US011501255B2

(12) United States Patent
Mann et al.

(10) Patent No.: US 11,501,255 B2
(45) Date of Patent: Nov. 15, 2022

(54) DIGITAL PROCESSING SYSTEMS AND METHODS FOR VIRTUAL FILE-BASED ELECTRONIC WHITE BOARD IN COLLABORATIVE WORK SYSTEMS

(71) Applicant: MONDAY.COM LTD., Tel Aviv (IL)

(72) Inventors: Roy Mann, Tel Aviv (IL); Stav Levi, Tel Aviv (IL); Etay Liberman, Tel Aviv (IL); Sarit Bartov, Ra'anana (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/242,452

(22) Filed: Apr. 28, 2021

(65) Prior Publication Data

US 2021/0342785 A1 Nov. 4, 2021

Related U.S. Application Data

(60) Provisional application No. 63/148,092, filed on Feb. 10, 2021, provisional application No. 63/122,439, (Continued)

(51) Int. Cl.
*G06Q 10/10* (2012.01)
*G06Q 10/06* (2012.01)

(Continued)

(52) U.S. Cl.
CPC ....... *G06Q 10/103* (2013.01); *G05B 13/0265* (2013.01); *G06F 3/0482* (2013.01);

(Continued)

(58) Field of Classification Search
CPC ............... G06Q 10/103; G06Q 10/101; G06Q 10/0633; G06Q 10/06313; G06Q 10/06312; G06Q 10/06316

(Continued)

(56) References Cited

U.S. PATENT DOCUMENTS

| | | | |
|---|---|---|---|
| 4,972,314 | A | 11/1990 | Getzinger et al. |
| 5,479,602 | A | 12/1995 | Baecker et al. |

(Continued)

FOREIGN PATENT DOCUMENTS

| | | | |
|---|---|---|---|
| CA | 2 828 011 | A1 | 9/2012 |
| CN | 103064833 | A | 4/2013 |

(Continued)

OTHER PUBLICATIONS

Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993: 391-398. (Year: 1993).*

(Continued)

*Primary Examiner* — Jonathan P Ouellette
(74) *Attorney, Agent, or Firm* — Finnegan, Henderson, Farabow, Garrett & Dunner LLP

(57) ABSTRACT

Systems and methods may include having an integrated unified filing engine. A system may include at least one processor configured to maintain at least one table containing a plurality of items and a plurality of asset designations, and to maintain at least one electronic whiteboard containing at least a subset of the plurality of asset designations. The processor may be further configured to maintain a data structure containing a plurality of links, wherein each link associates at least one of the subsets of asset designations with at least one location on the at least one electronic whiteboard, receive via a network access device, an activation of a particular link associated with a particular asset, alter a display of at least one electronic whiteboard containing an asset designation, and retrieving a presenting a corresponding asset in response to a received selection of a particular asset designation.

25 Claims, 240 Drawing Sheets

Related U.S. Application Data filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | |
|---|---|
| ***G06Q 30/02*** | (2012.01) |
| ***G06Q 30/06*** | (2012.01) |
| ***G06F 16/14*** | (2019.01) |
| ***G06F 16/23*** | (2019.01) |
| ***G06F 16/25*** | (2019.01) |
| ***G06F 16/11*** | (2019.01) |
| ***H04L 67/1095*** | (2022.01) |
| ***G06F 3/0482*** | (2013.01) |
| ***G06F 3/14*** | (2006.01) |
| ***H04L 51/046*** | (2022.01) |
| ***H04L 51/04*** | (2022.01) |
| ***G06F 40/279*** | (2020.01) |
| ***G06F 40/40*** | (2020.01) |
| ***G06F 40/30*** | (2020.01) |
| ***G06K 9/62*** | (2022.01) |
| ***G06F 3/04817*** | (2022.01) |
| ***G06F 3/16*** | (2006.01) |
| ***H04L 12/18*** | (2006.01) |
| ***G06F 16/22*** | (2019.01) |
| ***G06F 16/2455*** | (2019.01) |
| ***G06F 16/248*** | (2019.01) |
| ***G06F 40/177*** | (2020.01) |
| ***H04L 65/401*** | (2022.01) |
| ***G06N 20/00*** | (2019.01) |
| ***G06F 40/186*** | (2020.01) |
| ***G06F 3/0484*** | (2022.01) |
| ***G06F 11/30*** | (2006.01) |
| ***G06F 11/34*** | (2006.01) |
| ***G06F 40/103*** | (2020.01) |
| ***G06F 3/04845*** | (2022.01) |
| ***G06T 11/20*** | (2006.01) |
| ***G06F 16/909*** | (2019.01) |
| ***G06F 16/9038*** | (2019.01) |
| ***G06F 16/9032*** | (2019.01) |
| ***G06F 16/901*** | (2019.01) |
| ***G06F 16/951*** | (2019.01) |
| ***G06F 16/9536*** | (2019.01) |
| ***G06F 16/28*** | (2019.01) |
| ***G06F 16/26*** | (2019.01) |
| ***G06F 40/253*** | (2020.01) |
| ***H04L 51/18*** | (2022.01) |
| ***G06F 16/903*** | (2019.01) |
| ***G05B 13/02*** | (2006.01) |
| ***G06F 16/31*** | (2019.01) |
| ***G06F 40/106*** | (2020.01) |
| ***G06F 9/54*** | (2006.01) |
| ***H04L 51/48*** | (2022.01) |
| *B65D 83/04* | (2006.01) |

(52) U.S. Cl.

CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/48* (2022.05); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(58) Field of Classification Search

USPC .................................................. 705/1.1–912

See application file for complete search history.

(56) References Cited

U.S. PATENT DOCUMENTS

| | | | |
|---|---|---|---|
| 5,517,663 | A | 5/1996 | Kahn |
| 5,632,009 | A | 5/1997 | Rao et al. |
| 5,682,469 | A | 10/1997 | Linnett |
| 5,696,702 | A | 12/1997 | Skinner et al. |
| 5,726,701 | A | 3/1998 | Needham |
| 5,787,411 | A | 7/1998 | Groff et al. |
| 5,880,742 | A | 3/1999 | Rao et al. |
| 5,933,145 | A | 8/1999 | Meek |
| 6,016,553 | A | 1/2000 | Schneider et al. |
| 6,023,695 | A | 2/2000 | Osborn et al. |
| 6,034,681 | A | 3/2000 | Miller et al. |
| 6,167,405 | A | 12/2000 | Rosensteel, Jr. et al. |
| 6,169,534 | B1 | 1/2001 | Raffel et al. |
| 6,185,582 | B1 | 2/2001 | Zellweger et al. |
| 6,195,794 | B1 | 2/2001 | Buxton |
| 6,266,067 | B1 | 7/2001 | Owen et al. |
| 6,275,809 | B1 | 8/2001 | Tamaki et al. |
| 6,330,022 | B1 | 12/2001 | Seligmann |
| 6,377,965 | B1 | 4/2002 | Hachamovitch et al. |
| 6,385,617 | B1 | 5/2002 | Malik |
| 6,460,043 | B1 | 10/2002 | Tabbara et al. |
| 6,496,832 | B2 | 12/2002 | Chi et al. |
| 6,509,912 | B1 * | 1/2003 | Moran ............... G06F 3/04883 715/762 |
| 6,522,347 | B1 | 2/2003 | Tsuji et al. |
| 6,527,556 | B1 | 3/2003 | Koskinen |
| 6,567,830 | B1 | 5/2003 | Madduri |
| 6,606,740 | B1 | 8/2003 | Lynn et al. |
| 6,636,242 | B2 | 10/2003 | Bowman-Amuah |
| 6,647,370 | B1 | 11/2003 | Fu et al. |
| 6,661,431 | B1 | 12/2003 | Stuart et al. |
| 6,988,248 | B1 | 1/2006 | Tang et al. |

(56) References Cited

U.S. PATENT DOCUMENTS 7,027,997 B1 4/2006 Robinson et al.
7,043,529 B1 * 5/2006 Simonoff ................ H04L 67/02 709/204
7,054,891 B2 5/2006 Cole
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,383,320 B1 6/2008 Silberstein et al.
7,415,664 B2 8/2008 Aureglia et al.
7,461,077 B1 12/2008 Greenwood
7,489,976 B2 2/2009 Adra
7,617,443 B2 11/2009 Mills et al.
7,685,152 B2 3/2010 Chivukula et al.
7,707,514 B2 4/2010 Forstall et al.
7,710,290 B2 5/2010 Johnson
7,770,100 B2 8/2010 Chamberlain et al.
7,827,476 B1 11/2010 Roberts et al.
7,827,615 B1 11/2010 Allababidi et al.
7,916,157 B1 3/2011 Kelley et al.
7,954,064 B2 5/2011 Forstall et al.
8,046,703 B2 10/2011 Busch et al.
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater, Jr.
8,677,448 B1 3/2014 Kauffman et al.
8,738,414 B1 5/2014 Nagar et al.
8,812,471 B2 8/2014 Akita
8,819,042 B2 8/2014 Samudrala et al.
8,825,758 B2 9/2014 Bailor et al.
8,862,979 B2 10/2014 Hawking
8,863,022 B2 10/2014 Rhodes et al.
8,869,027 B2 10/2014 Louch et al.
8,937,627 B1 1/2015 Otero et al.
8,938,465 B2 1/2015 Messer
8,954,871 B2 2/2015 Louch et al.
9,007,405 B1 4/2015 Eldar et al.
9,015,716 B2 4/2015 Fletcher et al.
9,026,897 B2 5/2015 Zarras
9,043,362 B2 5/2015 Weissman et al.
9,063,958 B2 6/2015 Müller et al.
9,129,234 B2 9/2015 Campbell et al.
9,172,738 B1 10/2015 daCosta
9,183,303 B1 11/2015 Goel et al.
9,223,770 B1 12/2015 Ledet
9,239,719 B1 1/2016 Feinstein et al.
9,244,917 B1 1/2016 Sharma et al.
9,253,130 B2 2/2016 Zaveri
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,390,059 B1 7/2016 Gur et al.
9,424,287 B2 8/2016 Schroth
9,424,333 B1 8/2016 Bisignani et al.
9,424,545 B1 8/2016 Lee
9,430,458 B2 8/2016 Rhee et al.
9,449,031 B2 9/2016 Barrus et al.
9,495,386 B2 11/2016 Tapley et al.
9,558,172 B2 1/2017 Rampson et al.
9,613,086 B1 4/2017 Sherman
9,635,091 B1 * 4/2017 Laukkanen ......... G06F 3/04845
9,679,456 B2 6/2017 East
9,727,376 B1 8/2017 Bills et al.
9,760,271 B2 9/2017 Persaud
9,794,256 B2 10/2017 Kiang et al.
9,798,829 B1 10/2017 Baisley
9,811,676 B1 11/2017 Gauvin
9,866,561 B2 1/2018 Psenka et al.
9,870,136 B2 1/2018 Pourshahid
10,043,296 B2 8/2018 Li
10,067,928 B1 9/2018 Krappe
10,078,668 B1 9/2018 Woodrow et al.
10,169,306 B2 1/2019 O'Shaughnessy et al.
10,176,154 B2 1/2019 Ben-Aharon et al.
10,235,441 B1 3/2019 Makhlin et al.
10,255,609 B2 4/2019 Kinkead et al.
10,282,405 B1 5/2019 Silk et al.
10,282,406 B2 5/2019 Bissantz
10,311,080 B2 6/2019 Folting et al.
10,327,712 B2 6/2019 Beymer et al.
10,347,017 B2 7/2019 Ruble et al.
10,372,706 B2 8/2019 Chavan et al.
10,380,140 B2 8/2019 Sherman
10,423,758 B2 9/2019 Kido et al.
10,445,702 B1 10/2019 Hunt
10,452,360 B1 10/2019 Burman et al.
10,453,118 B2 10/2019 Smith et al.
10,474,317 B2 11/2019 Ramanathan et al.
10,489,391 B1 11/2019 Tomlin
10,489,462 B1 11/2019 Rogynskyy et al.
10,496,737 B1 12/2019 Sayre et al.
10,505,825 B1 12/2019 Bettaiah et al.
10,528,599 B1 1/2020 Pandis et al.
10,534,507 B1 * 1/2020 Laukkanen ............. G06F 9/452
10,540,152 B1 1/2020 Krishnaswamy et al.
10,540,434 B2 1/2020 Migeon et al.
10,564,622 B1 2/2020 Dean et al.
10,573,407 B2 2/2020 Ginsburg
10,628,002 B1 4/2020 Kang et al.
10,698,594 B2 6/2020 Sanches et al.
10,706,061 B2 7/2020 Sherman et al.
10,719,220 B2 7/2020 Ouellet et al.
10,733,256 B2 8/2020 Fickenscher et al.
10,740,117 B2 8/2020 Ording et al.
10,747,950 B2 8/2020 Dang et al.
10,748,312 B2 8/2020 Ruble et al.
10,754,688 B2 8/2020 Powell
10,761,691 B2 9/2020 Anzures et al.
10,795,555 B2 10/2020 Burke et al.
10,817,660 B2 10/2020 Rampson et al.
D910,077 S 2/2021 Naroshevitch et al.
10,963,578 B2 3/2021 More et al.
11,010,371 B1 5/2021 Slomka et al.
11,042,363 B1 6/2021 Krishnaswamy et al.
11,042,699 B1 6/2021 Sayre et al.
11,048,714 B2 6/2021 Sherman et al.
11,243,688 B1 2/2022 Remy et al.
2001/0008998 A1 7/2001 Tamaki et al.
2001/0032248 A1 10/2001 Krafchin
2001/0039551 A1 11/2001 Saito et al.
2002/0002459 A1 1/2002 Lewis et al.
2002/0065849 A1 5/2002 Ferguson et al.
2002/0065880 A1 5/2002 Hasegawa et al.
2002/0069207 A1 6/2002 Alexander et al.
2002/0075309 A1 6/2002 Michelman et al.
2002/0082892 A1 6/2002 Raffel et al.
2002/0138528 A1 9/2002 Gong et al.
2003/0033196 A1 2/2003 Tomlin
2003/0041113 A1 2/2003 Larsen
2003/0051377 A1 3/2003 Chirafesi, Jr.
2003/0058277 A1 3/2003 Bowman-Amuah
2003/0065662 A1 4/2003 Cosic

(56) References Cited

U.S. PATENT DOCUMENTS

2003/0093408 A1 5/2003 Brown et al.
2003/0135558 A1 7/2003 Bellotti et al.
2003/0187864 A1 10/2003 McGoveran
2003/0200215 A1 10/2003 Chen et al.
2003/0204490 A1 10/2003 Kasriel
2004/0032432 A1 2/2004 Baynger
2004/0098284 A1 5/2004 Petito et al.
2004/0133441 A1 7/2004 Brady et al.
2004/0138939 A1 7/2004 Theiler
2004/0139400 A1 7/2004 Allam et al.
2004/0162833 A1 8/2004 Jones et al.
2004/0172592 A1 9/2004 Collie et al.
2004/0212615 A1 10/2004 Uthe
2004/0215443 A1 10/2004 Hatton
2004/0268227 A1 12/2004 Brid
2005/0034058 A1 2/2005 Mills et al.
2005/0034064 A1 2/2005 Meyers et al.
2005/0039001 A1 2/2005 Hudis et al.
2005/0039033 A1 2/2005 Meyers et al.
2005/0044486 A1 2/2005 Kotler et al.
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0096973 A1 5/2005 Heyse et al.
2005/0114305 A1 5/2005 Haynes et al.
2005/0125395 A1 6/2005 Boettiger
2005/0165600 A1 7/2005 Kasravi et al.
2005/0171881 A1 8/2005 Ghassemieh et al.
2005/0257204 A1 11/2005 Bryant et al.
2005/0278297 A1 12/2005 Nelson
2005/0289342 A1 12/2005 Needham et al.
2005/0289453 A1 12/2005 Segal et al.
2006/0009960 A1 1/2006 Valencot et al.
2006/0015499 A1 1/2006 Clissold et al.
2006/0015806 A1 1/2006 Wallace
2006/0031148 A1 2/2006 O'Dell et al.
2006/0047811 A1 3/2006 Lau et al.
2006/0053096 A1 3/2006 Subramanian et al.
2006/0053194 A1* 3/2006 Schneider ............... H04L 67/36 709/204
2006/0069604 A1 3/2006 Leukart et al.
2006/0069635 A1 3/2006 Ram et al.
2006/0080594 A1 4/2006 Chavoustie et al.
2006/0090169 A1 4/2006 Daniels et al.
2006/0106642 A1 5/2006 Reicher et al.
2006/0107196 A1 5/2006 Thanu et al.
2006/0111953 A1 5/2006 Setya
2006/0129415 A1 6/2006 Thukral et al.
2006/0136828 A1 6/2006 Asano
2006/0173908 A1 8/2006 Browning et al.
2006/0190313 A1 8/2006 Lu
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0287998 A1 12/2006 Folting et al.
2006/0294451 A1 12/2006 Kelkar et al.
2007/0033531 A1 2/2007 Marsh
2007/0050322 A1 3/2007 Vigesaa et al.
2007/0050379 A1 3/2007 Day et al.
2007/0073899 A1 3/2007 Judge et al.
2007/0092048 A1 4/2007 Chelstrom et al.
2007/0094607 A1 4/2007 Morgan et al.
2007/0101291 A1 5/2007 Forstall et al.
2007/0106754 A1 5/2007 Moore
2007/0118527 A1 5/2007 Winje et al.
2007/0118813 A1 5/2007 Forstall et al.
2007/0143169 A1 6/2007 Grant et al.
2007/0168861 A1 7/2007 Bell et al.
2007/0174228 A1 7/2007 Folting et al.
2007/0174760 A1 7/2007 Chamberlain et al.
2007/0186173 A1 8/2007 Both et al.
2007/0220119 A1 9/2007 Himmelstein
2007/0256043 A1 11/2007 Peters et al.
2007/0282522 A1 12/2007 Geelen
2007/0282627 A1 12/2007 Greenstein et al.
2007/0283259 A1 12/2007 Barry et al.
2007/0294235 A1 12/2007 Millett
2007/0299795 A1 12/2007 Macbeth et al.
2007/0300174 A1 12/2007 Macbeth et al.
2007/0300185 A1 12/2007 Macbeth et al.
2008/0004929 A9 1/2008 Raffel et al.
2008/0005235 A1 1/2008 Hegde et al.
2008/0033777 A1 2/2008 Shukoor
2008/0034307 A1 2/2008 Cisler et al.
2008/0034314 A1 2/2008 Louch et al.
2008/0052291 A1 2/2008 Bender
2008/0059312 A1 3/2008 Gern et al.
2008/0065460 A1 3/2008 Raynor
2008/0077530 A1 3/2008 Banas et al.
2008/0097748 A1 4/2008 Haley et al.
2008/0104091 A1 5/2008 Chin
2008/0126389 A1 5/2008 Mush et al.
2008/0133736 A1 6/2008 Wensley et al.
2008/0148140 A1 6/2008 Nakano
2008/0155547 A1 6/2008 Weber et al.
2008/0163075 A1 7/2008 Beck et al.
2008/0183593 A1 7/2008 Dierks
2008/0195948 A1 8/2008 Bauer
2008/0209318 A1 8/2008 Allsop et al.
2008/0216022 A1 9/2008 Lorch et al.
2008/0222192 A1 9/2008 Hughes
2008/0256014 A1 10/2008 Gould et al.
2008/0270597 A1 10/2008 Tenenti
2008/0282189 A1 11/2008 Hofmann et al.
2008/0295038 A1 11/2008 Helfman et al.
2008/0301237 A1 12/2008 Parsons
2009/0006171 A1 1/2009 Blatchley et al.
2009/0006283 A1 1/2009 Labrie et al.
2009/0013244 A1 1/2009 Cudich et al.
2009/0019383 A1 1/2009 Riley et al.
2009/0024944 A1 1/2009 Louch et al.
2009/0044090 A1 2/2009 Gur et al.
2009/0048896 A1 2/2009 Anandan
2009/0049372 A1 2/2009 Goldberg
2009/0077164 A1 3/2009 Phillips et al.
2009/0077217 A1 3/2009 McFarland et al.
2009/0083140 A1 3/2009 Phan
2009/0094514 A1 4/2009 Dargahi et al.
2009/0113310 A1 4/2009 Appleyard et al.
2009/0132470 A1 5/2009 Vignet
2009/0150813 A1 6/2009 Chang et al.
2009/0174680 A1 7/2009 Anzures et al.
2009/0192787 A1 7/2009 Roon
2009/0198715 A1 8/2009 Barbarek
2009/0248710 A1 10/2009 McCormack et al.
2009/0276692 A1 11/2009 Rosner
2009/0313201 A1 12/2009 Huelsman et al.
2009/0313537 A1 12/2009 Fu et al.
2009/0313570 A1 12/2009 Po et al.
2009/0319623 A1 12/2009 Srinivasan et al.
2009/0319882 A1 12/2009 Morrison et al.
2009/0327240 A1 12/2009 Meehan et al.
2009/0327851 A1 12/2009 Raposo
2009/0327875 A1 12/2009 Kinkoh
2010/0017699 A1 1/2010 Farrell et al.
2010/0070895 A1 3/2010 Messer
2010/0083164 A1 4/2010 Martin et al.
2010/0088636 A1 4/2010 Yerkes et al.
2010/0095219 A1 4/2010 Stachowiak et al.
2010/0095298 A1 4/2010 Seshadrinathan et al.
2010/0100427 A1 4/2010 McKeown et al.
2010/0100463 A1 4/2010 Molotsi et al.
2010/0114926 A1 5/2010 Agrawal et al.
2010/0149005 A1 6/2010 Yoon et al.
2010/0174678 A1 7/2010 Massand
2010/0228752 A1 9/2010 Folting et al.
2010/0241477 A1 9/2010 Nylander et al.
2010/0241948 A1 9/2010 Andeen et al.
2010/0241972 A1 9/2010 Spataro et al.

(56) References Cited

U.S. PATENT DOCUMENTS

2010/0241990 A1 9/2010 Gabriel et al.
2010/0251090 A1 9/2010 Chamberlain et al.
2010/0257015 A1 10/2010 Molander
2010/0262625 A1 10/2010 Pittenger
2010/0287221 A1 11/2010 Battepati et al.
2010/0324964 A1 12/2010 Callanan et al.
2010/0332973 A1 12/2010 Kloiber et al.
2011/0010340 A1 1/2011 Hung et al.
2011/0016432 A1 1/2011 Helfman
2011/0028138 A1 2/2011 Davies-Moore et al.
2011/0047484 A1* 2/2011 Mount .................. G06Q 10/10 715/753
2011/0055177 A1 3/2011 Chakra et al.
2011/0066933 A1 3/2011 Ludwig
2011/0071869 A1 3/2011 O'Brien et al.
2011/0106636 A1 5/2011 Spear et al.
2011/0119352 A1 5/2011 Perov et al.
2011/0179371 A1 7/2011 Kopycinski et al.
2011/0205231 A1 8/2011 Hartley et al.
2011/0208324 A1 8/2011 Fukatsu
2011/0208732 A1 8/2011 Melton et al.
2011/0209150 A1 8/2011 Hammond et al.
2011/0219321 A1 9/2011 Gonzalez et al.
2011/0225525 A1 9/2011 Chasman et al.
2011/0231273 A1 9/2011 Buchheit
2011/0289397 A1 11/2011 Eastmond et al.
2011/0289439 A1 11/2011 Jugel
2011/0298618 A1 12/2011 Stahl et al.
2011/0302003 A1 12/2011 Shirish et al.
2012/0029962 A1 2/2012 Podgurny et al.
2012/0035974 A1 2/2012 Seybold
2012/0036462 A1 2/2012 Schwartz et al.
2012/0072821 A1 3/2012 Bowling
2012/0079408 A1 3/2012 Rohwer
2012/0081762 A1 4/2012 Yamada
2012/0084798 A1 4/2012 Reeves et al.
2012/0086716 A1 4/2012 Reeves et al.
2012/0086717 A1 4/2012 Liu
2012/0089914 A1 4/2012 Holt et al.
2012/0089992 A1 4/2012 Reeves et al.
2012/0096389 A1 4/2012 Flam et al.
2012/0096392 A1 4/2012 Ording et al.
2012/0102432 A1 4/2012 Breedvelt-Schouten et al.
2012/0102543 A1 4/2012 Kohli et al.
2012/0110515 A1 5/2012 Abramoff et al.
2012/0116834 A1 5/2012 Pope et al.
2012/0116835 A1 5/2012 Pope et al.
2012/0124749 A1 5/2012 Lewman et al.
2012/0131445 A1 5/2012 Oyarzabal et al.
2012/0151173 A1 6/2012 Shirley et al.
2012/0158744 A1 6/2012 Tseng et al.
2012/0192050 A1 7/2012 Campbell et al.
2012/0198322 A1 8/2012 Gulwani et al.
2012/0210252 A1 8/2012 Fedoseyeva et al.
2012/0215574 A1 8/2012 Driessnack et al.
2012/0215578 A1 8/2012 Swierz, III et al.
2012/0233533 A1 9/2012 Yucel et al.
2012/0239454 A1 9/2012 Taix et al.
2012/0246170 A1 9/2012 Lantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Strick et al.
2012/0297307 A1 11/2012 Rider et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2013/0018952 A1 1/2013 McConnell et al.
2013/0018953 A1 1/2013 McConnell et al.
2013/0018960 A1 1/2013 Knysz et al.
2013/0024418 A1 1/2013 Strick et al.
2013/0024760 A1 1/2013 Vogel et al.
2013/0036369 A1 2/2013 Mitchell et al.
2013/0041958 A1 2/2013 Post et al.
2013/0055113 A1 2/2013 Chazin et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.
2013/0104035 A1 4/2013 Wagner et al.
2013/0111320 A1 5/2013 Campbell et al.
2013/0117268 A1 5/2013 Smith et al.
2013/0159832 A1 6/2013 Ingargiola et al.
2013/0159907 A1 6/2013 Brosche et al.
2013/0211866 A1 8/2013 Gordon et al.
2013/0212197 A1 8/2013 Karlson
2013/0212234 A1 8/2013 Bartlett et al.
2013/0238363 A1 9/2013 Ohta et al.
2013/0238968 A1 9/2013 Barrus
2013/0262527 A1 10/2013 Hunter
2013/0268331 A1 10/2013 Bitz et al.
2013/0297468 A1 11/2013 Hirsch et al.
2013/0318424 A1 11/2013 Boyd
2014/0006326 A1 1/2014 Bazanov
2014/0019842 A1 1/2014 Montagna et al.
2014/0043331 A1 2/2014 Makinen et al.
2014/0046638 A1 2/2014 Peloski
2014/0052749 A1 2/2014 Rissanen
2014/0068403 A1 3/2014 Bhargav et al.
2014/0074545 A1 3/2014 Minder et al.
2014/0075301 A1 3/2014 Mihara
2014/0101527 A1 4/2014 Suciu
2014/0108985 A1 4/2014 Scott et al.
2014/0109012 A1 4/2014 Choudhary et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Järvenpää et al.
2014/0172475 A1 6/2014 Olliphant et al.
2014/0173401 A1 6/2014 Oshlag et al.
2014/0188748 A1 7/2014 Cavoue et al.
2014/0195933 A1 7/2014 Dv
2014/0214404 A1 7/2014 Kalia et al.
2014/0215303 A1 7/2014 Grigorovitch et al.
2014/0249877 A1 9/2014 Hull et al.
2014/0278638 A1 9/2014 Kreuzkamp et al.
2014/0278720 A1 9/2014 Taguchi
2014/0280287 A1 9/2014 Ganti et al.
2014/0280377 A1 9/2014 Frew
2014/0281868 A1 9/2014 Vogel et al.
2014/0281869 A1 9/2014 Yob
2014/0289223 A1 9/2014 Colwell et al.
2014/0304174 A1 10/2014 Scott et al.
2014/0306837 A1 10/2014 Hauck, III
2014/0324497 A1 10/2014 Verma et al.
2014/0324501 A1 10/2014 Davidow et al.
2014/0365938 A1 12/2014 Black et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0074721 A1 3/2015 Fishman et al.
2015/0074728 A1 3/2015 Chai et al.
2015/0095752 A1 4/2015 Studer et al.
2015/0106736 A1 4/2015 Torman et al.
2015/0125834 A1 5/2015 Mendoza
2015/0142676 A1 5/2015 McGinnis et al.
2015/0142829 A1 5/2015 Lee et al.
2015/0153943 A1 6/2015 Wang
2015/0154660 A1 6/2015 Weald et al.
2015/0169531 A1 6/2015 Campbell et al.
2015/0188964 A1 7/2015 Sharma et al.
2015/0212717 A1 7/2015 Nair et al.
2015/0242091 A1 8/2015 Lu et al.
2015/0249864 A1 9/2015 Tang et al.
2015/0261796 A1 9/2015 Gould et al.
2015/0278699 A1 10/2015 Danielsson
2015/0281292 A1 10/2015 Murayama et al.
2015/0295877 A1 10/2015 Roman
2015/0317590 A1 11/2015 Karlson
2015/0324453 A1 11/2015 Werner

(56) References Cited

U.S. PATENT DOCUMENTS

2015/0331846 A1 11/2015 Guggilla et al.
2015/0363478 A1 12/2015 Haynes
2015/0370540 A1 12/2015 Coslovi et al.
2015/0370904 A1 12/2015 Joshi et al.
2015/0378542 A1 12/2015 Saito et al.
2015/0378711 A1 12/2015 Cameron et al.
2015/0378979 A1 12/2015 Hirzel et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0055134 A1 2/2016 Sathish et al.
2016/0055374 A1 2/2016 Zhang et al.
2016/0063435 A1 3/2016 Shah et al.
2016/0078368 A1 3/2016 Kakhandiki et al.
2016/0088480 A1 3/2016 Chen et al.
2016/0092557 A1 3/2016 Stojanovic et al.
2016/0117308 A1 4/2016 Haider et al.
2016/0170586 A1 6/2016 Gallo
2016/0173122 A1 6/2016 Akitomi et al.
2016/0210572 A1 7/2016 Shaaban et al.
2016/0224532 A1 8/2016 Miller et al.
2016/0231915 A1 8/2016 Nhan et al.
2016/0232489 A1 8/2016 Skaaksrud
2016/0246490 A1 8/2016 Cabral
2016/0253982 A1 9/2016 Cheung et al.
2016/0259856 A1 9/2016 Ananthapur et al.
2016/0275150 A1 9/2016 Bournonnais et al.
2016/0299655 A1 10/2016 Migos et al.
2016/0321235 A1 11/2016 He et al.
2016/0321604 A1 11/2016 Imaeda et al.
2016/0335302 A1 11/2016 Teodorescu et al.
2016/0335303 A1 11/2016 Madhalam et al.
2016/0335731 A1 11/2016 Hall
2016/0335903 A1 11/2016 Mendoza
2016/0344828 A1 11/2016 Häusler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0041296 A1 2/2017 Ford et al.
2017/0052937 A1 2/2017 Sirven et al.
2017/0061342 A1 3/2017 Lore et al.
2017/0061360 A1 3/2017 Rucker et al.
2017/0063722 A1 3/2017 Cropper et al.
2017/0075557 A1 3/2017 Noble et al.
2017/0091337 A1 3/2017 Patterson
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0126772 A1 5/2017 Campbell et al.
2017/0132296 A1 5/2017 Ding
2017/0139874 A1 5/2017 Chin
2017/0139884 A1 5/2017 Bendig et al.
2017/0140047 A1 5/2017 Bendig et al.
2017/0140219 A1 5/2017 King et al.
2017/0153771 A1 6/2017 Chu
2017/0177888 A1 6/2017 Arora et al.
2017/0185668 A1 6/2017 Convertino et al.
2017/0200122 A1 7/2017 Edson et al.
2017/0206366 A1 7/2017 Fay et al.
2017/0220813 A1 8/2017 Mullins et al.
2017/0221072 A1 8/2017 AthuluruTlrumala et al.
2017/0228445 A1 8/2017 Chiu et al.
2017/0228460 A1 8/2017 Amel et al.
2017/0236081 A1 8/2017 Grady Smith et al.
2017/0242921 A1 8/2017 Rota
2017/0270970 A1 9/2017 Ho et al.
2017/0272316 A1 9/2017 Johnson et al.
2017/0272331 A1 9/2017 Lissack
2017/0285879 A1 10/2017 Pilkington et al.
2017/0285890 A1* 10/2017 Dolman ............... G06Q 10/101
2017/0315683 A1 11/2017 Boucher et al.
2017/0324692 A1 11/2017 Zhou
2017/0351252 A1 12/2017 Kleifges et al.
2017/0372442 A1 12/2017 Mejias
2018/0025084 A1 1/2018 Conlan et al.
2018/0032492 A1 2/2018 Altshuller et al.
2018/0032570 A1 2/2018 Miller et al.
2018/0055434 A1 3/2018 Cheung et al.
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0081863 A1 3/2018 Bathla
2018/0081868 A1 3/2018 Willcock et al.
2018/0088753 A1 3/2018 Viégas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121994 A1 5/2018 Matsunaga et al.
2018/0129651 A1 5/2018 Latvala et al.
2018/0157455 A1 6/2018 Troy et al.
2018/0157467 A1 6/2018 Stachura
2018/0157468 A1 6/2018 Stachura
2018/0173715 A1 6/2018 Dunne
2018/0181650 A1 6/2018 Komatsuda et al.
2018/0181716 A1 6/2018 Mander et al.
2018/0210936 A1 7/2018 Reynolds et al.
2018/0225270 A1 8/2018 Bhide et al.
2018/0260371 A1 9/2018 Theodore et al.
2018/0276417 A1 9/2018 Cerezo
2018/0293217 A1 10/2018 Callaghan
2018/0293669 A1 10/2018 Jackson et al.
2018/0329930 A1 11/2018 Eberlein et al.
2018/0330320 A1 11/2018 Kohli
2018/0357305 A1 12/2018 Kinast et al.
2018/0367484 A1 12/2018 Rodriguez et al.
2018/0373434 A1 12/2018 Switzer et al.
2018/0373757 A1 12/2018 Schukovets et al.
2019/0005094 A1 1/2019 Yi et al.
2019/0036989 A1 1/2019 Eirinberg et al.
2019/0050445 A1 2/2019 Griffith et al.
2019/0050812 A1 2/2019 Boileau
2019/0056856 A1 2/2019 Simmons et al.
2019/0065545 A1 2/2019 Hazel et al.
2019/0073350 A1 3/2019 Shiotani
2019/0095413 A1 3/2019 Davis et al.
2019/0108046 A1 4/2019 Spencer-Harper et al.
2019/0113935 A1 4/2019 Kuo et al.
2019/0123924 A1 4/2019 Embiricos et al.
2019/0130611 A1 5/2019 Black et al.
2019/0138583 A1 5/2019 Silk et al.
2019/0138588 A1 5/2019 Silk et al.
2019/0138653 A1 5/2019 Roller et al.
2019/0155821 A1 5/2019 Dirisala
2019/0208058 A1 7/2019 Dvorkin et al.
2019/0236188 A1 8/2019 McKenna
2019/0243879 A1 8/2019 Harley et al.
2019/0251884 A1* 8/2019 Burns .................... G09G 1/007
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0324840 A1 10/2019 Malamut et al.
2019/0347077 A1 11/2019 Huebra
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2020/0005248 A1 1/2020 Gerzi et al.
2020/0005295 A1 1/2020 Murphy
2020/0012629 A1 1/2020 Lereya et al.
2020/0019595 A1 1/2020 Azua
2020/0026397 A1 1/2020 Wohlstadter et al.
2020/0042648 A1 2/2020 Rao
2020/0125574 A1 4/2020 Ghoshal et al.
2020/0134002 A1 4/2020 Tung et al.
2020/0142546 A1 5/2020 Breedvelt-Schouten et al.

(56) References Cited

U.S. PATENT DOCUMENTS

| | | | |
|---|---|---|---|
| 2020/0151630 | A1 | 5/2020 | Shakhnovich |
| 2020/0159558 | A1 | 5/2020 | Bak et al. |
| 2020/0175094 | A1 | 6/2020 | Palmer |
| 2020/0192785 | A1 | 6/2020 | Chen |
| 2020/0247661 | A1 | 8/2020 | Rao et al. |
| 2020/0265112 | A1 | 8/2020 | Fox et al. |
| 2020/0279315 | A1 | 9/2020 | Manggala |
| 2020/0301678 | A1 | 9/2020 | Burman et al. |
| 2020/0301902 | A1 | 9/2020 | Maloy et al. |
| 2020/0327244 | A1 | 10/2020 | Blass et al. |
| 2020/0334019 | A1 | 10/2020 | Bosworth et al. |
| 2020/0348809 | A1 | 11/2020 | Drescher |
| 2020/0349320 | A1 | 11/2020 | Owens |
| 2020/0356873 | A1 | 11/2020 | Nawrocke et al. |
| 2020/0380212 | A1 | 12/2020 | Butler et al. |
| 2020/0380449 | A1 | 12/2020 | Choi |
| 2020/0387664 | A1 | 12/2020 | Kusumura et al. |
| 2020/0401581 | A1 | 12/2020 | Eubank et al. |
| 2021/0019287 | A1 | 1/2021 | Prasad et al. |
| 2021/0021603 | A1 | 1/2021 | Gibbons |
| 2021/0042796 | A1 | 2/2021 | Khoury et al. |
| 2021/0049555 | A1 | 2/2021 | Shor |
| 2021/0055955 | A1 | 2/2021 | Yankelevich et al. |
| 2021/0056509 | A1 | 2/2021 | Lindy |
| 2021/0072883 | A1 | 3/2021 | Migunova et al. |
| 2021/0073526 | A1 | 3/2021 | Zeng et al. |
| 2021/0084120 | A1 * | 3/2021 | Fisher ................. H04L 67/2842 |
| 2021/0124749 | A1 | 4/2021 | Suzuki et al. |
| 2021/0124872 | A1 | 4/2021 | Lereya |
| 2021/0149553 | A1 | 5/2021 | Lereya et al. |
| 2021/0150489 | A1 | 5/2021 | Haramati et al. |
| 2021/0165782 | A1 | 6/2021 | Deshpande et al. |
| 2021/0166196 | A1 | 6/2021 | Lereya et al. |
| 2021/0166339 | A1 | 6/2021 | Mann et al. |
| 2021/0173682 | A1 | 6/2021 | Chakraborti et al. |
| 2021/0192126 | A1 | 6/2021 | Gehrmann et al. |
| 2021/0264220 | A1 | 8/2021 | Wei et al. |

FOREIGN PATENT DOCUMENTS

| | | | |
|---|---|---|---|
| CN | 107422666 | A | 12/2017 |
| CN | 107623596 | A | 1/2018 |
| CN | 107885656 | A | 4/2018 |
| CN | 112929172 | A | 6/2021 |
| EP | 3 443 466 | B1 | 12/2021 |
| WO | WO 2004/100015 | A2 | 11/2004 |
| WO | WO 2006/116580 | A2 | 11/2006 |
| WO | WO 2008109541 | A1 | 9/2008 |
| WO | WO 2017202159 | A1 | 11/2017 |
| WO | WO 2020/187408 | A1 | 9/2020 |
| WO | WO 2021096944 | A1 | 5/2021 |
| WO | WO 2021144656 | A1 | 7/2021 |
| WO | WO 2021161104 | A1 | 8/2021 |
| WO | WO 2021220058 | A1 | 11/2021 |

OTHER PUBLICATIONS

D'Alessio et al., Monday.com Walkthrough 2018\All Features, Platforms & Thoughts, (https://www.youtube.com/watch?v=ajBtOzTlhC8&t=352s), Mar. 1, 2018, Screenshots and transcript pp. 1-55, (Year: 2018).

Rodrigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/1B2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/1B2021/000024, dated May 3, 2021 (13 pages).

"Pivot table—Wikipedia"; URL: https://en.wikepedia .org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2010, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/1B2021/000297, dated Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

U.S. Appl. No. 17/243,803, filed Apr. 29, 2021.
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.

(56) References Cited

OTHER PUBLICATIONS

U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,534, filed Dec. 30, 2021.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.
Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.
Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked Column and Bar Charts", Aug. 2011, Peltier Technical Services, Inc., pp. 1-128; (Year: 2011).
Beate List, "An Evaluation of Conceptual Business Process Modelling Languages", 2006, SAC'06, Apr. 23-27, pp. 1532-1539 (Year: 2006).

* cited by examiner

700

1200

3700

3800

3900

4200

4202

When a Conference meeting is scheduled, create an item

FIG. 169
Team files hub
Cards
Desktop
List
27 items, 613.9MB
New
Search
Filter
Sort
Share
Metadata
16902a
16902b
16902c
16902d
PLEASE BELIEVE THESE DAYS WILL PASS
16902e
16902f
16902g
16902i
facebook

| 17702 | Name | Email Address | 17704 |
|---|---|---|---|
| 17702a | Ralph | ralph@email.com | 17704a |
| 17702b | John | john@email.com | 17704b |
| 17702c | Sam | sam@email.com | 17704c |
| 17702d | Jordan | jordan@email.com | 17704d |

17725

| 17726 | Task | Assigned to: | 17728 |
|---|---|---|---|
| 17726a | Task #1 | Ralph | 17728a |
| 17726b | Task #2 | John | 17728b |
| 17726c | Task #3 | John | 17728c |
| 17726d | Task #4 | Sam, Jordan | 17728d |

17750

| 17752 | To-Do | Due Date | 17754 |
|---|---|---|---|
| 17752a | Task #4 | Tomorrow | |
| 17752b | Sub-Task A | Today | |
| 17752c | Sub-Task B | Today | |

| Subject | To | From | Date |
|---|---|---|---|
| Task #1 Status | Ralph | John | August 5 |
| Re: Task #1 Status | John | Ralph | August 7 |
| Task #2 Deadline | John, Ralph | Jordan | August 12 |
| Task #4 Details | Jordan | John | August 15 |
| Task #3 Quote | Sam | Jordan | September 2 |

| | File Name | Extension | Identification | Range | Location |
|---|---|---|---|---|---|
| 19501 | Single Clap (1-5) | .mp3 | 1216827494 (19503) | 1-5 (19505) | www.website.com/.../single-clap.mp3 |
| 19507 | Small Group Clap (6-9) | .wav | 4278110952 | 6-9 | www.website.com/.smlclap.wav |
| 19509 | Medium Group Clap (10-20) | .wav | 867530999 | 10-20 | www.website.com/.midclap.wav |
| 19511 | Large Group Clap (21-40) | .wav | 403987632 | 21-40 | www.website.com/.lrgclap.wav |
| 19513 | Group Cheer (41-) | .mp4 | 493836733 | 41- | C:\\...\crowd-cheer.mp4 |

FIG. 195

DIGITAL PROCESSING SYSTEMS AND METHODS FOR VIRTUAL FILE-BASED ELECTRONIC WHITE BOARD IN COLLABORATIVE WORK SYSTEMS

CROSS-REFERENCE TO RELATED APPLICATIONS

This application is based on and claims benefit of priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

The present disclosure relates generally to systems, methods, and computer-readable media for enabling and optimizing workflows in collaborative work systems.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

In many organizations, project management tools may be divided among many different systems with no way (or limited ways) to integrate them. For example, documents, chats, email, calendars, GANTT charts, location tracking, time management, control systems, cost management, capacity management, CRMs, process/order/delivery scheduling, and other functions of an organization may be confined to non-integrated standalone systems or systems that are only partially integrated. It would be useful to improve these software applications to increase operation management efficiency and overall efficiency of computer systems.

Enterprises of all sizes may deal with the challenges of troubleshooting their automation operations. Associated tasks may be complicated and time consuming. In many cases, troubleshooting automations of a single project may require integration of several employees, departments, and other groups. To deal with these complicated and time-consuming tasks, it may be helpful to have a tool to identify the source of an error that may cause one or more automations to no longer function properly, which may be hard to identify among a multitude of automations that may be associated with a project or board. Such a tool may manage various automation tasks, occurring irregularities, and other aspects of an automation.

It may be helpful to provide a user with information regarding one or more automations associated with one or more boards. Then, when an irregularity in an automation occurs in a board, one or more of the most recently changed automations may be displayed so that a user can quickly identify the source of the problem. Such information may include for example, an overview on how long tasks will take to complete, warnings, historical information, and the like. Further, the troubleshooting tool may include display features that provide different informational displays that allow a user to interact with the information in real time in an organized manner.

As a greater number of teams work collaboratively from a distance, maintaining an effective unified filing system may be more difficult. Even teams which work in a common space rely mostly on digital files to store their data. Conventional systems allow for these files to be stored and shared online. However, conventional systems are usually tailored toward individual use and not for teams. As such, these systems do not adequately allow for sharing, altering, annotating, and uploading digital files by multiple entities. Additionally, conventional systems do not allow for files to be associated with elements of a workflow management system, including, for example, deadlines, milestones, and statuses.

As a greater number of people communicate with colleagues and people in differing organizations through online methods, there is a need for enterprise messaging systems to be accurate and precise. Conventional systems may provide a person with a suggestion for an external address when sending a communication, but conventional systems only provide these suggestions if it receives inputs of at least some identifying data to the system. For example, a user may begin typing a name associated with an external address, which may prompt conventional systems to provide the user with the external address. However, these systems rely on users remembering at least some identifying information about the entity they wish to send a message to. However, users might not remember all of the entities which they want to send a message to. As such, many times entities are left out of communications which they should have been included in, sometimes causing great harm to individuals and organizations alike.

As greater numbers of employees either work from home or work in other locations remote from supervisors, acknowledging accomplishments can be more difficult. Even when employees work in a common space, ensuring that employees are recognized for accomplishments can be difficult, particularly when large groups of individuals each with many milestones, targets, or goals are managed by a single supervisor or a small group of supervisors. In such situations, accomplishments may be inadvertently overlooked. Regardless of size of a working group and its location, acknowledgements of accomplishments are typically left to the whim of supervisors who may be too busy or otherwise distracted to acknowledge an accomplishment.

The foregoing background is for illustrative purposes and is not intended as a discussion of the scope of the prior art.

SUMMARY

Embodiments consistent with the present disclosure provide systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Systems, methods, devices, and non-transitory computer readable media may include a system for identifying data types in customized headings, the system including at least one processor configured to: display a table having at least one customizable row heading or column heading; receive an insertion of a customized name for the at least one customizable row heading or column heading; perform a lookup of the inserted customized name to identify a data type associated with the inserted customized name; display, based on the identified data type, selectable options for values for an associated cell of the at least one customizable row heading or column heading; enable selection of at least one option of the selectable options; and associate the selected option with the associated cell in at least one row or column associated with the at least one customizable row heading or column heading.

Systems, methods, devices, and non-transitory computer readable media may include a system for generating a hybrid table template pre-populated with data pulled from preexisting tables, the system including at least one processor configured to: store a customized hybrid table-template definition, wherein the hybrid table-template definition may include a table format and at least one pre-population rule linking at least one cell of the hybrid table template with at least one cell of a preexisting table populated with data. The at least one processor may receive a request to generate a new table using the hybrid table template definition; and following receipt of the request, generate the new table, wherein generating includes following a link to access real-time cell data from the preexisting table, and migrating the real-time cell data to the new table.

Systems, methods, devices, and non-transitory computer readable media may include a system for representing data via a multi-structured table, the system including at least one processor configured to: maintain a main table having a first structure and containing a plurality of rows; receive a first electronic request for establishment of a first sub-table associated with the main table, wherein the electronic request may include column heading definitions and wherein the column heading definitions constitute a second structure. The at least one processor may store the second structure in memory as a default sub-table structure; associate the first sub-table with a first row in the main table, receive a second electronic request for association of a second sub-table with a second row of the main table, perform a lookup of the default sub-table structure following receipt of the second electronic request, apply the default sub-table structure to the second sub-table, and may receive a change to a structure of the second sub-table, and upon receipt of the change, cause a corresponding change to occur in the first sub-table and the default sub-table structure.

Systems, methods, devices, and non-transitory computer readable media may include a system for deconstructing an integrated web of structural components and data, the system including at least one processor configured to: maintain the integrated web of the structural components and the data, wherein the structural components include customized tables for maintaining the data, automations for acting on the data in the customized tables, and dashboards for visualizing the data. The at least one processor may receive instructions to alter elements of at least some of the structural components; update the integrated web to comport with the instructions; receive a command to generate a copy of the structural components of the integrated web without the data, and in response to the command, output the copy of the structural components in a template format that permits the copy to be adopted for secondary use.

Systems, methods, devices, and non-transitory computer readable media may include a system for graphically aggregating data from a plurality of distinct tables, and enabling dissociation of underlying aggregated data from the associated distinct tables including at least one processor that is configured to maintain the plurality of distinct tables, wherein each distinct table contains a plurality of items, with each item being made up of a plurality of cells categorized by category indicators, and wherein the plurality of distinct tables contain a common category indicator. The at least one processor may be further configured to generate a graphical representation of a plurality of variables within the plurality of cells associated with the common category indicator, the graphical representation including a plurality of sub-portions, each sub-portion representing a differing variable of the common category indicator, and receive a selection of a sub-portion of the graphical representation. The processor may further be configured to perform a look-up across the plurality of distinct tables for a specific variable associated with the received selection, and based on the look-up, cause an aggregated display of a plurality of items dissociated from the differing tables, wherein each displayed item includes the specific variable and variables associated with additional category indicators.

Systems, methods, devices, and non-transitory computer readable media may include a system for syncing data between a tabular platform and a third-party application including at least one processor that is configured to access a first platform that displays a first set of data in a first format, access a second platform that displays a second set of data in a second format, and link the first set of data with the second set of data to enable migration of the first set of data to the second platform and the second set of data to the first platform. The at least one processor may also be configured to enable the first platform to simultaneously display the second set of data in the second format, enable alteration of the second set of data in the second platform through manipulation of the simultaneous display of the second set of data in the first platform, and in response to receiving an alteration, sync the second set of data as altered via the first platform with the first data set.

Systems, methods, devices, and non-transitory computer readable media may include a workflow management system for triggering table entries characterizing workflow-related communications occurring between workflow participants including at least one processor that is configured to present a table via a display, the table containing rows and columns defining cells, the rows and cells being configured to manage respective roles of the workflow participants, present on the display at least one active link for enabling workflow participants to join in a video or an audio communication, log in memory, characteristics of the communication including identities of the workflow participants who joined in the communication, and generate an object associated with the table, the object containing the characteristics of the communication logged in memory.

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Systems, methods, and computer readable media for some embodiments for implementing multi-table automation triggers are disclosed. They may include at least one processor that is configured to maintain a first table with rows and columns defining first cells, maintain a second table with rows and columns defining second cells, and display a joint logical sentence structure template including a first definable condition and a second definable condition. Input options for the first definable condition may be linked to the first table, input options for the second definable condition may be linked to the second table, and a joint rule may be generated for the first table and the second table by storing a first value for the first definable condition and storing a second value for the second definable condition. The joint rule may be applied across the first table and the second table and triggered when the first condition in the first table is met and the second condition in the second table is met.

Methods, computer readable media and systems employing self-configuring table automations are disclosed in some embodiments. Systems, methods, devices, and non-transitory computer readable media may include at least one processor that is configured to present a plurality of alternative automation packages for application to a table, wherein each package includes a plurality of automations, and wherein each automation is configured to cause an action in response to at least one condition detected in the table. A selection of a package from the plurality of packages may be identified, a first condition may be automatically configured in a particular automation in the selected package based on data in the table, a second undefined condition of the particular automation may be displayed, wherein the second undefined condition may require further configuration. An input may be received for configuring the second undefined condition, the second undefined condition may be configured using the input to cause the second undefined condition to become a second defined condition, and the particular automation may be applied to the table.

Consistent with some disclosed embodiments, there may be provided systems, methods, and computer readable media for remotely automating changes to third party applications from within a primary application. A system may include a processor configured to maintain in the primary application, a table having rows, columns, and cells at intersections of the rows and columns. The primary application may be configured to enable the construction of automations defined by conditional rules for altering internal information in the primary application and external information in the third party applications. The processor may be configured to receive an automation definition conditional on specific information input into at least one specific cell in the table of the primary application. The automation definition may be constructed using internal blocks and external blocks. The external blocks may have links to the external party applications. The processor may be configured to monitor the at least one specific cell of the primary application for an occurrence of the specific information. The processor may be configured to, upon detection of the occurrence of the specific information, trigger functionality of the third party applications.

In the course of collaboration between different users, each of whom may be using different automations or different automation combinations and techniques, there may exist a technical challenge to troubleshoot a growing number of automation tasks that may be associated with one or more boards. For example, there may be a technical challenge to identify rules performed in each automation and ensure that there are no logical errors when there may be hundreds of automations operating on one or more boards. Therefore, there is a need for unconventional approaches to enable a user to pinpoint a specific automation that may include an error and troubleshoot the implemented automation. Various embodiments of the present disclosure describe unconventional systems and methods automation troubleshooting. The various embodiments the present disclosure describe at least a technological solution, based on improvement to operations of computer systems and platforms, to the technical challenge of troubleshooting automation tasks.

Specifically, aspects of this disclosure provides systems, methods, devices, and non-transitory computer readable mediums for troubleshooting faulty automations in tablature. Systems, methods, devices, and non-transitory computer readable mediums may include at least one processor configured to maintain a table containing data; store a plurality of logical sentence structures that may serve as logical rules to conditionally act on the data in the table, wherein each logical rule may be enabled to act at differing times in response to differing conditional changes; activate the logical rules so that each rule is in effect simultaneously; as each logical rule performs an action on the data, record the action and an associated time stamp in an activity log; receive a query to identify most recent actions performed on the table; access the activity log to identify at least one most recent action performed on the table; and present at least one specific logical sentence structure underlying at least one logical rule that caused the at least one most recent action.

Consistent with some disclosed embodiments, systems, methods, and computer readable media for automatically filtering data in complex tables are disclosed. Systems, methods, devices, and non-transitory computer readable media may include at least one processor that is configured to display multiple headings including a first heading and a second heading. The at least one processor may be configured to receive a first selection of a first cell associated with the first heading, wherein the first cell may include a first category indicator. The at least one processor may be further configured to receive a second selection of a second cell associated with the first heading, wherein the second cell may include a second category indicator. The at least one processor may be further configured to receive a third selection of a third cell associated with the second heading, wherein the third cell may include a third category indicator. The at least one processor may be further configured to generate a logical filter for the complex table by joining with an "or," the first selection and the second selection associated with the first heading, the first selection and the second selection constituting a first group; and by joining with an "and," the third selection and the first group. The at least one processor may be further configured to apply the logical filter to the complex table. The at least one processor may be further configured, in response to application of the logical filter, to cause a display of a filtered collection of items from the first group that contain the third category indicator.

Consistent with disclosed embodiments, systems, methods, and computer readable media for customizing chart generation based on table data selection are disclosed. Systems, methods, devices, and non-transitory computer readable media may include at least one processor that is configured to maintain at least one table containing rows, columns and cells at intersections of rows and columns. The at least one processor may be configured to receive a first selection of at least one cell in the at least one table. The at least one processor may be further configured to generate a graphical representation associated with the first selection of at least one other cell. The at least one processor may be further configured to generate a first selection-dependent link between the at least one table and the graphical representation, such that when information associated with the first selection is updated in the at least one table, the graphical representation changes. The at least one processor may be further configured to receive a second selection of at least one cell in the at least one table. The at least one processor may be further configured to alter the graphical representation based on the second selection. The at least one processor may be further configured generate a second selection-dependent link between the at least one table and the graphical representation, such that when information associated with the second selection is updated in the at least one table, the graphical representation changes.

One aspect of the present disclosure is directed to a systems, methods, and computer readable media for self-monitoring software usage to optimize performance. The system may include at least one processor configured to: maintain a table; present to an entity a plurality of tools for manipulating data in the table; monitor tool usage by the entity to determine at least one tool historically used by the entity; compare the at least one tool historically used by the entity with information relating to the plurality of tools to thereby identify at least one alternative tool in the plurality of tools whose substituted usage is configured to provide improved performance over the at least one historically used tool; and present to the entity during a table use session a recommendation to use the at least one alternative tool.

One aspect of the present disclosure is directed to a systems, methods, and computer readable media for predicting required functionality and for identifying application modules for accomplishing the predicted required functionality. Aspects of the disclosure may involve outputting a logical sentence structure template for use in building a new application module, the logical sentence structure template including a plurality of definable variables that when selected result in a logical sentence structure delineating a function of the new application module; receiving at least one input for at least one of the definable variables; performing language processing on the logical sentence structure including the at least one received input to thereby characterize the function of the new application module; comparing the characterized function of the new application module with pre-stored information related to a plurality of predefined application modules to determine at least one similarity to a specific predefined application module; and based on the at least one similarity, presenting the specific predefined application module as an adoptable alternative for accomplishing the function.

One aspect of the present disclosure is directed to systems, methods, and computer readable media for associating a plurality of logical rules with groupings of data. The system may include at least one processor configured to: maintain a table containing columns; access a data structure containing the plurality of logical rules including a first particular logical rule that when linked to a first particular column, enables a table action in response to a condition change in a cell associated with the first particular logical rule linked to the first particular column; access a correlation index identifying a plurality of column types and a subset of the plurality of logical rules typically associated with each column type; receive a selection of a new column to be added to the table; in response to the received selection, perform a look up in the correlation index for logical rules typically associated with a type of the new column; present a pick list of the logical rules typically associated with the type of the new column; receive a selection from the pick list; link to the new column a second particular logical rule associated with the selection from the pick list; and implement the second particular logical rule when data in the new column meets a condition of the second particular logical rule.

Some embodiments of the present disclosure may include systems and methods for mutual screen sharing during a text chat, the system including at least one processor configured to: maintain a platform that hosts a plurality of applications accessible to a plurality of client devices; enable the plurality of client devices to access and display via the platform, the plurality of applications, wherein at a particular time, at least a first client device displays a first application and does not display a second application, and at least a second client device displays the second application and does not display the first application; cause a communications interface to appear on the first client device and the second client device, wherein the communications interface on the first client device includes a first link to the second application and the communications interface on the second client device includes a second link to the first application; cause a first display on the first client device of the second application in response to selection on the first client device of the first link; cause a second display on the second client device of the first application in response to selection on the second client device of the second link; and during the first display and the second display, enable communication between the first client device and the second client device.

Some embodiments of the present disclosure may include systems, methods and computer readable media that automatically vary hang-time of pop-up messages, to enable presentation of a shared work environment on a plurality of client devices and cause a presentation of a plurality of visual indicators on a fraction of a display of the shared work environment, wherein each visual indicator represents differing clients associated with the plurality of client devices. The embodiments may further enable at least one group chat between the plurality of client devices, wherein communications are presented in pop-up windows appearing adjacent corresponding visual indicators, and wherein the pop-up windows remain on the display for differing durations depending on variables including at least one of length of message, number of concurrently displayed messages, a client defined threshold, or a sender status.

Some disclosed embodiments include systems, computer readable media, and methods for generating a network map reflective of node connection strength are disclosed. The embodiments may include tracking electronic connections between a plurality of entities in an electronic workspace; tracking characteristics of the electronic connections between the plurality of entities in the electronic workspace; storing in memory the tracked connections and the tracked characteristics; calculating connection strength between connected entities based on at least one of the tracked characteristics; rendering a visualization of the plurality of entities; rendering a visualization of the tracked electronic connections between the plurality of entities; and rendering a visualization of at least one of the tracked characteristics of the electronic connections, wherein at least one of the rendered visualization of the tracked electronic connections and the rendered visualization of the at least one of the tracked characteristics is reflective of the calculated connection strength.

Systems, methods, devices, and non-transitory computer readable media may include a dynamically changeable operating system for a workflow environment, the system including at least one processor may be configured to associate a user-ID with a workflow management account, maintain a plurality of workflow management boards associated with the workflow management account, and receive a first plurality of touch points associated with the user-ID. Based on the first plurality of touch points, the at least one processor may be further configured to customize the workflow management account by initially altering at least one of a column option picker, an automation option picker, a third-party application integration picker, a display interface picker, or a solution picker. Further the at least one processor may be configured to monitor activity associated with the workflow management account, receive, based on the monitoring, a second plurality of touch points associated with the user-ID, and adjust the customized workflow management account by subsequently altering, based on the second plurality of touch points at least one of the column option picker, the automation option picker, the third-party application integration picker, the display interface picker, or the solution picker.

Consistent with some disclosed embodiments, systems, computer readable media, and methods for a data extraction and mapping system are disclosed. Some of the embodiments may include at least one processor configured to maintain a main data source containing a plurality of data objects. Further, the at least one processor may maintain a plurality of boards for presenting the plurality of data objects. Moreover, the at least one processor may maintain a plurality of linkages between at least some of the plurality of data objects associated with differing boards of the plurality of boards. In addition, the at least one processor may receive a selection of a particular data object associated with a particular board. Further, the at least one processor receive a selection of a particular data object that may be associated with a particular board. The at least one processor may identify via a particular linkage of the plurality of linkages at least one additional data object on another board linked to the particular data object on the particular board. In addition, the at least one processor may define a sub-data source where the sub-data source may aggregate the at least one additional data object and the particular data object. Further, the at least one processor may receive a visualization template selection and may map the sub-data source to the visualization template selection to generate a sub-data visualization. Moreover, the at least one processor may cause a co-presentation of a representation of the particular board and the sub-data visualization.

Consistent with some disclosed embodiments, systems, computer readable media, and methods for a system for extrapolating display visualizations are disclosed. Some of the embodiments may include at least one processor configured to maintain a board with a plurality of items where each item may be defined by a row of cells, and wherein each cell may be configured to contain data and may be associated with a column heading. Further, the at least one processor may link at least a first column to at least a second column so that a change in data in a cell of the at least first column may cause a change in data of a cell in the at least second column. Moreover, the at least one processor may receive a first selection of a particular item from the board wherein the particular item may include a plurality of cells with data in each cell, and wherein data in a first cell of the plurality of cells may be linked to data in a second cell of the plurality of cells. In addition, the at least one processor may, upon receipt of the first selection, cause a display of an item interface extrapolator wherein the item interface extrapolator may include a plurality of activatable elements; each of the activatable elements may be associated with a differing visualization of at least some of the data contained in cells associated with the particular item. Further, the at least one processor may receive a second selection of one of the activatable elements. Moreover, the at least one processor may, upon receipt of the second selection, cause a first extrapolated display of data associated with the particular item to appear in a first manner. Further, the at least one processor may receive a third selection of another of the activatable elements. Moreover, the at least one processor may, upon receipt of the third selection, cause a second extrapolated display of data associated with the particular item to appear in a second manner.

Some embodiments of the present disclosure provide unconventional approaches to maintaining an integrated unified filing engine, which may lead to a more effective collaborative work environment. Some such disclosed embodiments may integrate a unified filing engine within a workflow management system that may permit files to be associated with entries in the workflow management system. Some disclosed embodiments may involve systems, methods, and computer readable media relating to a workflow management system having an integrated unified filing engine. These embodiments may involve at least one processor configured to maintain at least one table of the workflow management system, the at least one table containing a plurality of items and a plurality of asset designations, each asset designation being associated with at least one of the plurality of items; maintain at least one electronic whiteboard containing at least a subset of the plurality of asset designations; maintain a data structure containing a plurality of links, wherein each link associates at least one of the subsets of asset designations with at least one location on the at least one electronic whiteboard; receive via a network access device having a display presenting the at least one table, an activation of a particular link associated with a particular asset; in response to the activation of the particular link, alter the display to present at least a particular location on the at least one electronic whiteboard containing a particular asset designation corresponding to the particular asset, wherein the particular location includes a cluster of additional asset designations related to the particular asset; receive a selection of at least one of the additional asset designations or the particular asset designation; in response to the selection, retrieve a corresponding asset; and cause the corresponding asset to be presented on the display.

Consistent with some disclosed embodiments, an enterprise messaging system for message mediation and verification is disclosed. The enterprise system may include at least one processor to perform a variety of functions. The functions may include maintaining a plurality of interconnected boards. A first group of at least some of the plurality of interconnected boards may include items that contain external contact addresses. A second group of at least some of the plurality of interconnected boards may omit external contact addresses. A mediator overlay on the enterprise messaging system may monitor contact addresses of incoming messages and compare a contact address of a specific incoming message against a repository of addresses associated with the first group of at least some of the plurality of interconnected boards. In response to a match between the contact address of the specific incoming message and at least one address contained in the repository, at least one primary duplicate message of the specific incoming message maybe generated and may be associated with each board of the first group of at least some of the plurality of interconnected boards. At least one linked board of the second group may be determined for each of the first group having the at least one primary duplicate message associated therewith. At least one secondary duplicate message of the specific incoming message may be generated for the at least one linked board of the second group. The at least one secondary duplicate message may be associated with the at least one linked board of the second group.

Some embodiments of the present disclosure provide unconventional approaches to enterprise messaging systems, which may lead to more accurate and precise auto-population of recipient fields with external addresses. Some such disclosed embodiments integrate enterprise messaging within a workflow management system, permitting the auto-populating of recipient fields to be based on data contained within the workflow management system. Some disclosed embodiments may involve systems, methods, and computer readable media relating to an enterprise messaging system for auto-populating recipient fields based on context of source content. These embodiments may involve at least one processor configured to maintain a plurality of boards related to a common entity, wherein each board of the plurality of boards includes differing external addresses; receive an indication of an intent to send a communication, the indication originating from a specific board of the plurality of boards; in response to receiving the indication, render a communication interface associated with the specific board; perform a look up of a subset of the plurality of boards linked to the specific board; retrieve external addresses from each of the subset of the plurality of boards; populate the communication interface with the communication and the retrieved external addresses; receive a selection of at least one of the retrieved external addresses; cause the communication to be transmitted to the at least one selected retrieved external address; and link a copy of the transmitted communication to at least the specific board.

Some embodiments of the present disclosure provide unconventional approaches to rewarding accomplishments, which may lead to heightened employee morale and satisfaction. Some such disclosed embodiments integrate reward dispensation within a workflow management system, permitting reward rules to be established and rewards to be dispensed upon achievement of accomplishments. Some disclosed embodiments may involve systems, methods, and computer readable media relating to a digital workflow system for providing physical rewards from disbursed networked dispensers. These embodiments may involve at least one processor configured to maintain and cause to be displayed a workflow table having rows, columns and cells at intersections of rows and columns; track a workflow milestone via a designated cell, the designated cell being configured to maintain data indicating that the workflow milestone is reached; access a data structure that stores a rule containing a condition associated with the designated cell, wherein the at least one rule contains a conditional trigger associated with at least one remotely located dispenser; receive an input via the designated cell; access the rule to compare the input with the condition and to determine a match; and following determination of the match, activate the conditional trigger to cause at least one dispensing signal to be transmitted over a network to the at least one remotely located dispenser in order to activate the at least one remotely located dispenser and thereby cause the at least one remotely located dispenser to dispense a physical item as a result of the milestone being reached.

Systems, methods, and computer readable media for implementing a digital audio simulation system based on non-audio input are disclosed. Systems, methods, devices, and non-transitory computer readable media may include at least one processor configured to receive over a network, during a presentation, from a plurality of network access devices, a plurality of non-audio signals corresponding to activations of substitute audio buttons, each of the plurality of non-audio signals having an audio identity. The at least one processor may be configured to process the received plurality of non-audio signals to determine a quantity of non-audio signals corresponding to a specific audio identity. Disclosed embodiments may also involve a lookup in an audio-related data structure to select at least one particular audio file associated with the audio identity and the determined quantity, to output data for causing the at least one particular audio file to be played.

Consistent with disclosed embodiments, systems, methods, and computer readable media for generating high level summary tablature based on lower level tablature are disclosed. Systems, methods, devices, and non-transitory computer readable media may involve at least one processor configured to electronically access first data associated with a first board. The at least one processor may be further configured to electronically access second data associated with a second board and to perform electronic semantic analysis to identify a portion of the first data associated with the first board and a portion of the second data associated with the second board that share a similarity. The at least one processor may be further configured to consolidate in a third board reflecting a similarity consolidation, the identified first portion and the identified second portion. In addition, the at least one processor may be further configured to summarize the first portion and the second portion, and to aggregate the summarized first portion and the summarized second portion to form an aggregated summary. The at least one processor may be further configured to present on the third board the aggregated summary in a manner associating the aggregated summary with the similarity consolidation.

Consistent with disclosed embodiments, systems, methods, and computer readable media for generating high level summary tablature based on lower level tablature are disclosed. Systems, methods, devices, and non-transitory computer readable media may involve at least one processor that may be configured to electronically receive a first selection of at least one item contained on both a first board and a second board and to electronically receive a second selection of a first type of information presented on the first board. In some embodiments, the first type of information may be associated with a first heading. The at least one processor may be further configured to electronically receive a third selection of a second type of information presented on the first board. In some embodiments, the second type of information may be associated with a second heading. The at least one processor may be further configured to electronically receive a fourth selection of a third type of information presented on the second board. In some embodiments, the third type of information may be associated with a third heading. In some embodiments, the first type of information may be aggregable with the third type of information in a first aggregation. In some embodiments, the first heading may differ from the third heading. The at least one processor may be further configured to electronically receive a fifth selection of a fourth type of information presented on the second board. In some embodiments, the fourth type of information may be associated with a fourth heading. In some embodiments, the second type of information may be aggregable with the fourth type of information in a second aggregation. In some embodiments, the second heading may be different from the fourth heading. The at least one processor may be further configured to electronically generate a summary board including the at least one item. In some embodiments, the summary board may associate with the at least one item the first aggregation and the second aggregation. The at least one processor may be further configured to electronically associate one of the first heading and the third heading with the first aggregation. The at least one processor may be further configured to electronically associate one of the second heading and the fourth heading with the second aggregation.

Consistent with some disclosed embodiments, systems, methods, and computer readable media for generating high level summary tablature based on lower level tablature are disclosed. Systems, methods, devices, and non-transitory computer readable media may include at least one processor that may be configured to receive a selection of at least one item contained on both a first board and a second board. The at least one processor may be further configured to detect a first type of information presented on the first board. In some embodiments, the first type of information may be associated with a first heading. The at least one processor may be further configured to detect a second type of information presented on the first board. In some embodiments, the second type of information may be associated with a second heading. The at least one processor may be further configured to detect a third type of information presented on the second board. In some embodiments, the third type of information may be associated with a third heading different from the first heading. The at least one processor may be further configured to detect a fourth type of information presented on the second board. In some embodiments, the fourth type of information may be associated with a fourth heading different from the second heading. The at least one processor may be further configured to analyze characteristics of the first type of information, the second type of information, the third type of information, and the fourth type of information, to ascertain that the first type of information is aggregable with the third type of information, and that the second type of information is aggregable with the fourth type of information. The at least one processor may be further configured to present the at least one item on a third board. The at least one processor may be further configured to aggregate on the third board, in association with the at least one item, the first type of information with the third type of information, and the second type of information with the fourth type of information.

Consistent with some disclosed embodiments, systems, computer readable media, and methods for implementing conditional rules in a hierarchical table structure are disclosed. The embodiments may include maintaining for presentation on a viewable interface a higher-level table structure having first rows, first columns and first cells at the intersections of the first rows and the first columns. In addition, the embodiments may maintain for presentation on the viewable interface a lower-level table structure having second rows, second columns and second cells at the intersections of the second rows and second columns. Furthermore, the embodiments may link the lower-level table to a specific first cell in the higher-level table wherein the specific first cell may be configured to present a milestone indicator. Moreover, the embodiments may store a specific conditional rule associating the specific first cell with a plurality of second cells of the lower-level table such that entry of qualifying data into each of the plurality of second cells may trigger the specific conditional rule to cause a change in the specific first cell of the higher-level table. Furthermore, the embodiments may receive qualifying information from each of the plurality of second cells, and the embodiments may, upon receipt of the qualifying information from each of the plurality of second cells, trigger the specific conditional rule to thereby update milestone information in the specific first cell of the higher-level table.

Consistent with disclosed embodiments, systems, computer readable media, and methods for automatic generation of customized lower-level table templates based on data in an associated higher-level table structure are disclosed. The embodiments may include maintaining the higher-level table structure having first rows, first columns, and first cells at intersections of first rows and first columns where the first cells may be configured to hold value, and where the higher-level table structure may exhibit a plurality of characteristics that may include at least two of a table type, a table grouping, table content, a table size, a particular column heading, a particular item label, or an author. In addition, the embodiments may receive an input for triggering generation of a lower-level table template tied to the higher-level table structure. Furthermore, the embodiments may analyze at least one higher-level table characteristic including higher-level table type, higher-level table grouping, higher-level table content, higher-level table size, higher-level particular column heading, higher-level particular item label, or higher-level author. Moreover, based on the input and the analysis, the embodiments may determine a customization of the lower-level table template; the customization may include at least one of a lower-level column heading or a lower-level row heading. Furthermore, the embodiments may associate the customization with the lower-level table template to form a customized lower-level table structure. In addition, the embodiments may cause the lower-level table structure to be displayed in association with the higher-level table structure.

BRIEF DESCRIPTION OF THE DRAWINGS

FIG. 42 illustrates a first example of an interface enabling a user to select various prompts to associate a communications rule with a cell and trigger table entries characterizing workflow-related communications occurring between workflow participants, consistent with some embodiments of the present disclosure.

FIG. 122 illustrates a visual representation an exemplary correlation index, consistent with some embodiments of the present disclosure.

FIG. 123 illustrates a pick list of column types for a new column in a table, consistent with some embodiments of the present disclosure.

FIG. 124 illustrates an exemplary pick list for selecting one of a plurality of logical rules, consistent with some embodiments of the present disclosure.

FIG. 125 illustrates a block diagram of an example process for associating a plurality of logical rules with groupings of data, consistent with some embodiments of the present disclosure.

FIG. 126A depicts an exemplary application displayed on a client device, consistent with some embodiments of the present disclosure.

FIG. 126B depicts an exemplary application displayed on a different client device, consistent with some embodiments of present disclosure.

FIG. 127 depicts an exemplary application displayed on a client device after activation of a link in a communication interface, consistent with some embodiments of the present disclosure.

FIG. 128 depicts another exemplary application displayed on a client device after activation of a link in a communication interface, consistent with some embodiments of the present disclosure.

FIG. 129 depicts another exemplary application displayed on a client device including stored chat log, consistent with some embodiments of the present disclosure.

FIG. 130 depicts a block diagram of an exemplary process for mutual screen sharing during a text chat, consistent with some embodiments of the present disclosure.

FIG. 131 depicts a display of an exemplary shared work environment containing social layer messages, consistent with some embodiments of the present disclosure.

FIG. 132 depicts another display of an exemplary shared work environment containing social layer messages, consistent with some embodiments of the present disclosure.

Figure 133:
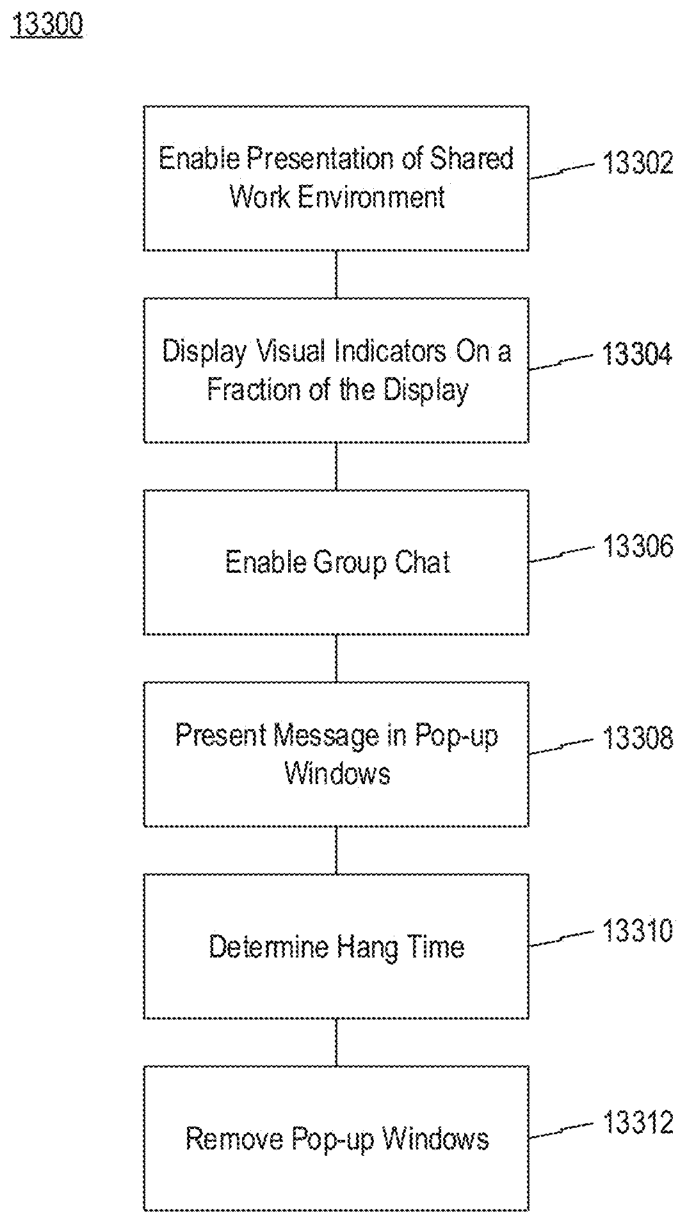

FIG. 133 depicts a flow chart of an exemplary process for variable hang time for social layer messaging, consistent with some embodiments of the present disclosure.

Figure 134:
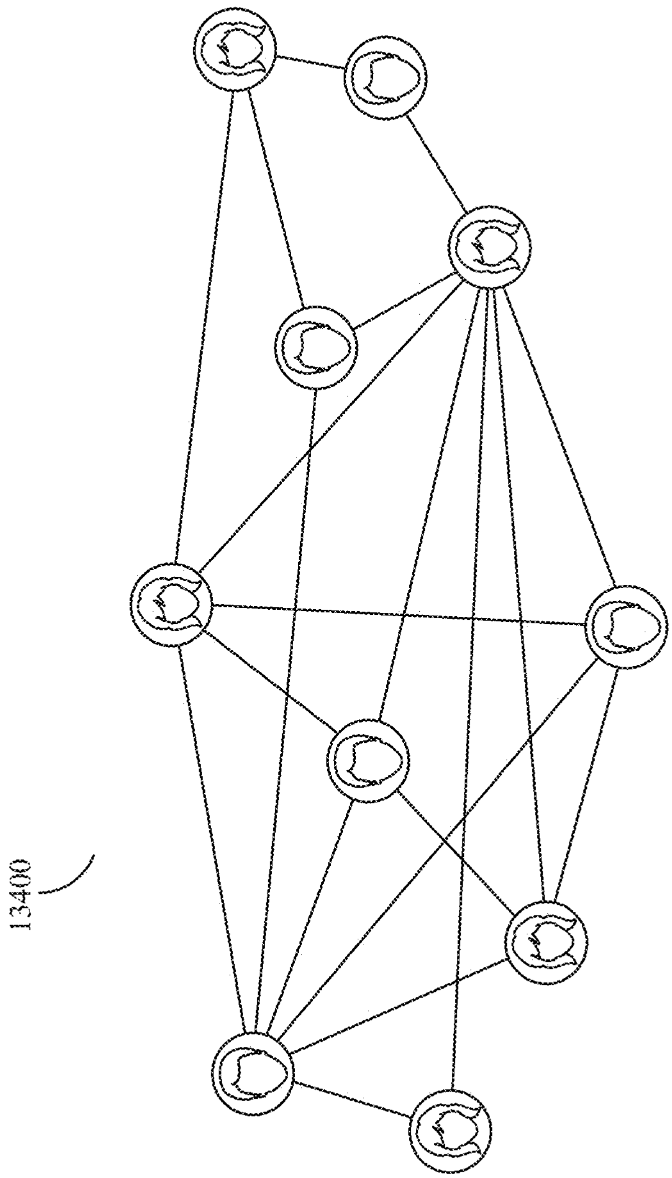

FIG. 134 illustrates an example network map, consistent with some embodiments of the present disclosure.

Figure 135:
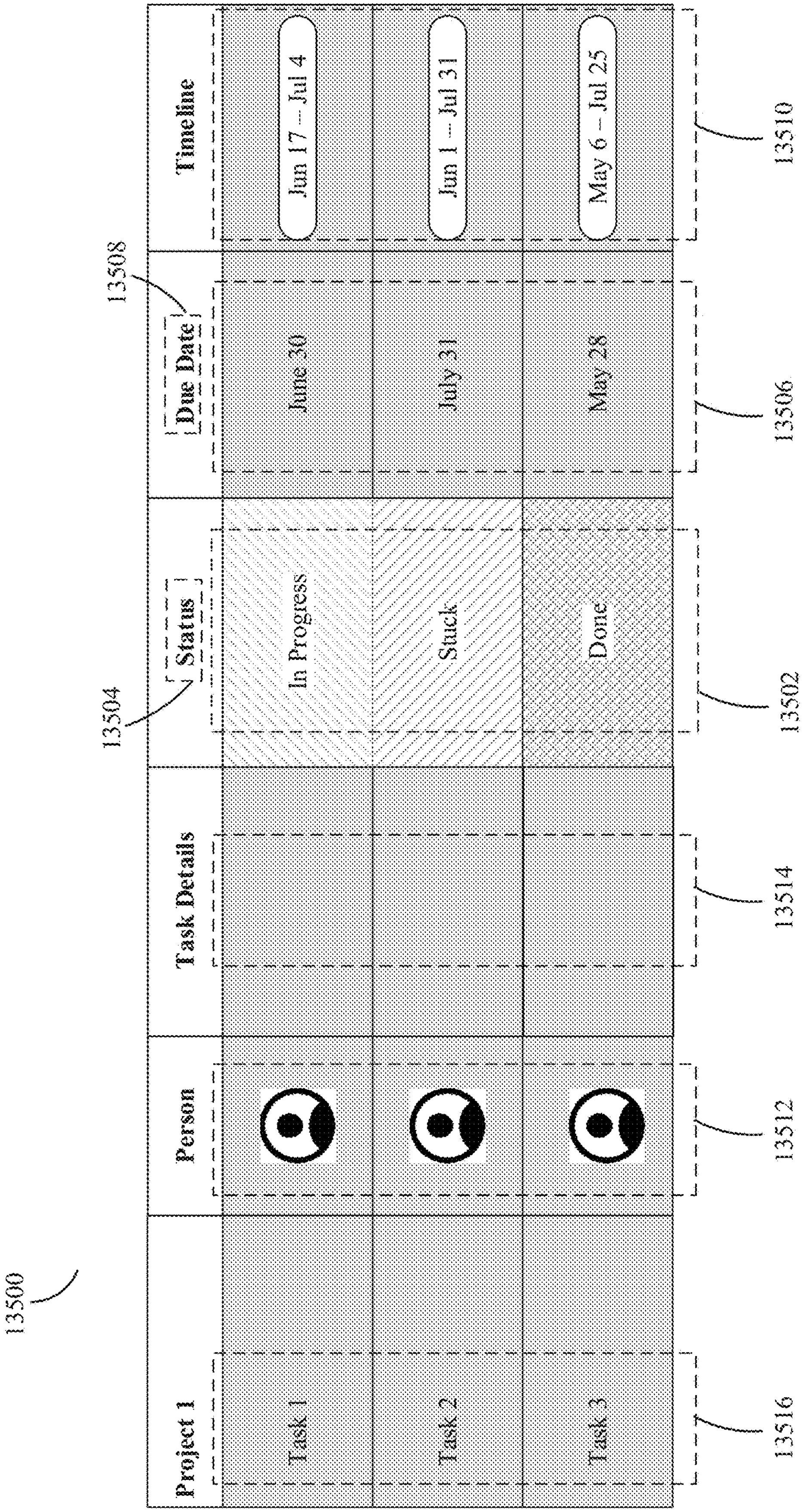

FIG. 135 illustrates an example of a table generated in a collaborative work system, consistent with some embodiments of the present disclosure.

Figure 136:
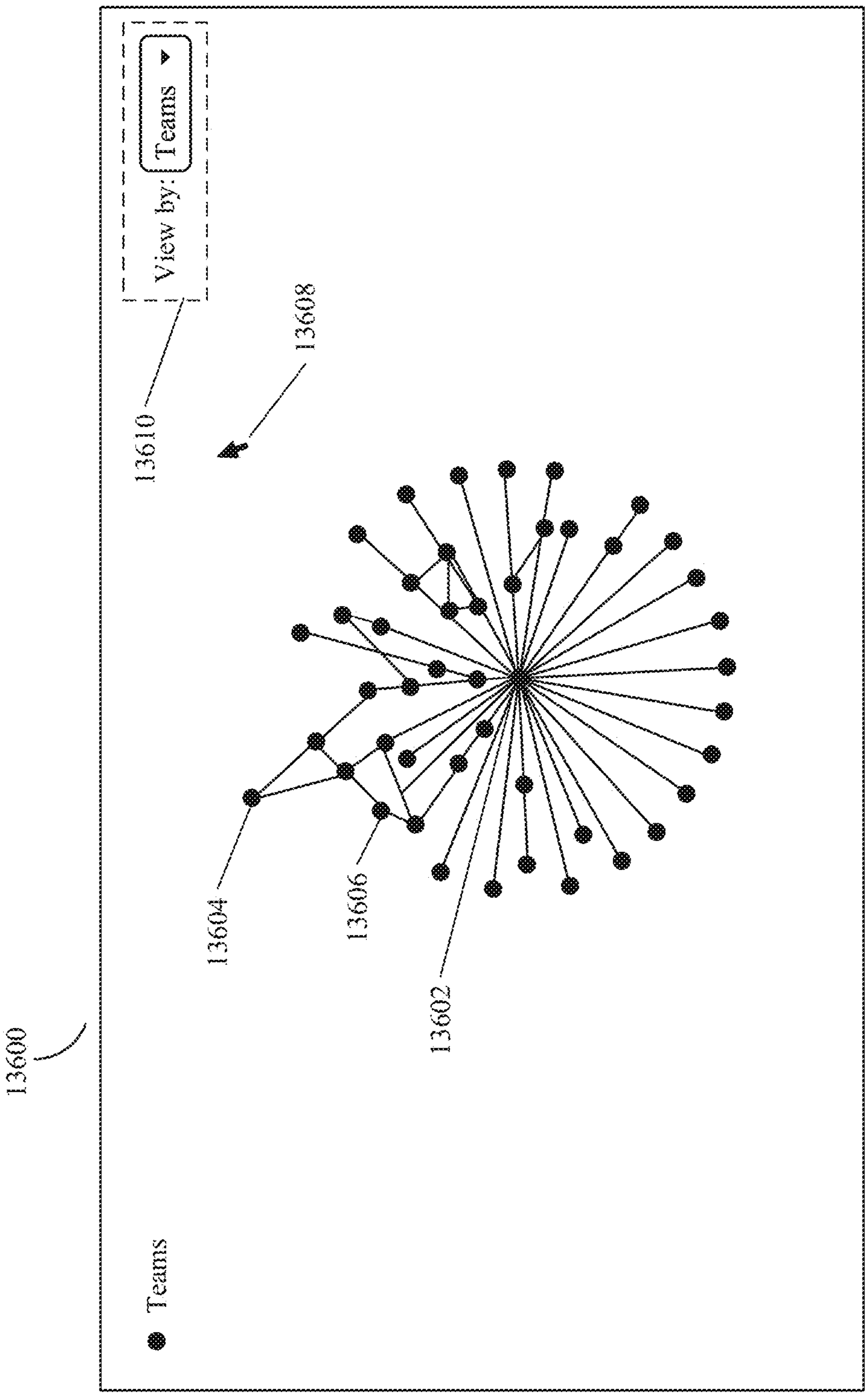

FIG. 136 illustrates an example visualization of a network map reflective of node connection strength, consistent with some embodiments of the present disclosure.

Figure 137:
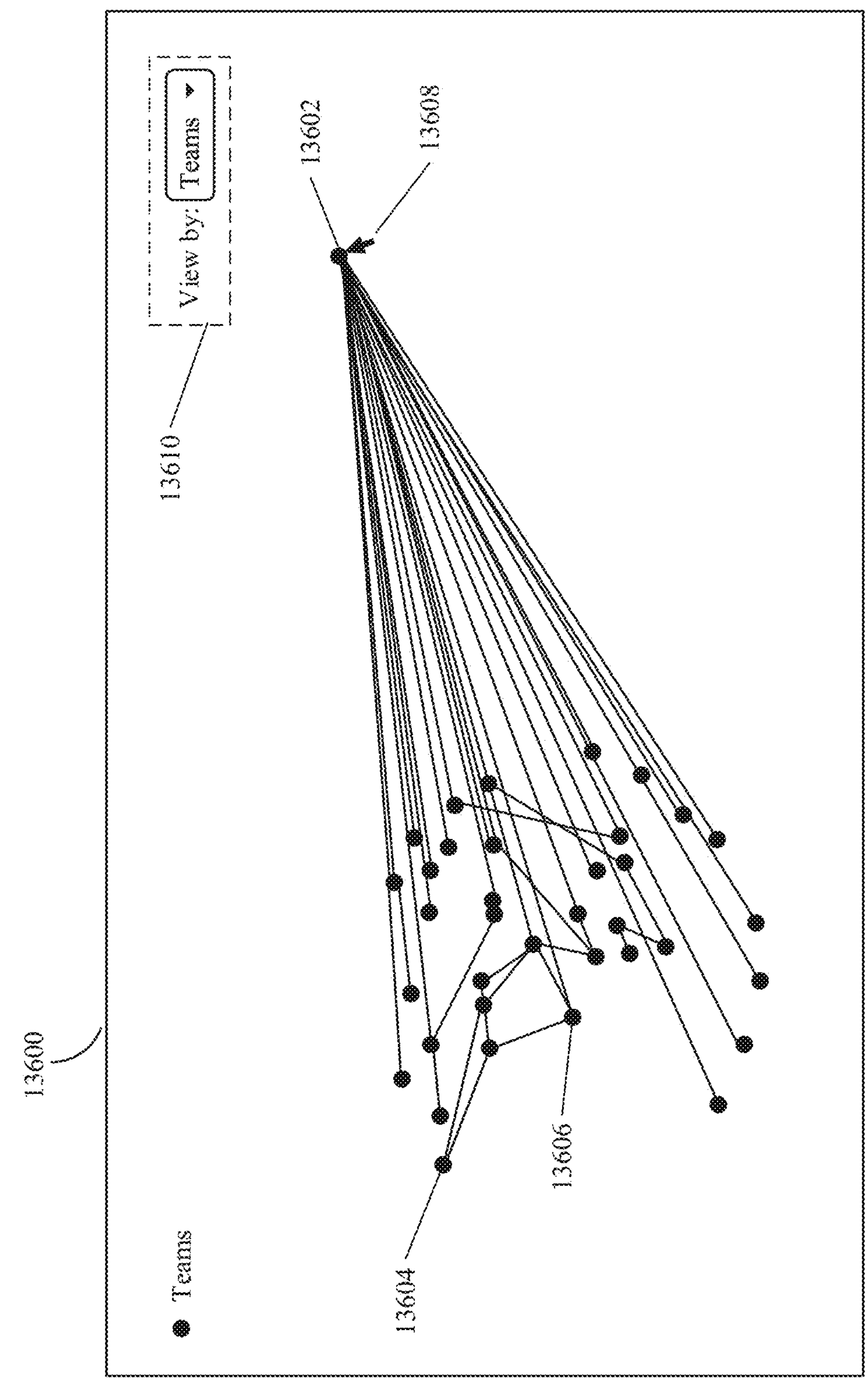

FIG. 137 illustrates an example visualization of a network map with movable nodes, consistent with some embodiments of the present disclosure.

Figure 138:
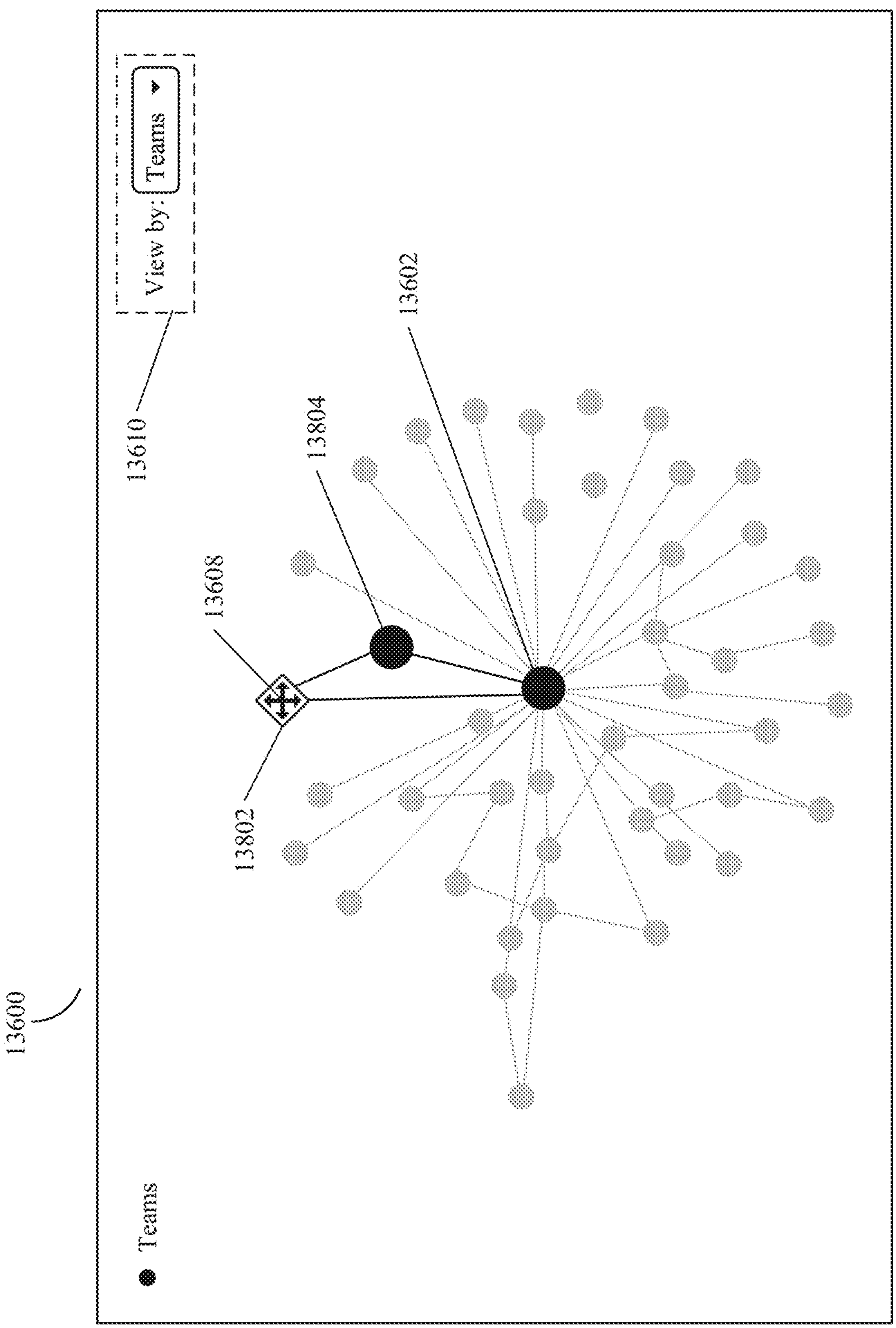

FIG. 138 illustrates an example visualization of a network map with highlighted nodes, consistent with some embodiments of the present disclosure.

Figure 139:
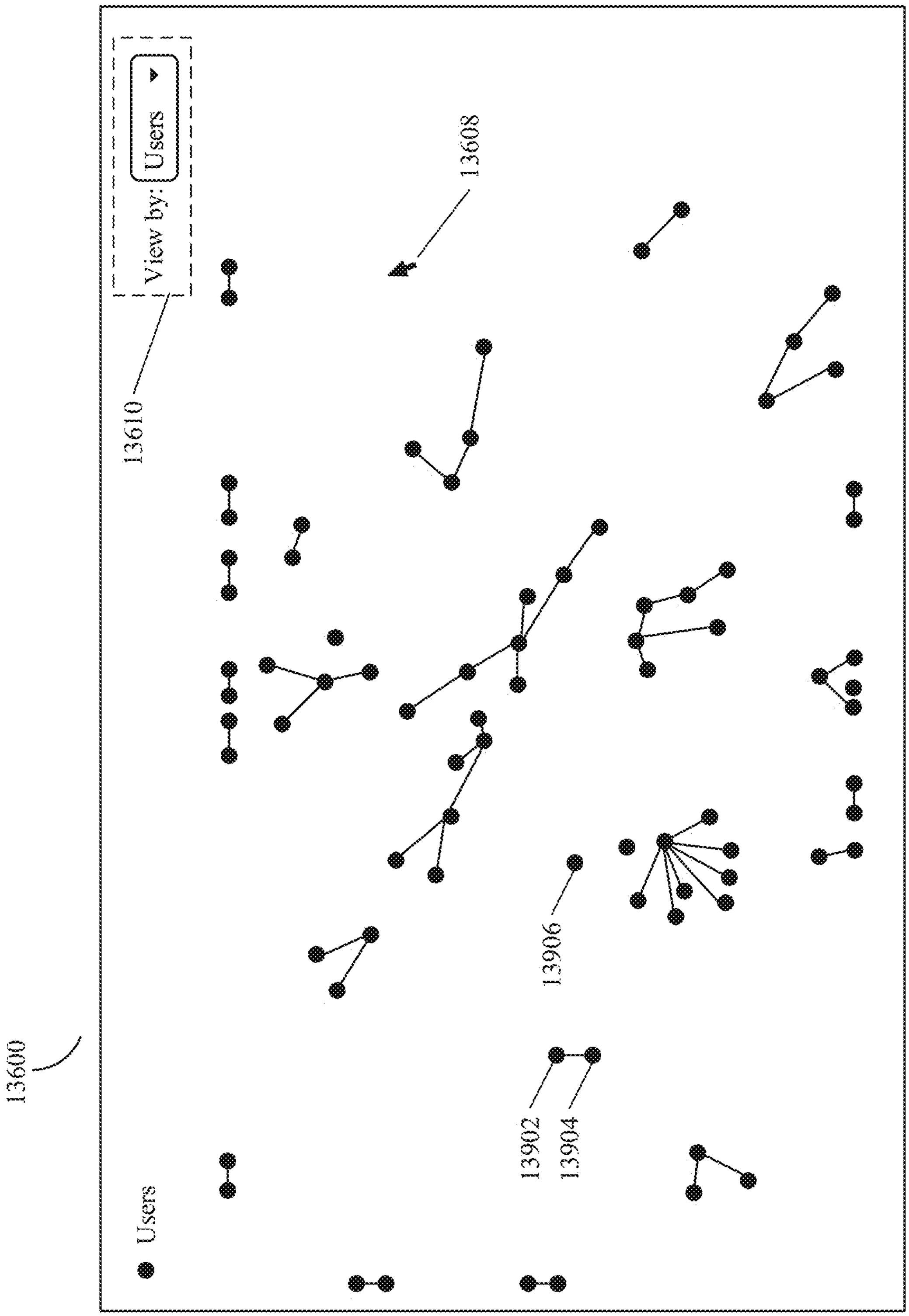

FIG. 139 illustrates another example visualization of a network map reflective of node connection strength, consistent with some embodiments of the present disclosure.

Figure 140:
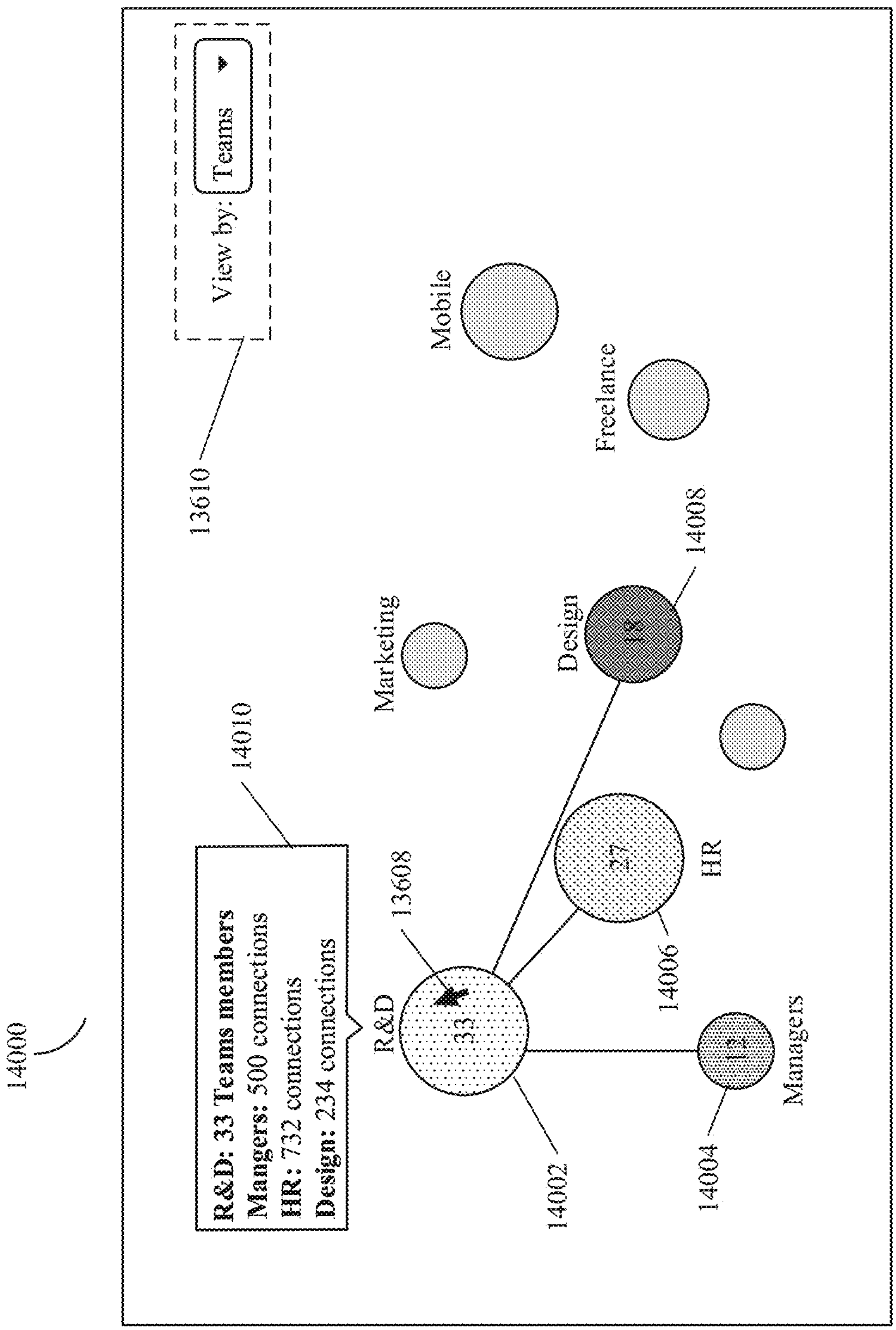

FIG. 140 illustrates a further example visualization of a network map reflective of node connection strength, consistent with some embodiments of the present disclosure.

Figure 141:
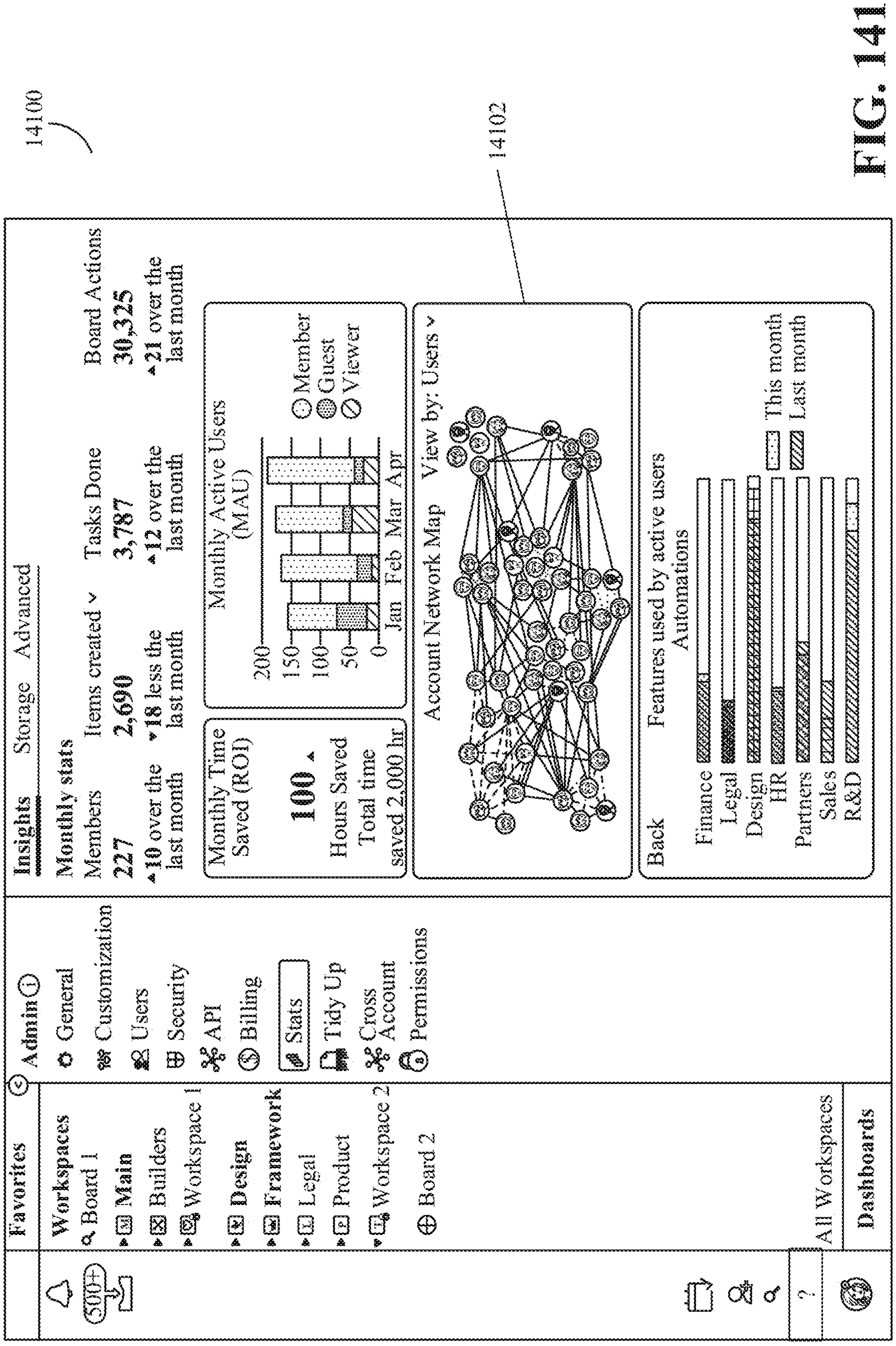

FIG. 141 illustrates an example visualization of an electronic working space including a network map reflective of node connection strength, consistent with some embodiments of the present disclosure.

Figure 142:
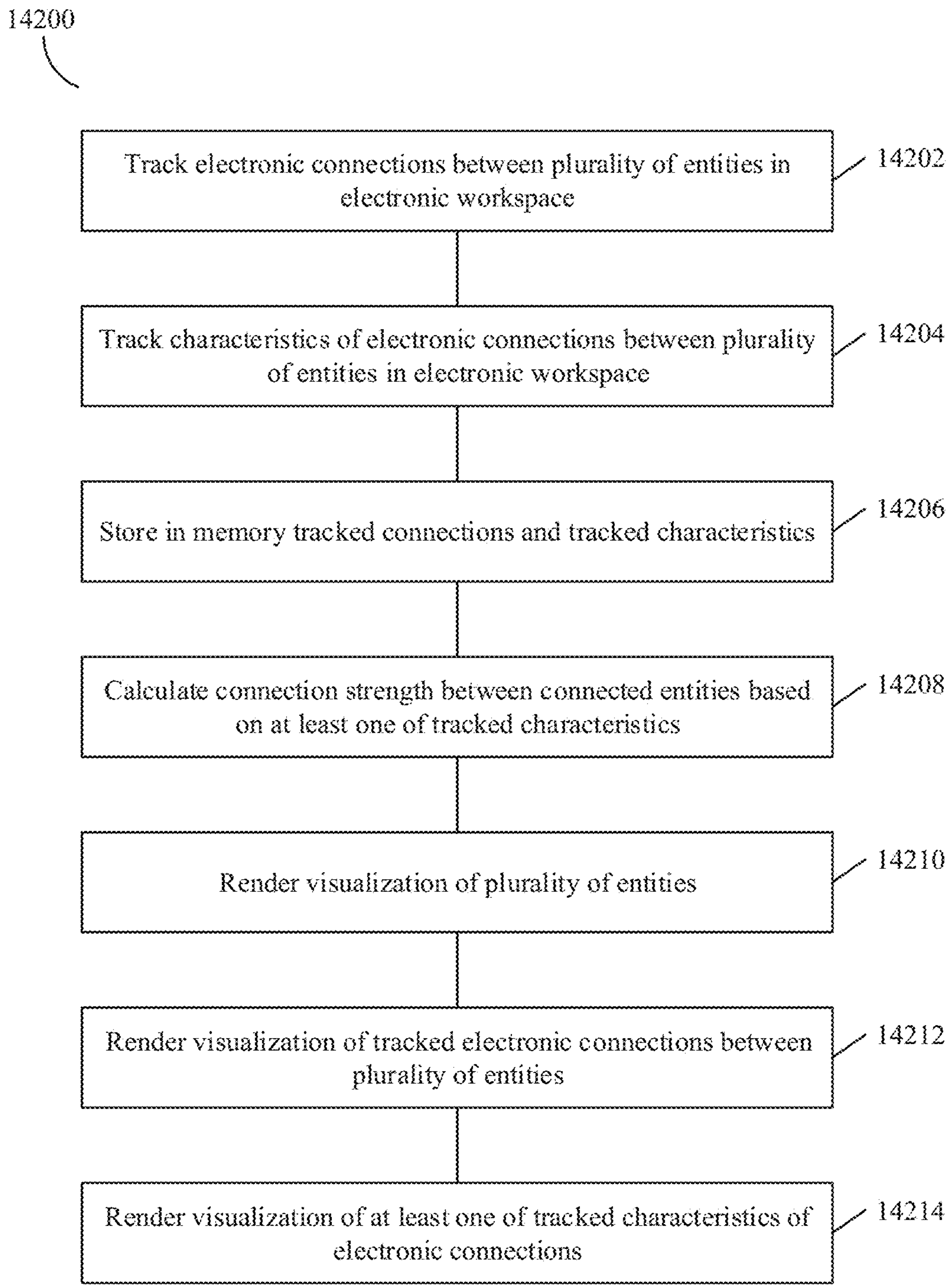

FIG. 142 is a block diagram of an example process for generating a network map reflective of node connection strength, consistent with embodiments of the present disclosure.

Figure 143:
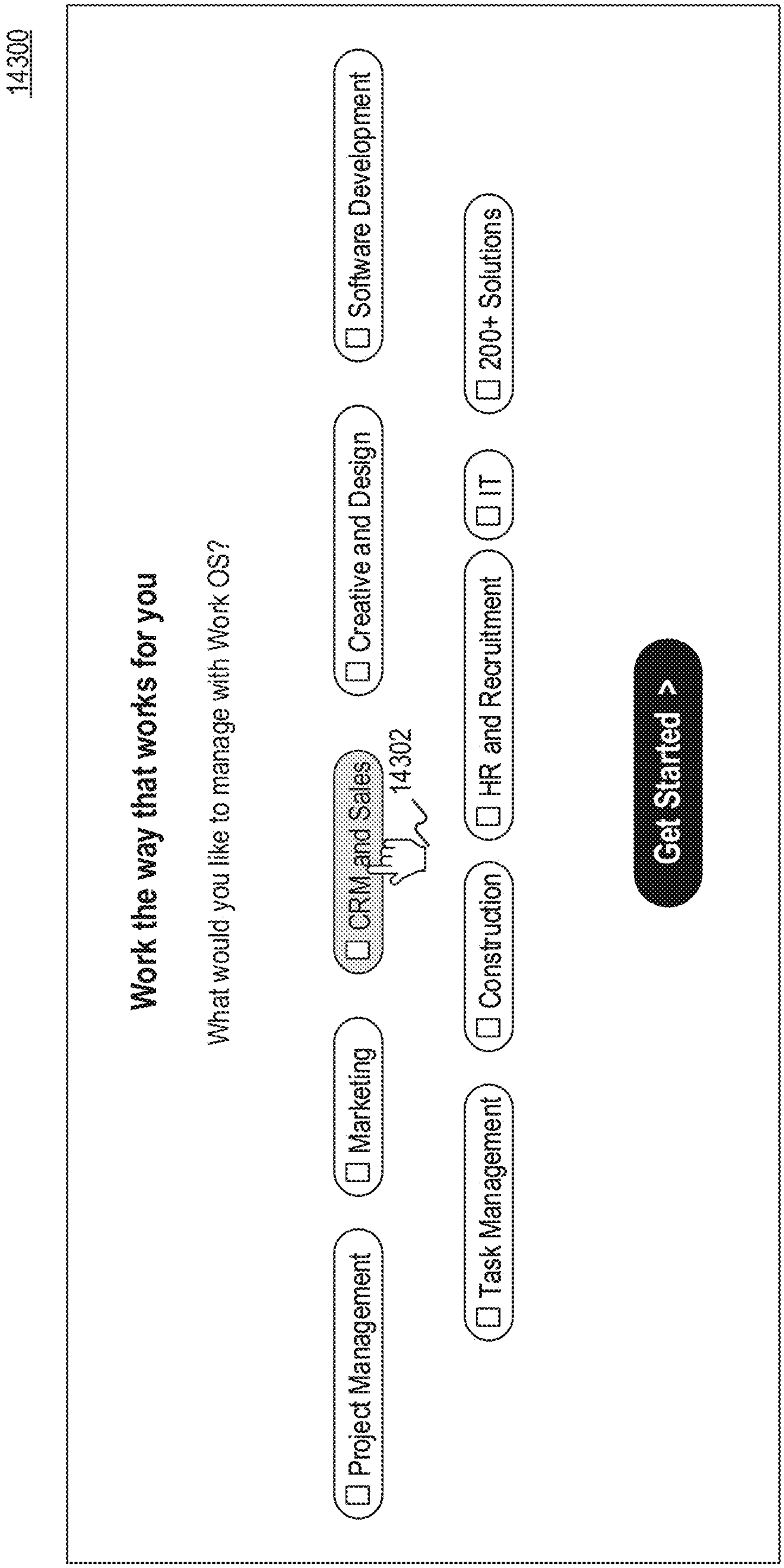

FIG. 143 illustrates a first example of an interface for enabling a user to select various prompts which may be sent to a system as a plurality of touch points associated with a user-ID, consistent with some embodiments of the present disclosure.

Figure 144:
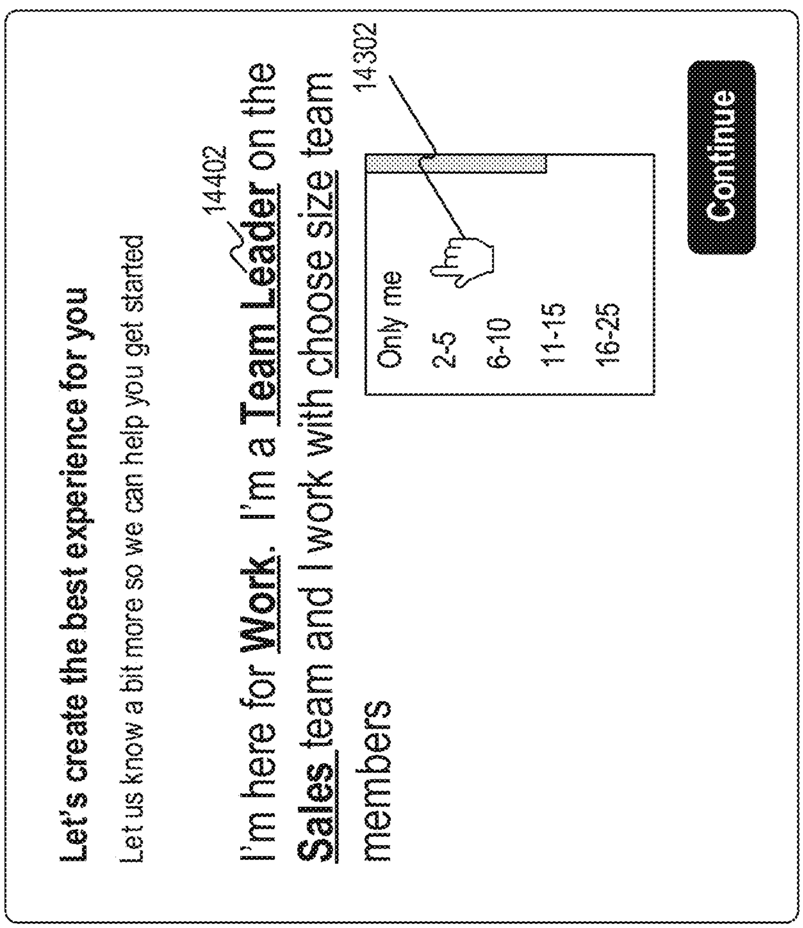

FIG. 144 illustrates a second example of an interface for enabling a user to select various prompts which may be sent to a system as a plurality of touch points associated with a user-ID, consistent with some embodiments of the present disclosure.

Figure 145:
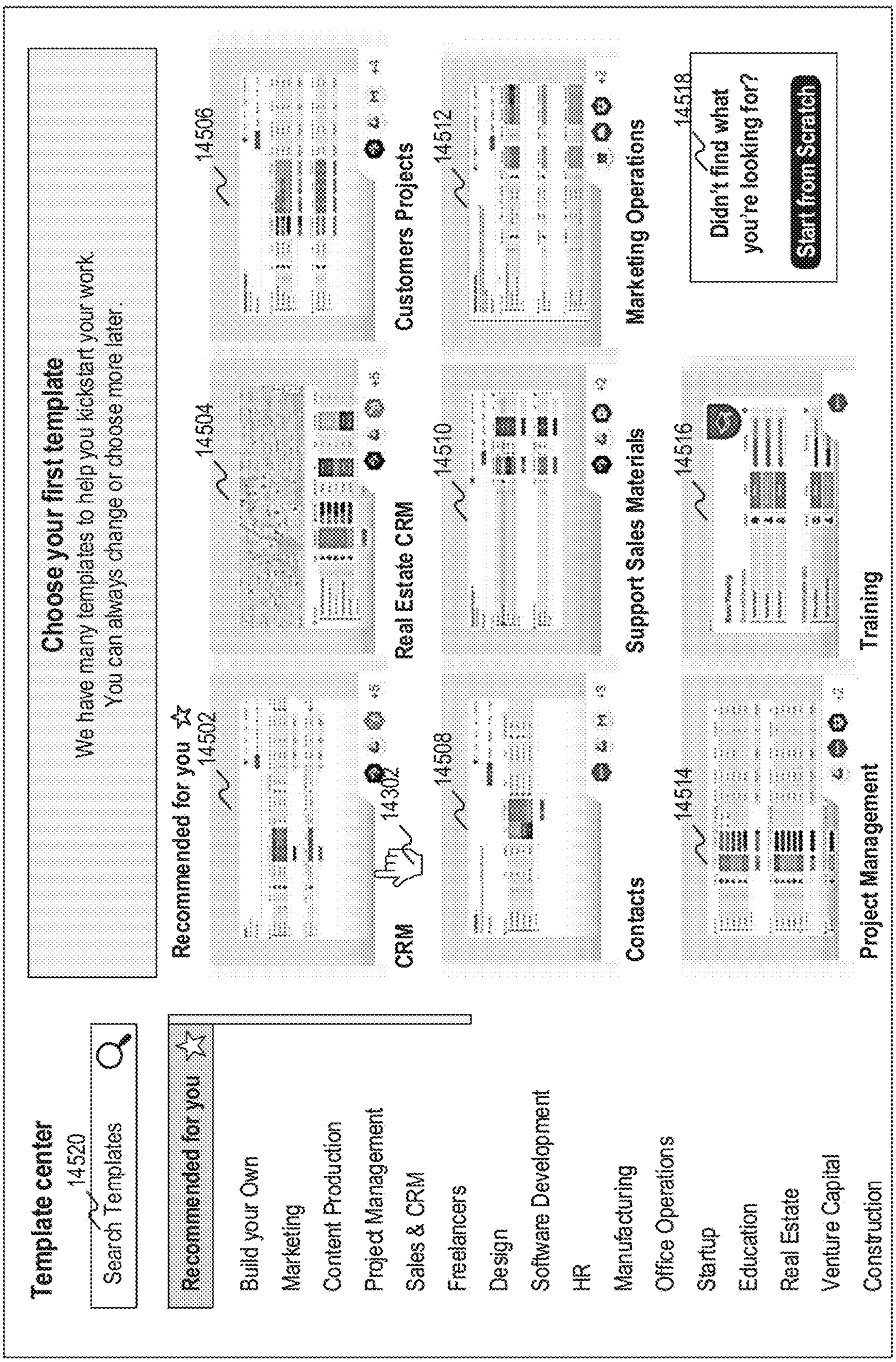

FIG. 145 illustrates an example of an interface of a customized workflow management account, consistent with some embodiments of the present disclosure.

Figure 146:
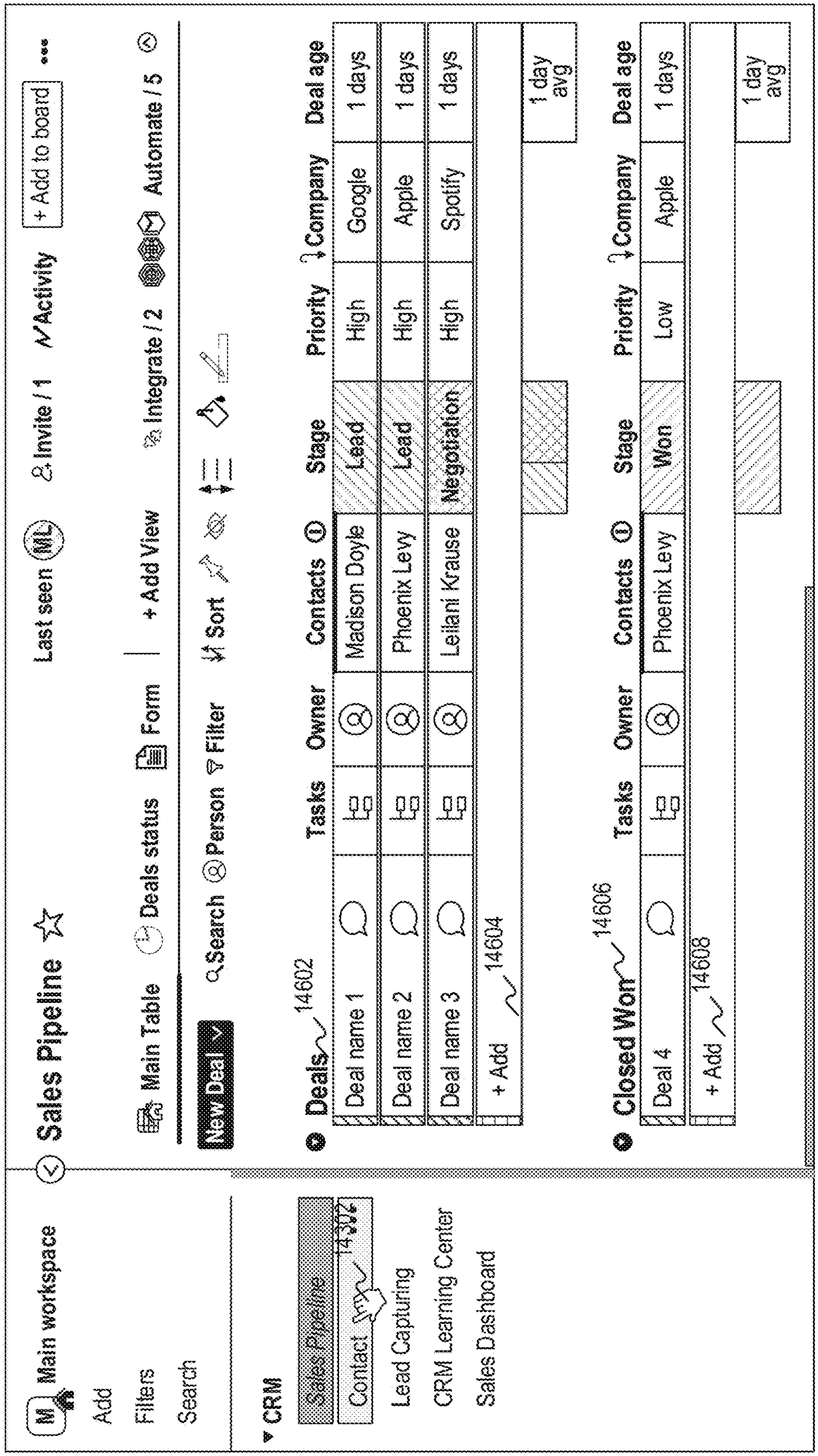

FIG. 146 illustrates an example of an interface with a customized workflow management account, consistent with some embodiments of the present disclosure.

Figure 147:
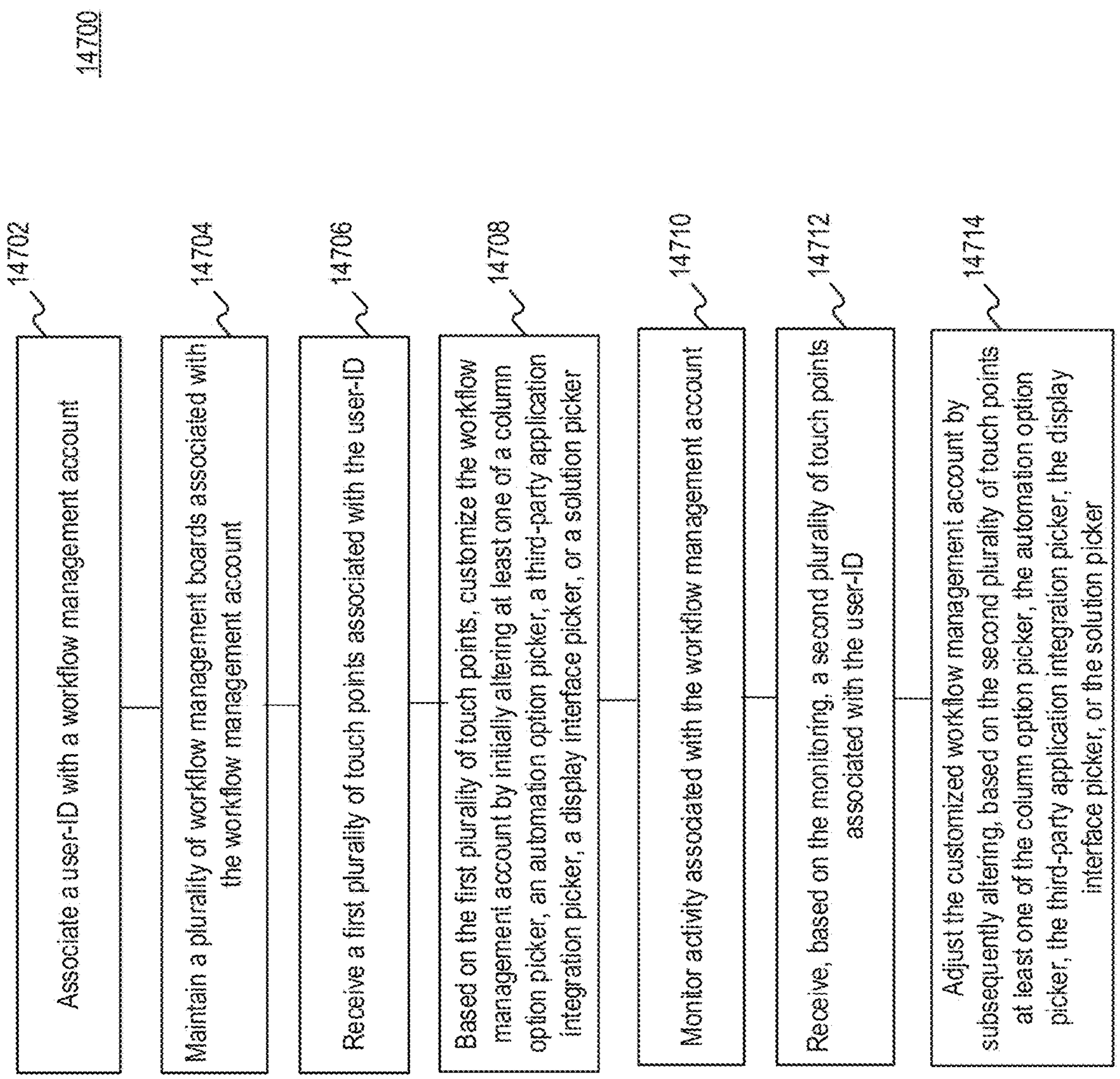

FIG. 147 illustrates a block diagram of method 14700 performed by a processor of a computer readable medium containing instructions, consistent with some embodiments of the present disclosure.

Figure 148:
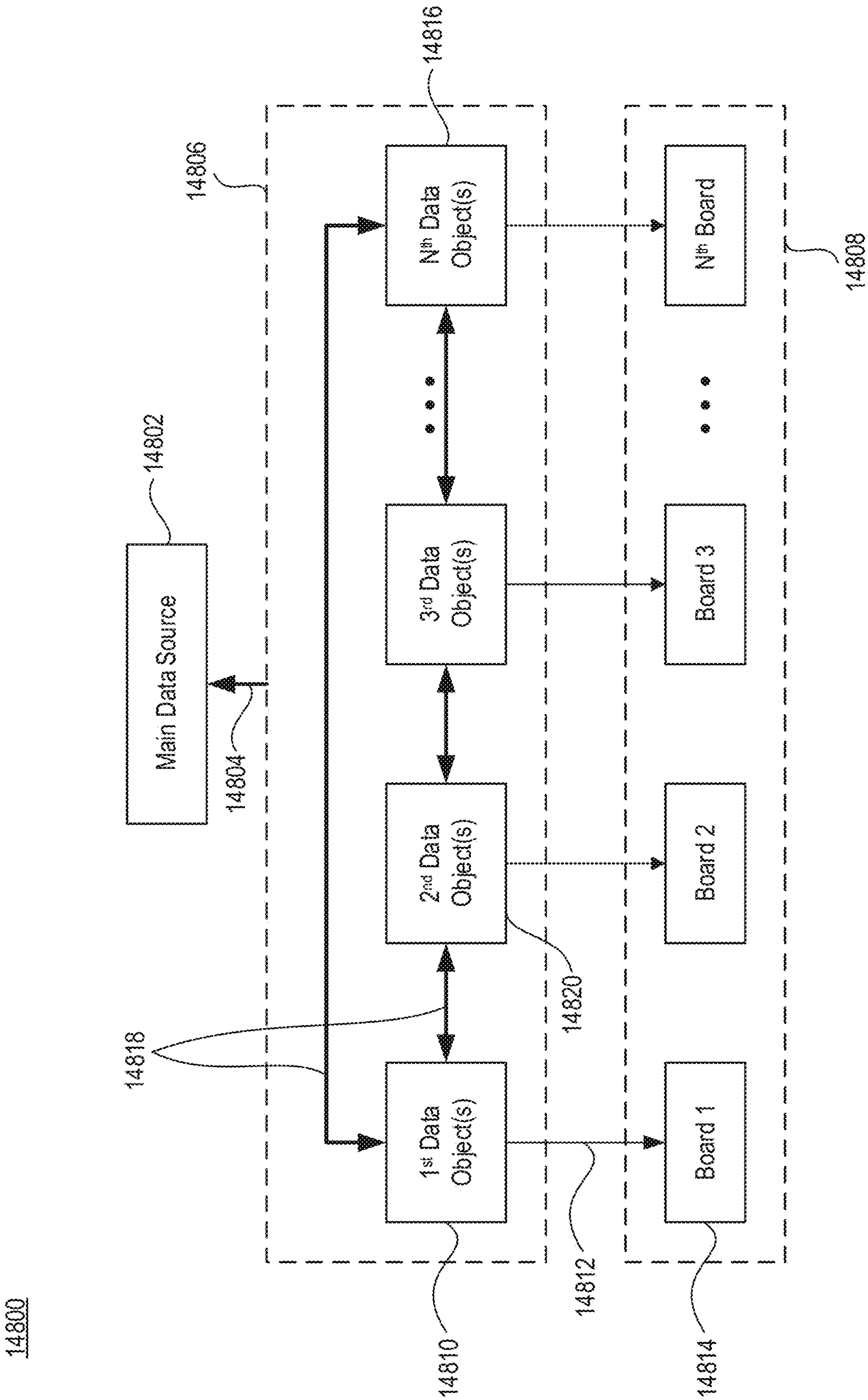

FIG. 148 illustrates an exemplary diagram of a main data source containing a plurality of data objects, consistent with some embodiments of the present disclosure.

Figure 149A:
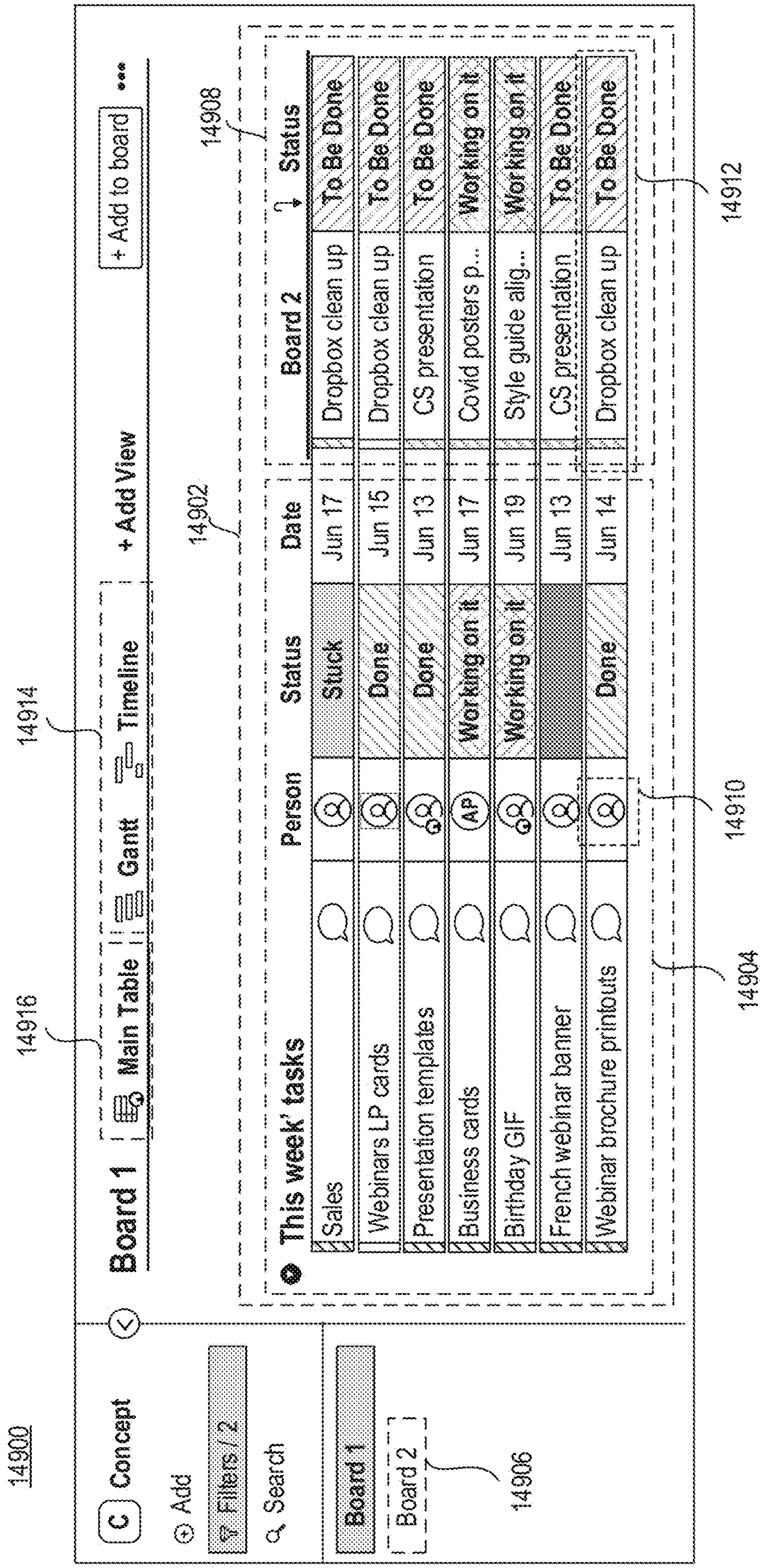
Figure 149B:
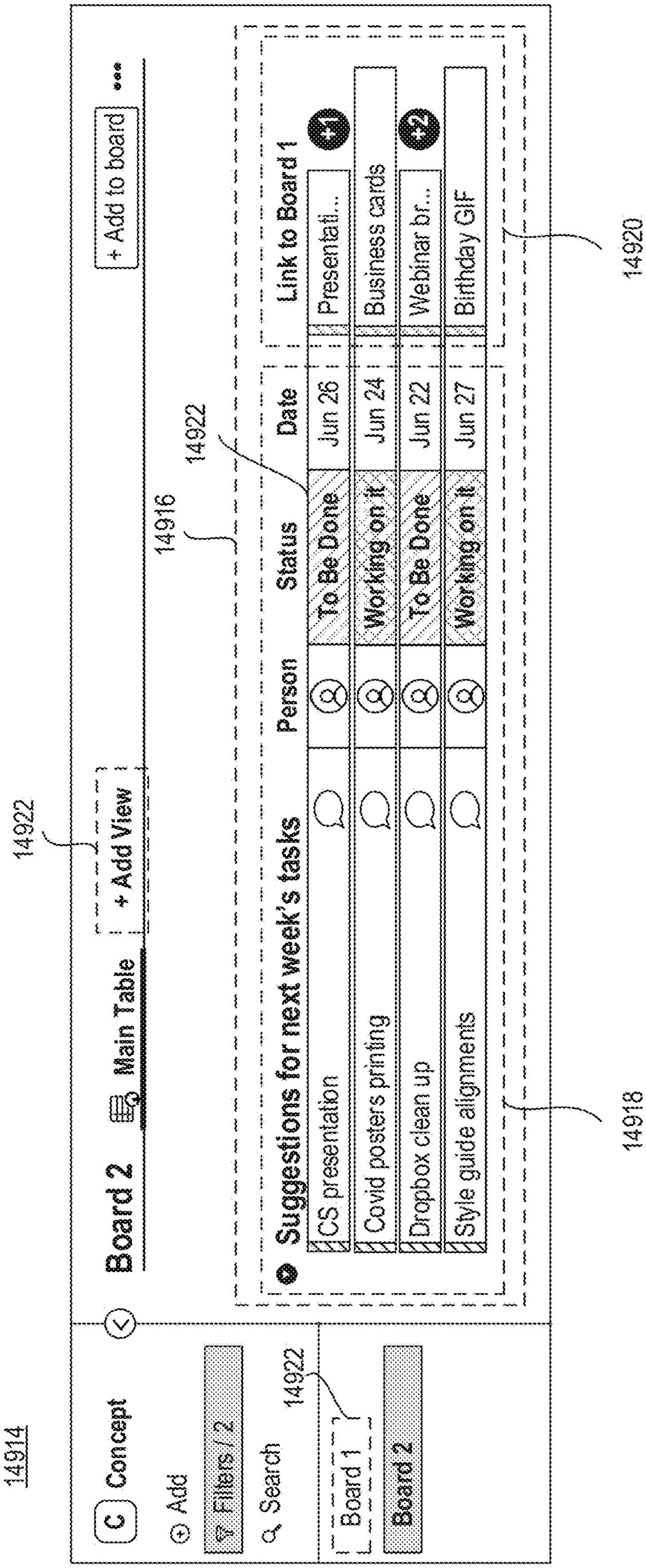

FIGS. 149A and 149B illustrate exemplary views of a plurality of linkages between at least some of the plurality of data objects associated with differing boards, consistent with some embodiments of the present disclosure.

Figure 150:
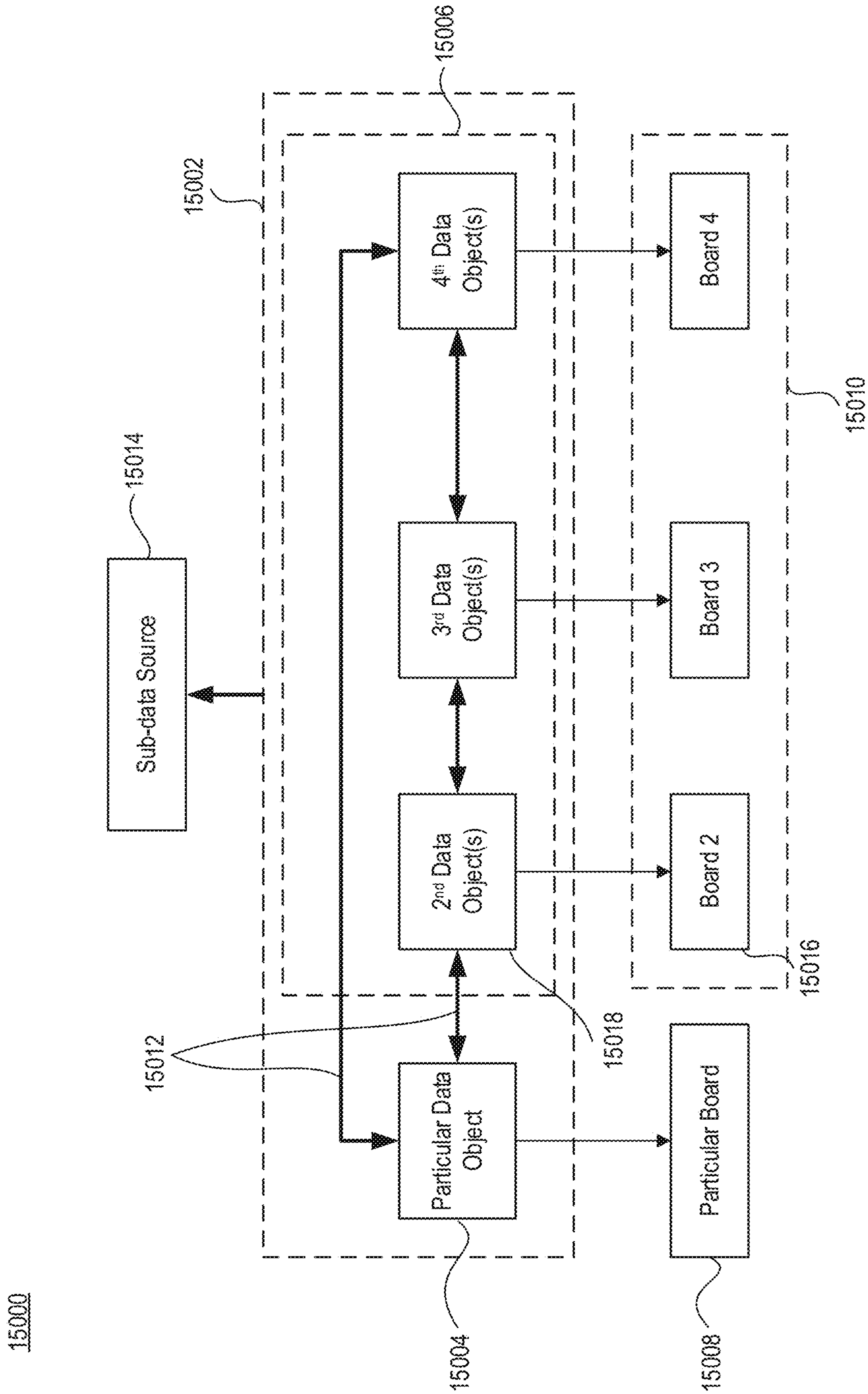

FIG. 150 illustrates an exemplary diagram of a sub-data source aggregating at least one additional data object and a particular data object, consistent with some embodiments of the present disclosure.

Figure 151:
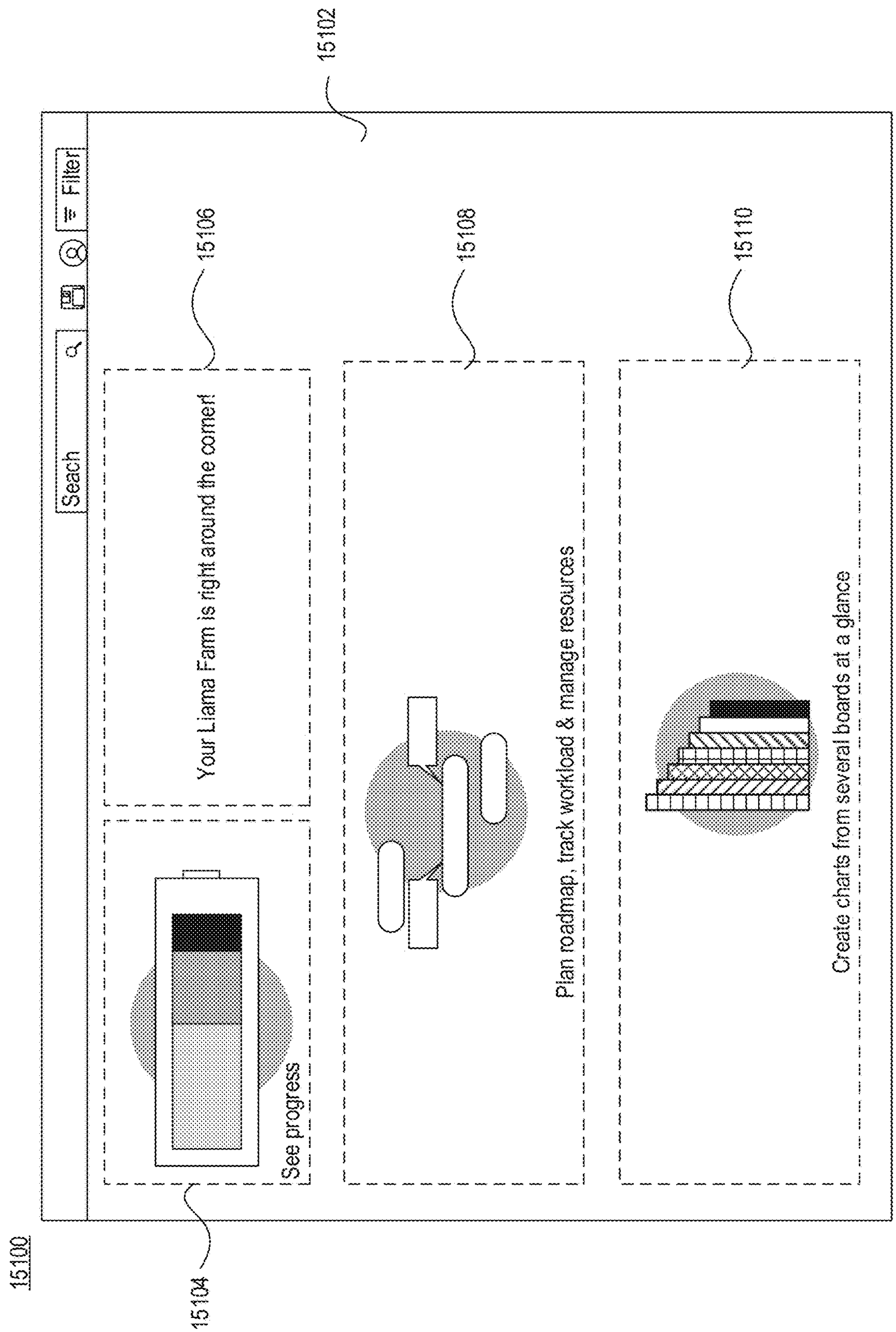
Figure 152:
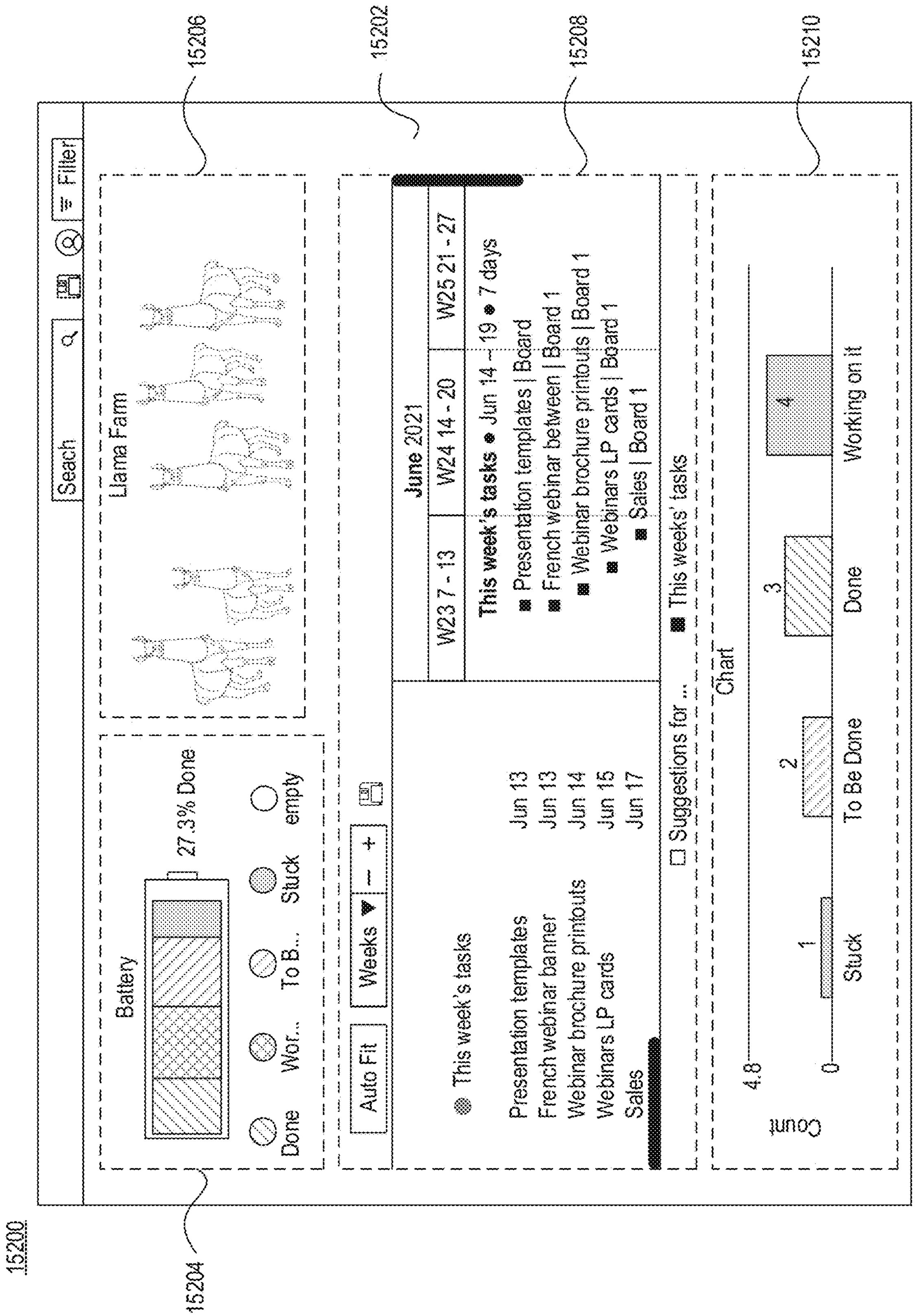

FIGS. 151 & 152 illustrate an exemplary visualization template selection and a sub-data visualization, consistent with some embodiments of the present disclosure.

Figure 153:
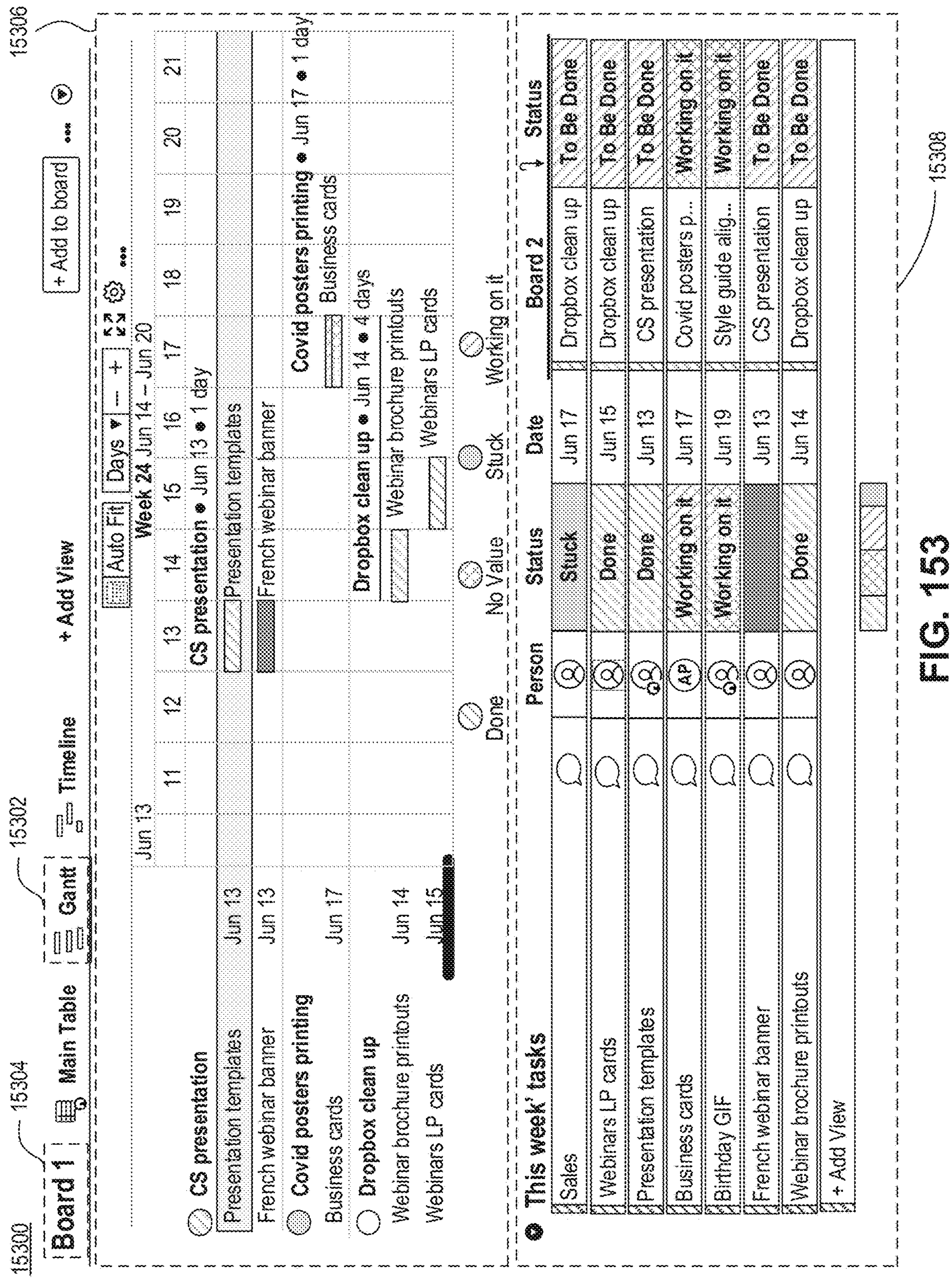

FIG. 153 illustrates an exemplary view of co-presentation of a representation of the particular board and the sub-data visualization, consistent with some embodiments of the present disclosure.

Figure 154:
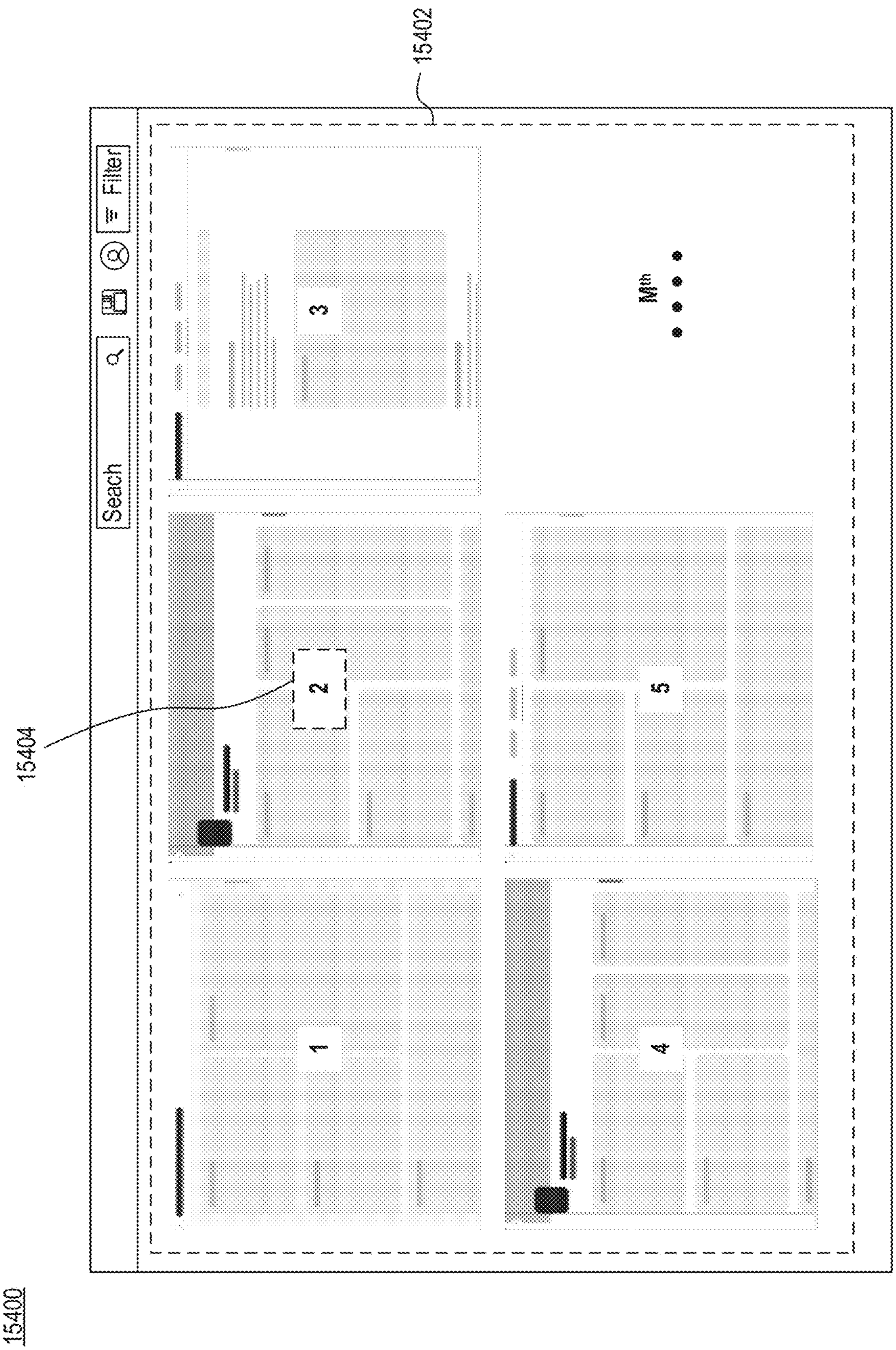

FIG. 154 illustrates an exemplary view of an index of a plurality of visualization templates where the received visualization template selection may be based on a selection from the index, consistent with some embodiments of the present disclosure.

Figure 155:
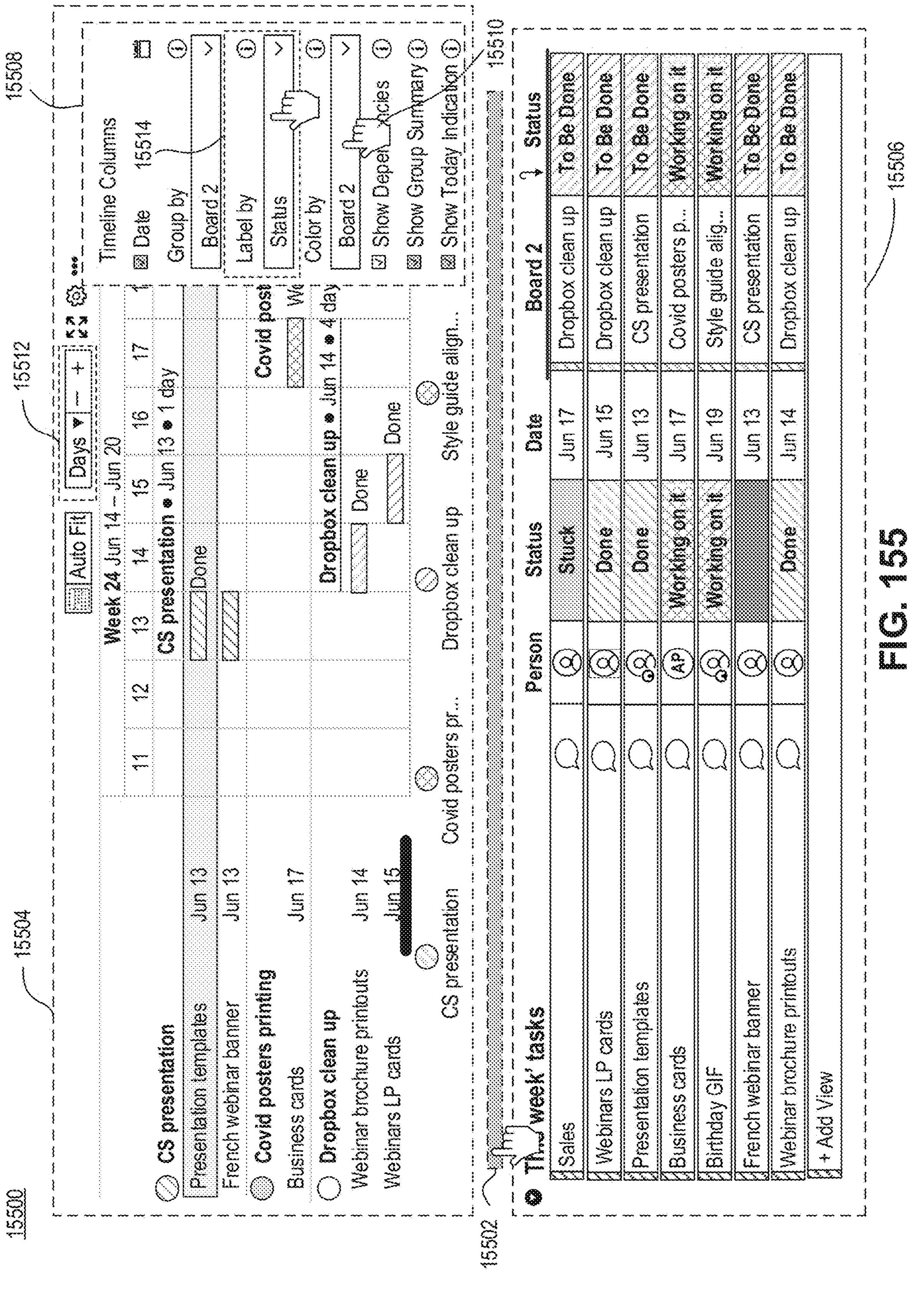

FIG. 155 illustrates an exemplary view of a co-presentation to reflect an unfiltered representation of a particular board and a filtered representation of a sub-data visualization upon receipt of a filter selection, consistent with some embodiments of the present disclosure.

Figure 156:
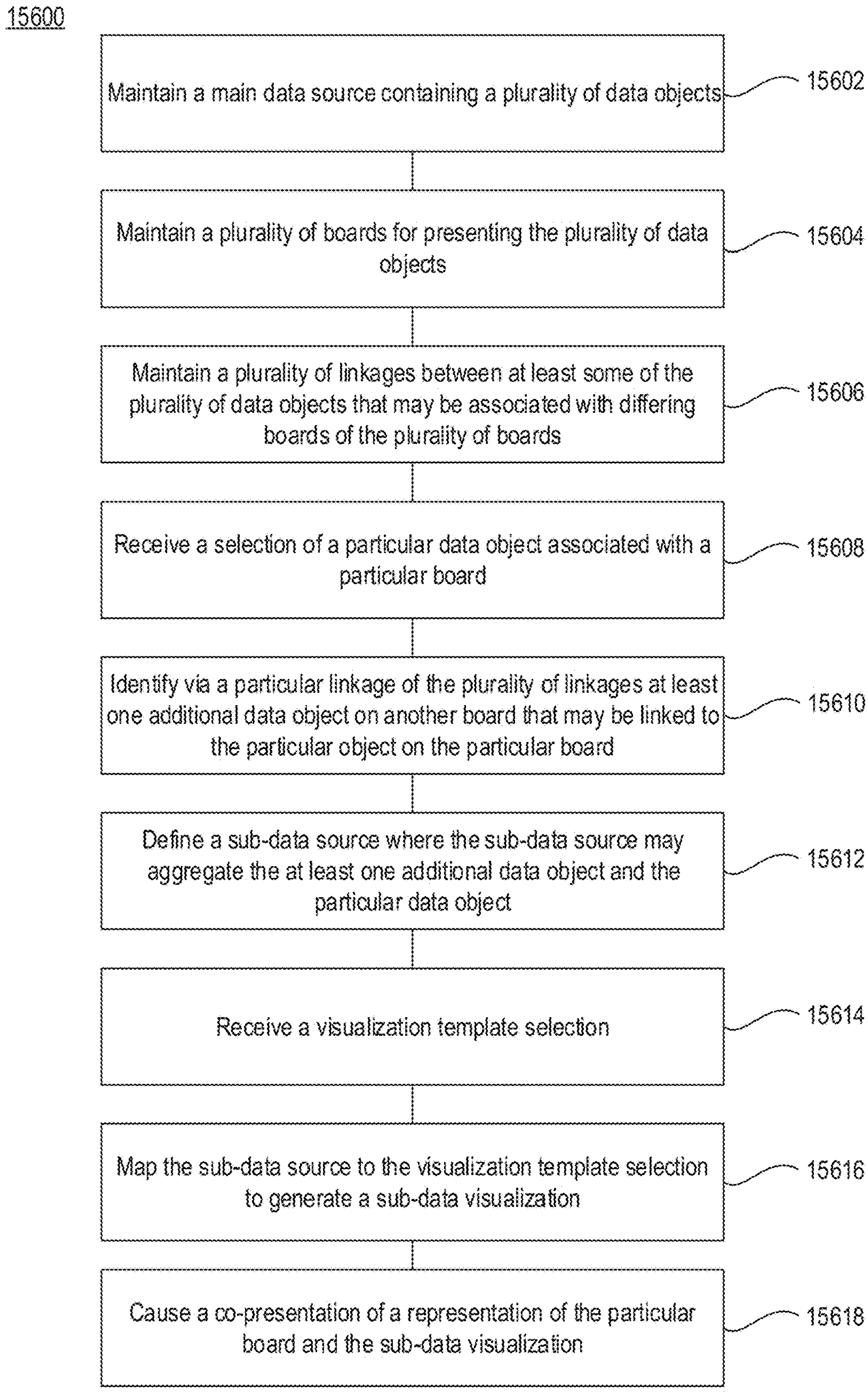

FIG. 156 illustrates an exemplary block diagram for an exemplary method for a data extraction and mapping system, consistent with some embodiments of the present disclosure.

Figure 157:
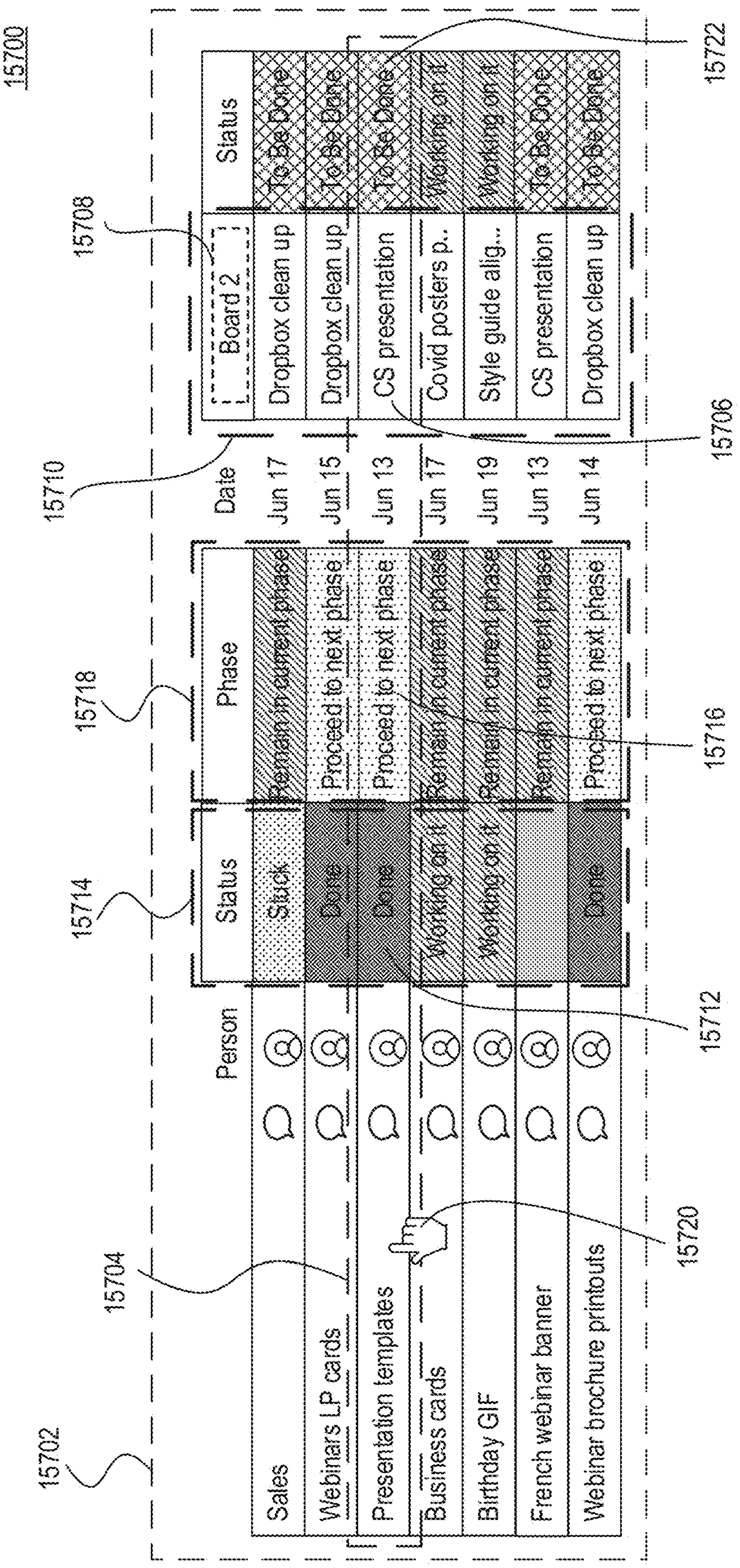

FIG. 157 illustrates an exemplary board with a plurality of items, each item defined by a row of cells, and wherein each cell is configured to contain data and is associated with a column heading, consistent with some embodiments of the present disclosure.

Figure 158:
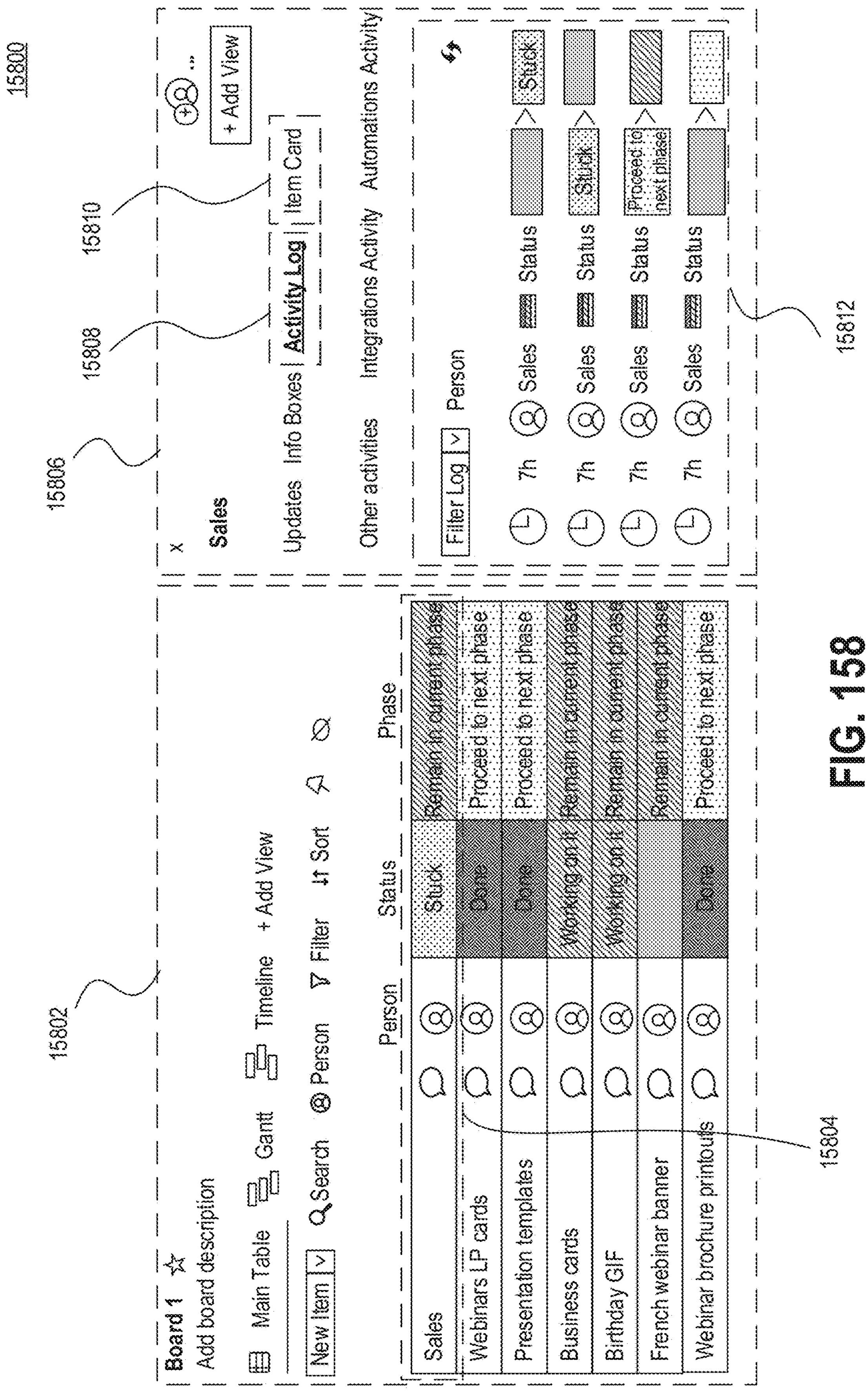

FIG. 158 illustrates an exemplary view of causing a display of an item interface extrapolator, wherein the item interface extrapolator may include a plurality of activatable elements, consistent with some embodiments of the present disclosure.

Figure 159:
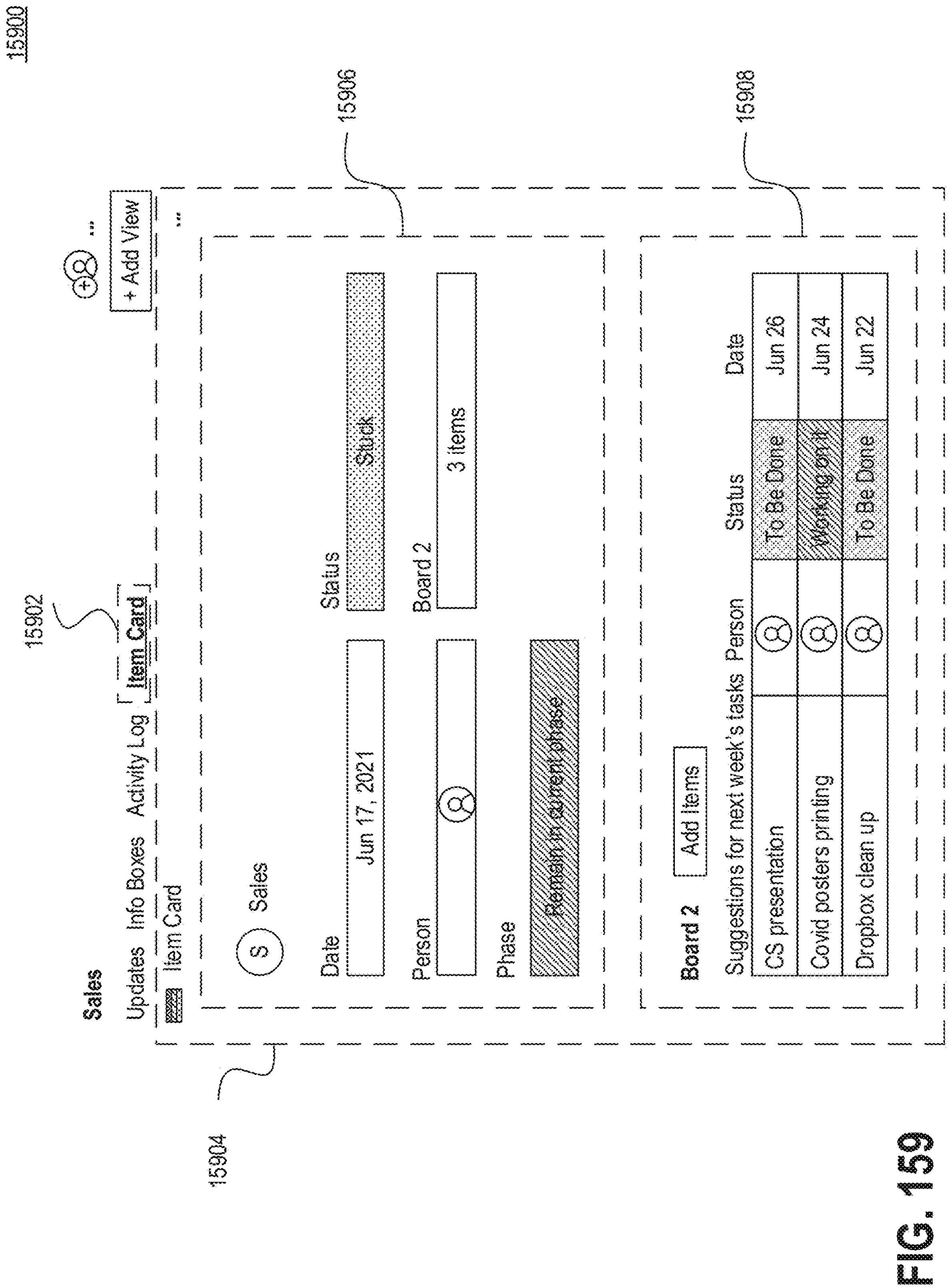

FIG. 159 illustrates an exemplary view of, upon receipt of the second selection, causing a first extrapolated display of data associated with the particular item to appear in a first manner, consistent with some embodiments of the present disclosure.

Figure 160:
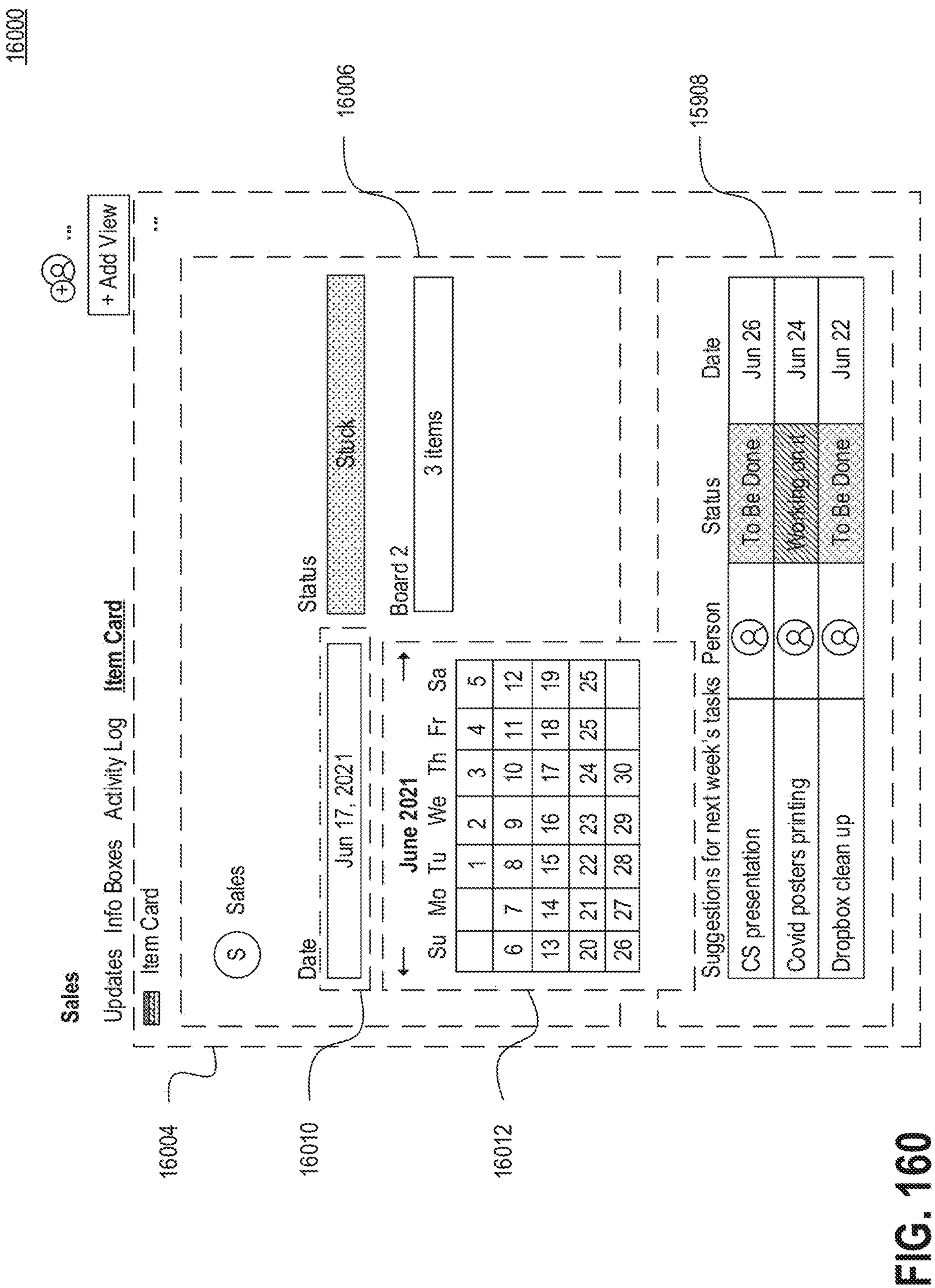

FIG. 160 illustrates an exemplary view of, upon receipt of a third selection, causing a second extrapolated display of data associated with the particular item to appear in a second manner, consistent with some embodiments of the present disclosure.

Figure 161:
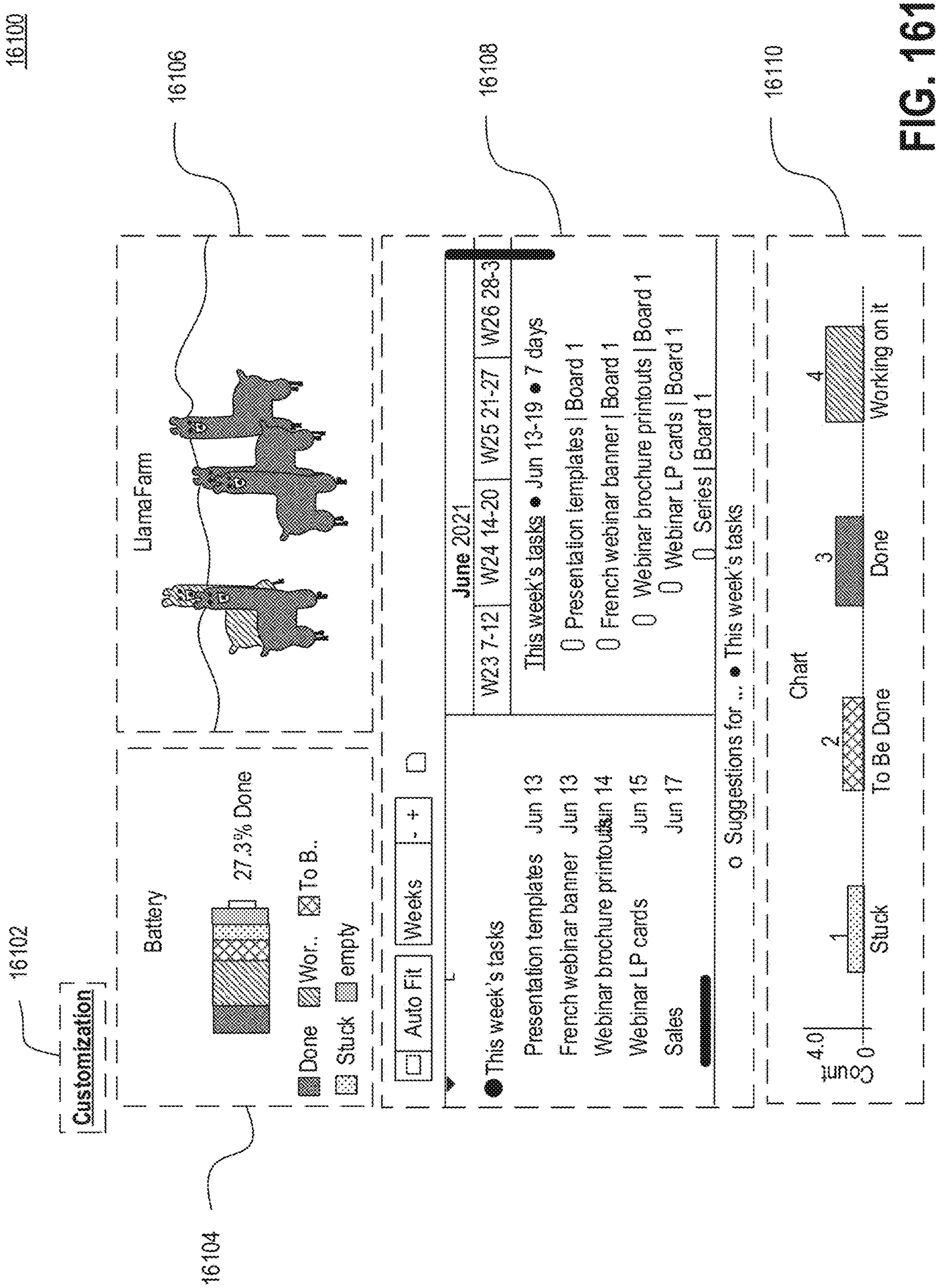

FIG. 161 illustrates an exemplary view of, upon receipt of a fourth selection, enabling customization of the interface extrapolator, wherein the customization enables data associated with the particular item to appear in a third customized manner, consistent with some embodiments of the present disclosure.

Figure 162:
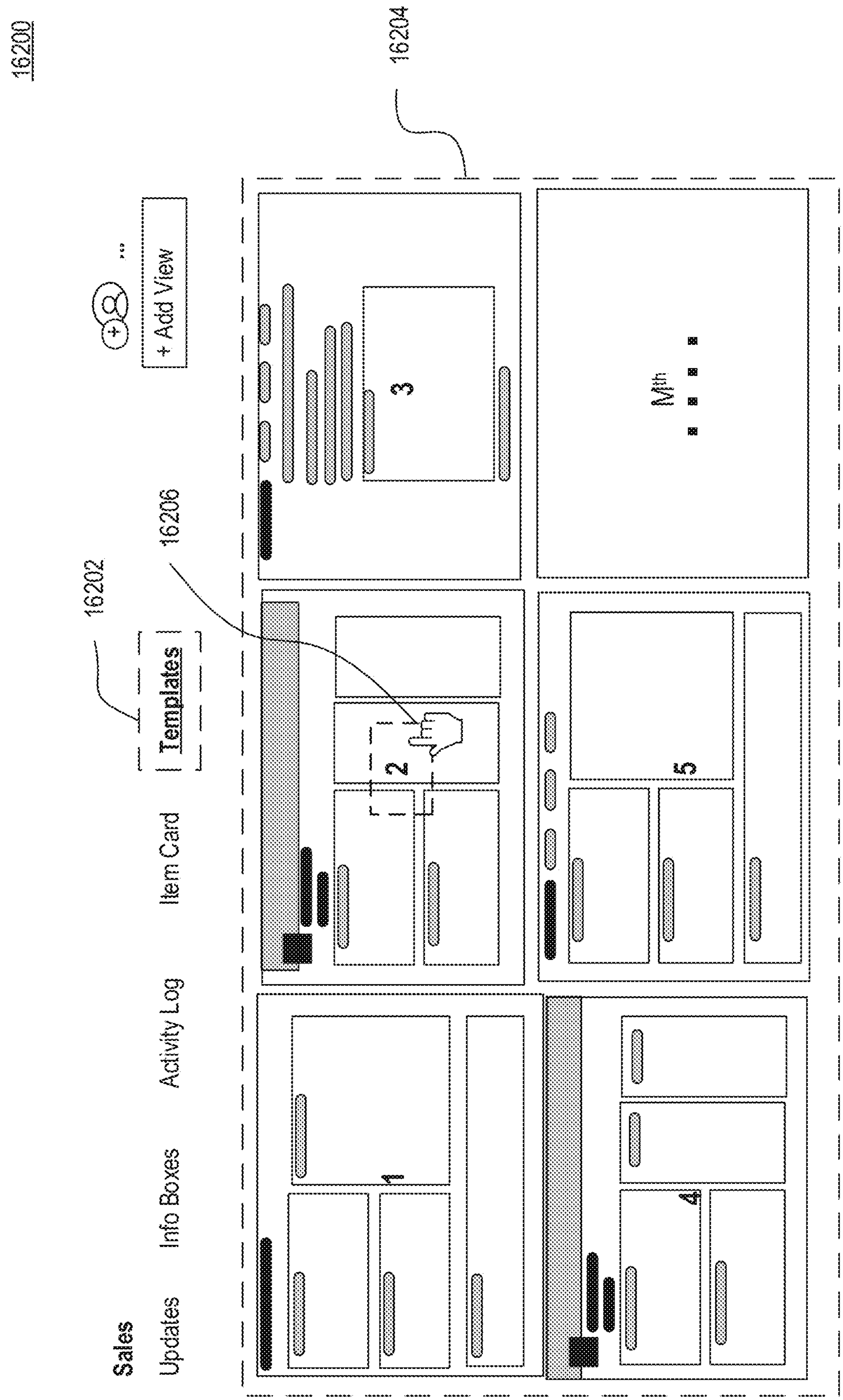

FIG. 162 illustrates an exemplary view of storing one or more templates of one or more of the third customized manners shown as a display option when items other than the particular item are selected for analysis and display within the interface extrapolator, consistent with some embodiments of the present disclosure.

Figure 163:
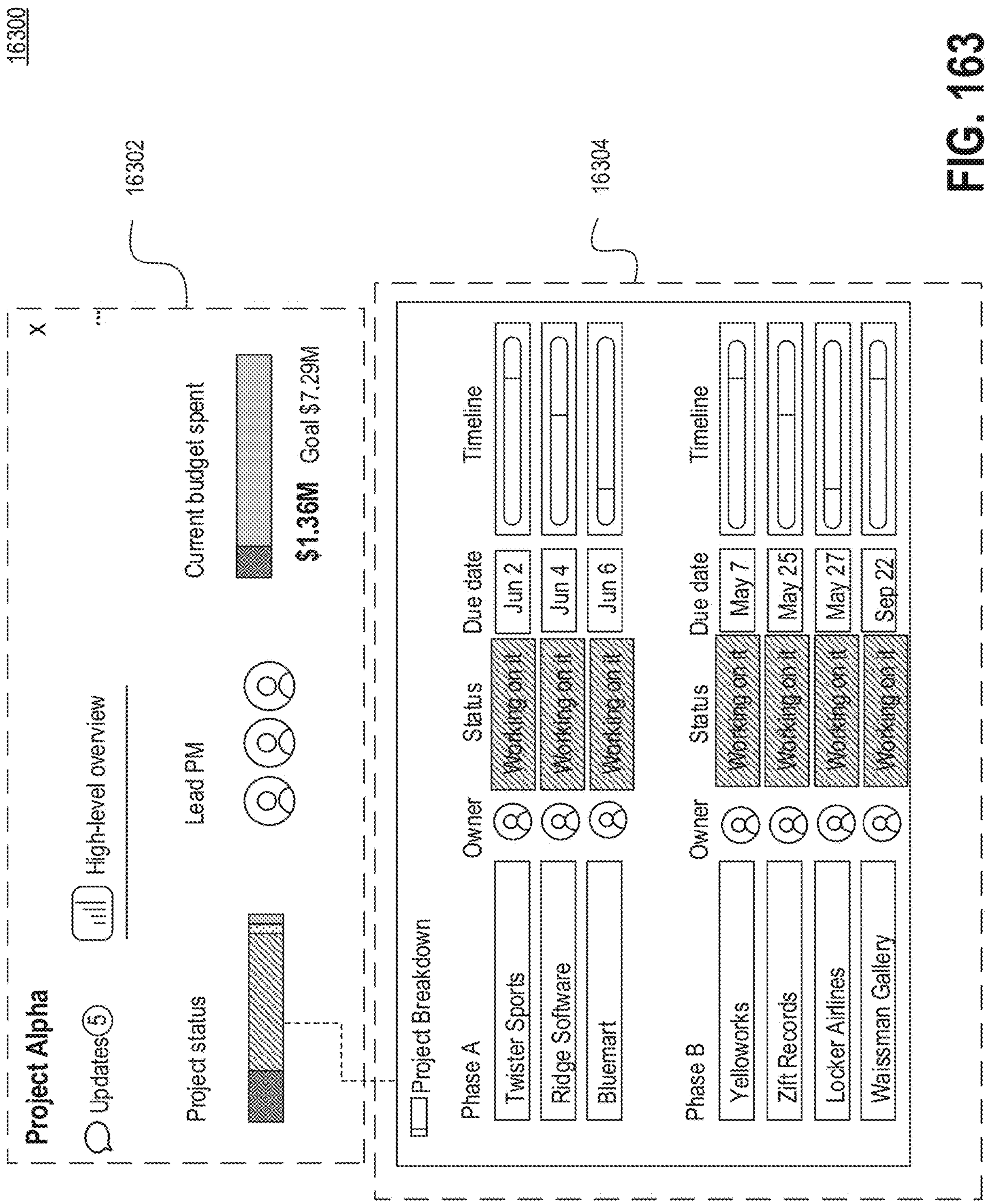

FIG. 163 illustrates an exemplary migrating the item interface extrapolator for co-presentation with a representation other than the board, consistent with some embodiments of the present disclosure.

Figure 164:
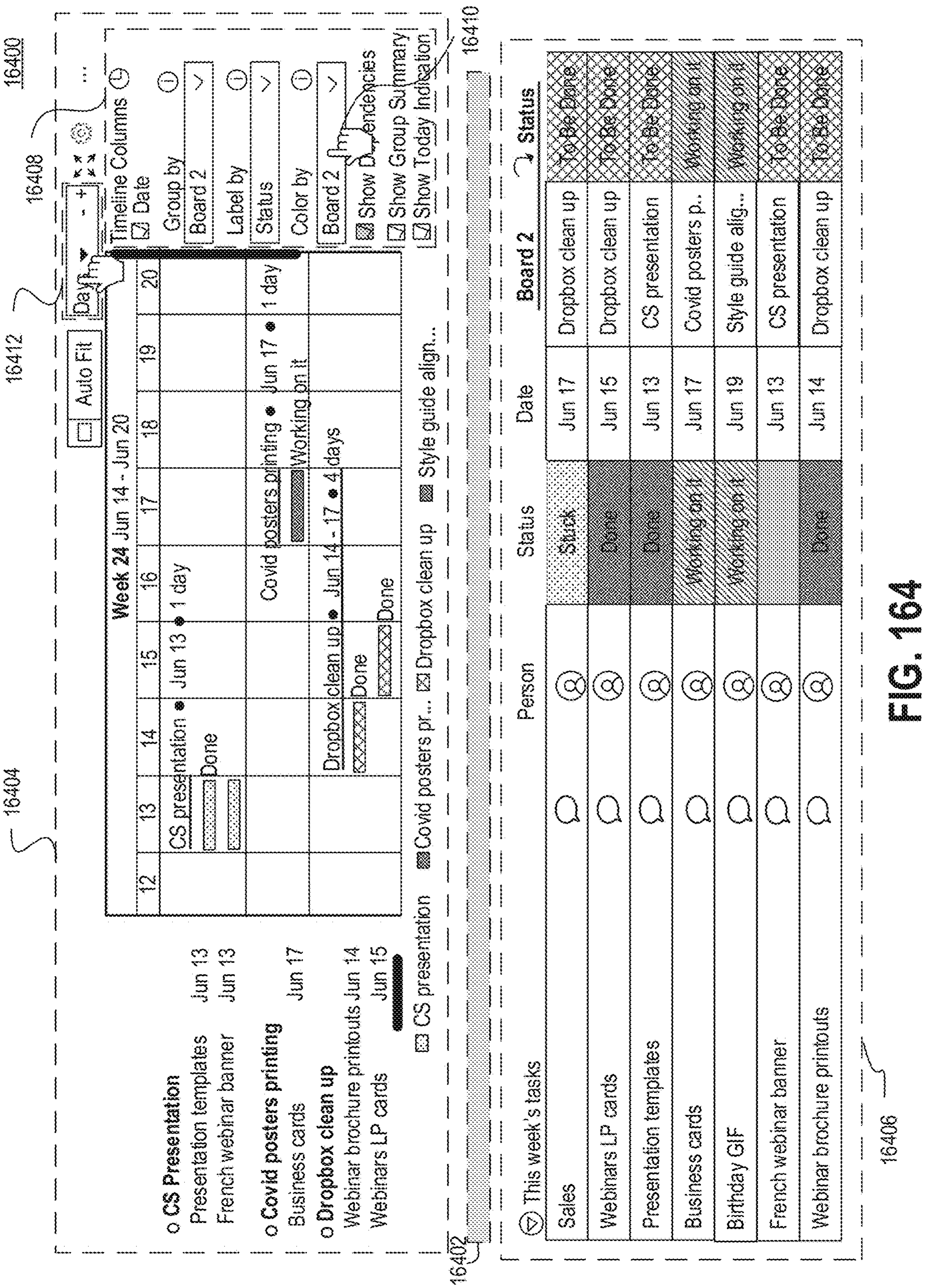

FIG. 164 illustrates an exemplary view of a co-presentation to reflect an unfiltered representation of a board and a filtered representation of an item interface extrapolator upon receipt of a filter selection, consistent with some embodiments of the present disclosure.

Figure 165:
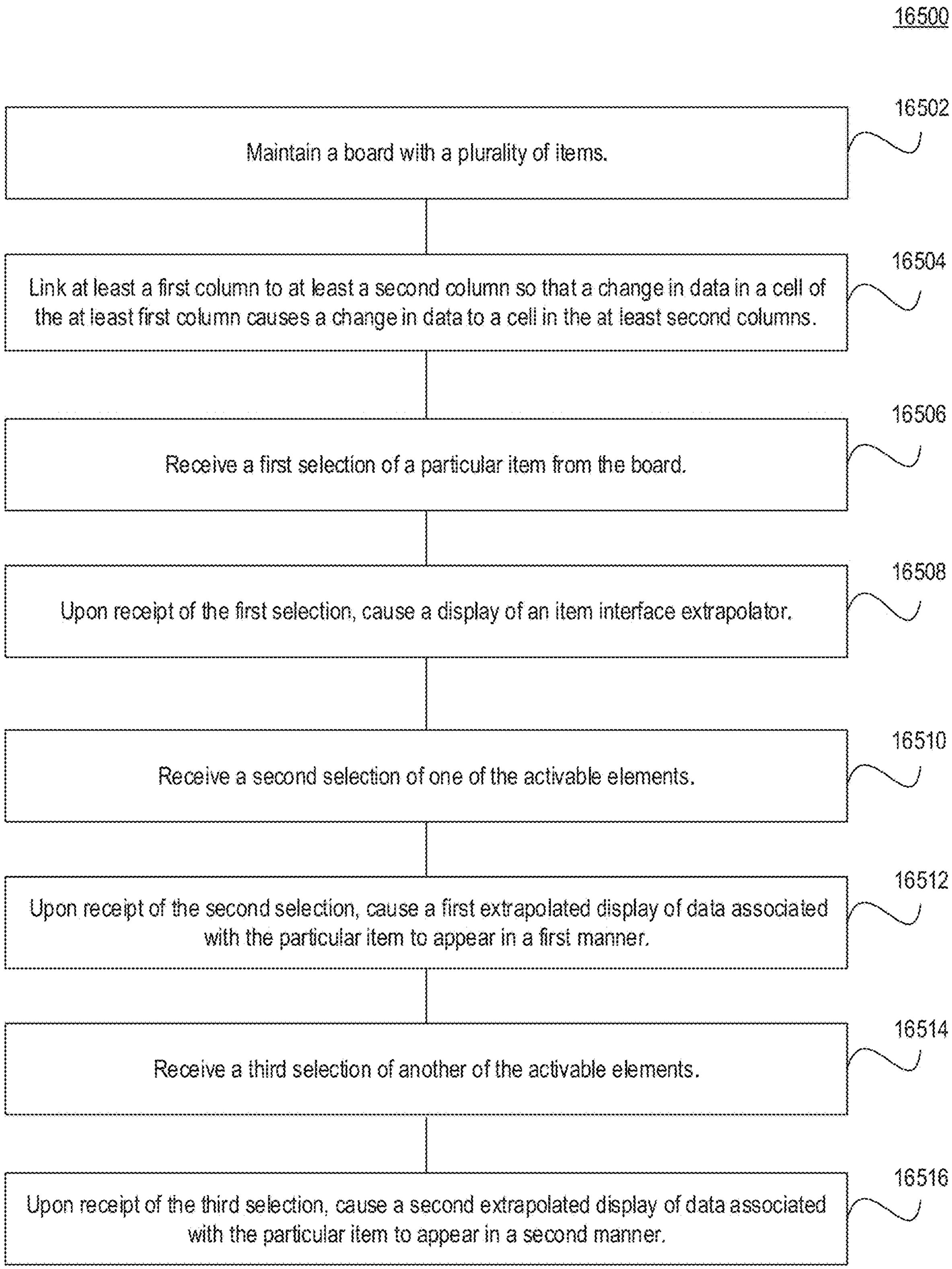

FIG. 165 illustrates an exemplary block diagram for an exemplary method for a data extraction and mapping system, consistent with some embodiments of the present disclosure.

Figure 166:
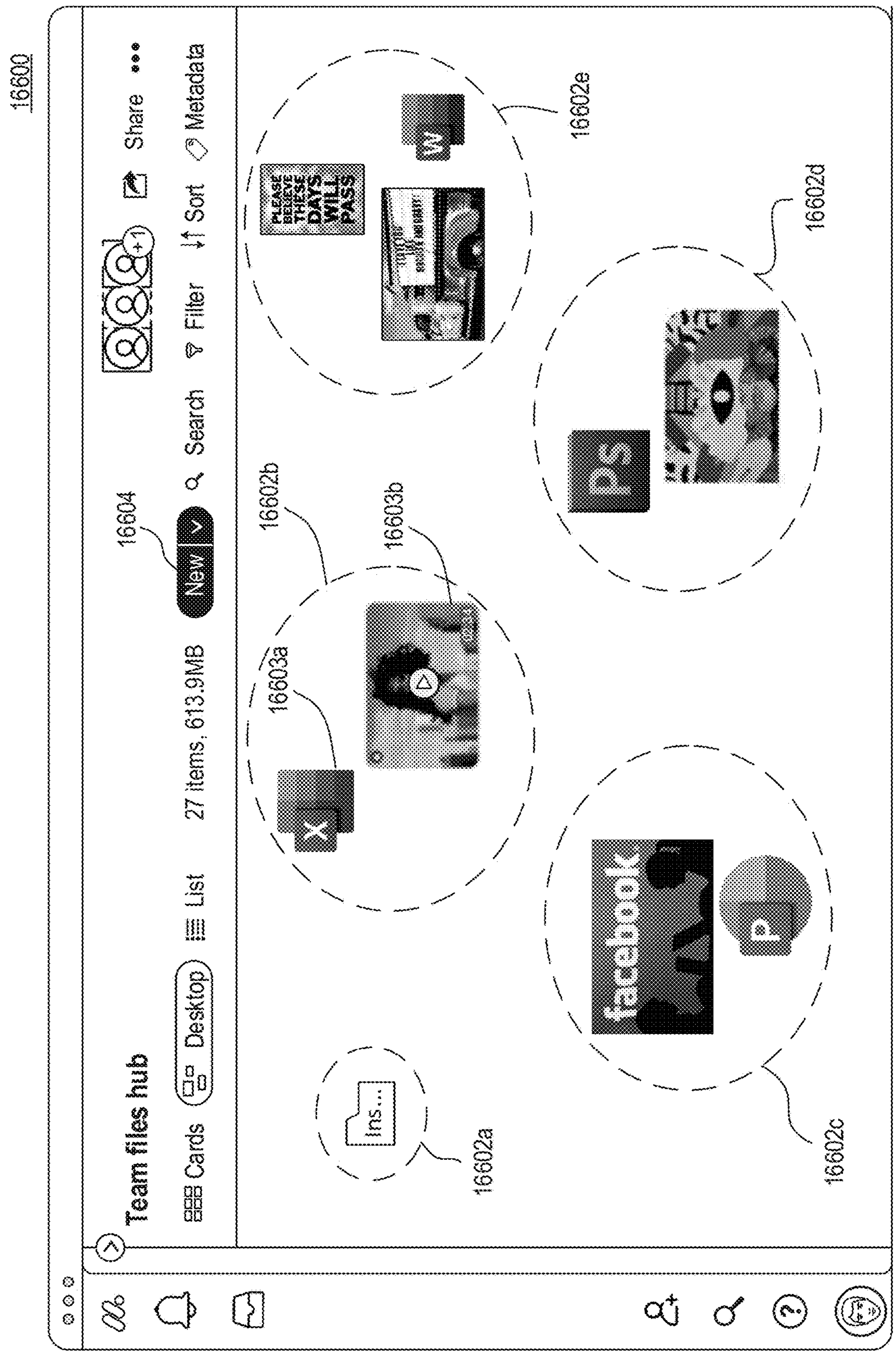

FIG. 166 illustrates an exemplary desktop view of an electronic whiteboard corresponding to an integrated unified filing engine, consistent with some embodiments of the present disclosure.

Figure 167:
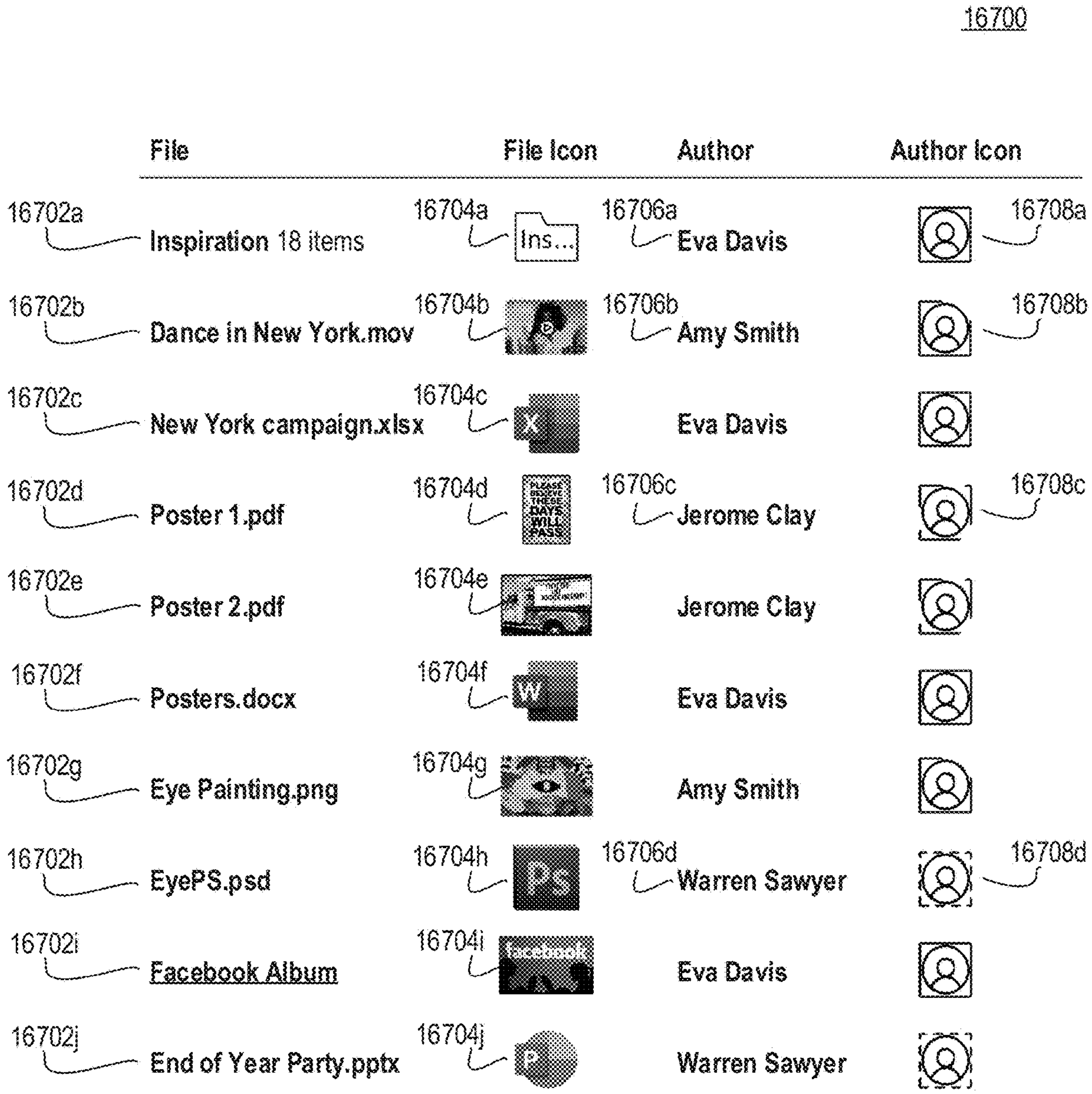

FIG. 167 illustrates an exemplary table of a workflow management system containing a plurality of items and asset designations, consistent with some embodiments of the present disclosure.

Figure 168:
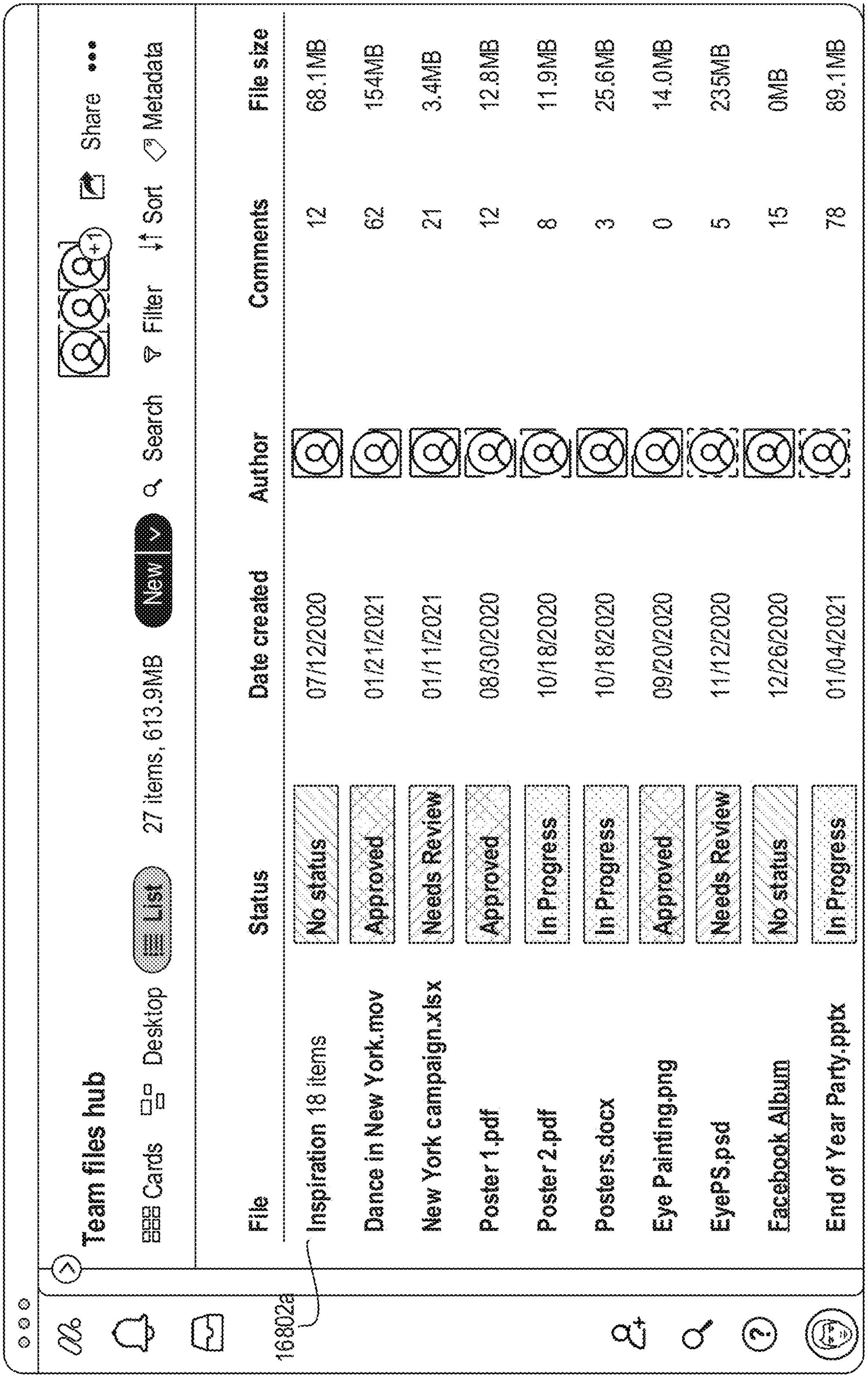

FIG. 168 illustrates an exemplary list view of an electronic whiteboard corresponding to an integrated unified filing engine, consistent with some embodiments of the present disclosure.

Figure 169:

FIG. 169 illustrates an exemplary cards view of an electronic whiteboard corresponding to an integrated unified filing engine, consistent with some embodiments of the present disclosure.

Figure 170:
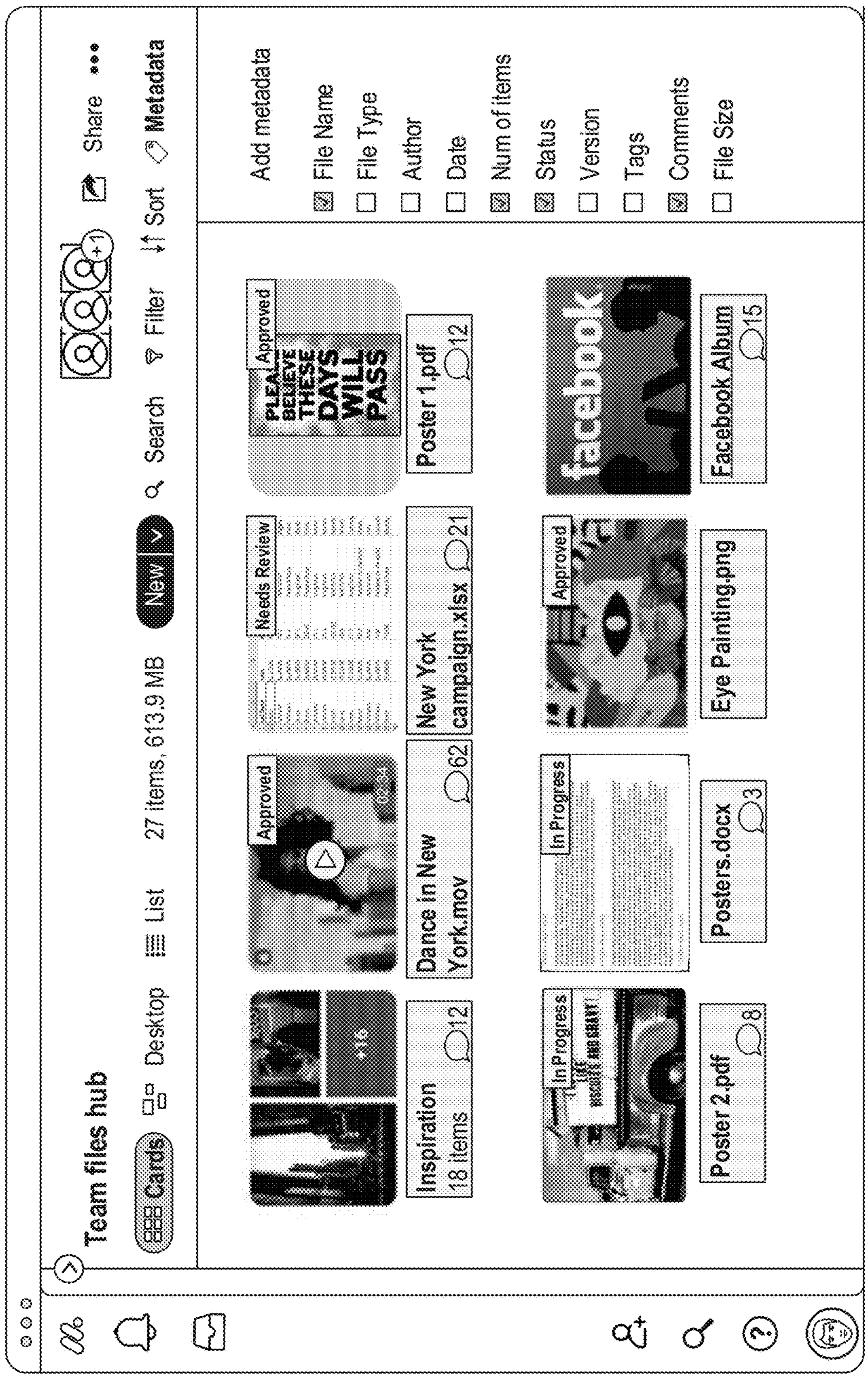

FIG. 170 illustrates an exemplary cards view of an electronic whiteboard corresponding to an integrated unified filing engine including metadata related to files, consistent with some embodiments of the present disclosure.

Figure 171:
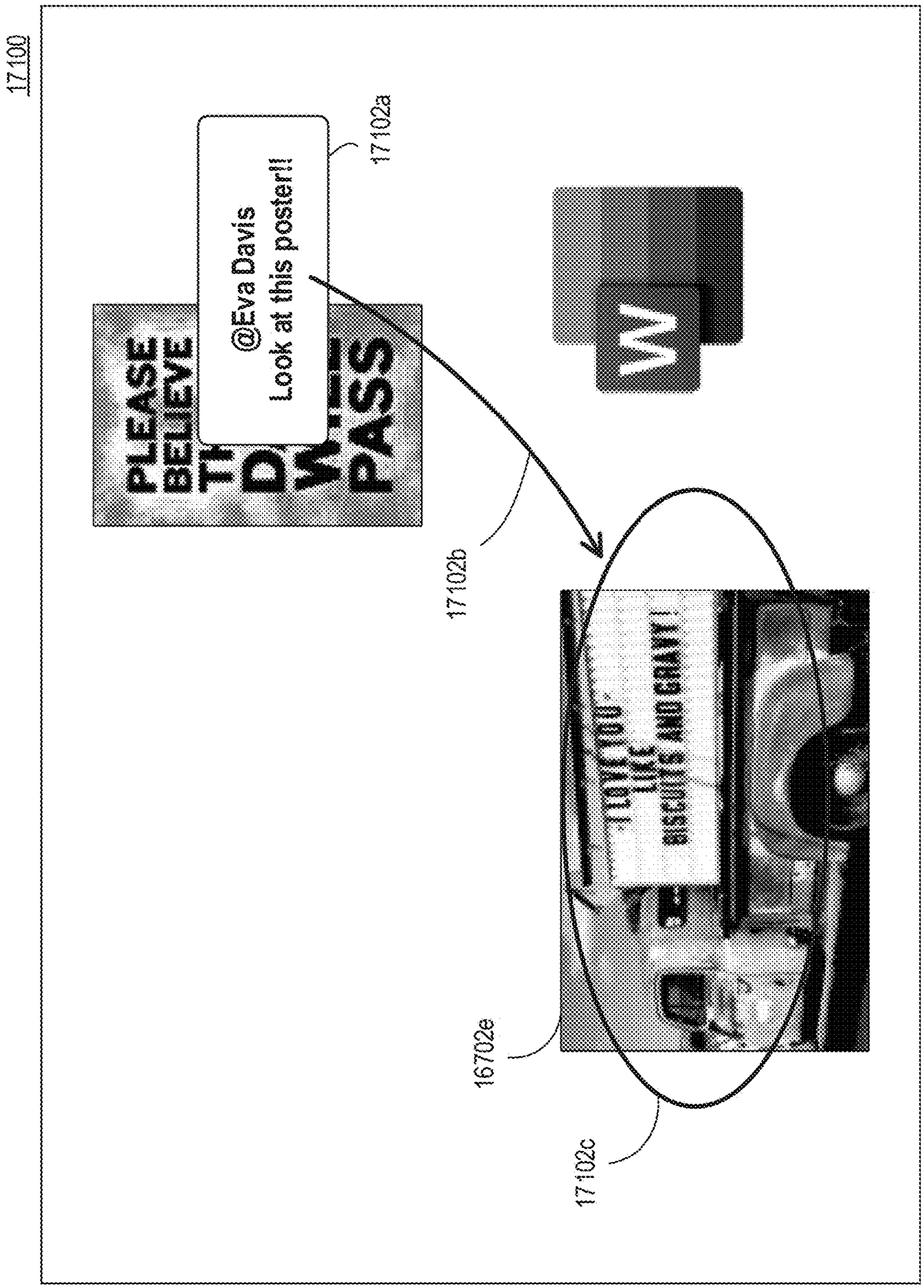

FIG. 171 illustrates exemplary annotations made to a location of an electronic whiteboard corresponding to an integrated unified filing engine, consistent with some embodiments of the present disclosure.

Figure 172:
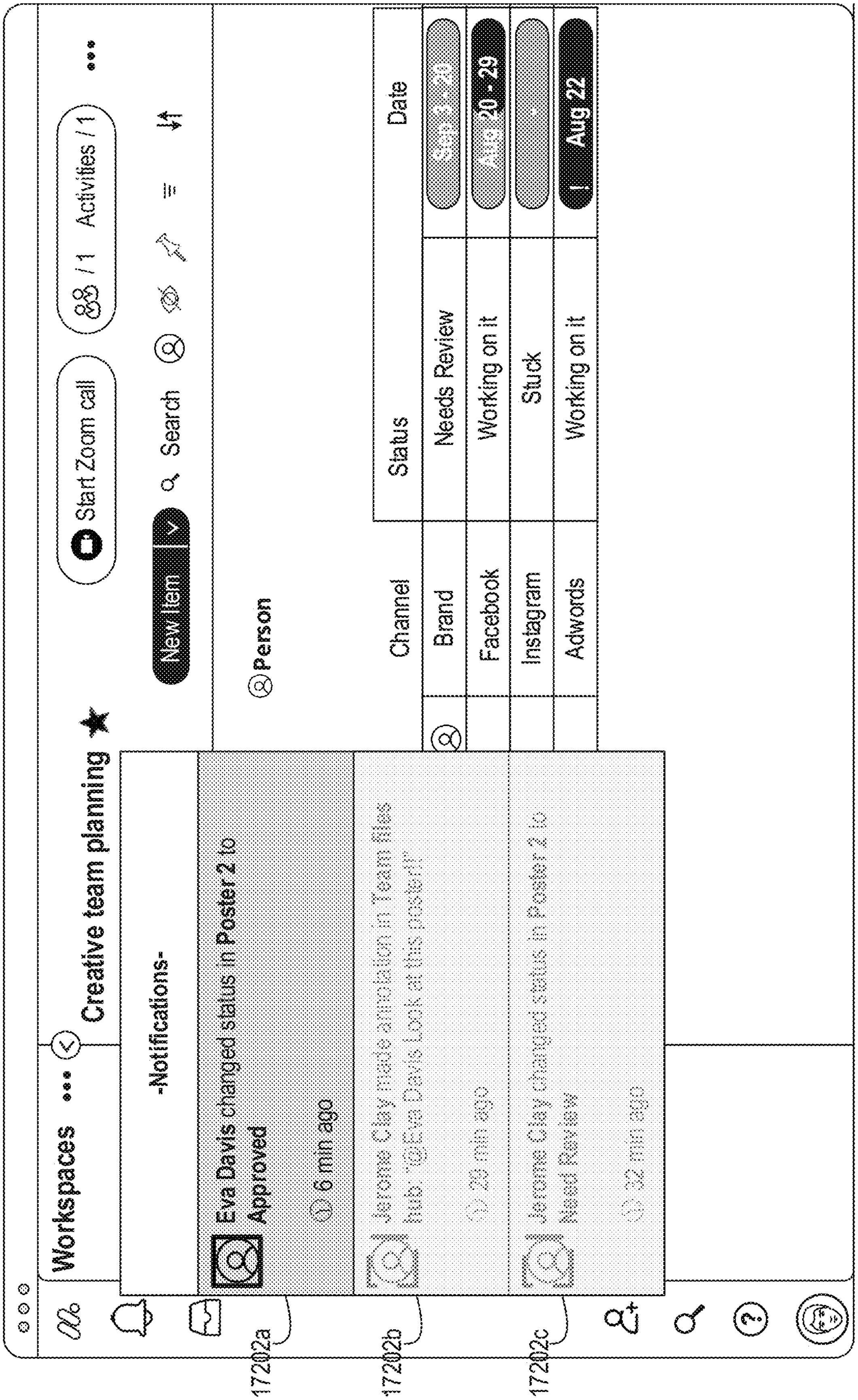

FIG. 172 illustrates exemplary notifications provided to an entity as a result of actions taken by other entities that are part of the workflow management system, consistent with some embodiments of the present disclosure.

Figure 173:
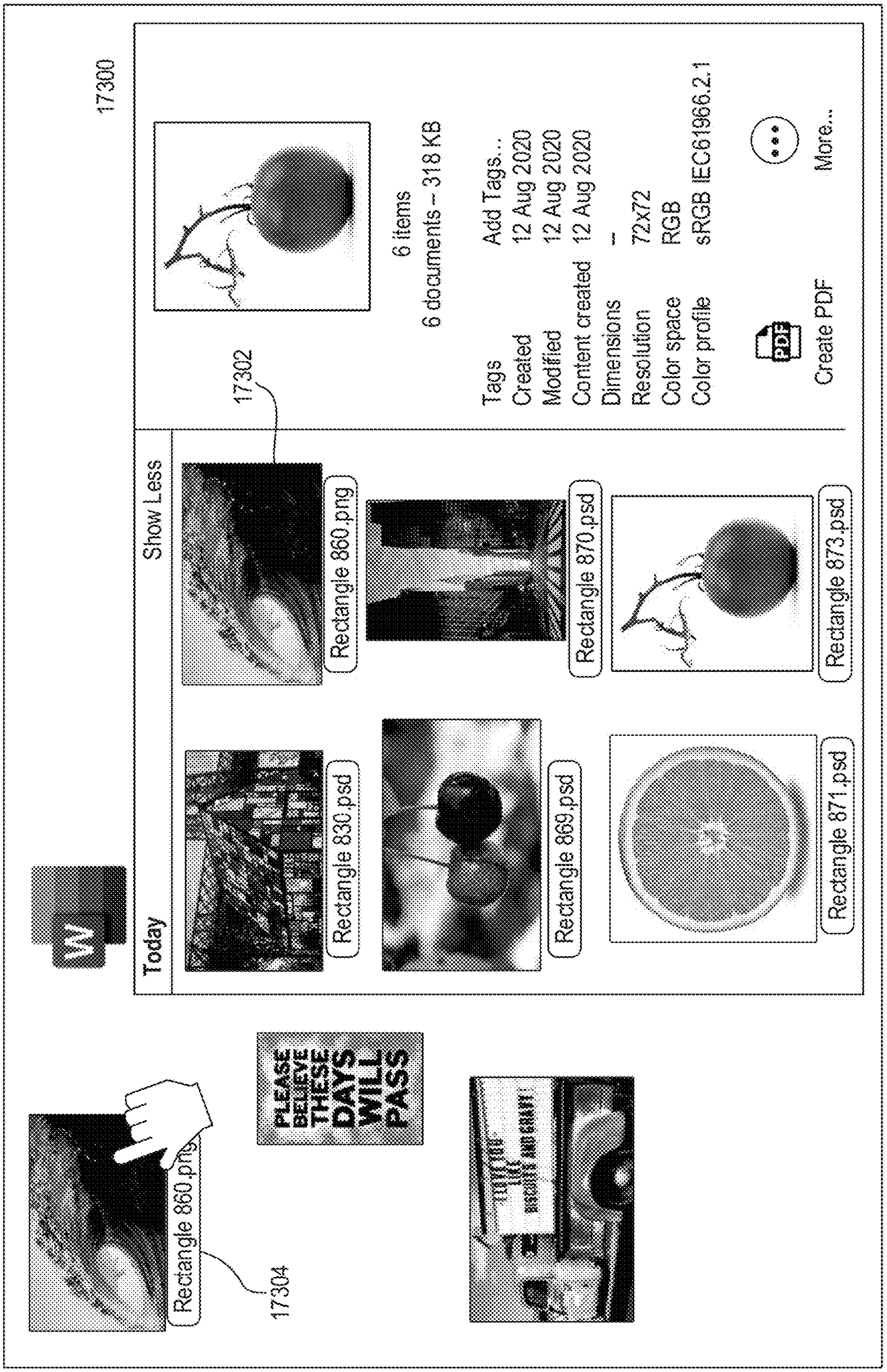

FIG. 173 illustrates an exemplary uploading of a digital file by dragging the digital file to an electronic whiteboard, consistent with some embodiments of the present disclosure.

Figure 174:
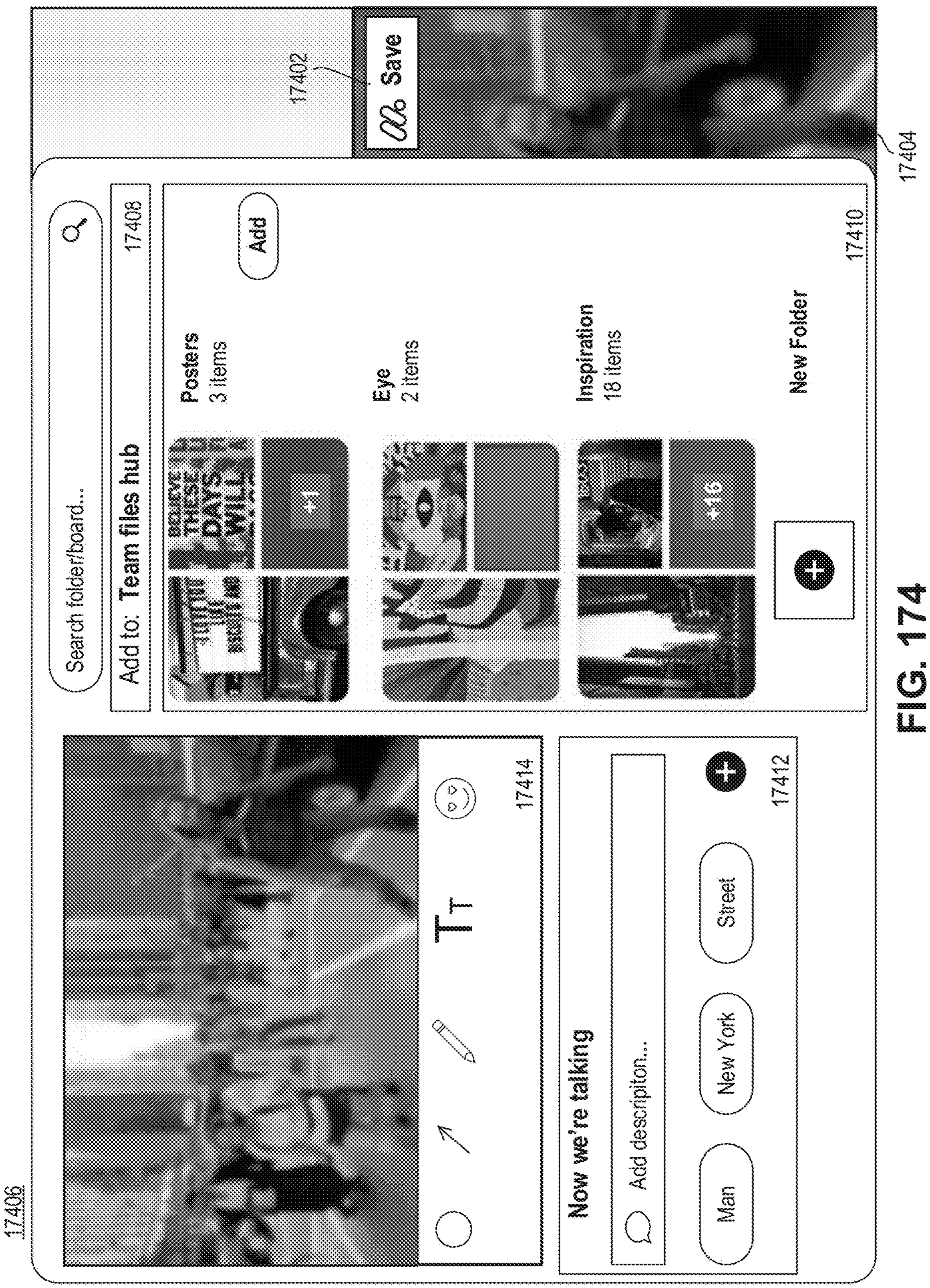

FIG. 174 illustrates an exemplary uploading of a digital file by adding the digital file to an electronic whiteboard from a different platform, consistent with some embodiments of the present disclosure.

Figure 175:
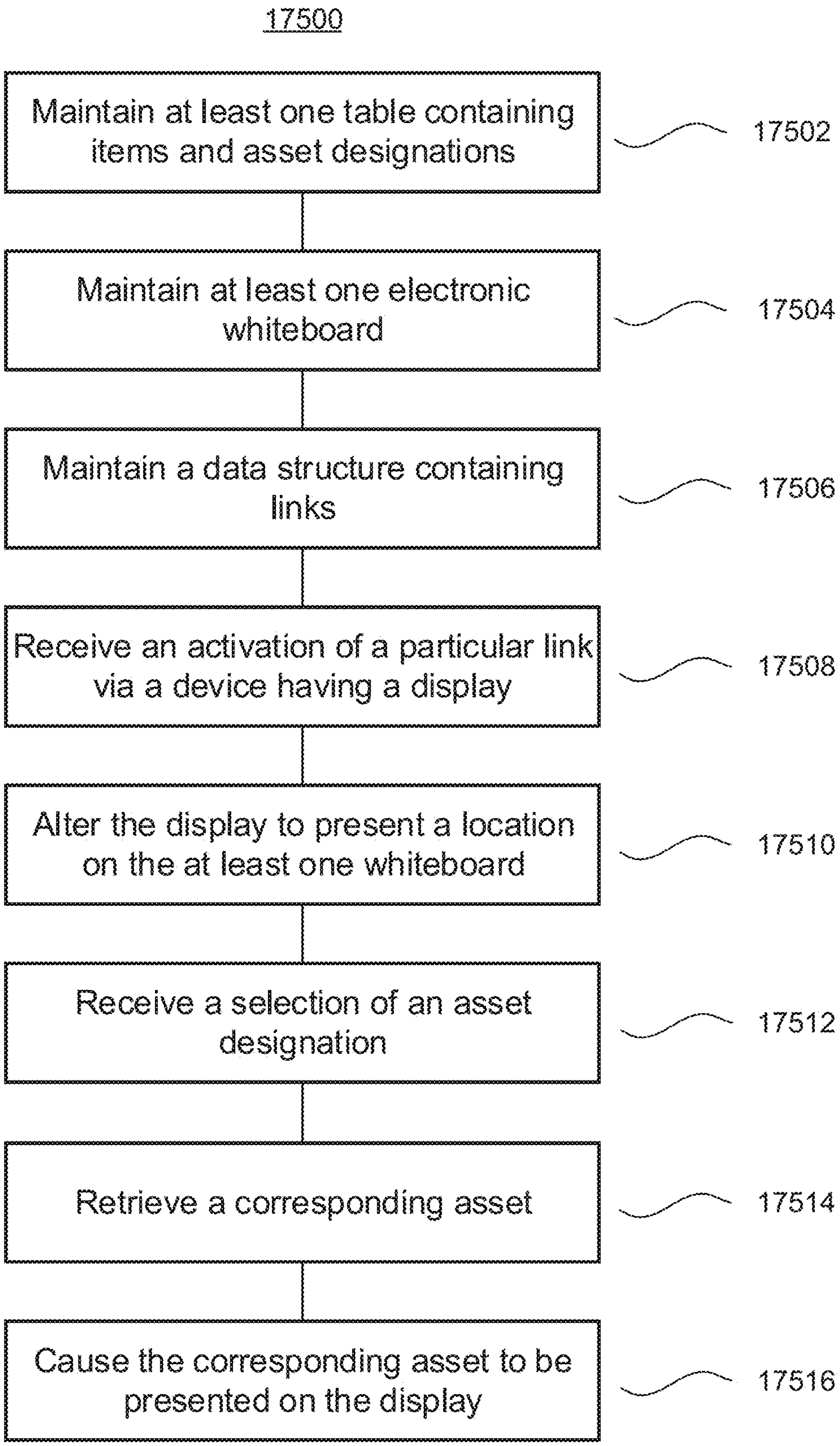

FIG. 175 is a block diagram of an exemplary workflow management system having an integrated unified filing engine, consistent with some embodiments of the present disclosure.

Figure 176:
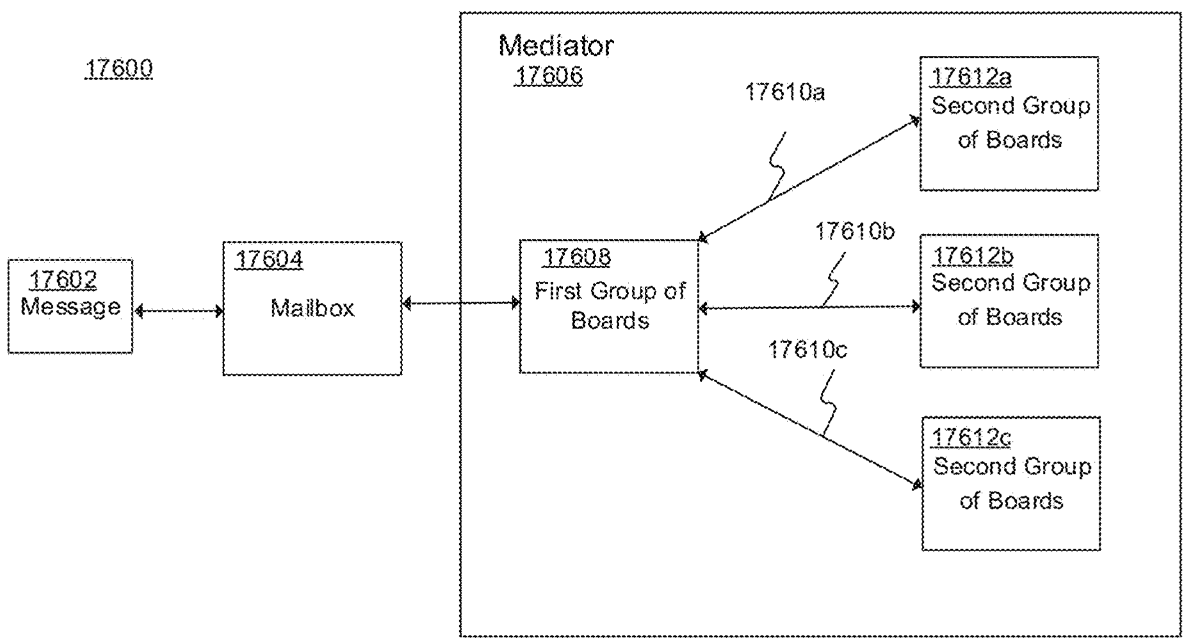

FIG. 176 depicts a block diagram of an exemplary enterprise messaging system, consistent with some embodiments of the present disclosure.

FIG. 177 illustrates simplified exemplary interconnected boards, consistent with some embodiments of the present disclosure.

FIG. 178 illustrates an exemplary presentation of messages, consistent with some embodiments of the present disclosure.

Figure 179:
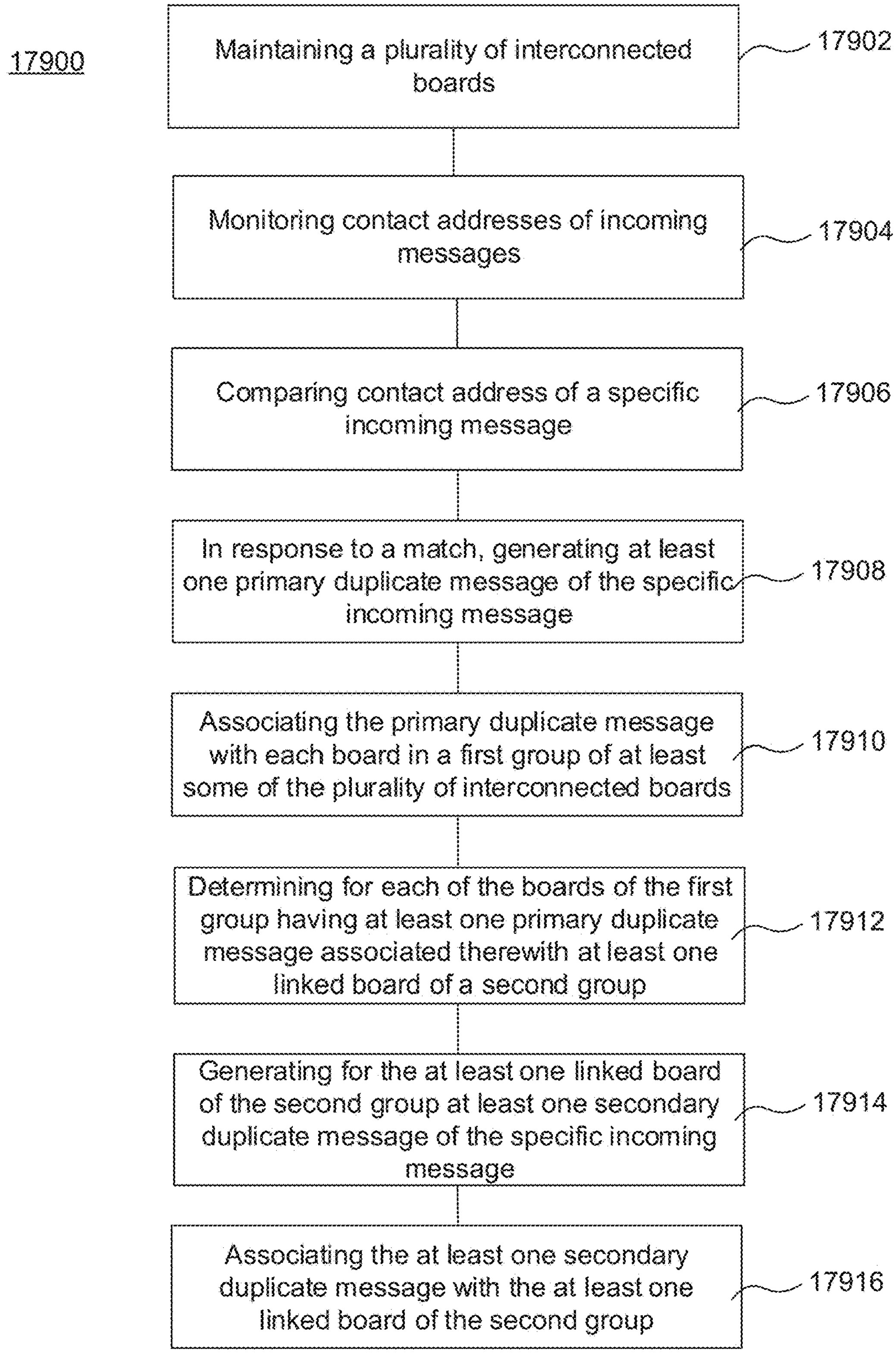

FIG. 179 illustrates a block diagram of an example process for message mediation and verification, consistent with some embodiments of the present disclosure.

Figure 180:
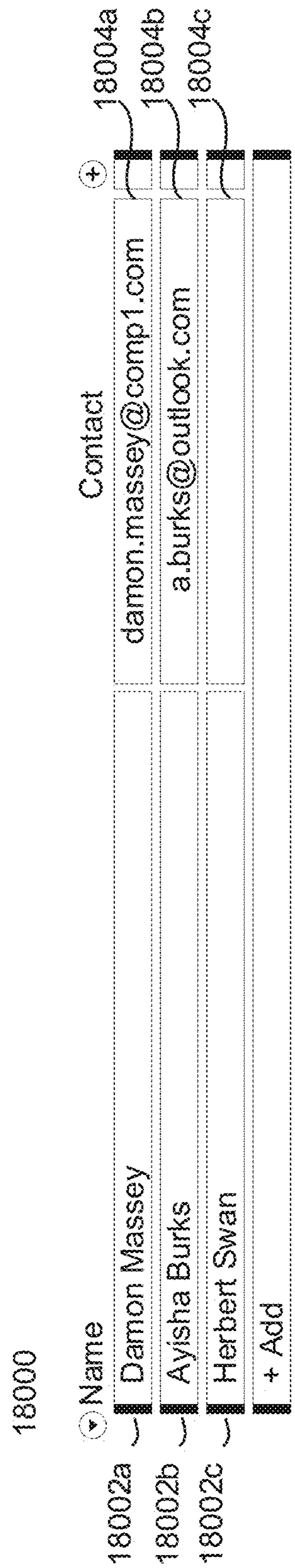

FIG. 180 illustrates an exemplary board containing differing external addresses, consistent with some embodiments of the present disclosure.

Figure 181:
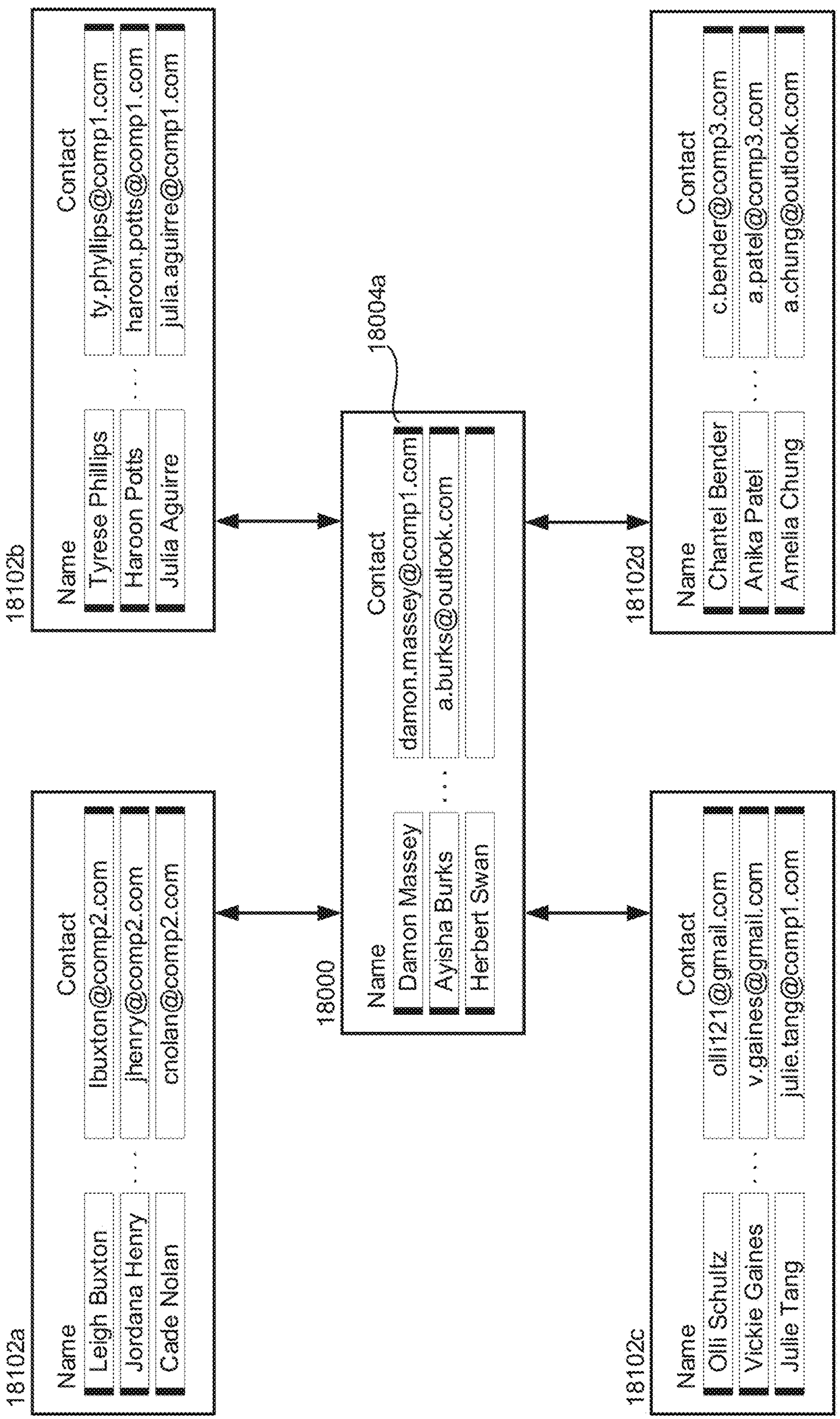

FIG. 181 illustrates a plurality of exemplary boards containing differing external addresses, consistent with some embodiments of the present disclosure.

Figure 182:
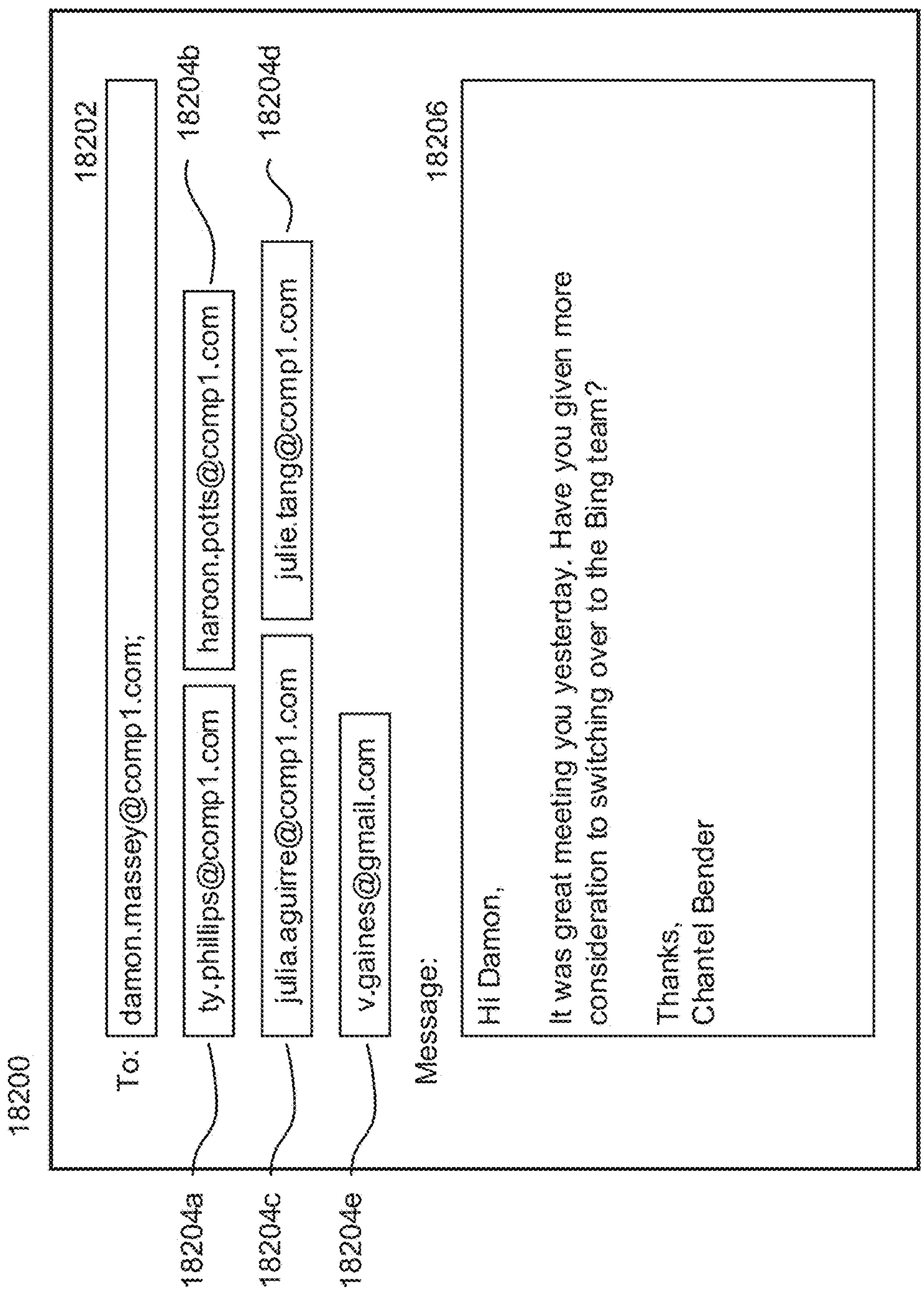

FIG. 182 illustrates an exemplary communication interface, consistent with some embodiments of the present disclosure.

Figure 183:
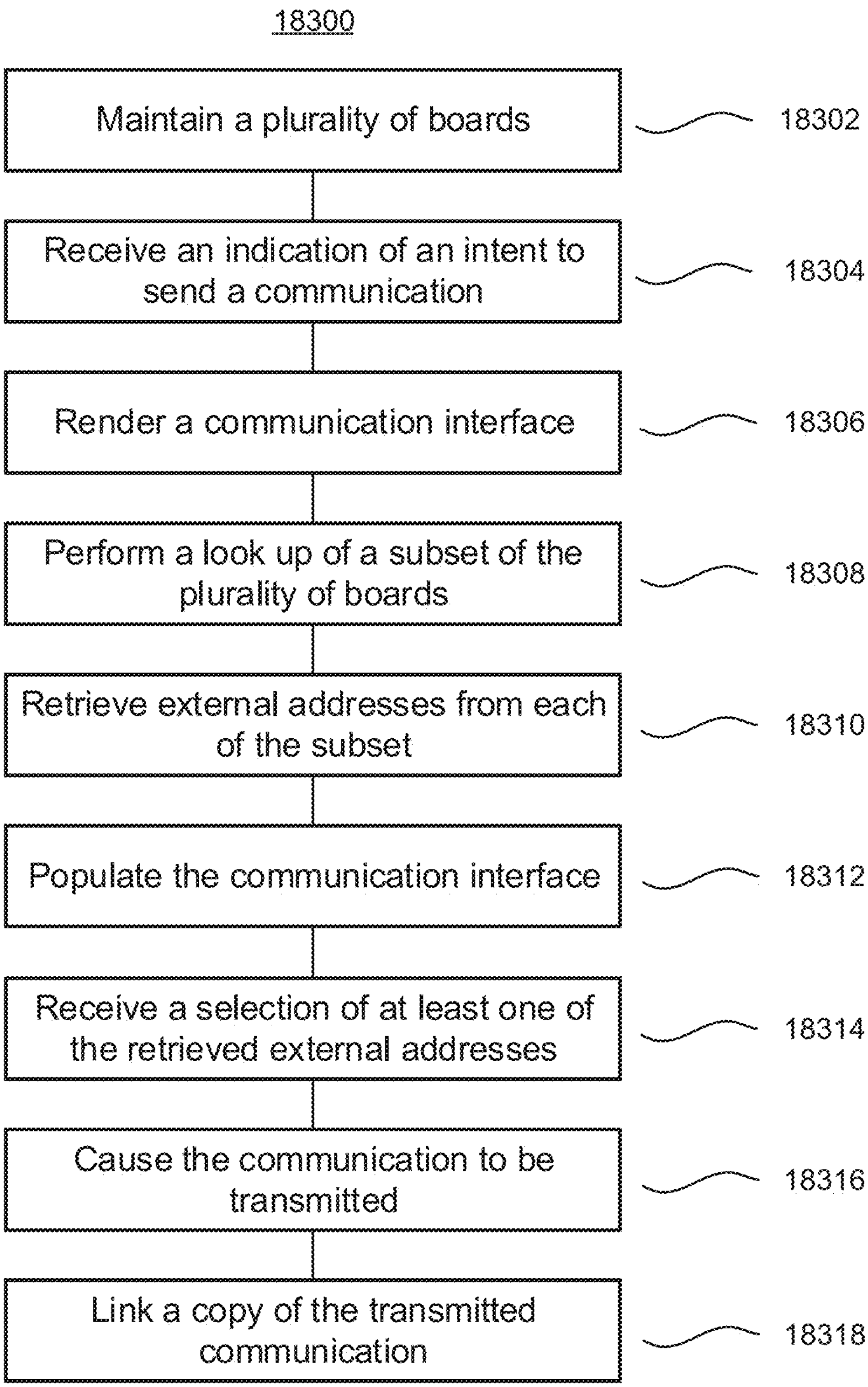

FIG. 183 is a block diagram of an enterprise messaging method for auto-populating recipient fields based on context of source content, consistent with some embodiments of the present disclosure.

Figure 184:
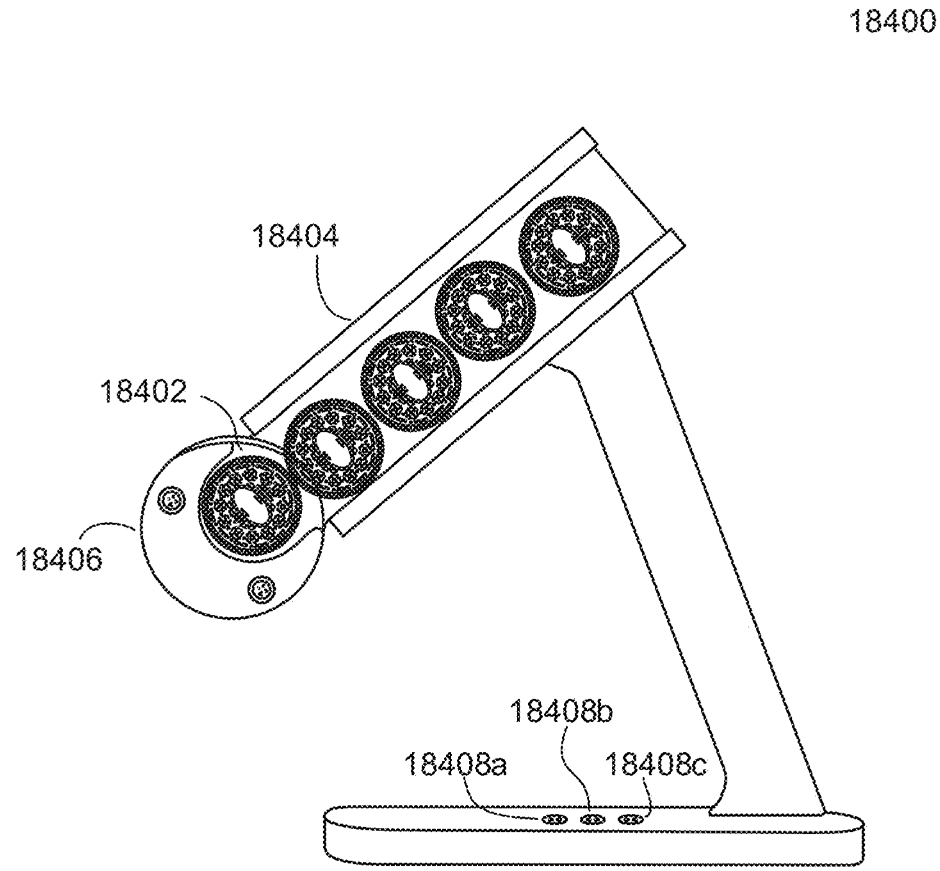

FIG. 184 illustrates an exemplary disbursed networked dispenser for dispensing cookies, consistent with some embodiments of the present disclosure.

FIGS. 185A to 185D illustrate exemplary embodiments of various disbursed networked dispensers for dispensing physical rewards, consistent with some embodiments of the present disclosure.

Figure 186:
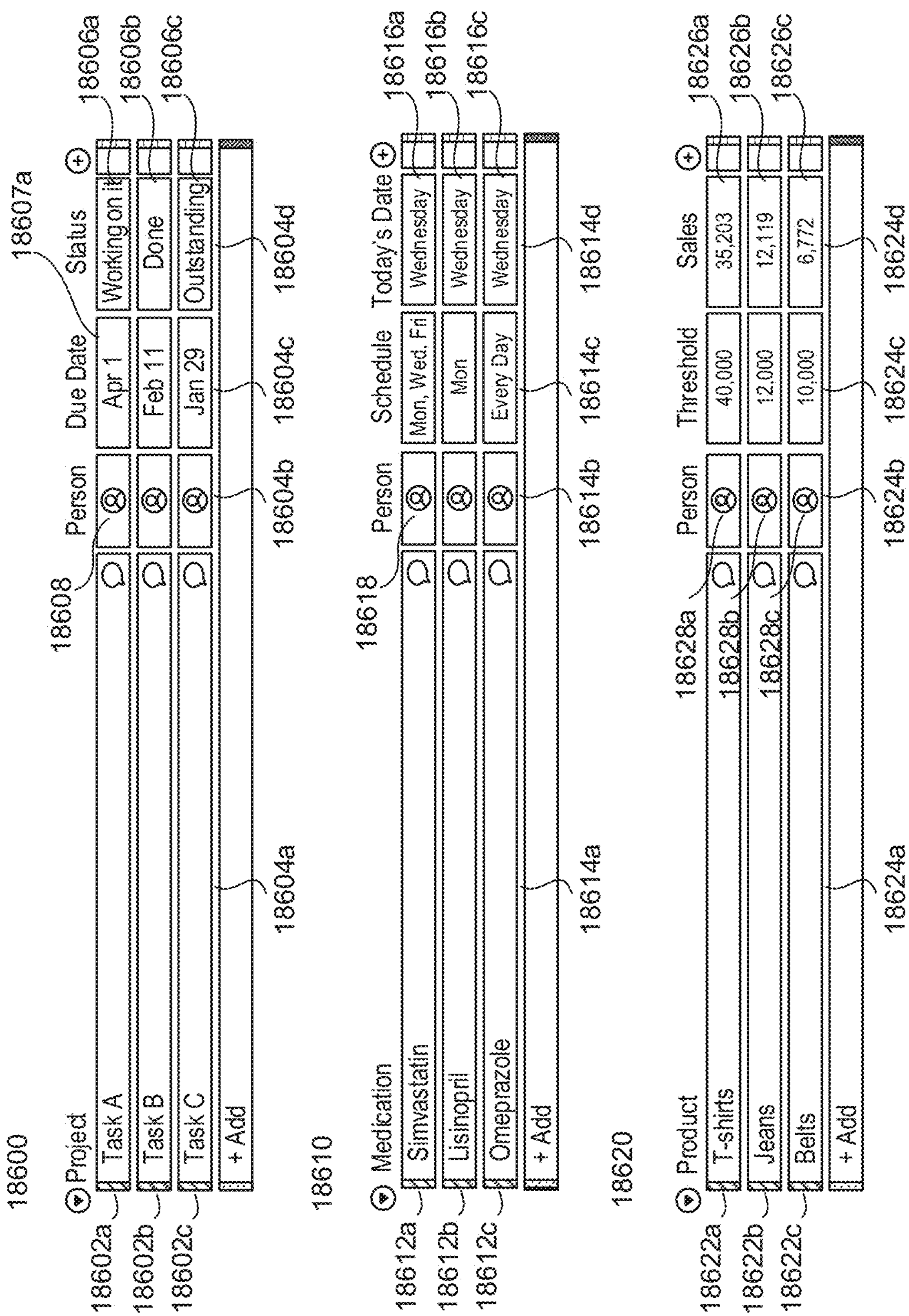

FIG. 186 illustrates multiple examples of workflow tables containing designated cells, consistent with some embodiments of the present disclosure.

Figure 187:
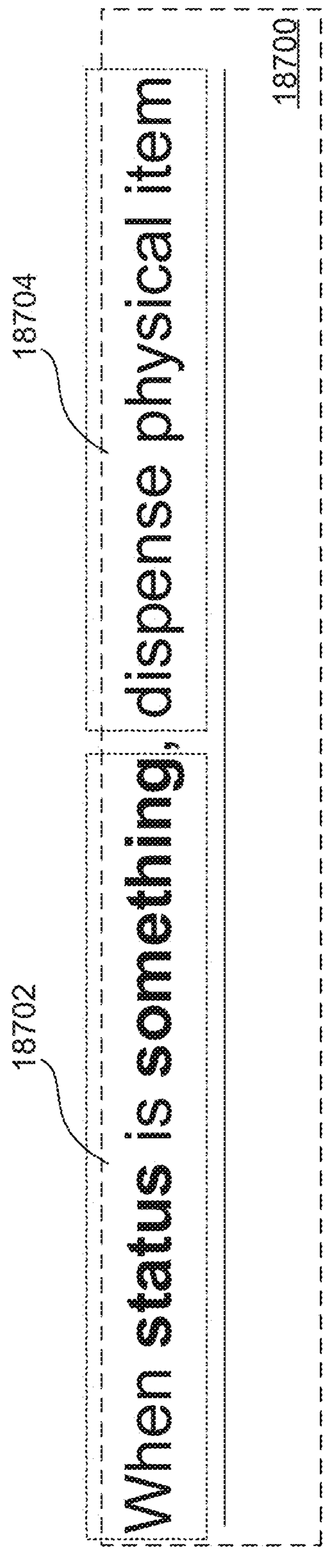

FIG. 187 illustrates an exemplary rule containing a condition and a conditional trigger, consistent with some embodiments of the present disclosure.

Figure 188:
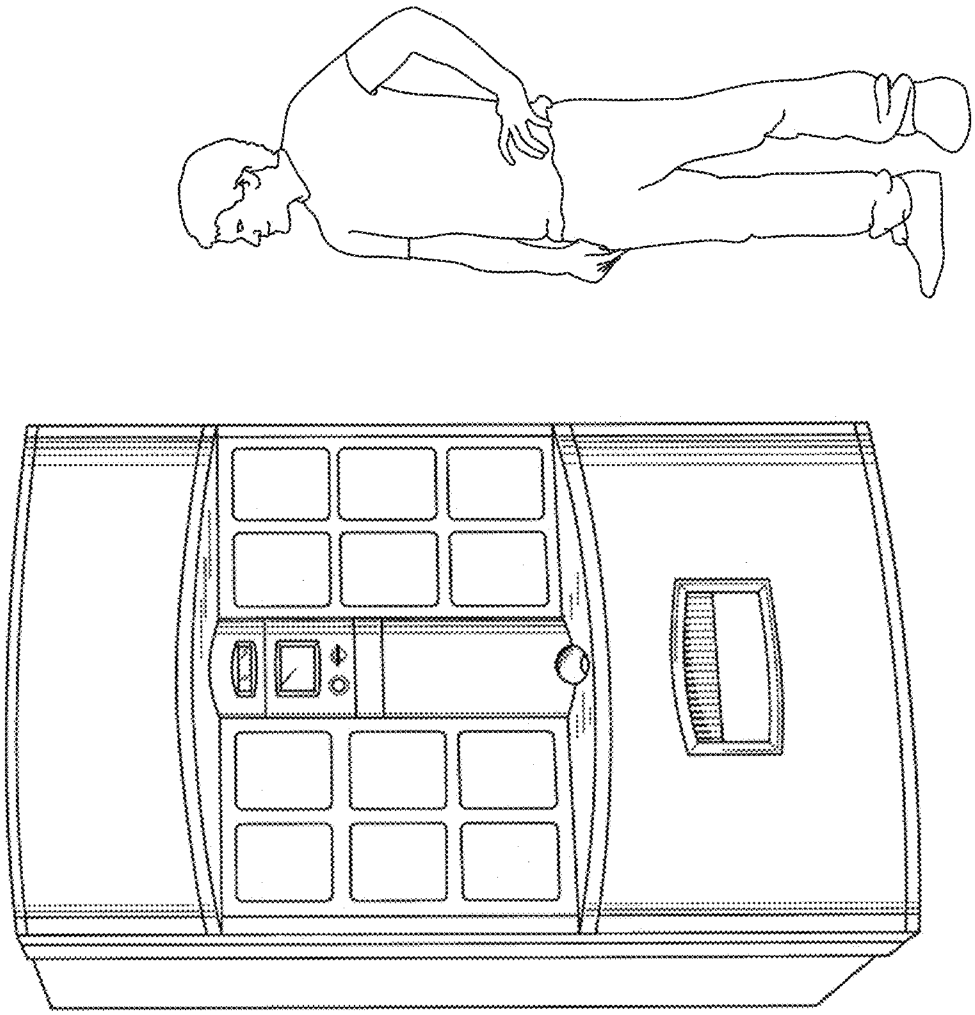

FIG. 188 illustrates an exemplary centralized dispenser for dispensing physical rewards, consistent with some embodiments of the present disclosure.

Figure 189:
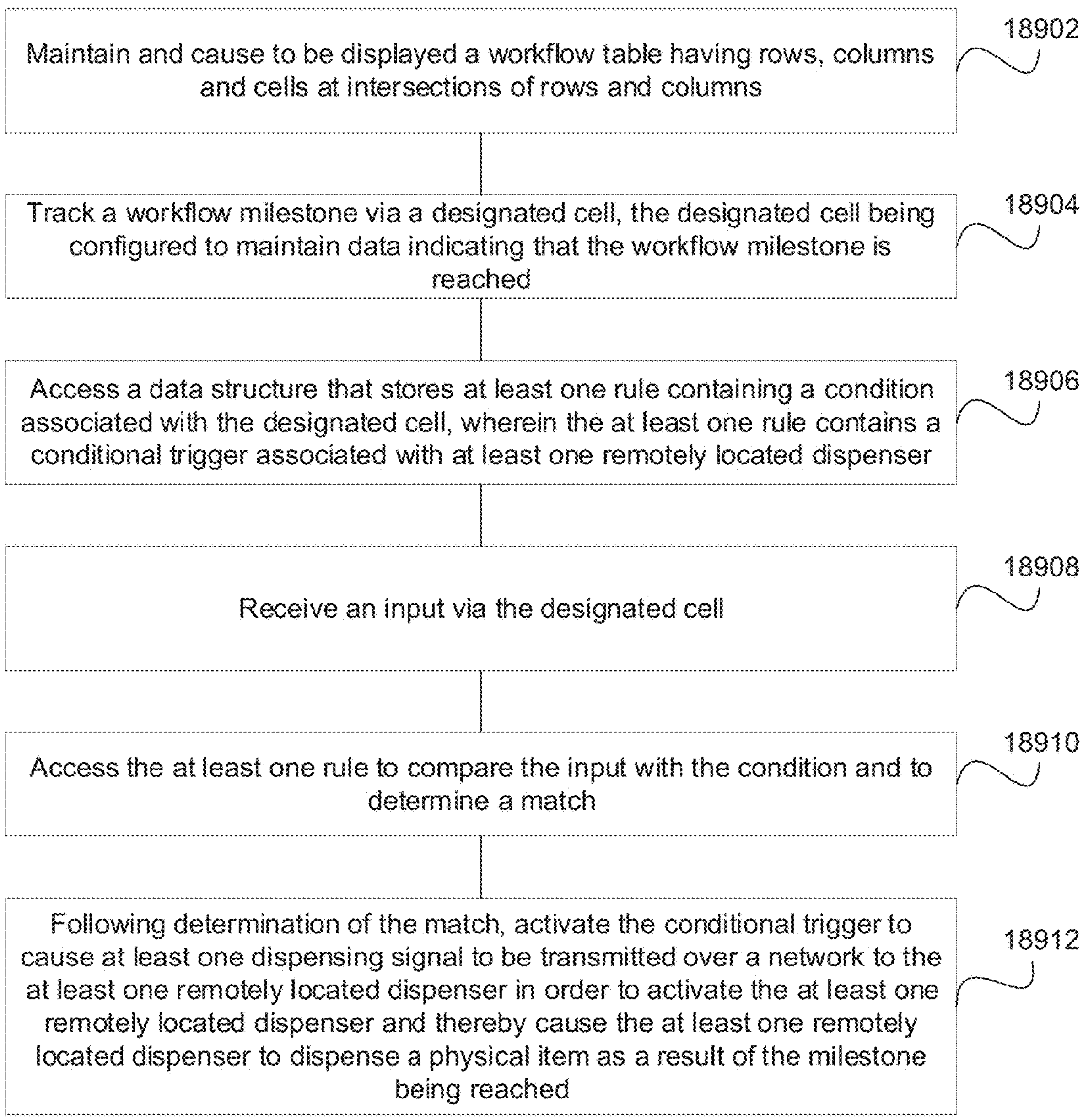

FIG. 189 is a block diagram of an exemplary digital workflow method for providing physical rewards from disbursed networked dispensers, consistent with some embodiments of the present disclosure.

Figure 190:
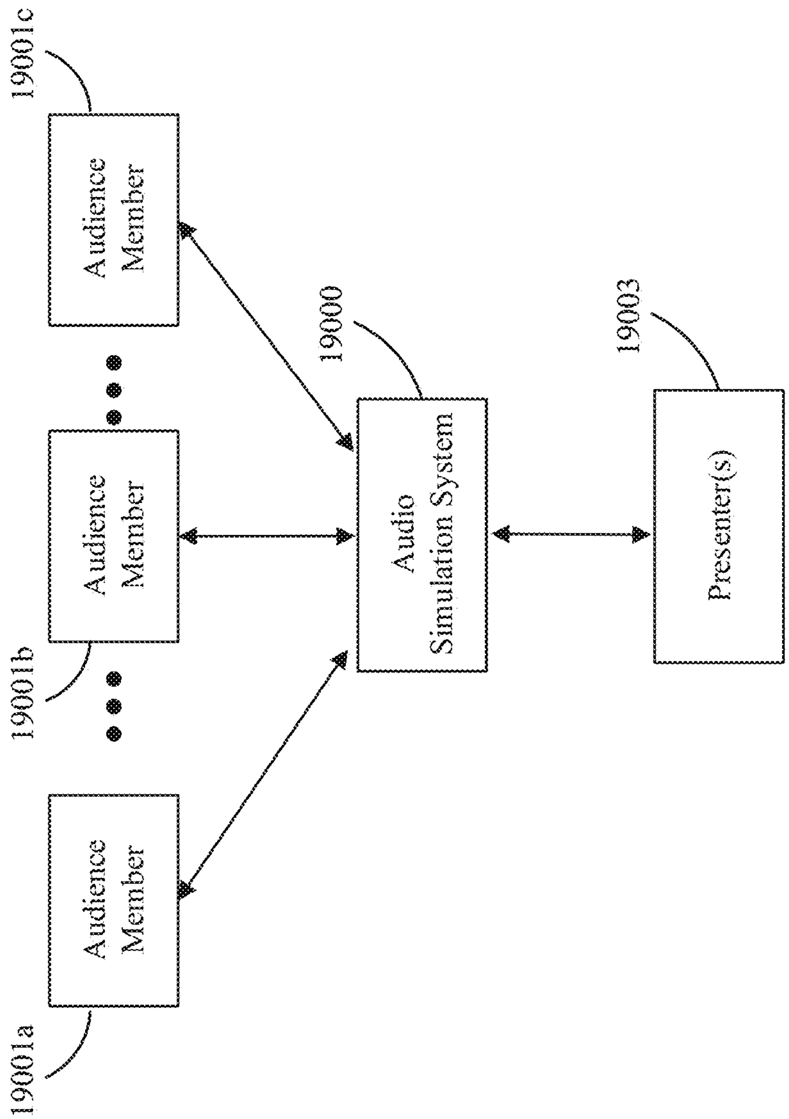

FIG. 190 is a block diagram of an exemplary audio simulation network, consistent with some embodiments of the present disclosure.

Figure 191:
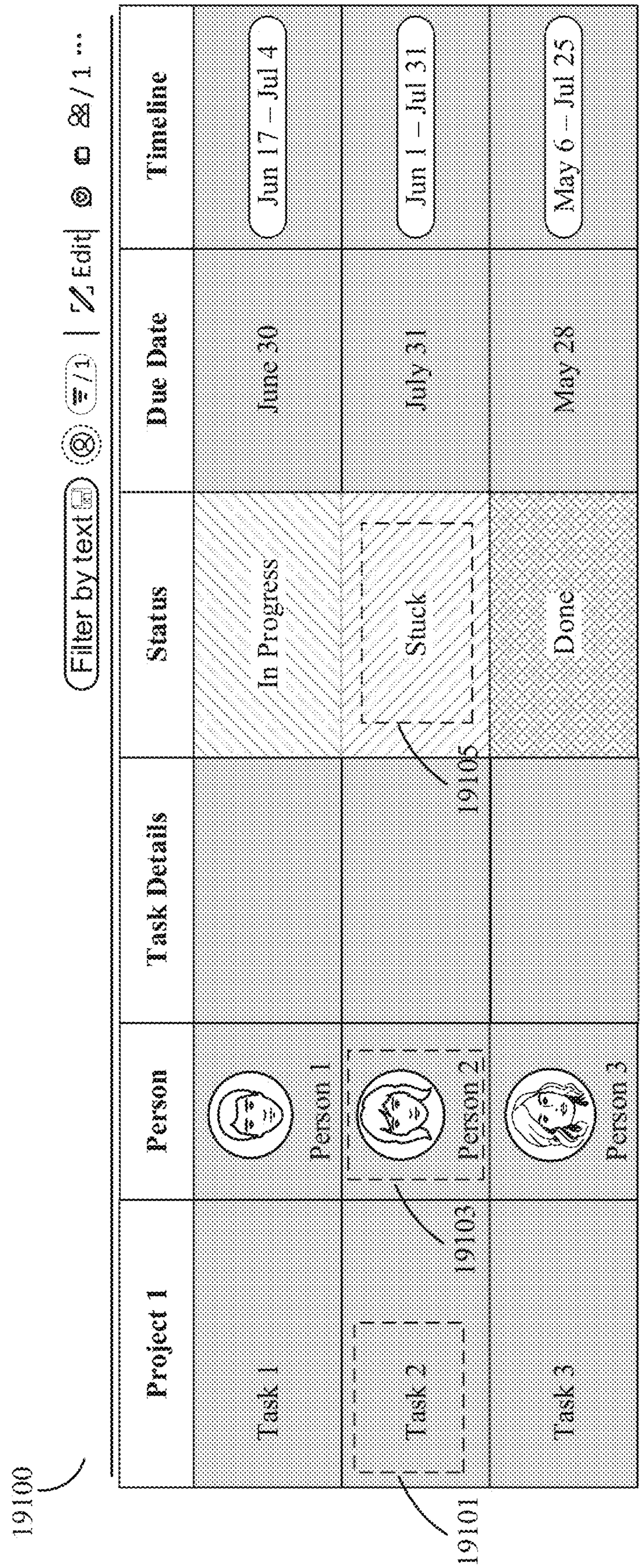
Figure 192:
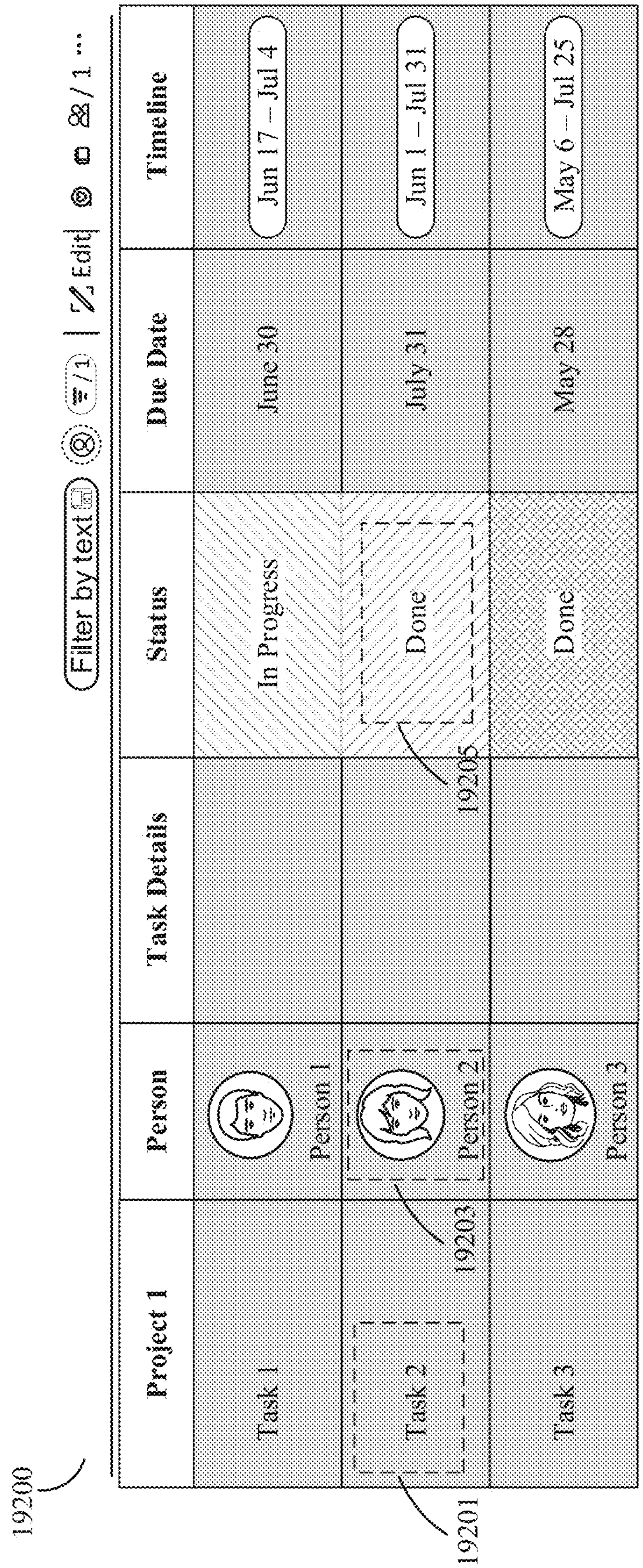

FIGS. 191 and 192 illustrate exemplary workflow boards for use with an audio simulation system, consistent with some embodiments of the present disclosure.

Figure 193:
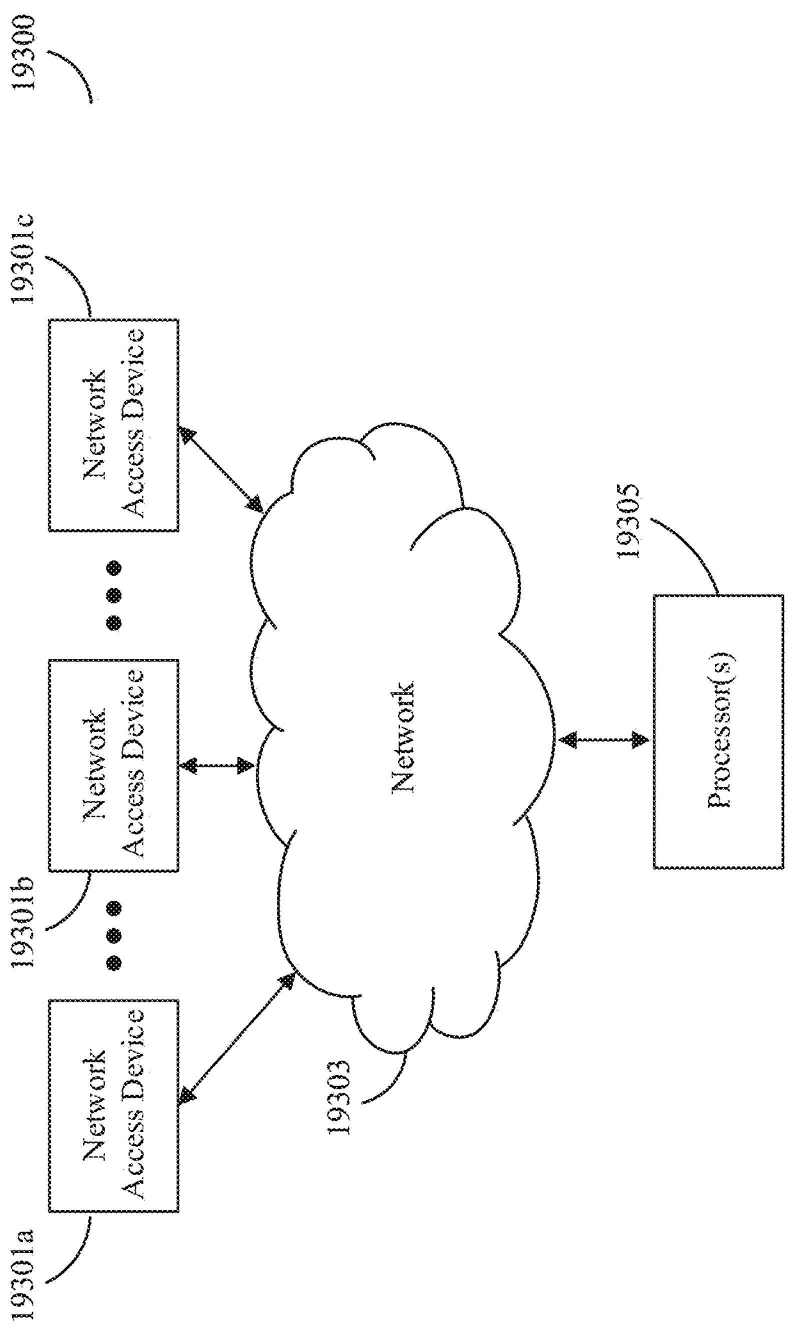

FIG. 193 is a network diagram of an exemplary audio simulation system, consistent with some embodiments of the present disclosure.

Figure 194:
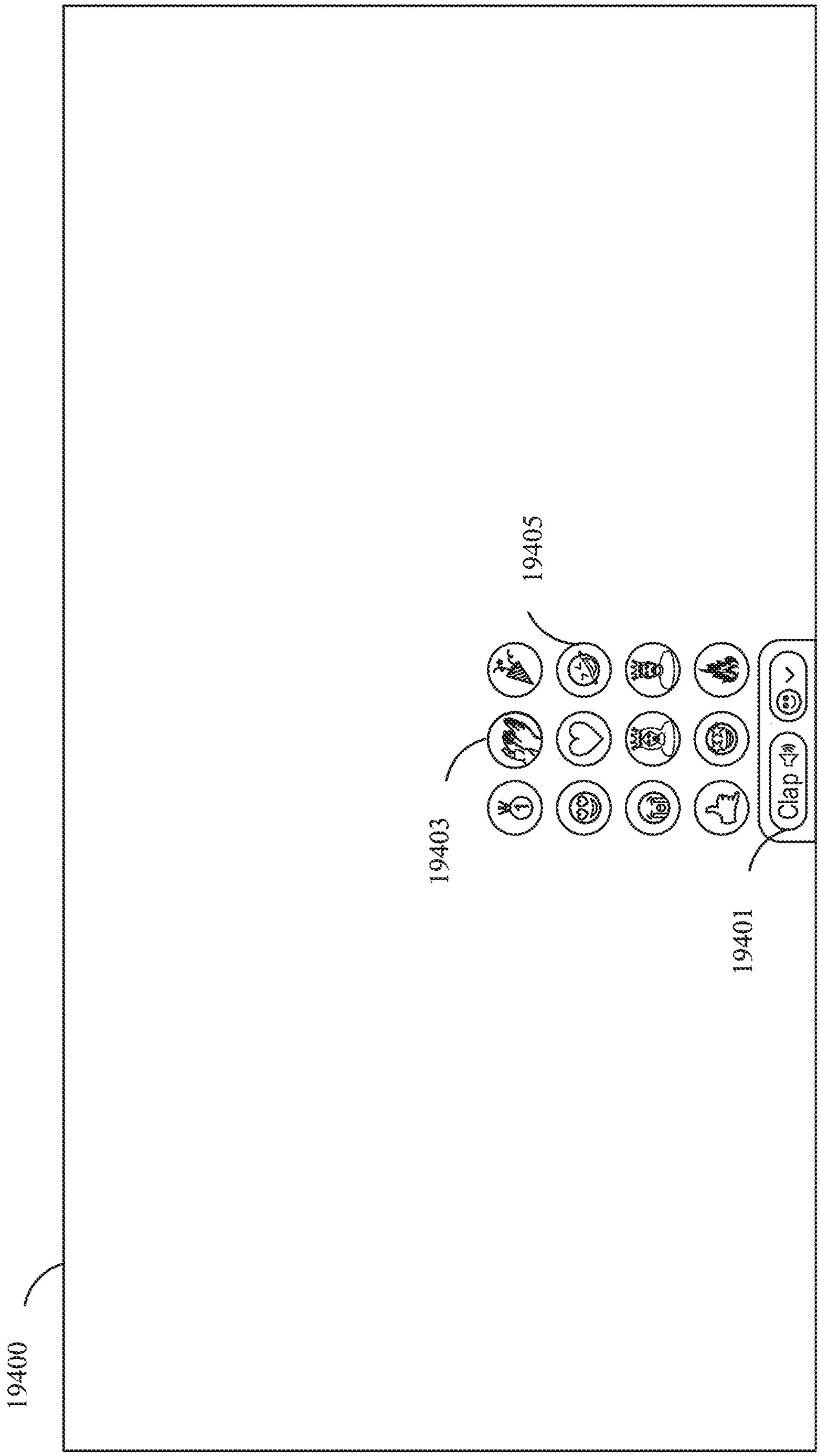

FIG. 194 illustrates an exemplary network access device containing substitute audio buttons, consistent with some embodiments of the present disclosure.

FIG. 195 illustrates an exemplary data structure, consistent with some embodiments of the present disclosure.

Figure 196:
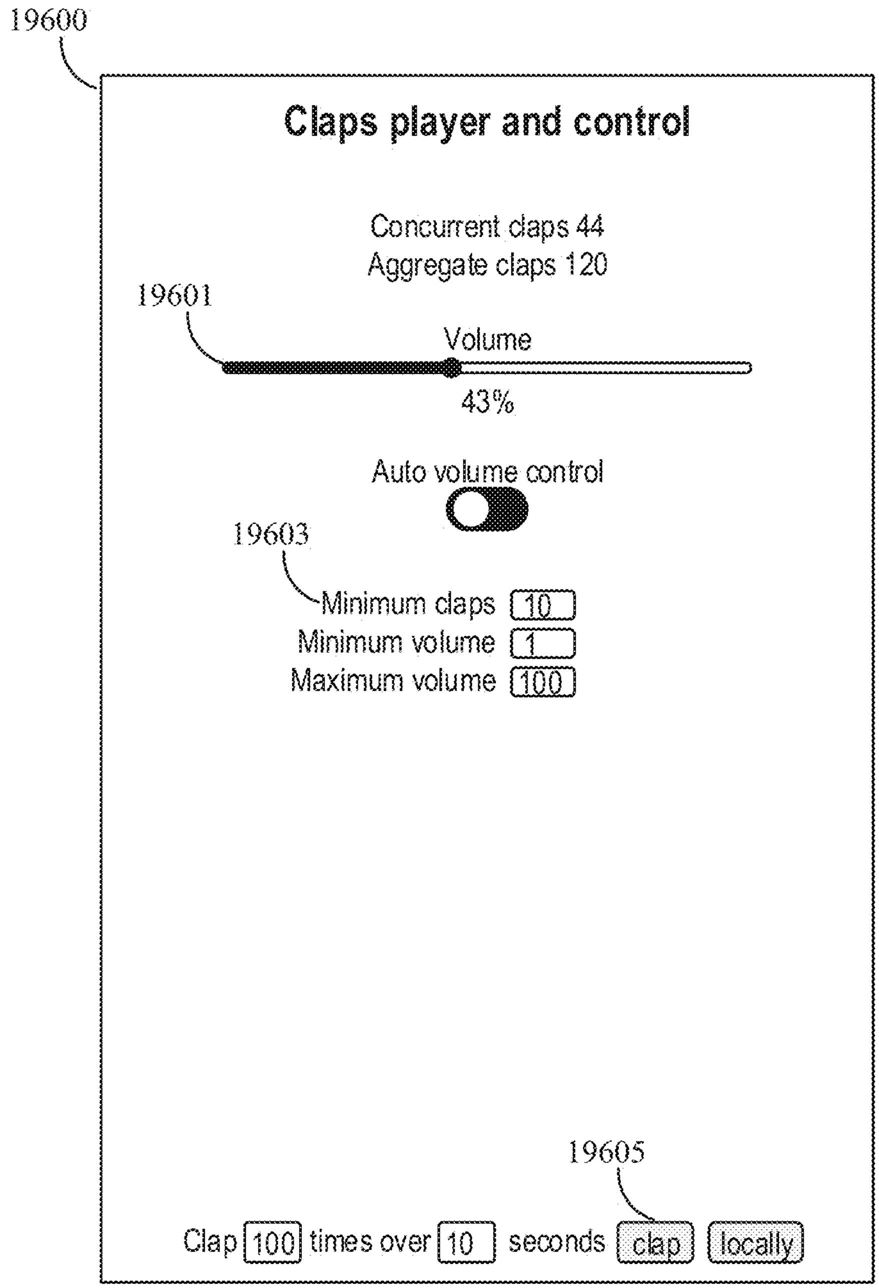

FIG. 196 illustrates an administrator control panel, consistent with some embodiments of the present disclosure.

Figure 197:
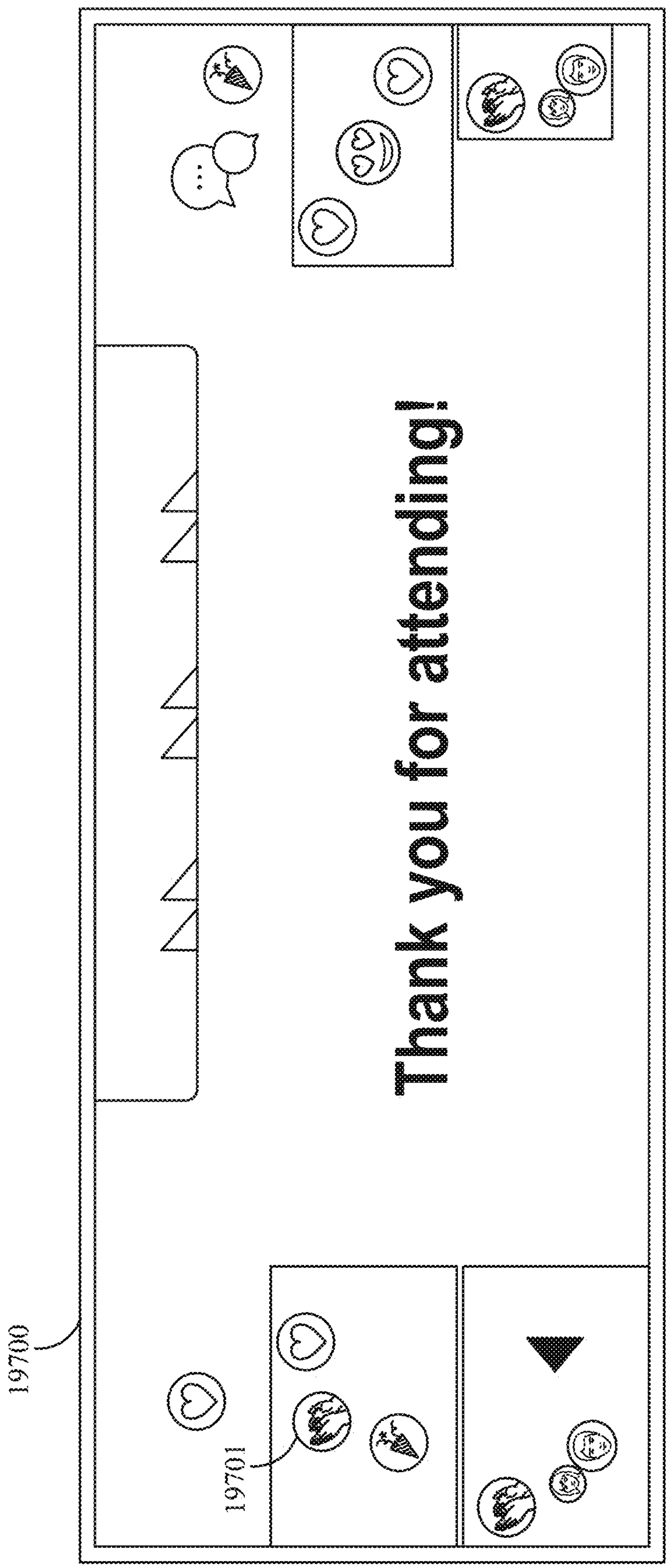

FIG. 197 illustrates an exemplary network access device display for presenting one or more graphical imageries, consistent with some embodiments of the present disclosure.

Figure 198:
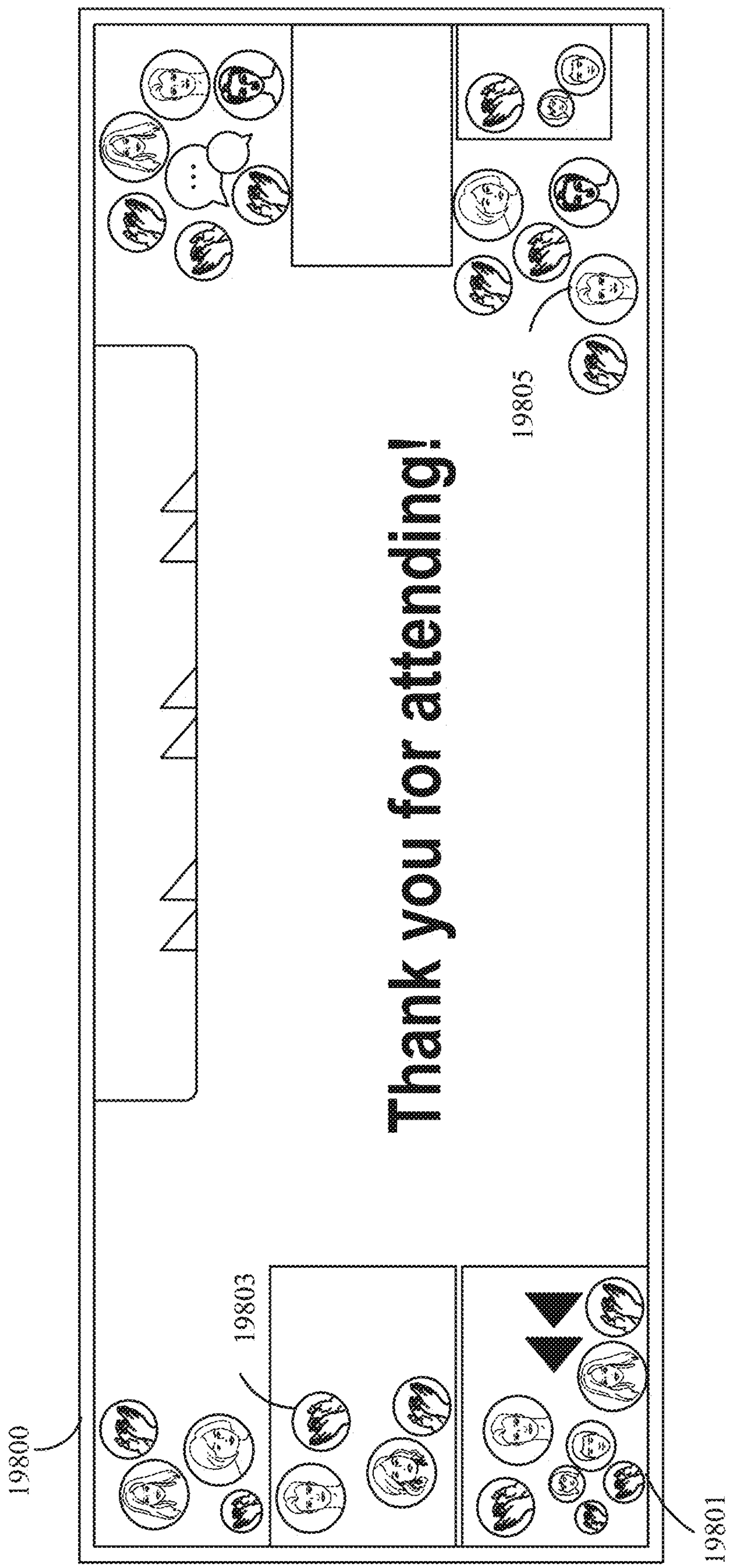

FIG. 198 illustrates another exemplary network access device display for presenting one or more graphical imageries, consistent with some embodiments of the present disclosure.

Figure 199:
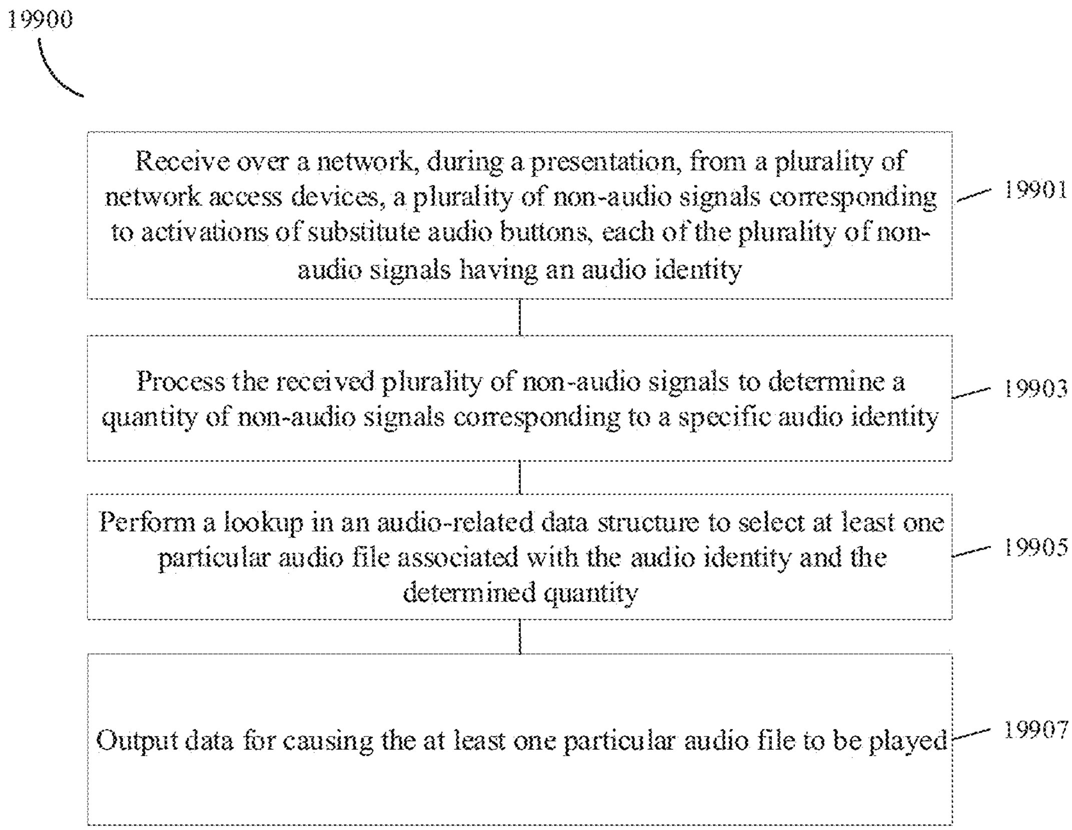

FIG. 199 illustrates a block diagram of an example process for performing operations for causing variable output audio simulation as a function of disbursed non-audio input, consistent with some embodiments of the present disclosure.

Figure 200A:
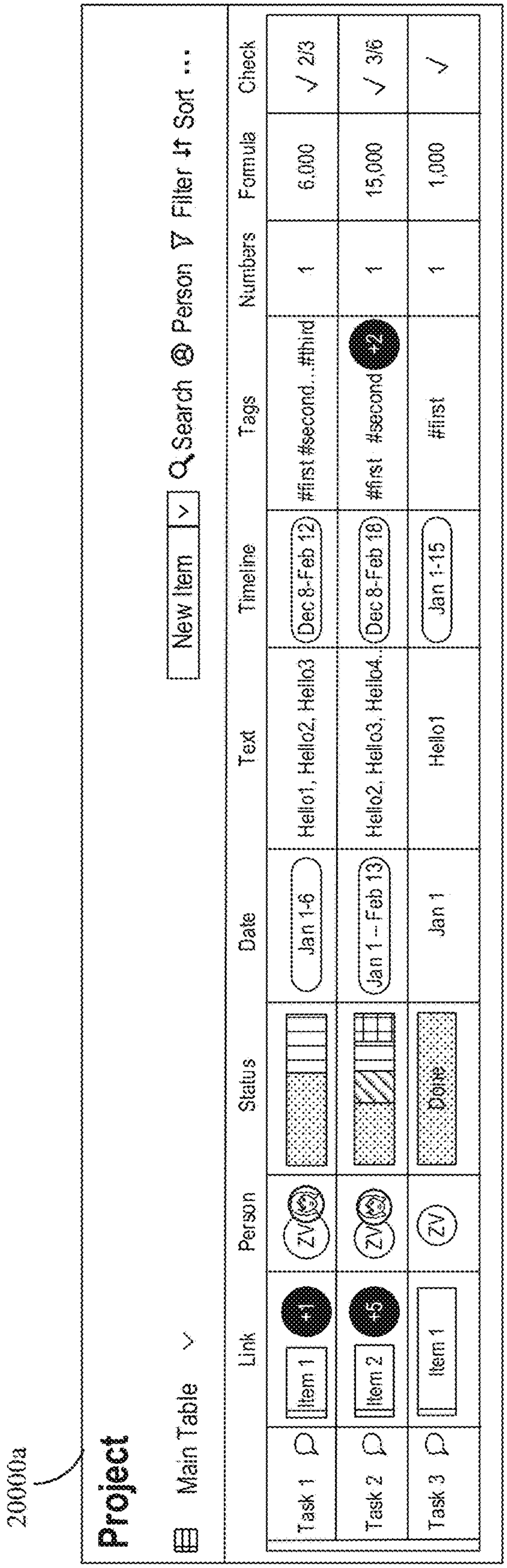
Figure 200B:
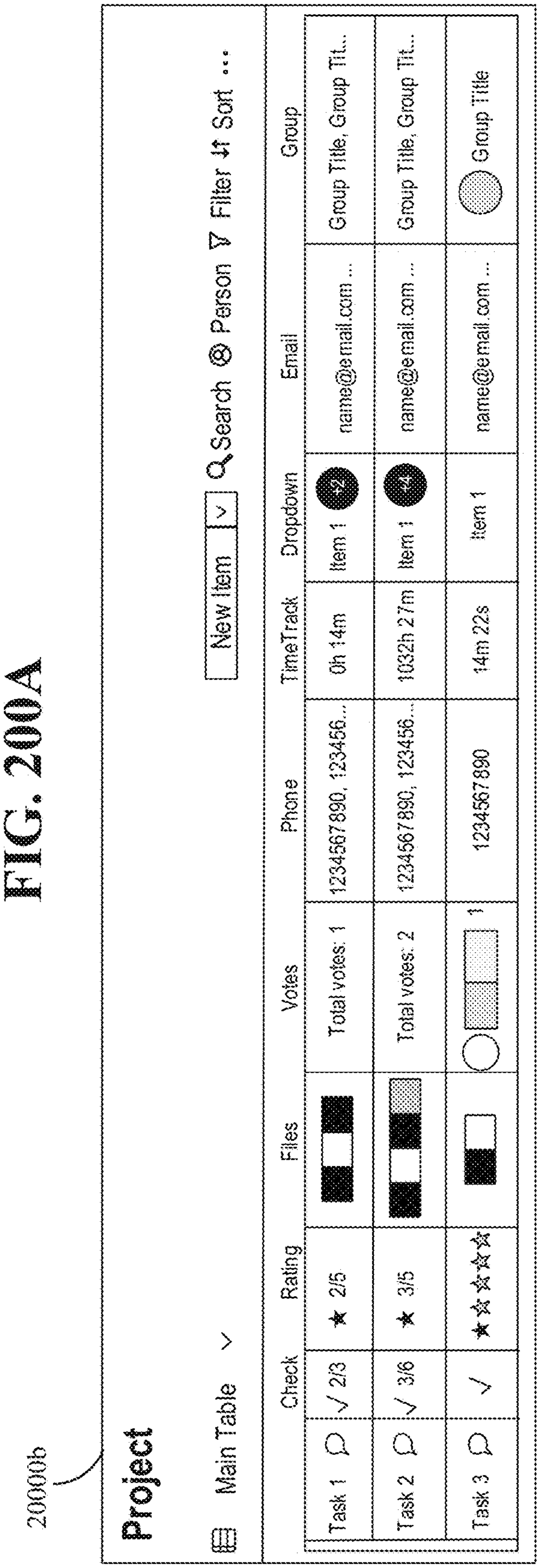

FIGS. 200A and 200B, illustrate exemplary tablature, consistent with some embodiments of the present disclosure.

Figure 201:
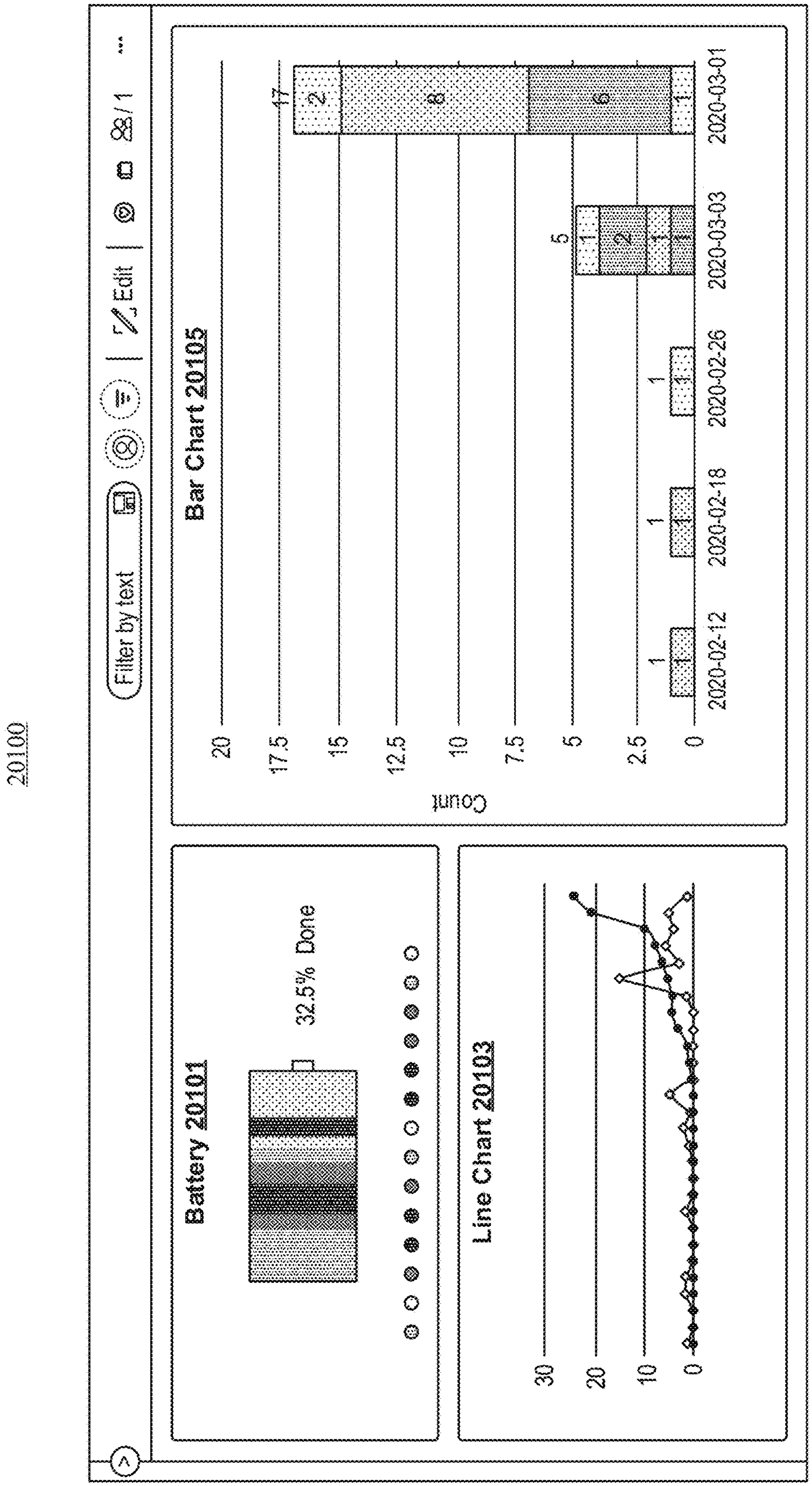

FIG. 201 illustrates exemplary summary tablature, consistent with some embodiments of the present disclosure.

Figure 202:
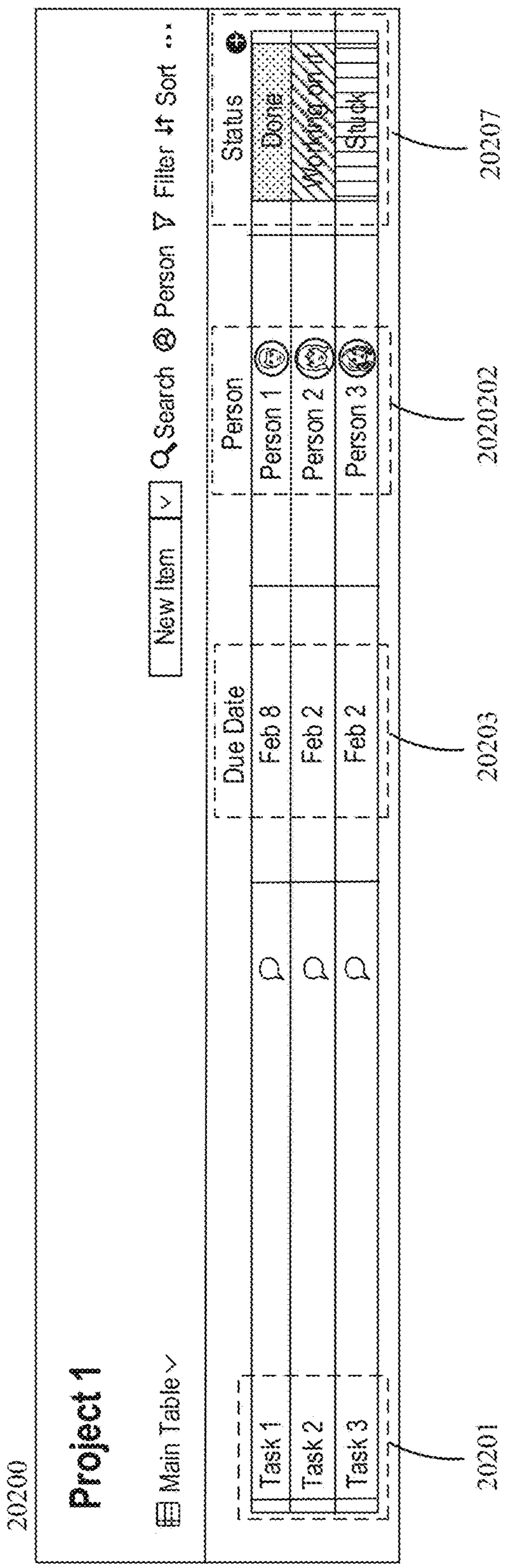

FIG. 202 illustrates an exemplary first board, consistent with some embodiments of the present disclosure.

Figure 203:
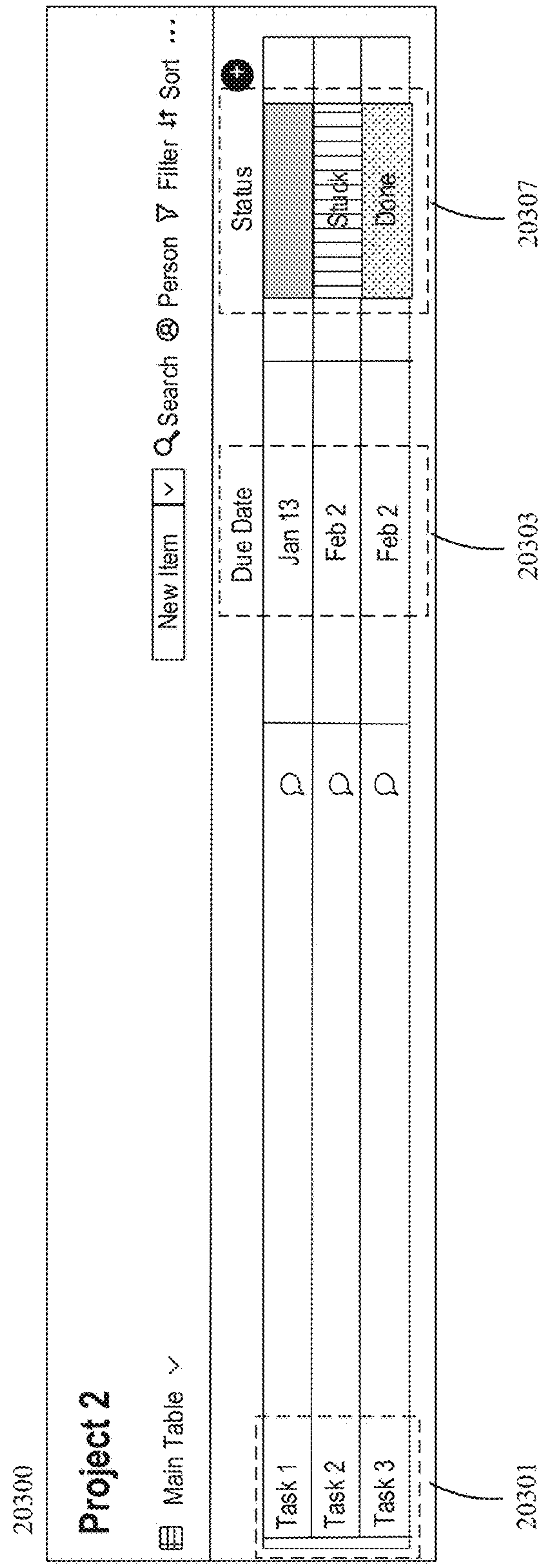

FIG. 203 illustrates an exemplary second board, consistent with some embodiments of the present disclosure.

Figure 204:
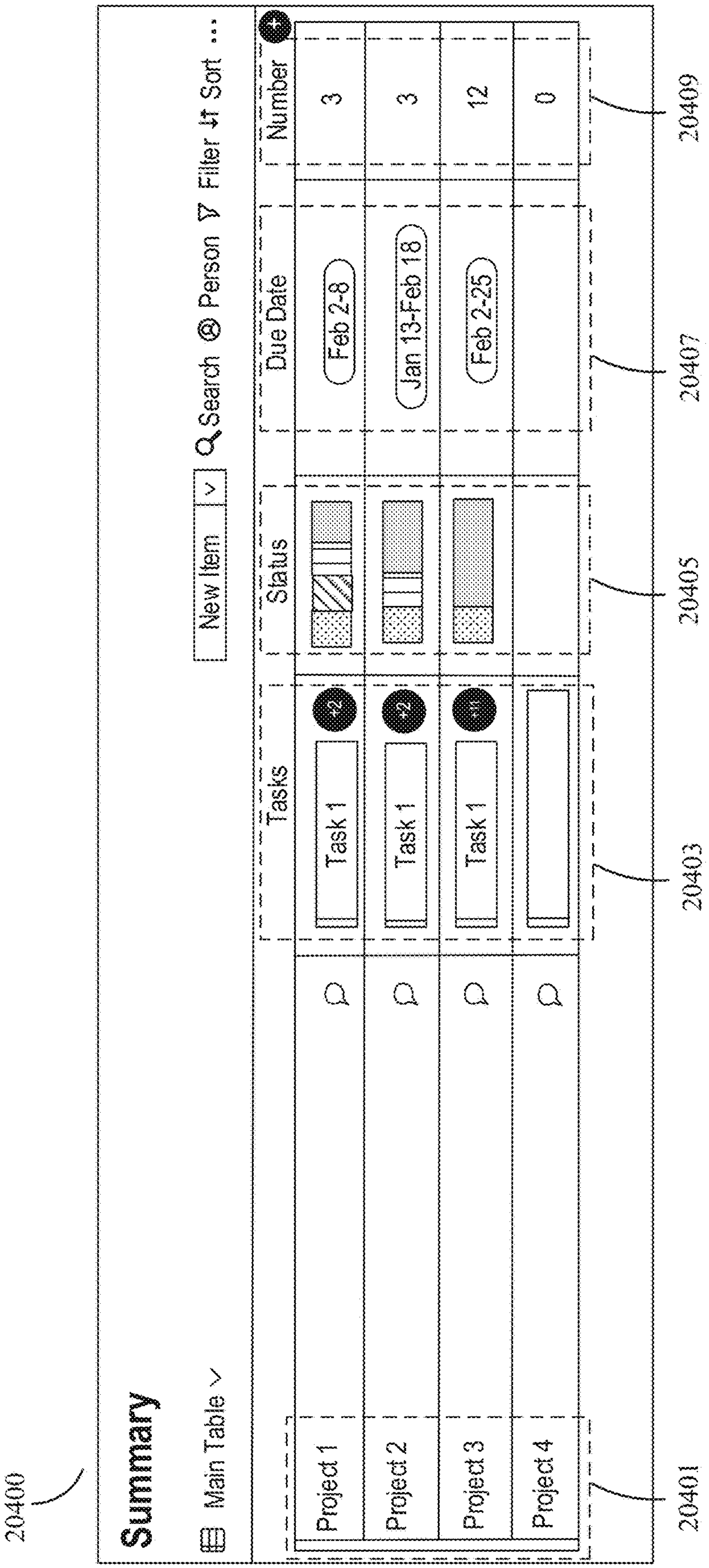

FIG. 204 illustrates an exemplary third board, consistent with some embodiments of the present disclosure.

Figure 205A:
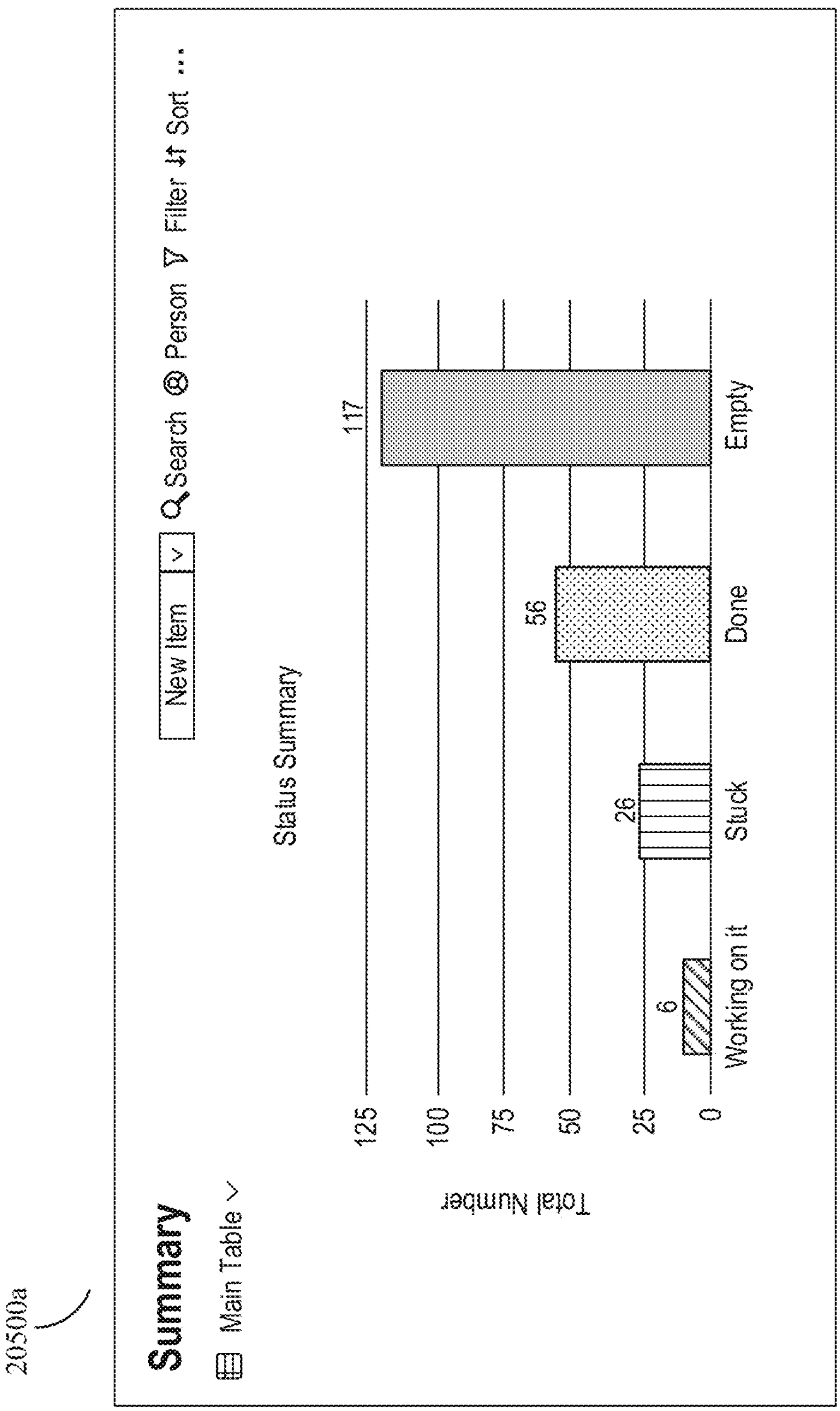
Figure 205B:
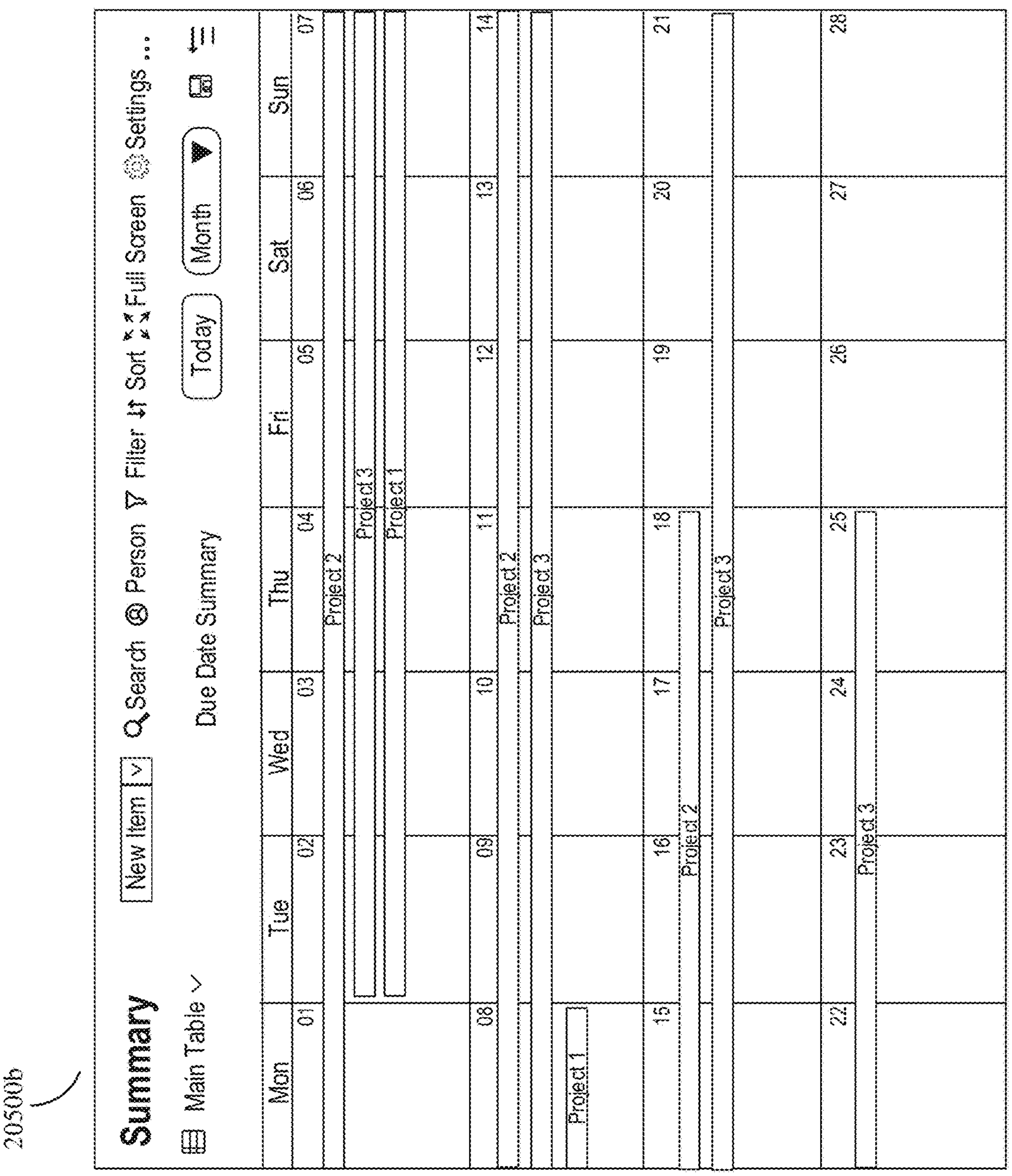

FIGS. 205A and 205B illustrate exemplary aggregated summaries, consistent with some embodiments of the present disclosure.

Figure 206:
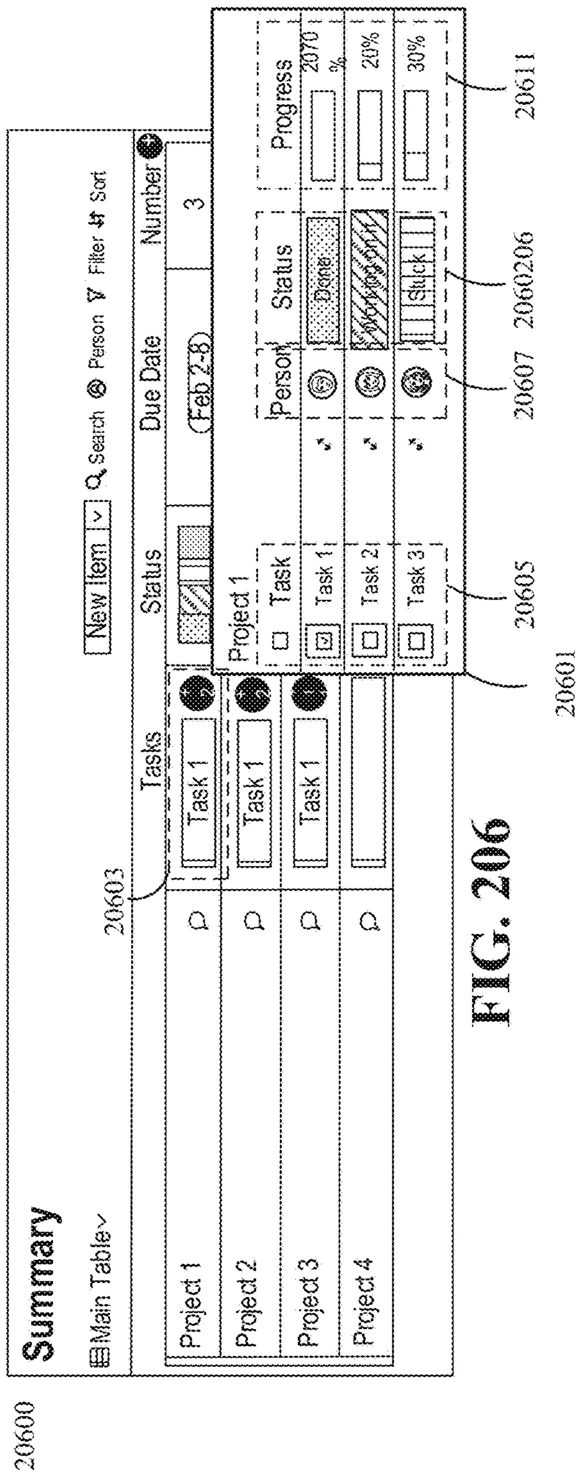

FIG. 206 illustrates an exemplary display generated as a result of an activation of a link in a cell, consistent with some embodiments of the present disclosure.

Figure 207:
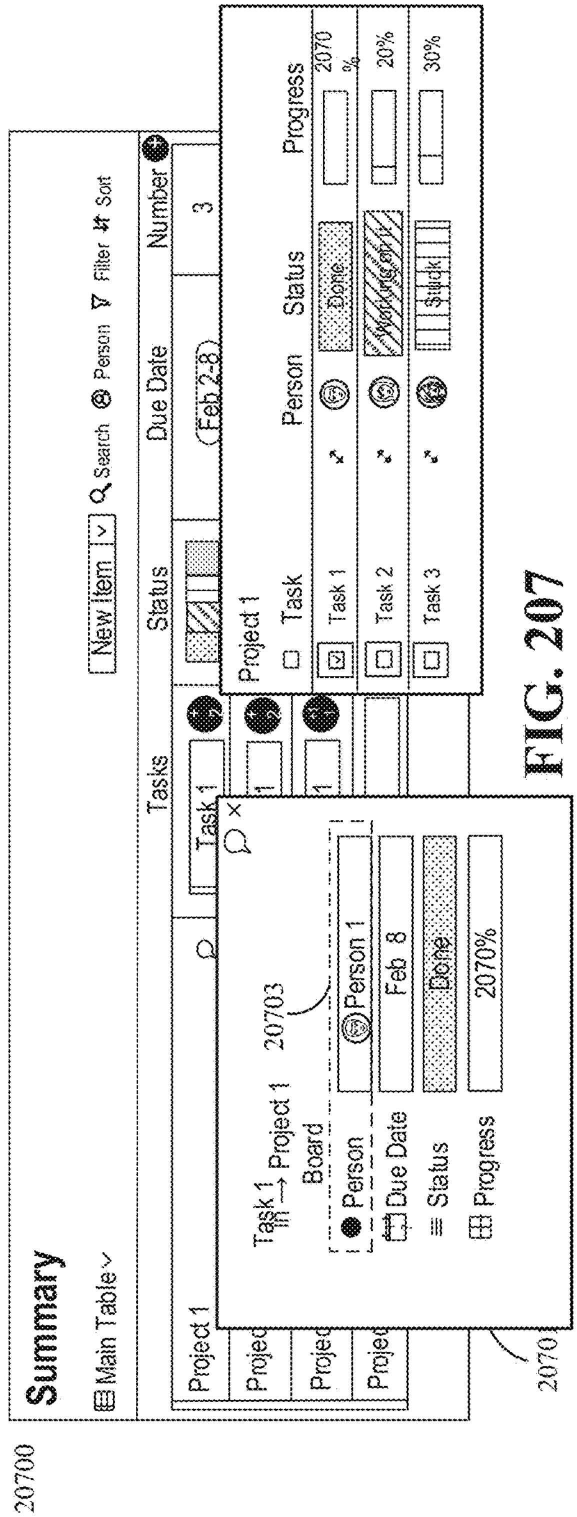

FIG. 207 illustrates another exemplary display generated as a result of an activation of a link in a cell, consistent with some embodiments of the present disclosure.

Figure 208:
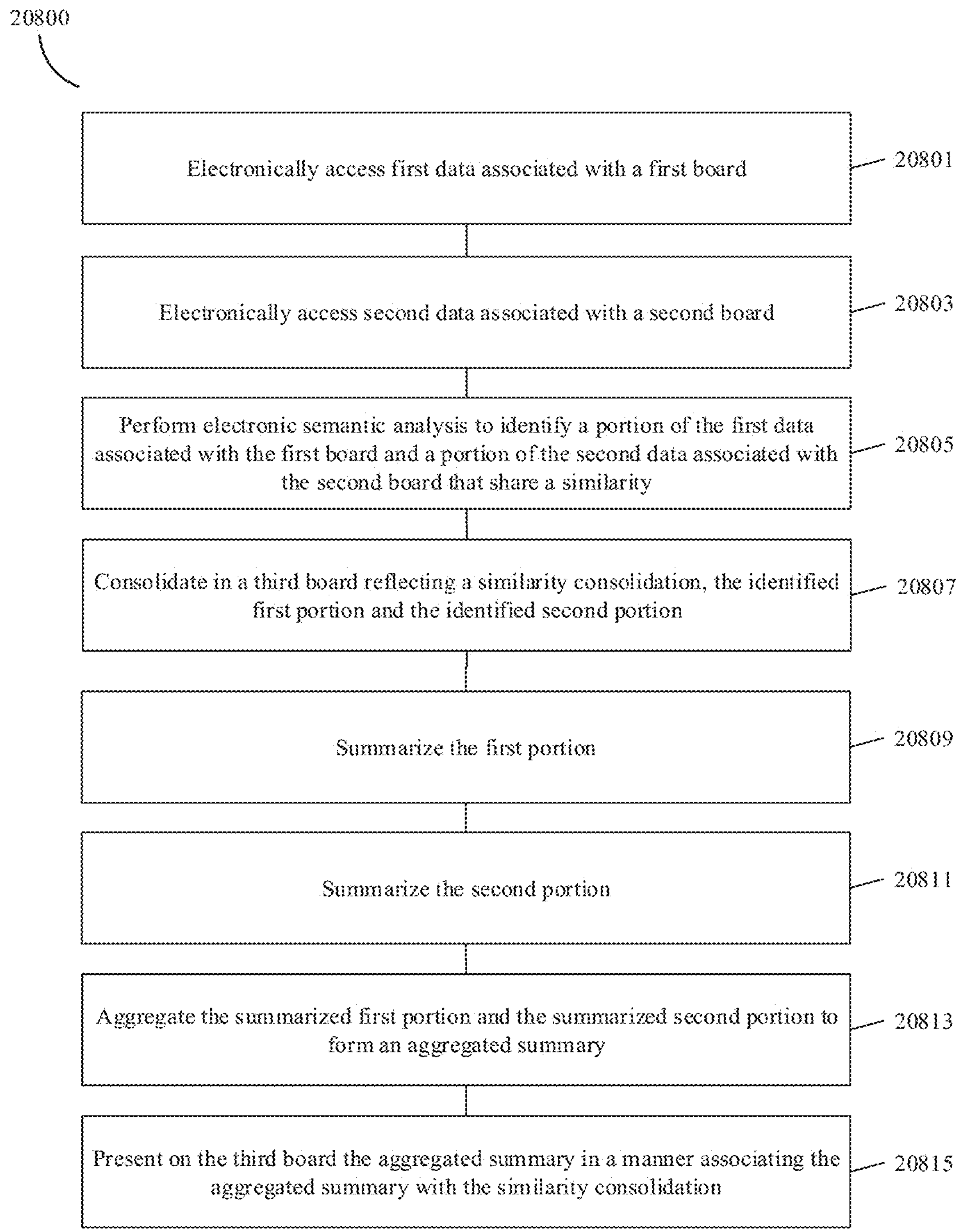

FIG. 208 is a block diagram of an example process for generating high level summary tablature based on lower level tablature, consistent with some embodiments of the present disclosure.

Figure 209:
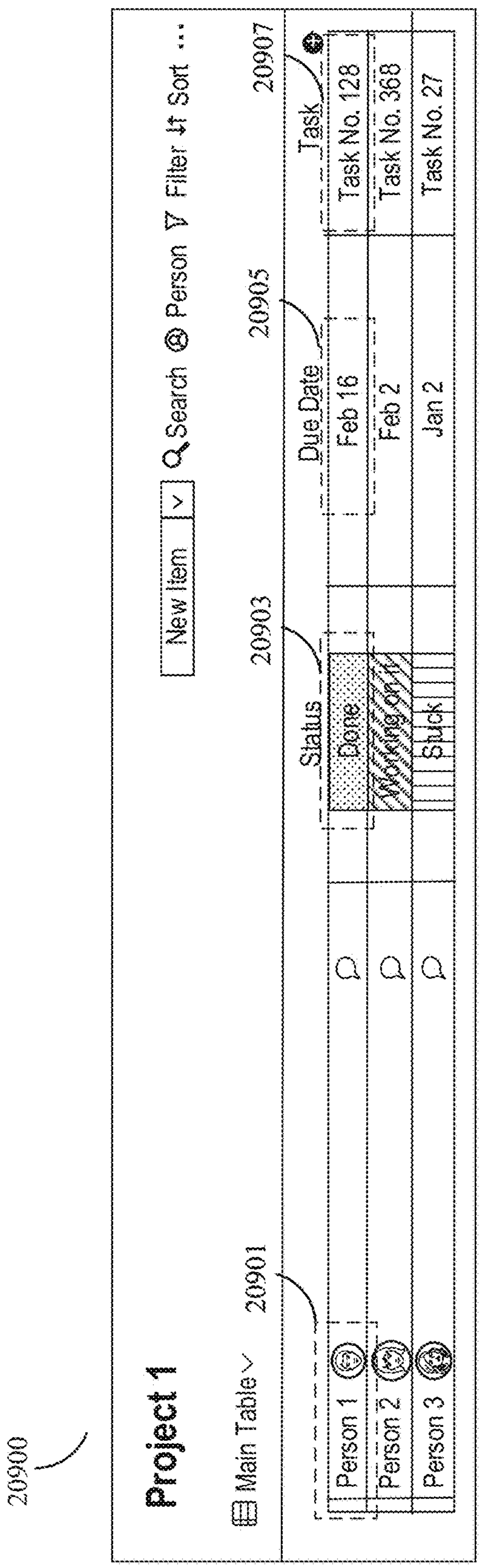

FIG. 209 illustrates an exemplary first board, consistent with some embodiments of the present disclosure.

Figure 210:
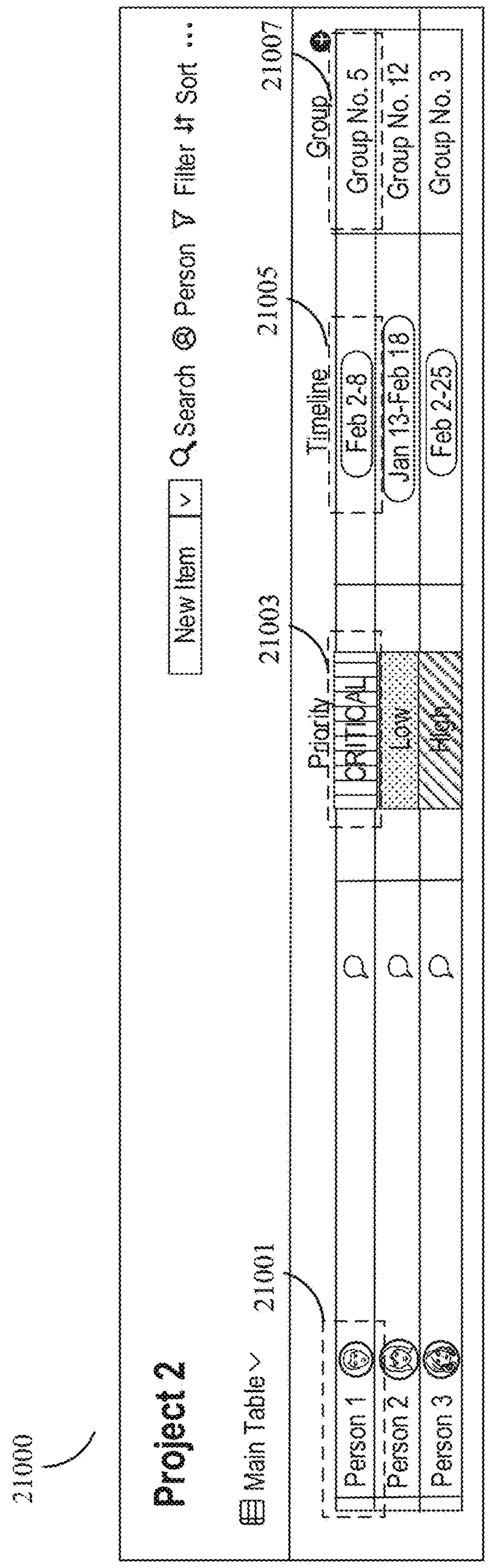

FIG. 210 illustrates an exemplary second board, consistent with some embodiments of the present disclosure.

Figure 211:
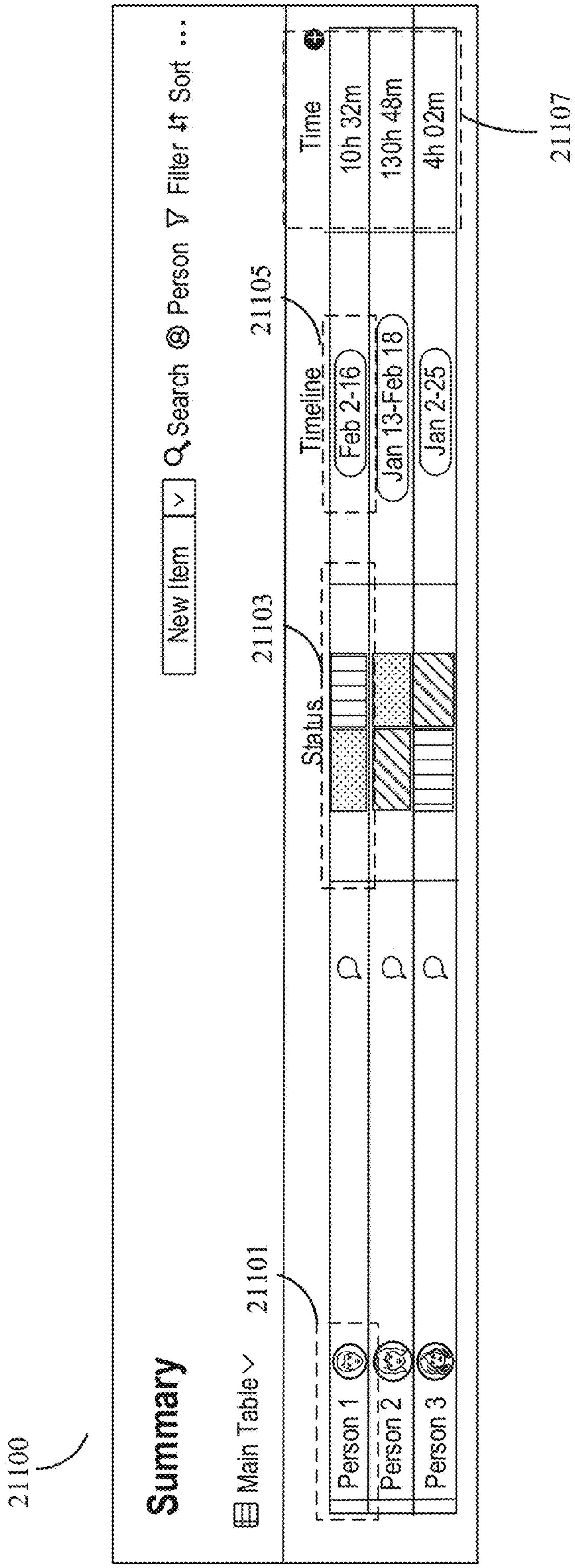

FIG. 211 illustrates an exemplary summary board, consistent with some embodiments of the present disclosure.

Figure 212:
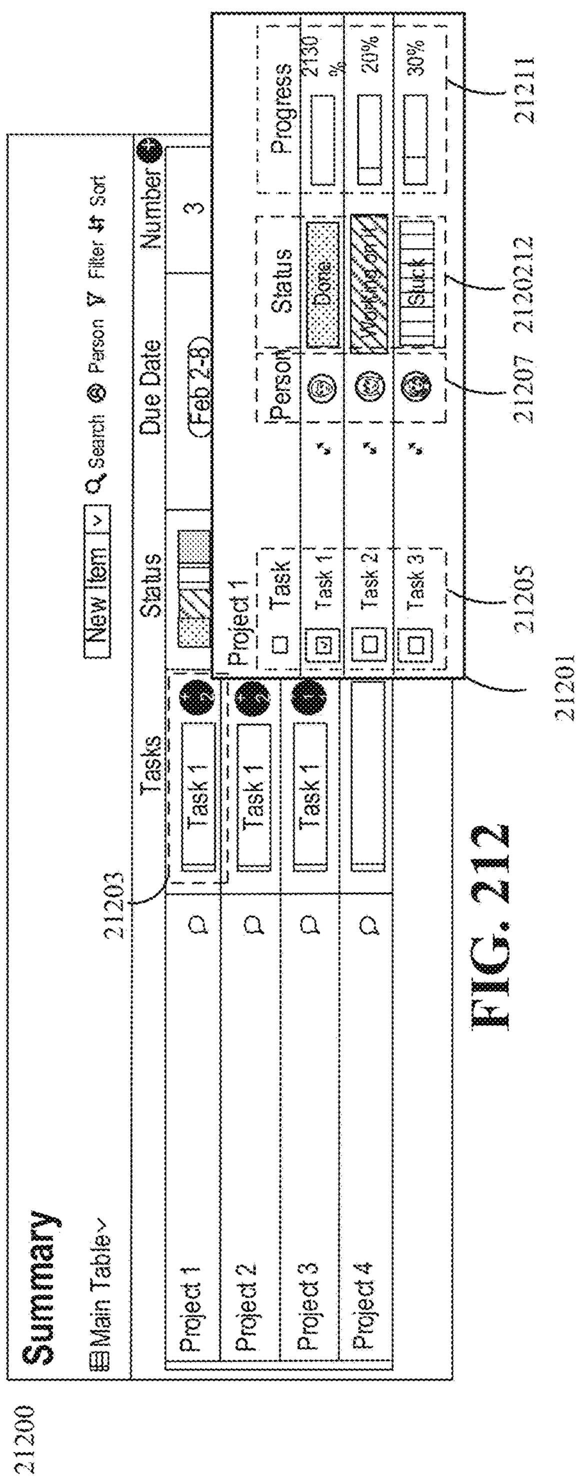

FIG. 212 illustrates an exemplary display generated as a result of an interaction with an indicator, consistent with some embodiments of the present disclosure.

Figure 213:
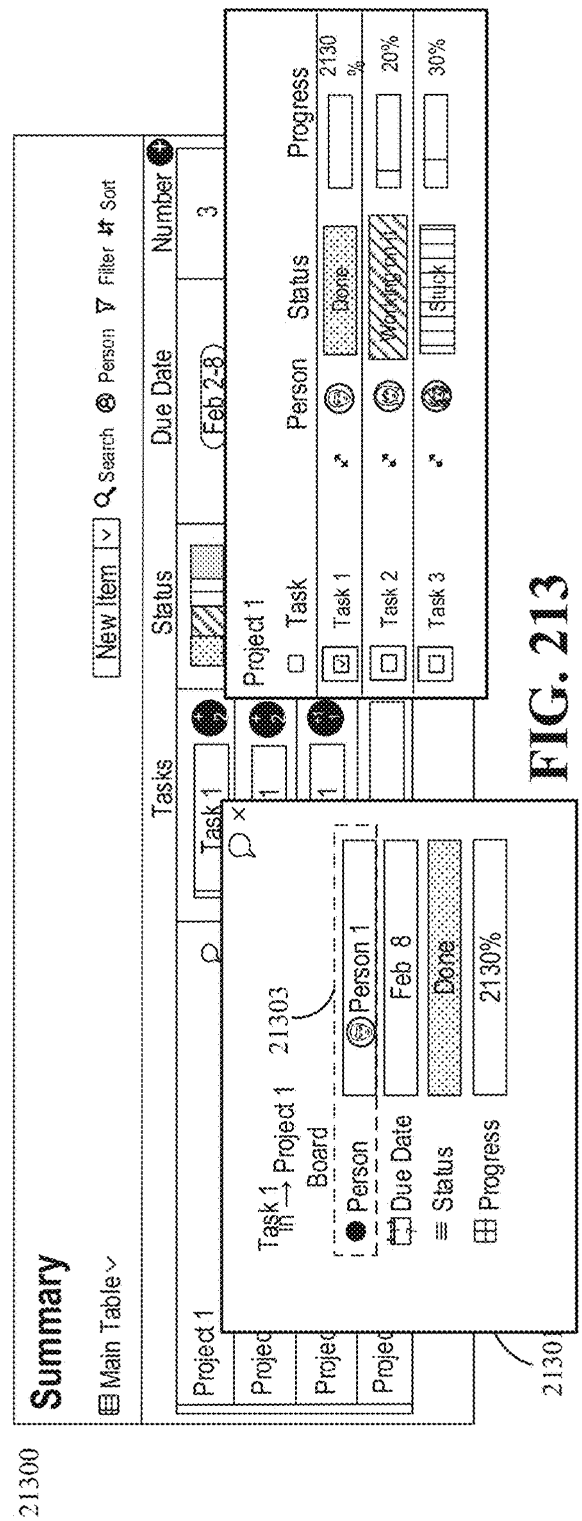

FIG. 213 illustrates another exemplary display generated as a result of an interaction with an indicator, consistent with some embodiments of the present disclosure.

Figure 214:
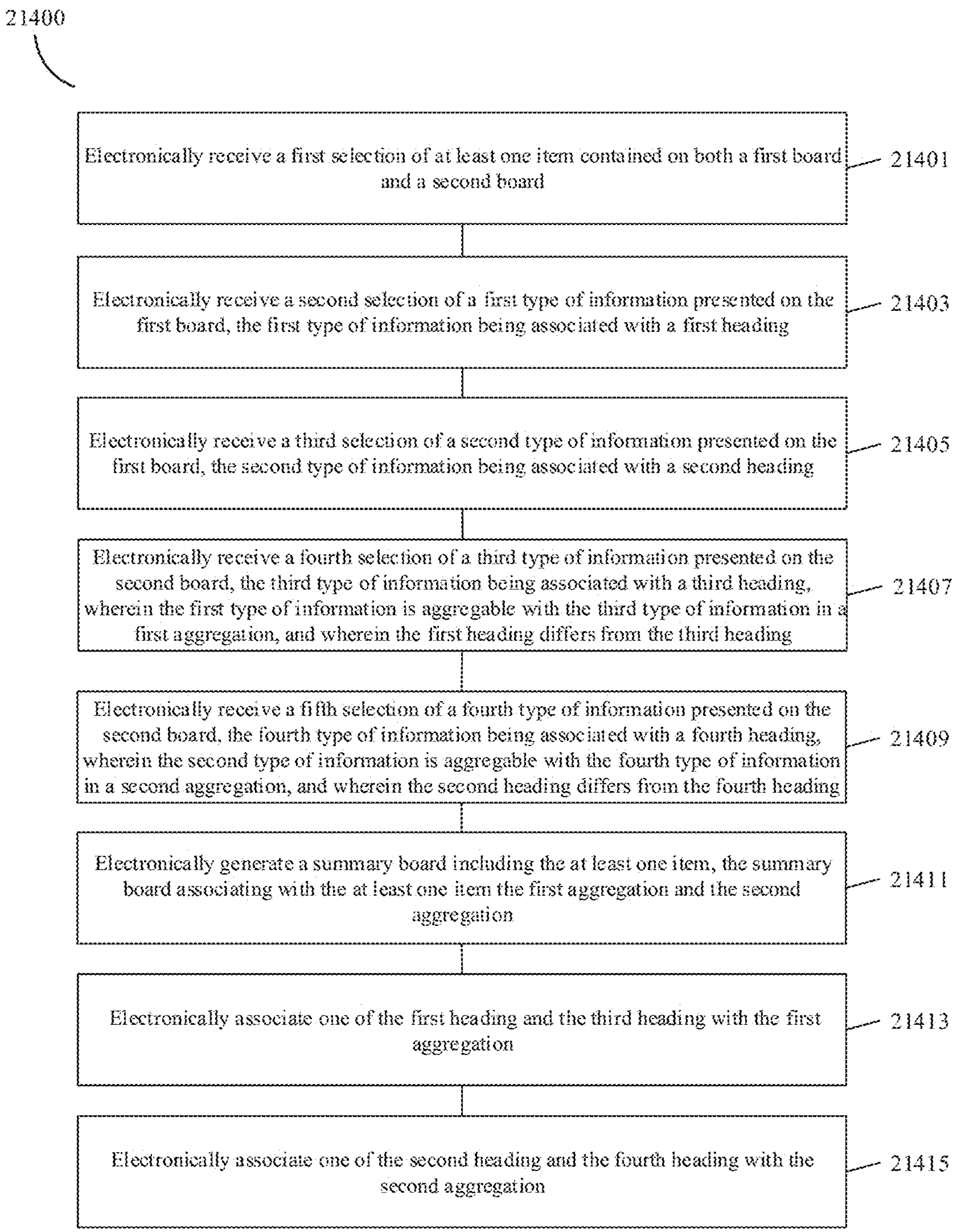

FIG. 214 is a block diagram of an example process for generating high level summary tablature based on lower level tablature, consistent with some embodiments of the present disclosure.

Figure 215:
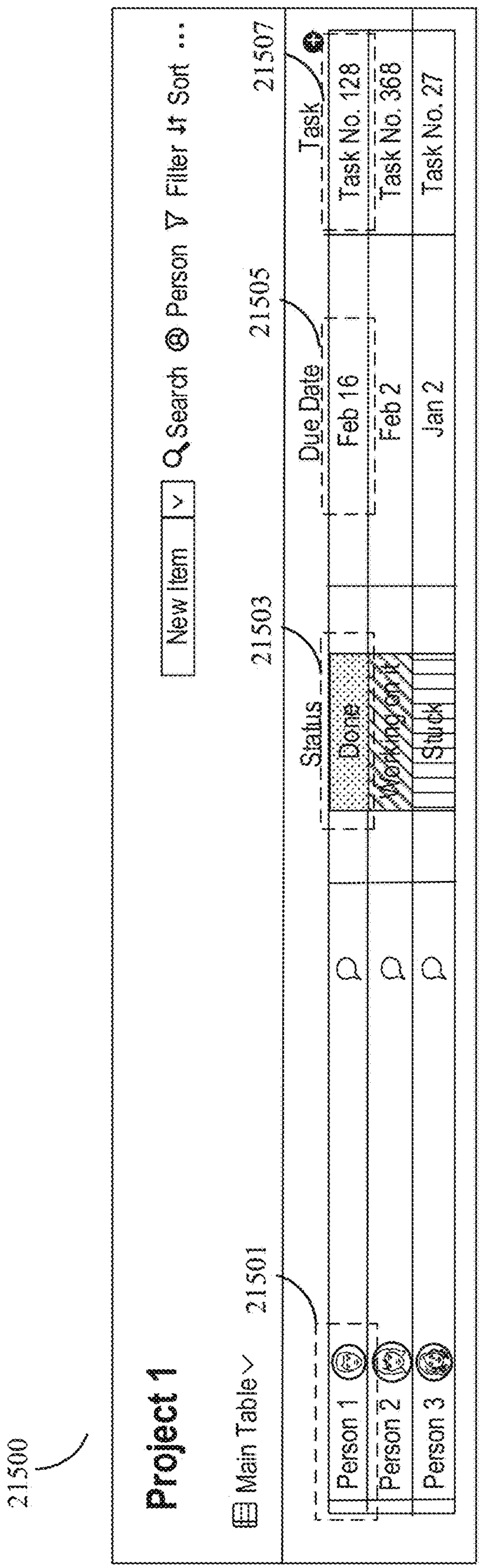

FIG. 215 illustrates an exemplary first board, consistent with some embodiments of the present disclosure.

Figure 216:
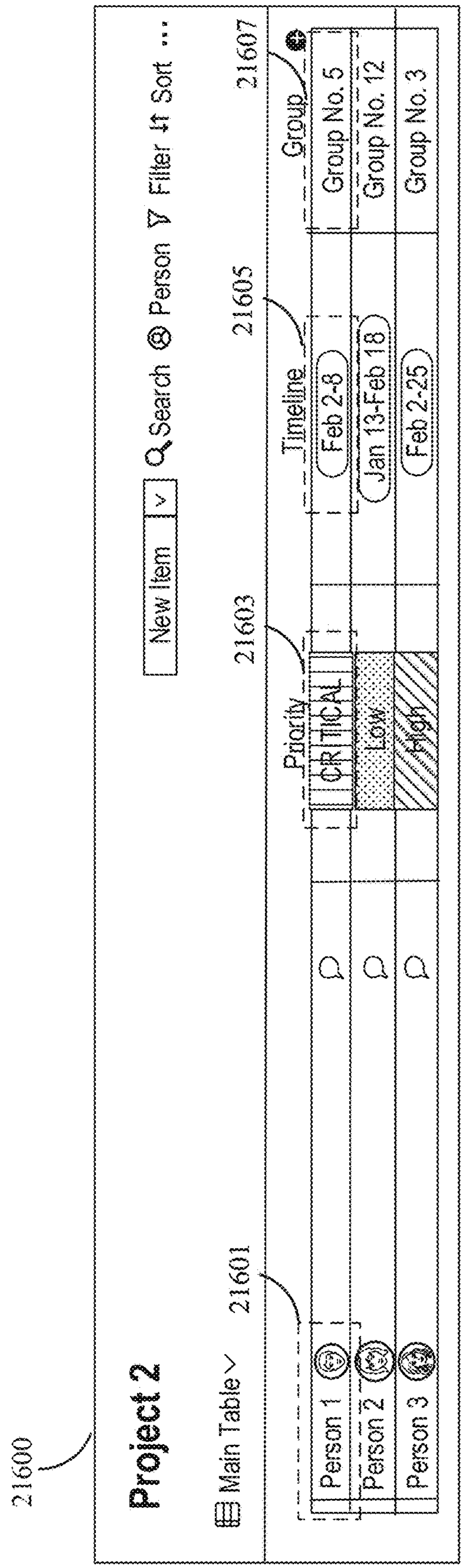

FIG. 216 illustrates an exemplary second board, consistent with some embodiments of the present disclosure.

Figure 217:
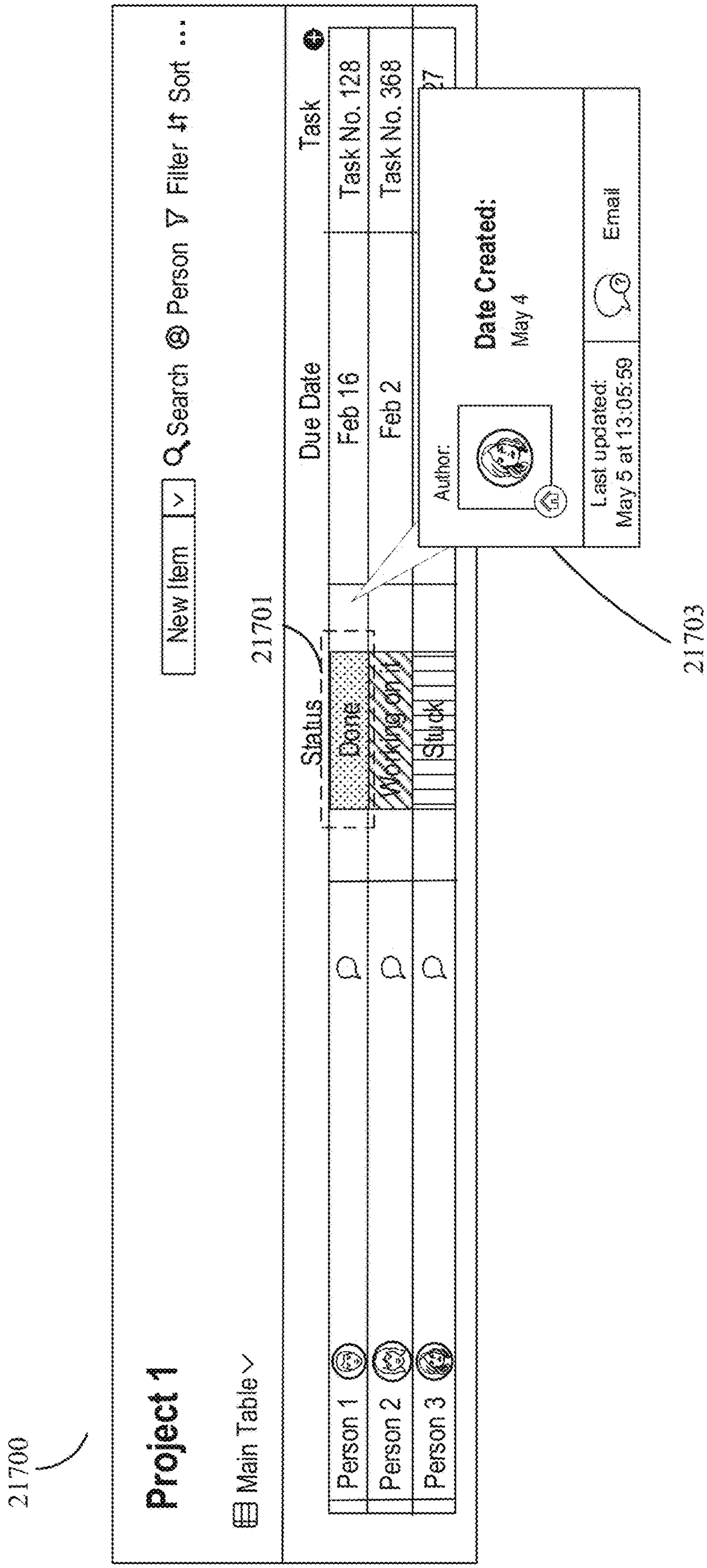

FIG. 217 illustrates exemplary metadata, consistent with some embodiments of the present disclosure.

Figure 218:
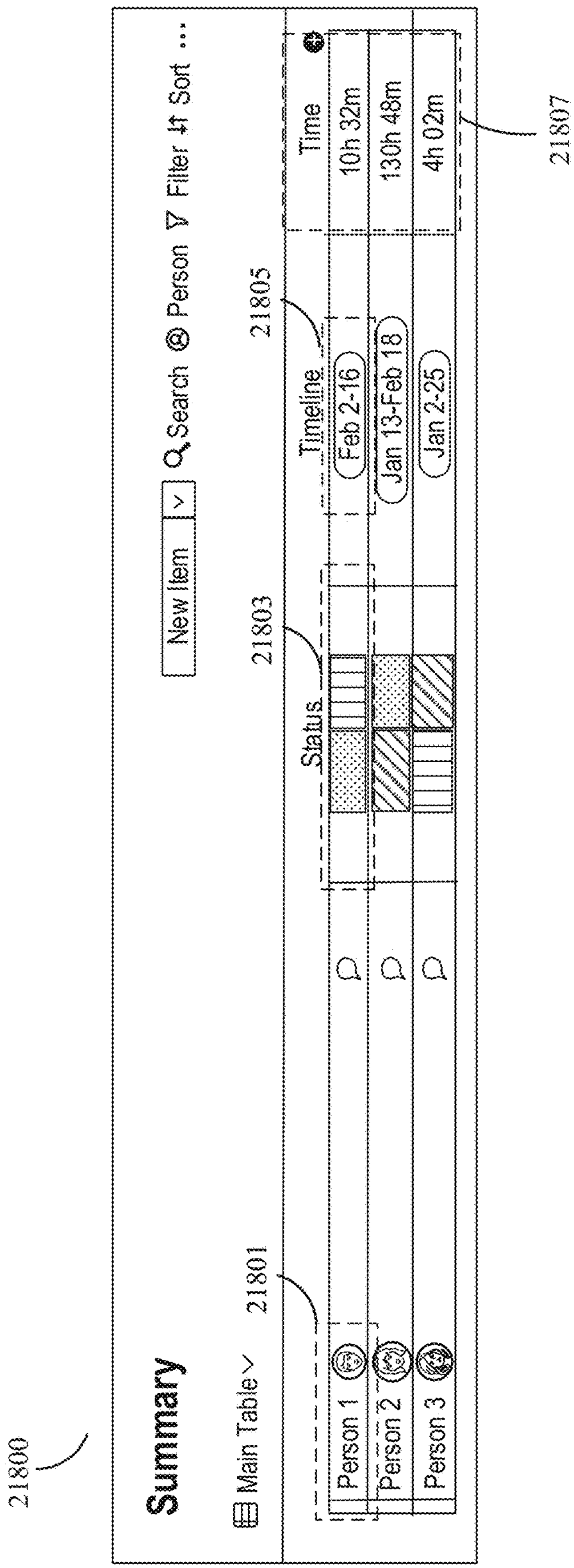

FIG. 218 illustrates an exemplary summary board, consistent with some embodiments of the present disclosure.

Figure 219:
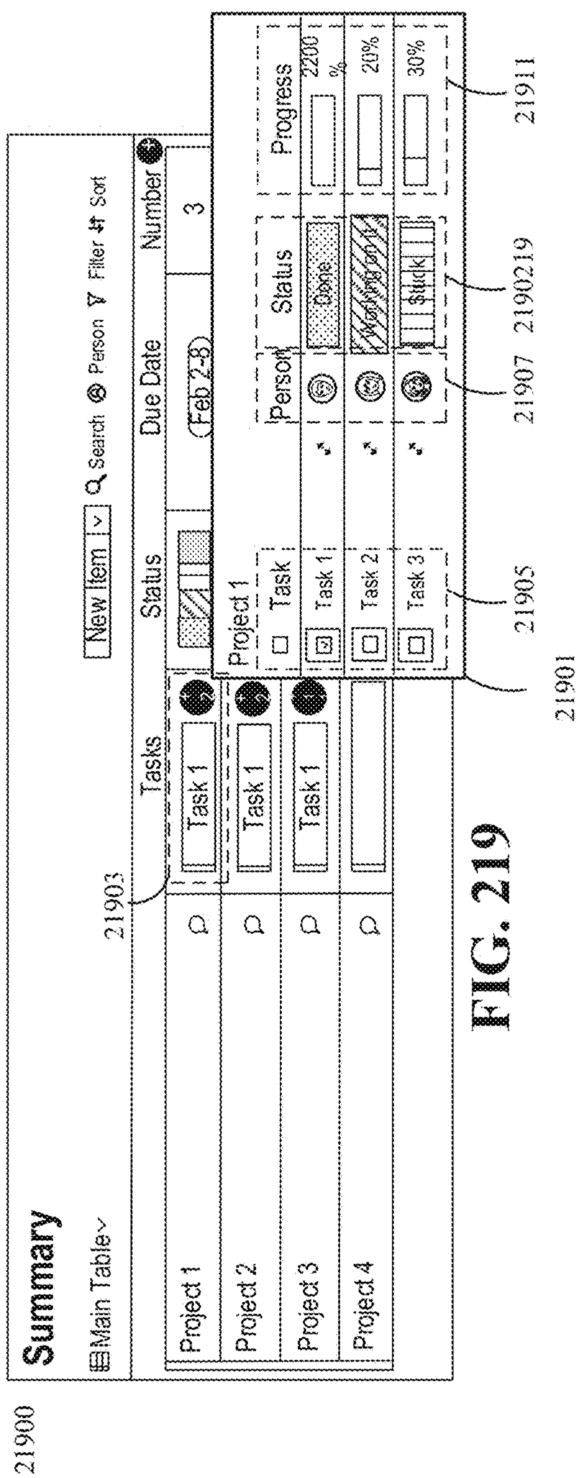

FIG. 219 illustrates an exemplary display generated as a result of an interaction with an indicator, consistent with some embodiments of the present disclosure.

Figure 220:
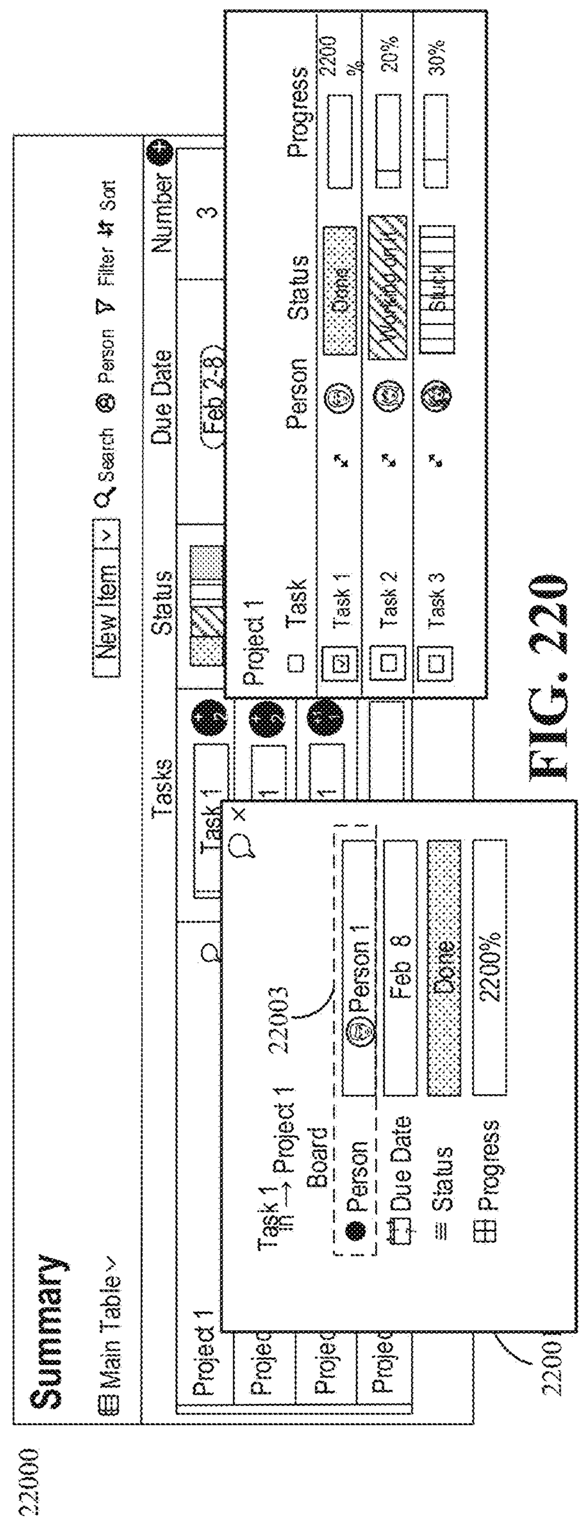

FIG. 220 illustrates another exemplary display generated as a result of an interaction with an indicator, consistent with some embodiments of the present disclosure.

Figure 221:

FIG. 221 is a block diagram of an example process for generating high level summary tablature based on lower level tablature, consistent with some embodiments of the present disclosure.

Figure 222:
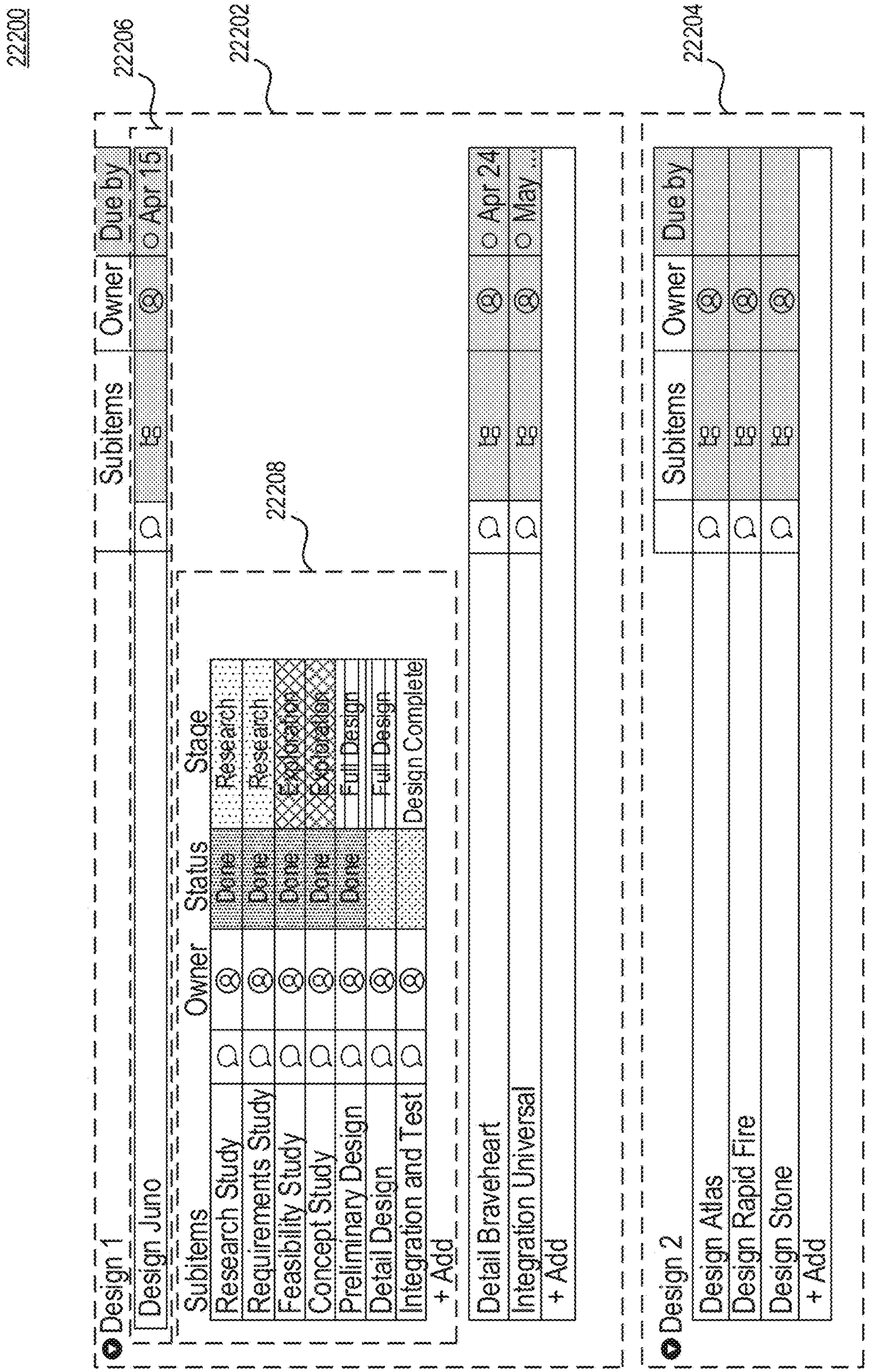

FIG. 222 illustrates an example view of a hierarchical table structure, consistent with some embodiments of the present disclosure.

Figure 223:
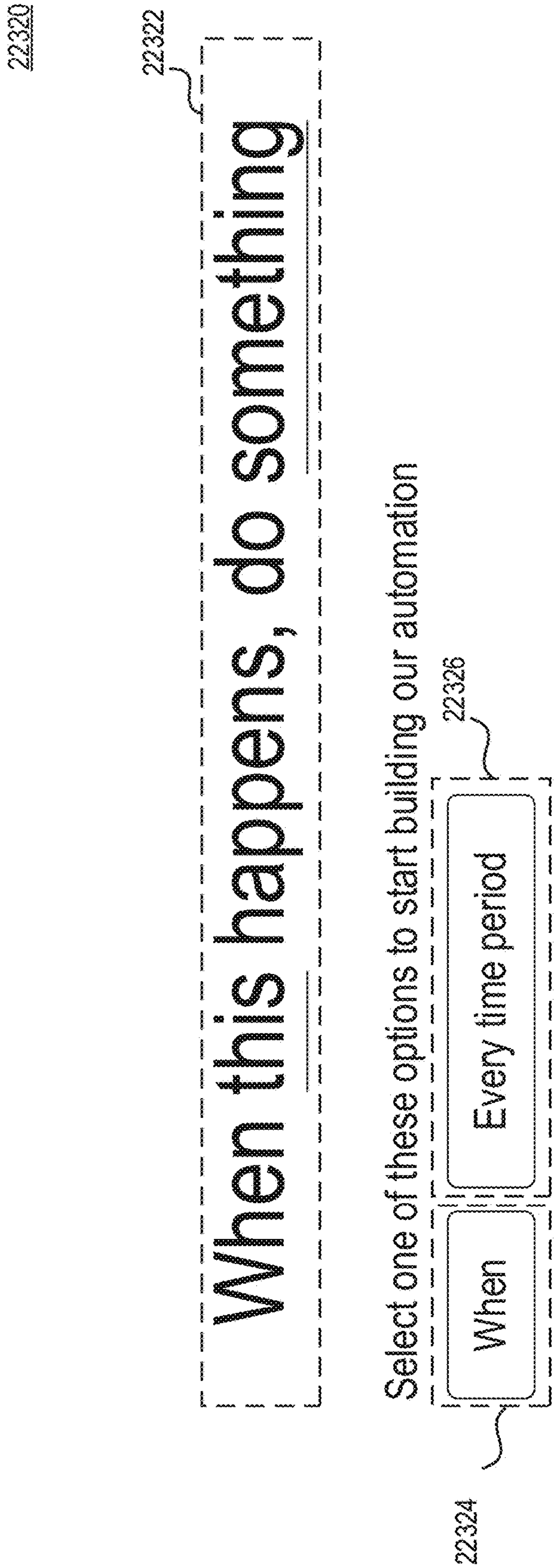

FIG. 223 illustrates an example conditional rule displayed in a user interface, consistent with embodiments of the present disclosure.

Figure 224:
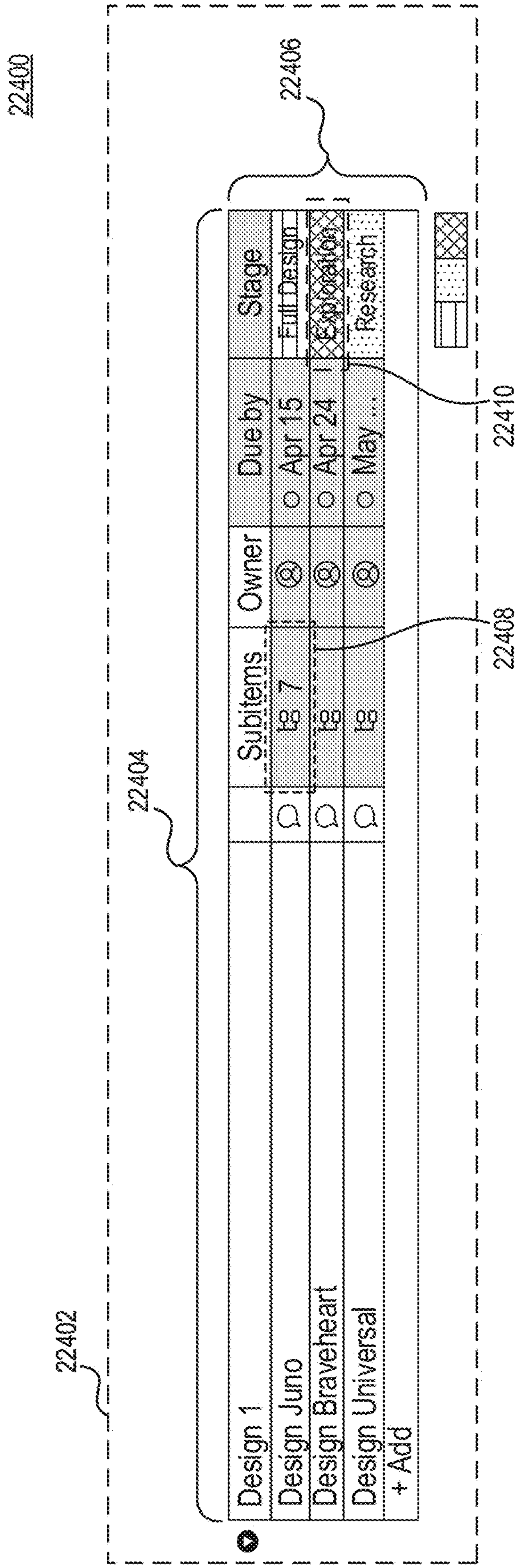

FIG. 224 illustrates a higher-level table structure presented on a viewable interface, consistent with some embodiments of the present disclosure.

Figure 225:
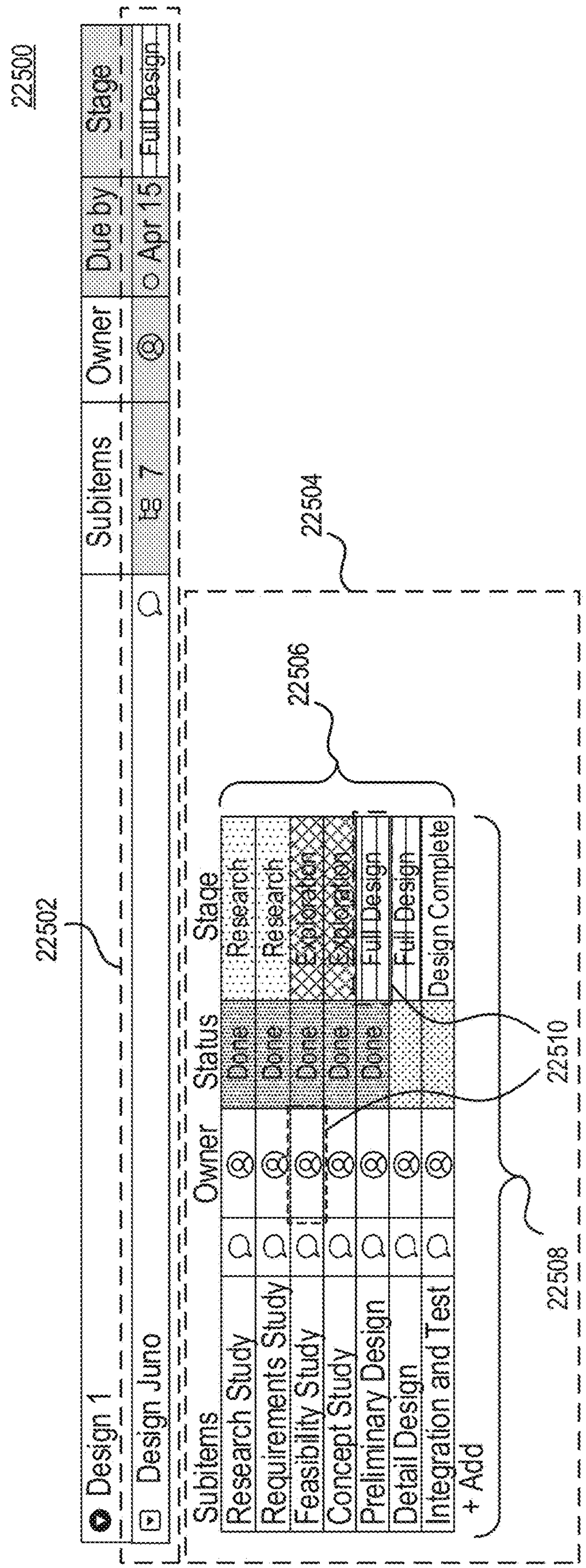

FIG. 225 illustrates a lower-level table structure presented on a viewable interface, consistent with some embodiments of the present disclosure.

Figure 226:
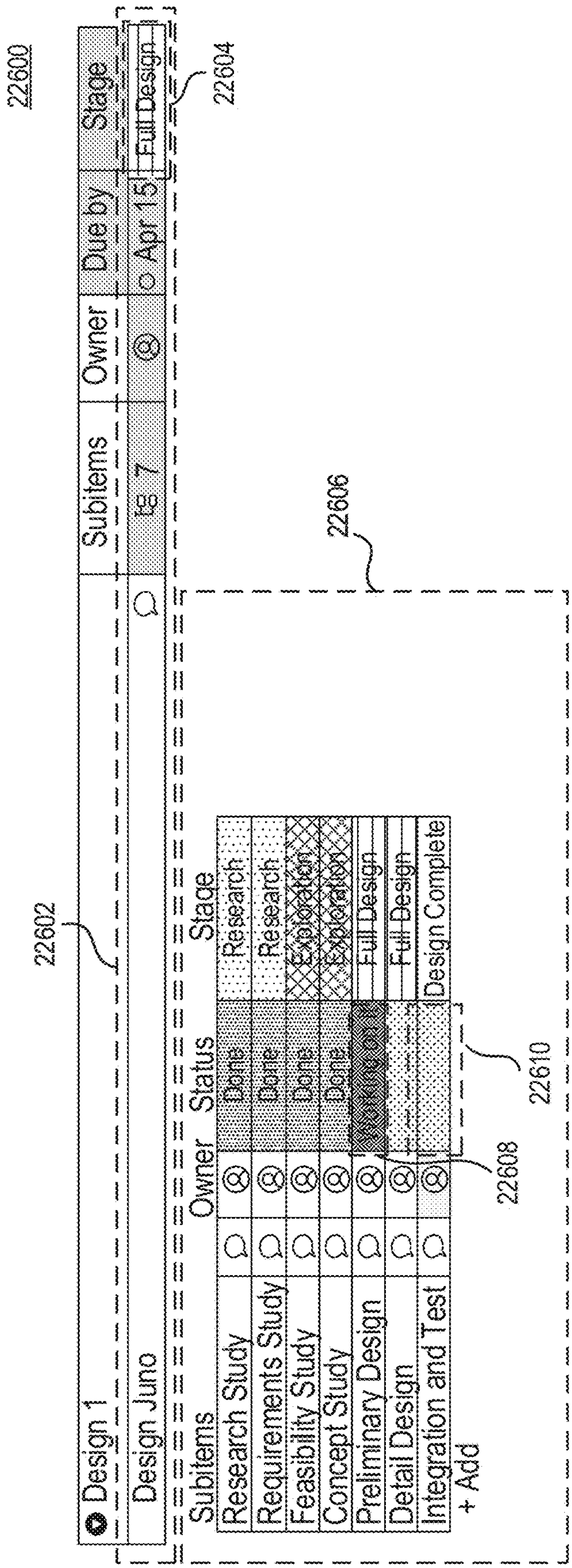

FIG. 226 illustrates an example view of linking a lower-level table to a specific cell in a higher-level table having a milestone indicator, consistent with some embodiments of the present disclosure.

Figure 227:
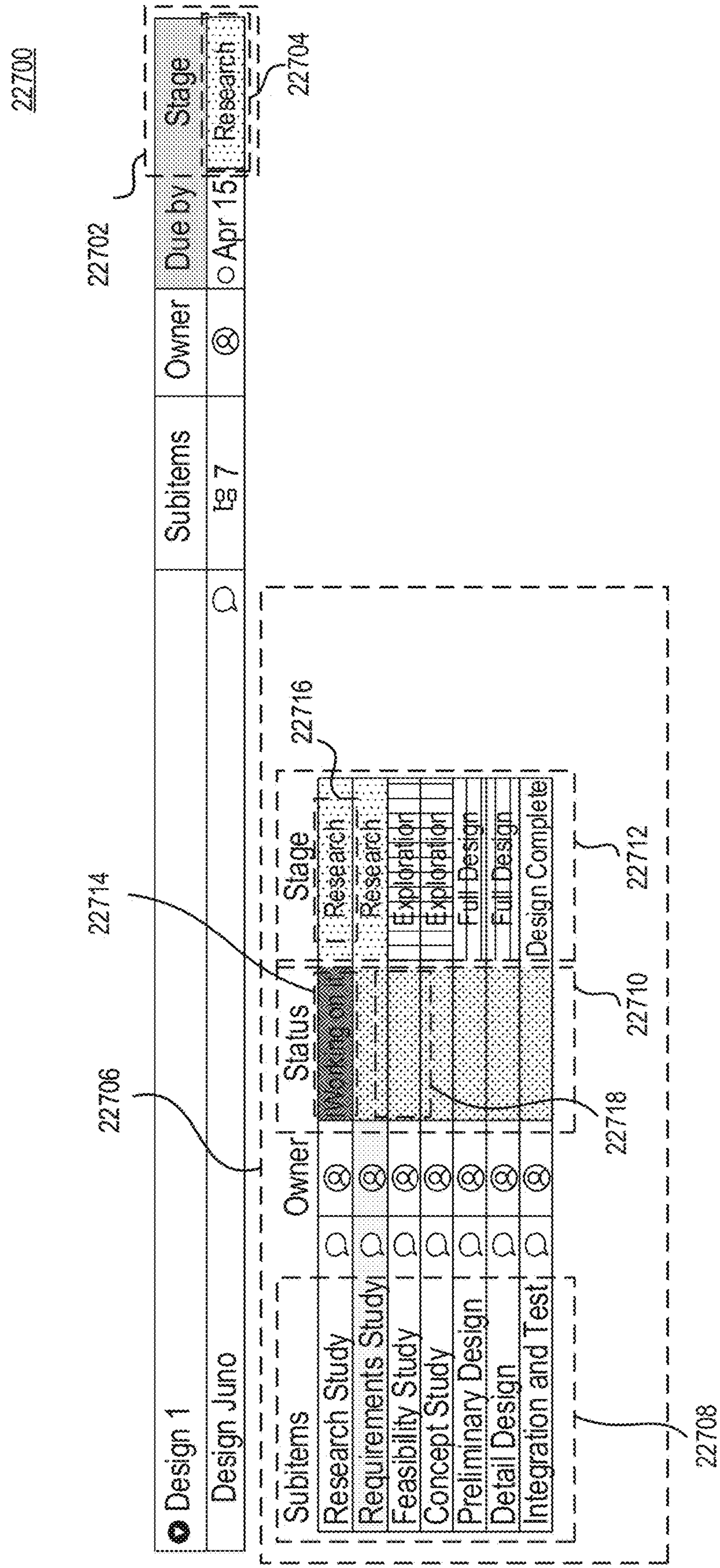

FIG. 227 illustrates a first use case of an example view of qualifying data in a plurality of seconds cells triggering a specific conditional rule to change a specific first cell, consistent with some embodiments of the present disclosure.

Figure 228:
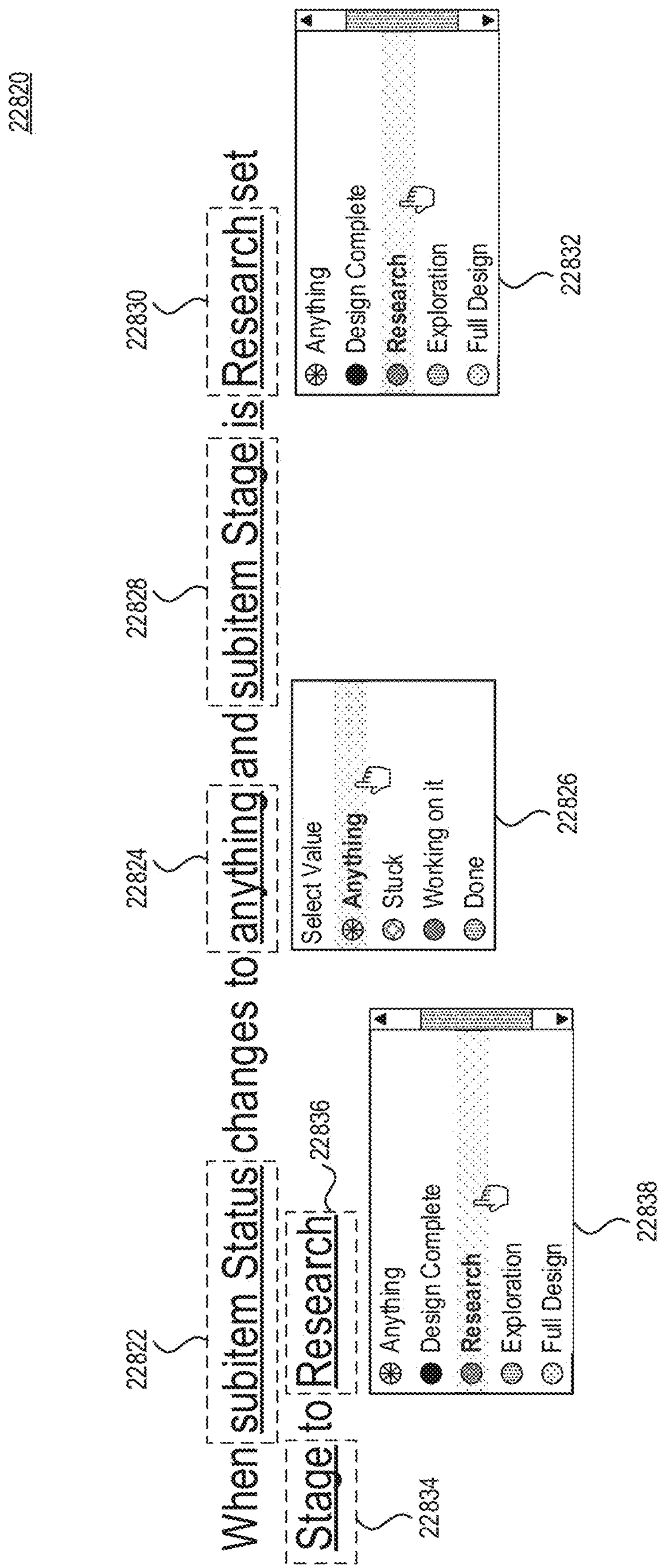

FIG. 228 illustrates a first use case for a specific conditional rule associating the specific first cell with a plurality of second cells, consistent with some embodiments of the present disclosure.

Figure 229:
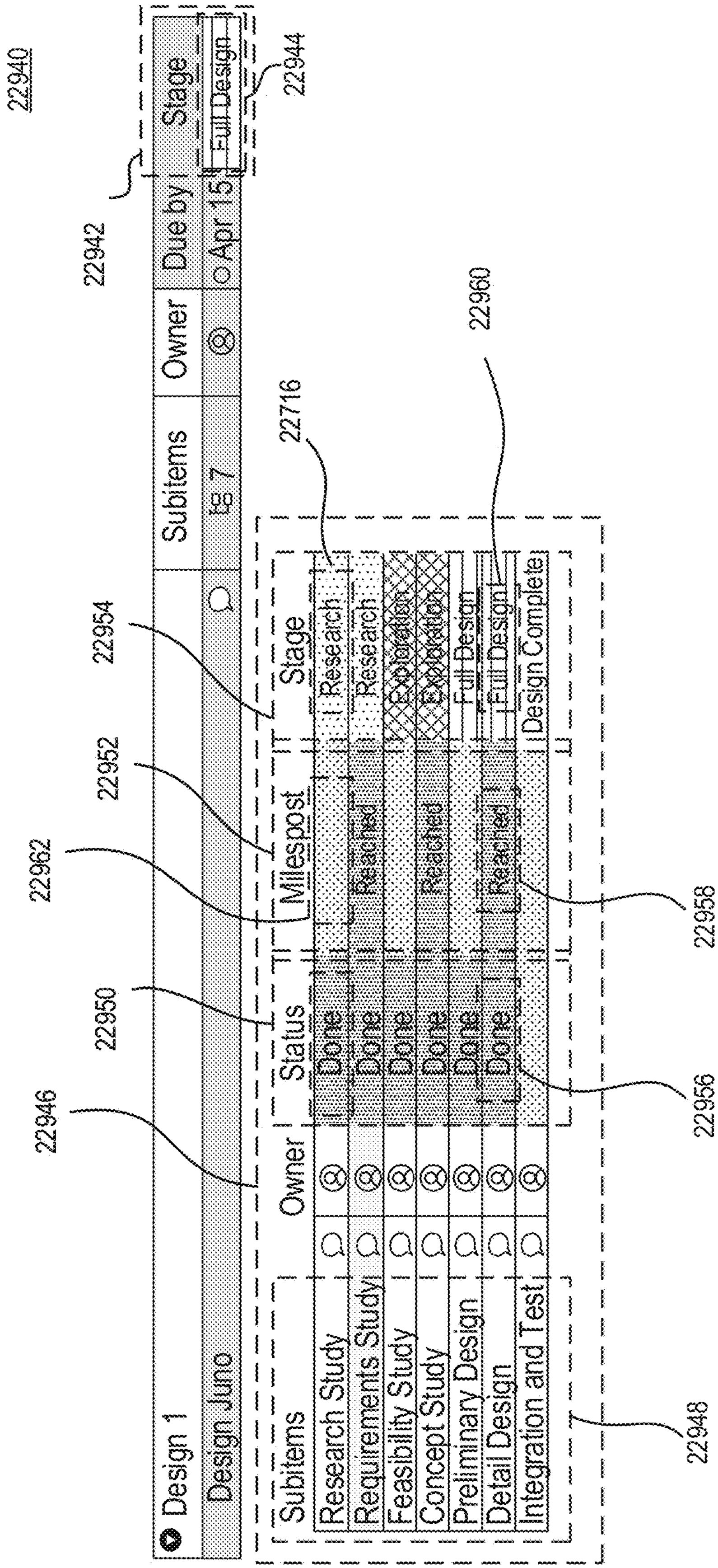

FIG. 229 illustrates a second use case of an example view of qualifying data in a plurality of seconds cells triggering a specific conditional rule to change a specific first cell, consistent with some embodiments of the present disclosure.

Figure 230:
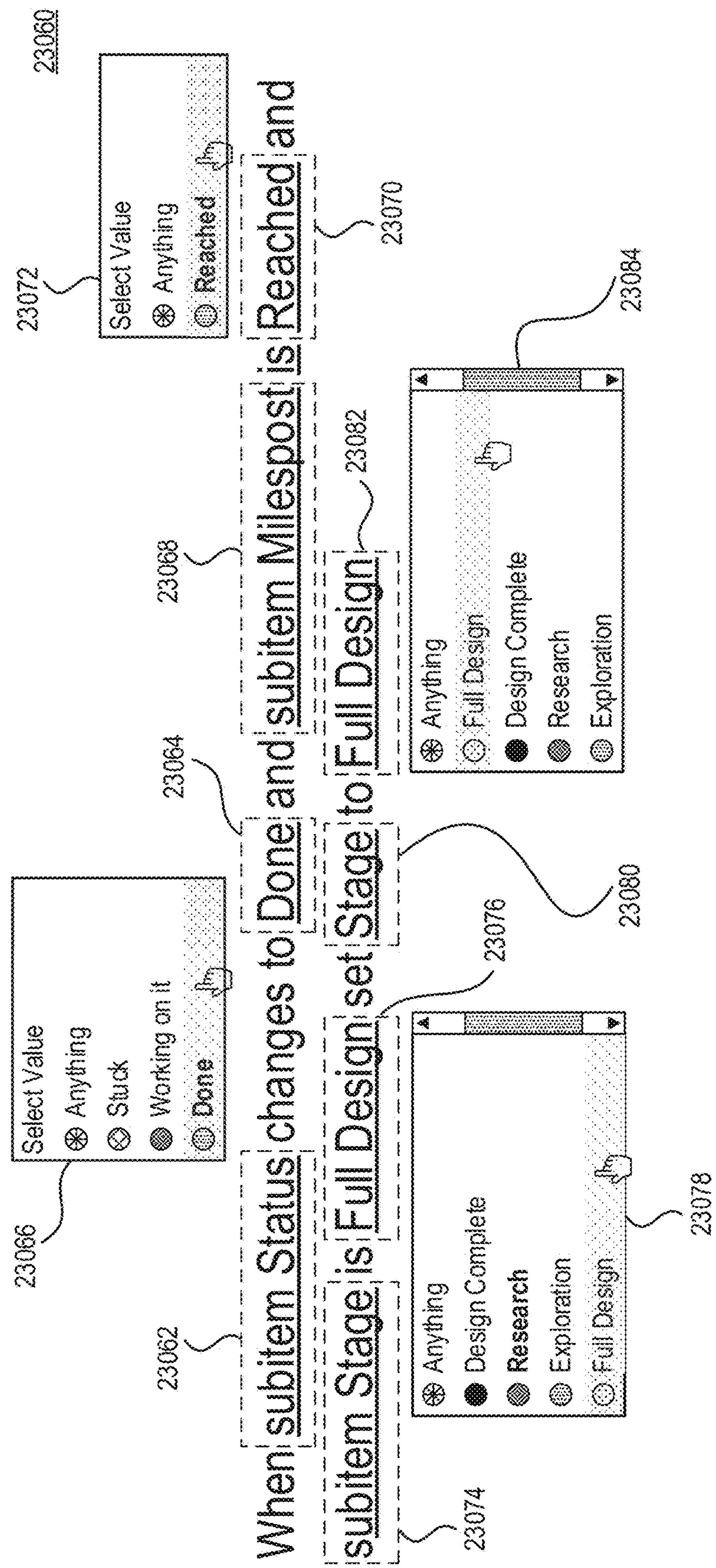

FIG. 230 illustrates a second use case for a specific conditional rule associating the specific first cell with a plurality of second cells, consistent with some embodiments of the present disclosure.

Figure 231:
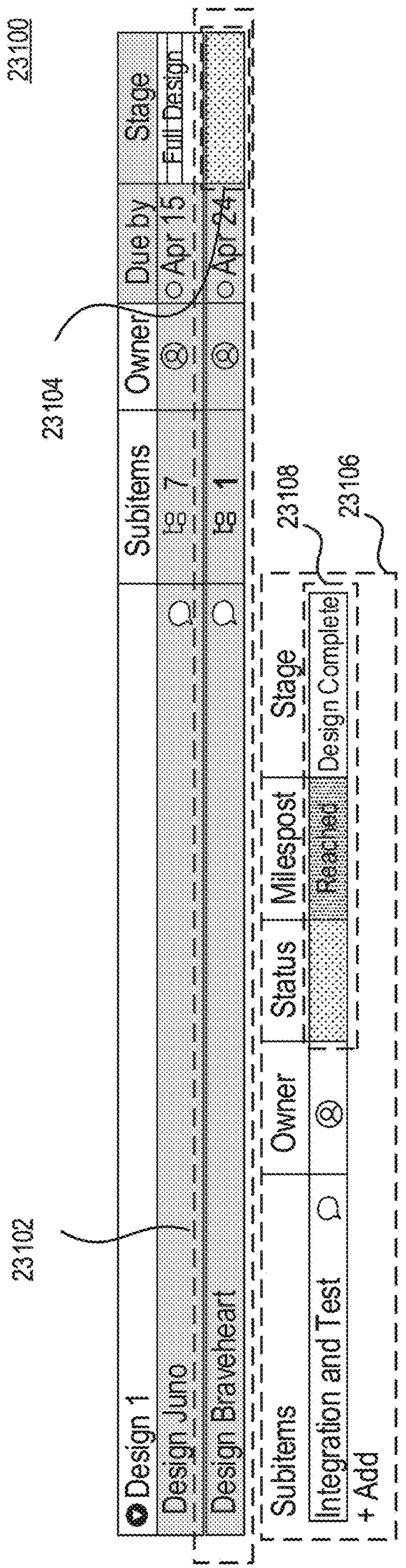
Figure 232:
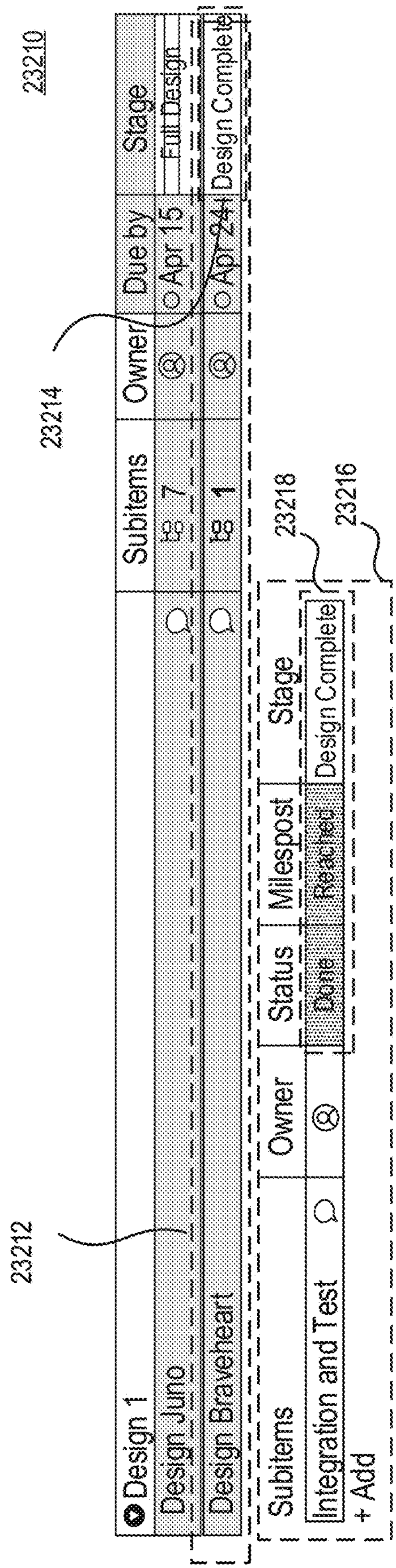

FIGS. 231 & 232 illustrate example views of updating the specific first cell from being empty to having an updated milestone indicator, consistent with some embodiment of the present disclosure.

Figure 233:
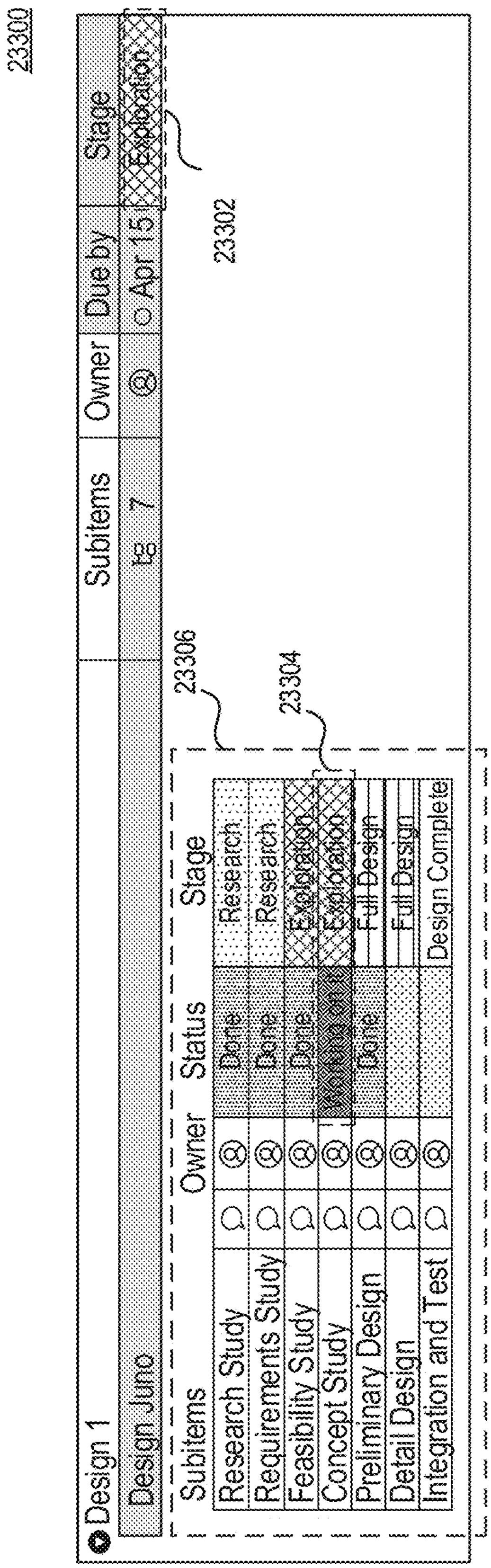
Figure 234:
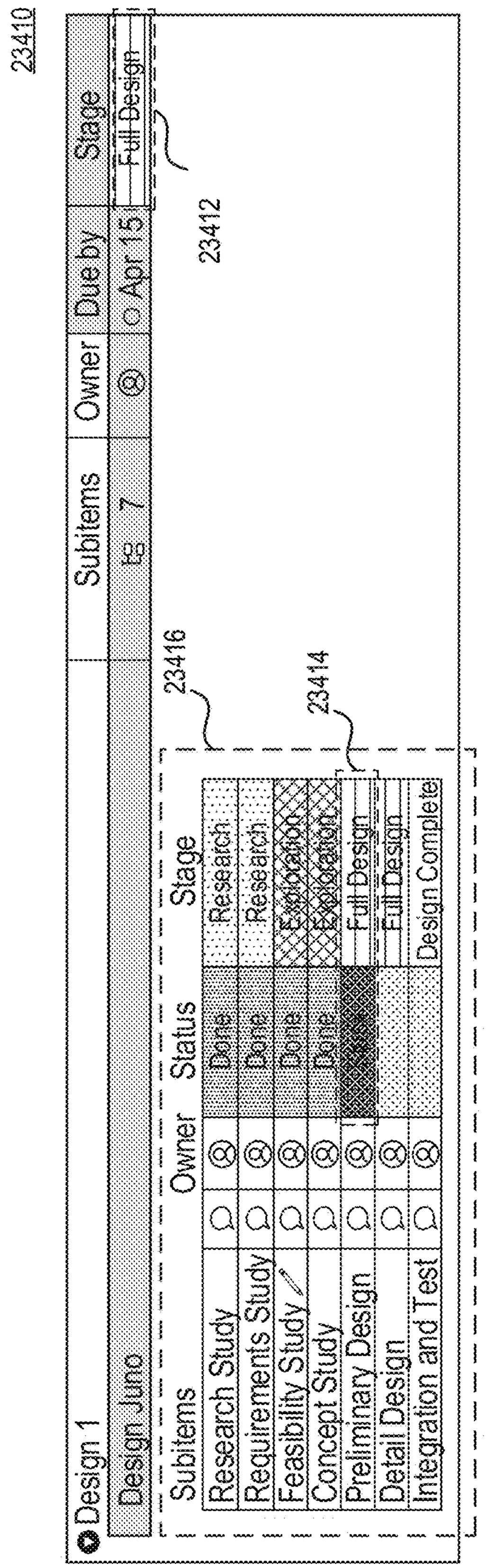

FIGS. 233 & 234 illustrates a specific first cell containing an original milestone indicator being replaced by an updated milestone indicator, consistent with some embodiments of the present disclosure.

Figure 235:
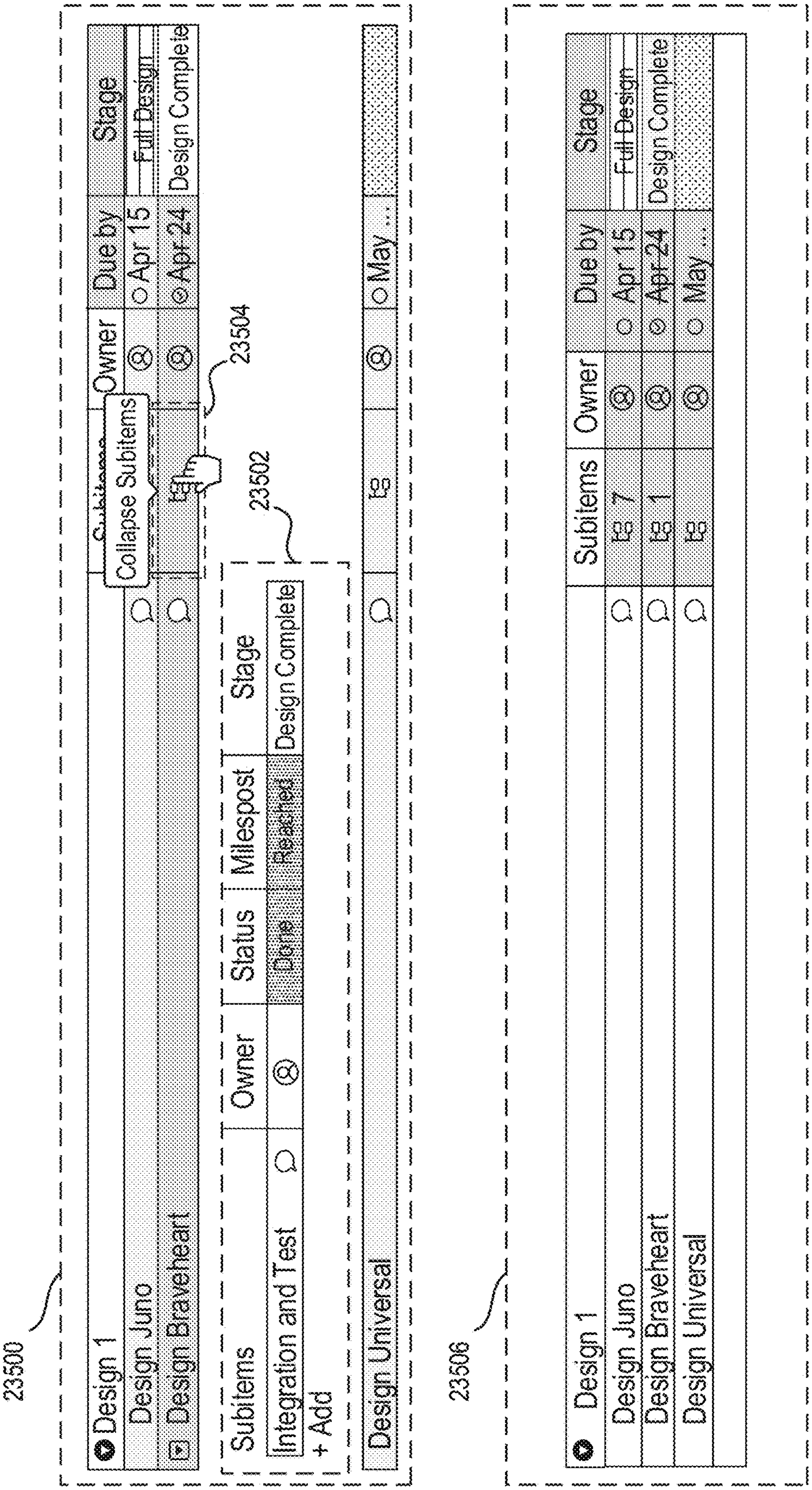

FIG. 235 illustrates example views of the at least one processor selectively expanding or collapsing lower-level table upon receipt of a collapsing command in a viewable interface, consistent with some embodiments of the present disclosure.

Figure 236:
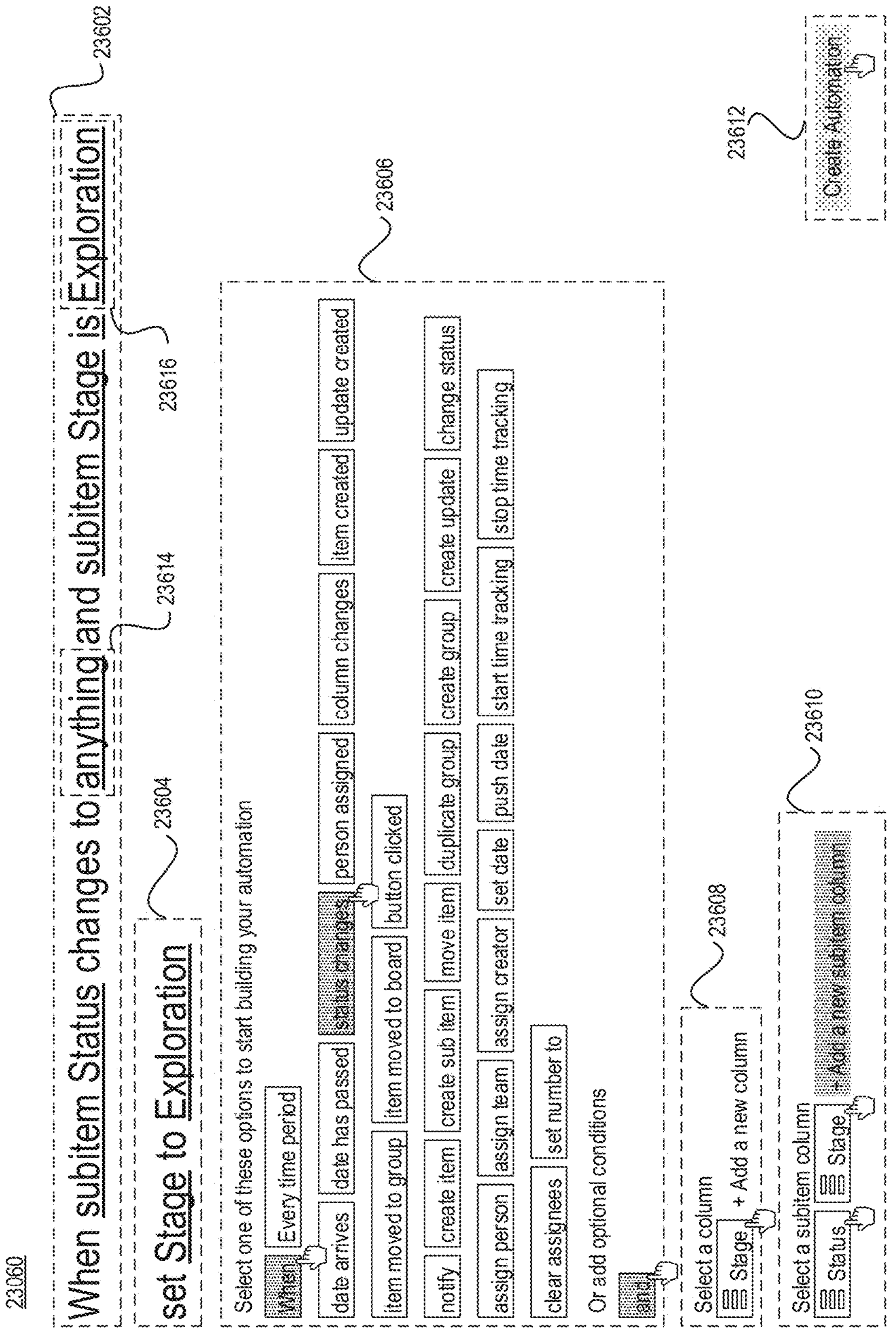

FIG. 236 illustrates an example view of a rule-builder interface having specific conditions in second cells of the lower-level table triggering the milestone update in the first specific cell of the higher-level table, consistent with some embodiments of the present disclosure.

Figure 237:
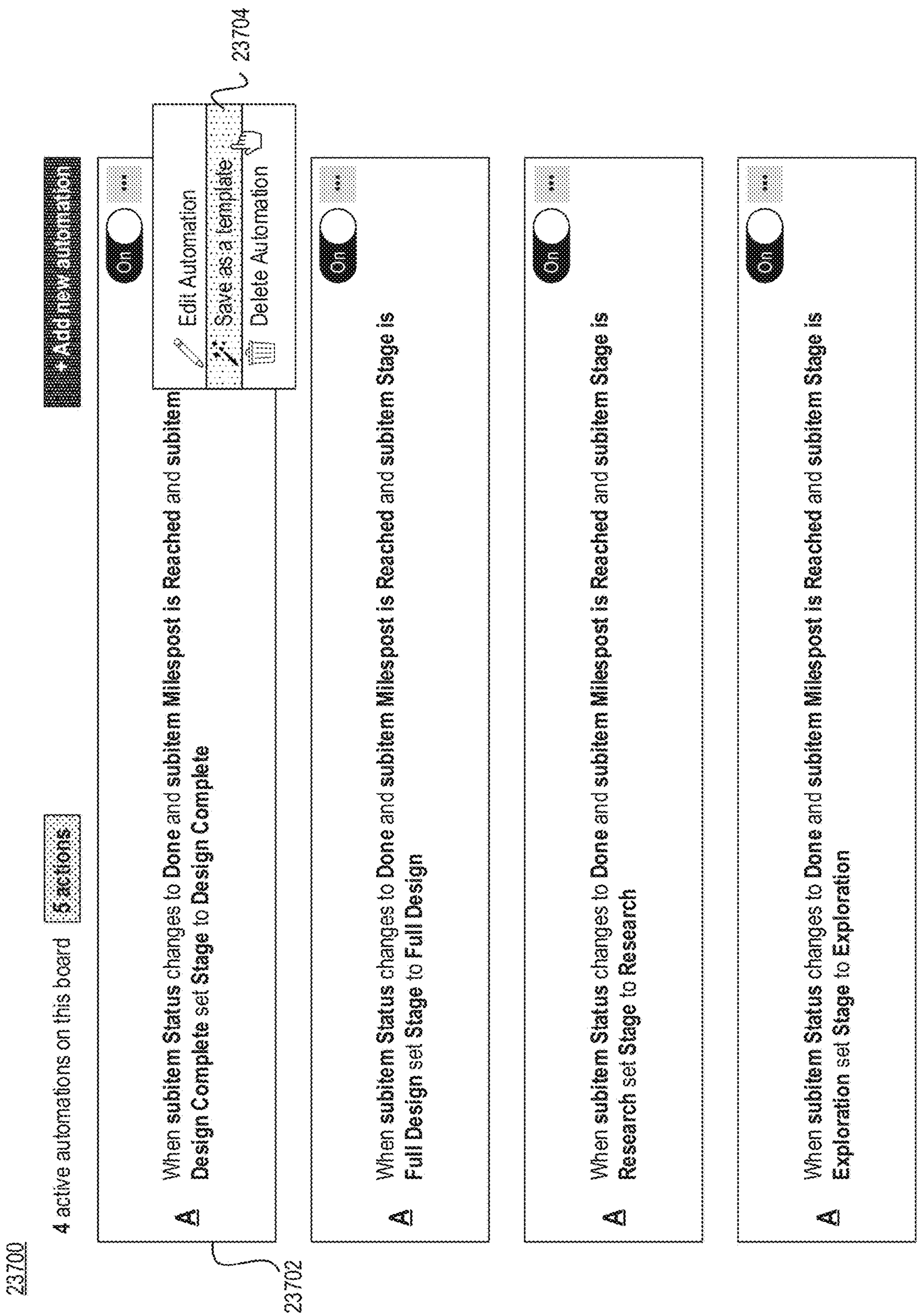

FIG. 237 illustrates the at least one processor storing a specific conditional rule as a template for application to additional lower-level tables, consistent with some embodiments of the present disclosure.

Figure 238:
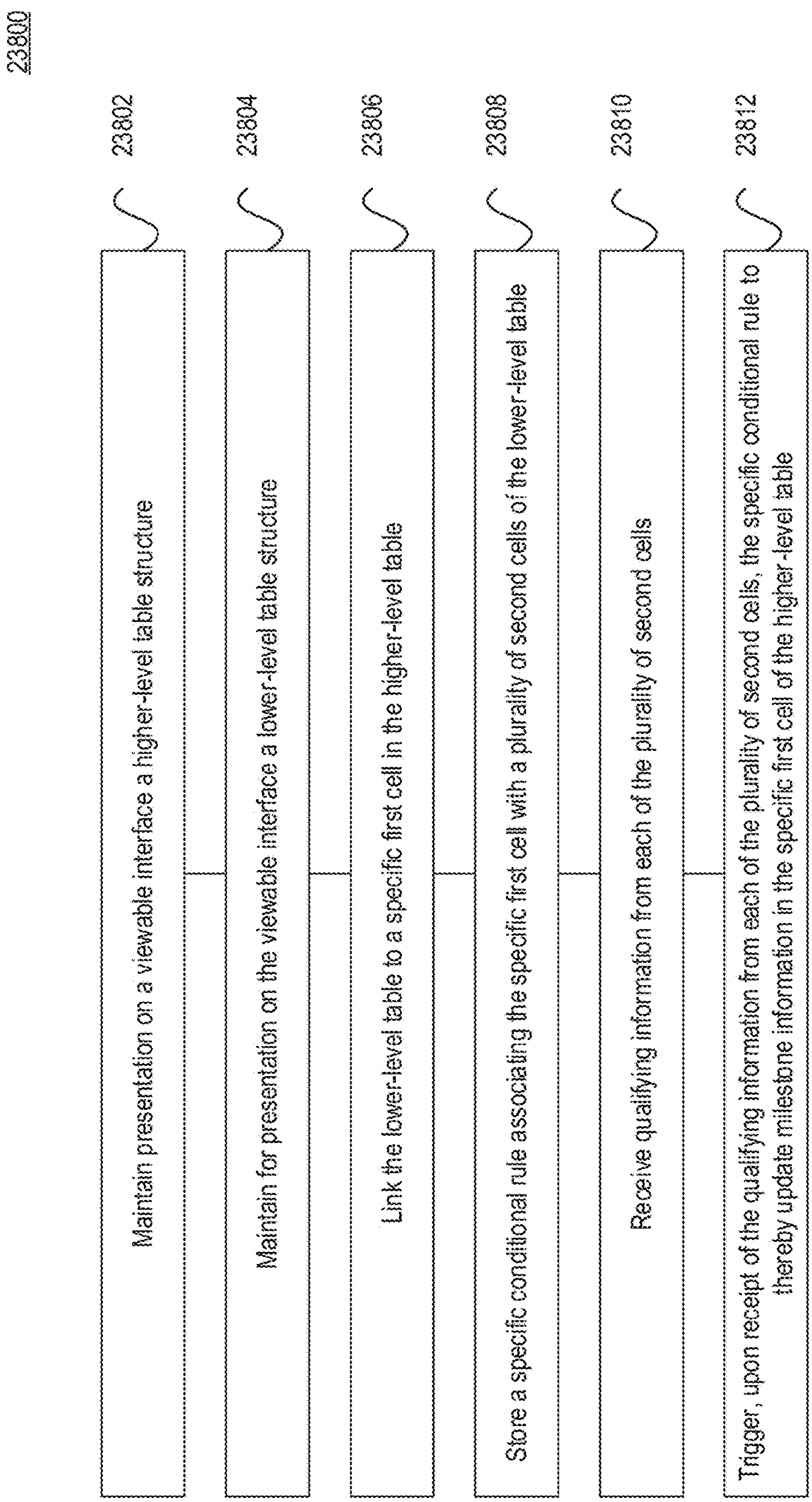

FIG. 238 illustrates exemplary block diagram for an exemplary method for implementing conditional rules in a hierarchical table structure, consistent with some embodiments of the present disclosure.

Figure 239:
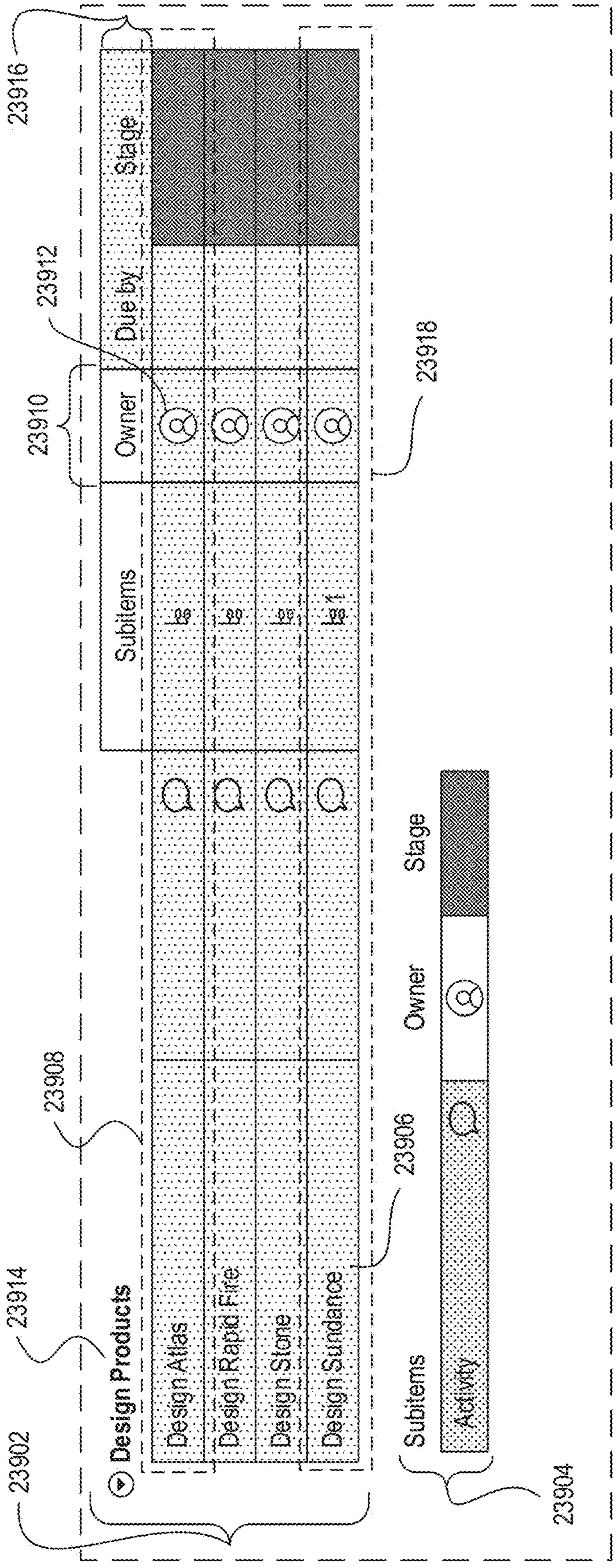

FIG. 239 illustrates an example view of customized lower-level table templates based on data in an associated higher-level table structure, consistent with some embodiments of the present disclosure.

Figure 240:
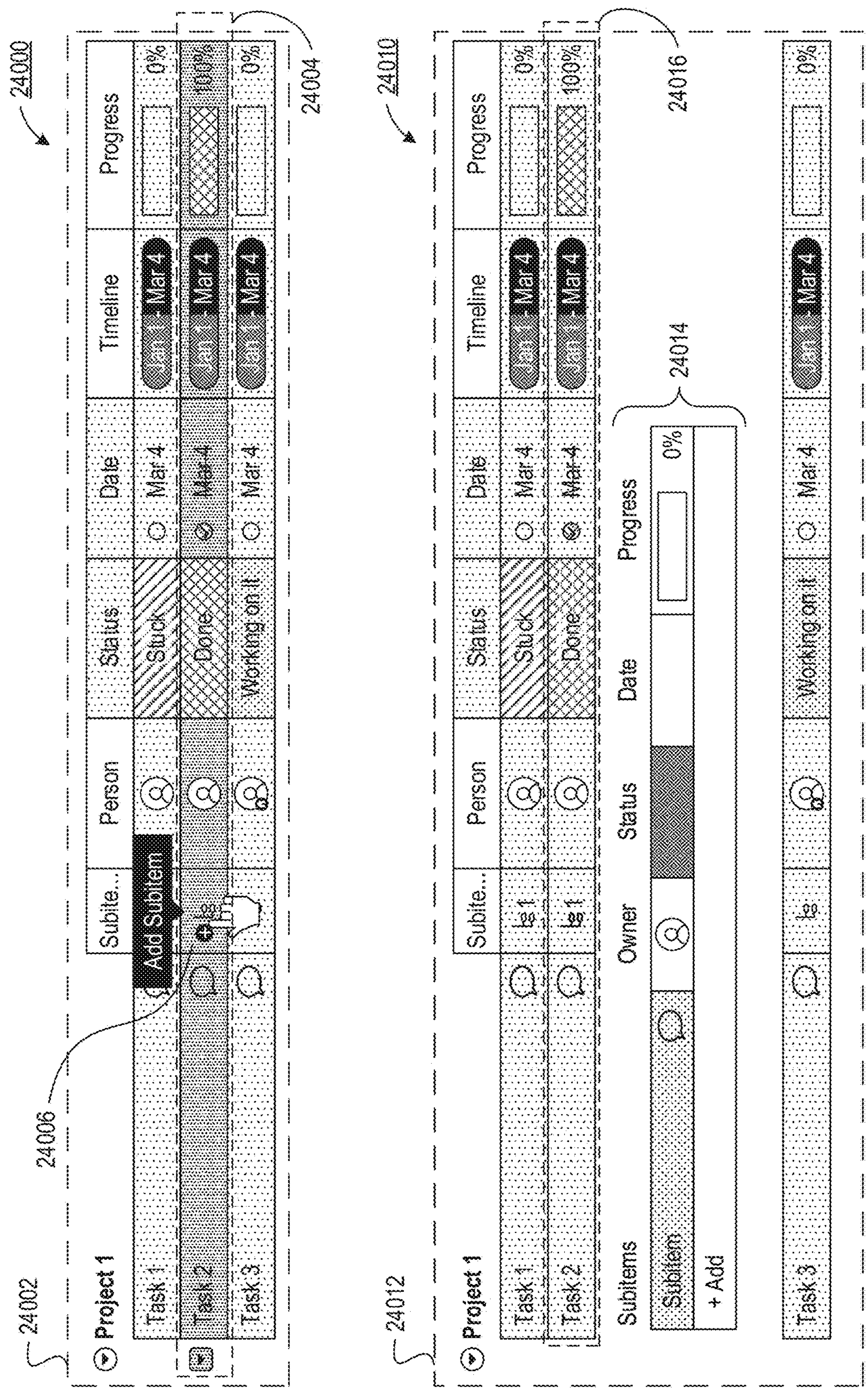

FIG. 240 illustrates examples views of receiving an input for triggering the generation of a lower-level table template tied to the higher-level table structure, consistent with some embodiments of the present disclosure.

Figure 241:
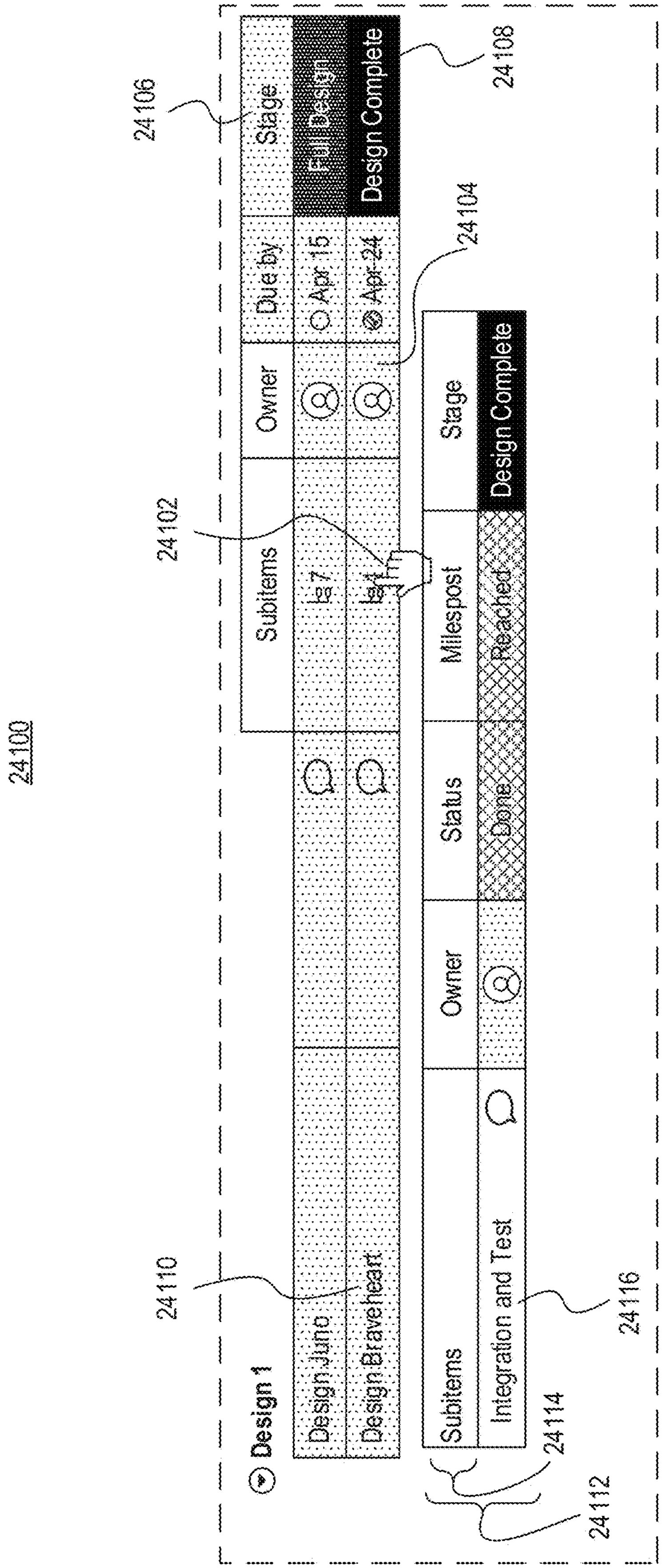

FIG. 241 illustrates determining a customization of the lower-level table template based on the input and the analysis by the at least one processor, consistent with some embodiments of the present disclosure.

Figure 242:
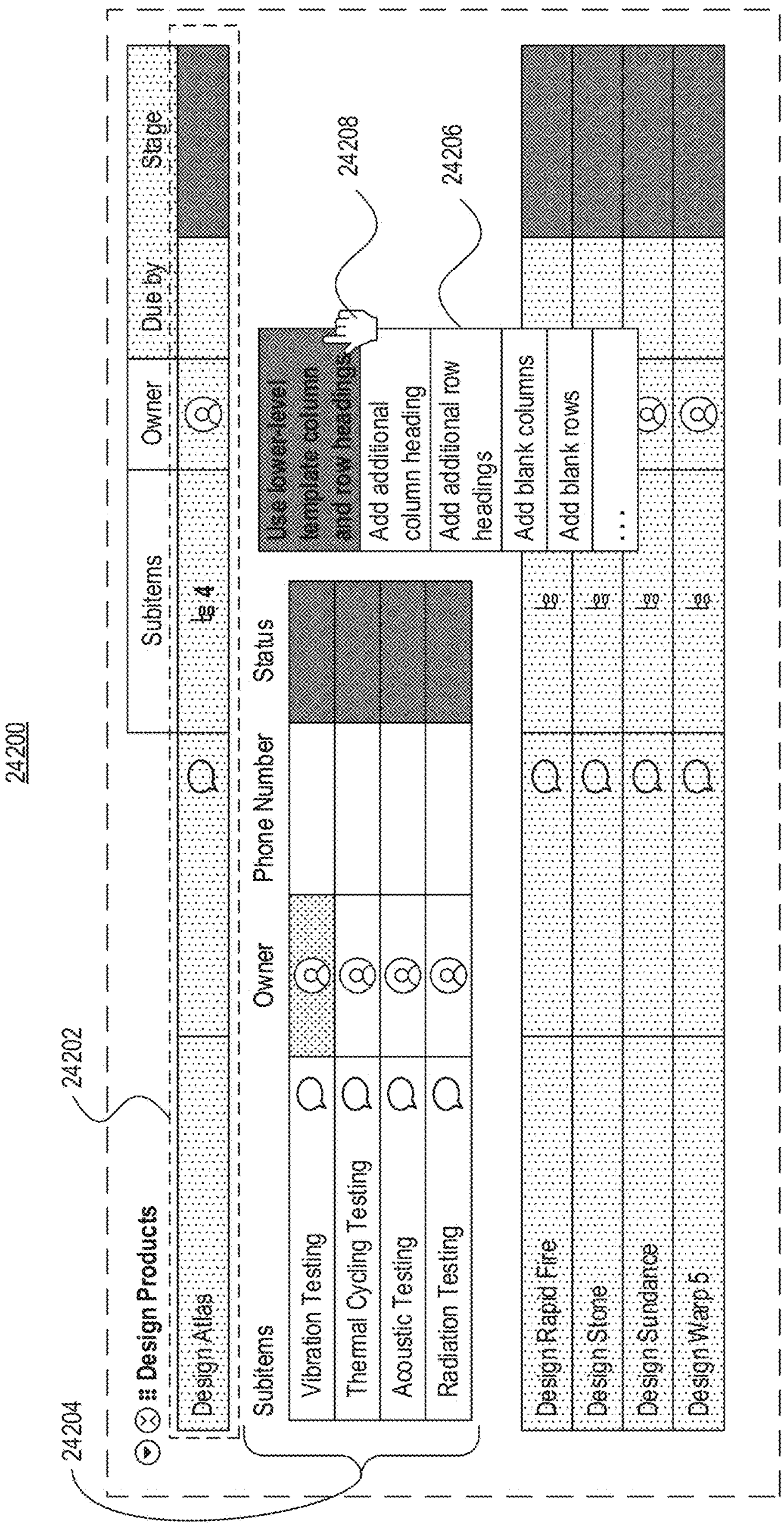

FIG. 242 illustrates associating the customization with the lower-level table template to form a customized lower-level table structure, consistent with some embodiments of the present disclosure.

Figure 243:
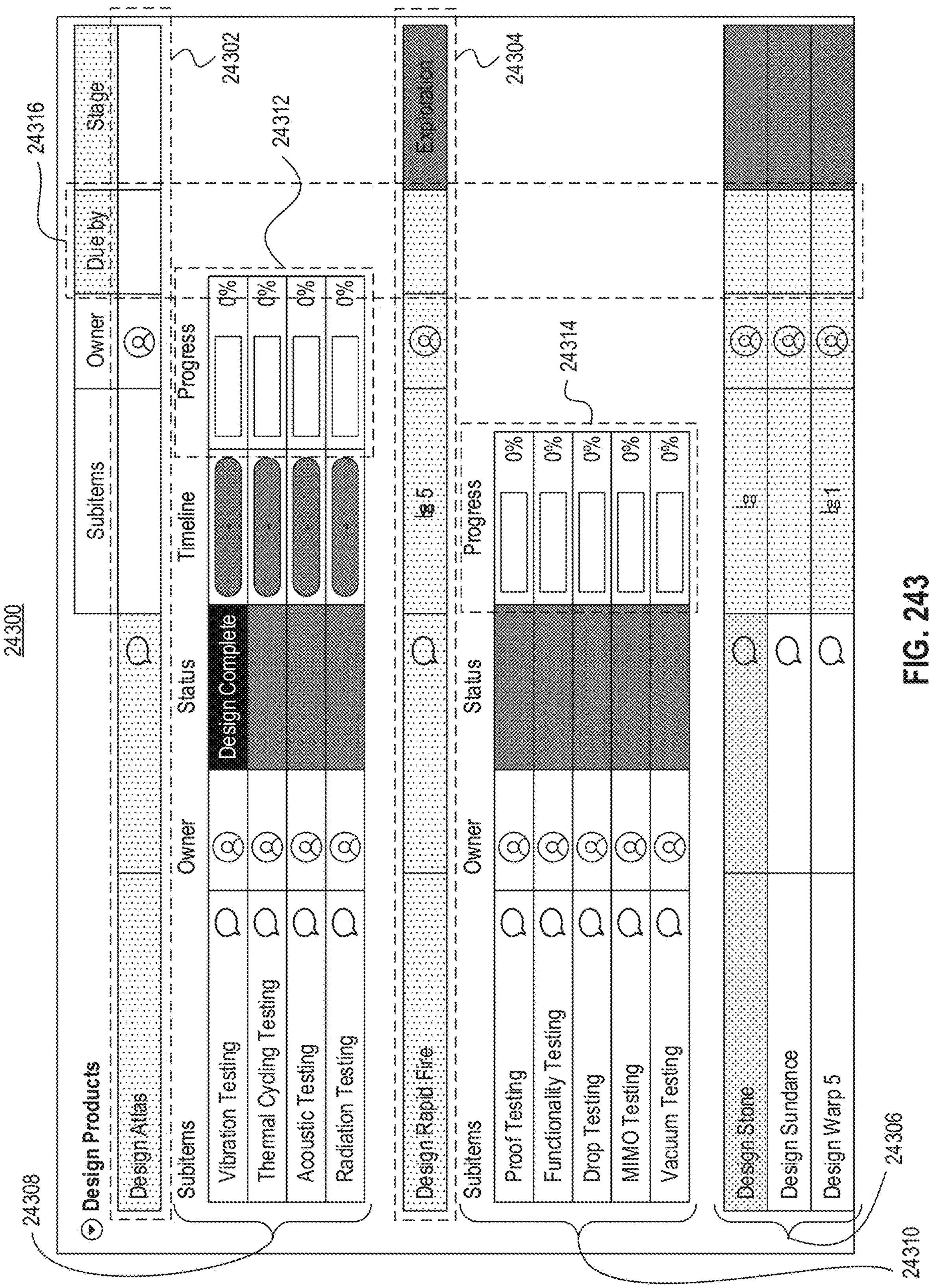

FIG. 243 illustrates a customization of a plurality of differing lower-level table structures depending on specific characteristics of the higher-level table structure, consistent with some embodiments of the present disclosure.

Figure 244:
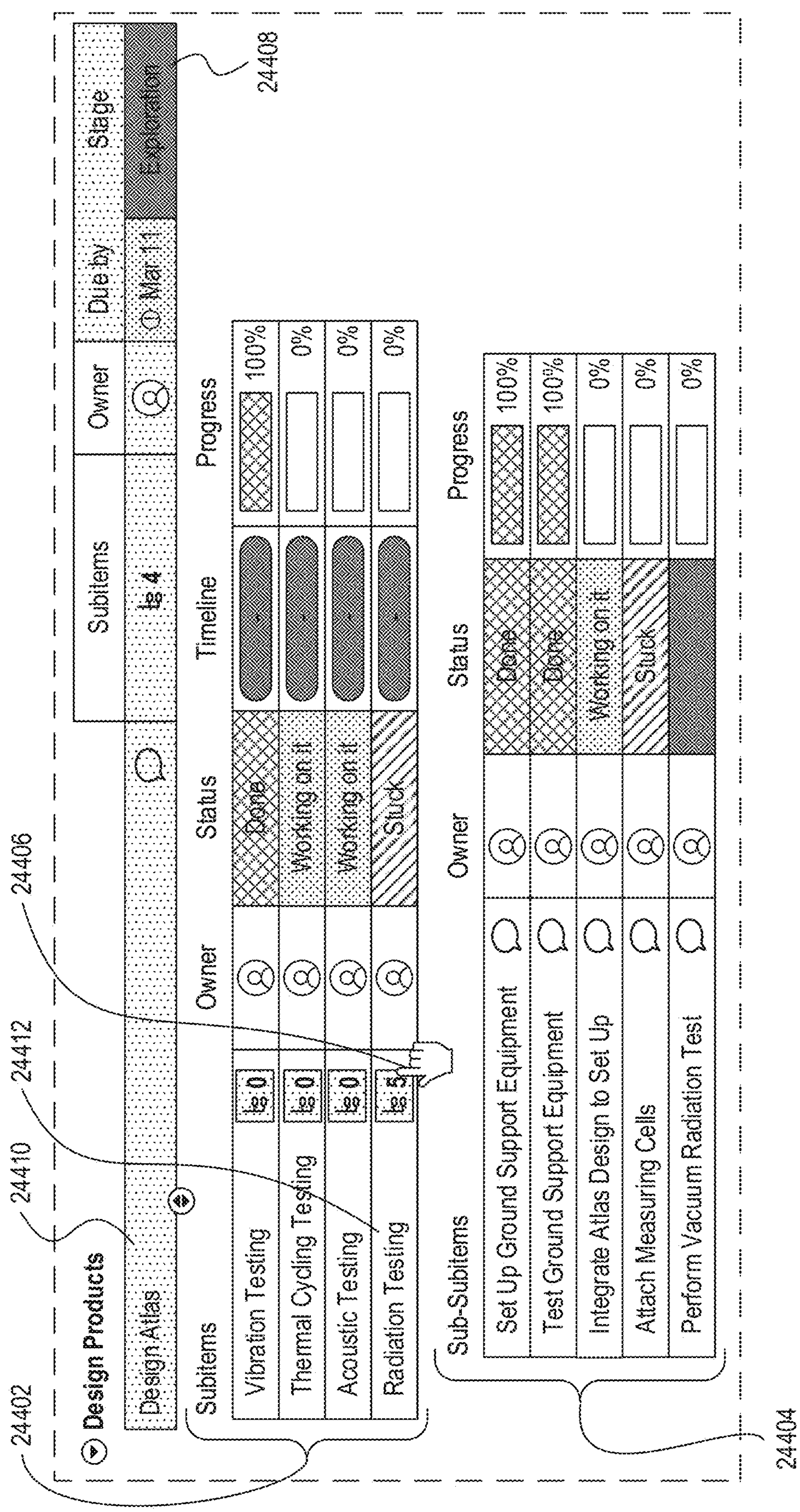

FIG. 244 illustrates the simultaneous display of a higher-level table structure, a lower-level table structure, and a sub-lower-level table structure based on instruction, at least one higher-level table characteristic and a lower-level characteristic, consistent with some embodiments of the present disclosure.

Figure 245:
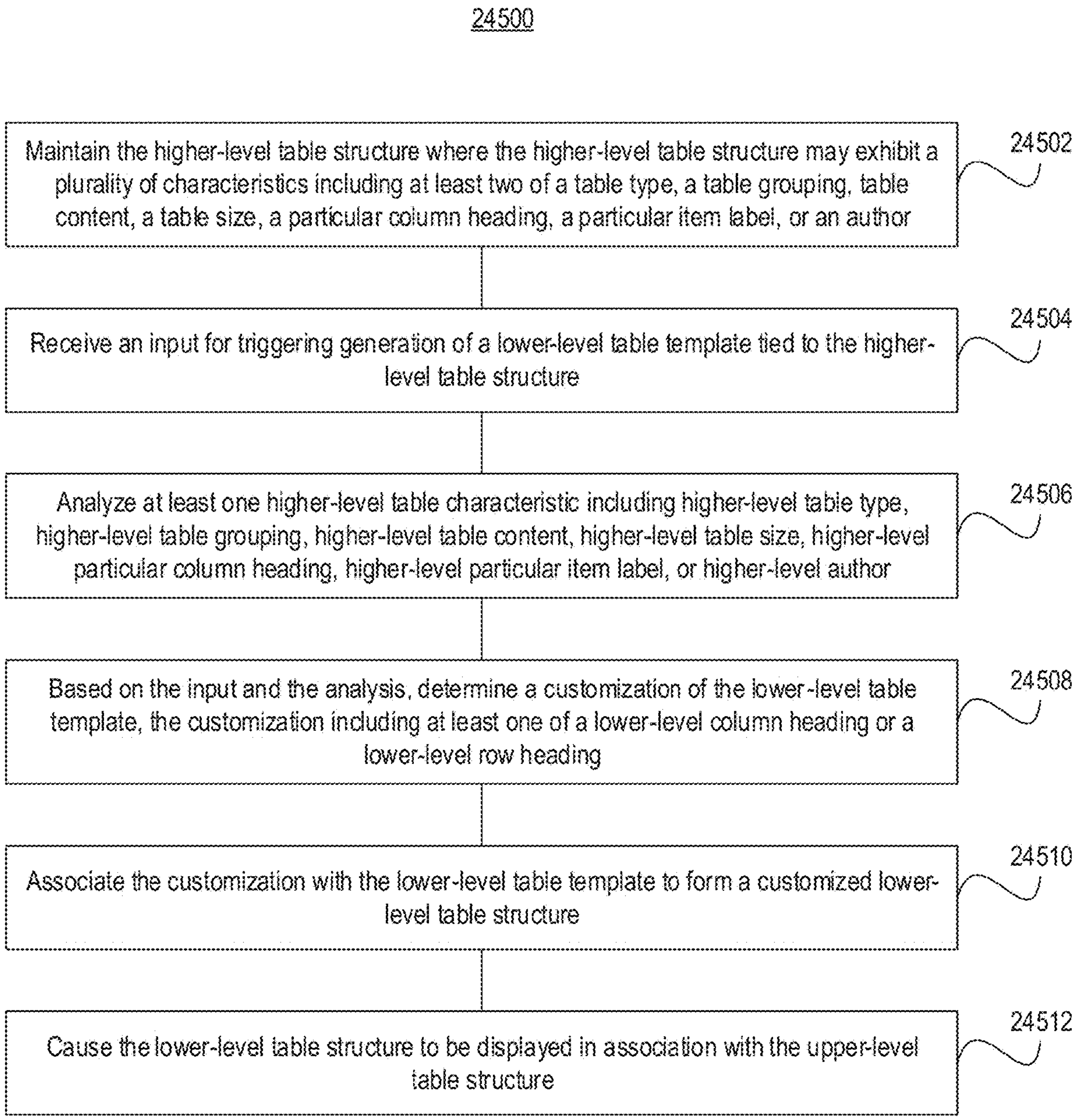

FIG. 245 illustrates exemplary block diagram for an exemplary method for automatic generation of customized lower-level table templates based on data in an associated higher-level table structure, consistent with some embodiments of the present disclosure.

DETAILED DESCRIPTION

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense, the term "row" may refer to one or more of a horizontal and a vertical presentation. A table or tablature, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Figure 1:
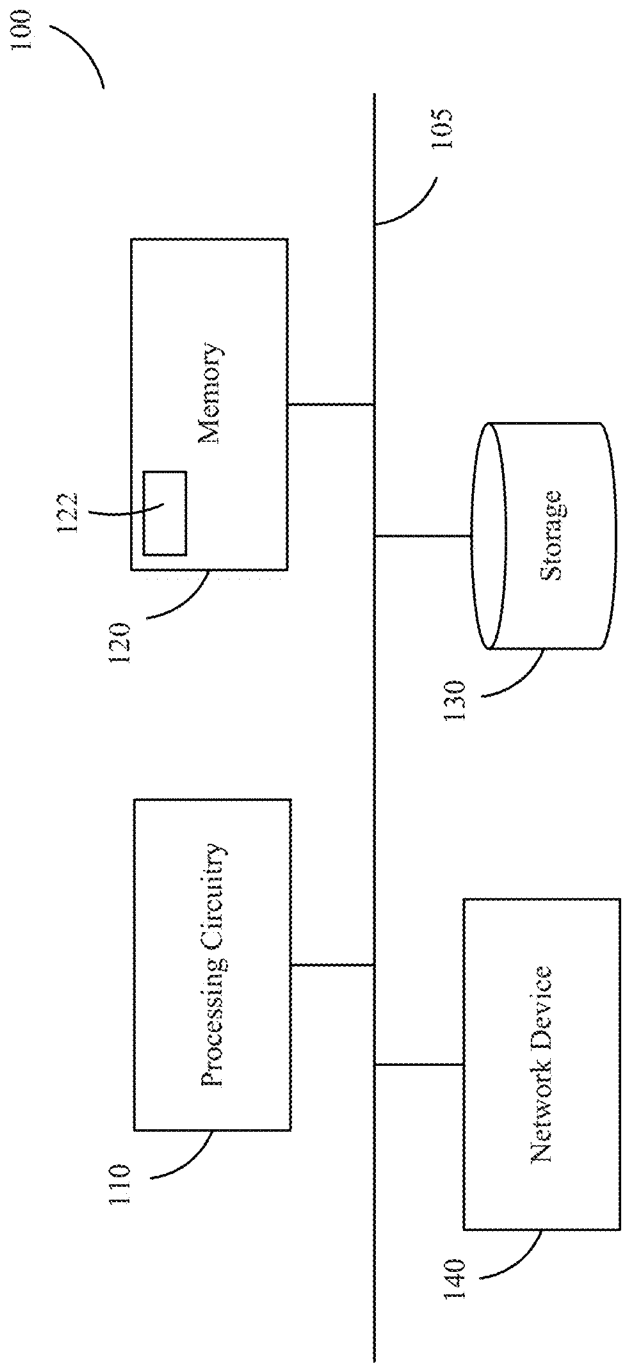
FIG. 1 is a block diagram of an exemplary computing device which may be employed in connection with embodiments of the present disclosure.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
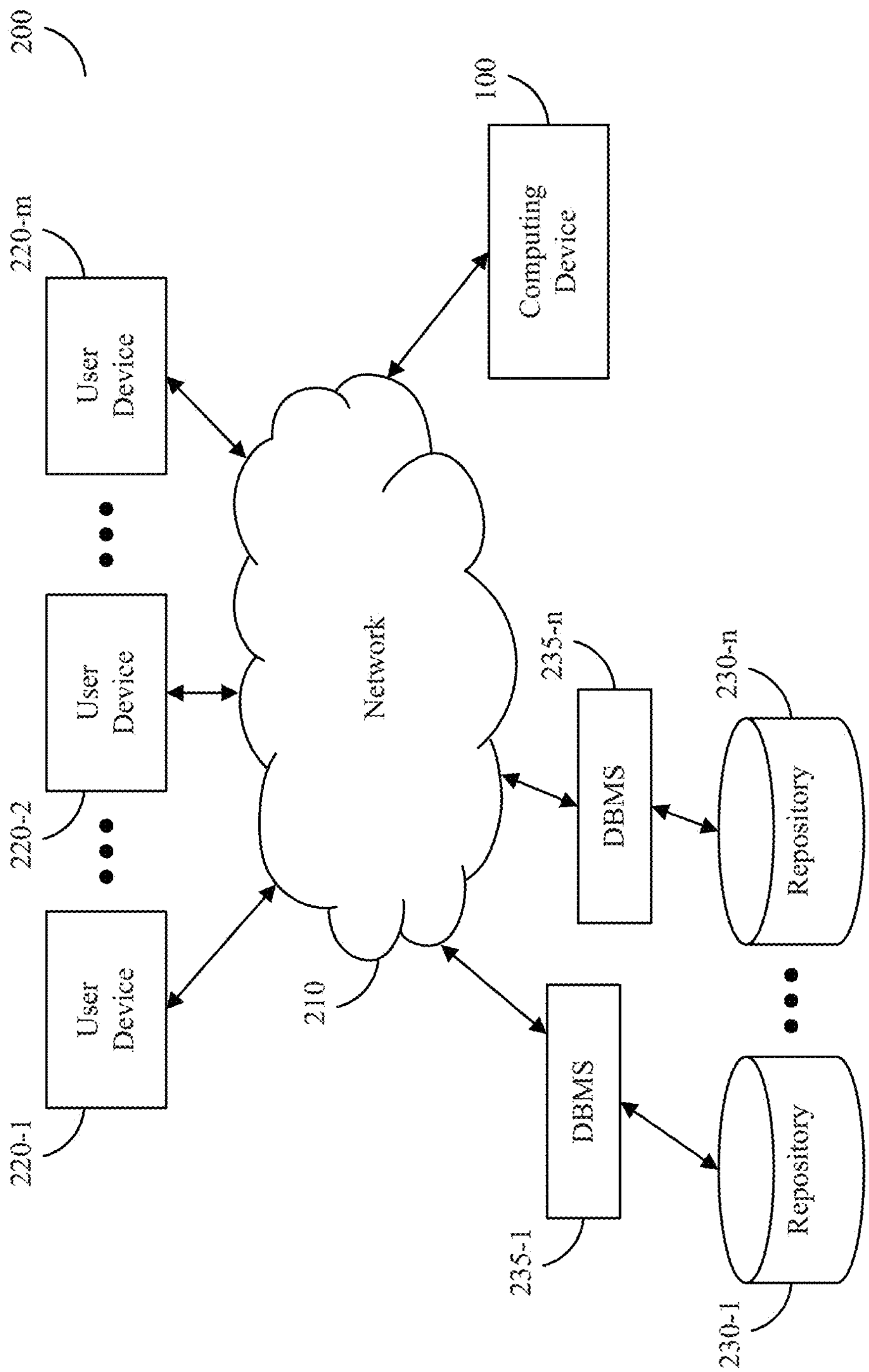
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-*m*, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-*n*, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-*n*. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may relate to a system for identifying data types in customized headings, including methods, systems, devices, and computer readable media. For ease of discussion, a system is described below, with the understanding that aspects of the system apply equally to non-transitory computer readable media, methods, and devices. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In a data management platform, it may be important for users to customize headings of rows and headings of various tables and have selectable options for values for an associated cell of the customizable heading that are specific to particular customized headings and automatically catered based on the recognized and customized heading to comply with user needs and customization of data management. Further, it may be valuable for users to create tables unique to their specifications. By customizing rows and headings of tables and being provided selectable options in response to customization, the user may experience various efficiencies to their business or personal requirements. Automatic identification of customization of multiple headings and providing selectable options for better use across multiple boards can be a difficult task. Merely using a pen and paper to track changes to hundreds of boards would result in mistakes and multiple headings being ignored and merely populating tables creates inefficiencies in workflows and data processing. The challenges addressed herein do not suit themselves to mental organizational tasks, requiring the unconventional solutions described herein.

Therefore, there is a need for unconventional approaches to enable a user to customize row headings or column headings and receive selectable options for values that are specific to the meaning of the customized headings for input into an associated cell of the customizable headings. Accordingly, by performing a lookup in the system, some disclosed embodiments create efficiencies in identifying data types based on the semantic meaning of customized headings and providing selectable options specific to each of the customized headings. Additionally, the system described below may provide suggestions that create needed efficiencies when developing management systems by recognizing historical usage and providing more accurate data inputs.

Aspects of this disclosure may include identifying data types in customized headings. A customized heading may include a non-preset value that is input for a heading. For example, a customized heading may be generated according to user preference. While the customized heading may be stored for later use, the original generation of the heading was customized. Identifying data types may include making a determination of a category of data based on characteristics of the data or from a customized heading. For example, when data may relate to money, the system may identify the data type as monetary based on an analysis that data contained in a cell contains numbers and a currency symbol. The system may also make this determination based on semantic analysis of a heading associated with a cell and recognizing that the cell is associated with a monetary data type because the heading includes key words related to money, such as text recognition of words relating to money (e.g., "USD," "Dollars," or "Euros") or recognition of symbols (e.g., $, €, ¥, or £) or a combination thereof. Other data types may include any other type of information, such as a status, calendar information, address, contact information, messages, or any other type of information that may be contained in a table.

Some embodiments may include displaying a table (e.g., which may also be referred to as a board or may be included as part of a board) having at least one customizable row heading or column heading. Displaying a table may include presenting a collection of data on a projector or display (e.g., on a touchscreen, monitor, AR/VR headset, or other display), as discussed previously. A table may be an organized collection of stored data. For example, a table may include a series of cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, may include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table. A display may include any interface such as a graphical user interface, a computer screen, projector, or any other electronic device for a visual presentation of data. At least one processor may be configured to present a table via a display if at least one processor outputs signals which result in a table being presented via the display.

A customizable row heading may include a label, tag, title, or any words associated with a row that is capable of being edited or input by a user of a client device or interface (e.g., through a keyboard). A customizable row heading may include any text a user may insert. By way of one example, a user may change a customizable row heading (e.g., name of an item/row) from "Item 1" to "Launch Project." Further, a user may change a customizable row heading from "Row" to "Patent Application Timeline," from "Task" to "Creative Mission," from "Customer" to "Former Client," from "Employee" to "Shareholder," from "Campaign" to "Kate's Project." In other examples, a user may change a customizable row heading that is blank and input any customized heading in place of the blank heading. In some embodiments, the row may represent something a user is managing in a board. Thus, the customizable row heading may be changed to portray exactly what the user is managing (e.g., personalizing the heading of a project, customer list, employee, or campaign). A user may be enabled to also customize activatable elements to generate additional rows, based on the customized row heading. For example, a customized activatable element such as a customized button may be associated with a customized row heading. In this way, each time the customized button is activated to insert a new row, that row follows the customization of the customized row heading. By way of one example, a system may provide an activatable element to generate or otherwise add a new row bearing the default label "New Item," such that each added row bears the "New Item" designation. However, when a user customizes the row heading to instead default to a "New Customer" label, every time the user activates the customized button, a new row may be added bearing the customized "New Customer" heading.

A customizable column heading may include a label, tag, title, or any words associated with a column that is capable of being edited or input by a user of a client device or interface (e.g., through a keyboard). A customizable column heading may include any text a user may insert. Some examples of column headings may include a people column, status column, timeline column, or any column name that may be added (either preset column from a column store or empty column). Some examples of the customizable column headings may include changing the heading of a column from "Person" to "Participants," from "Status" to "Priority," from "Date" to "Time in EST," from "Timeline" to "Revenue," from "Location" to "Project Location," or from "Status" to "Assignee." In another example, a user may change a name of a column from "Status" to "Project Deadline." In some embodiments, a user may customize a header, board name, column name, or row name, or cell name. In other examples, a user may change a customizable row heading that is blank and input any customized heading in place of the blank heading.

Figure 3:
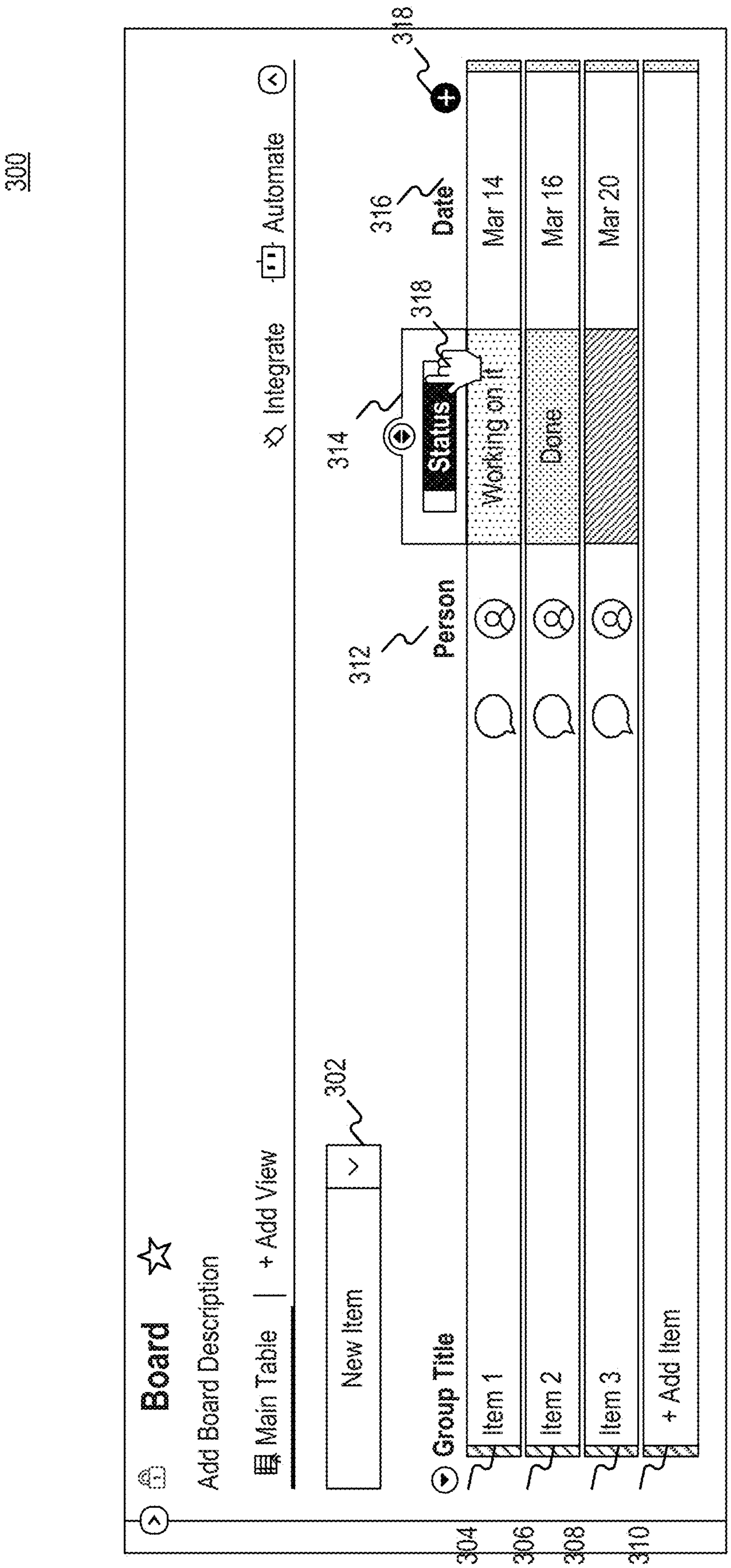
FIG. 3 illustrates a first example of an interface, consistent with some embodiments of the present disclosure.

By way of one example illustrated in FIG. 3, board 300 includes an interface displaying customizable column headings and row headings and enabling a user to customize the column headings or row headings. FIG. 3 illustrates a table having at least one customizable row heading or column heading. Specifically, board 300 includes item 304, item 306, item 308, and "add item" button 310 to add new rows or items to board 300 ("new item" button 302 may have the same functionality as "add item" button 310). In some embodiments, item 304, item 306, item 308 may have customizable row headings enabling a user to customize the heading or title of the row. For example, a user may change the title of item 304 from "Item 1" to "Marketing Initiative Spring 2020." Additionally, a user may change the title of item 306 from "Item 2" to "Marketing Initiative Fall 2020." Further, a user may change the title of item 308 from "Item 3" to "Marketing Initiative Spring 2021."

FIG. 3 illustrates displaying a table having at least one customizable row heading or column heading where users may edit text fields to any desired text. Specifically, board 300 includes column 312, column 314, column 316, and "add column" button 318 to add new columns to board 300. In some embodiments, column 312, column 314, and column 316 may have customizable column headings enabling a user to customize the title or heading of the column. For example, a user may change the title of column 312 from "Person" to "Requester." Additionally, a user may change the title of column 314 from "Status" to "Channel." Further, a user may change the title of column 316 from "Date" to "Deadline." As shown in FIG. 3, a user may click on column 314 with pointer 318 and change the title of column 314 from "Status" to any desired text.

Figure 4:
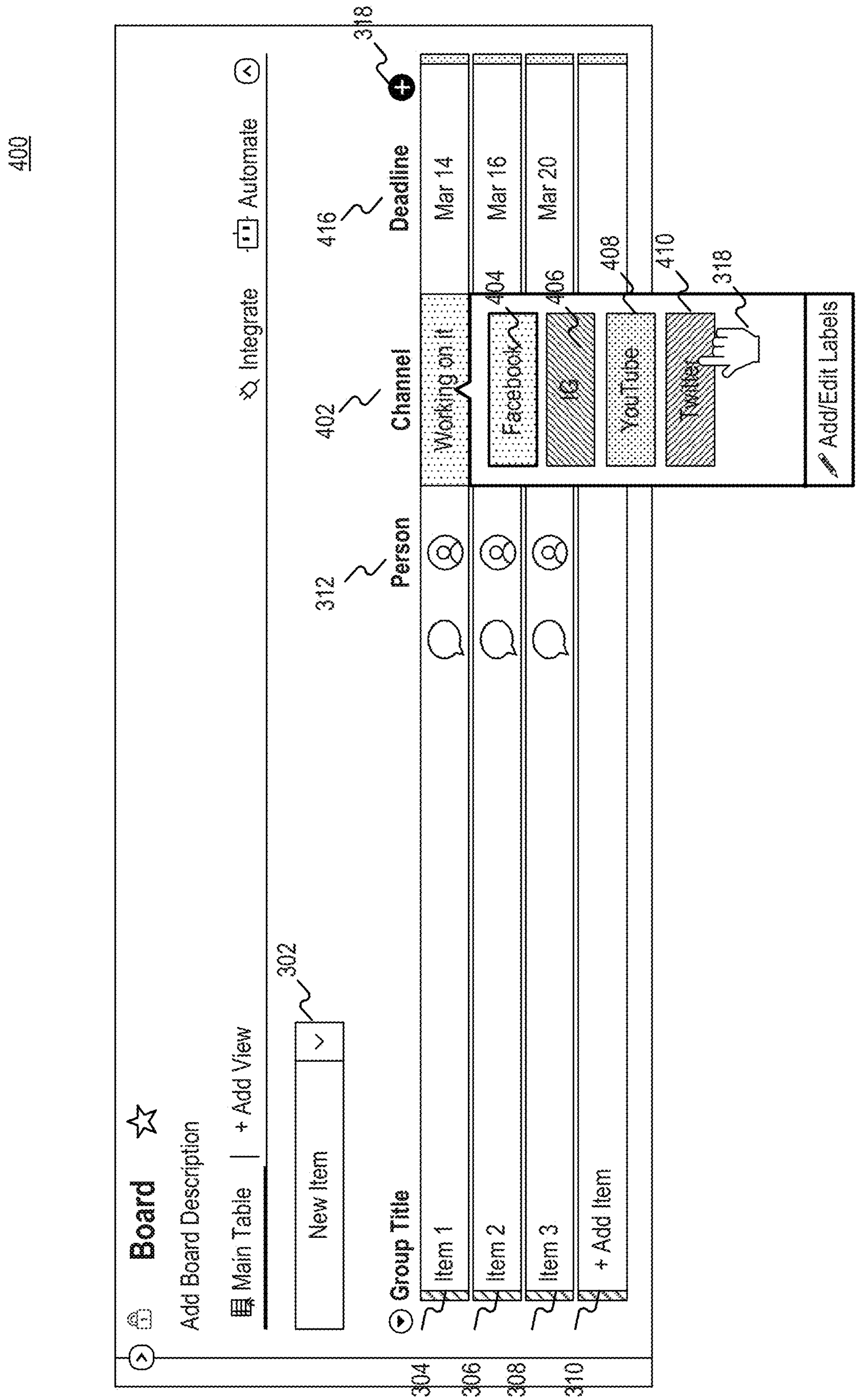
FIG. 4 illustrates a second example of a customizable interface, consistent with some embodiments of the present disclosure.

FIG. 4 illustrates a second example of an interface displaying selectable options for values for an associated cell of the customized column heading of FIG. 3, consistent with some embodiments of the present disclosure.

Aspects of this disclosure may include receiving an insertion of a customized name for the at least one customizable row heading or column heading. An insertion of a customized name may include any addition or introduction of data (e.g., alphanumeric, graphical, or combination thereof), a deletion of data, or rearrangement of data. The system may receive the insertion of a customized name manually from a user through an interface, or the insertion may be received automatically in response to a change in data in the system. By way of one example, the system may receive an input from a user changing a row heading or column heading to a customized name. The system may recognize the customized text in the column heading or row heading and store it in a database. Where the customized heading is mirrored in other boards, the mirrored customized headings may automatically change in response to a change in any instance of the customized heading in a board. Aspects of this disclosure may include receiving the insertion of the customized name using alphanumeric keystrokes. Alphanumeric keystrokes may include a depression of a key on an alphanumeric keyboard or selections made on a digital alphanumeric keyboard or touchscreen. The alphanumeric keystrokes are not limited to any language (e.g., English, Chinese, Japanese, French, Hebrew) or limited to individual keystrokes (e.g., gestures indicating entire words, rather than individual letters). By way of one example, the user may type the customized name using a physical keyboard or through a digital keyboard on a touchscreen.

As illustrated in FIG. 3, a user may insert a customized name or title for column 312 changing "Person" to "Requester" or insert a customized name for column 314 changing "Status" to "Channel," as shown in FIG. 4.

Some embodiments may include receiving an insertion of a customized name from a list of predefined customized names. A list of predefined customized names may include catalog or directory of customized names. By way of one example, instead of typing a new customized name, the system may provide a pop up with various names (e.g., previously inserted, customized names) for insertion as suggestions (sometimes because the user typed it in another cell in another column as a customized name). For example, if the user changed "Due Date" to "Project Due Date" in one column, the system may suggest changing "Item 1" to "Project" or changing "Status" to "Project Status" as a result of recognizing that the user is likely working on a "Project." Or, if the user changed "Due Date" to "Project Due Date" in one column in a first board, the system may suggest changing "Due Date" to "Project Due Date" in one column in a second board.

Aspects of some embodiments of this disclosure may include performing a lookup of an inserted customized name to identify a data type associated with the inserted customized name. Performing a lookup may include any indexing, processing, or operation to search in a data structure or data in a repository. In some embodiments, the lookup may be done via a preset repository or via a database with dynamic data. Access to the lookup may be restricted and the system may transmit a "yes" or "no" indication (or any other indication) to indicate whether the system is given authorization to perform a lookup of specific information. In this way, the system does not necessarily receive information about the customized name according to authorization settings. In some embodiments, the system may store a close list of keywords that is concerned with various areas of industry. For example, a repository may store fifty common words within the marketing industry to determine if an inserted customized name relates to marketing. The repository may store words in clusters or categories related to Customer Relationship Management (CRM), Research and Development (R&D), Information Technology (IT), Project Management Office (PMO), Legal, Human Resources (HR), and other fields. The stored words may change based on backend code checking for common names relating to an industry.

A data type may include pre-defined kinds of data associated with a column or row, as discussed previously above. For example, a data type may be a column type. Some column types include "People," "Status," "Timeline," and "Due Date." By way of one example, if a user inserts "Launch Date" in place of "Item 1," the system may recognize the customized text in the column heading and perform a lookup to determine a data type associated with the inserted customized name. The system may identify that the inserted customized name (Launch Date) relates to a "Date" data type. In response to the identification of the data type, the system may provide particular suggestions related to the data type such as an option to select a date from a calendar or options to input dates in a calendar format (e.g., Day/Month/Year). Further, the system may identify that the inserted customized name (Launch Date) relates to the Product Development or Project Management industry. The system may further suggest adding additional columns related to the customized text such as "Return on Investment," "Customer Satisfaction," "Actual Cost," "Cost Variance," "Cost Performance," and any other Product Development or Project Management industry categories that may be relevant to the customized heading.

By way of one example, if a user inserts "Litigation case" in place of "Item 1," the system may recognize the customized text in the row heading and perform a lookup to determine a data type associated with the inserted customized name. The system may identify that the inserted customized name (Litigation case) relates to an "item" data type. Further, the system may identify that the inserted customized name (Litigation case) relates to the Legal industry. The system may further suggest adding columns related to the legal industry such as "Law Firm," "Billing Rate," "Partner," "Associate," "Paralegal," and any other legal related categories.

In some embodiments, the system may scan different areas of a board to determine if the board is related to a specific use case (e.g., Customer Relationship Management (CRM), Research and Development (R&D), Information Technology (IT), Project Management Office (PMO), Legal, Human Resources (HR), and other fields) and provide suggestions for how to adapt the board (adding rows or columns, changing names of rows or columns, setting up automations and integrations) for more efficient use.

Aspects of this disclosure may include displaying, based on an identified data type, selectable options for values for an associated cell of an at least one customizable row heading or column heading. Displaying selectable options may include rendering digital buttons, selections, labels, or choices for a user to select. Selectable options may be available for any column type and may change based on whatever the column type is. Selectable options may be presented in any manner such as a drop down menu or list. The selectable options may populate in response to a user clicking a cell or may populate automatically after the system identifies a data type of at least one column or row.

Values may include any number, data, image, or text. For example, values for a column with a "status" data type may include "done," "working on it" and "finished" options for selection. Values for a column with a "Date" data type may include a calendar with multiple dates to select from. Values for a column with a "Person" data type may include images of people or names listed to select from.

In some embodiments, based on user customization (header or row customization, board name, column name, or row name), the system may provide a column suggestion, row suggestion, cell suggestion (of any row or any column), automation suggestion (e.g., if there is a new item, email Project Manager), or integration suggestion (e.g., integrating a third-party application—if there is a new item, pull information from Outlook calendar to insert into the item's status cell). By way of one example, if the user changes the column title to "In progress" in the heading, the system may recognize that it is a "status" data type and the system may then provide the user with pre-set options of "done" "stuck" and "in progress" as selectable options.

In some other embodiments, if a user changes a customizable column heading to "marketing campaign 2020," the board may trigger a notification, menu, or indication. The notification may state, for example, "we noticed you are building board directed to marketing activities, let me show you how to better your experience" and provide a selectable option to add a column that may be helpful to users in the marketing industry. Or, in some other embodiments, the notification may be suggestions to provide a varied board directed to a better experience based on the information inserted by the user. Another notification may be a suggestion to use Facebook advertisement integrations to input data from Facebook.

In some other embodiments, when a user inserts a title for a column on a board, the system may recognize that the board being built is a board that can fit to a template. The system may offer certain column suggestions rather than offering the full template (e.g., "Add this column"). If it is status column, the system may provide selectable options and values similar to those of the template. These system suggestions can spare the user time in building the board.

In some embodiments, displaying the selectable options includes displaying a drop down menu of options. For example, the selectable options may be provided to the user in a drop down menu. A drop down menu may include a picklist that allows a user to choose a value from a list. The selectable options in the drop down menu may populate in response to a user clicking a cell or may populate automatically after identifying a data type.

By way of one example as illustrated in FIG. 4, board 400 includes an interface displaying selectable options for values for an associated cell of a customized column heading. FIG. 4 illustrates a table having a customized column heading where a user customized column 402 from having a title of "Status" (shown in FIG. 3) to "Channel." As a result of the user inserting the customized column heading, the system may identify the customized name for that heading and perform a lookup to identify a data type associated with the customized name (the system may recognize a "Social Media" data type). As shown in FIG. 4, the system displays four selectable options for values for an associated cell of the customized column heading in a drop down menu including Facebook selectable option button 404, IG selectable option button 406, YouTube selectable option button 408, and Twitter selectable option 410. A user may select any of the selectable options using a cursor 318 to click the buttons in the drop down menu.

Aspects of this disclosure may further include, displaying selectable options that may include values that may be displayed in at least one button. A button may include any physical or digitally rendered element that sends a signal to indicate a selection. For example, a digital button may be associated with an option for insertion into an associated cell, as discussed previously above.

FIG. 4 shows a presentation of selection options that are each displayed in at least one button, as shown by Facebook selectable option button 404, IG selectable option button 406, YouTube selectable option button 408, and Twitter selectable option 410 of FIG. 4. Values for a column with a "Social Media" data type may include "Instagram," "YouTube," "Facebook," "Twitter," or any other value that is related to social media.

Some embodiments may include enabling selection of at least one option of the selectable options. Enabling selection may include allowing a user to choose something. By way of one example, a system may have an interface that is clickable (e.g., using a pointer or cursor as previously described above). In some other embodiments, a system may allow for selection of an option by typing, touching, dragging, dropping, or using any mechanism to show a selection.

Aspects of this disclosure may include associating a selected option with an associated cell in at least one row or column associated with at least one customizable row heading or column heading. Associating the selected option with the associated cell may include linking the option or containing the option within the cell in the row/column with the customized heading. Further, associating the selected option may include displaying the selected option in the corresponding cell. By way of one example, a board may have various rows of items and columns. When a user adds a "status" column from the column store, the fixed labels would be "done," "working on it," and "stuck." However, if the user changes the status column to have a customized column heading to something related to marketing, the system may provide labels (or selectable options for values an associated cell of the customized column) that are the same as the system's marketing label template. Once the user selects the customized label (or selected option) provided by the system, the system associates the selected option with the cell in the column associated with the customized column heading.

In some exemplary embodiments as illustrated in FIG. 4, if the system determines the user changed the name of a column to "Channel," in response to this determination, the selectable options for cells of that column will be changed to options like "Facebook," "Instagram," and "YouTube."

In some embodiments, the at least one processor may be configured to receive an insertion of a second customized name for a second customizable row heading or column heading. A second customized name may include a customized name that is different from the first customized name, without any determination of order or priority. By way of one example, a user may insert two customized column headings or two customized row headings. The user is not necessarily confined to inserting a single or two customized headings, since the user may insert any number of customized headings. In another example, the user may insert a first customized row heading in addition to a first customized column heading. In another example, the user may insert a first customized column heading in addition to a first customized row heading.

By way of an example illustrated in FIG. 3, a user may insert "Marketing Initiative Spring 2020" as the title or customized heading of item 304 in place of "Item 1." Then, the user may change the title of item 306 from "Item 2" to "Marketing Initiative Fall 2020."

By way of another example, illustrated in FIG. 3, user may insert "Marketing Initiative Spring 2020" as the title or customized heading of item 304 in place of "Item 1." Then, the user may change the title of column 312 from "Person" to "Website Metrics."

By way of another example, illustrated in FIG. 3, user may insert "Website Metrics" as the title or customized heading of column 312 in place of "Person." Additionally, a user may change the title of column 314 from "Status" to "Channel."

Aspects of this disclosure may include performing a second lookup of the second customized name in combination with the previously inserted customized name to identify a second data type associated with the second customized name. By way of one example, the system may perform multiple look ups for multiple customized names. In one embodiment, the second lookup may be a lookup using both the first and second customized names.

In some embodiments, the lookup may be contextual. Further, in some embodiments, the system may gain context from the first customized heading. By way of one example, a user may start typing in Chinese in one column and the system may recognize (by a lookup) the language in the first column. In response to the recognition, the system may suggest the date column be customized to Chinese format (e.g., second column gets context from first column).

By way of another example, if a user changed one column heading to "Project," then the system may determine that the project may have a deadline and the system may recommend changing the "Date" to be a "Due Date" column rather than just simply "Date."

Aspects of this disclosure may include displaying selectable options for second values for a second associated cell of the second customizable row heading or column heading.

By way of one example illustrated in FIG. 4, board 400 includes an interface displaying selectable options for values for an associated cell of a customized column heading. FIG. 4 illustrates a table having a customized column heading where a user customized column 402 from having a title of "Status" (shown in FIG. 3) to "Channel." As a result of the user inserting the customized column heading, the system may identify the customized name for that heading and perform a lookup to identify a data type associated with the customized name (the system may recognize a "Social Media" data type). Then, FIG. 3 illustrates a table displaying, based on the identified data type, selectable options for values for an associated cell of the at least one customizable row heading or column heading. As shown in FIG. 4, the system displays four selectable options for values for an associated cell of the customized column heading in a drop down menu including Facebook selectable option button 404. Additionally, the user may customize column 316 of FIG. 3 to have a customized column heading of "Deadline" 416 rather than "Date," as shown in FIG. 4. Then, the system may recognize the customized name for that heading and perform a lookup to identify a data type associated with the customized name (the system may recognize a "People" data type). In response, the system may display, based on the identified data type of "People," selectable options for values for a second associated cell of the at least one second customizable row heading or column heading. The system may then display images or text representing various selectable options for values for a second associated cell of the second customized column heading.

Some exemplary embodiments may include enabling selection of one of the second values. By way of one example, a system may have an interface that is clickable (using a pointer or cursor as discussed previously) to select the second values. In some embodiments, a system may allow for selection of the second value by typing, touching, dragging, dropping, or using any mechanism to show a selection. Some other embodiments may include populating the second associated cell with the second value upon selection of the second value, consistent with some embodiments of the disclosure discussed above. By way of one example, clicking the second value may populate the second associated cell with the selected value.

Figure 5:
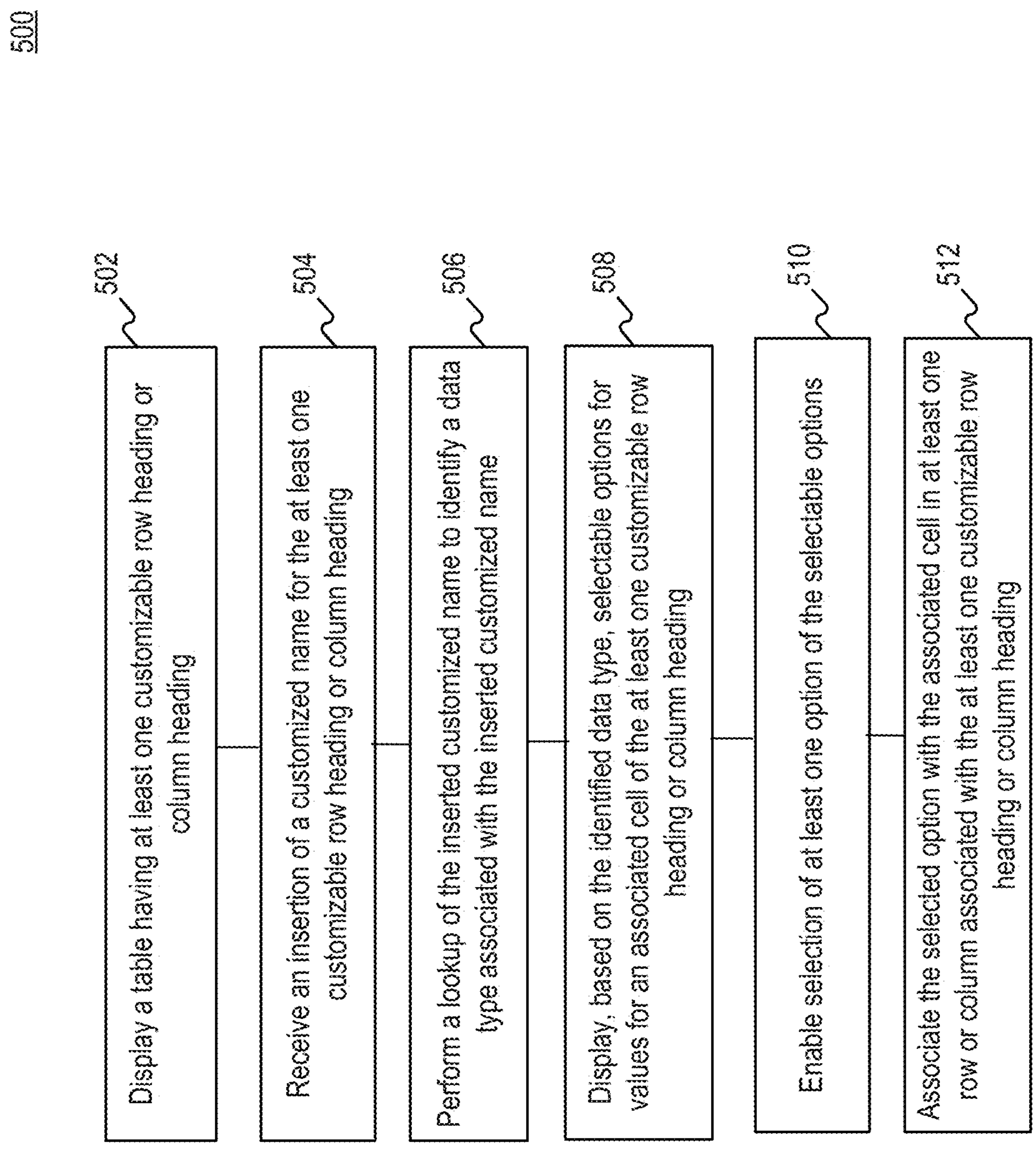
FIG. 5 illustrates a block diagram of method, consistent with some embodiments of the present disclosure.

FIG. 5 illustrates a block diagram of method 500 performed by a processor of a computer readable medium containing instructions, consistent with some disclosed embodiments. In some embodiments, the method may include the following steps:

Block 502: Display a table having at least one customizable row heading or column heading. In some embodiments, a user may access a data management platform and view tables with rows, columns, and cells to manage data. The user may change titles of any row or column.

Block 504: Receive an insertion of a customized name for the at least one customizable row heading or column heading. In some embodiments, the system may receive an altered name for a title of a column or row.

Block 506: Perform a lookup of the inserted customized name to identify a data type associated with the inserted customized name. In some embodiments, the system may search a database for a datatype related to the inserted title.

Block 508: Display, based on the identified data type, selectable options for values for an associated cell of the at least one customizable row heading or column heading. In some embodiments, the system may present a menu of options for cell values in the column or row with the customized title based on the identified data type.

Block 510: Enable selection of at least one option of the selectable options. In some embodiments, the system may allow a user to select within the menu of options using buttons.

Block 512: Associate the selected option with the associated cell in at least one row or column associated with the at least one customizable row heading or column heading. In some embodiments, the system may associate the option selected with a cell in the column or row with the customized title.

Aspects of this disclosure may relate to generating a hybrid table template pre-populated with data pulled from preexisting table, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

Aspects of this disclosure may include storing a customized hybrid table-template definition. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A table template may be a rule, form, framework, or layout that defines the structure of a table. The table template may be customized in as much as it may be modified or built according to individual or personal specifications or preference, or may be built for a specific purpose. For example, a template may be specifically designed for a particular business or class of businesses, or for a particular vocation, situation, trade, line of work, or other undertaking. The table template may be hybrid in that it may include being from two or more states of being or may be combined from multiple sources or formats. For example, it may be a merger of types, arrangements, forms, compositions, layouts, structures, or systems. The table-template definition may characterize the template, specifying one or more of the template's structure, substructure, column headings, row headings, column interrelationships, interrelationships with other templates, or any other feature of the table-template. The definition may include a statement or a rule providing a distinctness in structure or presentation, or a combination thereof. For example, a customized hybrid table-template definition may include a rule or structure for a preselected format of a table. Additionally, a customized hybrid table-template definition may also include data-population rules associated with cells in the table (e.g., cells may contain predefined links to data in other tables). In some embodiments, when a table template is selected, a new table may be automatically generated with not only predefined rows and columns, but also with real-time data, in some of the cells, pulled from other preexisting tables. The customized hybrid table-template definition may be stored, meaning, for example, that it may be saved for later access. Such storage may occur in memory, regardless of the location and/or form of that memory. The definition may be stored by a user or it may be stored by a system provider or third-party provider. A customized template could be stored for use by a particular individual, a particular group of individuals, a particular company, or a particular industry or class of individuals.

Consistent with some aspects of this disclosure, a hybrid table-template definition may include a table format and at least one pre-population rule linking at least one cell of the hybrid table template with at least one cell of a preexisting table populated with data. A table format may include an arrangement or organization. In some instances, a table format may involve a particular predefined layout or arrangement of columns, rows, sub-columns and/or sub-rows. In other instances, the table format may specify at least one a cell type. A pre-population rule may include a set of conditions used to define data that may populate cells. Populated data may include any value, information, or entry that is associated with a data structure. For example, populated data may include date ranges, labels, financial information, names, individuals, contact information, location information, or any other data relevant to an associated endeavor.

In some embodiments, a pre-population rule may link at least one cell of a hybrid table template with at least one cell of a preexisting table that is already populated with data. A preexisting table may include any source of data (e.g., column, table, form, third party application in non-tabular format, third party application in tabular format, or any data structure). There may be different ways of populating data, whether from an original table or a setting, an external application, or internal application. For example, any data from any integrations with external applications can be used to populate at least one cell. Additionally, any data from another board can be a set value for populating one or more cells in another board.

In some embodiments, a user may generate a new board with default values including pre-defined columns and structures. The user may further choose which columns may be filled or populated with a default value. Automations and types of table views may also be copied as default values. In some embodiments, using a table format and pre-population rule may streamline table building, especially for users who generate multiple similar tables.

Figure 6:
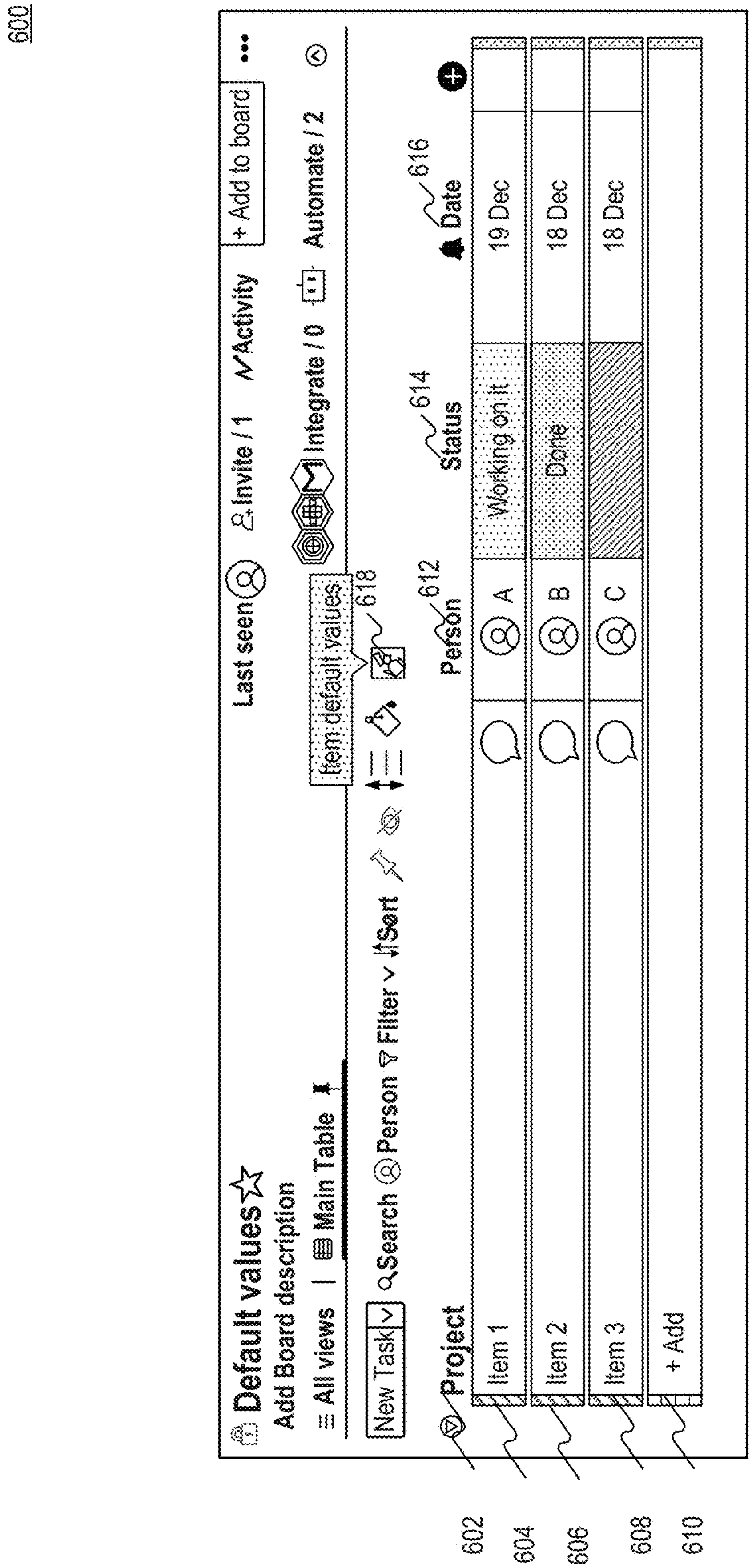
FIG. 6 illustrates an example of an interface with a first table containing various cells and a link to add and store a customized hybrid table template definition, consistent with some embodiments of the present disclosure.

By way of one example, board 600 of FIG. 6 presents a table (table 602) within a board. As illustrated in this example, there is a plurality of rows or items including "Item 1," 604, "Item 2," 606, and "Item 3," 608. Table 602 also includes a plurality of columns including Person column 612, Status column 614, and Date column 616. Additional columns and rows may be added by the user. Similarly, columns and rows maybe rearranged or removed by a user or the system.

As shown in FIG. 6, the cells of each item on table 602 are filled with data. For example, person cell of "Item 2," 606 is filled with Person B cell value/data. Status cell of "Item 2," 606 is filled with "Done" cell value/data. Date cell of "Item 2," 606 is filled with "18 December" cell value/data. Board 600 also includes an item default value icon 618, where a user may click to populate interface 700 of FIG. 7 and select default values for cells associated with a new item added to the table. Additionally, board 600 also includes add item icon 610, where a user may click to add a new item to board 600.

Figure 7:
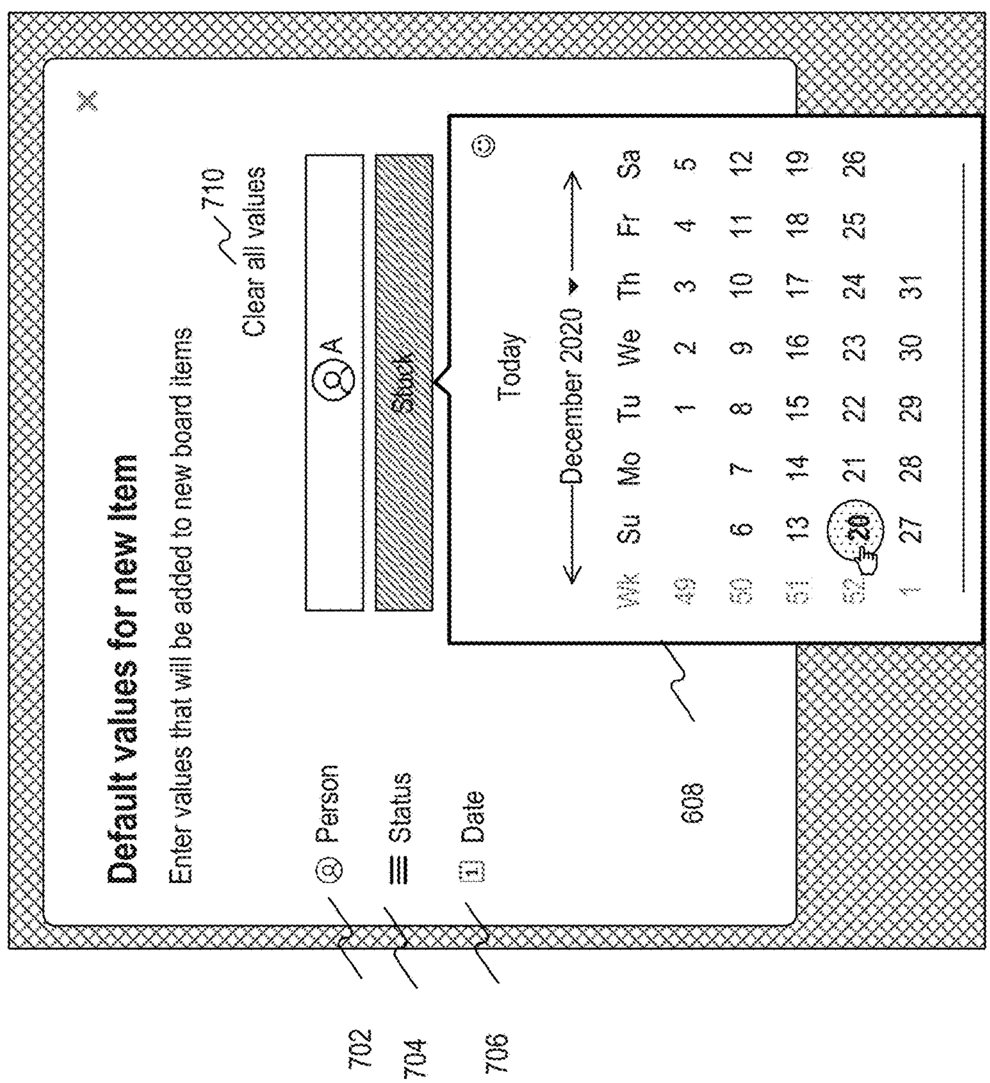
FIG. 7 illustrates an example of an interface for adding and storing a customized hybrid table template definition, consistent with some embodiments of the present disclosure.

Using interface 700 in FIG. 7, a user may define a hybrid table-template definition by selecting default values for new items added to a board. The default values selected generate the pre-population rules linking at least one cell of the hybrid table template with at least one cell of a preexisting table populated with data. Using interface 700 of FIG. 7, a user may also add new columns not originally on the table in order to change the table format.

In some embodiments with reference to FIG. 7, any values may be pre-populated. For example, a new board may be pre-populated partially (with just Person and Status cells) or fully (with all columns on a new board). In some other embodiments, a pre-population rule may be "Any new table starts with my name in the first column" to result in population of a name in the first column of any subsequent table that is generated.

Using interface 700 of FIG. 7, a user may enter default values that will be added to new board items. For example, the user may select cell values for Person 702, Status 704, and Date 706 using interface 700 that will populate on the board each time a new item is added, thereby generating a hybrid table-template definition that combines partial population of data with an otherwise empty table. The user may also use "Clear all values" icon 710 to clear the cell values associated with Person 702, Status 704, and Date 706. Interface 700 illustrates that the user selected "person A" for Person 702, "Stuck" for Status 704, and is currently selecting "Dec. 20, 2020" for Date 706. The user may save changes of selected default values and return to the table shown in FIG. 6. Then, if the user clicks add item icon 610 of FIG. 6 or FIG. 8, a new item is generated and each of the cells associated with that item (person, status, and date) are populated with values that were previously set using interface 700 of FIG. 7. For example, as shown on interface 800 of FIG. 8, after the new item is generated, default values are inserted into appropriate cells, for example, person cell 804 is filled with "person A," status cell 806 is filled with "stuck," and date cell 808 is filled with "20 December."

In some embodiments, if the configuration of the default items occur after there are already rows on the table, the configuration might not affect preexisting rows. In some embodiments, default values may be re-configured.

Aspects of this disclosure may involve at least one pre-population rule linking at least one cell of a hybrid table template with at least one cell of a preexisting table including a plurality of pre-population rules linking a plurality of cells from a plurality of preexisting tables with the hybrid table template. In some embodiments, there may be multiple pre-population rules linked from multiple tables. In some other embodiments, there may be two or more pre-population rules interacting with a single table. For example, a second pre-population rule generated from a second interface (different from interface 700) may link cells to a preexisting table at the same time as a first pre-population rule generated from interface 700.

In some embodiments, a hybrid table template may include a plurality of cells, a first portion of which may be linked to a preexisting table via a corresponding pre-population rule and a second portion of which may be unlinked to a preexisting table. As previously discussed, a pre-population rule may include a set of conditions used to define data that may populate cells. A corresponding pre-population rule may be one that is associated with a preexisting table, such as a default values table from which the pre-population rule draws information. A second portion may be unlinked to a preexisting table in that there are no such conditions. In some embodiments, some cells of the table may be filled with default values based on the association with the preexisting table and population rule while some cells of the table may remain empty or filled by other mechanisms (e.g., static default values that are not drawn from any preexisting table).

By way of example, using interface 70 of FIG. 7, a user selected "person A" for Person 702, "Stuck" for Status 704, and left Date 706 blank before saving changes of selected default values and returning to the table shown in FIG. 6. Then, if the user clicks add item icon 610 of FIG. 6 or FIG. 8, a new item is generated and each of the cells associated with that item (person, status) may be populated with values that were previously set using interface 700 of FIG. 7. However, cells associated with the date column will be left blank because no default value was selected for Date 706. Specifically, the first portion of cells (person and status column cells) are linked to a preexisting table via a corresponding pre-population rule (generated in FIG. 7) and a second portion of cells (date column cells) are unlinked to a preexisting table. In another example not shown, the second portion of cells (date column cells) could be populated with the date of adding that particular item, which draws information from an internal clock associated with the system. This exemplifies some other embodiments where the second portion of cells are unlinked to a preexisting table, but may still be populated by another mechanism.

Aspects of this disclosure may involve at least one pre-population rule drawing from at least one preexisting table at least one of a capacity, a count, an identity, a budget, variable numerical data, a timeline value, a status value, and a progress value. A count may include any numerical value or data indicating a tally. An identity may include any distinguishing information, value, or data (such as a person assignment). A budget may include any numerical value or data (e.g., numerical or graphical). Variable numerical data may include any numerical value or data that may be updated dynamically (e.g., periodically or in real time). A timeline value may include information associated with a date, time, or length of time (such as a due date) in a textual or graphical format. A status value may include any representative value (alphanumerical or graphical) or data (such as "done" or "working on it"). A progress value may include any numerical or graphical value (such as the amount of development in a project) that indicates an extent of completion associated with an item.

Aspects of this disclosure may include receiving a request to generate a new table using a hybrid table template definition. A request may include any indication either from a user or a system. The request may be to generate a new table that previously did not exist, using the hybrid table template definition, as previously described. The request may be received in response to a gesture or selection in an interface (e.g., physical device such as a mouse or keyboard, or digital activation through a virtual button).

Figure 8:
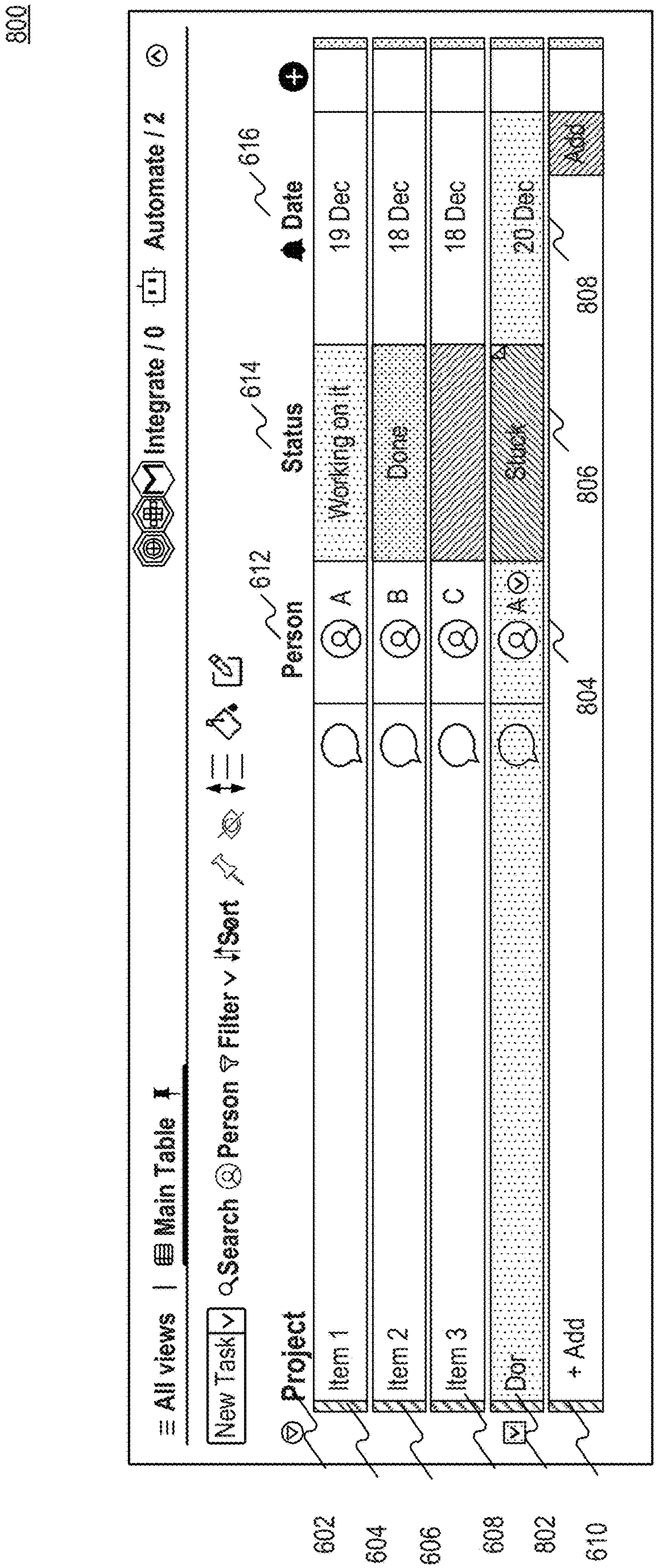
FIG. 8 illustrates an example of an interface for requesting to generate a new table using the hybrid table template definition, consistent with some embodiments of the present disclosure.

For example, a request may be received from a user clicking an "add item" icon 610 of FIG. 6 or FIG. 8 to generate the new item and fill cells associated with that item (person, status, and date) with values that were previously set using interface 700 of FIG. 7. In some embodiments, another button may be used to generate a new table. In yet some other embodiments, a condition being met (e.g., "when Status is Done") may cause an activation of a request to generate a new table.

Aspects of this disclosure may include a pre-population rule configured for dependency on other data in a new table, wherein pre-population may occur after other data is entered in the new table. Dependency on other data may include activating a function or action in response to a condition met (e.g., data population in a cell). For example, a pre-population rule may depend on the population of a date (e.g., an initial date) in a cell of the table before the system populates other cells with other dates (e.g., deadlines of sub-tasks based on the initial date).

Figure 11:
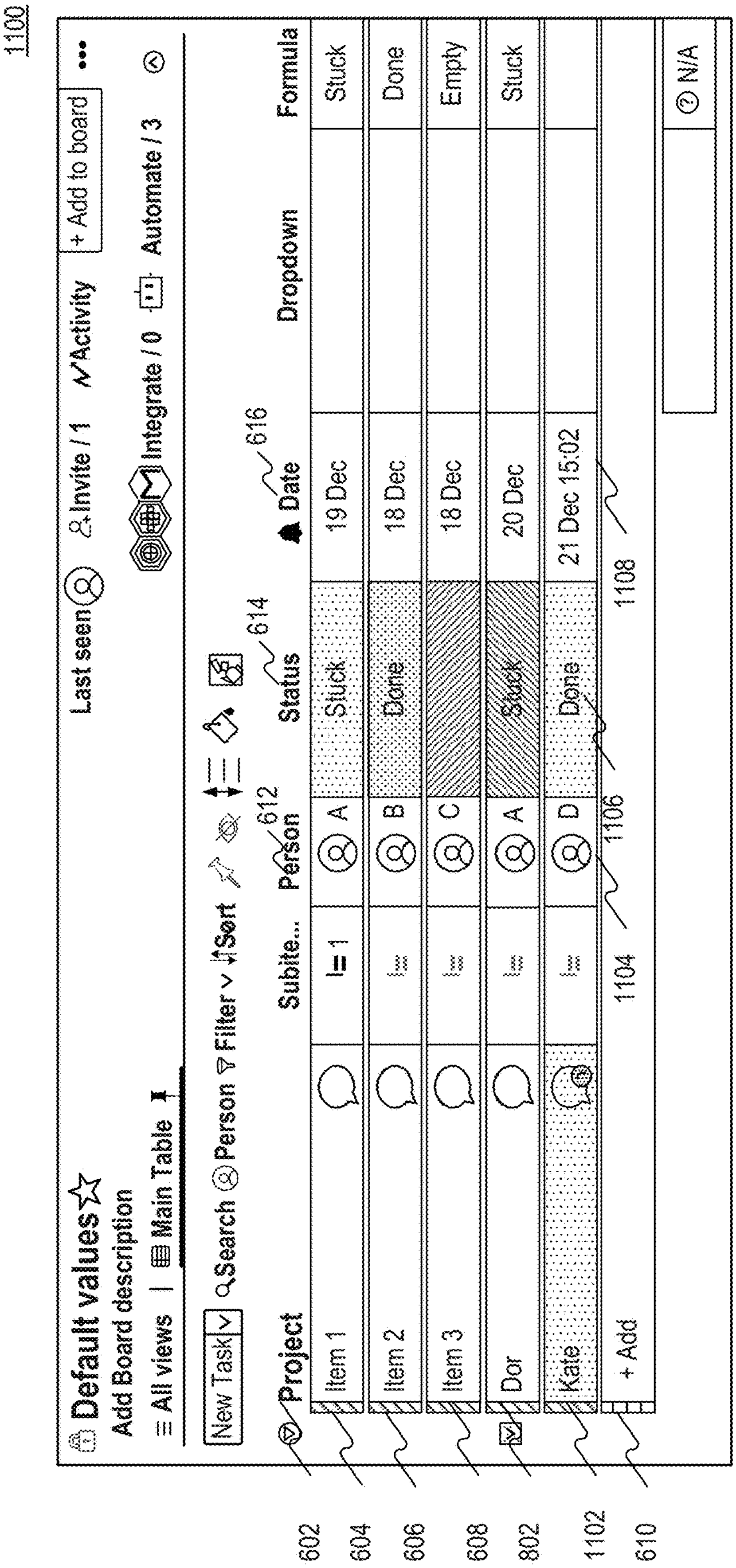
FIG. 11 illustrates an example of an interface generating the new table, consistent with some embodiments of the present disclosure.

In one example, in FIG. 11, pre-population occurs after other data is entered into the table. For example, FIG. 9 illustrates an example of an interface for adding and storing a customized hybrid table template definition, namely, adding a default value of "D" for "person" and a default value of "done" for "status."

In some embodiments, using interface 900 a user may select default values for new items added to a board. Specifically, a user may enter values that will be added to new board items. For example, the user may select cell values for some or all of Person 902, Status 904, Date 906, Dropdown 908, Formula 910, Agenda 912 (or other fields) using interface 900 that will populate on the board every time a new item is added. The user may also use "Clear all values" 916 to clear the cell values associated with Person 902, Status 904, Date 906, Dropdown 908, Formula 910, and Agenda 912. Interface 900 illustrates that the user selected "person D" for Person 902, "Done" for Status 904, and has not yet selected a default value date for Date 906. The user also has not selected default values for Dropdown 908, Formula 910, Agenda 912. The user may save changes of selected default values.

Figure 9:
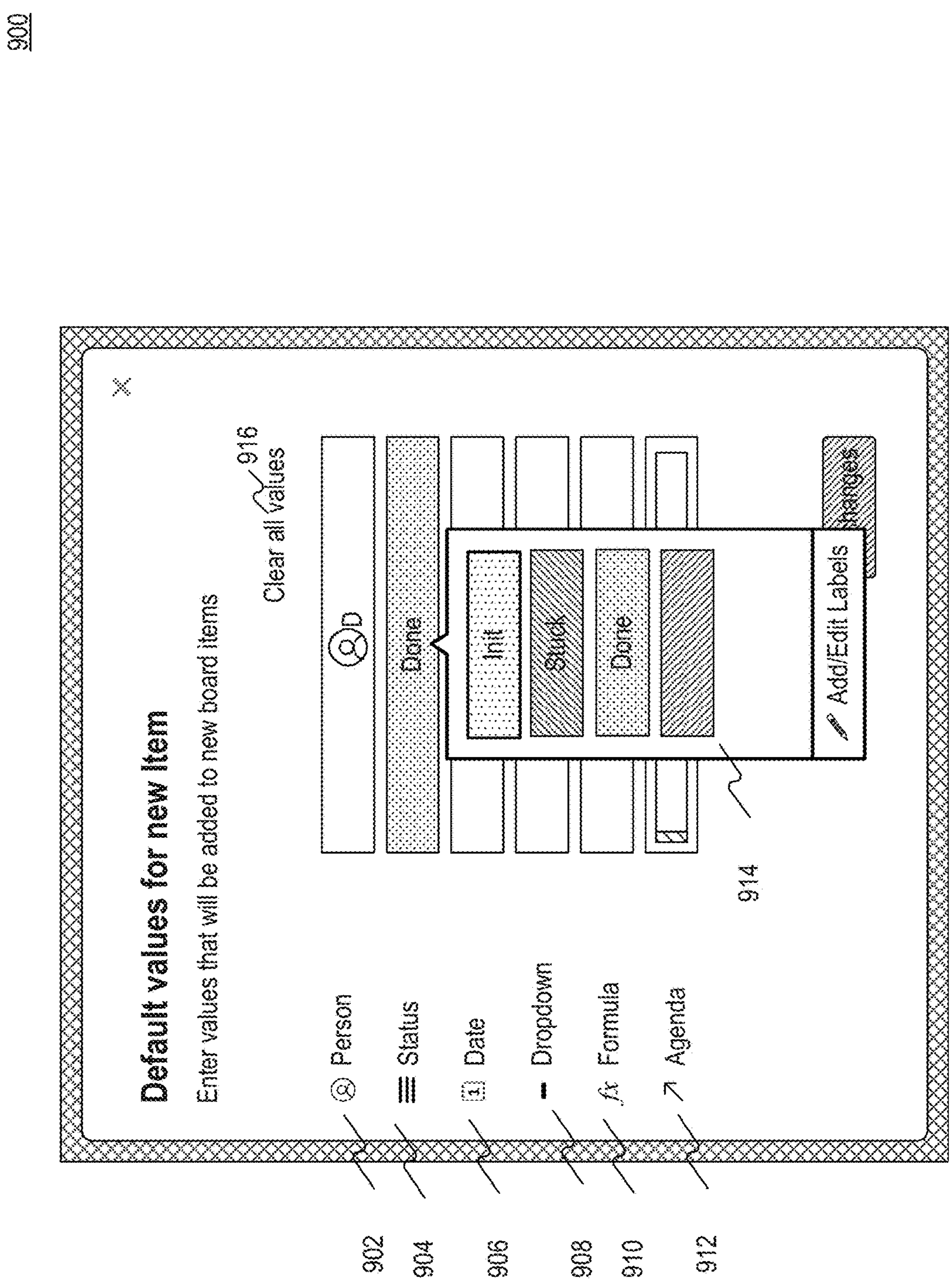
FIG. 9 illustrates a second example of an interface for adding and storing a customized hybrid table template definition, consistent with some embodiments of the present disclosure.
Figure 10:
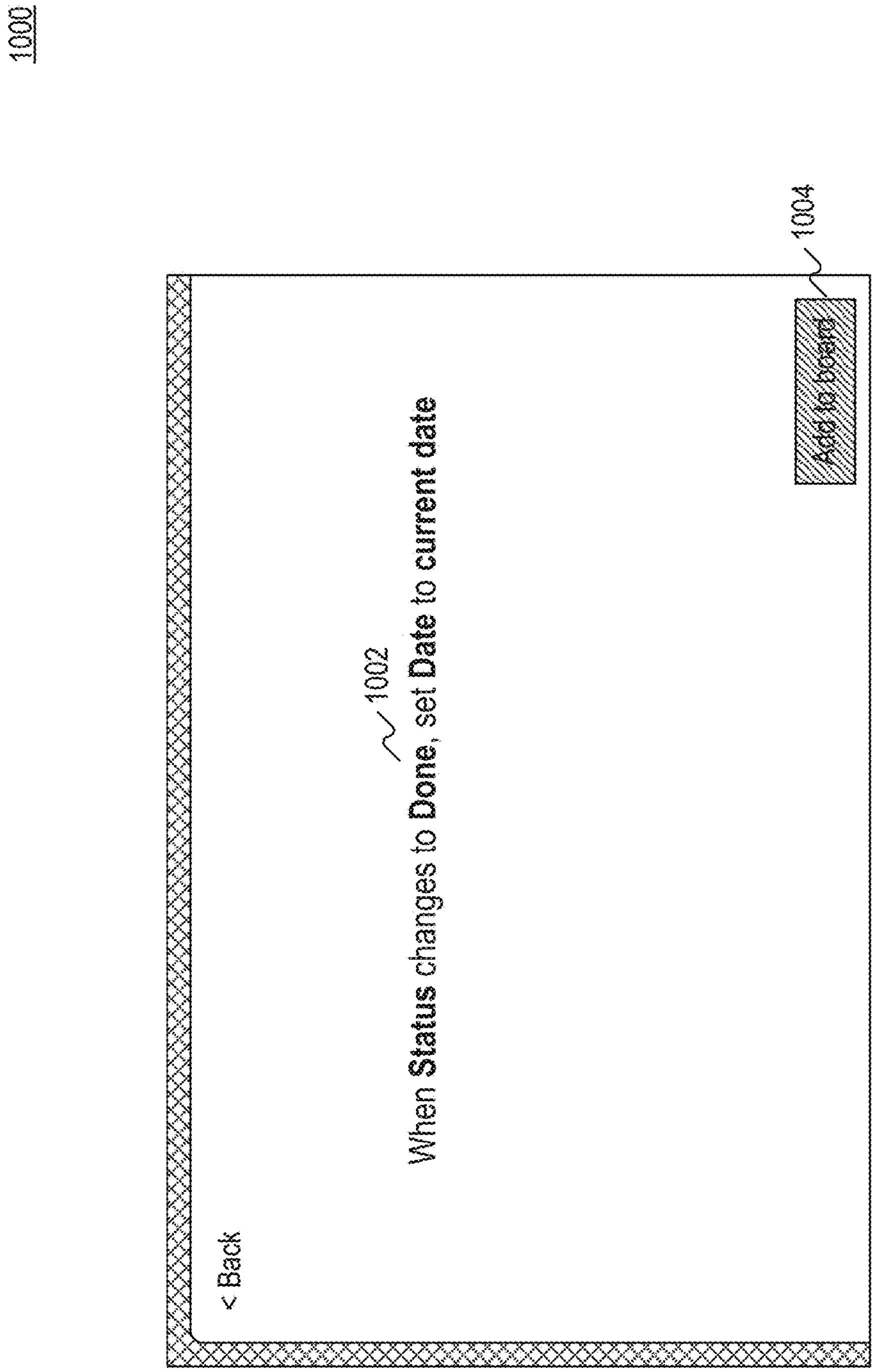
FIG. 10 illustrates an example of an interface for adding an automation that interacts with the stored customized hybrid table template definition defined in FIG. 9, consistent with some embodiments of the present disclosure.

Additionally, FIG. 10 illustrates an example of an interface for adding an automation that interacts with the stored customized hybrid table template definition defined in FIG. 9. Automation 1002 shown in FIG. 10 indicates that when a status changes to "done," a date will be sent to the current date (configured for dependency on other data in the new table).

If the user clicks add item icon 610 of FIG. 11, a new item is generated and each of the cells associated with that item (person and status) defined with default values are populated with values that were previously set using interface 900 of FIG. 9. Thus, in FIG. 11, when new item Kate 1102 is added, the "person" and "status" fields are filled with default values in accordance with the customized hybrid table template definition shown in FIG. 9. For example, as shown on interface 1100 of FIG. 11, after the new item is generated, person cell 1104 is filled with "person D" and status cell 1106 is filled with "done." The date, dropdown, and formula cells are not immediately filled because the user did not define default values for Date 906, Dropdown 908, Formula 910, and Agenda 912 on interface 900 of FIG. 9. However, because of the automation described with reference to FIG. 11, once data (Status changes to "Done") is entered into the "status" field of FIG. 11, pre-population occurs, and data is entered into the new table (date in the date field changes to the current date & time in accordance with the automation defined in FIG. 10). Accordingly, the pre-population in Date 1108 occurs only after other data (Status changes to "Done") is entered in the new table as a cascading default value.

In some embodiments, an automation may include "When the status changes to 'Done,' do 'something' on 'Date.'" For example, the system may send an email or text on the date that the status changes.

In some other embodiments, there may be conditional default values. For example, if X happens, the item will be generated with values A, B, C. If Y happens, the item will be generated with values D, E, F.

Aspects of this disclosure may include generating a new table following receipt of a request. In some embodiments, when a new item (row) on a board is generated, it may be automatically filled with pre-defined values. Generating may include following a link to access real-time cell data from a preexisting table, and migrating the real-time cell data to the new table. In some embodiments, real-time cell data may refer to data in the cell of the preexisting table at the time of the migration. Migrating the real-time cell data to the new table may include moving or copying data from one area to another area.

In some embodiments, generating a hybrid table template pre-populated with data pulled from preexisting tables may save manual work, especially for boards with many columns. For example, instead of configuring an automation for each column and setting each one to be triggered from row generation, all columns may be configured once as part of a dedicated user interface for this feature (e.g., When an item is added to the board, change status column to "Working on it;" when an item is added to the board, change Deadline column (a date type column) to a week from generation; when the default row values are generated, an automation is generated in the background; when a row is generated due to a separate automation or integration that triggered the row generation—the default values would be applied).

Aspects of this disclosure may involve real-time cell data being variable, wherein the at least one processor may be configured such that when the real-time data is updated in the preexisting table, an update automatically occurs via the link to the new table. Variable real-time cell data may include data that may change after migration, or data that may change as a result of any other update. When this happens, a link to the new table may enable an update to occur automatically. In some embodiments, default values may be re-configured after a change occurs.

Aspects of this disclosure may involve receiving a request to alter a stored hybrid table template definition based on data in the new table. In some embodiments, the stored hybrid table template definition may be modified by a user or system in response to new values in various cells. As a result, the stored hybrid table template may be stored in a modified state for later application. Aspects of this disclosure may include altering the stored hybrid table template definition based on a sub-selection of data in the new table. A sub-selection of data may include data of a cell beneath, within, or otherwise associated with a cell of the new table. In some embodiments, the stored hybrid table template definition may be modified by the user or system in response to new values or new selections in a portion of one or more cells.

Figure 12:
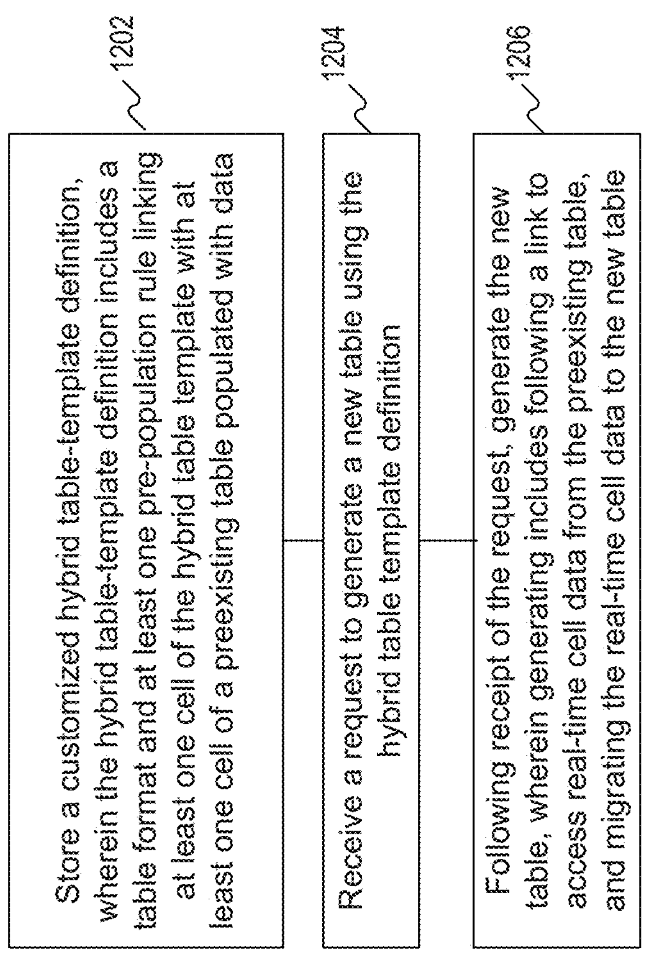
FIG. 12 illustrates a block diagram of method 1200 performed by a processor of a computer readable medium containing instructions, consistent with some embodiments of the present disclosure.

FIG. 12 illustrates a block diagram of method 1200 performed by a processor of a computer readable medium containing instructions, consistent with some disclosed embodiments. In some embodiments, the method may include three steps:

Block 1202: Store a customized hybrid table-template definition, wherein the hybrid table-template definition includes a table format and at least one pre-population rule linking at least one cell of the hybrid table template with at least one cell of a preexisting table populated with data. In some embodiments, a user may write a definition or make selections to generate a definition such as "When Status is Done, enter current Date."

Block 1204: Receive request to generate a new table using the hybrid table template definition. In some embodiments, the system may receive a selection from a user that triggers a hybrid table template definition to complete a function such as adding cell data to a table from a preexisting table.

Block 1206: Following receipt of the request, generate the new table, wherein generating includes following a link to access real-time cell data from the preexisting table, and migrating the real-time cell data to the new table. In some embodiments, the system may generate an updated table on a graphical user interface. The updated table may include cell data from preexisting tables.

Aspects of this disclosure may provide a technical solution to challenges associated with collaborative work systems. Some disclosed embodiments include methods, systems, devices, and computer-readable media. For ease of discussion, example system for representing data via a multi-structured table is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

As another example, some aspects of such system may be implemented as operations or program codes in a non-transitory computer-readable medium. The operations or program codes may be executed by at least one processor. Non-transitory computer readable mediums, as described previously, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for representing data via a multi-structured table having at least one processor (e.g., processor, processing circuit or other processing structure described herein) in collaborative work systems, including methods, devices, and computer-readable media. A multi-structured table may refer to one or more tables having a structure with a set number horizontal and vertical rows (e.g., rows and columns). A multi-structure table may also include a main table with a first structure and a sub-table with a second structure. A table may be in a form of a board, an array, a grid, a datasheet, a set of tabulated data, a set of comma separated values (CSV), a chart, a matrix, or any other two-dimensional or greater systematic arrangement of data. A row may be viewed as a range of cells, nodes, or any other defined length of data types that fully or partially extend across the table. A column may be viewed as a range of cells, nodes, or any other defined length of data types that extend transverse to the direction of a row in a table.

A structure may refer to the arrangement and organization of interrelated or unrelated elements containing data where the structure may include an array of tables, a hierarchy of tables (a cascade of one-to-may relationships), a network of tables featuring many-to-many links, or a lattice of table featuring connections between elements of the table. The structure of the one or more tables may be the same or different in the number of rows and/or columns. In addition, the cells in the rows and columns of a table may also contain an embedded or nested table or sub-table (e.g., a sub-board). The sub-table may also consist of a structure having the same or different number of rows and/or columns to other tables, or the main table containing the sub-table. The multi-structured table may refer to one or more separate tables with the same or different structure. Furthermore, the multi-structured table may have one or more sub-tables in cells with the same or different structure from one another or from non-sub-tables. For example, the multi-structured table may have a first group containing one or more tables having the same structure consisting of a set number of columns and rows, and a second group containing one or more tables with differing structures from one another. In addition, one or more cells of a table may contain a sub-table, which may be embedded, having a structure that may be the same or different from the tables in the multi-structured table.

Figure 13:
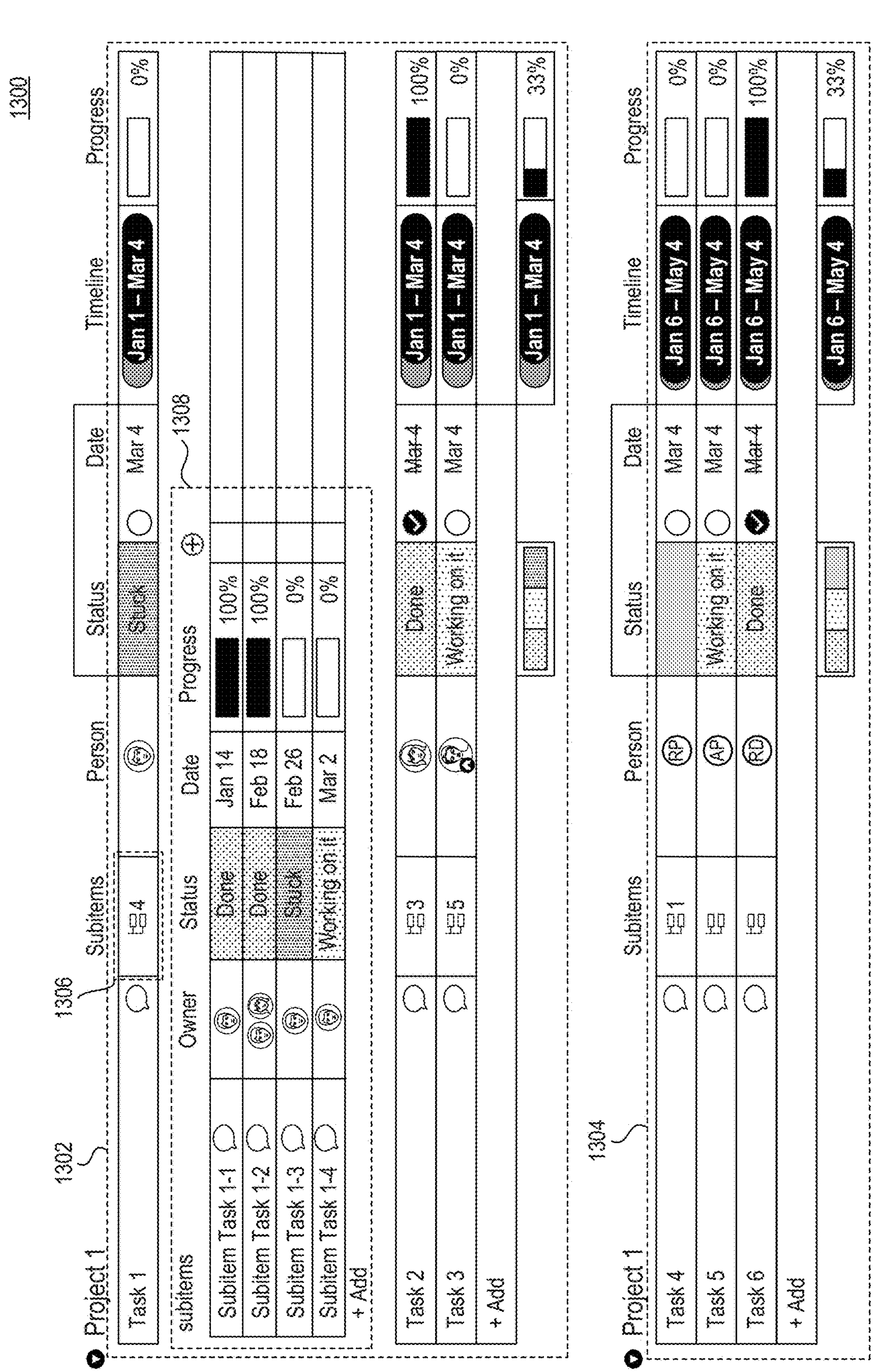
FIG. 13 illustrates an example view of representing data via a multi-structured table, consistent with some embodiments of the present disclosure.

By way of example, FIG. 13 illustrates an example view of representing data via a multi-structured table, consistent with some embodiments of the present disclosure. FIG. 13 may include a multi-structure table 1300 having a first table 1302 and a second table 1304. The first table may be structured with a plurality of rows and columns displaying data. The second table may have the same structure as the first table. Furthermore, cell 1306 may contain an embedded or associated sub-table 1308 having a different structure from the first table and the second table. The sub-table may have its own number of rows and columns that may be different or the same as the structure of the first table and/or the second table.

In some disclosed embodiments, at least one processor of the system may carry out operations that may involve maintaining a main table having a first structure and containing a plurality of rows. A main table may refer to one or more tables that primarily contain and display data or information. A main table may have horizontal and vertical rows (e.g., rows and columns) containing cells with data or information. Furthermore, the main table may have a first structure where the table may consist of a number of columns and rows. The columns of the main table may be organized with headings such that each column may represent the same or different data or information. The headings of the columns may identify information or characteristic types associated with the data in the main table. For example, each column may have a heading, appearing, for e.g., at the top of each column, such as status, person, list of text or numbers, time, timeline, date, icon of checkbox, file location, hyperlink, metadata, address, contact information, a mirrored column (e.g., duplicated information or linked to other sources of information), or any other data type that may be contained in a column. The rows of the main table may be organized to provide detail data about each column. For example, a main table may have a first structure consisting of five columns each representing certain information such as tasks, people, status, timelines, and progress of the tasks. The first structure of the main table may further have a plurality of rows, for e.g., seven rows, each providing data in cells for each column. Moreover, other tables in the main table may have the same or different first structure.

Figure 14:
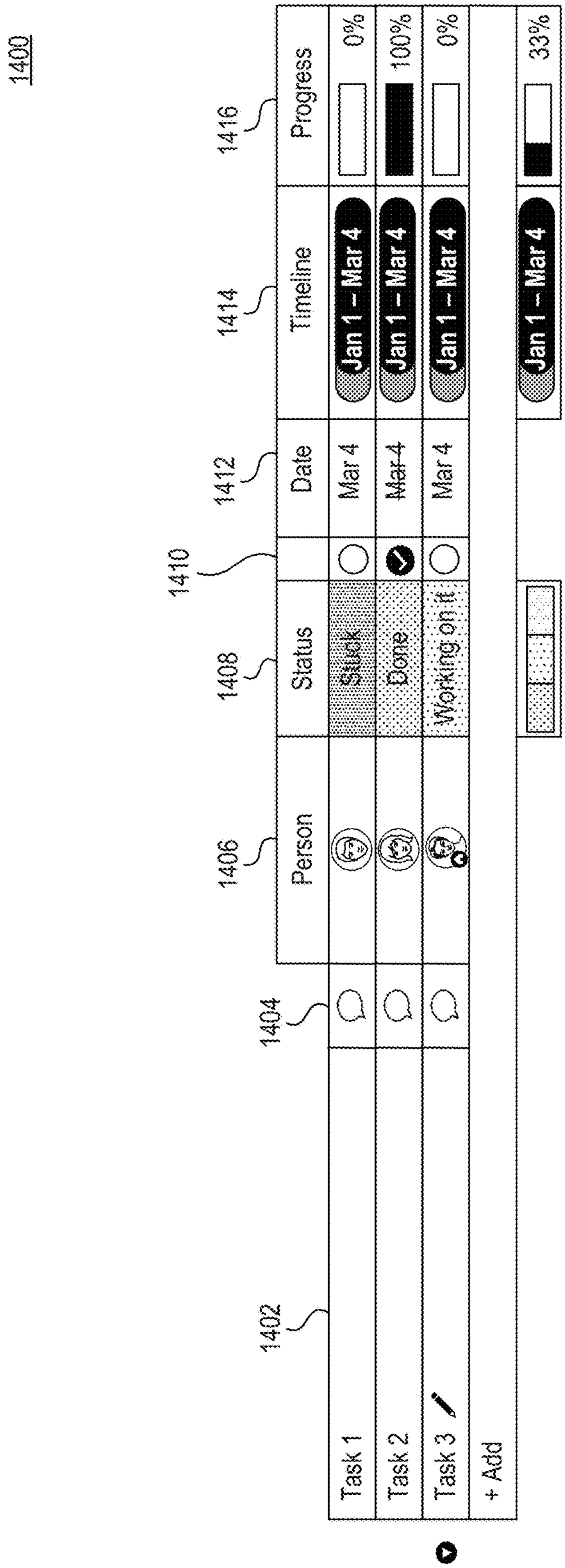
FIG. 14 illustrates an example view of a main table having a first structure with a plurality of rows, consistent with some embodiments of the present disclosure.

By way of example, FIG. 14 illustrates an example view of a main table having a first structure with a plurality of rows, consistent with some embodiments of the present disclosure. FIG. 14 may include main table 1400 having a first structure consisting of eight columns (Task 1402, Message 1404, Person 1406, Status 1408, Deadline Status 1410, Date 1412, Timeline 1414, Progress 1416) and three rows of data relating to Tasks 1 to 3. The columns of the main table may include a task column 1402, a message column 1404, a person column 1406, a status column 1408, a deadline status column 1410, a date column 1412, a timeline column 1414, and a progress column 1416. Furthermore, the main table main may include three rows having cells for each of the columns. The task column 1402 may contain three rows each with "Task 1," "Task 2," and "Task 3."

In some embodiments, at least one processor of the system may carry out operations that may involve receiving a first electronic request for establishment of a first sub-table associated with a main table, wherein the first electronic request includes column heading definitions and wherein the column heading definitions constitute a second structure.

A first electronic request may refer to an electronic signal containing instructions that may be configured to trigger an alteration of data associated with the main table, such as the addition, deletion, rearrangement or any other modification or combination thereof. The request may be in one or more digital, electronic, and/or photonic signals that may be received via a voice command, gesture, touch, tap, swipe, a cursor selection, cursor scrolling, or a combination thereof. A first sub-table may refer to a nested or embedded table contained within a row or a cell (any cell, including the heading cell) of the main table, as defined above. In some embodiments, the first sub-table may have the same characteristics (data, objects, date ranges, text, tally, or any other quantitative or qualitative summary information) and functions (display of data or information) as the main table. For example, the first sub-table may have a second structure, which may be different or the same as the first structure of the main table, as defined above. The second structure of the first sub-table may include horizontal and vertical rows (e.g., rows and columns) containing cells with data or information. The first sub-table may also include column heading definitions. The column heading definitions may include headings, appearing at the top of each column, such as, for example, subitems, status, person, list of text or numbers, time, timeline, date, icon of checkbox, file location, hyperlink, metadata, address, contact information, a mirrored column (e.g., duplicated information or linked to other sources of information), or any other data type that may be contained in a column. In some embodiments, the column heading definition may include different formats and constraints on formats that may affect the size, font, and color of values, objects, images, views, orientations, or displays in the second structure. The rows of the first sub-table may be organized to provide detail data about each column. For example, the first electronic request may be transmitted by a user by clicking a drop-down menu that may list "Add Subitem," or the first electronic request may include clicking on a cell in the main table that may prompt a user to "Add Subitem." Upon the execution of the first electronic request, the at least one processor may generate a sub-table having a second structure consisting of, for example, six columns with column heading definitions as subitems of tasks, people, owner, status, timelines, and progress of the tasks, or any other heading definitions. The second structure of the sub-table may further have, for example, a plurality of rows or nine rows each providing detailed data in cells for each column under their respective column heading definitions. The sub-table may also be referred to as a subitem associated with a row of the main table.

Figure 15:
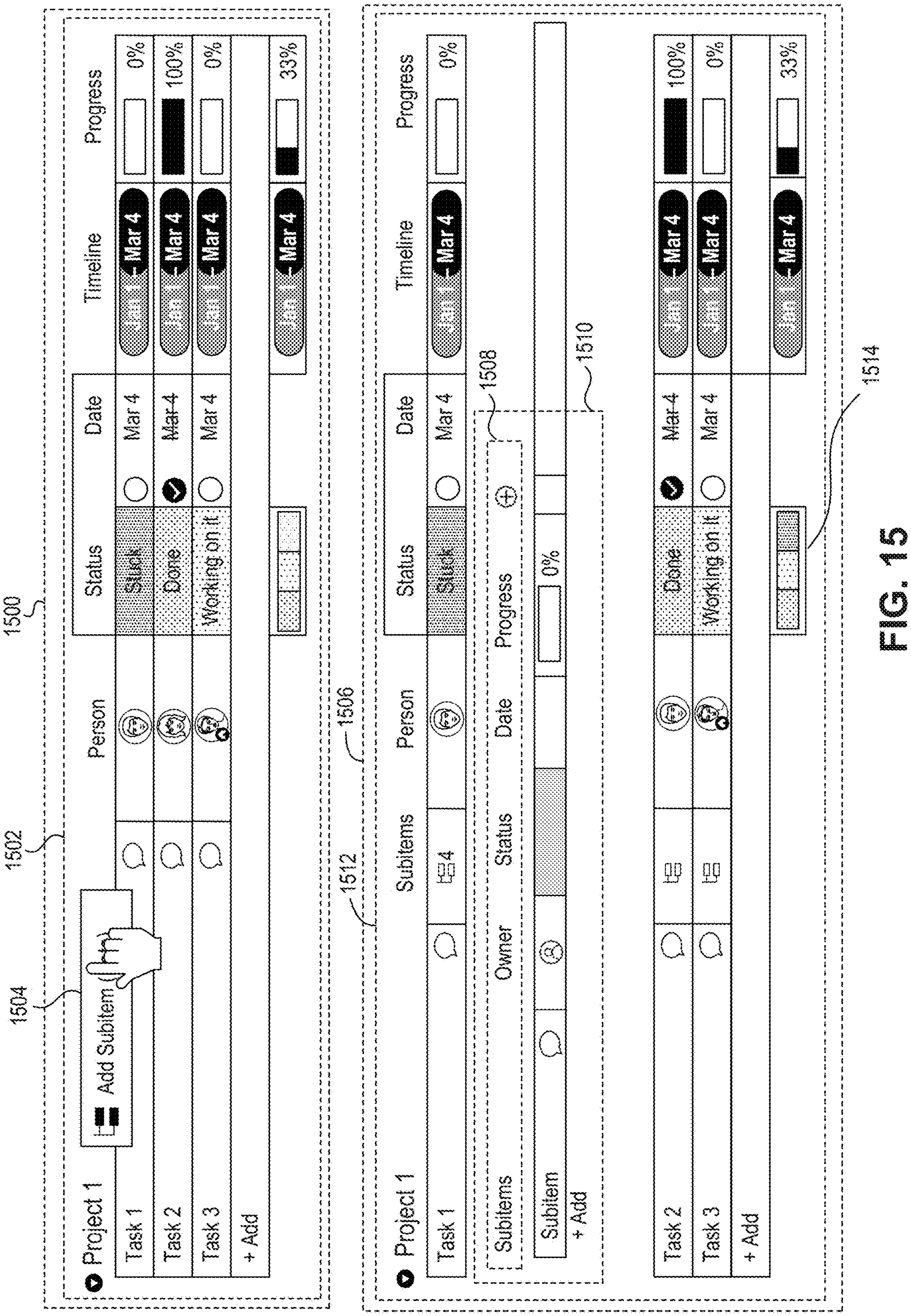
FIG. 15 illustrates example views of a first sub-table associated with a main table having a second structure with column heading definitions, consistent with some embodiments of the present disclosure.

By way of example, FIG. 15 includes the first view 1500 having a main table 1502. The at least one processor may receive a first electronic request such as a click to "Add Subitem" 1504 or the first sub-table associated with the main table. In the second view 1506, as a result of adding the subitem, a first sub-table 1508 may be generated having a plurality of column heading definitions 1510. The column heading definitions 1510 may constitute the second structure of the sub-table 1508 where the headings may be subitem names, owner indicators, statuses, and dates, or any other definitions that a user may choose. The sub-table 1508 may be associated with main table 1512, which is the same as main table 1502 in the first view.

In some embodiments, at least one processor of the system may carry out operations that may involve storing a second structure in memory as a default sub-table structure. A default sub-table structure may refer to an initial setting, a preset setting, or a preexisting configuration for the second structure of the sub-table where the second structure may automatically be applied to any subsequent sub-tables. After the first electronic request establishes the second structure of the first sub-table, the at least one processor may store the default sub-table in memory for assignment of the second structure to any later generated sub-tables or subitems. For example, the default sub-table structure may consist of a certain number of column heading definitions, and the same column heading definitions may then be applied to any later generated sub-table. The default sub-table structure may also include varying formats and constraints on table structures (e.g., permission settings or structural constraints) as discussed above. The default sub-table structure associated with the second structure may be modified to have additional column heading definitions as needed by a user.

Consistent with some disclosed embodiments, at least one processor of the system may carry out operations that may involve associating a first sub-table with a first row in a main table. The first sub-table may be embedded or nested under the first row of the main table such that the first row of the main table may expand to display the first sub-table, but the other rows of the main table may be collapsed to not display another sub-table, or the other rows may not have any sub-tables. In addition, the first sub-table may also be associated with a cell inside the first row of the main table. Alternatively, the first sub-table does not necessarily need to be limited to the first row of the main table and may generally be a sub-table that is first generated with any row of the main table. That is, in general, a sub-table (e.g., first sub-table) may be associated with any row of the main table.

By way of example, FIG. 15 includes in the second view 1506 a default sub-table structure 1510 that may include a column heading definition 1508. After receiving the first electronic request, the at least one processor may automatically store the default sub-table structure associated with the second structure of the first sub-table in memory for later application.

Figure 16:
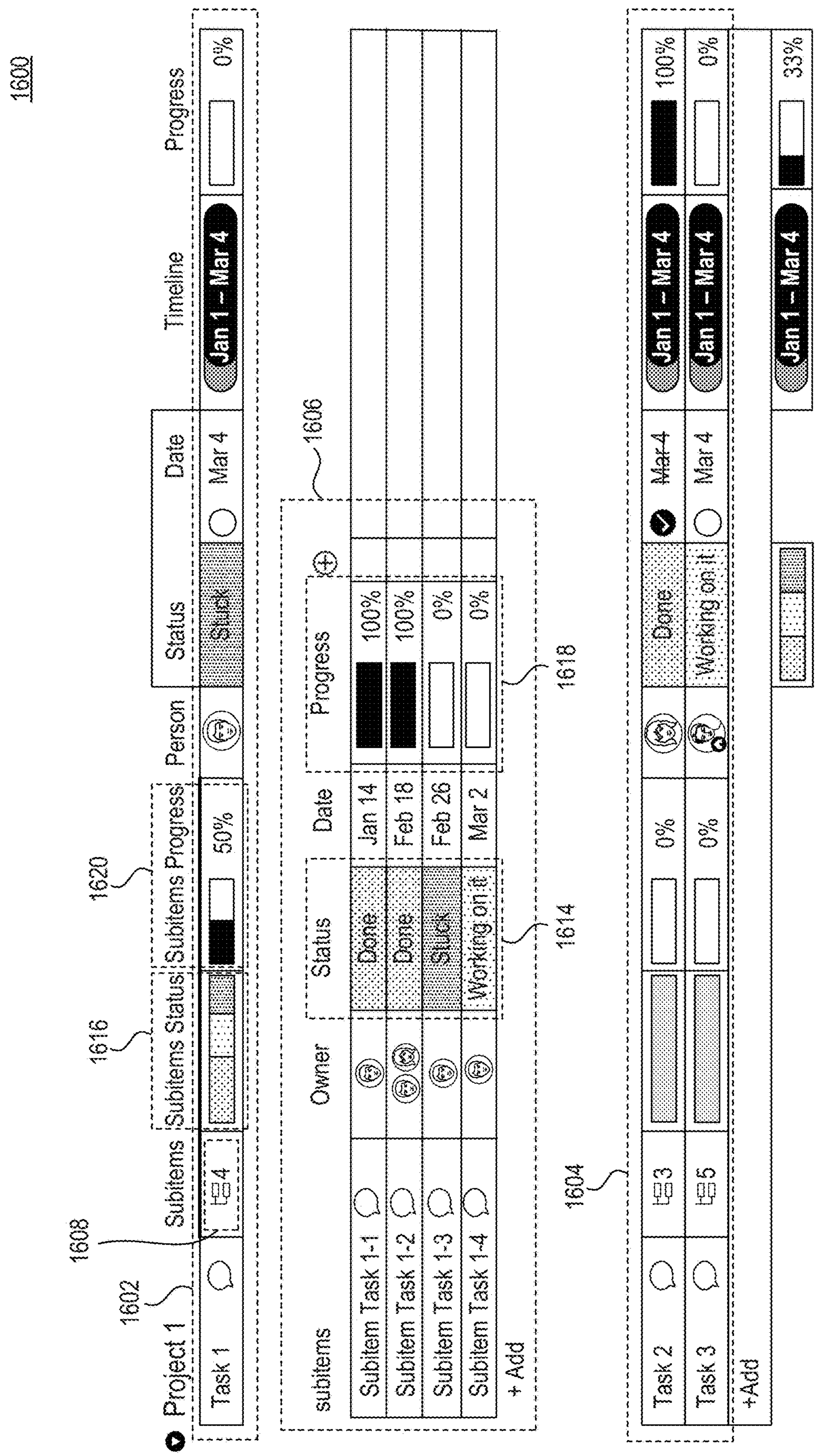
FIG. 16 illustrates an example view of the first sub-table with a first row in the main table, consistent with some embodiments of the present disclosure.

In another example, FIG. 16 includes a main table 1600 with a first row 1602 and two other rows 1604. The first row 1602 when expanded may display the first sub-table 1606 where the first sub-table may be positioned between the first row and the second row of the main table. As discussed above, the first sub-table is not limited to the first row of the main table, and instead may be associated with any row of the main table. The first sub-table 1602 may have automatically adopted the default sub-table structure stored in memory of the system for representing data via a multi-structured table. In addition, the first sub-table 1602 may have a column heading definition that may include the headings for "subitems," "owner," "status," "date," and "progress." In addition, the first sub-table 1606 may have four rows containing detailed data regarding the column heading definitions, such as "SubitemTask 1-1" through "Subitem Task 1-4" as shown in FIG. 16.

In some embodiments, the at least one processor may receive a request to update data in a first sub-table, wherein the update does not alter data in the main table. Updating data in the first sub-table may refer to changing, deleting, creating, altering, rearranging, adding, modifying, or renewing the values of the data, the format of the data, the constraints of the data, the display of the data in the column heading definition, or any of the rows or cells inside the first sub-table. For example, changing the status from "in progress" to "done" may be considered to be updating data in the first sub-table. In response to the update in the first sub-table, updating a graphical representation of the sub-table may include changing a size of at least one of the plurality of graphical representations. In another example, a column may contain three statuses marked as "done," and two statuses marked as "in progress." One of the "in progress" statuses may be updated to "done," resulting in a total of four "done" statuses and one "in progress" status. Altering data in the main table may be synonymous to "updating," as defined above for the main table. Not altering data in the main table may include the lack of an update in the main table despite there being an update in a first sub-table. This may be a result of the fact that the structure of the first sub-table is independent from the structure of the main table. For example, the system may add a column heading definition, such as "time tracker," in the first sub-table, which may not subsequently add the same column heading definition to the main table. In another example, the modification of a value in the cell of the first sub-table may not also subsequently alter any of the cells of the main table. Alternatively in some other embodiments, a change in a cell of the first sub-table may subsequently alter one or more cells in the main table.

Figure 17:
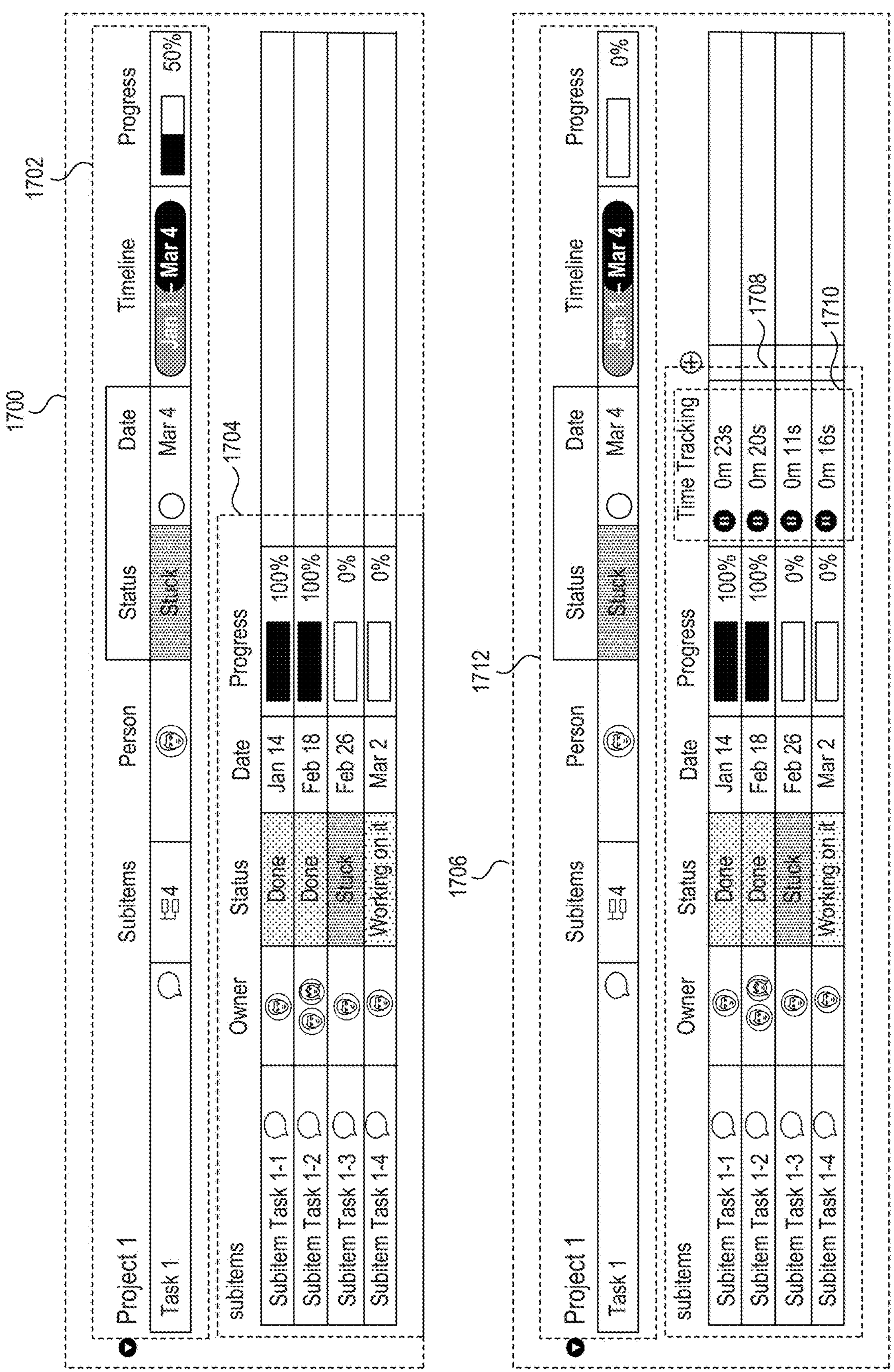
FIG. 17 illustrates example views of updating data in the first sub-table that does not alter data in the main table, consistent with some embodiments of the present disclosure.

By way of example, FIG. 17 illustrates a first view 1700 displaying the first row 1702 of a main table. The first row 1702 may include any number of columns containing different information. The first sub-table 1704 may have five columns having the column heading definitions "subitems," "Owner," "Status," "Date," and "Progress". In addition, the first sub-table may have four rows. The second view 1706 may be rendered in response to a request to update data in the first sub-table 1704, resulting in the same but updated first sub-table 1708 with an additional column 1710 (e.g., the previously mentioned update) with column heading definition "Time Tracking." The change in the same first sub-table 1708 (the addition of "Time Tracking" column 1710) would not alter the structure or information in the main table, as shown by main table 1702 of the first view 1700, and the same main table 1712 of the second view 1706.

In some embodiments, the at least one processor may receive an activation of a link associated with a first row of the main table, and upon activation may access the first sub-table. Receiving an activation of a link may include receiving an input from any interface (e.g., a touchscreen, mouse, keyboard, camera, and so on) to indicate an intent to activate a link. Activation of a link may refer to a triggering of an electronic request to access or retrieve information located in another location, such as information associated with a first sub-table. Activation of a link may also include causing a display to render the retrieved information, such as information of a first sub-table. A link may refer to a hyperlink, an image, a widget, an object, a drop down menu, or a graphical user interface (GUI), or any combination thereof. For example, the main table may include four rows, each containing a link to a first sub-table contained in a cell as a digital button. In response to activating a link (e.g., a link contained in a first row of the main table) the system may be configured to access information in the first sub-table and render a display of the first sub-table and the information contained therein. A user may also access the cells of the first sub-table upon the expansion of the first row as a result of activating the link in the first row.

Figure 18A:
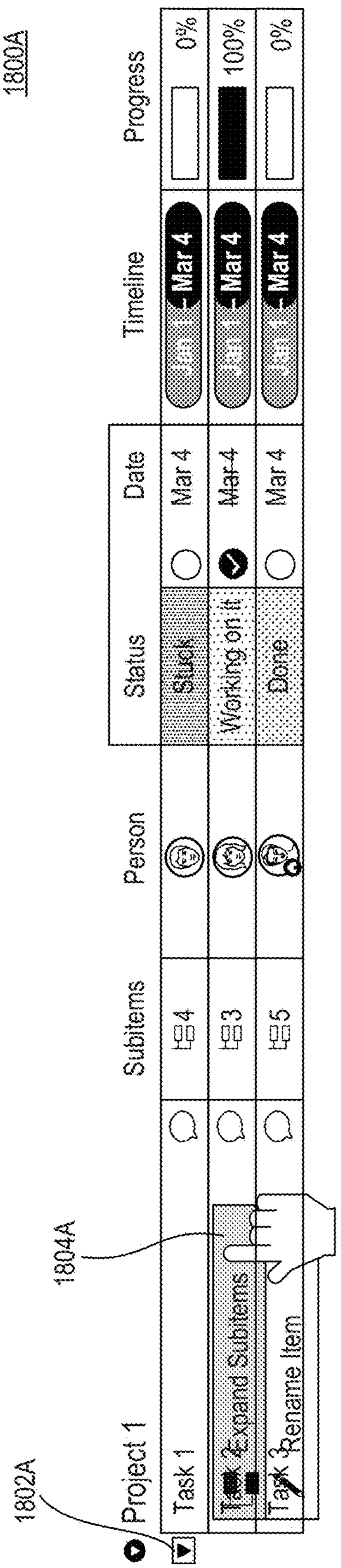
FIGS. 18A and 18B illustrate example views of receiving an activation of a link in the first row of the main table to access the first sub-table, consistent with some embodiments of the present disclosure.

FIG. 18A illustrates example main table 1800A having a plurality of rows and columns where the rows of the main table may be collapsed to not show any sub-tables. The activation of a link may include a drop-down menu 1802A for the first row of the main table. The drop-down menu may provide a window 1804A listing "Expand Subitems" to expand the first row of the main table to also display the first sub-table, as shown in FIG. 16.

Figure 18B:
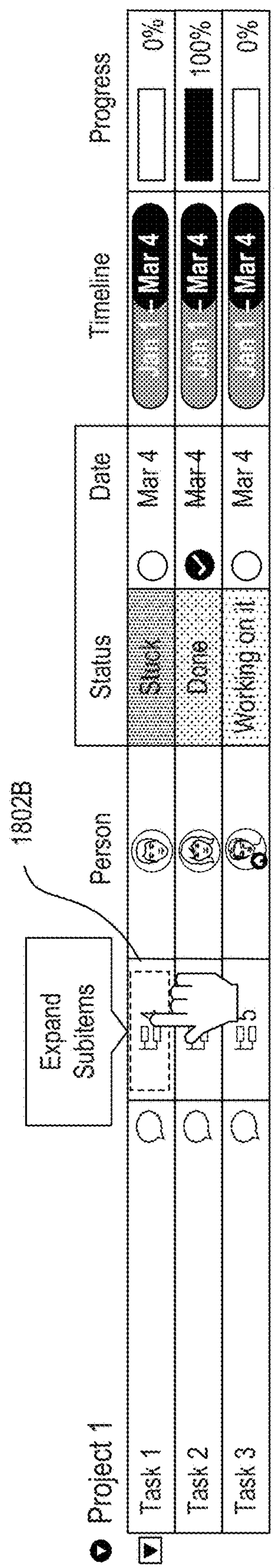

In another example, FIG. 18B illustrates main table 1800B having a plurality of rows and columns where the rows of the main table may be collapsed to not show any sub-tables. A link may be contained in a cell 1802B containing a combination of graphics and alphanumerics. The activation of the link may include clicking the subitems cell 1802B to expand the first row of the main table to display the first sub-table, as shown in FIG. 16.

In some embodiments, the at least one processor may be configured to display in a common view, information from a first sub-table and information from a main table. A common view may refer to the display of a single rendering to present data or information in the shared confines of the display. For example, a common view may include a presentation of a first sub-table under the first row of the main table while displaying data or information from the remaining rows of the main table all in the same display. For example, the first sub-table may be displayed overlaid or superimposed on a portion (or all) of the main table.

By way of example, FIG. 16 illustrates common view 1600 displaying both the first row 1602 of the main table, which has been expanded to include the first sub-table 1606. In addition, the common view 1600 may also simultaneously display the other rows 1604 of the main table.

In some embodiments, the common view may include summary information from the first sub-table in the main table. Summary information may refer to any visual display of high level, overview that is representative of a full set of information, such as, a graphical summarization, textual summarization, numerical summarization, or combination of any or all such summarized information. Furthermore, the summary information may be presented in a form of a number, range of numbers, percentage, chart, or any other form of data representation. A graphical summarization may include a bar chart, a pie chart, or any other chart or diagram divided proportionally based on corresponding percentages. For example, a column of a first sub-table may contain three statuses marked as "done" and two statuses marked as "in progress." A graphical representation displaying the summary information of the first sub-table may be a chart that may be split in two parts to indicate that 40% of work is "in progress" (two out of five statuses) and 60% of work is "done" (three out of five statuses). The graphical representation may be sized or shaped in any other manner, such as by volume, by a count, by size of individual icons representing individuals, or any other representation to reflect a count, a priority, or any other indication in a table. The summary information may be placed in any location in the main table or in the sub-table. This summary information may include information contained in both the first sub-table and the main table, and the summary information may be presented as part of the main table in the common view. In this way, even when the sub-table is obscured from view, a user may be able to understand high level information contained in the main table and any hidden sub-tables associated with the main table.

For example in FIG. 15, summary representation 1514 indicates summary information of statuses contained in the columns of the main table 1512 and sub-table 1508, such that when sub-table 1510 is minimized and no longer showing, the graphical summary representation 1514 would still summarize information contained in both the main table 1512 and sub-table 1510 in the common view 1506. While graphical summary representation 1514 in FIG. 15 is shown as a bar, any other representation of summary may be presented, such as text, animations, other graphics, or a combination thereof.

In some embodiments, the summary information from the first sub-table may be displayed in a cell of the main table. The summary information, as discussed above, may be located in a cell in a row of the main table or in a cell in any row of the main table.

By way of example, FIG. 16 illustrates a main table 1600 with a first row 1602 and a first sub-table 1606. The status column 1614 may be summarized as summary information in cell "Subitems Status" 1616. The cell "Subitems Status" 1616 may be a graphical representation showing differing proportions of the different status in status column 1614. Similarly, the progress column 1618 may be summarized as a summary information in cell "Subitems Progress" 1620 in the form of a graphical representation showing differing proportions of the status in progress column 1618. In some other embodiments not shown, the summary information may aggregate high level information from both the main table and the sub-table in a single summary representation in the main table.

Aspects of the disclosure may include rendering, in the main table, a display of an indication of a number of sub-items in the first sub-table. An indication of the number of sub-items may refer to a measure, a value, a text, an image, a level showing the quantity, number, percentage, fraction of the sub-items in a first sub-table, or a combination thereof. A subitems may refer to the number of rows in the first sub-table. For example, a cell in the first row or any row of the main table may render or display the total number of rows of the sub-table by way of a graphical image and a number.

For example, FIG. 16 illustrates subitem cell 1608 that may render or display an image adjacent to the number "4." The number "4" in subitems cell 1608 may represent the number of rows or sub-items in the first sub-table 1606. Further in FIG. 16, corresponding cells of the main table show "3" and "5" to indicate that the sub-tables associated with Task 2 and Task 3 contain three and 5 subitems in the sub-tables associated with each of those tasks. In this way, a user may quickly understand the relative volume of information contained in an associated sub-table of the main table.

Consistent with some disclosed embodiments, at least one processor of the system may carry out operations that may involve receiving a second electronic request for association of a second sub-table with a second row of the main table. The second electronic request may be another request similar to or different from the first electronic request discussed previously above. A second sub-table may be another similar sub-table or different sub-table from the first sub-table, as discussed above. A second row of the main table may be any row that may be different from the first row of the main table as described previously. For example, the second row of the main table may be displayed in a collapsed manner where there may not be any sub-table associated with it. The second electronic request may be executed by clicking on a cell in the second row of the main table, which may prompt the at least one processor to generate the second sub-table. Upon receiving the second electronic request for the second row of the main table, the at least one processor may generate a second sub-table, which may allow the user to reuse existing column heading definitions or generate new column heading definitions.

Figure 19:
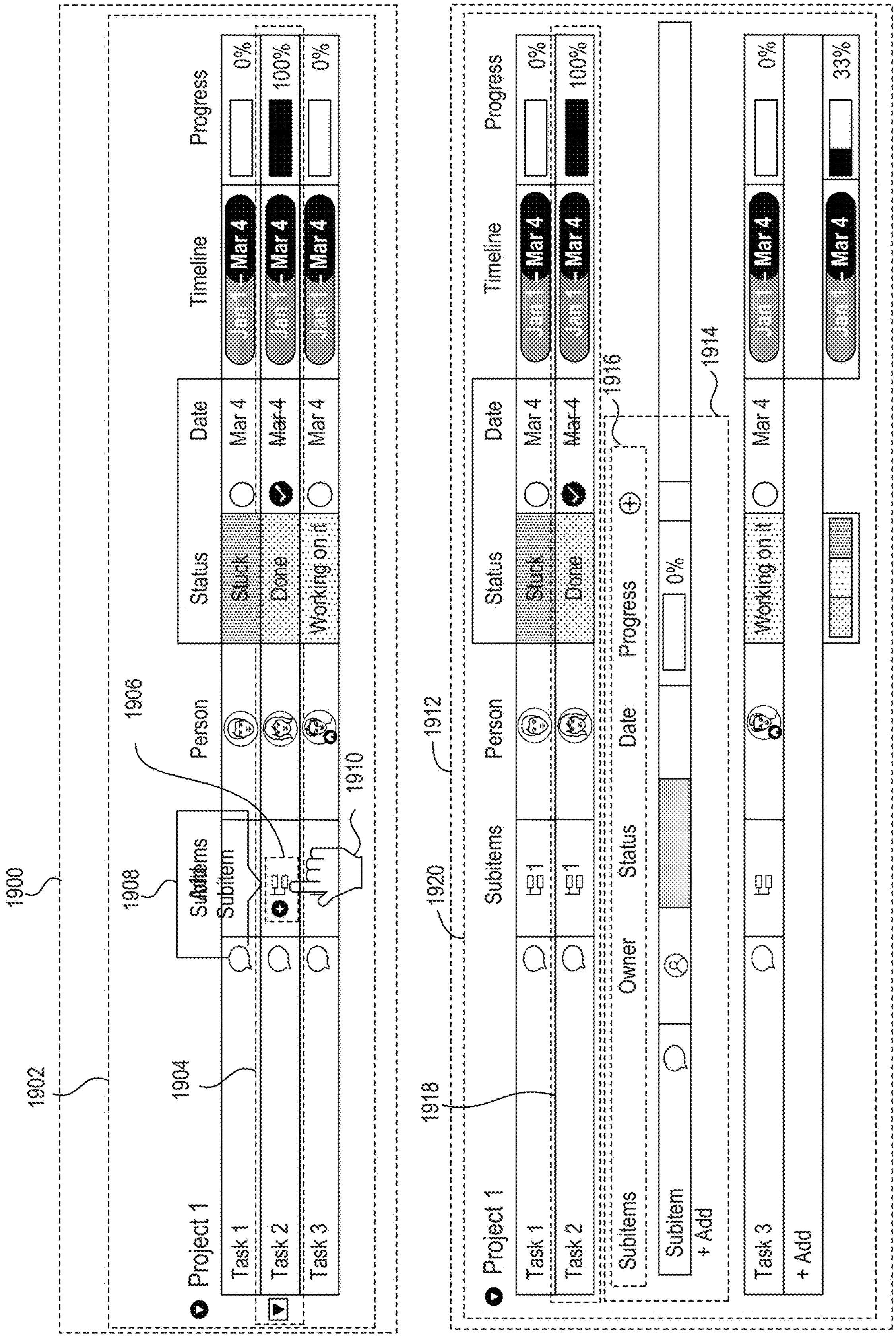
FIG. 19 illustrates example views of receiving a second electronic request to generate a second sub-table for a second row of the main table, consistent with some embodiments of the present disclosure.

FIG. 19 illustrates an exemplary first view 1900 that may display a main table 1902. The main table 1902 may have a second row 1904 containing a subitems cell 1906 that may prompt "Add Subitem" 1908 when a user clicks or hovers with cursor 1910 on a subitem cell 2006. Upon clicking 1910 in the first view 1900, the second view 1912 may display a second sub-table 1914 having column heading definitions 1916. The second sub-table 1914 may be displayed below the same second row 1918 of the same main table 1920.

Consistent with some disclosed embodiments, at least one processor of the system may carry out operations that may involve performing a lookup of a default sub-table structure following receipt of a second electronic request. Performing a lookup of the default sub-table structure may refer, to an action, process, instance of looking or searching for the default sub-table structure being prompted inside a list displaying a plurality of options for one or more similar or different table structure. For example, the at least one processor may automatically perform a lookup for a default sub-table structure in a remote repository for application to a newly generated sub-table, as indicated by the second electronic request, as discussed in further detail below. In addition, the lookup may be associated with the structure of one or more tables or sub-tables in boards not related to the main table.

In some embodiments, at least one processor of the system may carry out operations that may involve applying a default sub-table structure to a second sub-table. Applying a default sub-table structure to the second sub-table may include adopting the default sub-table structure (e.g., column headings, row headings, and the order in which they are presented) for a newly generated sub-table such that the newly generated sub-table has the same structure as the default sub-table structure. For example, the at least one processor may apply the default sub-table structure (previously established by the structure of the first sub-table) to the second sub-table based on the selected default sub-table during the look up. The second sub-table may have the same column definitions as the first sub-table. Furthermore, the second sub-table may have the same or different number of rows or sub-items as the first sub-table.

Figure 20:
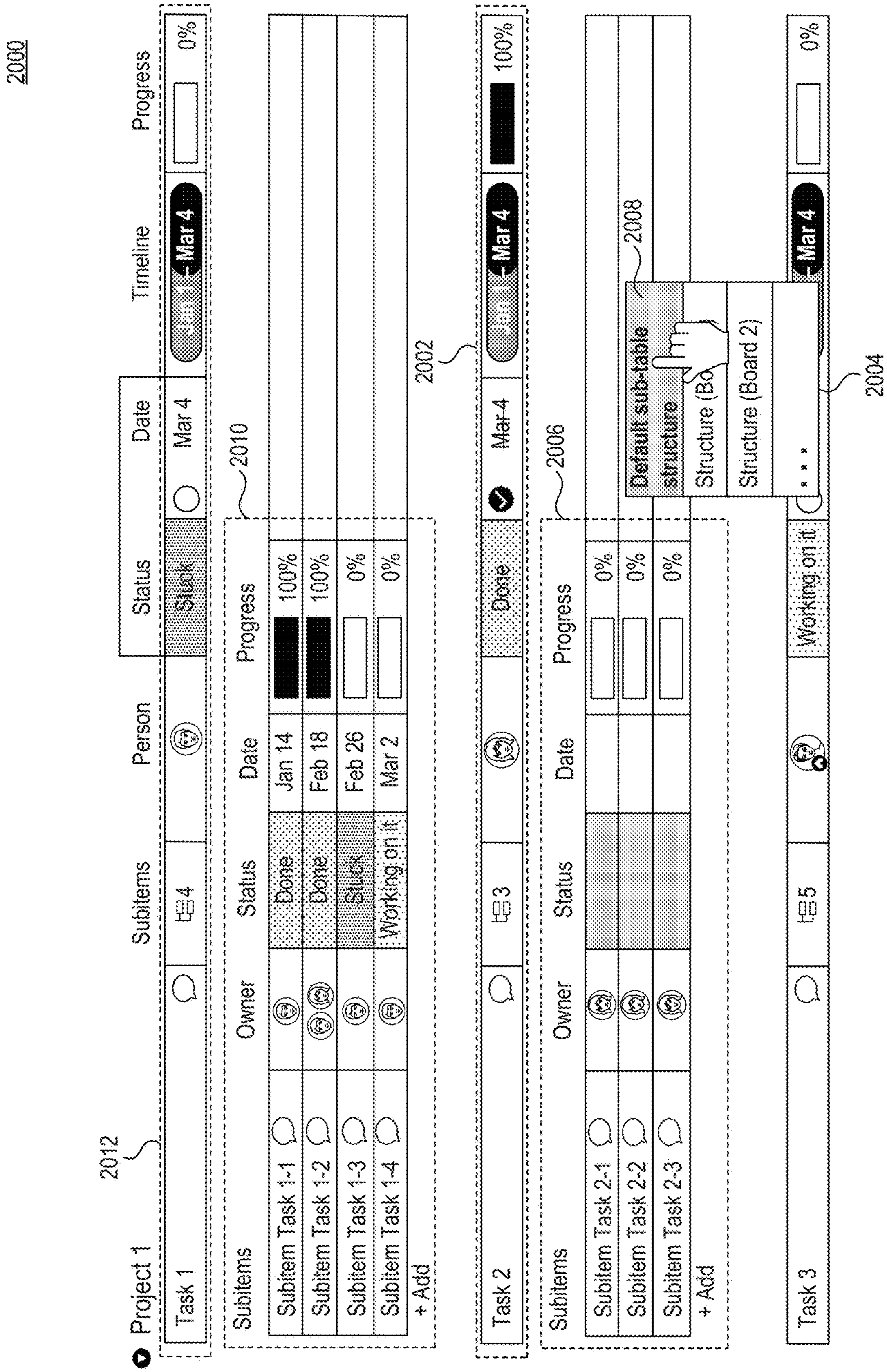
FIG. 20 illustrates an example view of looking up and selecting the default sub-table structure to apply to the second sub-table, consistent with some embodiments of the present disclosure.

FIG. 20 illustrates a main table 2000 with an expanded second row 2002 where a drop-down list 2004 may provide a plurality of options for the structure for the second sub-table 2006. The user may select the list named "Default sub-table structure" 2008 to apply to the second sub-table 2006 now having the same structure and column heading definitions as the first sub-table 2010 under the expanded first row 2012. The second sub-table 2006 may or may not have the same number of rows or sub-items as the first sub-table 2010.

Consistent with some disclosed embodiments, at least one processor of the system may carry out operations that may involve receiving a change to a structure of a second sub-table, and upon receipt of the change, cause a corresponding change to occur in the first sub-table and the default sub-table structure. In some embodiments, receiving a change to a structure may include receiving an input through any interface, as discussed previously above, to indicate an intent to make an alteration to a structure. A change to a structure of the second sub-table may refer to modifying, adding, subtracting, rearranging, or any other altering of the structure of the second sub-table. For example, a default sub-table structure may consist of three column definitions such as "subitem tasks," "status," and "progress." The default sub-table structure may be assigned to a first sub-table structure and a second sub-table structure that may have the same columns as the default sub-table structure. Upon the addition, subtraction, or rearrangement of a column heading definition for the first sub-table structure or the second sub-table structure, the at least one processor may automatically update the default sub-table structure to add, subtract, or rearrange the same column heading definition. One or more sub-items in a first sub-table may be linked to one or more sub-items in the second sub-table, which may generate mirrored or duplicated sub-items between the first sub-table and the second sub-table. Linking one or more sub-items to one or more sub-tables may also across boards with different main tables.

Figure 21:
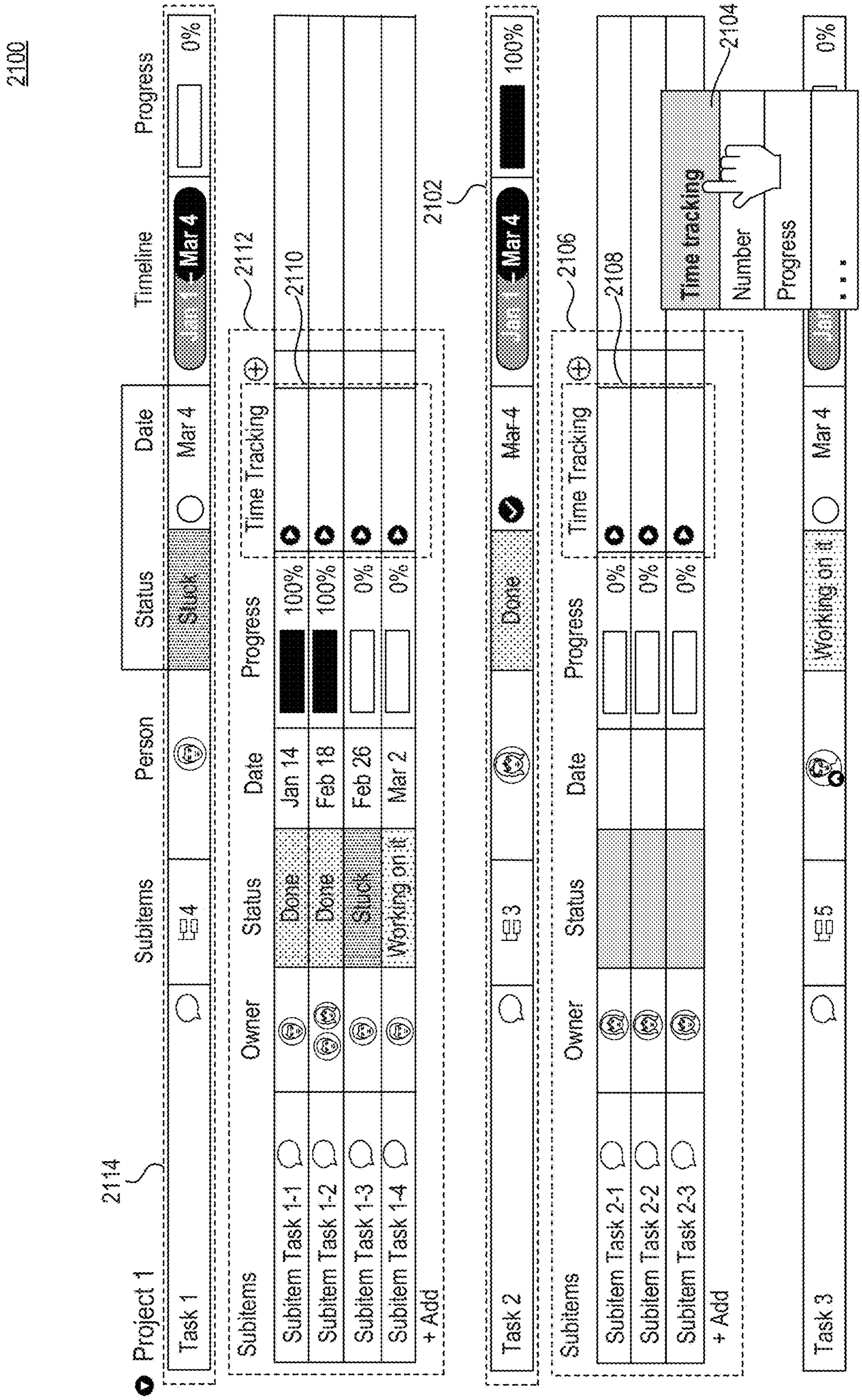
FIG. 21 illustrates an example view of receiving a change to a structure of the second sub-table to cause a corresponding change to occur in the first sub-table and the default sub-table structure, consistent with some embodiments of the present disclosure.

FIG. 21 illustrates the main table 2100 with an expanded second row 2102. In response to a user selecting the list "Time Tracking" 2104, a column head definition "Time Tracking" 2106 may be added to the second sub-table 2108. In response, the at least one processor may automatically add the same column definition "Time Tracking" 2110 to the first sub-table 2112 under the first row 2114. The default sub-table structure may also be automatically updated to include the added "Time Tracking" column heading definition for any subsequent application of the default sub-table structure. The addition, subtraction, or rearrangement of rows or sub-items to the first sub-table may or may not automatically change the structure of the second sub-table and vice versa.

Figure 22:
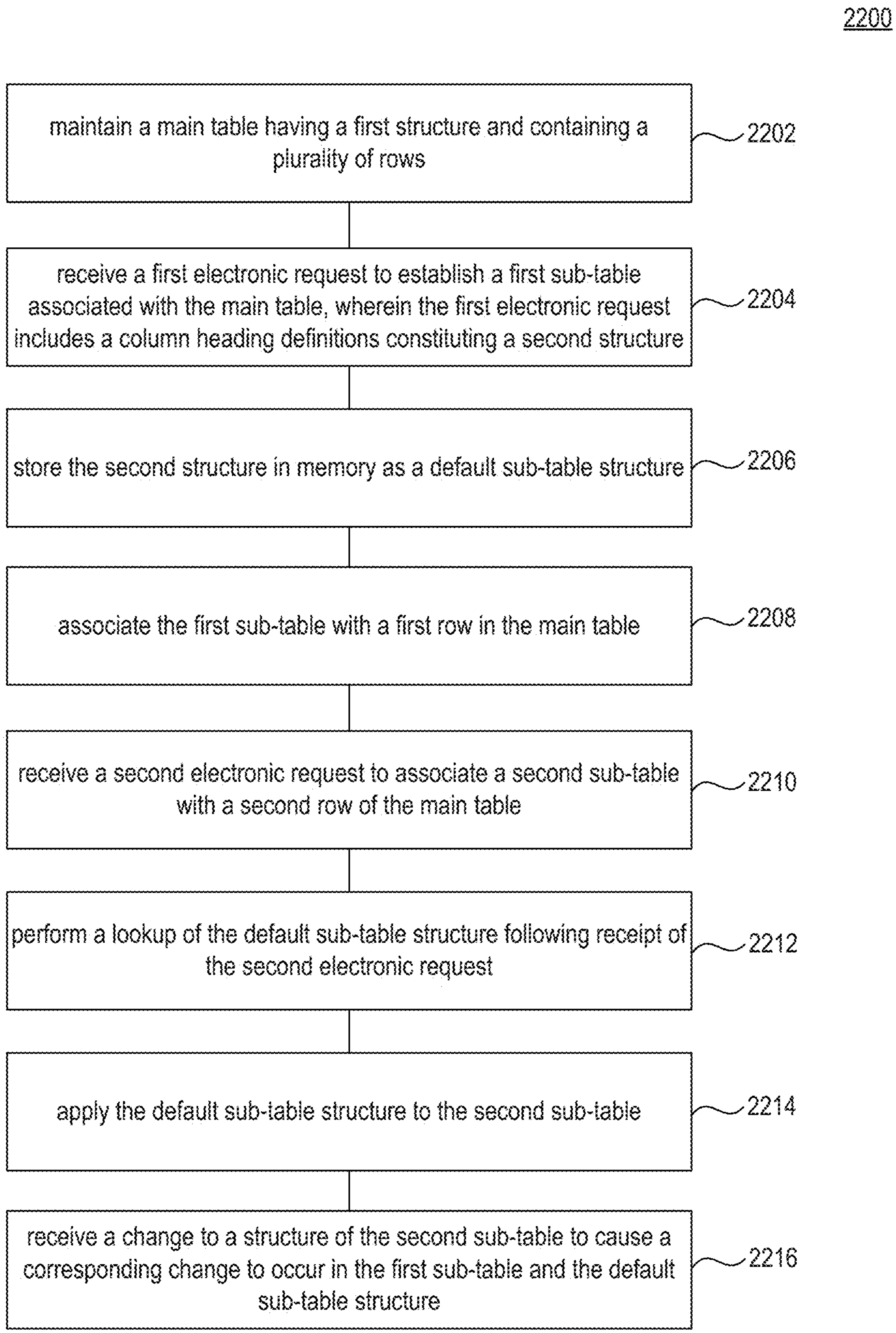
FIG. 22 is a block diagram for an exemplary method for representing data via a multi-structured table, consistent with some embodiments of the present disclosure.

FIG. 22 illustrates a block diagram for an exemplary method for representing data via a multi-structured table, consistent with some embodiments of the present disclosure. Method 28-10-00 may begin with block 2202 by maintaining a main table having a first structure and containing a plurality of rows, as previously discussed. At block 2204, method 2200 may include receiving a first electronic request for the establishment of a first sub-table that may be associated with the main table, wherein the first electronic request may include a column heading definitions, and the column heading definitions may constitute a second structure, as previously discussed. At block 2206, method 2200 may include storing the second structure in memory as a default sub-table structure, as previously discussed. At block 2208, method 2200 may include associating the first sub-table with a first row in the main table, as previously discussed. At block 2210, method 2200 may include receiving a second electronic request to associate a second sub-table with a second row of the main table, as previously discussed. At block 2212, method 2200 may include performing a lookup of the default sub-table structure following receipt of the second electronic request, consistent with the disclosure discussed above. At block 2214, method 2200 may include applying the default sub-table structure to the second sub-table, consistent with the disclosure above. At block 2216, method 2200 may include receiving a change to a structure of the second sub-table where upon the receipt of the change, the at least one processor may cause a corresponding change to occur in the first sub-table and the default sub-table structure, consistent with the disclosure above.

Aspects of this disclosure may provide a technical solution to challenges associated with collaborative work systems. Some disclosed embodiments include methods, systems, devices, and computer-readable media. For ease of discussion, a system is described below with the understanding that the disclosed details may equally apply to methods, devices, and computer-readable media. Some disclosed embodiments may be used for deconstructing an integrated web of structural components and data. This may occur using at least one processor configured to maintain the integrated web of the structural components and the data, wherein the structural components include customized tables for maintaining the data, automations for acting on the data in the customized tables, and dashboards for visualizing the data. Maintaining may include storing a web of structural components (as described below) and data in memory or storage. This may be accomplished, for example, using at least one processor configured for sending/receiving network packets, verifying connections, activating a graphical user interface (GUI), verifying updates, encrypting communications, and/or any other actions performed to make a table accessible from a data structure. An integrated web of the structural components (may also be referred to as template, workflow, solution, or an application throughout the disclosure) may refer to a group or a subset of interconnected, linked, dependent, or otherwise associated structural components (e.g., a table with a column structure). The structural components may be used to organize/hold maintained data. The structural components may refer to customized rows, columns, tables, dashboards, or any combination thereof for maintaining the data. In some instances, the structural components may be associated with automations for acting on the data in the customized tables. Customized tables for maintaining the data may refer to tables designed for a specific purpose or otherwise constructed or modified to be presented in an organized manner according to a preference. Automations for acting on the data in the customized tables may refer to set of logic rules, scripts, conditional actions or other modifiers that may be applied to data or table structures. Dashboards for visualizing the data may refer to high level arrangements of data, specialized views, panels, or any other organized presentation of data that may enable a user to obtain a summary view of view of data contained in a data set. A deconstruction of an integrated web of structural components and data may include a separation of data contained in a structural component from the structural component itself, such that the structural component only includes structural definition for components such as rows, columns, tables, dashboards, solutions, or any combination thereof as described above. Thus, deconstruction may include the removal of data from one or more columns, rows, or the entirety of a table.

Some embodiments may also involve receiving instructions to alter elements of at least some of the structural components and updating the integrated web to comport with the instructions. Receiving instructions may occur by receiving an input from any user interface (e.g., a mouse, keyboard, touchscreen, camera) or from an automatic action triggered in the system to indicate an intent to instruct the processor to perform an action. For example, the system may send/receive network packets, respond to commands from a graphical user interface (GUI), respond to automation tasks automatically, or otherwise responding to any other actions performed that may be interpreted as instructions. Altering elements of the structural components may refer to adding, removing, rearranging, transmitting, or otherwise modifying elements of structural components as disclosed earlier. By the way of a non-limiting examples, a table may be modified in various ways such as adding a row or column, modifying an automation associated with a table by adding or removing an additional step of the automation, modifying a dashboard to present data in different manner such as changing diagram type from pie chart to bar graph, or any other alterations that may be associated with the table. Updating the integrated web to comport with the instructions may refer to modifying, adding, removing, rearranging, or otherwise changing the version of an integrated web of structural components in a manner that complies with a request or command to do so.

Additionally, aspects of the disclosure may involve receiving a command to generate a copy of the structural components of the integrated web without the data. Receiving a command may include receiving instructions from any user interface or from the system, as described previously above. A copy of the structural components may refer to an identical or nearly identical structure configured to contain data. The copy may be stripped of the associated data (e.g., information contained in cells, such as cells at intersections of rows and columns). Additionally, in response to the command, some embodiments may involve outputting the copy of the structural components in a template format that permits the copy to be adopted for secondary use. Outputting the copy of the structural components may include generating a duplicate of the copied structural components and in some instances, presenting the copy of the structural components in a display or any other user interface consistent with the disclosure above. A template format may refer to a model, prototype, table, template, or other structural reusable format that permits the copy to be adopted for secondary use. A secondary use may refer to a use after the template format has been generated, such as a use by another entity, a use by the author of the original structural components of the integrated web with a different set of data, or any other use other than the original use in the original structural components of the integrated web as previously described.

Figure 23:
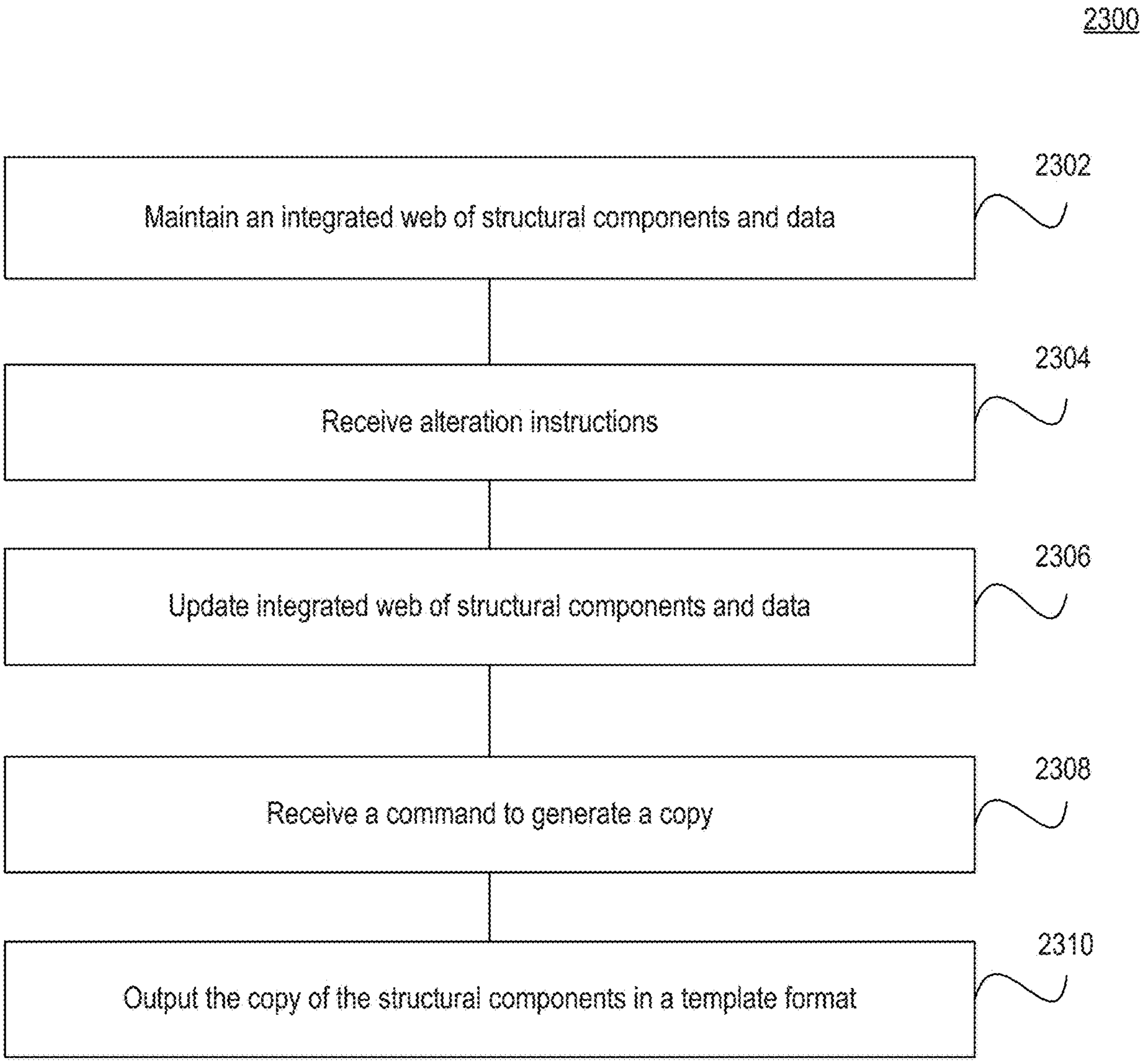
FIG. 23 is a block diagram of an exemplary method for deconstructing an integrated web of structural components and data, consistent with some embodiments of the present disclosure.

FIG. 23 illustrates a block diagram of an exemplary method 2300 for deconstructing an integrated web of structural components and data. This may occur, for example, in a collaborative work system. Method 2300 may be performed by the computing device 100 in conjunction with computing architecture 200 as depicted and described above with references to FIG. 1 and FIG. 2. Method 2300 may begin at block 2302 by maintaining an integrated web of the structural components and the data, wherein the structural components include customized tables for maintaining the data, automations for acting on the data in the customized tables, and dashboards for visualizing the data. Method 2300 may proceed to block 2304 by receiving instructions to alter elements of at least some of the structural components consistent with the disclosure above. Once instructions are received method 2300 may proceed to block 2306 by updating the integrated web to comport with the instructions as disclosed earlier. Method 2300 may further proceed to block 2308 by generating a copy of the structural components of the integrated web without the data as disclosed above. Method 2300 may then proceed to block 2310 where in response to the command it may output the copy of the structural components in a template format that permits the copy to be adopted for secondary use, consistent with earlier disclosure.

Some disclosed embodiments may involve exporting a copy in the template format to a repository for access by third parties. Exporting the copy in the template format may refer to copying, transferring, relocating, transmitting, or otherwise moving the copy in the template format to a repository location, such as a remote memory or remote server. A repository may refer to a store front, marketplace, shared data store, cloud storage, or any other means of storage accessible by first and/or third parties. Third parties may include any individual or other entity other than the first party, a first party being the originator, owner, or first user of the structure. Additionally, aspects of this disclosure may involve enabling revision of the copy prior to export. A revision may refer to a modification, addition, removal, or rearrangement of any data or structure within the copy consistent with the earlier disclosure. By the way of a non-limiting example, a revision may include a change in a column heading, a row heading, and/or a column linkage. Alternative non-limiting examples or revisions may include a change in table structure, change in an automation applied to the table, or change in the presentation of dashboards associated with the table or the mapping of specific data from the table. Automations may include logical sentence structures defining logical rules, wherein the instructions to alter elements may include an instruction to alter at least one portion of a logical sentence structure. A logical sentence structure, as discussed herein, may refer to a logical rule with one or more logical connectors, and configured to act on table data to produce an outcome. Logical rules may refer to underlying logic created by the automation. Underlying logic may be in a form of a script, assembly language, block diagram or any other form understandable by the processor or system. A non-limiting example of an alteration of a logical sentence structure may include modifying a conditional action from "send notification to Albert" to "initiate phone call with Albert."

Aspects of the present disclosure may also involve limiting access to the copy to entities with access authorization. Limiting access may refer to a permission-based availability within a repository that may not be generally accessible to the public. By the way of a non-limiting example, access authorization may be dependent on a receipt of a recompense signal. A recompense signal may refer to an authorization signal, payment signal, authentication signal, or any other means of permitting access to the copy. This may be useful to restrict access within specific organizations or alternatively may enable a developer to charge payment in exchange for access via the recompense signal.

Figure 24:
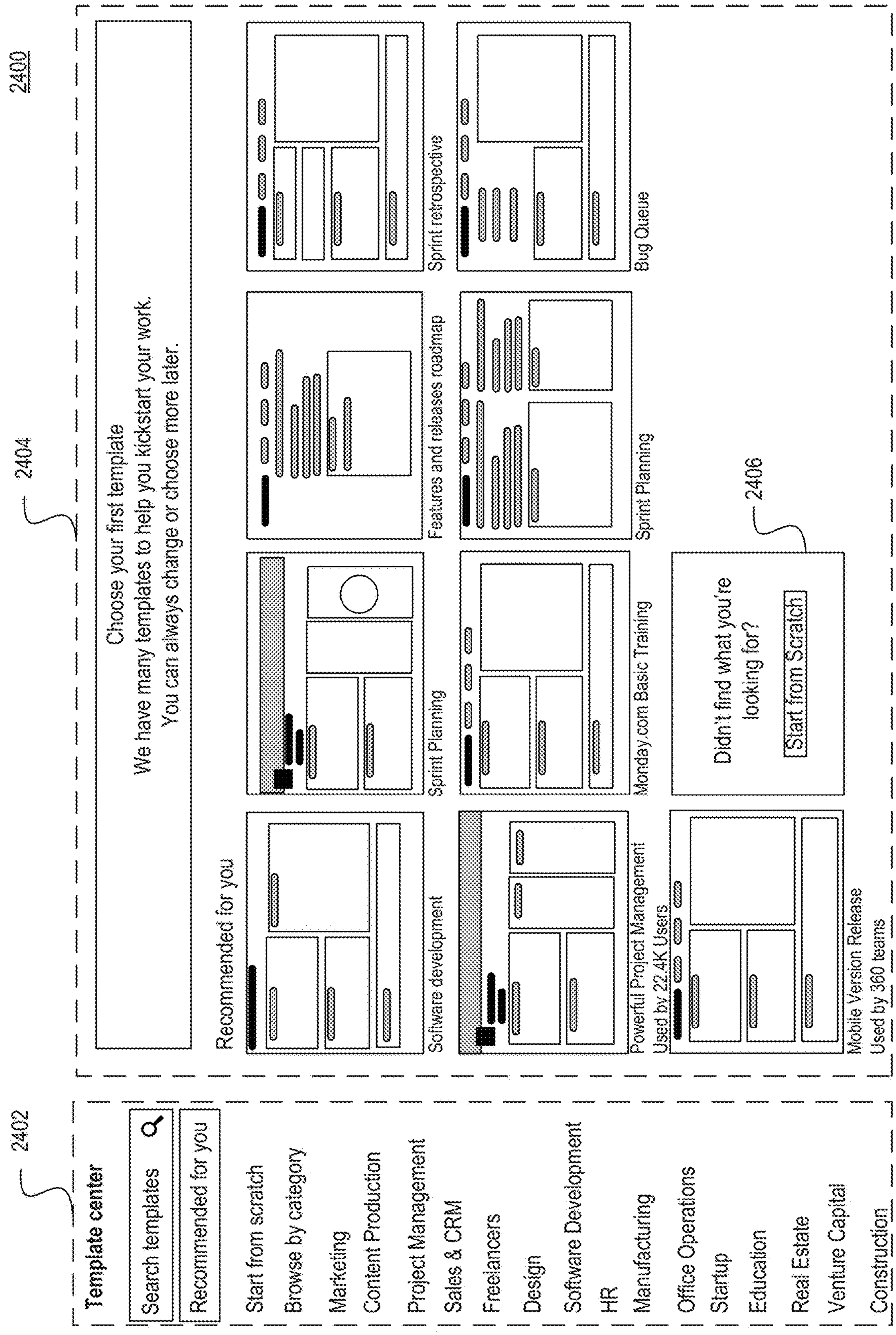
FIG. 24 is an exemplary representation of a template center, consistent with some embodiments of the present disclosure.

FIG. 24 illustrates an exemplary representation of template center. Template center view 2400 may allow a user to access a repository of an integrated web of structural components and/or shared templates for various use cases. Template center view 2400 allows a user to navigate a large number of templates via a navigation section 2402. Additionally, users may preview existing templates in a preview section 2404 or create their own template from scratch as depicted by block 2406.

Figure 25:
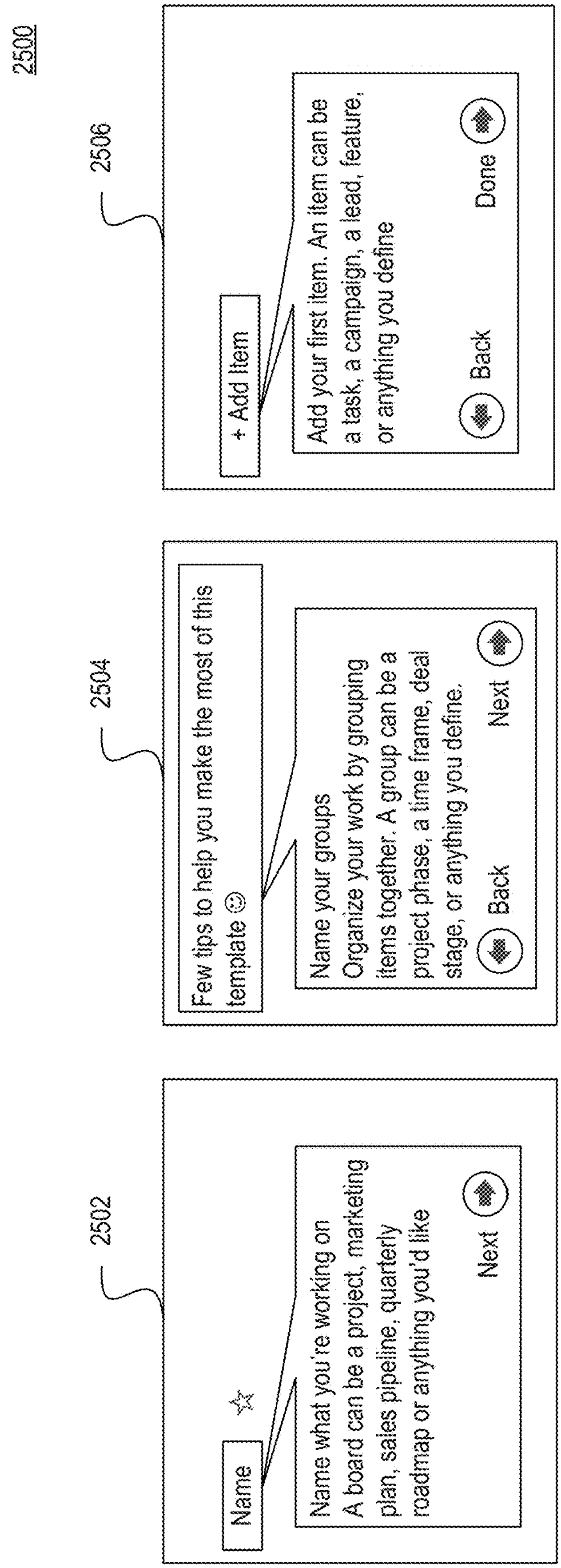
FIG. 25 is an exemplary representation of a template creation tutorial, consistent with some embodiments of the present disclosure.

FIG. 25 illustrates an exemplary representation of a template creation tutorial in a tutorial view 2500. In the event a user chooses to generate a template from scratch, the template generation may be guided though the template tutorial view 2500. A user may be shown to carry out various actions such as naming a template, and may be shown the available tools in the system and their uses. For example, block 2502 represents a tutorial for naming of a board accompanied by an explanation of what can be built to be a part of a template. Similarly, tutorial blocks 2504 and 2506 illustrate exemplary tutorials for group and item generation, respectively.

Figure 26:
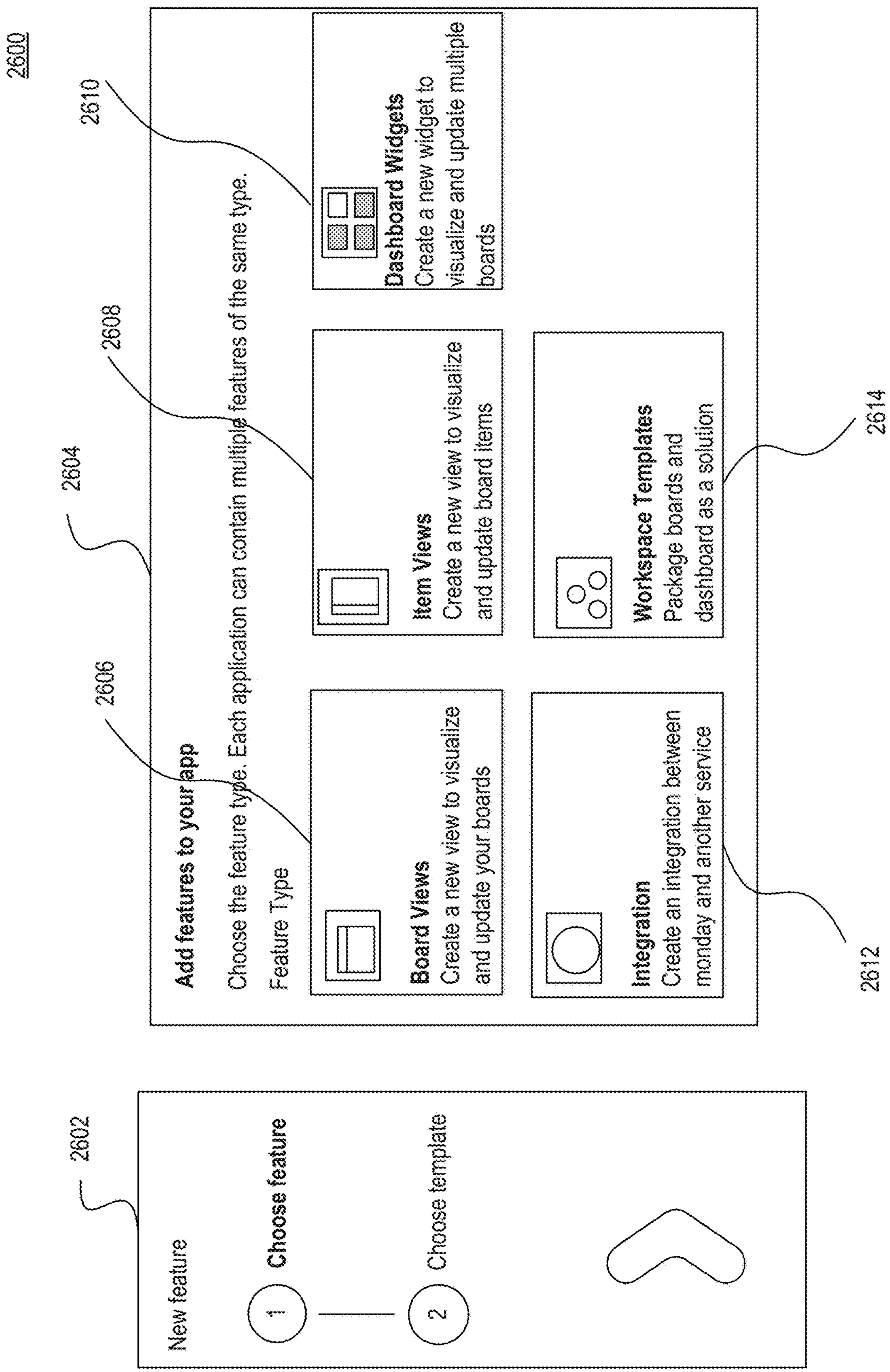
FIG. 26 is an exemplary representation of a feature center, consistent with some embodiments of the present disclosure.

FIG. 26 illustrates an exemplary representation of a feature center. Feature selection view 2600 allows for a guided approach for selecting an appropriate feature that may be applied to a template as shown in section 2602 of the feature selection view 2600. Exemplary features include but are not limited to generating board views 2606, item views 2608, dashboard widgets 2610, integrations 2612, and workspace templates 2614. Board view icon 2606 may enable users to generate a new view to visualize and update existing boards. Item view icon 2608 may enable users to generate a new view to visualize and update board items. Dashboard widgets icon 2610 may enable users to generate a new widget to visualize and update multiple boards. Integration icon 2612 may enable users to generate integration between various third-party services, such as ticketing service or an email service. Workspace templates icon 2614 may enable users to package boards and dashboards as a unified solution.

Users may be enabled to modify generated templates by versioning changes. Versioning may enable users to add or change functionality easily without disrupting existing end-users. Versioning enables users to maintain multiple draft versions and push specific versions to an end-user base as specific versions are finalized for release. Minor versions (e.g., versions including minor revisions) may be automatically pushed to end-users while major versions (e.g., versions including major revisions) may require end-users to reinstall the application. Major versions may be for large changes that could potentially break or otherwise disrupt a user's workflow. Existing users may need to reinstall the application when a new major version is released. Minor versions may be for small changes that can be pushed to end-users immediately. When a minor version is promoted, it may automatically be added to existing end-users' accounts.

Figure 27:
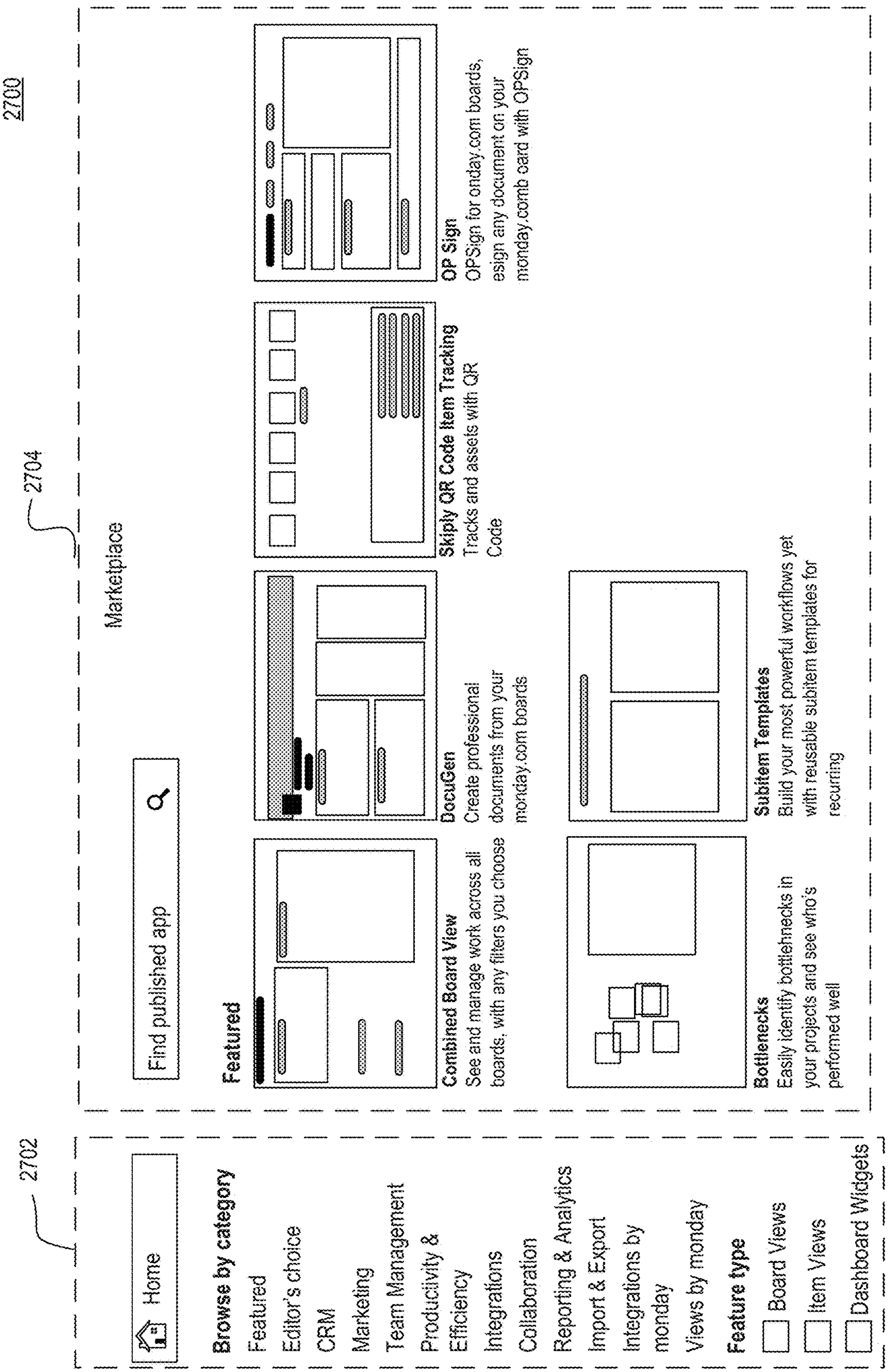
FIG. 27 is an exemplary representation of a marketplace view, consistent with some embodiments of the present disclosure.

FIG. 27 illustrates an exemplary representation of a marketplace view 2700. Marketplace view 2700 includes a navigation panel 2702, and a preview panel 2704. Navigation panel 2702 allows users to search and filter available applications within a marketplace. Filtering may be performed by selecting specific features consistent with the earlier disclosure. Applications may be shared for free, for purchase, or any combination of the approaches such as through a test trial or freemium model. There may be two primary ways that users can share an application. First, an application may be shared privately where these applications may be developed and shared only with other specific end-users. This approach may be preferred if a user builds a private application for a specific client, or for some internal teams. Second, an application may be shared publicly that may be available for anyone to use. Applications may be submitted to a marketplace by an author or any other use. If an application is approved, it may be available in a marketplace for all platform users to access and install in their accounts. Preview panel 2704 may show brief descriptions as well thumbnail previews of the approved, shared applications. Additionally, a referral link with a preinstalled application may be generated. If a new user creates an account using the referral link, an application may be preinstalled for the user and user may be able to interact with it without any additional steps.

Some embodiments will be apparent to those skilled in the art from consideration of the specification and practice of some of the disclosed embodiments disclosed herein. It is intended that the specification and examples be considered as exemplary only, with a true scope and spirit of some of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while some illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Aspects of this disclosure may relate to graphically aggregating data from a plurality of distinct tables and enabling dissociation of underlying aggregated data from the associated distinct tables, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

Aspects of this disclosure may include maintaining the plurality of distinct tables. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A table may be presented to a user in any manner in which the user is capable of viewing information associated with the table. A table may be presented, for example, via a display screen associated with a computing device such as a PC, laptop, tablet, projector, cell phone, or personal wearable device. A table may also be presented virtually through AR or VR glasses. Other mechanism of presenting may also be used to enable a user to visually comprehend presented information. Such information may be presented in cells. A cell may include any area, region or location in which information may be held, displayed, or otherwise presented. Values contained in the cells may include numeric, alphanumeric, or graphical information. The cells may be arranged in the table in vertical and horizontal rows (e.g., rows and columns), or in any other logical fashion.

Maintaining a plurality of distinct tables may include having at least two tables, having access to at least two tables, generating at least two tables, viewing at least two tables, or being provided at least two tables. Distinct tables may include two separate tables. The plurality of distinct tables may include tables from multiple entities or multiple accounts. The plurality of distinct tables may also include distinct tables of a single entity or account. The distinct tables of the single entity or account may include distinct tables sharing a common interface (e.g., table groups, sub-tables associated with a main table but with distinct structure from the main table). Distinct tables may include two or more tables having identical information within various cells or two or more tables having different information within various cells. Maintaining a plurality of distinct tables may include setting up the basic structure of having at least two tables and providing each table at last one cell. For example, in generating table A and table B, each table may have one or more cells.

Figure 28:
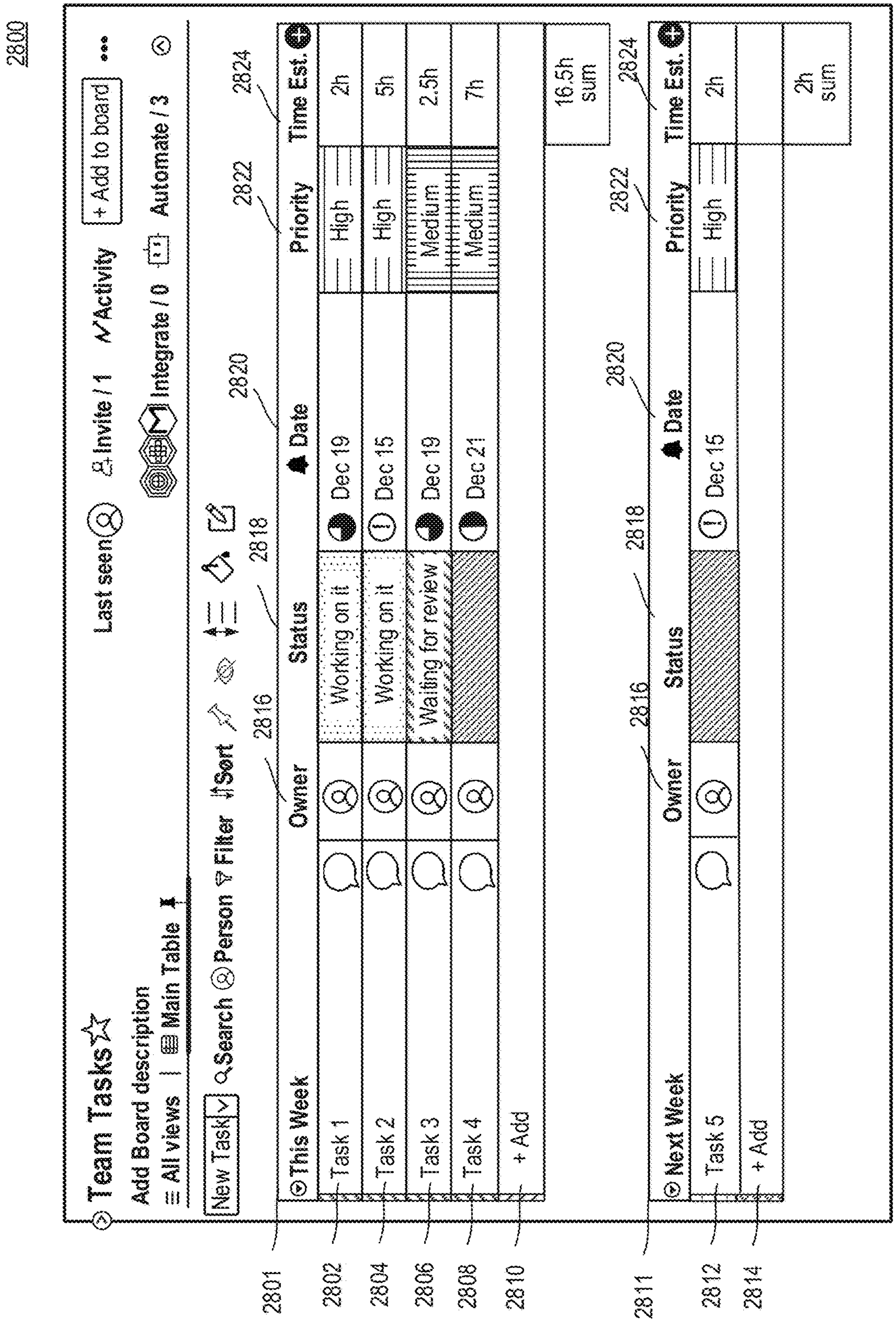
FIG. 28 illustrates an example of an interface with a first table (source or underlying table) containing various cells which are used as underlying data for an aggregated display of a plurality of items dissociated from differing source tables, consistent with some embodiments of the present disclosure.

By way of one example, board 2800 of FIG. 28 presents two tables within the team tasks board. As illustrated in this example, there is a plurality of distinct tables: "This Week" table 2801 and "Next Week" table 2811.

Aspects of this disclosure may include that each distinct table contains a plurality of items, with each item being made up of a plurality of cells categorized by category indicators, and wherein the plurality of distinct tables contain a common category indicator. A plurality of items may include one or more rows within each of the two or more tables. The rows may be horizontal or vertical according to preference.

By way of one example, board 2800 of FIG. 28 presents two tables within a team tasks board. As illustrated in this example, there is a plurality of distinct tables: "This Week" table 2801 and "Next Week" table 2811. Each of these distinct tables contain one or more items. For example, "This Week" table 2801 includes items "Task 1" 2802, "Task 2" 2804, "Task 3" 2806, and "Task 4" 2808. "Next Week" table 2811 includes item "Task 5" 2812.

Each item may be made up of a plurality of cells categorized by category indicators and may include each row being organized by category indicators. Category indicators may include values or representations employed for purposes of organization or grouping. For example, a category indicator may include a column heading (e.g., Status, Person, Description, Date, Timeline, and so on). Information associated with a common category indicator may be attributed to similar characteristics. In an exemplary embodiment where an item is contained in a horizontal row, the row may include cells associated with category indicators (e.g., column headings) that indicate a type of information that may be contained in that column. For example, an item (e.g., a property listing) may include three cells categorized by three category indicators (e.g., Status, Person, Address). Each cell associated with each category indicator may be contain information associated with each category indicator or be formatted by category indicator. For example, a cell associated with a Status column may contain status labels such as "Done," "Working on it," or "Stuck" and may be formatted to present these labels in colors commonly associated with each particular status. The item (e.g., a property listing) may be organized by the category indicators in any way according to preference. For example, the item may contain category indicators in the order of Status, People, then Address. The item may also be organized by Address, People, then Status, and by any other manner according to preference or default. The plurality of distinct tables containing a common category indicator may include two tables having a common column type.

By way of one example, each item (or row of a table), may be organized by category indicators (e.g., column headings) as shown in FIG. 28. For example, each item (Tasks 1-4) of "This Week" table 2801 includes category indicators (e.g., column headings) "Owner" 2816, "Status" 2818, "Date" 2820, "Priority" 2822, and "Time Est." 2824. Each item (Task 5) of "Next Week" table 2811 includes category indicators (e.g., column headings) "Owner" 2816, "Status" 2818, "Date" 2820, "Priority" 2822, and "Time Est." 2824.

By way of another example, items in two tables may have a common category indicator (e.g., column heading) in a common interface (e.g., two distinct tables as table groupings) in FIG. 28. As illustrated in this example, each item of "This Week" table 2801 and "Next Week" table 2811 contains five columns in common with common category indicators (e.g., column headings), namely, "Owner" 2816, "Status" 2818, "Date" 2820, "Priority" 2822, and "Time Est." 2824. Other embodiments of distinct tables may include different combinations and numbers of columns and category indicators, but may similarly share a common category indicator.

By way of one example, distinct tables of board 2800 may contain cells for holding values as shown in FIG. 28. As further illustrated in this example, cells are defined by intersections of vertical rows (columns) and horizontal rows. The values represented in the cells may include alphanumeric item designations, graphical information, dates such as illustrated in "Date" 2820, times as illustrated in "Time Est." 2824, and combinations of graphics as alphanumerics. In one embodiment, in an item which may be an assigned task, may have a "status" cell containing alternative designation values such as "done", "stuck", "working on it", or any other alphanumeric value that conveys information.

Aspects of this disclosure may include generating a graphical representation of a plurality of variables within the plurality of cells associated with a common category indicator. A graphical representation may include a chart, graph, symbol, illustration, picture, or other visualization to visibly depict quantitative or qualitative data. The data may be information contained in a plurality of cells associated with a common category indicator as previously discussed above. A graphical representation may include, for example, a pie chart, line graph, bar chart, a depiction of an object (e.g., a battery) or any other type of visualization depicting data. A graphical representation may also include a table. In some embodiments, graphical representations may be static or dynamic (e.g., updated and synced to changes made in data in an underlying table). Graphical representations may also be animated. For example, a graphical representation may include a visual representation of moving objects that each represent particular items in a table or tables. In some embodiments, graphical representations may be interactive, as further discussed below.

A plurality of variables within the plurality of cells associated with the common category indicator may include information, data, or values within cells of a common column. For example, in one embodiment, a graphical representation may be a chart of plurality of variables within the plurality of cells associated with the common category indicator (a bar chart with bars representing values in a common category indicator (e.g., column heading), e.g., A bar graph depicting the number of "Done" and "Incomplete" statuses of assignments).

Figure 29:
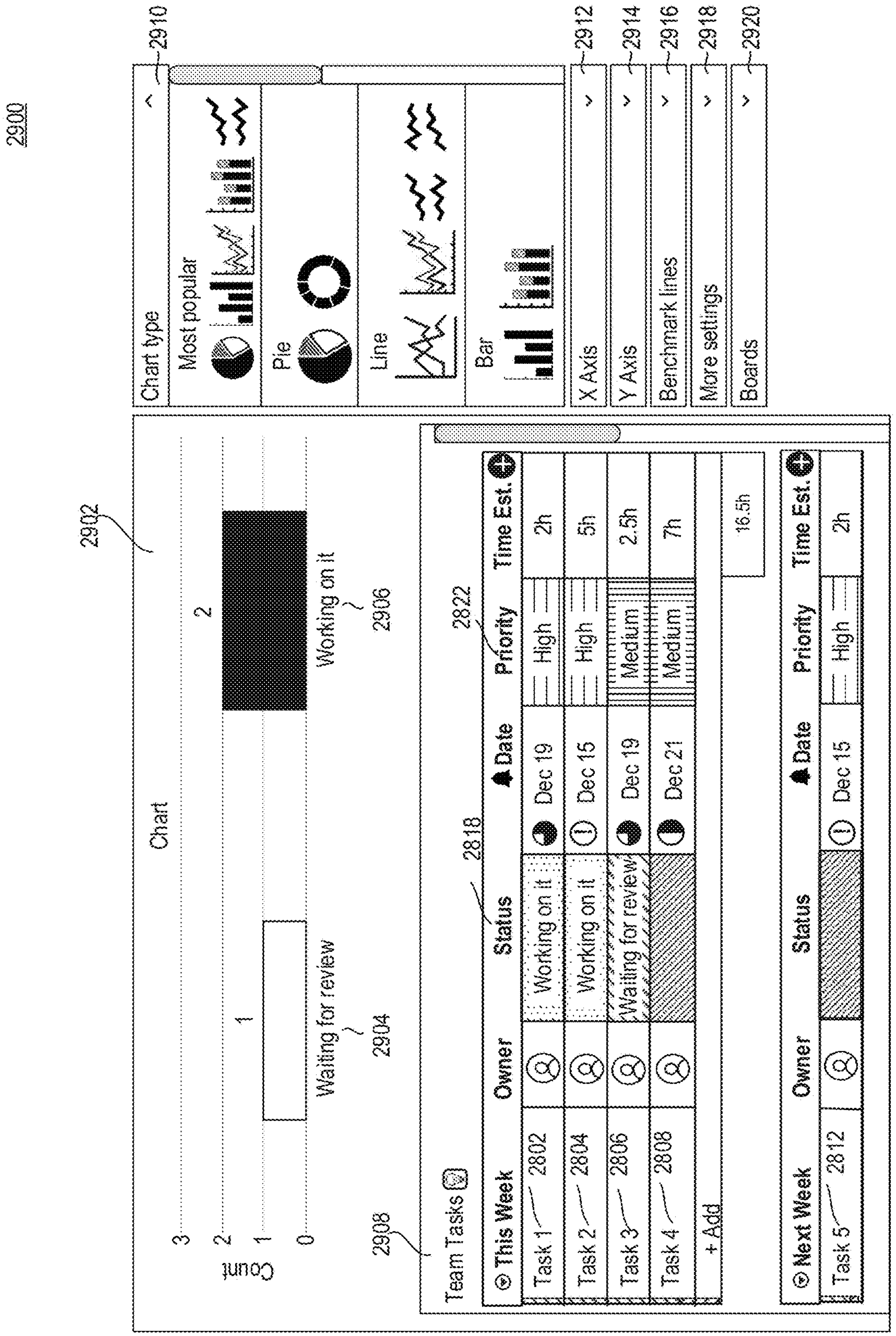
FIG. 29 illustrates an example of an interface for enabling a user to select various prompts in generating an aggregated display of a plurality of items dissociated from differing source tables, consistent with some embodiments of the present disclosure.

By way of one example, a graphical representation may include chart 2902 of FIG. 29. As illustrated in this example, interface 2900 depicts chart 2902 which includes variables (working on it/waiting for review) within the plurality of cells associated with the common category indicator "Status" 2818. Chart 2902 depicts one task with a "waiting for review" status shown in the "waiting for review" bar 2904 of the bar chart. Chart 2902 also depicts two tasks with "working on it" status shown in the "waiting for review" bar 2904 of the bar chart.

Aspects of this disclosure may involve a graphical representation including a plurality of sub-portions, each sub-portion representing a differing variable of the common category indicator. A graphical representation may include a chart or graph to visually display quantitative or qualitative data, as previously discussed. A graphical representation may include a pie chart, line graph, bar chart, or any other type of chart or graph depicting data. A plurality of sub-portions may be a part of the graphical representation. For example, if a graphical representation includes a pie chart, a sub-portion may be a "slice" of the pie chart. Similarly, if a graphical representation includes a bar chart, a sub-portion may be a bar of the bar chart. A sub-portion representing a differing variable of the common category indicator may include pieces of the whole graphical representation representing different values or data. For example, if a graphical representation includes a pie chart for differing statuses of a project, one sub-portion may depict "Complete" tasks and another sub-portion of the pie chart may depict "Incomplete" tasks.

By way of one example, a graphical representation may include chart 2902 of FIG. 29. As illustrated in this example, interface 2900 includes chart 2902 with sub-portions (or bars), each sub-portion (bar) representing a differing variable of the common category indicator (status). For example, in chart 2902 "working on it" bar 2904 and "waiting for review" bar 2906 are sub-portions representing the working on it/waiting for review cells in the category indicator "Status" column 2818. Chart 2902 depicts one task ("Task 3" 2806) with "waiting for review" status shown in the "waiting for review" bar 2904 of the bar chart. Chart 2902 also depicts two tasks ("Task 1" 2802 and "Task 2" 2804 with "working on it" status shown in the "working on it" bar 2906 of the bar chart.

In some embodiments, a chart type selector 2910 may enable a user to adapt chart 2902 to another chart type (e.g., pie chart, line graph, or any other type of chart or graph depicting data). X-Axis selector 2912 enables a user to change the X-axis of chart 2902. Changing the X-Axis values will change the represented data in chart 2902. Y-Axis selector 2914 enables a user to change the Y-axis of chart 2902. Changing the Y-Axis values will change the represented data in chart 2902. Benchmark lines selector 2918 enables a user to select various benchmark lines of chart 2902. Boards selector 2920 enables a user to select different boards and tables to use for underlying data for chart 2902. By way of another example, a user may select a category indicator/column, such as "Priority" or "Date," to update chart 2902 to present information from cells of those column.

Aspects of this disclosure may include receiving a selection of a sub-portion of the graphical representation. A selection of a sub-portion may include any action taken by a user (audio, visual, typographical, clicking, cursor hover, a tap on a touchscreen, or any other action/method) to choose any area of the graphical representation. For example, if a graphical representation includes a pie chart with a sub-portion as a "slice" of the pie chart, selecting a sub-portion may include a user clicking on a slice of the pie chart. Additionally, if a graphical representation includes a bar chart and a sub-portion would be a bar of the bar chart, selecting a sub-portion may include a user tapping on a bar of the bar chart. Receiving a selection may include a server or system receiving any indication of a selection as described above.

Figure 30:
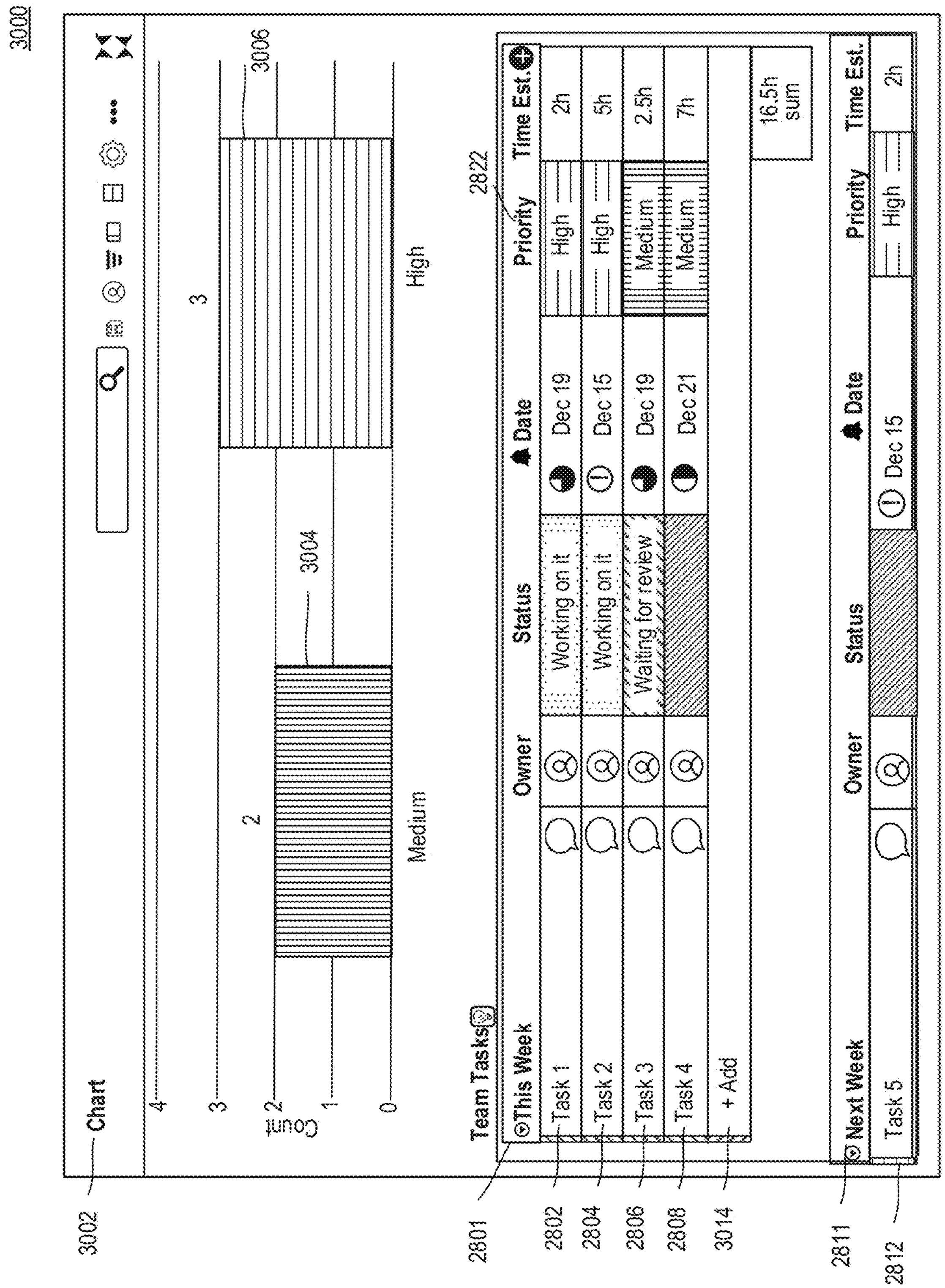
FIG. 30 illustrates a first example of an interface with a graphical representation of a plurality of variables within the plurality of cells associated with the common category indicator, consistent with some embodiments of the present disclosure.

By way of one example, a user may click on the "Priority" category indicator 2822 of FIG. 29 in order to update chart 2902 from a chart representing status of Tasks to a chart depicting priority of Tasks (as shown in chart 3002 of FIG. 30).

Aspects of this disclosure may include performing a look-up across the plurality of distinct tables for a specific variable associated with the received selection. A look-up may include any search function to find a value. A variable associated with the received selection may be any value or label related to a value or label that a user may have selected or generated. For example, if the user selected a "Priority" category indicator, the system may perform a search across multiple tables for values associated with "Priority", e.g., low, medium, and high priority.

Figure 31:
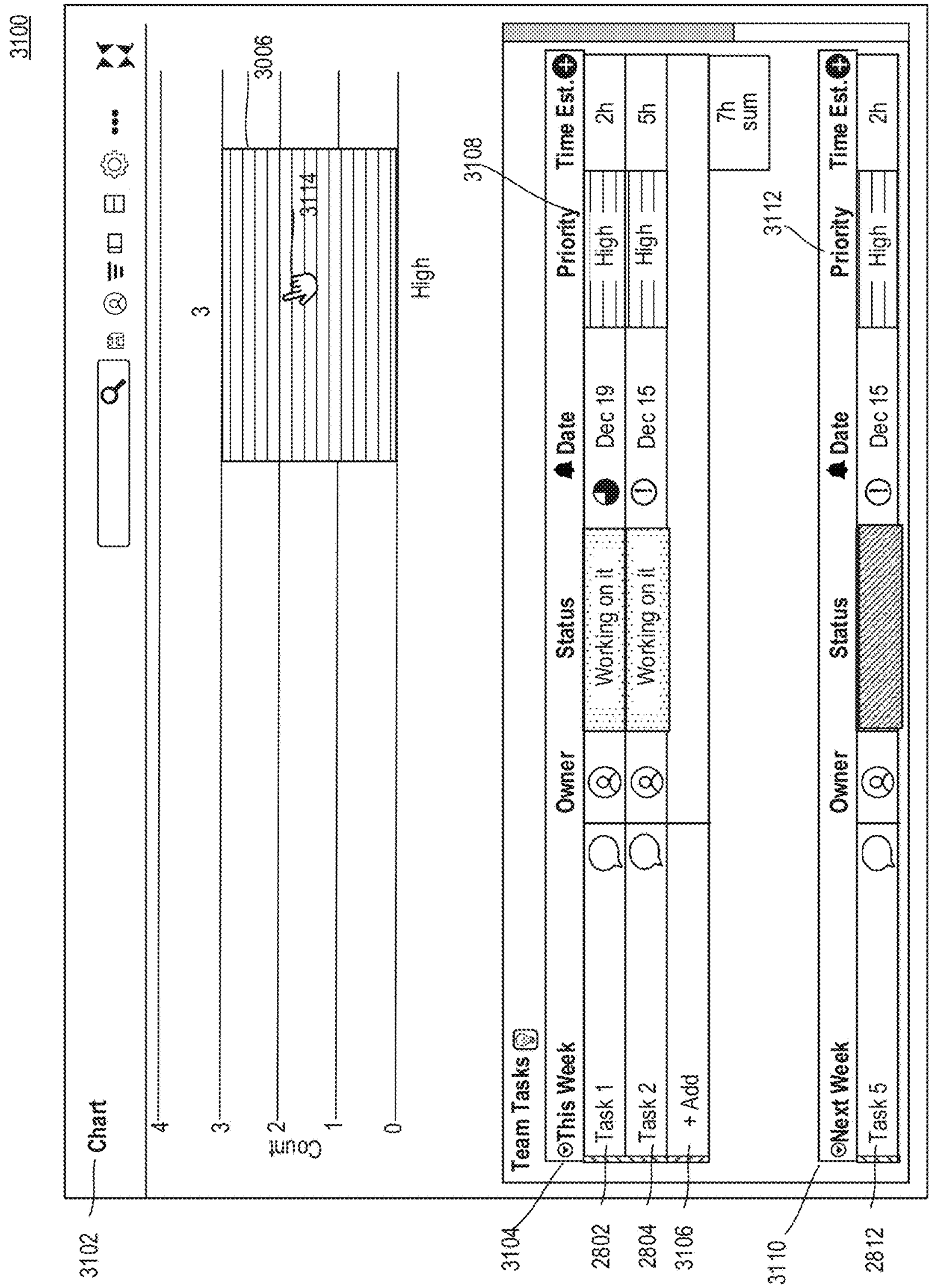
FIG. 31 illustrates a first example of an interface with an aggregated display of a plurality of items dissociated from the differing tables, wherein each displayed item includes the specific variable and variables associated with additional category indicators, consistent with some embodiments of the present disclosure.

By way of one example, if a user selects the "high" bar 3006 of bar chart 3102 of FIG. 31 with a cursor 3114, the system may perform a look-up across many tables, including at least "This Week" table 2801 and "Next Week" table 2811 of FIG. 30, to identify each instance of "high" in each of the distinct tables.

In some embodiments at least one processor may, based on the look-up, cause an aggregated display of a plurality of items dissociated from the differing tables wherein each displayed item may include the specific variable and variables associated with additional category indicators.

An aggregated display may include a presentation, on an interface, of items combined from two or more separate tables from a single user or a plurality of users. An aggregated display may be in an alphanumeric format, graphical format, or a combination thereof. For example, an aggregated display may include a new table with one item from table A and one item from table B and may generate a new interface showing a separate table (e.g., an aggregated table) from table A and table B. In another example, a system may pull the first row from one table and another row from another table. In one embodiment, for example, table A and table B both need a "status" column or share a similar column in order to aggregate. However, having at least one common column (category indicator) does not necessarily require that the tables have the same column structure. In one embodiment, the system may parse out underlying data from table A and table B in order to generate an aggregated display. A dissociation from differing tables may include taking apart specific parts of one table or graph from other parts of the table or graph. A dissociated table may allow for viewing snippets of one table without the other parts of the table and without original formatting.

As described above, by way of one example shown in FIG. 31, if a user selects the "high" bar 3006 of bar chart 3102 with cursor 3114, the system may perform a look-up across many tables, including at least "This Week" table 2801 and "Next Week" table 2811 of FIG. 30. Based on the look-up, the system may provide an aggregated display of items. For example, in FIG. 31, aggregated "This Week" table 3104 includes original "Task 1" 2802 and "Task 2" 2804 from the table of FIGS. 28 to 30 but dissociated from the "This Week" table 2801 of FIGS. 28 to 30. Further, aggregated "Next Week" table 3110 includes original "Task 1" 2802 and "Task 2" 2804 from the table of FIGS. 28 to 30 but dissociated from the "This Week" table 2801 of FIGS. 28 to 30. In yet another example, the aggregated display of items may be an updated chart.

Aspects of this disclosure may include at least one processor configured to receive selections of multiple sub-portions of the graphical display and perform a look-up across the plurality of distinct tables for specific variables associated with the received selections. Receiving selection of multiple sub-portions may be carried out consistent with some embodiments as previously discussed. For example, in one embodiment, a user may seek to view multiple portions of a graphical display (e.g., a pie chart), including the "medium" and "high" priority items within the "low," "medium," and "high" priority projects. In another example, a user may seek to view "Done" AND "Stuck" projects. Or, in another example, a user may seek to view "Done" OR "Stuck" projects.

In some embodiments, the aggregated display includes a new table different from each of the distinct tables. In other embodiments, the aggregated display may include a graphical indicator based on a percentage makeup of a characteristic of the plurality of items. By way of one example, an interface may depict a graphical representation of a percentage (e.g., pie chart) to show what percentage makeup of "Stuck" tasks belong to each team member, or any other characteristic.

In an exemplary embodiment shown in FIG. 31, aggregated "This Week" table 3104 and "Next Week" table 3110 are entirely new tables that are different from the underlying tables the items were originally drawn from ("This Week" table 2801 and "Next Week" table 2811 of FIGS. 28 to 30). The aggregated table in FIG. 31 for example only shows items that are categorized as having high priority.

In one example, in FIG. 30, chart 3002 may display items with a specific variable and variables associated with additional category indicators, such as only showing items that are categorized as having high or medium priority, specific variables associated with the additional category indicator (priority). In another example, aggregated "This Week" table 3104 and aggregated "Next Week" table 3110 in FIG. 31 only show items that are categorized as having high priority, specific variables associated with the additional category indicator (priority).

In one embodiment, a feedback form may be generated to have employees answer questions. A table may be generated to collect responses each day. Each answer submitted may trigger a new item to be generated on the table for the present day.

Figure 32:
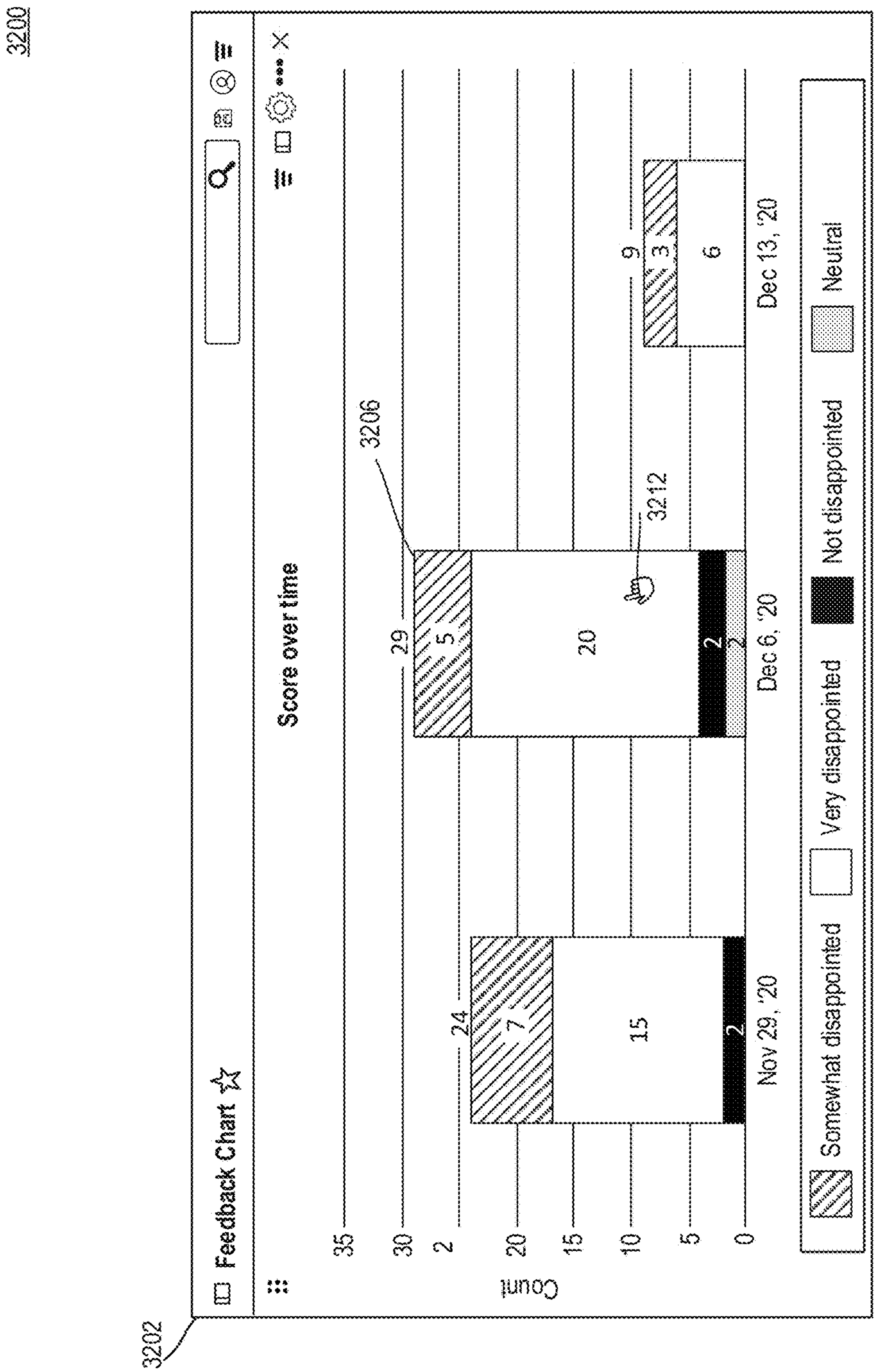
FIG. 32 illustrates a second example of an interface with a graphical representation of a plurality of variables within the plurality of cells associated with the common category indicator, consistent with some embodiments of the present disclosure.

Interface 3200 of FIG. 32 depicts Feedback chart 3202. Feedback chart 3202 is a graphical representation of a plurality of variables within the plurality of cells associated with the common category indicator (Time). Items from multiple tables (one for each day of responses) were collected and grouped into Feedback chart 3202. In this case, a user may select the Y-Axis of the Chart to depict the number of answers submitted per day. Feedback chart 3202 also depicts a breakdown in each bar of the bar chart which shows answers to a "How do you feel" category. Feedback chart 3202 depicts the number of "somewhat disappointed," "very disappointed," not disappointed," and "neutral" answers to the form question. A user may use mouse pointer 3212 to click on a portion of the Dec. 6, 2020 bar 3206 in order to drill down and seek further detailed information on the data that represents the 5 "somewhat disappointed" users 20 "very disappointed" users, the 2 "not disappointed" users, or the 2 "neutral" users.

Figure 33:
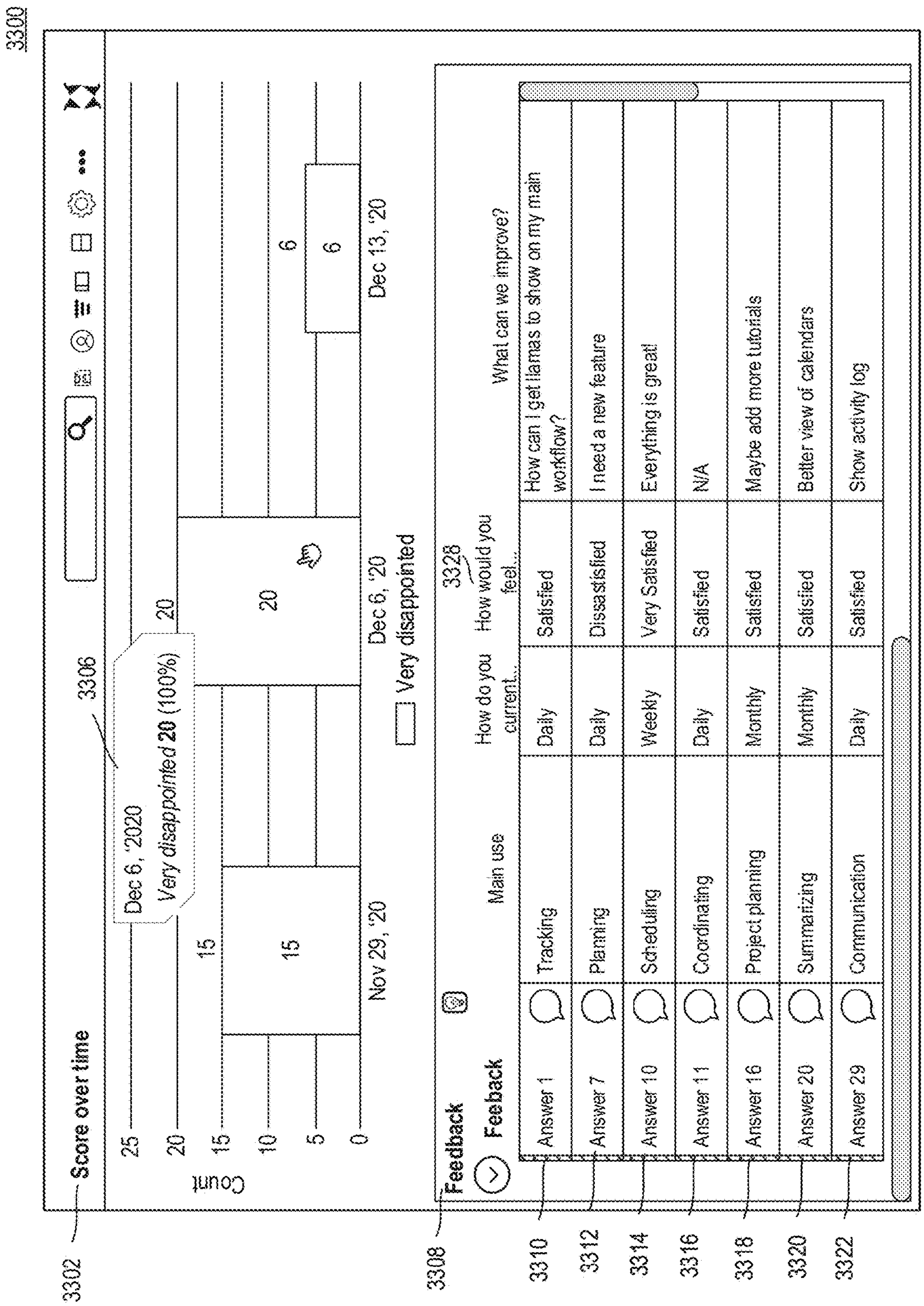
FIG. 33 illustrates a second example of an interface with an aggregated display of a plurality of items dissociated from the differing tables, wherein each displayed item includes the specific variable and variables associated with additional category indicators, consistent with some embodiments of the present disclosure.

After clicking on the "20" "very disappointed" users of Dec. 6, 2020 bar 3206, interface 3300 of FIG. 33 may populate. Simply hovering over the bar may also populate notification 3306 with detailed information on the bar. Chart 3302 shows an updated version of the data with simply the "very disappointed users" shown on the chart. Additionally, interface 3300 includes aggregated display 3308 which is table with items categorized by the "How do you feel" category indicator 3328 with a "very disappointed" variable pulled items from underlying tables. Aggregated display 3308 is dissociated from the underlying/differing tables as it is a completely new table without some data from the underlying tables. Aggregated display 3308 includes various answers from users as items 3310, 3312, 3314, 3316, 3318, 3320, 3322. Each of these items (answers) share a common category indicator.

According to some embodiments, at least one processor may be configured to receive a sub-selection of the plurality of distinct tables for exclusion from the aggregated display. A sub-selection of the plurality of distinct tables for exclusion may include an identification of a portion or group of data (e.g., at least one item, at least one column, at least one group associated with an entity) from a table that are not to be used or presented, consistent with some embodiments of the disclosure. In one embodiment, a user may select tables or portions or tables to exclude from the aggregated display. In some embodiments, following the received sub-selection, the aggregated display may be caused to change to omit items from the excluded tables. For example, once a user selects tables or portions of tables to exclude from the aggregated display, the aggregated display may update to omit the selected items.

For example, a user may select to exclude "Task 3" 2806 of "This Week" table 2801 as shown in FIG. 30 from the aggregated "This Week" table 3104 of FIG. 31. As a result "Task 3" is excluded from presentation in the table 3104 of FIG. 31. By another example, a user may select to exclude "Task 2" 2804 of "This Week" table 2801 of FIG. 30 from the aggregated "This Week" table 3104 of FIG. 31. Upon receiving the selection, the system may update "This Week" table 3104 of FIG. 31 to remove "Task 2" 2804.

According to some embodiments, at least one processor may be configured to store the selections as a template. A template may include a sample table or board that may already include some details or information in place (such as a fill-in-the-blank form). In one embodiment, a user may be enabled to save the aggregated display view as a new dashboard (e.g., user may want a table aggregating all of the "stuck" items).

By way of one example, "This Week" table 3104 and "Next Week" table 3110 of FIG. 31 may be saved as a new template or dashboard. Such a template would provide a table with all high priority categorized tasks.

Aspects of this disclosure may include at least one processor that may be further configured to receive a selection to alter one of the plurality of items of the aggregated display. A selection to alter one of the plurality of items of the aggregated display may include any action or indication to update any cell on the aggregated display. Altering may include the addition, modification, or deletion of information contained partially or entirely by an item in order to update any cell. In one embodiment, the system may enable a user to click on a cell of the aggregated table to change a status of an item.

By one example, a user may select the "Status" cell of "Task 2" 2804 of aggregated "This Week" table 3104 of FIG. 31 in order to change the status from "Working on it" to "Complete." By another example, a user may add items to underlying tables or aggregated tables via, for example, add buttons 2810 and 2814 of FIG. 28, add button 3014 of FIG. 30, and add button 3106 of FIG. 31.

Aspects of this disclosure may include outputting a display signal to re-render the aggregated display of the plurality of items in response to the selection to alter one of the plurality of items. A display signal may include any electronic signal or instruction to cause an action that results in a display, rendering, regarding-rendering or projection of information. Re-rendering may include any manner of refreshing, re-displaying, or re-projecting information as a result of an alternation of information. In one embodiment, once a user selects to alter one of the items, the aggregated display may update to display the changes.

For example, a user may select the "Status" cell of "Task 2" 2804 of aggregated "This Week" table 3104 of FIG. 31 in order to change the status from "Working on it" to "Complete." In response to the selection to change "Working on it" to "Complete," the system may output a display signal to re-render (or update) the aggregated display of the plurality of items.

In another example, if a user changes "Priority" of "Task 2" 2804 of aggregated "This Week" table 3104 of FIG. 31 from "High" to "Low," then the change would cause the aggregated table to re-render without that changed item because it no longer meets the selection (high priority table).

Figure 34:
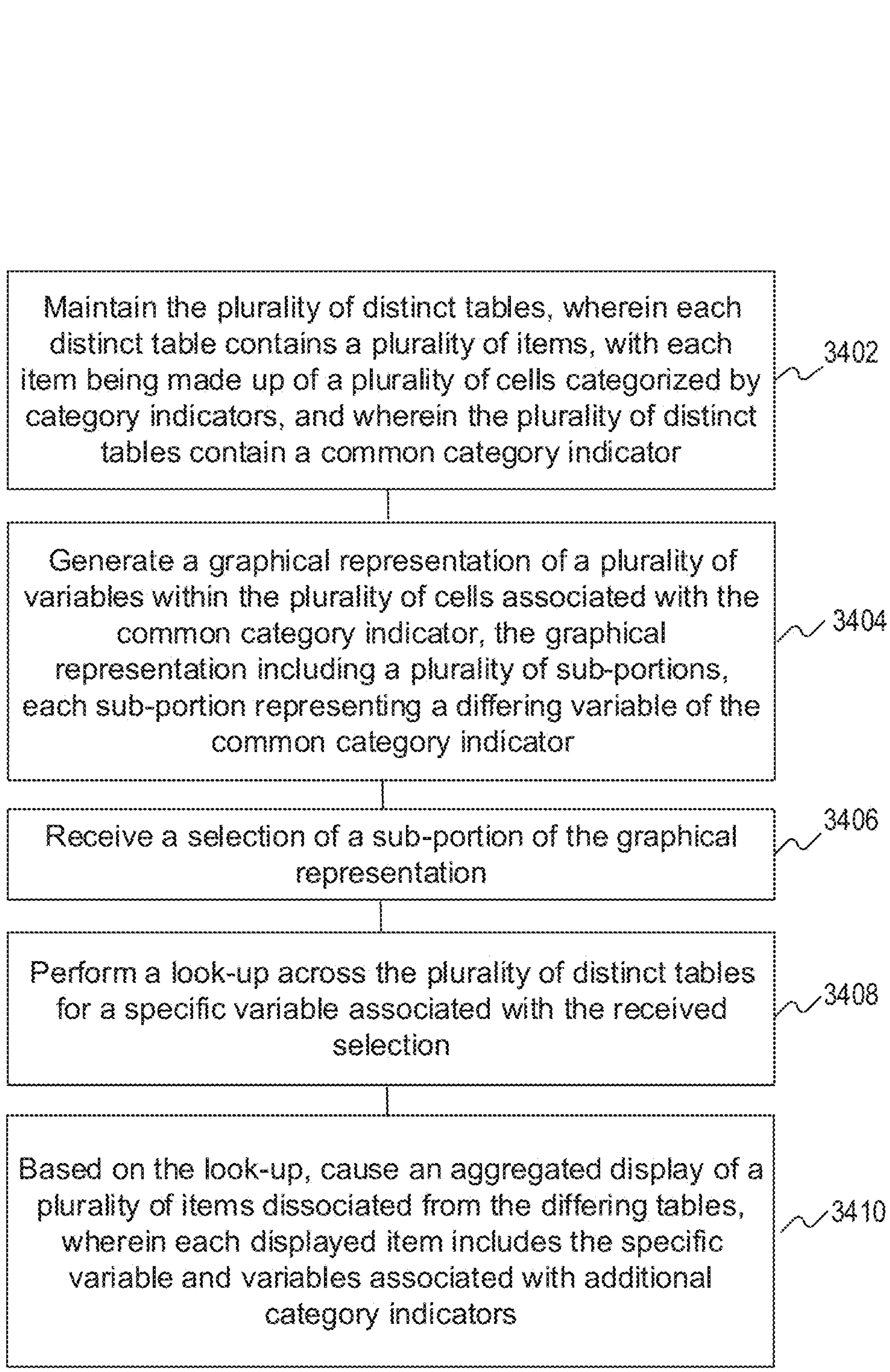
FIG. 34 illustrates a block diagram of method 3400 performed by a processor of a computer readable medium containing instructions, consistent with some embodiments of the present disclosure.

FIG. 34 illustrates a block diagram of method 3400 performed by a processor of a computer readable medium containing instructions, consistent with disclosed embodiments. In some embodiments, the method may include the following steps:

Block 3402: Maintain the plurality of distinct tables, wherein each distinct table contains a plurality of items, with each item being made up of a plurality of cells categorized by category indicators, and wherein the plurality of distinct tables contain a common category indicator.

In some embodiments, two boards may each include various items with at least a shared category indicator (e.g., Priority column).

Block 3404: Generate a graphical representation of a plurality of variables within the plurality of cells associated with the common category indicator, the graphical representation including a plurality of sub-portions, each sub-portion representing a differing variable of the common category indicator. In some embodiments, the system may generate a graphical representation (either a chart or another table) using the cells from different tables that have a shared category indicator (e.g., Priority column).

Block 3406: Receive a selection of a sub-portion of the graphical representation. In some embodiments, the system may receive a selection from a user that would like to drill-down or see a specific portion of the graphical representation (e.g., High priority cells of the Priority column).

Block 3408: Perform a look-up across the plurality of distinct tables for a specific variable associated with the received selection. In some embodiments, the system may search the various underlying tables for the specific cell value associated with the selection (e.g., high priority cells in different tables).

Block 3410: Based on the look-up, cause an aggregated display of a plurality of items dissociated from the differing tables, wherein each displayed item includes the specific variable and variables associated with additional category indicators. In some embodiments, the system may generate a new aggregated table with data of interest from different tables.

Aspects of this disclosure may relate to syncing data between a first platform and a third-party application, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In some embodiments, the system may enable users to connect boards from a first platform for data management to third-party applications and sync data in both directions. To facilitate the exchange, a frame may be opened within the first platform to enable viewing and editing of the third-party application in the third-party application's native format. Then, changes made in the native format may automatically sync to tables sharing that information in the first platform.

Aspects of this disclosure may include accessing a first platform that displays a first set of data in a first format. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects, or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A platform may include an application, system, or other instrumentality that supports or provides functionality. It may include, for example, or set of software with a surrounding ecosystem of resources. In one embodiment, a first platform may be a data management and project management platform. Accessing a platform may include one or more of gaining access to functionality, such as software, retrieving information that enables such access, generating a platform, viewing a platform, or being provided a platform. A set of data may include a collection of qualitative and/or quantitative information. A format may include the way in which something is arranged or set out. For example, the format may be the tabular platform format. A first format may include formatting native to a first platform (such as a data management platform's tablature or table structure). A second format may include the native formatting of a second platform (such as a third-party application's platform's table structure, or any other platform hosting different information).

Aspects of this disclosure may include accessing a second platform that may display a second set of data in a second format. The definitions of a platform, accessing a platform and format, as described above in connection with the first platform applies equally to the second platform. However, the specific functionality associated with each platform may vary. In one embodiment for example, a first platform may be a data management and project management platform, while a second platform may be any third-party application platform. A set of data may include a collection of qualitative and/or quantitative information. In some embodiments, the first and second sets of data may be the same data. In another embodiment, the first and second sets of data may be different data. While a first format of a first platform may be different from a second format of a second platform, the first and second formats of the first and second platforms may also be the same.

In one embodiment, a first format may include formatting native to a first platform (such as a data management platform's tablature), and a second format may include formatting native to a second platform (such as a third-party application's platform's tablature). In some embodiments, the first and second platforms may share the same or similar formats. In another embodiment, the first and second formats may differ.

Aspects of this disclosure may include linking a first set of data with a second set of data to enable migration of the first set of data to the second platform and the second set of data to the first platform. Linking data may include connecting, joining, coupling, or associating one set of data with another set of data. Migration of data may include moving, transferring, or copying of data from one location to another location. In one embodiment, linking data and migrating data may include syncing data via an automation set up by a user on the first or second platforms. The automation may include syncing in both directions (syncing data from the first platform to the second platform as well as syncing data from the second platform to the first platform). While such a system may introduce potential for a loop, the system may include a mechanism to address that issue. For example, where changes have been triggered by the first platform, the system may add an identifier to the change. Then, by checking for the identifier, the system may be notified to not continue into a loop (not trigger another change). For example, if one platform triggers a data change, the system may be configured to stop the loop of repeating the same data change.

Aspects of this disclosure may involve linking a first set of data with a second set of data by including mapping a data type from the first set of data to a data type from second set of data. Mapping may include a process of matching fields from one set of data to another. Mapping may also include a process of creating matching fields between two distinct data models, and/or facilitating data migration, data integration, and other data management tasks. Mapping may occur automatically according to a determination by the system or may occur manually by a user. A data type may include a particular data characteristic, including an indicator of its substance, form, or storage. For example, a characteristic may relate to how data is stored, viewed, and organized. In one embodiment, a data type may refer to any column type in a table. For example, if a change occurs on a first platform, the change may be reflected in the data on the second platform after the linking/mapping occurs. In one embodiment, linking the first set of data with the second set of data may include mapping a data type from the second set of data to a data type from first set of data. For example, if a change occurs on a second platform indicating a change in a project status, the change may be reflected in the data on the first platform after the linking/mapping occurs to reflect a change as a result of the project status change.

In some embodiments, linking a first set of data with a second set of data may occur as a result of an input to a logical sentence structure, wherein at least one processor may be configured, in response to receipt of an input, to regulate a syncing of the second data set with the first data set. An input may include something that is provided or given to a computing device (e.g., when a computer or device receives a command or signal from outer sources such as a user or information update). A logical sentence structure may include a user-defined rule (e.g., an automation) that may perform a logical function that may depend on a condition being met. Regulating may include controlling or maintaining a syncing. Syncing of data may include a transfer of data between two or more locations (e.g., platforms) so that one or both contains overlapping information with the other. Syncing may preferably occur continuously. In other embodiments, syncing may be triggered by certain actions or may occur periodically.

Figure 35:
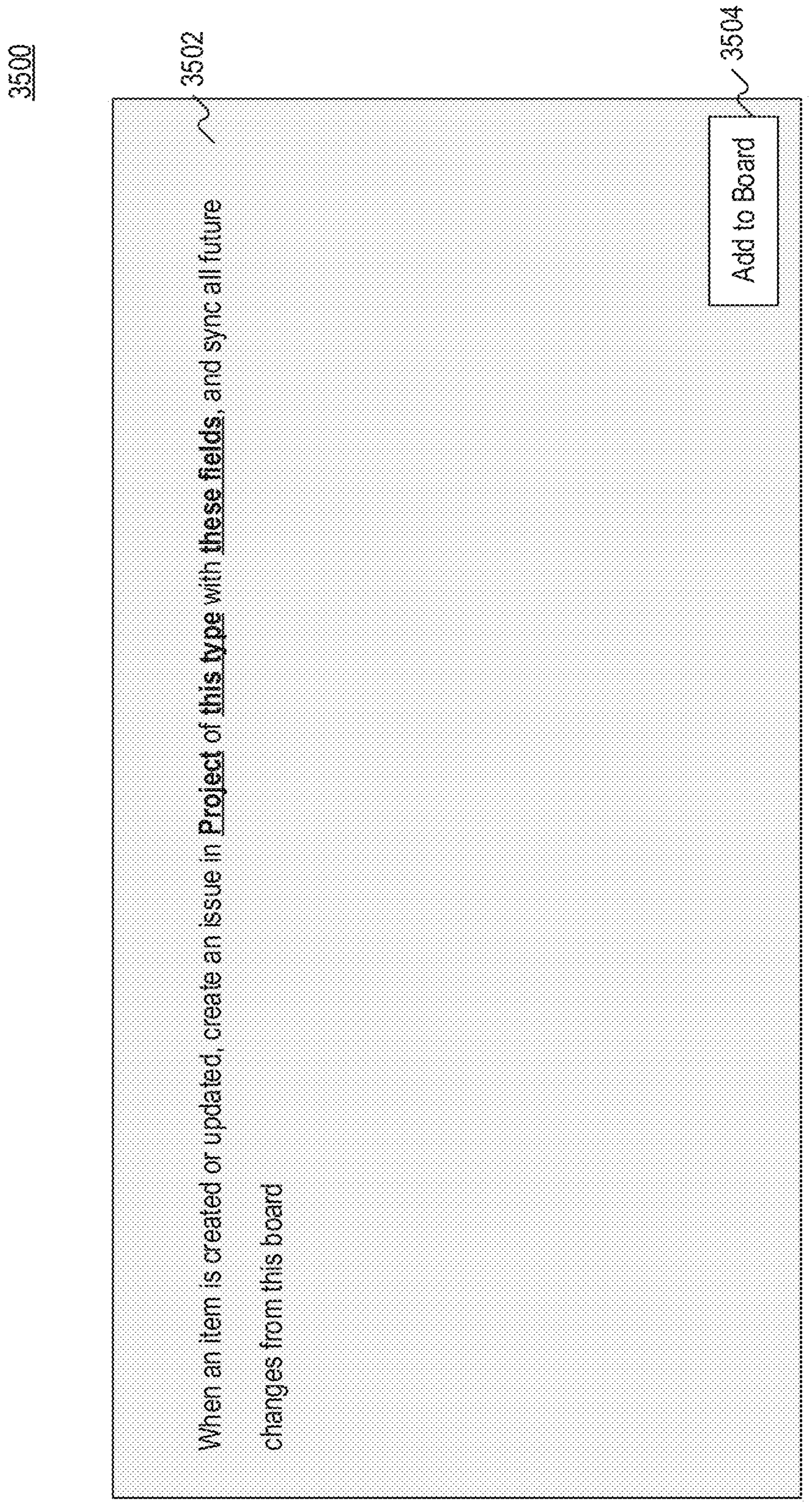
FIG. 35 illustrates an example of an interface with a user-defined automation for syncing data between a first platform and a second platform (third-party application), consistent with some embodiments of the present disclosure.

FIG. 35 illustrates an example of an interface with a user-defined automation for syncing data between a first platform and a third-party application (e.g., a second platform). Interface 3500 of FIG. 35 depicts logical sentence structure 3502. As shown in FIG. 35, logical sentence structure 3502 is a user-defined rule that may perform a logical function. The user may click on the "Add to Board" button 3504 to save the logical sentence structure 3502 and have the system perform the associated logical function. Specifically, logical sentence structure 3502 of FIG. 35 provides, "when an item is created or updated, create an issue in Project (e.g., a user selected project/board/table) of this type (e.g., a user-selected type) with these fields (e.g., a user-selected field as shown in FIG. 36), and sync all future changes from this board."

In another embodiment, the logical sentence structure may provide, "sync all changes from this board," and all cells may be linked with the current fields from the second platform and any future changes may also be linked. Other exemplary logical sentence structures may include "sync all changes from [Board A of internal platform] to fields from [third-party application]," "sync some changes from [Board A of internal platform] to fields from [third-party application]," "sync all changes between [Board B of internal platform] with fields from [third-party application] and [second third-party application]," "sync some changes between [Board A of internal platform] with fields from [third-party application]," and more. Syncing may be dependent on an item being added/updated to a board, a time of day, a date, or any event that may occur. Portions of logical sentence structures may be user-selected. For example, the user may select "Project" to be a certain board, "type" to be a certain column style, and "fields" to be particular fields.

Figure 36:
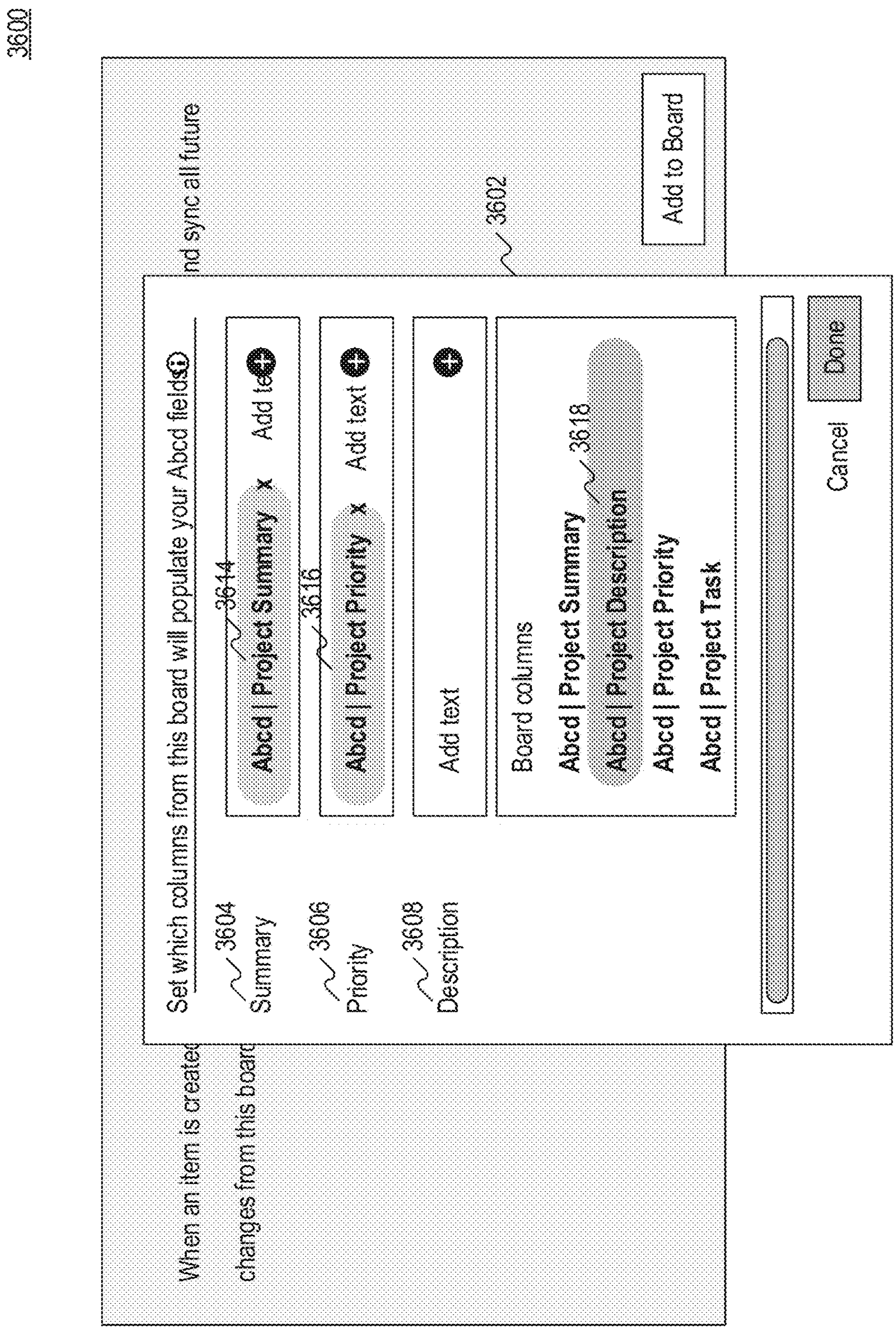
FIG. 36 illustrates an example of an interface for selecting fields of the user-defined automation of FIG. 35, consistent with some embodiments of the present disclosure.

By way of one example, FIG. 36 illustrates an embodiment of an interface for selecting fields of the user-defined automation of FIG. 35. Interface 3600 of FIG. 36 depicts selection interface 3602 where a user may select the "fields" from logical sentence structure 3502 (e.g., an automation). As shown in FIG. 36, a user may select particular columns from the board (fields associated with a column of the first platform) that will populate in a third-party application and vice versa (fields from the third-party application that will populate fields of the first platform) for two-way syncing. Logical sentence structure 3502 provides "When an item is created or updated, create an issue in Project (already selected by the user) of this type (already selected by the user) with these fields (in selection process using selection interface 3602 of FIG. 36), and sync all future changes from this board." Specifically, the user-selected cells of Summary 3604 of the first platform may populate in the cells of "Jira Project Summary" 3614 of the second platform during syncing, and cells of "Jira Project Summary" 3614 of the second platform may populate in the cells of Summary 3604 of the first platform during syncing. Additionally, the user-selected cells of Priority 3606 of the first platform may populate in the cells of "Jira Project Priority" 3616 of the second platform during syncing, and cells of "Jira Project Priority" 3616 of the second platform may populate in the cells of Priority 3606 of the first platform during syncing. Further, when a user selects the cells of Description 3608 of the first platform, those selected cells of Description 3608 may populate the cells of "Jira Project Description" 3618 of the second platform during syncing, and cells of "Jira Project Description" 3618 of the second platform may populate the cells of Description 3608 of the first platform during syncing.

In one embodiment, when defining particular fields to use (e.g., mapping) from one platform to another platform, a user may select multiple columns from a first platform's table to combine into a column in a second platform (or vice-versa). For example, a user may insert "(Summary cell value)-(Priority cell value)" into the "Project Summary" column of the second platform (e.g. "Summary 1—High" may populate in the second platform).

Figure 37:
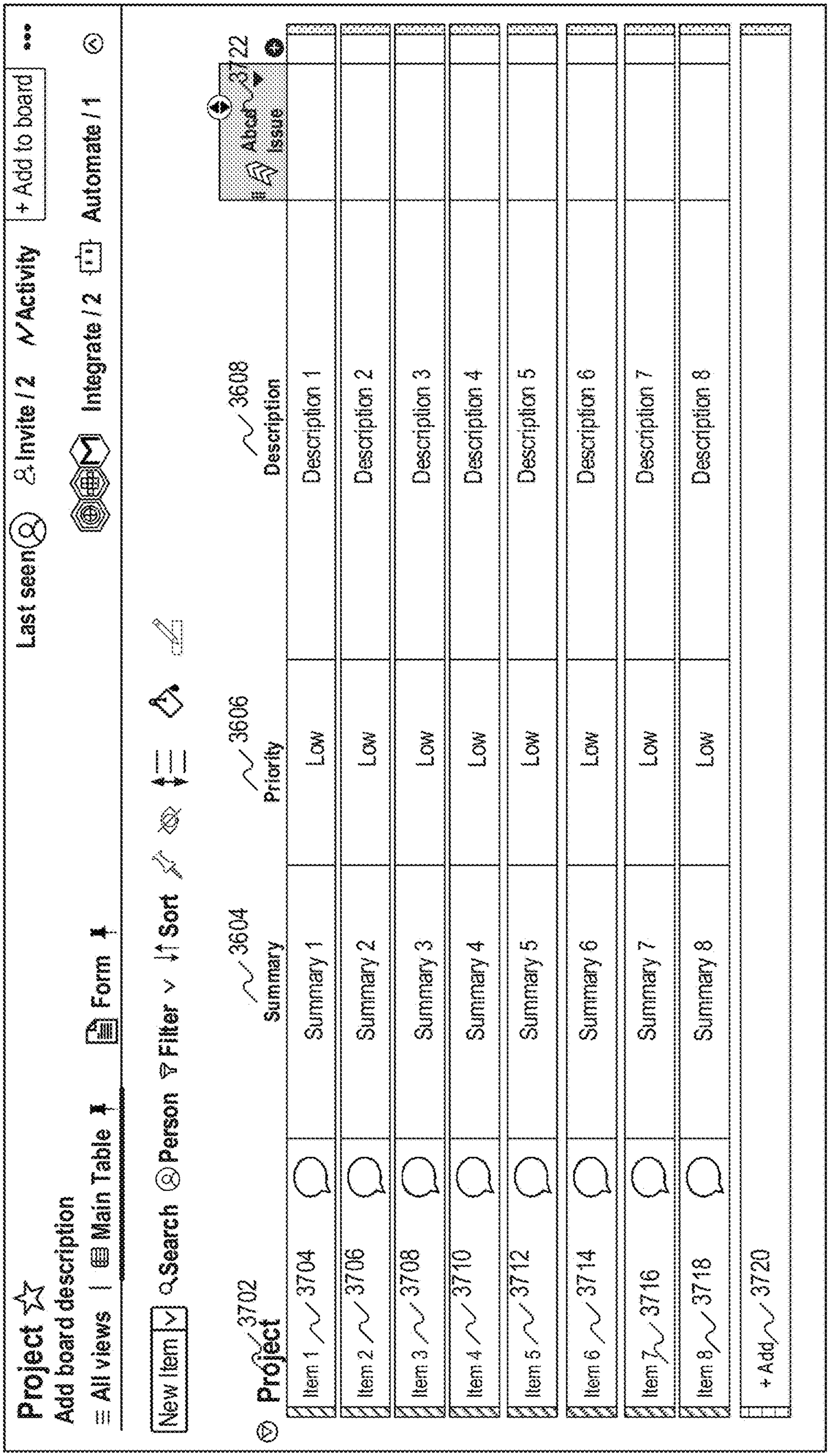
FIG. 37 illustrates an example of an interface with a new table on a first platform which may link and migrate a first set of data from the first platform with a second set of data from a second platform, consistent with some embodiments of the present disclosure.

By way of one example, FIG. 37 illustrates an embodiment of an interface with a new table on a first platform which may link and migrate a first set of data from the first platform to a second set of data from a second platform. Interface 3700 of FIG. 37 depicts board 3702 within the first platform displaying a first set of data. The data may include information contained in the cells of columns associated with Summary 3604, Priority 3606, and Description 3608. Board 3702 includes eight items: "item 1" 3704, "item 2" 3706, "item 3" 3708, "item 4" 3710, "item 5" 3712, "item 6" 3714, "item 7" 3716, and "item 8" 3718. Board 3702 further includes "Add Button" 3720 to add new items to the board. Board 3702 also includes "Jira issue" column 3722 because logical sentence structure 3502 of FIG. 35 indicated the system may generate an issue in board 3702 (Project) when an item is created or updated.

Figure 38:
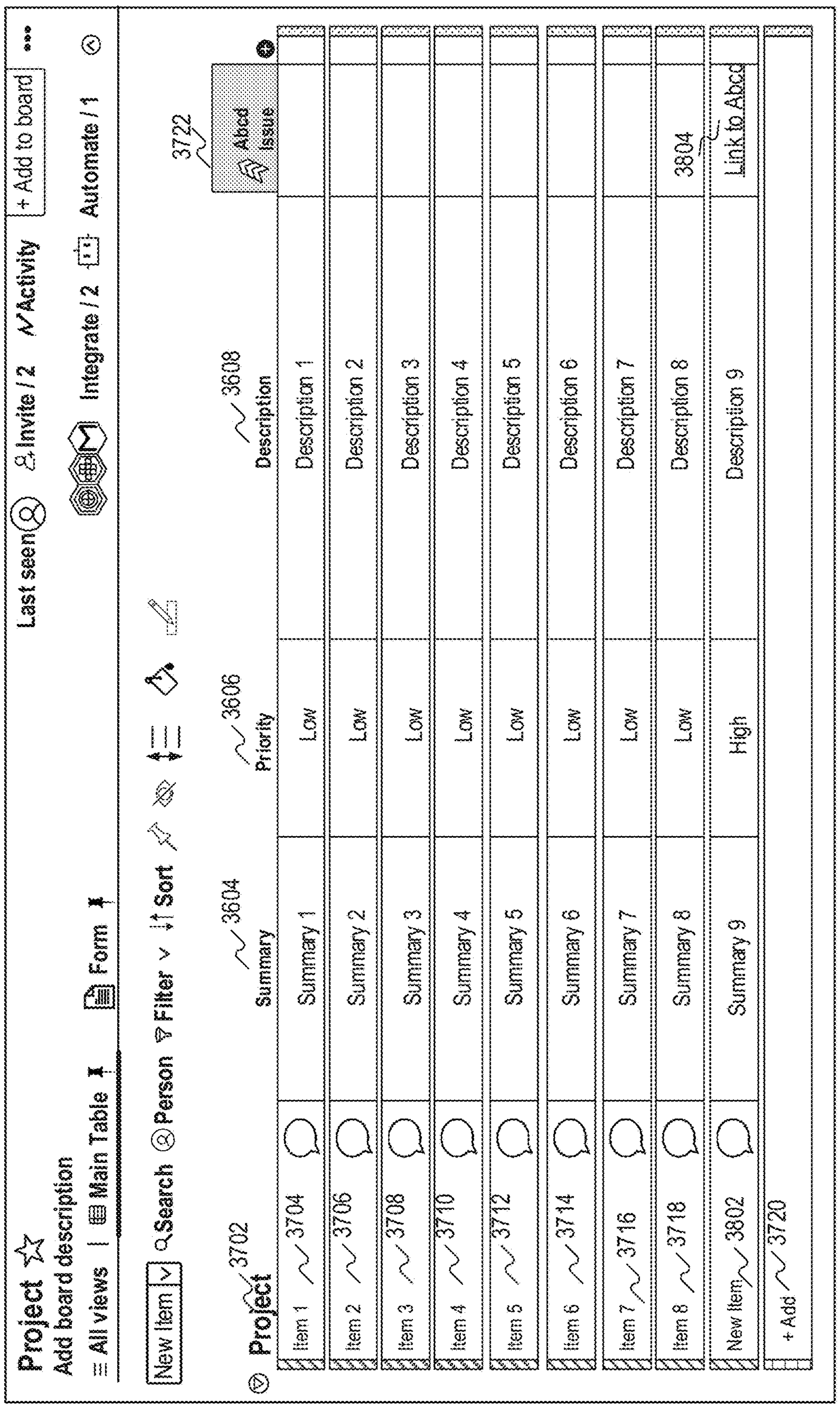
FIG. 38 illustrates an example of an interface where a user adds a new item and thus enables alteration of a second set of data in a second platform through manipulation of the interface of data in the first platform and a hyperlink to provide a frame of the second platform within the first platform, consistent with some embodiments of the present disclosure.

FIG. 38 illustrates an example of an interface 3800 where a user may add a new item to thereby enable alteration of a second set of data in a second platform through manipulation of the interface of data in the first platform (e.g., the platform containing interface 3800). Interface 3800 of FIG. 38 depicts a board 3702 within the first platform displaying a first set of data. The first set of data is slightly modified from the first set of data presented on interface 3700 of FIG. 37 in that interface 3800 includes New Item 3802 as a result of selecting the "add" button 3720 of FIG. 37.

The cells associated with New Item 3802 are populated ("Summary" cell is filled with "Summary 9," "Priority" cell is filled with "High," and the "Description" field is filled with "Description 9").

Figure 40:
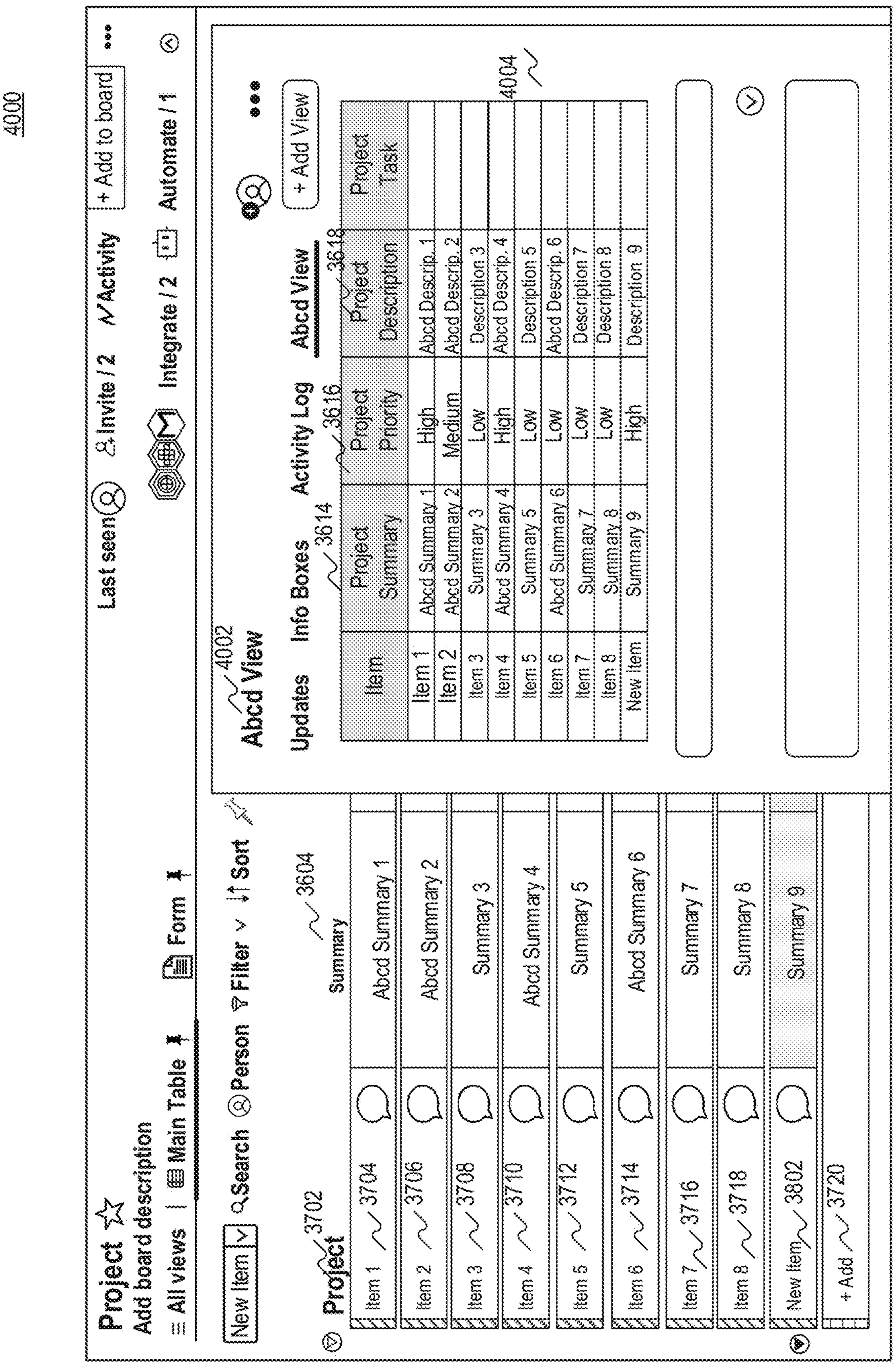
FIG. 40 illustrates an example of an interface providing a frame of a second platform within a first platform, consistent with some embodiments of the present disclosure.

Once cells of "New Item" 3802 are changed or updated, the changes are synced to the third-party application (e.g., altering the second set of data in the second platform as a result of altering data in the first platform). Data in the cells of "New Item" 3802 through "Summary," "Priority," and "Description" cells may be linked and migrated with Jira (e.g., a synced third-party platform or application). Accordingly, the data in second platform (Jira) and the first platform may be synchronized for information contained in "New Item" 3802. FIG. 38 and FIG. 40 portray a migration of the first set of data to the second platform.

Aspects of this disclosure may include enabling a first platform to simultaneously display a second set of data in a second format. Simultaneously displaying data may include presenting information at the same time or near same time. In one embodiment, a first platform may display a first set of data in a first format at the same time as the second platform displaying the second set of data in the second format by designating a portion of a display for the first platform and a different portion of a display for the second platform. The displays of the first and second platforms may be completely distinct, or one platform may partially or completely be presented over the other platform in the display. For example, the first and second platforms may be simultaneously displayed with an evenly split presentation in a display. In another example, the first platform may be displayed in the background while the second platform may be displayed as an iframe or smaller window that overlays the presentation of the first platform.

FIG. 38 illustrates an example of an interface for providing a hyperlink to cause a presentation of a frame (e.g., an iframe or window) of the second platform within the first platform. Interface 3800 of FIG. 38 depicts board 3702 within the first platform displaying a first set of data. In the "Jira Issue" column 3722, hyperlink 3804 provides a link to the second platform (e.g., Jira). The hyperlink may provide a frame 4002 of the second platform within the first platform to simultaneously display the second set of data in the second format and the first set of data in the first format as shown in FIG. 40.

Figure 39:
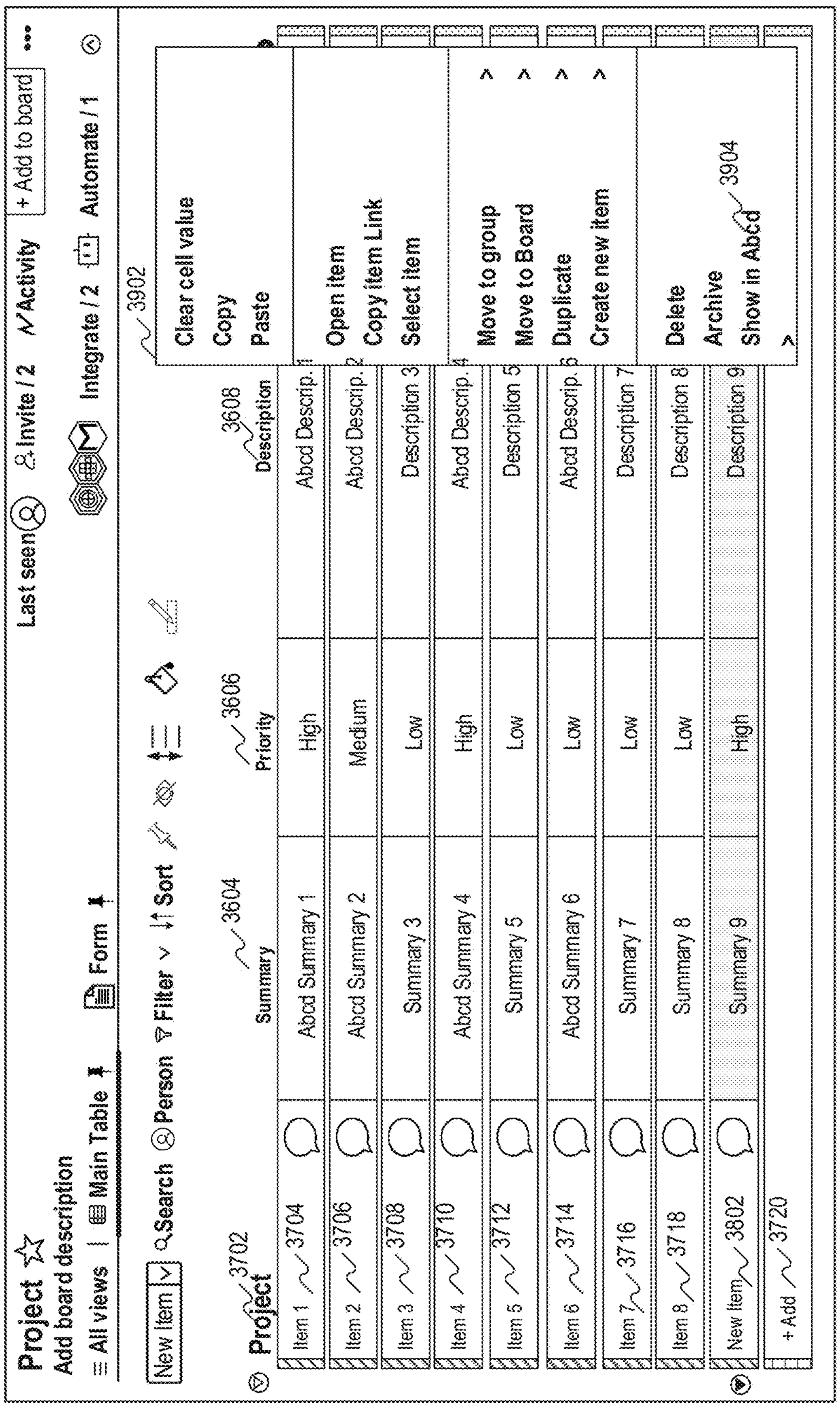
FIG. 39 illustrates an example of an interface with an option to provide a frame of a second platform within the first platform, consistent with some embodiments of the present disclosure.

FIG. 39 illustrates an example of an interface with a first option to provide a frame of the second platform within the first platform. Interface 3900 of FIG. 39 depicts board 3702 within the first platform displaying a first set of data and a menu 3902 for selection. Menu 3902 includes a "Show in Jira" option 3904 for selection. If a user selects "Show in Jira" option 3904, the system may then provide a frame (e.g., an iframe or window) of the second platform (e.g., Jira)

within or on top of the first platform to simultaneously display data from the first and second platforms, as shown in FIG. 40.

Furthermore, data from board 3702 of FIG. 39 (e.g., data of a first platform) has been updated and synced (linked and migrated) with the data from Jira (e.g., a second platform). Specifically, "item 1" 3704 of FIG. 39 includes updated data that is different from data in the original "item 1" 3704 of FIG. 37. Data contained in cells of "item 1" 3704 for the "Summary," "Priority," and "Description" cells have been updated because of a synchronization with data contained in Jira (same for "item 2" 3706, "item 4" 3710, and "item 6" 3714). Accordingly, the data in second platform (Jira) and the first platform are matching as a result of the synchronization. Thus, FIG. 39 portrays a migration of the second set of data to the first platform.

Aspects of this disclosure may involve enabling a first platform to simultaneously display a second set of data in a second format including providing a frame within the first platform in which the second platform is displayed. A frame may include an iframe, window, pop-up, module, or any other display structure or format. Aspects of this disclosure may include that the frame is an iframe. An iframe may include an in-line frame or a floating frame which may appear on a presentation in a display and enable new presentations of information to be opened within (and appearing on top of) a main platform (e.g., a main page or application). In one embodiment, a system may link two different platforms that may display data differently. The two platforms may share data, but the data need not be identical. A user in platform A may make a "call" or send a request to view or access the data from platform B. The data may be displayed on top of platform A in a shared or common view. The shared view may be a pop-up window, a card view on the screen, a split screen, or in any other format. Rules may be implemented on the first platform through automations and integration logic sentences. These rules may connect the data between the two different platforms by synchronizing the data between the platforms in response to a condition being met (e.g., when an alteration to information contained in a cell is detected). Data from an external source (e.g., the second application or platform) may be simultaneously visible with the data of the first platform. In another aspect of the disclosure, the system may be implemented by using a column (e.g., of a first platform) that stores links in each cell that lead to a third-party web page or platform (e.g., the second platform). Clicking on the link might not necessarily retrieve a separate page of the second platform; instead, a view of the third-party software may open from the first platform, on the first platform or otherwise simultaneously with the first platform. Data may be synced in both directions between the first platform and the second platform or just in a single direction. In some embodiments (e.g., such as stock market data), there may be a one-way synchronization configuration where the system merely pulls data from the second platform into the first platform.

FIG. 40 illustrates an example of a presentation of an interface with a frame of a second platform within/on top of a first platform. Interface 4000 of FIG. 40 depicts a presentation of board 3702 within the first platform and depicts a presentation of iframe 4002 with a second platform table 4004 (e.g., a Jira table or any other third-party application displaying the second set of data in a second format). The iframe 4002 may contain the second platform within or on top of the first platform in the display as shown in FIG. 40. Data from board 3702 and Jira table 4004 are synced. Any update of Jira table 4004 will update board 3702 and any update of board 3702 will update Jira table 4004 within interface 4000 (and in other applications where both sets of data are displayed individually).

Aspects of this disclosure may include enabling alteration of a second set of data in a second platform through manipulation of a simultaneous display of the second set of data in a first platform. Alteration of data may include modifying or updating any information through addition, destruction, rearrangement, or a combination thereof. Manipulation of a simultaneous display of data may include the use of or interaction with an interface presenting information from one or more platforms or applications at the same or near same time. In one embodiment, enabling alteration of the second set of data may include changing the third-party data from within the third-party application by manipulating the third-party application data while operating from the first platform or application.

By way of one example with regards to FIG. 40, a user may alter data in an exemplary Jira table 4004 (e.g., a second platform) and enable alteration of information contained on board 3702 (e.g., data from a first platform). The user may further alter data of board 3702 and enable alteration of Jira table 4004 within interface 4000 of the first platform (and on other webpages or applications where both sets of data are displayed individually).

Some embodiments may involve enabling alteration of a second set of data in a second platform through manipulation of a simultaneous display of the second set of data in a first platform including enabling editing within the frame. Editing within a frame may include modifying, correcting, or otherwise changing (e.g., adding, subtracting, rearranging, or a combination thereof) information inside the bounds of an iframe, window, pop-up, module, or any other frame of a platform or application. In one embodiment, a user may change data in a third-party application pop-up or portal within a first platform. As a result, the system may update the corresponding data on the second platform.

FIG. 38 illustrates an example of an interface of the first platform with a hyperlink 3804 to provide a frame of the second platform within the first platform as shown in FIGS. 39 and 40 and as previously discussed above. Clicking on the connection link may open a frame of the integrated third-party on top of the first platform. The user may edit in both platforms simultaneously and cause both platforms to be updated or otherwise synchronized in real-time. An edit in the first platform may result in a corresponding edit in the third-party platform (second platform), which maybe viewable on the open frame presenting the first platform. In another embodiment, clicking on the connection link may open a frame of the integrated third-party (e.g., the second platform) separately from the first platform.

Some embodiments may involve, in response to receiving an alteration, syncing a second set of data as altered via a first platform with a first data set. Receiving an alteration may include the system receiving a signal or request indicative of any change in an interface of an application or platform. Syncing may include a process of establishing consistency among data from a source to a target data storage and vice versa and the continuous harmonization of the data over time. For example, syncing may involve a duplication of a first set of data to a second set of data when a modification is detected in the first set of data. In another example, syncing may involve copying the alteration itself (e.g., a deletion action) and applying it to the unmodified data once the alteration is detected. In one embodiment, data may be synced in both directions between the first platform and the second platform. In other embodiments, the system may include just one-way syncing between the first and second platforms where the system may merely pull data from one platform to the other by transferring information of copying information.

Aspects of this disclosure may include, while the second platform may be simultaneously displayed, exporting changes made to a first set of data to a second platform such that the simultaneous display of a second set of data is updated in real time. Simultaneous display may include the presentation of information from multiple sources at the same time as previously discussed above. Exporting changes may include taking newly altered data from one application or computer system to another through copying and replacing original data with the newly altered data or transferring the alteration to apply the same to unaltered data. Updating in real time may include providing the latest updated information at the same time or near same time when an update is made. In some embodiments, changes in data are updated in real-time.

By way of one example in FIG. 40, any update of Jira table 4004 will update board 3702 in real-time and any update of board 3702 will update Jira table 4004 in real-time within interface 4000.

Figure 41:
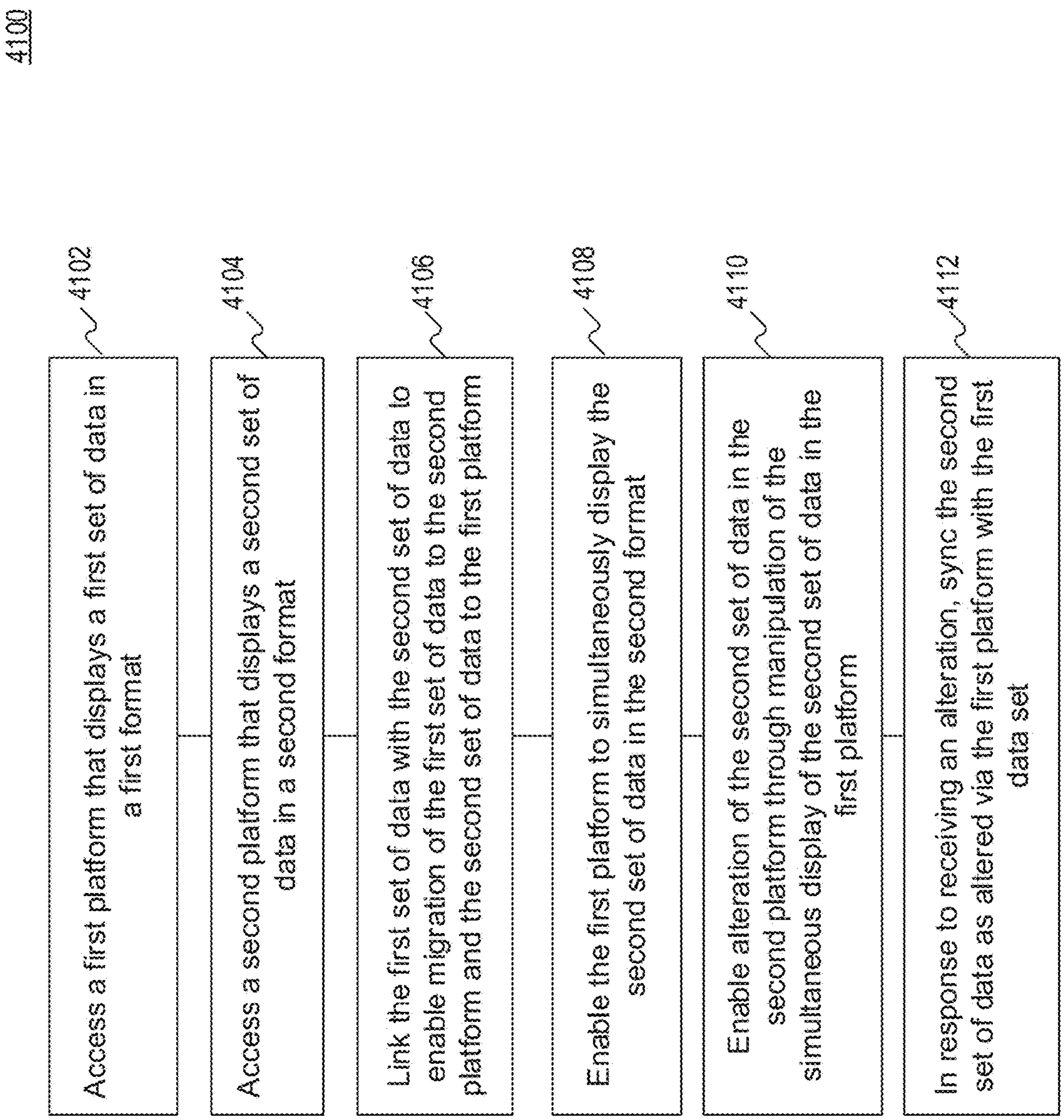
FIG. 41 illustrates a block diagram of a method performed by a processor of a computer readable medium containing instructions, consistent with some embodiments of the present disclosure.

FIG. 41 illustrates a block diagram of method 4100 performed by a processor of a computer readable medium containing instructions, consistent with disclosed embodiments. In some embodiments, the method may include the following steps:

Block 4102: Access a first platform that displays a first set of data in a first format. In some embodiments, a user may access a data management platform and view data in a first format (native format of data management platform).

Block 4104: Access a second platform that displays a second set of data in a second format. In some embodiments, a user may access a third-party platform and view another set of data in a second format (native format of third-party platform).

Block 4106: Link the first set of data with the second set of data to enable migration of the first set of data to the second platform and the second set of data to the first platform. In some embodiments, the system may connect link both sets of data to allow for two-way syncing of the data between the two platforms.

Block 4108: Enable the first platform to simultaneously display the second set of data in the second format. In some embodiments, the data management platform may display the second set of data in the second format (native format of the third-party application) by using an iframe.

Block 4110: Enable alteration of the second set of data in the second platform through manipulation of the simultaneous display of the second set of data in the first platform. In some embodiments, the user may alter the second set of data in the third-party application via the iframe presented in the data management platform.

Block 4112: In response to receiving an alteration, sync the second set of data as altered via the first platform with the first data set. In some embodiments, the system may sync the data among both platforms upon receiving the alteration via the iframe presented in the data management platform.

Aspects of this disclosure may relate to a workflow management system for triggering table entries characterizing workflow-related communications occurring between workflow participants, including methods, systems, devices, and computer readable media. For ease of discussion, a system is described below, with the understanding that aspects of the system apply equally to non-transitory computer readable media, methods, and devices. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information. The system may include a data management platform with integrated communication capabilities (e.g., Zoom call functionality). The data management platform may log communications (external or external calls) within the data management platform. For example, when a communication session is scheduled or when a communication session ends, the data management platform's system may generate a new row in a table, memorializing the communication session and displaying any metadata associated with and/or stored from the communication session.

Aspects of this disclosure may include presenting a table via a display, the table containing rows and columns defining cells, the rows and cells being configured to manage respective roles of the workflow participants. A table may be an organized collection of stored data. For example, a table may include a series of cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item.). In some embodiments, the items in the table may be unifying rows or columns that represent projects, tasks, property, people, or any object, action, or group of actions that may be tracked. Additionally, the table, which may also be referred to as a board, may include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table. A display may include any interface such as a graphical user interface, a computer screen, projector, or any other electronic device for a visual presentation of data. At least one processor may be configured to present a table via a display if at least one processor outputs signals which result in a table being presented via the display. Workflow participants may include any individuals or entities associated with a communication session. For example workflow participants may include individuals scheduled to be on a call, individuals who were actually on the call, a host of a call, or any other entity associated with the call (e.g., a conference call ID for a group of individuals).

Figure 43:
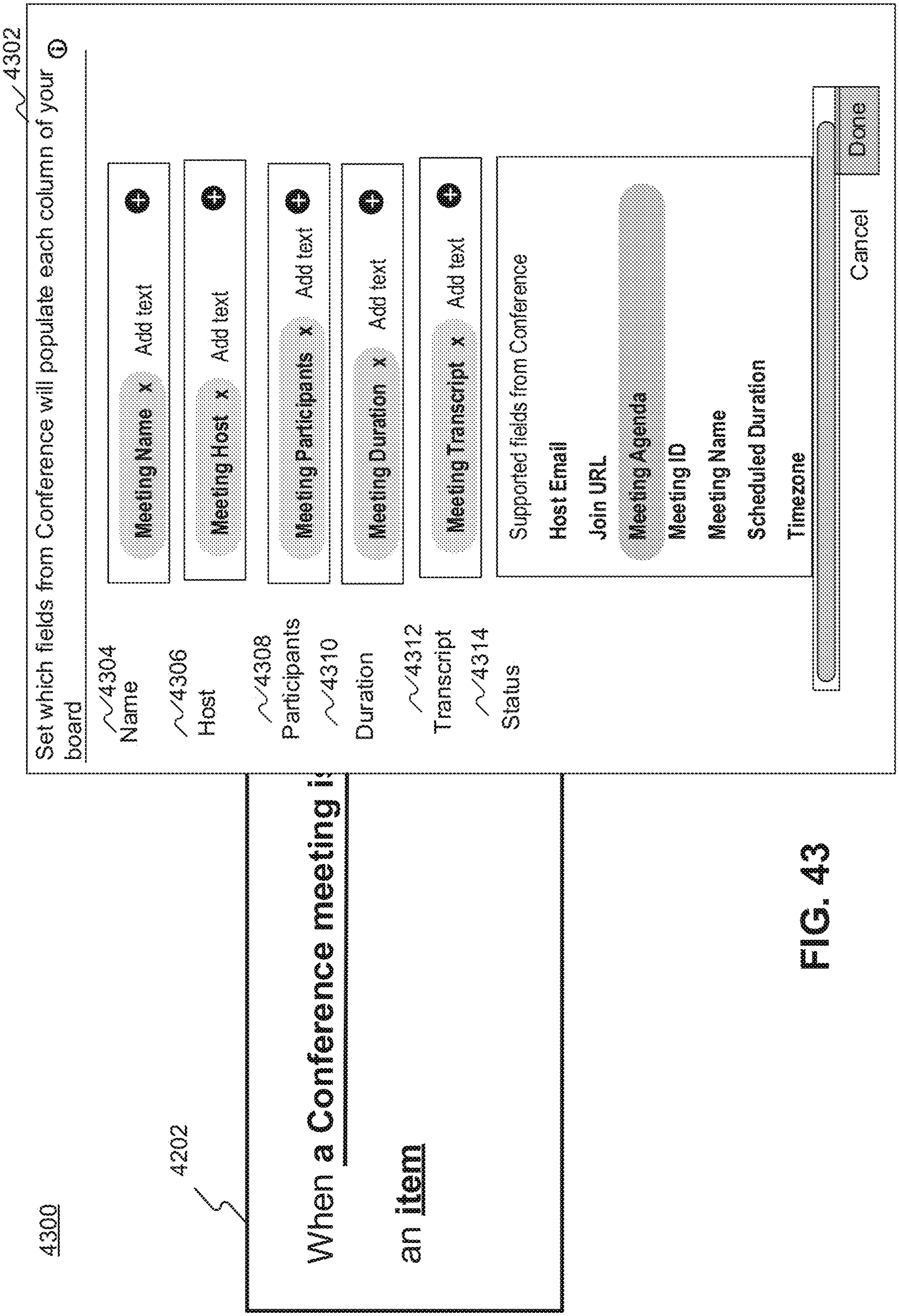
FIG. 43 illustrates a second example of an interface enabling a user to select various prompts to associate a communications rule with a cell and trigger table entries characterizing workflow-related communications occurring between workflow participants, consistent with some embodiments of the present disclosure.
Figure 44:
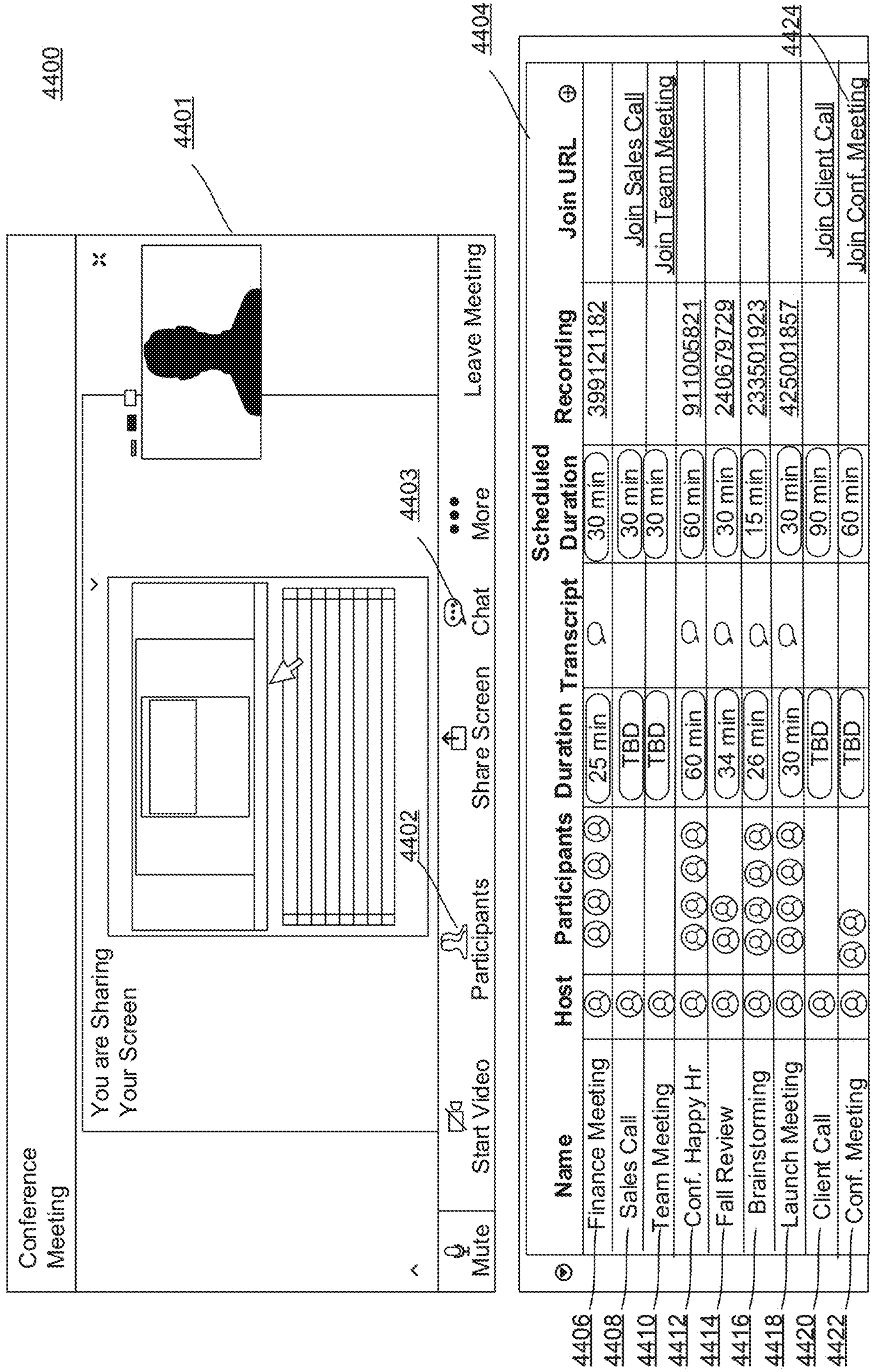
FIG. 44 illustrates an example of an interface with a video communication and a table with an object containing the characteristics of the video communication, consistent with some embodiments of the present disclosure.

By way of one example with respect to FIG. 42 and FIG. 43, a user may define a communications rule (e.g., via an automation) that may interact with a table presented via a display. The communications rule may define how cells of a table may be configured and populated. FIG. 42 and FIG. 43 illustrate an exemplary interface that may enable a user to customize (e.g., by selecting various prompts) to associate a communications rule with a cell and trigger the generation of new table entries or modifying existing table entries to characterize communications that may occur between workflow participants. Specifically, FIG. 42 depicts interface 4200 which includes communications rule 4202 instructing the system to generate a new item (or row) in a table when a Zoom meeting is scheduled. A user may click any condition (e.g., definable variable) of communications rule 4202 in order to further define the rule (e.g., pick options to define the definable variable fields). For example, FIG. 43 illustrates interface 4300 with menu 4302 enabling a user to select various prompts to associate the communications rule with a cell (or multiple cells in a column or row) and trigger the generation of new or modified table entries characterizing workflow-related communications between workflow participants. Specifically, menu 4302 may enable a user to configure specific fields from a video communications platform (such as Zoom) for populating cells or columns of the user's board. In FIG. 43, the user has selected "Meeting Name" to populate cells of a "Name" column 4304 of the user's board (e.g., a board as illustrated in FIG. 44), "Meeting Host" to populate cells of "Host" column 4306, "Meeting Participants" to populate cells of "Participants" column 4308, "Meeting Duration" to populate cells of "Duration" column 4310, and "Meeting Transcript" to populate cells of "Transcript" column 4312. FIG. 43 also illustrated an exemplary interface for the user to select "Meeting Agenda" from a pick list to populate cells of a "Status" column 4314 of the user's board (e.g., a board as exemplified in FIG. 44).

In some embodiments, the table may be configured to track due dates and statuses of items associated with a workflow. Tracking due dates of items may include monitoring or maintaining a log of dates that may be compared to a current date. Tracking statuses of items may include monitoring or maintaining a log of statuses or progress. For example, the system may monitor and track due dates and statuses of items to a current date to determine whether specific items are overdue (e.g., the current date is after a due date and the status is not "done"). In some embodiments, the processor may be configured to associate a communication with a specific one of the items and link an object to the specific one of the items. Associating a communication with an item may include linking a video/audio communication with an item in a table. For example, a communication may include any message such as a graphic, comment, or any annotation that may be stored in a cell that is associated with a particular item. The communication may include a link that may be activated to access an object in a table of the system or to a third-party application. Linking an object to an item may include associating or connecting an object and a row. As with other linking functions described herein, linking an object to an item may occur through computer code that establishes a connection between the object and the item.

By way of one example, objects of item 4422 of FIG. 44 include one specific host, two participants, duration of 'to be determined,' no meeting transcript (because the meeting was live and not completed), a scheduled duration of 60 minutes, no recording link (because the meeting has not been completed), and Active Link 4424 (because the meeting participants may still join the video communication). Each of the objects in this row are associated with item 4422.

Aspects of this disclosure may include presenting on a display at least one active link for enabling workflow participants to join in a video or an audio communication. An active link may include a functioning hyperlink that may be activated or triggered to access data within the system or external to the system. In one embodiment, an active link may include a button that may be activated by a cursor selection, a cursor hover, a gesture, or any other interaction with the button. Presenting at least one active link on a display may include presenting the link as a graphic (e.g., an icon that may be static or animated), as text (e.g., a URL), or any combination thereof. An audio communication may include any transmission of data using technology for the reception and transmission of audio signals by users in different locations, for communication between people in real time (e.g., a phone call via Zoom, Teams, or WebEx). A video communication may include any transmission of data using technology for the reception and transmission of audio-video signals by users in different locations, for communication between people in real time (e.g., a video call via Zoom, Teams, or WebEx).

In some embodiments, the at least one active link may be associated with a particular row in the table. Associating an active link with a row may include linking a functioning hyperlink with an item or row in a table. In another embodiment, the active link may be associated with a particular cell in the table. For example, a system may include linking a functioning hyperlink with a cell or particular row by storing the hyperlink in a particular cell. The hyperlink may be presented in the cell or particular row, or may merely be associated through an automation that activates the hyperlink in response to a condition being met in that particular cell or row.

In exemplary embodiments, the video or audio communication may be provided via an application linked via an active link. For example, a video or audio communication (such as a Zoom or Teams call) may be provided to a user via a presentation of a hyperlink within a cell of a table. If the user clicks on the hyperlink, the user's display may provide the video or audio communication within the original application (e.g., the application displaying the hyperlink in the table) or in an external application.

Aspects of this disclosure may involve logging in memory, characteristics of a communication including identities of the workflow participants who joined in the communication. Logging in memory may include storing data in a local or remote repository for later access. Characteristics of a communication may include any data or metadata associated with a communication. Non-limiting examples of communication characteristics may include sent text messages, transcripts of conversations, meeting duration, action items, participant IDs, number of messages transmitted by each participant, date and time of the communication, or any other information that may be discerned from a communication or meeting, as discussed further below. Identities of the workflow participants may include any identifying information of people (such as name, image, or email address).

FIG. 44 illustrates an example of interface 4400 with video communication interface 4401 and table 4404 with objects (or cells) containing the characteristics of the video communication. Video communication interface 4401 may include exemplary meeting functions such as "mute," "start video," "participants list" 4402, "share screen," "chat" 4403, "leave meeting," and more. Metadata from "participants list" 4402 and "chat" 4403 may be used to log in memory characteristics of the communication, including identities of the workflow participants who joined in the communication (participant list and chat transcript). The logged characteristics may also be presented in table 4404.

Table 4404 includes rows and columns defining cells, the rows and cells being configured to manage respective roles of the workflow participants. Specifically, table 4404 includes item 4406 relating to characteristics of a "Finance Meeting" communication, item 4408 relating to characteristics of a "Sales Call" communication, item 4410 relating to characteristics of a "Team Meeting" communication, item 4412 relating to characteristics of a "Zoom Happy Hour" communication, item 4414 relating to characteristics of a "Fall Review" communication, item 4416 relating to characteristics of a "Brainstorming" communication, item 4418 relating to characteristics of a "Launch Meeting" communication, item 4420 relating to characteristics of a "Client Call" communication, and item 4422 relating to characteristics of a "Zoom Meeting" communication. Each of these items may have been generated at the start, end, or during a communication (e.g., video, audio, or a combination thereof). The communication characteristics may be logged in memory and may also be stored in table 4404 while a communication is on-going or at the conclusion of the communication.

Characteristics of the video communications in table 4404 include listing the name, host, participants, meeting duration, meeting transcript, meeting scheduled duration, meeting recording, and meeting Join URL. Active Link 4424 is a functioning hyperlink where users may click to join a scheduled Zoom Meeting (video communication). For example, item 4414 relating to characteristics of a "Fall Review" communication lists characteristics including a specific host, two participants, duration of 34 minutes, a meeting transcript, a scheduled duration of 30 minutes, a recording link, and no join URL active link (because the meeting has already taken place). Additionally, item 4422 relating to characteristics of a "Zoom Meeting" communication lists characteristics of the video communication including a specific host, two participants (as of the time of the presentation of table 4404 in FIG. 44), duration of 'to be determined,' no meeting transcript (because the meeting has live and not completed), a scheduled duration of 60 minutes, no recording link (because the meeting has not been completed), and Active Link 4424 (because the meeting participants may still join the video communication). In one embodiment, item 4422 relates to video communication in video communication interface 4401 which is currently taking place. Metadata from "participants list" 4402 and "chat" 4403 of video communication 4401 may be used to log in memory, characteristics of the communication in table 4404 in real-time or once the communication is completed.

Figure 45:
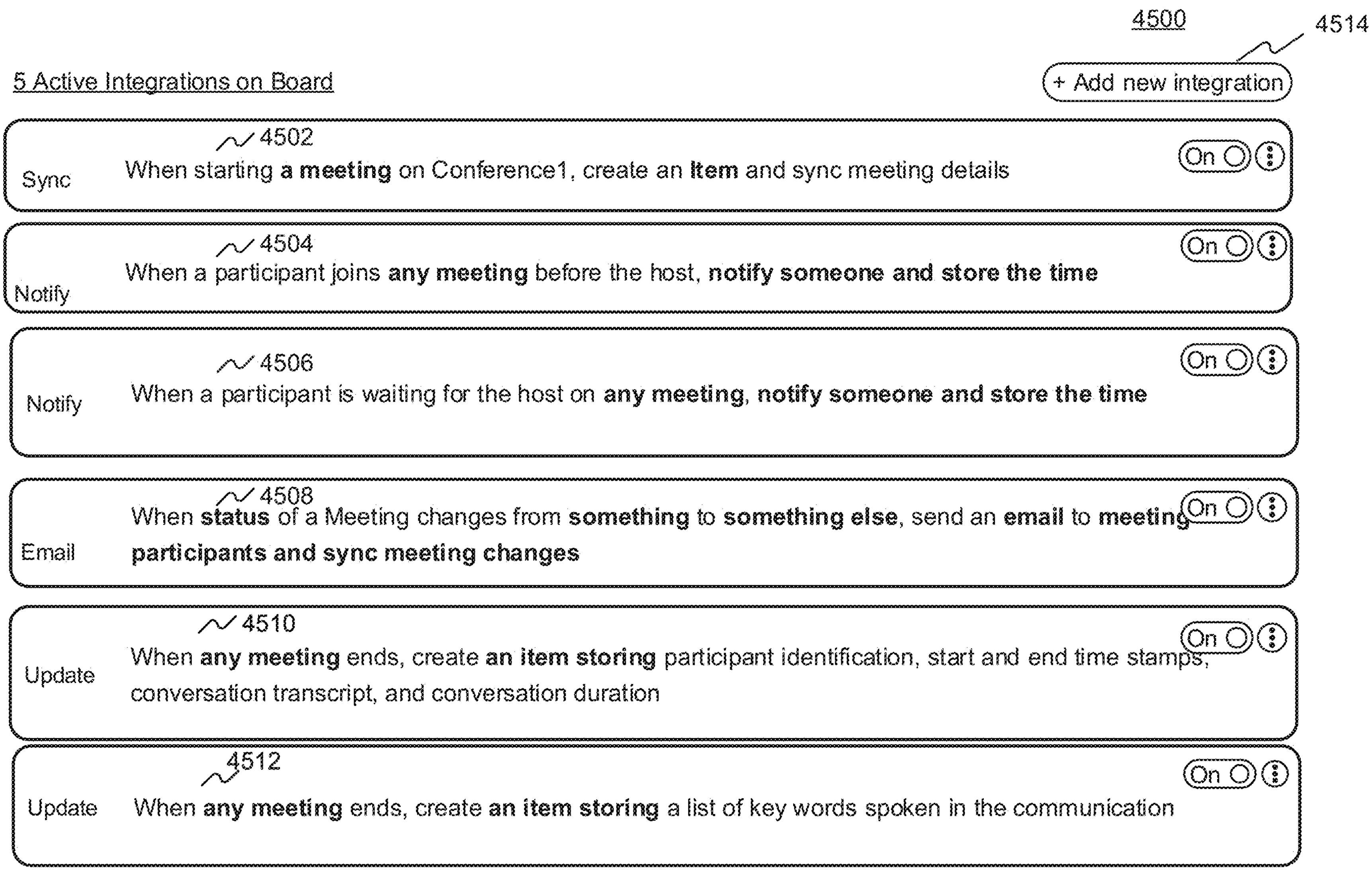
FIG. 45 illustrates an example of an interface with six active communications rules which define the characteristics of communications that are stored, consistent with some embodiments of the present disclosure.

By way of one example, FIG. 45 illustrates interface 4500 with six active communications rules which define the characteristics of communications that are stored in memory. Specifically, communications rule 4502 recites, "When starting a meeting on Microsoft Teams, create an Item and sync meeting details"; communications rule 4504 recites, "When a participant joins any meeting before the host, notify someone and store the time"; communications rule 4506 recites, "When a participant is waiting for the host on any meeting, notify someone and store the time"; communications rule 4508 recites, "When status of a Meeting changes from something to something else, send an email to meeting participants and sync meeting changes"; communications rule 4510 recites, "When any meeting ends, create an item storing participant identification, start and end time stamps, conversation transcript, and conversation duration"; and communications rule 4512 recites, "When any meeting ends, create an item storing a list of key words spoken in the communication." Using each of the communications rules displayed in FIG. 45, the system may pull all data (metadata or characteristics of the communication), log the data memory, and generate an object associated with the table to display the collected data from the communication.

In one embodiment, a system may log in memory any information retrievable from metadata of a video communication. Once all the data is pulled in and stored on the board, the data may be used in many other ways by the user. For example, the data may be migrated to other boards, the user may set up different ways to view the data, and the user may analyze the data for any purpose.

In one embodiment, if the video communication includes one or more breakout rooms, the system may generate one or more subitems for each breakout room in the table providing any characteristics of the communication (e.g., show who was in each breakout room and for what duration).

Aspects of this disclosure may involve characteristics of a communication further including at least one participant identification, start and end time stamps, a conversation transcript, a conversation duration, a list of key words spoken in the communication, or statistics related to participants. Participant identification may include any identifying information of people (such as name, image, or email address). Start and end time stamps may include start and end time indicators of a meeting (e.g., graphical or numerical or a combination thereof) or timestamps associated with someone joining meeting and leaving meeting. A conversation transcript may include an audio recording or video recording of the meeting, transcription of the audio, or the chat entries during the communication. A conversation duration may include the length of time of the communication or the length of times each participant participated in the communication. A list of key words spoken in the communication may obtained via speech recognition software, such as a speech to text API, or any other suitable mechanism for deriving text from speech. The list of key words may include a directory of each of the words used during the call based on frequency used per person or per call. Key words may be determined by a system look up in the directory or may be manually marked by participants during the communication such as through a bookmark or flag. Statistics related to participants may include any figures, data, numbers, or facts related to the people who joined the communication and their activities during the communication (e.g., number of messages sent, frequency of key words used, number of files transmitted, and more).

Aspects of this disclosure may include generating an object associated with a table, the object containing the characteristics of a communication logged in memory. Generating an object may include creating a new cell, row, column, table, dashboard, or any other locus that may store the data or presentation of data, as discussed further below. The object may contain the characteristics of the communication consistent with disclosed embodiments discussed above. For example, an object associated with the table may include an icon in an existing row or a cell.

By way of one example, item 4422 of FIG. 44 includes eight objects (eight cells in the row) relating to characteristics of a Zoom Meeting communication. The eight objects include meeting name, meeting host, meeting participants, meeting duration, meeting transcript, meeting scheduled duration, meeting recording, and meeting Join URL. Each of the cells specifically list characteristics of the video communication associated with it.

In some embodiments, generating an object associated with a table may include creating a row in the table associated with the communication. In one embodiment, the system may generate a new row associated with the communication.

FIG. 44 illustrated a system that generated item 4406, item 4408, item 4410, item 4412, item 4414, item 4416, item 4418, item 4420, and item 4422 as new rows in table 4404 associated with one or more communications. While these items may be generated as new rows in an existing table, these items may also have been generated in a new table. Further, the generation of new items may occur for a first user with a first board, or may be generated for multiple users (e.g., teammates associated with a communication) as discussed below.

In some embodiments, generating an object associated with a table may include creating a row in another table associated with the communication. In one embodiment, a system may create one or more rows in another table (of multiple tables) associated with the communication. The additional table may be for a single user or may be generated for multiple users who may or may not have participated in the communication. For example, where a communication involves a team of four individuals and a supervisor, the generated object that my contain characteristics of the communication as a new row containing that information in a table for each of the four individuals and the supervisor. Even if one of the individuals could not attend the communication, that particular individual may still have an object generated to capture the characteristics and communications from the meeting.

In some embodiments, the generated object may be associated with a particular row. Linking a generated object to a row may include associating or connecting an object and an item or row, consistent with some embodiments disclosed above. While the generated object may be associated with a particular row, the generated object may be associated with a particular cell. The generated object may be associated with the particular cell containing an active link, as previously discussed.

In FIG. 44, an exemplary generated object may be associated with a specific cell such as the cell item 4422 that includes Active Link 4424.

Aspects of this disclosure may also involve logging text messages occurring between participants during a communication and generating an object that may include characterizing the logged text messages. Text messages may include any alphanumeric of graphical communications transmitted or saved during a video or audio (e.g., a resulting transcript of an audio conversation) communication. Characterizing logged text messages may include analyzing data associated with the text messages or analyzing the text messages themselves, consistent with some embodiments discussed above. Characterizing the logged text messages may include recording a number of text messages exchanged. In one embodiment, the system may analyze the meta data associated with the video communication including the chat messages in order to determine tallies of the communications sent by particular participants.

In FIG. 44, the system displays logged chat messages from video communication 4401 in table 4404. While not shown, the system may log characteristics of the communications in memory that may be later retrieved and viewed. For example, a user associated with table 4404 may add a new column that presents additional characteristics of the logged text messages at a time after the text messages were sent. Upon adding the new column, the table 4404 may present the characteristics of the text message or other communications and files that were transmitted during the video/audio communication.

According to some embodiments of this disclosure, characterizing text messages may include recording key words from the text messages. In one embodiment, the system may analyze the logged chat messages from a communication and determine key words or phrases spoken by each individual or all individuals during the video or audio communication. This may enable users to track action items at the conclusion of the communication. In another embodiment, the system may enable participants to manually mark key words from the communication or text messages for recordation so that the participants may later refer to the key words.

Figure 46:
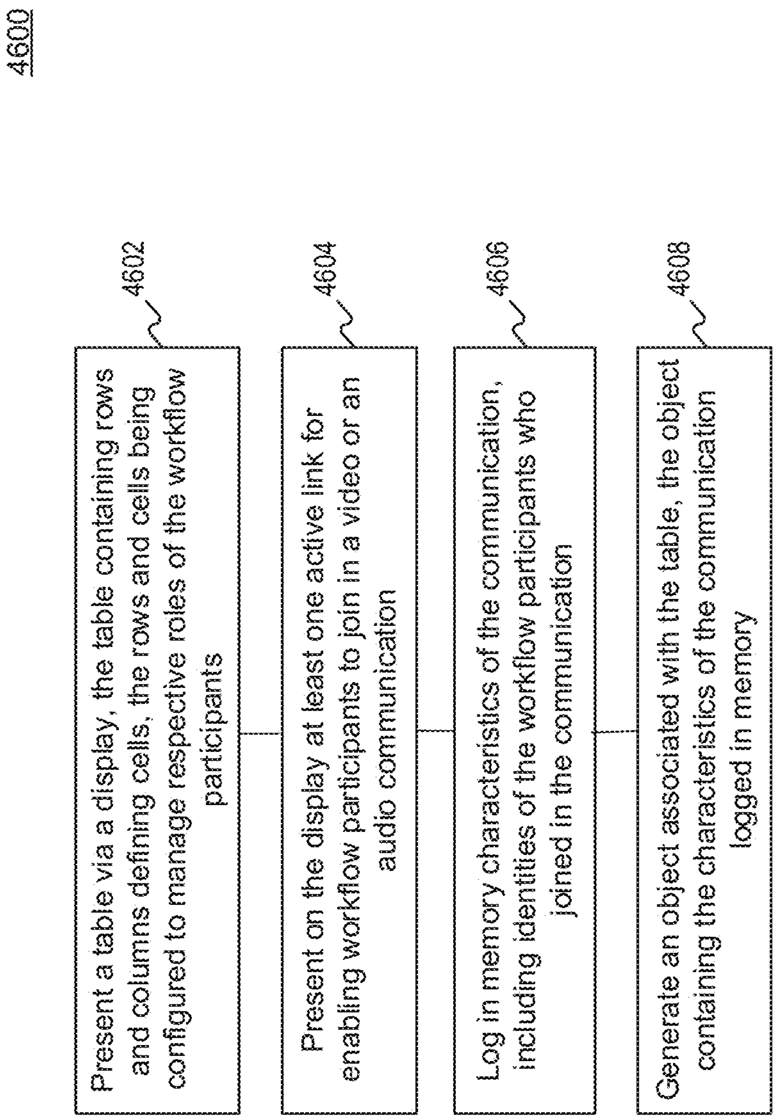
FIG. 46 illustrates a block diagram of method 4600 performed by a processor of a computer readable medium containing instructions, consistent with some embodiments of the present disclosure.

FIG. 46 illustrates a block diagram of method 4600 performed by a processor of a computer readable medium containing instructions, consistent with disclosed embodiments. In some embodiments, the method may include the following steps:

Block 461: Present a table via a display, the table containing rows and columns defining cells, the rows and cells being configured to manage respective roles of the workflow participants. In some embodiments, a user may access a data management platform and view tables with rows, columns, and cells to manage data.

Block 462: Present on the display at least one active link for enabling workflow participants to join in a video or an audio communication. In some embodiments, the table may include a functioning hyperlink to allow users to join a videocall.

Block 463: Log in memory characteristics of the communication, including identities of the workflow participants who joined in the communication. In some embodiments, the system may store any metadata associated with the video call and its participants.

Block 464: Generate an object associated with the table, the object containing the characteristics of the communication logged in memory. In some embodiments, the system may display the stored metadata associated with the video call and its participants on a table of the data management platform.

Aspects of this disclosure may provide a technical solution to the challenging technical problem of project management of multiple entities on collaborative networks and may relate to a system for implementing multi-table automation triggers, including methods, systems, devices, and computer-readable media. For ease of discussion, some examples are described below with reference to methods, systems, devices, and/or computer-readable media, with the understanding that discussions of each apply equally to the others. For example, some aspects of methods may be implemented by a computing device or software running thereon. The computing device may include at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Disclosed embodiments may involve at least one processor configured to maintain datasets or tables, display logical sentence structure templates, link input options for definable conditions of a logical sentence structure to corresponding tables, generate rules, store input values, apply the generated rules, and implement and trigger the rules based on the conditions being met, among other functions.

An automation, also referred to as a logical sentence structure template, may refer to a logical rule with one or more logical connectors, and configured to act on table data to produce an outcome. An automation may also be considered as a "recipe" having a logical organization of elements for implementing a conditional action.

The automation, for example, may be in the form of a recipe, a template, or a sentence including one or more triggering elements (also referred to herein as "triggers") and one or more action elements (also referred to herein as "actions" hereinafter). An automation may be configured to cause an action in response to a trigger, such as an event or a condition, the occurrence or satisfaction of which may cause another event in the system, implemented by the automation. Triggers may occur as the result of one or more conditions in a single table or across multiple tables. Triggers further may also occur as the result of conditions being met across multiple tables and/or across multiple users or entities. An action of an automation may refer to a change of one or more components of the system. For example, the change may include addition, deletion, alteration, conversion, rearrangement, or any manner of manipulation of data stored in the system. As an example, in an automation or a logical sentence structure template such as "when a task is done, notify John," notifying John may correspond to the action performed in response to the automation trigger or condition being met, i.e. task being done, and the logical connector "when." Automations may be broadly referred to as rules. In some embodiments, the rules may include a mathematical function, a conditional function, computer-readable instructions, or other executable functions.

Aspects of this disclosure may involve maintaining a first table with rows and columns defining first cells and maintaining a second table with rows and columns defining second cells. A table includes those items described herein in connection with the term "tablature," and may include horizontal and vertical rows for presenting, displaying, or enabling access to information stored therein. A table may be presented on a screen associated with a computing device or via any electronic device that displays or projects information on a surface or virtually. An intersection of multiple rows may represent a cell. For example, a cell may be represented as an intersection of a horizontal row (or referred to as a "horizontal column") and a vertical row (or referred to as a "vertical column"). A cell may contain a value, a color, a word, a graphic, a symbol, a GIF, a meme, any combination thereof, or any other data. In some embodiments, a table may be presented in two dimensions, three dimensions, or more. A table, a board, a workboard, a dashboard, or a part thereof, including digital data (e.g., computer readable data) may be populated via a data structure.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term "data structure" in the singular is inclusive of plural data structures.

Maintaining a table may refer to one or more of storing information that may be used to populate a table, storing a table template that may be populated by data, or storing a link that associates stored data with a table form or template. For example, a system may store an object or the link to an object in a non-transitory computer-readable medium. In some embodiments, maintaining a table may include storing a form of table with vertical and/or horizontal row headers defining information to be contained in cells of such rows. Maintaining a table may also include storing values associated with the cells of such rows. In some embodiments, maintaining a table may include one or more of saving, storing, recording, updating, tracking, counting, editing, viewing, displaying, aggregating, combining, or otherwise retaining in a repository information for representation in a table.

Figure 47:
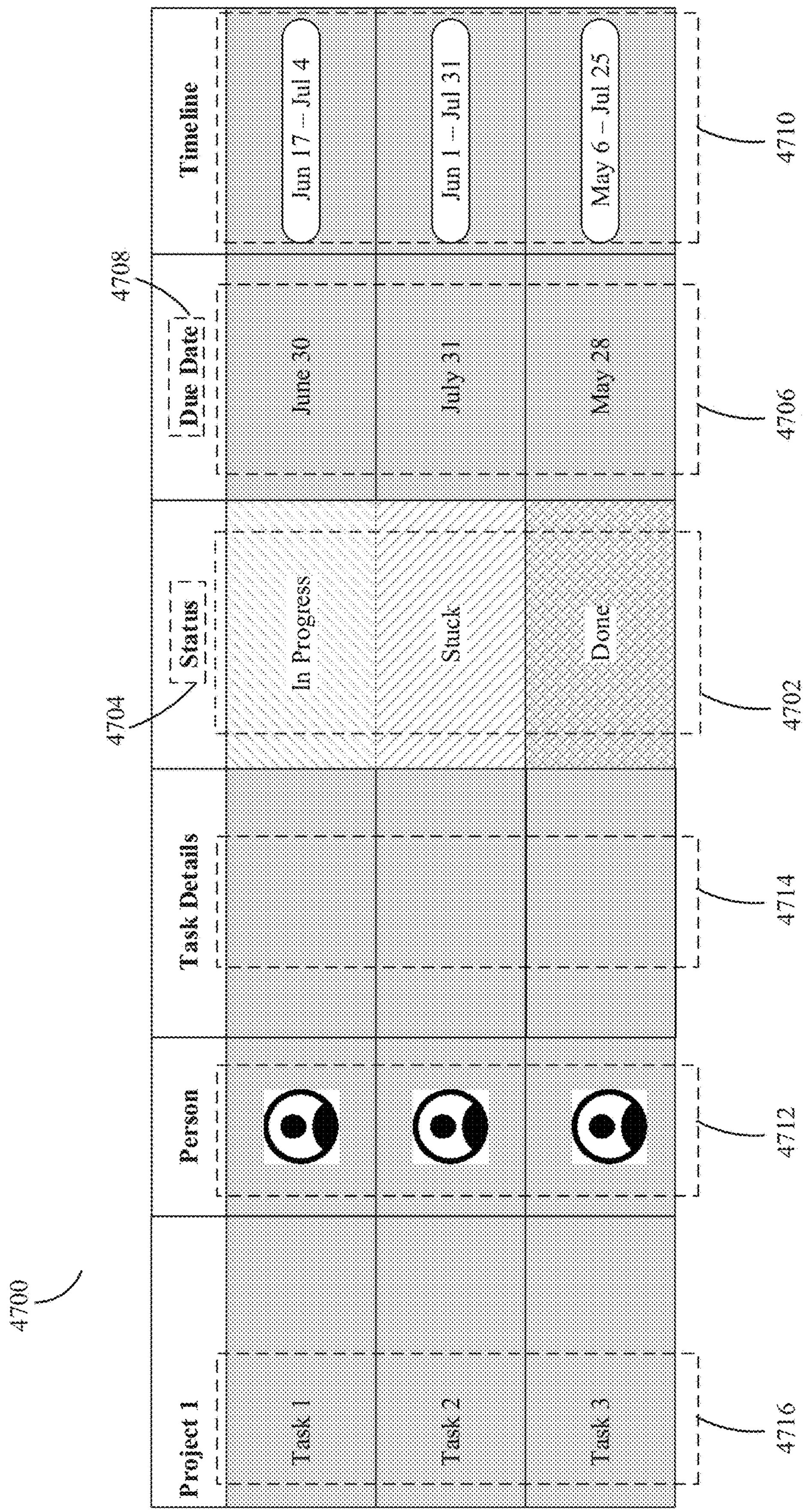
FIG. 47 illustrates an example of a table that includes multiple columns and rows, consistent with some embodiments of the present disclosure.

By way of example with reference to FIGS. 1-2, a system may maintain a table by storage in memory 120, in storage 130, in repository 230-1 (FIG. 2), or any combination thereof. FIG. 47 illustrates an exemplary table 4700 that may include multiple columns and rows, consistent with embodiments of the present disclosure. In some embodiments, the table 4700 may be displayed using a computing device (e.g., the computing device 100 illustrated in FIG. 1) or software running thereon. The table 4700 may be associated with a project (e.g., "Project 1" in FIG. 47) and may include, in the multiple rows and columns, tasks (e.g., in rows including "Task 1," Task 2," or "Task 3") included in the project, persons (e.g., in a column 4712) assigned to the tasks, details (e.g., in a column 4714) of the tasks, statuses (e.g., in a column 4702) of the tasks, due dates (e.g., in a column 4706) of the tasks, timelines (e.g., in a column 4710) of the tasks, or any information, characteristic, or associated entity of the project. A task may refer to a part or a portion of a project. A task may be performed by an entity (e.g., an individual or a team). In some embodiments, a task may be represented by a row of cells in a task table. In some embodiments, a task may be represented by a column of cells of a task table. An entity may refer to an individual, a team, a group, a department, a division, a subsidiary, a company, a contractor, an agent or representative, or any independent, distinct organization (e.g., a business or a government unit) that has an identity separate from those of its members, or a combination thereof.

As illustrated in FIG. 47, the at least one processor may maintain a plurality of tables (e.g., including the table 4700) and other information (e.g., metadata) associated with the plurality of tables. Each table (e.g., the table 4700) of the plurality of tables may include a plurality of rows (e.g., the rows of "Task 1," Task 2," and "Task 3" in the table 4700) and columns (e.g., columns 4702, 4706, 4710, 4712, 4714, and 4716 of the table 4700).

As mentioned previously, consistent with disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In various embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

Figure 48:
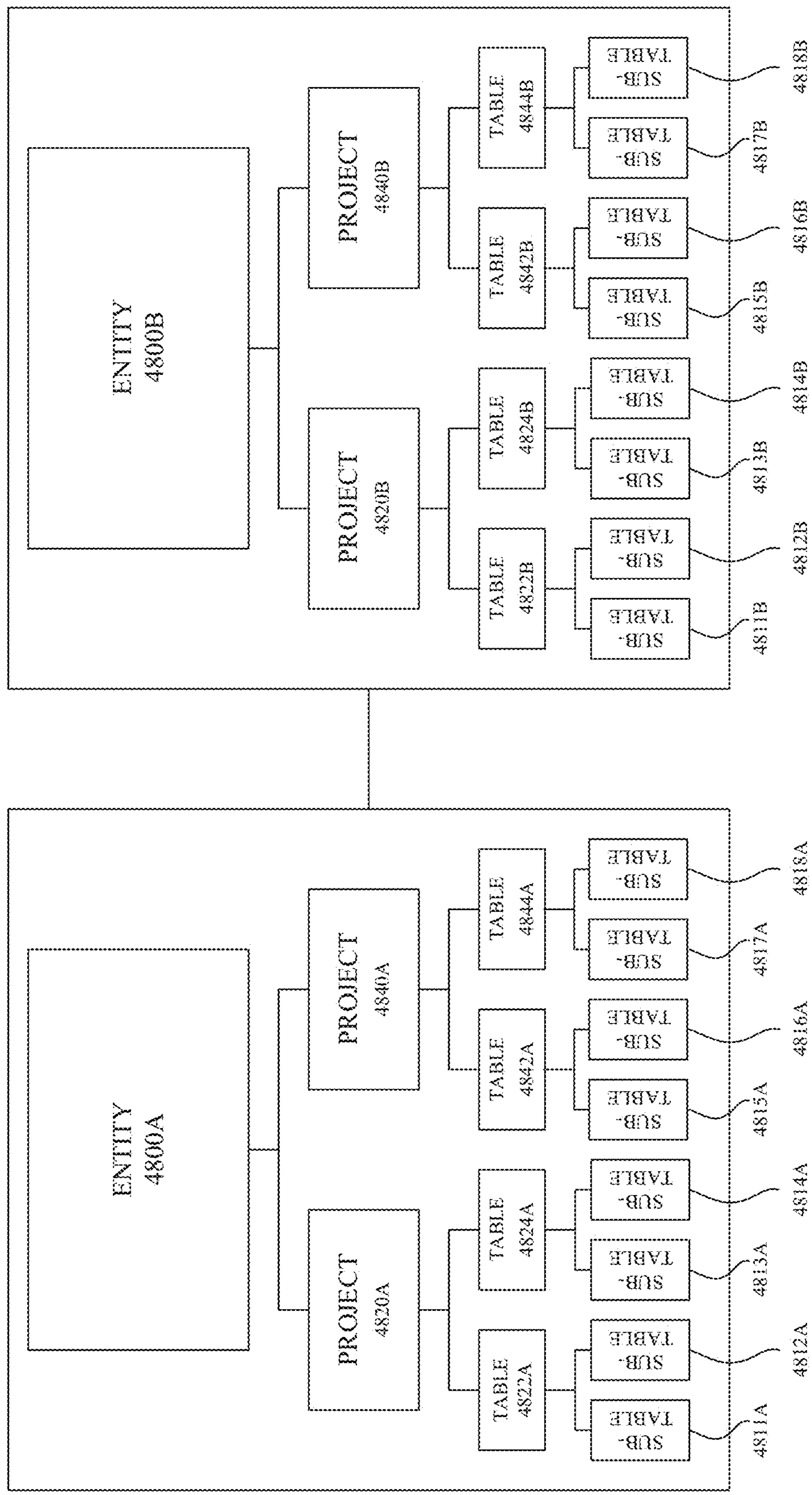
FIG. 48 illustrates an exemplary hierarchical relationship between multiple tables, consistent with some embodiments of the present disclosure.

By way of example, FIG. 48 illustrates an exemplary hierarchical relationship between multiple tables, consistent with some embodiments of the present disclosure. Entity 4800A may include projects 4820A and 4840A, and entity 4800B may include projects 4820B and 4840B. As previously described, an entity may refer to an individual, a team, a group, a department, a division, a subsidiary, a company, a contractor, an agent or representative, or any independent, distinct organization (e.g., a business or a government unit) that has an identity separate from those of its members. Entity 4800A and entity 4800B may include any number of projects, each project may include one or more tables, and each table may include any number of sub-tables including the absence of sub-tables. As illustrated in FIG. 48, a hierarchical structural relationship between multiple tables (also referred to as boards) may include an entity 4800A, projects 4820A and 4840A associated with entity 4800A, project 4820A may include tables 4822A and 4824A, and project 4840A may include tables 4842A and 4844A. Further, table 4822A may include sub-tables 4811A and 4812A, table 4824A may include sub-tables 4813A and 4814A, table 4842A may include sub-tables 4815A and 4816A, and table 4844A may include sub-tables 4817A and 4818A. It is to be appreciated by a person of ordinary skill in the art that the illustrated structural hierarchical relationship is exemplary, and may include more or fewer tables, levels of subordination, or combinations thereof.

Consistent with disclosed embodiments, some exemplary relationships between the first and the second table are described herein with reference to FIG. 48. For example, the first table may include a sub-table 4811A and the second table may include a sub-table 4811B of table 4822B associated with project 4820B of entity 4800B, or a sub-table 4817B of table 4844B associated with project 4840B of entity 4800B, or a sub-table 4817A of table 4844A associated with project 4840A of entity 4800A. Alternatively, the first table may include a table 4824A associated with project 4820A and the second table may include a sub-table 4812B of table 4822B associated with project 4820B of entity 4800B, or a table 4842B associated with project 4840B of entity 4800B, or a table 4842A associated with project 4840A of entity 4800A, or any table associated with one or more entities, one or more projects, or combinations thereof.

Consistent with disclosed embodiments, at least one processor of the system may be configured to display a joint logical sentence structure template including a first definable condition and a second definable condition. A logical sentence structure template or a logical template (sometimes referred to as a "recipe" or an "automation"), may include a logical organization of elements for implementing a conditional action. In some embodiments, the logical organization of elements may be a semantic statement or a rule (e.g., a logical sentence). A joint logical sentence structure template, also referred to herein as a joint logical template may include an automation recipe, elements of which may be mapped to more than one table, such as a first table and a second table. A joint logical template may include one or more user-definable, or configurable elements. A definable condition may be a requirement that may be configured or altered based on a user input or selection. The user-definable element may be a triggering element or an action element, activated or deactivated as a whole, or may be activated with configuration or alteration in accordance with user inputs. A first definable condition may include a triggering element or an action element associated with a first table, and a second definable condition may include a triggering element or an action element associated with a second table.

A definable condition may be presented in any manner such as being displayed in bold, underlining, or any other differentiating manner, representing that it is user-definable. In some embodiments, a definable condition may be dynamic such that input of at least one definable condition may be configured to cause a change in the joint logical template. A dynamic definable condition of a joint logical template may include a user-definable condition, that when altered, can cause a change in the joint logical template. A change of the joint logical template may refer to a change in structure or elements (e.g., triggers and actions, or pre-defined requirements and user-definable conditions).

In some embodiments, the joint logical template may be implemented as program codes or instructions stored in a non-transitory computer-readable medium of the system. The at least one processor of the system may execute the program codes or instructions to perform the conditional action in accordance with the joint logical template.

Aspects of this disclosure may display a joint logical template, for example, via a display screen associated with a computing device such as a PC, laptop, tablet, projector, cell phone, or a personal wearable device. A logical template may also be presented virtually through AR or VR glasses, or through a holographic display. Other mechanisms of presenting may also be used to enable a user to visually comprehend presented information and provide input through an interface (e.g., a touch screen, keyboard, mouse, and more). In some embodiments, the logical template may be displayed in a user interface. The user interface, as referred to herein, may be a presentation of a web page, a mobile-application interface, a software interface, or any graphical interface (GUI) that enables interactions between a human and a machine via the interactive element. The user interface may include, for example, a webpage element that overlays an underlying webpage. In some embodiments, a computing device that implements the operations may provide the user interface that includes an interactive element. The interactive element may be a mouse cursor, a touchable area (as on a touchscreen), an application program interface (API) that receives a keyboard input, or any hardware or software component that may receive user inputs.

Consistent with disclosed embodiments, at least one processor of the system may be configured to link input options for a first definable condition to a first table and link input options for a second definable condition to a second table. Linking may refer to associating or establishing a relationship or connection between two things (e.g., objects, data, interfaces, and more). For example, if the two or more things are stored as digital data in a non-transitory computer-readable medium (e.g., a memory or a storage device), the relationship or connection may be established by linking the two or more things, or by assigning a common code, address, or other designation to the two or more things in the non-transitory computer-readable medium.

Linking input options may refer to enabling input for the definable conditions into a selected joint logical template. An input for a definable condition may refer to any data, information, or indication to be used for configuring the definable condition. The input options for a definable condition may be linked or "mapped" to a table or cells of a table that have information stored therein. In some embodiments, one or more rows or columns of a table may be linked as input options based on the definable condition. For example, if the joint logical template includes a first definable condition preceded by a "when," the input options may be linked to a particular column or a row including relevant trigger data. In some embodiments, the input options may include an entire table.

The input options for the first and the second definable conditions may be linked to the first table and the second table, respectively. As previously described, the second table may be a sub-table of the first table, a different table associated with the same project, a different table associated with a different project, a table associated with the same entity as the first table, or a table associated with a different entity, or combinations thereof.

In some embodiments, input options for a definable condition may be based on authorization or permission to access data within a linked table. For example, a table may include restricted, confidential, or privileged information stored in cells that may only be accessed by entities such as an administrator, a project manager, an investor, a particular team or entity, or other authorized individuals or entities. In such a case, linking the input options may include requiring a password or authentication to access the desired information.

In some disclosed embodiments, linking input options for a first definable condition to a first table may include selecting as a default a current table being accessed by an entity. A user or an entity may frequently access a table for reviewing, modifying, updating, or storing information in cells. The frequently accessed table may be a master table where all the information may be stored and updated dynamically, or periodically, or based on a schedule. In some embodiments, a table being accessed by a user or an entity may be the master table or another table that the user may be updating, modifying, configuring, or reviewing. The current table being accessed by the user or the entity may be selected as a default input option for linking with the first definable condition based on the frequency of access, relevance, size, authorized users, content, or other characteristics of the table. The current table may be determined based on the entity's most recently accessed table. Selecting a table as a default may include automatically or manually mapping or associating the table for an input option or for a definable variable. For example, the system may be configured to automatically grant access to the table based on a user's profile, historical records, projects, location, qualification, or preferences. In another example, the system may be configured to receive a selection of a table to assign the table as a default for an input option or for a definable variable.

In some embodiments, at least one processor of the system may be configured to generate a joint rule for a first table and a second table by storing a first value for a first definable condition and storing a second value for a second definable condition. A joint rule refer to a joint logical template in which all or some of the conditions or the elements have been defined. Generating a joint rule may include defining or populating the first and the second definable conditions. In some embodiments, the joint rule may be generated by storing values for the first and the second definable condition. The first value for the first definable condition may be linked to a cell, a row, a column, or a portion of the first table. The second value for the second definable condition may be linked to a cell, a row, a column, or a portion of the second table. In various embodiments, a joint rule generated by defining the first and the second conditions may form a predefined joint logical template or a predefined automation recipe which can be implemented on a table, or across multiple tables associated with different projects and entities, or at any level of a hierarchical arrangement of tables. A user may create any number of joint rules and store the joint rules in a memory, storage device, or data server. Alternatively, the joint rules may be stored locally on a computing device, or on a webpage, or an allocated space on another board. For example, the joint rules may be stored in a common storage space on a website or a portal, such as an "automation marketplace." As referred to herein, an automation marketplace may refer to a webpage, a portal, a website, or an allocated space on a user-interface, where the joint rules may be stored.

Consistent with disclosed embodiments, at least one processor of the system may be configured to apply a joint rule across a first table and a second table. A joint rule may be applied to any combination of one or more tables (e.g., boards), sub-tables, groupings, tables associated with projects, tables associated with entities, or any other table in a collaborative workspace. For example, a joint rule may be applied to any number of tables or boards within a project, across projects, associated with an entity, or associated with multiple entities. In some embodiments, one or more joint rules may be applied to a board, or a joint rule may be applied to one or more boards. In some embodiments, a joint rule stored in a common storage space may be accessed by a user and may be applied to one or more boards simultaneously. The application of a joint rule on a board may be activated and/or de-activated based on a user input. For example, during a phase of a project, a user may simultaneously apply a joint rule to four boards associated with the project and upon completion of the phase, may deactivate the joint rule on one or more of the four boards originally selected. Alternatively, a user may select the board from a list of available boards to which a joint rule may be applied.

Figure 49:
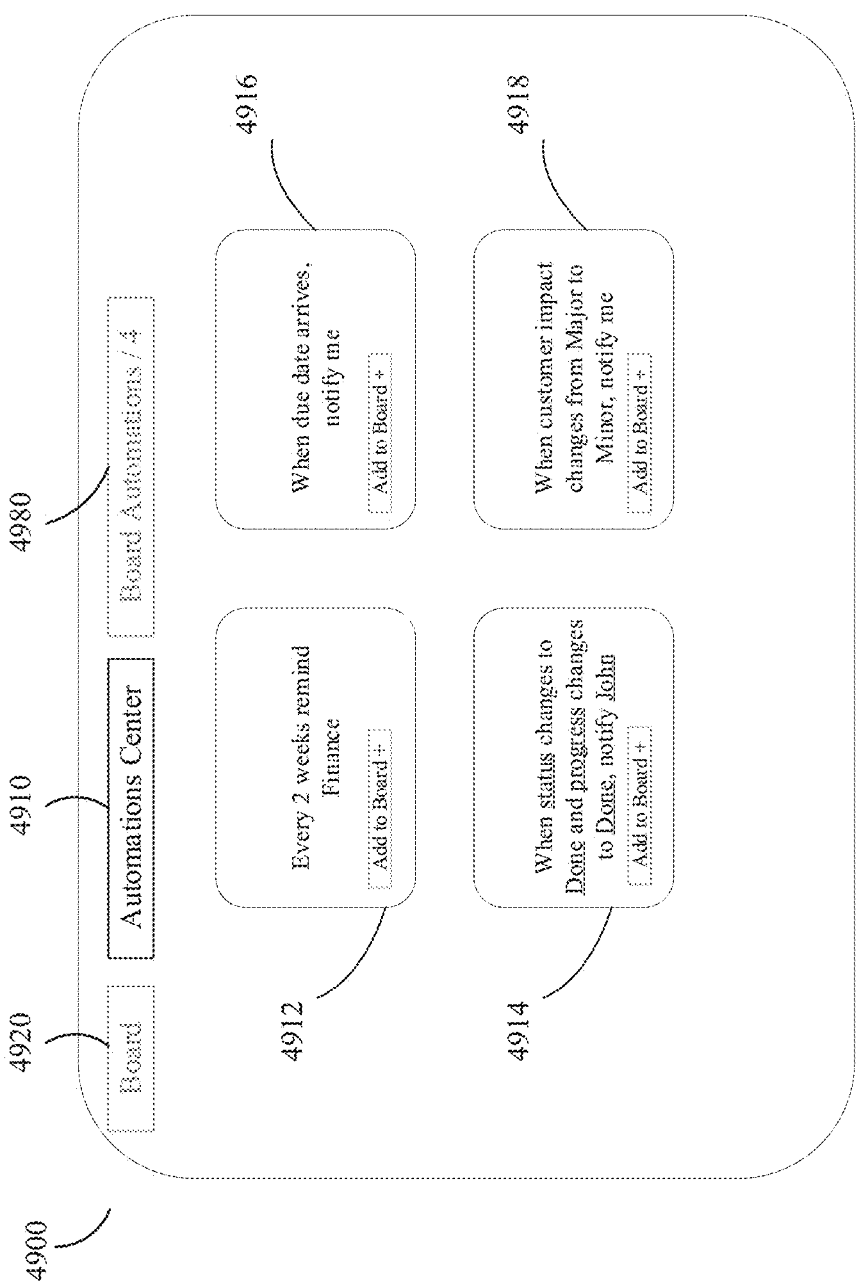
FIG. 49 illustrates an exemplary user-interface including joint rules stored in an allocated storage and display space, consistent with some embodiments of the present disclosure.

FIG. 49 illustrates an exemplary user-interface including joint rules stored in an allocated storage and display space, consistent with embodiments of the present disclosure. User interface 4900 may include allocated webpages or portions of a webpage to display an automation center including joint rules, automation recipes, boards that the joint rules or automation recipes may be applied to, user profiles (not shown), or other digital information. Space 4910 may be allocated to display and the automation marketplace or automation center configured to store the exemplary joint rules 4912, 4914, 4916, and 4918. For example, joint rule 4914 may be applied to one or more boards simultaneously. Joint rule 4914 provides a first definable variable "status" and a second definable variable "progress." The first definable variable may be mapped to a first table and the second definable variable may be mapped to a second table. In the example provided by joint rule 4914, when "status" and "progress" are both marked "Done," the system may be configured to send a notification to John. Selecting the option "Add to Board+" may generate a pop-up menu, drop-down list, a pick list, or any suitable interface to allow a user to apply the joint rule 4914 to the selected boards. The selected boards may be associated with one or more projects, one or more entities, or one or more users. User interface 4900 may also include allocated space 4980 to display and store the automations being applied to a board 4920. For example, element 4980 may list, tabulate, or graphically present the rules being applied to board 4920. In some embodiments, the user may be allowed to activate or deactivate an automation being applied to board 4920 using a toggle button, or a radio button, for example.

Consistent with some disclosed embodiments, at least one processor of the system may be configured to trigger a joint rule when a first condition in a first table is met and a second condition in a second table is met. The triggering event may include an occurrence where the conditions of a joint rule have been satisfied. "Triggering" may refer to invoking or activating a joint rule to be implemented when the condition of the rule is satisfied and may be defined as a triggering event. The triggering may occur as a response to an input such that the input satisfies the first condition in the first table and the second condition in the second table. The input may be from a user action or from a change of information contained in a user's table, in another table, across multiple tables, across multiple user devices, or from third-party applications, as previously discussed above. Triggering may be caused manually, such as through a user action, or may be caused automatically, such as through a logical rule, logical combination rule, or logical templates associated with a table, or a joint rule. For example, a trigger may include an input of a data item that is recognized by at least one processor that brings about another action.

In some embodiments, a joint rule may include an outcome of altering at least one of a first table, a second table, or a third table as a result of the triggering. Altering a table or tablature displays may refer to any procedure or process of changing a visual presentation form of a display of a table in a collaborative work system, as previously described. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element. In some embodiments, altering a first table or a second table may include altering the information stored in the first cells or the second cells, altering a presentation of data in the first or the second cells, altering a visual effect of a visual object.

In some disclosed embodiments, triggering of a joint rule may include an outcome of establishing or altering a third table for storing data associated with the trigger of the joint rule. Establishing a third table may include generating a new, independent table, or may include presenting new information within the first or second tables. A third table, in some embodiments, may refer to a hidden table such as an archive or an addition to an existing database of tables. For example, the trigger may be that "a task is overdue" to cause a presentation of an exclamation mark as a graphical indicator of a task being overdue. In some joint rules, the trigger may result in an indicator that graphically presents the remaining time for a task, an indicator that a task is done, or any other graphical, alphanumeric, or combination of graphical and alphanumeric indication regarding the item or task. In some embodiments, the third table may be established as an independent sub-table (e.g., added as a new sub-table). In some embodiments, the third table may be established as a part of an existing table. The established third table may not be linked or associated with the joint rule that connects the first and the second tables. In yet another example, the third table may already exist and be altered in response to the activation of the joint rule. For example, a joint rule may monitor conditions from a first table (employee 1) and from a second table (employee 2). As a result of a condition being "done" in both the first and second tables, a third table (supervisor) may be altered to provide an indication that both conditions are "done" in the first and second tables. In this way, projects with multiple dependencies may be managed.

Consistent with disclosed embodiments, linking input options for a second definable condition to a second table may include linking the second table to a first table via a joint rule. The joint rule may enable a user to connect or associate the first and the second tables such that the data in the first and the second tables may be duplicated. Duplicating the information stored may allow the user to link input options for the first definable condition to the second table in addition to the first table, or link input options for the second definable condition to the first table in addition to the second table. In some embodiments, the at least one processor may be further configured to employ the joint rule to alter information in at least one of the first cells based on information in at least one of the second cells. The first and the second tables may be linked through the joint rule such that the joint rule, when triggered, may alter the information stored in the first cells associated with the first table based on information stored in the second cells. For example, the first table including the first cells may store information associated with a software production team of a project, and the second table including the second cells may store information associated with a software testing team of the project. The joint rule may be constructed such that when the software testing team (information in the second cells) has successfully completed their tests, the software production team (information in the first cells) may be notified by creation of a "status" column in the first table, indicating that the software production team may proceed based on the information of the software testing results. As an example, if the software testing team is debugging the code related with some features of an application, the status column in the first table may indicate "debugging," or "waiting."

In some embodiments, a joint rule may include an outcome of sending a notification as a result of a triggering. A computing device configured to implement the joint rule may send a notification when the joint rule is triggered, as previously discussed above. The notification may include an email, a text message, a phone call, an application push notification, a prompt, or any combination of any form of notifications. The notification may be sent, for example, to an email address, a phone number, a mobile application interface, within the application, or any combination of any device or user interface to which the user has access. By doing so, in some exemplary embodiments, a user may be notified of the statuses of the tasks of a project in real-time or at a scheduled time. For example, the joint rule may state that, when a task is overdue, not only a display a change in the first, second, or the third table, but also send a notification to a particular person or persons.

In some embodiments, the joint rule may be a communications rule. A communications rule may include any logical rule associated with sending a communication. The logical rule may be presented as an automation or a logical sentence structure as described previously. The communications rule may monitor the table for certain conditions to trigger the activation of the communications rule and send the notification. Owners or users of a board may generate and customize communication rules incorporating their preferences for receiving or sending notifications relating to the table, group of items, or individual items. For example, a user may specify to only send notifications by email regarding certain items and to send a text message for other items. For example, the user may specify to send alerts regarding a commentary thread by email, but specify to send text messages regarding status changes. Additionally, the user may customize the system to send summary notifications for certain items such as sending only a single notification with the summary of changes made to an item for a predefined period of time on a periodic basis. For example, user may set up his or her notification to be sent at specific times (e.g., only on Mondays at 9 am). The user may also enable multiple communications rules for a single table, or may enable one or more communications rules applicable to a plurality of tables.

In some embodiments, a joint rule may include activating a control for an external device, as a result of the triggering. An external device may refer to a cellphone, a personal computer, a laptop, a tablet, a monitor, a wearable device, a display screen, heads-up display, virtual reality (VR) and augmented reality (AR) devices, a dispenser, or any device capable of processing and/or displaying data. The joint rule may be constructed such that when the first and the second definable conditions are satisfied, the joint rule, upon triggering, may activate a control of the external device. For example, triggering of the joint rule may initiate a communications application on the external device. A communications application may include an internal or external website or program that performs a particular task or set of tasks. (e.g., Outlook™, Gmail™, SMS, Whatsapp™, Slack™, Facebook Messenger™, a proprietary application of the system, or any other medium that enables communication. In other words, the communications application may be an integrated (or accessed) third-party-provider application or an internal automated application. The communications application may be predefined or may be selected by a user. For example, the rule may provide the user with access to picklist permitting the user to specify, in defining the rule, which communications application will serve as the transmission mechanism for the message. Or, the rule template may predefine the communications application that may be used. In either scenario, automatic triggering may include accessing the defined communications application. In some embodiments, the joint rule may be predefined to enable sending an email, initiating a phone call, initiating a video conference call, sending text messages or any form of notification.

Figure 50:
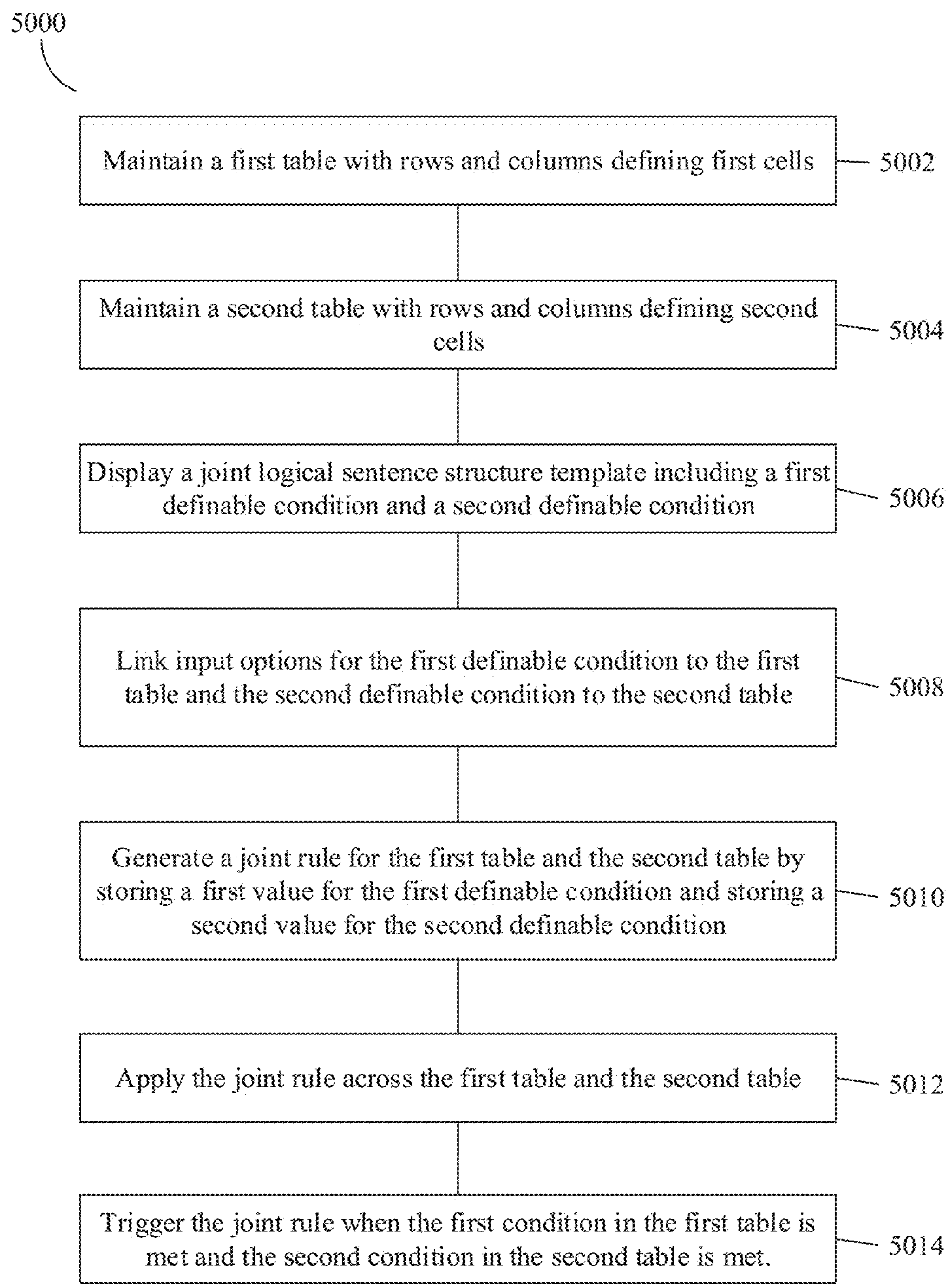
FIG. 50 is a block diagram of an example process for implementing multi-table automation triggers, consistent with some embodiments of the present disclosure.

FIG. 50 depicts a block diagram of an exemplary process for implementing multi-table automation triggers, consistent with disclosed embodiments. While the block diagram may be described below in connection with certain implementation embodiments presented in other figures, those implementations are provided for illustrative purposes only, and are not intended to serve as a limitation on the block diagram. In some embodiments, the process 5000 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 47 to 49 by way of example. In some embodiments, some aspects of the process 5000 may be implemented as software (e.g., program codes or instructions) that are stored in a memory (e.g., the memory portion 122 in FIG. 1) or a non-transitory computer-readable medium. In some embodiments, some aspects of the process 5000 may be implemented as hardware (e.g., a specific-purpose circuit). In some embodiments, the process 5000 may be implemented as a combination of software and hardware.

At block 5002, processing circuitry 110 may maintain a first table with rows and columns defining first cells. As discussed in greater detail earlier, maintaining a first table may include storing a form of table, or storing values associated with the first cells, or may generally include one or more of saving, storing, recording, updating, tracking, counting, editing, viewing, displaying, aggregating, combining, or otherwise retaining in a repository information for representation in a table.

At block 5004, processing circuitry 110 may maintain a second table with rows and columns defining second cells. The second table may be a sub-table of the first table, a different table within a project, a table associated with another project of the same entity, or a table associated with a different project of a different entity.

At block 5006, processing circuitry 110 may be configured to display a joint logical sentence structure template including a first definable condition and a second definable condition. A definable condition may be a requirement that may be configured or altered based on a user input. The user-definable element may be a triggering element or an action element, activated or deactivated as a whole, or may be activated with configuration or alteration in accordance with user inputs.

At block 5008, processing circuitry 110 may link input options for the first definable condition to the first table and link input options for the second definable condition to the second table. For example, the values for the first definable condition may be linked with the first table associated with a project of an entity, and the values for the second definable condition may be linked with a second table associated with another project of the entity.

At block 5010, processing circuitry 110 may generate a joint rule for the first table and the second table by storing a first value for the first definable condition and storing a second value for the second definable condition. A joint rule may be generated by defining the first and the second conditions from different tables and may be implemented across multiple tables associated with different projects and entities.

At block 5012, processing circuitry 110 may apply the joint rule across the first table and the second table. A joint rule may be applied to any combination of two or more tables, sub-tables, boards, groupings, tables associated with projects, tables associated with entities, or any other table in a collaborative workspace. For example, a joint rule may be applied to any number of tables or boards within a project, across projects, associated with an entity, or associated with multiple entities.

In some embodiments, the application of a joint rule on a board may be activated and/or de-activated based on a user input. For example, during a phase of a project, a user may simultaneously apply a joint rule to four boards associated with the project and upon completion of the phase, may deactivate the joint rule on one or more of the four boards originally selected.

Alternatively, a user may select the board from a list of available boards to which a joint rule may be applied.

At block 5014, processing circuitry 110 may trigger the joint rule when the first condition in the first table is met and the second condition in the second table is met. Triggering the joint rule may be caused manually, such as through a user action, or may be caused automatically, such as through a logical rule, logical combination rule, or logical templates associated with a board. For example, a trigger may include an input of a data item that is recognized by at least one processor that brings about another action.

Although there may be available tools for implementing tables with logical rules, there is a lack of technical solutions to provide systems, methods, devices, and computer-readable media for employing self-configuring table automations catered to specific vocations.

There is a need or unconventional systems, methods, devices, and computer-readable media for presenting a plurality of alternative automation packages for application to a table, wherein each package includes a plurality of automations, and wherein each automation is configured to cause an action in response to at least one condition detected in the table; identify a selection of a package from the plurality of packages; automatically configure a first condition in a particular automation in the selected package based on data in the table; display a second undefined condition of the particular automation, wherein the second undefined condition requires further configuration; receive an input for configuring the second undefined condition; configure the second undefined condition using the input to cause the second undefined condition to become a second defined condition; and apply the particular automation to the table. The embodiments provide advantages over prior systems that merely provide tables with conditional rules by providing targeted solution packages based on vacations to improve system processing to more efficiently initialize set up and process information based on specific scenarios.

Aspects of this disclosure may provide a technical solution to the challenging technical problem of project management on collaborative work systems and may relate to a system employing self-configuring table automations. For ease of discussion, some examples are described below with reference to systems, devices, methods, and/or computer-readable media, with the understanding that discussions of each apply equally to the others. For example, some aspects of methods may be implemented by a computing device or software running thereon. The computing device may include at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Disclosed embodiments may involve at least one processor configured to present a plurality of alternative automation packages, identify a selection of a package, automatically configure a first condition in a particular automation, display a second undefined condition of the particular automation, receive an input, configure the second undefined condition, apply a particular automation to a table, among other functions.

An automation, which, by way of example, may be implemented via a logical sentence structure template, may be a process that responds to a trigger or condition to produce an outcome. A logical rule may underly the automation, the logical rule including one or more logical connectors, and configured to act on table data to produce an outcome. An automation may also be considered as a "recipe" having a logical organization of elements for implementing a conditional action. The automation, for example, may be implemented via a recipe, a template, or a sentence including one or more triggering elements (also referred to herein as "triggers") and one or more action elements (also referred to herein as "actions" hereinafter). An automation may be configured to cause an action in response to a trigger, such as an event or a condition, the occurrence or satisfaction of which may cause another event in the system, implemented by the automation. Triggers may occur as the result of one or more conditions in a single table or across multiple tables. Triggers further may also occur as the result of conditions being met across multiple tables and/or across multiple users or entities. An action of an automation may refer to a change of one or more components of the system. For example, the change may include addition, deletion, alteration, conversion, rearrangement, or any manner of manipulation of data stored in the system. As an example, in an automation or a logical sentence structure template such as "when a task is done, notify John," notifying John may correspond to the action performed in response to the automation trigger or condition being met, i.e. task being done, and the logical connector "when." Automations may be broadly referred to as processes governed by rules. In some embodiments, the rules may include a mathematical function, a conditional function, computer-readable instructions, or other executable functions. Self-configuring table automations may include automations that automatically seek information from tables to auto-populate conditions and fields of the automations.

An automation package may refer to a single automation or a group of automations configured to perform an action when a condition is met. One or more automations of an automation package may be associated with a table or table data. "Associating," in this example and as used in this context, may refer to processes or procedures of establishing a relationship or connection between at least an automation and at least a table. The relationship or connection may be established by linking the automation and the table, or by assigning a common code, address, or other designation to the automation and the table. One or more automations in an automation package may be customized for a profession, a vocation, an industry, a technology, an occupation, a business, or other entities having collaborative workspaces. One or more automations in an automation package may also be customized based on specific use cases for certain tasks, such as tracking project progress, enabling communications between remote individuals, or managing files between teams.

Aspects of this disclosure may involve presenting a plurality of alternative automation packages for application to a table, wherein each package may include a plurality of automations, and wherein each automation may be configured to cause an action in response to at least one condition detected in the table. A table may include those items described herein in connection with the term "tablature," and may include horizontal and vertical rows for presenting, displaying, or enabling access to information stored therein. A table may be presented on a screen associated with a computing device or via any electronic device that displays or projects information on a surface or virtually. An intersection of multiple rows (and/or columns) may represent a cell. For example, a cell may be represented as an intersection of a horizontal row (or referred to as a "horizontal column") and a vertical row (or referred to as a "vertical column"). A cell may contain a value, a color, a word, a graphic, a symbol, a GIF, a meme, any combination thereof, or any other data. In some embodiments, a table may be presented in two dimensions, three dimensions, or more. A table, a board, a workboard, a dashboard, or a part thereof, including digital data (e.g., computer readable data) may be populated via a data structure.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term "data structure" in the singular is inclusive of plural data structures.

Presenting a plurality of alternative automation packages may refer to one or more of displaying or projecting a visual representation of automation packages available, or displaying one or more automations associated with an automation package, or displaying automation packages in a pop-up menu, a drop-down list, a pick list, or any suitable interface to allow a user to select an alternative automation package. The alternative automation packages may be displayed via a display screen associated with a computing device such as a PC, laptop, tablet, projector, cell phone, or a personal wearable device as discussed above. The one or more automation packages may also be presented virtually through AR or VR glasses, in more than two dimensions. Other mechanisms of presenting may also be used to enable a user to visually comprehend presented information. Application of an automation package to a table may refer to the application of one or more automations of the automation package to an associated table such that a predefined action may be performed when a condition of the one or more automations is met.

Each automation package may include a plurality of automations. As mentioned previously, consistent with disclosed embodiments, an automation may be broadly referred to as a rule or a logical rule that associates at least two of a plurality of columns with each other. In some embodiments, the rules may include a mathematical function that determines the value of a column based on values of one or more columns (e.g., a column may be customized to display a due date determined by adding 50 days to the date indicated in another column). In other embodiments, the rules may include conditional functions that determine the appearance of a column based on the value of the column itself and/or the values of one or more other columns (e.g., a column may turn red when a due date specified therein has passed). In further embodiments, the rules may include computer-readable instructions that perform certain actions using third-party services (e.g., a template may control a smart light bulb when the value of a column meets a predetermined condition), change the appearances of one or more columns, and/or change the values of one or more columns (e.g., a column may be linked to another column to display the same information).

Consistent with disclosed embodiments, each automation may include a logical sentence structure including definable conditions. A logical sentence structure may include a logical organization of elements for implementing a conditional action. In some embodiments, the logical organization of elements may be a semantic statement or a rule (e.g., a logical sentence). A definable condition may be a requirement that may be configured or altered based on a user input or selection. The user-definable element may be a triggering element or an action element, activated or deactivated as a whole, or may be activated with configuration or alteration in accordance with user inputs. A definable condition may be presented in any manner such as being displayed in bold, underlining, or any other differentiating manner, representing that it is user-definable.

Figure 51:
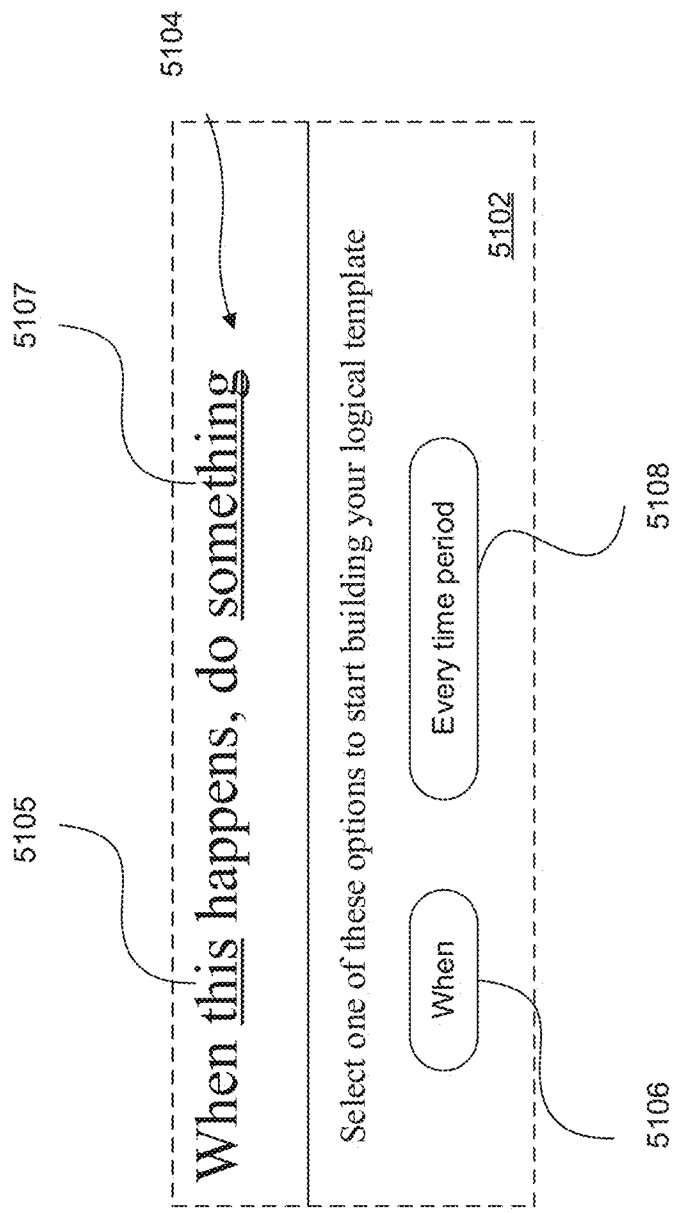
FIG. 51 illustrates an example of a logical template showing a user-definable condition in a user interface, consistent with some embodiments of the present disclosure.

By way of example, in FIG. 51, the logical sentence structure 5104 includes predefined requirements 5106 and 5108 such as "when," "happens," and "do," and definable conditions 5105 and 5107 such as "this" and "something." For example, the predefined requirement "when" may only be activated as a whole by receiving a user input indicating that a user selects an interactive element 5106 (e.g., a button). In another example, the predefined requirement "when" may only be deactivated as a whole by receiving a user input indicating that a user clicks an interactive element 5108 (e.g., a button) so that the predefined requirement may be removed and may be replaced. It is to be appreciated that logical sentence structure 5104 is exemplary, and logical sentence structures may include one or more predefined requirements and one or more definable conditions. It is also to be appreciated that an automation package may include a plurality of automations or logical sentence structures that may act independently or collaboratively.

In some embodiments, each automation may be configured to cause an action in response to at least one condition detected in the table. As described previously, an automation may be configured to cause an action in response to a trigger, such as an event or a condition, the occurrence or satisfaction of which may cause another event in the system, implemented by the automation. Triggers may occur as the result of at least one or more conditions being detected in a table. For example, a communications rule may include a trigger that activates when a specific value in a specific cell meets a criterion. A trigger may include an aspect of the rule (e.g., code) that recognizes a specific value in a cell, determines that it meets a criterion, and causes a resulting event, circumstance, action, process, or situation to occur as a result. A specific value contained in cells may include numeric, alphanumeric, graphical information, or any combination thereof. Similarly, a criterion associated with a communications rule may contain numeric, alphanumeric, graphical information, a combination thereof, or a range of such information (e.g., a range bounded on one or more ends by at least one boundary defining more than one specific value that may activate the trigger, such as a numeric range, a region, a category, a class, or any other criterion that defines multiple values.) When a match is determined between information in the cell and a criterion associated with the trigger, the condition of the trigger may be met and may be said to be a condition detected in the table, and result in an automation becoming activated to cause an action, such as a communications rule being triggered to send an alert.

A condition, as used in this context, may refer to any state of information contained in any column type or datatype stored in a column of an associated table. An automation may apply to any column type and may apply to an infinite number of combinations of column types such as a Task column, a Person column, a Date column, a Contact column, a Time Tracking column, a Location column, a World Clock column, a File column, or any other column type associated with the table. For example, in an automation or a logical sentence structure associated with a library such as "When a Person is absent at work, perform a Task," the condition may be associated with a "Person" column, and the action may include the column "Task." In some embodiments, the column or datatype associated with the condition may include, but is not limited to, a Date column, a Contact column, a Time Tracking column, a Location column, or other column types. The types and number of columns that may be subject to a predefined logical combination rule, and the action initiated as a result of that rule are limitless. Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, single formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

A condition detected in the table may refer to a condition being met. According to some aspects of the disclosure, an automation may include a trigger that may be activated when a specific value in a specific cell of a table meets a criterion or a condition. A trigger may include an aspect of the rule (e.g., code) that recognizes a specific value in a cell, determines that it meets a criterion, and causes a resulting event, circumstance, action, process, or situation to occur as a result. A specific value contained in cells may include numeric, alphanumeric, or graphical information. Similarly, a criterion associated with a communications rule may contain numeric, alphanumeric, or graphical information, or a range of such information (e.g., a range bounded on one or more ends by at least one boundary defining more than one specific value that may activate the trigger, such as a numeric range, a region, a category, a class, or any other criterion that defines multiple values.) When a match is detected between information in the cell and a criterion associated with the trigger, the criterion of the trigger may be met, and a result of the communications rule may be triggered.

Consistent with some disclosed embodiments, an action may include at least one of a change in data in a table or in another table, or a change in control of an external device. In response to at least one condition being met or occurrence of a triggering event, the processor may be configured to alter a display in an associated table, or a non-associated table. Altering or making a change may refer to processes or procedures of modifying, adding, removing, rearranging, or any way of changing an object. The "display" in the table may include a visual representation in the table as described herein. In some embodiments, the display of the table may be altered by one or more of adding or changing data in the table, removing data, changing a visual effect of a visual object in the table, adding a visual object or indication to the table. The visual effect may include a change in a color, a font, a typeface, a strikethrough, a shape, a size, a column-row arrangement, or any characteristic in visual presentation. The visual object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

In some embodiments, as a result of triggering, the action may include a change in control of an external device. The control of an external device may include activating, deactivating, charging, operating, initiating, or other control functions of the external device. An external device may refer to a cellphone, a personal computer, a laptop, a tablet, a monitor, a wearable device, a display screen, heads-up display, virtual reality (VR) and augmented reality (AR) devices, dispensers (e.g., vending machine), or any device capable of processing and/or displaying data that may result in a physical action. For example, triggering of the condition may initiate a dispenser to dispense a physical object, such as a physical reward or food item. In another example, triggering of the condition may initiate a communications application on the external device. A communications application may include an internal or external website or program that performs a particular task or set of tasks. (e.g., Outlook™, Gmail™, SMS, Whatsapp™, Slack™, Facebook Messenger™, a proprietary application of the system, or any other medium that enables communication. In other words, the communications application may be an integrated (or accessed) third-party-provider application or an internal automated application. The communications application may be predefined or may be selected by a user. For example, an automation may provide the user with access to a picklist permitting the user to specify, in defining the automation, which communications application will serve as the transmission mechanism for the message. Or, the logical template may predefine the communications application that may be used. In either scenario, automatic triggering may include accessing the defined communications application. In some embodiments, the automation may be predefined to enable sending an email, initiating a phone call, initiating a video conference call, sending text messages, activating an alarm, or any form of notification.

Some disclosed embodiments may involve identifying a selection of a package from a plurality of packages. Identifying an automation package may occur in a computing device in response to a user selection of an automation package or an alternative automation package from a plurality of alternative automation packages. A computing device may provide a user interface that includes an interactive element for identifying or receiving a user selection. The user interface may be a web page, a mobile-application interface, a software interface, or any graphical interface that enables interactions between a human and a machine. As previously mentioned, the automation packages may include one or more automations and the user may select an automation package based on existing automations including predefined and definable conditions.

Some disclosed embodiments may involve automatically configuring a first condition in a particular automation in the selected package based on data in the table. Data in the table may include, but is not limited to, a number, a text, a value, a symbol, a mark, a character, a date, a time, an icon, an avatar, a hyperlink, a picture, a video, an animation, or any visible item or information stored in a cell of the table or associated with a cell of the table (e.g., linked data). In some embodiments, data may be sorted or arranged in columns such that one column in the table includes similar data, and each column may have an associated column heading. In this disclosure, a column heading associated with a column may refer to a text associated with a column within a table and indicative of the data stored within the column. For example, a column with the column heading "Project Owner" may include a name, a photograph, or other identification information of the employee assigned as the owner of a project. In a non-limiting example, the associated column heading may be located in a top cell of the column including the text.

An automation may include any number of conditions, such as at least two conditions, of which one condition may include an automatically configurable condition and the second condition may include an undefined condition. Automatically configuring a condition based on data in the table may include mapping column heading information in the table to column heading information in the particular automation. Mapping may refer to linking or associating or establishing a relationship or a connection between two things (e.g., objects, data, interfaces, data objects, tables, and more). For example, if the two or more things are stored as digital data in a non-transitory computer-readable medium (e.g., a memory or a storage device), the relationship or connection may be established by linking the two or more things, or by assigning a common code, address, or other designation to the two or more things in the non-transitory computer-readable medium. In some embodiments, column heading information in the table may be "mapped" or linked to the column heading information (e.g., a definable condition or variable) in the automation. For example, if the automation package is customized for the legal profession, one or more automations in the automation package may include a condition "When the billed hours exceeds HOURS and the delivery date passes DATE, notify supervising attorney." In this example, the first condition, "billed hours exceeds HOURS," may be automatically configured by associating it with the column containing information about a working attorney's billed hours in the table. In some embodiments, the mapping may occur using artificial intelligence. The term "artificial intelligence" is defined earlier, and may refer, for example, to the simulation of human intelligence in machines or processors that exhibit traits associated with a human mind such as learning and problem-solving. Artificial intelligence, machine learning, or deep learning, or neural network processing techniques may enable the automatic learning through absorption of huge amounts of unstructured data such as text, images, or videos and user preferences analyzed over a period of time such as through statistical computation and analysis. Alternatively, or additionally, the mapping may occur using linguistic processing such as, for example, Natural Language Processing (NLP) techniques. Linguistic processing may involve determining phonemes (word sounds), applying phonological rules so that the sounds may be legitimately combined to form words, applying syntactic and semantic rules so that the words may be combined to form sentences, and other functions associated with identifying, interpreting, and regulating words or sentences. For example, a user may provide an audible input such as by "speaking" to select an automation package, or an automation within the selected automation package, or a condition of an automation within a selected automation package. In some embodiments, the mapping may occur using a combination of linguistic processing and artificial intelligence. For example, a neural network processor may be trained to identify and/or predict user preferences based on learning through linguistic processing and the user's historical preferences.

Some disclosed embodiments may involve displaying a second undefined condition of a particular automation, wherein a second undefined condition may require further configuration. Displaying an undefined condition in an automation may refer to presenting the condition to the user in an interactive format and presenting an indication the condition may not yet be fully defined. An undefined condition may refer to a configurable condition, in which the system may enable the user not only to select or deselect, but also to configure one or more elements thereof. For example, the system may enable the user to configure a maintained logical template in a dynamic manner, in which the user may create a new logical template that might not already exist in the system. In some embodiments, the system may enable the user to store the configured logical template in the system for future configurations or uses. In some embodiments, displaying the second undefined condition may include presenting a logical sentence structure with a variable field for subsequent completion. The second undefined condition may include an automation that includes a configurable trigger element, a configurable action element, or both. The second undefined condition may be presented to indicate that the condition has not yet been defined and that it is available for configuration, as discussed above. The automation may then be configured based on user input for the undefined condition, as discussed further below.

Some disclosed embodiments may involve receiving an input for configuring the second undefined condition. An input may be received via a user interface provided by the computing device. For configuring the second undefined condition, the user interface may enable the user to select a column, a column heading, a row, or any cell of a table associated with the automation. In some embodiments, the user interface may be a menu (e.g., a context menu) that may be prompted in response to a user input (e.g., a click or a finger tap on a button associated with the table).

In FIGS. 1 and 2, the generation of the user interface may be achieved by an application running on the computing device (e.g., the computing device 100 in FIGS. 1-2). The application may generate a user interface for rendering on a display of a user device (e.g., the user device 220-1, 220-2, or 220-*m* in FIG. 2). The user device may interact with the user interface using one or more physical elements (e.g., a mouse, a touchscreen, a touchpad, a keyboard, or any input/output device) that are associated with the user device.

The user interface may be a web page, a mobile-application interface, a software interface, or any graphical interface that enables interactions between a human and a machine via the interactive element. The user interface may include, for example, a webpage element that overlays an underlying webpage. In some embodiments, a computing device that implements the operations may provide the user interface that includes an interactive element. The interactive element may be a mouse cursor, a touchable area (as on a touchscreen), an application program interface (API) that receives a keyboard input, or any hardware or software component that may receive user inputs.

Some disclosed embodiments may be adapted to configure the second undefined condition using the input to cause the second undefined condition to become a second defined condition. In the selected automation, the first condition may already be automatically configured, and the second undefined condition may become a defined condition upon receiving a user input that configures the second undefined condition. Configuring the second undefined condition may involve enabling input options for the user-definable requirements into the selected automation. An input for a user-definable requirement may refer to any data, information, or indication to be used for configuring the user-definable condition.

By way of example, FIG. 51 illustrates an example of a logical template 5104 showing a user-definable condition 5106 in a user interface 5102, consistent with embodiments of the present disclosure. In FIG. 51, the user-definable condition 5106 may be displayed in bold, underlining, or any other differentiating manner, representing that it is user-definable. In some embodiments, the system may display the user interface 5102 after receiving data indicating that an interactive element of a user interface is activated (e.g., selected by a user). The user interface 5102 displays the logical template 5104 ("every time period do something") that includes the user-definable condition 5106 ("every time period"). As illustrated, the user-definable condition 5106 may be activated, as a whole, and invoke the display of the user interface 5102.

Some disclosed embodiments may be configured to apply a particular automation to a table. In some embodiments, the particular automation may be applied to a specific table or a group of tables associated with the selected automation package. In some embodiments, the application of the particular automation may be activated and/or deactivated based on a user input. For example, the user may select the automation to be applied, from a plurality of automations in the selected automation package through a toggle that enables or disables specific automations of the automation package.

In some embodiments, the alternative automation packages may be vocationally-based. Vocationally-based automation packages may include pre-packaged groups of automations that are catered towards specific fields or professions (e.g., legal, R&D, marketing, medical, financial, and so on). The vocationally-based automation packages may include automation that function independently or collaboratively to achieve a certain result. For example, a real estate agent may select an automation package containing automations that are specific to tracking properties and automatically tracking the status of open houses, sales, and contract documents. While some automations of the real estate based automation package may be specific to tracking real estate properties, other automations of the same real estate based automation package may include communication based automations that enable a real estate agent to send automatic emails in response to inquiries. While an automation package may be manually selected, combined, or modified by a user, the plurality of automation packages presented for selection by a user may be based on the user's profile including information associated with user's vocation or profession so that a user may be presented with relevant automation packages for selection. For example, if the user is a Patent Attorney or an Intellectual Property Lawyer, the system may be configured to present one or more automation packages customized for attorneys, and more particularly, for patent attorneys, such as automations catered to track office actions and response deadlines upon receipt of an office action. In some embodiments, the user profile including information associated with, but not limited to, the name, age, gender, profession, educational qualification, location, contact information, employment records, and other credentials of the user may be pre-existing and already stored in a database. Additionally, or alternatively, the user may provide input or create a profile in response to a request from the system.

Figure 52:
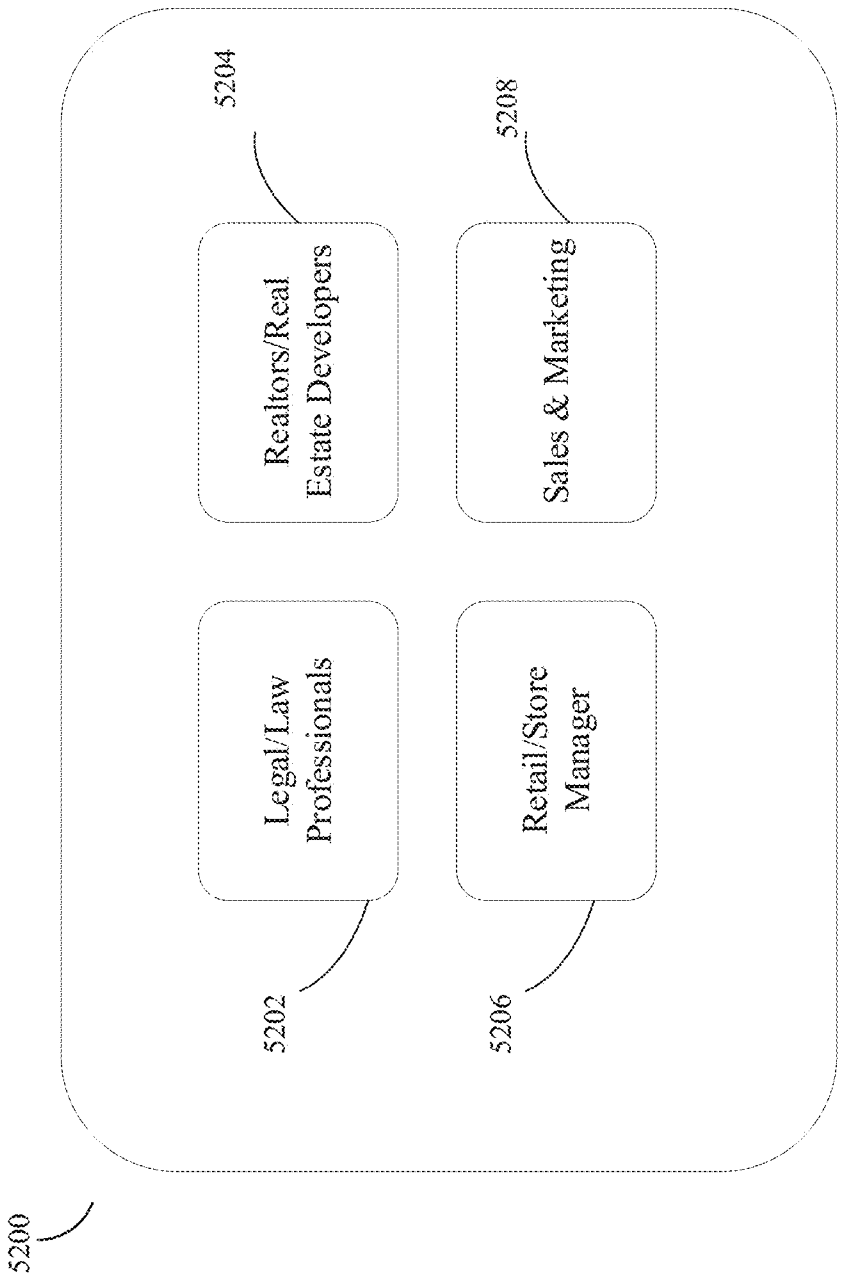
FIG. 52 illustrates an exemplary user interface displaying a plurality of automation packages, consistent with some embodiments of the present disclosure.

By way of example, FIG. 52 illustrates an exemplary user interface displaying a plurality of automation packages, consistent with embodiments of the present disclosure. The user interface 5202 may be configured to display or present a plurality of automation packages such as, for example, legal package 5202, realtors' package 5204, retail manager package 5206, and sales & marketing package 5208, customized for a particular profession, career, or a vocation. As illustrated, legal automation package 5202 may include one or more automations customized for lawyers and legal professionals, automation package 5204 may include one or more automations customized for realtors or real estate developers, automation package 5206 may include one or more automations customized for retail store managers, and automation package 5208 may include one or more automations customized for Sales & Marketing professionals. In some embodiments, the plurality of automation packages may be presented in a graphical format or in a pop-up menu, a drop-down list, a pick list, a tabulated list, or any suitable interface to allow a user to select the automation package based on their vocation. The one or more automation packages may be obtained from an automation marketplace such as a database configured to store automations, automation packages, and tables associated with the automations.

Consistent with some disclosed embodiments, at least one condition detected in the table may include a change in data in a cell of the table. As an example, in an automation "When a student is Status for school, send email to Personnel," the roll-call data table of students may be associated with the automation. Upon updating the table with the day's attendance, if a student is tardy for school, the data in a corresponding cell recording the attendance information for a student may change from a pre-existing value such as a blank or a null value, to presenting "Tardy." This change in data in a cell of the table may be detected which may trigger an action such as notifying "Personnel" (a defined condition for a specific individual) through an email or a phone call, or a text message, or any other means of communication.

Figure 53:
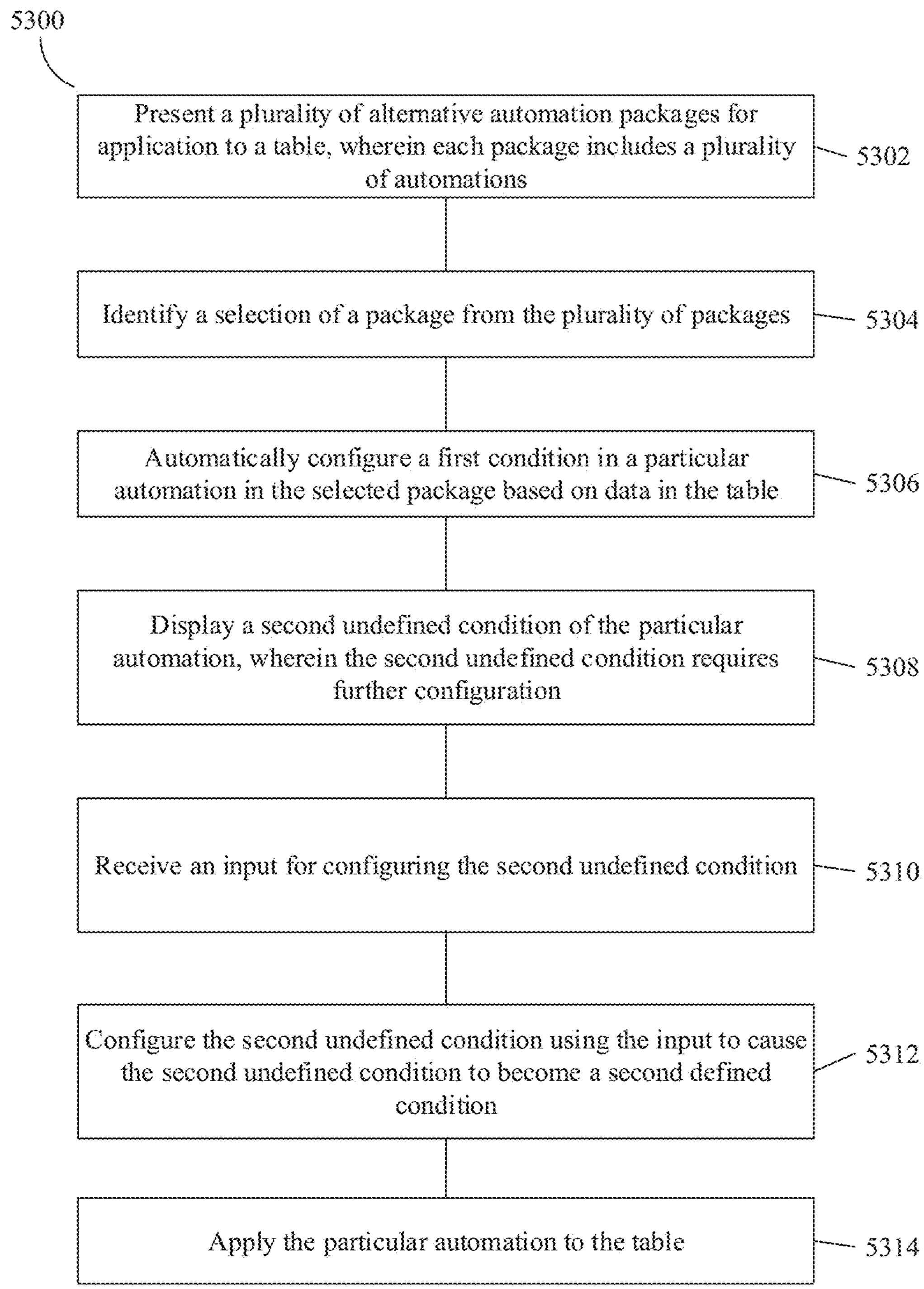
FIG. 53 is a block diagram for an exemplary process for employing self-configuring table automations, consistent with some embodiments of the present disclosure.

FIG. 53 depicts a block diagram of an exemplary process for employing self-configuring table automations, consistent with disclosed embodiments. While the block diagram may be described below in connection with certain implementation embodiments presented in other figures, those implementations are provided for illustrative purposes only, and are not intended to serve as a limitation on the block diagram. In some embodiments, the process 5300 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 51 to 53 by way of example. In some embodiments, some aspects of the process 5300 may be implemented as software (e.g., program codes or instructions) that are stored in a memory (e.g., the memory portion 122 in FIG. 1) or a non-transitory computer-readable medium. In some embodiments, some aspects of the process 5300 may be implemented as hardware (e.g., a specific-purpose circuit). In some embodiments, the process 5300 may be implemented as a combination of software and hardware.

At block 5302, processing circuitry 110 may present a plurality of alternative automation packages for application to a table, wherein each package may include a plurality of automations, and wherein each automation may be configured to cause an action in response to at least one condition detected in the table. As discussed in greater detail above, presenting a plurality of automation packages may include displaying a visual representation of automation packages, or displaying one or more automations associated with an automation package, or displaying automation packages in a pop-up menu, a drop-down list, a pick list, or any suitable interface to allow a user to select an automation package.

At block 5304, processing circuitry 110 may identify a selection of a package from the plurality of packages. Identifying an automation package may occur in a computing device in response to a user selection of an automation package or an alternative automation package from a plurality of alternative automation packages.

At block 5306, processing circuitry 110 may be configured to automatically configure a first condition in a particular automation in the selected package based on data in the table. Automatically configuring a condition based on data in the table may include mapping column heading information in the table to column heading information in the particular automation. Mapping may refer to linking or associating or establishing a relationship or a connection between two things (e.g., objects, data, interfaces, tables, and more).

At block 5308, processing circuitry 110 may display an undefined condition in an automation may refer to presenting the condition to the user in an interactive format. Displaying an undefined condition in an automation may refer to presenting the condition to the user in an interactive format.

At block 5310, processing circuitry 110 may receive an input for configuring the second undefined condition. An input may be received via a user interface provided by the computing device. For configuring the second undefined condition, the user interface may enable the user to select a column, a column heading, a row, or any cell of a table associated with the automation.

At block 5312, processing circuitry 110 may configure the second undefined condition using the input to cause the second undefined condition to become a second defined condition. Configuring the second undefined condition may involve enabling input options for the user-definable requirements into the selected automation. An input for a user-definable requirement may refer to any data, information, or indication to be used for configuring the user-definable condition.

At block 5314, processing circuitry 110 may apply the particular automation to the table. The automation may be applied to a specific table or a group of tables associated with the selected automation package. In some embodiments, the application of the particular automation may be activated and/or deactivated based on a user input.

In collaborative workspaces, it is desirable for collaborators to have control over processes occurring over multiple different platforms while maintaining uniformity across different platforms and involving multiple processes. A collaborator may use a primary application as a main working environment, while functionality of third-party applications may be integrated into the primary application. A way to enhance a collaborator's control may be to enable rules-based processing so that processes are automated and may occur seamlessly across different platforms. For example, upon conditions being met with respect to a primary application or third party application, processes may cause changes in the primary application or third party application. However, involving the functionality of third party applications can be a difficult task. Third party applications may have their own unique operations and their own communication protocols. These may not be compatible with a primary application that the collaborator wishes to use as his or her main working environment. Although it may be possible for an individual user to log in to each individual third party application and synchronize tasks manually, systems and methods for automatically making changes to third party applications using rules that are based on both primary and third party applications are lacking.

Therefore, there is a need for unconventional approaches to enable a collaborator to automate changes to third party applications from within a primary application through rules-based techniques to provide solutions for enhancing control over processing occurring over multiple different platforms.

In some embodiments, there may be provided systems, methods, and computer readable media for remotely automating changes to third party applications from within a primary application. Remotely automating changes to third party applications from within a primary application may include causing actions and alterations to applications that are external to the primary application (e.g., a third party application). For example, a primary application and its associated data may be located by a first provider that may automate changes to a third party application and its associated data that is provided by a second provider that might not have any relation to the first provider. Changes may include the addition, deletion, rearrangement, or any other modification or combination thereof. Changes to the third party applications may be caused due to an automation that may be configured to run in the primary application. The automated changes may be driven by automation, which may include rule-based logical sentence structures and logical rules for configuring actions, as described above.

In some embodiments, the system may maintain in the primary application, a table having rows, columns, and cells at intersections of the rows and columns, wherein the primary application is configured to enable the construction of automations defined by conditional rules for altering internal information in the primary application and external information in the third party applications. Maintaining a table having rows, columns, and cells at intersection of the rows and columns may include storing or managing the storage of a table with structural components such as rows, columns, and cells and its associated data in a repository for later access and retrieval. A table may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device (e.g., a personal computer, a tablet computer, a smartphone, or any electronic device having a screen, as previously described above). At least one table may be configured to operate within a primary application. For example, a user of the primary application may be able to view and manipulate the table within the primary application.

Construction of automations may include the establishment or generation of automations, as described above. The automations may be defined by conditional rules (e.g., rules that monitor a threshold, such as "if" and "when" logic) that when met, trigger an action. Conditional rules may be conditional on specific information input into at least one specific cell in the table of the primary application. Specific information input into at least one specific cell may include entering information into a cell. The information may include user input. The information may include free form text. The information may include one of a plurality of selectable options. For example, a user may change a value of a cell to one of a plurality of predefined options. In some embodiments, specific information input into at least one specific cell may include a status change, such as changing the content of a cell from "in progress" to either "stuck" or "done." A corresponding column for a status change may include a status column. In some embodiments, information may be entered into a cell automatically without direct user input. For example, a rule may be set up that automatically changes the contents of a cell in response to another cell changing.

Actions may include altering internal information, which may involve the addition, subtraction, rearrangement, or any other modification or combination thereof of data contained in a data object contained within a primary application (e.g., data internal to the primary application). The altering external information may include the addition, subtraction, rearrangement, or any other modification or combination thereof of data contained in a data object contained within a third party application (e.g., data external to the primary application). The primary application may be configured to enable the construction of automations defined by conditional rules. The primary application may allow the viewing and manipulation of information related to the table and may cause changes to the table. Meanwhile, third party applications may include external applications that may be unrelated to the table or other aspects of the primary application. The primary application may be linked with third party applications to enrich its functionality. The primary application may integrate functionality of third party applications and may communicate with the third party applications via links. The primary application may allow the viewing and manipulation of information related to third party applications.

A conditional rule may alter internal information in the primary application and external information in the third party applications. Alterations of internal information may include making changes to information maintained in the primary application. The primary application may maintain a table in the primary application, and the table may include rows, columns, and cells. Information in the cells may be added, deleted, or modified. Internal information of the primary application may include information that may not necessarily be contained in any particular cell. For example, internal information may include users associated with a table, dashboard, workspace, or any environment of the primary application. The users may include all available users that are associated with a project, even if some of those users have not yet been assigned to any particular task. Internal information may include metadata associated with data stored in the primary application. Internal information may include templates that may be used or stored in the primary application, such as custom recipe templates for creating an automation, workflow templates, choices for auto-filling lists (e.g., choices that automatically populate for column headings when creating a new column in a table), and any other customizable information associated with the primary application.

Alterations of external information may include making changes to information associated with third party applications. For example, a third party application may include a to-do list manager, and an alteration of external information in the third party applications may include adding, deleting, or editing a to-do item in a to-do list. Furthermore, for example, a third party application may include a blog host, and an alteration of external information in the third party applications may include posting a new blog article, deleting a blog article, or editing a blog article. Furthermore, for example, a third party application may include an email service, and an alteration of external information in the third party applications may include composing, deleting, or sending an email. Furthermore, for example, a third party application may include a file hosting service, and an alteration of external information in the third party applications may include adding a new file, deleting a file, editing a file, or editing information associated with the file, such as metadata. Furthermore, for example, a third party application may include a survey tool, and an alteration of external information in the third party applications may include adding a creating a new survey, deleting a survey, editing a survey, adding individual questions to a survey, adding or modifying a response to a survey question. As an example, a conditional rule may be conditional on information in a cell in a status column of a table of the primary application changing (e.g., changing from "in progress" to "done"), and the conditional rule may alter external information in third party applications including updating an answer to a survey question such as "is this task complete?" to "yes." The conditional rule may also alter internal information in the primary application such as changing information in another cell in a different column (e.g., in a column labeled "ready for next task?" adding the information "yes").

Conditional rules may alter internal information in the primary application together with altering external information in third party applications. In some embodiments, conditional rules may alter only internal information in the primary application or only external information in the third party applications. Conditional rules may be defined by the blocks, as described in further detail below, which may be configured to define changes to the primary application based on conditional data input in the third party applications. For example, a third party application (e.g., weather monitoring application) may receive a data input from a sensor that measures temperature. The primary application may have an associated automation with a conditional rule that is configured to define a change, such as a change in a status cell (e.g., below or above freezing temperature) in response to the data input from the third party application.

Figure 54:
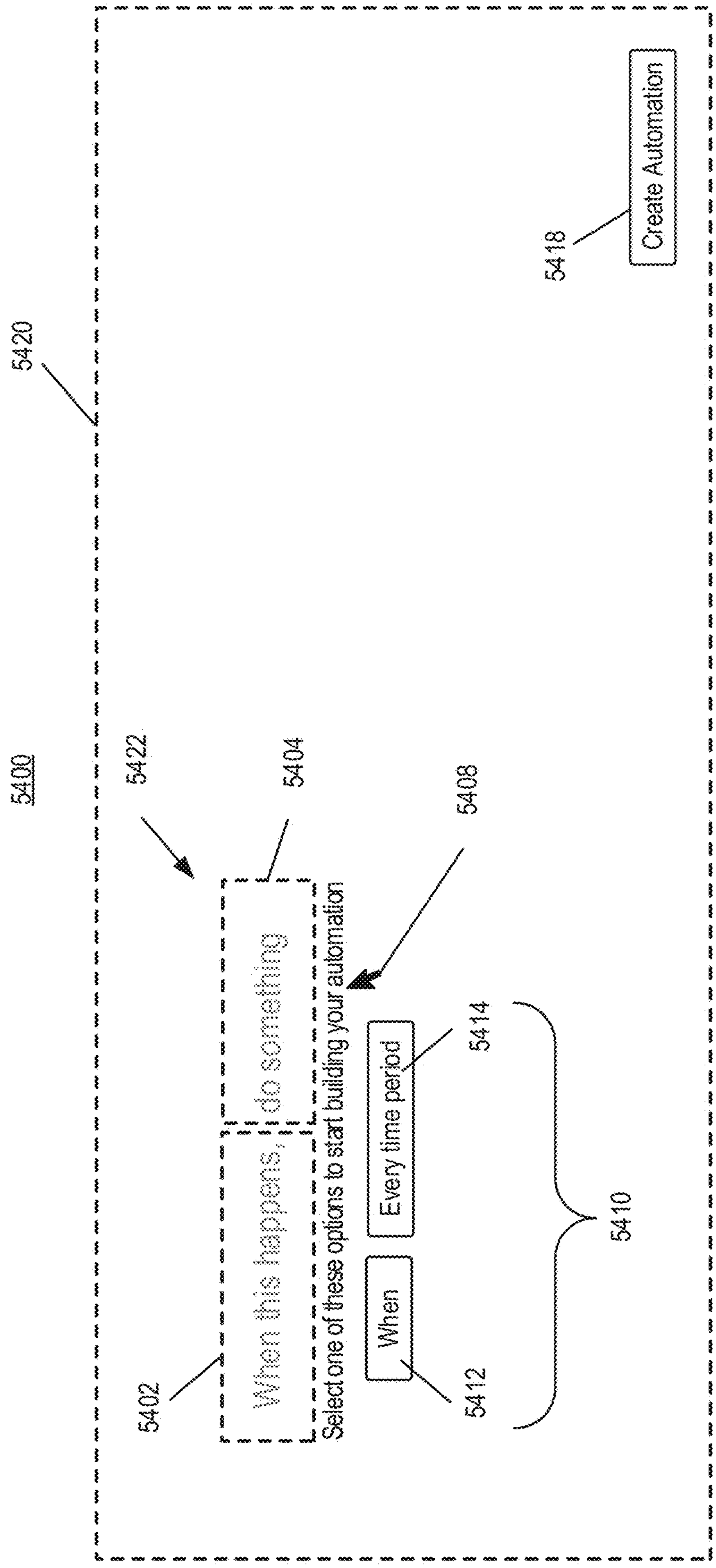
FIG. 54 illustrates an example of an automation definition in an intermediate stage of building an automation, consistent with some embodiments of the present disclosure.

With reference to FIG. 54, conditional rule 5422 may include a condition 5402 and an action 5404. Condition 5402 may include an event. Condition 5402 may include events associated with the primary application or third party applications. Condition 5402 may also include events that are not related to the primary application or third party applications. Action 5404 may include functions that are executed by a processor. Conditional rule 5422 may be configured such that action 5404 occurs in response to condition 5402 being satisfied. At an intermediate stage of building conditional rule 5422, graphical user interface 5420 may display temporary text such as "when this happens" in a region of condition 5402 and "do something" may be displayed in a region of action 5422. The temporary text may guide a user to build the automation without needing programming knowledge.

Some embodiments may include receiving an automation definition conditional on specific information input into at least one specific cell in the table of the primary application. Receiving an automation definition conditional on specific information input may include receiving a signal from a user interface (e.g., a mouse, keyboard, touchscreen, and so on) to indicate an intent to provide definition to an automation based on information input from a specific source. The specific source may be associated with a specific cell of a table in the primary application that may contain static information, or may include dynamic information that may be updated from external sources.

In some disclosed embodiments, the automation definition may be constructed using internal blocks and external blocks, the external blocks having links to the external third party applications. Automations may be displayed in an accessible way such that a user that does not necessarily have programming experience is enabled to construct an automation using selectable blocks. A user may select from a plurality of blocks that have instantly recognizable functions to configure an automation or otherwise provide an automation definition. Automations may be configured using both internal and external blocks to provide an automation definition. A block may include a programming unit that may act as a basic building block for constructing an automation. Blocks may include building blocks that are used to construct an automation definition. Blocks may be the most basic editable unit that may be manipulated by a user to form an automation definition in a format intelligible to the user. Blocks may have structure and may be associated with particular aspects of operation of the primary application or third party applications. Blocks may be associated with the primary application (e.g., an internal block) or third party applications (e.g., an external block). For example, there may be internal blocks that are associated with functions of the primary application such as tables, and external blocks that are associated with functions of external applications such as email, video conferencing, chatting, or any other platform. An external block may be said to be linked to external third party applications because the link may be activated to access and/or transmit information to external third party applications.

Figure 56:
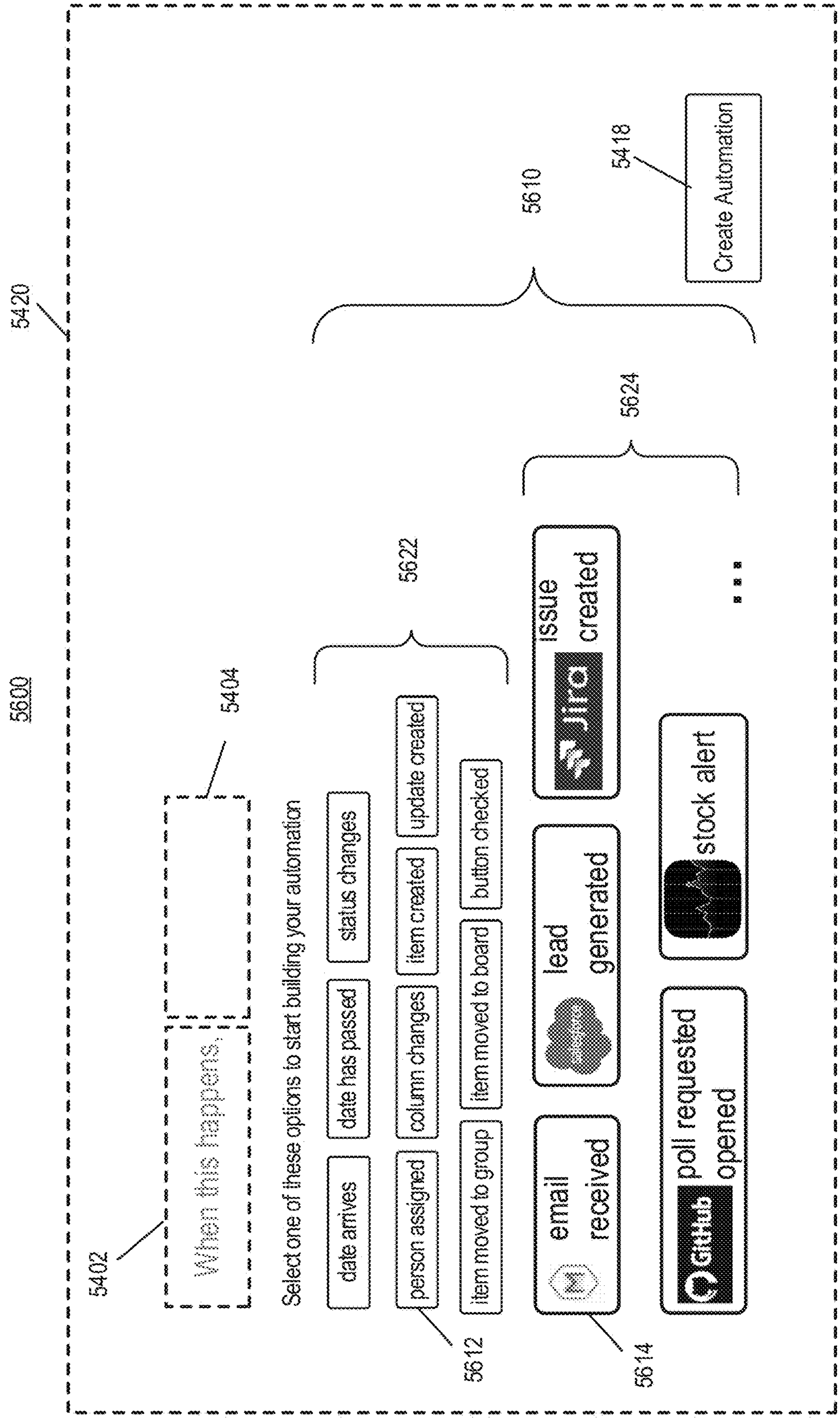
FIG. 56 illustrates an example of an automation definition in an intermediate stage of building an automation, consistent with some embodiments of the present disclosure.

As shown in FIG. 56, detailed blocks 5610 may include internal blocks 5622 and external blocks 5624. Internal blocks 5622 may be associated with aspects of the primary application. External blocks 5624 may be associated with third party applications. For example, a block 5614 may be provided that is associated with an email application. Selection of block 5614 may enable input options for further configuring aspects of the associated third party application, such as which account is used to login, what action is used as a trigger (e.g., receiving an email, receiving an email from a particular entity, sending an email, or any other functionality particular to the third party application). Although external blocks may be associated with third party applications, they may be presented in the primary application and may be used for altering external information in the third party applications.

Automations may include predefined automation categories (e.g., static recipes) and user-defined categories (e.g., custom recipes). Predefined automation categories may be set in advance and may include, for example, commonly used categories of automations or categories expected to be highly used. Predefined automation categories may include status change, notification, recurring, item creation, and due date automations. Predefined automation categories may include certain blocks arranged in a predefined order. For example, a predefined notification automation may include a recipe of "when a column changes, notify someone." Blocks making up such an automation may include "column" and "notify." While a user may be able to customize the automation by, for example, modifying which column changes, and who to notify, the basic structure of the automation may be unchangeable in some embodiments. In such automation, the blocks may remain in set positions. A user-defined automation, on the other hand, may allow a user to build an automation from scratch using their own selection of blocks. User-defined automations may grant a user broad flexibility to configure automations. A user may have the ability to build an automation that performs a broad range of desired functions, using a variety of applications including external platforms, in a user-friendly intuitive interface that does not require programming knowledge.

Automations may be configured to occur autonomously. Automations may occur without human intervention after they are set up. For example, an automation may be created that is configured to perform an action upon occurrence of a condition. After the automation is created, the action may be performed automatically upon occurrence of the condition. The condition may include an event. Automations may be linked to an environment, such as a board.

Blocks may be used for both conditions and actions. A variety of configurations may be used. For example, an automation may be configured to use an internal block as a condition, and an external block as an action. An automation may be configured to use an external block as a condition, and an internal block as an action. There may be multiple blocks on the condition side and multiple blocks on the action side of the automation. Any combination of internal and external blocks may be used. For example, an automation may be configured to cause an action using internal blocks or external blocks, upon occurrence of a condition using internal blocks or external blocks.

FIG. 54 illustrates an example of an automation definition 5400 in an intermediate stage of building an automation, consistent with embodiments of the disclosure. Automation definition 5400 is in a stage of beginning to build an automation. As illustrated in FIG. 54, a graphical user interface 5420 may be provided. Graphical user interface 5420 may include a button 5418 for completing an automation, upon which a finished automation may be put into service. In graphical user interface 5420, a conditional rule 5422 may be displayed that may be a graphical representation of an automation. Conditional rule 5422 may be configured as a semantic statement (e.g., a sentence) that is intelligible to a human user. Conditional rule 5422 may be configured so that an action is executed in response to a condition being met. The condition may include an event that may occur with respect to a primary application or a third party application. A processor may be configured to maintain a table in the primary application. The processor may be configured to perform various functions that are based on conditional rules, such as conditional rule 5422. Upon a condition of conditional rule 5422 being met, an action may occur. The processor may cause the action to occur. The processor may execute computer-readable instructions that may set into motion a process for causing the action to occur.

As shown in FIG. 54, a cursor 5408 may be displayed in graphical user interface 5420. Cursor 5408 may be used for user input. Cursor 5408 may hover over different regions of graphical user interface 5420 and changes may occur in graphical user interface 5420 in response to cursor 5408 hovering over particular regions.

Figure 55:
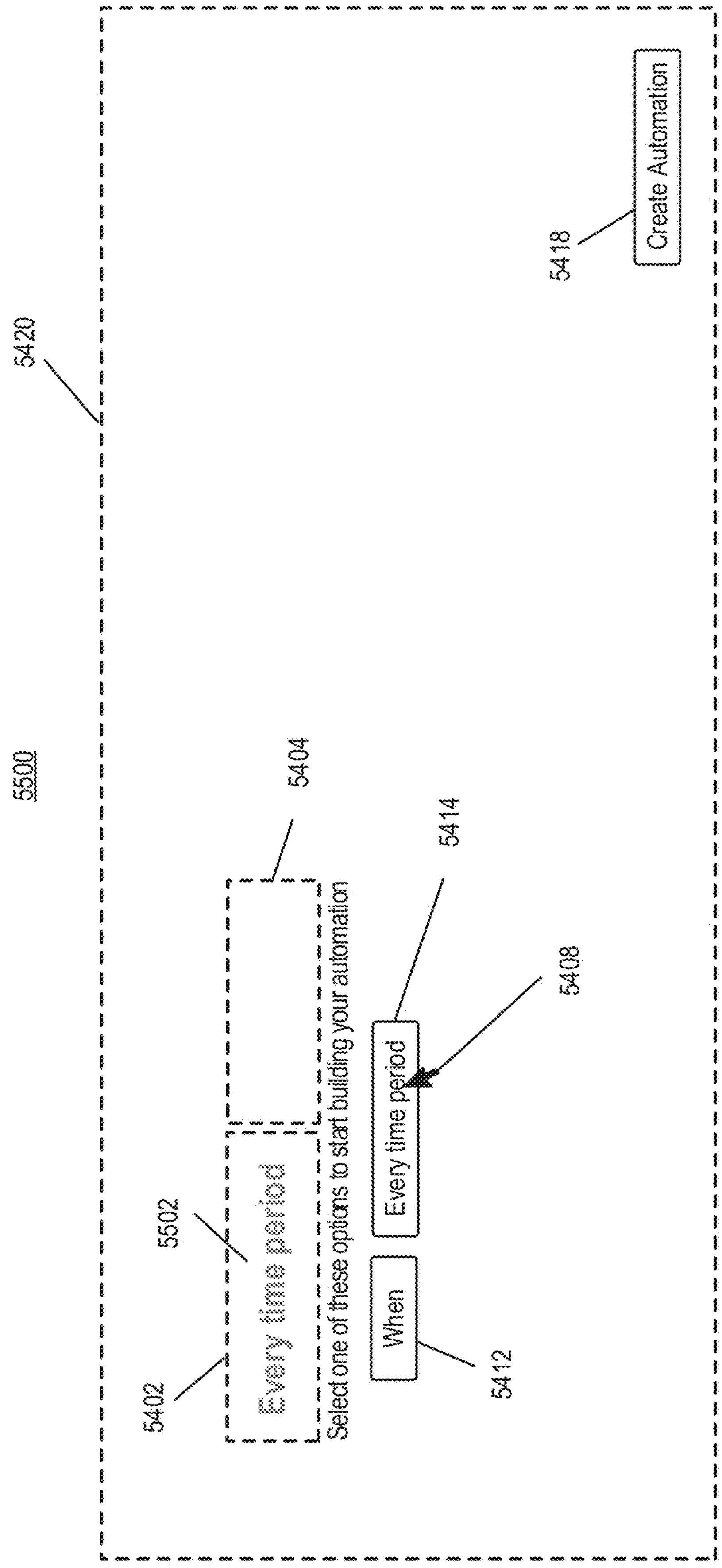
FIG. 55 illustrates an example of an automation definition in an intermediate stage of building an automation, consistent with some embodiments of the present disclosure.

FIG. 55 illustrates an example of an automation definition 5500 in an intermediate stage of building an automation, consistent with embodiments of the disclosure. Automation definition 5500 is in a stage of continuing to build an automation. As illustrated in FIG. 55, cursor 5408 may hover over second block 5414. Upon hovering over second block 5414, temporary text in a region of condition 5402 may change. For example, upon cursor 5408 reaching second block 5414, temporal condition 5502 may be displayed in a region of condition 5402 with the text "every time period." Graphical display of automation definition 5500 may change in real time as a user manipulates options in graphical user interface 5420. A user may be guided by changes in graphical display of automation definition 5500 as an automation is being built. Graphical display may include a preview mode. As shown in FIG. 55, a preview of an automation may be shown wherein only a part of automation definition 5500 is visible in graphical form. Condition 5402 may be displayed, while action 5404 is suppressed. Suppressing part of automation definition 5500 may simplify a construction process for a user. Upon a user input, for example, clicking of second block 5414 using cursor 5408, further changes may be caused in graphical display of automation definition 5500.

FIG. 56 illustrates an example of an automation definition 5600 in an intermediate stage of building an automation, consistent with some embodiments of the disclosure. With reference to both FIGS. 55 and 56, automation definition 5600 is in a stage of continuing to build an automation upon first block 5412 being clicked using cursor 5408 (see FIG. 55). As illustrated in FIG. 56, a variety of options become available and are displayed. Upon clicking first block 5408, first block 5408 may disappear and detailed blocks 5610 may appear. Detailed blocks 5610 may include a plurality of internal or external blocks. An internal block may be associated with the primary application. An external block may be associated with a third party application. Additionally, blocks that are not associated with the primary application or any third party application may be displayed. A block 5606 may display "date arrives" and may be related to temporal information. In some embodiments, internal blocks may be related to aspects of a table of the primary application, such as rows or columns. An example of an internal block may include a block 5608 that displays "column changes." Block 5608 may be related to information included in a column of a table of the primary application. Furthermore, there may be a block 5612 that displays "person assigned." Block 5612 may be related to a person column of a table of the primary application. Block 5612 may be related to a condition that when the contents of a cell in a person column is filled with an item (e.g., a person is assigned to a task), the condition is satisfied.

Figure 57:
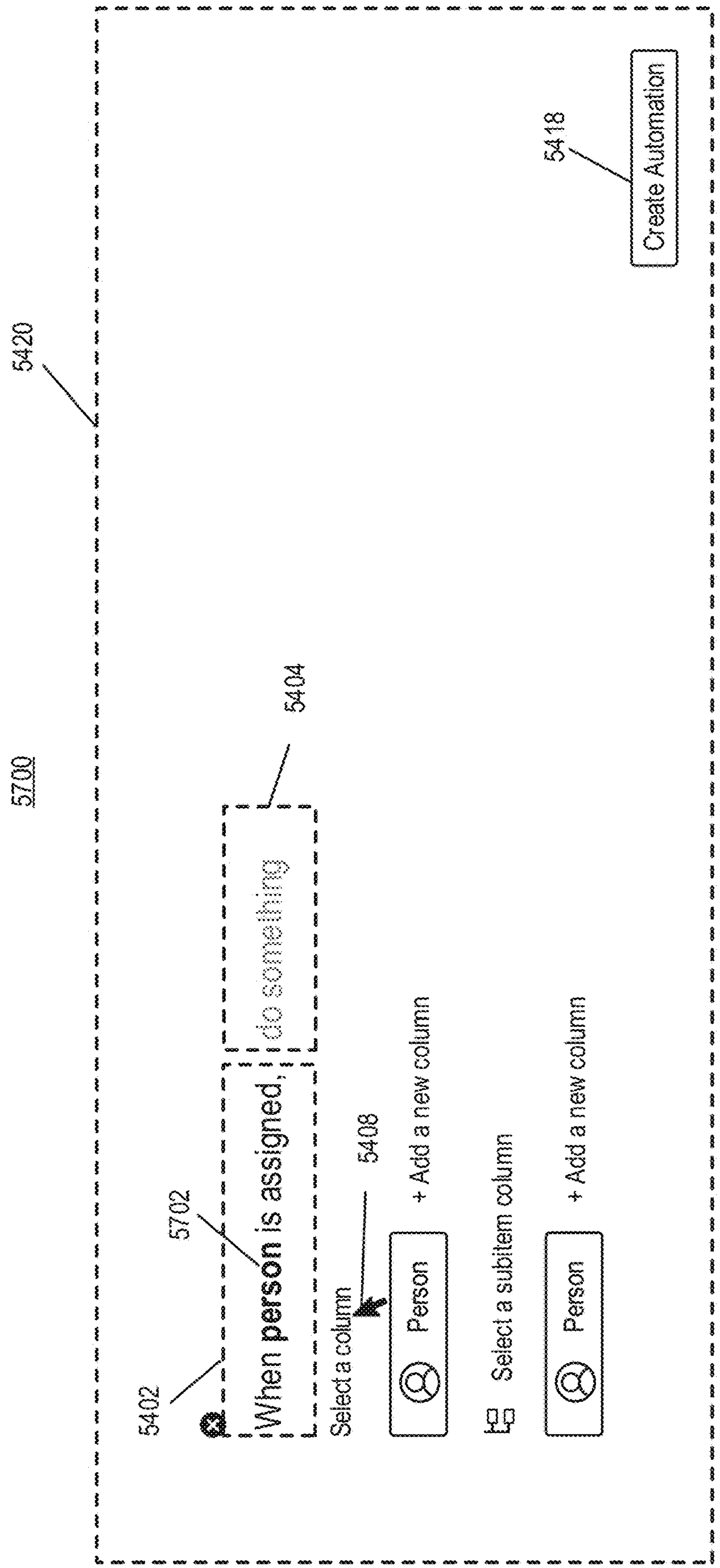
FIG. 57 illustrates an example of an automation definition in an intermediate stage of building an automation, consistent with some embodiments of the present disclosure.

FIG. 57 illustrates an example of an automation definition 5700 in an intermediate stage of building an automation, consistent with embodiments of the disclosure. Automation definition 5700 is in a stage of continuing to build an automation upon selecting block 5612 using cursor 5408. As illustrated in FIG. 57, a variety of options may become available and are displayed. Detailed manipulation of automation definition 5700 may be enabled. Upon clicking block 5612 (labeled "person assigned") in FIG. 56, block 5612 may disappear and detailed options may appear. Condition 5402 may display text corresponding to block 5612 that was selected, while action 5404 is suppressed. Condition 5402 may include a parameter 5702. Parameter 5702 may be displayed in a manner different from that of surrounding text. Parameter 5702 may be modifiable based on specific information. For example, parameter 5702 may be selected using cursor 5408 and further detailed options may appear. Upon selecting parameter 5702, specific information may be input, such as a specific person among a list of persons. The list of persons may include team members added to a board. Upon selecting a specific person, condition 5402 may be configured so as to be satisfied upon the specific person being assigned.

Additionally, as shown in FIG. 57, action 5404 may display temporary text such as "do something." Although not a requirement, in some embodiments, condition 5402 and action 5404 may be displayed in an upper region of graphical user interface 5420. Meanwhile, in a lower region of graphical user interface 5420, options available for modifying of parameter 5702 may be displayed. Changing between different input types may also be enabled. For example, although block 5612 (labeled "person assigned") may have been selected, and options relating to a person column may be displayed, it may be possible to change to a different column, such as a status column. Furthermore, options such as "Add a new column" may be displayed, which may allow a user to add a new column to a table of the primary application directly from graphical user interface 5420. A user may be able to make changes to a table of the primary application while in a state of constructing an automation definition, rather than, for example, exiting graphical user interface 5420 and editing a table after entering a view of the table.

Figure 58:
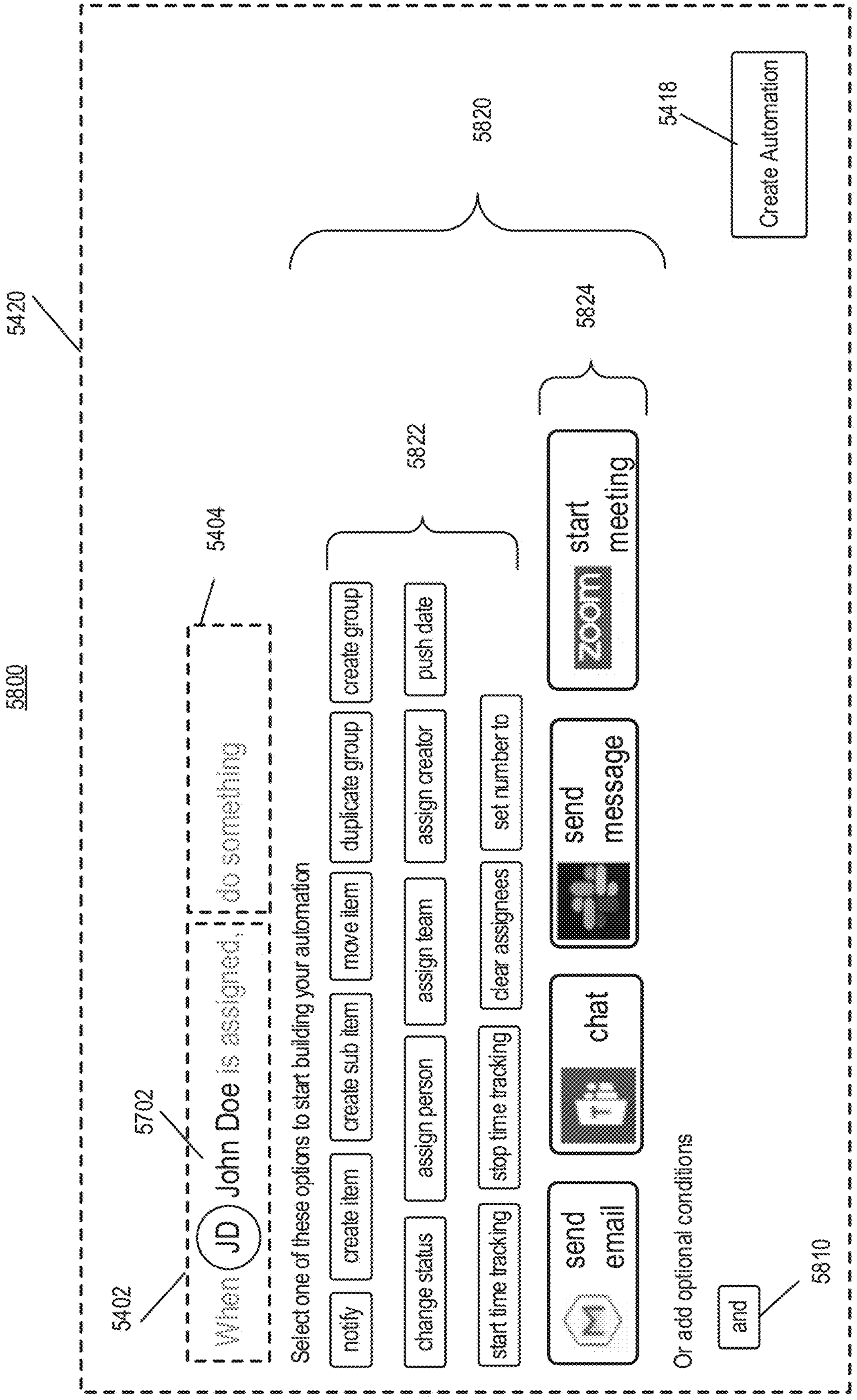
FIG. 58 illustrates an example of an automation definition in an intermediate stage of building an automation, consistent with some embodiments of the present disclosure.

FIG. 58 illustrates an example of an automation definition 5800 in an intermediate stage of building an automation, consistent with embodiments of the disclosure. Automation definition 5800 is in a stage of continuing to build an automation upon selecting block an available choice for parameter 5702 using cursor 5408. As shown in FIG. 58, parameter 5702 may be changed to a specific person, e.g., John Doe. Automation definition 5800 may monitor a cell of a table of the primary application for occurrence of specific information such as the specific person John Doe being assigned. Multiple cells may be monitored, such as a column of cells. After selection of an available choice for parameter 5702, condition 5402 may be complete. Next, a selection of blocks for actions may be enabled.

As shown in FIG. 58, action blocks 5820 may be displayed in a lower region of graphical user interface 5420. Action 5404 may be constructed using action blocks 5820. Action blocks 5820 may include internal blocks and external blocks. For example, FIG. 58 shows action blocks 5820 that include internal blocks 5822 and external blocks 5824.

According to an automation definition, action 5404 may be triggered upon satisfaction of condition 5402. As shown in FIG. 58, according to automation definition 5800, action 5404 may be triggered upon satisfaction of the condition that John Doe is assigned. When action 5404 is constructed using external blocks, functionality of third party applications may be triggered upon satisfaction of condition 5402.

Various parts of an automation definition may include one or more blocks. Condition 5402 may include multiple blocks. As shown in FIG. 58, a connector 5810 may be provided. Connector 5810 may be used for adding additional blocks to parts of an automation definition. In the state shown in FIG. 58, graphical user interface 5420 may display options relating to condition 5402. Connector 5810 may be associated with condition 5402. Connector 5810 may be used to add more blocks to condition 5402. Connector 5810 may include conjunctive terms, such as "and" or "or." Conditions may be formed having multiple components, and the condition may be satisfied in accordance with the conjunctive terms used. For example, a condition may be constructed such as "when event A occurs, and when event B occurs, . . . " and such condition may be satisfied when both events A and B occur. In some embodiments, a condition may be constructed such as "when event A occurs, or when event B occurs, . . . " and such condition may be satisfied when either event A or B occurs. Further conductive terms may be added, and various permutations may be possible.

Figure 59:
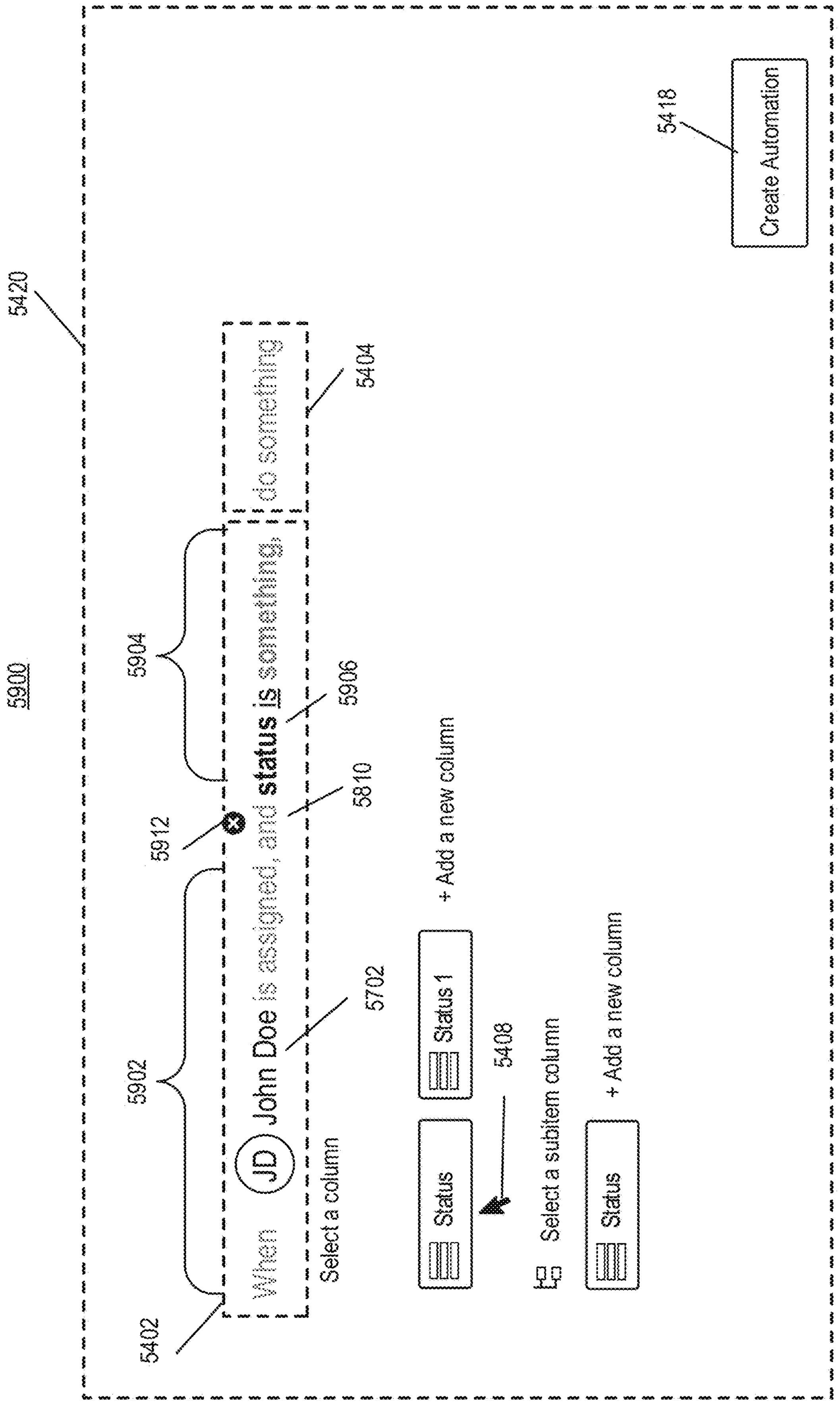
FIG. 59 illustrates an example of an automation definition in an intermediate stage of building an automation, consistent with some embodiments of the present disclosure.

FIG. 59 illustrates an example of an automation definition 5900 in an intermediate stage of building an automation, consistent with embodiments of the disclosure. Automation definition 5900 is in a stage of continuing to build an automation upon adding additional conditions to an automation definition. Additional conditions may be added by selecting connector 5810 using cursor 5408. As shown in FIG. 59, connector 5810 may be added to condition 5402. Condition 5402 may include a first condition 5902 and a second condition 5904. A process for constructing first condition 5902 and second condition 5904 may be similar. For example, for second condition 5904, temporary text such as "status is something" may be displayed in graphical user interface 5420. Also, in a lower region of graphical user interface 5420, options for customizing second condition 5904 may be displayed. The options may include blocks. The options for customizing second condition 5904 may be related to a parameter 5906 of second condition 5904. For example, second condition 5904 may be based on a status column of a table of the primary application, and internal blocks may be displayed that are related to parameter 5906 that may correspond to a particular column of a table of the primary application. Second condition 5904 may be removed using deletion button 5912.

Figure 60:
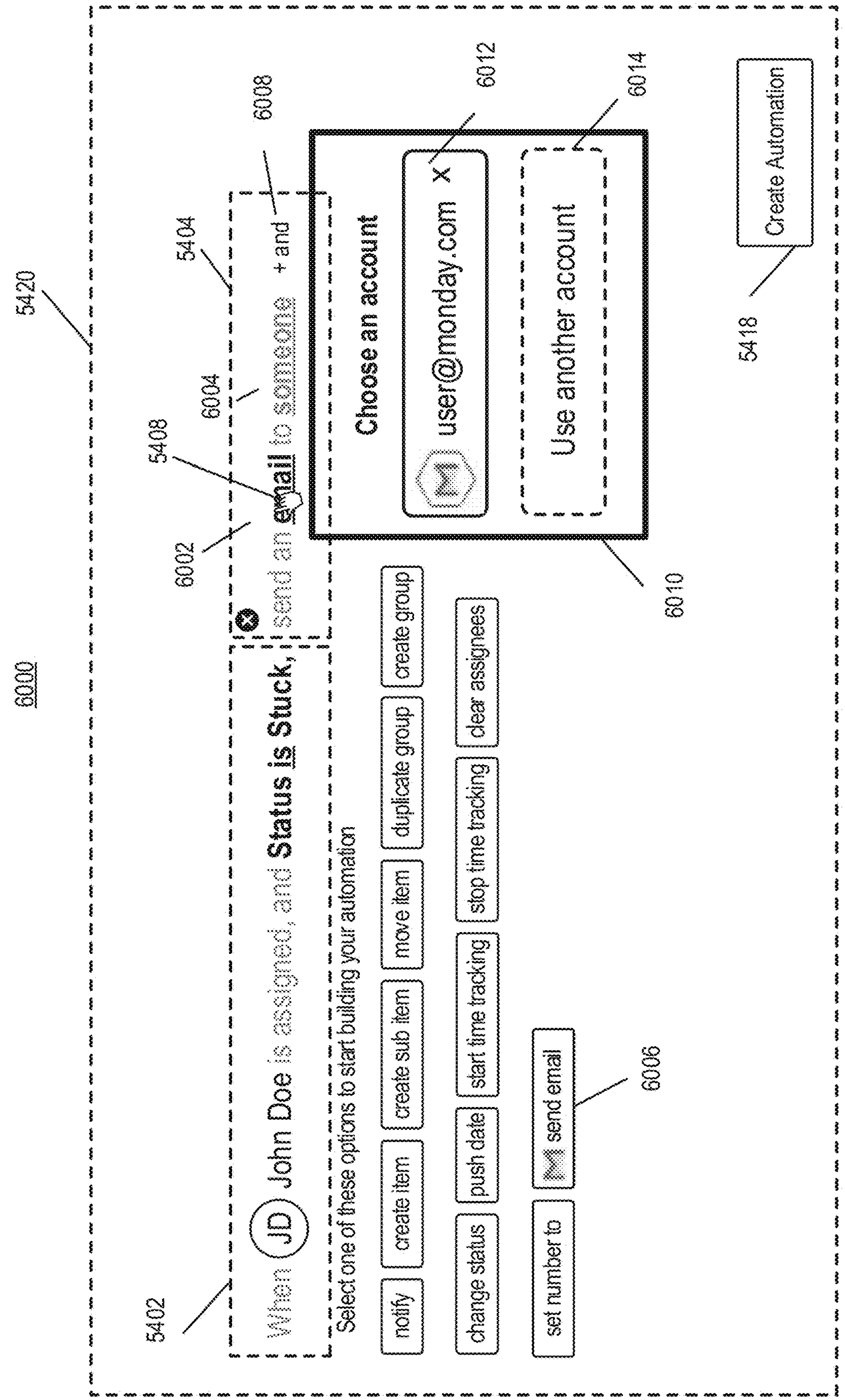
FIG. 60 illustrates an example of an automation definition in an intermediate stage of building an automation, consistent with some embodiments of the present disclosure.

FIG. 60 illustrates an example of an automation definition 6000 in an intermediate stage of building an automation, consistent with embodiments of the disclosure. Automation definition 6000 is in a stage of continuing to build an automation upon completing condition 5402 with multiple conditions, and beginning to define action 5404. Blocks may be displayed in a lower region of graphical user interface 5420. Although features (e.g., blocks and any other feature) of a graphical user interface are described as being displayed in specific regions (e.g., top, bottom, and so on) of the GUI, this is only exemplary and persons skilled in the art would recognize that these features may, in general, be displayed in any region of the GUI. Among the blocks, an external block may be provided, such as a block for sending an email using a third party email application. As shown in FIG. 60, automation definition 6000 may be constructed using two internal blocks, including (i) a person being assigned in the primary application and (ii) a status being stuck, and one external block including sending an email using a third party application. Additional actions may be added by selecting connector 6008 using cursor 5408.

In automation definition 6000, action 5404 includes a first action 6002 of sending an email. First action 6002 may be customized based on the particular third party application involved. Action 5404 may be constructed using block 6006. Further blocks may be provided in graphical user interface 5420, including external blocks. When an external block is used such as a meeting application, first action 6002 may include an action such as scheduling a meeting. Various actions may be selectable, such as starting a meeting, inviting a user in the third party application to join a meeting, sending a reminder regarding a meeting, or any other actions based on the functionality of the third party applications. First action 6002 may include parameters, such as first parameter 6004. When first action 6002 is based on a third party email application, first parameter 6004 may include a recipient of an email to be sent using the third party email application.

Some embodiments may include monitoring the at least one specific cell of the primary application for an occurrence of a specific information. Monitoring may include checking (e.g., a continuous or partially continuous checking) of information contained in a data object such as a specific cell, or any other data object such as a column, table, or information across multiple tables. Monitoring a specific cell for an occurrence of a specific information may include checking the data contained in a specific cell for when the data in the specific meets a certain criteria or condition. The specific cell may contain information that is internal to the primary application, or the specific cell may be a cell in the primary application that may be linked to the third party applications in a manner permitting the primary application to monitor data input in the third party application. A manner permitting the primary application to monitor data input in the third party application may include any method of providing the primary application with access to data in a third party application either in completely open access manners or in other manners that may provide restrictions requiring authentications. The primary application may be linked to the third party applications using a connection protocol. For example, a request may be sent to a third party application. The request may include a login request wherein a user inputs an identifier and login credentials. The identifier may include a username and the login credentials may include a password. An authentication process (e.g., a handshake) may occur based on the request. Authentication may include comparing the identifier and login credentials to a database. Upon a successful authentication, an access token may be returned. The primary application may receive the access token and store it. The primary application may include an access token vault. Linking of the primary application to the third party applications may be accomplished using, for example, an Application Programing Interface (API).

Internal blocks may be related to a table of the primary application. A table of the primary application may include cells. An automation definition may be set up that monitors a specific cell among the cells. For example, the automation definition may monitor one cell that is at the intersection of a particular row and column. In some embodiments, the automation definition may monitor multiple cells. In some embodiments, the automation definition may monitor a whole column or row, multiple columns or rows, or a portion of a column or row. The automation definition may monitor for an occurrence of specific information in a cell. Specific information may include data in the at least one specific cell. Specific information may include predetermined information. For example, an automation definition may monitor a status column for occurrence of a "stuck" status occurring among an entire column. When status becomes "stuck" for one or more rows, a condition of the automation definition may be met.

In some embodiments, monitoring the at least one specific cell of the primary application for an occurrence of the specific information may include monitoring for an event. Blocks may be configured to represent the event by defining a condition. For example, with reference to FIG. 55, first block 5412 may be configured to represent an event in which specific information is input into the at least one specific cell. Details of which event may be further defined by detailed blocks, such as detailed blocks 5610. Further details of the event may be further defined by more detailed blocks.

A conditional rule 5422 may be conditional on an event occurring that is related to the primary application or third party applications, as discussed above. The event may include the occurrence of specific information being input into at least one specific cell. The event may include the occurrence of events that are specific to a third party application. A block may be used to reflect the occurrence of events. For example, as shown in FIG. 54, a first block 5412 and a second block 5414 may be provided. First block 5412 may be labeled "when" and second block 5414 may be labeled "every time period." First block 5412 may be configured to represent an event in which specific information is input into the at least one specific cell. First block 5412 may also be configured to represent events associated with third party applications. Second block 5408 may be configured to represent an event occurring based on time. For example, second block 5408 may represent a condition that is satisfied upon a regularly recurring time period, such as daily, weekly, monthly, or any other defined time period. Time periods of second block 5408 may be relative to a defined time point, such as a particular start date.

Figure 61:
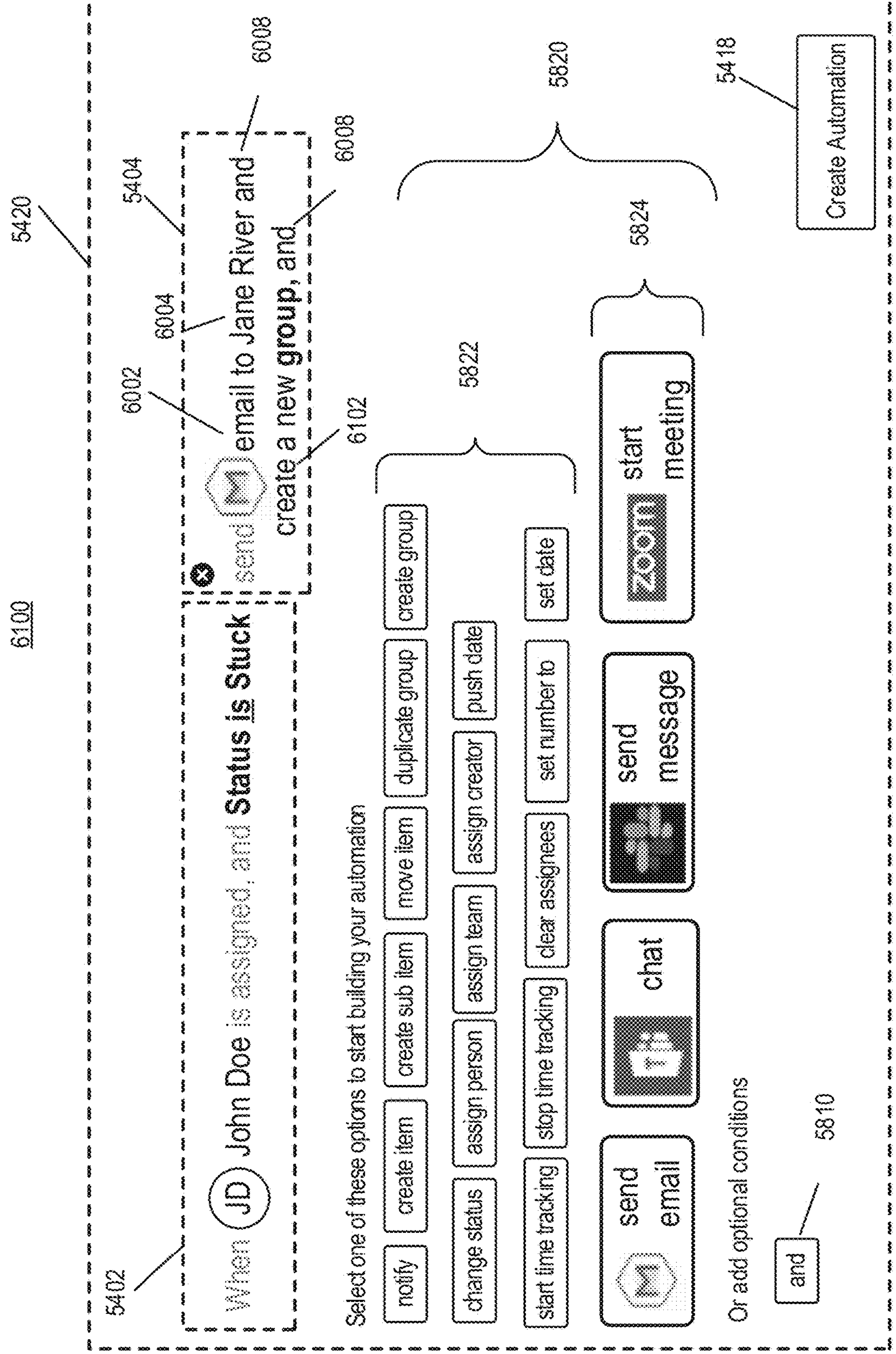
FIG. 61 illustrates an example of an automation definition in an intermediate stage of building an automation, consistent with some embodiments of the present disclosure.

In some embodiments, an automation definition may include conditional rules that define changes to the primary application based on conditional data input in third party applications. For example, condition 5402 may include conditions that are based on external blocks, such as receiving an email in a third party email application. Upon receiving an email, changes to the primary application may be triggered. For example, as shown in FIG. 61, action 6102 may include second action 6102 that causes changes to the primary application. In the example of FIG. 61, the changes to the primary application may include creating a new group in the primary application. Conditional rules may be constructed that are based on functionality of the third party applications. A rule may specify, for example, that a condition is met when conditional data is input in a third party application. The conditional data may include receiving an email. The third party application may be linked with the primary application such that the primary application monitors for the conditional data being input in the third party application. In some embodiments, the third party application may be linked with the primary application such that another entity monitors for the conditional data being input in the third party application and sends a signal to the primary application indicating that the condition has been met. The primary application may be linked to the third party application using, for example, customizable object 6010 discussed above with reference to FIG. 60.

The primary application may be linked to the third party applications in a manner permitting the primary application to monitor data input in the third party application. The primary application may be linked to the third party applications using a connection protocol that may be implemented through customizable object 6010. For example, referring to FIG. 60, a user may select address 6012 and a request may be sent to a third party application to login using address 6012. The request may include a login request wherein a user inputs an identifier (e.g., a username) and login credentials (e.g., a password). An authentication process (e.g., a handshake) may occur based on the request. Authentication may include comparing the identifier and login credentials to a database and may be performed by the third party application. Upon a successful authentication, an access token may be returned to the primary application. The primary application may receive the access token and store it. The primary application may include an access token vault. Linking of the primary application to the third party applications may be accomplished using an Application Programing Interface (API).

The primary application may be linked to the third party applications and may monitor for a specific event or information occurring with respect to the primary application or a third party application. In some embodiments, upon detection of the occurrence of the specific information, the system may trigger functionality of the third party applications or any other various actions. Triggering functionality may include sending a signal that may activate operations to carry out functionality of an application or any other workflow. For example, functionality of the third party application may be triggered even though the detection of the occurrence of the specific information occurs in the primary application. In this example, the primary application may output an activation signal that may be transmitted to a linked, third party application to cause the third party application to activate and carry out operations. In some embodiments, functionality of the primary application may be triggered. As one example, an external block for a third party email application may be used and the primary application may monitor for reception of an email from the third party email application.

In some embodiments, an automation may be configured to use external blocks along with at least one internal block. The internal block may be on the condition side or the action side of an automation. For example, an automation may be configured such that upon occurrence of a condition using an internal block, an action is triggered using an external block. The action may cause changes to a third party application associated with the external block. Changes to the third party application may include altering external information in the third party application. For example, the third party application may include a to-do list manager, and a change to the third party application may include adding, deleting, or editing a to-do item in a to-do list. The action may also cause changes to the primary application that may include altering internal information in the primary application. For example, the primary application may use a table with rows, columns, and cells at intersections of the rows and columns, and changes to the primary application may include adding, deleting, or editing data in a cell.

Changes to a third party application may be caused using the primary application. A change to a third party application may include triggering functionality of the third party application. As shown in FIG. 60, graphical user interface 5420 may display a customizable object 6010 for customizing aspects of first action 6002. Customizable object 6010 may be used to link the primary application to the third party application. Customizable object 6010 may include a login prompt that may present options for a user to login to various accounts using the third party application. Customizable object 6010 may be populated using information from the third party applications or the primary application. For example, the primary application may store user preferences for the user using the primary application and who may be constructing automation definition 6000. The user using the primary application may have a default email address associated with a third party application. Customizable object 6010 may include default address 6012. Customizable object 6010 may include an option 6014 for adding additional accounts. Upon selecting option 6014, a user may input further accounts associated with the third party application. Added accounts may be saved in the primary application. Customizable object 6010 may enable a login operation that may involve authentication with the third party application. Upon logging in with a particular account associated with the third party application, automation definition 6000 may be configured to use the account of the third party application to trigger functionality of the third party application. For example, an email may be sent using the account associated with the third party application. Other changes to third party applications may include posting an article on a third party blog application, sending a message through a third party messenger application, altering a to-do item in a to-do list manager application, or implementing any other functions of third party applications.

FIG. 61 illustrates an example of an automation definition 6100 in an intermediate stage of building an automation, consistent with embodiments of the disclosure. Automation definition 6100 is in a stage of continuing to build an automation upon adding multiple actions in action 5404. As shown in FIG. 61, action 5404 may include first action 6002 and a second action 6102. First action 6002 may be customized by defining first parameter 6004 as a particular recipient. Connector 6008 may be used to connect second action 6102 with first action 6002. Connector 6008 may include an "and" conjunction or other logical operator.

Action 5404 may be constructed using blocks, including internal blocks or external blocks. Second action 6102 may be associated with an internal block. For example, second action 6102 may be related to a group function of the primary application. Second action 6102 may cause a new group to be formed. A group may be formed in the primary application that is associated with particular users in the primary application.

Figure 62:
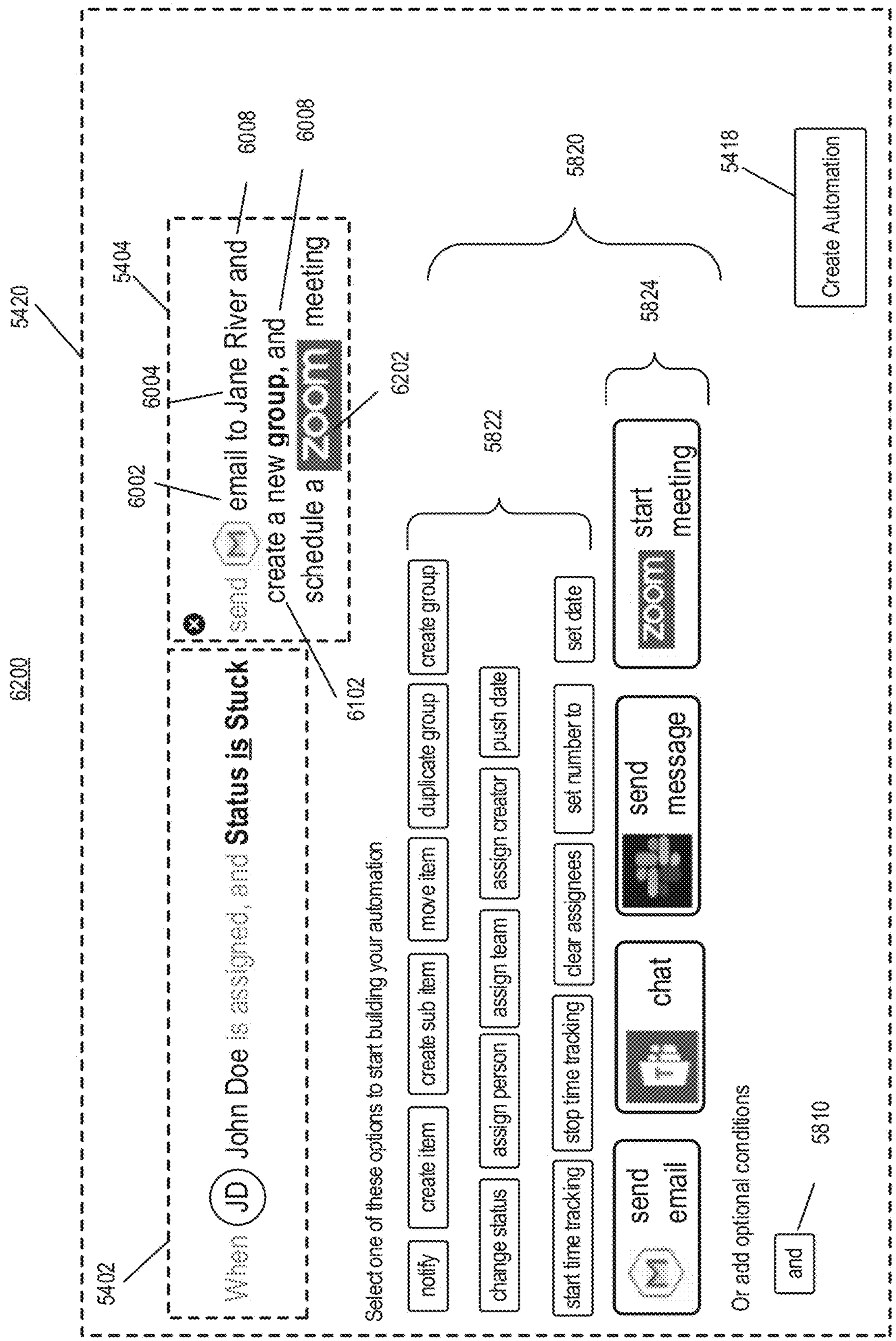
FIG. 62 illustrates an example of an automation definition in final stage of building an automation, consistent with some embodiments of the present disclosure.

In the state shown in FIG. 62, graphical user interface 5420 may display additional options for further editing automation definition 62-00. Although each of condition 5402 and action 5404 include multiple conditions or actions, further conditions or actions may be added. As shown in FIG. 62, graphical user interface 5420 may include action blocks 5820. Action blocks 5820 may be used to add further actions to action 5404. Additionally, connector 5810 may be displayed that may be used to add additional conditions to condition 5402.

When automation definition 62-00 is constructed to a user's satisfaction, the user may select button 5418 to generate the automation and place it into service. The automation may be made active and may constantly run in the background of the primary application. The automation may continue running even when a user is not actively using the primary application. Even when an automation definition is in an intermediate stage of construction, a user may select button 5418 to finalize the automation. However, if certain parameters of the automation definition are left undefined, the user may be prompted to enter user input for fully defining the automation definition.

Figure 63:
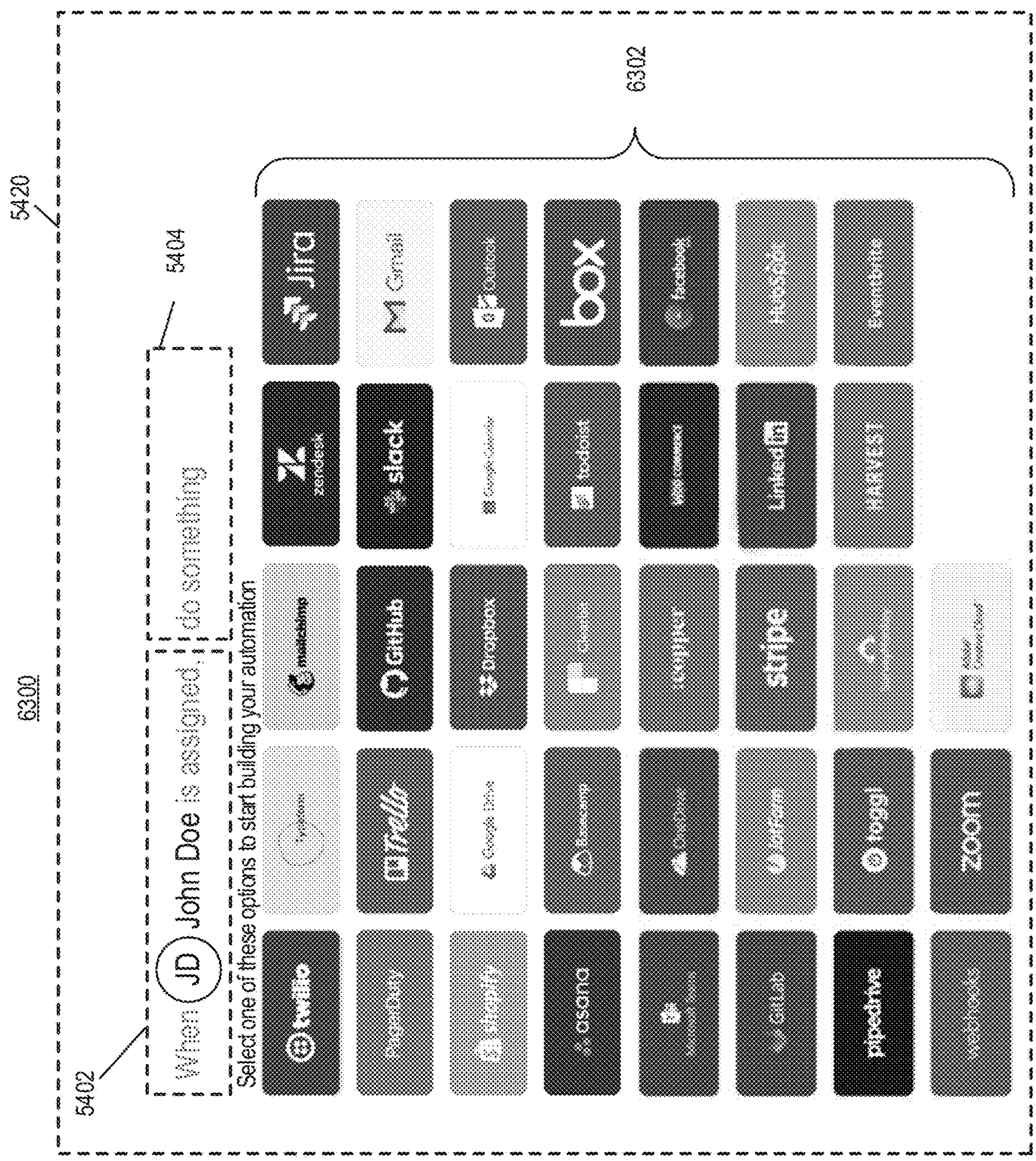
FIG. 63 illustrates an example of an automation definition in an intermediate stage of building an automation, consistent with some embodiments of the present disclosure.

FIG. 63 illustrates an example of an automation definition 6300 in an intermediate stage of building an automation, consistent with embodiments of the disclosure. Automation definition 6300 is in a stage of building an automation upon defining a condition for condition 5402, and in which a user is to select among various external blocks for defining an action for action 5404. Graphical user interface 5420 may include external blocks 6302. Blocks 6301 may be arranged by third party application. Each of the blocks among blocks 6301 may include a logo corresponding to the particular third party application whose functionality is involved in the particular block. Upon selecting an individual block, further options may be displayed. For example, upon selecting a file sharing block, such as that labeled "box," options for further defining an action using the block may be presented. Such options may include uploading a file, deleting a file, altering a file (such as altering the contents or metadata of a file), sending a link to a file hosted by the third party application, or any other function enabled by the third party application.

Figure 64:
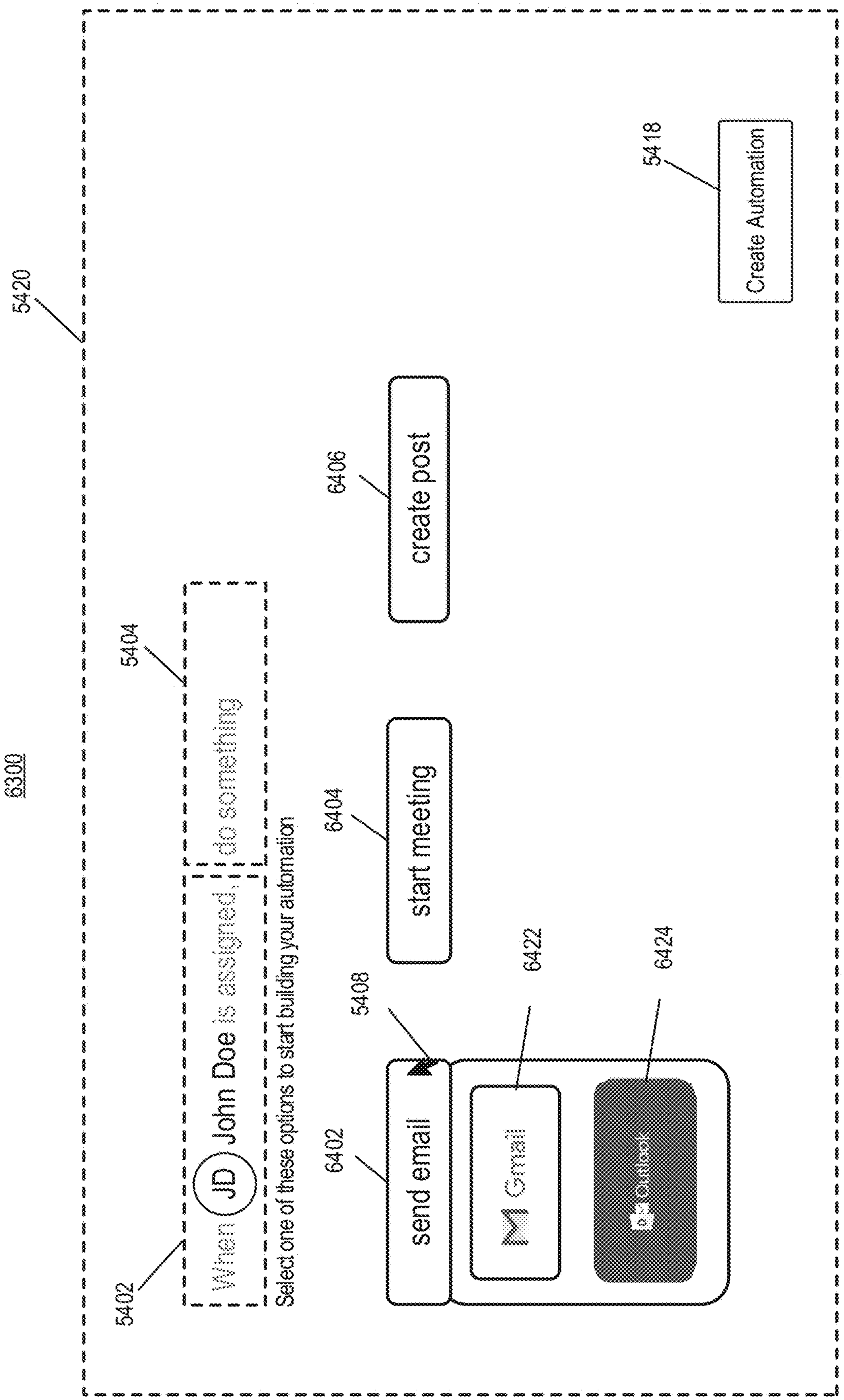
FIG. 64 illustrates an example of an automation definition in an intermediate stage of building an automation, consistent with some embodiments of the present disclosure.

FIG. 64 illustrates an example of an automation definition 6400 in an intermediate stage of building an automation, consistent with embodiments of the disclosure. Automation definition 6400 is in a stage of building an automation upon defining a condition for condition 5402, and in which a user is to select among various categories of external blocks for defining an action for action 5404. Graphical user interface 5420 may be configured so as to organize blocks in a manner such that related blocks are grouped together. For example, as shown in FIG. 64, a first block group 6402, a second block group 6404, and a third block group 6406 may be displayed in a lower region of graphical user interface 5420. Although features (e.g., blocks and any other feature) of a graphical user interface are described as being displayed in specific regions (e.g., top, bottom, and so on) of the GUI, this is only exemplary and persons skilled in the art would recognize that these features may, in general, be displayed in any region of the GUI. Graphical user interface 5420 may be changed in accordance with manipulations of cursor 5408. For example, a user may mouse over first block group 6402 and first block group 6402 may expand. Selectable options within first block group 6402 may be presented. First block group 6402 may correspond to an email function and may include a first third party email application 6422 and a second third party email application 6424. A user may select one of the blocks in the expanded group to further construct automation definition 6400. The selected block may be used to define action 5404.

In some embodiments, the system may be configured to cause a presentation on a display a plurality of internal blocks and a plurality of external blocks, wherein an automation definition may be constructed of at least one internal block and at least two external blocks. In some embodiments, each of the at least two external blocks may link to differing external third party applications. External blocks may be configured to trigger functionality of the third party applications. External blocks may be linked to external third party applications, such as a chat application, an email application, a messenger application, a meeting application, a video conferencing application, a customer relationship management application, a file sharing application, an advertising application, a calendar application, a social networking application, a survey application, an event scheduling application, a blogging application, or any application for achieving functionality using a third party platform.

As shown in FIG. 56, a plurality of internal blocks and a plurality of external blocks are displayed in graphical user interface 5420. A processor may be configured to cause a presentation on a display a plurality of internal blocks and a plurality of external blocks. Graphical user interface 5420 may be displayed on a display, such as a computer monitor, mobile phone, tablet, laptop, wearable device, or any other device capable of displaying a graphic representation of an automation definition. Automation definition 5600 may be constructed of any combination of internal and external blocks.

As shown in FIG. 58, there may be provided, for example, a block for triggering functionality of a third party chat application, a block for triggering functionality of a third party messaging application, and a block for triggering a meeting.

FIG. 62 illustrates an example of an automation definition 62-00 in a final stage of building an automation, consistent with embodiments of the disclosure. Automation definition 62-00 is in a stage of continuing to build an automation upon adding multiple actions in action 5404. Automation definition 62-00 may include at least two external blocks that link to differing external third party applications. As shown in FIG. 62, action 5404 may include first action 6002, second action 6102, and third action 62-02. The multiple actions may be joined by connector 6008. Third action 62-02 may be based on an external block that is different from that of first action 6002. In some embodiments, third action 62-02 may be based on an internal block.

A processor maintaining the primary application may also be configured to alter at least one specific external block. In response to alteration of an external block, the alteration may be stored for a later automation definition. Storing an alteration for later automation definition may include storing an alteration, as described previously above, in a repository such it may be accessed at a later time and reused for an automation definition. For example, a user's default selection of a preferred third party email application may be stored in the primary application. A user's default selection of a preferred third party meeting application may be stored. A user's default selection of a preferred third party application for any particular block may be stored. In some embodiments, a custom template may be created that stored the user's selections. Any alterations to external blocks may be stored and may be loaded upon selecting the custom template for later use in creating another automation definition.

For example, as shown in FIG. 64, an external block may include first block group 6402. Based on user input (e.g., selecting one of first third party email application 6422 or second third party email application 6424), first block group 6402 may be altered. The selected third party email application may be designated as a default application for the particular functionality associated with first block group 6402 and may made to display either of first third party email application 6422 or second third party email application 6424 as the top position of the expanded state of first block group 6402. In some embodiments, a rapid construction process may be used and a user may simply select, for example, an external block associated with sending an email and an action may be defined using the user's default preference for third party email applications. A separate step may be provided for altering the user's preference. In some embodiments, a default selection for a third party application for a particular external block may be saved and may be automatically inserted into an automation definition. In some embodiments, a default selection may be used to construct a part of an automation definition while still presenting options to the user to change the particular third party application involved.

Figure 65:
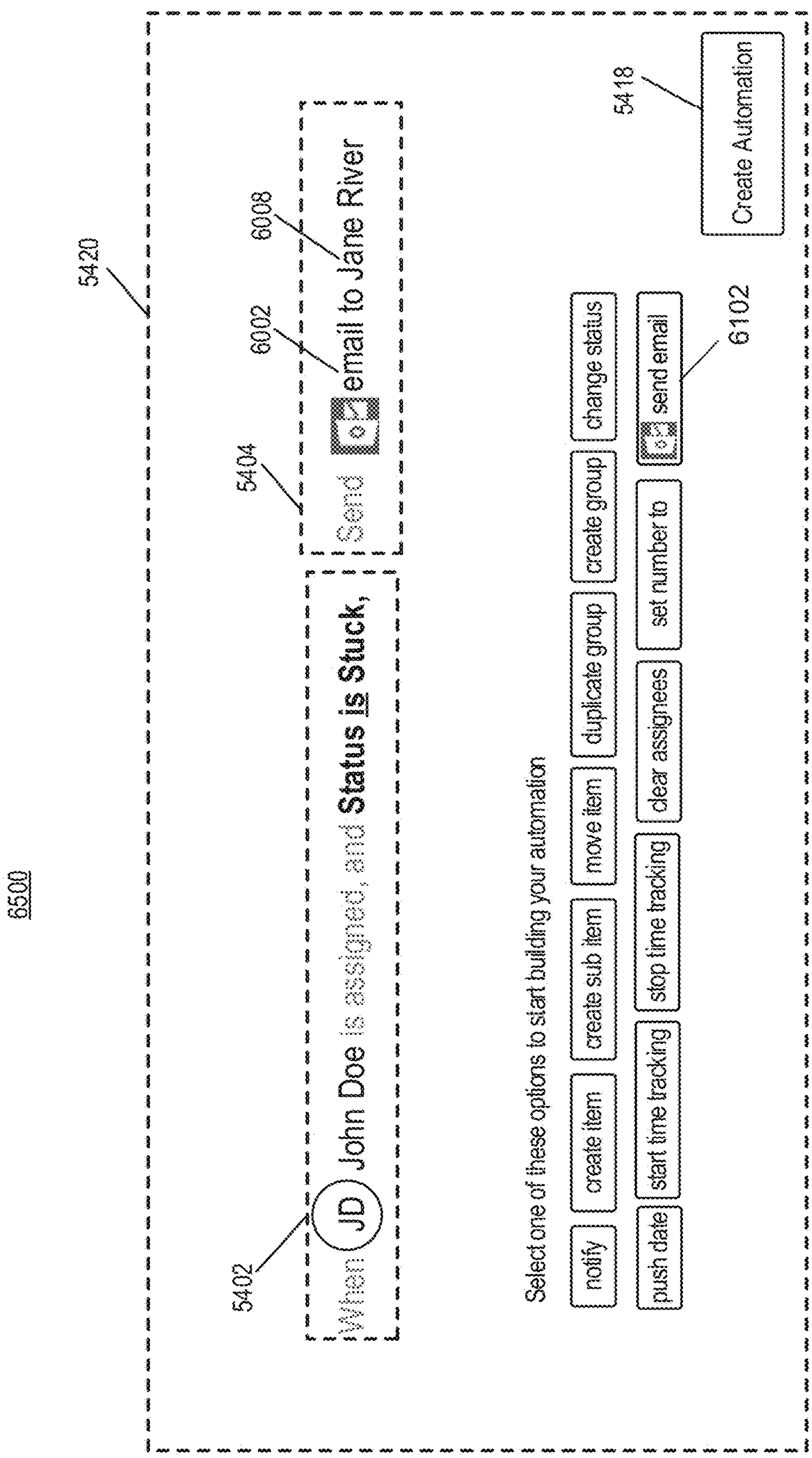
FIG. 65 illustrates an example of an automation definition in an intermediate or final stage of building an automation, consistent with some embodiments of the present disclosure.

FIG. 65 illustrates an example of an automation definition 6500 in an intermediate or final stage of building an automation, consistent with embodiments of the disclosure. Automation definition 6500 is in a stage of building an automation upon defining a condition for condition 5402, and in which a user is to select among various actions using internal or external blocks for defining an action for action 5404. Graphical user interface 5420 may be configured to display external blocks in a manner such that only one third party application is associated with a particular function. For example, for sending an email, only one third party email application may be displayed as block 6102, although different third party email applications may be available. The particular third party application corresponding to block 6102 may be determined based on previous user input. The particular third party application may be set based on user preferences. The particular third party application may be that last used by the user for a particular function. The particular third party application may be determined based on a custom template.

In FIG. 65, although only one third party application may be shown for block 6102 for a particular function (e.g., sending an email), block 6102 may be altered so that other third party applications may be selected. Upon selecting block 6102, options may be presented in graphical user interface 5420 for selecting a different third party application. Customizable object 6010, as discussed above with reference to FIG. 60, may be used.

In some embodiments, the primary application may be configured to monitor a response from third party applications such that if the response fails to meet a condition of at least one specific cell of the primary application, the primary application may be configured to initiate an action. A response from a third party application may include a response to a query from a primary application to obtain information from the third party application. A response that fails to meet a condition of a specific cell of the primary application may include a threshold condition of the specific cell not being met. As a result of the failure to meet the condition, the system may be configured to initiate an action, such as updating data in the at least one specific cell to present an indication (e.g., a status) that the condition is not met. For example, a table may include a watch list of stocks that a user is interested in. The table may include a column for stock ticker and a column for a limit price. The limit price may be a price at which the user desires to purchase or to sell the stock. A condition for an automation definition may include a stock ticker reaching the limit price. In some embodiments, a condition may include a stock ticker failing to reach the limit price. An automation definition may be constructed such that actions are performed on the basis of data input into the table. The primary application may be linked with third party applications and may communicate with them to monitor for conditions and to initiate actions. In the example of an external block of a stock alert and a third party application including a stock quote application, the primary application may monitor for conditions based on information in the table of the primary application or information coming from the third party application. The primary application may monitor a response from the stock quote application and may compare a price for a particular stock to a limit price for the corresponding stock in the table of the primary application. If the stock price reaches the limit price, actions may be triggered, such as notifying the user, or causing a third party brokerage application to buy or sell a stock. In some embodiments, if the stock price fails to reach the limit price, the primary application may initiate an action, such as notifying the user, or performing any other action that may use internal or external blocks. The primary application may be configured to monitor a condition for a predetermined time period. For example, the primary application may monitor the stock price of a stock during regular trading hours. At the end of regular trading hours, the primary application may initiate an action. In some embodiments, the primary application may monitor the stock price during extended trading hours, or any other time period that may be designated.

Figure 66:
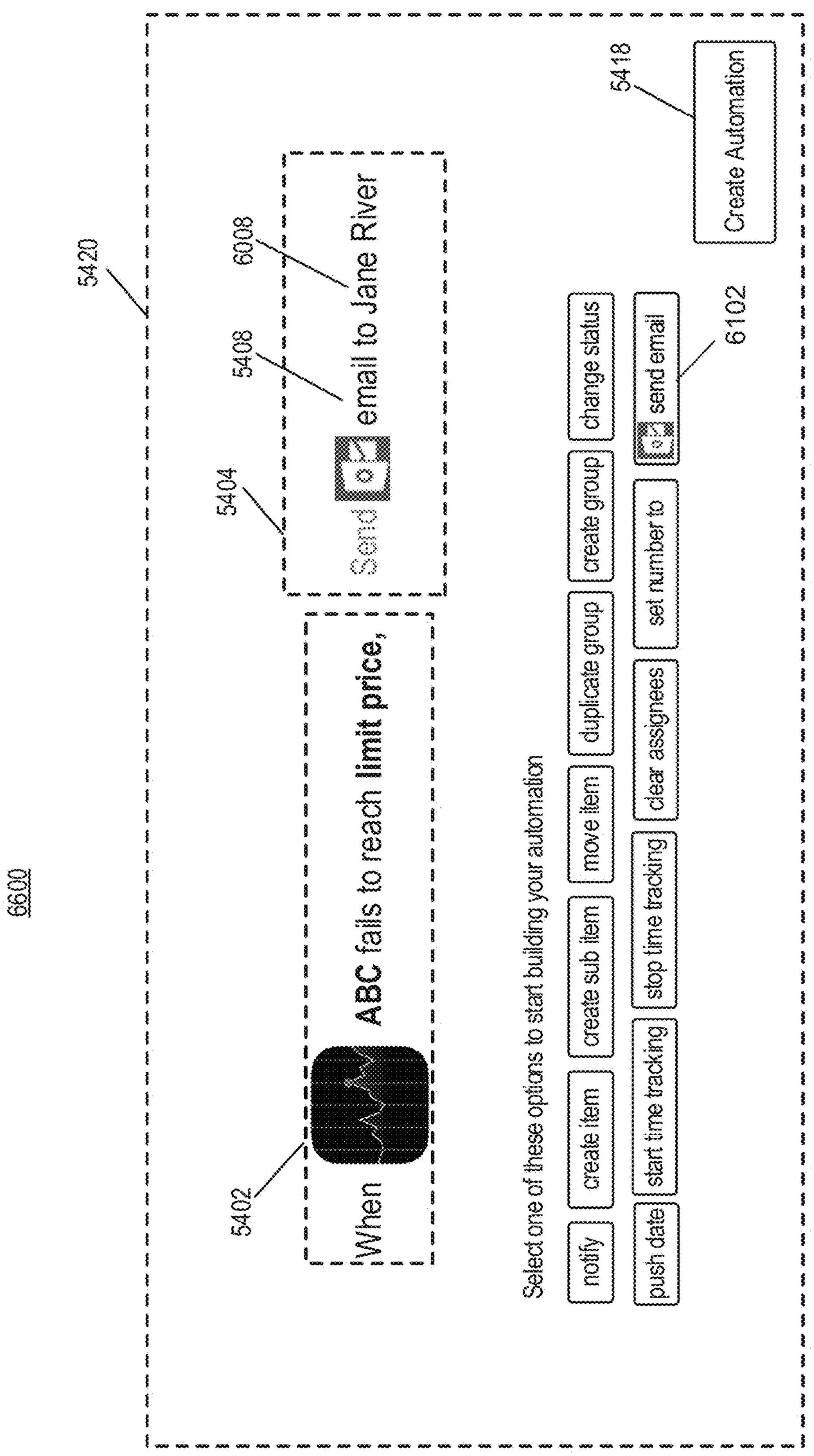
FIG. 66 illustrates an example of an automation definition in an intermediate or final stage of building an automation, consistent with some embodiments of the present disclosure.

FIG. 66 illustrates an example of an automation definition 6600 in an intermediate or final stage of building an automation, consistent with embodiments of the disclosure. Automation definition 6600 is in a stage of building an automation upon defining a condition for condition 5402 and selecting an action for action 5404. Condition 5402 may be constructed using an external block and may include a stock alert. Condition 5402 may be configured so that the primary application monitors a response from a third party application associated with the external block.

Figure 67:
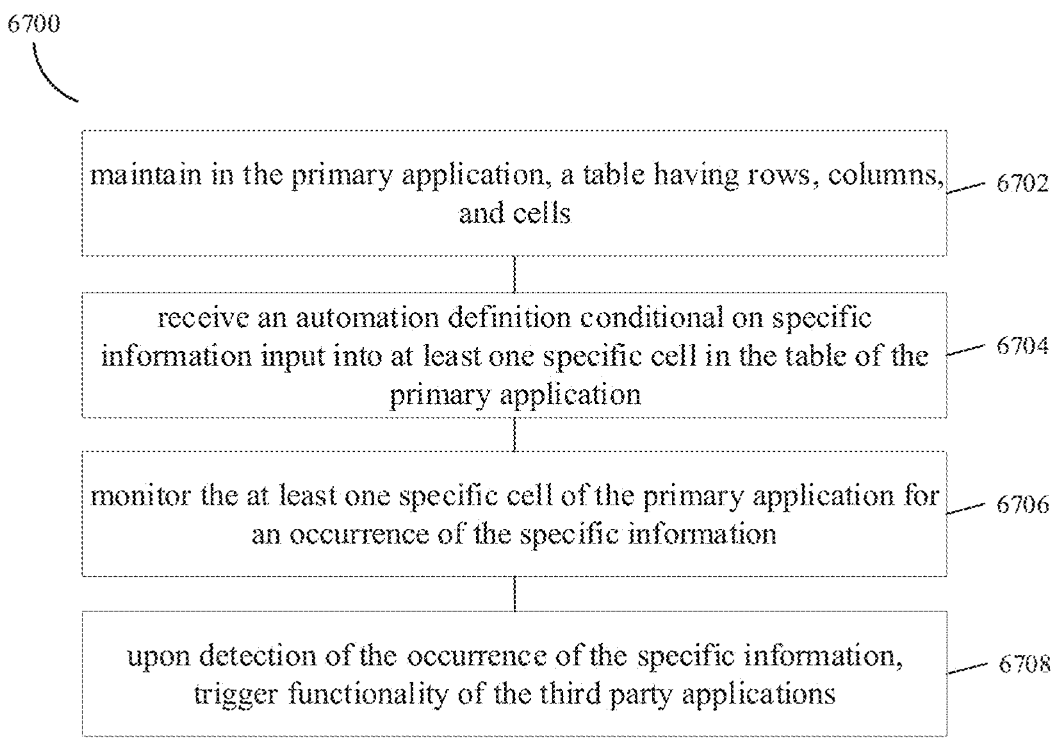
FIG. 67 is a block diagram of an example process for remotely automating changes to third party applications from within a primary application, consistent with some embodiments of the present disclosure.

FIG. 67 illustrates a block diagram of method 6700 performed by a processor of a computer readable medium containing instructions, consistent with some disclosed embodiments. In some embodiments, the method may include these steps:

Block 6702: Maintain in the primary application, a table having rows, columns, and cells at intersections of the rows and columns, wherein the primary application may be configured to enable the construction of automations defined by conditional rules for altering internal information in the primary application and external information in the third party applications.

Block 6704: Receive an automation definition conditional on specific information input into at least one specific cell in the table of the primary application, wherein the automation definition may be constructed using internal blocks and external blocks, the external blocks having links to the external third party applications.

Block 6706: Monitor the at least one specific cell of the primary application for an occurrence of the specific information.

Block 6706: Upon detection of the occurrence of the specific information, trigger functionality of the third party applications.

It is appreciated that the above described embodiments may be implemented by hardware, or software (program codes), or a combination of hardware and software. If implemented by software, it may be stored in the above-described computer-readable media. The software, when executed by the processor may perform the disclosed methods. The computing units and other functional units described in the present disclosure may be implemented by hardware, or software, or a combination of hardware and software. One of ordinary skill in the art will also understand that multiple ones of the above described modules/units may be combined as one module or unit, and each of the above described modules/units may be further divided into a plurality of sub-modules or sub-units.

In the foregoing specification, embodiments have been described with reference to numerous specific details that may vary from implementation to implementation. Certain adaptations and modifications of the described embodiments may be made. Other embodiments may be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Aspects of this disclosure may provide a technical solution to challenges associated with collaborative work systems. Disclosed embodiments include methods, systems, devices, and computer-readable media. For ease of discussion, a system is described below with the understanding that the disclosed details may equally apply to methods, devices, and computer-readable media.

Some disclosed embodiments may involve troubleshooting faulty automations in tablature. Consistent with earlier disclosure, tablature may refer to a board or a table containing information. An automation, also referred to as a logical sentence structure, as described earlier may refer to a logical rule with one or more logical connectors, and configured to act on table data to produce an outcome. An automation may also be considered as a "recipe" having a logical organization of elements for implementing a conditional action. The automation, for example, may be in the form of a recipe, a template, or a sentence including one or more triggering elements (also referred to herein as "triggers") and one or more action elements (also referred to herein as "actions"). A faulty automation may refer to an automation as described earlier which does not perform as expected, has failed, or otherwise produced an unexpected result or irregularity from an intended result. While not limited in application to tables containing data automations, automations may apply to data stored in tables or boards as defined earlier. Maintaining a table containing data may include storing or managing the storage of a table and its data in a repository for later access and retrieval. The processor and processes required to maintain a table are defined previously above and may maintain the table by sending/receiving network packets, verifying connections, activating a graphical user interface (GUI), verifying updates, encrypting communications, or performing any other actions to make a table accessible.

Some embodiments may include storing a plurality of logical sentence structures that serve as logical rules to conditionally act on the data in the table, wherein each logical rule may be enabled to act at differing times in response to differing conditional changes. A logical sentence structure is described earlier and may refer to a representation of an automation configured or configurable to perform a function related to data in a table. Logical rules may refer to underlying logic created by an automation, which may be hidden from the user by the automation, or which may be at least partially revealed through observation of the logical sentence structure. Underlying logic may be in a form of a script, assembly language, block diagram or any other form understandable by a processor or generic computer. Differing conditional changes may refer to modifications to data associated with a board. Such changes may occur manually or automatically. Such changes may invoke the trigger of a logical rule causing the logical rule to act (e.g., an automation may be launched). For example, change in data may include any change such as the addition, deletion, rearrangement, or any combination thereof of information contained in a table (e.g., a changed status, newly entered data, removal of old data, modification of existing data). When there are multiple logical rules that act on differing conditional changes, each of the logical rules might be activated the moment each differing condition is met. Each of the logical rules may be said to act at differing times because each logical rule will activate when their respective condition is met, which may occur at differing times. However, if multiple logical rules depend on an identical conditional change, those multiple logical rules may act simultaneously or near simultaneously because they are triggered by the same conditional change. Further, in response to a condition being met, while a logical rule monitoring for that condition may be enabled to act immediately, the logical rule may also be configured to act at a later time after the condition is met (e.g., send a notification to an individual 10 minutes after a status changes to "Done").

Disclosed embodiments may involve activating the logical rules so that each rule is in effect simultaneously. Activating logical rules may refer to a process of establishing, initiating, enabling, starting, beginning, or otherwise setting up a logical rule so that it is ready to act upon detection of a triggering event (e.g., a change). Activating logical rules so that each rule is in effect simultaneously may therefore refer to enabling logical rules to be actively monitoring for each logical rule's condition. For example, there may be a plurality of logical rules that each may be toggled on and off to be "active." In such exemplary situations, when two logical rules are toggled to an "on" position, the two rules may be said to be in effect simultaneously. When a specific condition is met for a specific logical rule, that specific logical rule may then be triggered to carry out an action. As each logical rule performs an action on the data, some disclosed embodiments may record the action and an associated time stamp in an activity log. An action on the data may refer to adding, changing, deleting, transmitting, or any other action or a combination thereof that may affect data associated with a table. An activity log may refer to an organized data ledger, table, board, or any other type of data storage. An activity log may contain an action type, time stamp, action status, occurring errors if any, or any other metadata describing any action. The activity log may be hidden from view or may be presented on a client device or any display. For example, the activity log may continuously store information about the data and actions taken on the data.

Aspects of this disclosure may also involve receiving a query to identify most recent actions performed on the table. A query may refer to a signal request to initiate an action, such as a request for retrieving information from a database. Most recent actions performed on the table may refer to the latest action performed (e.g., by an automation or manually be a user) on the table, such as the last action taken or the most recent actions in a time period (e.g., actions in the last hour, actions in the last day, week month, and so on). Some embodiments may also involve the query being generated in response to a potential irregularity in an operation of at least one of the logical rules. A potential irregularity may refer to any deviation from an intended operation of an automation such as an overuse of computing resources, timing out of one or more tasks, looping, or any other unusual activity caused by the automation. In such an event, some disclosed embodiments may be configured to identify a source of the potential irregularity and display an associated logical sentence structure. The associated logical sentence structure that is displayed may include the logical sentence structure containing the potential irregularity. For example, in the event of timeout occurring, a logical sentence structure (e.g., automation) causing the timeout may be displayed for further configuration to modify the logical sentence structure.

After the query is received some disclosed embodiments may access the activity log to identify at least one most recent action performed on the table and present at least one specific logical sentence structure underlying at least one logical rule that caused the at least one most recent action. An underlying logical rule may refer to the logical rule operated and defined by the logical sentence structure or any other automation. A logical rule may be defined by a sentence structure. Thus, when the rule that caused a most recent action is identified, the sentence structure that underlies (e.g., defines) that rule may be identified. By way of example, logical sentence structure may be configured to send an email after certain change to data is made. In this exemplary situation, the automation will monitor for data changes, and after the data change is detected, the automation will then send an email. If automation is successful, the action of sending the email is considered the latest step. Should the automation fail (e.g., because there is no email address to send the message or any other error that may occur), the last action recorded may be an indication of a failure to send the email. This result and recorded last action may be presented on a graphical user interface or any other way preferred by the user. The presentation may include causing the at least one logical sentence structure to appear on a display, such as on a screen, client device, projector, or any other device that may present the at least one logical sentence structure, as previously disclosed.

Figure 68:
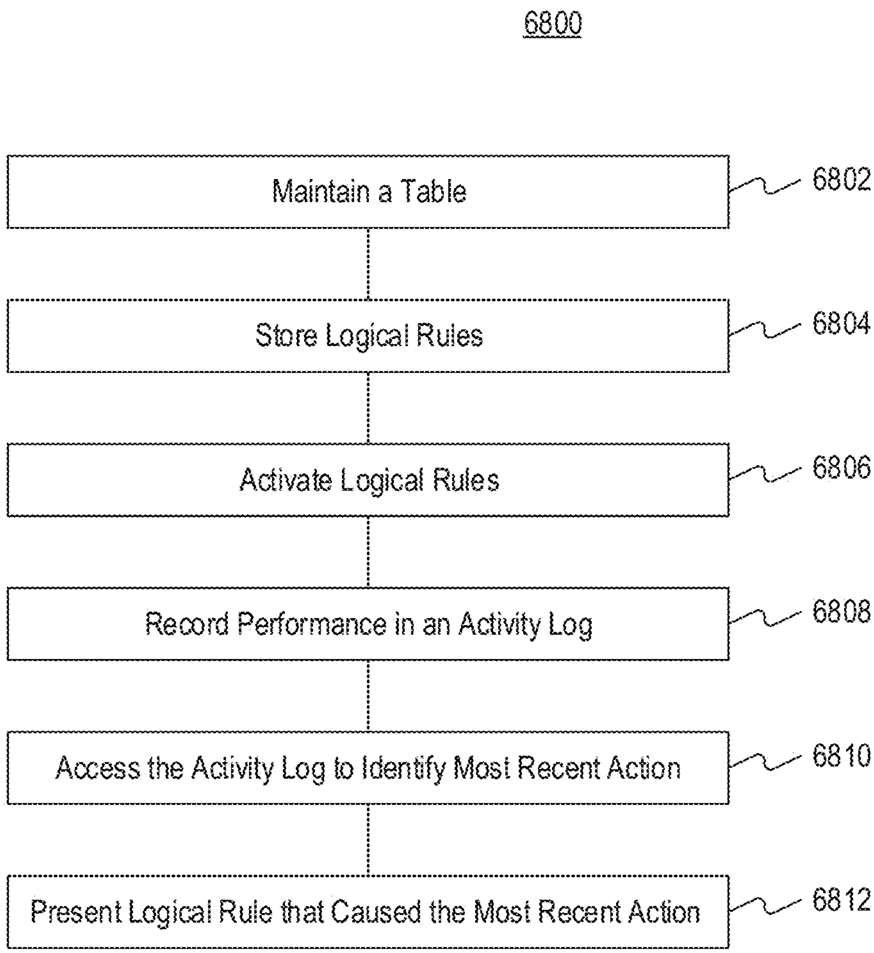
FIG. 68 is a block diagram of an exemplary method for troubleshooting faulty automations in tablature, consistent with some embodiments of the present disclosure.

FIG. 68 illustrates a block diagram of an exemplary method 6800 for troubleshooting faulty automations in tablature. This may occur, for example, in a collaborative work system. Method 6800 may be performed by the computing device 100 in conjunction with computing architecture 200 as depicted and described above with references to FIG. 1 and FIG. 2. Method 6800 may begin at block 6802 by maintaining the table with rows and columns defining cells containing the category indicators, as described previously and further detail above. Method 6800 may proceed to block 6804 by storing a plurality of logical sentence structures that serve as logical rules to conditionally act on the data in the table, wherein each logical rule may be enabled to act at differing times in response to differing conditional changes, consistent with earlier disclosure. Method 6800 may continue to block 6806 to activate the logical rules so that each rule is in effect simultaneously as described in more detail herein. Following block 6806, method 6800 may proceed to block 6808 recording the action and an associated time stamp in an activity log as each logical rule performs an action on the data consistent with the earlier disclosure. At the next block 6810, method 6800 may receive a query to identify most recent actions performed on the table and access the activity log to identify at least one most recent action performed on the table consistent with earlier disclosure. Finally, method 6800 may include block 6812 by presenting at least one specific logical sentence structure underlying at least one logical rule that caused the at least one most recent action.

Aspects of this disclosure may involve receiving updates to the plurality of logical sentence structures, the updates including changes to logical sentence structure variables that alter associated logical rules, and wherein at least one processor may be further configured to log and timestamp each update. Logical sentence structure variables may refer any to any parameter, constraint or condition that may be changed. These may include, for example, table, row/column identifiers, names, conditions or otherwise replaceable components of an automation. If such variables are modified, any such modification may be tagged, logged, and time stamped. A user may be presented with an interface displaying variables changed via the at least one most recent update, consistent with the earlier disclosure. The most recent update refer to the last (or a recent) modification or alteration made in at least one of the last few minutes, last hour, last day, last week, last month, last year, or any other period of time in the past.

Figure 69:
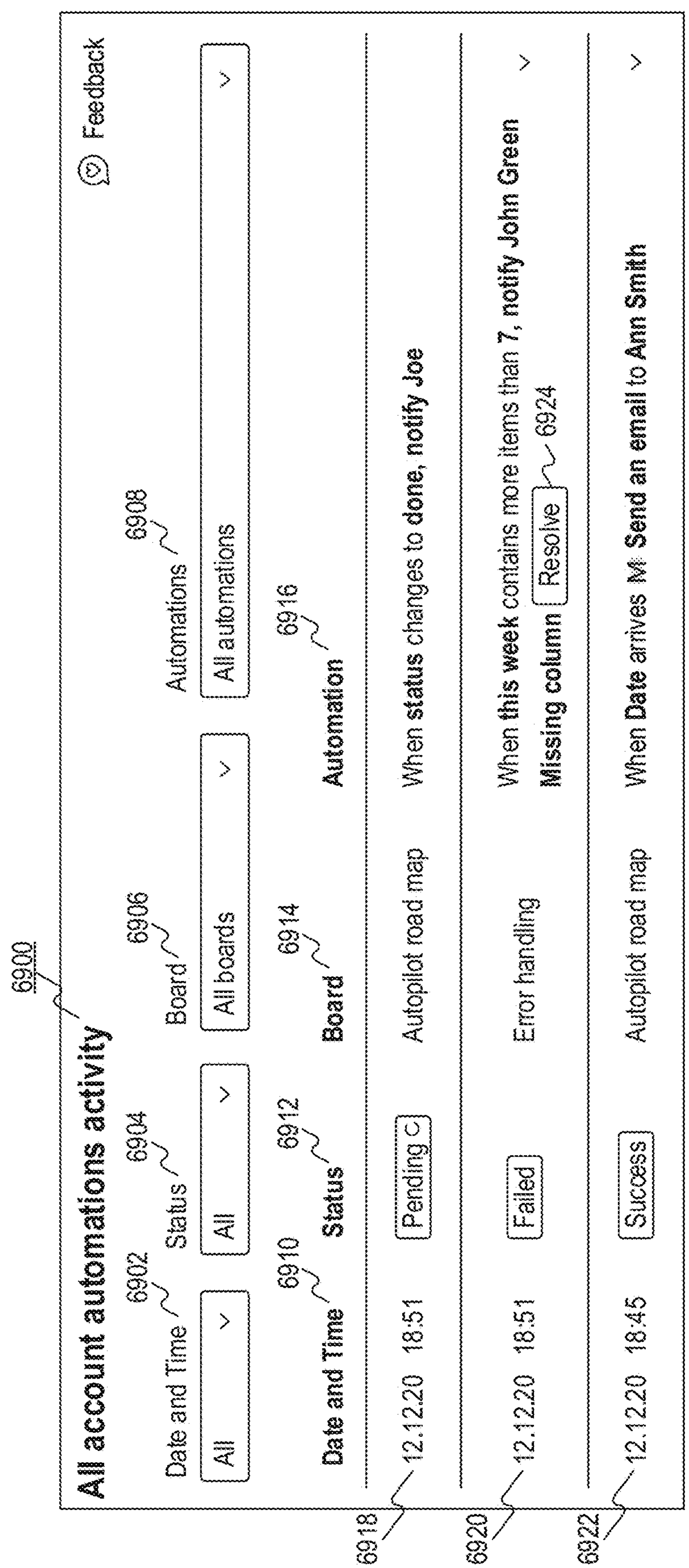
FIG. 69 is an exemplary representation of a collapsed account activity viewing interface of a system for troubleshooting faulty automations in tablature, consistent with some embodiments of the present disclosure.

In FIG. 69 for example, an automation under the automation heading 6916 may receive updates to change the variables, including the conditions (e.g., "When Date arrives" and "When status changes to done") and actions (e.g., "send an email to Ann Smith" and "notify Joe"). Each of the changes indicated by change entries 6918, 6920, and 6922 may include a time stamp under Date and Time heading 6910 to reflect when the change was made. Each of the change entries may reflect the changes that were made under the automation heading 6916 so that a user may follow each of the updates made to the automation in sequential order and determine which change may have caused an error in the normal operation of the automation. While FIG. 69 illustrates a filter for all changes made, a user may also filter the changes based on a date and time using the Date and Time filter 6902 to view the changes made in the last few minutes, last hour, last day, last week, last month, last year, or any other time period.

Some embodiments may involve receiving an indication of a type of irregularity occurring on the table. An irregularity may include any deviation from a normal operation of the table, such as timeout, overuse of computing resource or any other unusual activity within the automation as described earlier. An indication of the type of irregularity may be any visual cue, audio cue, or a combination thereof that alerts the system or the user that an irregularity has occurred on the table. For example, a visual cue may include a pop-up message, a presentation of a graphical symbol that indicates a warning, an animation such as a flashing indication, or any other indicator displayed on a client device. In such an event, the system may proceed with identifying a particular logical sentence structure likely to be associated with the irregularity and displaying the particular logical sentence structure. The particular logical sentence structure may refer to a particular automation that contains an irregularity. For example, in the event of timeout occurring while sending an email, the particular logical sentence structure causing the timeout may be in communication with an email server but might not be able to fully transmit the email due to an error such as an incorrect email address, the lack of an email address, or any other irregularity. Because of this irregularity, the system may display this particular automation consistent with the earlier disclosure. The display of the particular logical sentence structure may also include a display of a variable recently changed in the particular logical sentence structure consistent with earlier disclosure. For example, a user or entity may modify an automation to send an email to a new email address. In response to this modification, the system may display the new email address as the variable recently changed, so that the user may identify a recent change that may have caused an irregularity.

Similarly, as described earlier with relation to block 6812 in FIG. 68, presenting may include at least one logical sentence structure to appear on a display as also shown on the exemplary FIG. 69 through FIG. 72. FIG. 69 illustrates an exemplary representation of a collapsed account activity viewing interface 6900 of a system for troubleshooting faulty automations in tablature. View 6900 may be filtered by date and time 6902, status 6904, board 6906, or/and automations 6908. While not depicted, additional filters may be implemented. Date and time filter 6902 may enable a user to filter by a time stamp. Each automation may include individual time stamps for various steps included with the automations (as shown by the example provided with a reference to FIG. 70 and described later in the disclosure). Date and time filter 6902 may utilize any time stamp 6910 associated with the automations to filter appropriate rows within the table. Filtering may be enabled via a drop-down menu as depicted on the exemplary embodiment, or any other technique for interaction with a user interface. Similarly, status filter 6904 allows filtering of the view 6900 to only show rows with specific status 6912 or exclude certain statuses. For example, if a user troubleshooting the automation only would like to check on failed activities, the user may utilize view 6900 to view by a "failed" status and reconfigure those particular automations. As depicted, "Success" status 6922 corresponds to a configured automation that did not encounter any issues and performed as expected; "Pending" status 6918 corresponds to an automation currently processing that may be monitored by the user in a real-time; "Failed" Status 6920 corresponds to an automation that did not perform as expected and may display a reason for failure as depicted, and a button (or any other interactive element) 6924 to assist in resolving the issue. The "Failed" status may be an example of an indication of an irregularity. The system may also include mapping of different reasons for failures associated with automations and integrations. In some instances, the system may rate or score the severity of the failures, which may be included in a notification to a user or administrator to communicate the failure and/or to provide information needed to correct the failure. Likewise, filters such as board filter 6906 and automation filter 6908 enabled filtering by boards 6914 and automations 6916, respectively allowing a troubleshooter to fine tune the account automation activity as needed. The tool, for example, may provide administrative level information of the failures such as the date of the generation of the rule and any configuration edits to the automations. Further, the system may be configured to automatically or manually disable specific automations, in some instances, in response to the detection of a failure.

Figure 70:
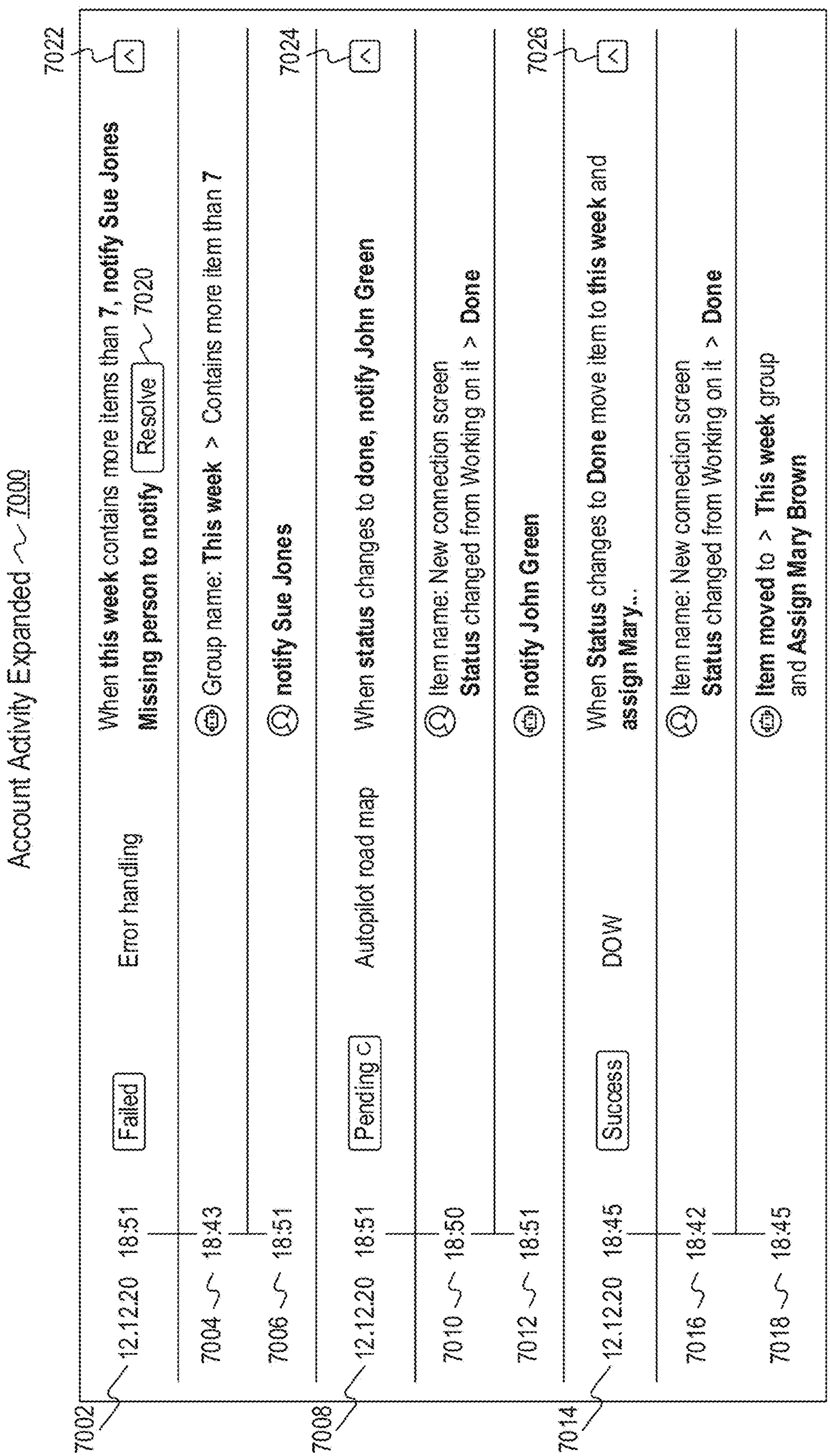
FIG. 70 is an exemplary representation of an expanded account activity viewing interface of a system for troubleshooting faulty automations in tablature, consistent with some embodiments of the present disclosure.

FIG. 70 illustrates an exemplary representation of an expanded account activity view interface 7000 of a system for troubleshooting faulty automations in tablature. Each log item depicted in the earlier described collapsed view 6900 may be expanded by the user/troubleshooter. Expansion may be performed by clicking on expand buttons 7022, 7024, and 7026 as depicted in FIG. 70, which is not limited to the depicted example and may be carried out by any other interactive user interface technique to achieve a similar result. Expanded view 7000 may provide additional information to the troubleshooter. For example, for each automation 7002, 7008, and 7014, each logical rule or step of the automation may be displayed with corresponding information about each element. Specifically with relation to exemplary representative automation 7002, the automation may be expanded by clicking on button 7022 to display logical rules 7004 and 7006, wherein logical rules may display additional information about the underlying process, such as irregularities, completed actions, a current status, and so on. Similarly, automations 7008 and 7014 may be expanded via buttons 7024 and 7026 respectively to show underlying logical rules 7010 and 7012 for automation 7008 and logical rules 7016 and 7018 for automation 7014 as depicted in FIG. 70.

Figure 71:
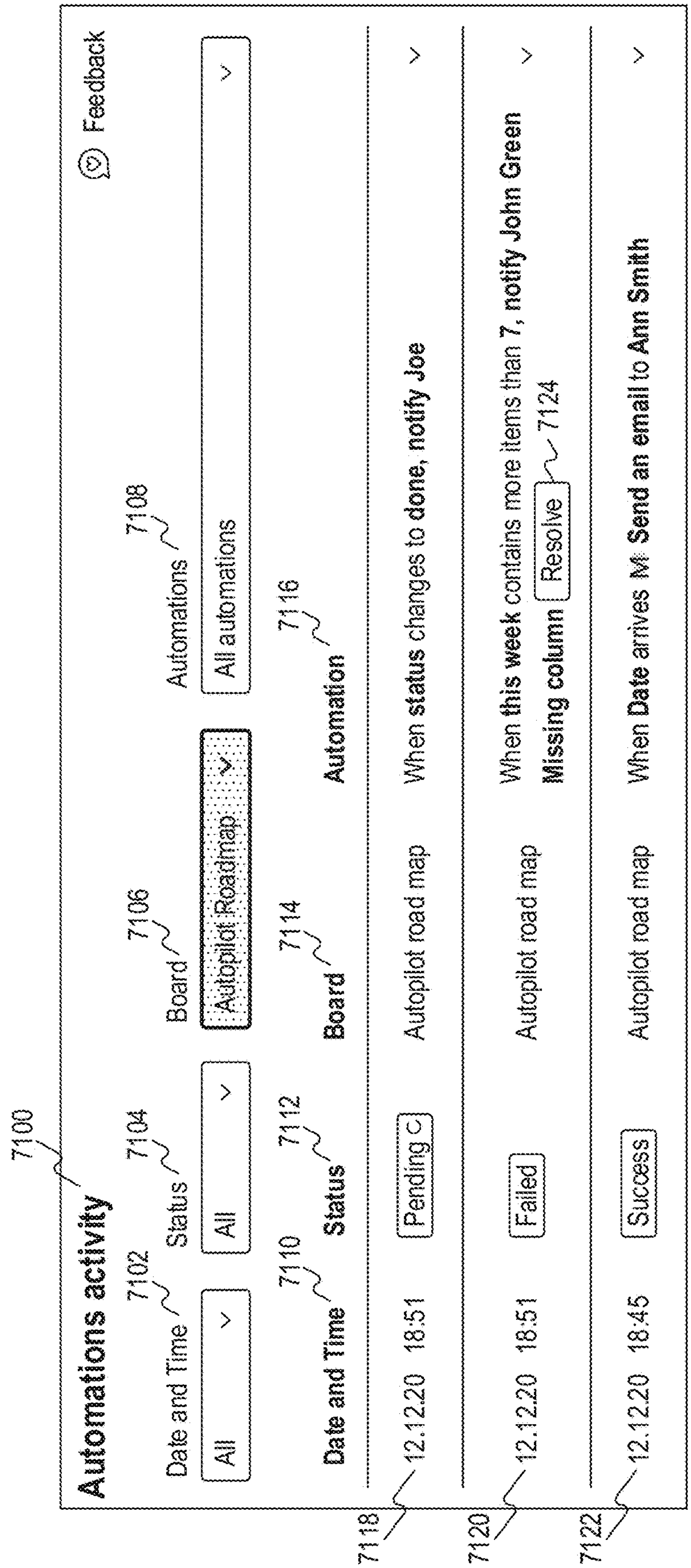
FIG. 71 is an exemplary representation of an automation activity interface of a system for troubleshooting faulty automations in tablature, consistent with some embodiments of the present disclosure.

FIG. 71 illustrates another exemplary representation of an automation activity interface 7100 of a system for troubleshooting faulty automations in tablature. Filters 7102, 7104, 7106, and 7108 are consistent with embodiments of the earlier disclosure. FIG. 71 depicts a selection of a board filter 7106. By making such a selection, as previously described, a troubleshooter may view a particular automation affecting a specific board within the environment. In FIG. 71, automations 7118, 7120, and 7122 are displayed regardless of the current status associated with each automation as they are enabled on the selected board. Additional information may be displayed in columns for date and time 7110, status 7112, board 7114, and automation 7116, consistent with the earlier disclosure. Button 7124 may be activated to resolve the exemplary failed automation 7120. Button 7124 may also be accompanied by a brief description of the occurred irregularity as shown for automation 7120.

Figure 72:
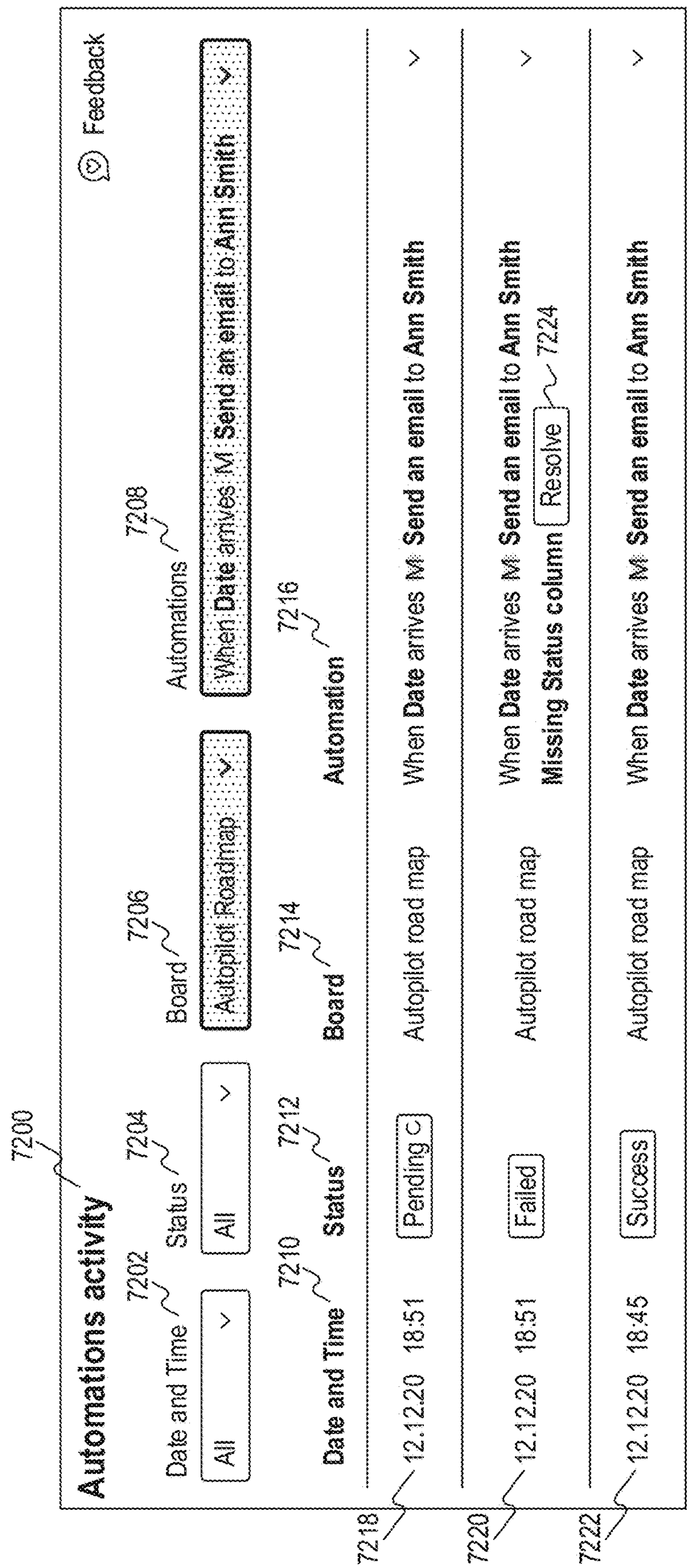
FIG. 72 is an exemplary representation of an automation activity interface with applied filters of a system for troubleshooting faulty automations in tablature, consistent with some embodiments of the present disclosure.

FIG. 72 illustrates an exemplary representation of an automation activity interface with applied filters 7200 of a system for troubleshooting faulty automations in tablature. Filters 7202, 7204, 7206, and 7208 are consistent with the earlier disclosure. Filters may be combined to allow for a finer level of filtering the information. FIG. 72 illustrates automations within a specific board filter 7206 and with a specific automation filter 7208. Illustrated examples of automations in FIG. 72 show varying statuses of "successful" 7222, "pending" 7218, and "failed" 7220 automations with a shared step of "send an email" as shown in automation column 7216. Additionally, the reasons for an improperly working automation (e.g., indicated by a "failed" status, a deleted column, an API rate limit, a revoked token or authorization, and/or any other circumstance that results in a dysfunctional automation) may be displayed and accompanied with a hyperlink 7224 to resolve the identified issue. This may be particularly useful to a troubleshooter trying to narrow down to a specific issue and resolve the specific issue directly. Additional information may be displayed in columns for Date and Time 7210, Status 7212, Board 7214, and Automation 7216, consistent with the earlier disclosure.

Figure 73:
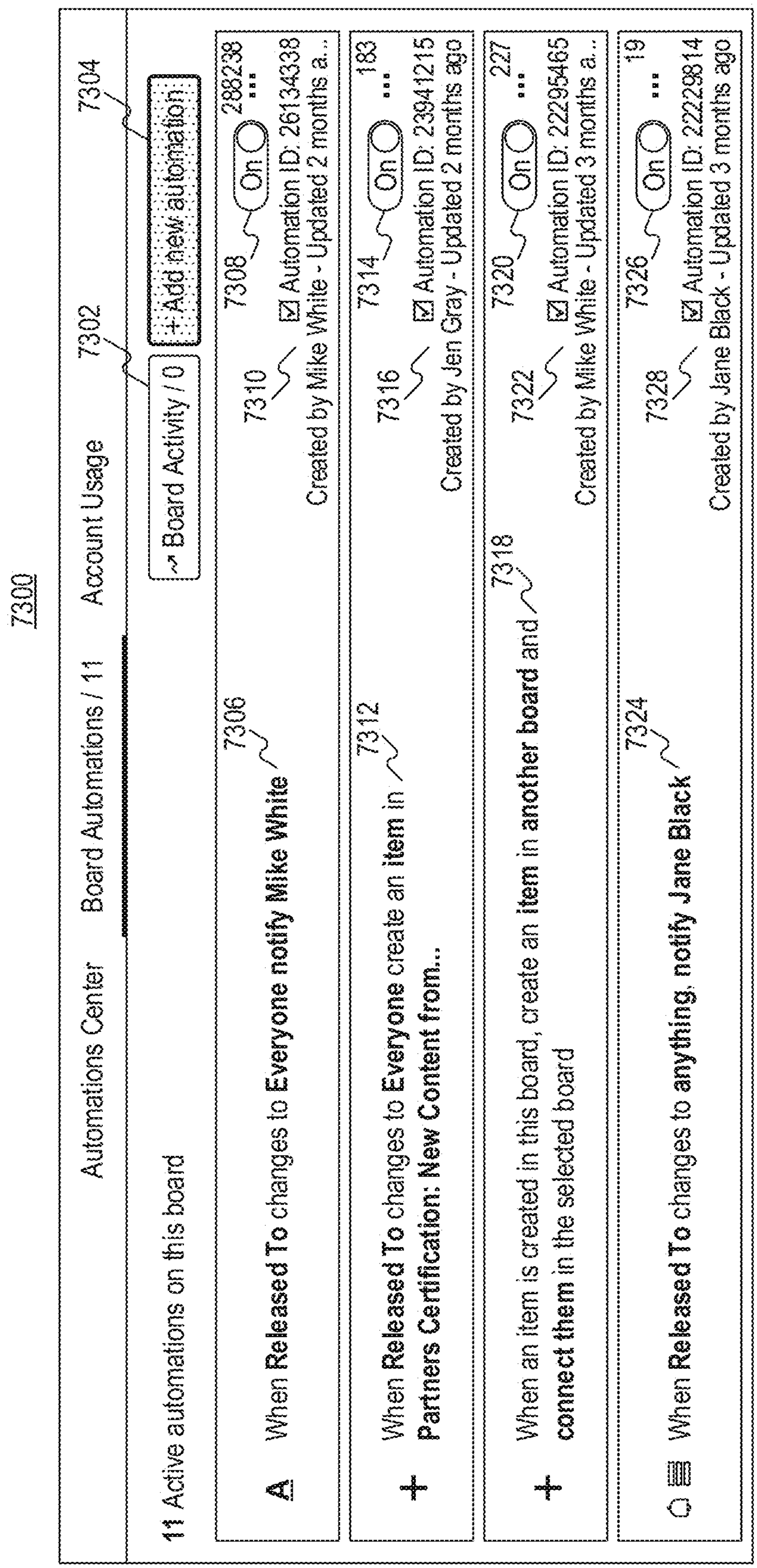
FIG. 73 is an exemplary representation of board automation view interface of a system for troubleshooting faulty automations in tablature, consistent with some embodiments of the present disclosure.

FIG. 73 illustrates another exemplary representation of a board automation view 7300 which may be an interface of a system for troubleshooting faulty automations in tablature. View 7300 is particular to a specific board and enables configuration of all automations within the selected board. A board activity log may be viewed in response to selecting a board activity button 7302. New automations may be added by a button 7304. Existing automations may be turned on/off, modified, or removed. Specifically, as shown on the exemplary representation in view 7300, modifications may be made via control mechanisms referenced at toggle buttons 7308, 7314, 7320, and 7326. View 7300 may also provide a troubleshooter with additional information such as the logical rule and variables associated with an automation 7306. Additional information 7306 may include an automation ID, creator ID, last modified date, or any other information related to the automation. Additional information 7306 may be used for targeted search of specific automation tasks within the system to improve troubleshooting of the affected automation. Specifically, as shown on the exemplary representation, additional information may be displayed under the control mechanisms as shown with controls 7310, 7316, 7322, 7328.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Consistent with some disclosed embodiments, systems, methods, and computer readable media for automatically filtering data in complex tables are disclosed. Using computerized systems and methods for automatically filtering data in complex tables provides several advantages over extant processes that rely on inefficient graphical user interfaces for filtering data. For example, users may find it desirable to filter data by interacting with the complex table directly, without having to interact with a separate interface having logical functionality for filtering data. By making such logical functionality available through interactions with cells or elements in the complex table, time may be saved and user experience may be enhanced. Additionally, the disclosed computerized systems and methods may display filtered data in a manner that is intuitive and consistent with the user's interactions, such as by indicating a number of data matching the filtering criteria or generating a summary display containing the matching data directly on the complex table. Accordingly, the systems and methods disclosed herein may provide filtered information in a real-time or near real-time fashion, allowing the user to gain access to desired information faster than with extant systems and methods. Further, the disclosed computerized systems and methods may provide a more flexible and intuitive filtering experience than with extant systems and methods.

The systems, methods, and computer readable media may include at least one processor, such as a CPU, FPGA, ASIC, or any other processing structure(s), as described above. The at least one processor may be configured to automatically filter data in complex tables. Filtering data may include any action of segregating or identifying a subset of data from a data set for viewing or analysis. Filtering data may include selecting any information, features, or characteristics associated with one or more cells in a complex table to include a subset of the complex table, such as specific status values, projects, countries, persons, teams, progresses, or a combination thereof. Filtering data may be performed automatically without input from a user, such as through a logical rule, logical combination rule, logical templates, or any processing instruction. "Automatically" in this context may include one or more of an action in real-time, in near real-time, at a predetermined interval, integrated in a customized template, in sync with a customized template, manually, or in any manner in which input from the user is reduced or with which at least some portion of the action occurs without user input.

A complex table may refer to any structure for presenting data in an organized manner, such as cells presented in horizontal rows and vertical columns (e.g., tables or tablatures as described herein), a tree data structure, a web chart, or any other structured representation. A cell may refer to a unit of information contained in the complex table defined by the structure of the complex table. For example, a cell may be defined as an intersection between a horizontal row with a vertical column in a complex table having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement.

In some aspects of the disclosure, the at least one processor may be configured to display multiple headings including a first heading and a second heading, consistent with disclosed embodiments. "Display" may include outputting information in order to cause a presentation of information, whether that presentation is visual, tactile, or any other provision of information. In the cause of at least one processor being configured to display, the processor may output signals that either directly or indirectly cause the presentation of information. For this purpose, any suitable device may be used to present the outputted information. A display may be associated with one or more mobile devices, desktops, laptops, tablets, LED panel, augmented reality (AR) presenter, virtual reality (VR) presenter, or a combination thereof. Displaying a heading may include generating alphanumeric data, a graphical indication of a heading, a combination thereof, or any other indication of the heading. A complex table may include one or more headings defining or associated with a data type, such as status, project, country, person, team, progress, or any other feature or characteristic that may be associated with one or more cells. In embodiments where the complex table includes horizontal rows and vertical columns, a heading may be associated with a row, a column, or both. A complex table may include any combination of column headings with differing column headings, multiple column headings with the same column heading, or a combination thereof according to a default or user preference. The complex table may be altered to add or remove columns and alter any column heading regardless of the column's type. In some embodiments, complex tables may include two columns of differing column types with common column headings or even two columns of the same column type with differing column headings according to user preference.

Figure 74:
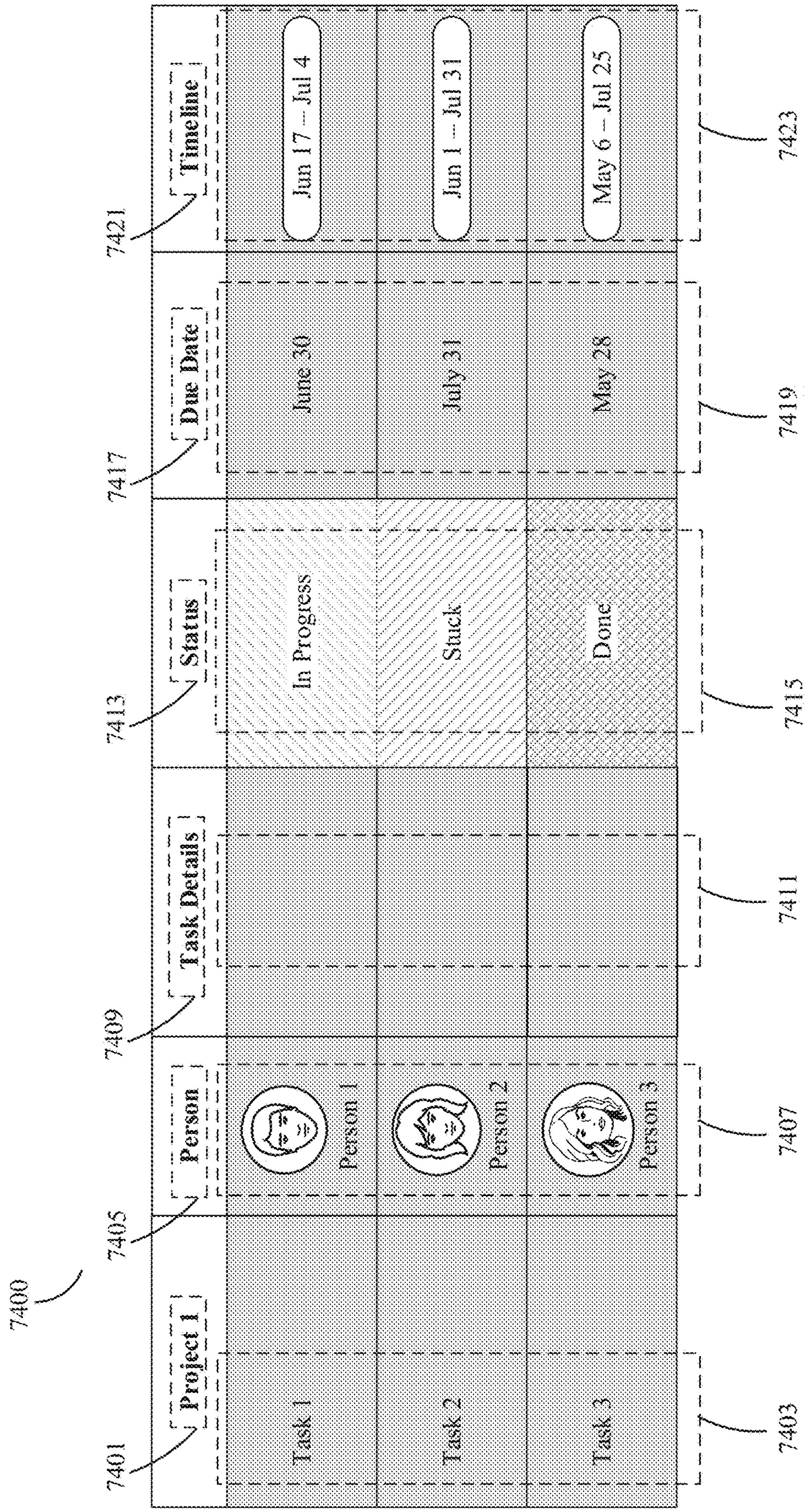
FIG. 74 illustrates an example of a complex table that includes multiple headings, consistent with some embodiments of the present disclosure.

For example, FIG. 74 illustrates an exemplary complex table 7400 that may include multiple columns and rows having headings, consistent with embodiments of the present disclosure. In some embodiments, the table 7400 and other information discussed in connection with other figures may be displayed using a computing device (e.g., computing device 100 illustrated in FIG. 1) or software running thereon. The presentation may occur via a display associated with computing device 100 or one or more of the user devices 220-1 to 220-*m* in FIG. 2. As shown in FIG. 74, the table 7400 may include a "Project" heading 7401 associated with a project (i.e., "Project 1") for display and may include, in the multiple rows and columns, cells corresponding to tasks (e.g., in rows including "Task 1," Task 2," or "Task 3" in column 7403). The table 7400 may also include a "Person" heading 7405 associated with cells corresponding to persons assigned to a task (e.g., column 7407), a "Task Details" heading 7409 associated with cells corresponding to additional information related to the task (e.g., column 7411), a "Status" heading 7413 associated with cells corresponding to the state of the task (e.g., column 7415), a "Due Date" heading 7417 associated with cells corresponding to a deadline of the task (e.g., column 7419) of the task, and a "Timeline" heading 7421 associated with cells corresponding with progress over time of the task (e.g., column 7423), or any information, characteristic, or associated entity of the project. The complex table 7400 may include any number of columns and may include multiple columns with the same column heading with the same column type, or may include multiple columns with the same column heading with a different column type. For example, complex table 7400 may be altered to change "Person" heading 7405 to include the text "Task Details" identical to "Task Details" heading 7409 despite the fact that person column 7407 is a different column type from task column 7411. It may be possible for a two columns of differing column types to have the same column heading and it may be possible for two columns of the same column type to have different column headings according to user preference.

Figure 75:
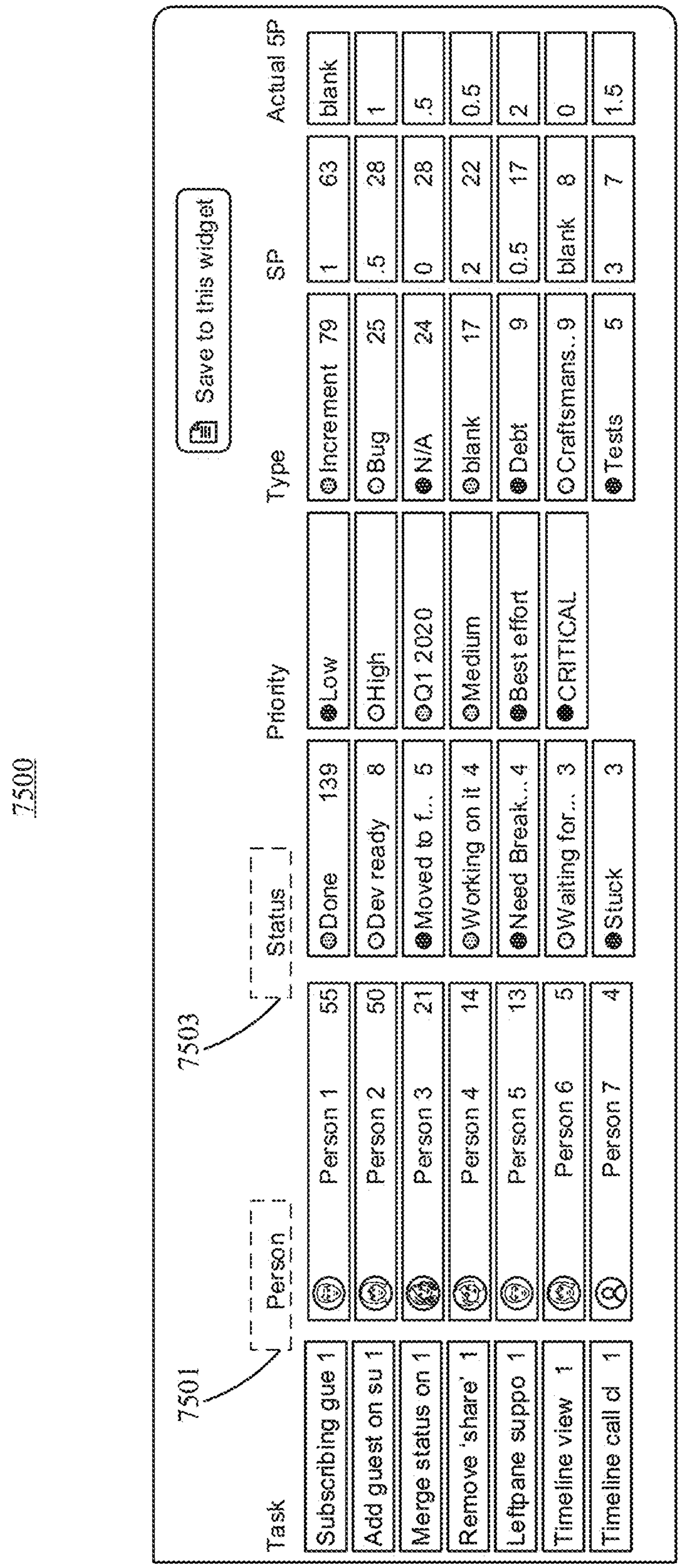
FIG. 75 illustrates another example of a complex table that includes multiple headings, consistent with some embodiments of the present disclosure.

FIG. 75 illustrates another exemplary complex table 7500 that may include a first heading and a second heading, consistent with disclosed embodiments. In FIG. 75, a first heading to be displayed may be heading 7501 ("Person") and a second heading to be displayed may be heading 7503 ("Status"). As shown on FIG. 75, headings may be represented as text, graphics, symbols, shapes, images, videos, or any other categorical representation.

Figure 76:
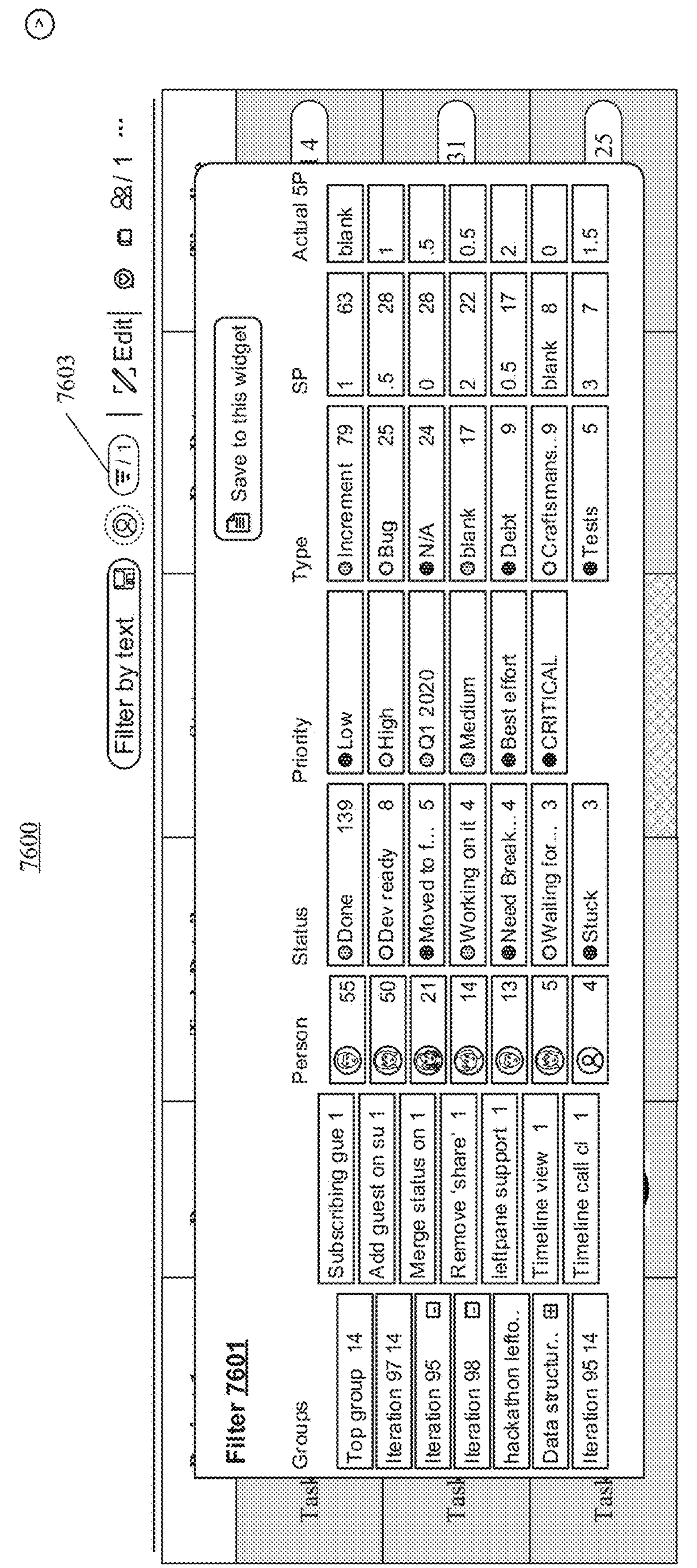
FIG. 76 illustrates an example of a filter for filtering data in a complex table, consistent with some embodiments of the present disclosure.

FIG. 76 illustrates an exemplary filter 7601 for updating complex table 7600, consistent with embodiments of the present disclosure. The complex table 7600 in FIG. 76 may include an interactive element 7603 (e.g., a button). The interactive element 7603 may include a link to every cell containing information associated with or contain a shared characteristic with the interactive element 7603. By selecting the interactive element 7603, as illustrated in FIG. 76, the at least one processor may cause to display an interactive element (e.g., a floating GUI element overlaying the complex table 7600) showing the filter 7601. The filter 7601 may include multiple buttons (or any other interactive elements), each button representing a feature or a characteristic (e.g., specific cell values) in the complex table 7600. By selecting one or more of the buttons, the filter 7601 may activate or select the features or characteristics associated or linked with the selected buttons for generating filtered information. For example, by selecting "CRITICAL" in the "Priority" column of the filter 7601, the at least one processor may update the complex table 7600 to display only information of tasks having the status "CRITICAL" as shown in FIG. 77.

Figure 77:
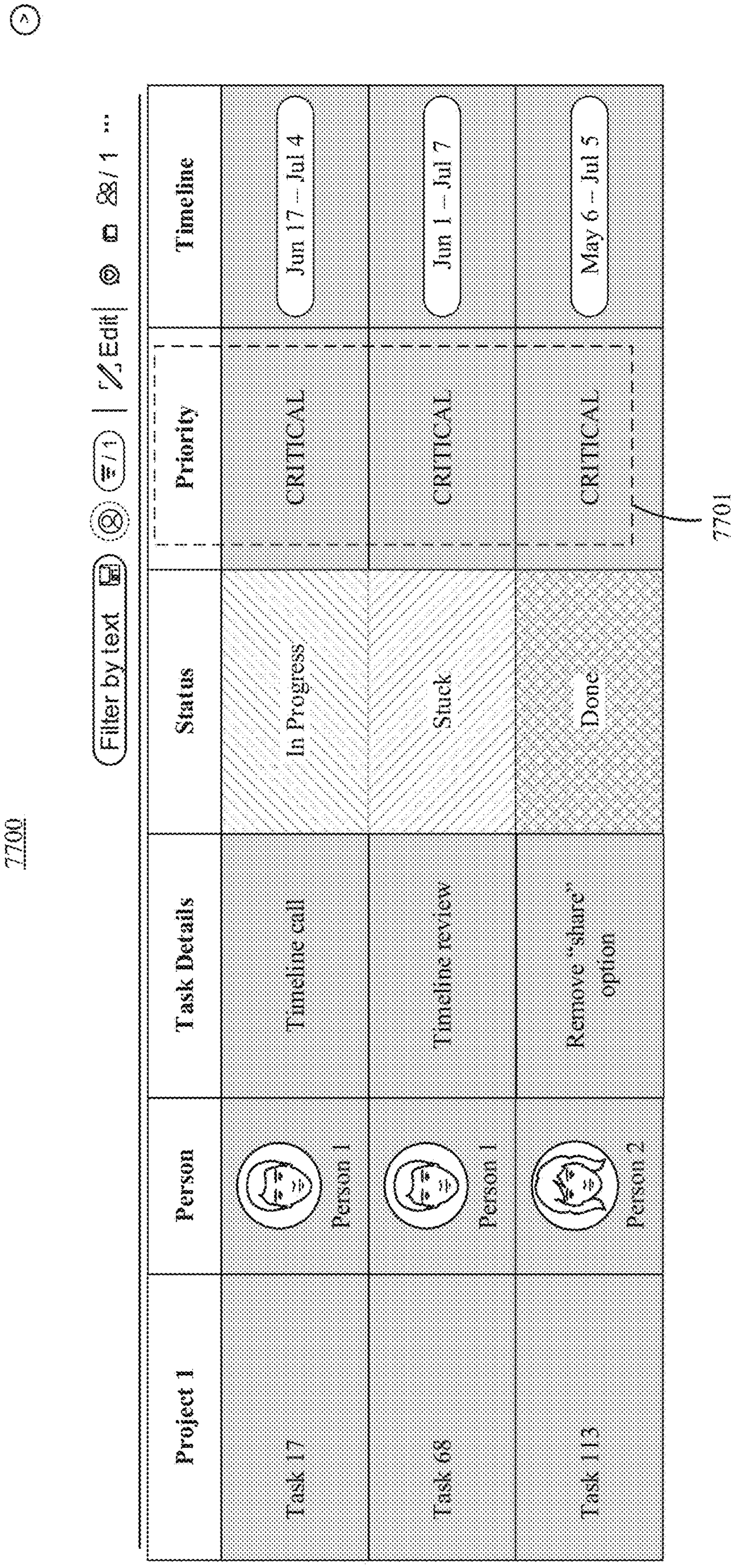
FIG. 77 illustrates an example of a filtered complex table, consistent with some embodiments of the present disclosure.

FIG. 77 illustrates an example of filtered complex table 7700, consistent with embodiments of the present disclosure. For example, the filtered complex table 7700 may be the complex table 7600 after applying the filter 7601 (e.g., by clicking one or more buttons therein) as illustrated and described in association with FIG. 76. As shown in FIG. 77, the filtered complex table 7700 includes only those tasks where the priority status is "CRITICAL" as illustrated in the "Priority" column 7701.

Figure 78:
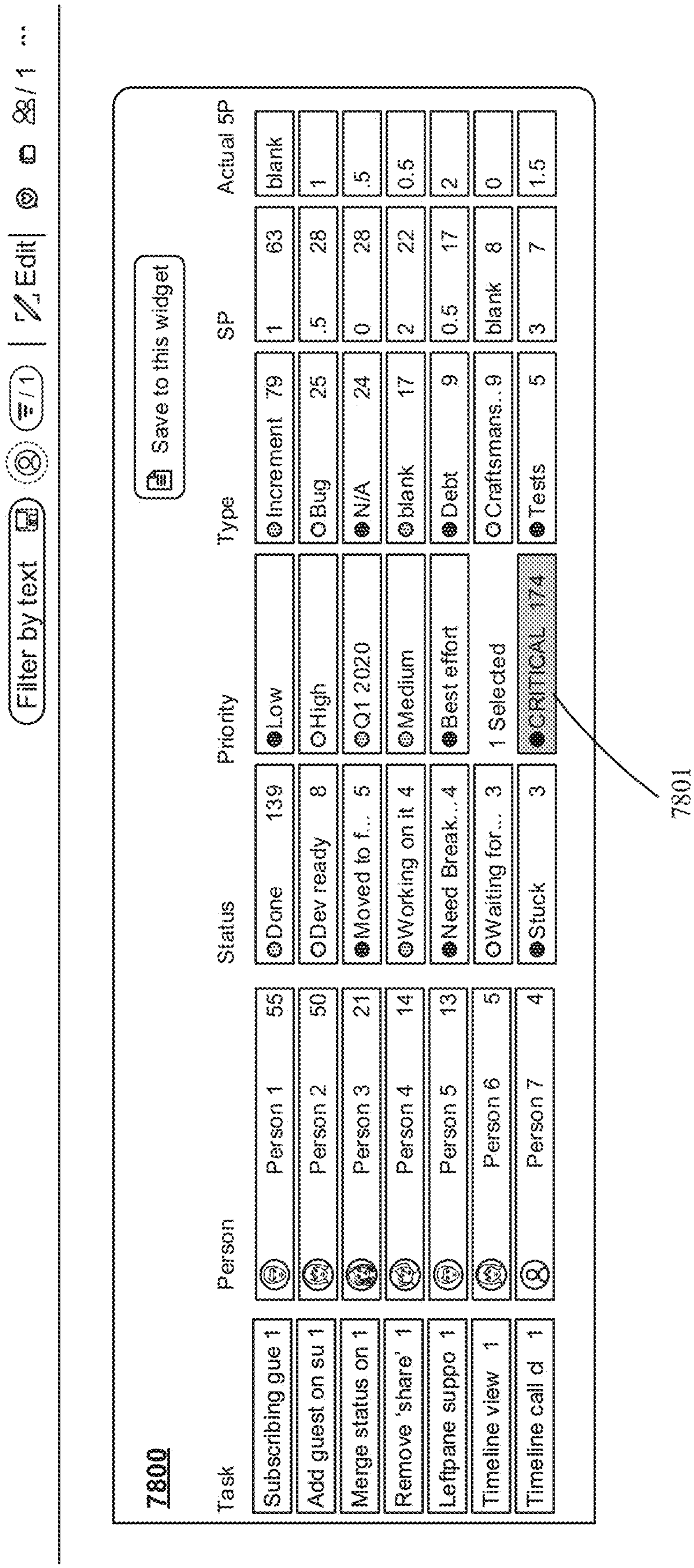
FIG. 78 illustrates another example of a filtered complex table, consistent with some embodiments of the present disclosure.

FIG. 78 illustrates another exemplary filtered complex table 7800, consistent with embodiments of the present disclosure. For example, the filtered complex table 7800 may be the complex table 7500 after applying a filter generated by selecting one or more buttons therein, such as "CRITICAL" button 7801. As shown, as a result of selecting the "CRITICAL" button 7801, the button may contain a number (e.g., "174") indicating the number of cells matching the filtering criteria. In FIG. 78, the number "174" indicates the number of cells with the status "CRITICAL" in the complex table 7800. As can be appreciated from comparing FIG. 77 with FIG. 78, filtering operations may be received from a filter separate from the complex table (as in FIG. 77) or from the complex table itself (as in FIG. 78).

The at least one processor may be configured to receive a first selection of a first cell associated with a first heading, wherein the first cell includes a first category indicator, consistent with disclosed embodiments. A selection may include any user action, such as a mouse click, a cursor hover, a mouseover, a button press, a keyboard input, a voice command, an interaction performed in virtual or augmented reality, or any other action by a user received via the at least one processor. In embodiments where the complex table includes horizontal rows and vertical columns, the first cell may be part of a first column containing a first heading. (As used herein, designations such as first, second, third, etc. do not necessarily refer to a position, but are rather used to distinguish one from another.) The first cell may be any cell associated with the complex table associated with a corresponding category indicator (e.g., a heading).

Each cell may include a category indicator for representing a feature, characteristic, or information associated with the cell (e.g., a status, a date, or any other data associated with the cell). The category indicator may be any depiction suitable for the cell, including one or more pictures, alphanumeric characters, avatars, videos, VR or AR object, graph, metadata, or any combination thereof. For example, in embodiments where a cell is associated with a heading corresponding to persons in a project, the cell may include a graphical representation of the person associated with the cell such as a picture, avatar, name initials, or any other representation of the person. It is to be understood that any kind of category indicator may be used depending on the cell and information contained therein, and the disclosed embodiments are therefore not limited to any specific type of category indicator.

Figure 79:
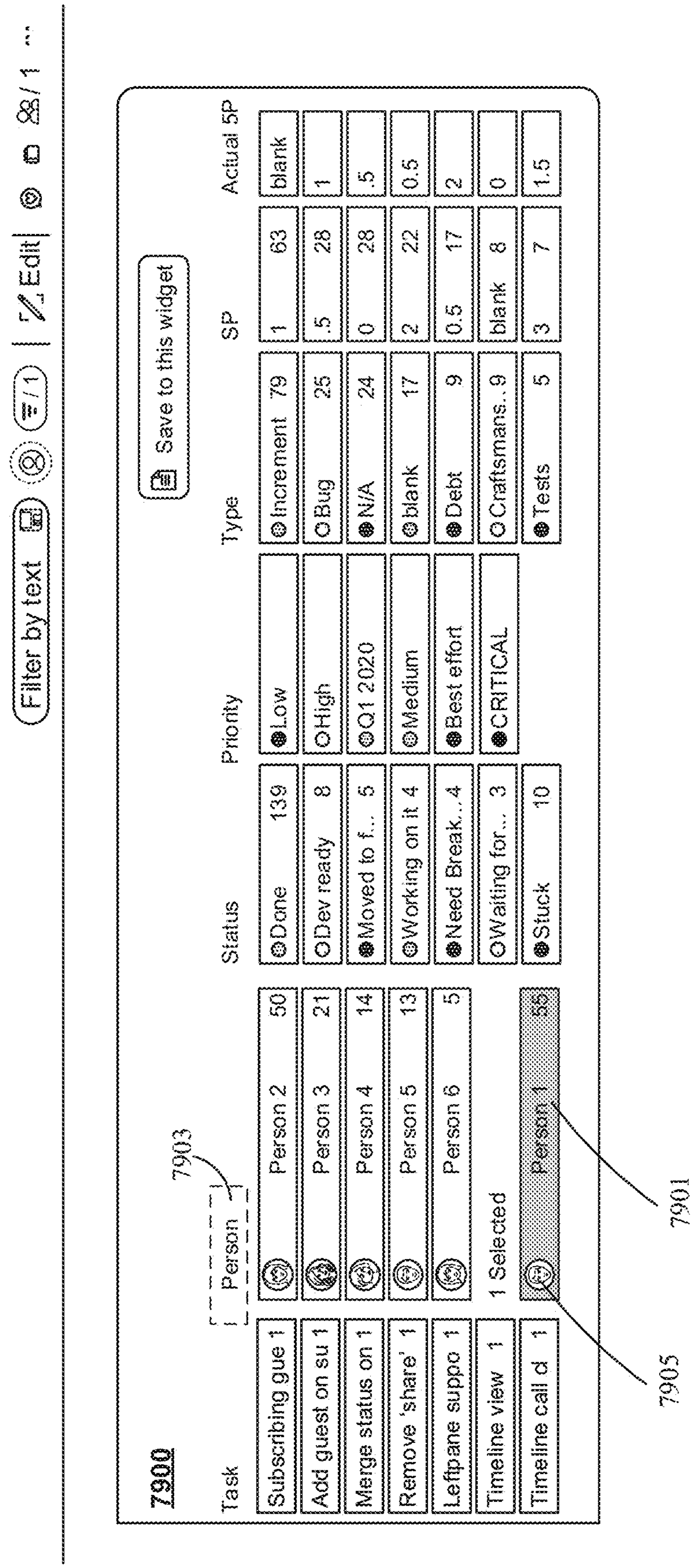
FIG. 79 illustrates an example of a first selection of a first cell associated with a first heading, consistent with some embodiments of the present disclosure.

For example, in FIG. 75 each cell associated with the "Person" heading 7501 includes a picture of the associated person and text (e.g., "Person 1") represented by each cell. Although a picture and text are used in this example, any other category indicator may be used to represent a person, such as a color indicator, a graphical icon, a sound, or any other visual or audio indicator. FIG. 79 illustrates an exemplary complex table 7900 where a first selection has been received, consistent with disclosed embodiments. In FIG. 79, a first cell 7901 ("Person 1") associated with first heading 7903 ("Person") is selected, for example, by clicking on first cell 7901. As shown in FIG. 79, first cell 7901 may include a first category indicator 7905 illustrated as a graphical indicator and text "Person 1."

The at least one processor may also be configured to receive a second selection of a second cell associated with the first heading, wherein the first cell includes a second category indicator, consistent with disclosed embodiments.

In embodiments where the complex table includes horizontal rows and vertical columns, the second cell may be part of a first column containing a first heading. The second cell may be a different cell from the first cell of the first column. In other embodiments, the second cell may be any cell associated with the complex table in a second column and it may be not limited to any particular column until a selection is made for the second cell.

Figure 80:
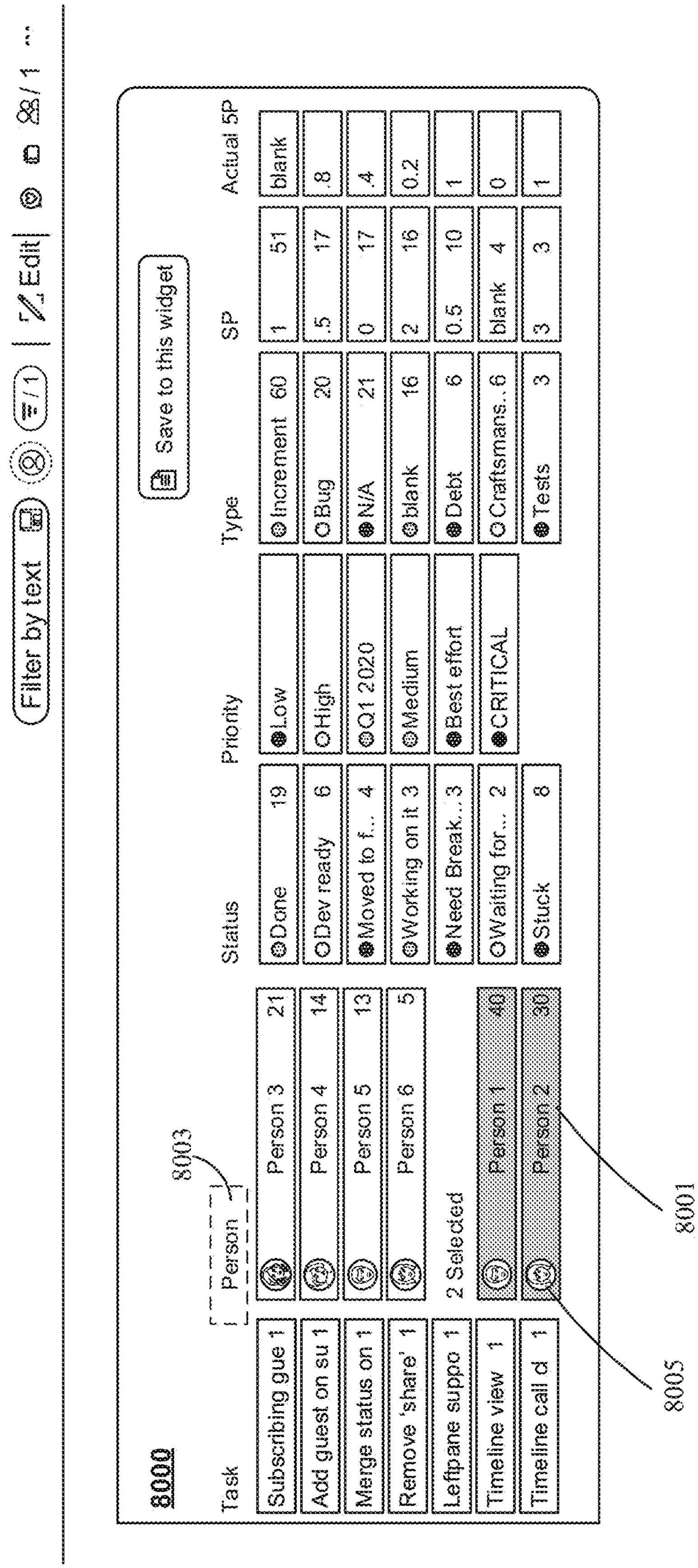
FIG. 80 illustrates an example of a second selection of a second cell associated with a first heading, consistent with some embodiments of the present disclosure.

For example, FIG. 80 illustrates an exemplary complex table 8000 where a second selection has been received, consistent with disclosed embodiments. In FIG. 80, a second cell 8001 ("Person 2") associated with first heading 8003 ("Person") is selected, for example, by selecting second cell 8001. As shown in FIG. 80, second cell 8001 may include a second category indicator 8005 illustrated as a graphical indicator and text "Person 2." Consistent with some embodiments of the disclosure, the second category indicator may also be presented graphically (e.g., shapes, colors, images), textually (e.g., words), or a combination thereof.

The at least one processor may be configured to receive a third selection of a third cell associated with the second heading, wherein the third cell includes a third category indicator, consistent with disclosed embodiments. In embodiments where the complex table includes horizontal rows and vertical columns, the third cell may be part of a second column containing a second heading. The second column may be any other column associated with the complex table that is different from the first column.

Figure 81:
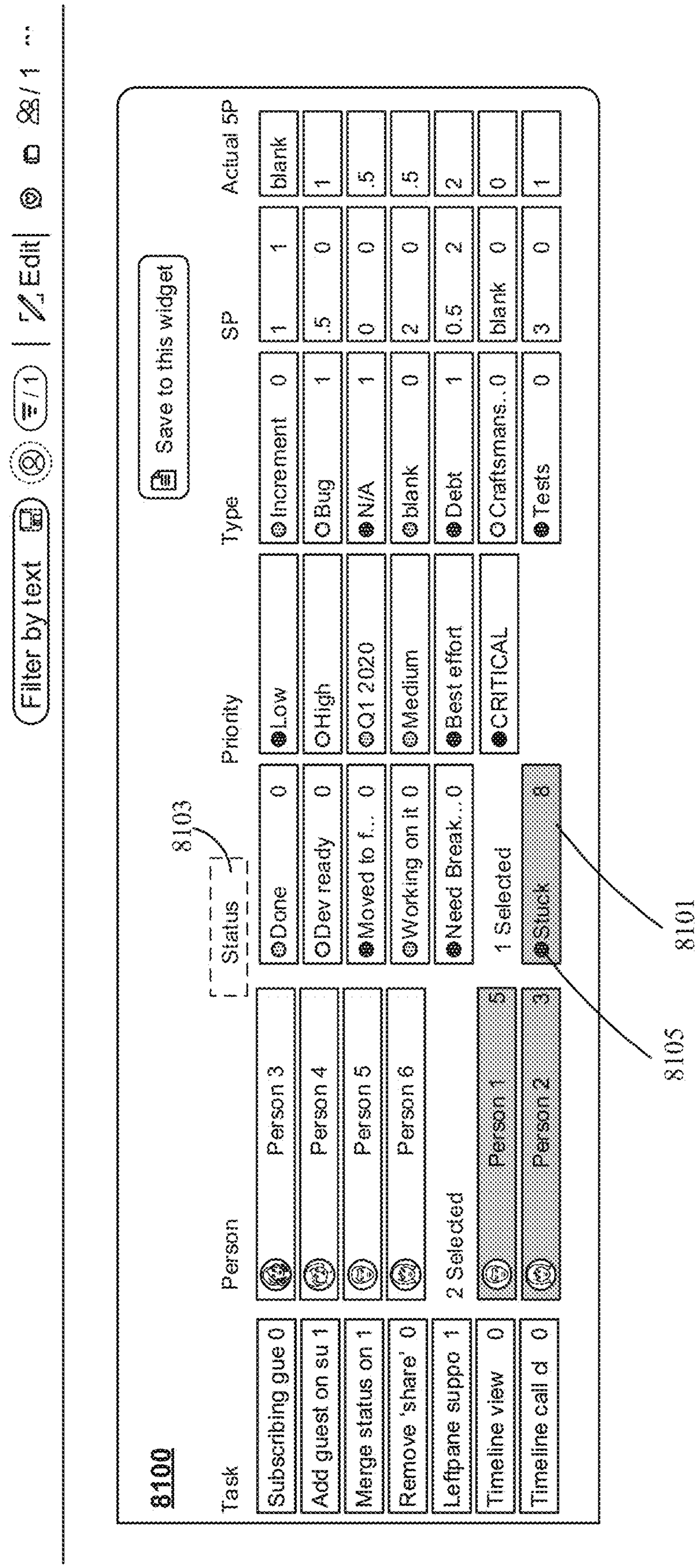
FIG. 81 illustrates an example of a third selection of a third cell associated with a second heading, consistent with some embodiments of the present disclosure.

For example, FIG. 81 illustrates an exemplary complex table 8100 where a third selection has been received, consistent with disclosed embodiments. In FIG. 81, a third cell 8101 with a third category indicator (e.g., "stuck") associated with second heading 8103 ("Status") is selected, for example, by clicking on the third cell 8101. As shown in FIG. 81, third cell 8101 may include a third category indicator 8105 illustrated as a colored circle (e.g., a red circle) and text "Stuck." Consistent with some embodiments of the disclosure, the third category indicator may also be presented graphically (e.g., shapes, colors, images), textually (e.g., words), or a combination thereof.

The at least one processor may be configured to generate a real time indicator of a number of received selections, consistent with disclosed embodiments. A real time indicator in this context indicates any representation of the number of received selection, including one or more pictures, alphanumeric characters, avatars, videos, VR or AR object, graph, or any combination thereof, which is generated in real-time, in near real-time, at a predetermined interval, integrated in a customized template, in sync with a customized template, manually, or in any manner in which the indicator is generated in quick succession following the selection. A number of received selections may include any indication of category indicators that have been chosen by a user for generating a subset of data from the complex table.

For example, in FIG. 79, an indicator ("1 Selected") is shown above a first cell 7901 ("Person 1") that has been selected, representing the number of received selections of persons in the column associated with "Person" heading 7903. In this case, because one person (e.g., a category indicator) has been selected, the number of received selections is "1." This indication for the number of received selections may be presented in any format such as graphical format, alphanumeric format, or a combination thereof. For example, the indicator for the number of received selections may be presented numerically, graphically, or symbolically (such as in the form of a representation of an inanimate or animate object or set of objects), or via any other combination of graphics and alphanumerics.

Similarly, in FIG. 80, an indicator ("2 Selected") is shown above the first cell ("Person 1") and second cell 8005 ("Person 2"). In this example, because two persons (e.g., two category indicators) have been selected, the number of received selections is updated to "2." Where the category indicator is presented in a different format, the category indicator may be updated in any way to indicate an update to the number of received selections. For example, where the number of selections is represented by a depiction of an animal, there may appear a second depiction of another animal to represent the new selection. In a similar example where a depiction of an animal represents a single selection, in response to the system receiving a second selection, the depiction of the animal may increase in size to indicate that an additional selection has been made.

The at least one processor may be configured to generate a logical filter for the complex table, consistent with disclosed embodiments. A logical filter may include one or more operations for linking selected information, features, or characteristics associated with one or more cells in the complex table to thereby generate a subset of data from the complex table. Linking operations may include associating together all of the underlying information (e.g., in cells) in the complex table that meet the selected information, features or characteristics. The logical filter may be generated as one or more instructions, signals, logic tables, or any form suitable for performing functions in conjunction with the one or more linking operations. In some embodiments, a logical filter may include an "OR" operator for filtering data in such a way that resulting data may contain the information, feature, or characteristic associated with any of the filters to which the operator applies in an inclusive manner. For example, when a logical filter segregates tasks associated with a project based on a first person and a second person, the resulting tasks after the OR operator may be associated with either the first person or the second person. In some embodiments, a logical filter may include an "AND" operator for filtering data to contain the information, feature, or characteristic associated only with all of the filter conditions applied. Continuing the example above, the resulting tasks after the AND operator may be associated with both the first person and the second person, and not with tasks failing to meet the filter conditions that both the first person and the second person are associated with a task. In some embodiments, the at least one processor may be further configured to regenerate the logical filter in response to an input to provide additional filter options. Regenerating the logical filter may include a re-rendering of an interface associated with the logical filter. Regenerating the logical filter may include presenting altered filter options (e.g., addition, removal, rearrangement, or any other modification to filter options) or additional filter options that may enable a user to specify in more detail the information they may wish to filter. The regeneration may occur in response to an input received by the system from any interface (e.g., mouse, keyboard, touchscreen, and so on) to indicate an intent to regenerate the logical filter. For example, a user may provide an input (e.g., selecting a button such as "advanced filter") to regenerate the logical filter to present more granular filtering options that may not have been previously available on the original logical filter. As a result of the regeneration, a user may be presented with additional filter options such as options to directly alter inclusion of "AND" and "OR" logical connectors and selecting information from varying boards containing information.

The at least one processor may be configured to join with an "or" the first selection and the second selection associated with the first heading, the first selection and the second selection constituting a first group. "Joining" may refer to any manipulation of two or more values or variables using operations associated with the logical filter. For example, a bitwise operation may be used to implement an AND or an OR operation between two or more filters. It is to be understood, however, that any suitable method of manipulating data may be used in conjunction with disclosed embodiments, including but not limited to automated scripts, truth tables, manual operations, a combination thereof, or any other technique for handling or processing data. When a first selection and second selection are made under a common first heading, the first and second selection may be joined with an "or," which may result in selecting any task that may be associate with the first selection, the second selection, or a combination of both selections in an inclusive manner.

For example, FIG. 80 shows an exemplary logical filter (which may be presented as a table) with a first selection (e.g., "Person 1") and a second selection (e.g., "Person 2") that both are under a common heading (e.g., "Person" heading and column). As a result of the first and second selection, the logical filter may select all tasks of the underlying complex table (not shown) associated with "Person 1" or "Person 2" in an inclusive manner.

Figure 82:
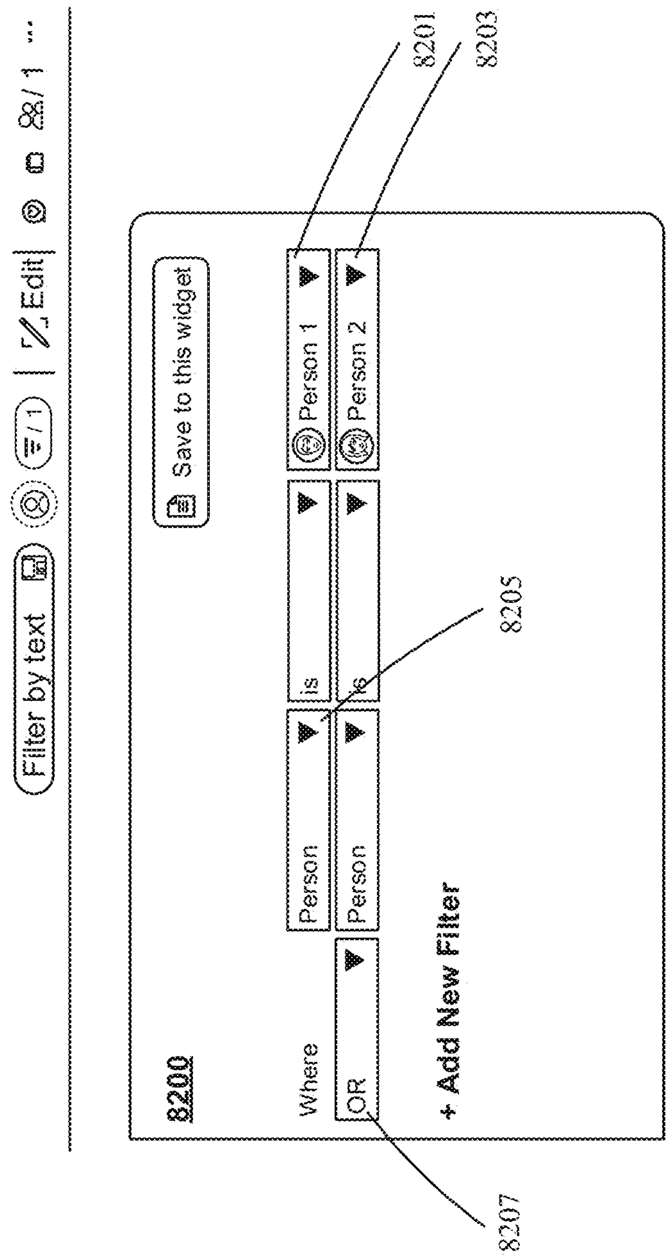
FIG. 82 illustrates an example of an operation for joining with an "or" two or more selections, consistent with some embodiments of the present disclosure.

In another example, FIG. 82 is an exemplary logical filter 8200 (which may be presented as a table) illustrating another embodiment of joining with an "or" the first selection and the second selection associated with the first heading. The joining may be a result of the selection of first cell or category indicator 8201 ("Person 1") and second cell or category indicator 8203 ("Person 2") associated with first heading 8205 ("Person"). As shown, the first selection and the second selections are joined with "OR" operator 8207. As a result of the operation, tasks associated with either Person 1 or Person 2 may be outputted (not shown).

The at least one processor may be configured to join with an "and" the third selection and the first group. Based on this operation, the information, features, or characteristics resulting from the operations may result in those items (or tasks) associated with the first group that includes either the first selection or the second selection, but only for those items associated with the third selection, consistent with the description above. In this manner, the user may perform intuitive and straightforward operations when filtering through desired information present in the complex table.

FIG. 81 shows another example of a logical filter (which may be presented as a table) with a first group containing a first selection ("Person 1") and a second selection ("Person 2") and a third selection ("Stuck"). Because the first selection and the second selection are under a common heading, the selections are joined with an "or." However, because the third selection is made from a differing heading from the first group, the third selection is joined with the first group with an "and." In this manner, only items or tasks from the underlying complex table associated with the first group (e.g., the first and second selections) and the third selection are selected or filtered for further presentation or action.

Figure 83:
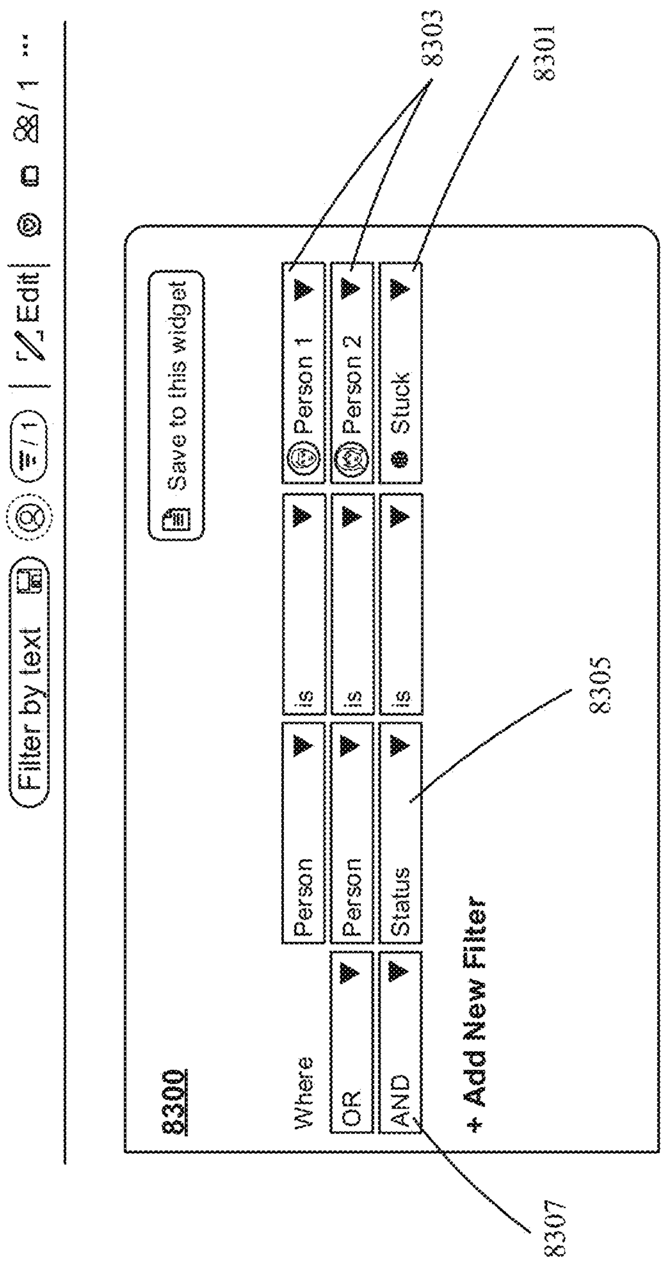
FIG. 83 illustrates an example of an operation for joining with an "and" two or more selections, consistent with some embodiments of the present disclosure.

FIG. 83 shows another example of a logical filter 8300 (which may be presented as a table) illustrating joinder with an "and" of the third selection and the first group including the first selection and the second selection. The joinder may be a result of the selection of third cell 8301 ("Stuck") associated with second heading 8307 ("Status") following, for example, selection of first group 8303 ("Person 1" and "Person 2") as explained above in connection with FIG. 82. As shown in FIG. 83, the third selection and the first group are joined with AND operator 8307. As a result of the operation, tasks associated wither either Person 1 or Person 2 where the status of the project is "Stuck" may be outputted (not shown).

The at least one processor may be configured to apply the logical filter to the complex table, consistent with disclosed embodiments. The logical filter may be applied through the performance of processing of data in the table. The processing may involve one or more functions employed on one or more cells, values, variables, or any other information associated with the complex table. In this manner, the data in the complex table may be filtered by a specified operation (e.g., OR or AND).

The at least one processor may be configured to apply the logical filter in real time to each selection. Consistent with the definition above, in "real time" in this context may occur in real-time, in near real-time, at a predetermined interval, integrated in a customized template, in sync with a customized template, manually, or in any manner in which a logical filter is applied in quick succession following the selection. Applying the logical filter may include linking the selections made to the underlying complex table for further action or presentation. Linking the selections made may include associating together all of the underlying information (e.g., items or tasks) in the complex table that meet the conditions of the logical filter. For example, associating all of the underlying items or tasks in the complex table together may include generating a collection of those items and tasks as a new group so that those items and tasks that meet the logical filter do not have to be individually selected in the complex table for further action.

The at least one processor may be configured to cause the logical filter to be saved in memory for later application. The logical filter may be stored in a local memory on a user device, in a local network, and/or one or more remote servers. The memory may include any mechanism capable of storing information, such as a hard drive, an optical drive, or a flash memory, as described above. The at least one processor may cause the logical filter to be saved automatically or as a result of a user instruction. For example, a user may select on an interactive element (e.g., a button labeled "Save this widget"), causing the at least one processor to save the logical filter as part of information associated with the complex table. In this manner, data contained in the complex table may be filtered with the desired logical filter(s) when the data is displayed, thereby saving time and leading to a more enjoyable user experience. Further, the logical filter may be accessed and used by any secondary user who has permission to access the logical filter in the memory.

The at least one processor may be configured to cause the logical filter to be saved in a repository for application to a summary view of the complex table. A repository may include a database to manage digital content, such as databases to add, edit, delete, search, access, import, export, or manage content. Using the repository, the logical filter may be applied to a summary view of the complex table. A summary view may include a presentation of information that presents representative characteristics or features of a group of cells but not all of their details. For example, the summary view may include any combination of a list, a chart (e.g., a bar chart, a pie chart, or a line chart), a symbol, a picture, a number, a timeline, a word cloud, a calendar, a report, an information feed, an animation, or any other representation of representative characteristics or features.

Figure 84:
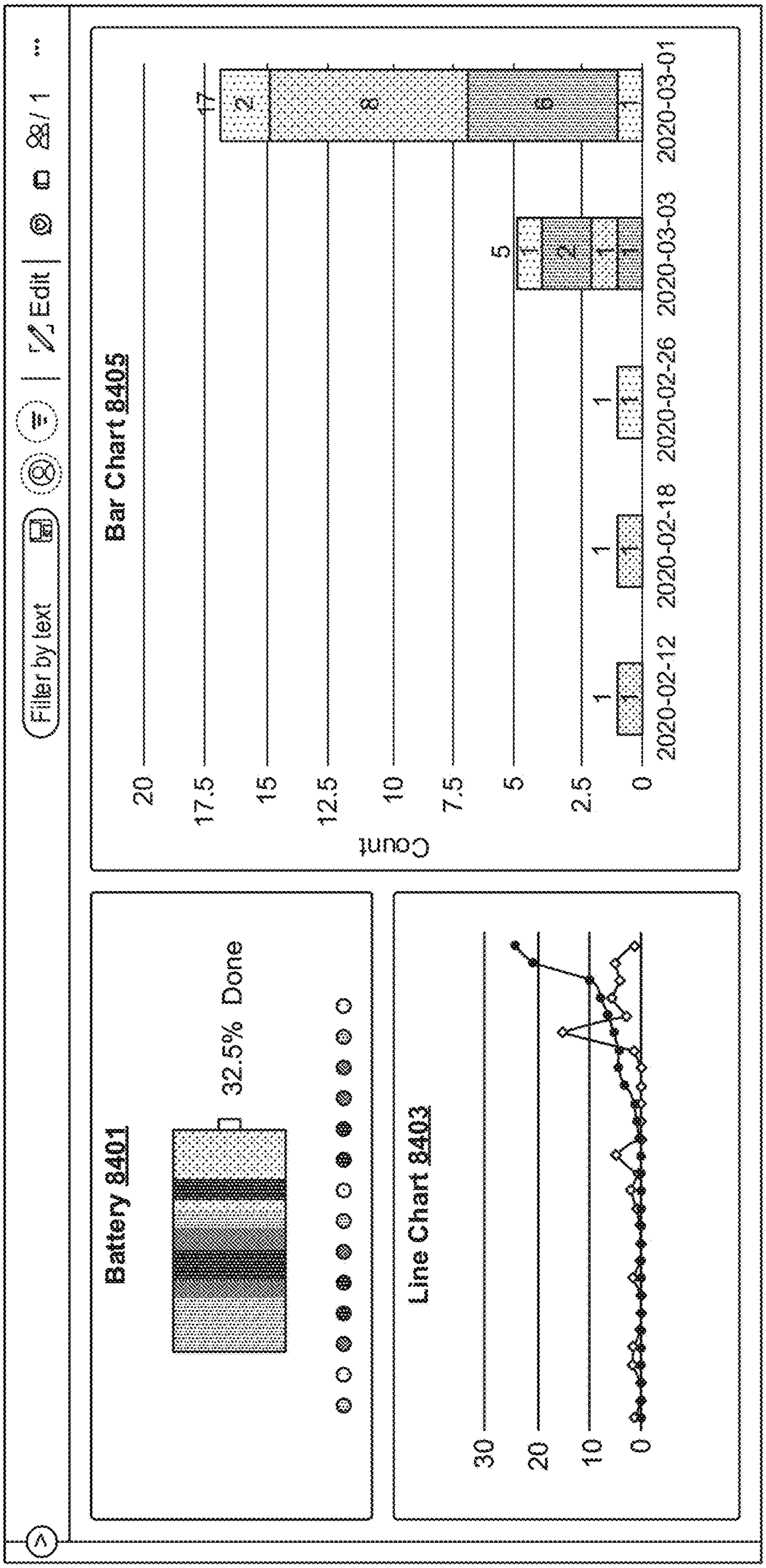
FIG. 84 illustrates an example of a summary view, consistent with some embodiments of the present disclosure.

By way of example, FIG. 84 illustrates an example of summary view 8400 of a complex table, consistent with embodiments of the present disclosure. The presentation may occur via a display associated with computing device 100 or one or more of the user devices 220-1 to **220-*m* in FIG. 2. By way of example only, summary view 8400 may include a depiction of a battery 8401 that represents overall progress information of a complex table (not shown in FIG. 84), a line chart 8403 that represents information of planned progress versus actual progress extracted from the complex table, and a bar chart 8405** that represents information of status by week extracted from the complex table.

The depiction of a battery 8401 shows a battery-shape representation that consolidates all of the statuses of the tasks included in the complex table, such as "done," "in progress," "stuck," "waiting," "delayed," or any other status value in the complex table. As illustrated in this example, the depiction of a battery 8401 includes the text "32.5% done" reflecting that 32.5% of the tasks associated with the statuses are "Done." That is, of all the tasks included in the complex table, 32.5% are completed. This text may be a default or may be configured to present the percentage makeup or any of the status values in the complex table.

The exemplary line chart 8403 shows two lines, a line of black dots and a line of circle dots. Each black dot of the line of black dots may represent a planned progress of a task included in the complex table, and each circle dot of the line of circle dots may represent an actual progress of a task included in the complex table. The line chart may be a default or may be configured according to user preference.

The exemplary bar chart 8405 shows five bars, each bar including one or more statuses associated with a single week (e.g., the week of "2020-02-12," the week of "2020-02-18," and so on). That is, each bar may represent all of the statuses updated or changed within one week for their associated tasks. The bar chart may be a default or may be configured according to user preference.

Figure 85:
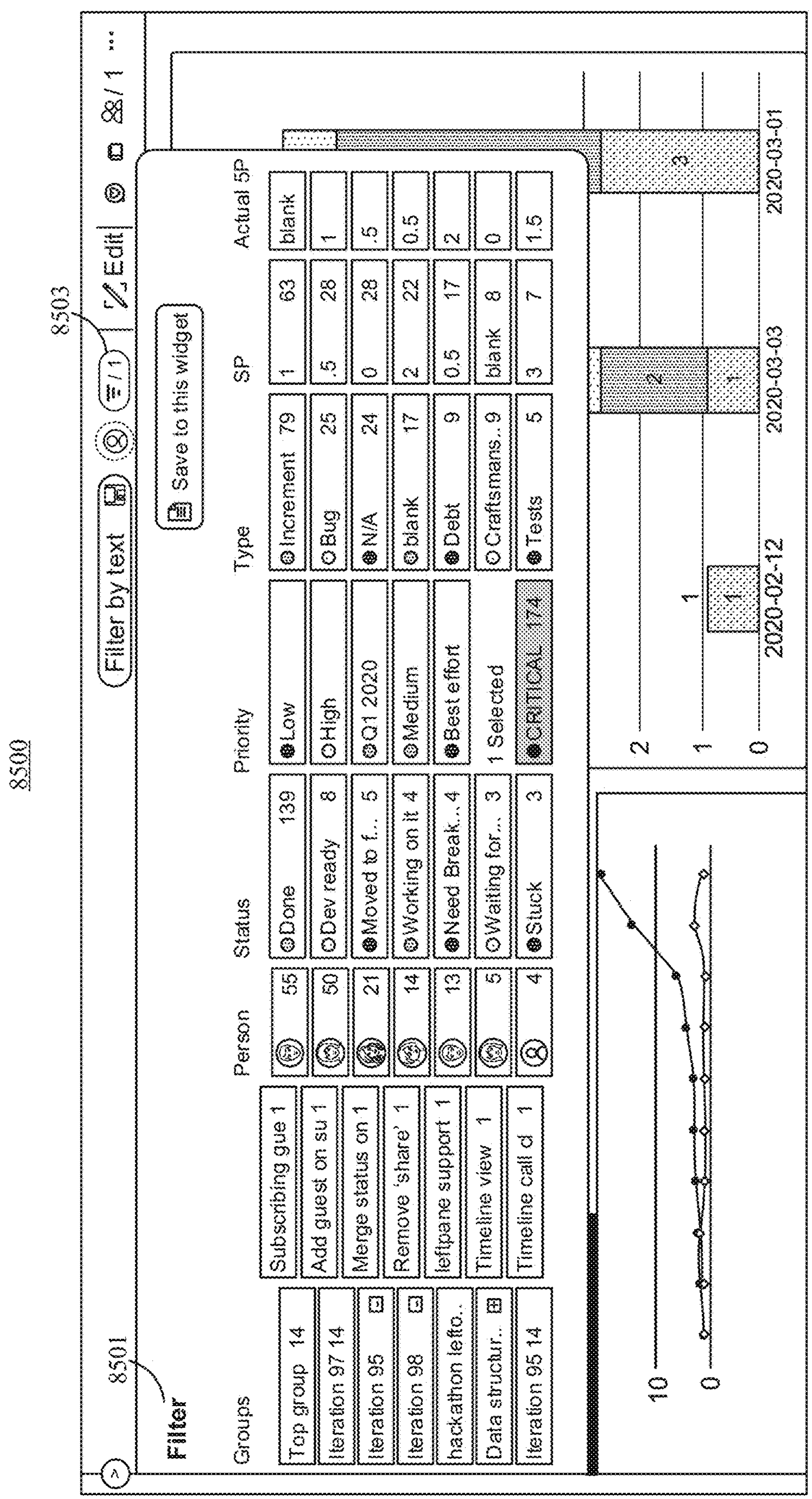
FIG. 85 illustrates an example of a filter for filtering data in a summary view, consistent with some embodiments of the present disclosure.

FIG. 85 illustrates an exemplary filter 8501 for updating summary view 8500 representative of data contained within each of the columns such that specific data may be represented as a proportion of all of the data contained within each column. The summary view 8500 in FIG. 85 includes an interactive element 8503 (e.g., a button). By selecting the interactive element 8503, as illustrated in FIG. 85, the at least one processor may cause to display an interactive element (e.g., a floating GUI element overlaying the summary view 8500) showing the filter 8501. The filter 8501 may include multiple buttons, each button representing a feature or a characteristic (e.g., specific cell values) in the complex table associated with the summary view 8500. By selecting one or more of the buttons, the filter 8501 may activate the features or characteristics associated with the selected buttons for generating a filtered summary view. For example, by selecting on a button "CRITICAL 174" (representing that 174 tasks having the status "CRITICAL" in the complex table) in the "Priority" column of the filter 8501, the at least one processor may update the summary view 8500 to display only summary information of tasks having the status "CRITICAL."

Figure 86:
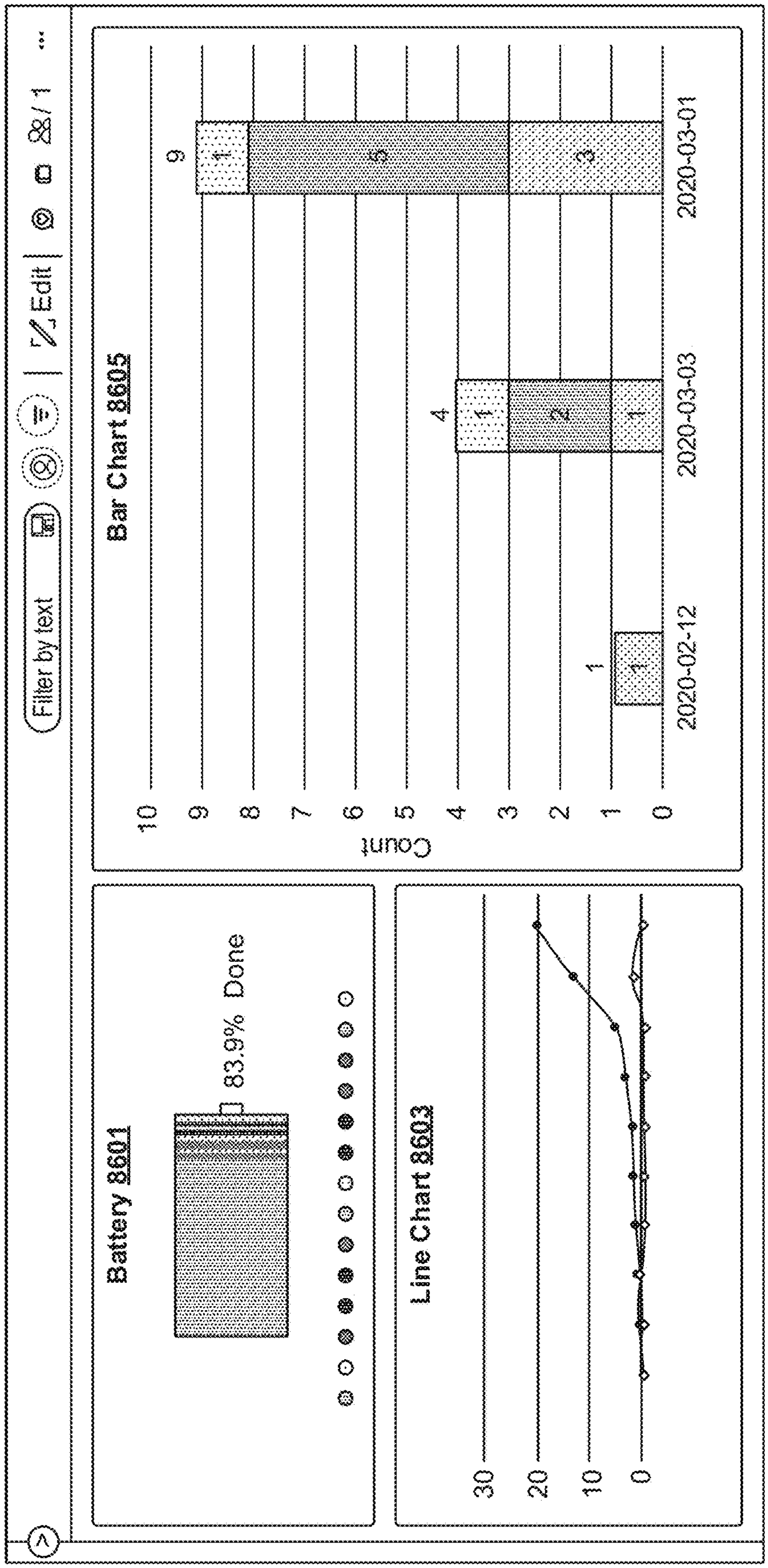
FIG. 86 illustrates an example of a filtered summary view, consistent with some embodiments of the present disclosure.

FIG. 86 illustrates an example of the resulting filtered summary view 8600, consistent with embodiments of the present disclosure.

The at least one processor may be configured to, in response to application of the logical filter, cause a display of a filtered collection of items from the first group that contain the third category indicator. A display, as discussed previously, may be caused to present a filtered collection of items corresponding to the cells, values, variables, or other information that may result from applying the logical filter as described above. The filtered collection of items of the underlying complex table may then be further processed for display. The collection of items may include information associated with the first group, such as the first selection and the second selection, containing the third category indicator. In this manner, items associated with either the first selection or the second selection, but only those associated with the third selection, may be selected in an intuitive and straightforward manner.

Figure 87:
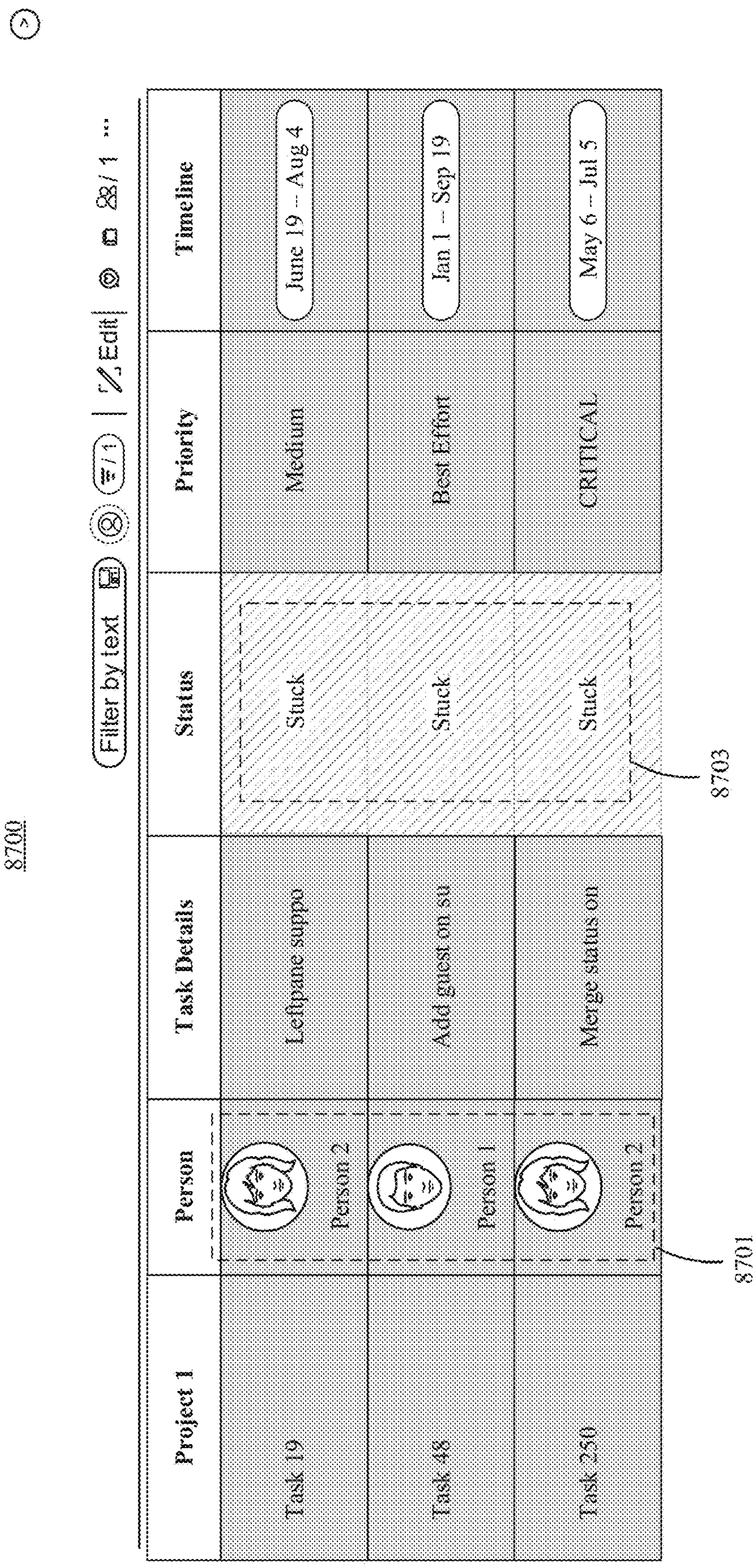
FIG. 87 illustrates an example of a complex table containing a filtered collection of items, consistent with some embodiments of the present disclosure.

FIG. 87 is an exemplary complex table 8700 including a filtered collection of items from a first group 8701 that contain a third category indicator 8703. For example, complex table 8700 may be displayed as a result of a first selection (e.g., selection of first cell 7901 described above in connection with FIG. 79) and a second selection (e.g., selection of second cell 8001 described above in connection with FIG. 80) constituting first group 8701, and a third selection (e.g., selection of third cell 8101 described above in connection with FIG. 81). However, in other embodiments, the selections may be received directly from complex table 8700. As shown, complex table 8700 may display only those items in first group 8701 that contain a third category indicator 8703, which in this case is a color (e.g., red) and the text "Stuck."

In some embodiments, the at least one processor may be configured to calculate and display a number of times that the first category indicator appears under the first heading. The number of times that a category indicator appears under a heading may be calculated using any process for computing a total number of instances of the category indicator appearing in the complex table, such as arithmetic computations, binary arithmetic, or any other process for mathematically transforming one or more inputs into one or more outputs. For example, in embodiments where the complex table includes vertical columns and horizontal rows, the number of cells containing the first category indicator in each column associated with the first heading may be tallied to calculate the number of times that the first category indicator appears under the first heading. The resulting calculation may then be displayed using any visual, tactile, or any other generation of physical information, such as through the use of one or more mobile devices, desktops, laptops, tablets, LED, AR, VR, or a combination thereof, as described above. The calculation of the number of times that the category indicator appears may be updated according to updates made in the complex table or in the logical filter.

For example, in FIG. 79 a logical filter 7900 (which may be presented as a table) may contain an indication of the number of times that a category indicator 7905 appears under a heading in the complex table. In FIG. 79, total number "55" associated with the selection 7901 of Person 1 represents the number of times that category indicator 7905 (e.g., a profile picture for "Person 1") appears in the complex table. For example, such an indication may represent the number of times an individual in a project is present in a column associated with "Person" heading 7903. As the number of times an individual is assigned to particular items or tasks is changed in the complex table, the same number may be updated in the logical filter 7900. While represented textually in FIG. 79, the number of times may also (or alternatively) be presented graphically or as a combination of graphics and alphanumerics.

Consistent with some disclosed embodiments, the at least one processor may be configured to reduce the displayed number of times following receipt of the third selection. As a result of additional selections made, the number of times a category indicator may be updated to reflect the number of items or tasks that meet the updated logical filter. The reduction of the number of times that a category indicator may appear under a heading may be calculated in the same or similar manner as described above in connection with the initial calculation (e.g., arithmetic computations, binary arithmetic, or any other process for mathematically transforming one or more inputs into one or more outputs). Following the example above, upon receipt of the third selection (joining an "and" logic that excludes data), the number of cells not associated with the third selection may be subtracted from the number of times that the first category indicator appears under the first heading. As a further example, the number of cells containing the first category indicator in each column associated with the first heading, may be tallied to calculate the number to be displayed, but only if associated with the third selection.

For example, comparing FIG. 80 and FIG. 81 shows that the displayed number associated with the first selection (e.g., selection of "Person 1" cell 7901 described in connection with FIG. 79) is reduced in cell 8001. Specifically, as shown in FIG. 80, the displayed number in the "Person 1" cell is "40," indicating that 40 cells in the column associated with "Person" heading 8003 are associated with Person 1. As shown in FIG. 81, following a third selection (e.g., selection of "Stuck" cell 8101 described above in connection with FIG. 81), the displayed number in the "Person 1" cell is reduced to "5," indicating that only five cells in the column associated with the "Person" heading is associated with Person 1 where the status of the task is "Stuck."

In some embodiments, causing a display of the filtered collection includes displaying metadata associated with at least one item of the collection. Metadata may include any data related to the at least one item of the collection, such as tags, author, date created, date modified, file size, a combination thereof, or any other information corresponding to the data represented by the at least one item of the collection. It is to be understood that metadata may include any information related to the data corresponding to the at least one item of the collection.

Figure 88:
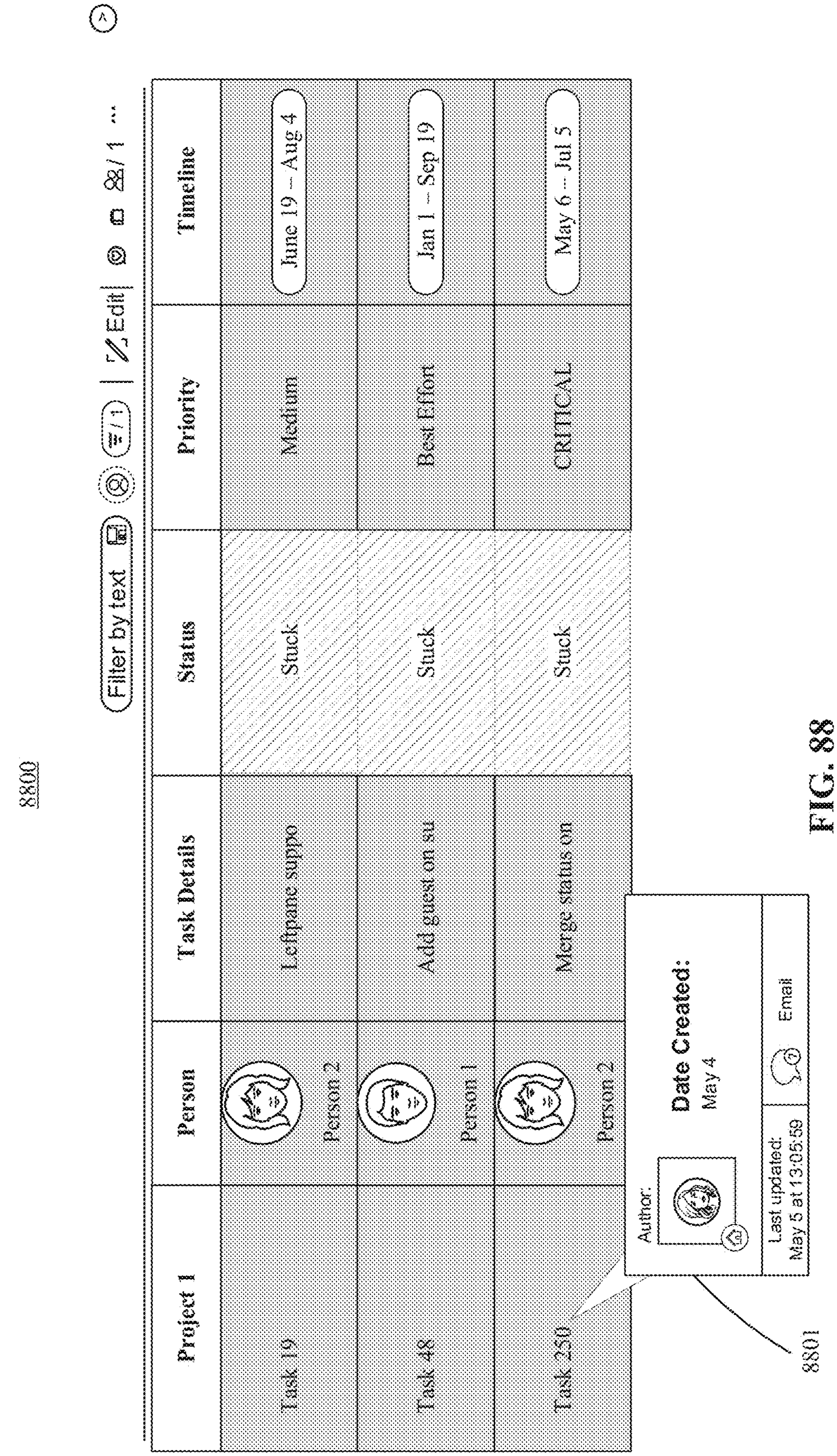
FIG. 88 illustrates an example of a complex table containing metadata, consistent with some embodiments of the present disclosure.

For example, FIG. 88 illustrates a complex table 8800 that may contain metadata associated with at least one item of the collection, consistent with disclosed embodiments. As shown in FIG. 88, metadata 8801 associated with a cell (e.g., "Task 250") may be displayed. Metadata 8801 may include any information associated with the cell, in this case a task, such as the creator the author of the task, the creation date of the task, the date of the last update of the task, and email information for the author of the task.

Figure 89:
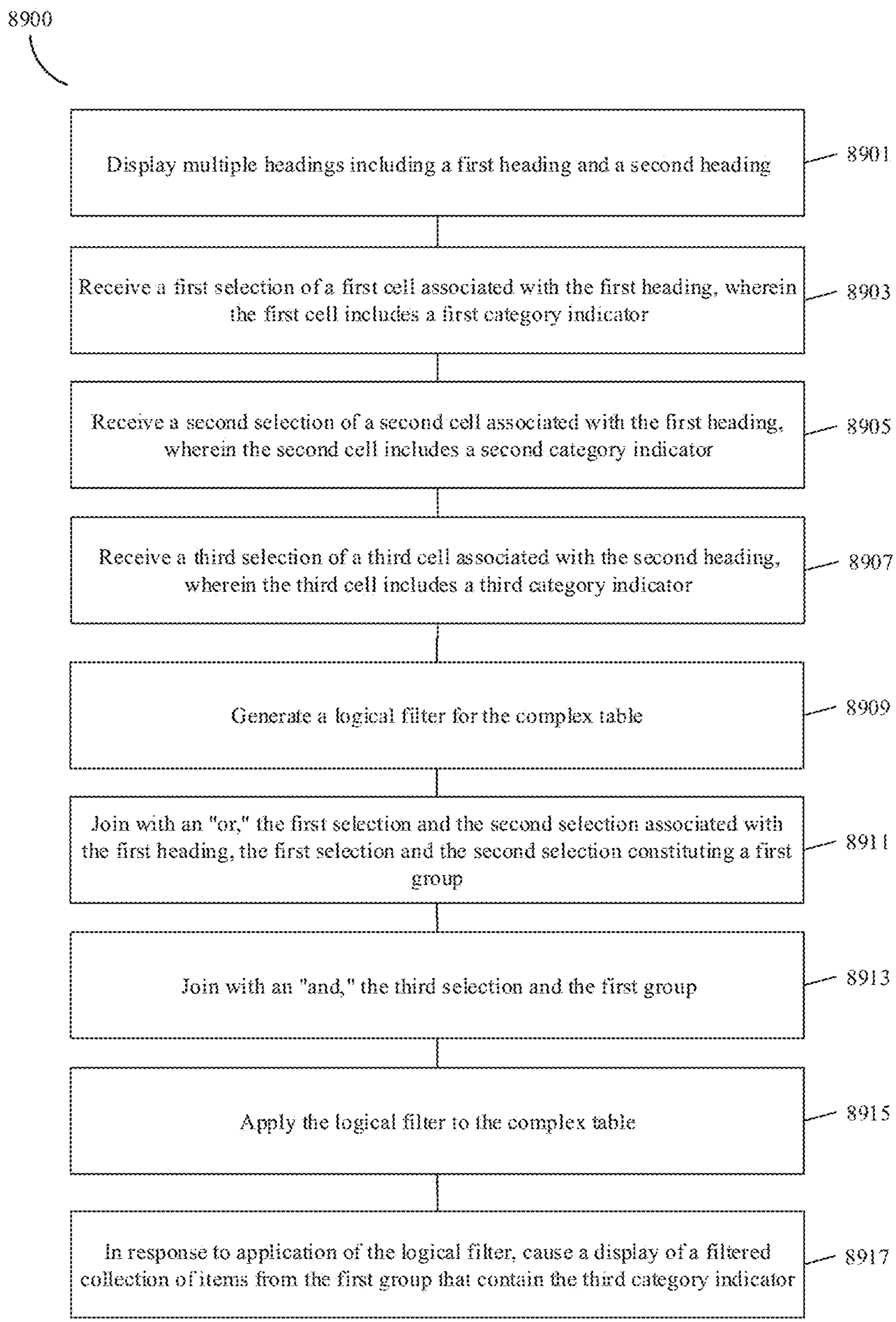
FIG. 89 is a block diagram of an example process for automatically filtering data, consistent with some embodiments of the present disclosure.

FIG. 89 illustrates a block diagram of an example process 8900 for automatically filtering data in complex tables, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 8900 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 74 to 88 by way of example. In some embodiments, some aspects of the process 8900 may be implemented as software (e.g., program codes or instructions) that are stored in a memory (e.g., the memory portion 122 in FIG. 1) or a non-transitory computer-readable medium. In some embodiments, some aspects of the process 8900 may be implemented as hardware (e.g., a specific-purpose circuit). In some embodiments, the process 8900 may be implemented as a combination of software and hardware.

FIG. 89 includes process blocks 8901 to 8917. At block 8901, a processing means (e.g., the processing circuitry 110 in FIG. 1) may display multiple headings including a first heading and a second heading (e.g., first heading 7501 and second heading 7503 in FIG. 75).

At block 8903, the processing means may receive a first selection of a first cell associated with the first heading (e.g., "Person 1" cell 7901 associated with "Person" heading 7903 in FIG. 79). In some embodiments, the first cell may include a first category indicator.

At block 8905, the processing means may receive a second selection of a second cell associated with the first heading (e.g., "Person 2" cell 8001 associated with "Person" heading 8003 in FIG. 80). In some embodiments, the second cell may include a second category indicator.

In some embodiments, the processing means may generate a real time indicator of a number of received selections (e.g., "1 selected" indicator 7901 in FIG. 79, representing the number of received selections of persons in the column associated with "Person" heading 7903).

At block 8907, the processing means may receive a third selection of a third cell associated with the second heading (e.g., "Stuck" cell 8101 associated with "Status" heading 8103 in FIG. 81). In some embodiments, the third cell may include a third category indicator (e.g., a colored circle 8105, such as a red circle, in FIG. 81).

At block 8909, the processing means may generate a logical filter for the complex table (e.g., the logical filter illustrated by FIG. 82 or FIG. 83). At block 8911, generating a filter may involve joining with an "or," the first selection and the second selection associated with the first heading (e.g., the logical filter 8207 for a selection of "Person 1" cell 8201 and "Person 2" cell 8203 associated with "Person" heading 8205 in FIG. 82). In some embodiments, the first selection and the second selection may constitute a first group (e.g., first group 8303 for a selection of "Person 1" and "Person 2" cells in FIG. 83). At block 8913, generating a filter may involve joining with an "and," the third selection and the first group (e.g., the logical filter 8307 for a selection of "Stuck" cell 8301 associated with "Status" heading 8305 and first group 8303 in FIG. 83).

At block 8915, the processing means may apply the logical filter to the complex table (e.g., such as applying filter 7601 in FIG. 76 to generate filtered complex table 7700 in FIG. 77). In some embodiments, the processing means may apply the logical filter in real time to each selection, as previously discussed. In some embodiments, the processing means may cause the logical filter to be saved in memory for later application, consistent with the discussion above. In some embodiments, the processing means may cause the logical filter to be saved in a repository for application to a summary view of the complex table, as previously discussed.

At block 8917, the processing means may, in response to application of the logical filter, cause a display of a filtered collection of items from the first group that contain the third category indicator, consistent with the previous disclosure.

In some embodiments, the processing means may calculate and display a number of times that the first category indicator appears under the first heading as discussed above. In some embodiments, the processing means may reduce the displayed number of times following receipt of the third selection as discussed above. In some embodiments, the processing means causing a display of the filtered collection may include displaying metadata associated with at least one item of the collection consistent with the disclosure above.

Consistent with some disclosed embodiments, systems, methods, and computer readable media for customizing chart generation based on table data selection are disclosed. Computerized systems and methods for customizing chart generation based on table data selection provide several benefits over extant processes that rely on manual processes for generating graphical representations. A user may desire, for example, to utilize automatic processes to generate graphical representations based on user selections of table data, without having to manually create graphical representations and without having to interact with a separate graphical user interface. In addition, the disclosed computerized systems and methods may generate a link between the table data and the graphical representation, thereby leading to real-time or near real-time updates of the graphical representation as a result of changes in the table data. This provides several benefits over extant processes that rely on manual updating or other user-dependent input to update graphical representations, resulting in saved time. Accordingly, some systems and methods disclosed herein may provide graphical representations containing up-to-date information automatically, allowing the user to gain access to table data faster and more reliably than with extant systems and methods.

The systems and methods described herein may be implemented with the aid of at least one processor or non-transitory computer readable medium, such as a CPU, FPGA, ASIC, or any other processing structure(s), as described above. A "chart" (which may also be referred to in some embodiments as a "graphical representation") may refer to an illustrative representation of data, which may be part of or associated with one or more dashboards, widgets, tables, or any other component of the system. Examples of charts include one or more bar charts, circle charts, pie charts, dashboards, widgets, maps, tables or tabulations, flowcharts, alphanumeric characters, symbols, pictures, a combination thereof, or any other visual or physical representation of data. Charts or graphical representations may be representative of data associated with a dashboard, widget, table, or any other component of the system, such as specific status values, projects, countries, persons, teams, progresses, or a combination thereof. It is to be understood that the present disclosure is not limited to any specific type of charts or graphical representations, but may rather be utilized in conjunction with any form or medium for representing data.

Figure 90:
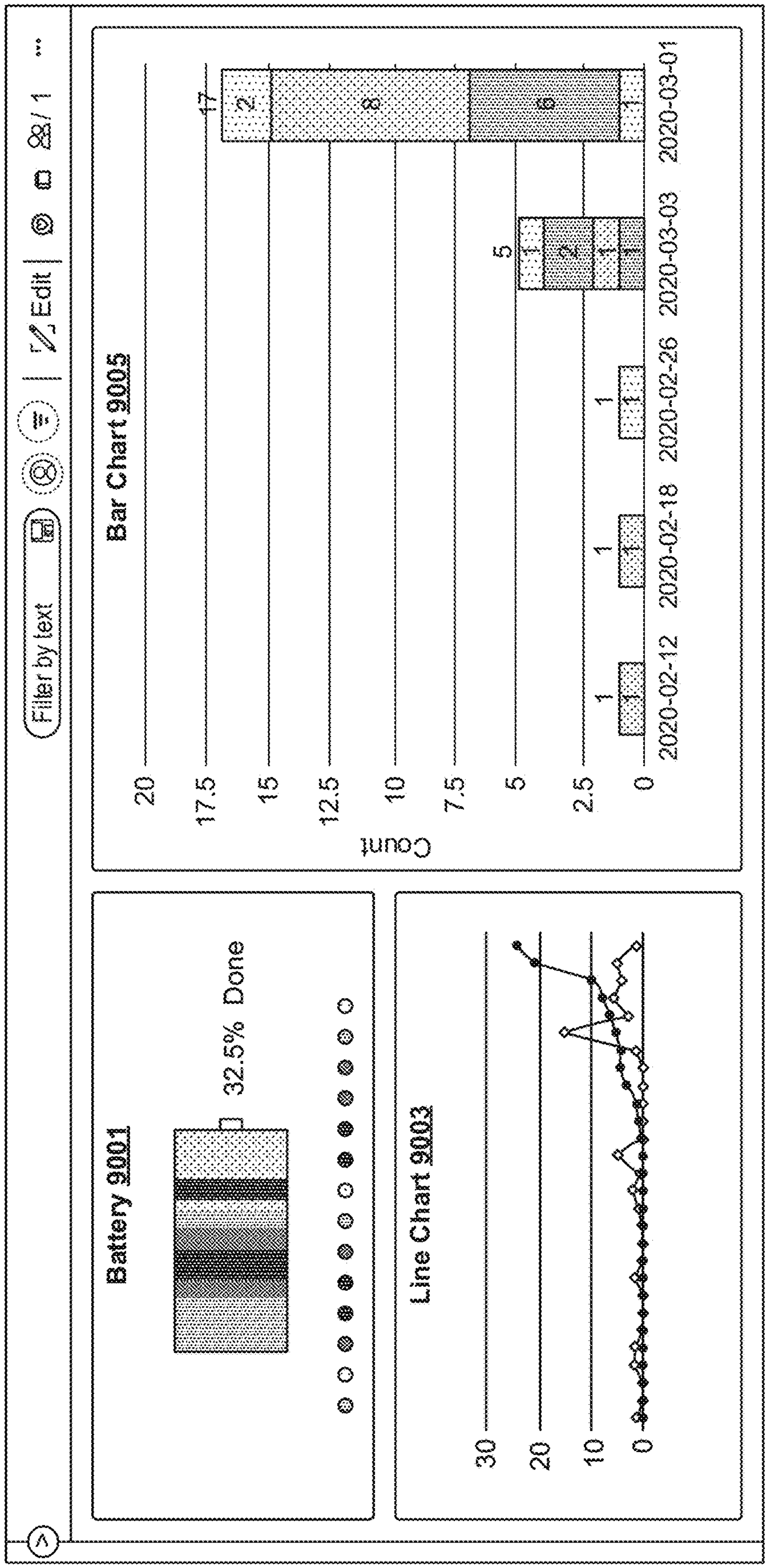
FIG. 90 illustrates exemplary charts and graphical representations, consistent with some embodiments of the present disclosure.

For example, FIG. 90 illustrates exemplary charts or graphical representations 9001, 9003, and 9005, consistent with embodiments of the present disclosure. In some embodiments, the charts or graphical representations 9001, 9003, and 9005 and other information discussed in connection with other figures may be displayed using a computing device (e.g., computing device 100 illustrated in FIG. 1) or software running thereon. The presentation may occur via a display associated with computing device 100 or one or more of the user devices 220-1 to **220-*m* in FIG. 2. As shown in FIG. 90, the charts or graphical representations may be contained within dashboard 9000. Dashboard 9000 includes a depiction of a battery chart 9001 that represents overall progress information of a task table (not shown), a line chart 9003 that represents information of planned progress versus actual progress extracted from the task table, and a bar chart 9005 that represents information of status by week extracted from the task table. Although dashboard 9000 is depicted as housing the charts or graphical representations 9001, 9003, and 9005 in FIG. 90**, it is to be understood that charts or graphical representations may be presented in isolation, or partially or fully enclosed within other parts of the system, such as widgets, tables, other charts or graphical representation, or any other part of the system.

The battery chart 9001 shows a battery-shape representation that consolidates all of the statuses of the tasks included in the task table, such as "done," "in progress," "stuck," "waiting," "delayed," or any other status value in the task table. Also, the depiction of a battery chart 9001 includes the text "32.5% done" reflecting that 32.5% of the tasks associated with the statuses are "Done." That is, of all the tasks included in the associated underlying table, 32.5% are completed. This text may be a default or may be configured to present the percentage makeup or any of the status values in the task table.

The line chart 9003 shows two lines, a line of black dots and a line of circle dots. Each black dot of the line of black dots may represent a planned progress of a task included in the task table, and each circle dot of the line of circle dots may represent an actual progress of a task included in the task table. The line chart may be a default or may be configured according to user preference.

The bar chart 9005 shows five bars, each bar including one or more statuses included in one week (e.g., the week of "2020-02-12," the week of "2020-02-18," and so on). That is, each bar may represent all the statuses updated or changed within one week for their associated tasks. The bar chart may be a default or may be configured according to user preference.

Figure 91:
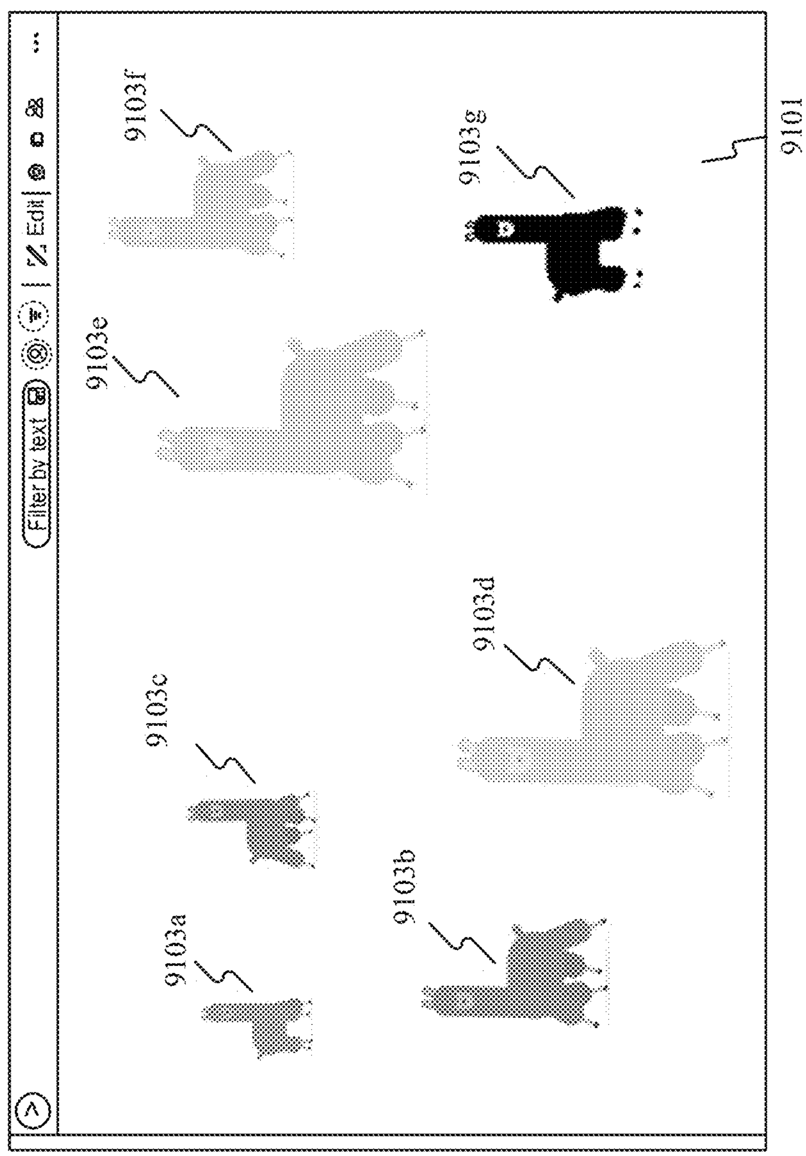
FIG. 91 illustrates another graphical representation, consistent with some embodiments of the present disclosure.

FIG. 91 illustrates another chart or graphical representation 9101, consistent with embodiments of the present disclosure. Chart or graphical representation 9101 may be contained within dashboard 9100 (as in FIG. 91), or it may be in isolation, or partially or fully contained within another part of the system (e.g., a widget, a table, or another graphical representation). As shown in FIG. 91, a graphical representation may consist of one or more depictions, in this case llamas (e.g., llama **9103*a*, 9103*b*, 9103*c*, 9103*d*, 9103*e*, 9103*f*, or 9103*g*). Llamas are illustrated by way of example only. Any depiction of an object may be used. Depictions of objects may be stored in a repository, and a user may be enabled to select a depiction most suitable to a user's interest. Alternatively, users might be permitted to upload their own depiction of objects, and the system processor may be configured to generate varying versions (differing in or more of size, color, visual texture, or any other visible characteristic). In another embodiment, the depiction of objects may be automatically selected based on a software package version or preselected template. For example, when employed in a real estate context, the objects may be buildings, and when employed in a transportation context the objects may be vehicles. The objects might also change within any particular platform depending on context. A manufacturer with five products might employ five different graphical objects to represent each separate product. In some embodiments, the position of each llama may change over time such as through one or more of horizontal, vertical, or diagonal movement or any other positional change, such that the position of one or more individual llamas may move to a different position (not shown) than their original positions in FIG. 91**. Multiple different classes of objects might appear on a common display, or each form of display might be reserved for a particular object. Thus, object movement may include a change in orientation, location, movement along a path, position relative to other objects (e.g., on a screen).

Object movement may also include an animation of the object (e.g., an avatar or animal with moving legs "walking" or a vehicle with wheels spinning), a change in animation, a change in color, or any other change relative to the object or the object's environment.

A chart may be generated through one or more signals, instructions, operations, or any method for rendering graphical representations of data. A chart may be generated using visual, tactile, or any other physical methods of rendering or displaying information. The generation process may be performed with the aid of the at least one processor or with the aid of a separate device. For this purpose, any suitable device may be used to generate a chart. For example, a chart may be generated through one or more mobile devices, desktops, laptops, tablets, LED display, augmented reality (AR), virtual reality (VR) display, or a combination thereof. Alternatively, a chart may be generated electronically through a virtual button, automatically in response to a condition being met, or any other electric or digital input. In some embodiments, a chart may be saved in a repository for future retrieval, consistent with disclosed embodiments. A repository may include a database to manage digital content, such as databases to add, edit, delete, search, access, import, export, or manage content.

The generation of the chart may be customized so as to alter one or more properties of the chart. The customization may be based on table data selection, as explained further below. For example, properties of a chart that may be altered may include the data represented by the chart, its structure or format, any alphanumeric information included in the chart (e.g., text associated with one or more elements in the chart, such as a heading or a label), colors associated with one or more elements in the chart (e.g., the color of a bar in a bar graph), or any other attribute or characteristic of the chart. In addition, a chart may be customized by adding or deleting elements, such as by adding or removing sections in a pie chart, portions of a table, figures or images, moving objects, or any other element of the chart.

Figure 92:
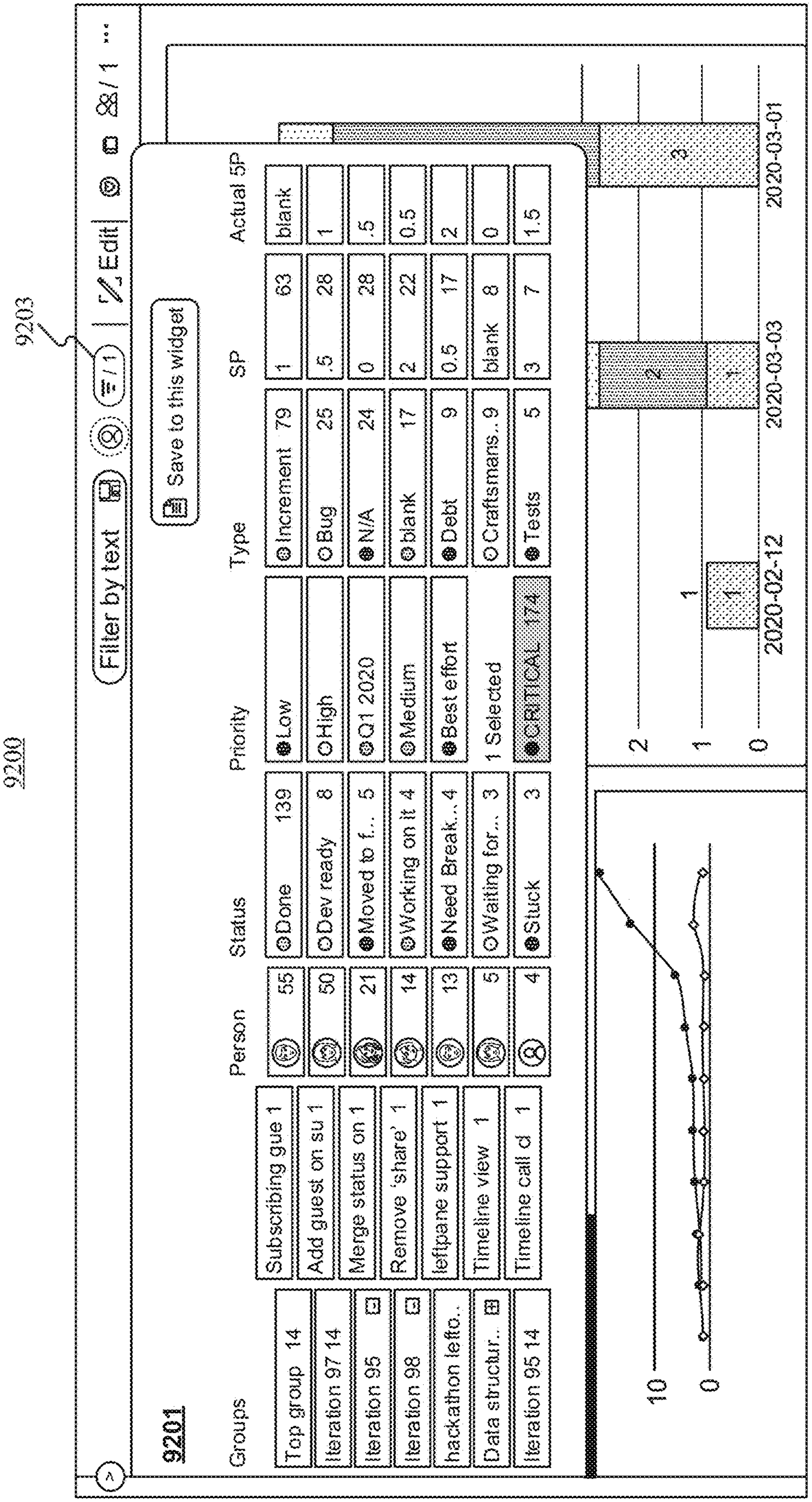
FIG. 92 illustrates an exemplary table for customizing charts and graphical representations, consistent with some embodiments of the present disclosure.
Figure 93:
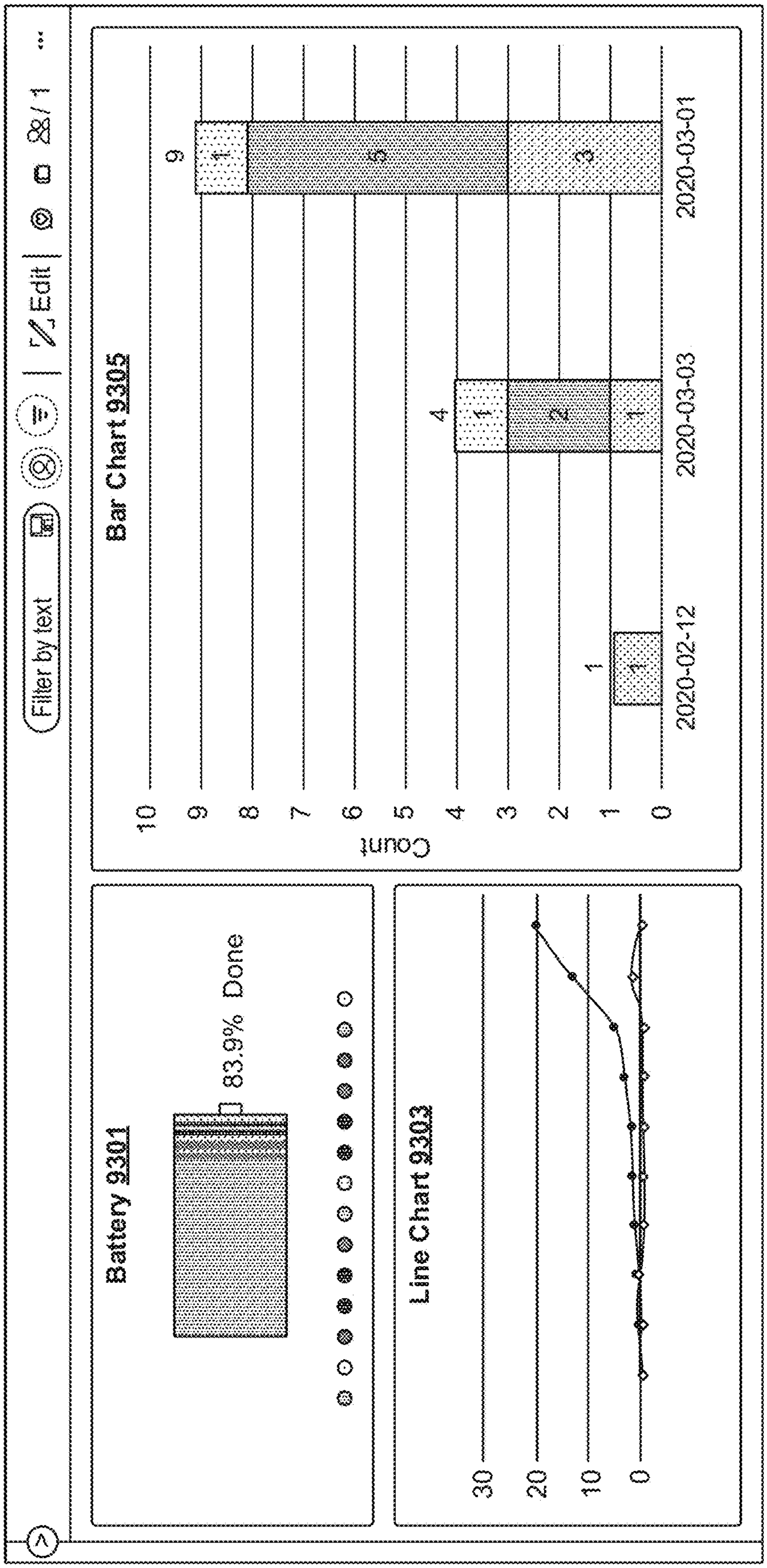
FIG. 93 illustrates an example of a customized chart and graphical representation, consistent with some embodiments of the present disclosure.

For example, FIG. 92 illustrates an exemplary table 9201 for customizing charts or graphical representations associated with dashboard 9200, consistent with embodiments of the present disclosure. In this example, dashboard 9200 may be the same as dashboard 9000 in FIG. 90. The dashboard 9200 in FIG. 92 may include an interactive element 9203 (e.g., a button). By selecting the interactive element 9203, as illustrated in FIG. 92, the at least one processor may cause to display another interactive element (e.g., a floating GUI element overlaying the dashboard 9200) showing the table 9201. The table 9201 may include multiple buttons, each button representing a feature or a characteristic (e.g., specific cell values) in the data associated with the charts or graphical representations in dashboard 9200. By selecting one or more of the buttons, the filter 9201 may activate the features or characteristics associated with the selected buttons for generating a filtered summary view. For example, by selecting a button "CRITICAL 174" (representing that 174 tasks having the status "CRITICAL") in the "Priority" column of the filter 9201, the at least one processor may customize the charts or graphical representations associated with dashboard 9200 to display only information for tasks having the status "CRITICAL." FIG. 93 illustrates an example of the resulting customized chart or graphical representation 9301, 9303, and 9303 contained in dashboard 9300, consistent with embodiments of the present disclosure.

The at least one processor may be configured to maintain at least one table containing rows, columns, and cells at intersections of rows and columns, consistent with disclosed embodiments. As used herein, a table may refer to data presented in horizontal and vertical rows, (e.g., horizontal rows and vertical columns) defining cells in which data is presented, as described above. Columns intersecting with rows of items may together define cells in which data associated with each item may be maintained. Table data may refer to any information associated with cells, columns, rows, or any other data associated with the table. The table data may include data maintained in a specific table, mirrored or linked from a second table, metadata or hidden data, or any other data that may be associated with a table.

Figure 94:
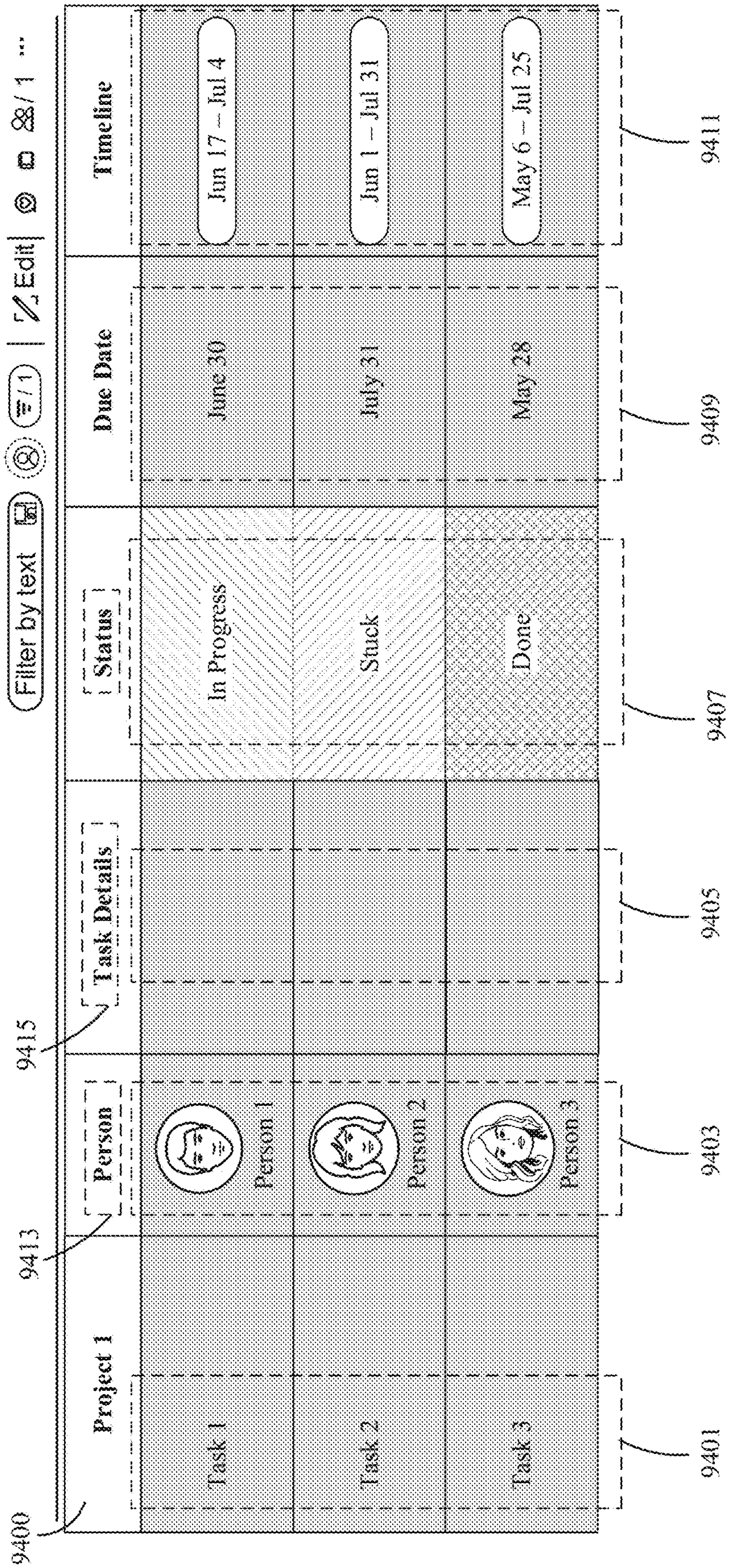
FIG. 94 illustrates an exemplary table containing multiple columns, rows, and cells, consistent with some embodiments of the present disclosure.

For example, FIG. 94 illustrates an exemplary table 9400 that may include multiple columns, rows, and cells, consistent with embodiments of the present disclosure. Table 9400 may be contained in a dashboard, widget, or any other component of the system. As shown in FIG. 94, the table 9400 may include a "Project" column 9401 associated with a project (i.e., "Project 1") for display and may include, in the multiple rows and columns, cells corresponding to tasks (e.g., in rows including "Task 1," Task 2," or "Task 3" in column 9401). The table 9400 may also include a "Person" column 9403 associated with cells corresponding to persons assigned to a task, a "Task Details" column 9405 associated with cells corresponding to additional information related to the task, a "Status" column 9407 associated with cells corresponding to the state of the task, a "Due Date" column 9409 associated with cells corresponding to a deadline of the task, and a "Timeline" column 9411 associated with cells corresponding with progress over time of the task, or any information, characteristic, or associated entity of the project. The table 9400 may include any number of columns and may include multiple columns with the same column heading with the same column type, or may include multiple columns with the same column heading with a different column type. For example, table 9400 may be altered to change "Person" heading 9413 to include the text "Task Details" identical to "Task Details" heading 9415 despite that person column 9403 is a different column type from task column 9405. It may be possible for a two columns of differing column types to have the same column heading and it may be possible for two columns of the same column type to have different column headings according to user preference.

As a further example, FIG. 92 illustrates an exemplary table 9201 that may be an interactive element overlaying dashboard 9200, consistent with embodiments of the present disclosure, as discussed in connection with FIG. 92. As can be appreciated from comparing FIG. 92 with FIG. 94, a table may be maintained within a dashboard, widget, or other component of the system (as in FIG. 94) or it may be dynamically generated as a result of one or more actions (e.g., pressing an interactive button) (as in FIG. 92) or both.

The at least one processor may be configured to receive a first selection of at least one cell in the at least one table, consistent with disclosed embodiments. A first selection may include any user action, such as a mouse click, a cursor hover, a mouseover, a button, a keyboard input, a voice command, an interaction performed in virtual or augmented reality, or any other action by a user received via the at least one processor. In embodiments where the at least one table includes horizontal rows and vertical columns, the at least one cell may be part of a column, a row, or both. The at least one cell is not limited to any particular column or row until a selection is made for the at least one cell. In some embodiments, the graphical representation may include at least two visualizations and the at least one processor may be further configured to receive an input and to alter a presentation of at least one of the at least two visualizations in response to the input. Visualizations may refer to any visual representation or illustration of data, as previous discussed. Receiving an input may include the system receiving instructions via an interface (e.g., a mouse, keyboard, touchscreen, or any other interface) that may indicate an intent to make a selection for further action on the selected material. Receiving an input to alter a presentation of a visualization may include receiving instructions to select a part or an entire visualization that may result in any modification such as an addition, removal, rearrangement, or any other modification in the display of information associated with a visualization. For example, a graphical representation may include at least one widget (e.g., a visualization) for displaying data. Each widget may include a widget based filter that can affect the specific graphical representation of that widget. The widget based filter may receive a selection (e.g., the input) that could supersede a previously dashboard-based filter (e.g., from a first selection as previously discussed above), such as by adding data that was previously filtered out by a dashboard level filter. In this scenario, the input may result in an addition of data to a graphical representation of that particular widget that was selected. In other instances, the widget based filter may receive a selection that was not filtered out previously by a dashboard level filter, which may result in the removal of some data from the graphical representation of that particular widget, resulting in an additional drill down of the data in that widget. In response to receiving an input associated with a visualization, the system may also combine the input to add a widget based filter to work in conjunction with a dashboard filter. In another example, the received input may result in a removal of data from a widget (e.g., a visualization). In another instance, in response to receiving an input for a visualization, the system may add data that was not previously shown in the visualization. For example, a dashboard (e.g., a graphical representation) may include one or more widgets (e.g., visualizations) that may receive a first selection to filter information contained in all of the widgets to only display "Done and "Stuck" tasks. An input may be received on a specific widget (e.g., a visualization depicting a battery) to also present information relating to tasks associated with a "Working on it" status. In this scenario, while the other widgets may only display "Done" and "Stuck" tasks, the specific widget (e.g., the at least one visualization) may display all "Done," "Stuck," and "Working on it" statuses.

Figure 95:
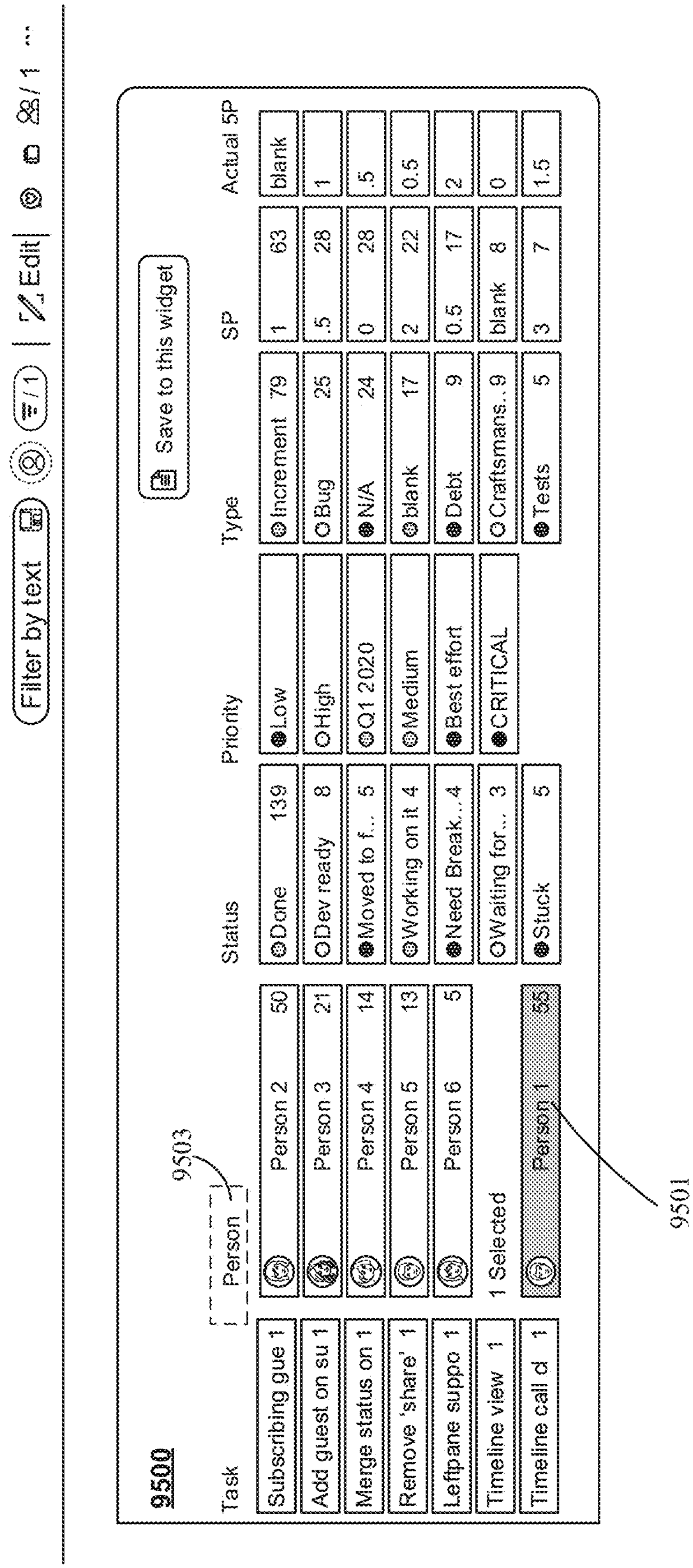
FIG. 95 illustrates an exemplary table where a first selection of at least one cell in the table is received, consistent with some embodiments of the present disclosure.

For example, FIG. 95 illustrates an exemplary table 9500 where a first selection of at least one cell in table 9500 is received, consistent with disclosed embodiments. In FIG. 95, cell 9501 ("Person 1") associated with "Person" column 9503 is selected, for example, by a user interaction (e.g., mouse click) with the at least one cell 9501. As shown in FIG. 95, the selection of the at least one cell 9501 may be indicated by a change in color, size, font, or any other attribute associated with the at least one cell as compared to non-selected cells.

The at least one processor may be configured to generate a graphical representation associated with the first selection of the at least one cell, consistent with disclosed embodiments. A graphical representation may refer to any visual illustration of data, such as one or more bar charts, circle charts, pie charts, dashboards, widgets, maps, tables or tabulations, flowcharts, alphanumeric characters, symbols, pictures, or a combination thereof, as described above. The graphical representation may be generated as a result of a command, such as the selection of at least one cell, through one or more signals, instructions, operations, or any method for directing the rendering of illustrations of data. In embodiments where the at least one table includes horizontal rows and vertical columns, the at least one cell may be part of a column, a row, or both. The at least one cell is not limited to any particular column or row until a selection is made for the at least one cell.

Figure 96:
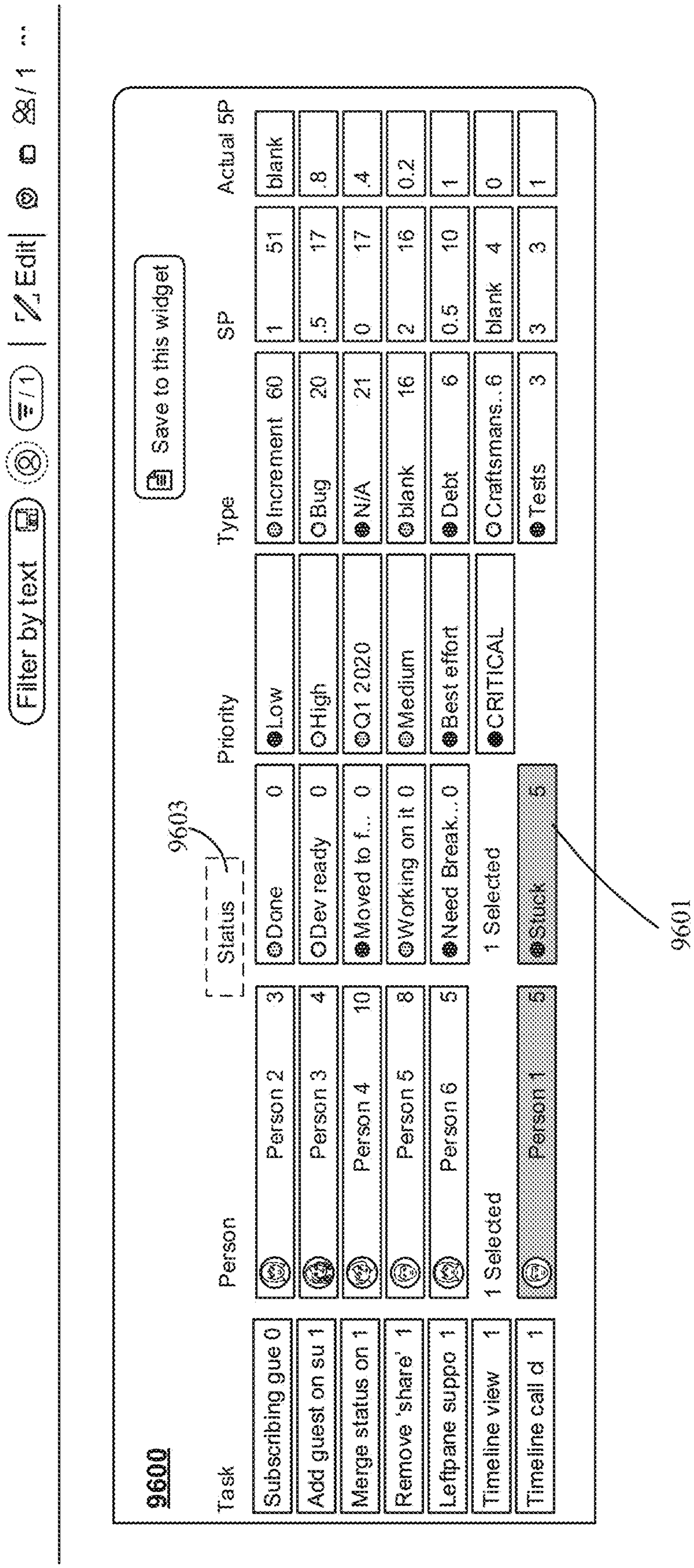
FIG. 96 illustrates another exemplary table where a first selection of at least one other cell in the table is received, consistent with some embodiments of the present disclosure.

For example, FIG. 96 illustrates an exemplary table 9600 where a first selection of at least one cell in table 9600 is received, consistent with disclosed embodiments. Table 9600 in FIG. 96 may be the same as table 9500 in FIG. 95. In FIG. 96, an at least one cell 9601 ("Stuck") associated with "Status" column 9603 is selected, for example, by a user interaction (e.g., mouse click) with the at least one cell 9601. As shown in FIG. 96, the selection of the at least one cell 9601 may be indicated by a change in color, size, font, or any other attribute associated with the at least one cell as compared to non-selected cells.

Figure 97:
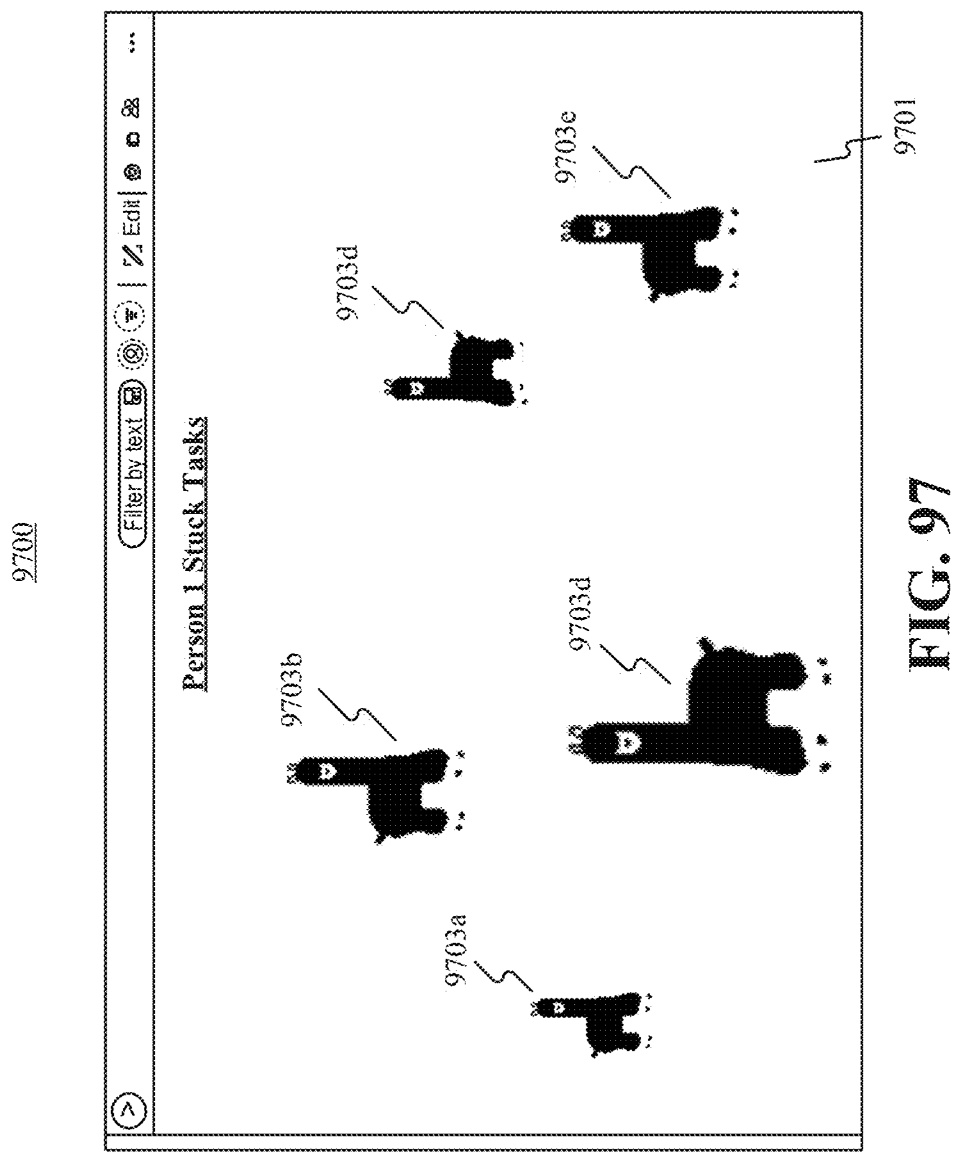
FIG. 97 illustrates a graphical representation associated with a cell selection, consistent with some embodiments of the present disclosure.

FIG. 97 illustrates a graphical representation 9701 associated with the first selection of at least one cell, consistent with disclosed embodiments. The graphical representation 9701 may be contained partially or fully within a dashboard 9700 (as in FIG. 97) or other component of the system, or may be in isolation. As shown in FIG. 97, a graphical representation may consist of one or more depictions, in this case llamas (e.g., llama 9703*a*, 9703*b*, 9703*c*, 9703*d*, or 9703*e*). Llamas are illustrated by way of example only. Any depiction of an object may be used, as discussed above. The depictions may correspond to information associated with the first selection of the at least one cell. As illustrated in FIG. 97, for example, each llama may represent one of the five tasks resulting from the selection of the at least one cell 9601 ("Stuck") associated with "Status" column 9603 of table 9600 discussed above in connection with FIG. 96. As a result of a user interaction (e.g., mouse click or hover), additional information associated with each of the five tasks may be presented to the user (not shown).

The at least one processor may be configured to generate a first selection-dependent link between the at least one table and the graphical representation, consistent with disclosed embodiments. A first selection-dependent link may be generated as one or more instructions, signals, logic tables, logical rules, logical combination rule, logical templates, or any operations suitable such that when information associated with the first selection is updated in the at least one table, the graphical representation changes via the link. Additionally or alternatively, the first selection-dependent link may be associated with two or more graphical representations at once, such as those stored in or associated with a repository, dashboard, widget, database, in local memory on a user device, in a local network, or in any other electrical medium. For example, a selection-dependent link may be associated with all graphical representations in a dashboard, such as one or more pie charts, bar charts, or widgets in the dashboard. In this manner, when the information associated with the first selection is updated in the at least one table, the graphical representations in the dashboard change accordingly, leading to a consistent display of information, saved time, and a more enjoyable user experience.

Figure 98:
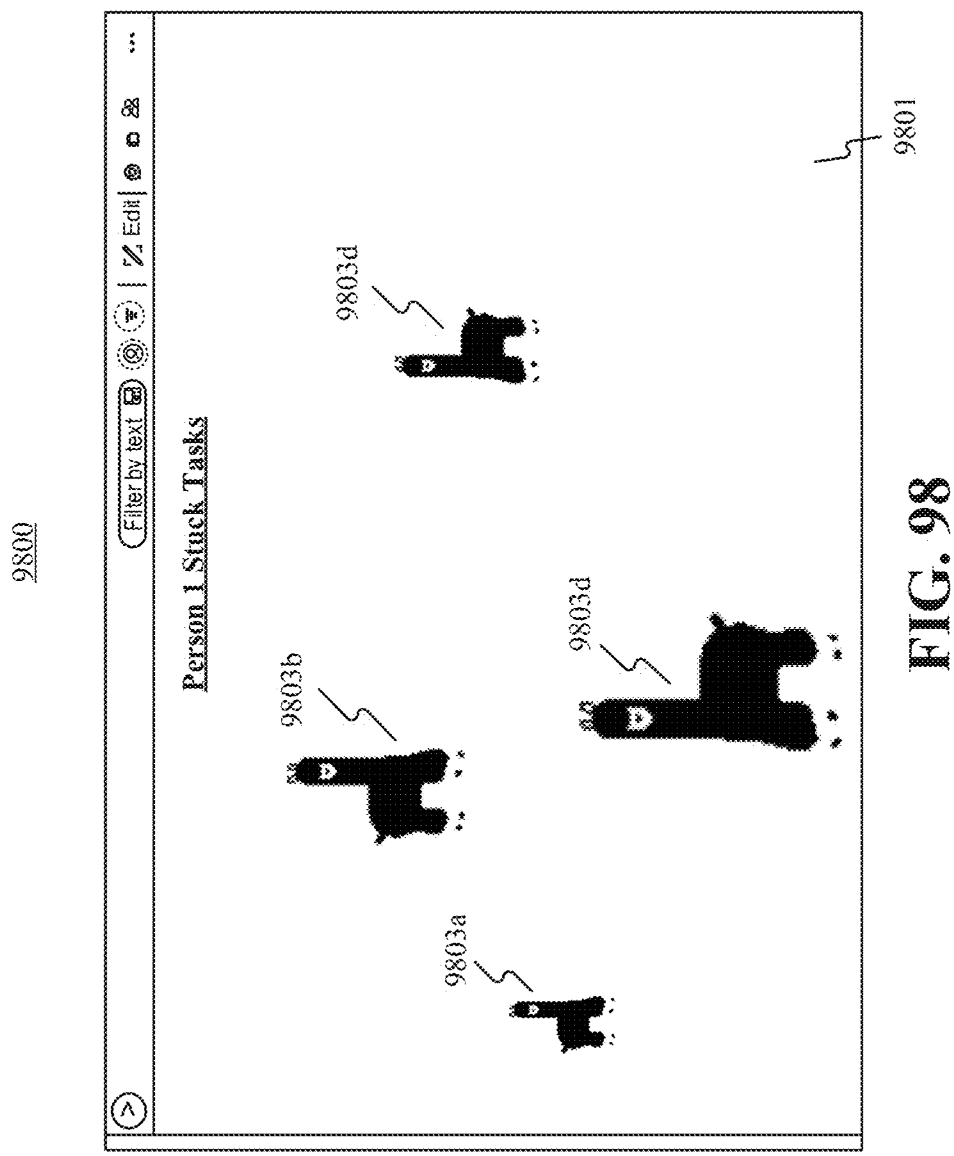
FIG. 98 illustrates an example of a graphical representation changed in response to an update of information in a cell, consistent with some embodiments of the present disclosure.

For example, FIG. 98 illustrates an exemplary graphical representation 9801 that changed when information associated with the first selection was updated, consistent with disclosed embodiments. Dashboard 9800 in FIG. 98 may be an update to dashboard 9700 in FIG. 97. A depiction associated with a task (e.g., a llama) may be deleted, added, modified, or otherwise changed in response to a change in the underlying task. As shown in FIG. 98, for example, as a result of a first selection-dependent link, a llama corresponding to a task (e.g., llama 9803*e* in FIG. 97) may be removed when the task is no longer associated with the first selection, such as when a person associated with the task (e.g., "Person 1") is no longer associated with the task, the person has completed the task, the task no longer has a "Stuck" status, or for any other reason such that the task no longer meets the criteria corresponding to the first selection. Other forms of updates, however, may result in changes in the graphical representation, such as addition, deletion, modification, duplication, reduction, or other alterations in data.

In some embodiments, the first selection-dependent link may be tied to a column in the at least one table, consistent with disclosed embodiments. The first selection-dependent link may be associated with any information, features, or characteristics associated with a column in the at least one table, such as specific status values, projects, countries, persons, teams, progresses, or a combination thereof. Accordingly, as a result of a first selection of at least one cell, the graphical representation associated with the first selection-dependent link may be updated to include a specific information, feature, or characteristic in the column associated with the at least one cell, thereby providing additional relevant information to the user. For example, upon selecting a cell associated with a specific person associated with a task, the graphical representation may be updated to reflect information associated with all persons. In addition, in some embodiments the first selection-dependent link may be tied to one or more columns, one or more rows, or both.

Figure 99:
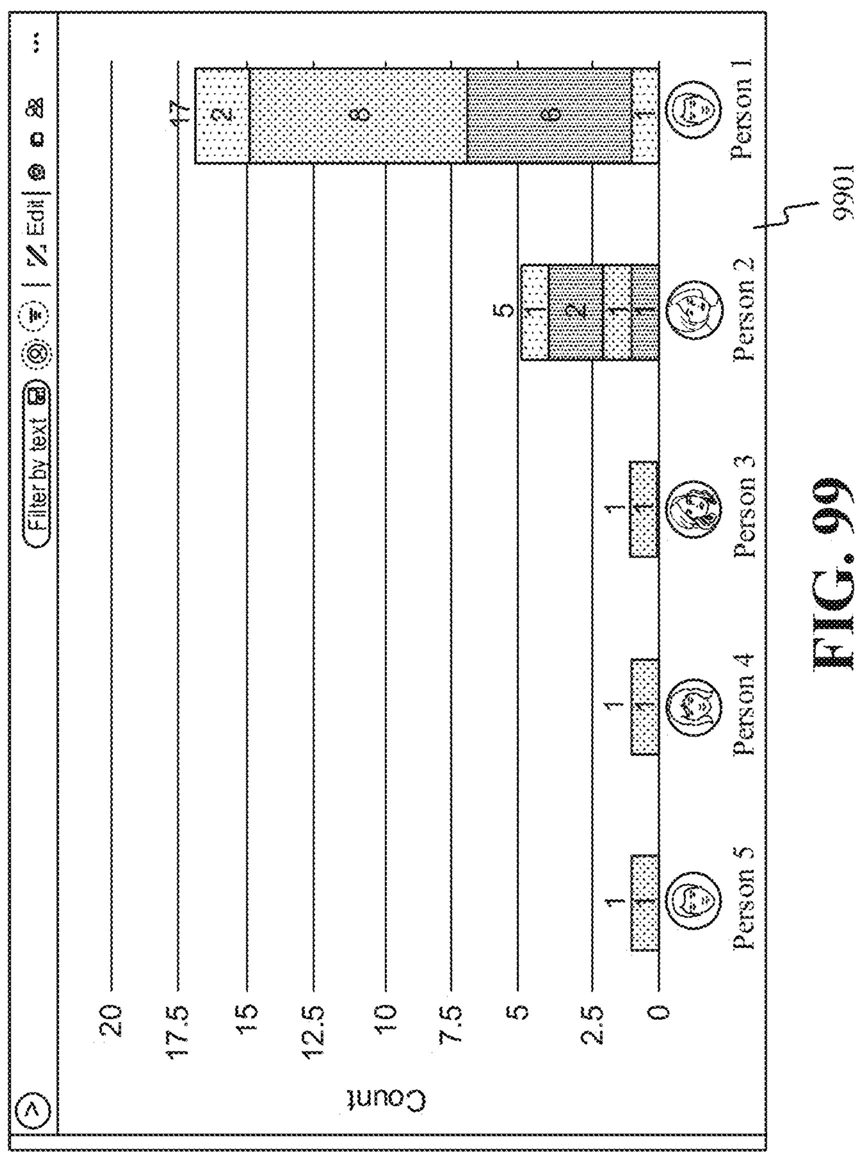
FIG. 99 illustrates an exemplary graphical representation where a first selection-dependent link may be tied to a column in a table, consistent with some embodiments of the present disclosure.

For example, FIG. 99 illustrates an exemplary graphical representation 9901 where the first selection-dependent link may be tied to a column in a table associated with dashboard 9900, consistent with disclosed embodiments. Graphical representation 9901 in FIG. 99 may be generated as a result of a first selection of at least one cell 9501 ("Person 1") in FIG. 95 and at least one cell 9601 ("Stuck") in FIG. 96. In other embodiments, the graphical representation 9901 may also have been generated as a result of a first selection of at least one cell 9413 (e.g., a person column heading in FIG. 94). As shown in FIG. 99, graphical representation 9901 may be associated with a column, such as the persons column corresponding to a selection of "Person 1" cell. Consequently, graphical representation 9901 may include information associated with persons other than Person 1, such as Person 2, Person 3, Person 4, and Person 5.

The at least one processor may be configured to receive a second selection of at least one cell in the at least one table, consistent with disclosed embodiments. The second selection may be received in the same or similar manner as the first selection as described above (e.g., through any user action, such as a mouse click, a cursor hover, a mouseover, a button, a keyboard input, a voice command, an interaction performed in virtual or augmented reality, or any other action by a user received via the at least one processor). The second selection may be received in a manner that modifies the first selection as previously discussed above. In some embodiments, the second selection may be received in a manner different from the first selection (e.g., the first selection is made on a table, and the second selection is made on a graphical representation).

Figure 100:
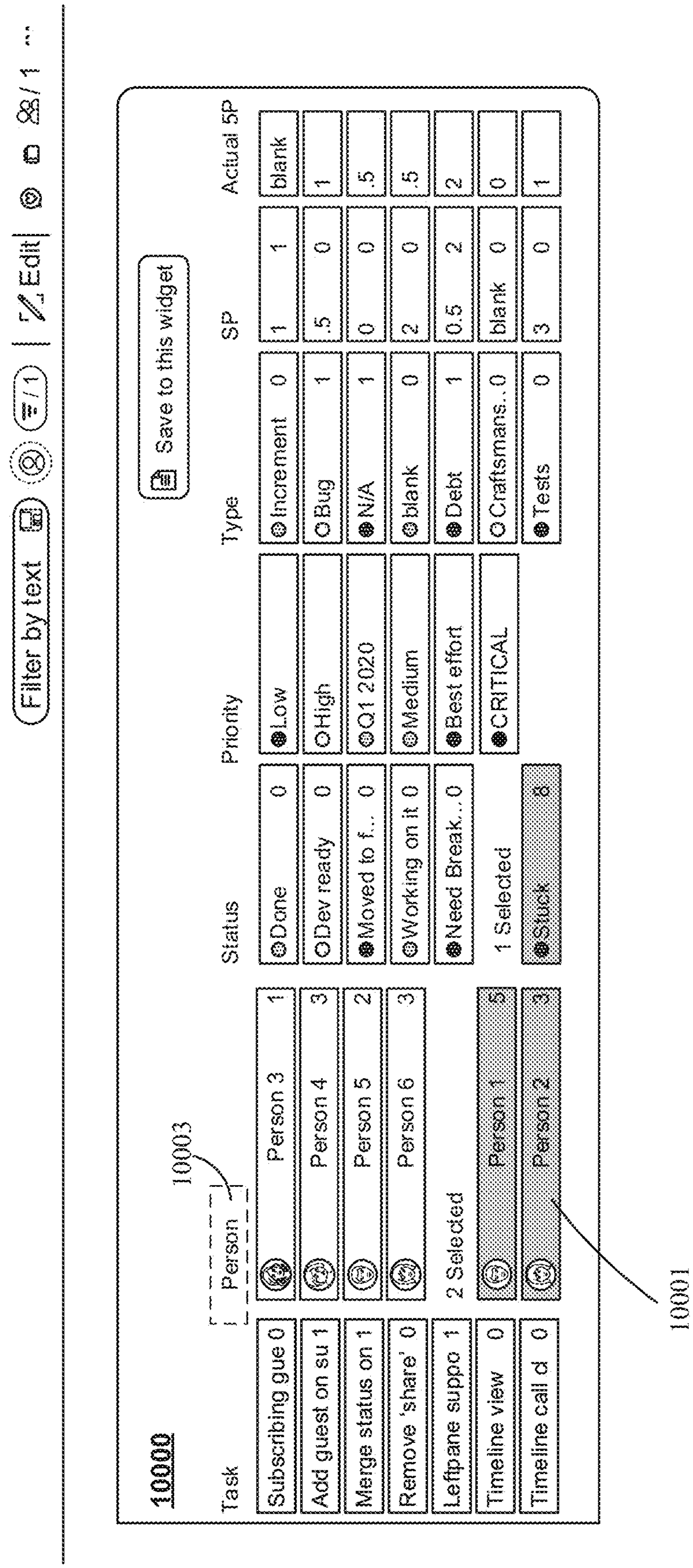
FIGS. 100 and 101 illustrate exemplary representations of a table in which another selection of at least one cell is received, consistent with some embodiments of the present disclosure.

For example, FIG. 100 illustrates an exemplary table 10000 where a second selection of at least one cell in table 10000 is received, consistent with disclosed embodiments. Table 10000 in FIG. 100 may be updated versions of table 9500 in FIG. 95 or table 9600 in FIG. 96. In FIG. 100, an at least one cell 10001 ("Person 2") associated with "Person" column 10003 is selected, for example, by a user interaction (e.g., mouse click) with the at least one cell 10001. As shown in FIG. 100, the selection of the at least one cell 10001 may be indicated by a change in color, size, font, or any other attribute associated with the at least one cell as compared to non-selected cells.

In some embodiments, the second selection of the at least one cell in the at least one table may be received as a result of an indirect selection of the at least one cell. For example, a user may perform an interaction (e.g., a mouse click) with a depiction (e.g., a llama) in a graphical representation associated with a table, as described herein. As a result of the user interaction with the depiction, a cell associated with the depiction may be selected. In this manner, the user may intuitively and efficiently select information on the table without being required to select information directly from the table. In some embodiments, the first selection of at least one cell, the second selection of at least one cell, or both, may be performed in the same or similar manner.

Figure 101:
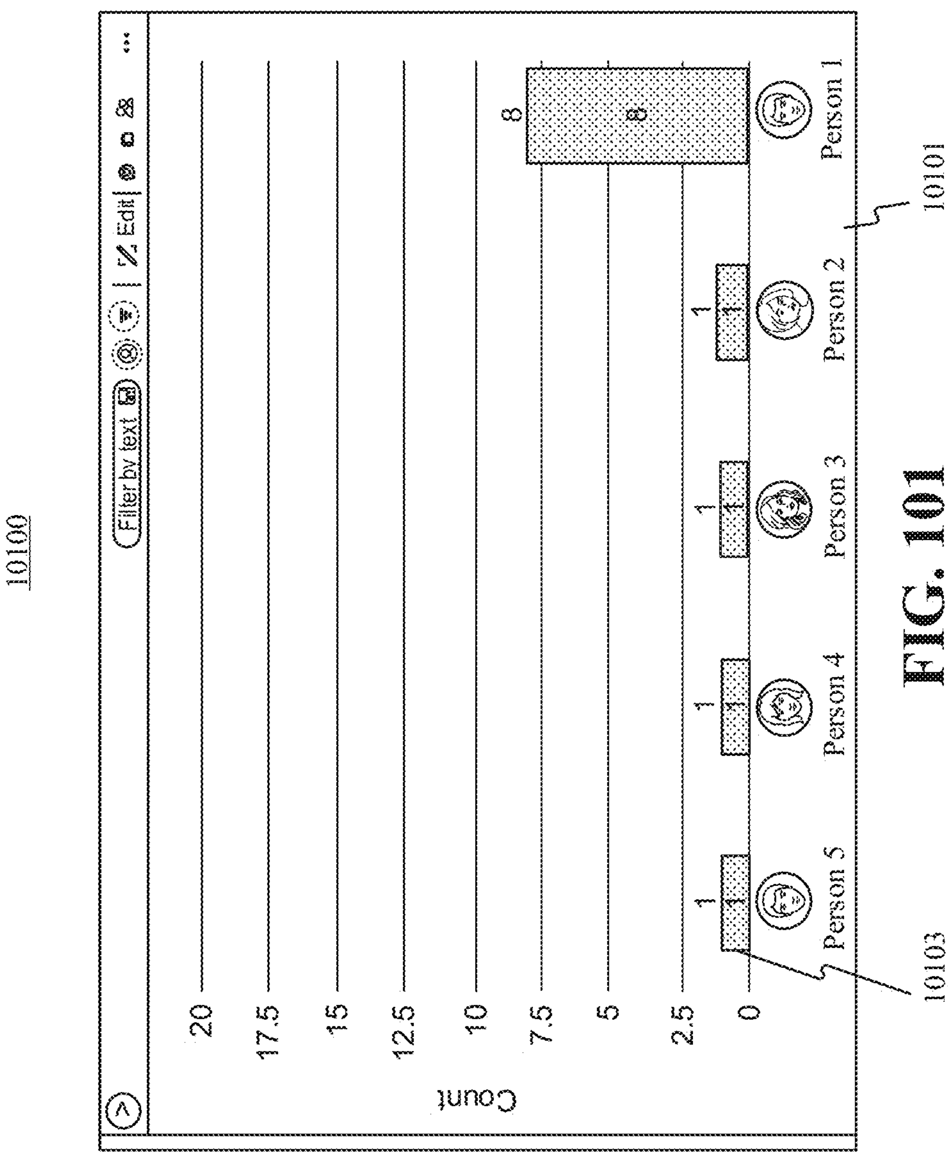

For example, FIG. 101 illustrates an exemplary graphical representation 10101 where a second selection of at least one cell in a table is received, consistent with disclosed embodiments. Dashboard 10100 in FIG. 101 may be an updated version of dashboard 9900 in FIG. 99. In FIG. 101, depiction 10003 (e.g., a segment in a bar chart) associated with "Person 5" may be subject to a user interaction (e.g., a mouse click). As a result of the user interaction with depiction 10003, an at least one cell in a table corresponding to depiction 10003 may be selected (e.g., a cell associated with Person 5 with a status of "Done"). As shown in FIG. 101, the second selection of the at least one cell in the table may be indicated by altering graphical representation 10101, such as by only displaying depictions with the same or similar information as that of the at least one cell, such as gray ("Done") bar segments for "Person 1," "Person 2," "Person 3," "Person 4," and "Person 5."

The at least one processor may be configured to alter the graphical representation based on the second selection, consistent with disclosed embodiments. An alteration of the graphical representation may include a recalculation of data, the addition of data, the subtraction of data, a rearrangement of information, modifying the appearance of one or more visible items (e.g., table border, font type, font size, layout, arrangement of columns or rows), or any other modification of information displayed, presented, or associated with the graphical representation.

Figure 102:
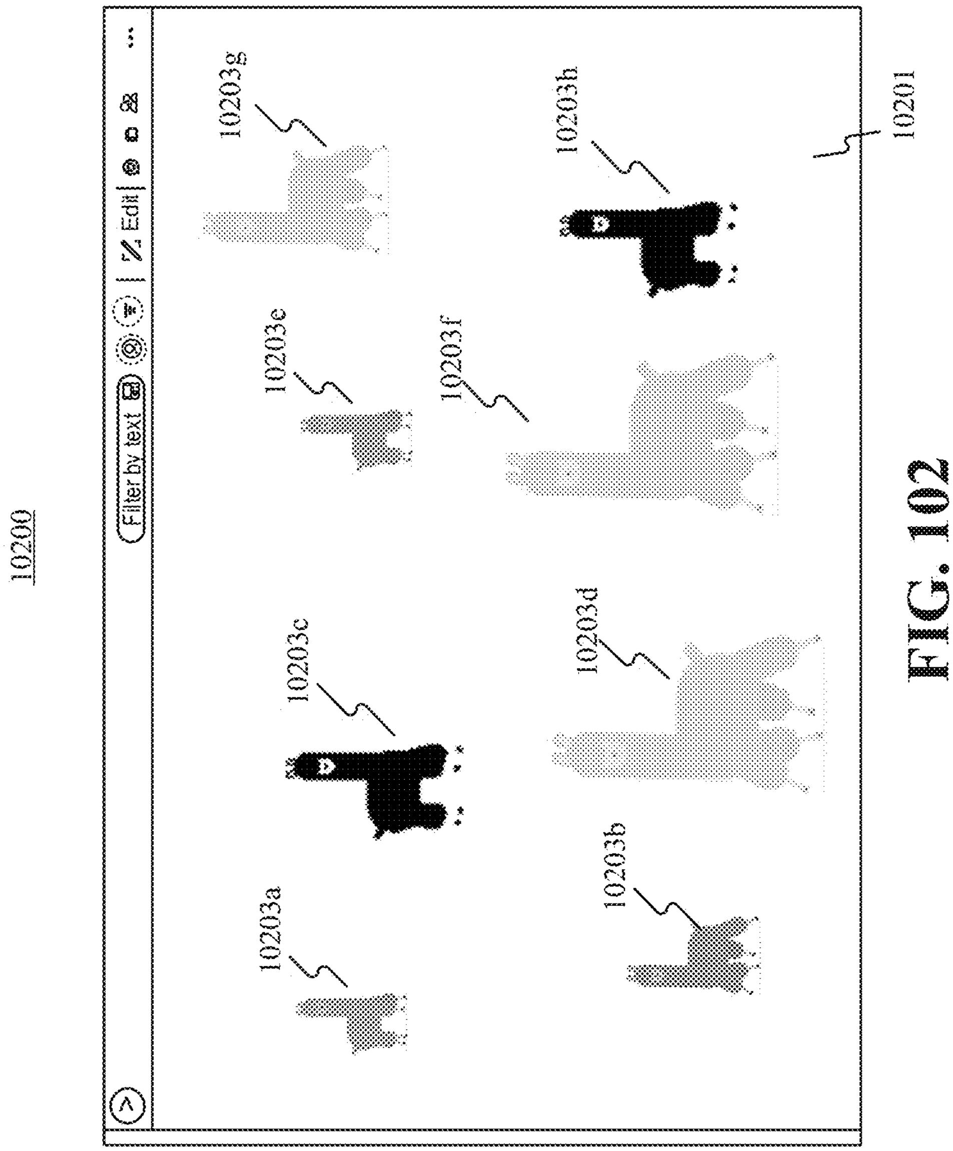
FIGS. 102 and 103 illustrate exemplary graphical representations associated with another selection of at least one cell, consistent with some embodiments of the present disclosure.

For example, FIG. 102 illustrates a graphical representation 10201 associated with the second selection of at least one cell, consistent with disclosed embodiments. Dashboard 10200 in FIG. 102 may be the same as dashboard 9700 in FIG. 97. As shown in FIG. 102, a graphical representation may consist of one or more depictions, in this case llamas (e.g., llama 10203*a*, 10203*b*, 10203*c*, 10203*d*, 10203*e*, 10203*f*, 10203*g*, or 10203*h*). Llamas are illustrated by way of example only. Any depiction of an object may be used, as discussed above. The depictions may correspond to information associated with the second selection of at least one cell. As illustrated in FIG. 102, for example, each llama may represent one of the eight tasks with a "Stuck" status associated with either Person 1 (e.g., as a result of selection of "Person 1" cell 9501 discussed in connection with FIG. 95) or Person 2 (e.g., as a result of selection of "Person 2" cell 10001 discussed in connection with FIG. 100). Comparing graphical representation 10201 in FIG. 102 with graphical representation 9701 in FIG. 97, it can be seen that three new depictions corresponding to tasks associated with Person 2 are present in graphical representation 10201 in FIG. 102. However, other methods of illustrating information associated with a second selection may be used, such as through alphanumeric characters, videos, images, VR or AR objects, or any other representation of data. As a result of a user interaction (e.g., mouse click or hover), additional information associated with each of the eight tasks may be presented to the user (not shown).

In some embodiments, the graphical representation may be altered as a result of a second selection performed from the graphical representation or a different graphical representation. For example, a user may perform an interaction (e.g., a mouse click) with a depiction (e.g., a llama) in a graphical representation associated with a table, resulting in the selection of least one cell in the table associated with the depiction, as described above. As a result of the user interaction with the depiction, the graphical representation may be altered to display information associated with the at least one cell associated with the depiction. In this manner, the user may intuitively and efficiently modify graphical representations without being required to select information directly from the table. In some embodiments, one or more additional graphical representations may be generated or altered as a result of the interaction with the depiction.

Figure 103:
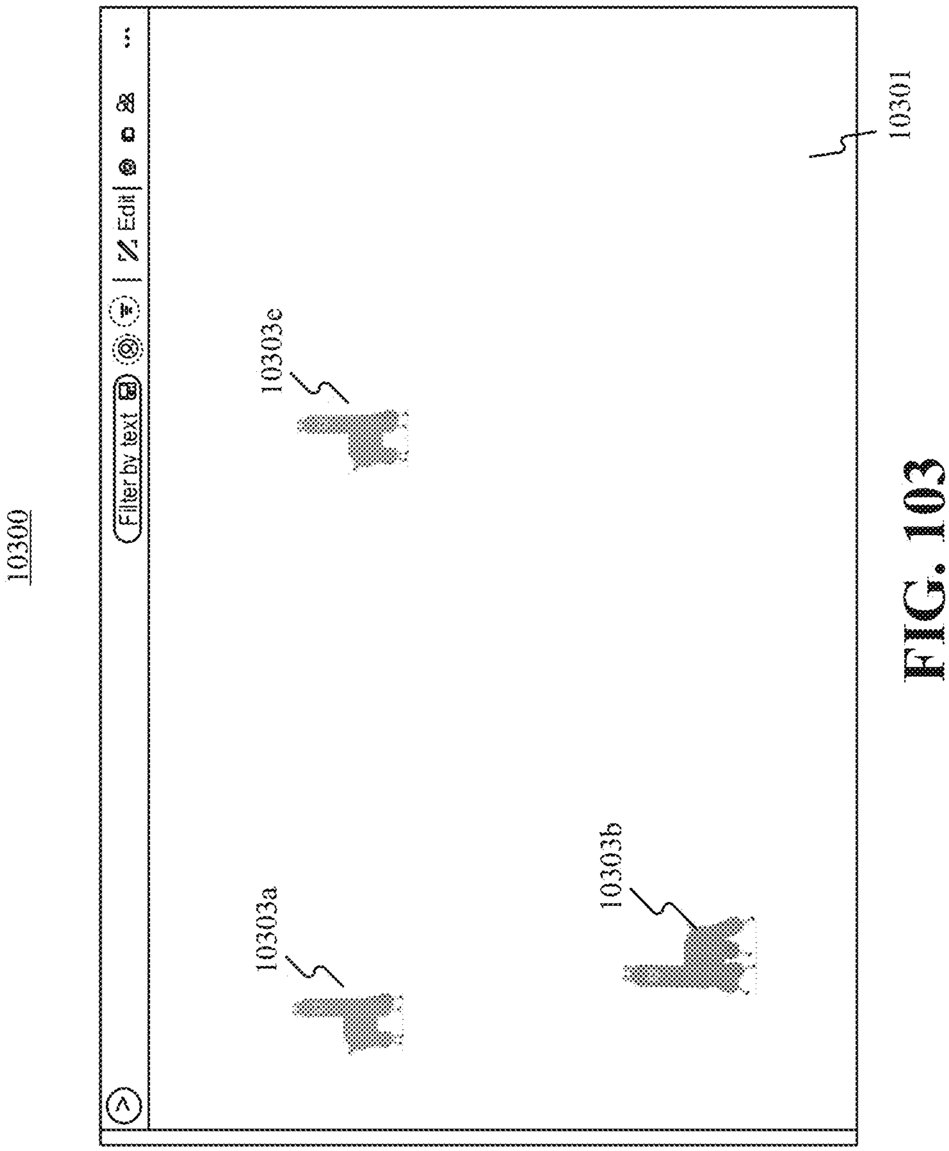

For example, FIG. 103 illustrates a graphical representation 10301 altered as a result of a second selection performed within the graphical representation, consistent with disclosed embodiments. Dashboard 10300 in FIG. 103 may be the same as dashboard 10200 in FIG. 102. Graphical representation 10201 in FIG. 102 may be altered as a result of a user interaction (e.g., a mouse click) with a depiction, such as llama 10203*a*. As a result of the user interaction, graphical representation 10201 may be modified to display only information associated with llama 10203*a*, as can be seen from comparing graphical representation 10201 in FIG. 102 with graphical representation 10301 in FIG. 103. In FIG. 103, graphical representation may include only depictions associated with the second selection, that is gray llamas associated with the status "Done" (e.g., llamas 10303*a*, 10303*b*, and 10303*e*). However, other methods of illustrating information associated with a second selection may be used (e.g., alphanumeric characters, videos, images, VR or AR objects, or any other representation of data) as discussed above. In addition, other graphical representations may be generated or altered as a result of the user interaction with llama 10203*a* in FIG. 102 (not shown).

The at least one processor may be configured to generate a second selection-dependent link between the at least one table and the graphical representation, consistent with disclosed embodiments. A second selection-dependent link may be generated in the same or similar manner as the first selection-dependent link as described above (e.g., as one or more instructions, signals, logic tables, logical rules, logical combination rules, logical templates, or any operations suitable such that when information associated with the second selection is updated in the at least one table, the graphical representation changes). Additionally or alternatively, a second selection-dependent link may be associated with two or more graphical representations at once, such as those stored in or associated with a repository, dashboard, widget, database, in local memory on a user device, in a local network, or in any other electrical medium, as described above in connection with the first selection-dependent link. In some embodiments, the second selection-dependent link may be associated with any information, features, or characteristics associated with one or more columns, one or more rows, or both, in the at least one table, such as specific status values, projects, countries, persons, teams, progresses, or a combination thereof.

Figure 104:
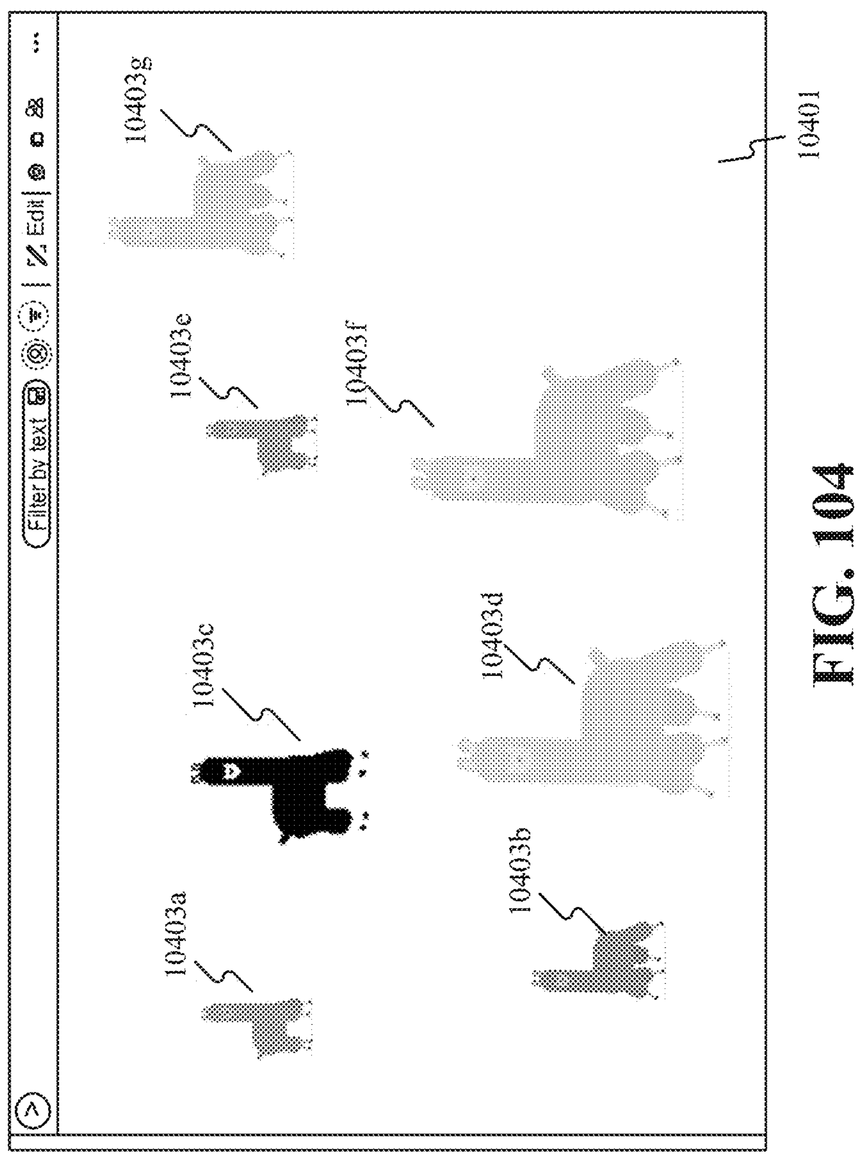
FIG. 104 illustrates an exemplary graphical representation that has changed when information associated with a selection is updated, consistent with some embodiments of the present disclosure.

For example, FIG. 104 illustrates an exemplary graphical representation 10401 that changed when information associated with the second selection was updated, consistent with disclosed embodiments. Dashboard 10400 in FIG. 104 may be an updated version of dashboard 10200 in FIG. 102. A depiction associated with a task (e.g., a llama) may be deleted, added, modified, or otherwise changed in response to a change in the underlying task. As shown in FIG. 104, for example, as a result of a second selection-dependent link, a llama corresponding to a task (e.g., llama 10203*h* in FIG. 102) may be removed when the task is no longer associated with the second selection, such as when a person associated with the task (e.g., "Person 2") is no longer associated with the task, the person has completed the task, the task no longer has a "Stuck" status, or for any other reason such that the task no longer meets the criteria corresponding to the second selection. Other forms of updates, however, may result in changes in the graphical representation, such as addition, deletion, modification, duplication, reduction, or other alterations in data.

In some embodiments, a graphical representation may be changed as a result of a second selection-dependent link due to a second selection performed from within the graphical representation or a different graphical representation. For example, one or more depictions (e.g., llamas) may be added, deleted, or modified in a graphical representation when the underlying table changes.

For example, graphical representation 10301 in FIG. 103 may be modified as a result of a second selection-dependent link due to a second selection of llama 10303*a* described above. When a task associated with a depiction, such as llama 10303*e*, is no longer associated with the second selection, then the depiction may be deleted. Other modifications may be performed, depending on the change in the underlying table, as described above.

The at least one processor may be configured to cancel the first selection in response to the second selection, consistent with disclosed embodiments. "Cancel" and variations thereof may refer to processes or procedures of removing, deleting, destroying, erasing, nullifying, negating, or any manner of neutralizing the effect of a selection. For example, a first selection of a first person may result in a graphical representation (e.g., a pie chart, bar chart, or widget) showing information associated with the first person. Subsequently, a second selection of a second person may result in the graphical representation no longer showing information associated with the first person, but rather only information associated with the second person.

Figure 105:
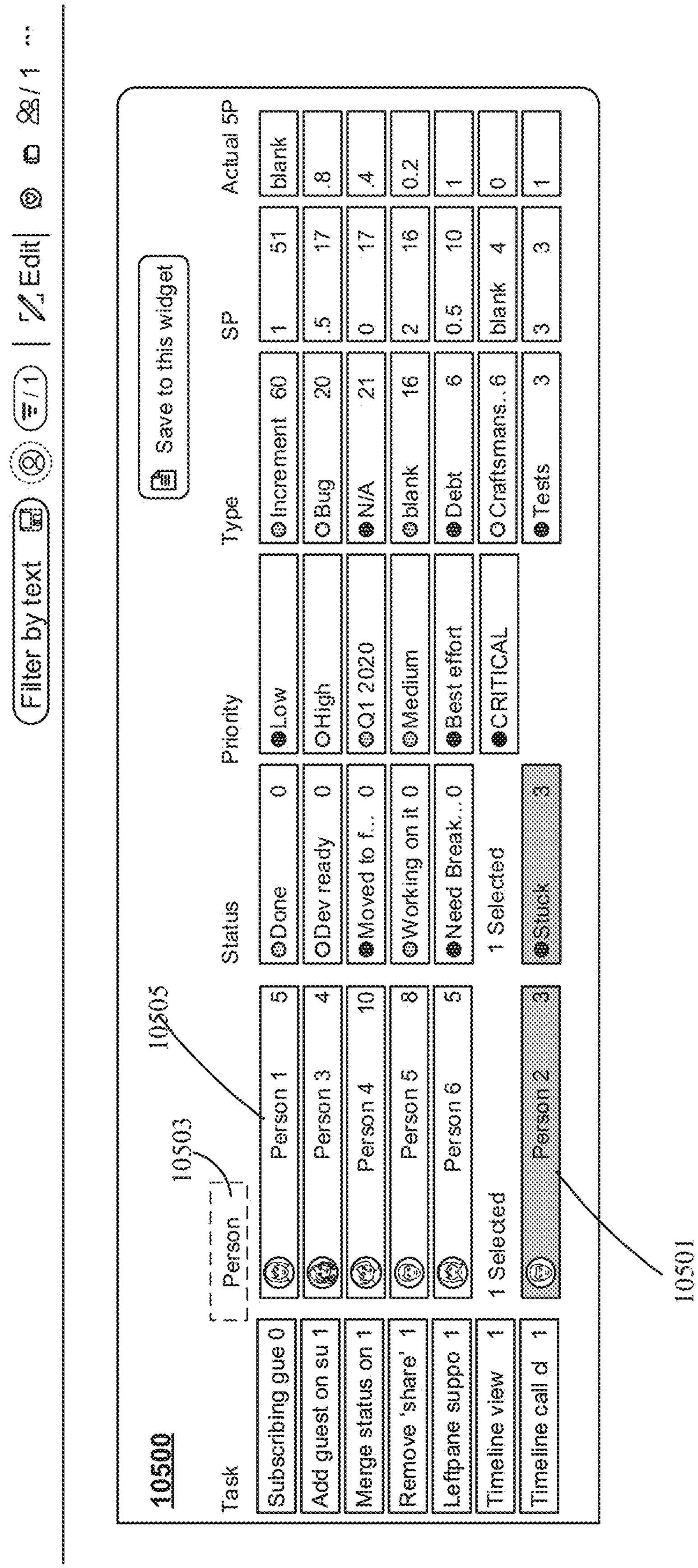
FIG. 105 illustrates an exemplary table where a first selection is cancelled in response to a second selection, consistent with some embodiments of the present disclosure.

For example, FIG. 105 illustrates an exemplary table 10500 where a first selection has been cancelled in response to a second selection, consistent with disclosed embodiments. Table 10500 in FIG. 105 may be the same as table 9600 in FIG. 96. In FIG. 105, a second selection of at least one cell 10501 ("Person 2") associated with "Person" column 10503 is selected, for example, by a user interaction (e.g., mouse click) with the at least one cell 10501. As shown in FIG. 105, the selection of the at least one cell 10501 may result in the cancellation of a first selection of at least one cell 10505 ("Person 1"). As compared to the at least one cell "Peron 1" in FIG. 96, the at least one cell 10505 in FIG. 105 can be seen to revert back to its original state, which may be indicated by a change in color, size, font, or any other attribute associated with the at least one cell as compared to selected cells. While the cancellation of the first selection in FIG. 105 is partial (i.e., only cancelling the selection of "Person 1" cell), other forms of cancellations may be implemented, such as a full cancellation (i.e., also cancelling the selection of "Stuck" cell), a temporary cancellation, a random cancellation, or any other suitable process to determine the cancellation of a selection.

The at least one processor may be configured to receive a cancellation of the second selection, consistent with disclosed embodiments. A cancellation of the second selection may be received through any user action, such as a mouse click, a cursor hover, a mouseover, a button, a keyboard input, a voice command, an interaction performed in virtual or augmented reality, or any other action by a user received via the at least one processor. Following the cancellation receipt, the first selection may be revived. In this context, "revived" and variations thereof may refer to processes or procedures of re-rendering, adding, reconstructing, restoring, or any manner of recovering the effect of a previous selection.

For example, as a result of a cancellation receipt of a second selection of at least one cell 10001 ("Person 2") discussed in connection with FIG. 100 (e.g., through a mouse click, hover, or any other user interaction), table 10000 in FIG. 100 may revert back to table 9600 in FIG. 96, corresponding to the first selection.

As a further example, as a result of a user interaction with depiction 10101 (gray "Done" segment for "Person 5") discussed in connection with FIG. 101 (e.g., through a mouse click, hover, or any other user interaction), the second selection associated with depiction 10101 may be cancelled in the underlying table. Accordingly, graphical representation 10100 in FIG. 101 may revert back to graphical representation 9901 in FIG. 99.

The at least one processor may be configured, upon revival of the first selection, to revert the graphical representation to a prior state, consistent with disclosed embodiments. The graphical representation may revert back to a prior state by returning to a previous condition, period, or content, such as to represent information associated with a previous set of circumstances. For example, continuing the example above, a receipt of a cancellation of the second selection of the second person may result in the graphical representation no longer showing information associated with the second person, but rather may be restored to show the information associated with the first person.

For example, upon revival of the first selection of at least one cell "Person 1" and at least one cell "Stuck" as depicted in table 9600 in FIG. 96, graphical representation 10201 in FIG. 102, showing "Stuck" tasks illustrated as llamas for both Person 1 and Person 2, may revert back to graphical representation 9701 in FIG. 97, showing "Stuck" tasks illustrated as llamas only for Person 1.

As a further example, following a cancellation receipt of a second selection associated with a user interaction with depiction 10101 (gray "Done" segment for "Person 5"), discussed in connection with FIG. 101 above, a revival of the underlying first selection may occur. As a result, graphical representation 10100 in FIG. 101 may revert back to graphical representation 9901 in FIG. 99 as noted above.

The at least one processor may be configured to, in response to receiving a request, generate another graphical representation based on the first and second selection-dependent links between the at least one table and the graphical representation, consistent with disclosed embodiments. A "request" may be one or more signals, instructions, operations, or any mechanism for directing a command received by the processor, such as from a second processor, a device, a network, as a result of an inquiry by the at least one processor, as a result of one or more user actions as described above (e.g., mouse click, keyboard input, voice command, or any other action received by the at least one processor), or any other information received by the at least one processor. Consistent with the definition above, the another graphical representation may refer to any visual illustration of data, such as one or more bar charts, circle charts, pie charts, dashboards, widgets, maps, tables or tabulations, flowcharts, alphanumeric characters, symbols, pictures, or a combination thereof. The another graphical representation may be generated as a result of a command, such as a cancellation receipt of the second selection, through one or more signals, instructions, operations, or any method for directing the rendering of illustrations of data. The another graphical representation may be different than the graphical representation described above, or it may be the completely or partially contained within the graphical representation, or both. It may contain any characteristic, feature, or information based on the first and second selection-dependent links between the at least one table and the graphical representation. For example, upon a receipt of a cancellation of the second selection, if the graphical representation is a pie chart, the at least one processor may cause an another graphical representation to be displayed in the form of a battery chart representing the same or similar information displayed by the pie chart based on the first and second selection-dependent links between the at least one table and the graphical representation (e.g., the selection of a person). In this manner, the user may selectively receive alternative representations of information.

Figure 106:
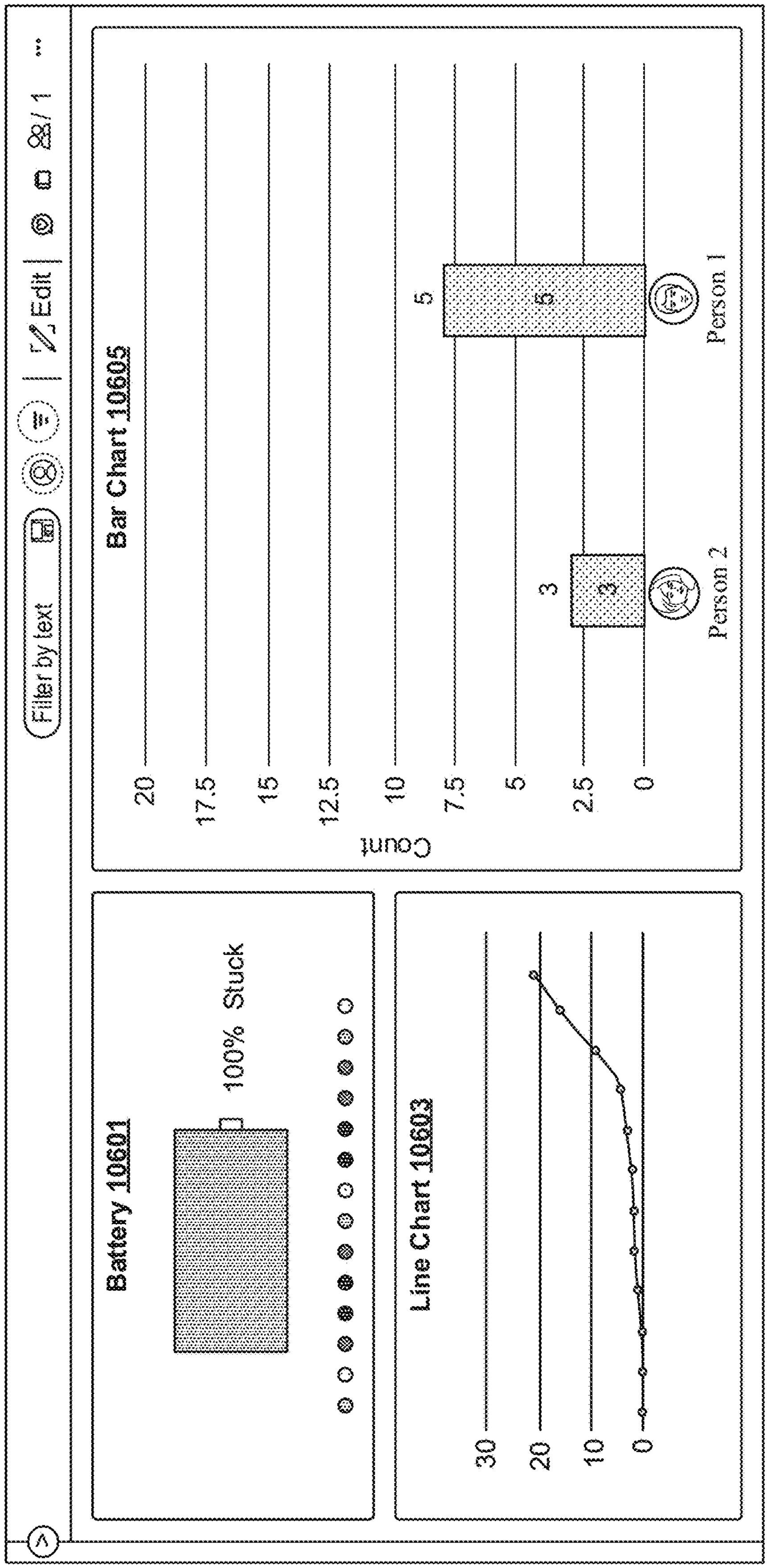
FIG. 106 illustrates another graphical representation based on first and second selection-dependent links generated upon receipt of a request, consistent with some embodiments of the present disclosure.

For example, FIG. 106 illustrates another graphical representation based on the first and second selection-dependent links generated upon receipt of a request, consistent with disclosed embodiments. As shown in FIG. 106, graphical representations other than graphical representations discussed in connection with other figures (e.g., 10201 in FIG. 102) may be displayed. For example, battery graph 10601, line chart 10603, or bar chart 10605 in FIG. 106 may be generated as a result of a request. A request may be received as a result of a user action (e.g., mouse click or hover) as described above. Comparing FIG. 106 with FIG. 90, it can be seen that the graphical representations in FIG. 106 include only information associated with "Stuck" tasks associated with Person 1 and Person 2. As a result of the first and second selection-dependent links, any changes in the underlying table with respect to any "Stuck" tasks associated with Person 1 and Person 2 (e.g., additions or deletions) may result in alterations to the graphical representations 10601, 10603, and/or 10605 (not shown).

Consistent with disclosed embodiments, the at least one processor may be configured to receive a cancellation of the second selection, and following the cancellation receipt, revive the first selection to regenerate both the graphical representation and the another graphical representation. The cancellation of the second selection may be received in the same or similar manner as described above. The first selection may be revived in the same or similar manner as described above. In this context, "regenerate" may refer to processes or procedures of re-rendering, adding, reconstructing, restoring, or any manner of recovering any illustration, data, or information associated with the graphical representation, the another graphical representation, or both.

For example, continuing the example above, upon a receipt of a cancellation of the second selection, the at least one processor may cause the pie chart (i.e., the graphical representation) and the battery chart (i.e., the another graphical representation) to display the information associated with the selection of the first person (i.e., the first selection).

In this manner, the user may be presented with multiple representations of information consistent with the user's previous selections.

Figure 107:
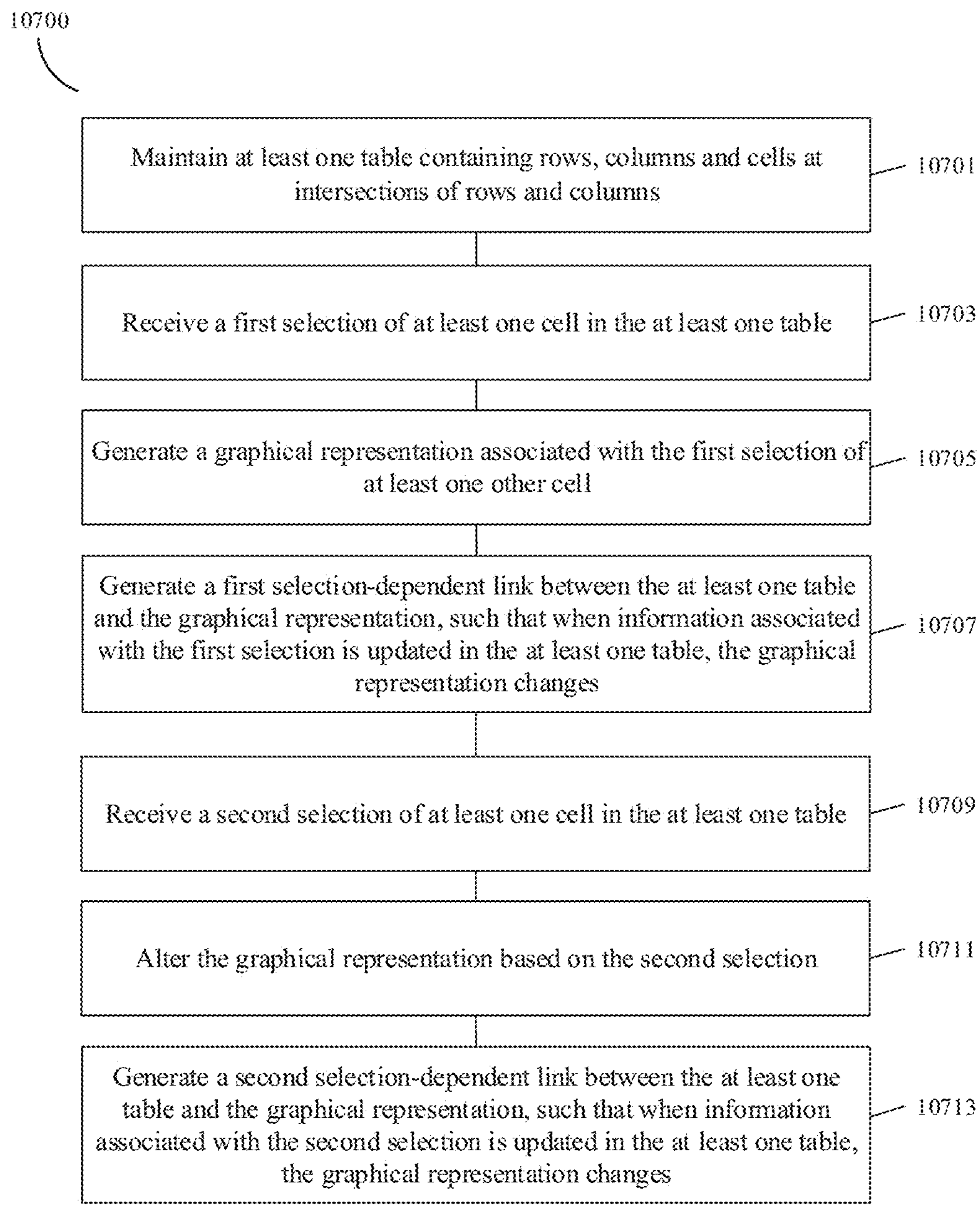
FIG. 107 is a block diagram of an example process for automatically filtering data in complex tables, consistent with some embodiments of the present disclosure.

FIG. 107 illustrates a block diagram of an example process 10700 for customizing chart generation based on table data selection, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 10700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 90 to 106 by way of example. In some embodiments, some aspects of the process 10700 may be implemented as software (e.g., program codes or instructions) that are stored in a memory (e.g., the memory portion 122 in FIG. 1) or a non-transitory computer-readable medium. In some embodiments, some aspects of the process 10700 may be implemented as hardware (e.g., a specific-purpose circuit). In some embodiments, the process 10700 may be implemented as a combination of software and hardware.

FIG. 107 includes process blocks 10701 to 10713. At block 10701, a processing means (e.g., the processing circuitry 110 in FIG. 1) may maintain at least one table containing rows, columns and cells at intersections of rows and columns (e.g., table 9201 in FIG. 92 or table 9400 in FIG. 94).

At block 10703, the processing means may receive a first selection of at least one cell in the at least one table (e.g., selection of "Person 1" cell 9501 associated with "Person" column 9503 in FIG. 95).

At block 10705, the processing means may generate a graphical representation associated with the first selection of at least one cell (e.g., graphical representation 9701 in FIG. 97 following selection of "Stuck" cell 9601 associated with "Status" column 9603 in FIG. 96).

At block 10707, the processing means may generate a first selection-dependent link between the at least one table and the graphical representation, such that when information associated with the first selection is updated in the at least one table, the graphical representation changes (e.g., graphical representation 9801 in FIG. 98 changing as a result of a change in a task associated with Person 1). In some embodiments, the first selection-dependent link may be tied to a column in the at least one table (e.g., graphical representation 9901 in FIG. 99 showing information for persons other than Person 1).

At block 10709, the processing means may receive a second selection of at least one cell in the at least one table (e.g., selection of "Person 2" cell 10001 associated with "Person" column 10003 in FIG. 100).

At block 10711, the processing means may alter the graphical representation based on the second selection (e.g., graphical representation 10201 in FIG. 102 being altered to include indicators associated with Person 2).

At block 10713, the processing means may generate a second selection-dependent link between the at least one table and the graphical representation, such that when information associated with the second selection is updated in the at least one table, the graphical representation changes (e.g., graphical representation 10401 in FIG. 104 changing as a result of a change in a task associated with Person 2).

In some embodiments, the processing means may be configured to cancel the first selection in response to the second selection (e.g., deselecting "Person 1" cell as a result of selection of "Person 2" cell 10501 in FIG. 105).

In some embodiments, the processing means may be configured to receive a cancellation of the second selection, and following the cancellation receipt, revive the first selection (e.g., table 10000 in FIG. 100 reverting back to table 9600 in FIG. 96).

In some embodiments, the processing means may, upon revival of the first selection, to revert the graphical representation to a prior state (e.g., graphical representation 10201 in FIG. 102 reverting back to graphical representation 9701 in FIG. 97)

In some embodiments, the processing means may, in response to receiving a request, generate another graphical representation based on the first and second selection-dependent links between the at least one table and the graphical representation (e.g., battery graph 10601, line chart 10603, or bar chart 10605 in FIG. 106, which are different from graphical representation 10201 in FIG. 102).

In some embodiments, the processing means may receive a cancellation of the second selection, and following the cancellation receipt, revive the first selection to regenerate both the graphical representation and the another graphical representation (e.g., a pie chart, i.e., the graphical representation, and a battery chart, i.e., the another graphical representation, displaying information associated only with a selection of a first person, i.e., the first selection).

Operation of modern enterprises can be complicated and time consuming. In many cases, managing the operation of a single project may require integration of several employees, departments, and other resources of an entity. To manage the challenging operation, project management software applications may be used. Such software applications may enable organizing, planning, and management of resources by providing project-related information in order to optimize the time and resources spent on each project. This may be accomplished using tools, functions, or rules that automatically update project-related information based on one or more formulas or conditions. However, the number of rules and/or functions that may be used with relation to a project may be virtually limitless. Current systems lack the ability to effectively and efficiently determine what rules or functions are most appropriate for a project, producing inefficient outcomes for users.

Therefore, there is a need for unconventional approaches to enable computer systems to monitor tool usage and determine tools, functions, and/or rules that may be implemented to improve efficiency of project management software applications. Various embodiments of the present disclosure describe unconventional systems, methods, and computer readable media for self-monitoring software usage to optimize performance. The various embodiments of the present disclosure describe at least a technological solution, based on improvement to operations of computer systems and platforms, to the technical challenge of determining the most appropriate tools, functions, and rules to implement on a platform by an intelligent analysis of different groupings of data in a project management platform.

Disclosed embodiments may include systems, methods, and computer-readable media related to self-monitoring software usage to optimize performance. As discussed above, some software applications, such as project management software applications, may enable organization, planning, and/or management of resources by interactively presenting project-related information that may be integrated with a variety of tools that may optimize performance. A single software application, however, may include an unlimited number of tools that may be unknown or not readily accessible to a user. For example, an average user of a spreadsheet application will likely not be knowledgeable of all of the tools available in the spreadsheet application and will therefore be unable to make the most efficient use of the application for its intended purpose. By monitoring a user's historical tool usage, the system may determine whether the user is efficiently utilizing the system to achieve the user's goals and recommend more efficient tools if the system determine that the user is not using tools that may improve their workflows. Monitoring software usage may include an analyzing the historical usage of tools in the system to determine tools that have been historically used, determine whether unused tools may improve data processing efficiency, and storing such determination to present recommendations to a user. Advantageously, disclosed embodiments may address this issue by enabling software applications to self-monitor tool usage to identify and present tools that may increase efficiency and optimize performance of the application's intended use.

Disclosed embodiments may include maintaining a table. As described previously in greater detail, a table may include data presented in horizontal and vertical rows, as previously discussed. A table may also refer to a collection of one or more groupings of data that may be associated with logical rules that serve to optimize performance and is accessible by at least one entity associated with the table. A logical rule, as described previously in greater detail, may refer to a combination of one or more automated conditions, triggers, and/or actions that may be implemented with respect to disclosed systems, methods, and computer-readable media, or it may refer to any other logical associations between one or more groupings of data. A grouping of data may refer to cells, columns, rows, tables, dashboards, widgets, templates, and/or any other data structure or a combination thereof to provide a workflow in association with a table or other workspace. An exemplary logical rule may include a plurality of automations that trigger various actions. For example, a logical rule (e.g., automation) may be configured to monitor a condition and to determine if a particular status is "complete" before the logical rule triggers an action of archiving a completed task.

Figure 108:
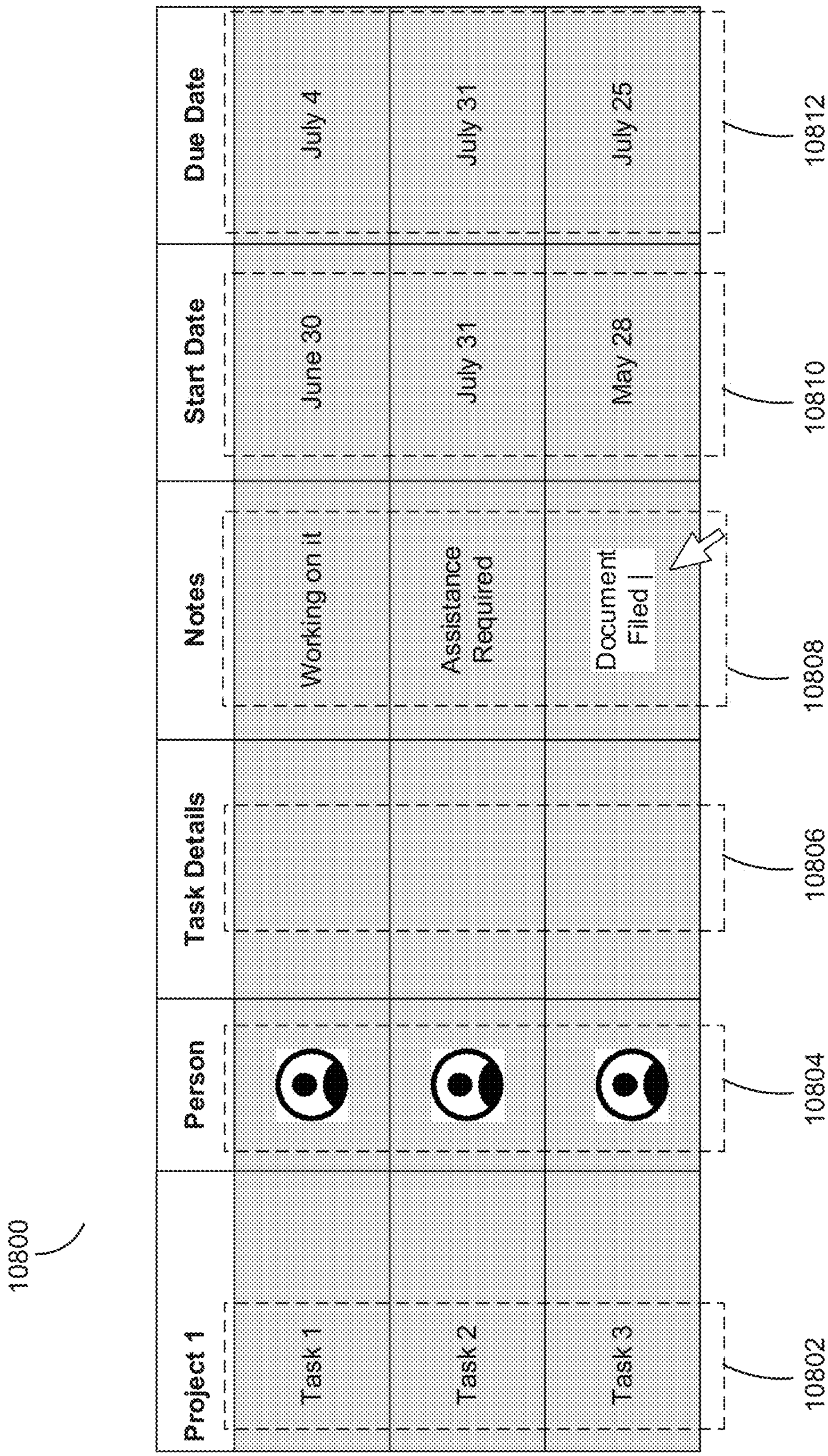
FIG. 108 illustrates an example of a table that includes multiple columns and rows, consistent with some embodiments of the present disclosure.

FIG. 108 illustrates an example of a table 10800 that may include multiple columns, consistent with embodiments of the present disclosure. In some embodiments, table 10800 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 10800 may be associated with a project and may include, in the multiple rows and columns, tasks (e.g., in rows including "Task 1," Task 2," or "Task 3") included in the project, persons (e.g., in a column 10804) assigned to the tasks, details (e.g., in a column 10806) of the tasks, notes (e.g., in a column 10808) associated with the tasks, start dates (e.g., in a column 10810) of the tasks, due dates (e.g., in a column 10812) of the tasks, or any information, characteristic, or associated entity of the project. In some embodiments, table 10800 may be associated with one or more logical rules. For example, table 10800 may be associated with an application module that is configured to perform the functionality of sending a notification to a user device associated with one or more persons in column 10804 when a due date in column 10812 passes.

Some embodiments may include presenting to an entity a plurality of tools for manipulating data in the table. An entity may refer to any user or combination of users (or their associated client devices) associated with a table, such as a table owner, an organization, a team, or any other individual(s) with access rights to the table. A tool may refer to any groupings of data or logical rules that are configured for one or more particular functionalities. By way of some non-limiting examples, a tool may include a column of a certain type (e.g., a status column, a text column, a date column, etc.), a row associating data in a plurality of columns (e.g., a row associating an individual, a task associated with the individual, and a due date associated with the task), or a logical rule that is triggered based on a condition change in one or more cells associated with a table (e.g., a rule notifying a supervisor when a task is complete). The plurality of tools may be presented to the entity through a user interface, such as a web page, a mobile-application interface, a software interface, or any graphical interface that enables interactions between a human and a machine. Manipulating data in the table may refer to adding, removing, rearranging, and/or modifying information contained in cells, columns, rows, tables, dashboards, widgets, templates, and/or any other data structure associated with the table, or it may refer to adding, removing, and/or modifying rules associated with the table.

Figure 109:
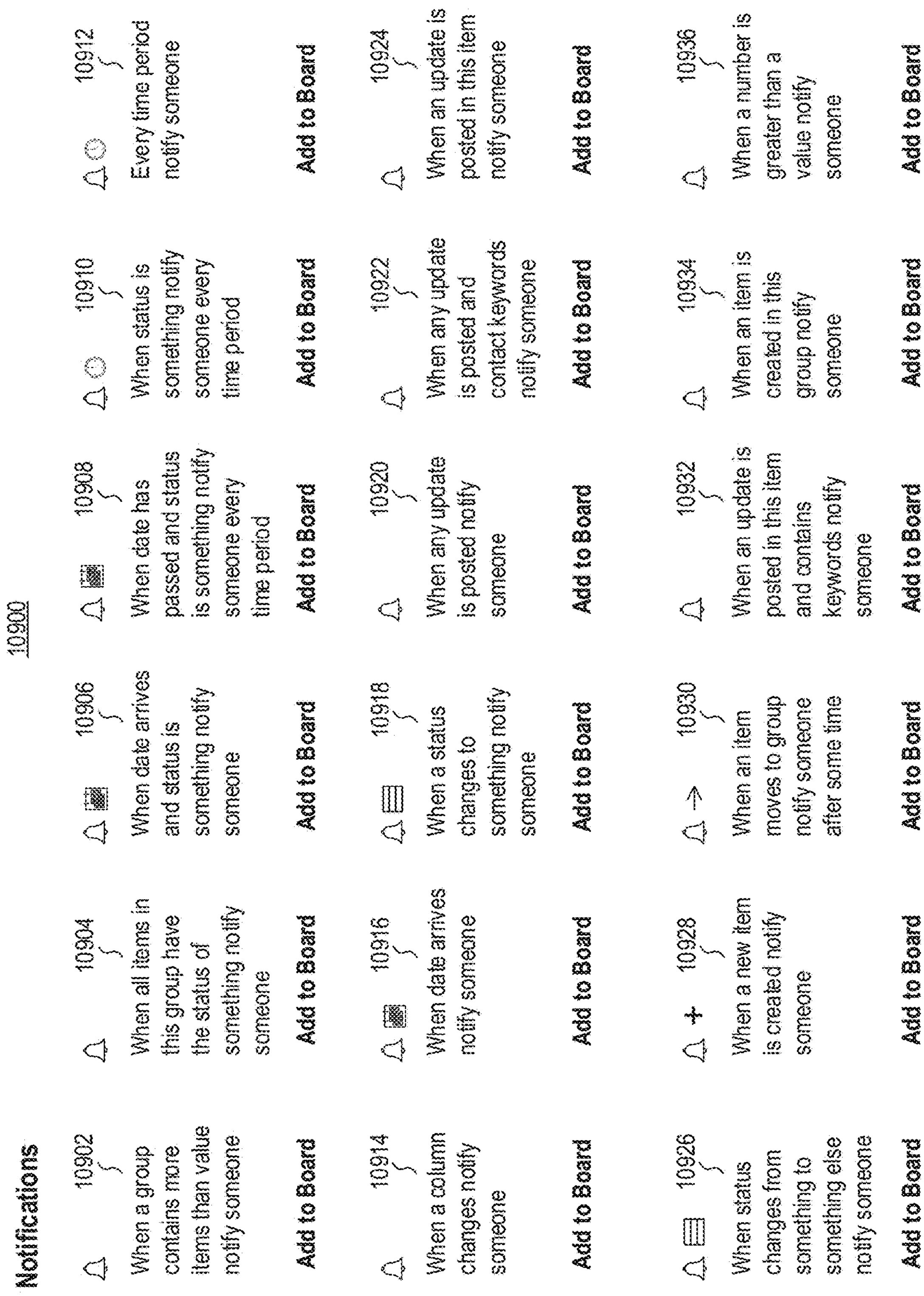
FIG. 109 illustrates an example of a logical rule notification interface, consistent with some embodiments of the present disclosure.

By way of example, a plurality of tools may be presented to an entity via table 10800, as illustrated in FIG. 108. As discussed above, table 10800 may be presented using a computing device (e.g., the computing device 100 illustrated in FIG. 1), software running thereon, or any other projecting device (e.g., projector, AR or VR lens, or any other display device). By utilizing a user interface associated with table 10800, an entity may utilize a plurality of tools for manipulating data within table 10800. For example, an entity may type notes directly into notes column 10808 (e.g., "Document Filed" in the bottom cell) or modify a date in due date column 10812. An entity may also manipulate data in the table by integrating one or more rules, for example by adding a rule that sends an email to an entity associated with table 10800 when a due date in column 10812 has passed. For example, FIG. 109 illustrates an example of a logical rule notification interface 10900, consistent with some embodiments of the present disclosure. Rule notification interface 10900 shows a visual approach to software where users do not need to have any knowledge of coding to setup specific rules for notifications. Rule notification interface includes notification rules 10902 to 10936. These exemplary automations or logical rules may, when selected, enable a user to configure a communications rule for table 10800, for example. The user may also enable multiple communications rules for a single table or may enable one or more communications rules applicable to a plurality of tables.

Aspects of this disclosure may involve monitoring tool usage by an entity to determine at least one tool historically used by the entity. Tool usage by an entity may refer to the implementation, by the entity, of one or more tools to a single table or in a plurality of tables and may be recorded in one or more data structures associated with disclosed embodiments. Monitoring tool usage may include reviewing and/or analyzing one or more metrics associated with an entity's use of one or more tools and may refer to monitoring an entity's tool usage in a single table or in a plurality of tables. For example, the system may analyze the frequency in which a tool is used with a count in a period of time. The system may analyze the frequency in which a tool is used in context of other information and logical rules contained in the table to also determine how the tool is used in relation to other information or logical rules. In some embodiments, monitoring tool usage may include monitoring a count of each instance each tool is used. A count of each instance each tool is used may refer to a total amount of times a specific tool has been implemented or a frequency at which a specific tool is implemented by the entity. Additionally or alternatively, in some embodiments, monitoring tool usage may include monitoring combinations of the at least one tool historically used by the entity. Combinations of the at least one tool historically used by the entity may refer to one or more metrics related to other tools that have been used in association with the historically used tool. In some embodiments, monitoring combinations may include monitoring a count for each combination in a plurality of combinations. Monitoring tool usage may also include monitoring the nature of an entity's interactions with certain tools, for example by performing a semantic analysis of text entered by the entity directly into text columns. By way of some non-limiting examples, monitoring an entity's tool usage may include monitoring how many times a specific notification rule is implemented (e.g., a rule that notifies an entity when a due date has passed), monitoring how often one column type is used with another column type, or monitoring how often an entity sorts a particular column in a table.

For example in FIG. 108, an entity may interface (e.g., with user device 220-1, user device 220-2, user device 220-*m* of FIG. 2) with table 10800. At least one processor (e.g., processing circuitry 110 in FIG. 1) may be configured to monitor the interactions between the entity and table 10800 for tool usage and store the usage data in at least one data structure (e.g., repository 230-1 to 230-*n*). The usage data, for example, may include language entered into notes column 10808 (e.g., "Working on it", "Assistance Required", "Document Filed"). At a time when the entity adds start date column 10810 and due date column 10812, the at least one processor may be configured to update a count stored in at least one data structure associated with each column type, and to further update a count associated with the combination of each column type.

Some disclosed embodiments may include comparing an at least one tool historically used by an entity with information relating to a plurality of tools to thereby identify at least one alternative tool in the plurality of tools whose substituted usage is configured to provide improved performance over the at least one historically used tool. An alternative tool may include any tool in the system that an entity is not currently utilizing or a tool in the system that the entity has not utilized often. The alternative tool may provide increased performance over another tool, for example, by its relative ease of use, increased automation, its capabilities, and/or computational efficiency. By way of non-limiting example, a status column may provide increased efficiency over use of a "notes" column due to due to a higher time spent by interacting with the text column (e.g., by typing). In another example, a table may be associated with a large number of tools to accomplish a single function that can be accomplished by a single alternative tool or a smaller number of alternative tools. Accordingly, the alternative tools may improve the functioning of associated systems by increasing computational efficiency. The comparison may be based on, for example, at least one of a characterized function, capability, computational efficiency, or any other associated attribute of the at least one tool historically used and the plurality of tools. Characterized functions, capabilities, computational efficiencies, and any other associated attributes may be predefined for each tool, or they may be determined based on the monitored tool usage by applying machine learning and/or artificial intelligence to stored usage data.

A comparison may be performed, by way of non-limiting example, through the use of artificial intelligence. Artificial intelligence (i.e., machine learning), as described in more detail earlier, may refer to a system or device's ability to interpret data, to learn from such data, and/or to use such learnings to achieve specific goals and tasks through flexible adaptation. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to characterize at least one of a function, capability, computational efficiency, and any other associated attribute of a tool based on stored usage data.

By way of example, at least one processor (e.g., processing circuitry 110 in FIG. 1) may be configured to compare one or more tools associated with table 10800 of FIG. 108 with a plurality of tools that may be integrated with table 10800. For example, the at least one processor may apply artificial intelligence to notes column 10808 to characterize the function of notes column 10808. The artificial intelligence may be configured, in this example, to perform a semantic analysis of text columns to characterize their function and/or capabilities and may determine that notes column 10808 frequently contains language related to a task status. Based on comparing this characterized function of notes column 10808 with the plurality of tools, the at least one processor may determine that replacing notes column 10808 with a status column would increase performance (e.g., by enabling a user to selected predefined variables instead of manually typing in the status). In another example, the at least one processor may be configured to analyze the data associated with the entity's historical use of due date column 10812 to determine that the entity frequently uses due date column 10812 with start date column 10810. Based on this determination, the at least one processor may characterize the function of the combination as a timeline function and may determine that a timeline column would increase performance and processing efficiency (e.g., by reducing the number of columns).

In some embodiments, comparing may include performing semantic analysis of the table to identify a table context and wherein the at least one alternative tool may be identified at least in part on the table context. The semantic analysis may, as discussed above, involve artificial intelligence, and may be applied to column titles, logical sentence structures, task titles, or any other language data associated with the maintained table. For example, the semantic analysis may be configured to detect at least one language usage (e.g., words, numbers, symbols, dialect, language, phraseology, terminology, sentence structure) and associate the language use with at least one context and may determine a table context based on the at least one context. The at least one alternative tool may be identified at least in part on the table context due to an association with between the table context and the at least one alternative tool. The table context may include any information contained in the table or as data associated with the table (e.g., metadata or account information). In some embodiments, the table context may be at least one of a field, vocation, task, or function. By way of example, a table context may relate to scheduling, and an alternative scheduling tool may be identified based on its association with the scheduling table context.

By way of example in FIG. 108, at least one processor (e.g., processing circuitry 110 in FIG. 1) may be configured to perform a semantic analysis on language usage in any and all cells of table 10800, such as the cells in project column 10802, person column 10804, task details column 10806, start date column 10810, due date column 10812, and each of the columns' title cells. In this example, artificial intelligence may be applied to determine that the table is associated with a legal context, at least based on terminology in the bottom of notes column 10808 (i.e., "document filed"). Accordingly, at least one alternative tool may be identified based on its association with the legal context. For example, targeted document filing due date column may be identified as an alternative with the improved performance of increased workflow organization. In this example, the at least processor determines the table context based on data contained in a single cell. However, it is understood that the semantic analysis as disclosed herein may be configured to determine at least one table context based on data contained in any number or combination of cells.

Disclosed embodiments may include presenting to the entity during a table use session a recommendation to use the at least one alternative tool. The recommendation to use the at least one alternative tool may be presented at any preconfigured or appropriate time or interface event, for example in a pop-up window, a webpage, or a drop-down menu, or other similar notification or prompting mechanisms associated with a user interface accessible with the entity. The recommendation may include information regarding the at least one alternative tool and/or provide an option to implement the tool via a suitable user interface. In some embodiments, for example, the recommendation may include information about a tool newly added to the plurality of tools (e.g., a newly developed tool introduced to the system), or it may include providing the entity with an identification of the improved performance (e.g., time saved, number of reduced columns, increased computational efficiency). In some embodiments, the improved performance of implemented recommendations may be monitored, stored such that improved performance statistics may be presented to or accessed by at least one entity with access rights to improved performance data (e.g., a table administrator, workflow specialist, supervisor).

Consistent with some disclosed embodiments, presenting the recommendation may be threshold-based and may be displayed on any device as described previously. A threshold may refer to at least one unit associated with any usage metric as discussed herein, that when reached or exceeded by the usage metric triggers at least in part the presenting of the at least one alternative tool. For example, at least one processor may be configured to present the at least one alternative tool at a time when the monitored at least one historically used tool by the entity meets or exceeds a count, frequency, or a combination related threshold. In some embodiments, for example, a threshold may also be related to an entity affinity level associated with a tool that may be determined by applying artificial intelligence to the stored usage data.

Some disclosed may include presenting the at least one alternative tool at a time when the entity accesses the at least one historically used tool. As discussed above, presenting the at least one at any preconfigured or appropriate time or interface event, such as a threshold being met. Additionally or alternatively, the recommendation may be presented when a certain tool is accessed, for example a status column or a sorting tool. Accordingly, at least one tool may be presented one time or every time the historically tool is accessed if the at least one tool has been identified as an alternative tool that may increase efficiency over the historically used tool, or the at least one alternative tool may be presented at the first time the historically used tool is used after an associated usage threshold has been met.

Figure 110:
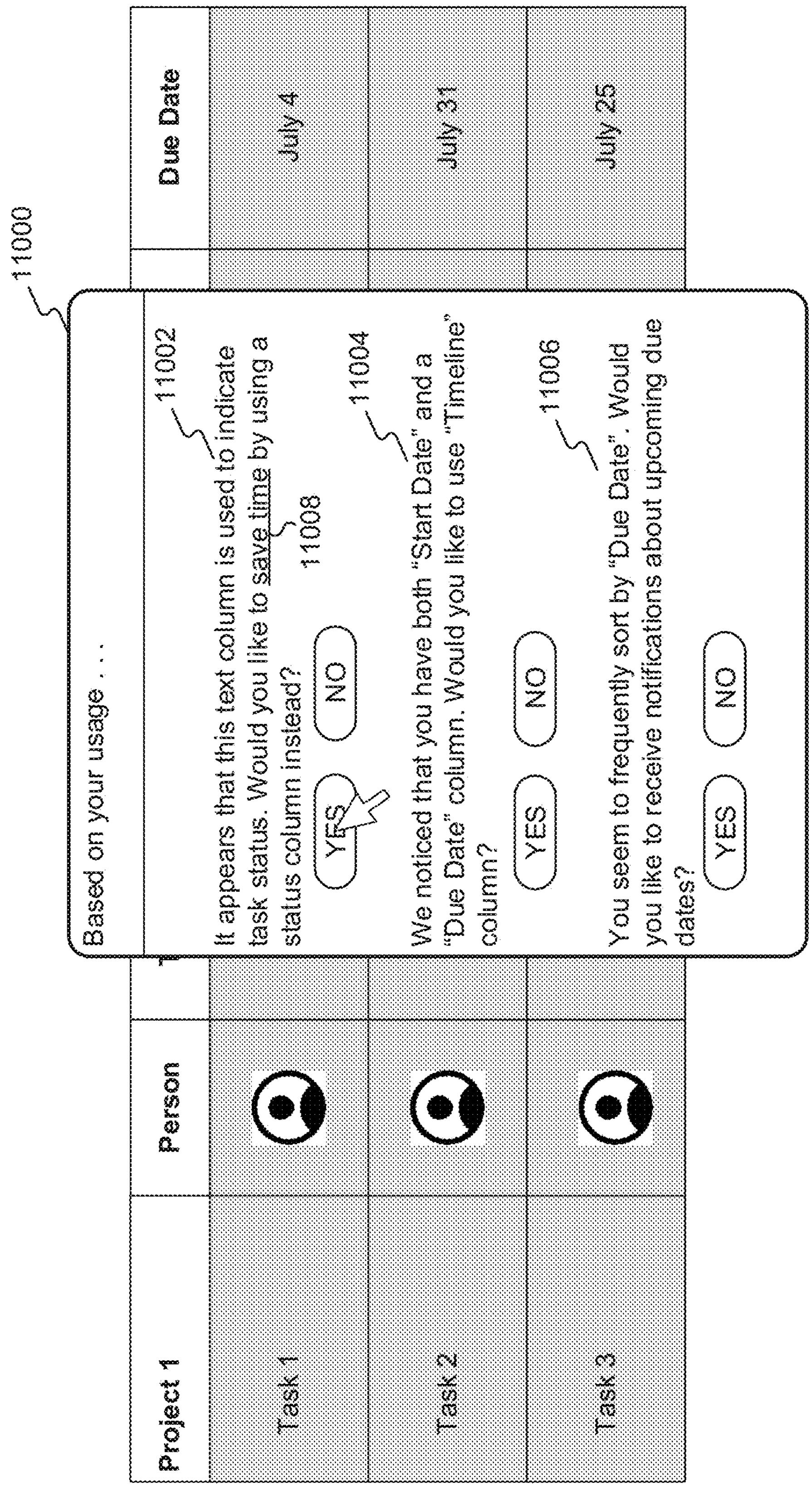
FIG. 110 illustrates an example of an interface for enabling selection of multiple tool recommendations, consistent with some embodiments of the present disclosure.

FIG. 110 illustrates an example of an interface 11000 for enabling selection of multiple tool recommendations, consistent with some embodiments of the present disclosure. Interface 11000 for example, may be presented based at least one threshold being met with regard to one of the historically used tools associated with recommendations 11002, 11004, and 11006. Although interface 11000 is illustrated as providing three recommendations, it is to be understood that any number of recommendations may be presented at a single time. In some embodiments, a user can hover over or click hyperlink 11008 ("save time") to view one or more metrics of improved performance associated with adopting recommendation 11002 (i.e., a status column) as an alternative to the historically used tool (i.e., a text column). Interface 11000 may be presented, for example, based at least on a count of times an entity sorts by "Due Date" exceeding a threshold. Additionally or alternatively, interface 11000 may be presented based on an entity accessing the sorting tool.

In some disclosed embodiments, the presented recommendations may include, via a user interface, options to accept or decline a specific recommendation. Accepting a specific recommendation may cause the associated alternative tool to be implemented in the current table, another table, or a plurality of tables, and declining a recommendation may prevent the associated alternative tool from being implemented whatsoever. Some embodiments may include, for example, identifying an instance where a specific recommendation is declined, and future presentation of the specific recommendation is thereafter disabled. Disabling future presentation may include removing the declined tool from the plurality of tools, intercepting the specific recommendation of the alternative tool from presentation, or otherwise preventing future presentation of the declined tool without affecting the ability of an entity to access the declined tool in the future (e.g., the entity may still access the declined tool). Additionally or alternatively, some embodiments may include a recommendation center (e.g., a webpage) that allows authorized entities to adjust recommendation settings, such as by promoting, blocking, or modifying certain recommendations.

Figure 111:
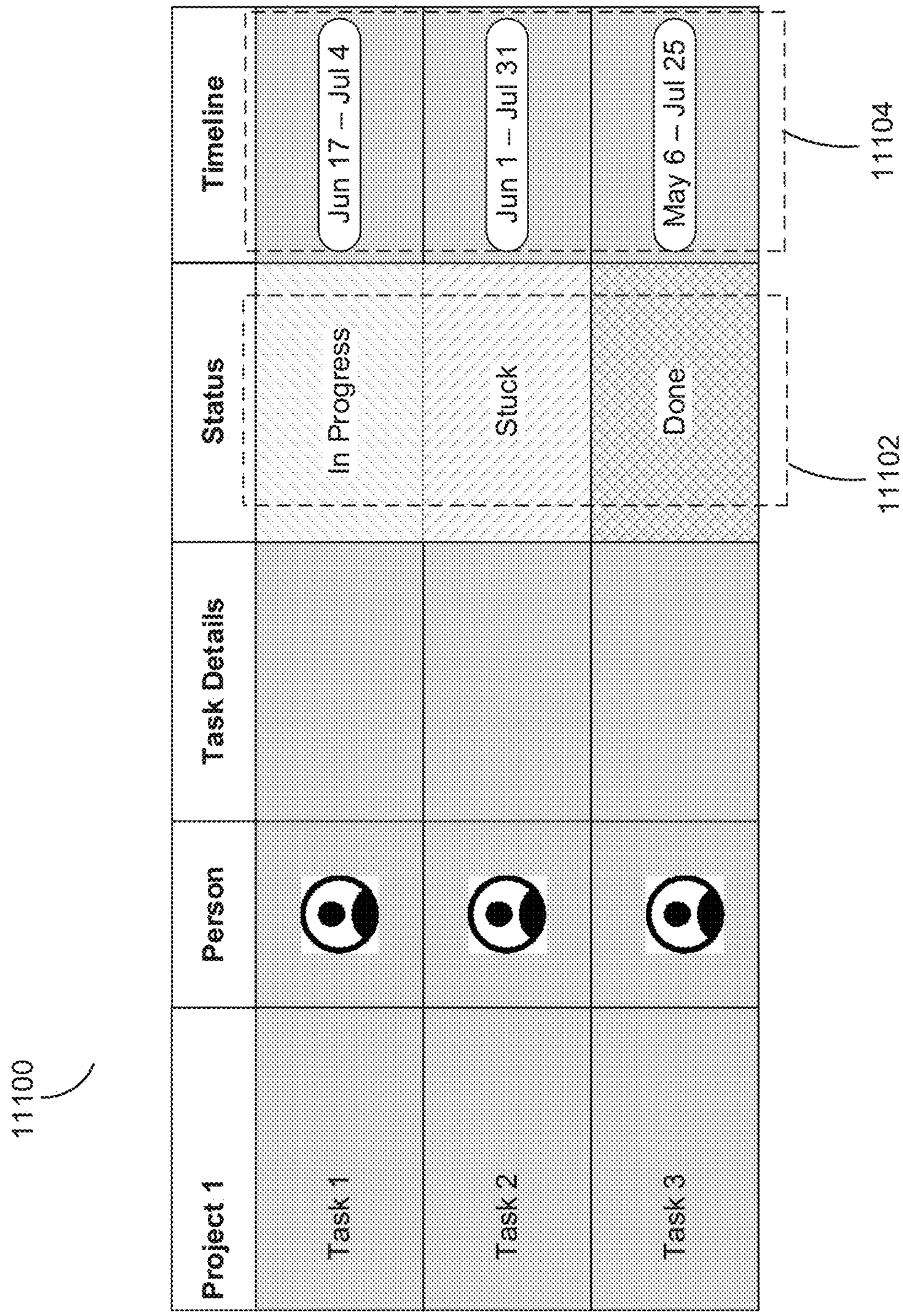
FIG. 111 illustrates an example of a table with implemented tool recommendations, consistent with some embodiments of the present disclosure.

By way of example, assume a user selects "YES" for recommendations 11002 and 11004 but selects "NO" for recommendation 11006. Accordingly, the alternative tools associated with recommendations 11002 and 11004 may be automatically integrated into the table, whereas the alternative tool associated with 11006 would not be integrated. In some embodiments, future presentation of recommendation 11006 may be disabled based on being declined. By way of example, FIG. 111 illustrates an example of a table 11100 with implemented tool recommendation according to this scenario, consistent with some embodiments of the present disclosure. As shown, table 11100 may include status column 11102 integrated because of an acceptance of recommendation 11002 and timeline column 11104 integrated because of an acceptance of recommendation 11004. Not shown is that the alternative tool in recommendation 11006 is not integrated in table 11100 due to the recommendation being declined.

Some disclosed embodiments may include maintaining a list of restricted tools and withholding a recommendation to a use a tool when the tool is on the restricted list. A list of restricted tools may refer to a list of tools maintained by an entity (e.g., an administrator, a service provider of disclosed systems, etc.), and may include tools restricted from a single entity and/or table or a plurality of entities and/or tables. An entity or table may be restricted from using a tool for example, based on a decision by an administrator, or it may be based on the table or entity not having unlocked the restricted tools. By way of some non-limiting examples, an entity may be restricted from a tool because they do not have a plan (e.g., a subscription) that allows for the use of such tools.

By way of example, in FIG. 110, recommendation 11006 may not be included in interface 11000 because the recommended tool is on a restricted list of tools associated with the entity. Alternatively, recommendation 11006 may be included in interface 1100, despite the recommended tool being on a restricted list associated with the entity. However, if the entity selects "YES" for recommendation 11006, at least one processor may be configured to present to the entity information about a plan associated with the restricted tool in recommendation 11006.

Figure 112:
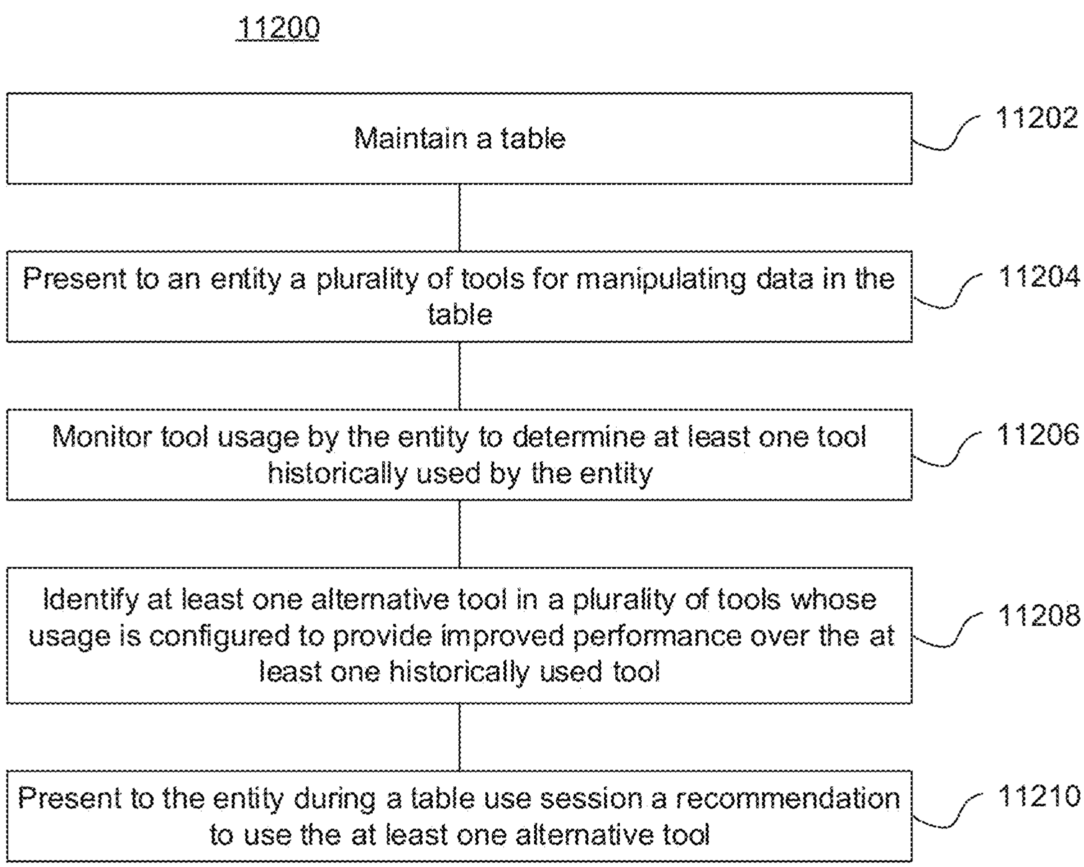
FIG. 112 illustrates a block diagram of an example process for self-monitoring software usage to optimize performance, consistent with some embodiments of the present disclosure.

FIG. 112 illustrates a block diagram of an example process 11200 for self-monitoring software usage to optimize performance, consistent with some embodiments of the present disclosure.

Process 11200 includes process blocks 11202 to 11210. At block 11202, a processing means may maintain a table, as discussed previously in the disclosure above.

At block 11204, the processing means may present to an entity a plurality of tools for manipulating data in the table, as discussed previously in the disclosure above.

At block 11206, the processing means may monitor tool usage by the entity to determine at least one tool historically used by the entity, as discussed previously in the disclosure above.

At block 11208, the processing means may identify at least one alternative tool in a plurality of tools whose usage is configured to provide improved performance over that at least one historically used tool. In some embodiments, identifying the at least one tool may be based on comparing the at least one tool historically used by the entity with information relating to the plurality of tools, as discussed previously in the disclosure above.

At block 11210, the processing means may present to the entity during a table use session a recommendation to use the at least one alternative tool, as discussed previously in the disclosure above.

Some disclosed embodiments may include systems, methods, and computer-readable media related to predicting required functionality and for identifying application modules for accomplishing the predicted required functionality. An application module may refer to a logical combination of rules described herein or any other logical associations between cells, columns, rows, tables, dashboards, widgets, templates, and/or any other data structure or a combination thereof to provide a workflow in association with a table or other workspace. An application module may include a single logical sentence structure or a plurality of logical sentence structures that may be associated with a table. Exemplary application modules may include at least one logical sentence structure (e.g., automation) that triggers different actions when certain conditions are met. Application modules may include a plurality of automations that trigger various actions, thereby providing various functionalities. A functionality may include an output of an application module that may be triggered upon one or more conditions relating to a status of one or more data structures. For example, an application module (e.g., automation) may be configured to monitor a condition and to determine if a particular status is "complete" before the application module triggers an action of archiving a completed task. This application module may be said to include an archiving functionality. Predicting a required functionality may include an analysis, comparison, or any other lookup of characteristics associated with a table to determine commonly associated functions of the table. For example, where a table is organized with team members and contact information (e.g., email addresses, phone numbers, or any other contact information), the system may be configured to predict that the author of the table may desire to adopt an application module with a notification functionality (e.g., an automation that triggers an email to be sent to certain team members).

Figure 113:
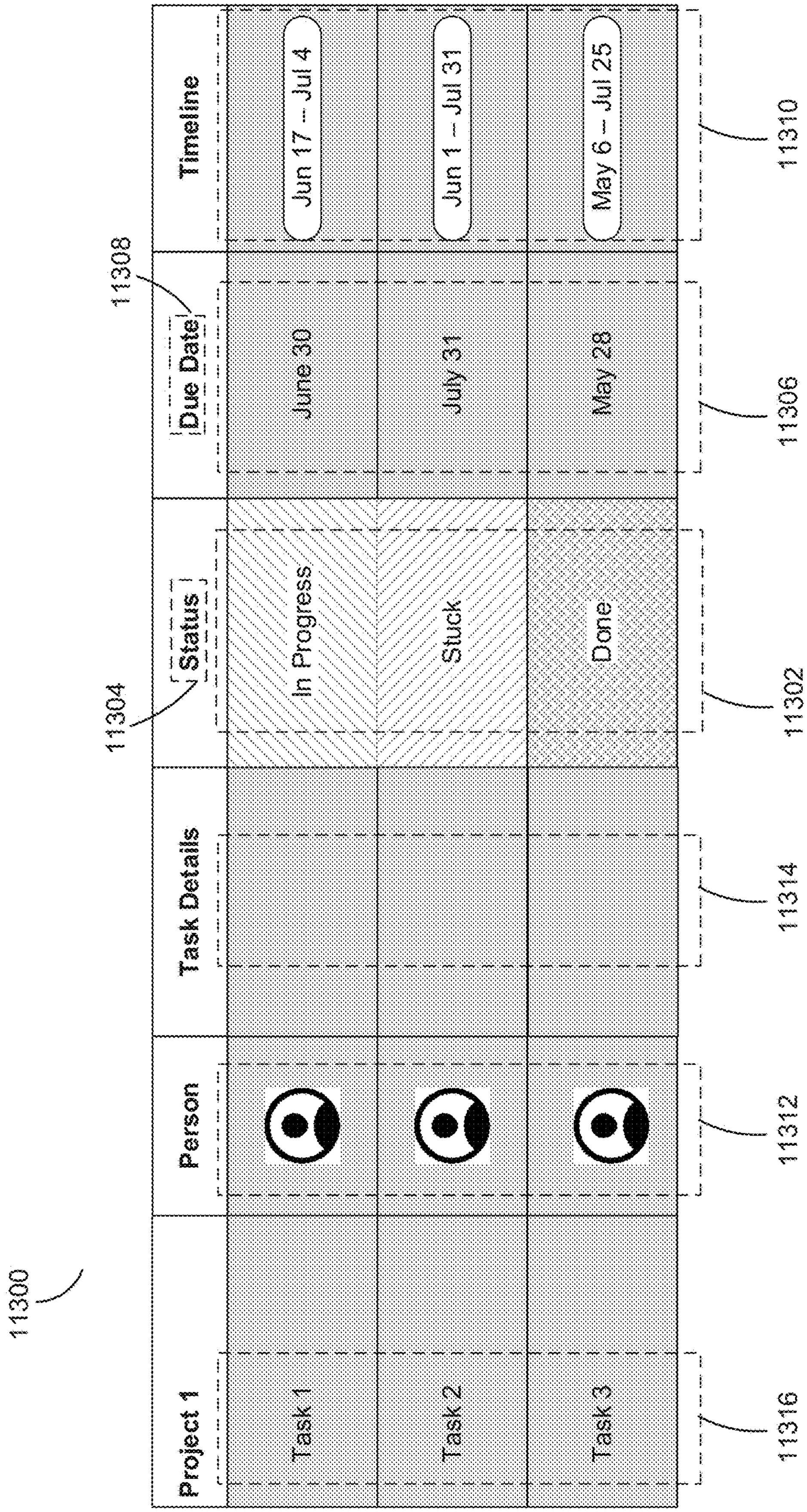
FIG. 113 illustrates an example of a table that includes multiple columns and rows, consistent with some embodiments of the present disclosure.

FIG. 113 illustrates an example of a table 11300 that may include multiple columns, consistent with embodiments of the present disclosure. In some embodiments, table 11300 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 11300 may be associated with a project and may include, in the multiple rows and columns, tasks (e.g., in rows including "Task 1," "Task 2," or "Task 3") included in the project, persons (e.g., in a column 11312) assigned to the tasks, details (e.g., in a column 11314) of the tasks, statuses (e.g., in a column 11302) of the tasks, due dates (e.g., in a column 11306) of the tasks, timelines (e.g., in a column 11310) of the tasks, or any information, characteristic, or associated entity of the project. In some embodiments, table 11300 may be associated with one or more application modules. For example, table 11300 may be associated with an application module that is configured to perform the functionality of sending a notification to a user device associated with one or more persons in column 11312 when one or more statuses in column 11302 changes. Application modules may be applied to exemplary table 11300 and required functionalities may be predicted based on what is contained in table 11300. For example, table 11300 includes a status column 11302, due date column 11306, and person column 11312. In response to detecting these column types, the system may predict that the owner of table 11300 may require functionality to send an alert to individuals assigned in the person column 11312 regarding tasks that do not yet have a "Done" status as a certain due date approaches a current date. The application modules may be predicted and recommended according to aspects of this disclosure discussed in further detail below.

Disclosed embodiments may include outputting a logical sentence structure template for use in building a new application module. A logical sentence structure (e.g., an automation) may include a logical organization of elements for implementing a conditional action. In some embodiments, the logical sentence structure may include a semantic statement or a rule (e.g., a sentence) that may be used to represent a functionality of a new application module. Logical sentence structures may be used to monitor conditions in a single table, in multiple tables of a single user, or multiple tables across multiple users. Further, logical sentence structures may be implemented to trigger actions in the single table or multiple tables of a single or multiple users. A logical sentence structure template may refer to a logical sentence structure in a template format that may be ready for configuration by the system of a user.

Figure 114:
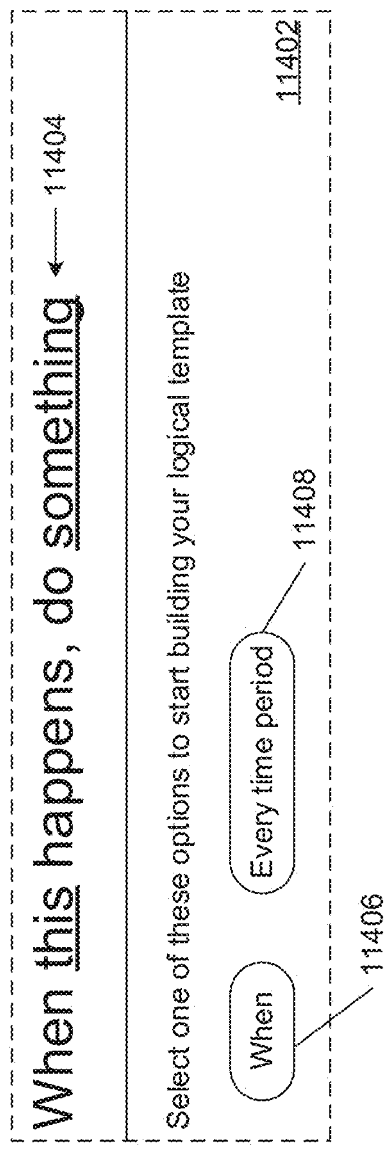
FIG. 114 illustrates an example of a logical sentence structure template displayed in a user interface, consistent with some embodiments of the present disclosure.

By way of example, FIG. 114 illustrates an example of a logical sentence structure template 11404 displayed in a user interface 11402, consistent with some embodiments of the present disclosure. As illustrated in FIG. 114, the user interface 11402 involves the content presented in the outer dash-line rectangle. In some embodiments, the user interface 11402 may be displayed using a computing device (e.g., the computing device 100 illustrated in FIG. 1) or software running thereon. For example, the user interface 11402 may be a portion of a graphical user interface (GUI), such as a webpage or a mobile application GUI displayed on a screen of the computing device 100. Logical sentence structure template 11404 may be presented as a sentence with predefined and definable variables. As shown in FIG. 114, the definable variables are underlined and are configurable by a user or system to provide definition from an associated table.

In some embodiments, the logical sentence structure template may include a plurality of definable variables that when selected result in a logical sentence structure delineating a function of the new application module. A definable variable may refer to a variable element of the logical sentence structure that may be selected and/or modified based on a user input. In some embodiments, a definable variable may include a status of one or more cells, columns, rows, tables, dashboards, widgets, templates, and/or any other data structure. In some embodiments, a definable variable may also include an event (e.g., a conditional action such as sending a notification, sending an email, archiving a task, or any other action) that is to be triggered once a certain condition is satisfied. An event may include sending a notification, modifying data in at least one data structure, or any other action that the new application module may be configured to execute when one or more conditions are satisfied. The event or conditional action of a logical sentence structure, alone or in combination with other events or conditional actions or the same or additional logical sentence structure, may be said to delineate a function of the new application module (e.g., a single or combination of logical sentence structures) by characterizing and providing the function of the logical sentence structure that is associated with a new application module (e.g., a workflow). For example, in some embodiments, one or more variables associated with a status of one or more data structures, and another one or more variables associated with one or more events may be defined in the logical sentence structure such that a functionality of the associated new application module is to trigger the one or more events upon a change of the one or more statuses in the one or more data structures.

Figure 115:
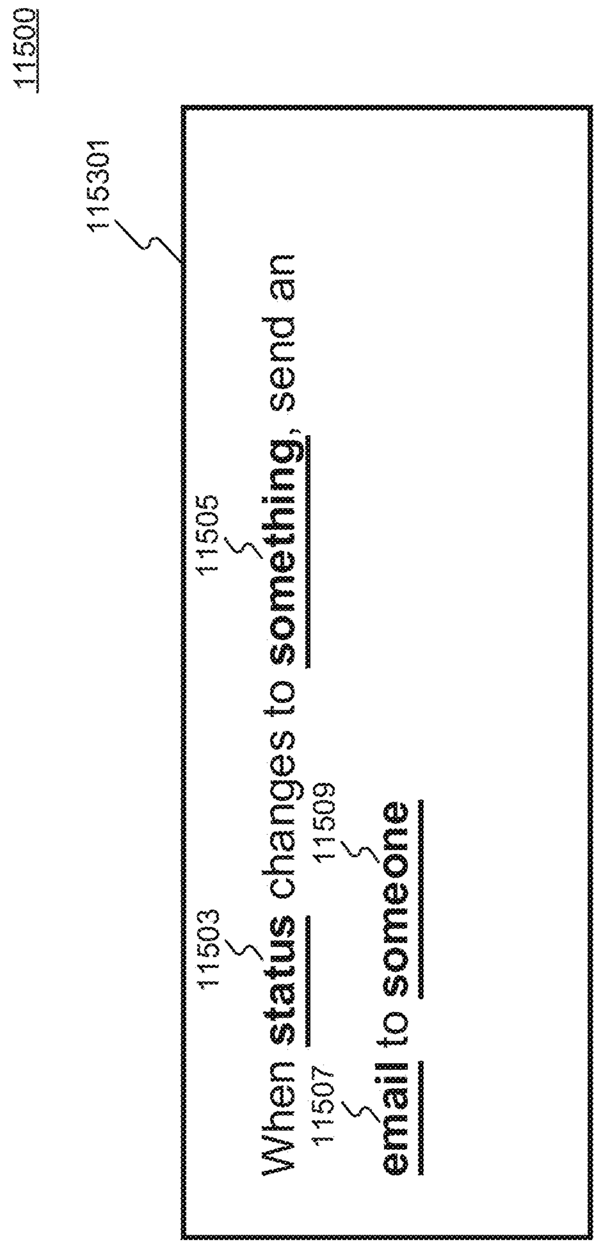
FIG. 115 illustrates a first view of an example of an interface for enabling selection of multiple variables in a logical sentence structure template, consistent with some embodiments of the present disclosure.

By way of example, FIG. 115 illustrates an example of a logical sentence structure template 11501 in which a user may define a plurality of definable variables. For example, a user may click on any of the various definable variables (may be referred to as user-definable requirements) including "status" variable 11503, "something" variable 11505, "email" variable 11507, or "someone" variable 11509 to delineate a function of the new application module. In this example, the "something" variable 11505 may be considered a condition used by the new application module to cause a result. The result itself in this example is defined by the email 11507 and someone 11509 variables that follow the conditions that serves to trigger the rule. In logical sentence structure template 11501, a status change automatically activates the rest of the logical sentence structure template to send a message to someone. The something 11505, email 11507 and someone 11509 may be user definable.

Disclosed embodiments may include receiving at least one input for at least one of the definable variables. Receiving at least one input may refer to receiving a selection of one or more of the plurality of definable variables by a user or the system. The at least one input may include a selection of the variables via a pick list, or the variables may be completely definable by a user via a customized input (e.g., entering text through a keyboard or any other user interface).

Figure 116:
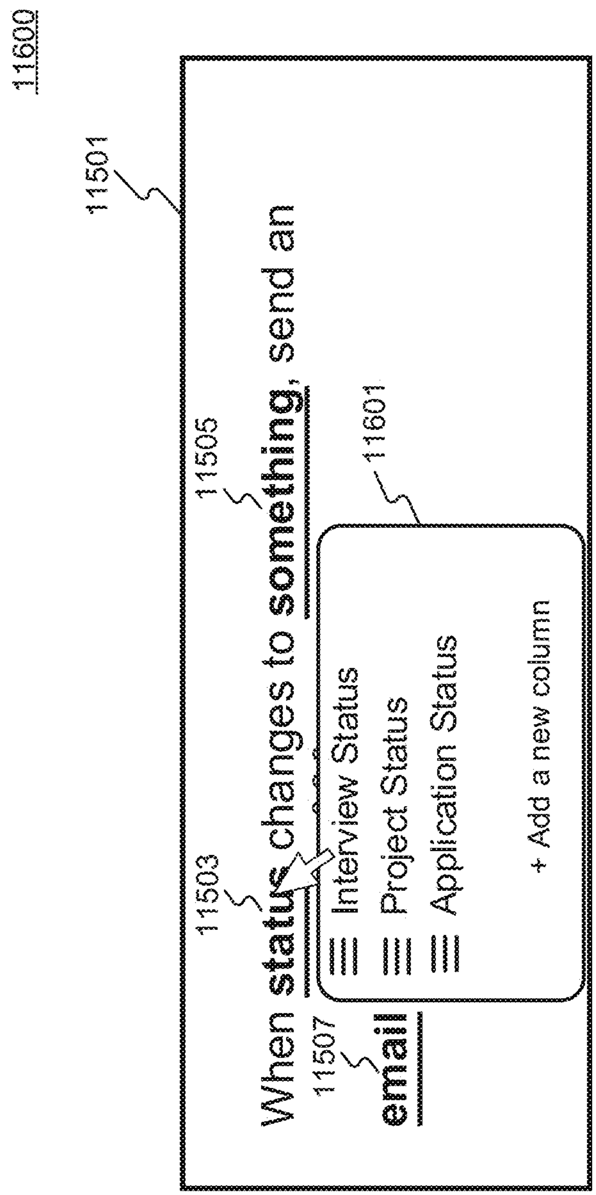
FIG. 116 illustrates a second view of an example of an interface for enabling selection of multiple variables in a logical sentence structure template, consistent with some embodiments of the present disclosure.
Figure 117:
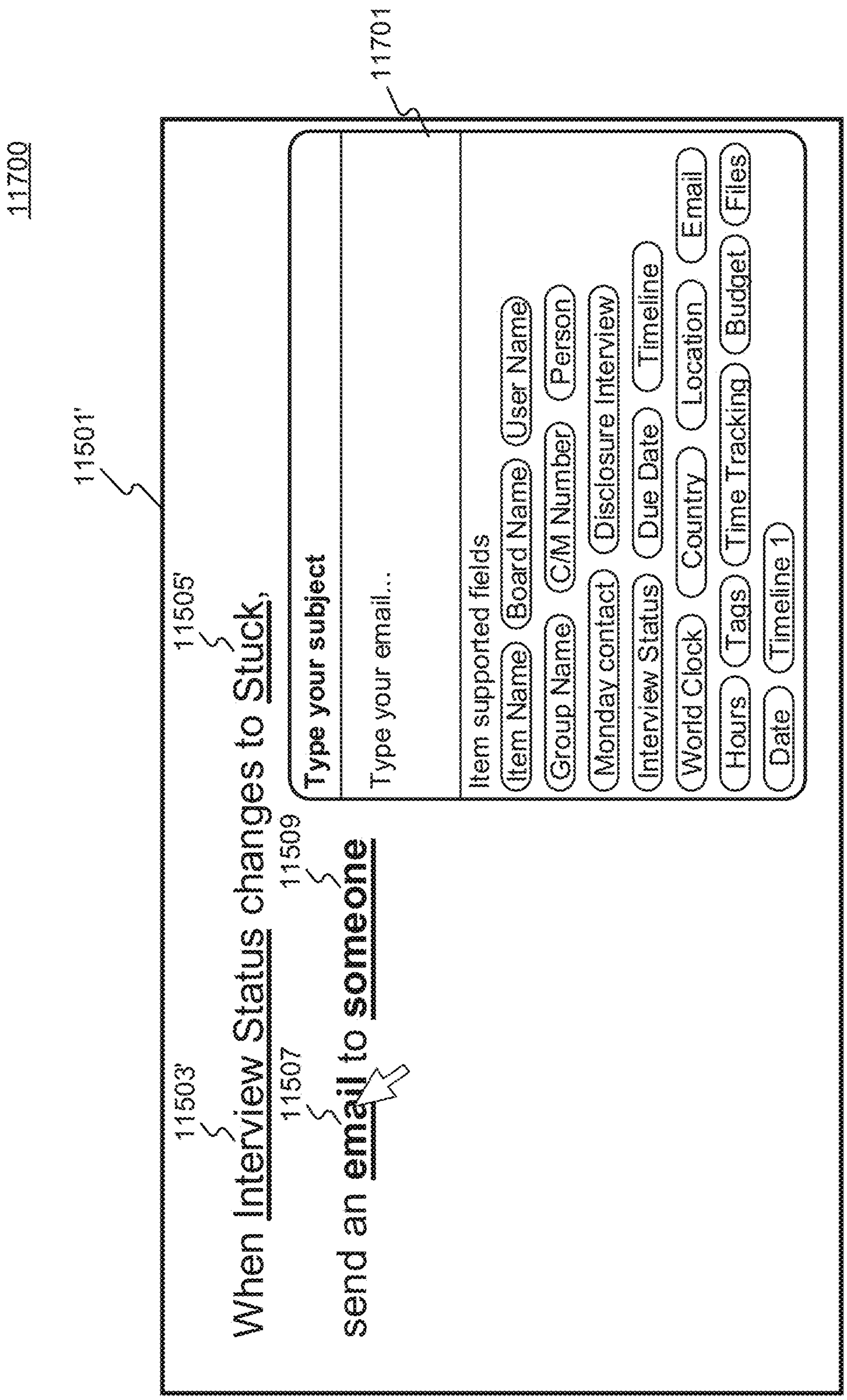
FIG. 117 illustrates a third view of an example of an interface for enabling selection of multiple variables in a logical sentence structure template, consistent with some embodiments of the present disclosure.

By way of example, a user may define the condition "done" for "something" variable 11505 and a custom or pre-defined message for the "email" variable 11507 in FIG. 115. In FIG. 116, the user may define "status" variable 11503 by clicking on "Interview Status," "Project Status," or "Application Status" from pick list 11601 (e.g., available status columns with differing headings from the underlying table). Further, a user may define the "status" variable 11503 by generating a new input previously unavailable in the pick list 11601 (e.g., defining a new column). In FIG. 117, however, a user may define email 11507 by typing in a subject and body of the email in window 11701.

Disclosed embodiments may include performing language processing on a logical sentence structure including at least one received input to thereby characterize the function of a new application module. Language processing may refer to rule-based methods, statistical methods, neural natural language processing methods, semantics look-up, or any other processes relating to the computer processing and analysis of any amount of language data. Language processing may enable computerized systems to perform a wide range of language processing tasks, such as text and speech processing, morphological analysis, syntactic analysis, lexical semantics, relational semantics, discourse, higher-level natural language processing applications, or any other computerized emulation of intelligent behavior and apparent comprehension of language. In some embodiments, the language processing may be based on the logical sentence structure and/or its template and the selected or unselected variables contained therein. Characterizing the function of the new application module may include determining or delineating a function (e.g., a conditional action or event), an intended function, and/or a potential function of the new application module based on one or more results of the natural language processing. For example, the system may perform language processing on a logical sentence structure that contains variables and actions for sending notifications or email messages. As a result of processing the language in the logical sentence structure to include an "email" variable or "notify" variable, the system may characterize the function of the new application module to be one of messaging, notification, or communication.

In some embodiments, language processing on the logical sentence structure may include identifying function-related words used in the logical sentence structure. A function related word may include one or more words associated with one or more objectives or functions of a new application module, such as "send message," "archive," "move to table," or any other action associated the function of a logical sentence structure.

In some embodiments, the language processing may involve artificial intelligence for determining an objective of the logical sentence structure. Artificial intelligence may refer to a system or device's ability to interpret data, to learn from such data, and/or to use such learnings to achieve specific goals and tasks through flexible adaptation. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to determine one or more objectives associated with the logical sentence structure, which may further be utilized to characterize a function of the new application module.

As illustrated in FIG. 115, the logical sentence structure template includes undefined variables "status" 11503, "something" 11505, "email" 11507, and "someone" 11509. The system may be configured to perform language analysis on the undefined logical sentence structure template and determine that the function of the new application module 11501 is one of communication or emailing, based on the language processing of the undefined "email" variable 11507. The language processing may be performed on a fully defined logical sentence structure template (e.g., a logical sentence structure or automation) and perform a similar analysis to determine that the characterized function of the new application module is one for communication or emailing.

By way of other examples, disclosed systems, methods, and computer readable media may be configured to perform natural language processing on the logical sentence structure template illustrated in FIG. 117. The natural language processing may be based on, for example, "status" variable 11503, "something" variable 11505, "email" variable 11507, or "someone" variable 11509 that have or have not been selected, and may identify one or more function-related words in logical sentence structure template 11501, such as "changes" or "send". The natural language processing may apply artificial intelligence on logical sentence structure template 11501, the variables contained in logical sentence structure template 11501, and/or the identified function-related words in logical sentence structure template 11501. The artificial intelligence may be used, in this example, to determine that an objective of the logical sentence structure is to monitor status variable 11503 and/or to notify an individual associated with someone variable 11509, and may further be used to determine that the intended function of the new application module is to send a specific email to an individual when an interview status changes to stuck.

In some embodiments, the language processing may be performed on the logical sentence structure before less than all the variables of the logical sentence structure are selected. For example, a logical sentence structure template may include several selectable variables. However, disclosed embodiments may choose to not require each of the several selectable variables to be selected by a user before performing language processing on the logical sentence structure. Language processing may be performed at any point prior to, during, or after selection of each selectable variable of the logical sentence structure and may be said to be performed before less than all of the variables of the logical sentence structure are selected. Performing language processing before less than all of the variables are selected may provide an anticipatory effect of determining function of an application module, in that the system may anticipate the function of the application module and may provide suggestions for how to complete the remainder of the application module or logical sentence structure template (e.g., an automation template or partially defined automation template), as further discussed below.

In some embodiments, language processing may be performed on a logical sentence structure before less than all of the plurality of variables are input, and wherein the function is estimated based on less than an input of all the variables. For example, a logical sentence structure template may include several selectable variables. However, disclosed embodiments need not require each of the several selectable variables to be selected by a user before estimating a function of the logical sentence structure. In one sense, estimation of a function of the logical sentence structure may include performing an analysis (e.g., a language processing analysis) of the logical sentence structure or logical sentence structure template and determining at least one function that may be associated with the logical sentence structure at any point prior to, during, or after selection of each selectable variable in a plurality of selectable variables in the logical sentence structure.

In some embodiments, a characterization of the function of a new application module may be generated before all the plurality of variables are selected. For example, a new application module may include a logical sentence structure template with several selectable variables. However, disclosed embodiments need not require each of the several selectable variables of the logical sentence structure template to be selected by a user before characterizing a function of the new application module (e.g., the workflow). In one sense, characterizing a function of the new application module may include performing an analysis (e.g., a language processing analysis) and determining the function based on the characterized function of the logical sentence structure at any point prior to, during, or after selection of each selectable variable in a plurality of selectable variables in the logical sentence structure.

By way of example, FIG. 117 provides an illustration of a logical sentence structure template 11501' in which all of the plurality of variables have not been selected. At the point in time illustrated in FIG. 117, "Interview Status" input 11503' is selected for "status" variable 11503, and "Stuck" input 11505' is selected for "something" variable 11505. However, "email" variable 11507 and "someone" variable 11509 remain unselected (e.g., undefined). At this particular point in time, disclosed embodiments may be configured to perform language processing on the logical sentence structure, estimate a function of the logical sentence structure, characterize a function of the new application module, and/or perform any other disclosed steps related to the analysis of the logical sentence structure.

In some embodiments, characterization of a function of a new application module may include examination of a table associated with a logical sentence structure. A table associated with the logical sentence structure may include, for example, a table or any other data structure that may contain data in one or more rows, columns, cells at intersections of rows and columns, or any other data field related to a selectable variable, trigger, and/or function associated with the logical sentence structure. In some embodiments, a table may be associated with the logical sentence structure and may provide the underlying information for including in the logical sentence structure template when the logical sentence structure template is generated and/or selected while the user is accessing the table. In some embodiments, the table associated with the logical sentence structure may include any table associated with the user or user account. Examination of a table associated with the logical structure may include assessing data and/or one or more variables contained in one or more rows, columns, and/or other data field of the table or preestablished application modules associated with the table in order to characterize the function of the new application module. For example, a table associated with the logical sentence structure may be examined to identify data contained in the table, and the characterized function of the new application module may be a function related to the data.

By way of example, FIG. 117 provides yet another illustration of logical sentence structure template 11501'. The characterization of a function of a new application module associated with logical sentence structure template 11501' may include an examination of a table (not shown) associated with logical sentence structure template 11501'. For example, table 11300 illustrated in FIG. 113 may be associated with logical sentence structure template 11501 because a user initiated the generation of the logical sentence structure template while accessing table 11300, or the user may have selected a variable in logical sentence structure template 11501 that is associated with data contained in one or more fields of table 11300. For example, "Interview Status" 11503' may correspond with column 11302, and characterization of the function of logical sentence structure template 11501' may include an examination of table 11300 as an associated table. The examination of table 11300 may include reviewing and/or analyzing rows and columns to determine their relationships, which may be used to determine and/or characterize the function of logical sentence structure template 11501'. For example, the function of logical sentence structure template 11501' may be characterized as communication or notifying an individual (e.g., an individual or any other entity) when a status in column 11302 changes. The "someone" variable 11509 may be any individual or any other entity, such as a supervisor or another team member.

Disclosed embodiments may include comparing the characterized function of the new application module with pre-stored information related to a plurality of predefined application modules. The pre-stored information may include any information or data that may be stored in a database or any other data structure associated with disclosed embodiments, and may include information such as variables, objectives, triggers, action, functions, or any other information associated with predefined application modules. Predefined application modules may include any number of application modules that have been preconfigured by disclosed systems to perform any number of actions based on one or more triggers or serve any function associated with embodiments of the present disclosure. By storing predefined application modules associated with pre-stored information, the system may compare a user's application module to a library of predefined application modules to find common characteristics and functions associated with similar application modules to that of the user's application module.

By way of example, a characterized function of logical sentence structure template 11501 in FIG. 117 may be to send a notification email to an individual or entity when "Interview Status" 11503' changes to "Stuck" 11505', which may characterize the functionality of this particular application module. This characterized function of the particular application module may be compared to one or more functions of a plurality of predefined application modules (e.g., a library of predefined application modules). For example, one predefined application module may have a comparable function of sending an email with a predefined script to a supervisor when a status of a particular column changes. The system may characterize the application module including the logical sentence structure template 11501' of FIG. 117 as having a notification function and compare this function against a stored repository of sample application modules that may be commonly associated with notification-based functionality.

Disclosed embodiments may include determining at least one similarity of a characterized function (e.g., of a new application module) to a specific predefined application module. A similarity may be determined between any form of information associated with the characterized function of the new application module and the predefined application module (e.g., a stored application module in a library for look-up). For example, the new application module and a predefined application module may have at least one similarity between variables, triggers, and/or actions associated with each application module. In some embodiments, the at least one similarity may include at least one of a similarity in a word or an objective. For example, each of the new application module and the predefined application module may contain the same word in a logical sentence structure associated with each respective application, or each respective application module may have one or more similar objectives. An objective may include a determined or estimated functionality of an application module based on at least one logical sentence structure associated with an application module, consistent with some embodiments of the disclosure.

By way of example, a characterized function of logical sentence structure template 11501' in FIG. 117 may be to send a notification email to an individual or entity when "Interview Status" 11503' changes to "Stuck" 11505', resulting in the characterized function of the new application module (e.g., the workflow associated with the logical sentence structure template 11501' of FIG. 117) as sending an email with a predefined script to an individual or entity when a status of a particular column changes. The system may perform a look-up in a repository of predefined application modules for specific application modules that share a similarity to the function of new application module (e.g., sending an email in response to a status change). Some examples of similarities between the characterized function of the new application module and the predefined application modules (e.g., prestored in a repository) may include similar triggers (i.e., the status variable) and similar actions (i.e., sending an email). The subject of the similar actions (e.g., John Doe for the characterized function of the new application module) may also be a similarity between each respective, prestored application module because each subject is associated with a supervisor role. Additionally, the predefined application module (e.g., prestored in a repository) may each be associated with at least one logical sentence structure that includes one or more similar words to those included in logical sentence structure template 11501' of the new application module, such as "when . . . changes" or "send," which may also be an identified similarity between the characterized function of the new application module and the predefined application module.

Disclosed embodiments may include presenting a specific predefined application module as an adoptable alternative for accomplishing a function. Presenting the specific predefined application module may include generating a pop-up window on a graphical user interface that may prompt the user for an input for whether the user would like to use the predefined application module as an alternative, or it may include any other prompt. In some embodiments, more than one specific predefined module may be presented at the same time. For example, in some embodiments, determining at least one similarity may include generating a similarity score between the characterized function of the new application module and a plurality of predefined application modules, and disclosed embodiments may be configured to present a particular or a group of predefined application modules that meet and/or exceed a specific threshold similarity score. In some embodiments, once the specific predefined application module is presented, disclosed embodiments may be configured to implement the selected predefined application module upon selection of predefined application module by a user through a user interface.

Figure 118:
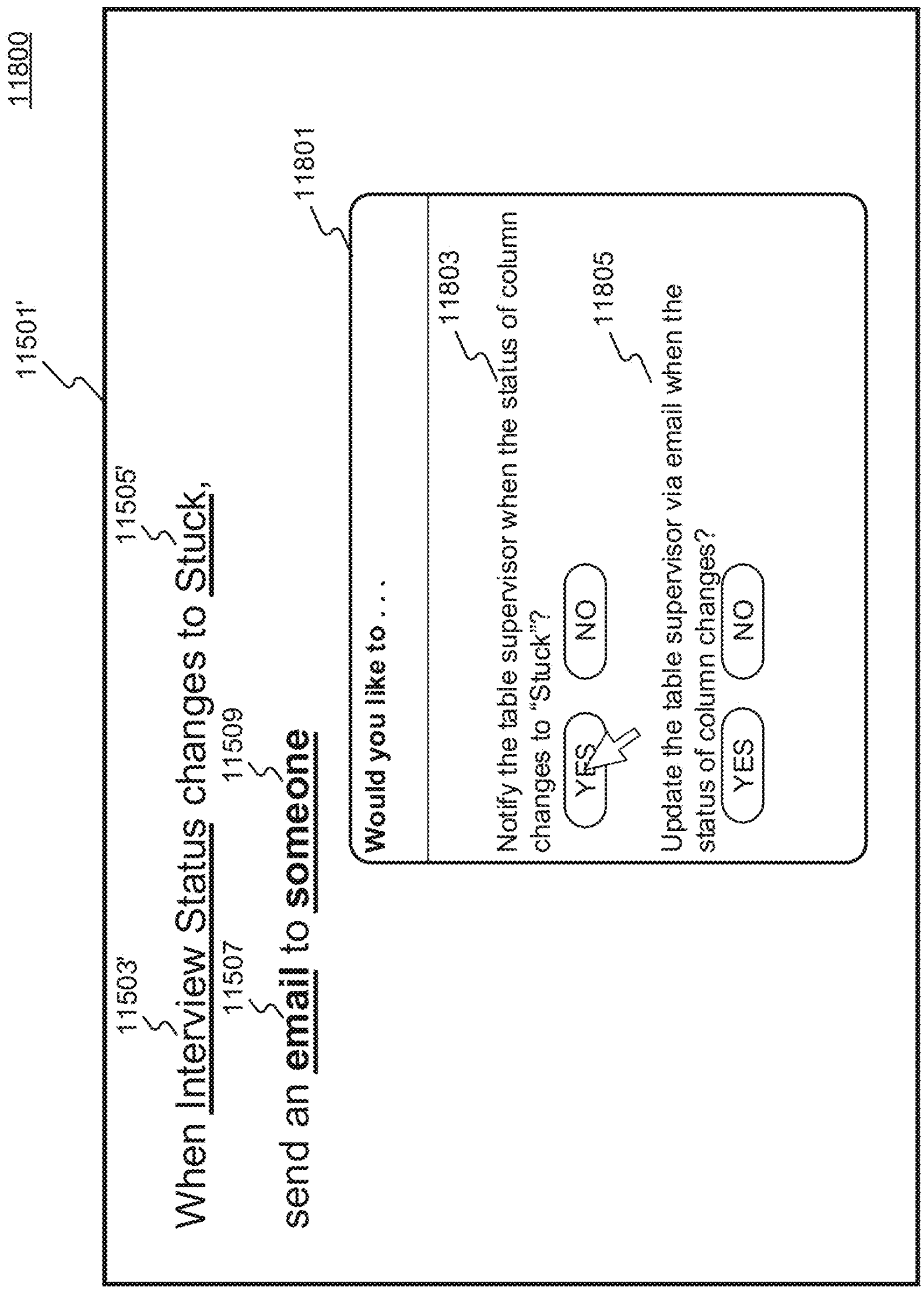
FIG. 118 illustrates a fourth view of an example of an interface for enabling selection of multiple variables in a logical sentence structure template, consistent with some embodiments of the present disclosure.

By way of example, FIG. 118 provides an illustration of logical sentence structure template 11501', where window 11801 presents two options delineating the function of adoptable alternatives for accomplishing the characterized function of logical sentence structure template 11501' of a new application module, including adoptable alternatives as a first option 11803 and a second option 11805. Upon reviewing the information contained in window 11801, a user may choose to adopt one of first option 11803 and second option 11805 and select "YES" under one or both of the two options. Once at least one of options 11803 and 11805 is selected, the selected option may be implemented as part of the new application module consistent with some embodiments of the disclosure. Although FIG. 118 only illustrates options that are selectable with "YES" and "NO" icons, it is to be understood that any number of adoptable alternatives may be presented that may be selected through any suitable interaction with a user.

Figure 119:
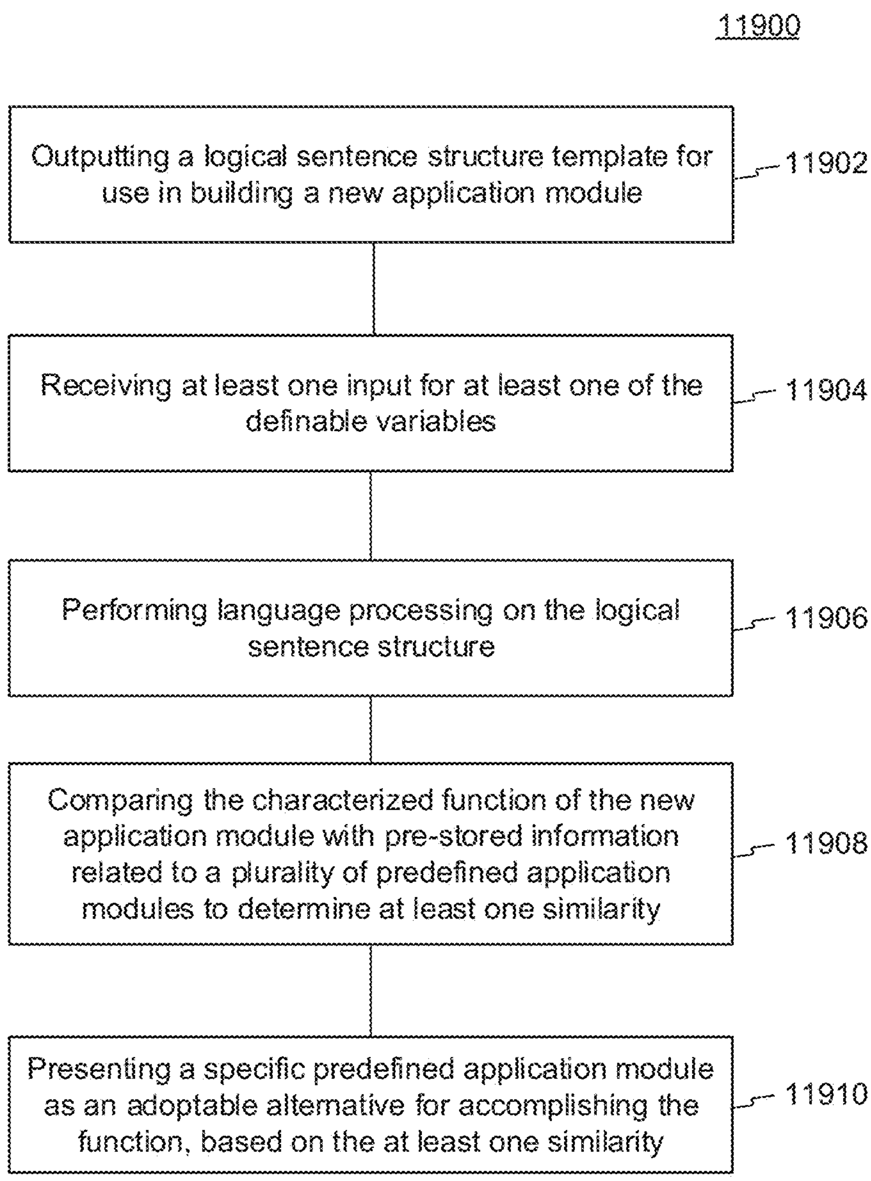
FIG. 119 is a block diagram of an exemplary process for predicting required functionality and for identifying application modules for accomplishing the predicted required functionality, consistent with some embodiments of the present disclosure.

FIG. 119 illustrates a block diagram of an example process 11900 for predicting required functionality and for identifying application modules for accomplishing the predicted required functionality, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 11900 may be performed by at least one processor (e.g., the processing circuitry 110 in FIG. 1) of a computing device (e.g., the computing device 100 in FIGS. 1 and 2) to perform operations or functions described herein, and may be described hereinafter with reference to FIGS. 113 to 118 by way of example. In some embodiments, some aspects of the process 11900 may be implemented as software (e.g., program codes or instructions) that are stored in a memory (e.g., the memory portion 122 in FIG. 1) or a non-transitory computer-readable medium. In some embodiments, some aspects of the process 11900 may be implemented as hardware (e.g., a specific-purpose circuit). In some embodiments, the process 11900 may be implemented as a combination of software and hardware.

FIG. 119 includes process blocks 11902 to 11910. At block 11902, a processing means may output a logical sentence structure template for use in building a new application module. The logical sentence structure template may include a plurality of definable variables that when selected, may result in a logical sentence structure delineating a function of the new application module, as discussed above.

At block 11904, the processing means may receive at least one input for at least one of the definable variables, consistent with the disclosure above.

At block 11906, the processing means may perform language processing on the logical sentence structure including the at least one received input to thereby characterize the function of the new application module, as discussed previously in the disclosure above.

At block 11908, the processing means may compare the characterized function of the new application module with pre-stored information related to a plurality of predefined application modules to determine at least one similarity to a specific predefined application module, as discussed previously.

At block 11910, the processing means may, based on the at least one similarity, present the specific predefined application module as an adoptable alternative for accomplishing the function, consistent with some embodiments of the disclosure as described above.

In electronic workflow systems for managing complex endeavors, it may be beneficial to employ a myriad of conditional rules for triggering actions when one or more conditions are met. Defining the triggers and the actions to maintain consistency within projects and across projects can be daunting when the possible combinations of triggers and actions could be endless. Therefore, there is a need for unconventional innovations for helping to ensure that endeavors are managed consistently and correctly.

Such unconventional approaches may enable computer systems to determine tools and functions that may be implemented to improve efficiency of project management software applications. By training a system to understand the types of tools and settings required to manage a particular project by learning from prior projects, by understanding a current project, and by identifying similarities, a system may recommend tools and settings to increase the efficiency and operations of workflow management functionality. Various embodiments of the present disclosure describe unconventional systems, methods, and computer readable media for associating a plurality of logical rules with groupings of data. Various embodiments of the present disclosure may include at least one processor configured to maintain a table containing columns, access a data structure containing the plurality of logical rules that when linked to columns, enable a table action in response to a condition change in a cell associated with a first particular logical rule linked to a first particular column. The at least one processor may be configured to access a correlation index identifying a plurality of column types and a subset of the plurality of logical rules typically associated with each column type and receive a selection of a new column to be added to the table. In response to the received selection, in some embodiments, the at least one processor may be configured to perform a look up in the correlation index for logical rules typically associated with a type of the new column, present a pick list of the logical rules typically associated with the type of the new column, receive a selection from the pick list, link to the new column a second particular logical rule associated with the selection from the pick list, and implement the second particular logical rule when data in the new column meets a condition of the second particular logical rule.

Thus, the various embodiments the present disclosure describe at least a technological solution, based on improvement to operations of computer systems and platforms, to the technical challenge of determining the most appropriate tools, functions, and rules to implement on a platform by an analysis of different groupings of data in a project management platform.

Some disclosed embodiments may involve systems, methods, and computer-readable media for associating a plurality of logical rules with groupings of data. A logical rule may refer to a combination of one or more conditions, triggers, and/or actions that may be implemented with respect to disclosed systems, methods, and computer-readable media, or it may refer to any other logical associations between one or more groupings of data. A grouping of data may refer to cells, columns, rows, tables, dashboards, widgets, templates, and/or any other data structure or a combination thereof to provide a workflow in association with a table or other workspace. An exemplary logical rule may include a plurality of automations that trigger various actions. For example, a logical rule (e.g., automation) may be configured to monitor a condition and to determine if a particular status is "complete" before the logical rule triggers an action of archiving a completed task.

Figure 120:
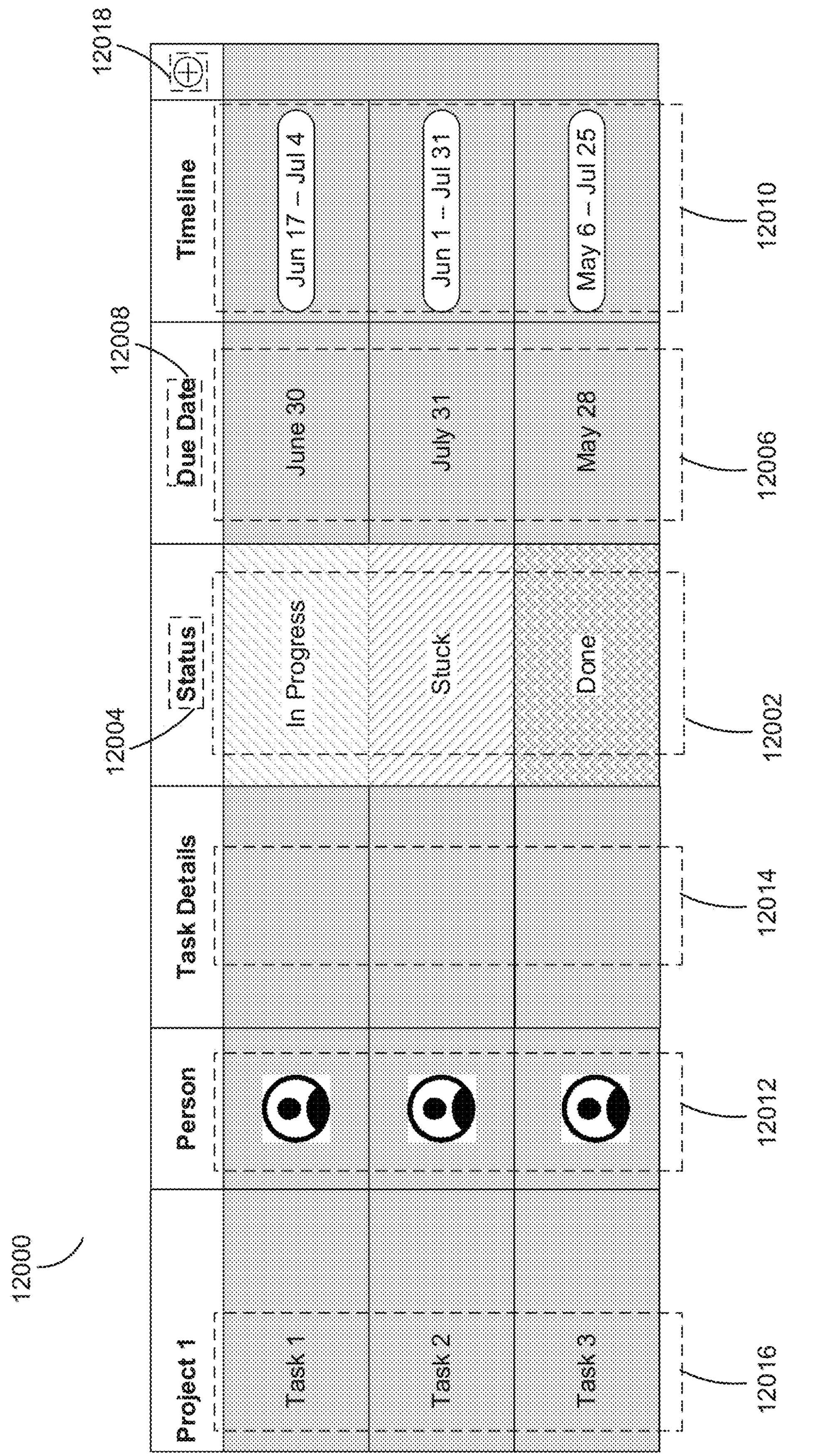
FIG. 120 illustrates an example of a table that includes multiple columns and rows, consistent with some embodiments of the present disclosure.

By way of example FIG. 120 illustrates an example of a table that includes multiple columns and rows, consistent with some embodiments of the present disclosure. In some embodiments, table 12000 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 12000 may be associated with a project and may include, in the multiple rows and columns, tasks (e.g., in rows including "Task 1," "Task 2," or "Task 3") included in the project, persons (e.g., in a column 12012) assigned to the tasks, details (e.g., in a column 12014) of the tasks, statuses (e.g., in a column 12002) of the tasks, due dates (e.g., in a column 12006) of the tasks, timelines (e.g., in a column 12010) of the tasks, or any information, characteristic, or associated entity of the project. In some embodiments, table 12000 may be associated with one or more logical rules. For example, table 12000 may be associated with a logical rule that is configured to perform the functionality of sending a notification to a user device associated with one or more persons in column 12012 when one or more statuses in column 12002 changes. Logical rules may be applied to exemplary table 12000 and required functionalities may be predicted based on what is contained in table 12000. For example, table 12000 includes a status column 12002, due date column 12006, and person column 12012. In response to detecting these column types, the system may predict that the owner of table 12000 may require functionality to send an alert to individuals assigned in the person column 12012 regarding tasks that do not yet have a "Done" status as a certain due date approaches a current date. The logical rules may be predicted and recommended according to aspects of this disclosure discussed in further detail below.

In some disclosed embodiments, each of the plurality of logical rules may include a logical sentence structure. A logical sentence structure (e.g., an automation template) may include a logical organization of elements for implementing a conditional action. In some embodiments, the logical sentence structure may include a semantic statement or a rule (e.g., a sentence) that may be used to represent a functionality of a new application module. Logical sentence structures may be used to monitor conditions in a single table, multiple tables of a single user, or multiple tables across multiple users. Further, logical sentence structures may be implemented to trigger actions in the single table or multiple tables of a single or multiple users. A logical sentence structure template may refer to a logical sentence structure in a template format that may be ready for configuration by the system of a user.

Figure 121:
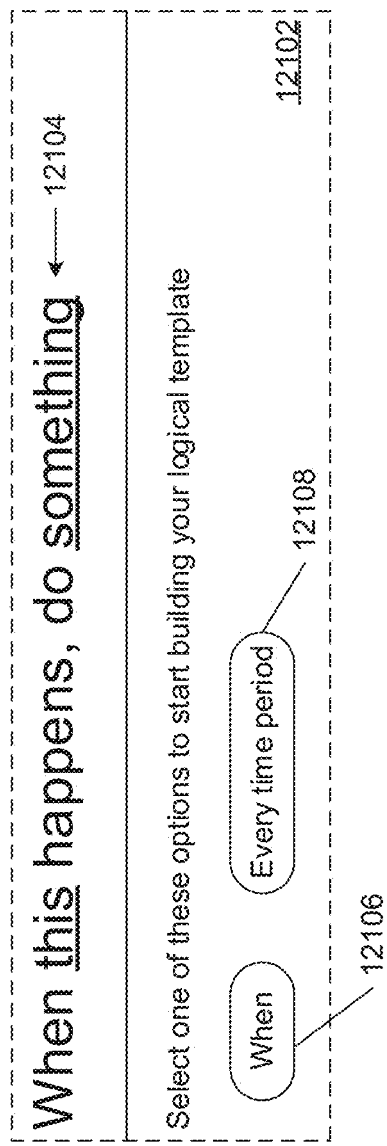
FIG. 121 illustrates an example of a logical sentence structure template displayed in a user interface, consistent with some embodiments of the present disclosure.

By way of example, FIG. 121 illustrates an example of a logical sentence structure template 12104 displayed in a user interface 12102, consistent with some embodiments of the present disclosure. As illustrated in FIG. 121, the user interface 12102 is represented as a dash-line box that does not necessarily represent its boundary. In some embodiments, the user interface 12102 may be displayed using a computing device (e.g., the computing device 100 illustrated in FIG. 1) or software running thereon. For example, the user interface 12102 may be a portion of a graphical user interface (GUI), such as a webpage or a mobile application GUI displayed on a screen of the computing device 100. Logical sentence structure template 12104 may be presented as a sentence with pre-defined and definable variables.

Disclosed embodiments may include maintaining a table containing columns, and accessing a data structure containing a plurality of logical rules that when linked to the columns, enable a table action in response to a condition change in a cell associated with a first particular logical rule linked to a first particular column. A data structure consistent with the present disclosure may include any collection of data values and relationships among them. The data structure may be maintained on one or more of a server, in local memory, or any other repository suitable for storing any of the data that may be associated with a plurality of rules and any other data objects. A table action may refer to one or more events that that occur based on data presented in a table and that may be triggered by a condition being satisfied. In some embodiments, the condition change in a cell may include a change of data in one or more cells. A change of data may include the addition, deletion, rearrangement, or any other modification or combination thereof. For example, a table action may include sending an e-mail or other notification when a status of cell in a status column changes to "complete," or if all cells in a status column change to "complete." In some embodiments, the table action may include a change in data in the maintained table or in another table. A maintained table may refer to the table containing one or more cells, columns, rows, or any arrangement. Changing data in another table may include changing data in a table that is different from a subject maintained table, such as a table associated with another team or workspace, or another table of the same entity.

By way of example in FIG. 120, disclosed embodiments may include maintaining table 12000 containing project column 12016, person column 12012, task details column 12014, status column 12002, due date column 12006, and timeline column 12010. One or more data structures associated with table 12000 (e.g., in storage 130, repository 230-1, repository **230-*n* of FIGS. 1 and 2) may store a plurality of logical rule that may be linked to columns to accomplish one or more functionalities. There may be many logical rules each having different functionalities. For example, a first particular logical rule may be linked to a first particular column to cause first functionality when a condition of the first particular logical rules is met. One of such logical rules in the data structure may be to notify (i.e., via a table action) an individual when a due date is approaching (i.e., a condition change). When linked to table 12000, for example, this rule may cause a notification to be sent to someone in person column 12012 when their respective due date in due date column 12006 is approaching (e.g., within a few days). Another logical rule may be to update a timeline (i.e., a change in data) when a due date passes (i.e., a condition change). When linked to table 12000, this rule may cause a timeline in timeline column 12010 to be extended based on the corresponding due date in due date column 12006 passing. Yet another logical rule may be to update a status in a cell (i.e., a change in data) in another table if a due date passes (i.e., a condition change). When linked to table 12000, for example, this rule may cause a status in a cell of a separate table (e.g., a table limited to administrators or supervisors) to indicate that a task in task column 12016** is overdue.

Some embodiments may include accessing a correlation index identifying a plurality of column types and a subset of the plurality of logical rules typically associated with each column type. A correlation index may refer to at least one repository of stored relationships, typically relating differing pieces of information with each other. For example, a correlation index may relate column types, information in columns, or both. In some embodiments the correlation index may be manifest in the form of an artificial intelligence engine that accesses information about past relationships between information in tables or related tables to determine correlations between that information. By way of example only, a correlation index may determine that when two types of information are maintained in a particular type of table, a particular logical rule is regularly employed. The index may be accessible to perform a look up, to identify common logical rules that match features of one or more table structures. Disclosed systems may reference the correlation index to determine which logical rules in the plurality of logical rules may be associated with a certain column type. A column type may refer to classification of a column based on the type of data to be stored in column. Some non-limiting examples of columns include “status” columns, “text” columns, “people” columns, “timeline” columns, “date” columns, “tags” columns, and “numbers” columns. Each column type may have any number of logical rules associated with the column type, for example, by virtue of the data stored in each column type being associated with conditions or actions associated with the logical rules. In some embodiments, the correlation index may be stored in the data structure.

Figure 122:
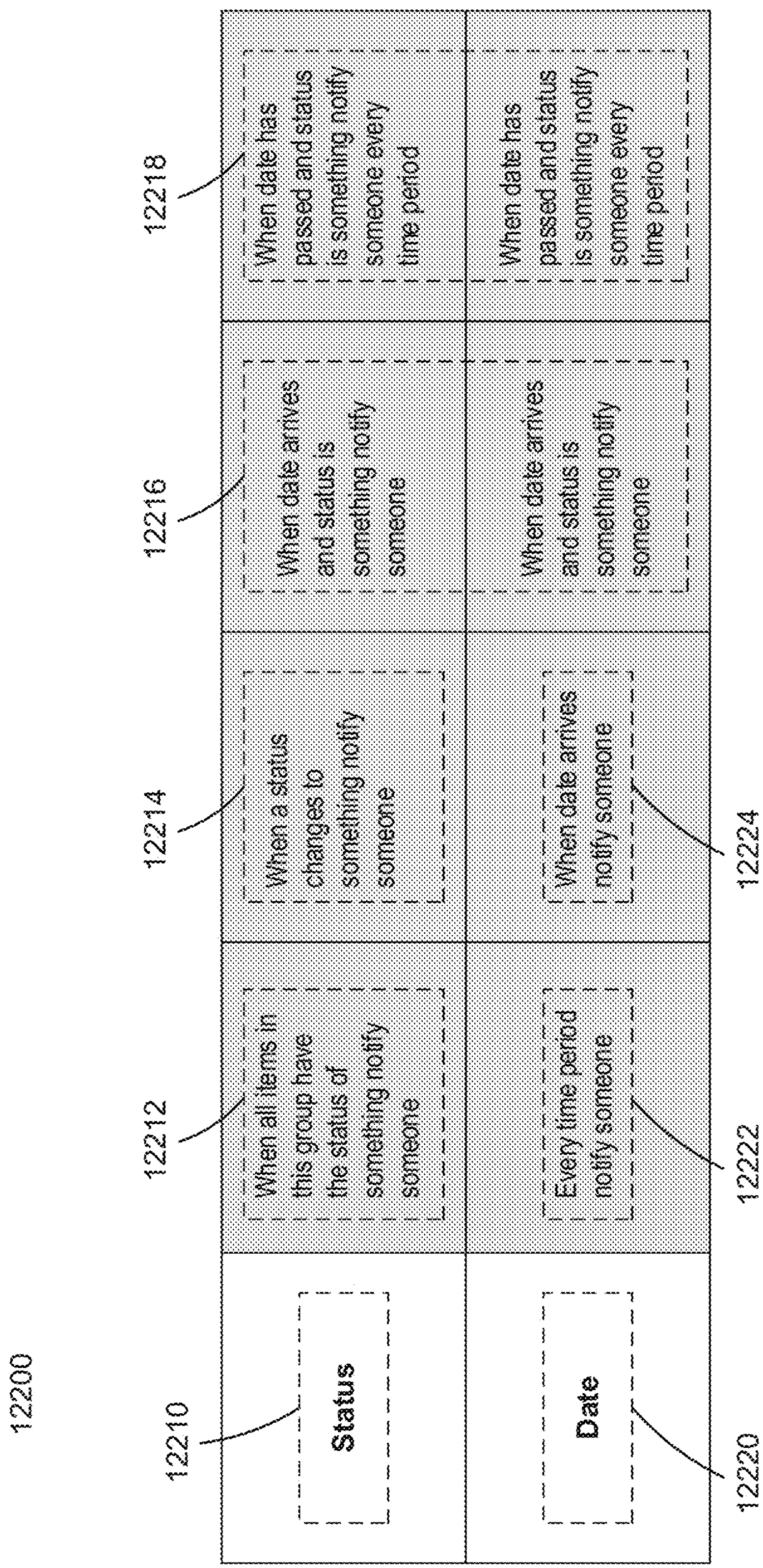

For discussion purposes, FIG. 122 illustrates a highly simplified visual representation an exemplary correlation index 12200, consistent with some embodiments of the present disclosure. For ease of discussion, correlation index 12200 is illustrated as maintaining a plurality of logical rules associated with a limited number of column types. It is to be understood, however, that correlation index 12200 may contain information related to any number of logical rules and/or any number of column types or any combination of multiple logical rules and multiple column types. Correlation index 12200 may include a plurality of logical rules that may be associated with status column type 12210 and date column type 12220. For example, status column type 12210 may be associated with logical rule 12212 and logical rule 12214, while date column type 12220 may be associated with logical rule 12222 and logical rule 12224. Some logical rules, such as logical rule 12216 and logical rule 12218, may be associated with more than one column type that may be linked together. For example, logical rule 12216 delineates “when date arrives and status is something notify someone.” Because a certain date and a certain status are both conditions to notifying someone, this rule is associated with both status column type 12210 and date column type 12220.

Some disclosed embodiments may include generating a correlation index by inspecting preexisting linkages between preexisting columns and at least some of the plurality of logical rules. Inspecting preexisting linkages may include accessing one or more pre-established tables to determine one or more column types that are linked or otherwise associated together so that the system may determine which logical rules are typically associated with one or more linked column types. Preexisting linkages may be inspected within a single table, a specified number of tables, or all tables that may be associated with disclosed systems. For example, a status column and a date column may be linked because the combination of the columns may generate additional deadline information that relies on both columns. The system may determine that there is a preexisting linkage between a status column and a date column in a table because they are linked in the presentation of the columns (e.g., an indication such as a graphical icon) or because they are linked in functionality based on logical rules (e.g., automations). Inspecting preexisting linkages may be limited to preexisting columns in a single or in multiple tables associated with one or more workplaces or users, or preexisting columns in tables of a certain type (e.g., a particular structure, a particular industry designation, or shared common row or column designations). Alternatively, all of the tables in a platform may be inspected. Generating the correlation index may include storing, in a repository, the preexisting columns and associated logical rules that were inspected in preexisting tables, as discussed above. Such storing may involve storing tags to linked data, storing linkages, or storing the complete data. Generating the correlating index may include storing every association of logical rules with columns, or applying a statistical measure to the likelihood of correlation. For example, the system may generate a likelihood of association between columns and logical rules through a score, percentage, or any other metric that may be determined as a result of inspecting preexisting linkages between preexisting columns and at least some of the plurality of logical rules. For example, if a certain logical rule has been linked to a certain column type or linked column types at a high frequency, the logical rule may receive a high score with respect to that column type. In some embodiments, generating the correlation index may include associating a logical rule with a column type in the correlation index if the score and/or percentage (i.e., the percentage of columns of the same column type that are linked to the logical rule) with respect to the column type meets or exceeds a certain threshold. Conversely, in some embodiments, generating the correlation index may also include disassociating a logical rule with a column type at a time when the score and/or percentage with respect to the column type falls below a certain threshold. Inspecting preexisting linkages between preexisting columns and at least some of the plurality of logical rules and generating the correlation index may occur on an instantaneous basis, on a periodical basis, or on a continuous basis.

In some embodiments, inspecting preexisting linkages may involve the use of artificial intelligence (as described in more detail throughout this disclosure with reference to machine learning and/or artificial intelligence) to analyze relationships between preexisting columns and at least some of the plurality of rules. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to inspect preexisting linkages between preexisting columns and at least some of the plurality of rules, which may further be utilized to generate the correlation index.

By way of example, correlation index 122 may be generated and/or maintained based on the inspection of one or more tables (e.g., table 12000 in FIG. 120) associated with disclosed embodiments. In table 12000, there may be preexisting linkages between at least some of the columns and at least some of the plurality of logical rules. For example, rule 12212 in FIG. 122 may be linked to status column 12002 such that when all of the statuses in status column 12002 have a status of "done", an individual is notified. Upon inspecting table 12000 alone or together with a plurality of other tables, it may be determined that rule 12212 is typically associated with status column type 12210, and correlation index 12200 may be generated or updated to reflect this association. In some embodiments, additional artificial intelligence methods may be used to generate correlation index 12200. The determination may, for example, be made through the use of artificial intelligence by assigning a score to logical rule 12212 with respect to status column type 12210 based on an analysis of a large amount of data relating to a plurality of tables. The correlation index may be, for example, preestablished, preestablished and periodically updated, preestablished and updated each time a new lookup is performed, or established on the fly each time a new lookup is performed.

In some embodiments, a correlation index may be a universal correlation index used across a plurality of tables, or it may be a correlation index that is particular to one table or a limited number of tables. For example, some disclosed embodiments may include customizing the correlation index to the maintained table based at least in part on other column types in the maintained table. Customizing the correlation index may include adding, removing, rearranging, or modifying rules based on the types of columns that exist within the maintained table. In one example, if a table does not include a status column type, the correlation index associated with the table may be customized to not include logical rules including conditions or table actions associated with a status or status change. In another example, a status column may be added to a table that previously did not contain a status column, and accordingly the correlation index associated with the table may be customized or otherwise updated to include logical rules including conditions or table actions associated with a status or status change.

By way of example, with reference to FIG. 120 and FIG. 122, suppose table 12000 is modified such that status column 12002 is removed. In this example, correlation index 12200 may be customized by removing all rules associated with status column type 12210 (e.g., rule 12212, rule 12214, rule 12216, rule 12218, etc.).

In some embodiments, the correlation index may be based on correlations previously employed by an entity associated with the new column. An entity associated with the new column may include any user associated with a table, such as a table owner or any other individual or entity (e.g., a particular device, a team, a company, or any other entity) with access rights to the table. As discussed above, logical rules may be included in the correlation index based on a score, percentage, or any other metric that may be determined as a result of inspecting preexisting linkages between preexisting columns and at least some of the plurality of logical rules. In some embodiments, however, including logical rules in the correlation index may be based on a score, percentage, or any other metric related to the entity's usage of said rule with respect to a certain column type. For example, if an entity frequently uses a rule that notifies an individual when a certain status changes, the correlation index may include an association between the rule and the status column type. Thus, in some embodiments, a correlation index may be associated with and personalized for a single entity.

By way of example, a user may add a new column to table 12000 in FIG. 120 by selecting the new column icon 12018 ("+"), and the user selects a "date" column type for the new column. Accordingly, the logical rules included in the correlation index may be based on this usage as a past usage of the logical rules by the user with respect to the new column type in the future when the user adds that particular column type.

In some embodiments, the correlation index is based on correlations previously employed by entities subscribed to the maintained table. An individual subscribed to the maintained table may refer to any entity or user with access or viewing rights to the maintained table. As discussed above, a correlation index may be associated with the maintained table and personalized based on any and/or all entities subscribed to the table. In some embodiments, however, a correlation index may be associated with a table and may be personalized based on past activity of entities subscribed to the maintained table. For example, if multiple entities frequently use a rule that notifies an individual when a certain status changes, the correlation index may include an association between the rule and the status column type.

In FIG. 120, a user may add a new column to table 12000 by selecting the new column icon 12018 ("+") and selecting a "date" column type for the new column. Accordingly, the logical rules included in the correlation index may be based on a past usage of the logical rules by any and/or all entities subscribed to the maintained table with respect to the new column type.

Aspects of this disclosure may involve a correlation index that may include rules customized to identify individuals subscribed to the maintained table. Rules customized to identify individuals subscribed to the maintained table may refer to rules that may determine the identity of particular individuals or client devices associated with particular individuals. For example, John Doe may be a supervisor associated with a maintained table, and a rule customized to identify John Doe may, when linked to the table, determine a specific client device associates with John Doe so that the system may send a notification or complete any action specific to John Doe or John Doe's client device. For example, the system may notify John Doe when the status of one or more cells changes to "complete" and the system identifies that the changed cell is associated with John Doe.

By way of example, referring to FIG. 122, logical rule 12224 delineates that "when date arrives notify someone." Logical rule 12224, however, may be customized to identify individuals subscribed to the maintained table and may delineate that "when date arrives notify John Doe."

Disclosed embodiments may include receiving a selection of a new column to be added to the table, and in response to the received selection, perform a look up in the correlation index for logical rules typically associated with a type of the new column. A new column may be selected through a user interface. For example, a user may select a new column icon, and may be presented with a pick list of column types that when selected, adds the selected column to the table. In some embodiments the type of the new column is defined by a heading of the new column. A heading of the new column may include a label associated with the new column to identify or define the information associated with the new column. This heading may be presented and selected as discussed above. Once the selection has been received, a look up for logical rules associated with a type of the new column may be performed by accessing the correlation index.

Figure 123:
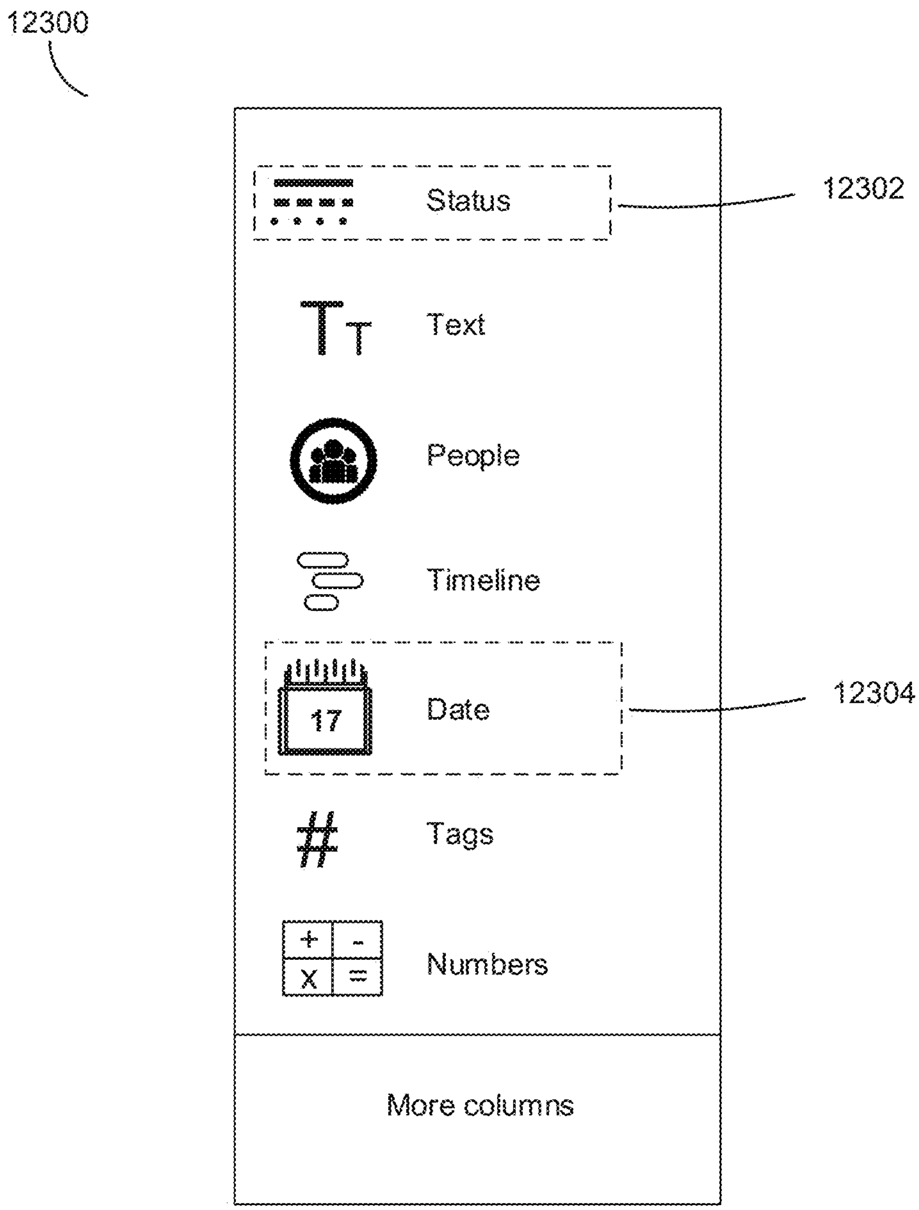

By way of example, FIG. 123 illustrates a pick list 12300 of column types for a new column in a table, consistent with some embodiments of the present disclosure. Pick list 12300 may be presented via a user interface (e.g., on user device 220-1, user device 220-2, user device 220-*m*, etc.) based on a user selecting new column icon 12018 in FIG. 120. Pick list 12300 may include a plurality of column types for selection by the user, such as status column type 12302 and date column type 12304. Once a column type is selected, a column of that column type may be added to the table, and the column type may be defined by a heading of the new column. For example, the column types of status column 12002 and due date column 12008 may be defined by heading 12004 and heading 12008, respectively.

Disclosed embodiments may include presenting a pick list of the logical rules typically associated with the type of the new column. A pick list may include a limited or unlimited list of options that may be selected, or it may refer to any form of interface suitable for enabling users to select one or more options from a selection of options. By way of some non-limiting examples, a pick list may include different logical rules that are associated with the type of the new column and may be selectable by a user, such as a notification rule, a data change rule, or an archiving rule. In some embodiments, a pick list may include all the logical rules in the correlation index that are associated with the new column. However, the pick list may also only include a limited number of logical rules. For example, some disclosed embodiments may include ranking the logical rules in the correlation index with respect to each column type and presenting only the top ranked logical rules in the pick list (e.g., top 3). The ranking may be based on scores, percentages, or other metrics of the logical rules with respect to certain column types, which may be based on total usage across all tables, individual table usage, individual entity usage, or any other usage metrics.

Figure 124:
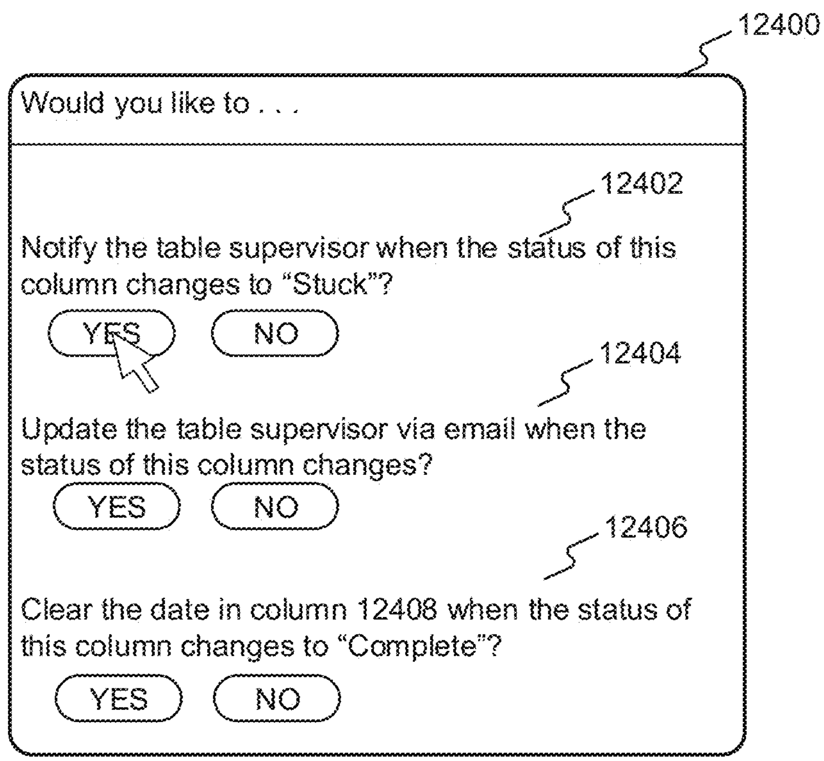

FIG. 124 illustrates an exemplary pick list 12400 for selecting one of a plurality of logical rules, consistent with some embodiments of the present disclosure. Pick list 12400 may be displayed on a graphical user interface (e.g., on user device 220-1, user device 220-2, user device 22-*m*). Pick list 12400 may present as suggestions rule 12402, rule 12404, and rule 12406 that may be selected by the user by clicking "YES" or may be declined by the user by clicking "NO." In some embodiments, a list may be provided without a "YES"/"No" option, but rather that enables selection simply by clicking on a listed rule. Rule 12402, rule 12404, and rule 12406 may be all of the logical rules associated with the selected column type in the correlation index, or they may be the top ranked logical rules in a larger number of rules in the correlation index.

Some embodiments may include permitting alteration to the correlation index to remove suggestions. Alteration to the correlation index may include the addition, removal, rearrangement, or modification of logical rules from the pick list. Altering the correlation index to remove suggestions may include the removal or obfuscation of logical rules from the correlation index and the pick list, or a presentation indicating that the logical rule for removal should not be presented with respect to a certain column type. In some embodiments, altering the correlation index to remove suggestions may include modifying settings or parameters associated with the correlation index so that it no longer includes logical rules similar to the removed suggestions. Permitting alteration may refer to granting a user access rights to the user such that the user can modify the correlation index. In some embodiments, alteration to the correlation index can occur automatically based on a user selecting or declining a presented suggestion.

By way of example, a user may be granted access rights to correlation index 12200 in FIG. 122 such that the user can modify correlation index 12200. For example, a user with access may remove rule 12224 so that it is no longer presented (e.g., on pick list 12400 in FIG. 124 as a suggestion). In another example, rule 12402 may be declined when the user selects "NO" in FIG. 124, which may cause rule 12402 from being removed from a search index.

Disclosed embodiments may include receiving a selection from a pick list and linking to a new column a second particular logical rule associated with the selection from the pick list. Receiving a selection may include receiving one or more inputs indicating that a user has selected a particular second logical rule from the pick list. The selection may be achieved through any suitable user interface (e.g., a mouse, keyboard, touchscreen, microphone). Some nonlimiting examples of inputs may include a clicking the logical rule, clicking a button associated with the logical rule, touching the logical rule on a touch screen, or a verbal confirmation that the logical rule has been selected. Once the selection is received, the selected second logical rule may be linked to the new column.

By way of example, referring to FIG. 124, a user may select one of the logical rules on pick list 12400. For example, the user may select logical rule 12402 from pick list 12400 by clicking on the "YES" icon associated with logical rule 12402.

Some embodiments may include implementing a second particular logical rule when data in a new column meets a condition of the second particular logical rule. Implementing a second particular logical rule may be similar to implementation of the first logical rule, as discussed above and may refer to executing a table action associated with the second particular logical rule once data in the new column meets a condition. For example, if the new column is a status column, and the second particular logical rule is to clear a due date (i.e., a table action) when a corresponding status in a status column is "done" (i.e., meeting a condition), then implementing the second particular logical rule may include clearing the due date when the status turns to "done." Some embodiments may include applying the second particular logical rule to at least one cell in the new column when the particular logical rule is linked to the new column. In these embodiments, it can be said that the selected logical rule is automatically applied or associated to one or more cells of a new column upon being linked to the new column. As soon as the selected logical rule is applied to a new column and its cells, the selected logical rule may automatically execute operations as soon as conditions are met. For example, a selected logical rule for a new status column may be to change the status in the column to "overdue" if a date in a corresponding date column has passed. If the due date has passed when the logical rule is linked to the column, the linked logical rule will be applied such that the corresponding cell in the new status column will have a status of "overdue."

By way of a non-limiting example, referring to FIGS. 120 and 124, assume status column 12002 is a new column where a user has selected logical rule 12402 from pick list 12400, thereby linking logical rule 12402 to status column 12002. Logical rule 12402 may be implemented such that if the top cell of status column 12002 changes from "In Progress" to "Stuck," a table supervisor will be notified. Logical rule 12402 may also be applied at the time when it is linked to status column 12002 such that a table supervisor is notified immediately due to the status of the middle cell in status column 12002 being "Stuck."

Figure 125:
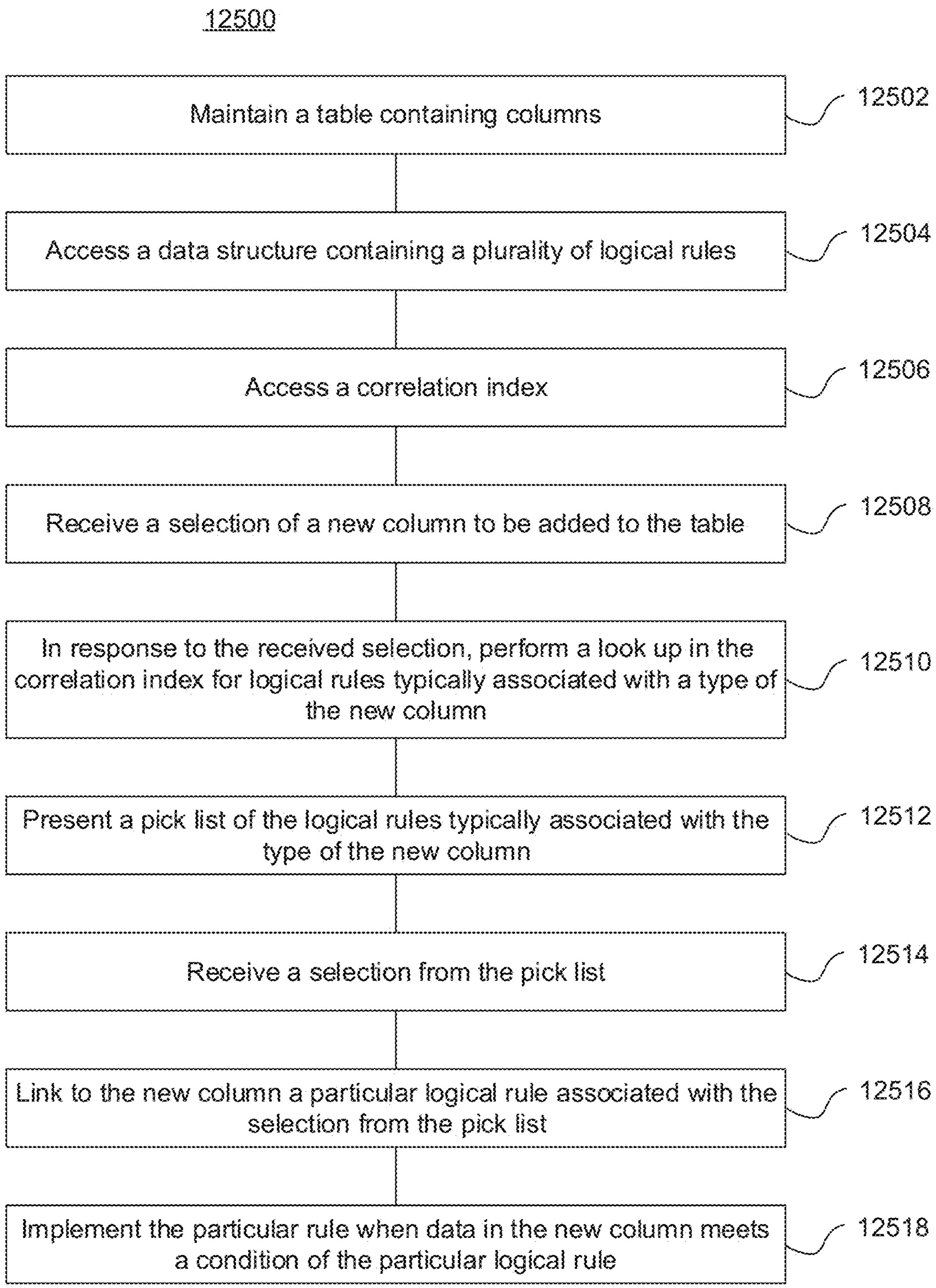

FIG. 125 illustrates a block diagram of an example process 12500 for associating a plurality of logical rules with groupings of data. While the block diagram may be described below in connection with certain implementation embodiments presented in other figures, those implementations are provided for illustrative purposes only, and are not intended to serve as a limitation on the block diagram. In some embodiments, the process 12500 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 120 to 124 by way of example. In some embodiments, some aspects of the process 12500 may be implemented as software (e.g., program codes or instructions) that are stored in a memory (e.g., the memory portion 122 in FIG. 1) or a non-transitory computer-readable medium. In some embodiments, some aspects of the process 12500 may be implemented as hardware (e.g., a specific-purpose circuit). In some embodiments, the process 12500 may be implemented as a combination of software and hardware.

FIG. 125 includes process blocks 12502 to 12518. At block 12502, a processing means (e.g., any type of processor described herein or that otherwise performs actions on data) may maintain a table containing columns, consistent with some embodiments of the present disclosure.

At block 12504, the processing means may access a data structure containing a plurality of logical rules. The logical rules may, when linked to columns, enable a table action in response to a condition change in a cell associated with a particular logical rule linked to a particular column, as discussed previously in the disclosure above.

At block 12506, the processing means may access a correlation index. The correlation index may identify a plurality of column types and a subset of the plurality of logical rules typically associated with each column type, as discussed previously in the disclosure above.

At block 12508, the processing means may receive a selection of a new column to be added to the table, as discussed previously in the disclosure above.

At block 12510, the processing means may, in response to the received selection, perform a look up in the correlation index for logical rules typically associated with a type of the new column, as discussed previously in the disclosure above.

At block 12512, the processing means may present a pick list of the logical rules typically associated with the type of the new column, as discussed previously in the disclosure above.

At block 12514, the processing means may receive a selection from the pick list, as discussed previously in the disclosure above.

At block 12516, the processing means may link to the new column a particular logical rule associated with the selection from the pick list, as discussed previously in the disclosure above.

At block 12518, the processing means may implement the particular rule when data in the new column meets a condition of the particular logical rule, as discussed previously in the disclosure above.

In the course of collaboration between different users, each of whom may be using a different device (e.g., client device), there may exist a technical challenge to configuring the user interfaces being displayed on each of the different device. For example, there may be a technical challenge to enable a user using one device to view what is being display to another user using another device, and vice versa.

Therefore, there is a need for unconventional approaches to enable a user using one device to view what is being display to another user using another device, and vice versa. Various embodiments of the present disclosure describe unconventional systems and methods of mutual screen sharing. Various embodiments of the present disclosure describe enabling a plurality of client devices to access and display via the platform, causing a communications interface to appear on the first client device and the second client device, wherein the communications interface on the first client device includes a first link to the second application and the communications interface on the second client device includes a second link to the first application; causing a first display on the first client device of the second application in response to selection on the first client device of the first link; causing a second display on the second client device of the first application in response to selection on the second client device of the second link; and during the first display and the second display, enabling communication between the first client device and the second client device. Thus, the various embodiments the present disclosure describe at least a technological solution, based on improvement to operations of computer systems and platforms, to the technical challenge of configuring the user interfaces being displayed on each of the different device.

Aspects of this disclosure may relate to systems, methods, and computer readable media for mutual screen sharing during a text chat. For ease of discussion, some examples are described below with reference to systems, methods, devices, and/or computer-readable media, with the understanding that discussions of each apply equally to the others. For example, some aspects of these methods may be implemented by a computing device or software running thereon. The computing device may include at least one processor as previously described (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example systems, methods and computer readable media are not limited to particular physical or electronic instrumentalities, but rather may be accomplished using many differing instrumentalities.

Mutual screen sharing may refer to an operation or an ability for viewer of one screen to view contents being displayed on a screen of a different viewer, and vice versa. A screen may be an example of the display interface described previously, and may include devices such as a display screen of computer monitor, TV, mobile device, augmented reality (AR), virtual reality (VR) display, and/or other display technologies. Mutual sharing may include directing the different screens to display the same content. For example, different screens may display identical sets of visual data.

Text chat may refer to a method of communication that may include the use of alphanumeric symbols. For example, two or more individuals may communicate through text symbols inputted into a computer systems (including PCs, MACs, phones, pagers, and other electronic devices) by way of an input device (including keyboards, touch screen, voice-to-text interface, and other suitable text interface), which may be displayed on display interfaces to be viewed by a different individual. Examples of text chat includes text messages, instant messages, direct messages, chat boards, SMS, and other similar format of exchanging information via alphanumeric symbols. Text chat may include alphanumerics in any language of any country (e.g., English, Hebrew, Spanish, Chinese, French, Japanese, Korean) and may also include graphics such as images, videos, emojis, GIFs, or any other graphical representation. Other forms of text chat may include the transmission of a link (e.g., a URL or file path) that may cause a re-rendering of a display to present different information.

Consistent with disclosed embodiments, at least one processor of the system may carry out operations that may involve maintaining a platform that hosts a plurality of applications accessible to a plurality of client devices. A platform may refer to a computer system having hardware such as one or more central processing units ("CPUs"), a memory, and input/output interfaces, and software such as an operating system, application program, instruction codes, or any combination thereof, which may be executed by the CPU or other hardware components. For example, the platform may be a software program, executed by the processor of the computer system, which enables the various functions and operations described in the present disclosure. Maintaining the platform may refer to maintaining the operation of the hardware components and/or software programs of the platform or storing data and/or operations of software programs of the platform in a repository.

Hosting may refer to enabling, storing and/or otherwise supporting processes and functions of hardware and software components of the computer system. The platform may generate a software environment that supports various functions carried by applications. For example, a website or a webpage may be an example of a platform, on which various other applications may carryout functions, such as organization of information via tables and spreadsheets, audio and video playback, animations, and graphics generation, downloading and uploading of data, linking to other software or webpages, posting and viewing of messages, text chat, and any other electronic and digital functions. In some instances, these applications may be accessed by client devices connected to the platform. Client devices may refer to computer systems (including PCs, MACs, phones, pagers, and other electronic devices) associated with parties, entities, or users connected to the platform, but not necessarily part of the platform. A user for instance, may access the platform (e.g., a webpage) to use one or more of the applications hosted by the platform via a client device.

By way of example in FIG. 2, computing device 100 and DBMS 235-1 through DBMS **235-*n*** may be examples of client device included in a system that may execute computer instructions, maintain or support the platform, and host a plurality of applications.

Consistent with disclosed embodiments, at least one processor of the system may carry out operations that may enable the plurality of client devices to access and display via the platform, the plurality of applications. Accessing may refer to gaining authorization or entry to download, upload, copy, extract, update, edit, or otherwise receive or manipulate data or information. For example, for a client device to gain access to a board, the platform may authorize the client device to view information that may be stored in items of the board. If accessing the board requires authentication or credential information, the processor may confirm authentication information supplied by the client device as needed.

By way of examples, one or more user devices 220-1 through user device **220-*m* depicted in FIG. 2** may be examples of the plurality of client devices.

In some embodiments, the plurality of applications may include tables. A table, as used herein, refers to any organized manner of displaying information in two dimensions, three dimensions, or more. A plurality of cells formed by horizontal and vertical rows (e.g., rows and columns) may form one example of a two-dimensional table. Tables presented in greater than two dimensions may be simulated on a two-dimensional display or may be presented holographically or through virtual glasses or other virtual displays. The table may be part of a plurality of boards as described previously, which may include tables with items defining objects or entities that are managed in the platform (task, project, client, deal, or any other indication of an item). Items may be contained in a rows or columns of the boards or may be associated therewith through a link (e.g., a link to another board or sub-board, or to any other data structure) or through metadata. The boards or items of the boards may be associated with a user, and the platform may allow client device of the user to access and view the boards, or items of the boards.

Figure 126A:
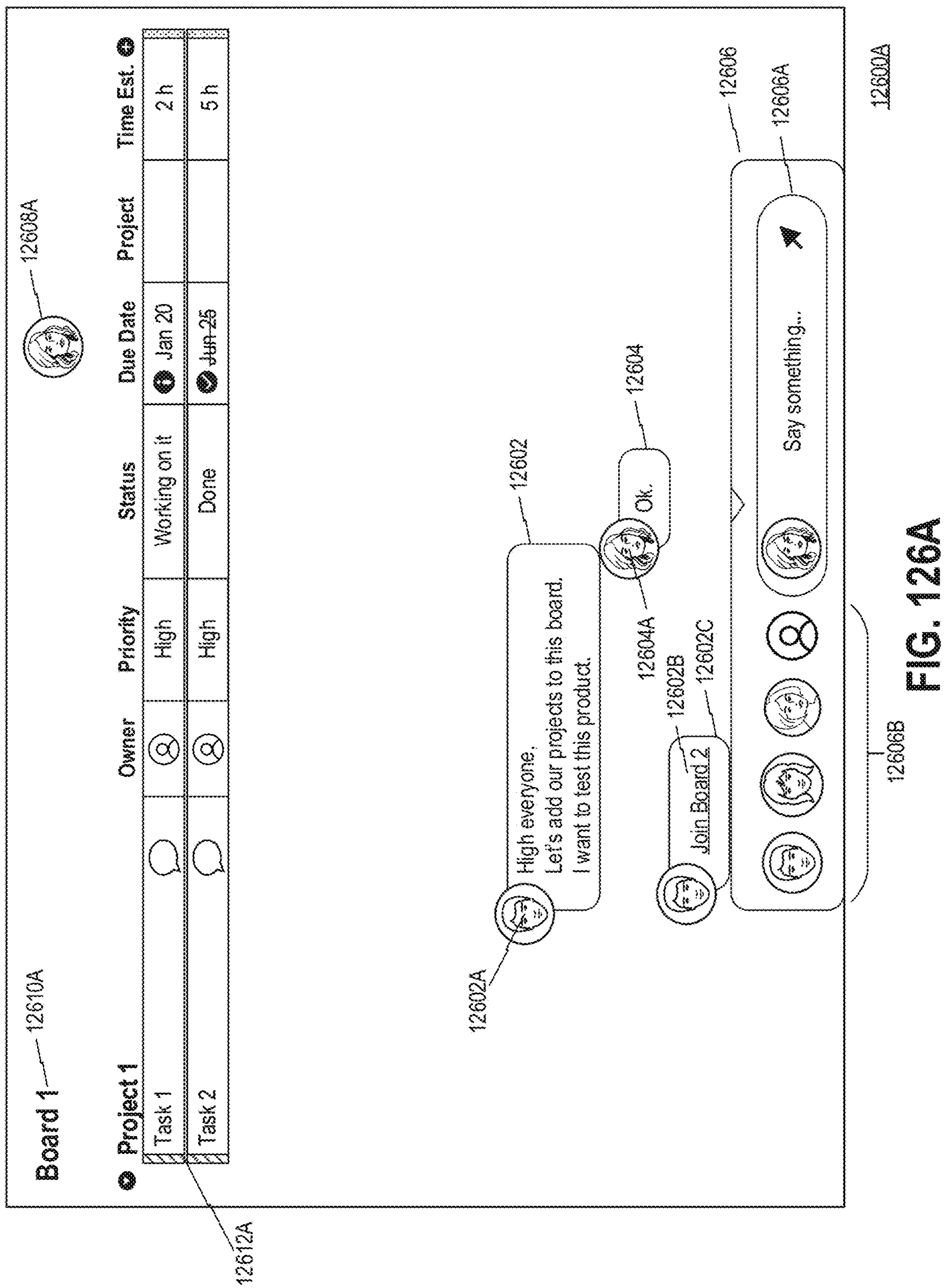

Board 12610A depicted in FIG. 126A is one example of a board. Board 12610A includes table 12612A, which may be an example of an application or a table. Table 12612A may include one or more rows and columns. For example, each row represents an item, such as "Task 1" or "Task 2." Similarly, in FIG. 126B, board 12610B may be another example of a board, and includes table 12612B.

In some embodiments, a plurality of client devices may be enabled to access and display via the platform when, at a particular time, at least a first client device displays a first application and does not display a second application, and at least a second client device displays the second application and does not display the first application. An application may include any platform that may be used by a user that may store and/or process information and may render information on a display. Exemplary applications may be customized to provide unique workflows according to user-design, such as a cell, a column, a row, a header, a board, a dashboard, a widget, or any combination thereof. A second application may be part of the same system or platform as a first application (e.g., a first application and second applications are each different boards of the same system). In other embodiments, the second application may be part of a different system or platform from that of the first application (e.g., the second application is part of a third-party application and is external to the system that hosts the first application). Not displaying an application may include obscuring a view of the application, minimizing a view of the application, not hosting the application, or any other means of not presenting information from the application.

For instance, the system that may include a platform for enabling collaboration among several entities. The system may, for example, share information about a task or a project (e.g., due states, current status, priority, collaborators, collaboration notes, or any other information) among the several users. This information may be contained in tables and boards hosted by the platform. When the platform hosts multiple tables or boards, each of which may be associated with a different project, different users accessing the platform may view a different board or table from other users at any given time. For example, a first user may be viewing a first board on the first client device while a second user is viewing a second board, different form the first board, on the second client device.

FIG. 126A illustrates an exemplary display 12600A. Display 12600A may be an example of what may be displayed (e.g., a first application) on the first client device. Display 12600A includes board header 12610A and table 12612A (e.g., a board), each of which may be an example of the first application displayed on the first client device. In other non-limiting examples, the first application may include multiple tables, dashboards (e.g., summary boards), or any other visualization of information according to any customized workflow consistent with some embodiments of this disclosure. The first client device may be associated with user 12608A, who may be an example of a first user. Table 12612A includes two rows, each representing an item (e.g., "Task 1" and "Task 2"). Table 12612A includes columns, each representing a category of information of an item. For example, column "Owner" may contain information on the user that created the particular item; column "Priority" may contain information regarding level importance of the item; and so on.

Figure 126B:
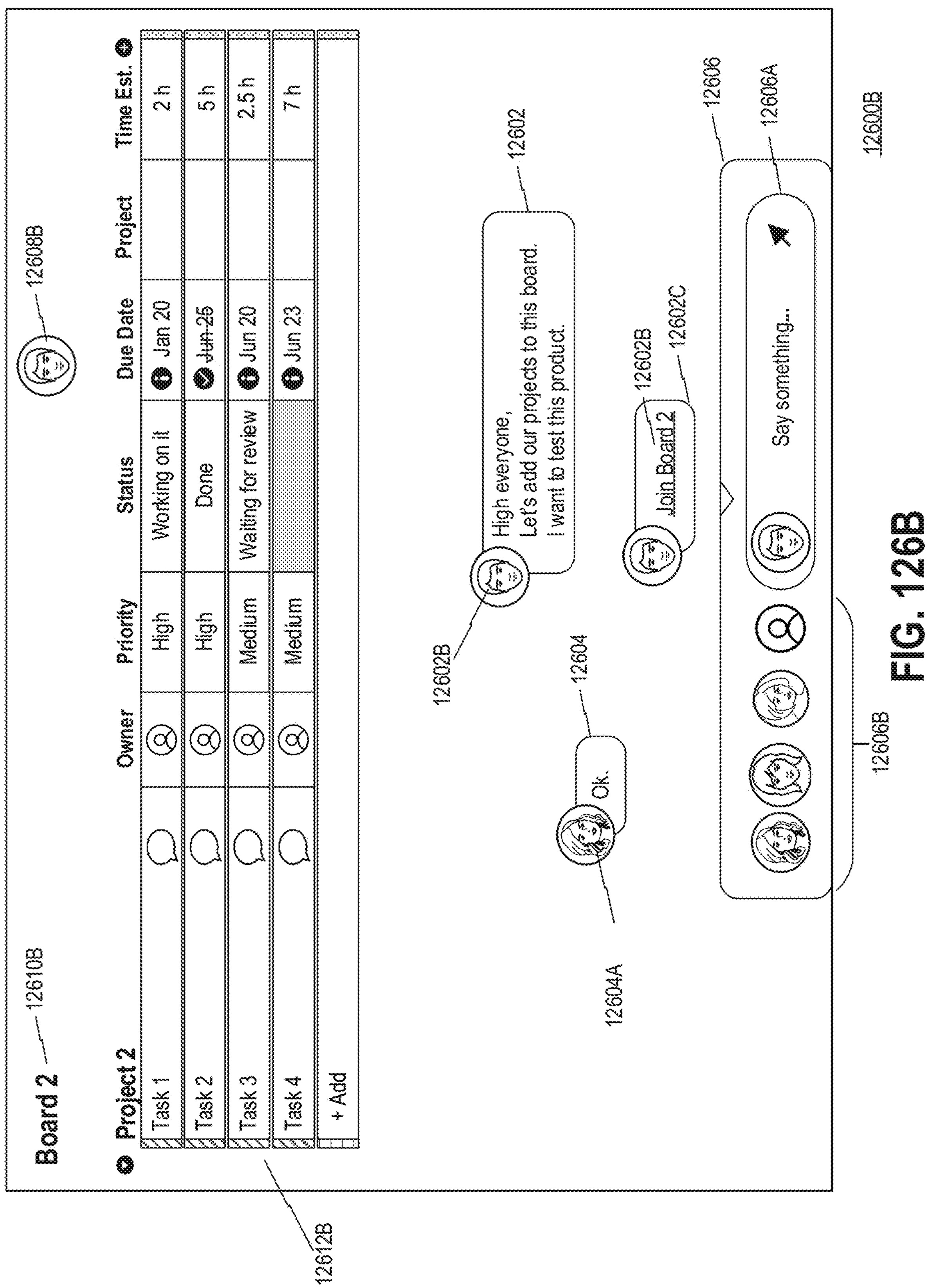

FIG. 126B depicts yet another exemplary display 12600B. Display 12600B may be an example of what may be displayed on a second client device. Display 12600B includes board header 12610B and table 12612B, each of which may be an example of the second application displayed on the second client device. The second client device may be associated with user 12608B, which may be an example of the second user. Any one of user devices 220-1 through user device 220-*m* depicted in FIG. 2 may an example of the first client device or the second client device. In some embodiments, the second client device may display the second application as shown in FIG. 126B, but the second client device might not display the first application as shown in FIG. 126A. Similarly, the first device may display the first application as shown in FIG. 126A and not display the second application as shown in FIG. 126B.

Consistent with disclosed embodiments, at least one processor of the system may carry out operations that may cause a communications interface to appear on a first client device and a second client device. A communications interface may refer to an interactive element of a web page, a mobile-application, a software interface, or any graphical user interface (GUI) that enables interactions between a user and a machine via the interactive element, for the purpose of enabling communication. Examples of the communication interface may include a chat box, a chat bar, a button, an icon, a pop-up menu, virtual keyboard, or any other GUI capable of receiving user input or generating output to the user.

By way of example, interface 12606 depicted in FIG. 126A and FIG. 126B may be an embodiment of a communication interface. As seen in FIG. 126A, interface 12606 is a graphical user interface presented in display 12600A (and/or 12600B). Interface 12606 may be rendered as an overlay (e.g., an object on top of) of display 12600A (and/or 12600B) and may be moved or dragged to a different position of the display as desired. Interface 12606 may be configured to receive inputs from a user (such as user 12608A) via textbox 12606A. Textbox 12606A may display the text or graphics (e.g., emojis) as the user types or otherwise provides inputs. In the example depicted, the textbox 12606A may include an avatar indicating the identity of the text sender (e.g., user 12608A). Interface 12606 may also include social bar 12606B. Social bar 12606B may include one or more avatars representing other users who may be in communication with the text sender. For instance, the social bar 12606B indicates other users who may be part of a group that may send and receive text messages from each other. The social bar 12606B may provide an indication of specific users who are available, busy, or offline. Depending on the status of the recipient of a message, the communication interface may leave a different type of message. For example, when an available recipient receives a message, the available recipient may receive the message immediately. If the recipient is busy or offline for example, the recipient may receive the message later when the recipient becomes available.

In some embodiments, the communications interface may include a text chat box. A text chat box may refer to any user interface, such as GUIs, that may be configured to receive text input from a user and provide text output to the user. Text messages may be communications (e.g., alphanumeric, graphical, or a combination thereof) sent to or received from one or more different users. The text chat box may enable text messages to be sent or received in real-time or near real-time, as to simulate a conversation between different users.

FIG. 126A and FIG. 126B include illustrated examples of text chat boxes. For example, chat box 12602 may display text messages sent by user 12608B (an example of the second user associated with the second client device), and text chat box 12604 may display text messages sent by user 12608A (example of the first user associated with the first client device). Chat boxes 12602 and 12604 may also include avatars (graphically, alphanumerically, or a combination thereof) depicting the identities of the text message senders. For example, chat box 12602 includes avatar 12602A of a second user, and chat box 12604 includes avatar 12604A of a first user. The avatar of the text message sender enables a user to quickly ascertain the source of the text messages. In some embodiments, the chat boxes may appear at a location above social bar 12606B, corresponding to the avatar of the user that sent the text message in the chat box. For example, in FIG. 126A, chat box 12602 contains a text message sent by second user 12608B, leading chat box 12602 to appear above the avatar of the second user 12608B on social bar 12606B. Chat box 12604 contains text messages sent by a first user 12608A, so it appears above textbox 12606A of the first user 12608A. This arrangement of chat box locations may also allow users to visually organize the text messages being displayed in an efficient manner.

Similarly, in FIG. 126B, chat box 12604, which contains text messages sent by the first user 12608A, appears over social bar 12606B corresponding to the avatar of the first user 12608A. Chat box 12602, which contains text sent by the second user 12608B, appears over textbox 12606A of the second user 12608B.

In some embodiments, the communications interface on the first client device includes a first link to the second application and the communications interface on the second client device may include a second link to the first application. A link may include any means of electronically associating or connecting information and may activated to cause one or more functions, applications, programs, or renderings to occur. For example, a link may contain an address to a destination, and/or instructions, that when activated, would cause the loading of information stored at the destination, or execution of the instruction. For instance, a hyperlink or a URL may be examples of the first link, which may cause the first client device to access the second application. In some embodiments, the communications interface on the second client device may include a second link to the first application which may cause the second client device to access the first application. For example, the first user may also send a link (e.g., the first link) to the second user to allow the second user to access a table (e.g., the first application) being accessed by the first user as previously described. In other embodiments, the first link to the second application and the second link to the first application may be associated to establish a two-way connection between the first and second user and cause the first and second applications to display on the first and second client devices.

For example, in FIG. 126A, link 12602B include an embodiment of a link, such as the first link to the second application. Link 12602B may be included in chat box 12602C. By way of a non-limiting example, when a first user 12608A using the first client device is in communication with a second user 12608B using the second client device, via the platform, each user may be accessing different boards or tables at a given time. In order to collaborate on a common project relating to table 12612B (e.g., the second application) currently being accessed by the second user 12608B, the second user 12608B may send link 12602B (e.g., the second link) to the first user 12608A through chat box 12602C. The first user 12608A may now access the table 12612B that is currently accessed by the second user 12608B, and these two parties may collaborate while accessing table 12612B. Link 12602B may be a hyperlink containing in a computer executable instruction that may be activated.

Consistent with disclosed embodiments, at least one processor of the system may carry out operations that may cause a first display on the first client device of the second application in response to selection on the first client device of the first link. For example, when the first client device accesses a table (e.g., the second application) embedded in the link (e.g., the second link) received from the second client device, the table may be displayed on the first client device. This may allow the first user to view and work on the same table as the second user who sent the link.

Figure 127:
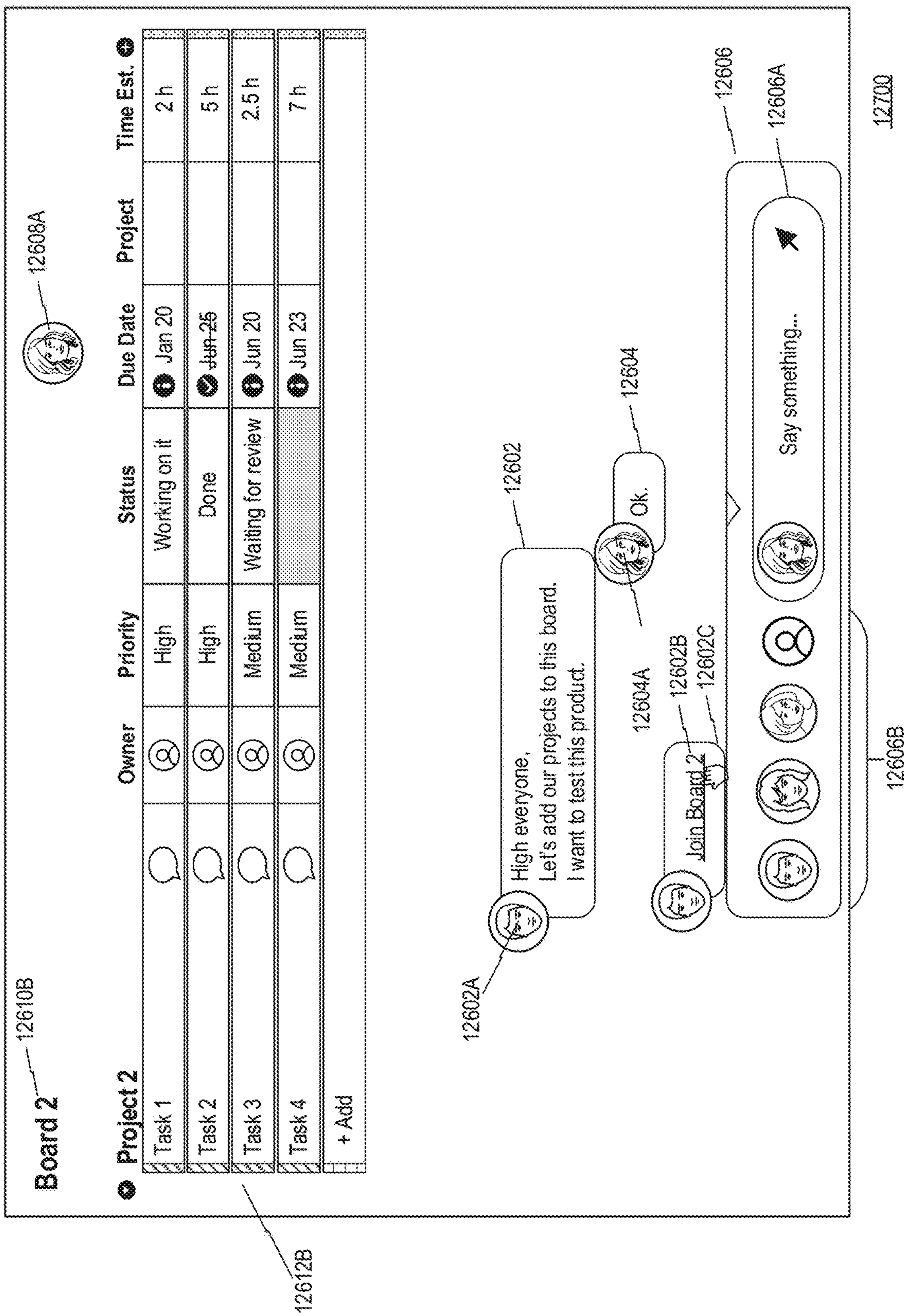

For example, when user 12608A activates link 12602B (e.g., by clicking or pressing on a touch screen, or any other type of selection), the client device of a first user 12608A (e.g., the first client device) may cause the display to change to a different display (e.g., the second application). FIG. 127 may be an example of the display on the client device of the first user 12608A (e.g., the first client device) after activation of the link. FIG. 127 depicts display 12700, which is being presented on the first client device after activation of link 12602B. Whereas the first client device previously presented display 12600A prior to activation of link 12602B, the first client device presents display 12700 after activation of link 12602B.

Consistent with disclosed embodiments, at least one processor of the system may carry out operations that may cause a second display on the second client device of the first application in response to selection on the second client device of the second link. When the second client device accesses a table (e.g., the first application) embedded in the link (e.g., the first link) received from the first client device, the table is displayed on the second client device, allowing second user to view and work on the same table as the first user who sent the link. The present disclosure is not limited to the example illustrated in FIG. 126A and FIG. 126B. For example, the first user 12610A may also send a link configured to cause display 12600A to the second device, which upon activation by the second user 12608B, might cause the second client device to present display 12600A on the second client device.

In some embodiments, the first link and the second link each may include at least one button, activation of which enables screen sharing. A button, for example, may be an interactive graphical element such as an icon, which may be programmed to include the first link or the second link. For example, graphic element in a shape of a button can contain or be associated with a hyperlink to the first application or the second application. Buttons may be graphical, but may also be alphanumerical, textual, or any combination thereof.

Figure 128:
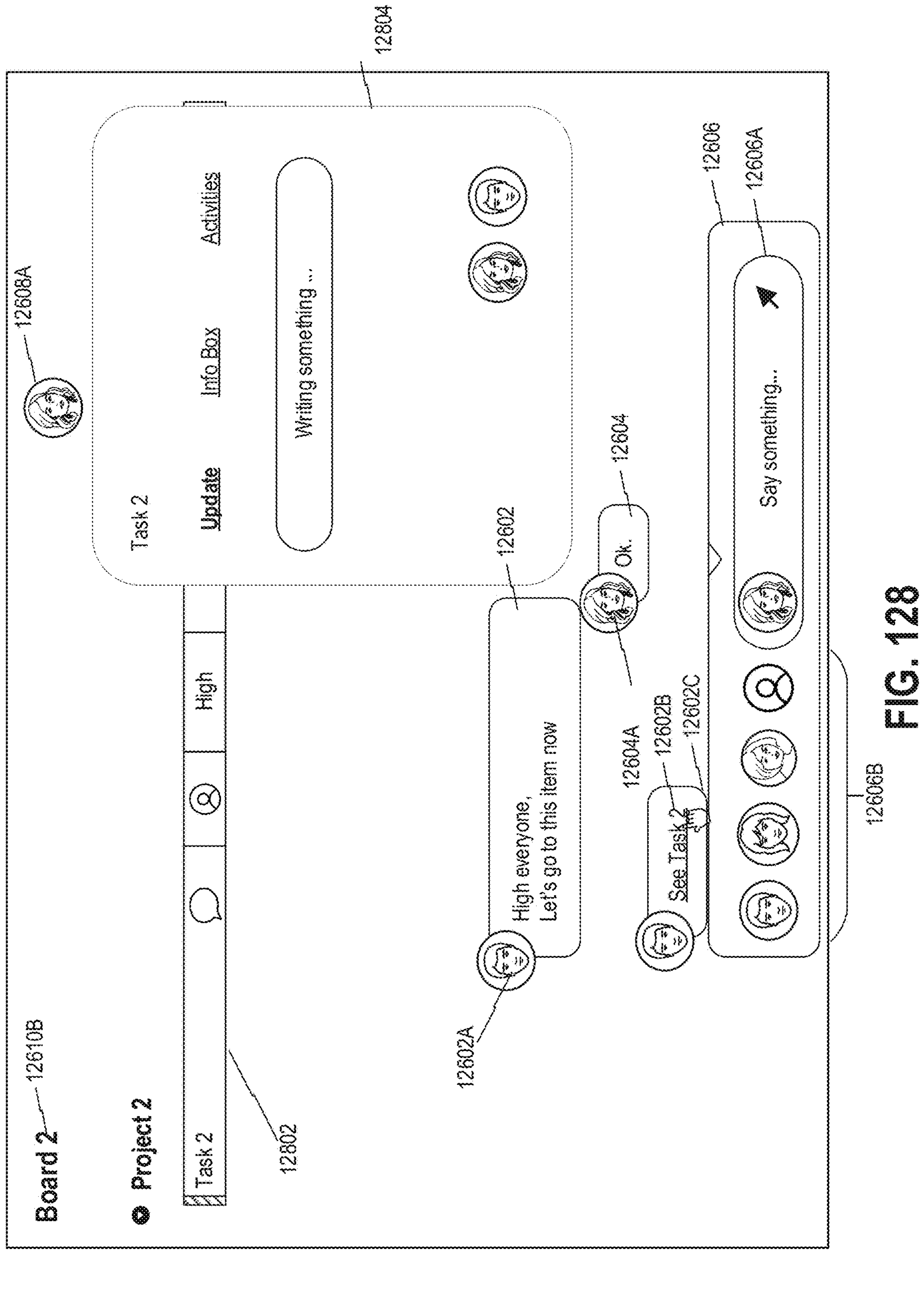

As depicted in FIG. 128, button 12602B may be an example of a link being presented in form of a button presented with text that links other users to the board of a first user 12602A. In another exemplary embodiment, the button may be graphical and may be associated with an indication of the user, such as avatar 12602A, which may be associated with the first user's application.

In some embodiments, the first display on the first client device of the second application includes a link to a particular location within the second application, the particular location corresponding to a current working location on the second client device. A location may refer to a portion of the application being displayed on a display interface. For example, a particular location of table may include a particular row (or rows), column (or columns), or cell (or cells) of a table. Another example of a particular location may include a zoomed in view of a portion of a document (e.g., PDF) or a visualization (e.g., a dashboard). A current working location may refer to the location of the application that is being displayed on a client device, or is being linked to when accessed by a client device. For example, an item of a table of may be an example of a location. When, for example, the second client device provides a link of a specific item on a table, the linked item may be a particular location or the current working location. In some embodiments, when the link is associated with a specific item, the client device may zoom or scale to the specific item, or cause an additional menu or interface to appear on the display of the client device. In some embodiments, the platform may host other types of applications, in addition to or alternatively to boards and tables. For example, the platform may host applications such as word processors, spreadsheet applications, calendars, organizers, or similar types of software applications. A current working location may also refer to a specific location in those software applications, such as a specific line or page in a word processor; a specific row, column, or cell of a spread sheet; and/or a specific date in a calendar.

For example, FIG. 128 may be an example of what may be displayed on the first client device associated with a first user 12608A after activation of button 12602B. Item 12802 may be an example of a location. Item 12802 may be "Task 2" of table 12612B depicted in FIG. 126B. In some instances, a second user 12608B may desire to collaborate on a specific item of a board, and thus may send a link (such as button 12602B) that is linked only to that item. Thus, when first user 12608A activates the link, the first client device zooms directly to the linked item ("Task 2" in the example). Additionally, in some instances, display 12804 may appear in FIG. 128 upon activation of button 12602B. Display 12804 may be a user interface that allow users (such as first user 12608A or second user 12608B) to make edits to information of item 12802, or to leave additional notes specific to item 12802 (e.g., annotations).

In some embodiments, the at least one processor is further configured to store communications between a first client device and a second client device based on the particular location. The communication between the first client device and the second client device may be, for example, a log of text messages. When the text messages are exchanged in context of a specific item, the log of text chats may be stored in a data field associated with the specific item, and later accessible by accessing the specific item. The specific item may be the item being contained in the first link or the second link. Once the communications are stored based on the particular location, a client device may access the communications from the particular location when the client device displays that particular location containing the stored communications. In this way, multiple communications may be stored in multiple locations in an application associated with multiple items, which may then be accessed to display the pertinent communications to each of the correlating items.

Figure 129:
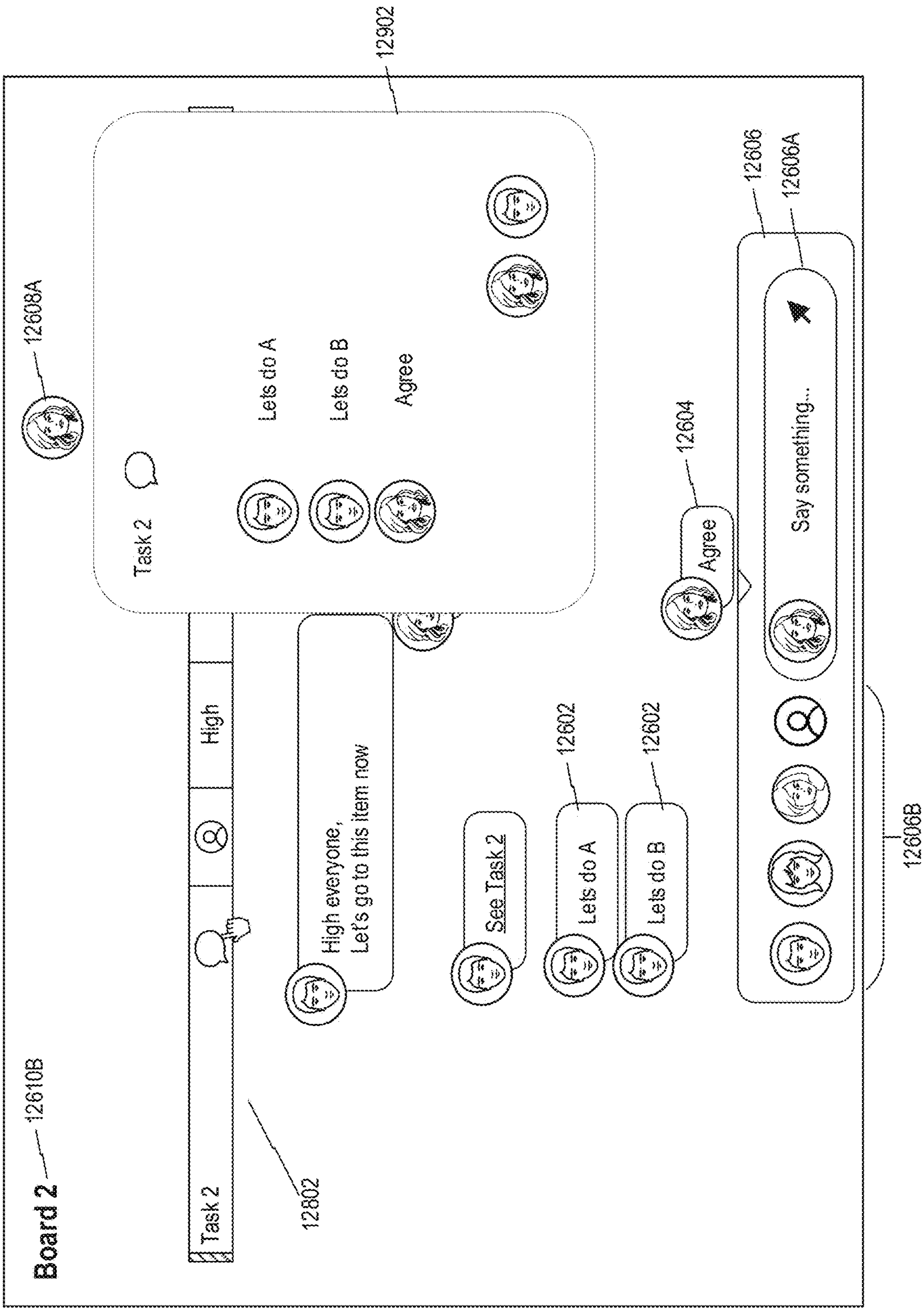

For example, FIG. 129 depicts an example of content displayed on the client device (e.g., the first client device), after activation of button 12602. The text messages being sent back and forth between a first user 12608A and a second user 12608B may be stored in a particular location on board 12610B for later viewing. In some cases, the text messages may be stored and linked to a specific item, such as item 12802. For example, text messages in chat boxes 12602 and 12604 may be related to item 12802, so it may be convenient to store the record of this conversation in a location linked to item 12802. By way of example, the text message between users 12608A or 12608B can be retrieved and displayed in display 12902. In some cases, the text messages may be accompanied by the avatar of the sender, or accompanied by a time stamp of the time of sending.

Consistent with disclosed embodiments, at least one processor of the system may carry out operations that may, during a first display and a second display, enable communication between a first client device and a second client device. For instance, even while the display interfaces on the first client device or the second client device switch views when the links to a different application are activated, the chat function, and the associated interfaces may be maintained. This may allow the on-going conversation between the first and second users to continue without interruption. The first user and the second user may switch between boards that they are currently viewing and may simultaneously interact with each other through text messages that remain active. Further, the first user and the second user may simultaneously view both applications (e.g., both boards) while simultaneously interacting with each other. This ability may allow the users to be in the "same place together," (e.g., a virtual location) even if they are viewing or working on different items or boards. The constant availability of the communication interface removes the need for the users to frequently switch between collaboration tools (such as the boards) and communication tools.

For example, as seen in FIG. 126A and FIG. 126B, both the first client device and the second client device present the text messages exchanged between the users. Moreover, as seen in FIG. 127, the first client device continues to present the text messages exchanged (e.g., chat boxes 12602 and 12604 remain visible and active). In FIG. 126A, FIG. 126B, and FIG. 127, interface 12606 remains enabled to send and receive text messages in both the first and second client devices.

In some embodiments, the at least one processor is further configured to receive a response to a notification and to cause a communications interface to appear on a first client device and a second client device upon receipt of the response to the notification. A notification may refer to an alert or an announcement of an event or an occurrence. A notification may include any communication or command generated in response to an event or an occurrence within the system or from an external source. In one example, a notification may be generated by the system when a user sends a message (such as a text chat) to a different party. In another example, a notification may be generated by the system based on a time (such as a preset alarm for a given time), a system status (such as when system is starting up, shutting off, or encountering an error), a condition being met or failed (such as a status change, meeting a deadline, a user being assigned or removed), or some other event or occurrence of the system.

By way of example, the communications interface may appear on the first and/or second client devices when these devices receive a text message from another user. Additionally, or alternatively, the communications interface may appear when the first and/or second client devices are in communication with the platform or are accessing a board, table, or an item. Additionally, or alternatively, the communications interface may appear automatically at a fixed time, such as at the beginning of business hours. Additionally, or alternatively, the communications interface may appear when a status or information contained in a table or an item associated with a user is updated. Additionally, or alternatively, the communications interface may appear when a user selects an interactive element of a table or an item.

In some embodiments, the at least one processor is further configured to cause a communications interface to appear on a third client device and to enable access to the second application on the third client device via the first link. The present disclosure is not limited to access between two client devices. Multiple users, each using a client device, may communicate using the communications interface on the platform. One user may send links to more than one other user, all of whom may access the table or application being linked through their respective client devices.

For example in FIG. 127 or FIG. 128, social bar 12606B is shown to include avatars representing additional users. Any of these additional users may join the text message conversation (e.g., may be added to the conversation by users in an established chat), and may also access link 12602B or button 12602B, which will cause their respective client device to display a particular location of an application as shown in FIG. 127 or FIG. 128.

Figure 130:
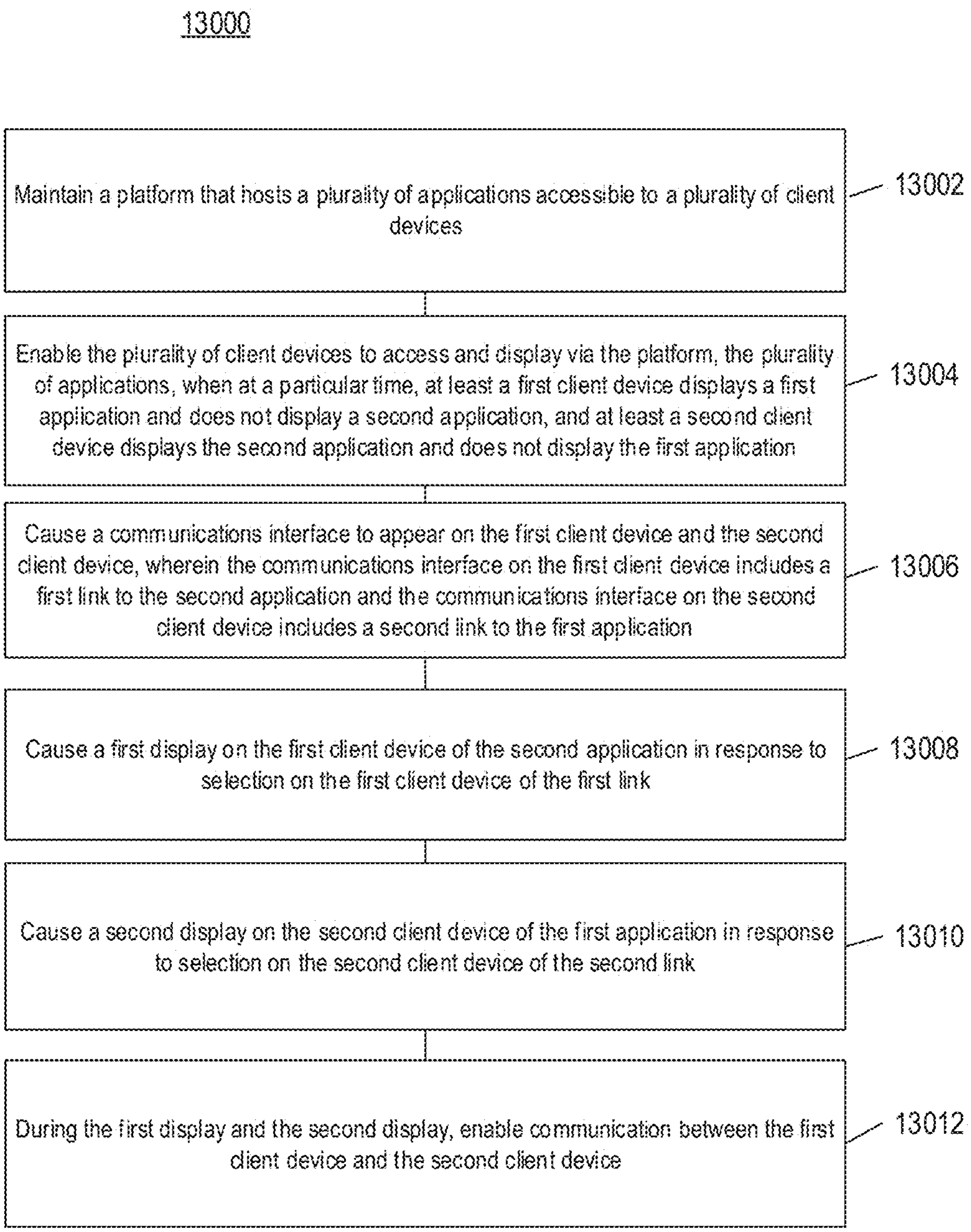

FIG. 130 depicts an exemplary process for mutual screen sharing during a communication, consistent with the present disclosure.

At block 13002, processing circuitry 110 may maintain a platform that may host a plurality of applications accessible to a plurality of client devices. For example, processing circuitry 110 may maintain a website, an operating system, or other virtual/digital environment on which various other applications may carryout functions, such as organization information via tables and spreadsheet, audio and video playback, animation, graphic generation, downloading and uploading of data, linking to other software or webpages, posting, and viewing of messages, text chat, and other electronic and digital functions. Processing circuitry 110 may also allow a plurality of client devices to connected to the platform. For example, user devices 220-1 to 220-*m* may be example of client devices that may be connected to a platform maintained by computer device 100 via network 210. Users associated with user devices 220-1 to 220-*m* may access the platform to use one or more of the applications hosted by the platform.

At block 13004, processing circuitry 110 may enable the plurality of client devices to access and display via the platform, the plurality of applications. For example, computing device 100 may provide a link to user devices 220-1 to 220-*m* to gain access to boards, tables, and other applications hosted on the platform. If accessing the board requires authentication or credential information, processing circuitry 110 may confirm authentication information supplied by the client device as needed. User devices 220-1 to 220-*m* may display their respective display interfaces of the plurality of applications. For example, one of user device 220-*m* (e.g., the first client device) may present display 12600A (an example of a first display) on its display interface, and another one of user device 220-*m* (e.g., the second client device) may present display 12600B (an example of a second display) on its display interface.

At block 13006, processing circuitry 110 may cause a communications interface to appear on the first client device and the second client device. For example, interface 12606 may be an example of the communication interface. Processing circuitry 110 may render interface 12606 as an overlay on display 12600A (and/or 12600B), and it may be moved or dragged to a different position as desired. Interface 12606 may be configured to receive inputs from a user (such as user 12608A) via textbox 12606A. Textbox 12606A may display the texts as the user types or otherwise provides input. Interface 12606 may also include social bar 12606B. Social bar 12606B may include one or more avatars representing other users who may be in communication with sender of text messages. For instance, the social bar 12606B indicates other users who may be part of a group that may send and receive text messages to and from each other.

In some embodiments, the communications interface includes one or more text chat box. Processing circuitry 110 may generate text chat boxes to display messages sent or received in real-time or near real-time, as to simulate a conversation between different users. For example, in FIG. 126A and FIG. 126B, chat boxes 12602 and 12604 are examples of text chat boxes. Chat boxes 12602 and 12604 also include avatars depicting the identity of texts senders, such as avatar 12602A and avatar 12604A. In some embodiments, processing circuitry 110 renders the chat boxes to appear at a location above social bar 12606B, corresponding to the avatar of the user that sent the text message in the chat box. For example, in FIG. 126A, chat box 12602 contains texts sent by 12608B, so chat box 12602 appears over the avatar of 12608B on social bar 12606B. Similarly, chat box 12604 contains texts sent by 12608A, so it appears over textbox 12606A.

In some embodiments, the communications interface on the first client device includes a first link to the second application. Additionally, or alternatively, the communications interface on the second client device includes a second link to the first application. A link may contain an address to a destination, and/or instructions, that when activated, cause the loading of information stored at the destination, or execution of the instruction. For instances, a hyperlink or an URL may be an example of the first link, which may cause the first client device to access the second application. For example, in FIG. 126A, link 12602B may be an example of a link, such as the first link to the second application. Link 12602B may be included in chat box 12602.

At block 13008, processing circuitry 110 may cause a first display on the first client device of the second application in response to selection on the first client device of the first link. For example, when user 12608A activates link 12602B (e.g., by clicking or pressing on a touch screen), processing circuitry 110 may cause the client device of user 12608A (e.g., the first client device) to change to a different display (e.g., the second application). Display 12700 may be an example of what is being display on the client device of 12608A (e.g., the first client device) after activation of link 12602B.

At block 13010, processing circuitry 110 may cause a second display on the second client device of the first application in response to selection on the second client device of the second link. In some embodiments, user 12608A may send a link (e.g., the second link) to user 12608B in a chat box, such that when user 12608B activates the link, processing circuitry 110 may cause the client device of user 12608B (e.g., the second client device) to present the first application for display.

At block 13012, processing circuitry 110, during the first display and the second display, may enable communication between the first client device and the second client device. For instance, even while the display interfaces on the first client device or the second client device switch or re-render views, processing circuitry 110 maintains the communications function and the communication interface. For example, as seen FIG. 127, the first client device continues to present the text messages exchanged (e.g., chat boxes 12602 and 12604 remain visible and active). In FIG. 126A, FIG. 126B, and FIG. 127, interface 12606 remains enabled to send and receive text messages in both the first and second client devices.

In the course of collaboration between different users, each of whom may be using a different device (e.g., client device), there may exist a technical challenge of configuring the user interfaces being displayed on each of the different devices to enable contextual communications regarding a particular work area in a workspace. For example, there may be a technical challenge of efficiently arranging on the user interfaces, displays of communications between the different users. For example, when many users communicate simultaneously or in proximity to each other, some messages might be missed because, for example, some messages might overwrite or cover others; some messages might scroll off or otherwise disappear from a display before the messages can be read; or some messages might be missed because a user is distracted by other messages.

Therefore, there may be a need for unconventional approaches to enable a user using their device to view on-going communications between different users, arrange such communication in a display in an efficient manner, and remove such communication displays in a timely manner in relation to a context. The context options are myriad. They may include priorities of certain communications, priorities of certain individuals, number of individuals communicating simultaneously, amount of display space available for messages, length of messages, importance level of messages, and any other factor that might influence the need to have a message remain on a display for a variable period. Various embodiments of the present disclosure describe unconventional systems, methods and computer readable media that automatically vary hang-time of pop-up messages. The various embodiments of the present disclosure describe at least a technological solution, based on improvement to operations of computer systems and platforms, to the technical challenge of efficiently arranging on the user interfaces, display of communications between differing users.

Aspects of this disclosure may relate to systems, methods, and computer readable media that automatically varies hang-time of pop-up messages. For ease of discussion, some examples are described below with reference to systems, methods, devices, and/or computer-readable media, with the understanding that discussions of each apply equally to the others. For example, some aspects of these methods may be implemented by a computing device or software running thereon. The computing device may include at least one processor as previously described (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

A communications system may be any set of components working together. For example, a system may involve one or more processors that execute instructions to cause functionality described herein, such as varying the hang time of pop-up messages. The system may be configured to display the pop-up messages via an interactive element of a web page, a mobile-application, a software system, or any graphical user interface (GUI) that enables interactions between a human and a machine via the interactive element, for the purpose of facilitating communication. By way of example, the system may be configured to enable pop-up messages to appear on a display screen or other form of display, in a chat box, or in a chat bar. The pop up messages may be enabled to appear on any form of interface and in any context. For example, the messages may be enabled to pop-up in a social layer. The messages may be generated in a myriad of ways, such as through a physical or virtual keyboard, a voice to text component, buttons, icon selection, a menu, and/or via any other GUI or input device capable of receiving user inputs.

Figure 131:
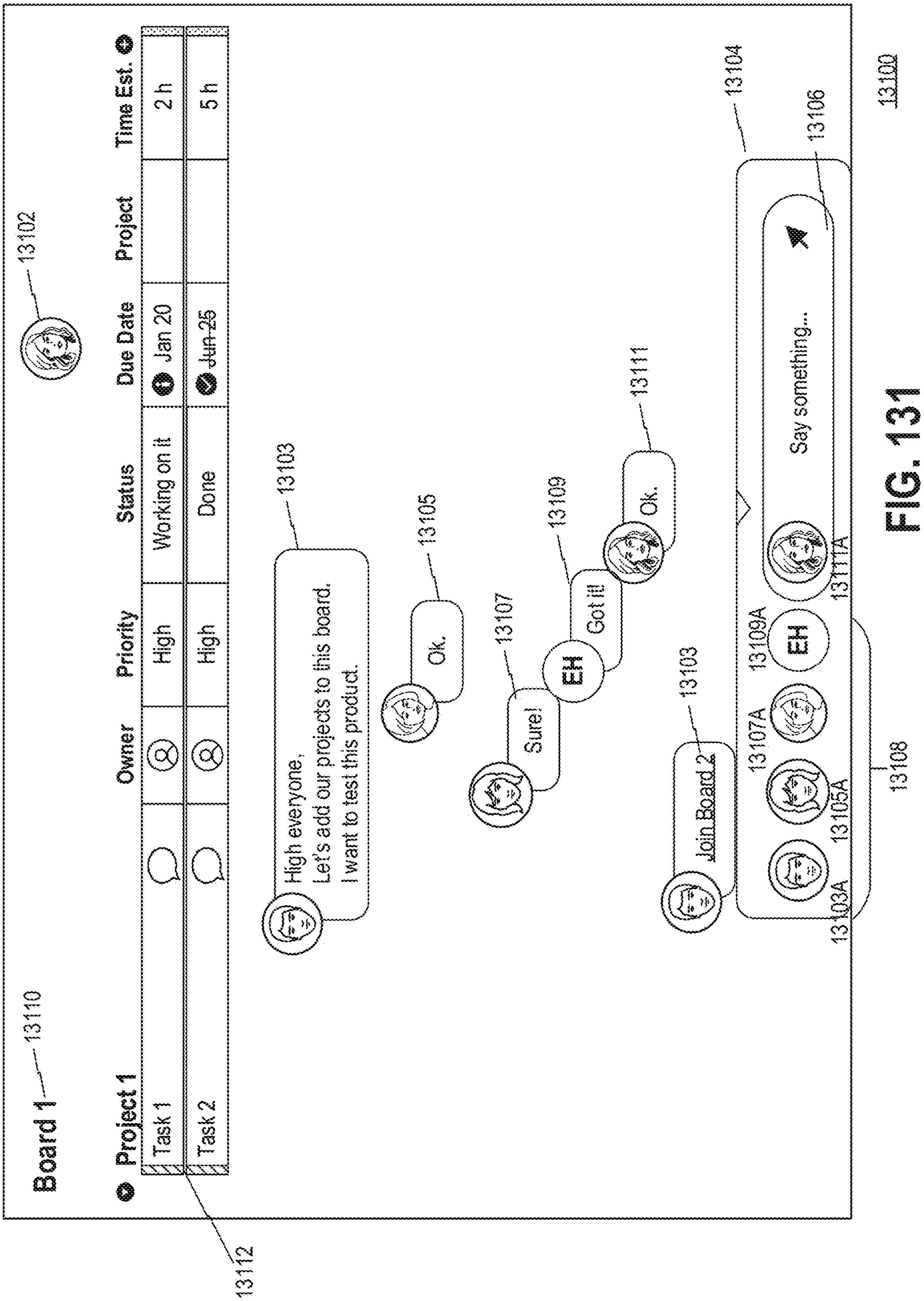

By way of example, interface 13104 depicted in FIG. 131 may be an example of a display on which hang time may be varied. As seen in FIG. 131, interface 13104 is a graphical user interface presented in display 13100. Interface 13104 may be configured to receive inputs from a user (such as user 13102) via textbox 13106. Textbox 13106 may display the text or graphics as the user types or otherwise provides inputs. In the example depicted, textbox 13106 may include an avatar (e.g., 13111A) indicating the identity of the text sender.

Pop-up messages may refer to messages, texts, graphics and/or other information that may be displayed for a limited amount of time. Pop-up messages may include information communicated between parties. For example, two or more individuals may communicate through text symbols inputted into computer systems (including PCs, MACs, phones, pagers, and other electronic devices) by way of an input device (including keyboards, touch screen, voice-to-text interface, and other suitable text interface), which may be displayed on display interfaces to be viewed by another individual. Examples of pop-up messages includes text messages, instant messages, direct messages, chat boards, SMS messages, and any other formats of exchanging information. Pop-up messages may include alphanumerics in any language of any country (e.g., English, Hebrew, Spanish, Chinese, French, Japanese, Korean) and may also include graphics such as images, emojis, GIFs, or any other graphical representation. Other forms of pop-up messages may include the transmission of a link (e.g., a URL or file path) that may cause a re-rendering of a display to present different information.

A pop-up notification may refer to a message, such as a message presented in a form of a bubble, window, box, or other format presentable on a display interface, such as a display interface as described previously. For example, display interfaces may include devices such as a display of a computer monitor, TV, mobile device, augmented reality (AR) device, virtual reality (VR) device, and/or other device employing other display technologies. In some cases, the user may view the pop-up message or notifications without having to react to the messages or notifications immediately. In some cases, the pop-up messages or notifications may disappear from the screen after some time period. The time period that the pop-up messages remain viewable by the user may be referred to as hang time. The hang time of the pop-up messages may vary, such that the communication interface may cause some pop-up messages to have a longer hang time than other pop-up messages. The communication interface may automatically determine the hang time of each of the pop-up messages based on some logic, algorithms, or rules, which may vary depending on design choice. For example, the system may assign a longer hang time that correlates to a longer message length. In other embodiments, the hang time may be manually determined by a user, such as by assigning a hang time based on the identity of a message sender. For example, there may be a preference to assign a longer hang time for a message sent by a supervisor. In other examples, the hang time may vary based on the number of messages being simultaneously displayed. For example, when fewer messages are displayed, less time may be needed to read them, and therefore, a shorter hang time may be warranted. Longer hang times may be assigned to a host of a chat session. An administrator may, in some instances, be permitted to define hang time rules.

As illustrated in FIG. 131, bubbles 13103, 13105, 13107, 13109, and 13111 may each be an example of a pop-up message. Each of these bubbles may be configured to disappear from display 13100 after a time period (e.g., hang time) either automatically determined by the system, by a manual assignment based on a preference, or a combination thereof.

Consistent with disclosed embodiments, at least one processor may enable presentation of a shared work environment on a plurality of client devices. A shared work environment may refer to features, functions, tools, utilities, or other activities supported or created by computer programs, applications, or software. For example, a shared work environment may be an interface, a form of display, a suite of software applications, such task organizers, word processors, spreadsheet, webpage, calendars, and/or other programs or applications that may separately or together be accessible by users through the use of client devices. The shared work environment may be presented on any interface or display of a client device, as previously discussed above. Client devices may refer to computer systems (including PCs, MACs, phones, pagers, or any other electronic device that can be used for generating and/or consuming information) associated with parties connected to a platform. A user for instance, may access the platform (e.g., a webpage) to use one or more of the applications hosted by the platform via a client device. A word processing program or a workflow management board system may serve as a platform, and various client devices might access that platform simultaneously, with embodiments of this disclosure permitting multiple users to communicate simultaneously or sequentially. The users may be enabled to view common or shared information. In some embodiments, differing users might view different information or access differing platforms, while common messages are nevertheless displayed across differing views or platforms.

FIG. 131 depicts display 13100. Display 13100 may be an example of a presentation of a portion of a shared work environment that is displayed on a client device. Display 13100 presents board 13110 and table 13112, each of which may examples of an application of the shared work environment accessible by a client device. By way of example, any one of user devices 220-1 through user device **220-*m* depicted in FIG. 2 may be the client device that displays the shared work environment. The client device may be associated with a client with access to the shared work environment, such as by user 13102 of FIG. 131**.

A table may refer to any organized manner of displaying information in two dimensions, three dimensions, or more. A plurality of cells formed by horizontal and vertical rows (e.g., rows and columns) may form one example of two-dimensional table. Tables presented in greater than two dimensions may be simulated on a two-dimensional display or may be presented holographically or through virtual glasses or other virtual displays. The table may be part of a plurality of boards as described previously, which may include tables with items defining objects or entities that are managed in the platform (e.g., task, project, client, deal, or any other indication of an item).

Board 13110 depicted in FIG. 131 may be an example of a table. Board 13110 includes table 13112, which may be an example of an application or a table. Table 13112 may include one or more rows and columns. In the example depicted, table 13112 includes two rows, each representing an item (e.g., "Task 1" and "Task 2"). Table 13112 includes columns, each representing a category of information of an item. For example, column "Owner" may contain information on the user that created the item; column "Priority" may contain information regarding level importance of the item; and so on. Items may be contained in a rows or columns of the boards or may be associated therewith through a link (e.g., a link to another board or sub-board, or to any other data structure) or through metadata. The boards or items of the board may be associated with a user (e.g., user 13102), and the platform may allow client devices of the user to access and view the boards, or items of the boards.

Disclosed embodiments may involve causing a presentation of a plurality of visual indicators on a fraction of a display of the shared work environment. A visual indicator may refer to any graphic or visual elements, such as shapes, symbols, images, animations, videos, photo, alphanumeric text, and other similar media, rendered by the system to represent data or information. Visual indicators may be rendered for the purpose of providing visual notifications, reminders, identification, information presentation, or any other viewing purposes, on, for example, only on a fraction of the display. A fraction of the display may include any portion of space taken up in a presentation of information on the display, ranging from a minimum portion of the display up to the entire display. The fraction of the display may be static or may be dynamic in that the fraction of the display may be adjusted by the system or a user. For example, the shared work environment may be configured to display may different elements, and the visual indicator may be displayed on top of, or together with other visual elements of the shared work environment. The visual indicators may take a fraction of the display of the shared work environment by being located towards the top, side, or bottom of the display.

In FIG. 131, interface 13106 may include social bar 13108. Social bar 13108 may include one or more avatars representing other users who may be in communication with the text sender. As depicted, social bar 13108 includes avatars 13103A, 13105A, 13107A, 13109A, each of which may be an example of a visual indicator representing a user associated a client device. Interface 13106 also includes avatar 13111A, which may be an example of a visual indicator representing user 13102.

In some embodiments, the fraction of the display includes a bar on an edge of the display. For example, a fraction of the display may be reserved to display users in communication with the shared work environment. For instance, there may be one or more users sharing the shared work environment or are otherwise associated with the shared work environment. An indication of these users may be provided on the display, such as in an interface near the edge of the display, in form such as a bar.

Interface 13106 may be rendered as an overlay (e.g., an object on top of) of display 13100, and may be moved or dragged to a different position as desired. In FIG. 131, interface 13106 is rendered as a bar located on the bottom edge of display 13100.

In some embodiments, each visual indicator may represent differing clients associated with the plurality of client devices. A client may be a user, such as an individual, party, company or organization that owns or operates an associated client device.

For example, an individual, party, company or organization that owns or operates one of user devices 220-1 through user device **220-*m* depicted in FIG. 2 may be an example of a client. For example, avatar 13103A may represent a first client associated with a first client device; avatar 13105A may represent a second client associated with a second client device, avatar 13107A may represent a third client associated with a third client device; avatar 13109A may represent a fourth client associated with a fourth client device; and so on. Avatar 13111A may represent user 13102, who may be associated with client device that is currently viewing display 13100**.

A client may be represented by a graphic element, such as by a visual indicator. In some embodiments, the visual indicator is at least one of a thumbnail photo, an icon, or alphanumeric characters. For example, the visual indictor may be a photo of the client. Alternatively, an icon or picture may represent the client. For example, a logo, icon, or picture of an organization may represent the client of the client device. Alternatively, alphanumeric text such as the name or initials of a user or organization may represent the client.

In FIG. 131, avatar 13103A may be an image or photo of a client. Alternatively, avatar 13109A may be alphanumeric characters represent initials of another client.

Disclosed embodiments may enable at least one group chat between the plurality of client devices. A group chat may refer to a method of communication through the use of messages including alphanumeric or graphic symbols among two or more individuals. Chat messages may be sent to or received from users of the client device. In some embodiments, the chat messages may be displayed in the shared work environment. For example, two or more individuals (e.g., users of client devices) may communicate through texts, graphics (e.g., emojis), and/or images (e.g., photos) in the shared work environment. The individuals may provide input through an input apparatus (including keyboards, touch screen, voice-to-text interface, and other suitable text interface) of the client devices. Examples of group chat may include text messages, instant messages, direct messages, chat boards, SMS, and other similar format of exchanging information via alphanumeric and graphic symbols. The group chats may be example of social layer messages.

By way of example, FIG. 131 depicts an example of a group chat taken place in the shared work environment. Bubbles 13103, 13105, 13107, 13109, and 13111 may contain messages sent by the different users that are part of the "group chat." For example, bubble 13103 contains a message sent by avatar 13103A; bubble 13105 contains a message sent by avatar 13105A; bubble 13107 contains a message sent by avatar 13107A; bubble 13109 contains a message sent by avatar 13109A; bubble 13111 contains a message sent by avatar 13111A; and so on.

In some embodiments, communications may be presented in pop-up windows appearing adjacent to corresponding visual indicators. The pop-up windows may be presented on a location on the display selectable by the user or imbedded in the system/software design. For example, the pop-up window may be placed adjacent to the visual indicator corresponding to the sender. This placement of pop-up windows may allow the viewer to readily determine the source of the text message.

In some embodiments, the pop-up windows appear at a location above social bar 13108, corresponding to an avatar of the user that sent the text message in the chat box. For example, in FIG. 131, bubble 13103 contains a message sent by user 13103A, so bubble 13103 appears over the avatar of 13103A on social bar 13108; bubble 13105 contains a message sent by user 13105A, so bubble 13105 appears over the avatar of 13105A on social bar 13108; and so on. This arrangement of chat box locations may also allow users to visually organize the text messages being displayed in an efficient manner.

Some embodiments may be configured to alter a combination of a plurality of client devices in at least one group chat. One or more users that are part of the group chat, or an administrator of the system, may add or remove users from the group chat. For example, when a collaborator joins a project or task, the collaborator may be added to the ongoing 'conversation' as a new user. A visual indicator of the new user may appear to indicate the presence. Similarly, an existing user that was part of the 'conversation' may be removed, and his/her avatar may disappear to indicate the absence of the removed user.

In FIG. 131, a visual indicator of the new user may appear in social bar 13108 to indicate the presence. Similarly, an existing user that was part of the 'conversation' may be removed, and his/her avatar may disappear from social bar 13108 to indicate the absence of the removed user.

In some embodiments, the pop-up windows may remain on the display for differing durations depending on variables. A variable may refer to a factor or a parameter that may be changed (e.g., by a user, an administer, or some other party authorized to access the variable). The variable may determine a setting or a status of the system. For example, the hang-time of the pop-up window may be determined based on a variable (or variables). The duration for which pop-up windows remain on screen may be the hang-time.

It may be desirable in some situation for text chat in a pop-up window to disappear from the display screen. For example, if messages remain on screen indefinitely, they may take up screen space for no additional benefit once the content has been read by a recipient. Moreover, a 'conversation-style' exchange may be better simulated if text messages disappear after a given time. One issue that may arise in an interface that removes messages from display after a time is that when many individuals send messages at the same time, or when some messages are particularly long, there may be insufficient time to read all the messages before they disappear from the display. Therefore, it may be desirable for the system to alter the hang-time of messages depending on a number of factors, such as variables based on length of the message and/or number of concurrently displayed messages.

In some embodiments, a variable may include a length of a message. A message length may include any metric for determining the size of the message, such as by character count, word count, line count, a file size included with the message, or a combination thereof. For example, a first pop-up window that includes a text message containing a first number of characters may have a first hang-time, while a second pop-up window that includes a text message containing a second number of characters may have a second hang-time. When the second number of characters is greater than the first number of characters, the second pop-up window may be configured to have a longer hang-time (second hang-time) than the first pop-up window (first hang-time). In another example, if a message includes an attachment such as a PDF or JPG file, the file size of the attachment may be taken into account for the system to assign a longer hang-time for the message. In some embodiments, the at least one processor may be configured to compare each message to a message length threshold and to increase message hang-time when the message length threshold is surpassed. For example, the increase in hang-time based on length of the message may be in intervals, and additional hang-time is added when the length of the message reaches a threshold. For example, messages containing 0-25 characters may have a first pre-set hang time (e.g., 15 seconds), a message containing 25-50 characters may have a second pre-set hang-time (e.g., 30 seconds), and so on.

In some embodiments, variables may include a number of concurrently displayed messages. Concurrently displayed messages may include messages presented in a display at the same time. When, for instance, multiple users are sending messages, many pop-up windows may appear at once, and a viewer may need additional time to consume all the content being displayed. Thus, in the situation when a high number of messages are displayed concurrently displayed, the processor may increase the hang-time of each of the pop-up windows to enable a viewer to read all the messages.

In some embodiments, variables may include a client defined threshold. In some embodiments, the client defined threshold may be selectable by a client. In some embodiments, the client defined threshold is selectable by an administrator. The defined threshold may be selected from a preset list of options or may be defined through a customized input. An administrator may be a user other than the client who automatically has access to the client's settings and can make the selections unilaterally. For example, the user of the client device (the client) may desire a shorter or longer hang-time of pop-up windows based on personal preference. Thus, the client may change a setting of the shared work environment to manually increase or decrease the hang-time of the pop-up windows based on personal preference.

In some embodiments, variables may include a sender status. For example, the system may determine that certain messages have different hang-based on the status of the author that sends the message. For example, the system may send a message to indicate a systems status (such as error message), which may result in an increased hang-time to emphasize its importance. In another example, some users may have priority over other users. For instance, a group leader, a manager, or an executive may have priority over other individuals using the shared work environment, thus their messages may have increased hang-time over the messages sent by other users.

In some embodiments, the at least one processor may be configured to save a pop-up message for later review on a particular client device when a client associated with the particular client device selects the message. Saving a pop-up message may include storing the message in a local or remote repository that may be accessed or retrieved at a later time. Saving the pop-up message may be automatic, or it may be manually achieved by a user selecting a particular message with a hang-time to instead be saved. When the message is saved, the message may be saved in a particular location in the shared workspace, such as with an associated item, a cell, an attachment, or any other location.

Figure 132:
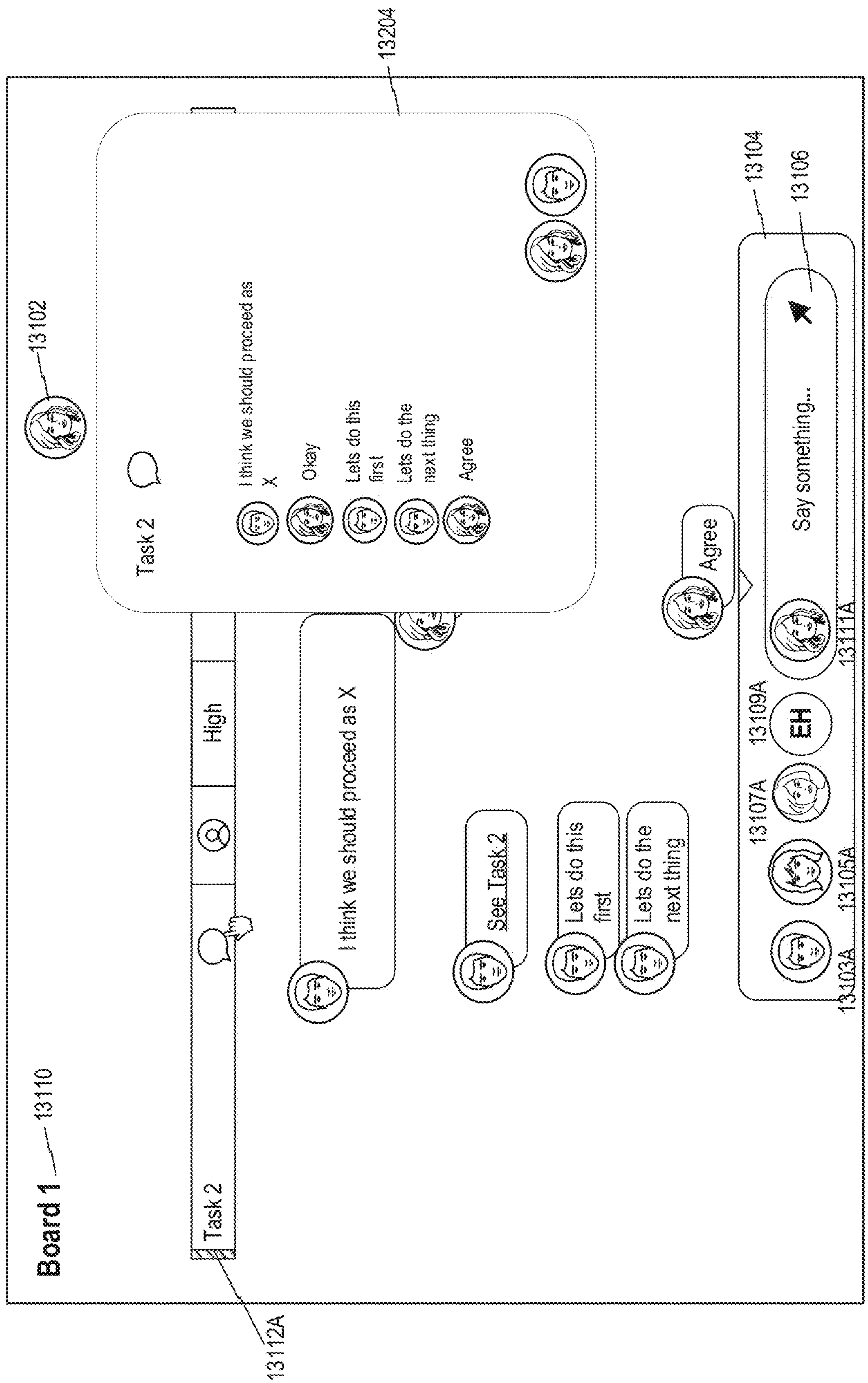

For example, FIG. 132 depicts an example of a saved pop-up message. The messages being sent back and forth between users may be stored in board 13110 for later viewing. In some cases, the messages may be stored and linked to a specific item, such as item 13112A. For example, messages in pop-up windows may be related to item 13112A, so it may be convenient to store the record of this conversation in a location linked to item 13112A. By way of example, the message between users can be retrieved and displayed in display 13204. In some cases, the text messages may be accompanied by the avatar of the sender, or accompanied by a time stamp of the time of sending.

FIG. 133 depicts an exemplary block diagram for mutual screen sharing during a text chat, consistent with the present disclosure.

At block 13302, processing circuitry 110 may enable presentation of a shared work environment. The shared work environment may include a suite of software applications, such task organizers, word processors, spreadsheet, webpage, calendars, and/or other programs or applications that may separately or together accessible by users through the use of client devices. For example, FIG. 131 depicts display 13100, which may be a shared work environment that is being displayed on one of the client devices. Display 13100 includes board 13110 and table 13112A, each of which may be an example of an application of the shared work environment accessible by a client device. Users may use client devices to access one or more of the applications hosted by the platform via a client device. Any one of user devices 220-1 through user device **220-*m* depicted in FIG. 2 may be an example of the client devices. User 13102 of FIG. 131** may be an example of a user who are accessing the shared work environment.

At block 13304, processing circuitry 110 may display visual indicators on a fraction of the display. For example, display 13100 includes interface 13104 display on a portion of the display, such as a bar on the edge of the display. Interface 13104 may be rendered as an overlay (e.g., an object on top of) of display 13100, and may be moved or dragged to a different position as desired. Interface 13104 includes social bar 13108, which includes avatars 13103A, 13105A, 13107A, 13109A, each of which may be an example a visual indicator representing a user associated a client device. Interface 13104 also includes avatar 13111A, which may be an example of a visual indicator representing user 13102. In some embodiments, each visual indicator may represent differing clients associated with the plurality of client devices, such as a user that owns or operates one of user devices 220-1 through user device **220-*m* depicted in FIG. 2. For example, avatar 13103A may represent a first client associated with a first client device; avatar 13105A may represent a second client associated with a second client device, avatar 13107A may represent a third client associated with a third client device; avatar 13109A may represent a fourth client associated with a fourth client device; and so on. Avatar 13111A may represent user 13102, who may be associated with client device that is currently viewing display 13100. The visual indicator is at least one of a thumbnail photo, an icon, or alphanumeric characters. For example, avatar 13103A may be an image or photo of a client. Alternatively, avatar 13109**A may be alphanumeric characters represent initials of another client.

At block 13306, processing circuitry 110 may enable a group chat. Messages may be sent to or received from clients of the client device. In some embodiments, the chat messages may be displayed in the share work environment. For example, two or more individuals (e.g., users of client devices) may communicate through texts, graphics (e.g., emojis), and/or images (e.g., photos) in the shared work environment. The individuals may provide input through an input apparatus (including keyboards, touch screen, voice-to-text interface, and other suitable text interface) of the client devices. Examples of group chats may include text messages, instant messages, direct messages, chat boards, SMS, and other similar format of exchanging information via alphanumeric and graphic symbols. FIG. 131 depicts an example of a group chat taking place in the shared work environment.

At block 13308, processing circuitry 110 may present messages in pop-up windows. For example, FIG. 131 depicts an example of a group chat occurring in the shared work environment, where the messages are presented in pop-up windows. Bubbles 13103, 13105, 13107, 13109, and 13111 may contain messages sent by the different users that are part of the 'group chat.' For example, bubble 13103 contains a message sent by avatar 13103A; bubble 13105 contains a message sent by avatar 13105A; bubble 13107 contains a message sent by avatar 13107A; bubble 13109 contains a message sent by avatar 13109A; bubble 13111 contains a message sent by avatar 13111A, and so on. The pop-up windows may be presented on a location on the display based on certain considerations. For example, the pop-up window may be placed adjacent to the visual indicator corresponding to the sender. This placement of pop-up windows may allow the viewer to readily determine the source of the text message. For example, the pop-up windows may appear at a location above social bar 13108, corresponding to avatar of the user that sent the text message in the chat box. As seen, in FIG. 131, bubble 13103 contains a message sent by user 13103A, so bubble 13103 appears over the avatar of 13103A on social bar 13108; bubble 13105 contains a message sent by user 13105A, so bubble 13105 appears over the avatar of 13105A on social bar 13108; and so on. This arrangement of chat box locations may also allow users to visually organize the text messages being display in an efficient manner.

At block 13310, processing circuitry 110 may determine hang time. In some embodiments, as described in greater detail earlier, the pop-up windows remain on the display for differing durations (hang time) depending on variables that may be changed (e.g., by a user, an administer, or some other party authorized to access the variable). The variable may determine a setting or a status of the system. For example, the hang-time of the pop-up windows may be determined based on a variable (or variables). The duration for which pop-up windows remain on screen may be the hang-time. The variables may include length of message, wherein hang time is longer for messages with longer length. For example, processing circuitry may compare each message to a message length threshold and to increase message hang-time when the message length threshold is surpassed. For example, messages contain 0-25 characters may have a first pre-set hang time, a message containing 25-50 characters may have a second pre-set hang-time, and so on.

The variables may also include at least a number of concurrently displayed messages. When, for instance, multiple users are sending messages, many pop-up windows may appear at once, and a viewer may need additional time to consume all the content being displayed. Thus, in the situation when a high number of messages are displayed concurrently displayed, the processor may increase the hang-time of each of the pop-up windows.

The variables may also include a client defined threshold. For example, the user of the client device (the client) may desire a shorter or longer hang-time of pop-up windows based on personal preference. Thus, the client may change a setting of the shared work environment to manually increase or decrease hang-time of the pop-up windows based on personal preference. In some embodiments, the client defined threshold is selectable by a client. In some embodiments, the client defined threshold is selectable by an administrator.

The variables may also include a sender status. For example, the system may determine that certain clients have different hang-time for the messages the send. A system message indicating a systems status (such as error message) may have increased hang-time to emphasize its importance. In another example, some users may have priority over other users. For instance, a group leader, a manager, or an executive may have priority over other individuals using the shared work environment, thus their messages may have increased hang-time over the messages sent by other users.

At block 13312, processing circuitry 110 may remove pop-up windows. For example, once the pop-up window has reached the end of its hang time determined in block 13312, processing circuitry 110 removes the pop-window from the display.

In a collaborative work system, users may perform various actions on their accounts, and information of these actions may be collected, analyzed, and visualized to provide intelligence to the users for management or administration. A challenge to the information visualization is that some aggregation or high-level characteristics (e.g., frequencies, importance levels, behavior modes, or trends) of the actions performed by the users may be invisible from the presentation of the collected and analyzed data, especially when the number of the users is large or when the users are involved in many different workflows. It may be difficult to manually identify and analyze the aggregation characteristics of many actions of many users for many workflows. It may also be difficult to visualize such aggregation characteristics in real time.

Aspects of this disclosure may provide a technical solution to the challenging technical problem of visualizations of information associated with teams and team members, and may relate to a dynamic system for generating a network map reflective of node connection strength for presentation in collaborative work systems, including methods, systems, devices, and computer-readable media. For ease of discussion, some examples are described below with reference to systems, methods, devices, and/or computer-readable media, with the understanding that discussions of each apply equally to the others. For example, some aspects of methods may be implemented by a computing device or software running thereon. Other aspects of such methods may be implemented over a network (e.g., a wired network, a wireless network, or both).

Some disclosed embodiments are directed to systems, methods, devices, and non-transitory computer readable media for generating a network map reflective of node connection strength. A network map may refer to a visual presentation (e.g., a map, a chart, or a figure) for a network that may include various nodes and connections between the nodes to represent information regarding the relationships between the various nodes. A node in the network may represent an entity. A node may be presented in any way such as by alphanumerics, graphics, or a combination there of to represent an entity. An entity may refer to an individual, a device, a team, a group, a department, a division, a subsidiary, a company, a contractor, an agent or representative, or any independent, distinct organization (e.g., a business or a government unit) that has an identity separate from those of its members. In some embodiments, each of the plurality of entities may be a single individual such as a user of the collaborative work system. In some embodiments, at least some of the plurality of entities may include a group of individuals. For example, the group of individuals may be a team that uses the collaborative work system. A connection between two nodes in the network may represent an interaction or a relationship between the two nodes. The network may be presented in any two-dimensional (2D) or three-dimensional (3D) manner. Node connection strength (also referred to as "connection strength") in this disclosure may refer to a metric value of the connection, such as a frequency, an importance value, a count, a weight, or any value representing a strength of an interaction or a relationship.

By way of example, FIG. 134 illustrates a network map 13400, consistent with embodiments of the present disclosure. Network map 13400 may be a 2D visual representation. A node (represented as a circular avatar) of network map 13400 may represent an individual (e.g., a team member). A connection (represented as a line between two circular avatars) between two nodes of network map 13400 may represent an interaction or a relationship between the two nodes. For example, the interaction may represent that two individuals have communicated with each other, such as by emails, instant messages, phone calls, or any other interactions.

Some disclosed embodiments may be configured to track electronic connections between a plurality of entities in an electronic workspace. An electronic workspace may refer to an electronic or digital space for storing, representing (e.g., displaying), transmitting, and/or executing instructions or data of collaborative work between a group of entities. For example, the electronic workspace may be a collaborative work system (e.g., a team collaboration website). The electronic workspace may be used by entities within the same organization or from different organizations.

Tracking may refer to an operation to monitor, follow, observe, find, search, pursue, collect, or any form of operation to record data. In some embodiments, the tracking operation may be implemented using computer software. For example, computer software may collect data (e.g., related to usage or user activity) from interactions between the computer software and a user of the computer software. In another example, first computer software may interact or interface with second computer software, and may further collect data (e.g., related to usage, user engagement, or communications between the two computer softwares) associated with the second computer software. The tracked data may be stored in a storage medium (e.g., a database on a server). In another example, data related to a user of a platform (e.g., a website or a mobile application) may be tracked by the platform. When a user of a first platform (e.g., a social media platform) is connected to a second platform (e.g., a collaborative work system), data related to the user may be collected by either the first platform or the second platform. In some embodiments, the tracked data of the user may include various characteristics, features, or specifications, such as a type of activity, a count of an activity, a feature used by the user, a time duration of using the feature by the user, or an accumulated time of using the feature. It should be noted that the characteristics, features, or specifications of the tracked data are not limited to the examples described herein.

An electronic connection between two entities may refer to a digital or electronic representation of a relationship or interaction between the two entities. The relationship may represent any organizational or business-flow relationship, such as a supervisor-supervisee or a supplier-client relationship. The interaction between the two entities may include any form of interaction. For example, the electronic connection may represent a communication, such as an instant message, a calendar invite, an email, a text message, a phone call, a shared post, a comment to the shared post, an acknowledgement (e.g., a "thumbs up") to the shared post, or any metric, activity, or form of communication or engagement. The electronic connection may include a benchmark of activities or interactions between nodes of the network map, which may be used for quantitative analysis (e.g., by comparison or ranking). For example, the electronic connection may include a value representing a frequency of communications, which may be used as a benchmark of importance of interactions between the connected nodes.

In some embodiments, the electronic connection may further include data related to the relationship or the interaction between the two entities, such as location data (e.g., an address), geography data (e.g., a positioning coordinate), temporal data (e.g., a time stamp), time tracking data (e.g., a duration of an activity), monetary data (e.g., an expenditure or an income), content data (e.g., a user-generated post), or any other type of data.

In some embodiments, the electronic connections may be tracked in a live or dynamic manner (e.g., being generated derived based on data points of usage of a computer software) rather than being predefined in a static manner. Such data points may include a geographic location, a time stamp, a time duration, a monetary value, a content, a numeric value, or any form of data. For example, at least one processor may track the electronic connections based on usage statistics of a collaborative work system. Rather than predefining which statistic metrics to be tracked, the at least one processor may allow a user to select one or more statistic metrics to track and configure (e.g., setting a filter) the selected statistic metrics based on preferences. For example, the at least one processor may generate and present a user interface to the user for such configuration. The at least one processor may continuously track and update the electronic connections as selected and configured.

In some embodiments, the electronic connections may be based on at least one of emails, team assignments, text messages, voice messages, file transfers, or collective work in the electronic workspace. For example, an electronic connection may represent a count of items generated by a user in the collaborative work system. Such a count may be associated, measured, and visualized with other data (e.g., completion of a task or a stage of a project) derived from the collaborative work system. The items generated by the user in the collaborative work system may include, for example, electronic tables ("boards"), teams, projects, tasks of a project, events, or usage (e.g., statistics of a feature or a function) of the collaborative work system.

In an example, the count of items generated by the user in the collaborative work system may include a number of items generated by one or more users in an account of the collaborative work system. The number may be associated, measured, or visualized with other information derived from the collaborative work system, such as a progress status of a task or a stage of a project, for example. In another example, the count of items generated by the user in the collaborative work system may include a number of boards generated in an account of the collaborative work system. The boards may be associated with a team, a workspace, a part of a project, or a time duration. As another example, the count of items generated by the user in the collaborative work system may include a number of events, a number of features of an event, or a number of users (e.g., monthly active users) using a feature.

By way of example, FIG. 135 illustrates an example table 13500 generated in a collaborative work system, consistent with embodiments of the present disclosure. The items generated by the user in the collaborative work system, as described above, may include table 13500 itself, contents of table 13500 (e.g., content data in a cell of table 13500), or features (e.g., statistical data or metadata) associated with the contents of table 13500. In some embodiments, the table 13500 may be displayed using a computing device (e.g., the computing device 100 illustrated in FIG. 1) or software running thereon. The table 13500 may be associated with a project (e.g., "Project 1" in FIG. 135) and may include, in the multiple rows and columns, tasks (e.g., in rows including "Task 1," "Task 2," or "Task 3") included in the project, persons (e.g., in a column 13512) assigned to the tasks, details (e.g., in a column 13514) of the tasks, statuses (e.g., in a column 13502) of the tasks, due dates (e.g., in a column 13506) of the tasks, timelines (e.g., in a column 13510) of the tasks, or any information, characteristic, or associated entity of the project. A task may refer to a part or a portion of a project. A task may be performed by an entity (e.g., an individual or a team). In some embodiments, a task may be represented by a row of cells in a task table. In some embodiments, a task may be represented by a column of cells of a task table.

Any column of the table may display cells of a single data type or of multiple data types. A "data type" of a cell in this disclosure may refer to a type, a category, or a characteristic of data to be included in the cell, such as a numeric value, a character, a symbol, a text, an alphanumeric value, a graphic element, a closed list of elements, a value range, or any constraint on the format or type of cell data. A single data type column may be one where all cells are uniform in at least one data type or characteristic. In some embodiments, the first column may be at least a portion of a single data type (e.g., texts) column-oriented data structure. A single data type column-oriented data structure may be a digital data structure of a table that includes columns where all cells of the columns may be programmed to include a single category of data.

In FIG. 135, the table 13500 includes, among other columns, a first column 13502 that has a first column heading 13504 ("Status") and a second column 13506 that has a second column heading 13508 ("Due Date"). For example, the first column 13502 may be a status column type of table 13500. Other columns with other characteristics in FIG. 135 may include a due date column type (including a second column 13506), a timeline column type (including the column 13510), a person column type (including the column 13512), and text column types such as the columns 13514 and 13516.

In FIG. 135, the first column 13502 includes three rows, each row including one or more words indicative of a status of each task of the project. The second column 13506 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

As illustrated in FIG. 135, the at least one processor may maintain a data structure that includes a plurality of tables (e.g., including the table 13500) and other information (e.g., metadata) associated with the plurality of tables. Each table (e.g., the table 13500) of the plurality of tables may include a plurality of rows (e.g., the rows of "Task 1," "Task 2," and "Task 3" in the table 13500) and columns (e.g., columns 13502, 13506, 13510, 13512, 13514, and 13516 of the table 13500). Each of the plurality of columns may have an associated column heading, such as the first column heading 13504 associated with the first column 13502 or the second column heading 13508 associated with the second column 13506.

Some disclosed embodiments may be configured to track characteristics of electronic connections between a plurality of entities in an electronic workspace. A characteristic of an electronic connection may refer to a type of an activity associated with the electronic connection, a time duration of the activity associated with the electronic connection, a feature of the activity associated with the electronic connection, a time duration a user spending on the feature of the activity associated with the electronic connection, a count of activities associated with the electronic connection, or any other specification or metric of the activity or a relationship associated with the electronic connection. In some embodiments, the characteristics may include at least one of a length of interaction, a quality of interaction, a type of interaction, a number of interactions, a frequency of interactions, or a regularity of interactions. A length of an interaction may include a metric such as a character count of a text message, a measure of time for a phone call or recording, or any other similar metric that can measure a length of an interaction. A quality of interaction may include any metric that measures the substance of an interaction. For example, an interaction may be of higher quality if the interaction includes sending a file. In contrast, an interaction may be of lower quality if the interaction merely includes clicking a "like" button on a post. The measure of a quality of interaction may be defined by the system or may be defined and modified according to a user preference. A type of interaction may include a descriptor of the interaction between any nodes (e.g., a message interaction, a phone call interaction, a file transmittal interaction, and so on.)

In some embodiments, the at least one processor may track the characteristics of the electronic connections in the electronic workspace directly, such as by collecting data representing the characteristics via computer software running in the electronic workspace. In some embodiments, the at least one processor may track the characteristics of the electronic connections on a computer platform (e.g., a server computer) communicatively coupled to the electronic workspace (e.g., a client computer). For example, the data representing the characteristics may be collected in the electronic workspace and transmitted to the computer platform for tracking.

Consistent with disclosed embodiments, the at least one processor may be configured to store in memory the tracked connections and the tracked characteristics. Tracking connections and characteristics may include making a record of connections and characteristics as described above in a repository (e.g., in memory) in a local client device or in a remote server.

By way of example, the memory can be memory 120 as described in association with FIG. 1. In some embodiments, the at least one processor may store the tracked connections and the tracked characteristics in a database (e.g., a relational database) in the memory.

In some embodiments, the at least one processor may be configured to calculate connection strength between connected entities based on at least one of the tracked characteristics. The connection strength may refer to a frequency, an importance value, a count, a weight, or any metric value representing a strength of an interaction or a relationship. For example, if the connection strength represents a count of interactions between two connected entities, the more interactions that occur between the two connected entities, the greater the connection strength may be.

In some embodiments, when the connection strength is associated with interactions between the connected entities, the interactions may include a "mentioning" operation (e.g., a first user responding a second user in the electronic workspace, such as an "@" operation), a replying operation (e.g., a first user posting contents in response to contents generated by a second user), a commenting operation (e.g., a first user clicking a "like" button for contents generated by a second user), an updating operation (e.g., a first user adding, removing, or modifying contents generated by a second user), a generating operation (e.g., a first user generating contents associated with a second user), a notifying operation (e.g., a first user sending a notification to a second user), a labeling operation (e.g., a first user assigning a second user to a group, team, task, or project), a communicating operation (e.g., a first user messaging, texting, emailing, or calling a second user), an annotating operation (e.g., a first user generating a note, an annotation, or a comment for a second user without notifying the second user), or any other activity associated with the connected entities in the electronic workspace. In such cases, the tracked characteristics of the connected entities may include at least one of a frequency value, a count, or a weight value. In some embodiments, the interactions between the connected entities may include an interaction between a first computer software (e.g., an application, a website, or a service platform) associated with a first user (e.g., an individual or a team) and a second computer software (e.g., an application, a website, or a service platform) associated with a second user (e.g., an individual or a team).

Some embodiments may involve calculating the connection strength using a calculation formula or an algorithm. In some embodiments, the calculated connection strength may be based on more than one of the plurality of tracked characteristics, as previously described above. For example, the tracked characteristics of the connected entities may include a count of interactions between a first entity and a second entity, and a total count of interactions between each two of the plurality of entities in the electronic workspace. The at least one processor may determine a ratio of the count of interactions between the first entity and the second entity over the total count of interactions, and determine the ratio as the connection strength.

In some embodiments, the at least one processor may calculate the connection strength based on at least one weight. The weight may be inputted by a user or determined automatically by the at least one processor (e.g., by retrieving the weight from a lookup table). For example, each count of interaction (including the count of interactions between the first entity and the second entity) between each two of the plurality of entities in the electronic workspace may be associated with a weight. The at least one processor may determine a weighted sum of the total count of interactions (e.g., by determining a sum of products, each product being calculated as a count multiplied with its associated weight), and determine a weighted product by multiplying the count of interactions between the first entity and the second entity with a weight associated with the count. Then, the at least one processor may calculate a ratio of the weighted product over the weighted sum, and determine the ratio as the connection strength. It should be noted that the at least one processor may calculate the connection strength using any formula or algorithms, not limited to the examples described herein.

In some embodiments, when at least some of the plurality of entities include a group of individuals, the calculated connection strength may include scoring. A score may include any alphanumeric associated with a metric to provide a value to a connection strength such that different connections may be compared based on their scores. For example, the calculated connection strength may be one or more scores (e.g., a ratio value as described above), each of the one or more scores being associated with an electronic connection between two of the group of individuals. A connection strength that is rated highly based on one or more characteristics may, for example, be associated with a score of "A" or "100%" for a highly rated score, and a score of "F" or "0%" for a lower rated score.

Some embodiments may involve calculating the connection strength for a predefined time period. For example, the at least one processor may calculate the connection strength between the connected entities based on at least one of the characteristics tracked in the predefined time period (e.g., a day, a week, a month, a year, or any time duration). In some embodiments, the time period may be adjustable. For example, the at least one processor may receive a first inputted time period and calculate a first connection strength for the first inputted time period, and then receive a second inputted time period and calculate a second connection strength for the second inputted time period, in which the first inputted time period is different from the second inputted time period. In some embodiments, the at least one processor may enable a user to input the time period in the electronic workspace before or concurrently with interactions occurring between the connected entities.

Aspects of this disclosure may include rendering a visualization of the plurality of entities. Rendering a visualization may refer to an operation of presenting or displaying a visual or graphical representation (e.g., a static or dynamic figure) of an object or group of objects on a screen of a device or via any other display mechanism. In some embodiments, an entity may be rendered as visualization of a node in the network map. Consistent with disclosed embodiments, the at least one processor may be configured to render a visualization of the tracked electronic connections between the plurality of entities. In some embodiments, a tracked electronic connection between two entities may be rendered as visualization of a connection (e.g., a line) between two nodes in the network map, in which the two nodes are the rendered visualization of the two entities.

By way of example, with reference to FIG. 134, the at least one processor may render the visualization of the plurality of entities as the circular avatars in network map 13400 and the tracked electronic connections between the plurality of entities as lines between the circular avatars in network map 13400.

In some embodiments, the visualization of the tracked electronic connections may represent actual interactions (e.g., communications) between the plurality of entities rather than direct organizational relationships between the plurality of entities. For example, the at least one processor may render a visualization of a tracked electronic connection between a first entity (e.g., an individual) and a second entity (e.g., an individual) based on actual interactions having occurred between the first entity and the second entity, even though the first entity and the second entity may have no direct organizational relationship (e.g., belonging to different independent departments of a company).

In some embodiments, before rendering the visualization of the tracked electronic connections, the at least one processor may determine whether a threshold condition is met. If the threshold condition is met, the at least one processor may render the visualization of the tracked electronic connections. For example, if the connection strength is calculated for a predefined time period, the at least one processor may set a minimum number (e.g., 50, 100, 200, or any number) of interactions (e.g., communications) within the predetermined time period (e.g., a month) for entities associated with the tracked electronic connections, and only enable rendering the visualization of the tracked electronic connections when the interactions between two entities exceed the minimum value. By doing so, the at least one processor may disable visualizing non-significant interactions (e.g., casual, infrequent, or one-time interactions) between the plurality of entities.

In some embodiments, the threshold condition may be related to a subset of the tracked electronic connections. For example, the at least one processor may render a visualization of a percentage range (e.g., top 10%, bottom 20%, or a range of 30% to 50%) of interactions between entities associated with the tracked electronic connections. Such a visualization may present a percentage range of frequencies of interactions between interacted entities in the electronic workspace, for example.

In some embodiments, the threshold condition may be related to a type of the tracked electronic connections. For example, the at least one processor may render a visualization of tracked electronic connections related to messages or emails but not render a visualization of tracked electronic connections related to non-significant interactions (e.g., clicking "like" buttons for user generated contents). Such a visualization may present prioritized interactions between interacted entities in the electronic workspace, for example.

In some embodiments, the threshold condition may be related to a specific entity of the tracked electronic connections. For example, the at least one processor may render a visualization of tracked electronic connections related to a first entity but not render a visualization of tracked electronic connections related to a second entity. Such a visualization may present interactions of interested entities in the electronic workspace, for example.

In some embodiments, the threshold condition may be related to a feature of the tracked electronic connections. For example, the at least one processor may render a visualization of tracked electronic connections within a time duration only, only between entities at a geographic location, or only between entities associated with the same task or project. In another example, the at least one processor may render a visualization of tracked electronic connections outside a time duration, between entities not at a geographic location, or between entities not associated with the same task or project. Such a visualization may present, for example, interactions of interested features in the electronic workspace.

In some embodiments, the threshold condition may be adjustable or customized. For example, the at least one processor may enable a user (e.g., by providing a user interface) to input or configure the threshold condition. The threshold condition may be configured before, after, or concurrently with the interactions occurring between the plurality of entities in the electronic workspace. In some embodiments, the at least one processor may render a plurality of visualizations of the tracked electronic connections under a plurality of different threshold conditions or generated at a plurality of different timestamps, in which the plurality of visualizations may be compared for trend analysis.

Consistent with disclosed embodiments, the at least one processor may be configured to render a visualization of at least one of the tracked characteristics of the electronic connections. At least one of the rendered visualizations of the tracked electronic connections and the rendered visualization of the at least one of the tracked characteristics may be reflective of the calculated connection strength. In some embodiments, the rendered visualization of the tracked electronic connections may be reflective of the calculated connection strength. For example, tracked electronic connections with a higher calculated connection strength may be rendered with a shorter line between two nodes to indicate that the two nodes have a stronger connection strength as compared to other nodes that are rendered further apart. In another example, the rendered visualization of the at least one of the tracked characteristics may be reflective of the calculated connection strength. For instance, the connection strength between two nodes may include the tracked characteristic of a frequency of interactions transmitted between the two nodes. As such, a visualization may be associated with the two nodes to represent the frequency of interactions, such as a number to indicate a count, a graphical indication such as a thicker line between the nodes, and so on. As another example, both the rendered visualization of the tracked electronic connections and the rendered visualization of the at least one of the tracked characteristics may be reflective of the calculated connection strength so that the visualization may provide information regarding both the tracked electronic connections and tracked characteristics (e.g., the distance between two nodes reflecting a strength, in addition to a number representing a count, between the two nodes).

In some embodiments, the at least one of the rendered visualization of the tracked electronic connections and the rendered visualization of the at least one of the tracked characteristics may be reflective of the calculated connection strength represented as at least one of a distance between rendered entities, a color, a size, an alphanumeric, or a graphic. For example, the rendered visualization of the tracked electronic connections, the rendered visualization of the at least one of the tracked characteristics, or both may use various thickness of lines or various sizes of nodes in the network map to reflect the calculated connection strength.

Consistent with some embodiments of this disclosure, the at least one processor may be further configured to output a display signal to cause the visualization of the plurality of entities and the visualization of the tracked electronic connections to be presented as a map of nodes. Each entity may be represented as a separate node in the map of nodes. A map of nodes may include a spatial presentation (2D, 3D, or virtual 3D) of nodes in a display or any other presentation manner. In some embodiments, in such a map of nodes, an associated entity may be represented via a photo, an icon, an avatar, a graphic, or a series of alphanumeric characters at each node.

By way of example, FIG. 136 illustrates an example visualization of a network map 13600 reflective of node connection strength, consistent with some embodiments of the present disclosure. Network map 13600 includes nodes (represented as dots) and connections (represented as lines between the dots). Each node of network map 13600 represents an entity, including entities 13602, 13604, and 13606. Each connection of network map 13600 represents a tracked electronic connection between two entities. In FIG. 136, the entities may be teams. For example, entity 13602 may represent a management team, entity 13604 may represent a sales team, and entity 13606 may represent a production team. Hovering over or otherwise selecting a mode might reveal a textual and/or graphical indication of the identity of the entity represented by the node. In other embodiments, the indication may appear by default.

In some embodiments, the tracked characteristics of the electronic connections between the plurality of entities may include tracked interactions (e.g., communications) between the teams. For example, the connection strength between two connected teams may be calculated based on a count of tracked communications between the two teams. In FIG. 136, the length of the connection may be reflective of the connection strength. For example, the more communications between two teams, the shorter the lines may be between the two teams. It should be noted that the nodes and the connections in network map 13600 may be represented in other shapes besides the dots and the lines, respectively, which are not limited to the example embodiments as described herein. For example, the nodes and connections of network map 13600 may be stars and dash lines, respectively.

In some embodiments, the tracked characteristics of the electronic connections between the plurality of entities may additionally include tracked relationships (e.g., an organizational relationship) between the teams. For example, the visualization of the nodes of network map 13600 can be arranged to present (e.g., in a tree structure) an organizational structure of the teams (e.g., based on supervising duties), while the visualization of other parts of network map 13600 may remain unchanged. By doing so, network map 13600 may simultaneously present the organizational structure of the entities and the connection strength between them.

In some embodiments, although not shown in FIG. 136, instead of using the length of the connections, the connection strength may be visualized using other manners. For example, thickness or colors of the connection may be used to reflect the connection strength, in which the length of the connections may be irrelevant to the connection strength. In another example, one or more alphanumeric symbols may be overlayed on the connections to reflect the connection strength, in which the length of the connections may be irrelevant to the connection strength.

In some embodiments, each connection (e.g., a line) of network map 13600 may be associated with a weight. The weight may be predetermined, such as defined in a lookup table, or may be dynamically determined, such as being determined based on its connection strength calculated in real time. The weight may be used to represent an importance level of the electronic connections. For example, the tracked characteristics associated with network map 13600 may include various types of tracked communications between the teams, such as instant messages, emails, phone calls, or in-person meetings. In such an example, the weights of the instant messages, emails, phone calls, and in-person meetings may be assigned with increasing values that represent increasing importance levels. As another example, the tracked characteristics associated with network map 13600 may include various types of tracked relationships between the teams, such as an independent relationship, a peer relationship, or a supervising relationship. In such an example, the weights of independent relationship, peer relationship, and supervising relationship may be assigned with increasing values that represent increasing importance levels.

In some embodiments, to enhance readability, the nodes of network map 13600 are capable of being moved (e.g., dragged). By way of example, FIG. 137 illustrates an example visualization of network map 13600 with movable nodes, consistent with some embodiments of the present disclosure. As illustrated in FIG. 137, entity 13602 may be dragged to an arbitrary position using cursor 13608 (e.g., by clicking, holding, and dragging entity 13602 using cursor 13608), while the electronic connections between entity 13602 and other entities in network map 13600 remain. By providing such capability to the visualization of network map 13600, a user may be enabled to rearrange the positions of the nodes of network map 13600 for enhancing readability in some situations, such as the nodes being overly congested. In some embodiments, when the user releases the clicking of cursor 13608 on entity 13602, the node of entity 13602 may return to its original position as illustrated in FIG. 136.

In some embodiments, when a node of network map 13600 is selected, the visualization of network map 13600 may be changed to highlight the node and other nodes connected to the node. By way of example, FIG. 138 illustrates an example visualization of network map 13600 with highlighted nodes, consistent with some embodiments of the present disclosure. As illustrated in FIG. 138, an entity 13802 is selected. For example, entity 13802 may be selected by hovering cursor 13608 over entity 13802 or by clicking entity 13802 using cursor 13608, in either case of which the shape of cursor 13608 is changed to a cross shape and the shape of entity 13802 is changed to a diamond. After being selected, all entities having electronic connections with entity 13802, including entity 13602 and an entity 13804, may be visualized in a highlight mode. For example, as illustrated in FIG. 138, all other entities that have no electronic connections to entity 13802 as well as their connections may be dimmed (represented in a gray color), and the size of entity 13602 and entity 13804 may be enlarged. By providing such capability to the visualization of network map 13600, a user may be enabled to view the tracked electronic connections, the tracked characteristics of the tracked electronic connections, and the calculated connection strengths of an interested entity with improved clarity.

In some embodiments, network map 13600 may change its visualization in accordance with a presentation basis. As shown in FIGS. 136 to 138, network map 13600 is associated with a user interface 13610 (e.g., a drop-down menu). User interface 13610 enables a user to select a presentation basis to be applied for the visualization of network map 13600. In FIG. 136, user interface 13610 indicates that a presentation basis named "Teams" is selected, and thus network map 13600 shows the entities as teams as well as their connections and connection strength based on teams.

By way of example, FIG. 139 illustrates another example visualization of network map 13600 reflective of node connection strength, consistent with some embodiments of the present disclosure. As shown in FIG. 139, user interface 13610 indicates that a presentation basis named "Users" is selected, and thus network map 13600 shows the entities as users of the teams as well as their connections and connection strength based on users.

Compared to FIG. 136, each node of network map 13600 in FIG. 139 represents an entity that is a user (e.g., an individual) rather than a team, including users 13902, 13904, and 13906 that may be different individuals. Users 13902, 13904, and 13906 may belong to the same or different teams. Each connection of network map 13600 in FIG. 139 represents a tracked electronic connection between two users. For example, the tracked characteristics of the electronic connections between the plurality of users in FIG. 139 may include tracked interactions (e.g., communications) between the users or additionally include tracked relationships (e.g., an organizational relationship) between the users. The examples of the tracked interactions (e.g., communications) between the users and the examples of the tracked relationships may be similar to those described in association with FIG. 136, which will not be repeated.

Consistent with some embodiments of this disclosure and as alluded to previously, a label may be displayed near or over a node of the network map, such as for displaying an entity name or information related to the entity. For example, the label may be displayed by default. As another example, the label may be hidden by default, and when a cursor hovers over or clicks on the node, the label may be displayed near or over the node.

By way of example, FIG. 140 illustrates another example visualization of a network map 14000 reflective of node connection strength, consistent with some embodiments of the present disclosure. Network map 14000 includes nodes (represented as circles) and connections (represented as lines between the circles). Each node of network map 14000 represents an entity, including entities 14002, 14004, 14006, and 14008. Each connection of network map 14000 represents a tracked electronic connection between two entities. The sizes of the nodes represent sizes of the entities.

In FIG. 140, the entities may be teams, and some entities have labels of team names displayed near their nodes, such as "R&D" near entity 14002, "Managers" near entity 14004, "HR" near entity 14006, "Design" near entity 14008, as well as "Marketing," "Freelance," and "Mobile" near other entities of network map 14000. Also, some entities have labels of team sizes (e.g., numbers of team members) displayed over their nodes, such as "33" over entity 14002, "12" over entity 14004, "27" over entity 14006, and "18" over entity 14008. As an example, when hovering cursor 13608 over entity 14002, a label 14010 may be displayed near entity 14002 to show information associated with entity 14002, such as a team size of entity 14002 and connection counts between entity 14002 and entities 14004, 14006, and 14008, respectively.

Consistent with some embodiments of this disclosure, the visualization of the network map (e.g., including the visualizations of its entities, tracked electronic connections between the entities, or tracked characteristics of the electronic connections) may not be limited to a two-dimensional representation. In some embodiments, the visualization of the network map may be presented as a three-dimensional object (e.g., with the entities distributed in a spherical shape) in a user interface (e.g., a screen of a device). For example, a virtual three-dimensional object may be manipulated (e.g., enlarged, shrunk, rotated, flipped, or mirrored) for viewing the entities, the tracked electronic connections between the entities, or the tracked characteristics of the electronic connections. In some embodiments, the visualization of the network map may be presented in hierarchy. For example, one or more entities may be grouped and presented as a single node in a first network map, and when the single node is selected to expand, a visualization of a second network map including only the one or more entities may be presented. In such an example, in some embodiments, the single node in the first network map may be displayed using a presentation basis of teams, and the nodes in the second network map may be displayed using a presentation basis of users.

Consistent with some embodiments of this disclosure, the visualization of the network map may be filtered using one or more tracked characteristics of the tracked electronic connections between entities of the network map. The tracked characteristics may include, for example, a count, a frequency, a weight, a content, a location, a date, a time, an individual, a team, a task, a project, a client, a supplier, a type of communications, or any other feature, specification, or metric associated with the electronic connection. For example, by applying a filter of a location, the visualization of the network map may be enabled to show only entities and their tracked electronic connections associated with the location. By providing such capability to the visualization of the network map, a user may be enabled to view contents of the network map related to an interested characteristic with improved clarity.

By way of example, FIG. 141 illustrates an example visualization of an electronic working space 14100 including a network map 14102 reflective of node connection strength, consistent with some embodiments of the present disclosure. As illustrated in FIG. 141, electronic working space 14100 may be displayed as a user interface (e.g., a webpage) on a screen of a computing device. Network map 14102 may be displayed as part of the user interface, which presents tracked accounts, tracked electronic connections between the tracked accounts, and tracked characteristics of the tracked electronic connections viewed using users as a presentation basis. Network map 14102 may provide information to a user of electronic workspace 14100 to identify trends, behaviors and user account information that is non-obvious in other parts of electronic workspace 14100. For example, network map 14102 may reveal that some users lack communications, which may cause inefficiencies in their teams. In some embodiments, network map 14102 may be displayed in a dynamic manner to reflect actual communications between the users in electronic workspace 14100 in real time.

In some embodiments, network map 14102 may visualize information of entities (e.g., "persons" in table 13500 in FIG. 135) associated with a board (e.g., "Board 1") in electronic workspace 14102. In some embodiments, network map 14102 may visualize information of entities associated with two or more boards (e.g., both "Board 1" and "Board 2") in electronic workspace 14100. In some embodiments, network map 14102 may visualize information of entities associated with one or more boards in electronic workspace 14100 and another electronic workspace (not shown in FIG. 141).

As described in association with FIGS. 134 to 141, the technical solutions provided in this disclosure may provide visualization of information of entities in an electronic workspace with improved clarity, which may assist management and administration of the electronic workspace. Based on the visualization of the information of the entities, a manager or administrator may be enabled to comprehend the dynamics and trends occurring among entities. For example, the network map reflective of node connection strength may be applied to organize and manage different departments of a company or different members of a department.

FIG. 142 illustrates a block diagram of an example process 14200 for generating a network map reflective of node connection strength, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 14200 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 134 to 141 by way of example. In some embodiments, some aspects of the process 14200 may be implemented as software (e.g., program codes or instructions) that are stored in a memory (e.g., the memory portion 122 in FIG. 1) or a non-transitory computer-readable medium. In some embodiments, some aspects of the process 14200 may be implemented as hardware (e.g., a specific-purpose circuit). In some embodiments, the process 14200 may be implemented as a combination of software and hardware.

FIG. 142 includes process blocks 14202 to 14214. At block 14202, at least one processor may track electronic connections between a plurality of entities in an electronic workspace. In some embodiments, each of the plurality of entities may be a single individual. In some embodiments, at least some of the plurality of entities may include a group of individuals.

At block 14204, the at least one processor may track characteristics of the electronic connections between the plurality of entities in the electronic workspace. In some embodiments, the characteristics may include at least one of a length of interaction, a quality of interaction, a type of interaction, a number of interactions, a frequency of interactions, or a regularity of interactions.

At block 14206, the at least one processor may store in memory the tracked connections and the tracked characteristics.

At block 14208, the at least one processor may calculate connection strength between connected entities based on at least one of the tracked characteristics. In some embodiments, the calculated connection strength may include scoring. In some embodiments, the at least one processor may calculate the connection strength based on at least one weight.

In some embodiments, the at least one processor may calculate the connection strength for a predefined time period. For example, the time period may be adjustable. In some embodiments, the electronic connections may be based on at least one of emails, team assignments, text messages, voice messages, file transfers, or collective work in the electronic workspace. In some embodiments, the calculated connection strength may be based on more than one of the plurality of tracked characteristics.

At block 14210, the at least one processor may render a visualization of the plurality of entities. At block 14212, the at least one processor may render a visualization of the tracked electronic connections between the plurality of entities.

At block 14214, the at least one processor may render a visualization of at least one of the tracked characteristics of the electronic connections. At least one of the rendered visualization of the tracked electronic connections and the rendered visualization of the at least one of the tracked characteristics may be reflective of the calculated connection strength.

In some embodiments, the at least one of the rendered visualization of the tracked electronic connections in block 14212 and the rendered visualization of the at least one of the tracked characteristics reflective of the calculated connection strength in block 14214 may be represented as at least one of a distance between rendered entities, a color, a size, an alphanumeric, or a graphic.

Consistent with some embodiments of this disclosure, the at least one processor may further output a display signal to cause the visualization of the plurality of entities and the visualization of the tracked electronic connections to be presented as a map of nodes, in which each entity may be represented as a separate node. In some embodiments, at each node, an associated entity may be represented via a photo, an icon, an avatar, a graphic, or a series of alphanumeric characters.

Aspects of this disclosure may relate a dynamically changeable operating (or platform) system for a workflow environment (e.g., the platform system dynamically changing the user's experience by customizing the presentation of options specific to the user's needs), including methods, systems, devices, and computer readable media. For ease of discussion, a system is described below, with the understanding that aspects of the system apply equally to non-transitory computer readable media, methods, and devices. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In a data management platform, it is important for users to customize the user experience or operating system. For example, a workflow management account may have various tables. However, these tables need to comply with user needs and customization of data management. Further, it is important for users to generate tables unique to their specifications. Given the numerous tools and workflows a user may be presented with, a user may experience inefficiencies in deciding between which tools to use without knowing whether those are tools that are best situated for their use case. If a user begins using tools and realizes that they picked the wrong one for their needs after spending time working with them, this makes processing data inefficient if the user continues using the incorrect tools or inefficiencies in time if the user then has to browse and try other tools that might be better situated for their needs. By customizing the user experience or operating system, the user may experience various efficiencies to their business or personal requirements. Identification of user touch points and adjusting accounts for customization of user experience across multiple boards can be a difficult task. Merely using a pen and paper to track changes to hundreds of boards and changes to an account or new touch points would result in mistakes and multiple touch points being ignored. Although mental organizational tasks may be used, systems and methods for dynamically changing an operating system in a workflow environment are lacking.

Therefore, there is a need for unconventional approaches to enable a user to have an adjusted customized workflow management account based on a plurality of touch points to be presented with relevant tools and solutions based on the information gained in each of the touch points. Accordingly, by identifying touch points and monitoring activity, disclosed embodiments provide efficiencies in adjusting the customized workflow management account to present the most relevant tools and workflows to a user and adapting to the user's activities. Additionally, the system described below may provide suggestions that can spare the user time in building the table or workspace.

Aspects of some of the embodiments of this disclosure may include a dynamically changeable operating system for a workflow environment. A dynamically changeable operating system may include a system that carries out operations in an adaptive manner, such as by automatically adapting to new inputs to carry out different operations. The dynamically changeable operating system may be configured to carry out operations for maintaining a virtual workflow environment that may process information and data contained in a data structure, which the operating system may act upon.

Some embodiments may involve associating a user-ID with a workflow management account. A user-ID may include any identifying information associated with a user, any other entity (e.g., a team or a company), and/or of a device of any of the foregoing. For example, a user-ID may include a string of characters, a string of numbers, a name, a phone number, an ID associated with an account, a client device identifier, a client account identifier, or any other identifier. A workflow management account may include any website or application where a user may manage information, data, projects, tasks, or work. Associating a user-ID with a workflow management account may include linking a user-ID with a workflow management account. By way of one example, a user may utilize a workflow management system and open an account with a user-ID related to their name (e.g., user-ID=JaneSmith). In such an embodiment, the workflow management system may associate user-ID JaneSmith with a workflow management account and also customize the user's workflow management experience in response to any information provided by the user, specific to the user-ID JaneSmith.

Some embodiments may include maintaining a plurality of workflow management boards associated with the workflow management account. A plurality of workflow management boards may include one or more tables made up of rows and columns containing cells for data management. In a broader sense, a board may include any of the board examples described herein. Maintaining a plurality of workflow management boards may include storing the plurality of workflow management boards and their associated information in a repository for storage and access. By way of one example, the workflow management system may store multiple boards associated with a user-ID (e.g., JaneSmith). In some embodiments, a user may generate the one or more boards associated with their user-ID from scratch or the user may select various prompts to generate each board from part of a template. In some embodiments, the workflow management system may include multiple boards, networks of boards working together, columns, column stores, dashboard stores, and data objects accessible by and associated with multiple workflow management accounts (not necessarily just for one workflow management account or user-ID).

Some embodiments may include receiving a first plurality of touch points associated with the user-ID. A touch point may include any information provided to the system or identified by the system. By way of one example, the workflow management system may receive a plurality of touch points when users set up their accounts and provide information about themselves or their projects. For example, each input from a user is considered a touch point, e.g., which field the user would like to manage (law firm, hospital management, corporate business, or other field), which team the user would like to manage (marketing, R&D, sales), how large the team is, and solutions (particular workflows with columns, automations, integrations, or any combination thereof). Each of the inputs from a user may be a touch point.

FIG. 143 illustrates a first example of an interface enabling a user to select various prompts which may be sent to a system as one or more touch points associated with a user-ID. By way of one example, interface 14300 of FIG. 143 illustrates that the user may use pointer 14302 to select one of multiple answers to a question. Interface 14300 provides the user with a question—"What would you like to manage with Work OS?" Interface 14300 also provides ten options for the user to select from, including for example, Project Management, Marketing, C R M and Sales, Creative and Design, Software Development, Task Management, Construction, H R and Recruitment, IT, and 200+ Solutions (e.g., other options to select from). Selecting any of these options may act as a touch point, specifically a primary touch point identifying a field. In response to selecting "CRM and Sales," for example, the workflow management system may receive a plurality of touch points associated with the user's user-ID.

In some embodiments, the first plurality of touch points may include a primary touch point identifying a field, a secondary touch point identifying an endeavor, and a tertiary touch point identifying a tool. A field may include any category or vocational area. In some embodiments, the field the user would like to manage may include a field regarding any vocation, industry, or specialty such as a legal industry, hospital management, corporate business, or any other field. An endeavor may include any goal that the user would like to achieve for the workflow management account, such as a financial profit and loss management tool, a human resource employee management tool, a team management tool, or any other task a user would like to pursue. In some embodiments, the endeavor may be selected by the user to indicate whether the workflow management account is for personal or work projects, the role the user may have on the project (e.g., team leader), which team the user would like to manage (marketing, R&D, sales), or size of the team. A tool may include any system tool that can vary from simple data objects (e.g., a column, a table structure, and so on) or complex solutions that include any number or combination of different tools such as data object structures and automations. The tools may be provided as recommendations by the workflow management system in response to receiving information about the user's field and endeavors. In some embodiments, the tool the user selects may include solutions such as particular workflows with columns, automations, integrations, templates, or any combination thereof.

By way of one example, a system may receive a plurality of touch points associated with a user-ID that may include the following: a selection of "Real Estate" by a user after the system prompts the user to choose which industry the user's board may relate to (e.g., a first touch point identifying a field), a selection of "100+" by a user after the system prompts the user to indicate the number of people on her team (e.g., a second touch point identifying an endeavor), and a selection of "Real Estate CRM template" by a user after the system prompts the user to select a template for building a board (e.g., a third touch point identifying a tool).

FIG. 144 illustrates a second example of an interface enabling a user to select various prompts which may be sent to a system as a plurality of touch points associated with a user-ID. By way of one example, interface 14400 of FIG. 144 illustrates that the user may use pointer 14302 to select one of multiple answers to a series of questions in order for the system to provide a customized workspace experience for the user that adapts to inputs provided by the user. In a non-limiting example, interface 14300 may be provided to the user with a presentation of a sentence having multiple blanks that may be filled in by the user. For example, the sentence may provide: "I'm here for (Work/Personal/School). I'm a (Business Owner/Team Leader/Team Member/Freelancer/Director) on the (Sales/HR/Creative/Marketing/Legal/Finance/IT/Multiple) team and I work with (Only Me, 2-5, 6-10, 11-15, 16-25, 25-100, 101+) team members." For example, by clicking on sentence 14402 of FIG. 144, the user may fill in each of the blanks and provide various touch points to the system. In response to filling in the blanks with various answers (e.g., Work, Team Leader, Sales, and 2-5), the workflow management system may receive a plurality of touch points associated with the user's user-ID.

Some embodiments may include, based on the first plurality of touch points, customizing the workflow management account by initially altering at least one of a column option picker, an automation option picker, a third-party application integration picker, a display interface picker, or a solution picker. Customizing a workflow management account may include the system adapting the original workflow management account and interface in response to one or more touch points, such that the interface may present particular tools and options that may be more relevant to the information received from the one or more touch points. A column option picker may include a presentation of a list of options for one or more column types (e.g., columns containing data types for statuses, dates, timelines, contact information, and so on) for a workspace. An automation option picker may include a presentation of a list of options for automations (e.g., logical sentence structures with conditional triggers that may act on data and otherwise trigger actions) in a system. A third-party application integration picker may include a presentation of a list of options for third-party application integrations for a workspace (e.g., integrating a third-party application with the workspace). A display interface picker may include a presentation of a list of options for one or more presentations of information (e.g., bar chart, dynamic object displays, graphical batteries, summary statistics) for a workspace. A solution picker may include a presentation of a list of options for workflows or a package of pre-made features (e.g., simple to complex packages data objects such as columns, tables, dashboards, widgets, or a combination thereof) in a system. A bundle of pre-made features may also be described as a "solution." A solution may include a combination of all features (e.g., integration, automation, column picker, display interface, and so on) packaged together. A solution may be built from a combination of different building blocks in the system. Solutions may be any workflow functionality configured by any building blocks of the system and may be based on board templates that solve a specific use case in one of the categories. A solution may include one or more boards that may be pre-interconnected, and may include pre-set dashboards with built-in widgets that may be partially configured with the boards in the solution.

By way of one example, if a first user selects "marketing" and "CRM" (customer relationship management) in interface 14300 of FIG. 143, the user may receive a platform with solutions fitted for these verticals. The user may be offered relevant templates, applications (e.g., an email application that may be already installed for CRM or other verticals) shown in interface 14500 of FIG. 145, relevant data types in the form of columns, columns with pre-made titles and labels, suggested integrations and more features that may be defined by the system as relevant to that vertical (or cluster).

By way of another example, a user may set up a workflow management account to track help desk ticket tracking projects on a single board or multiple boards. The user may be tracking requests for technical support in one board and customer services responses in another board, for example. The user may indicate by a variety of touch points that the user is working in the food industry, specifically in restaurant reservation systems. In response, the system may customize the workflow management account by adapting a column option picker, adapting an automation option picker, or third-party application integration picker that may be tailored towards resolving technical issues relating to restaurant reservation platforms. Specifically, the adapted column option picker may provide a suggestion to add a column to the help desk ticket tracking board for "Status of Help Request." Additionally, an adapted automation option picker may provide a suggestion to add an automation to "Email technical support staff when a new row for a new customer support ticket has been added to the board." Further, an adapted third-party application integration picker may provide a suggestion to add an integration to "integrate a communication via WebEx to communicate with the customer." Additionally, the system may provide a suggestion to add a solution such as a template of a board for the restaurant industry or a suggestion to add a display interface that is useful for those in the restaurant industry.

In some embodiments, a solution may be a template including a combination of three boards. For example, the system may provide an adapted solution picker as a customized experience that includes a solution with parts from multiple templates (e.g., Legal board templates, project management board templates, and HR board templates), based on the provided touch points.

FIG. 145 illustrates an example of an interface of a customized workflow management account with an altered solution picker, for example. Interface 14500 of FIG. 145 provides multiple recommended templates to choose from based on touch points received by interacting with interface 14300 of FIG. 143 and interface 14400 of FIG. 144. The user may choose from CRM template 14502, Real Estate CRM template 14504, Customers Projects template 14506, Contacts template 14508, Support Sales Materials template 14510, Marketing Operations template 14512, Project Management template 14514, and Training template 14516. Additionally, if the user would like to build their own board from scratch, the user may select "Start from Scratch" button 14518. Further, the user may search Templates Center 14520 to find additional recommended templates in various industries such as education, start up, design, construction, and more. As shown in FIG. 145, the user may use pointer 14302 to select CRM template 14502 to generate a customized workflow environment with one or more boards related to CRM.

Some disclosed embodiments may include monitoring activity associated with the workflow management account. Monitoring activity may include tracking any changes or updates associated with an account or any action made by the user. By way of one example, the system may monitor which areas of the board the user is most frequently using, by clicking, typing, updating, or hovering, in order to determine which areas of the board are most useful to the user.

Some embodiments may include receiving, based on the monitoring, a second plurality of touch points associated with the user-ID. A second plurality of touch points may include any information provided to the system or identified by the system, as described previously above. By way of one example, the workflow management system may receive a second plurality of touch points when the user interacts with the account or the board. For example, each input from a user may be considered a touch point (e.g., which template the user chooses, which columns the user adds to board generated by the recommended template, which columns are removed, which integration is added, which area or the board the user is most frequently using, or any other information identified by the system or provided to the system). Each of the pieces of information derived from the user may be a second plurality of touch points that may be provided after the system received a first plurality of touch points. Additionally, any interaction with the system after the initial setup (e.g., field) to set up the team (e.g., marketing, R&D, sales, and so on) may be a second plurality of touch points.

In some embodiments, at least one of the first plurality of touch points and the second plurality of touch points are derived from responses to queries. Responses to queries may include answers to questions, both of which may be presented and received by the system. In some embodiments, the system may present an interface with a question/query to the user (e.g., which field, team, or solution would you like to manage with work OS?). Answers to the questions/queries can be presented in a variety of ways (e.g., checkbox, dropdown list, custom text input/look up). In some embodiments, the use may click a checkbox, select an option from a dropdown list, or type into a textbox in order to provide a response to a query. The responses to the queries may be provided for any touch point received by the system.

By way of one example, interface 14300 of FIG. 143 illustrates that the user may use pointer 14302 to select one of multiple checkboxes to provide a response to a query. Interface 14300 provides the user with a question—"What would you like to manage with Work OS?" Interface 14300 also provides ten check boxes for the user to select from, including, Project Management, Marketing, C R M and Sales, Creative and Design, Software Development, Task Management, Construction, H R and Recruitment, IT, and 200+ Solutions (e.g., other options to select from). Selecting any of these options may act as a first plurality of touch points or a second plurality of touch points. By responding to a query (clicking "CRM and Sales" by pointer 14302), the workflow management system may receive a first plurality of touch points or second plurality of touch points associated with the user's user-ID.

In some embodiments, the queries may seek a field identification. A field identification may include indicating any category or vocational area associated with the account or that the user would like to manage. In some embodiments, the field the user would like to manage may include any field, such as legal, medical, corporate business, engineering, or any other field to provide a context to the system regarding the user's intended workflow.

For example, interface 14300 of FIG. 143 illustrates that the user may use pointer 14302 to select one of multiple checkboxes to provide a response to a query inquiring which field the user would like to manage within the Work OS.

In some embodiments, at least one of the first plurality of touch points and the second plurality of touch points may be derived from actions monitored in the workflow management account. Actions monitored may include any interactions or activities identified by the system. For example, the system may identify actions taken in a board or dashboard. By way of one example, the system may recognize that the user is inputting a lot of budget information and salary information, which may cue the system to recognize the user is likely on a sales or project management team. Such actions may be monitored and may influence the solutions presented to the user later, as opposed to touch points during the account set up phase. By way of another example, the system may identify that the user emails the project manager each time a new entry is added to the board. Upon monitoring actions on the board and identifying such a pattern, the system may suggest adding an automation to automatically send an email to the project manager each time a new entry is added to the board without having the user take any further action.

In some embodiments, the actions monitored may be associated with a plurality of entities and wherein actions of a first of the plurality of entities may cause customization differing from customization caused by actions of a second of the plurality of entities. A plurality of entities may include any one or more users or groups. Actions of a first of the plurality of entities may include any interaction a first entity may take with a board or account. Actions of a second of the plurality of entities may include any interaction a second entity, different from the first entity, may take with the board or account. In some embodiments, the system may monitor activities such as tracking any changes or updates associated with an account or any action made by multiple groups or users. Further, the system may provide different customization to the board based on which group provided the action. In some embodiments, there may be groups of users that are related to each other but may still get varying, customized experiences. By way of one example, a first entity may be from R&D (e.g., an engineer) and a second entity may be from Marketing (e.g., a marketing analyst) within the same company in the medical device field. For example, the engineer or others in R&D may be presented with a customization that presents tools and solutions commonly used for R&D needs (such as product development). Additionally, the marketing analyst or others in Marketing may be presented with a customization that presents differing tools and solutions that may be better suited for Marketing needs (such as market research). Even though both entities may have had the same first touch point to indicate they are from the same company (e.g., a medical device company) and that first touch point may affect their customizations, they may still experience different customizations because their later actions (after the first touch point) show that they require different customizations.

Some embodiments may include adjusting the customized workflow management account by subsequently altering, based on the second plurality of touch points at least one of the column option picker, the automation option picker, the third-party application integration picker, the display interface picker, or the solution picker. Adjusting the customized workflow management account may include the system adapting the already customized workflow management account and interface in response to one or more secondary touch points to re-render the updated customized workflow management account. Adjusting the customized workflow management account may include altering the previously described column option picker, automation picker, third-party application integration picker, display interface picker, and/or the solution picker to present updated options for selection. In some embodiments, adjusting the customized workflow management account may include readjusting the already adjusted/customized workflow management account and interface. For example, options for each of the features (column option picker, automation option picker, integration picker, display interface picker, and solution picker) may change to customize to workflows that are most relevant to the user. By way of one example, if the system determined the user is a customer caller by monitoring activity associated with the workflow management account, the system may adjust the customized workflow management account by altering the third-party application integration picker to present all of the communication integrations (Zoom, Teams, and Skype) towards the top and leave out integrations typical to R&D (e.g., Matlab and statistical analysis).

FIG. 146 illustrates an example of an interface with a customized workflow management account. After answering the questions presented in FIG. 143 and FIG. 144 and selecting a template in FIG. 145 (all considered touch points), the system may provide the user with a customized board shown in interface 14600 related to specific types of project the user may be managing. Board 14602 and Board 14606 are boards customized based on the touch points collected from the user's interactions with the system and answers to various questions. The user may also add new rows to the boards using "Add" button 14604 and "Add" button 14608. The user may also use pointer 14302 to interact with the boards further and provide further customization to the user experience and workflow management account.

Some disclosed embodiments may include permitting a plurality of entities to have access to the plurality of workflow management boards, wherein the second plurality of touch points may include at least one touch point received from a first entity of the plurality of entities and at least one touch point received from a second entity of the plurality of entities, and wherein the subsequent altering may result in a common visualization to both the first entity and the second entity. Permitting a plurality of entities to have access the plurality of workflow management boards may include allowing multiple users or groups to interact with or view one or more workflow management boards. In some embodiments, workflow management boards may be a common workspace, a common board, or a common dashboard where multiple people may user the same space. A common visualization may include a unified presentation of information contained in a workspace or account two which multiple entities may have access. No matter which entity impacted the altering of the board, workspace, or account, both the first and second entities may be able to access and view the common visualization as a result of touch points provided by both the first and second entities. In some embodiments, the common visualization may also include a presentation of solutions and workflows (columns, automation packages, etc.) that are offered in common to the first and second entities.

By way of one example, a plurality of entities (a team leader and multiple team members) may have access to a board for a project they are all working on. Both of the entities, the team leader and the multiple team members, interact with the board by hovering over certain columns, clicking certain cells, and deleting some rows. The interactions by the two entities may be the touch points received by the system. In response to these interactions, the system may alter certain features offered on the board (column option picker, automation option picker, integration picker, display interface picker, and solution picker). The board may be altered in such a way as to provide a single, common visualization to both the first entity (team leader) and the second entity (team members). Both entities may be able to view and access the same board with the same altered features no matter which entity impacted the altering of the board, workspace, or account.

Some embodiments may include permitting a plurality of entities to access the plurality of workflow management boards, wherein the second plurality of touch points may include at least one touch point received from a first entity of the plurality of entities and a touch point received from a second entity of the plurality of entities, and wherein subsequently altering may result in an altered customized visualization for the first entity different from an altered customized visualization for the second entity. An altered customized visualization may include re-rendering the customized visualization, as previously discussed, with alterations made to the customized visualization. In some embodiments, the altered customized visualizations may also include two presentations of solutions and workflows (columns, automation packages, etc.) that are varied and separately offered to the first and second entities based on their own touch points provided to the system. In such an embodiment, the system customizes the presentation of solutions to pick for each of the first and second users. For example, a plurality of entities (a team leader and multiple team members) may have access to a board for a project they are all working on. Both entities, the team leader and the multiple team members, may interact with the board by hovering over certain columns, clicking certain cells, and deleting some rows. The interactions by the two entities may be considered touch points received by the system. In response to these interactions, the system may alter certain features offered on the board (column option picker, automation option picker, integration picker, display interface picker, and solution picker) for one of the entities based on their interactions with the board and alter other features offered on the board (column option picker, automation option picker, integration picker, display interface picker, and solution picker) for the other entity based on their interactions with the board. The boards may be altered in such a way as to provide two different altered customized visualization to the first entity (team leader) and the second entity (team members) based on their interactions with the board. Each entity may be able to view and access different boards with different altered features that may be catered to them based on their touch points and past actions.

Some embodiments may include receiving an additional plurality of touch points and further customizing the workflow management account based on an additional plurality of touch points. In some embodiments, the system may continue to receive touch points and may continue to customize the workflow management account to generate a more customized experience for the user. In other words, the customized workflow management account may continue to learn from the user's touch points and activities to continuously provide relevant tools, solutions, and visualizations to adapt to the user's activities and updates. In one embodiment, additional touch points may be from a modification of the field, team, or solutions set up, or may be based on actions taken in a board. In another example, where a user is adding multiple solutions, the combination of solutions may lead the system to determine different solutions that are helpful in view of what the user has added (e.g., a constantly learning system that continues to customize the options presented to the user).

Disclosed embodiments may include analyzing behavior associated with the workflow management account, and deriving the second touch points based on the analysis of the behavior. Analyzing behavior may include monitoring any interaction with a board, workflow, or account to determine a user interaction, multiple user interactions, or patterns of interactions, which may be used for further processing, such as for making updated recommendations of tools and solutions. By way of one example, the system may analyze behavior including any interaction the user had in setting up the board. Additionally, the system may track where the user may click in the workflow management account or workspace. For example, if a user is constantly clicking between the board and a dashboard to see summary information, the system may suggest a visualization in the board itself to help the user be more efficient.

FIG. 147 illustrates a block diagram of method 14700 performed by a processor of a computer readable medium containing instructions, consistent with disclosed embodiments. The block diagram includes an example and is not restrictive of the broader and alternative discussions previously presented. In some embodiments, the method may include the following steps:

Block 14702: Associate a user-ID with a workflow management account. In some embodiments, a system may associate an identifier, e.g., name, number, ID, client device, client account, associated with an account for a workflow management provider, as previously described, for example.

Block 14704: Maintain a plurality of workflow management boards associated with the workflow management account. In some embodiments, the system may have access to multiple tables associated with the account. Each of the tables may include rows, columns, and cells to manage data, as previously described, for example.

Block 14706: Receive a first plurality of touch points associated with the user-ID. In some embodiments, the system may receive data, such as touch points or answers to various questions, that are associated with the identifier, as previously described, for example.

Block 14708: Based on the first plurality of touch points, customize the workflow management account by initially altering at least one of a column option picker, an automation option picker, a third-party application integration picker, a display interface picker, or a solution picker. In some embodiments, the system may provide an updated and personalized workflow management account with various different options for customizing tables, as previously described, for example.

Block 14710: Monitor activity associated with the workflow management account. In some embodiments, the system may continue to monitor any updates or changes the user may make in the personalized workflow management account, as previously described, for example.

Block 14712: Receive, based on the monitoring, a second plurality of touch points associated with the user-ID. In some embodiments, the system may receive additional data, such as touch points or updates to the workflow management account, that are associated with the identifier, as previously described, for example.

Block 14714: Adjust the customized workflow management account by subsequently altering, based on the second plurality of touch points at least one of the column option picker, the automation option picker, the third-party application integration picker, the display interface picker, or the solution picker. In some embodiments, in response to the additional data, the system may provide an updated and personalized workflow management account with various different options for customizing tables, as previously described, for example.

Aspects of this disclosure may provide a technical solution to challenges associated with collaborative work systems. Disclosed embodiments include methods, systems, devices, and computer-readable media. For ease of discussion, an example system for data extraction and mapping system is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both). As another example, some aspects of such system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Tools for data extraction and mapping system to map a sub-data source and a visualization template for co-presentation of a representation a particular board and the sub-data visualization are lacking. Accordingly, some embodiments may include data extraction and mapping system with a main data source containing a plurality of data objects where a plurality of linkages between at least some of the plurality of data objects may be constructed to map a sub-data source and a visualization template selection to generate a sub-data visualization. The system may also cause a co-presentation of a representation a particular board and the sub-data visualization. Some of these embodiments may create efficiencies in the data processing, reduce costs associated with memory, distributed memory, communication across multiple networks, and increase reliability needed in processors. Further, some embodiments may improve accuracy in the generation of sub-data visualizations.

Therefore, there is a need for unconventional methods, systems, devices, and computer-readable media for data extraction and mapping system. The system may include maintaining a data source containing a plurality of data objects represented by a plurality of boards where a plurality of linkages between at least some of the plurality of data objects may be constructed to map a sub-data source and a visualization template selection. Further, the system may generate a sub-data visualization causing a co-presentation of a representation a particular board and the sub-data visualization. By using the disclosed computerized method to ascertain data extraction and mapping system, the embodiments provide advantages over prior systems that merely provide data extraction and mapping.

Some disclosed embodiments may relate to a data extraction and mapping system having at least one processor (e.g., processor, processing circuit or other processing structure described herein) in collaborative work systems, including methods, devices, and computer-readable media. Data may refer to any type of information such as numbers, texts, characters, formats, characteristics, qualitative or quantitative variables, units, index, objects, metadata, constants, unstructured information (e.g., web pages, emails, documents, pdfs, scanned text, mainframe reports, spool files, or any other unstructured information), tables, or any combination thereof. Data extraction may refer to the process of obtaining or retrieving data from one or more systems, databases, platforms, or any combination thereof. A mapping system may refer to a system configured to process of transforming data from one database into another database (e.g., between systems, through a representation as GUI, or any combination thereof that may implement the use of artificial intelligence/machine learning). For example, a system may be capable of extracting data from different data structure or different data sets (e.g., data from different workflows or tables).

Some disclosed embodiments may involve maintaining a main data source containing a plurality of data objects. Maintaining a main data source may refer to all sources of information that may be stored in a data repository, a storage medium, or a database for one or more systems or platforms. Each data object of the plurality of data objects may refer to any object capable of containing data such as a cell, column, row, table, dashboard, widget, solution, or any combination thereof capable of dynamically or continuously storing, changing, adding, subtracting, modifying, transforming, rearranging, categorizing, or any combination thereof of data contained in the data objects. The aggregation of the data contained in each data objects may form the data in main data source.

By way of example, the at least one processor may store the plurality of data objects in memory 120 in FIG. 1, the storage 130 in FIG. 1, or both. FIG. 148 illustrates exemplary diagram of a main data source containing a plurality of data objects, consistent with some embodiments of the present disclosure. FIG. 148 illustrates a system 14800 having a main data source 14802 where data 14804 from a plurality of data objects 14806 may be stored in the main data source 14802. Furthermore, the plurality of data objects 14806 may contain one or more data objects (i.e., "data object(s) 1," "data object(s) 2," "data object(s) 3" to "$N^{th}$ data object(s)").

Some disclosed embodiments may involve maintaining a plurality of boards for presenting the plurality of data objects. Maintaining a plurality of boards may refer to one or more boards stored in a repository for access at a later time, as discussed above. A board may represent a single data object having one or more other data objects. A board may contain a listing of data such as, for example, one or more tables, Gantt charts, calendars, pie charts, line charts, bar charts, 3D charts, forms, maps, density maps, scatter plots, bubble charts, tree maps, rain flow charts, timelines, tabs, filters, or any combination thereof. The plurality of boards may include one or more identical or differing boards. The plurality of boards may contain data from the plurality of data objects. Presenting the plurality of data objects may refer to displaying data derived from the plurality of data objects on any device such as a monitor, touchscreen, projector, and so on.

By way of example, the at least one processor may store the plurality of boards in memory 120 in FIG. 1, the storage 130 in FIG. 1, or both. As illustrated in FIG. 148, the plurality of data objects 14806 may be presented by the at least one processor into the plurality of boards 14808 on any device. The plurality of data objects 14806 may contain a first data object(s) 14810 whose data set 14812 may be represented as a first board 14814 in the plurality of boards 14808.

Some disclosed embodiments may involve maintaining a plurality of linkages between at least some of the plurality of data objects that may be associated with differing boards of the plurality of boards. A plurality of linkages may refer to one or more relationships or association between one or more data objects that may be established manually or automatically. Automatic linkages may be established based on any characteristics of the data objects such as the information contained in the data objects (e.g., common contact information, common entities), information associated with the data objects (e.g., column headings, author information of boards), or based on established dependencies between the data objects (e.g., mirrored columns that draw information from a first board to a second board or a rule or automation that may link data objects). The plurality of linkages may include data from one or more data objects. A linkage may include shared data between a first data object and a second data object or a first data object and a plurality of data objects via at least one link to access the shared data. For example, data from one data object may be sent to another data object or vice versa. In some exemplary embodiments, where a first data object is a first cell on a first table and a second data object, that is linked to the first data object, is a second cell in a second table, clicking on the first cell may initiate a transfer of data from the second cell to the first cell, or vice versa. At least some of the plurality of data objects may refer to a portion of or all of the plurality of data objects. Differing boards may refer to one or more boards being identical or distinct from each other.

Some disclosed embodiments may involve at least some of the plurality of data objects associated with differing boards to include multiple data objects from each of the differing boards. Multiple data objects may refer to at least one or more data objects, as previously described above. The multiple data objects for each of the differing boards may contain data that may be similar or different from each other. Data objects from a board may contain data associated with data objects from one or more other differing boards. For example, the at least some of the plurality of data objects may include a first group of multiple data objects from a first board and a second group of multiple data objects from a second board that differs from the first board.

By way of example, the system may store a plurality of linkages in memory 120 in FIG. 1, the storage 130 in FIG. 1, or both. As illustrated in FIG. 148, the plurality of data objects 14806 may include a first data object(s) 14810, a second data object(s) 14820 and an $N^{th}$ data object(s) 14816. The plurality of data objects 14806 may also include a plurality of linkages 14818 between the first data object(s) 14810, the second data object(s) 14820, the first data object(s) 14810, and the $N^{th}$ data object(s) 14816.

Some disclosed embodiments may involve the plurality of linkages being defined by at least one of a folder, an automatic rule, a manually defined rule, a column heading, a row designation, a data cell value, or an item. A folder may refer to a virtual cabinet, tab, or any combination thereof reserved for generating, defining, or storing information. A plurality of linkages associated with the at least some of the plurality of data objects may be based on the fact that some of the data objects contain information from the same folder that may have been established by a user or the system. An automatic rule may be referred to as an automation or logical sentence structure, which may be a logical rule with one or more logical connectors, and configured to act on table data to produce an outcome. An automatic rule may also be considered as a "recipe" having a logical organization of elements for implementing a conditional action. The automatic rule, for example, may be in the form of a recipe, a template, or a sentence including one or more triggering elements (also referred to herein as "triggers") and one or more action elements (also referred to herein as "actions"). An automatic rule may be configured to associate or link data contained in the at least some of the plurality of data objects. The at least one processor may independently generate the automatic rule in response to an input by the user that may not be associated with the establishment of the plurality of linkages. A manually defined rule may be similar to an automatic rule, as described above; however, a user may define the rule for associating or linking data contained in the at least some of the plurality of data objects. A row designation may refer to identifying or recognizing an index or value that may define a row of a table having a plurality of columns and rows such as a row heading for example. The row designation may be an index identifying the location of the row in the table or a title. A data cell value may refer to a value contained in one or more cells of a table. An item may refer to a data object (e.g., a row or a column) that may be represented by one or more texts, numbers, expressions, titles, formats, color, or any combination thereof in one or more rows, columns, or cells of a table. For example, the at least one processor may define the plurality of linkages between a plurality of boards based on a common row designation that may be found in each of the plurality of boards. In another example, an automatic rule may be configured to monitor conditions and/or act on data in a first and a second board. Because the automatic rule is associated with both the first and second boards, both boards may be considered linked via the automatic rule.

FIGS. 149A and 149B illustrate exemplary views of a plurality of linkages between at least some of the plurality of data objects associated with differing boards, consistent with some embodiments of the present disclosure. FIG. 149A illustrates a first board 14900 which may be table 14902 containing a first set of data objects 14904 that includes a plurality of column headings, row designations, data cell values, and items. A user may manually define an automatic rule for a plurality of linkages between the first board 14900 and a second board 14906 through a second set of data objects 14908 that may be mirrored from a second board 14906, as shown in FIG. 149B as second board 14914. Mirroring column 14908 of FIG. 149A may include generating an identical copy of a column from another board (status column 14922 of FIG. 149B) such that when a cell of the column 14908 is altered, the same corresponding cell in column 14922 will also be altered, and vice versa. Because mirrored columns may be considered to include linkages between boards, an automatic rule may act conditionally on data based on these linkages, such as a Date column of board 14902 and the mirrored column 14908. FIG. 149B illustrates second board 14914 which may be a table 14916. The second board 14914 may contain the second data objects 14918 in FIG. 149B that are mirrored (e.g., linked such that data in the mirrored column is automatically updated in any location the mirrored column exists) into the second set of data objects 14908 of the first board 14902 of FIG. 149A.

Some disclosed embodiments may involve receiving a selection of a particular data object associated with a particular board. Receiving a selection of a particular data object may include receiving an input from an interface (e.g., a mouse, keyboard, touchscreen), which in some embodiments, may indicate an intent to manipulate information in a specific data object or a specific board. For example, the at least one processor may receive a selection from a user selecting one or more data objects such as cells, columns, rows, column headings, items, row designations, data cell values, or any combination thereof that may be associated with a particular data object in a particular board.

Some disclosed embodiments may involve identifying via a particular linkage of the plurality of linkages at least one additional data object on another board linked to the particular data object on the particular board. Identifying an additional data object on another board via a particular linkage may include the system making a determination that an additional data object on another board is associated with a selected data object. This determination may be based on any of the previously described links such as through a characteristic of data contained. For example, a user may select a particular data object in a particular board, and the at least one processor may identify a particular linkage between the particular data object and one or more additional data objects associated with another board of the user or to a different user. For example, in an exemplary embodiment, a user may select a cell on one table and the processor may detect a link, or identify a linkage, between that cell and another cell in a different (or same table).

Some disclosed embodiments may involve defining a sub-data source where the sub-data source may aggregate the at least one additional data object and the particular data object. A sub-data source may include a subset of the main data source based on a certain criterion such data objects that are associated with a selected data object. The associated data objects may be based on a particular link or based on a plurality of linkages in order to form a sub-data source. The sub-data source may be an aggregate of a particular data object and its associated additional data objects that may be from other boards, such that the sub-data source may be stored in a repository for later access and reduce the need for re-generating the sub-data source. Depending on the context, the activity, or the operation related to one or more boards having at least some of the plurality of data objects and plurality of linkages, the at least one processor may dynamically or simultaneously store data from the main data source into a sub-data source. For example, the at least one processor may define a sub-data source based on a user's generation of one or more boards. The one or more boards may have a plurality of data objects that may or may not have a plurality of linkages, which the at least one processor may aggregate into the sub-data source that may be accessed later.

By way of example, the system may store a sub-data source in memory 120 in FIG. 1, the storage 130 in FIG. 1, or both. FIG. 150 illustrates an exemplary diagram of a sub-data source aggregating at least one additional data object and a particular data object, consistent with some embodiments of the present disclosure. FIG. 150 illustrates a block diagram 15000 having a plurality of data objects 15002. The plurality of data objects 15002 may contain a particular data object 15004 and three additional data objects 15006. The particular data object 15004 may be associated with a particular board 15008, and the three additional data objects 15006 may be associated with their respective additional boards 15010. The particular data object 15004 and the three additional data objects 15006 may share a plurality of linkages 15012. The particular data object 15004, the three additional data objects 15006, and the plurality of linkages 15012 may be stored in sub-data source 15014. In other instances, a particular linkage may result in a different subset of additional data objects that are aggregated with the particular data object to form the sub-data source. If for example, a selected data object is a cell containing information about a particular individual and the particular individual is only found in one additional data object of "Board 2" 15016 of the additional boards 15010, then the sub-data source may be an aggregate of just the particular data object 15004 of the particular board 15008 and the second data object 15018 of "Board 2" 15016 through the particular linkage involving the information pertaining to that particular individual.

Some disclosed embodiments may involve receiving a visualization template selection. Receiving a visualization template selection may refer to receiving an input through any interface (e.g., mouse, keyboard, touchscreen) via a GUI window indicating an intent to select a visual template for representing data. The visualization template may be selected from a predefined list of varying visualization templates or may be customized that may involve multiple visualizations. The visualization template selection may be indicated by the user by clicking a tab or a button on a board. The visualization template selection may be a separate and distinct GUI from the boards. The visualization template selection may be integrated inside the boards. The visualization template selection may allow the user to select a plurality of widgets to add and place in specific locations inside the GUI window. A widget may be an example of a visual representation of data such as one or more progress bars, graphical batteries, level indicator, tables, Gantt charts, calendars, pie charts, line charts, bar charts, 3D charts, forms, maps, density maps, scatter plots, bubble charts, tree maps, rain flow charts, timelines, to do lists, numbers, time trackers, workload displays, dynamic object displays, countdown displays, or any combination thereof. The visualization template selection may allow a user to place one or more widgets or other visualizations in the GUI window according to the user's preference. The visualization template selection may be stored in memory by the at least one processor for later use for any sub-data sources that are aggregated.

By way of example, the at least one processor may store the visualization template selection in memory 120 in FIG. 1, the storage 130 in FIG. 1, or both. FIG. 151 illustrates exemplary visualization template selection, consistent with some embodiments of the present disclosure. FIG. 151 illustrates a GUI 15100 for visualization template selections having a GUI window 15102. A user may activate the GUI 15100 for a visualization template selection by clicking on, for example, an "Add View" tab 14922 in FIG. 149B. In FIG. 151, the user may select a battery status widget 15104 to be placed at the top left, a llama farm status widget 15106 to be placed at the top right, a Gantt chart widget 15108 to be placed under both the batter status widget 15104 and the llama farm status widget 15106, and a bar chart widget 15110 to be placed under the Gant chart widget 15108 in the GUI window 15102. The placements of any of the widgets or visualizations may be arranged in any matter according to a preset (default) arrangement, a random arrangement, or an arrangement according to user preference. Further, the particular widgets and visualizations implemented may be selected by a user and may also be removed according to user preference.

Some disclosed embodiments may involve mapping the sub-data source to the visualization template selection to generate a sub-data visualization. A sub-data visualization may refer to a presentation or visualization of information contained in the sub-data source as discussed previously above. The sub-data visualization may involve mapping the sub-data source to the selected visualization templates as discussed above either manually (e.g., through settings to match data objects to aspects of visualizations) or automatically (e.g., through machine learning or through auto-recognition). The at least one processor may map the data contained in the sub-data source for transformation into a visual representation that may include one or more visualizations to provide summary or detail information of the data contained in the sub-data source.

By way of example, the at least one processor may store the data-source visualization in memory 120 in FIG. 1, the storage 130 in FIG. 1, or both. FIG. 152 illustrates an exemplary sub-data visualization, consistent with some embodiments of the present disclosure. FIG. 152 illustrates a sub-data visualization 15200 having a GUI window 15202. A user may map a sub-data source to the selected visualization templates shown in GUI 15100 in FIG. 151 to generate the sub-data visualization 15200 in FIG. 152.

Some disclosed embodiments may involve the sub-data visualization being presented within a container, and where the at least one processor may be configured to associate a computing application to the sub-data source to thereby alter the sub-data visualization. A container may refer to a dynamic window or canvas containing one or more widgets capable of being presented or viewed alongside one or more tables within a board when the user may select an item in the table of the board. The container may disappear, minimize, or may be prevented from being presented or viewed alongside the one or more tables within the board when the user unselects the item in the table. The container may present the sub-data visualization, as discussed above. A computer application may refer to any application such as a customized application generated within the system or any external applications such as the suit of Microsoft™ applications, Google™ webpages and applications, Facebook™, Twitter™, or any other computer related applications. For example, a user may add a widget associated with Microsoft™ Word and Excel to an existing sub-data visualization for the at least one processor to append data contained in the widget associated with Microsoft™ Word and Excel to the sub-data source. The at least one processor may further alter the sub-data visualization to reflect the appended data contained in the widget associated with Microsoft™ Word and Excel.

Some disclosed embodiments may involve causing a co-presentation of a representation of the particular board and the sub-data visualization. A co-presentation of a representation of the particular board and the sub-data visualization may refer to the at least one processor simultaneously presenting a particular board and a sub-data visualization associated with the particular board on a GUI. The at least one processor may also simultaneously display the particular board and the sub-data visualization of another board linked (referring to the plurality of linkages) or not linked to the particular board. For example, a particular board may include a table containing one or more particular data objects. The at least one processor may cause a co-presentation of the table in the board and a timeline chart in a sub-data visualization for the board. In another example, the at least one processor may cause a co-presentation of the table in the board linked to another board and a Gantt chart of the other board in the sub-data visualization. In yet another example, the at least one processor may cause a co-presentation of a first sub-data visualization, a second sub-data visualization, and a table in a particular board.

By way of example, FIG. 153 illustrates exemplary view of co-presentation of a representation of the particular board and the sub-data visualization, consistent with some embodiments of the present disclosure. As illustrated in FIG. 153, the at least one processor may cause a co-presentation 15300 of a particular board 15308 having a table and a sub-data visualization 15306 having a Gantt chart. The co-presentation 15300 may be accessed or minimized by a user clicking tab 15302. The particular board 15308 having the table may be associated with "Board 1" 15304. It is to be understood this is one non-limiting example at that the sub-data visualization 15306 may present any sub-data visualization such as those illustrated in FIG. 151 (in an unconfigured state) or in FIG. 152 (in a configured state) in a co-presentation 15300 as shown in FIG. 153.

Some disclosed embodiments may further involve presenting an index of a plurality of visualization templates, and where the received visualization template selection may be based on a selection from the index. The plurality of visualization templates may all be displayed by the at least one processor to a user on a GUI window for a particular board in the form of an index. An index of a plurality of visualization templates may refer to any listing of visualization templates, such as through a marketplace, a list (e.g., a full list or a drop-down), or through a look up in a search bar, or any combination thereof. The index of the plurality of visualization templates may be a preset list from the system, or the index may also be dynamic in that it may include new visualization templates added to the system (e.g., customized visualizations generated by users or by the administrator). For example, the at least one processor may have stored a user's prior established plurality of visualization templates to apply to one or more particular boards. The combination of the visualization templates used may be stored as a newly added visualization template for the index, which may be accessed by other users, or just to the user who generated the newly added visualization template.

By way of example, the at least one processor may store the index of a plurality of visualization templates in memory 120 in FIG. 1, the storage 130 in FIG. 1, or both. FIG. 154 illustrates exemplary view of an index of a plurality of visualization templates where the received visualization template selection may be based on a selection from the index, consistent with some embodiments of the present disclosure. As illustrated in FIG. 154, GUI window 15400 may display an index of a plurality of visualization templates 15402 as a matrix with elements 1 thru M. A user may make a visualization template selection 15404 from the index of a plurality of visualization templates 15402 for mapping to a sub-data source's plurality of data objects.

Some disclosed embodiments may involve the at least one processor to further be configured to migrate the sub-data visualization for co-presentation with a representation other than the representation of the particular board. Migrating a sub-data visualization may refer to moving or transferring a sub-data visualization with a co-presentation from one representation of information to another. A representation other than the representation of the particular board may include a representation associated with a particular board, aside from the presentation of the particular board itself. For example, while a particular board may be presented in a table form, the particular board may be represented in another form such as a Gantt chart, dashboard, or any other different view that is not in a table form. As such, the sub-data visualization of the sub-data source may be presented in a co-presentation with not merely just the representation of the particular board in a table form, but other representations of the information contained in the particular board.

As illustrated in FIG. 155, a co-presentation 15500 may be displayed by the at least one processor with a horizontal split 15502. In some instances, the co-presentation may include both a representation of a particular board 15506 in table form, and another representation other than the representation of the particular board as shown by Gantt view 15504. A sub-data visualization (e.g., 15200 of FIG. 152) may be in a co-presentation with a particular board 15506, or the sub-data visualization may be migrated to be in co-presentation with a representation other than a representation of the particular board, such as Gantt view 15504.

Some disclosed embodiments may involve the at least one processor further configured to, upon receipt of a filter selection, cause the co-presentation to reflect an unfiltered representation of the particular board and a filtered representation of the sub-data visualization. A filter selection may refer to a selection received from any interface to indicate an intent to filter any information. A filter may refer to any higher-order function or method that may process an original data object (e.g., items in a list, items in a column, items a row, items in table, items in a chart, items in a map, items in a display, or any combination thereof) in some order to produce a new data object containing a subset of the elements of the original data object in another form, order, or display to present information related to the filter. The filter may be displayed as a GUI window containing a plurality of drop-down menus, drop-down lists, list boxes, radio buttons or any combination thereof for a user to select from and filter the data in the data structure. An unfiltered representation of the particular board may refer to the presentation of a specific table without an applied a filter selection which may be the specific board in its original or unaltered format. A filtered representation of the sub-data visualization may refer to a re-rendered presentation of the sub-data visualization based on the filter selection, as discussed above. For example, the at least one processor may cause the display of a co-presentation via a horizontal split or a vertical spit of an unfiltered representation of a particular board in a first split and a filtered representation of the sub-data visualization in a second split of the co-presentation. Some disclosed embodiments may involve the filtered representation being limited by a time period. A time period may refer any metric of time such as a period by minutes, hours, days, weeks, months, years, or any combination thereof. For example, the at least one processor may limit the data displayed in the filtered representation of the sub-data visualization by weeks such that a timeline may display tasks by weeks in a given one or more months. The filter by time period may work in conjunction with other filter selections a user may make.

By way of example, FIG. 155 illustrates exemplary view of a co-presentation to reflect an unfiltered representation of a particular board and a filtered representation of a sub-data visualization upon receipt of a filter selection, consistent with some embodiments of the present disclosure. As illustrated in FIG. 155, co-presentation 15500 may be displayed by the at least one processor with a horizontal split 15502, a filtered representation of a sub-data visualization 15504 located above the horizontal split 15502, and an unfiltered representation of a particular board 15506 located below the horizontal split 15502. The unfiltered representation of the particular board 15506 may be a table that may contain data associated with another board. The filtered representation of the sub-data visualization 15504 may be filtered by making selections in the filter 15508 containing a plurality of drop-down menus or any other selection methods. The system may receive a filter selection 15510 from a user to re-render the visualization to present information relevant to any combinations of filter selections. The at least one processor may also display or re-render the filtered representation of the sub-data visualization 15504 based on a selection 15512 to the limit the display of time on the timeline by "Days."

Some disclosed embodiments may involve the at least one processor further configured to limit the filtered representation that may be limited by a specific aspect of the particular data object. A specific aspect of a data object may refer to any characteristics associated with any data object, such as the information contained in the data object, metadata associated with the data object (e.g., a timestamp of the establishment of the data object and/or the author of the data object), the position of the data object, a heading associated with the data object, or any other characteristics that may be associated. For example, the at least one processor may limit the filtered representation of the sub-data visualization by the data having a specific column heading (e.g., "Status" or "Person"), a specific status contained in a cell (e.g., Stuck, Working on it, Done), having a specific author associated with the data, or any other aspects of characteristics that may be discerned from a particular data object.

By way of example, FIG. 155 illustrates the co-presentation 15500 having the filtered representation of the sub-data visualization 15504 and the unfiltered representation of the particular board 15506. The at least one processor may limit the filtered representation of the sub-data visualization 15504 according to an aspect of a particular data object 15514 where the timelines may be limited to only show label associated with the status "Done," "Working on it," and "Stuck."

Some embodiments may involve the at least one processor further configured to enable a selection that may cause a change in a relative make-up of a display surface area allotted to the representation of the particular board and the sub-data visualization. A selection may refer to a user activating or clicking a slide bar, a bar, an area, a button, a filter selection, a drop-down menu, or any combination thereof to shape, adjust, arrange, or any combination thereof a display on a GUI. The selection may be dynamic where the display may simultaneously change as the user makes a selection or drags the selection in any direction, or any combination thereof. A change in a relative make-up of a display may refer to assigning a plurality of percentages to relative portions of a display such that the summation of the plurality of percentages may equal one hundred percent. The plurality of percentages to relative portions of the display may be associated with a surface area or a volume of the display. For example, the at least one processor may receive a selection by a user to allot or allocate fifty percent of the display surface area to the representation of the particular board and fifty percent of the display surface area to the representation of the sub-data visualization. This allocation may be changed through any interaction such as a click and drag gesture, an entry of allotted space for each representation, and so on.

By way of example, FIG. 155 illustrates the co-presentation 15500 having a sub-data visualization 15504 and a representation of a particular board 15506 with a horizontal split 15502. The co-presentation view 15500 may be rearranged by dragging the horizontal split 15502 in the vertical direction by a user to cause the at least one processor to change the percentage surface area for the sub-data visualization 15504 to be greater or smaller than the representation of the particular board 15506. The total percentage of the surface area of the display or co-presentation 15500 constituting the representation of the sub-data visualization 15504 and the representation of the particular board 15506 may be equal to 100%.

FIG. 156 illustrates exemplary block diagram for an exemplary method for a data extraction and mapping system, consistent with some embodiments of the present disclosure. Method 15600, as shown in FIG. 156, with block 15602 may maintain a main data source containing a plurality of data objects, as previously discussed. At block 15604, method 15600 may maintain a plurality of boards for presenting the plurality of data objects, as previously discussed. At block 15606, method 15600 may maintain a plurality of linkages between at least some of the plurality of data objects that may be associated with differing boards of the plurality of boards, as previously discussed. At block 15608, method 15600 may receive a selection of a particular data object associated with a particular board, as previously discussed. At block 15610, method 15600 may identify via a particular linkage of the plurality of linkages at least one additional data object on another board that may be linked to the particular object on the particular board, as previously discussed. At block 15612, method 15600 may define a sub-data source where the sub-data source may aggregate the at least one additional data object and the particular data object, as previously discussed. At block 15614, method 15600 may receive a visualization template selection, as previously discussed. At block 15616, method 15600 may map the sub-data source to the visualization template selection to generate a sub-data visualization, as previously discussed. At block 15618, method 15600 may cause a co-presentation of a representation of the particular board and the sub-data visualization, consistent with the disclosure discussed above.

Aspects of this disclosure may provide a technical solution to challenges associated with collaborative work systems. Disclosed embodiments include methods, systems, devices, and computer-readable media. For ease of discussion, example system for extrapolating information display visualization is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

Tools for extrapolating information display visualizations through an item interface extrapolator are lacking. This may present inefficiencies with processing information and storage of information when a system regenerates and re-maps information for visualizations each time items are selected for presentation. Accordingly, a system for extrapolating information display visualization through an item interface extrapolator presents efficiencies in data processing, reduces costs associated with memory, distributed memory, communication across multiple networks, and reliability needed in processors, and improves accuracy in the generation of an item interface extrapolator with a plurality of activatable elements associated with differing visualization of data and the activatable elements having a first extrapolated display of data in a first manner and a second extrapolated display of data in a second manner.

Therefore, there is a need for unconventional methods, systems, devices, and computer-readable media for a system for extrapolating information display visualizations through an item interface extrapolator that may, upon receipt of a first selection, include a plurality of activatable elements where each of the activatable elements may be associated with differing visualization, that may, upon receipt of a second selection of one of the activatable elements, include a first extrapolated display of data associated with a particular item to appear in a first manner, that may upon receipt of a third selection of another of the activatable elements, cause a second extrapolated display of data associated with the particular item to appear in a second manner. By using the disclosed computerized method to ascertain extrapolating information display visualization through an item interface extrapolator, the embodiments provide advantages over prior systems that merely provide extrapolating information.

As another example, some aspects of such a system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for extrapolating information display visualization having at least one processor (e.g., processor, processing circuit or other processing structure described herein) in collaborative work systems, including methods, devices, and computer-readable media. Extrapolating information may refer to the at least one processor estimating, projecting, extending, expanding, mapping, or any combination thereof from an original set of information to arrive at a new set of information or visualization. Extrapolating information may also be transforming, rearranging, changing, interpolating, or any combination thereof from one visual medium into another visual medium via a display to create a new set of information based on the original set of information. A display visualization may refer to the at least one processor providing a graphical user interface (GUI) to visually present information. For example, a display visualization may include charts, interactive graphics, dynamic or animated displays of information, or any combination thereof that may include alphanumerics, graphics, or a combination of both.

Some disclosed embodiments may involve maintaining a board with a plurality of items, each item defined by a row of cells, and wherein each cell may be configured to contain data and may be associated with a column heading. Maintaining a board may include storing information associated with or contained in a board in a repository for storage and access. A board may be a structure that may contain data in any format, such as in rows and columns, as described previously above. An item may include any information pertaining to any task, entity, or object, in a data object such as a row or column having a plurality of cells in a board or table. For example, a plurality of items may refer to each row in a table. Containing data may include the storage of any type of information in any data object (e.g., cells) such as numbers, texts, characters, formats, characteristics, qualitative or quantitative variables, units, index, objects, metadata, constants, unstructured information (e.g., web pages, emails, documents, pdfs, scanned text, mainframe reports, spool files, or any other unstructured information), or any combination thereof. A column heading may refer to a value representative of information in an associated column. Although not a requirement, in some embodiments, a column heading may be descriptive of, or indicative of, data in the associated column. For example, the at least one processor may have a board with a plurality of rows and columns with cells at intersections of the rows and columns. Each column may be associated with a column heading to identify the information contained in each of the columns. Each column heading may be input manually by a user through any interface (e.g., a keyboard), automatically as a default, or automatically through machine learning to determine the data type contained in the cells of a column to predict a suitable column heading.

By way of example, the at least one processor may store a board in memory 120 in FIG. 1, the storage 130 in FIG. 1, or both. FIG. 157 illustrates an exemplary board with a plurality of items, each item defined by a row of cells, and wherein each cell is configured to contain data and is associated with a column heading, consistent with some embodiments of the present disclosure. As illustrated in FIG. 157, the at least one processor may maintain a board 15700 which may be a table 15702. The table 15702 may contain a plurality of rows and columns. An item 15704 may be a row of cells in the table 15702. Cell 15706 of item 15704 may be associated with a column heading 15708, which may be part of column 15710.

Some disclosed embodiments may involve linking at least a first column to at least a second column so that a change in data in a cell of the at least first column may cause a change in data of a cell in the at least second column. Reference to first and second columns may refer to consecutive or non-consecutive columns to identify at least two different columns. Linking at least a first column to at least a second column may refer to one or more relationships or associations between one or more cells in the at least first column and the at least second column. The at least one processor may cause a change in a cell in the at least second column based on a change in a cell in the at least first column, or vice versa because of established links or relationships between the cells of the at least first column and the at least second column. The cell in the at least first column may not be in the same row as the cell in the at least second column. Causing a change in data may refer to at least one processor altering (e.g., adding, deleting, rearranging), updating, structuring, restructuring, transforming, or any combination thereof the display or value of data in any data object such as a cell of a table. For example, a board may have two columns indicating status information that are linked together such that when a cell in the first column is marked with "done," the associated cell in the second column will automatically be marked with "complete,"

By way of example, FIG. 157 illustrates the at least one processor changing cell 15712 to "Done" in the first column 15714, which may cause a change in cell 15716 to "Proceed to Next Phase" in the second column 15718. This change may be automatic as a result of the link between the first column 15714 and the second column 15718. This link may be defined, for example, by a logical rule.

Some disclosed embodiments may involve receiving a first selection of a particular item from the board, wherein the particular item may include a plurality of cells with data in each cell, and wherein data in a first cell of the plurality of cells may be linked to data in a second cell of the plurality of cells. Receiving a selection of a particular item on a board may include receiving an input from any interface (e.g., a mouse, keyboard, touchscreen, and so on) to indicate an intent to select a specific item on a board. This received input may cause an activation of the specific item for further processing. A particular item may refer to a subset of or a specific one or more cells or a plurality of cells within an item, as defined above. The cells and the data contained in them that are associated with a particular item may be considered linked to each other, as described above. For example, the at least one processor may receive a user's selection of a row of cells of a table where at least two of those cells associated with the row may be linked together.

By way of example, FIG. 157 illustrates the item 15704 that is selected by a user with a cursor interface 15720. The item 15704 may include first cell 15712, second cell 15716, third cell 15706, and fourth cell 15722 whose data may be linked to each other.

Some disclosed embodiments may involve, upon receipt of the first selection, causing a display of an item interface extrapolator, wherein the item interface extrapolator may include a plurality of activatable elements, each of the activatable elements being associated with a differing visualization of at least some of the data contained in cells associated with the particular item. A display of an item interface extrapolator may refer to a GUI window that may display interpolated and/or extrapolated data (manually, automatically, or with machine learning) drawn from an item or any other data object. The display of the item interface extrapolator may include any visualizations of data that may be in the form of one or more tables, progress bars as batteries, Gantt charts, calendars, pie charts, line charts, bar charts, 3D charts, forms, maps, density maps, scatter plots, bubble charts, tree maps, rain flow charts, timelines, to do lists, numbers, time trackers, workload displays, llama farm status displays, count-down displays, tabs, filters, sub-GUI windows, objects, or any combination thereof. The at least one processor may display the item interface extrapolator by appearing in a board's view as a GUI window fully or partially covering the virtual space containing the data associated with the board, items, or any other data object. An activatable element may refer to one or more objects, charts, icons, tabs, folders, figures, sub-GUI windows, buttons, or any combination thereof on the item interface extrapolator that may be selected or clicked by a user to activate a further processing of information or displays. Differing visualizations may refer to separate visualizations that may include presentations of information in similar or differing formats.

Some disclosed embodiments may involve receiving a second selection of one of the activatable elements. A second selection of an activatable element may refer to an activation of an activatable element inside the item interface selector, as defined above. Upon receipt of the second selection, the system may cause a first extrapolated display of data associated with the particular item to appear in a first manner. A first extrapolated display of data in a first manner may refer to a first visualization in the item interface extrapolator drawn from data associated with a particular item. For example, the at least one processor may receive a user's first selection of a particular item and cause the display of a first GUI window for an item interface extrapolator that may be co-presented with a display of a board. The item interface extrapolator may include activatable elements that would cause different visualizations in different manners to appear in the item interface extrapolator. The first visualization may be any manner of visualization such as one or more tables, progress bars as batteries, Gantt charts, calendars, pie charts, line charts, bar charts, 3D charts, forms, maps, density maps, scatter plots, bubble charts, tree maps, rain flow charts, timelines, to do lists, numbers, time trackers, workload displays, llama farm status displays, count-down displays, tabs, filters, sub-GUI windows, objects, or any combination thereof.

FIG. 158 illustrates an exemplary view of causing a display of an item interface extrapolator, wherein the item interface extrapolator may include a plurality of activatable elements, consistent with some embodiments of the present disclosure. As illustrated in FIG. 158, view 15800 may display a board view 15802 with a selection of a particular item 15804. In response to the selection of the particular item 15804, the at least one processor may cause the display of an item interface extrapolator 15806 (that may be in a co-presentation with board view 15802) including a first tab (activity log activatable element) 15808, a second tab (item card activatable element) 15810, and an activity log 15812 all associated with data in the cells of the particular item 15804. The visualization of the activity log 15812 may appear in response to the selection of the activity log activatable element 15808 (e.g., the second selection).

By way of example, the at least one processor may receive a second selection by storing it in memory 120 in FIG. 1, the storage 130 in FIG. 1, or both. FIG. 159 illustrates another exemplary view of causing a first extrapolated display of data associated with the particular item to appear in a first manner in response to receipt of a second selection, consistent with some embodiments of the present disclosure. As illustrated in FIG. 159, in item interface extrapolator 15900, a user may select the item card activatable element 15902. In response to the selection of the item card activatable element 15902, the at least one processor may cause the display of extrapolated data from the particular item in an item card visualization 15906. The first extrapolated display of data 15904 may appear in a first manner where an item card visualization 15906 of data of a particular item may be positioned above a table 15908 in a co-presentation containing a plurality of cells associated with the data of the particular item inside the item interface extrapolator 15900.

Some disclosed embodiments may involve receiving a third selection of another of the activatable elements, and upon receipt of the third selection, causing a second extrapolated display of data associated with the particular item to appear in a second manner. For example, the at least one processor may receive a third selection by a user where the user may click on a Gantt chart (the first manner described above) to cause the at least one processor to further display a calendar. In another example, the third selection may be made on a second activatable element in the item interface extrapolator. Similarly to the first extrapolated display of data, a second extrapolated display of data may refer to one or more nested GUI windows within the item interface extrapolator or the first extrapolated display of data, one or more GUI windows independent from the item interface extrapolator or the first extrapolated display of data, or any combination thereof that may display interpolated and/or extrapolated data with machine learning in a particular item as one or more activatable elements. Similar to the first manner, a second manner may refer to a second visualization in the item interface extrapolator drawn from data associated with a particular item that may be similar or different from the first manner. For example, the at least one processor may cause the display of a second extrapolated display of data in a second manner such as a 3D chart that is in a different manner from a Gantt chart display, in the item interface extrapolator.

By way of example, the at least one processor may receive a third selection by storing it in memory 120 in FIG. 1, the storage 130 in FIG. 1, or both. FIG. 160 illustrates exemplary view of, upon receipt of a third selection, cause a second extrapolated display of data associated with the particular item to appear in a second manner, consistent with some embodiments of the present disclosure. As illustrated in FIG. 160, in item interface extrapolator 16000 may include the display of a first extrapolated display data 16004. The first extrapolated display data 16004 may include item card view 16006 of data of a particular item positioned above a table 16008 in a co-presentation. A user may make a third selection 16010, which may cause the at least one processor to display a second extrapolated display of data 16012 in a second manner where the second extrapolated display of data 16012 may be a calendar placed above a portion of the item card view 16006 and the table 16008 in the first extrapolated display of data 16004, which may also be contained in the item interface extrapolator 16000. In another example in FIG. 158, a selection of a first activatable element such as activity log activatable element 15808 to cause a visualization of an activity log 15812 as the first manner in the item interface extrapolator. The system may then receive a selection of a second activatable element such as item card activatable element 15810 to cause an item card visualization 15906 to be presented as a second manner, as shown in FIG. 159.

Some disclosed embodiments may involve the at least one processor further configured to receive a fourth selection of a further activatable element, wherein the further activatable element may be configured to enable customization of the item interface extrapolator; and upon receipt of the fourth selection, enabling customization of the item interface extrapolator via a network access device, wherein the customization may enable data associated with the particular item to appear in a third customized manner. Similar to the second selection and the third selection as described above, a fourth selection may refer to activating one or more activatable elements other than the activatable elements in the third selection inside the item interface extrapolator, inside the first extrapolated display of data, inside the second extrapolated data, or any combination thereof. A further activatable element may refer to one or more activatable elements other than the third selection. A customization of the item interface extrapolator may refer to a customized modification to an item interface extrapolator caused by a user to rearrange, reorient, reposition, change, reformat, resize, move, or any combination thereof the activated elements and/or visualizations associated with the item interface extrapolator. A network access device may refer to a computer, a mobile device, a tablet, a laptop, or any other related devices associated with a user that may be capable of accessing the network that the system is maintained. A third customized manner may refer to the rearrangement, repositioning, relocation, resizing, reorienting, changing, reformatting, moving, or any combination thereof of the activatable elements or visualizations in the customization of the item interface extrapolator. In other instances, the third customized manner may be a third visualization that appears in the item interface extrapolator that is a customized visualization generated by a user. For example, the at least one processor may receive a fourth selection via a user on a desktop by selecting one or more activated elements that may enable the user to customize the selection of a timeline, a table, a calendar, and a status bar for display according to specific locations—a third customized manner—in the item interface extrapolator. In another example, the fourth selection may be of a link to activate a customized visualization builder to generate a new, customized visualization that may be presented in the item interface extrapolator.

By way of example, the at least one processor may receive a fourth selection by storing it in memory 120 in FIG. 1, the storage 130 in FIG. 1, or both. FIG. 161 illustrates exemplary view of, upon receipt of a fourth selection, enable customization of the item interface extrapolator, wherein the customization enables data associated with the particular item to appear in a third customized manner, consistent with some embodiments of the present disclosure. FIG. 161 illustrates a customization of the item interface extrapolator 16100 where a user may make a fourth selection of a customization button 16102 to enable the user to customize a battery status widget 16104, a llama farm status widget 16106, a Gantt chart widget 16108, and a bar chart widget 16110. The selection of the customization button 16102 may also cause a custom visualization builder to appear to enable a user to generate a new, custom visualization to be presented in the item interface extrapolator 16100. The user may position the battery status widget 16104 at the top left, the llama farm status widget 16106 may be placed at the top right, the Gantt chart widget 16108 may be placed under both the battery status widget 16104 and the llama farm status widget 16106, and the bar chat widget may be placed below the Gantt chart widget 16108 in a third customized manner. In addition to customization of position, other instances of customization may involve the configuration of the visualizations in the item interface extrapolator 16100 such as a light or dark mode, or any other customization of the visualizations contained therein.

Some disclosed embodiments may involve the at least one processor to further be configured to store the third customized manner as a template, and to present the third customized manner as a display option when items other than the particular item may be selected for analysis and display within the item interface extrapolator. A template may refer to a GUI window for specifically allowing a user to construct or establish a visual template for a pre-formatted example of the third customized manner having one or more activatable elements without the data associated with the particular item. A template of the third customized manner may be a skeleton representation of unpopulated data associated with the particular item in the one or more activatable elements. Storing the third customized manner as a template may involve storing one or more visualizations in memory, or may involve storing a custom generated visualization not previously stored in the system for later use. Presenting a third customized manner as a display option may refer to presenting an indication or activatable element to access the third customized manner. The display option may be indexed by numbers, alphabet letters, alpha-numerical values, or any combination thereof of one or more lists, vertical array of elements, horizontal array of elements, matrix containing elements, drop-down menus, or any combination thereof displaying one or more templates. For example, a user may generate a custom visualization involving a network map that was previously unavailable to the system. The user may save this custom visualization as a template, which may then appear as a new activatable element in the item interface extrapolator to access the custom visualization. The at least one processor may have stored pre-defined templates and customized templates in memory. The at least one processor may receive a selection from a user pressing or clicking a button named "template options" on the item interface extrapolator to provide a GUI window of display options of templates. The at least one processor may display a plurality of templates of different visualizations and templates of visualizations, that may be presented as display options in the form of activatable element or as numbered elements contained in, for example, a horizontal array that the user may scroll from left to right or vice versa to select from an index. The at least one processor may receive a template from the user selecting one of the display options of templates to be utilized in the item interface extrapolator. In another example, the template may be a third customized manner that may be displayed in the item interface interpolator, the board, or any combination thereof.

By way of example, the at least one processor may store one or more templates in memory 120 in FIG. 1, the storage 130 in FIG. 1, or both. FIG. 162 illustrates an exemplary view of one or more stored templates of one or more of the third customized manners shown as a display option when items other than the particular item are selected for analysis and display within the item interface extrapolator, consistent with some embodiments of the present disclosure. As illustrated in FIG. 162, item interface extrapolator 16200 may include an activatable element 16202 to access template visualizations such as a custom visualization 16204 that may have been generated by a user, or may have been provided as a preset. A user may select a template 54-6-06 from the index of the plurality of templates for display as the third customized manner in the item interface extrapolator 16200.

Some disclosed embodiments may involve the at least one processor to further be configured to cause a simultaneous display of the item interface extrapolator and at least a portion of the particular item. At least a portion of the particular item may refer to the display of the particular item of a board being completely or partially covered or uncovered by the item interface extrapolator. For example, the at least one processor may cover 50% of the particular item with the item interface extrapolator where the item extrapolator may be automatically resized by the at least one processor to occupy the remaining 50% of the particular item covered in addition to the item interface extrapolator's original size. In another example, the at least one processor may cover 75% of the particular item with the item interface extrapolator where the item extrapolator may be automatically resized by the at least one processor to occupy the remaining 75% of the particular item covered in addition to the item interface extrapolator's original size. In yet another example, the at least one processor may cover all of the particular item selected by the user causing a single window of the item interface extrapolator.

By way of example, FIG. 158 illustrates the particular item 15804 being partially covered by the item interface extrapolator 15806.

Some disclosed embodiments may involve the at least one processor to further be configured to migrate the item interface extrapolator for co-presentation with a representation other than the board. Migrate the item interface extrapolator may refer to the at least one processor moving or relocating the item interface extrapolator from one platform (i.e., a first board) to another distinct or associated platform (i.e., a second board). A co-presentation may refer to the at least one processor simultaneously displaying information such as from a particular board and an item interface extrapolator containing extrapolated displays of data. The at least one processor may also simultaneously display the item interface extrapolator having data associated with a particular item of a first board with the extrapolated display of data from a particular item from a second board. For example, the at least one processor may cause a co-presentation of a table in an item interface extrapolator, a timeline chart and Gantt chart in a first extrapolated display, and a battery status chart in a second extrapolated display of data from a second table. In another example, the at least one processor may cause a co-presentation of a table, a llama farm status, and a battery status in the item interface extrapolator. A representation other than the board may include a representation associated with a particular board (e.g., in a table representation), aside from the presentation of the particular board itself (e.g., not in a table representation or in the original table representation).

By way of example, FIG. 163 illustrates an exemplary migration of an item interface extrapolator for co-presentation with a representation other than the board, consistent with some embodiments of the present disclosure. As illustrated in FIG. 163, the at least one processor may have migrated item interface extrapolator 16300 from a first board where activatable elements 16302 associated with the item interface extrapolator 16300 may display data associated with a particular item in the first board. The at least one processor may cause a co-presentation of the item interface extrapolator 16300 with a representation other than the board such as, for example, an aggregate of data from two boards 16304.

Some disclosed embodiments may involve the at least one processor to further be configured to, upon receipt of a filter selection, cause a co-presentation to reflect an unfiltered representation of the board and a filtered representation of the item interface extrapolator. A filter selection may refer to a selection received from any interface to indicate an intent to filter any information. A filter may refer to any higher-order function or method that may process an original data object (e.g., items in a list, items in a column, items a row, items in table, items in a chart, items in a map, items in a display, or any combination thereof) in some order to produce a new data object containing a subset of the elements of the original data object in another form, order, or display to present information related to the filter. The filter may be displayed as a GUI window containing a plurality of drop-down menus, drop-down lists, list boxes, radio buttons or any combination thereof for a user to select from and filter the data in the one or more items, one or more particular items, or any combination thereof. An unfiltered representation of the board may refer to the presentation of a table without an applicated filter selection (e.g., the original representation of the table). A filtered representation of the item interface extrapolator may refer to the presentation of the item interface extrapolator related to data in a particular item where the user may have applied a filter selection, as discussed above, to the item interface extrapolator presentation. For example, the at least one processor may cause the display of a co-presentation via a horizontal split, a vertical spit, or another suitable split in the display. The at least one processor may place an unfiltered representation of a board in one of the splits in the display and place the filtered representation of the item interface extrapolator in the other split of the display. The unfiltered representation of the board may be a table with a plurality of items containing data related to one or more particular items. The filtered representation of the item interface extrapolator may be a timeline of data related the particular items where a filter selection may have been executed by a user.

FIG. 164 illustrates an exemplary view of a co-presentation to reflect an unfiltered representation of a board and a filtered representation of an item interface extrapolator upon receipt of a filter selection, consistent with some embodiments of the present disclosure. As illustrated in FIG. 164, a co-presentation 16400 may be displayed by the at least one processor with a split 16402, a filtered representation of an item interface extrapolator 16404 located above the split 16402, and an unfiltered representation of a board 16406 located below the split 16402. The unfiltered representation of the particular board 16406 may be a table containing data associated with two boards (a particular board—"Board 1"—and another board—"Board 2"). The filtered representation of the item interface extrapolator 16404 may be, for example, a Gantt chart showing the due dates from the data in the particular item associated with "Board 1" and "Board 2" in the table of the unfiltered representation of the board 16406. The filtered representation of the item interface extrapolator 16404 may contain a filter 16408 containing a plurality of drop-down menus. A filter selection 16410 made by a user may be received by the at least one processor to display timelines in the Gantt chart according to color codes associated with data associated with the particular item including "Board 2."

Some disclosed embodiments may involve the filtered representation being limited by a time period. A time period may refer any metric of time such as a period by minutes, hours, days, weeks, months, years, or any combination thereof. For example, the at least one processor may limit the data displayed in the filtered representation of the item interface extrapolator by weeks such that the timeline may display tasks by weeks in a given month.

By way of example, FIG. 164 illustrates the co-presentation 16400 having the filtered representation of the item interface extrapolator 16404. The at least one processor may display the filtered representation of the item interface extrapolator 16404 based on a selection 16412 to limit the display of time on the timeline by "Days."

FIG. 165 illustrates exemplary block diagram for an exemplary method for a data extraction and mapping system, consistent with some embodiments of the present disclosure. Method 16500, as shown in FIG. 165, with block 16502 may maintain a board with a plurality of items, each item defined by a row of cells, and wherein each cell may be configured to contain data and is associated with a column heading, as previously discussed. At block 16504, method 16500 may link at least a first column to at least a second column so that a change in data in a cell of the at least first column may cause a change in data of a cell in the at least second column, as described previously above. At block 16506, method 16500 may receive a first selection of a particular item from the board, wherein the particular item may include a plurality of cells with data in each cell, and wherein data in a first cell of the plurality of cells may be linked to data in a second cell of the plurality of cells, as previously discussed. At block 16508, method 16500 may, upon receipt of the first selection, cause a display of an item interface extrapolator, wherein the item interface extrapolator may include a plurality of activatable elements, each of the activatable elements being associated with a differing visualization of at least some of the data contained in cells associated with the particular item, as previously discussed. At block 16510, method 16500 may receive a second selection of one of the activatable elements, as discussed previously. At block 16512, method 16500 may, upon receipt of the second selection, cause a first extrapolated display of data associated with the particular item to appear in a first manner, as previously discussed. At block 16514, method 16500 may receive a third selection of another of the activatable elements, as previously discussed. At block 16516, method 16500 may, upon receipt of the third selection, cause a second extrapolated display of data associated with the particular item to appear in a second manner, consistent with the disclosure discussed above.

As previously discussed, there may be an unmet need for collaborative file sharing in a collaborative work environment, regardless of whether teams are working remotely or in an office setting. Some aspects of the present disclosure provides unconventional ways of providing such collaborative file sharing using a workflow management system which maintains an electronic whiteboard for storing and sharing files. Conventional approaches may be too rigid and might not encourage collaboration due to inefficiencies in transmitting and storing files across multiple accounts.

As a result, there is a need for unconventional approaches to enable entities to store and share digital files on an electronic whiteboard and associate the digital files to elements of a workflow management system through the techniques disclosed herein involving a table, an electronic whiteboard, a data structure containing links, receiving an activation of a link corresponding to an asset of the table, altering a display to present a location on the electronic whiteboard associated with the asset, receiving a selection of one of an asset designation corresponding or related to the asset, retrieving the asset corresponding to the selected asset designation, and causing the corresponding asset to be presented on the display.

Some embodiments of this disclosure may provide a technical solution to the challenging technical problem of data management and may relate to a workflow management system having an integrated unified filing engine, the system having at least one processor, such as the various processors, processing circuitry, or other processing structure described herein. Such solutions may be employed in collaborative work systems, including methods, systems, devices, and computer-readable media. For ease of discussion, references below to systems, methods, or computer readable media apply equally to all. For example, the discussion of functionality provided in a system is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. in a broadest sense, the example methods are not limited to particular physical or electronic instrumentalities but rather may be accomplished using many different instrumentalities.

Aspects of some embodiments of this disclosure may be related to workflow, which in one sense may refer to a series of tasks or sub-functions electronically monitored, and collectively directed to completing an operation. In other instances, a workflow may involve an orchestrated and repeatable combination of tasks, data (e.g., columns, rows, boards, dashboards, solutions), activities, or guidelines that make up a process. By way of example, a workflow management system may utilize software that enables members of a team to cooperate via a common online platform (e.g., a website) by providing interconnected boards and communication integrations embedded in each of the interconnected boards. In the workflow management system, the system may provide workflows that enable automatic updates to a common dashboard that is shared among multiple client devices, and provide varying visualizations of information to enable teams to understand their performance and milestones.

An integrated unified filing engine may refer to a software functionality block for consolidating one or more digital files associated with one or more entities in a collective data store, the one or more digital files having various parts or attributes linked or coordinated. The one or more digital files may include a text, programming language, video, presentation, audio, image, design, document, spreadsheet, tabular, virtual machine, a link or shortcut, an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, or any other type of file which may be stored in a database.

By way of example, FIG. 166 illustrates one example of an electronic whiteboard 16600 corresponding to an integrated unified filing engine. Electronic whiteboard 16600 may include one or more digital files associated with one or more entities, as discussed in greater detail below.

Consistent with some disclosed embodiments, the at least one processor may be configured to maintain at least one table of the workflow management system, the at least one table containing a plurality of items and a plurality of asset designations, each asset designation being associated with at least one of the plurality of items. A table of the workflow management system, in some instances, may include a data object with rows, columns, and cells at the intersections of the rows and columns that may contain data. A table may include any information such as items defining objects or entities that may be managed in a platform, the objects or entities presented in rows and columns defining cells in which data is contained, as described in greater detail below. Maintaining the table may refer to keeping the table in an existing or operating state and storing it in a repository. Additionally or alternatively, maintaining the table may refer to modifying the workflow table to correct faults or to improve performance or other attributes. Items may refer to one or more users, entities, associated or grouped entity (e.g., a group of users), property addresses, digital files, assets, and/or any object which may be stored in a row or column of a table. An asset designation may refer to an indication of whatever the at least one associated item may be. The indication may include an alphanumeric, graphic representation, or a combination thereof. For example, the indication may include a pdf icon, an image preview of a photograph, a string of numbers and letters, or any other symbol or piece of information which may be used to represent an item.

As an illustrative example, FIG. 167 depicts an exemplary table 16700 of a workflow management system containing a plurality of files 16702*a* to 16702*j* and corresponding file icons 16704*a* to 16704*j*, and a plurality of authors 16706*a* to 16706*d* and corresponding author icons 16708*a* to 16708*d*. The plurality of files 16702*a* to 16702*j* and authors 16706*a* to 16706*d* may be defined as items and the corresponding file icons 16704*a* to 16704*j* and author icons 16708*a* to 16708*d* may be defined as asset designations.

Consistent with some disclosed embodiments, the at least one processor may be configured to maintain at least one electronic whiteboard containing at least a subset of the plurality of asset designations. An electronic whiteboard may include a digital, visual workspace which may store information common to several users on which they may add files, annotate, draw, and otherwise edit the workspace. For example, an electronic whiteboard may store information in a visual space, such as by allowing multiple users to organize files into groups and place each group in a location of the space. A subset of the asset designations may include a part or all of the plurality of asset designations. For example, the at least one electronic whiteboard may contain a subset of the plurality of asset designations associated with one or more authors, owners, tasks or projects, items, subject matter, teams, deadlines, dates created, status, files, file types, file sizes, channels, metadata, labels, budgets, data sources, or any other appropriate grouping.

For example, FIG. 166 depicts electronic whiteboard 16600 containing a subset of the plurality of asset designations 16704*a* to 16704*j* of FIG. 167, represented as clusters 16602*a* to 16602*e*. Cluster 16602*a* represents a subset containing file icon 16704*a*; Cluster 16602*b* represents a subset containing file icons 16704*b* and 16704*c* corresponding to files 16704*b* and 16704*c* of FIG. 167; cluster 16602*c* represents a subset containing file icons corresponding to files 16704*i* and 16704*j* of FIG. 167; cluster 16602*d* represents a subset containing file icons corresponding to files 16704*g* and 16704*h* of FIG. 167; and cluster 16602*e* represents a subset containing file icons corresponding to files 16704*d* to 16704*f* of FIG. 167. In some embodiments, a file icon may include part of one or more clusters. An electronic whiteboard may also take different forms, as shown in the "Desktop" form of FIG. 166, the "List" form of FIG. 168, and the "Cards" form of FIG. 169 or any other presentation or format. These forms are merely exemplary and non-limiting. In some embodiments, the "Cards" form may include cards 16902*a* to 16902*g* and 16902*i* corresponding to files 16702*a* to 16702*g* and 16702*i* of FIG. 167. In other embodiments, each card may represent clusters 16602*a* to 16602*e*.

Consistent with some disclosed embodiments, the at least one processor may be configured to maintain a data structure containing a plurality of links, wherein each link associates at least one of the subsets of asset designations with at least one location on the at least one electronic whiteboard. A data structure may refer to a database or other system for organizing, managing, and storing a collection of data and relationships among them in a format which enables efficient access. A link may refer to any destination address which may include an address, hyperlink, inline link, anchor, or any other reference to data that an entity may activate to retrieve such data. For example, a link may point to an entire electronic whiteboard or to a specific element or location within the electronic whiteboard. A location on the at least one electronic whiteboard may refer to a particular area of the electronic whiteboard which may store items represented by asset designations. Items stored in a particular location may be grouped together based on one or more common attributes. For instance, items grouped in a same location may share a same author, owner, task or project, item, subject matter, team, deadline, date created, status, file, file type, file size, channel, metadata, label, budget, data source, or any other appropriate grouping.

As an illustrative example in FIG. 166, a data structure (not shown) may contain links associating clusters 16602*a* to 16602*e* to specific locations on electronic whiteboard 16600. Inspiration file 16704*a* in the electronic whiteboard 16600 may be associated with a link that may be activated by an input, such as a selection of the graphical icon depicting Inspiration file 16704*a*, to re-render a display to present the same Inspiration file 16702*a* of FIG. 167 in view 16700, or the same Inspiration file 16802*a* in the List form shown in FIG. 168, or the same Inspiration file 16902*a* in the Card form shown in FIG. 169. The same may occur to activate any of the Inspiration files of FIGS. 167 to 169 to re-render the display to present the Inspiration file 16704*a* in the electronic whiteboard 16600 of FIG. 166.

Consistent with some disclosed embodiments, the at least one processor may be configured to receive via a network access device having a display presenting the at least one table, an activation of a particular link associated with a particular asset. A network access device may include any computing device such as a mobile device, desktop, laptop, tablet, IOT, or any other device capable of accessing the system and receiving input from a user. A display may include an electronic device or part of an electronic device which may serve as the visual presentation of data. For example, a display may include a liquid crystal display (LCD), a light-emitting diode display (LED), a microLED, an electroluminescent display (ELD), an electrophoretic display, an active matrix organic light-emitting diode display (AMOLED), an organic light-emitting diode display (OLED), a quantum dot display (QD), a quantum light-emitting diode display (QLED), a vacuum florescent display (VFD), a digital light processing display (DLP), an interferometric modulator display (IMOD), a digital microshutter display (DMS), a plasma display, a neon display, a filament display, a surface-conduction electron-emitter display (SED), a field emission display (FED), Laser TV, a carbon nanotube display, a touch screen, projector, AR/VR lens, or any other suitable display for a network access device. Receiving an activation of a link may refer to receiving an input on an interface (e.g., mouse, keyboard, touchscreen) to indicate an intent to select or otherwise activate a link, or any other way of informing a device that an entity desires to reach an address associated with a link. A particular link may refer to one link among the plurality of links which an entity desires to activate. A particular asset may include one asset among the plurality of items which is associated with the particular link which the entity desires to activate.

By way of example, a link associated with a particular asset may be activated by a user through a network access device (not shown) presenting table 16700 of FIG. 167. For example, the user may click on file 16702*a* or file icon 16704*a* to activate a link associated with file 16702*a*, or may click on author 16706*a* or author icon 16708*a* to activate a link associated with author 16706*a*.

Consistent with some disclosed embodiments, in response to the activation of the particular link, the at least one processor may be configured to alter the display to present at least a particular location on the at least one electronic whiteboard containing a particular asset designation corresponding to the particular asset, wherein the particular location includes a cluster of additional asset designations related to the particular asset. Altering the display may refer to sending a signal to the network access device to cause the display to re-render and present different information, a different amount of information, or the same information in a different form, or any combination thereof. For example, if a network access device is displaying a table, altering the display may involve sending a signal to the network access device to cause the network access device to display the electronic whiteboard. The electronic whiteboard may take different forms, for example, it may resemble a whiteboard with scattered items or items grouped in clusters, a board with a plurality of cards, each card containing one or more grouped items, a list, a table, a timeline showing when each item was uploaded, or any other means of presenting files in a space. Presenting at least a particular location on the at least one electronic whiteboard may refer to causing the display to render an area of the at least one electronic whiteboard associated with the activated link, such as a zoomed in rendering of one part of the electronic whiteboard, or a zoomed out view of the entire electronic whiteboard. A particular asset designation may include an asset designation among the plurality of asset designations which is associated with the particular asset. For example, the particular asset may include a digital file, including at least one of a text, video, audio, image, design, document, tabular, an image file, a video file, a drawing file, a graphic file, a presentation file, project management file, a webpage, or any other digital file as described previously above with reference to the items. A particular location may include a cluster of additional asset designations related to the particular asset may include another group of one or more asset designations which may share one or more common attributes with the particular asset. A particular location of the at least one electronic whiteboard may present a single cluster of particular asset designations (e.g., files) associated with a particular asset (e.g., all files related to a common project), or the particular location may also present additional clusters that are related to the particular asset in a manner that may indicate an association between the clusters, such as by proximity, color coding, labeling, or any other indication. For instance, the cluster of additional asset designations may be based on at least one of an author, owner, task or project, item, subject matter, team, deadline, date created, status, file, file type, file size, channel, metadata, label, budget, data source, or any other appropriate attribute for grouping. This cluster of additional asset designations may, for example, be associated with a particular asset because of a common attribute of having a common author of the particular asset. As a result, the system may present a cluster of asset designations related to a particular asset (e.g., files related to a common project) and an additional cluster of asset designations that might not necessarily be related to the particular asset (e.g., files related to a different project) in a particular location because of the shared common attribute that both clusters are related to a common author.

Consistent with some disclosed embodiments, the at least one processor may be configured to receive a selection of at least one of the additional asset designations or the particular asset designation. Receiving a selection of at least one of the additional asset designations or the particular asset designation may refer to the at least one processor receiving, from an entity, a choice of one or more of the asset designations associated with the particular asset designation or the asset designation itself through an interface as described previously above. For example, the selection may be received by means of any of a keyboard, mouse, microphone, camera, touchpad, touchscreen, graphics tablet, scanner, switch, joystick, or any other appropriate input device. Receiving a selection may involve an entity preselecting an additional asset designation or the particular asset designation by clicking, hovering over with a cursor, or any other method of preselecting an item. Preselecting an asset designation may cause the at least one processor to provide the network access device with a preview of the asset associated with the preselected asset designation. The preview may include a facility for inspecting the appearance or the metadata of an item before it is retrieved.

In some embodiments, at least one of the additional asset designations of the cluster may be associated with a differing asset from the particular asset. For instance, in a cluster of a particular asset, such as a document of a project with additional asset designations (e.g., other files related to the same project), one of the additional asset designations may be associated with an asset different from the particular asset because the additional asset designations may be associated with multiple projects. In other embodiments, at least one of the additional asset designations of the cluster is activatable to access information of another table. For example, an additional asset designation may be associated with a table of the workflow management system different from the table the particular asset is associated to because the additional asset (e.g., a document) may be associated with projects of a first table and projects of a second table. In this example, an entity may activate said additional asset designation to cause the at least one processor to retrieve information of the different table.

By way of example, a user who is being presented cluster 16602*b* of electronic whiteboard 16600 of FIG. 166 may select one of file icons 16704*b* or 16704*c*. which may be associated or linked to the assets presented with asset designations 16704*b* or 16704*c* of FIG. 167 (which may be of another table). The at least one processor may receive the selection, e.g., of file icon 16603*b*. The user may select file icon 16603*b* by clicking on it with a mouse or using a touchscreen, or by any of the methods discussed.

In another example, a user may be presented with a table in view 16700 of FIG. 167. The user may select asset designation 16704*b* (e.g., the particular asset being a video file), which may be a link that may cause the system to re-render the display to present the electronic whiteboard 16600 of FIG. 166 and present the corresponding particular asset designation 16603*b* of the particular asset in a cluster 16602*b*, which contains an additional asset designation 16704*c* (e.g., an Excel file). While the additional asset designation 16704*c* may be associated with the particular asset and its designation 16704*b*, the additional asset designation 16704*c* may also be associated with a different asset, such as differing asset designation 16704*a* of FIG. 166. As such, the system may present the cluster 16602*b* in close proximity to a cluster containing differing asset designation 16602*a* to indicate a relationship between the two clusters in that particular location of the electronic whiteboard 16600.

In other embodiments, an entity may request to view metadata relating to each item. For example, a user may request to see one or more of a file name, file type, owner, author, date, number of items, status, version, tags, description or any other metadata relating to an item. The at least one processor may retrieve the metadata relating to each item and cause the network access device to present it to the entity, for example, by overlaying the metadata on top of or near the respective item. Additionally or alternatively, metadata may be presented to an entity when said entity selects an asset designation associated with an item.

In some embodiments, an entity may request to search, filter, and sort items. Searching for an item in the electronic whiteboard may involve inputting, by the entity, data which may allow the at least one processor to perform a search within the electronic whiteboard for one or more items associated with the data. Additionally or alternatively, items may be filtered and/or be sorted by attribute (e.g., author, owner, date, tag, status). Filtering may refer to the process of assessing items in order to select or remove one or more items from the plurality of items. Sorting may refer to the process of arranging items systematically by arranging items in a sequence ordered by some criterion, grouping items with similar properties, or providing any other arrangement of items. When searching, filtering, and/or sorting, the requesting entity may be provided with a view of the electronic whiteboard which includes a timeline. The timeline may include the asset designations associated with the search, filter, and/or sort item results ordered by when they were uploaded, when they were last modified, when they were last viewed, or any other ordering condition. The entity may then select one or more items from the timeline to be presented in another view, or may select one or more items for retrieval by the at least one processor.

For example, in response to the activation of a link associated with file 16702*a* of FIG. 167, the at least one processor may alter the display of a network access device to present the location associated with file 16702*a*, i.e., the location of cluster 16602*a* on electronic whiteboard 16600, which contains file icon 16704*a* corresponding to file 16702*a*. As another example, in response to the activation of a link associated with file 16704*b*, the at least one processor may alter the display to present the location of cluster 16602*b* on electronic whiteboard 16600, which contains file icon 16704*b* corresponding to file 16702*b*, and file icon 16704*c* corresponding to file 16702*c*. In this example, file icon 16704*c* may be related to file 16702*b* and a part of cluster 16602*b* because a user placed them together on electronic whiteboard 16600, because of semantic analysis performed by the at least one processor which recognizes "New York" in both file names, or for any other appropriate reason. Further, file icon 16704*c* may related to a table other than table 16700 and may be activatable to access information of this table. As yet another example, if a link associated with file 16704*d* is activated, the at least one processor may alter the display to present the location of cluster 16602*c* on electronic whiteboard 16600, which contains file icon 16704*d* corresponding to file 16702*d*, and file icon 16704*e* corresponding to file 16702*e*. In this example, file icon 16704*e* may be related to file 16702*d* and a part of cluster 16602*c* because the "Author" is the same for both, in this case, "Jerome Clay."

As an illustrative example, FIG. 170 depicts an exemplary electronic whiteboard 17000 where an entity may request to view metadata relating to each item. In this example, a user has selected to view the "File Name," "Num of items," "Status," and "Comments" for each item. The user may also select "File Type," "Author," "Date," "Version," "Tags," "File Size," and/or any other appropriate metadata related to the items. The selected metadata may be presented underneath the asset designation, such as with "File Name," "Num of items," and "Comments," overlaid over the asset designation, such as with "Status," or presented in any other way which may convey information about each file to an entity. Additionally or alternatively, all or some of the metadata may be presented to the entity after an item is selected.

Consistent with some disclosed embodiments, in response to the selection, the at least one processor may be configured to retrieve a corresponding asset. Retrieving a corresponding asset may refer to the at least one processor, based on the selection, locating and returning an asset or item associated with the selected additional asset designation or particular asset designation. The at least one processor may be configured to then cause the corresponding asset to be presented on the display. Causing the corresponding asset to be presented on the display may refer to sending a signal to the network access device to render the corresponding asset on the display. For example, in response to the selection of a particular asset and its designation in an electronic whiteboard, the system may retrieve the particular asset (e.g., a word document) and display the particular asset in its native format in a new window, pop-up, or in any other presentation.

Continuing the above example, after receiving the selection of file icon 16704*b*, the at least one processor may retrieve the file corresponding to file icon 16704*b*, i.e., file 16702*b*, and perform additional operations such as transmitting the file or presenting the file in its native format (not shown) on a display, projection, or lens of a network access device.

Consistent with some disclosed embodiments, the at least one processor may be further configured to receive an alteration to the presented corresponding asset, wherein the alteration causes sending a notification to an entity associated with the presented corresponding asset. Receiving an alteration to the presented corresponding asset may include receiving an input indication an instruction for addition, deletion, reassignment, rearrangement, renaming, or any other type of modification to the corresponding asset presented on the display via any interface such as through the network access device. Additionally or alternatively, the at least one processor may be further configured to receive an alteration to an asset designation or to a location on the electronic whiteboard. Notifications may be sent to the entity associated with the presented corresponding asset when certain an alteration or a certain action is made on an item of the electronic whiteboard. Sending a notification may include transmitting any alert such as a message, a graphical indication, an audio indication, or any combination thereof. For example, if a user were to merely open and view an item, the author of that item may receive a notification that the user has accessed the item, so that the author is made aware of any access or alterations made to the author's item. In this scenario, the system may send a notification to the author by sending a text message that the item has been accessed by another user. As another example, a user may alter a presented asset by annotating an item, asset designation, or a location on the electronic whiteboard with a note, and the message in the note may be sent directly to the author of that item through a notification. Similar annotations may include overlaid drawings, emoticons, images, or any other annotation which may be superimposed over an asset designation or location of the electronic whiteboard. In other embodiments, the note annotation may be sent as a message to all team members who are associated with the item. Notifications may also provide an entity with an updated location of the whiteboard and may show all the modifications that were made to the location since the entity was last provided the whiteboard. In some embodiments, the alteration may include an entity-specific tag which will directly notify this entity that they have been tagged on the corresponding asset regardless of whether they are associated to the corresponding asset.

As an illustrative example, FIG. 171 depicts exemplary alterations made to a location 17100 of electronic whiteboard 17100. In this example, a user has made alterations 17102*a* to 17102*c* to location 17100. Alteration 17102*a* may include a digital representation of a "sticky note" or any other textual annotation; alteration 17102*b* may include an arrow pointing to an area of location 17100; and alteration 17102*c* may include an addition of a shape or general highlighting of an area of location 17100 which a user wishes to bring attention to. In this example, alteration 17102*a* includes the message "@Eva Davis Look at this poster!!" which may cause the at least one processor to tag "Eva Davis" and automatically send her a notification. Following this example, FIG. 172 depicts exemplary notifications to an entity following alterations made to file 16702*e* (of FIG. 167 and FIG. 171) and annotations made to location 17100 of FIG. 171. In this example, the exemplary entity is receiving three notifications: notification 17202*a* pertaining to a change in the status of file 16702*e* made by author 16706*c*; notification 17202*b* pertaining to annotations 17102*a* to 17102*c* made by author 16706*c*; and notification 17202*c* pertaining to a change in the status of file 16702*e* made by author 16706*a*.

In some embodiments, the at least one processor may be further configured to receive an alteration to the presented corresponding asset, and wherein the alteration to the presented corresponding asset may cause the presented corresponding asset to be associated with another cluster of the electronic whiteboard. Causing the presented corresponding asset to be associated with another cluster of the electronic whiteboard may involve an entity modifying information or an attribute of the corresponding asset displayed on the network access device so that the presented corresponding asset may become associated with a different cluster of the electronic whiteboard. The alteration may cause the presented corresponding asset to be associated with the cluster it was already associated with and any number of additional clusters. For example, where the presented corresponding asset is a word document with text, a user may alter the word document to add information such as additional names or calendar dates. As a result of this alteration, the system may recognize the additional information to be associated with another cluster of the electronic whiteboard and store this association in a repository. Based on this new association, the system may re-render the clusters of the electronic whiteboard in a manner that may indicate an association between the cluster containing the presented corresponding asset and the another cluster in a manner that may indicate the association, such as through proximity, a color indication, a connected line, or any other indication. For example, an asset which is located in a first cluster grouped by author may receive an alteration from an entity so that it is also associated with a second cluster grouped by a deadline, and may appear on the electronic whiteboard as being in between both clusters, as part of the first cluster, as part of the second cluster, or any other logical location.

For example, the at least one processor may receive an alteration to file 16702*a* of FIG. 167, which may cause the corresponding designation of the file 16602*a* of FIG. 166 to be associated with cluster 16602*b* and may cause the asset designation for file 16802*a* to change its location on electronic whiteboard 16600 of FIG. 166 or electronic whiteboard 16700 of FIG. 167. In other embodiments, file 16702*a* may be associated with cluster 16602*b* but may remain in its current location on electronic whiteboard 16600.

Consistent with some disclosed embodiments, the at least one processor may be further configured to receive an alteration to the presented corresponding asset, and wherein the alteration to the presented corresponding asset may cause a simultaneous change to the at least one table and the at least one electronic whiteboard. Causing a simultaneous change to the at least one table and the electronic whiteboard may involve an entity providing an alteration to an asset, which may cause the at least one processor to transmit the alteration to the at least one table and the electronic whiteboard at the same time. For example, the alteration may involve annotating an asset designation on the electronic whiteboard (e.g., via a note, drawing, emoji, or other comment or illustration), making a change to the metadata, changing anything in the item (e.g., editing text, an entry in excel, an image, video, or other changes to an item), the alteration being carried throughout the system to the at least one table and the at least one electronic whiteboard at the same time. In some embodiments, the alteration may be made to a location or cluster of the electronic whiteboard and not to an asset itself. In other embodiments, following one or more alterations to an asset, the electronic whiteboard may store one or more versions of the asset. Here, an entity may request to view an older version of an asset, to revert an asset back to a previous version, compare versions to each other, track which entity has modified the asset at any time, and any other functionality that relates to editing or comparing one or more versions of an asset.

In some embodiments, the at least one processor may be further configured to receive selections of one or more items for storing on the electronic whiteboard. Items may be uploaded by transmitting data from a system to the workflow management system. An upload may be initiated by an entity using a network access device or automatically by a computerized system. Items may be uploaded via web browsers, FTP clients, terminals (e.g., SCP/SFTP), a cloud, or file sharing. Items may be uploaded by, for example, selecting files through a file explorer, dragging and dropping files into a space such as the electronic whiteboard, sending an email, posting on social media, clicking on a link, adding directly from a website (such as Google Docs, Dropbox, social media, or any other site where files may be stored) or any other suitable method for uploading files. When uploading files, the at least one processor may perform recognition processes on the files. For example, the at least one processor may scan an uploaded image to provide an entity with smart tags for a city the image was taken in (e.g., a smart tag of "New York," if the at least one processor recognizes the Brooklyn Bridge), scan a pdf to allow an entity to sign a document, provide a report on a file, or any other process which allows an entity to edit an item in any way before, during, or after it has been uploaded.

By way of example, FIG. 173 depicts an exemplary process for adding files to an electronic whiteboard 16600 of FIG. 166. In this example, the at least one processor may receive an indication that a user wishes to add a file to electronic whiteboard 16600 by receiving a selection or click to button 16604, which may prompt a file explorer 17300 to be presented to the user. Alternatively, the user may simply pull up file explorer 17300 themselves. File explorer 17300 may then be used by the user to add files to electronic whiteboard 16600. For example, the user may drag file icon 17304 onto electronic whiteboard 16600 to add file icon 17304 and corresponding file 17302 to electronic whiteboard 16600. As another example, a file may be added to electronic whiteboard 16600 by the method shown in FIG. 174, which depicts an exemplary process for adding files to electronic whiteboard 16600. In this example, the at least one processor may overlay a button 17402 on a file 17404 on a website. The at least one processor may receive a selection or click from a user to button 17402 indicating that the user wishes to add file 17404 to an electronic whiteboard. The at least one processor may then provide the user with interface 17406. The user may then utilize interface 17406 to provide details to the at least one processor, for example, through field 17408 the user may indicate which electronic whiteboard to save file 17404 to (i.e., electronic whiteboard 16600), through field 17410 the user may indicate which cluster to add file 17404 to, and through fields 17412 and 17414 the user may make alterations or add annotations to file 17404 before adding file 17404 to electronic whiteboard 16600.

In some embodiments, the at least one processor may be further configured to receive a request to provide a report on an item. For instance, a report may include how many entities have accessed the item, how long has each entity spent looking at the item, where in the item did each entity scroll or click.

FIG. 175 illustrates an exemplary process block diagram of a workflow management method 17500 having an integrated unified filing engine. The method may be implemented, for example, using a system including a processor, as previously described. To the extent specific details and examples were already discussed previously, they are not repeated with reference to FIG. 175. In this example, at block 17502 the processor may maintain at least one table of a workflow management system, the at least one table containing a plurality of items and a plurality of asset designations, each asset designation being associated with at least one of the plurality of items. At block 17504, the processor may maintain at least one electronic whiteboard containing at least a subset of the asset designations. At block 17506, the processor may maintain a data structure containing a plurality of links, wherein each link associates at least one of the subsets of asset designations with at least one location on the at least one electronic whiteboard. At block 17508, the processor may receive via a network access device having a display presenting the at least one table, an activation of a particular link associated with a particular asset. At block 17510, in response to the activation of the particular link, the processor may alter the display to present at least a particular location on the at least one electronic whiteboard containing a particular asset designation corresponding to the particular asset, wherein the particular location includes a cluster of additional asset designations related to the particular asset. At block 17512, the processor may receive a selection of at least one of the additional asset designations or the particular asset designation. At block 17514, in response to the selection, the processor may retrieve a corresponding asset. At block 17516, the processor may cause the corresponding asset to be presented on the display.

In enterprise messaging systems it may be beneficial to monitor, copy, store, and organize endless possible forms of communication in conjunction with a collaborative work system. Organizing and distributing communications across multiple user accounts can be burdensome when possible, communications may be continuous and ongoing across different platforms and services while shifting in frequency, medium, and subject matter. Additionally, communications may include or surround the exchange of or reference to documents or other work product. In some instances, a single communication may be relevant to multiple endeavors while in other instances a communication using one medium or service may be responsive to a communication received in another. Thus, there is a need for unconventional innovations for helping to ensure that communications are managed consistently and correctly.

Such unconventional approaches may enable computer systems to determine tools and functions that may be implemented to improve efficiency of project management software applications by improving processing times and storing of information contained in project management software applications in memory thereby reducing reliance on external databases. By providing tools and functionality unavailable in traditional messaging systems and platforms, a system may increase the efficiency and operations of workflow management functionality through aggregation, consolidation, and mediation of communications across platforms and subjects.

Aspects of some embodiments of this disclosure may relate to an enterprise messaging system for message mediation and verification. An enterprise messaging system may include a system, service, or other platform that may facilitate the exchange of communications between systems and/or devices. Examples of communications may include, but are not limited to, email, instant messaging (e.g., Slack), or text (e.g., SMS) messages. Message mediation may include matching incompatible protocols, data formats, and interaction patterns in order to match different capabilities across different systems, services, devices, or platforms. Message mediation may include transforming a message from one format to another, allowing reception and transmission of differing message formats. Message mediation may also include routing messages (sent or received) to one or more target destinations. For example, message mediation may direct a received email to an inbox as specified by an email address. Message verification may include establishing truth, accuracy, and/or validity of the source or contents of a message. Message verification may further include ensuring a message is sent, received, copied, or otherwise routed correctly. An enterprise messaging system may perform message mediation and verification using a central processor, a designated processor, one or more processors, or other suitable hardware.

An enterprise messaging system may be integrated with a collaborative work system. Integration may provide access to services or functionality of an enterprise messaging system from within a collaborative work system. For example, integrating an email service with a collaborative work system may allow messages to be sent, received, stored, and viewed using the collaborative work system environment. In further examples, integrating multiple enterprise messaging systems may also aggregation of differing message mediums in a single presentation.

Some disclosed embodiments may include maintaining a plurality of interconnected boards. Maintaining interconnected boards may include one or more boards that may share items, data, ownership, or other connections that may be stored in a repository. For example, a board of a first group may include names and contact information for multiple individuals. A different board may be interconnected to the first group if it includes or references any of the information contained in the first group. In another example, a board of the first group may have an owner or be maintained by a user. A board of the second group may be interconnected with the board of the first group if the board of the second group is maintained by the same user or by a user associated with the user (e.g., both users are members of the same organization or team). In some embodiments, maintaining a plurality of interconnected boards may include storing a form of each board or table, with vertical and/or horizontal row headers defining information to be contained in cells of such rows. Maintaining a plurality of interconnected boards may also include storing values associated with the cells of such rows. In some embodiments, maintaining a board may include one or more of saving, storing, recording, updating, tracking, counting, editing, viewing, displaying, aggregating, combining, or otherwise retaining in a repository information for representation in a board. A "board" or "table" may include those items described previously in connection with the term "tablature," and may include horizontal and vertical rows for presenting, displaying, or enabling access to information stored therein. A board or table may be presented on a screen associated with a computing device or any electronic device that displays or projects information on a surface or virtually as described previously above. An intersection of multiple rows (e.g., a horizontal row and a vertical row) may represent a cell. A cell may contain values, text, colors, graphics, symbols, gifs, memes, any combination thereof, or any other data.

In some embodiments a first group of at least some of the plurality of interconnected boards may include items that contain external contact addresses. For example, one or more boards may include an item or cell indicating or referencing (e.g., a hyperlink) an external contact address associated with a user or contact for routing communications to a specified destination (e.g., to an entity, to a device, to a physical address). An external contact address may include any combination of text, numbers, or symbols that can be used to identify a specific destination or user outside or independent of the interconnected boards such as but not limited to an email address, a phone number, a username, a mailing address, or an IP address.

In some embodiments a second group of at least some of the plurality of interconnected boards may omit external contact addresses. Some boards may include a reference to a user or contact without including the item or cell indicating or referencing an external contact address. In some instances, some boards may lack any associations to any external contact addresses in general. For example, where one or more boards associate an external contact address with a contact, other boards may refer to the contact without listing the external contact address. However, the contact remains associated with the external contact address even in a board where the external contact address is omitted due to the interconnection between the first group of boards (with an external contact address) and the second group of boards (which omit the external contact address). This may decrease or eliminate the need to duplicate external contact addresses across multiple boards, thus simplifying a network of boards and eliminating potential errors associated with manual or automatic reproduction of data.

For discussion purposes, FIG. 177 illustrates a plurality of exemplary interconnected boards 17700, 17725, and 17750. Board 17700 may be included in a first group of the plurality of interconnected boards as a board 17700 including email addresses 17704 in a vertical row or column under email address heading 17704. Board 17725 and board 17750 may be included in a second group of the plurality of interconnected boards because they do not include an email address.

Some disclosed embodiments may include monitoring, via a mediator overlay on an enterprise messaging system, contact addresses of incoming messages. An enterprise messaging system may include a processor, module, set of rules, process, or any defined software or hardware serving as a mediator overlay which formats and/or routes messages as described above. A mediator overlay may monitor communications or messages as they are sent to a destination (e.g., a mailbox or a board) within an enterprise messaging system. Monitoring contact addresses of incoming messages may include performing a lookup of author or recipient fields of a communications to make a determination of a contact address in an incoming message. The mediator overlay may monitor or identify a contact address of an incoming message. For example, a mediator overlay may identify an email address associated with a recipient of the incoming message. A mediator overlay may include a webhook, web callback, HTTP push API, or any other method that may provide information or data from other applications in real-time. For example, a mediator overlay may be linked or associated with an email inbox such that when a message is received by the inbox, the message or information associated with the message may also be delivered to or readable by the mediator overlay.

Some embodiments may include comparing a contact address of a specific incoming message against a repository of addresses associated with a first group of at least some of a plurality of interconnected boards. Contact addresses associated with one or more boards (as part of the first group) may be stored in a repository, as disclosed previously. Individual contact addresses may be associated with a user, a contact, a board, or any other item or cell. When a mediator overlay identifies a contact address associated with a message, the contact address of that message may be compared against contact addresses stored in the repository. A contact address of each message may be compared, multiple contact addresses associated with the specific message may be compared, or no contact addresses associated with the specific message may be compared, according to system rules reflecting desired functionality or security settings.

In some embodiments, in response to a match between a specific contact address of an incoming message and at least one address contained in a repository, the at least one processor may generate at least one primary duplicate message of the specific incoming message. A duplicate message may include a copy or other replication of a message. Generating a duplicate message may include copying, duplicating, or replicating all properties and details of the original message such as metadata, hyperlinks, and formatting as well as coping, duplicating, or replicating attachments associated with the message. The duplicate message may be stored in a repository. The at least one primary duplicate message may be associated with each board of the first group of at least some of the plurality of interconnected boards. Each board of the first group of the interconnected boards may contain or be associated with the matching contact address, as described above. For example, when the contact address associated with an incoming message matches a contact address associated with a board, then that incoming message may be duplicated, stored, or otherwise associated with that board. In some embodiments, the incoming message may be duplicated once, and the duplicate may be associated with one or more boards each containing the matching external contact address. In other embodiments, a separate duplicate of the incoming message may be generated, stored, and associated with each board in the first group of interconnected boards containing the matching external contact address.

A "primary," "secondary," "tertiary," "quaternary," and so forth duplicate may refer to a distinction between instances that duplicates may be generated via links between interconnected boards. In some embodiments, they may refer to a chronological order in which a duplicate or copy is generated. In further embodiments, a "primary," "secondary," "tertiary," "quaternary," and so forth duplicate may refer to a hierarchical copy of a message, reflecting the degree of separation between the first group (i.e., primary) of at least some of a plurality of interconnected boards which include external contact addresses and the delineated (i.e., secondary, tertiary, quaternary, and so forth) group of the at least some of the plurality of interconnected boards.

In some embodiments, an administrator or user may prevent or block a generation of duplicate messages based on preference or security settings. For example, a blacklist may be generated which may include external contact addresses such as email addresses or domain names. If the specific contact address of an incoming message matches an external contact address on the blacklist, then a duplicate message will not be generated.

Some disclosed embodiments may further include determining for each of the boards of the first group having at least one primary duplicate message associated therewith at least one linked board of the second group. Due to the interconnectivity between boards, a board of the first group may be linked to one or more boards in the second group. A link between one or more boards may include any connection, overlap, or association between data contained in or associated with a board of the first group and one or more boards of the second group such as but not limited to a shared item, common board ownership, or a common domain name associated with users associated with the one or more boards. Determining at least one linked board of the second group for each of the boards of the first group having at least one primary duplicated message may include the system carrying out an analysis of links between boards of the first and second groups to determine at least one linked board of the second group based on one or more of the links. In one example, a link between one or more boards of the first group and one or more boards of the second group may include a shared item or data included in both a horizontal or vertical row in the one or more boards of the first group and in a horizontal or vertical row in the second group of boards. A link between a board of the first group having at least one primary duplicate message associated therewith and a board of the second group may be determined by comparing data associated with the board of the first group or items contained within the board of the first group with data associated with boards of the second group or items contained with the boards of the second group. A link may be determined when data associated with the board of the first group or items contained within the board of the first group matches or overlaps with data associated with boards of the second group or items contained with the boards of the second group. Multiple links may be determined between a board of the first group and a board in the second group. Additionally or alternatively, links between a board of the first group and multiple boards in the second group may be determined. Links between a board of the first group and multiple boards in the second group may be based on the same or different matching or overlapping data (e.g., the link between the board of the first group and a first board of the second group may be based on both boards having the same owner while the link between the board of the first group and a second board of the second group may be based on the same item appearing in both boards). For example, a board in the first group may identify a specific user associated with the external contact address by a first name, surname, username, title, picture, or any other identifier as discussed previously. A board in the second group may be linked to the board of the first group by including the identifier associated with the specific user without including the external contact address associated with the specific user.

Referring to FIG. 177, a link between board 17700 of a first group and board 17725 of a second group may be determined based on the inclusion of names 17702 from board 17700 as individuals assigned 17728 to a task 17726 in board 17725.

As another example, a board in the first group may be owned or generated by a user associated with an email address indicating a domain name. A board in the second group may be linked with the board in the first group because it is owned or generated by the same user. Additionally or alternatively, in this example, the board in the second group may be linked with the board in the first group because a user associated with the board in the second group may be associated with the same domain name as the user associated with the board in the second group (e.g., the email addresses associated with both users share a domain name).

Some embodiments may include generating for the at least one linked board of the second group at least one secondary duplicate message of the specific incoming message. Generating a secondary duplicate message may include generating an additional copy or other replication of the incoming message in addition to a first, previous, or primary duplicate of the incoming message. Additionally or alternatively, a secondary duplicate may be generated by copying, duplicating, or replicating a primary duplicate message of the incoming message. The secondary duplicate message may be stored in a repository. The system may associate the at least one secondary duplicate message with the at least one linked board of the second group. For example, when a message is received and a primary duplicate message may be generated, then a secondary duplicate message may be generated based on the link between the board of the first group and the board of the second group. In some embodiments, the message (incoming or outgoing) may be duplicated once, and the duplicate may be associated with one or more boards of the second group. In other embodiments, a separate duplicate of the message (incoming or outgoing) may be generated, stored, and associated with each board in the second group of interconnected boards.

Some disclosed embodiments may include determining for each of the boards of a second group having at least one secondary duplicate message associated therewith at least one linked board of a third group of at least some of the plurality of interconnected boards. Interconnected boards may facilitate multiple links between a board or group of boards which may be further interconnected with additional boards or groups of boards. A link between one or more boards may include any connection, overlap, or association between data associated with a board of the second group and one or more boards of a third group, as previously discussed above. A link may be determined when data associated with the board of the third group or items contained within the board of the third group matches or overlaps with data associated with boards of the second group or items contained with the boards of the second group. A link between the board of the third group and the board of the second group may be based on matching the same type or field of data that is the basis for the link between the board of the second group and the board of the first group. Additionally or alternatively, a link between the board of the third group and the board of the second group may be based on matching a different type or field of data that may be the basis for the link between the board of the second group and the board of the first group.

For example, data such as an external contact address, first name, surname, username, title, picture or graphical data, company, or other information as disclosed previously may be associated with a board in the first group. A link between a board in the second group and the board in the first group may be determined based on matching data associated with the specific user with data associated with the board of the second group (e.g., username) wherein the data associated with the board of the second group does not include the external contact address associated with the specific user.

Referring to FIG. 176 and FIG. 177, board 17700 may be included in a first group of boards 17608 because an email address 17704 (e.g., external email address) is associated with an item in board 17700. Board 17725 and board 17750 of FIG. 177 may be included in a second group of boards 17612*a* (FIG. 176) because they do not contain (e.g., omit) an email address or any other external contact address. Mediator 17606 of FIG. 176 may monitor mailbox 176054 and determine an email address 17704 (of FIG. 177) associated with incoming message 17604. A duplicate message of message 17602 may be generated and associated with board 17700. A link 17610*a* may be determined between board (e.g., board 17725 of FIG. 177) from a second group of boards 17612*a* and board (e.g., board 17700 of FIG. 177) from a first group of boards 17608 based on a determination of a link based on a shared "Ralph" item 17702*a* in board 17700 and item 17728*a* associated with Ralph in board 17725. Based on a link 17610, another duplicate message of message 17602 may be generated and associated with board 17725. A link may be determined between board 17750 from a third group of boards (not shown) and board 17725 from the second group of boards 17612*a* based on the shared "Task #4" item 17726*d* in board 17725 and item 17752*a* in board 17750. Based on the link between board 17725 and board 17750, a further duplicate message of message 17602 may be generated and associated with board 17750.

In an alternative example, link 17610*b* may be determined between board 17750 from a second group of boards 17612*b* and board 17700 from a first group of boards 17608 based on common board ownership (not shown) of board 17700 and board 17750. For example, a user (Sam) 17702*c* associated with an external contact address 17704*c* may have generated and thus, own board 17750. When a contact address associated with an incoming message 17602 includes "sam@email.com," then a primary duplicate of message 17602 may be generated and associated with board 17700 based on the match between the contact address associated with an incoming message 17602 and the email address 17704*c* in a repository. A secondary duplicate of message 17602 may be generated and associated with board 17750 based on the link between the owner of board 17750 in the second group of boards 17612*b* and the email address 17704*c* in board 17700 from the first group of boards 17608.

Some disclosed embodiments may include generating for the at least one linked board of the third group at least one tertiary duplicate message of the specific incoming message. For example, when the contact address associated with an incoming message matches a contact address associated with a board of the first group which may be linked to a board of the second group, which may also be linked to a board of the third group, then that incoming message may be duplicated, stored, and associated with a board of the third group. In some embodiments, the incoming or outgoing message may be duplicated once, and the duplicate may be associated with one or more boards of the third group. In other embodiments, a separate duplicate of the incoming or outgoing message may be generated, stored, and associated with each board in the third group of interconnected boards. The tertiary duplicate message may be stored in a repository such that the system may associate the at least one tertiary duplicate message with the at least one linked board of the third group, similar to the discussion regarding the secondary message above.

Some disclosed embodiments may include monitoring, via a mediator overlay, contact addresses of outgoing messages. A mediator overlay, as described previously above, may monitor communications or messages as they are sent using an enterprise messaging system. Outgoing messages may include any communications sent from the system to a third-party system. Additionally or alternatively, for messages originating from within the enterprise messaging system, the mediator overlay may determine, identify, and monitor a contact address associated with an outgoing message based on information available within the enterprise messaging system (e.g., via a composer or the outgoing message or outbox). For example, a mediator overlay may be linked or associated with a messaging account such that when a message is sent using the enterprise messaging system, the message or information associated with the message may be stored based on the mediator monitoring or identifying a contact address associated with an outgoing message. For instance, a mediator overlay may identify an email address associated with a recipient or an author of the outgoing message.

Some disclosed embodiments may include comparing a contact address of a specific outgoing message against a repository of addresses associated with a first group of at least some of a plurality of interconnected boards. Contact addresses associated with one or more boards may be stored in a repository, as discussed previously. Individual contact addresses may be associated with a user, a contact, a board, or any other item or cell. When a mediator overlay identifies a contact address associated an outgoing message, the contact address of that message may be compared against contact addresses stored in the repository.

Some disclosed embodiments may include, in response to a match between the contact address of the specific outgoing message and at least one address contained in the repository, generating at least one primary duplicate message of the specific outgoing message. Generating a duplicate message may include a copy or other replication of a message, as described previously above. Generating a duplicate message may include copying, duplicating, or replicating all properties and details of the original message such as metadata, hyperlinks, and formatting as well as coping, duplicating, or replicating attachments associated with the message, as described previously. The duplicate message may be stored in a repository and the system may associate the at least one primary duplicate message of the specific outgoing message with each board of the first group of at least some of the plurality of interconnected boards. For example, when the contact address associated with an outgoing message matches a contact address associated with a board, then that outgoing message may be duplicated, stored, and associated with that board. In some embodiments, the outgoing message may be duplicated once, and the duplicate may be associated with one or more boards each containing the matching external contact address. In other embodiments, a separate duplicate of the outgoing message may be generated, stored, and associated with each board in the first group of interconnected boards containing the matching external contact address.

Some disclosed embodiments may include determining for each of the boards of the first group having the at least one primary duplicate message of the specific outgoing message associated therewith at least one linked board of the second group. As previously discussed, interconnected boards may facilitate multiple links between a board or group of boards which may be further interconnected with additional boards or groups of boards. The system may similarly determine at least one linked board of the second group as previously discussed.

Referring to FIG. 176 and FIG. 177, board 17700 may be included in a first group of boards 17608 because an email address 17704 (e.g., external email address) is included an item in board 17700. Board 17725 and board 17750 may be included in a second group of boards 17612*c* because they do not contain an email address. Mediator 17606 may monitor messages originating in or sent from board 17700 in the first group of boards 17608 and determine an email address 17704 associated with outgoing message 17604. A duplicate message of message 17602 may be generated and associated with board 17700. A link 17610*c* may be determined between board 17725 from a second group of boards 17612*c* and board 17700 from a first group of boards 17608 based on the shared "Jordan" item 17702*d* in board 17700 and item 17728*d* in board 17725. Based on link 17610*c*, another duplicate message of message 17602 may be generated and associated with board 17725. A link may be determined between board 17750 from a third group of boards (not shown) and board 17725 from the second group of boards 17612*c* based on the shared "Task #4" item 17726*d* in board 17725 and item 17752*a* in board 17750. Based on the link between board 17725 and board 17750, a further duplicate message of message 17602 may be generated and associated with board 17750.

Some disclosed embodiments may include generating for the at least one linked board of the second group at least one secondary duplicate message of the specific outgoing message. Generating a secondary duplicate message may include generating an additional copy or other replication of the outgoing message in addition to a first, previous, or primary duplicate of the outgoing message. Additionally or alternatively, a secondary duplicate may be generated by copying, duplicating, or replicating a primary duplicate message of the outgoing message. The secondary duplicate message may be stored in a repository and the system may associate the at least one secondary duplicate of the outgoing message with at least one linked board of the second group as disclosed previously.

Some disclosed embodiments may include aggregating associated messages of at least one board of the first group in chronological order. Aggregating may include collecting, searching for, or otherwise locating and associating messages that are associated with a board with other messages that are also associated with the same board. Aggregated messages may be arranged in chronological order according to a timestamp associated with the message. A timestamp may be included with metadata associated with a message or generated by the enterprise messaging system upon receiving or sending the message.

Some disclosed embodiments may include, in response to an input, render a presentation of the aggregated associated messages. An input for rendering a presentation of the aggregated associated messages may include any input received from any interface (such as through an interaction via mouse, voice, touchscreen, or keyboard) which indicates an intent to display the associated aggregated messages on any display (e.g., a monitor, projector, AR/VR lens), as described previously above. Additionally or alternatively, the system may render a presentation of the associated aggregated messages in response to a trigger, such as when a new message is received and associated with the current board being presented. Rendering a presentation may include displaying, as part of a graphical user interface, a representation of aggregated messages such as a timeline, news feed, or notification center. The presentation may include all aggregated associated messages or a subset of the aggregated associated messages (e.g., messages from the last seven days or a certain number of messages) and, in response to further input, the presentation may include an additional or expanded subset or all of the aggregated associated messages. The presentation may represent individual messages using graphics, text, or a combination thereof. The presentation may include information about individual messages such as a subject, identity of a sender, identity of a recipient, a time received, content of the message, and any attachments associated with the individual message or group of messages. The presentation of the aggregated associated messages may display all available information associated with individual messages or require it may include a subset of the available information and, in response to further input, render a presentation of additional information.

In some embodiments, the system may filter the aggregated associated messages by at least one of an author, recipient, board owner, date, communication type, communication content, or board address. Filtering may include sorting, excluding, identifying (e.g., altering the presentation of aggregated associated messages associated with a specified aspect), or otherwise altering the display or arrangement of the aggregated associated messages based on a specified aspect. An author may include any entity (e.g., an account associated with an individual, team, company, or other entity) that may have generated and sent a message. A recipient may include any entity that may be intended to receive a message from an author. A board owner may include any entity that may be associated with a board and has administrative rights over the board. A date may include any metric of a day associated with a calendar, such as Gregorian or lunar calendar. A communication type may include a characteristic of a communication. In non-limiting examples, communication types may include audio, video, text, file attachments, email, instant message, or any combination thereof. Communication content may refer to the information contained within a communication that may include any information associated with varying communication types. A board address may include any indication of a destination that may lead to a particular board, such as a board identification number, an IP address, a URL, or any other address that may be associated with a board.

In some embodiments, the presentation may include additional items associated with a board. Items associated with a board may include attachments to messages associated with the board such as documents, spreadsheets, presentations, or photos. Additionally, items associated with a board may include messages sent using a separate enterprise messaging system or messaging platform. The items may be included in the presentation in addition to a relevant message or in the place of message. An item may be included in the presentation instead of an associated message if the body of the associated message is irrelevant such as where the message lacks content (e.g., an empty message body), where the message body is a form message or automatically generate content, or where the message simply refers to the item or attachment (e.g., "see attached").

In some embodiments, the system may add a quote or a quotation to the aggregated associated messaged in chronological order. In one example, an item may include a quote or invoice generated from within board and sent to an external email address. The quote may be included as the content (e.g., body) of a message or as an attachment and sent to an external email address. The presentation of aggregated associated messages may include the quote according to association of the quote with an individual message or may include the quote as an individual item and arrange the quote in chronological order with the messages based on a timestamp. The timestamp associated with the quote may refer to the time the quote was originally generated, the time the quote was last updated, the time the quote was sent (e.g., the timestamp of the message associated with the item), or a time from within the body of the quote such as a due date. In some embodiments, excerpts (keywords, summaries, etc.) from the board, such as, for example, messages or attachments from within the board.

Referring to FIG. 178, timeline 17800 is an exemplary presentation of messages and items associated with board 17725. In FIG. 178, each horizontal row represents a different message or item associated with board 17725. Messages and items are referred to by a subject 17802 associated with the message or item. The presentation also includes a recipient(s) 17804 of each message or item and an author 17806 of each message or item. Additionally, the exemplary presentation includes a date 17808 associated with each message or item. Here, the messages and items are presented in chronological order based on the date 17808, with the oldest message or item presented at the top and the most recently received message or item presented at the bottom. In an alternate embodiment, the most recently received message or item may be presented at the top, with the oldest message or item presented at the bottom. Presentation 17800 includes a quote item 17810. Quote 17810 may represent a message, an attachment to message such as a document, or both.

FIG. 179 is a block diagram illustrating an example process 17900 for message mediation and verification. Process 17900 may be performed by one or more processors. In some embodiments, a non-transitory computer readable medium may contain instructions that when executed by a processor cause the processor to perform process 17900. Process 17900 is not necessarily limited to the process blocks shown in FIG. 179 and any steps or processes of the various embodiments described throughout the present disclosure may be included in process 17900.

At block 17902, process 17900 may include maintaining a plurality of interconnected boards, consistent with some embodiments as described above.

At block 17904, process 17900 may include monitoring contact addresses of incoming messages, as previously discussed above.

At block 17906, process 17900 may include comparing a contact address of a specific incoming message against a repository of addresses associated with the first group of at least some of the plurality of interconnected boards, as previously discussed.

At block 17908, process 17900 may include, in response to a match between a specific contact address of an incoming message and at least one address contained in a repository, generating at least one primary duplicate message of the specific incoming message, as previously discussed.

At block 17910, process 17900 may include associating the primary duplicate message with each board in a first group of at least some of the plurality of interconnected boards, as previously discussed.

At block 17912, process 17900 may include determining for each of the boards of the first group having at least one primary duplicate message associated therewith at least one linked board of a second group, as previously discussed.

At block 17914, process 17900 may include generating for the at least one linked board of the second group at least one secondary duplicate message of the specific incoming message, as previously discussed above. Generating a secondary duplicate message may include generating an additional copy or other replication of the incoming message in addition to a first, previous, or primary duplicate of the incoming message. Additionally or alternatively, a secondary duplicate may be generated by copying, duplicating, or replicating a primary duplicate message of the incoming message. The secondary duplicate message may be stored in a repository.

At block 17916, process 17900 may include associating the at least one secondary duplicate message with the at least one linked board of the second group, as previously discussed.

As previously discussed, there is an unmet need for ensuring that all entities which should receive a communication are included in a recipient field of a communication in collaborative work environments. Some embodiments of the present disclosure provide unconventional ways of ensuring such inclusion, using an integrated enterprise messaging system that auto-populates recipient fields based on context of source content. Conventional approaches tend to be overly reliant on users remembering who the intended recipients of a communication are, which leaves room for error.

As a result, there is a need for unconventional approaches to auto-populate recipient fields based on the context of source content through some techniques disclosed involving a plurality of boards related to a common entity, receiving an indication of an intent to send a communication, rendering a communication interface, performing a look up of a subset of the plurality of boards, retrieving external addresses from the subset, populating the communication interface with the retrieved external addresses, causing the communication to be transmitted, and linking the transmitted communication to at least one board of the plurality of boards.

Aspects of some embodiments of this disclosure may provide a technical solution to the challenging technical problem of online communications and may relate to an enterprise messaging system for auto-populating recipient fields based on context of source content, the enterprise messaging system having at least one processor, such as the various processors, processing circuitry, or other processing structure described herein. Such solutions may be employed in collaborative work systems, including methods, systems, devices, and computer-readable media. For ease of discussion, references below to systems, methods, or computer readable media apply equally to all. For example, the discussion of functionality provided in a system is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. in a broadest sense, the example methods are not limited to particular physical or electronic instrumentalities but rather may be accomplished using many different instrumentalities.

Aspects of some embodiments of this disclosure may be related to enterprise messaging, which may refer to a set of standards extending throughout one or more entities (e.g., businesses, companies, universities, or any other organizations) that may enable the one or more entities to send communications between computer systems. Auto-populating may refer to the at least one processor adding data to a previously empty or incomplete section of a communication, form, document, webpage, graph, or any other appropriate interface. Auto-populating may occur automatically, following a determination by the at least one processor, or following the reception of an input. A recipient field may refer to a particular area associated with a communication interface which may contain one or more identifiers related to one or more entities which are on the receiving end of a communication. A context of source content may refer to the objects or entities surrounding or associated with a piece of data which may be used by the at least one processor to make a determination including, for example, subject matter of the source content, key words in the source content, and so on. For example, where a piece of data may include an email address under a column heading of "co-worker contact," the system may infer that all of the email addresses contained in that column pertains to co-workers in relation to the owner or author of the board containing that column. In another example, the context may be inferred from other parts of the board such as other columns that may include telephone numbers. Based on the telephone numbers, the system may infer that the area codes associated with those telephone numbers are associated with a geographical area and also infer geographical information from the telephone numbers in relation to external contact information in another column of a board.

By way of example, an enterprise messaging system may involve utilizing a board 18000 of FIG. 180 and related boards 18102*a* to 18102*d* of FIG. 181 to populate one or more recipient fields of a communication interface such as recipient field 18202 of communication interface 18200 of FIG. 182.

Some disclosed embodiments may involve maintaining a plurality of boards related to a common entity, wherein each board of the plurality of boards includes differing external addresses. A board in some instances may refer to an arrangement of data presented, for example, in horizontal and vertical rows (e.g., horizontal rows and vertical columns) with cells at the intersections of the horizontal and vertical rows or columns that may contain information. For instance, a board may include items defining objects or entities that may be managed in a platform, the objects or entities presented in rows and columns defining cells in which data is contained, as described in greater detail below. Maintaining a plurality of boards may refer to storing or otherwise retaining the plurality of boards and/or its underlying data in a repository. For example, the plurality of boards may be kept in an existing or operating state in a repository containing a data structure located locally or remotely. Additionally or alternatively, maintaining the plurality of boards may refer to modifying the plurality of boards to correct faults, to improve performance, functionality, capabilities, or other attributes, to optimize, to delete obsolete capabilities, and/or to change the workflow in any other way once it is already in operation. A plurality of boards related to a common entity may refer to two or more boards which are associated with an account, which may be associated with any entity such as at least one individual or organization. An external address may include an email address, a name, a physical address, a phone number, or any other identifier which may be used to establish communication with an entity. Differing external addresses may be associated with different entities, or differing external addresses may be different external addresses associated with a common entity (e.g., an individual with multiple email accounts in different domains).

As an example, FIG. 180 depicts an exemplary board 18000 including name cells 18002*a* to 18002*c* (associated with Damon Massey, Ayisha Burks, and Herbert Swan) and contact cells 18004*a* to 18004*c* (associated with damon.massey@comp1.com and a.burks@outlook.com, with empty cell 18004*c* being blank) which may be capable of containing external addresses. Board 18000 may be related to other boards such as one or more of boards 18102*a* to 18102*d* of FIG. 181. For example, board 18000 may be related to boards 18102*b* and 18102*c* because they are related to a common entity, in this case "Comp1." Similarly, board 18000 may be related to board 18102*a* because the at least one processor determines that context surrounding "Herbert Swan" relates him to being an employee of "Company 2," and board 18102*a* is also related to "Company2" because it contains external addresses containing "@comp2.com" for the domain name. As another example, the at least one processor may perform semantic analysis on the plurality of boards 18000 and 18102*a* to 18102*d* to determine that boards 18000 and 18102*d* are related because the external address "a.burks@outlook.com" of board 18000 is in the same format (e.g., same domain name of "@outlook.com" or any other format) as the external addresses of board 18102*d*.

Some disclosed embodiments may involve receiving an indication of an intent to send a communication, the indication originating from a specific board of the plurality of boards. Receiving an indication may refer to the at least one processor receiving a command or signal through any interface such as a mouse, keyboard, touchscreen, microphone, webcam, softcam, touchpad, trackpad, image scanner, trackball, or any other input device. Receiving an indication of an intent to send a communication may refer to an entity providing an input to a system via any interface to inform or instruct the at least one processor that they wish to transmit a communication (e.g., any information, a file, text message, audio message, or any other communication). The indication may originate from a specific board of the plurality of boards may the system receiving a command or signal as a result of an interaction with an element of one of the boards of the plurality of boards (e.g., an indication of an intent to send a communication via an input). For example, a user through a network access device may click on a cell of the specific containing an entity identifier to indicate their intent to send a communication to the entity associated with the entity identifier. In some embodiments, receiving an indication of an intent to send the communication may include an activation of a link associated with an item in the specific board. For example, a cell may contain a link that may be activated as a result of selecting the cell. In another example, a cell containing a recipient's name may be selected, which may result in the activation of a link associated with the selected cell (e.g., another cell in the same row) that may contain the recipient's contact address. A link may refer to any destination address which may include an address, hyperlink, inline link, anchor, or any other reference to data that an entity may activate to retrieve such data. Activation of the link may be carried out in response to receiving an indication of an intent to send a communication, as described previously. For example, activation of a link may involve receiving an input of a selection of a cell of a board, where the cell contains a link that is activated upon selection. An activation of a link may refer to clicking on a link (e.g., a single-click, double-click, right-click, or any other type of click) with a mouse, touchpad, touchscreen, joystick, keyboard (e.g., shift+click or a command), or any other way of informing a device that an entity desires to reach an address associated with a link. For example, activating a link may indicate to the at least one processor that an entity wishes to establish communication with another entity associated to the link. An item may refer to one or more users, entities, associated or grouped entity (e.g., a group of users), property addresses, digital files, assets, and/or any object which may be stored digitally. A link may be associated with an item in a board by containing a link in a cell associated with an item (e.g., a cell containing a link in the same row or column as an item). Other information associated with an item may also contain links, such as through an item heading, a graphical indication depicting a person, or any other information that may be contained in cells.

As an illustrative example, a user viewing board 18000 of FIG. 180 may indicate their intent to send a communication by activating an element of board 18000. For instance, the user may click on one of a name or contact to indicate their intent of sending a communication. As another example, the user may click on a link associated with one of the entities of board 18000 board (e.g., one of contact cells 18004*a* to 18004*c* of FIG. 180). The link may be the names contained in name cells 18002*a* to 18002*c* and/or the external addresses contained in contact cells 18004*a* to 18004*c* or may be contained in additional cells of the board (not shown). In other embodiments, clicking on one of a name, contact, or other may cause the at least one processor to present an interface to the user, which may then be used by the user to indicate their intent to send a communication via a different link, button, or other appropriate object to receive an input.

Some disclosed embodiments may involve, in response to receiving the indication, rendering a communication interface associated with the specific board. A communication interface associated with the specific board may refer to a user interface for generating and configuring communications. Rendering a communication interface may include providing the communication interface to the entity by outputting one or more signals configured to result in the presentation of the communication interface on a screen, other surface, through a projection, or in a virtual space. This may occur, for example, on one or more of a touchscreen, monitor, AR or VR display, or any other means as previously discussed and discussed below. A communication interface may be presented, for example, via a display screen associated with a computing device such as a PC, laptop, tablet, projector, cell phone, or personal wearable device. A communication interface may also be presented virtually through AR or VR glasses, or through a holographic display. Other mechanisms of presenting may also be used to enable a user to visually comprehend the presented information. The communication interface may appear as a new window, as a pop-up, or in other manner for presenting the interface on a device. In some embodiments, the at least one processor may be configured to render the communication interface associated with the specific board in a co-presentation with the specific board, which may refer to outputting the communication interface at the same time as the specific board in a display or any other visualization such that both the communication interface and the specific board may be presented simultaneously.

For example, FIG. 182 depicts communication interface 18200. Communication interface 18200 may include a recipient field 18202 (that may be populated by, for example, additional retrieved external addresses 18204*a* to 18204*e*) and message field 18206. The at least one processor may, in response to receiving an indication to send a communication from a user from a board (e.g., clicking on cell 18002*a* of FIG. 180 containing "Damon Massey"), render communication interface 18200 to the user through a screen that my initially populate some information based on the indication to send the communication (e.g., information such as the contact address for "Damon Massey" because the cell 18002*a* of FIG. 180 was selected). Communication interface 18200 may be associated with board 18000 such that communication interface 18200 may be provided to the user when the user interacts with an element of board 18000. Communication interface 18200 may be provided to the user on its own or may be rendered in a co-presentation with board 18000.

Some disclosed embodiments may involve performing a look up of a subset of the plurality of boards linked to the specific board. A subset of the plurality of boards linked to the specific board may include a part or all of the plurality of boards which are associated with the specific board. For example, for a specific board associated with an entity 'X', a subset of the plurality of boards linked to the specific board may include the boards associated with the entity 'X'. Performing a look up of a subset of boards may refer to the at least one processor identifying and accessing the subset of boards which may be linked or otherwise associated with the specific board. In some embodiments, performing the look up of the subset of the plurality of boards linked to the specific board may be based on an activated link in the specific board. For instance, the link activated by an entity wishing to establish communication, as previously described, may provide characteristics (e.g., a name associated with the link, an IP address, a project name, or any other identifiable attribute associated with the link) that the system may use to identify the subset of the plurality of boards. As an example, a cell of a table may contain a name "Damon Massey" which may also be an activatable link to retrieve contact information associated with "Damon Massey." As a result of activating the link, the system may use the attribute of the name "Damon Massey" to perform a look up for this name in other boards that may be associated with the table containing the cell.

By way of example, the at least one processor may perform a look up of a subset of boards 18102*a* to 18102*d* in FIG. 181. The subset may be based on the activated link in the specific board 18000. For instance, if a user activates a link associated with "Damon Massey" in board 18000, the at least one processor may perform a look up of boards 18102*a* to 18102*d* to determine a subset of boards 18102*b* and 18102*c*. This determination may be based on the fact that this subset of boards 18102*b* and 18102*c* include relevant information to the activated link associated with "damon.massey@comp1.com" and because these boards contain information to related to "Damon Massey" and contact addresses with a common domain name "@comp1.com." As another example, if the user activates a link associated with "Ayisha Burks," the at least one processor may perform a look up and determine board 18102*d* to be the subset of the plurality of boards, since this board 18102*d* and "Ayisha Burks" may be associated with "Company3" through metadata not shown in FIG. 181.

Some disclosed embodiments may involve retrieving external addresses from each of the subset of the plurality of boards, which may refer to fetching one or more external addresses from each board of the subset of boards linked to the specific board. For example, for a subset of boards linked to a specific board because they are all related to a same company, e.g., Company 1, the at least one processor may retrieve email addresses found in the boards that have been determined to be a part of the subset of the plurality of boards.

In some embodiments, performing the look up of a subset of the plurality of boards may include performing semantic analysis on at least one cell of the specific board, performing semantic analysis on a plurality of cells of the plurality of boards, and retrieving the external addresses may be based on a connection between the semantic analysis of the specific board and the semantic analysis of the plurality of boards. Semantic analysis may include but is not limited to an analysis of a board, digital file, webpage, or any other form which may store external addresses, which may interrogate and analyze syntactic structures, from the levels of words, phrases, clauses, sentences, and paragraphs to the writing as a whole, in order to derive meaning from words. In particular, semantic analysis may be performed on at least one cell of the specific board and on a plurality of cells of the plurality of boards to identify and retrieve external addresses which may be appropriate for the entity wishing to establish communication. For example, semantic analysis may be performed on the cells in a row clicked on by a person 'A' to establish that person 'A' wishes to establish communication with a real estate broker from Atlanta, Ga. The at least one processor may then perform semantic analysis on a plurality of cells of the plurality of boards to determine whether there are more external addresses for real estate brokers in Atlanta that person 'A' may also wish to send the communication to. In this example, retrieving external addresses from each of the subset of the plurality of boards may be based on the connection between the semantic analysis of the specific board and the semantic analysis of the plurality of boards, namely, real estate brokers in Atlanta.

In some other embodiments, the at least one processor may be further configured to retrieve external addresses from each of the subset of the plurality of boards based on a context including at least one of a column heading, common characteristics between the specific board and at least one board of the subset of the plurality of boards, a common domain, an address, or a name. Retrieving external addresses based on a context may refer to retrieving specific external addresses based on information related to the indication of intent to send a communication. For example, the context may be based on associated information with the activated link, as previously discussed, which may include a column heading, common characteristics between one or more boards, a common domain, an address, and/or a name. For example, external addresses may be retrieved based on a column heading named 'Veterinarians', which may indicate to the at least one processor that a user is attempting to contact a veterinarian, leading it to retrieve external addresses related to veterinarians from other boards of the subset of the plurality of boards. Additionally, in this example the at least one processor may consider the location of the veterinarians (through an address found in the board or an online look up of each veterinarian), the domain of the external address associated with the veterinarian (e.g., to identify other employees of the same clinic), the name of the veterinarian clinic (e.g., also to identify other employees of the same clinic), and any other factor which may be useful when determining which external addresses to retrieve.

Continuing the above example, if a user has activated a link associated with "Damon Massey," and the at least one processor has performed a look up of a plurality of boards and determined a subset of the boards to include boards 18102*b* and 18102*c* of FIG. 181 because of the name "Damon Massey" and because of a shared contact address domain name "@comp1.com." As a result, the at least one processor may retrieve external addresses from boards 18102*b* and 18102*c*. The retrieved external addresses may be associated with the activated link, for example, because of the common name and domain name in the contact address, but may also be retrieved based on other context as discussed above. For example, the at least one processor may perform semantic analysis on one or more cells of board 18000 associated with the activated link and on a plurality of cells of boards 18102*b* and 18102*c* (e.g., the "Name" cells, the "Contact" cells or other cells not shown, such as "Organization," "Location," "Date Added" cells, or any other cells which may provide information on an associated with the entity associated with the activated link). The at least one processor may then retrieve the external addresses based on a connection between the semantic analysis of board 18000 and boards 18102*b* and 18102*c*. For instance, the at least one processor may retrieve external addresses based on identifying the domain "@comp1.com" in cell 18004*a* of board 18000 and in certain "Contact" cells of boards 18102*b* and 18102*c*.

Some disclosed embodiments may involve populating the communication interface with the communication and the retrieved external addresses, which may refer to the at least one processor adding the communication and the retrieved external addresses to previously empty or incomplete sections of the rendered communication interface. For example, the at least one processor may provide the retrieved external addresses to an entity for the entity to consider. As another example, for a communication interface including a recipient field and a message body field, the at least one processor may add the retrieved external addresses directly to the recipient field or allow an entity to select external addresses from a list of external addresses and may add a message to the message body field. In some embodiments, the at least one processor may be further configured to populate the communication interface with retrieved external addresses from a source other than the plurality of boards. For instance, the at least one processor may access a data store, document, webpage, or any other file where external addresses may be stored, any of which may be related or unrelated to the plurality of boards. As an example, the at least one processor may have determined that an entity wishes to communicate with someone at 'Company1' and may retrieve external addresses from a common data store containing external addresses associated with 'Company1' which is not related to any of the plurality of boards. However, the system may be configured to also receive external addresses from a user input (e.g., entered as a custom input or as an input for an external address not retrieved by the system) because, for instance, the input external address is not found in the plurality of boards or because the system may not have retrieved that inputted external address because it was not determined to be a part of the subset of boards for retrieving external addresses.

For example, FIG. 182 depicts retrieved external addresses 18204*a* to 18204*e* which have been populated in the communication interface by the at least one processor. The at least one processor may have also populated message field 18206 with an intended communication from the user which initiated the communication. The at least one processor may automatically populate recipient field 182 with the external address associated with the activated link, as previously discussed. In this example, the at least one processor may have populated recipient field 18202 with external address "damon.massey@comp1.com" associated with the activated link. In other embodiments, the at least one processor may not automatically populate recipient field 182 with the external address associated with the activated link and may provide this external address to the user with the rest of the retrieved external addresses. The at least one processor may also include external addresses from a source other than boards 18102*a* to 18102*d*. For example, the at least one processor may retrieve external addresses from a data store which contains addresses with a "comp1.com" domain.

In some embodiments, the user may edit the communication directly by typing into message field 18206. In other embodiments, the user may have input the communication elsewhere and the at least one processor may populate message field 18206 automatically. As another example, the at least one processor may provide an editable sample communication in message field 18206 which may be based on the activated link.

Some disclosed embodiments may involve receiving a selection of at least one of the retrieved external addresses, which may refer to the at least one processor receiving a command or signal indicating an external address of the retrieved external addresses for input into a recipient field as an intended recipient.

For example, a user may click on one or more of retrieved external addresses 18204*a* to 18204*e* of FIG. 182 to indicate to the at least one processor that they wish to send the communication to the selected external addresses. For instance, the user may click on retrieved external addresses 18204*a* and 18204*b* to add "ty.phillips@comp1.com" and "haroon.potts@ comp1.com" to recipient field 18202. Additionally or alternatively, there may be a CC field (not shown), and the user may click on a retrieved external address such as retrieved external address 18204*c* to add "julia.aguirre@comp1.com" to the CC field. In some embodiments, the user may be able to specify whether they wish to add an external address to recipient field 18202, to the CC field (not shown) or to any other appropriate field. Additionally, a user may be able to edit the recipient field 18202 directly by entering in an external address manually that may not have been retrieved by the system, or may not be contained in any of the boards of the system.

Some disclosed embodiments may involve causing the communication to be transmitted to the at least one selected retrieved external address. Causing the communication to be transmitted may include the system transmitting the configured communication to a destination outside of the system (e.g., to the external address). The communication may be transmitted automatically in response to receiving an input from a user indicating instructions to transmit the communication (e.g., clicking on a "send" button) oy may be transmitted automatically at a specified time (e.g., at a date and time established by a preference or at an established time period after receiving instructions to send the communication).

By way of example, the at least one processor may cause the communication contained in message field 18206 of FIG. 182 to be transmitted to the external addresses selected by a user and contained in recipient field 18202. This may occur automatically, as a result of one or more retrieved external addresses being selected, or by receiving an input which indicates that the user wishes to send the communication, for example, by means of a click to a "Send" button (not shown).

Some disclosed embodiments may involve linking a copy of the transmitted communication to at least the specific board. Linking a copy of the transmitted communication may include the at least one processor copying or generating a duplicate, associating, attaching, or in any other way associating the copy of the transmitted communication to a specific board, such as the specific board where the system received the indication of intent to send the communication, as previously discussed. In some embodiments, the at least one processor may be configured to also link the copy of the transmitted communication to at least one of the subset of the plurality of boards from which the retrieved external address was received. For example, for a communication transmitted by a person 'A' to persons 'X', 'Y', and 'Z', the at least one processor may link a copy of the transmitted communication to the specific board which person 'A' used to initiate the communication and any other board of the subset of the plurality of boards related to persons 'X', 'Y', and 'Z.' As another example, the at least one processor may link a copy of the transmitted communication to the specific board which person 'A' used to initiate the communication and any other board of the subset of the plurality of boards related to person 'A'. In some embodiments, the at least one processor may be further configured to populate the specific board with the retrieved external addresses. Populating a specific board with the retrieved external addresses may include containing the retrieved external addresses in at least one cell of the specific board such that the system does not have to re-retrieve those external addresses in the future. For example, a person 'A' may wish to establish communication with a person 'X' who does not have any contact information on the specific board. However, the at least one processor may find an external address associated with person 'X' on another board, and may populate a contact field of the specific board with the external address for person 'X'. As another example, the at least one processor may populate a field associated with person 'X' with external addresses for any number of related persons in a 'related contacts' field. Alternatively, the at least one processor may only populate the contact field or the 'related contacts' field with external addresses selected by person 'A'.

As an illustrative example, the at least one processor may link a copy of the transmitted communication to board 18000 of FIG. 180. The transmitted communication may include the communication contained in message field 18206 of FIG. 182, the one or more external addresses contained in recipient field 18202, the selected external addresses, retrieved external addresses 18204*a* to 18204*e* (e.g., addresses retrieved from boards of FIG. 181), or any combination thereof. Linking a copy of the transmitted communication to board 18000 may include copying the communication into a cell of board 18000, adding a link to the communication to a cell of board 18000, attaching a file containing the communication to board 18000, or any other way of connecting a copy of the communication to board 18000. Additionally or alternatively, the at least one processor may link the copy of the transmitted communication to one or more of boards 18102*a* to 18102*d*, which may be based on the activated link or on which boards the at least one processor retrieved external addresses for. For example, for the communication depicted in FIG. 182, the copy of the transmitted communication may be linked to boards 18102*b* and/or 18102*c*. As another example, if the at least one processor had only retrieved external addresses from board 18102*b* and not board 18102*c*, the at least one processor may link the copy of the transmitted communication to either board 18102*b* or board 18102*c*, or to both boards 18102*b* and board 18102*c*, since both are still part of the same subset associated with the activated link.

In some embodiments, the at least one processor may also populate one or more cells of board 18000 or an associated board of boards 18102*a* to 18102*d* with one or more of the retrieved external addresses or one or more of the selected external addresses. For example, if a user has sent a communication to "Damon Massey," the at least one processor may add retrieved external addresses 18204*a* to 18204*e* of FIG. 182 to a "Related Contacts" cell (not shown) of board 18000 of FIG. 180.

FIG. 183 illustrates an exemplary process block diagram of an enterprise messaging method 18300 for auto-populating recipient fields based on context of source content. The method may be implemented, for example, using a system including a processor as previously described. To the extent specific details and examples were already discussed previously, they are not repeated with reference to FIG. 183. In this example, at block 18302 the processor may maintain a plurality of boards related to a common entity, wherein each board of the plurality of boards includes differing external addresses. At block 18304, the processor may receive an indication of an intent to send a communication, the indication originating from a specific board of the plurality of boards. At block 18306, the processor may render a communication interface associated with the specific board in response to receiving the indication. At block 18308, the processor may perform a look up of a subset of the plurality of boards linked to the specific board. At block 18310, the processor may retrieve external addresses from each of the subset of the plurality of boards. At block 18312, the processor may populate the communication interface with the communication and the retrieved external addresses. At block 18314, the processor may receive a selection of at least one of the retrieved external addresses. At block 18316, the processor may cause the communication to be transmitted to the at least one selected retrieved external address. At block 18318, the processor may link a copy of the transmitted communication to at least the specific board.

As previously discussed, there is an unmet need for ensuring that employees are consistently rewarded for accomplishments, such as reaching target or goals, regardless of whether employees are working remotely or in an office setting. The present disclosure provides unconventional ways of providing such recognition, using a workflow management system that triggers the dispensation of physical rewards when the system detects to accomplishment of a target, milestone, or goal. Conventional approaches tend to be overly reliant on human interaction where recognition for accomplishments may be inconsistent.

As a result, there is a need for unconventional approaches to enable entities to automate the dispensing of physical items as a result of milestones being reached through the techniques disclosed herein involving a workflow table, tracking workflow milestones via designated cells, accessing data structures that store at least one rule containing a condition associated with the designated cell, accessing the at least one rule to compare an input with the condition to determine a match, and activating a conditional trigger to cause a dispensing signal to be transmitted to at least one remotely located dispenser to thereby cause a physical item to be dispensed as a result of a milestone being reached.

Aspects of this disclosure may provide a technical solution to the challenging technical problem of project management and may relate to a digital workflow system for providing physical rewards from disbursed networked dispensers, the system having at least one processor, such as the various processors, processing circuitry or other processing structure described herein. Such solutions may be employed in collaborative work systems, including methods, systems, devices, and computer-readable media. For ease of discussion references below to system, methods or computer readable media apply equally to all. For example, the discussion of functionality provided in a system, is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities but rather may be accomplished using many different instrumentalities.

Aspects of this disclosure may be related to digital workflow, which in one sense refers to a series of tasks or sub-functions electronically monitored, and collectively directed to completing an operation. In other senses, a digital workflow may involve an orchestrated and repeatable combination of tasks, data (e.g., columns, rows, boards, dashboards, solutions), activities, or guidelines that make up a process. By way of example, a digital workflow system may utilize workflow management software that enables members of a team to cooperate via a common online platform (e.g., a website) by providing interconnected boards and communication integrations embedded in each of the interconnected boards. In an exemplary digital workflow system, the system may provide automatic updates to a common dashboard that is shared among multiple client devices, and provide varying visualizations of information to enable teams to understand their performance and milestones. Providing physical rewards as may refer to any process for delivering tangible items to an entity. In this context, a physical reward may be any item having material existence which may be delivered to one or more people, animals, organizations, or other entities which may receive an item. Physical rewards or physical items are not limited by size, shape, or form, and may include food, drinks, gifts, gift cards, gadgets, vehicles, medication, tools, clothing, live animals, data storage apparatuses, keys to access another physical object (e.g., physical keys or access codes printed on a card), plants, packages, furniture, appliances, office supplies, or any other tangible items which may be provided to an entity.

Disbursed networked dispensers may refer to one or more machines or containers that may be configured to release an amount (e.g., a volume of a liquid or solids) or a specific item at a specified time or when prompted, simultaneously or at designated times for each dispenser. The machines or containers may be connected to each other (e.g., wired or wirelessly) and placed at locations different from each other. In some embodiments, the disbursed networked dispensers may be configured to move or be moved from one location to another. For example, a dispenser may be mounted on or part of a drone, a vehicle, a train, a robot or any other apparatus which would allow a dispenser to move from one location to another. In other embodiments, a dispenser may be a continuous belt or chain made of fabric, rubber, metal, or another appropriate material, which may be used for moving physical rewards from one location to another. For example, a dispenser may include a conveyor belt which may move a physical reward from a centralized location to a specific location associated with a receiving entity. Additionally, a dispenser may include a robot arm or picker which may autonomously retrieve and transport physical items. In other embodiments, a dispenser may be an apparatus configured to dispense the physical reward by launching it at an entity (e.g., a catapult, cannon, or a slingshot) or by delivering a physical reward via a track which may lead the physical reward to a receiving entity. In yet another embodiment, a dispenser may include a mechanism for striking the physical reward upon delivery thereof. For example, the dispenser may include a hammer which smashes the physical reward, e.g., a cookie, as it is delivered to an entity. In another example, the dispenser may strike a container of the physical reward to release the physical reward, such as striking a tube to release confetti, or striking a balloon to reveal the physical reward contained inside the balloon. In some embodiments, the disbursed networked dispensers may include one or more lights, speakers, or any apparatuses capable of transmitting an alert or message to an entity. Additionally, the dispensers may be connected in such way that when one of the disbursed networked dispensers dispenses a physical reward, the other dispensers in the network may become "aware" of this and may transmit an alert, dispense a physical reward of their own, or execute any other appropriate response to a sibling dispenser dispensing a reward.

Figure 185A:
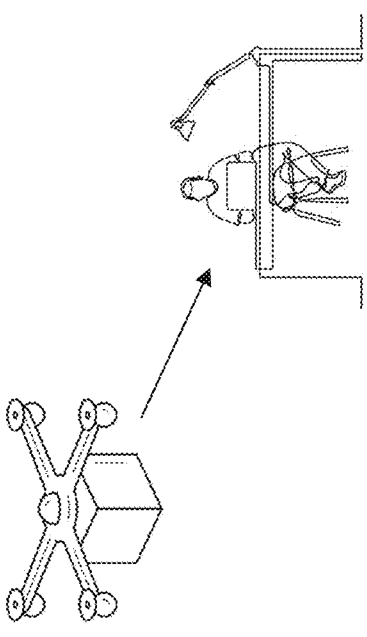
Figure 185B:
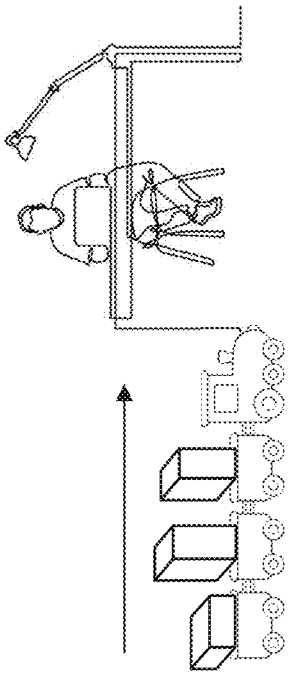
Figure 185C:
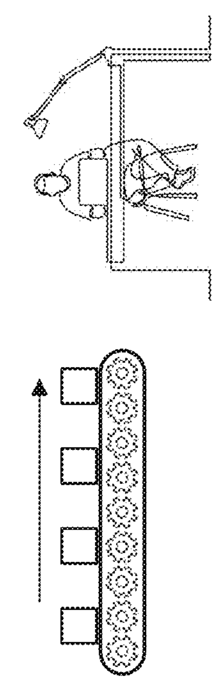
Figure 185D:
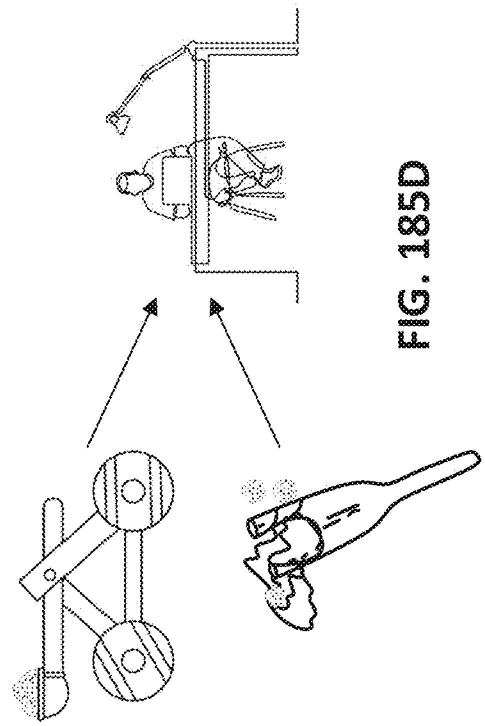

By way of example, FIG. 184 illustrates one example of a disbursed networked dispenser 18400 for dispensing physical rewards (e.g., cookies). Other examples of disbursed networked dispensers are shown in FIGS. 185A to 185D, ranging from flying drones, driving robots, conveyor belt systems, and launching mechanisms. By way of a few examples, a physical item may be dispensed by means of a flying drone, as illustrated in FIG. 185A; a remote control or autonomous train as in FIG. 185B; a conveyor belt, as illustrated in in FIG. 185C; or a catapult, cannon or slingshot, as illustrated in FIG. 185D. Any other mechanism capable of delivering a reward may also be used consistent with this disclosure. Each of these mechanisms may be connected to a digital workflow system to enable delivery of a physical reward in response to a condition being met in the digital workflow system (e.g., a task being marked complete, a milestone reached, a goal met, a delivery being marked ready for delivery, or any other condition).

Disclosed embodiments may involve maintaining and causing to be displayed a workflow table having rows, columns, and cells at intersections of rows and columns. A workflow table may refer to an arrangement of data presented in horizontal and vertical rows (e.g., horizontal rows and vertical columns) relating to a process, task, assignment, engagement, project, endeavor, procedure item to be managed, or any other undertaking that involves multiple steps or components. The workflow table may include items defining objects or entities that may be managed in a platform, the objects or entities presented in rows and columns defining cells in which data is contained, as described in greater detail herein. Maintaining the workflow table may refer to storing or otherwise retaining the workflow table and/or its underlying data. For example, the workflow table may be kept in an existing or operating state in a repository containing a data structure located locally or remotely. Additionally or alternatively, maintaining the workflow table may refer to modifying the workflow table to correct faults, to improve performance, functionality, capabilities, or other attributes, to optimize, to delete obsolete capabilities, and/or to change the workflow in any other way once it is already in operation. Causing the workflow table to be displayed may refer to outputting one or more signals configured to result in presentation of the workflow table on a screen, other surface, or in a virtual space. This may occur, for example, on one or more of a touchscreen, monitor, AR or VR display, or any other means as previously discussed and discussed below. A table may be presented, for example, via a display screen associated with a computing device such as a PC, laptop, tablet, projector, cell phone, or personal wearable device. A table may also be presented virtually through AR or VR glasses, or through a holographic display. Other mechanisms of presenting may also be used to enable a user to visually comprehend the presented information. In some embodiments, rows may be horizontal or vertical, and columns may be vertical or horizontal, and every intersection of a row and a column may define a cell.

As an illustrative example, FIG. 186 depicts workflow tables 18600, 18610, and 18620 including rows 18602*a* to 18602*c* (Task A, Task B, and Task C); row 18612*a* to 18612*c* (Simvastatin, Lisinopril, and Omeprazole); and rows 18622*a* to 18622*c* (T-shirts, Jeans, and Belts). The workflow tables of FIG. 186 also include columns 18604*a* to 18604*d* (Project, Person, Due Date, and Status); columns 18614*a* to 18614*d* (Medication, Person, Schedule, and Today's Date); and columns 18624*a* to 18624*d* (Product, Person, Threshold, and Sales). Designated cells are located at intersections of rows and columns. For example, designated cells 18606*a* to 18606*c* appear at the intersections of the rows and status column in workflow table 18600; designated cells 18616*a* to 18616*c* appear at the intersections of the rows and "Today's Date" column in workflow table 18610; and designated cells 18626*a* to 18626*c* appear at the intersections of the rows and Sales column in workflow table 18620. Similarly, each of the tables in FIG. 186 include a Person column designating, for example, persons 18608, 18618, and 18628*a* to 18638*c*. Designated Status cells 18606*a* to 18606*c* are at the intersections of each row and the Status column. As discussed later in greater detail, logical (conditional) rules may trigger actions when conditions are met in specified cells.

Some disclosed embodiments may involve tracking a workflow milestone via a designated cell, the designated cell being configured to maintain data indicating that the workflow milestone is reached. To track a workflow milestone via a designated cell may include monitoring a cell of a workflow table to determine whether an action or event (e.g., marking a change or stage in development) has occurred (e.g., as reflected in a value in a cell or as reflected in a combination of cells). The action or event may be automatically updated in response to a change in the system, or may occur as a result of a manual change provided by input from a client device. A workflow milestone may be any goal set by the system or by a user to indicate progress made in relation to a project, property, item, or any other workflow being tracked. For example, a workflow milestone may be associated with a progress or completion of a task, a deadline, a status, a date and/or time (e.g., every Wednesday or every day at 2:00 pm); a threshold; an event (e.g., a new sale); a received input (e.g., the press of a button, data entered into a form, or a received donation to a charity); a received input from a specific entity (e.g., receiving an email from your boss or gaining a new follower on social media); a detection by a sensor (e.g., a camera capturing a passing dog; a microphone detecting a passphrase such as "give me a cookie"); an evaluation made by a processor (e.g., a number of hours worked by an entity or a number of projects completed); a combination of one or more data points (e.g., a milestone being marked as completed before a certain date) or any other event which may serve as a milestone. In response to the milestone being reached, the system may trigger an action for dispensing a physical reward. A designated cell being configured to maintain data indicating that the workflow milestone is reached. The designated cell may be any cell of the workflow table that is pre-designated as milestone-related. The cell may be, for example, a status cell indicating that an item is complete. The designated cell may be one of a combination of cells for designating a milestone is reached. For example, a milestone may only be considered reached if both a status cell contains a certain value and a date cell contains a certain value. The designated cell may be updated by automatic or manual means as discussed above. For example, the designated cell may be updated automatically by a processor, manually by a user, by a third-party system, or by any other entity which may modify the designated cell. For example, the system may determine that a status is reached by assessing data entered in a group of cells. Or, the system may determine a status when a user makes a corresponding entry in a status cell.

For example, FIG. 186 depicts status cells 18606*a* to 18606*c*. The designated cells may be tracked to determine when a workflow milestone is reached. For example, designated cells 18606*a* to 18606*c* may be tracked to determine whether a project is completed. In this example, Tasks B and C may be completed since designated cell 18606*b* contains the value "Done". Therefore, if the workflow milestone is project completion, for task B the workflow milestone is attained. Additionally or alternatively, the workflow milestone may be a date and may designate multiple cells for monitoring. For example the designated cells for monitoring may include a due date and a status. In FIG. 186, if on April 2, Task A's status cell 18606*a* still reads "Working on it," a workflow milestone may not be reached (i.e., the due date was missed set by Due Date cell 18607*a*).

As another example, the workflow milestone may be a recurring date, such as with workflow table 18610. Here, a person 18618 associated with medications "Simvastatin," may be scheduled to take Simvastatin on Mondays, Wednesdays, and Fridays; while person 18614*b* is scheduled to take Omeprazole every day of the week. In this example, since designated cells 18616*a* to 18616*c* read "Wednesday," the system will determine a workflow milestone will have been reached for "Simvastatin" and "Omeprazole."

As yet another example, the workflow milestone may be a threshold, such as with workflow table 18620. Here, a person 18628*a* may be associated with "T-shirts," a person 18628*b* may be associated with "Jeans," and a person 18628*c* may be associated with "Belts." A workflow milestone may be reached when T-shirt sales reach 40,000, when "Jeans" sales reach 12,000, and when belt sales reach 10,000. In this example, the "Jeans" sales provided via designated cell 18626*b* show that "Jeans" sales have surpassed the threshold, therefore the workflow milestone is attained.

Some disclosed embodiments may involve accessing a data structure that stores at least one rule containing a condition associated with the designated cell, wherein the at least one rule contains a conditional trigger associated with at least one remotely located dispenser. A data structure may refer to a database or other system for organizing, managing, and storing a collection of data and relationships among them, such as through a local or remote repository. A rule may refer to a logical sentence structure that may trigger an action in response to a condition being met in the workflow table, as described in greater detail herein. In some embodiments, the rule may be an automation that associates the designated cell with the condition and an entity. A condition may refer to a specific status or state of information that may relate to a particular cell, such as a designated cell for monitoring. The designated cell may contain status information (e.g., status is "working on it") that may be changed to a different status (e.g., status is "done"), which may be the condition required to trigger an action associated with one or more remotely located dispensers. A status may refer to a mode or form a designated cell may take. For example, the status for a designated cell may be "In Progress" or "Completed." A conditional trigger may refer to specific conditions that must be met in order to cause an activation of a dispenser. For example, a rule may be "when X task is completed, dispense a cookie." Here, the condition may be "when X task is completed," and the conditional trigger may be the transmission of a signal to dispense a cookie when the condition is met. The at least one remotely located dispenser associated with the conditional trigger may refer to any device configured to dispense a reward or a physical item. The dispenser may be considered remote in that the processor that originates the dispensing signal is not within the dispenser. The dispensers may receive signals from a triggering processor through a network, directly through a cable, or by any other means. In some embodiments, the at least one remotely located dispenser may be located remote from the at least one processor. Being located remotely may include any measure of physical distance between the dispenser and the at least one processor that determines that the conditional trigger is met. For example, the dispenser and the at least one processor may be remotely located from each other in the same room. In other examples, the dispenser and the at least one processor may be in different buildings, different cities, different states, or even in different countries. In any situation, the at least one remotely located dispenser may be associated with a conditional trigger and activated in response to a condition being met in a digital workflow, even if the dispenser is located remotely from the at least one processor that monitors the digital workflow.

As an illustrative example, FIG. 187 depicts an exemplary rule 18700 containing a condition 18702 and a conditional trigger 18704. Here, condition 18702 is "When status is something." Condition 18702 may be modified by an entity associated with the designated cell and a workflow milestone. For example, condition 18702 may read "When date/time is Monday at 2:00 pm," "When T-shirt sales are 40,000," "When a new social media follower is gained," "When camera detects somebody at the door," etc. In this example, conditional trigger 18704 is "dispense physical item." Conditional trigger 18704 may also be modified by an entity, for example, to specify where to dispense a physical item, which entity to dispense the physical item to, when to dispense the physical item, and how to dispense the physical item. For example, modified conditional trigger 18704 could read "dispense fertilizer to onion field via drone." A modified rule 18700 may be simple, such as "when project X is "done," dispense cookie to Janet," or complex, such as "when timer reaches 10 seconds, dispense a tennis ball to Rafael Nadal via tennis ball launcher on court 4."

As another example, dispenser 18400 of FIG. 184 may be remotely located from the at least one processor. In an example, dispenser 18400 may be located in the USPTO headquarters in Alexandria, Va., while the at least one processor may be located in Tel Aviv, Israel. The at least one processor in Israel may maintain a workflow table associated with an Examiner from the USPTO, and in response to the Examiner reaching a milestone, for example, allowing this application, the at least one processor may send a dispensing signal to dispenser 18400 to dispense part of its contents, for example, confetti or cookies.

Some disclosed embodiments may involve receiving an input via a designated cell. This may refer to the at least one processor receiving a command or signal through the designated cell as a result of information input into the designated cell or as a result of a change in information that is contained in the designated cell. The input may be provided through any interface such as a mouse, keyboard, touchscreen, microphone, webcam, softcam, touchpad, trackpad, image scanner, trackball, or any other input device. For example, a user through the user's client device may click on the designated cell to change the status from "In Progress" to "Completed." In some embodiments, receiving the input may occur as a result of an update to the designated cell. For example, an update may include the addition, subtraction, or rearrangement of information in the designated cell. One example of an update is a change in status from "In Progress" to "Done." In other embodiments, the input may be received from a network access device in a vicinity of the at least one remotely located dispenser, and the at least one remotely located dispenser and the network access device may be located remote from the at least one processor. A network access device may include any computing device such as a mobile device, desktop, laptop, tablet, or any other device capable of processing data. A network access device which is in the vicinity of the at least one remotely located dispenser may be in the physical area near or surrounding the at least one remotely located dispenser. For example, a PC user might have a dispenser nearby. When the user updates a status to Done, the update may be detected by a remote processor, triggering a rule that causes the nearby dispenser to provide the user with a physical reward. In yet another embodiment, the at least one processor may be a server and the at least one remotely located dispenser may be connected to the server via a network. A server may be computer hardware or a repository that maintains the data structure that contains the digital workflows of users, as described in greater detail herein. A network may be a group of computing devices which use a set of common communication protocols over digital interconnections for the purpose of sharing resources provided by the devices. Thus, the dispenser may be networked to the server to enable the server to send signals directly to the dispenser. In an alternative arrangement, the dispenser may be connected to a user's device (e.g., PC) and the server might communicate with the dispenser through the user's device.

By way of example, a user may modify designated status cell 18606*a* in table 18600 of FIG. 186 to "Done" using a mouse, a keyboard, or any other means. For example, these input devices might be used to make a selection on a drop-down list. As another example, the system itself may automatically update designated date cells 18616*a* to 18616*c* at a determined time every day. Alternatively, the system may receive input from another entity which specifies that a new t-shirt sale has been made, raising the count of designated number cell 18626*a* to 35,204. Yet another example may involve a sensor informing an entity that movement has been detected, and such entity updating a designated cell to reflect this information.

Some disclosed embodiments may include accessing at least one rule to compare an input with a condition and to determine a match. Comparing the input with the condition to determine a match may refer to the at least one processor inspecting both the input received via a designated cell and the condition contained in the rule to determine whether the input and the condition correspond to each other. For example, if the input received via the designated cell reveals that a project X has been completed, and the condition is "when project X is completed," the at least one processor may determine that there is a match. Alternatively, if the input received via the designated cell reveals that project X is still in progress, the at least one processor may determine that there is not a match.

As an illustrative example, the at least one processor may access a rule, associated with designated status cell 18606*a* of table 18600 in FIG. 186, which reads "when status is 'Done,' dispense a cookie." The at least one processor may then compare an input (e.g., status was changed from "Working on it" to "Done") with the condition (i.e., "when status is 'Done'") and determine that there is a match since the input shows that the workflow milestone has been reached. As another example, the rule associated with designated status cell 18606*b* may read "when status is 'Done' and due date is not passed, dispense a cookie." In this example, the at least one processor may compare the input (i.e., status was changed from "Working on it" to "Done") with the condition (i.e., "when status is 'Done' and due date is not passed"), with the addition of determining whether the due date has passed, to determine whether there is a match.

Yet another example may involve workflow table 18610, where the at least one processor may access a rule associated with designated cell 18616*b* which may read "when today's date is "Monday," dispense Lisinopril." The at least one processor may then compare an input (e.g., today's date was changed from "Tuesday" to "Wednesday") with the condition (i.e., when today's date is "Monday") to determine whether there is a match. In this case, the at least one processor may determine that there is not a match.

In some embodiments, following determination of a match, the at least one processor may be configured to activate a conditional trigger to cause at least one dispensing signal to be transmitted over a network to at least one remotely located dispenser in order to activate the at least one remotely located dispenser and thereby cause the at least one remotely located dispenser to dispense a physical item as a result of the milestone being reached. Activating the conditional trigger may refer to executing the action associated with the at least one remotely located dispenser. Activating the conditional trigger may, in some embodiments, cause at least one dispensing signal to be transmitted over a network to the at least one remotely located dispenser, which may refer to the at least one processor sending a signal to the at least one remotely located dispenser through a network, the signal containing instructions for the at least one remotely located dispenser to dispense a part or all of its contents. Activating the at least one remotely located dispenser may include the at least one remotely located dispenser receiving the dispensing signal to cause the operations of the at least one remotely located dispenser to be activated and carried out. Causing the at least one remotely located dispenser to dispense a physical item may refer to the dispensing signal transmitted to the remotely located dispenser causing the dispenser to disburse a tangible object corresponding to a part of its contents, as described in greater detail herein. A physical item may be dispensed by, for example, rotating or otherwise moving a part of the dispenser, opening a window, picking (e.g., with a robotic arm), pushing, blowing, pulling, suctioning, causing to roll, striking, or any other means of delivering a physical item to an entity, as discussed previously above. Dispensing a physical item as a result of the milestone being reached may refer to dispensing the physical item based on the milestone being complete, as evidenced by the determination of a match, as described in greater detail herein. A physical item may include any tangible object which may be provided to an entity, as described in greater detail herein.

In some embodiments, the at least one remotely located dispenser may be configured to hold a plurality of confections and to dispense a confection in response to the dispensing signal. Confections may include edible rewards such as baked desserts, candy, or any other food item. As a result of receive a dispensing signal, a remotely located dispenser holding confections may then dispense at least one confection. In another example, if the at least one dispenser holds ice cream, in response to receiving a dispensing signal, the dispenser may be configured to dispense a volume of ice cream. The at least one remotely located dispenser may be configured to hold any tangible item which may be provided to an entity, as described in greater detail herein.

In other embodiments, at least one identity of at least one remotely located dispenser includes identities of a plurality of remotely located dispensers, and wherein the at least one dispensing signal includes a plurality of dispensing signals configured to cause, upon activation of the conditional trigger, dispensing by each of the plurality of dispensers. An identity of a remotely located dispenser may refer to an identifier associated with the remotely located dispenser. For example, the identity may be represented as a word (e.g., name), number (e.g., IP address), letter, symbol, or any combination thereof. Causing dispensing by each of the plurality of dispensers based on a plurality of dispensing signals may refer to sending a dispensing signal to a plurality of dispensers to cause them to activate and dispense a physical item in response to the activation of conditional trigger (an action as a result of a condition being met). For example, all of the dispensers in an office may be configured to dispense a physical item whenever the company makes a sale, every day at a specific time, or every time a manager presses a button. Similarly, a group of networked dispensers may be configured to dispense a physical item whenever one of the networked dispensers of the group receives a dispensing signal.

In some embodiments, the at least one rule may contain an identity of at least one entity associated with the at least one remotely located dispenser, and activating the conditional trigger may include looking up an identification of the at least one remotely located dispenser based on the identity of the at least one entity. An identity of an entity may refer to an identifier associated with a specific individual, the identifier being represented by a word, number, letter, symbol, or any combination thereof, as discussed previously. Looking up an identification of the at least one remotely located dispenser based on the identity of the at least one entity may refer to the at least one processor determining which particular dispenser to send a dispensing signal to, based on the entity associated with the conditional trigger. For example, a rule may be associated with a person Y. When the condition of this rule matches an input received via the designated cell, the at least one processor may activate the conditional trigger of the rule, including looking up the identification of a dispenser associated with person Y. In this way, the system may appropriately dispense a physical reward to a particular dispenser associated with a specific entity (e.g., an individual, a team, a specific room).

In other embodiments, the at least one remotely located dispenser may be a vending machine that holds a plurality of differing food items and wherein the at least one signal is configured to dispense a food item in response to the conditional trigger. A vending machine may be an automated machine which provides items such as snacks and beverages to entities after a condition has been met. Additionally or alternatively, a vending machine may hold physical items other than food items, such as gift cards, gadgets, and/or other small tangible items. The at least one remotely located dispenser may also be a centralized dispenser other than a vending machine. For example, a centralized dispenser may resemble an ATM and may dispense cash to an entity. The at least one signal being configured to dispense a food item in response to the conditional trigger may refer to the signal containing instructions for the vending machine to dispense a specific item in response to an activated conditional trigger. For example, depending on the difficulty of a task associated with a conditional trigger, an item of corresponding value may be selected by the at least one processor to be dispensed by the vending machine. In this case, a more difficult task may award an entity an item with a higher value than an easier task. As another example, an entity may choose which physical item they wish to receive from the vending machine or other dispenser type (such as the conveyor belt, drone, etc.). Additionally or alternatively, a rule may be such that different items may be selected for dispensing by the at least one processor depending on the match.

In one example, a rule for Tasks A, B, and C of worktable 18600 of FIG. 186 may read "when status is 'done,' dispense one cookie, when status is done two days ahead of schedule, dispense two cookies." In this case, person 18608 may receive one cookie for having completed Task B on time, and two cookies for having completed Task B ahead of schedule.

Embodiments may also include the vending machine being configured to withhold dispensing of the food item associated with the conditional trigger until an identity is locally received by the vending machine. Withholding dispensing until an identity is locally received by the vending machine may refer to the vending machine receiving a dispensing signal, but waiting for an additional signal before activating to dispense a physical item. For example, in some instances, the dispensing may be delayed until the recipient is present at the dispenser. For example, an individual may receive a message entitling the individual to an item from a vending machine (e.g., a particular item or a credit to select an item). The dispensing may only occur when the individual approaches and prompts the machine to dispense. The identity of the entity may be confirmed by scanning an ID, facial recognition, inputting a code or ID, two-factor authentication, RFID, NFC, QR code, or any other means of identifying a specific entity. In this way, the vending machine may dispense the physical reward to the correct entity in a situation when multiple entities may also have access to the same vending machine.

By way of example, for a rule associated with designated cell 18606*a* in FIG. 186, which reads "when status is "Done," dispense a cookie," the at least one processor determines a match when the status is updated to "Done." Following the determination of the match, the at least one processor may activate the condition trigger (i.e., dispense a cookie) to cause a dispensing signal to be transmitted over a network to a remotely located dispenser, for example, dispenser 18400 of FIG. 184. Receiving the dispensing signal may cause dispenser 18400 to become activated and thereby cause dispenser 18400 to dispense a cookie as a result of the milestone (i.e., completing task A) being reached. In this example, dispenser 18400 may dispense a cookie 18402 by having a cookie roll down shaft 18404 into rotating motor unit 18406, and having rotating motor unit 18406 rotate to allow cookie 18402 fall while maintaining the rest of the cookies in place in shaft 18404. However, other methods for dispensing cookies or other physical items may be employed. Dispenser 18400 may be configured to hold a plurality of cookies or other physical items, as shown in shaft 18404 of FIG. 184. Dispenser 18400 may include an identity, such as a unique ID or some form of identification such that the at least one processor may ensure the dispensing signal is sent to the right dispenser. Dispenser 18400 may also include indicators to provide information to a user. For example, dispenser 18400 may include indicators 18408*a* to 18408*c* where indicator 18408*a* may indicate whether dispenser 18400 is receiving power, indicator 18408*b* may indicate whether dispenser 18400 is connected to a network, and indicator 18408*c* may indicate whether another dispenser in the network has dispensed a cookie. Indicators 18408*a* to 18408*c* may also be configured to indicate other information, such as indicating that a cookie is about to be dispensed, dispenser 18400 is out of stock, or any other information which may be useful to a user. Additionally, indicators 18408*a* to 18408*c* may include a speaker or some other system which may be used to alert a user.

As described above, the rule may contain an identity of an entity associated with the dispenser. For example, for a dispenser associated with "Janet," the rule may read "when task A is "Done," dispense a cookie to Janet." In this case, activating the conditional trigger may include looking up an identification of the dispenser associated with Janet based on the rule. That is, the at least one processor may determine there is a match and that the conditional trigger specifies that a cookie be dispensed to Janet, and may therefore look up which dispenser is associated with Janet in order to ensure a cookie is being dispensed to her.

As another example, the remotely located dispenser may be a vending machine 18800 that holds a plurality of differing food or other items, as shown in FIG. 188. In this case, the dispensing signal may include additional instructions to dispense the physical item. For example, vending machine 18800 may be configured to withhold dispensing of the physical item until an identity of an entity is confirmed by vending machine 18800. That is, if Janet completes Task A and a dispensing signal is sent to vending machine 18800 to dispense a cookie, vending machine 18800 may wait until Janet confirms her identity to vending machine 18800. This may be done by scanning an ID, facial recognition, or any other means of identifying a specific entity, as described in greater detail herein. Other instructions to dispense the physical item may include dispensing different items according to a difficulty of a task (e.g., completing easy Task A will reward Janet with a cookie and completing hard Task B will reward Janet with a smartwatch) or even allowing a physical item to be chosen by an entity (e.g., Janet may prefer cereal bars to cookies). The vending machine described above may be similar to other centralized dispensing methods systems described herein, such as the conveyor belt, the drone, or the cookie dispenser as shown in FIGS. 184 and 185A to 185D.

FIG. 189 illustrates an exemplary block diagram of a digital workflow method 18900 for providing physical rewards from disbursed networked dispensers. The method may be implemented, for example, using a system including a processor as previously described. To the extent specific details and examples were already discussed previously, they are not repeated with reference to FIG. 189. In this example, at block 18902 the processor may maintain and cause to be displayed a workflow table. The workflow table may have rows, columns, and cells at intersections of rows and columns. At block 18904, the processor may track a workflow milestone. The workflow milestone may be tracked via a designated cell (or group of cells) configured to maintain data indicating whether a workflow milestone is reached. At block 18906, the processor may access a data structure storing at least one rule. The at least one rule may contain a condition associated with the designated cell (or group of cells) and a conditional trigger associated with a remotely located dispenser. At block 18908, the processor may receive an input via the designated cell(s). At block 18910, the processor may access the at least one rule to determine a match by comparing the input with the condition. At block 18912, the processor may activate a conditional trigger. The conditional trigger may be activated following determination of the match and may cause a dispensing signal to be transmitted over a network to the remotely located dispenser. The remotely located dispenser may be activated as a result of receiving the dispensing signal, which may cause the remotely located dispenser to dispense a physical item as a result of the milestone being reached.

Consistent with some disclosed embodiments, systems, methods, and computer readable media for implementing an audio simulation system for providing variable output as a function of disbursed non-audio input are disclosed. The systems and methods described herein may be implemented with the aid of at least one processor or non-transitory computer readable medium, such as a CPU, FPGA, ASIC, or any other processing structure(s), as described above.

Using an audio simulation system may enhance the ability to create a meaningful connection between presenters and audience members in a virtual environment. For instance, audience members may be more likely to remain engaged in a presentation when they are capable of sharing their thoughts, emotions, and impressions throughout the presentation. Accordingly, unconventional technical approaches may be beneficial to connect one or more network access devices associated with presenters and audience members in a way that allows for the generation and sharing of communications through sound and visual cues. For example, to indicate approval of a presentation or presenter, audience members may choose to generate sounds such as clapping or laughing through the use of simulated buttons in a network access device(s). Further, audience members may choose to generate sounds such as booing or yawning using the network access device(s). In this manner, presenters are capable of receiving feedback in a real-time manner, thereby leading to improved presentations. Accordingly, the disclosed computerized systems and methods provide an unconventional technical solution with advantageous benefits over extant systems that fail to provide audience members with an opportunity to share communications through sound, visual cues, or a combination thereof, using network access devices.

An audio simulation system may refer to any apparatus, method, structure or any other technique for generating electrical, mechanical, graphical, or other physical representation of a sound, vibration, frequency, tone, or other signal transmitted through air or another medium. As will be appreciated by those having ordinary skill in the art, the system may include one or more separate sub-systems that together and/or separately perform the functions described herein. The system may include one or more electrical environments, such as one or more software applications running on one or more electronical devices such as laptops, smartphones, or tablets. The audio may be simulated in the electronical environment, such as a presentation platform where one or more presenters, one or more audience members, or both receive the simulated audio signals. For example, the one or more presenters may receive one or more simulated audio signals such as clap sounds through an electronic device, while the audience members do not. In another example, the system may be configured to resemble a traditional presentation room, whereby both the one or more presenters and the one or more audience members receive the simulated audio claps.

For example, FIG. 190 illustrates an exemplary audio simulation network 19000 in a presentation environment, consistent with embodiments of the present disclosure. In FIG. 190, audio simulation system 19000 may receive non-audio input and any other information from one or more audience members, such as audience members 19001*a*, 19001*b*, and/or 19001*c* through one or more network access devices as described in more detail herein. After processing the received non-audio input as described herein, audio simulation system 19000 may provide variable output as a function of the non-audio input to one or more presenters, such as presenter(s) 19003, and/or audience members 19001*a*, 19001*b*, and/or 19001*c*.

It is to be understood, however, that the claimed invention is not limited to presentation applications, but rather may be used in any circumstance or location where simulating audio would be beneficial, such as during workflow management, performance review, social media, content sharing, or any other scenario where one or more persons wish to provide or receive one or more responses. As a non-limiting example, the system may be part of workflow management software that may enable various members of a team to cooperate via a common online platform. The workflow management software may include one or more boards with items related to one or more tasks associated with one or more projects, clients, deals, or other organization information. As a result of one or more changes in the tasks, a simulated audio signal may be generated. For example, upon completion of a task, one or more individuals associated with the task may receive a simulated clapping sound thereby signaling the completion of the task. In an alternate example, the simulated audio signal may be generated as a result of an individual's level of performance. For example, a clapping sound may be simulated upon reaching a milestone, or upon achieving a threshold level of performance in all tasks in a financial quarter. The above-referenced examples are provided for illustration purposes only and are not intended to limit the scope of the innovations described herein.

For example, FIGS. 191 and 192 illustrate exemplary workflow boards 19100 and 19200, respectively, for use with the audio simulation system, consistent with embodiments of the present disclosure. In FIG. 191, board 19100 may include various pieces information associated with one or more tasks (e.g., "Task 2" 19101), including persons associated with that task (e.g., "Person 2" 19103), task details, status (e.g., "Stuck" status 19105), due date, timeline, and any other information associated with the task. As a result of change in information, the audio simulation system may be configured to output one or more sound files as described herein. Comparing FIG. 191 with FIG. 192, for example, it can be seen that the status changes from "Stuck" status 19105 in FIG. 191 to "Done" status 19205 in FIG. 192. As a result of this change in status, the audio simulation system may be configured to generate an output, such as a clapping sound. The person associated with the task (e.g., "Person 2" 19203) may consequently receive an auditory cue of the change in status. Any other information associated with the board may be used by the audio simulation system to generate one or more outputs.

The simulated audio may be generated as a variable output as a function of disbursed non-audio input, consistent with disclosed embodiments. The simulated audio signal may be an output of one or more processors that are part of the audio simulation system, such as through one or more signals, instructions, operations, or any method for directing the generation of sound through air or another medium. The audio may be outputted with the aid of any suitable process or device for generating sound, such as through one or more speakers, Universal Serial Bus (USB) devices, software applications, internet browsers, VR or AR devices, a combination thereof, or any other method of producing or simulating sound. The output may be variable, consistent with disclosed embodiments. The term "variable" may refer to the ability of the simulated audio to change based on one or more factors, or to provide differing outputs based on differing inputs. In some embodiments, the simulated audio may change as a result of one or more non-audio inputs. A non-audio input may be one or more signals, instructions, operations, a combination thereof, or any data provided to the at least one processor. A non-audio input may represent electrical, mechanical, or other physical data other than sound. For example, a non-audio input may represent a user action, such as a mouse click, a cursor hover, a mouseover, a button activation, a keyboard input, a voice command, a motion, an interaction performed in virtual or augmented reality, or any other action by a user received via the at least one processor. As non-limiting examples, a non-audio input may occur as the result of one or more users interacting with one or more physical or digital buttons such as a "Clap" or "Laugh" button, digital images, or icons such as a heart emoji, motion sensors through physical movement such as by making a clapping motion, digital interaction such as by "liking" an image or video, or any other way of communicating an action.

Disclosed embodiments may involve receiving over a network, during a presentation, from a plurality of network access devices, a plurality of non-audio signals. A presentation may refer to any circumstance or scenario where one or more users, individuals, electronic apparatus, programs, a combination thereof, or any other device or entity share information among one another. For example, a presentation might involve a video conference or broadcast presentation where at least one individual is able to communicate with a group of individuals located in a common space or dispersed and communicatively coupled over one or more networks. A network may refer to any type of wired or wireless electronic networking arrangement used to exchange data, such as the Internet, a private data network, a virtual private network using a public network, a Wi-Fi network, a LAN, or WAN network, and/or other suitable connections, as described above. At least one processor may receive a plurality of non-audio signals from a plurality of network access devices capable of transmitting information through the network, such as one or more mobile devices, desktops, laptops, tablets, touch displays, VR or AR devices, a combination thereof, or through any other device capable of communicating directly or indirectly with the at least one processor. At least one transmission pathway may involve BLUETOOTH™, BLUETOOTH LE™ (BLE), Wi-Fi, near field communications (NFC), radio waves, wired connections, or other suitable communication channels that provide a medium for exchanging data and/or information with the at least one processor.

For example, FIG. 193 illustrates an exemplary audio simulation network 19300, consistent with embodiments of the present disclosure. In FIG. 193, one or more network access devices, such as network access devices 19301*a*, 19301*b*, and 19301*c*, may be in electronic communication with one or more networks, such as network 19303. Network access devices 19301*a*, 19301*b*, and 19301*c* may be the same or similar to user devices 220-1 to 220-*m* in FIG. 2. The system may include at least one processor, such as processor 19305, in electronic communication with network 19303. Processor(s) 19305 may be the same or similar to computing device 100 illustrated in FIG. 1. Through network 19303, the at least one processor 19305 may receive a plurality of non-audio signals, and any other suitable information, from network access devices 19301*a*, 19301*b*, and 19301*c*. In some embodiments, other sub-systems or elements (not shown) may be present between network 19303 and the at least one processor 19305 and/or network access devices 19301*a*, 19301*b*, and 19301*c*.

The received non-audio signals may correspond to activations of substitute audio buttons, consistent with disclosed embodiments. A "substitute audio button" may refer to one or more physical buttons, virtual buttons, activable elements, a combination thereof, or any other device or element for triggering an event when activated. For example, in embodiments where the simulated audio system is used with a presentation platform, a substitute audio button may be a graphical control element labeled with the text "Clap," an emoji of hands clapping, or a physical button in connection with the presentation platform such as through a physical (e.g., USB) or wireless (e.g., BLUETOOTH™) communication. Other buttons may indicate a laugh, sigh, yawn, boo, hiss, unique sound, words, or any other reflection of human expression. As a further example, in embodiments where the simulated audio system is used with a workflow management software, a substitute audio button may be part of a messaging platform overlaying a board, may be a virtual button contained in a cell of a board, or may be located anywhere in the platform in any interface at any level (e.g., in a board, dashboard, widgets, or any other element of the workflow management software). It is to be understood that a substitute audio button need not be part of the same environment or platform as where the at least one processor generates its output, but may rather be part of a third-party application or may otherwise be available at a different place or time. In some embodiments, the substitute audio button may include information related to its corresponding activation(s), such as an identification of a presenter, presentation, audience member, board, dashboard, widget, a combination thereof, or any other information related to the activation(s).

For example, FIG. 194 illustrates an exemplary network access device display 19400 containing substitute audio buttons, consistent with embodiments of the present disclosure. In FIG. 194, a network access device may include one or more displays, such as display 19400, for containing substitute audio buttons, such as substitute audio buttons 19401 ("Clap" button), 19403 (clapping emoji), and 19405 (laughing emoji). A user may interact with one or more substitute audio buttons, thereby causing the network access device to generate one or more non-audio signals for transmission to the simulated audio system as described herein.

In some embodiments, each of the plurality of non-audio signals may have an audio identity. An audio identity may refer to an association with one or more sound files, portions of sound files, sound samples, analog audio, a combination thereof, or any other representations of sound. For example, in embodiments where a non-audio signal corresponds to an activation of a "Clap" button, the non-audio signal's audio identity may be clapping and may be associated with one or more sound files of a single clap, multiple claps, a standing ovation, a crowd cheer, or a combination thereof. It is to be appreciated, however, that an audio identity may be associated with more than one representation of sound, either simultaneously or at separate times, and may be dependent on one or more variables or circumstances as described herein. In some embodiments, for example, the audio identity of the substitute audio buttons may include at least one of clapping or laughing. Similar to the clapping example described earlier, if the audio identity of a button is laughing, it may be associated with one or more sound files of single laughs, multiple laughs, a somewhat larger group laugh, a room full of laughter, or a combination thereof. In some cases, multiple sound files might be simultaneously activated, resulting in multiple simultaneous sounds, such as clapping and laughing, or a toggle between a clapping sound and a laughing sound based on one or more circumstances (e.g., based on the presentation or another context, or as a result of a user action), or a combination thereof. In other embodiments, the clapping sound may be entirely replaced with a different sound altogether, such as based on a user preference or an administrator action.

For example, in FIG. 194, an activation of "Clap" button 19401 or clapping emoji 19403 may generate one or more non-audio signals having an audio identity of clapping. Similarly, an activation of laughing emoji 19405 may generate one or more non-audio signals having an audio identity of laughing. In some embodiments, an emoji button may be associated purely with a non-sound output and lack an audio identity. Other simulated buttons shown in FIG. 194 may have a unique audio identity of may share audio identities amongst one another.

In some embodiments, each of the plurality of non-audio signals may correspond to a common audio identity. For example, the plurality of non-audio signals received by the at least one processor may share a same audio identity, such as clapping, laughing, cheering, booing, or any other identity as described above. In some embodiments, at least a first group of the plurality of non-audio signals may have a first audio identity that differs from a second audio identity of a second group of the plurality of non-audio signals. Following the example above, a first group of the plurality of non-audio signals may have a first audio identity associated with clapping, and may be associated with one or more sound files of a single clap, multiple claps, a standing ovation, a crowd cheer, or a combination thereof. A second group of the plurality of non-audio signals, on the other hand, may have a second audio identity associated with laughing, and may be associated with one or more sound files of a single laugh, a chuckle, a crowd laughter, or a combination thereof. The first and second group of non-audio signals may be generated as a result of an activation of the same or different substitute audio buttons.

Some disclosed embodiments may involve processing the received plurality of non-audio signals to determine a quantity of non-audio signals corresponding to a specific audio identity. A quantity of non-audio signals corresponding to a specific audio identity may be determined using one or more aggregating operations, mathematical counters, logical rules, or any other method of performing arithmetic computations. For example, in embodiments where a specific audio identity includes clapping, each non-audio signal associated with clapping may increase a total quantity corresponding to the specific audio identity by one. As a further example, in embodiments where the specific audio identity includes both clapping and laughing, each non-audio signal associated with either clapping or laughing may increase the total quantity corresponding to the specific audio identity by one. It is to be understood, however, that other computations and information may be used to determine the quantity, such as by counting audio-signals associated with one or more specific users (e.g., using a specific username) or audience members (e.g., using all usernames in a presentation or room), activations of a substitute audio button, interactions with elements in the audio simulation system, or any other information generated or used by the system. In some embodiments, for example, processing may include counting a number of non-audio signals received. In such embodiments, a quantity of total non-audio signals received from all or specific sources (e.g., using specific usernames, presentations, or rooms) may be determined using the same or similar manner as described above, such as by using one or more aggregating operations, mathematical counters, logical rules, or any other method of performing arithmetic computations. For example, in both scenarios described above, regardless of the specific audio identity, each non-audio signal associated with clapping or laughing may increase by one a total quantity corresponding to the number of non-audio signals received. The system may subsequently utilize the number of non-audio signals received in other processes and determinations. For example, the system may determine how many times a specific user interacts with a substitute audio button with respect to a total number of interactions received, such as by determining that the user interacted with a "Clap" button five times out of twenty total interactions during a presentation. In some embodiments, as a further example, processing may include counting a first number of signals in the first group of the plurality of non-audio signals and counting a second number of signals in the second group of the plurality of non-audio signals. In such embodiments, a first group of signals and a second group of signals may be selected using one or more patterns, one or more functions, as a result of one or more variables, randomly, or through any other criteria for selecting information. The first group of signals and the second group of signals may be counted in the same or similar manner as described above. For example, a first group of the plurality of non-audio may be associated with clapping, while a second group of the plurality of non-audio signals may be associated with laughing. As a result, each non-audio signal associated with clapping may increase by one a total quantity corresponding to the first group, while each non-audio signal associated with laughing may increase by one a total quantity corresponding to the second group.

Some disclosed embodiments may involve limiting a number of non-audio signals processed from each network access device within a particular time frame. The number of non-audio signals processed may be limited using one or more thresholds on the count of number of non-signals received, such that the system does not process any non-audio signals received from a specific network access device above that threshold. For example, if, during a period of time a user repeatedly presses the clap button, the system may count all the presses as a single press (e.g., such as by ignoring all additional presses beyond the first). In some embodiments, the system may set a limit based on one or more criteria besides a specific network access device, such as one or more user identifications, user interactions, activations of substitute audio buttons, or any other suitable information for regulating the number of non-audio signals processed by the system. The limit may be associated with a particular time frame, which may be milliseconds, seconds, minutes, hours, days, presentation(s), slides, scenes, or any other discrete period for processing non-audio signals. The time frame may be fixed, dynamic, or both. For example, upon a group of users interacting with a "Clap" button for more than a predetermined limit of one-hundred claps per ten minutes, the system could be configured to stop processing any further user interactions with the "Clap" button for the remaining of the time limit, for another amount of time (e.g., for the rest of a presentation or permanently), or may reduce the number of interactions processed (e.g., one out of ten interactions). In some embodiments, the limit may be a single non-audio signal per unit of time. For example, the system could be configured to only process one non-audio signal per second, thereby registering a user's rapid interaction with a "Clap" button as only one per second. Any other unit of time may be used, such as one or more milliseconds, seconds, minutes, hours, or days.

In some embodiments, the at least one processor may be configured to process a plurality of non-audio signals processed from each network access device within a particular time frame. As a variation of the example above, if multiple users activate a clap button in a prescribed period, all might be counted together for the purposes of selecting a corresponding audio file. For example, the system may maintain a plurality of audio files associated with clapping for playback depending on a number of clap signals received from differing devices. If five users activate their clap buttons in a prescribed time frame, a small group clap audio file may be played back. However, if fifty users activate their clap buttons in the same prescribed period, a large crowd clapping audio file may be played back. The process may be dynamic in that if, over time, the number of users pressing their clap buttons increases, an initial audio file played back may be of a small crowd clapping, but the playback file may change to a larger crowd clapping one or more times as the button activations increase. Similarly, as the button activations decrease, the playback files may change to diminish the sound of clapping over time.

Some disclosed embodiments may involve performing a lookup in an audio-related data structure to select at least one particular audio file associated with the audio identity and the determined quantity. A data structure may be any compilation of information for storing information in an organized manner, such as one or more arrays, linked lists, records, unions, tagged unions, objects, containers, lists, tuples, multimaps, sets, multisets, stacks, queues, libraries, tree graphs, web graphs, or any other collection of information defining a relationship between the information. The data structure may include audio-related information so as to enable look-up to select at least one particular audio file. The data structure may, for example, include one or more audio files and corresponding identifications for looking up the one or more audio files; or it may include one or more lists of Uniform Resource Locators (URLs) for retrieving one or more audio files from a web address; or it may contain one or more functions (e.g., Application Programming Interfaces (APIs)) for accessing one or more audio files from an application or other electronic system. It is to be understood, however, that the contents of the data structure are not limited to any specific type of information but may rather include any suitable information for enabling efficient access of one or more audio files. In addition, the data structure may include information other than audio files, such as one or more images (e.g., emojis or avatars), one or more videos, or other information used by or generated by the system (e.g., information related to user interactions, such as a person that last interacted with a "Clap" button). The data structure or its associated information may be stored in any suitable location, such as within an application, on an online database, cached in a CPU or a browser or another electronic medium, a combination thereof, or any electronically accessible location. The look-up of the data structure may be performed in any suitable manner, such as according to one or more patterns, one or more functions, as a result of one or more variables, randomly, or through any other process for selecting information.

For example, FIG. 195 illustrates an exemplary display of information from data structure 19500 for performing a lookup, consistent with embodiments of the present disclosure. In FIG. 195, data structure 19500 may include any information related to one or more audio files, such as the file name, extension format, identification number, range of quantities, location, and any other information related to the one or more audio files. For example, audio file 19501 ("Single Clap") may have an identification 19503 and a location 19505 associated with it as defined by data structure 19500. If a processor receives under six clap signals from differing users, the corresponding audio file 19501 may be called for playback. If clap signals from between six and nine users are received, the audio file associated with audio file 19507 may be called for playback. When 10-20 clap signals are received, the audio file associated with the Medium Group Clap 19509 may be called. Similarly, when the parameters for a Large Group Clap 19511 and a Group Cheer 19513 are met, the corresponding audio files may be called. The process may be dynamic in that, as the number of clap signals received in a particular period grow, succeeding corresponding files may be called. The files may be played in an overlapping manner, such that a former fades as a later begins to provide a more natural transition between file playback. While FIG. 195 is illustrated by way of example only for clapping, similar files may be employed for laughing files and for any other sound or form of human expression. In addition, the ranges provided are exemplary only, and can depend on design choice. The ranges may also be dynamic in that they adjust to the size of an audience. For example, if the total audience size is 35, the most significant response (Group Cheer 19513) in FIG. 195 may be keyed to an upper range tied to the audience size of 35, and the other files may be accordingly scaled downwardly. Similarly, if the audience size is 350, the most significant response (Group Cheer 19513) in FIG. 195 may be tied to a much larger audience response. Depending on design choice, the system may also treat multiple button activations differently. For example, in some systems, a group of sequential pushes, in a predetermined time window, by the same individual might be counted separately. In other systems, the same group of sequential pushes by the same individual in the same time window may be counted as a single activation. Even in systems that count multiple pushes by the same individual, there may be a limit. For example, after three pushes, subsequent pushes may be ignored until a time window elapses. In yet other embodiments, rather than providing discrete files corresponding to a specific range of button presses, combinations of files may be played simultaneously. For example, in the example of FIG. 195, in lieu of a Large Group Clap 19511, as the signals received begin to exceed 20, Small Group Clap file 19507 might be played simultaneously with Large Group Clap file 19511. Additionally, or alternatively, instead of a file changing as the number of signals increase, audio playback volume may increase, or other sound characteristics of the file may be changed. It is to be understood that the information described above is provided for illustration purposes only, as the data structure may include any other information associated with one or more audio files. Moreover, the examples are not limited to clapping. Multiple forms of expression may be played back separately or simultaneously.

The audio file selected from the data structure may be associated with an audio identity, consistent with disclosed embodiments. An audio identity may a type of sound such as a clap, laugh, cheer, or any other form of expression. The audio identity may correspond to one or more sound files such as a single clap, multiple claps, a standing ovation, a crowd cheer, laughing, a combination thereof, or any other type of sound. The audio file may also be associated with a determined quantity of non-audio signals received, as described herein. A quantity may include one of more specific amounts, one or more ranges of amounts, one or more sets of amounts, a combination thereof, or any other arrangements of amounts. In some embodiments, a quantity may be stored in the data structure of may be retrieved using information in the data structure. In some embodiments, for example, the audio-related data structure may contain information about a plurality of audio files each associated with a common audio identity, wherein each of the plurality of audio files may correspond to a differing quantity of non-audio signals. For example, a common audio identity may be clapping, and a plurality of audio files may include, for example, a single clap, a small group clap, a medium group claim, a large group clap and a group cheer, as depicted in FIG. 195. The names of the file designations, the audio quality associated with them, and the range of triggering responses may differ, depending on design choice. Accordingly, when the system receives five non-audio signals, it may select the single clap sound file; and when the system receives six non-audio signals, it may select the Small Group Clap sound file 19507, and so forth. It is to be understood that the quantities listed above are provided for illustration purposes only, and other combinations of ranges and audio files may be used. In addition, as previously mentioned, the quantity associated with an audio file may be fixed or dynamic, and may change depending on one or more variables (e.g., the number of viewers in a presentation), one or more commands (e.g., an administrator setting a specific quantity value), a combination thereof, or any other change in information.

In some embodiments, performing a lookup may include identifying a first audio file corresponding to the first group of the plurality of non-audio signals and a second audio file corresponding to the second group of the plurality of non-audio signals. A first group of non-audio signals may correspond, for example, to a series of similar non-audio signals received from a number of differing user devices. A second group of non-audio signals may correspond, for example, to a series of differing similar non-audio signals received from a number of user devices. In one example, the first group may be clap signals and the second group may be laugh signals. As a result, whenever the system receives a non-audio signal associated with the first group, the system may perform lookup to select one or more clap audio files. In addition, whenever the system receives a non-audio signals associated with the second group, the system may perform lookup to select one or more laughing audio files. The two files may be played simultaneously. In the example of the clap and laugh signals, this may result in simultaneous playback of both clapping and laughing. The audio files may be actual record files of human laughter and human clapping, or they may be simulations.

Some disclosed embodiments may involve outputting data for causing the at least one particular audio file to be played. Outputting data may include generating any information through any electronic or physical means, such as through one or more signals, instructions, operations, communications, messages, data, or any other information for transmitting information, and which may be used with one or more speakers, headphones, sound cards, speech-generating devices, sound-generating devices, displays, video cards, printers, projectors, or any other output device. In some embodiments, outputting data may include transmitting an audio file, which may be subsequently played through an output device (e.g., speaker). The audio file may be retrieved from a non-transitory readable medium (e.g., a hard drive or USB drive), through one or more downloads (e.g., from the Internet such as through Wi-Fi), through one or more functions or applications (e.g., APIs), through a wired connection (e.g., Ethernet), or through any other electrical or physical medium. In some instances, the output may be an audio file transmitted to users' devices. In other embodiments, the output may be a code that calls an audio file pre-stored on the users' devices. In still other embodiments where the code is sent, if a user's device lacks the audio file called for, the user's device may contact a remote server to retrieve the missing file. In yet other embodiments, the user's device may include a sound simulator, and the code may trigger the sound simulator to generate a desired sound. In alternative embodiments, the sound may be transmitted to a location in which a live presentation is occurring, for playback in that location. Participants who are watching the live presentation via their network access devices, would, in this instance, be presented with the selected audio file(s) together with audio of the live presentation.

For example, in FIG. 195, outputting Single Clap audio file 19501 may include downloading the audio file via the Internet from location 19505. The downloaded audio file may subsequently be electronically transmitted to one or more network access devices (e.g., a computer, smartphone, or tablet) or another output device (e.g., a speaker) to be played. Similarly, the audio file 19501 might be transmitted instead (or additionally) to a live location of a presentation, as discussed above.

In some embodiments as discussed above, outputting data may include transmitting an identification or other information associated with a location of the data file, and which may be used to thereby cause the audio file to play in its location or a different location. For example, one or more audio files may be stored in memory of a presenter's computer or other electronic device. Subsequently, as a result of a viewer interacting with a "Clap" button, the system may transmit an identification associated with a clap sound file to the presenter's computer or other electronic device, thereby causing the computer or other electronic device to generate a clapping sound. It is to be understood that other locations or methods of transmitting an information associated with audio files may be used, such as transmitting one or more URLs, online database information, samples, portions of sound files, or any other information capable of resulting in the transmission or generation of an audio file.

For example, in FIG. 195, outputting Single Clap audio file 19501 may include electronically transmitting identification 19503 to one or more network access devices (e.g., a computer, smartphone, or tablet) or another output device (e.g., a speaker). The one or more network access devices or another output device may subsequently retrieve audio file 19501 from memory or by downloading it via the Internet from location 19505.

In some embodiments, outputting may be configured to cause the at least one particular audio file to play via the presentation. As discussed above, as an alternative to causing playback to occur directly on a user's network access device, the playback may occur via the underlying presentation. For example, electronics in a lecture hall during a live presentation may cause audio to be received at that location and be merged with the presentation for transmission to the user. Alternatively, in some embodiments, outputting may be configured to cause the at least one particular audio file to play on the plurality of network access devices. For example, the audio signals (or codes to call them) may be sent to each user's device for playback. While in some embodiments all users watching the same presentation might receive the same audio files or codes to call them, that need not be the case. User experiences may differ in some embodiment depending on user preference. For example, a user might be enabled to deactivate an augmented sound track so as to avoid hearing clapping, laughing or other expressions. In other embodiments, a user might select substitute sounds for a clap, or might choose settings that limit the volume or other sound characteristics of the augmented audio track. In addition, there may be a delay between the play of two or more computers, or any other variation in the play of the sound.

In some embodiments, outputting may be configured to cause the at least one particular audio file to play via the presentation on the plurality of network access devices, as described herein. In such embodiments, the system may cause an audio file to play via the presentation and on the plurality of network access devices in the same or similar manner as described above.

In some embodiments, the outputted data may be configured to cause the first audio file and the second audio file to simultaneously play, as discussed earlier. In such embodiments, the first and second audio files may be different, similar, or the same audio files, and may be predetermined or may change based on one or more criteria, such as a specific number of selections, a specific user, a presentation, or any other information used or generated by the system. For example, upon receiving thirty non-audio signals associated with clapping and fifteen non-audio signals associated with laughing, the system may be configured to play thirty clap sound files and fifteen laugh sound files at the same time or in quick succession. The system may be configured to aggregate the received non-audio signals in a manner suitable for play, such as by adjusting a play volume based on the number of non-audio signals received. Following the example above, the system may be configured to play a single clap audio file at twice the volume of a single laugh audio file at the same time or in quick succession, since the number of received non-audio signals associated with clapping is twice the number of received non-audio signals associated with laughing. It is to be understood that other suitable ways of aggregating the received non-audio signals for simultaneously play purposes may be implemented, such as based on one or more users, presenters, presentations, rooms, times, or any other information used or generated by the system.

In some embodiments, the data structure may associate a first audio file with a first range of quantities of non-audio signals and a second audio file with a second range of quantities of non-audio signals, and when the determined quantity falls within the first range, outputting may be configured to cause the first audio file to playback. A range may include one of more specific quantities, one or more ranges of quantities, one or more sets of quantities, a combination thereof, or any other arrangements of quantities. The data structure may associate one or more audio files with one or more ranges in any organized manner, such as through one or more arrays, linked lists, records, unions, tagged unions, objects, containers, lists, tuples, multimaps, sets, multisets, stacks, queues, libraries, tree graphs, web graphs, or any other collection of information defining a relationship between an audio file and a range, as described above. For example, the data structure may associate a clap sound file with a range of one to ten activations of a "Clap" button, and may associate an applause sound file with eleven or more activations of the "Clap" button. Subsequently, when a quantity of activations of the "Clap" button is determined to be five, the system may select the clap sound file and may cause it to be transmitted or played. Conversely, when the quantity of activations of the "Clap" button is determined to be fifteen, the system may select the applause sound file and may cause it to be transmitted or played.

For example, in FIG. 195, one or more audio files, such as "Single Clap" audio file 19501, may include a "Range" variable 19517 corresponding to a quantity of non-audio signals for causing the system to playback the file. As an illustration, "Single Clap" audio file 19501 may have a range 19515 of "1-5" in data structure 19500, resulting in playback of audio file 19501 when the quantity of non-audio signals received is five or fewer.

In some embodiments, the at least one processor may be configured to maintain a count of a quantity of actively connected network access devices. The count may be generated or maintained using one or more aggregating operations, mathematical counters, logical rules, or any other method of performing arithmetic computations. For example, the system may include a count variable that is increased by one when a network access device (e.g., laptop, smartphone, or tablet) connects to the system, and is decreased by one when a network access device disconnects from the system. The at least one processor may be further configured to compare a number of received non-audio signals in a particular time frame with the count, consistent with disclosed embodiments. The number of received non-audio signals within a particular time frame may be compared with the count using one or more instructions, signals, logic tables, logical rules, logical combination rule, logical templates, or any operations suitable for comparing data. The specific time frame may be one or more milliseconds, seconds, minutes, hours, days, presentation(s), slides, scenes, a combination thereof, or any other discrete period for processing non-audio signals. The at least one processor may be further configured to select the at least one particular audio file to be played as a function of a correlation between the count and the number of non-audio signals received, consistent with disclosed embodiments. For example, the system may be configured to select a single clap audio file when the number of non-audio signals received is less than half of the count of actively connected network access devices. Similarly, the system may be configured to select a crowd cheer audio file when the number of non-audio signals received is equal to or greater than half of the count of actively connected network access devices. These are just two examples. The correlation may be based on design parameters of the system left to the system designer.

Other proportions and correlations may be used, such as those based on one or more specific users, presenters, presentations, locations, or any other information available to the system. In some embodiments, for example, the correlation may be a proportion of non-audio signals to the count, and as the proportion increases the output may be configured to cause an increase in a volume of play of the selected audio file. For example, the system may be configured to play the selected audio file at one-hundred percent volume when the number of non-audio signals received is equal to the count of actively connected network access devices. Similarly, the system may be configured to play the selected audio file at fifty percent volume when the number of non-audio signals received is equal to half the count of actively connected network access devices. So, for example, if half of a group of participants in a 300 person presentation press their clap buttons in a common time frame, the audio output may be equal to when half the participants in a 400 person presentation do the same. Again, this is just an example, and the system response parameters may be selected by the system designer within the scope of this disclosure. Other percentages and volumes may be used, as would be apparent to those having ordinary skill in the art. As a further example, in some embodiments, the selection of the at least one audio file may be a function of the proportion. For example, the system may be configured to play a single clap audio file when the number of non-audio signals received is less than half the count of actively connected network access devices. Similarly, for example, the system may be configured to play an applause audio file when the number of non-audio signals received is equal to or greater than half the count of actively connected network access devices. Other percentages and audio files may be used, as would be apparent to those having ordinary skill in the art.

In some embodiments, the at least one processor may be configured to receive an additional non-audio augmentation signal from an administrator to cause a playback of an audio file different from the particular audio file. An administrator may be any individual, entity, or program responsible for the configuration and/or reliable operation of the system, such as one or more individuals, entities, or programs associated with one or more applications, networks, databases, security functions, websites, computers, presentations, a combination thereof, or any other part of the system. For example, during particular times of a presentation, such as at the end of a presentation, when the particular audio file to play would otherwise be a small group clap audio file corresponding to the received non-audio signals, an administrator (e.g., the presenter) may cause an applause or a standing ovation audio file to play. Or if the presenter tells a joke that does not receive significant laughs, the presenter may effectively override the audience's response and manually cause a heightened laugh track to play through, for example, an augmented soundtrack button on the presenter's (or other administrator's display). In some embodiments, an administrator may stop the playback of an audio file altogether, such as when a laugh sound would play during an otherwise serious part of a presentation or during another inappropriate time. In this manner, the administrator may intervene when required to simulate or dimmish audience participation. In addition, an administrator may have the ability to perform functions other than those associated with selecting an audio file for playback, such as volume control, banning or muting users, adjusting limits or other thresholds (e.g., a minimum number of interactions needed to cause an audio file to play), or any other functions related to the system. It is to be understood that an administrator need not be a person but may include a program configured to automatically perform any desired tasks, including those mentioned above.

For example, FIG. 196 illustrates an administrator control panel 19600, consistent with embodiments of the present disclosure. In FIG. 196, administrator control panel 19600 may include one or more interactive elements, such as "Volume" control 19601, "Minimum claps" control 19603, and "Clap" control 19605. "Volume" control 19601 may allow the administrator to adjust the volume of audio played (e.g., claps) by setting a slide to a desired location. "Minimum claps" control 19603 may allow the administrator to adjust a threshold number of clap activations required to trigger one or more events, such as playback of a clapping audio file. "Clap" control 19605 may allow the administrator to cause one or more audio files, such as a clapping audio file, to repeat over a time period, thereby allowing the administrator to simulate audience participation. As can be appreciated from FIG. 196, other actions and information may be available to administrators as suitable for the presentation or another context.

Some embodiments may involve causing both the at least one particular audio file and graphical imagery to be presented via the plurality of network access devices, consistent with disclosed embodiments. A graphical imagery may include one or more pictures, text, symbols, graphical interchange format (GIF) pictures, Cascading Style Sheets (CSS) animations, video clips, films, cartoons, avatars, static or animated stickers, static or animated emojis, static or animated icons, a combination thereof, or any other visual representations. The graphical imagery may be presented using one or more computer screens, mobile device screens, tablets, LED displays, VR or AR equipment, a combination thereof, or any other display device. In some embodiments, for example, the graphical imagery may include an emoji. For example, the system may be configured to output an emoji of hands clapping or a laughing emoji through one or more network access devices (e.g., computers, smartphones, or tablets).

For example, FIG. 197 illustrates an exemplary network access device display 19700 for presenting one or more graphical imageries, consistent with embodiments of the present disclosure. In FIG. 197, display 19700 may be used to present a presentation as disclosed herein. As a result of an audience member interacting with one or more substitute audio buttons, such as "Clap" button 19401 or clapping emoji 19403, in FIG. 194, display 19700 in FIG. 197 may be configured to display a graphical image in the form of a clapping emoji 19701. As can be appreciated from FIG. 197, display 19700 may present other graphical imagery, such as one or more avatars, heart emojis, firecracker emojis, or any other visual representation as a result of the same or different interaction.

In some embodiments, the graphical imagery may be correlated to the audio file. The term "correlated" may refer to any mutual relationship or connection between the graphical imagery and the audio file. For example, the system may be configured to output an emoji of hands clapping when a clapping sound is outputted. As a further example, the system may be configured to output an animated graphic of glasses clinking when an audio file of glasses clinking is played. As yet a further example, the system may be configured to output a video clip of fireworks when a fire crackling sound is outputted. In addition, the system may also be configured to alter a size, animation, speed, or other attribute of the graphical imagery. For example, the system may cause the graphical imagery to become an animated clap GIF or a larger clap emoji when a user interacts with the clapping button in rapid succession.

For example, FIG. 198 illustrates another exemplary network access device display 19800 for presenting one or more graphical images, consistent with embodiments of the present disclosure. In FIG. 198, display 19800 may include one or more graphical images, such as clapping emojis 19801 and 19803 and avatar 19805. As can be seen from comparing clapping emoji 19801 and clapping emoji 19803, the system may be configured to alter one or more attributes of the graphical images, in this example size, as a result of one or more conditions. For example, clapping emoji 19801 may start at a small size and progressively become as large as clapping emoji 19803 over time; or its size may be adjusted as a result of one or more users rapidly interacting with a simulated audio button, such as "Clap" button 19401 or clapping emoji 19403 in FIG. 194.

In some embodiments, the graphical imagery may correspond to activations of graphical imagery buttons on a plurality of network access devices. The term "graphical imagery buttons" may refer to any interactive element, such as one or more buttons, icons, texts, links, check boxes, radio button, slides, spinners, or a combination thereof, that may include one or more graphical images as defined above. For example, the system may be configured to output an emoji of hands clapping when a user interacts with a "Clap" button. As a further example, the system may be configured to output an animated graphic of glasses clinking in response to a user interacting with a "Cheers" button. As yet a further example, the system may be configured to output a video clip of fireworks when a user interacts with a "Fire" button.

In some embodiments, the graphical imagery may reflect identities of a plurality of individuals associated with the plurality of network access devices. An individual may be any user or group of users associated with one or more network access devices (e.g., computer, smartphone, or tablet), user identifications, user accounts, Internet Protocol (IP) addresses, or any other suitable method of differentiating users. For example, the system may be configured to output one or more avatars, images, video clips, alphabetical characters, numbers, a combination thereof, or any other visual element corresponding to a user. This may occur as a result of a user interacting with one or more elements (such as a "Clap" button), at regular intervals, randomly, based on one or more variables, a combination thereof, or at any other suitable times.

For example, in FIG. 198 display 19800 may include one or more graphical images reflecting an identity of an individual, such as avatar 19805. The system may be configured to present the identity, in this case a circular avatar, as a result of one or more conditions. For example, display 19800 may display avatar 19805 as a result of one or more user interactions with a simulated audio buttons, such as "Clap" button 19401 or clapping emoji 19403 in FIG. 194.

FIG. 199 illustrates a block diagram of an example process 19900 for performing operations for causing variable output audio simulation as a function of disbursed non-audio input, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 19900 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 190 to 198 by way of example. In some embodiments, some aspects of the process 19900 may be implemented as software (e.g., program codes or instructions) that are stored in a memory (e.g., the memory portion 122 in FIG. 1) or a non-transitory computer-readable medium. In some embodiments, some aspects of the process 19900 may be implemented as hardware (e.g., a specific-purpose circuit). In some embodiments, the process 19900 may be implemented as a combination of software and hardware.

FIG. 199 includes process blocks 19901 to 19907. At block 19901, a processing means (e.g., the processing circuitry 110 in FIG. 1) may receive over a network, during a presentation, from a plurality of network access devices, a plurality of non-audio signals corresponding to activations of substitute audio buttons, each of the plurality of non-audio signals having an audio identity (e.g., as with audio simulation system 19300 in FIG. 193). The presentation may include for example, a broadcast over any platform, such as a video conference, audio conference, group chat, interactions on a shared networked platform, or any other mechanism that permits group interactions. In such group interactions, participants access the interaction though network access devices as described earlier. Those network access devices may be provided interactive buttons, provided for example, via a downloaded application or a web application. The interactive buttons may include substitute audio buttons. The buttons may be considered "substitute" because instead of clapping or laughing, the user might push a corresponding button. Clapping and laughing, may each be considered a separate audio identity. During a presentation watched by a group, a number of differing viewers or participants may simultaneously press (or press during a common timeframe) a clapping button, for example. This in turn, may cause the user's network access device to transmit a non-audio signal reflective of an intent to clap. When multiple users do the same, the plurality of non-audio signals may correspond to a common audio identity (in this example, clapping). In some embodiments, at least a first group of the plurality of non-audio signals may have a first audio identity that differs from a second audio identity of a second group of the plurality of non-audio signals. For example, non-audio clap and laugh signals can be received in a common time frame.

At block 19903, the processing means may process the received plurality of non-audio signals to determine a quantity of non-audio signals corresponding to a specific audio identity. For example, in a common time frame, the processor may determine that fifteen users sent non-audio clap signals. Processing those signals may include counting them. In some embodiments, processing may include counting a first number of signals in the first group of the plurality of non-audio signals (e.g., claps) and counting a second number of signals in the second group of the plurality of non-audio signals (e.g., laughs). In some embodiments, the processing means may limit a number of non-audio signals processed from each network access device within a particular time frame. In some embodiments, the limit may be a single non-audio signal per unit of time. In some embodiments, the processing means may process a plurality of non-audio signals processed from each network access device within a particular time frame.

At block 19905, the processing means may perform a lookup in an audio-related data structure to select at least one particular audio file associated with the audio identity and the determined quantity (e.g., as with data structure 19500 in FIG. 195). In some embodiments, the audio-related data structure may contain information about a plurality of audio files each associated with a common audio identity, wherein each of the plurality of audio files may correspond to a differing quantity of non-audio signals. For example, if a first number of non-audio signals are received corresponding to claps, a corresponding audio file may be selected that is different from the file that would have been selected had a larger number of non-audio files have been received. In some embodiments, performing a lookup may include identifying a first audio file corresponding to the first group of the plurality of non-audio signals and a second audio file corresponding to the second group of the plurality of non-audio signals.

At block 19907, the processing means may output data for causing the at least one particular audio file to be played. In this way, the presentation may become participatory in that the viewers' collective reactions can be aggregated and shared with the group. When a group of viewers all send no audio clapping signals, their collective response may trigger a corresponding file to be played back for all participants to hear. The file may be played through each network access device separately or may be played via the presenters' (or some other central) device. Thus, in some embodiments, outputting may be configured to cause the at least one particular audio file to play via the presentation. In some embodiments, outputting may be configured to cause the at least one particular audio file to play on the plurality of network access devices. In some embodiments, outputting may be configured to cause the at least one particular audio file to play via the presentation and on the plurality of network access devices. In some embodiments, the outputted data may be configured to cause the first audio file and the second audio file to simultaneously play. In some embodiments, the data structure may associate a first audio file with a first range of quantities of non-audio signals and a second audio file with a second range of quantities of non-audio signals, and when the determined quantity falls within the first range, outputting may be configured to cause the first audio file to playback.

In some embodiments, the processing means may maintain a count of a quantity of actively connected network access devices, to compare a number of received non-audio signals in a particular time frame with the count, and to select the at least one particular audio file to be played as a function of a correlation between the count and the number of non-audio signals received. In some embodiments, the correlation may be a proportion of non-audio signals to the count, and as the proportion increases the output may be configured to cause an increase in a volume of play of the selected audio file. In some embodiments, the selection of the at least one audio file may be a function of the proportion.

In some embodiments, the processing means may receive an additional non-audio augmentation signal from an administrator to cause a playback of an audio file different from the particular audio file (e.g., such as by using administrator panel 19600 in FIG. 196).

In some embodiments, the processing means may cause both the at least one particular audio file and graphical imagery to be presented via the plurality of network access devices (e.g., clapping emoji 19701 in FIG. 197). In some embodiments, the graphical imagery may be correlated to the audio file. In some embodiments, the graphical imagery may correspond to activations of graphical imagery buttons on a plurality of network access devices. In some embodiments, the graphical imagery may reflect identities of a plurality of individuals associated with the plurality of network access devices (e.g., avatar 19805 in FIG. 198).

Consistent with disclosed embodiments, systems, methods, and computer readable media for generating high level summary tablature based on lower level tablature are disclosed. Computerized systems and methods for generating high level summary tablature provides several advantages over extant systems and methods that rely on inefficient and inaccurate processes for determining similarity in tablature data. Extant systems and methods for determining a similarity in data, for example, may fail to analyze data types, data content, or table structure information when making such a determination. Extant approaches, moreover, may require a user to manually identify similar information. In addition, extant approaches may fail to identify data as similar, or may incorrectly identify data as similar, due to a lack of analysis of relevant information. The disclosed systems and methods, on the other hand, may perform semantic analysis of data associated with lower level tablature to determine a similarity and to subsequently aggregate the similar data in a streamlined manner. In addition, the disclosed systems and methods may present a summary of the similar data, allowing a user to view the aggregated data in a more convenient manner than with extant systems and methods. Additionally, the disclosed systems and methods may automatically generate an indication of the similarity consolidation, providing an intuitive representation of the similarity. Accordingly, the systems and methods disclosed herein may provide more seamless processes to aggregate similar data than with extant approaches. Further, the disclosed computerized systems and methods may provide more robust and accurate processes to identify similar data than with extant systems and methods.

The systems and methods described herein may be implemented with the aid of at least one processor or non-transitory computer readable medium, such as a CPU, FPGA, ASIC, or any other processing structure(s) or storage medium, as described herein. As used herein, tablature may refer to any structure for presenting data in an organized manner, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. When used in conjunction with a workflow management application, tablature may include any information associated with one or more tasks, such as one or more status values, projects, countries, persons, teams, progresses, a combination thereof, or any other information related to a task.

For example, FIGS. 200A and 200B, illustrate exemplary tablature 20000*a* and 20000*b*, consistent with embodiments of the present disclosure. In some embodiments, tablature 20000*a* and 20000*b* and other information discussed in connection with other figures may be presented using a computing device (e.g., computing device 100 illustrated in FIG. 1) or software running thereon. The presentation may occur via a display associated with computing device 100 or one or more of the user devices 220-1 to 220-*m* in FIG. 2. As shown in FIGS. 200A and 200B, tablature 20000*a* and 20000*b* may include multiple rows and columns with cells at intersections of rows and columns. In the embodiment shown in FIGS. 200A and 200B, tablature 20000*a* and 20000*b* may include information associated with one or more tasks, such as "Task 1," "Task 2," and "Task 3." Each cell in tablature 20000*a* and 20000*b* may include information associated with the task with which it is associated, such as links, persons, status, date, text, timeline, tags, numbers, formulas, checks, ratings, files, votes, phones, time tracking, multi-selection or dropdown information, emails, groups, and any other suitable information, as shown in FIGS. 200A and 200B. Tablature may contain other information associated with a task, or any other kind of information not related to tasks or workflow management information.

A high level summary tablature may be utilized to present data derived from one or more other tablature or other sources of data, such as one or more graphical representations, dashboards, widgets, tables or tabulations, flowcharts, maps, bar charts, circle charts, pie charts, alphanumeric characters, symbols, pictures, a combination thereof, or any other content of information. A summary tablature may include information from one or more sources that is in a same or a condensed manner as compared to the one or more sources. The summary information may be identical to information contained in the source or may be shortened, abbreviated, modified, or otherwise altered while maintaining meaning and/or context. For example, in embodiments where summary tablature represents data contained in one or more source tablature, a cell in the summary tablature may depict data contained in cells in each of the one or more source tablature, such as by combining one or more task names, statuses, deadlines, client information, projects, persons, teams, progresses, a combination thereof, or any other information contained in the one or more source tablature. In some embodiments, the summary tablature may be presented as a combination of graphical and alphanumeric indications.

For example, FIG. 201 illustrates exemplary summary tablature 20100, consistent with embodiments of the present disclosure. By way of example only, summary view 20100 may include a depiction of a battery 20101 that represents overall progress information of lower level tablature (not shown in FIG. 201), a line chart 20103 that represents information of planned progress versus actual progress extracted from the lower level tablature, and a bar chart 20105 that represents information of status by week extracted from the lower level tablature.

The depiction of a battery 20101 shows a battery-shape representation that consolidates all of the statuses of the tasks included in the lower level tablature, such as "done," "in progress," "stuck," "waiting," "delayed," or any other status value in the lower level tablature. As illustrated in this example, the depiction of a battery 20101 includes the text "32.5% done" reflecting that 32.5% of the tasks associated with the statuses are "Done." That is, of all the tasks included in the lower level tablature, 32.5% are completed. This text may be a default or may be configured to present the percentage makeup or any of the status values in the lower level tablature.

The exemplary line chart 20103 shows two lines, a line of black dots and a line of circle dots. Each black dot of the line of black dots may represent a planned progress of a task included in the lower level tablature, and each circle dot of the line of circle dots may represent an actual progress of a task included in the lower level tablature. The line chart may be a default or may be configured according to user preference.

The exemplary bar chart 20105 shows five bars, each bar including one or more statuses associated with a single week (e.g., the week of "2020-02-12," the week of "2020-02-18," and so on). That is, each bar may represent all the statuses updated or changed within one week for their associated tasks. The bar chart may be a default or may be configured according to user preference.

The at least one processor may be configured to electronically access first data associated with a first board, consistent with disclosed embodiments. A board may include a table with items (e.g., individual items presented in horizontal rows) defining objects or entities that are managed in the platform (such as task, project, client, deal, or other information), as discussed above. A board may include two or more different boards or tables, or may directly or indirectly access data from one or more other boards, tables, or other sources. Electronically accessing information may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting or otherwise modifying information directly or indirectly from the board.

For example, FIG. 202, illustrates an exemplary first board 20200 the data of which may be electronically accessed, consistent with embodiments of the present disclosure. As shown in FIG. 202, first board 20200 may include a table having multiple horizontal rows, such as rows 20201 representing "Task 1," "Task 2," and "Task 3." Each row in first board 20200 may include information associated with each task, such as "Due Date" column 20203 representing a deadline of the task, "Person" column 20205 representing individuals associated with the task, and "Status" column 20207 representing a current condition of the task. First board 20200 may include other information associated with a task, or any other kind of information not related to tasks or workflow management information.

The at least one processor may be configured to electronically access second data associated with a second board, consistent with disclosed embodiments. Accessing second data associated with a second board may be done in the same or similar manner as accessing first data associated with a first board, as discussed above. In some embodiments, the second board may be the same as the first board, and may include two or more different boards or tables. The first board and the second board may be associated with the same or different application, environment, user, or any other entity or sub-system of the system. For example, in some embodiments, the first board and the second board may belong to the same user. In other embodiments, the first board may be associated with a first user, and the second board may be associated with a second user. In other embodiments, a board may be associated with two or more users, and each user may add, edit, or delete information as desired, resulting in a first board and a second board that are variations of one another.

For example, FIG. 203, illustrates an exemplary second board 20300 the data of which may be electronically accessed, consistent with embodiments of the present disclosure. In FIG. 203, second board 20300 may include a table comprising multiple horizontal rows, such as rows 20301 representing "Task 1," "Task 2," and "Task 3." Each row in second board 20300 may include information associated with each task, such as "Due Date" column 20303 representing a deadline of the task, and "Status" column 20307 representing a current condition of the task. Second board 20300 may include other information associated with a task, or any other kind of information not related to tasks or workflow management information. As can be appreciated from comparing FIG. 202 with FIG. 203, first board 20200 and second board 20300 may include the same, similar, or different information. In FIGS. 202 and 203, for example, both boards include due date and status information, as represented by "Due Date" columns 20203 and 20303 and "Status" columns 20207 and 20307. However, only first board 20200 in FIG. 202 includes information on individuals associated with a task, as represented by "Person" column 20305.

In some embodiments, the first data and the second data may include row headings. In such embodiments, the first board and the second board may include one or more tablature having one or more rows having one or more headings defining or indicating a category or attribute associated with the information in that row. A "row," may refer to one or more of a horizontal presentation, a vertical presentation, or both, as discussed above. For example, in embodiment where the first board and the second board include workflow management information, vertical or horizontal rows may have headings associated with a task such as a name, status, project, country, person, team, progress, or any other feature or characteristic that may be associated with the information associated with a particular row.

For example, in FIGS. 202 and 203, first board 20200 and second board 20300 may include row headings 20201 and 20301, respectively. As illustrated in FIGS. 202 and 203, each row heading may be associated with an individual task in a horizontal row, such as "Task 1," "Task 2," and "Task 3." A row heading may also be associated with a vertical row or column, however, such as the "Due Date" row heading for columns 20203 and 20303, the "Person" row heading for column 20205, and the "Status" row heading for columns 20207 and 20307.

In some embodiments, the first data and the second data may include status information. Status information may refer to any state or condition associated with the first data and the second data, such as "done," "in progress," "stuck," "waiting," "delayed," or any other information indicating a current state or condition. In embodiments where the first board and the second board include workflow management information, the status information may be associated with one or more tasks, projects, goals, clients, deadlines, targets, or any other data for which a state or condition would be desirable.

For example, in FIGS. 202 and 203, first board 20200 and second board 20300 may include status information 20207 and 20307, respectively. As illustrated in FIGS. 202 and 203, status information may represent a current state of an individual task, such as "Done," "Working on it," and "Stuck." Other statuses or labels may be used depending on the task or other information included in the first board and the second board.

The at least one processor may be configured to perform electronic semantic analysis to identify a portion of the first data associated with the first board and a portion of the second data associated with the second board that share a similarity, consistent with disclosed embodiments. Semantic analysis involves a computer process for drawing meaning from text. It may involve identifying relationships between individual words in a particular context within sentences, paragraphs, or whole documents by electronically analyzing grammatical structure and identifying relationships between particular words in a particular context. After semantic analysis is performed on first data in a first board and second data in a second board, the at least one processor can compare the results to determine a similarity. In some embodiments, semantic analysis may be performed by analyzing a data type associated with the first data and the second data. Data types may include text, numbers, calendar information, formulas, time, files, multi-select data, tags, check boxes, a combination thereof, or any other attribute or characteristic of information. In such embodiments, the system may determine whether the data type of the first data is the same or similar to the data type of the second data. For example, the first data may include one or more cells with a range of dates associated with a timeline, such as "December 8-February 12," and the second data may also include one or more cells with a range of dates associated with a timeline, such as "December 8-February 18." In such cases, the system may determine that the one or more timeline cells in the first data and the second data share a similarity because both have the same type of data, in this case calendar information. The system may arrive at the same result if the types of data of the first data and the second data are similar, such as numbers compared to formulas, numerical strings compared to numbers, persons compared to groups, emails compared to names, and any other data types that relate to one another. Conversely, the first data may include one or more cells including status information, such as "Done," and the second data may include one or more cells including telephone numbers associated with a person, such as "+123 45 678 9123." In such cases, the system may determine that the one or more status cells in the first data and the one or more telephone cells in the second data do not share a similarity because they do not share the same data type, in this case text and numbers (although in some embodiments there may be sufficient relationship between the two to constitute a similarity). Other data types and combinations may be used, as would be understood by a person having ordinary skill in the art.

In other embodiments, electronic semantic analysis may be performed by analyzing information contained in the first data and the second data. For example, in embodiments when the first board and the second board include workflow management information, the first data and the second data may include information associated with one or more tasks, such as one or more status values, projects, countries, persons, teams, progresses, a combination thereof, or any other information related to a task. In such embodiments, the system may determine whether the information of the first data is the same or similar to the information of the second data. For example, the first data may include one or more cells with a person associated with a task, such as "J. Smith," and the second data may also include one or more cells with a person associated with a task, such as "John Smith." In such cases, the system may determine that the one or more cells in the first data and the second data share a similarity because both include the same last name, in this case "Smith" and both have names that start with a "J." The system may arrive at the same result if the information in the first data and the second data share a commonality, such as being synonymous, falling under a common category, overlapping in content (e.g., having one or more letters, numbers, or other information in common), a combination thereof, or having any other likeness in nature or relationship. For example, the first data may include one or more cells with dates associated with a deadline, such as "February 6," and the second data may also include one or more cells with dates associated with a deadline, such as "August 8." In such cases, the system may determine that the one or more deadline cells in the first data and the second data share a similarity because both information fall under a common category, in this case months. Conversely, the first data may include one or more cells associated with a status, such as "Done," and the second data may include one or more cells associated with a person associated with a task, such as "J. Smith." In such cases, the system may determine that the one or more status cells in the first data and the one or more person cells in the second data do not share a similarity because there is no correlation between the word "Done" and the word "J. Smith" (although in some embodiments there may be sufficient relationship between the two to constitute a similarity). Other relationships and combinations may be used, as would be understood by a person having ordinary skill in the art.

In other embodiments, semantic analysis may be performed by analyzing structure information associated with the first board and the second board. Structure information may include data associated with rows, column, size, intractability, inputs, outputs, signals, operations, metadata, graphical representations, a combination thereof, or any other information associated with a board. In such embodiments, the system may determine whether the structure information of the first board is the same or similar to the structure of information in the second board.

In some embodiments, for example, the identified similarity between the first data and the second data may include common status information. For example, the first board may have a row heading labeled "Status" including one or more cells associated with a status, and the second board may also have a row heading labeled "Stage" including one or more cells associated with a status. In such cases, electronic semantic analysis may determine that "status" and "stage" have similar meanings and may determine that the one or more status cells in the first board and stage cells in the second board share a similarity as a result of the similar meaning. The system may arrive at the same result if the structural information of the first board and the second board share a commonality, such as being identical, otherwise synonymous, falling under a common category, overlapping in content (e.g., having one or more letters, numbers, or other information in common), a combination thereof, or having any other likeness in nature or relationship. In some embodiments, for example, the shared similarity may include a similarity between row headings. For example, the first board may include one or more cells associated with a row heading labeled "Project Status," and the second board may include one or more cells associated with a row heading labeled "Task Status." In such cases, the system may determine that cells associated with the two row headings share a similarity because both row headings have similar information, in this case "Status" information. Conversely, the first board may have a row heading labeled "Deadline" including one or more deadline cells associated with deadlines, such as "February 9," and the second board may have a row heading labeled "Persons" including one or more person cells associated with persons, such as "J. Smith." In such cases, the system may determine that the one or more deadline cells in the first board and the one or more person cells in the second board do not share a similarity because they do not share the same row heading information, in this case "Deadline" and "Persons" (although in some embodiments there may be sufficient relationship between the two to constitute a similarity). Other structure information and combinations may be used, as would be understood by a person having ordinary skill in the art.

It is to be understood that the above-referenced ways of performing semantic analysis are provided for illustration purposes only. The system may perform semantic analysis by employing all, some, a variation of, or none of the examples provided above. A person having ordinary skill in the art may utilize other methods of performing semantic analysis without departing from the scope and spirit of the claimed invention.

The at least one processor may be configured to consolidate in a third board reflecting a similarity consolidation, the identified first portion and the identified second portion, consistent with disclosed embodiments. Similarity consolidation may include presenting information from the identified first portion and the identified second portion in the same or a condensed manner in instances where there is a semantic likeness between the two. For example, the information may be identical or may be shortened, abbreviated, modified, expressed in a synonymous or related manner, or otherwise differing while maintaining a related meaning. The third board may be a table with items (e.g., individual items presented in horizontal rows) defining objects or entities that are managed in the platform (such as task, project, client, deal, or other information), as discussed above. In embodiments where the first board and the second board include tables, for example, the third board may also include a table with the same or similar row headings and column headings as the first board and the second board.

For example, FIG. 204 illustrates an exemplary third board 20400 reflecting a similarity consolidation, consistent with embodiments of the present disclosure. In FIG. 204, third board 20400 may include a table having multiple horizontal rows, such as rows 20401 representing lower level boards associated with "Project 1," "Project 2," "Project 3," and "Project 4." Each row in third board 20400 may include information consolidated from the lower level boards, as reflected in "Tasks" column 20403 representing the consolidated tasks, "Status" column 20405 representing the status of the consolidated tasks, "Due Date" column 20407 representing the deadlines of the consolidated tasks, and "Number" column 20407 representing the total number of consolidated tasks. The data consolidated as row "Project 1" in FIG. 204 may be extracted from first board 20200 described above in connection with FIG. 202. Similarly, the data consolidated as row "Project 2" in FIG. 204 may be extracted from second board 20300 described above in connection with FIG. 203. The information on third board 20400 may represent information from lower level boards having a similarity, in this case information associated with "Status" and "Due Date" information from the first board and the second board. Conversely, third board 20400 may omit information not present in both the first board and the second board. For example, because first board 20200 in FIG. 202 contains "Person" column 20205 representing individuals associated with a task, but second board 20300 in FIG. 203 does not, third board 20400 in FIG. 204 may omit this information. In addition, as can be appreciated from FIG. 204, third board 20400 may include information associated with other boards, such as boards associated with "Project 3" and "Project 4." Consequently, third board 20400 may include other information associated with the first board and the second board, or may include any other information not related to the first board and the second board.

In some embodiments, identifying the shared similarity may include discovering a first plurality of common row headings in the first data, discovering a second plurality of common row headings in the second data, and wherein consolidating the identified similarity may include generating a singular entry in the third board consolidating the first plurality of common row headings and second plurality of common row headings. Discovering a plurality of common row headings may involve performing semantic analysis to determine whether a group of row headings in the first data share a commonalities with a group of row headings in second data as discussed above (although other suitable steps or methods may be performed to determine whether there is a commonality). For example, in embodiment where the first board and the second board include workflow management information, all tasks associated with a project in the first data and the second data may be consolidated. Subsequently, a singular entry, such as a cell, in the third board may be used to consolidate the tasks associated with the project in the first data and the second data. For example, the third board may have a row labeled "Project 1" having a cell with a total number of tasks in the first data and the second data associated with that project (e.g., "40" representing forty tasks), and the third board may also have a row labeled "Project 2" having a cell with a total number of tasks in the first data and the second data associated with that project (e.g., "30" representing thirty tasks), and so forth. Other ways of consolidating the information on the third board may be used, as discussed herein.

The at least one processor may be configured to summarize the first portion and the second portion, consistent with disclosed embodiments. Summarizing a portion may include representing it in a same or a condensed manner as compared to how it is presented in the first board and/or the second board, such as through one or more instructions, signals, logic tables, logical rules, logical combination rules, logical templates, a combination thereof, or any other operation for indicating information in a same or condensed manner as compared to its original source. In embodiments where the first board and the second board include tablature, summarizing the first portion may involve adding, editing, deleting, or otherwise modifying a variable or other information representing two or more cells in the first portion. In some embodiments, for example, summarizing the first portion and the second portion may include counting common statuses within the first portion and the second portion. For example, the at least one processor may be configured to tally a total number of cells in the first portion and the second portion associated with a "Done" status, or it may modify a variable in a data structure, database, or similar structure by the total number, or it may increase a height of a "Done" bar in a bar graph by the total number, or through any other suitable process of adding information. As a further example, the status of one-hundred tasks associated with a project may be tallied in the form of a percentage, such as representing forty "Done" tasks out of the one-hundred tasks as 40%. Other information other than status information may be summarized, such as name, project, country, person, team, progress, or any other feature or characteristic associated with the first portion and the second portion. Summarizing may be performed automatically, manually, or a combination thereof, such as a result of a mouse click, a cursor hover, a mouseover, a button press, a keyboard input, a voice command, an interaction performed in virtual or augmented reality, or any other action by a user received via the at least one processor. For example, summarizing the first portion may be performed as a result of a user interacting with a button. Additionally or alternatively, the at least one processor may automatically summarize the first portion as result of a default setting or a user preference.

The at least one processor may be configured to aggregate the summarized first portion and the summarized second portion to form an aggregated summary, consistent with disclosed embodiments. Aggregating information to form an aggregated summary may include presenting the information in a same or a condensed manner as compared to how it is presented in the first board and the second board, such as through one or more graphical representations, dashboards, widgets, tables or tabulations, flowcharts, maps, bar charts, circle charts, pie charts, alphanumeric characters, symbols, pictures, a combination thereof, or any other content of information. Generating an aggregated summary may be performed automatically, manually, or a combination thereof, such as a result of a mouse click, a cursor hover, a mouseover, a button press, a keyboard input, a voice command, an interaction performed in virtual or augmented reality, or any other action by a user received via the at least one processor, as described above.

For example, FIGS. 205A and 205B illustrate exemplary aggregated summaries 20500*a* and 20500*b*, respectively, consistent with disclosed embodiments. In FIGS. 205A and 205B, aggregated summaries 20500*a* and 20500*b* may be part of or independent from third board 20400 described above in connection with FIG. 204. As shown in FIG. 205A, aggregated summary 20500*a* may include a similarity between the first board, the second board, and any other boards (if any), which in the example of FIG. 205A may include "Status" information. For example, aggregated summary 20500*a* may depict a number of entries having a status of "Working on it," "Stuck," "Done," or none (e.g., "Empty"), as shown in FIG. 205A. Similarly, aggregated summary 20500*b* may include a similarity between one or more boards, which in the example of FIG. 205B may include "Due Date" information. For example, aggregated summary 20500*b* may depict a calendar corresponding to entries having a due date associated with "Project 1," "Project 2," and "Project 3." Other types of aggregated summaries may be generated, as discussed above.

The at least one processor may be configured to present on the third board the aggregated summary in a manner associating the aggregated summary with the similarity consolidation, consistent with disclosed embodiments. The aggregated summary on the third board may be presented through one or more mobile devices, desktops, laptops, tablets, LED display, augmented reality (AR), virtual reality (VR) display, a combination thereof, or through any other suitable device or method of depicting graphical information. Presenting the aggregated summary may include displaying the summarized first portion and the summarized second portion in a same or a condensed manner, as discussed above. In addition, presenting the aggregated summary may include displaying a similarity between the first portion and the second portion sharing the similarity, such as by including a data type, data value, structure information, or any other information used by the system to determine the similarity between the first portion and the second portion. In some embodiments, for example, the manner associating the aggregated summary with the similarity consolidation may include displaying the similarity consolidation as a row heading and the aggregated summary in a cell associated with the row heading. In such embodiments, the row heading may be represented as one or more alphanumeric characters, symbols, pictures, avatars, videos, VR or AR objects, graphs, metadata, a combination thereof, or any other suitable depiction of the similarity consolidation included in the row.

For example, in FIG. 204, third board 20400 may include row headings having cells associated with a similarity consolidation, consistent with disclosed embodiments. As an illustration only, third board 20400 may include a "Project 1" row heading associated with first board 20200 in FIG. 202 and a "Project 2" row heading associated with second board 20300 in FIG. 203. As shown in FIG. 204, third board 20400 may also include row headings "Project 3" and "Project 4" associated with other boards. Each row in third board 20400 may include one or more cells associated with a corresponding board, and which may represent at least a part of the similarity consolidation. For example, a cell in the "Project 1" row in "Tasks" column 20403 may represent consolidated tasks in the first board; a cell in "Status" column 20405 may represent consolidated status information of the tasks in the first board; a cell in "Due Date"

column 20407 may represent consolidated deadlines of the tasks in the first board; and a cell in "Number" column 20409 may represent a total number of consolidated tasks in the first board. The same information may be displayed for other boards as represented by other row headings, such as "Project 2," "Project 3," and "Project 4" row headings, as shown in FIG. 204.

The aggregated summary may be presented as a cell associated with the row heading. A cell may refer to a unit of information contained in the third board defined by the structure of the third board, such as an intersection between a horizontal row with a vertical column, intersection between a vertical row with a horizontal column, a node on a tree data structure, a node on a web chart, or any other structural unit, as defined above. The information in the cell may be represented using the same, similar, or a different form as compared the row heading, such as through one or more alphanumeric characters, symbols, pictures, avatars, videos, VR or AR objects, graphs, summary information, metadata, a combination thereof, or any other suitable depiction. In some embodiments, for example, the cell may include a numeral or a summary representation. As an illustration, the cell in the third board may include a number, such as "3" representing three tasks having a similarity; text, such as "Stuck (3)" representing three tasks having a stuck status; color representation, such as three green boxes representing three "Done" tasks; an image, such as a client's company logo representing tasks associated with that client; or any other depiction of the number of cells in the first board and the second board sharing the similarity.

For example, in FIG. 204, third board 20400 may include a column indicating a total number of data in in the first board and the second board sharing a similarity, consistent with disclosed embodiments. As an illustration only, third board 20400 may include a "Number" column 20409 indicating a total number of tasks in each board sharing a similarity. Because three tasks from each of first board 20200 in FIG. 202 and second board 20300 in FIG. 203 share a similarity, in this case "Status" and "Due Date" information, the "Project 1" and "Project 2" rows both have a "3" in "Number" column 20409. Another board associated with "Project 3" may have more tasks sharing a similarity with the first board and the second board, in this case twelve tasks indicated as a "12" in "Number" column 20409. Yet another board associated with "Project 4" may have less tasks sharing a similarity with the first board and the second board, in this case zero tasks indicated as a "0" in "Number" column 20409. Other ways of indicating a total number of data sharing a similarity may be used, as described above.

In some embodiments, the cell may include an active link, and at least one processor may be configured, upon activation of the link, to cause a display of at least one of the portion of the first data or the portion of the second data. An active link may refer to any connection, linkage, relationship, instruction, signal, logic table, logical rule, logical combination rule, logical template, or any suitable element or operation for accessing, referring, displaying, or otherwise making available the portion of the first data and/or the portion of the second data. The activation may be performed automatically, manually, or a combination thereof, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a number or a status in a cell on the third board, the at least one processor may be configured to display a fourth board including the underlying first data and the second data from which the cell on the third board was generated. In some embodiments, a user or the at least one processor may edit the portion of the first data and/or the portion of the second data directly from the display. For example, a user may modify one or more status cells in the first board by first interacting with a status summary cell in the third board, and subsequently editing the corresponding cells that are displayed as a result of the interaction.

For example, FIG. 206 illustrates an exemplary display 20601 generated as a result of an activation of a link in a cell, consistent with disclosed embodiments. Display 20601 may be overlaid on top of board 20600, which may be third board 20400 discussed above in connection with FIG. 204. In FIG. 206, cell 20603 ("Task 1" in "Project 1") may include an active link to generate display 20601, although any other cells in board 20600 may have active links. Consequently, display 20601 may be generated as a result of a user interaction, such as a mouse click, with cell 20603. Display 20601 may include information associated with tasks in the first board, although in some embodiments it may display information associated with tasks in the second board, both, or any other board(s). Display 20601 may, for example, include a "Task" column 20605 representing tasks in the first board, a "Person" column 20607 representing individuals associated with each task in the first board, a "Status" column 20609 representing status information associated with each task in the first board, and a "Progress" column 20611 representing completion information associated with each task in the first board. Other information associated with the first board may be displayed, however. In addition, a user may edit information present on display 20601.

For example, FIG. 207 illustrates another exemplary display 20701 for editing information on a third board, consistent with disclosed embodiments. Display 20701 may be overlaid on top of board 20700, which may be third board 20400 discussed above in FIG. 204. In FIG. 207, display 20701 may be generated as a result of a user interaction with a cell having an activation link in board 20700, similar to display 20601 discussed above in connection with FIG. 206. However, display 20701 in FIG. 207 may be generated as a result of another user interaction, such as by an interaction with display 20601 in FIG. 206 (e.g., "Task 1"), or through any other instruction, operation, function, or any other information received by the at least one processor. Display 20701 in FIG. 207 may include one or more interactive elements that a user may utilize to edit information on the first board, the second board, or any other board, directly. For example, a user may interact with "Person 1" cell 20703 to edit information about individuals associated with "Task 1" in the first board. A user may do the same with the "Due Date," "Status," or "Progress" information in display 20701. In this way, a user may edit information in the underlying first board and second board directly from the third board or any other aggregated summary, thereby saving time.

In some embodiments, the aggregated summary may include an indication of a number of entries that share a common status. For example, three cells associated with a "Done" status may be summarized a single cell with the number "3," or may be summarized as a bar in a bar graph that is three units in height, or as three green blocks, or through any other suitable representation. As a further example, the status of one-hundred tasks associated with a project may be summarized as a "Project Progress" cell, where each task with a "Done" status may increase the progress by one percent (e.g., forty "Done" tasks would result in a "Project Progress" of 40%). Other information other than status information may be summarized, such as name, project, country, person, team, progress, or any other feature or characteristic associated with the first portion and the second portion.

For example, in FIG. 205A, aggregated summaries 20500*a* may include an indication of a number of entries that share a common status, consistent with disclosed embodiments. As shown in FIG. 205A, aggregated summary 20500*a* may depict a number of entries having a status of "Working on it," "Stuck," "Done," or none (e.g., "Empty"). Each type of status may include a number of entries that share that status. For example, aggregated summary 20500*a* may include a "6" above the status "Working on it," indicating that six tasks in the aggregated boards are in progress; a "26" above the status "Stuck," indicating that twenty-six tasks in the aggregated boards cannot progress further; a "56" above the status "Done," indicating that fifty-six tasks in the aggregated boards are complete; and a "117" above the status "Empty," indicating that one-hundred and seventeen tasks in the aggregated boards do not have a status associated with them.

FIG. 208 illustrates a block diagram of an example process 20800 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 208. In some embodiments, the process 20800 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 200 to 207, by way of example. In some embodiments, some aspects of the process 20800 may be implemented as software (e.g., program codes or instructions) that are stored in a memory (e.g., the memory portion 122 in FIG. 1) or a non-transitory computer-readable medium. In some embodiments, some aspects of the process 20800 may be implemented as hardware (e.g., a specific-purpose circuit). In some embodiments, the process 20800 may be implemented as a combination of software and hardware.

FIG. 208 includes process blocks 20801 to 20815. At block 20801, a processing means (e.g., the processing circuitry 110 in FIG. 1) may electronically access first data associated with a first board (e.g., first board 20200 in FIG. 202). At block 20803, the processing means may electronically access second data associated with a second board (e.g., second board 20300 in FIG. 203). In some embodiments, the first data and the second data may include row headings (e.g., row headings 20201 and 20301 in FIGS. 202 and 203, respectively). In some embodiments, the first data and the second data may include status information (e.g., status information 20207 and 20307 in FIGS. 202 and 203, respectively).

At block 20805, the processing means may perform electronic semantic analysis to identify a portion of the first data associated with the first board and a portion of the second data associated with the second board that share a similarity. In some embodiments, the identified similarity between the first data and the second data may include common status information. In some embodiments, the shared similarity may include a similarity between row headings.

At block 20807, the processing means may consolidate in a third board reflecting a similarity consolidation, the identified first portion and the identified second portion (e.g., third board 20400 in FIG. 204). In some embodiments, identifying the shared similarity may include discovering a first plurality of common row headings in the first data, discovering a second plurality of common row headings in the second data, and wherein consolidating the identified similarity may include generating a singular entry in the third board consolidating the first plurality of common row headings and second plurality of common row headings.

At block 20809, the processing means may summarize the first portion. At block 20811, the processing means may summarize the second portion. In some embodiments, summarizing the first portion and the second portion may include counting common statuses within the first portion and the second portion.

At block 20813, the processing means may aggregate the summarized first portion and the summarized second portion to form an aggregated summary (e.g., aggregated summaries 20500*a* and 20500*b* in FIGS. 205A and 205B, respectively).

At block 20815, the processing means may present on the third board the aggregated summary in a manner associating the aggregated summary with the similarity consolidation. The manner associating the aggregated summary with the similarity consolidation may include displaying the similarity consolidation as a row heading and the aggregated summary in a cell associated with the row heading. The cell may include a numeral or a summary representation and may also include an active link, and wherein the at least one processor may be configured, upon activation of the link, to cause a display of at least one of the portion of the first data or the portion of the second data (e.g., displays 20601 and 20701 in FIGS. 206 and 207, respectively). In some embodiments, the aggregated summary may include an indication of a number of entries that share a common status.

Consistent with disclosed embodiments, systems, methods, and computer readable media for generating high level summary tablature based on lower level tablature are disclosed. The systems and methods described herein may be implemented with the aid of at least one processor or non-transitory computer readable medium, such as a CPU, FPGA, ASIC, or any other processing structure(s) or storage medium, as described herein.

Using computerized systems and methods for generating high level summary tablature using selections provides several advantages over extant processes that rely on cumbersome and unintuitive aggregating processes. For example, users may find it desirable to aggregate specific information on lower level tablature based on a desired use or preference. In such cases, one or more types of information of interest in two or more boards may be selected manually, automatically, or semi-automatically. Subsequently, the computerized systems and methods disclosed herein may receive the selection as input, may identify and aggregate items of interest having a similarity, and may present them in a convenient and consolidated manner. The disclosed computerized systems and methods may process and analyze any information in the lower level tablature to make this determination, including data types, data content, board data, and any other information associated with the lower level tablature. Extant systems and methods may fail to utilize selections in generating summarized information, which may fail to provide the flexibility desired by users.

Further, extant systems and methods may fail to identify items having a similarity in the selected information in a computerized manner that affords convenience to the user.

Some disclosed embodiments may be configured to electronically receive a first selection of at least one item contained on both a first board and a second board. A board may include a table with items (e.g., individual items presented in horizontal rows) defining objects or entities that are managed in the platform (such as tasks, projects, clients, deals, or other information), as discussed herein. A board may include two or more different boards or tables, or may directly or indirectly access data from one or more other boards, tables, or other sources. A selection may include any automatic, semi-automatic, or manual signal, instruction, process, logical rule, logical combination rule, template, setting, a combination thereof, or any other operation for choosing information in a board. As non-limiting examples, a selection may include a mouse click, a cursor hover, a mouseover, a button press, a keyboard input, a voice command, an interaction performed in virtual or augmented reality, a default based on a user or system setting, a combination thereof, or any other signal received via the at least one processor. A selection of data presented on the first board and/or the second board may be received through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provides a medium for exchanging data.

For example, FIG. 209, illustrates an exemplary first board 20900 the data of which may be selected, consistent with embodiments of the present disclosure. As shown in FIG. 209, first board 20900 may include a table including multiple horizontal rows, such as rows representing "Person 1," "Person 2," and "Person 3." Each row in first board 20900 may include task information associated with an individual (e.g., "Person 1" 20901) in a particular project (e.g., "Project 1"), such as status information indicated by "Done" cell 20903, deadline information indicated by "February 16" cell 20905, and task identification information indicated by "Task No. 128" cell 20907. First board 20900 may include other information associated with a task, or any other kind of information not related to tasks or workflow management information.

FIG. 210, illustrates an exemplary second board 21000 the data of which may be selected, consistent with embodiments of the present disclosure. In FIG. 210, second board 21000 may include a table including multiple horizontal rows, such as rows representing "Person 1," "Person 2," and "Person 3." Each row in second board 21000 may include task information associated with an individual (e.g., "Person 1" 21001) in a particular project (e.g., "Project 2"), such as priority information indicated by "CRITICAL" cell 21003, timeline information indicated by "February 2-8" cell 21005, and project group information indicated by "Group No. 5" cell 21007. Second board 21000 may include other information associated with a task, or any other kind of information not related to tasks or workflow management information.

As can be appreciated from comparing FIG. 209 with FIG. 210, first board 20900 and second board 21000 may include the same, similar, or different information. In FIGS. 209 and 210, for example, both boards may contain information on "Person 1," labeled as item 20901 in FIG. 209 and item 21001 in FIG. 210. In some embodiments, the at least one processor may be configured to electronically receive a selection of this item, or any other item contained on both the first board and the second board, as described above. In addition, both boards may include information on a current state of an individual's work with respect to a project, such as status information (e.g., "Done" cell 20903 in FIG. 209) and priority information (e.g., "CRITICAL" cell 21003 in FIG. 210). Both boards may also include information on one or more significant dates associated with the individual's work, such as due date information (e.g., "February 16" cell 20905 in FIG. 209) and timeline information (e.g., "February 2-8" cell 21005 in FIG. 210). However, as illustrated, the first board and the second board may include different information. For example, first board 20900 in FIG. 209 may include information on individual tasks (e.g., "Task No. 128" cell 20907), while second board 21000 in FIG. 210 may include information on project groups instead (e.g., "Group No. 5" cell 21007).

Disclosed embodiments may be further configured to electronically receive a second selection of a first type of information presented on the first board. A second selection may be received in the same or similar manner as the first selection, as discussed herein. A type of information may represent any characteristic, feature, attribute, or any aspect related to data on a board. For example, in embodiments when the first board and the second board include workflow management information, a type of information may be associated with one or more status values, projects, countries, persons, teams, progresses, a combination thereof, or any other information related to a task. It is to be understood, however, that the disclosed embodiments are not limited to any particular type of information, but may rather be used in conjunction with any suitable type of information depending on the information contained in a board or depending on any other context.

For example, in FIG. 209, a second selection of "Done" cell 20903 in first board 20900 may be electronically received by the processor, consistent with disclosed embodiments. The detection may be automatic (e.g., periodic), a result of a user interaction (e.g., a mouse click), or a combination of both, as discussed herein. In such embodiments, the first type of information associated with the second selection may be status information, since "Done" cell 20903 may be indicative of a state of a task in a cell, although any other type of information may be used depending on other information contained in first board 20900 or any other context.

In some embodiments, the first type of information may be associated with a first heading. In such embodiments, the first board and the second board may include one or more tablature having one or more headings defining or indicating a category or attribute associated with the information in that row. A heading may be depicted as text, numbers, symbols, images, avatars, videos, AR or VR objects, or any other graphical representation. A heading may be associated with one or more horizontal presentations, vertical presentations, or both, as discussed herein. For example, in embodiment where the first board and the second board include columns and rows, the columns and rows may have headings associated with their content, such as a task, name, status, project, country, person, team, progress, or any other feature or characteristic that may be associated with the information associated with a particular column or row.

For example, in FIGS. 209 and 210, first board 20900 and second board 21000 may include one or more headings. As illustrated in FIGS. 209 and 210, a heading may be associated with an individual in a horizontal row, such as "Person 1," "Person 2," and "Person 3." A heading may also be associated with a vertical column, such as the "Status," "Due Date," and "Task" headings shown in FIG. 209, or the "Priority," "Timeline," and "Group" headings shown in FIG. 210. Following the example above, the first type of information associated with the second selection of "Done" cell 20903 may be status information, which is associated with the "Status" column heading in first board 20900.

Disclosed embodiments may be further configured to electronically receive a third selection of a second type of information presented on the first board. A third selection may be received in the same or similar manner as the first and/or second selections, as discussed herein. In some embodiments, the second type of information may be associated with a second heading. The second type of information may be the same, similar, or different from the first type of information discussed herein. Likewise, the second heading may be the same, similar, or different from the first heading discussed herein.

For example, in FIG. 209, a third selection of "February 16" cell 20905 in first board 20900 may be electronically received by the processor, consistent with disclosed embodiments. In such embodiments, the second type of information associated with the third selection may be deadline information, since "February 16" cell 20905 is indicative of a significant date of a task, although any other type of information may be used depending on other information in first board 20900 or any other context. In this case, the second type of information associated with the third selection of "February 16" cell 20905 may be due date information, which is associated with the "Due Date" column heading in first board 20900.

Some disclosed embodiments may be configured to electronically receive a fourth selection of a third type of information presented on the second board. A fourth selection may be received in the same or similar manner as the first, second, and/or third selections, as discussed above. In some embodiments, the third type of information may be associated with a third heading. The third type of information may be the same, similar, or different from the first and/or second type of information discussed above. Likewise, the third heading may be the same, similar, or different from the first and/or second heading discussed above.

For example, in FIG. 209, a fourth selection of "CRITICAL" cell 21003 in second board 21000 may be electronically received by the processor, consistent with disclosed embodiments. In such embodiments, the third type of information associated with the fourth selection may be priority information, since "CRITICAL" cell 21005 is indicative of an urgency status of a task, although any other type of information may be used depending on other information in second board 21000 or any other context. In this case, the third type of information associated with the fourth selection of "CRITICAL" cell 21005 may be priority information, which is associated with the "Priority" column heading in second board 21000.

In some embodiments, the first type of information may be aggregable with the third type of information in a first aggregation, wherein the first heading may differ from the third heading. The first type of information and the third type of information may be aggregable based on a shared nature or relationship indicating a commonality between the two or more types of information, such as one or more common data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system.

For example, in FIGS. 209 and 210, a first type of information associated with "Done" cell 20903 in FIG. 209 may be aggregable with a third type of information associated with "CRITICAL" cell 21003 in FIG. 210, consistent with disclosed embodiments. In this non-limiting example, because the type of information of "Done" cell 20903 in FIG. 209 is status information, and the type of information of "CRITICAL" cell 21003 in FIG. 210 is priority information, these two types of information may be aggregable despite having differing headings since they both relate to a state of a task associated with an individual.

Some disclosed embodiments may be further configured to determine a similarity between the first type of information and the third type of information. A similarity may be determined by identifying relationships between the first type of information and the third type of information, such as by analyzing data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system. Such analysis, as described herein and as applicable to other similar instances of analysis, may be performed by artificial intelligence or any other process or mechanism for similarity determination. In some instances, for example, a relational data structure may associate differing words in order to aid in similarity determination.

In some embodiments, the similarity may be based on a position. A position may relate to any relational placement with respect to surrounding information, such as placement in a column, row, board, widget, graph, graphical representation, or any other structural data arrangement. In embodiments where the similarity may be based on a position, the system may determine that two types of information share a similarity as a result of having the same or similar position in the structural data arrangement. As a non-limiting example, in embodiments where the first board and the second board include tablature having rows and columns, the system may determine that the first type of information and the third type of information share a similarity if they are located in the same column in the first board and the second board, respectively. Other positional and structural information may be used, as would be understood by a person having ordinary skill in the art.

For example, in FIGS. 209 and 210, the system may determine that the type of information associated with "Done" cell 20903 in FIG. 209 may share a similarity with the type of information associated with "CRITICAL" cell 21003 in FIG. 210 based on position. In this non-limiting example, because the column containing "Done" cell 20903 in FIG. 209 is the second left-most column in board 20900, and the column containing "CRITICAL" cell 21003 in FIG. 210 is also the second left-most column in board 21000, the system may determine that these two columns share a similarity based on position.

In some embodiments, the similarity may be based on a data type. Data types may include text, numbers, calendar information, formulas, time, files, multi-select data, tags, check boxes, a combination thereof, or any other attribute or characteristic of information. In embodiments where the similarity may be based on a data type, the system may determine that two types of information share a similarity as a result of having the same or similar data types. For example, the first type of information may include one or more cells with a range of dates associated with a timeline, such as "December 8-February 12," and the third type of information may also include one or more cells with a range of dates associated with a timeline, such as "December 8-February 18." In such cases, the system may determine that the two types of information share a similarity because both have the same type of data, in this case calendar information. The system may arrive at the same result if the two types of information are similar, such as numbers compared to formulas, numerical strings compared to numbers, persons compared to groups, emails compared to names, and any other data types that relate to one another. Conversely, the first type of information may include one or more cells including status information, such as "Done," and the third type of information may include one or more cells including telephone numbers associated with a person, such as "+123 45 678 9123." In such cases, the system may determine that the two types of information do not share a similarity because they do not share the same data type, in this case text and numbers (although in some embodiments there may be sufficient relationship between the two to constitute a similarity). Other data types and combinations may be used, as would be understood by a person having ordinary skill in the art.

For example, in FIGS. 209 and 210, the system may determine that the type of information associated with "February 16" cell 20905 in FIG. 209 may share a similarity with the type of information associated with "February 2-8" cell 21005 in FIG. 210 based on data types. In this non-limiting example, because "February 16" cell 20905 in FIG. 209 contains calendar data, and "February 2-8" cell 21005 in FIG. 210 also contains calendar data, the system may determine that these two types of information share a similarity based on data type.

In some embodiments, the similarity may be based on a historical usage. Historical data may include any information previously utilized or generated by the system, such as one or more previous signals, instructions, operations, functions, database retrievals, inputs received from one or more users, user preferences, default settings, interactions with a board or tablature, graphical representations, or any other information associated with the system. In embodiments where the similarity may be based on a historical usage, the system may determine that two types of information share a similarity as a result of having previously been subject to the same or similar historical usage. For example, if the system previously aggregated the first type of information and the third type of information, such as in the form of a summary, graphical representation (e.g., charts), or any other aggregation, the system may determine that the two types of information share a similarity as a result of this historical information. In other embodiments, the system may determine that two types of information share a similarity because a user previously aggregated them, such as by combining the two types of data, generating graphical representations (e.g., charts) of them, or selecting them to be similar as a user preference. Other historical usages may be used, as would be understood by a person having ordinary skill in the art.

In some embodiments, the similarity may be based on a logical rule. A logical rule may be any function for causing the system to perform an action on information contained in a board, such as one or more notification generation rules, sound generation rules, data generation rules, data aggregation rules, column rules, row rules, default rules, logical templates, settings, operations, instructions, signals, or any other electronic prompt for causing the system to perform an action. In embodiments where the similarity may be based on a logical rule, the system may determine that two types of information share a similarity as a result of being subject to the same or similar logical rule. As a non-limiting example, in embodiments where the system generates one or more notifications (e.g., email messages) to a particular user as a result of a change in two types of information, the system may determine that the two types of information share a similarity as a result of being subject to the same notification generation rule. Other logical rules may be utilized depending on the information contained in the first board and the second board, and any inputs received by the system, as would be understood by those having ordinary skill in the art.

As an illustration, in FIGS. 209 and 210, the system may determine that the type of information associated with "Done" cell 20903 in FIG. 209 may share a similarity with the type of information associated with "CRITICAL" cell 21003 in FIG. 210 based on a logical rule. If the system is configured to generate an email notification to "Person 1" as a result of a change in status information (e.g., "Stuck") and a change in priority information (e.g., "CRITICAL"), the system may determine that these two types of information share a similarity.

Some disclosed embodiments may involve electronically receiving a fifth selection of a fourth type of information presented on the second board. A fifth selection may be received in the same or similar manner as the first, second, third, and/or fourth selections, as discussed above. In some embodiments, the fourth type of information may be associated with a fourth heading. The fourth type of information may be the same, similar, or different from the first, second, and/or third type of information discussed above. Likewise, the fourth heading may be the same, similar, or different from the first, second, and/or third heading discussed above.

For example, in FIG. 209, a fifth selection of "February 2-8" cell 21005 in second board 21000 may be electronically received by the processor, consistent with disclosed embodiments. In such embodiments, the fourth type of information associated with the fourth selection may be timeline information, since "February 2-8" cell 21005 is indicative of a range of significant dates of a task, although any other type of information may be used depending on other information in second board 21000 or any other context. In this case, the fourth type of information associated with the fifth selection of "February 2-8" cell 21005 may be timeline information, which is associated with the "Timeline" column heading in second board 21000.

In some embodiments, the second type of information may be aggregable with the fourth type of information in a second aggregation, wherein the second type of information may be aggregable with the fourth type of information in a second aggregation. The second type of information and the fourth type of information may be aggregable based on a shared nature or relationship indicating a commonality between the second and fourth types of information, as discussed above.

For example, in FIGS. 209 and 210, a second type of information associated with "February 16" cell 20905 in FIG. 209 may be aggregable with a fourth type of information associated with "February 2-8" cell 21005 in FIG. 210, consistent with disclosed embodiments. In this non-limiting example, because the type of information of "February 16"

cell 20905 in FIG. 209 is due date information, and the type of information of “February 2-8” cell 21005 in FIG. 210 is timeline information, these two types of information may be aggregable despite having differing headings since they both relate to calendar information of a task associated with an individual.

Some disclosed embodiments may further involve electronically generating a summary board including the at least one item, the summary board associating with the at least one item the first aggregation and the second aggregation. A summary board may include a table with items (e.g., individual items presented in horizontal rows) defining objects or entities that are managed in the platform (such as tasks, projects, clients, deals, or other information), as discussed herein. The summary board may represent information in a same or a condensed manner as compared to how it is presented in the first board and/or the second board, such as through one or more graphical representations, dashboards, widgets, tables or tabulations, flowcharts, maps, bar charts, circle charts, pie charts, alphanumeric characters, symbols, pictures, a combination thereof, or any other method for indicating information in a same or condensed manner as compared to its original source. In embodiments where the first board and the second board include tablature, summarizing may involve adding, editing, deleting, or otherwise modifying a variable or other information in the first board and/or the second board. The summary board may be generated automatically, manually, or a combination thereof, such as a result of a mouse click, a cursor hover, a mouseover, a button press, a keyboard input, a voice command, an interaction performed in virtual or augmented reality, or any other action by a user received via the at least one processor.

For example, FIG. 211, illustrates an exemplary summary board 21100 associating with the at least one item, the first aggregation and the second aggregation, consistent with embodiments of the present disclosure. As shown in FIG. 211, summary board 21100 may include a table including multiple horizontal rows, such as rows representing “Person 1,” “Person 2,” and “Person 3.” In this illustration, “Person 1” item 21101 may be an item contained in both first board 20900 in FIG. 209 and second board 21000 in FIG. 210, as discussed above. Each row in summary board 21100 may include one or more aggregations associated with an individual (e.g., “Person 1” 21101), such as aggregated status information indicated as “Status” cell 21103 (representing an aggregation of “Done” cell 20903 in FIG. 209 and “CRITICAL” cell 21003 in FIG. 210), and aggregated timeline information indicated as “Timeline” cell 21005 (representing an aggregation of “February 16” cell 20905 in FIG. 209 and “February 2-8” cell 21005 in FIG. 210). As shown in FIG. 211, aggregated status information may be illustrated as two or more color blocks, and aggregated timeline information may be illustrated as a range of dates. Other depictions of aggregated information may be used depending on the aggregated information, as would be appreciated by those having ordinary skill in the art.

In some embodiments, the summary board may associate with the at least one item the first aggregation and the second aggregation. The association between the at least one item with the first aggregation and the second aggregation may be direct or indirect, and may be through any connection, linkage, relationship, instruction, signal, logic table, logical rule, logical combination rule, logical template, or any suitable element or operation for accessing, referring, displaying, or otherwise making available the first aggregation and the second aggregation. For example, in embodiments where the summary board includes rows and columns, the at least one item may be represented as a row, and the first aggregation and the second aggregation may be associated with the row as one or more items in the columns of the row. Other ways of associating the at least one item and the first aggregation and the second aggregation may include one or more graphical representations, dashboards, widgets, tables or tabulations, flowcharts, maps, bar charts, circle charts, pie charts, alphanumeric characters, symbols, pictures, a combination thereof, or any other content of information, as discussed herein.

For example, in FIG. 211, “Person 1” item 21101 is depicted as a row having multiple items in multiple columns, such as status cell 21103, timeline cell 21105, and a time cell (e.g., a cell in “Time” column 21107). In this non-limiting example, status cell 21103 and timeline cell 21105 may be associated with “Person 1” item 21101 by virtue of being part of the same row. In some embodiments, however, association may be depicted as a graphical representation, such as battery chart 20101, line chart, 20103, or bar chart 20105 in FIG. 201.

In some embodiments, as a result of the association, when aggregated information in the first board and/or the second board changes, the information in the at least one item of the summary board may change to reflect the change in information. Further, the association of the at least one item in the summary board with the first aggregation and the second aggregation may persist through modifications in the first board and/or the second board, such as through duplications, additions, deletions, or any other alterations. In such embodiments, for example, an original first board and/or an original second board may be duplicated as a result of a user action or automatically by the system, resulting in a duplicate first board and/or a duplicate second board, respectively. As a result of the duplication, the association of the at least one item in the summary board may similarly be added onto the duplicate first board and/or the duplicate second board. Accordingly, when information changes in either the original first board or the duplicate first board, the first aggregation associated with the at least one item in the summary board may be adjusted automatically to reflect the change. Similarly, when information changes either in the original second board or the duplicate second board, the second aggregation associated with the at least one item in the summary board may be adjusted automatically to reflect the change. In this manner, the summary board may reflect up-to-date information of all relevant lower level tablature without additional input from the user.

Some disclosed embodiments may be further configured to electronically associate one of the first heading and the third heading with the first aggregation. The association between one of the first heading and the third heading with the first aggregation may be direct or indirect, and may be through any connection, linkage, relationship, instruction, signal, logic table, logical rule, logical combination rule, logical template, or any suitable element or operation for accessing, referring, displaying, or otherwise making available the first heading and/or the third heading, similar to the discussion above. For example, in embodiments where the first aggregation is contained in a cell that is an intersection between a row and a column, the first heading and/or the third heading may be displayed as a row heading, a column heading, or both. Other ways of associating one of the first heading and the third heading with the first aggregation may include using one or more graphical representations, alphanumeric characters, symbols, pictures, videos, AR or VR objects, a combination thereof, or any other content of information. For example, in embodiments where the first aggregation is depicted as a bar in a bar chart, the first heading and/or the third heading may be depicted as a text, image, avatar, video, or any other graphical representation under or near the bar in the bar chart. Further in some embodiments, the association may include depicting both the first heading and the third heading, a portion of the first heading, a portion of the third heading, a combination of the first heading and the third heading, or any other information related to the first heading and/or the third heading.

For example, in FIG. 211, status cell 21103 may be an aggregation of “Done” cell 20903 in FIG. 209 and “CRITICAL” cell 21003 in FIG. 210. In this illustration, status cell 21103 in FIG. 211 has a column heading of “Status,” which is the same column heading as “Done” cell 20903 in FIG. 209. However, in some embodiments, status cell 21103 in FIG. 211 may have a column heading of “Priority,” which is the same column heading as “CRITICAL” cell 21003 in FIG. 210. Further, in some embodiments, the heading may include both “Status” and “Priority,” a portion of “Status,” a portion of “Priority,” a combination of the two, or any other information related to the terms “Status” and “Priority.”

Some disclosed embodiments may be further configured to electronically associate one of the second heading and the fourth heading with the second aggregation. The association between one of the second heading and the fourth heading with the second aggregation may be done in a same or similar manner as the association between one of the first heading and the third heading with the first aggregation discussed herein. For example, in embodiments where the second aggregation is contained in a cell that is an intersection between a row and a column, the second heading and/or the fourth heading may be displayed as a row heading, a column heading, or both. Similarly, in embodiments where the second aggregation is depicted as a bar in a bar chart, the second heading and/or the fourth heading may be depicted as a text, image, avatar, video, or any other graphical representation under or near the bar in the bar chart. Further in some embodiments, the association may include depicting both the second heading and the fourth heading, a portion of the second heading, a portion of the fourth heading, a combination of the second heading and the fourth heading, or any other information related to the second heading and/or the fourth heading.

For example, in FIG. 211, “February 2-16” cell 21105 may be an aggregation of “February 16” cell 20905 in FIG. 209 and “February 2-8” cell 21005 in FIG. 210. In this illustration, “February 2-16” cell 21105 in FIG. 211 has a column heading of “Timeline,” which is the same column heading as “February 2-8” cell 21005 in FIG. 210. However, in some embodiments, “February 2-16” cell 21105 in FIG. 211 may have a column heading of “Due Date,” which is the same column heading as “February 16” cell 20905 in FIG. 209. Further, in some embodiments, the heading may include both “Due Date” and “Timeline,” a portion of “Due Date,” a portion of “Timeline,” a combination of the two, or any other information related to the terms “Due Date” and “Timeline.”

In some embodiments, the first aggregation may include an indicator that summarizes the first type of information and the third type of information. An indicator may be any depiction suitable for the type of summarized information, including one or more pictures, alphanumeric characters, avatars, videos, VR or AR objects, graphs, metadata, or any combination thereof. For example, in embodiments where a type of information summarizes individuals associated with a project, the indicator may include a graphical representation of the individuals, such as a picture, avatar, name initials, or any other representation of the individuals. It is to be understood that any kind of indicator may be used depending on the type of information, and the disclosed embodiments are therefore not limited to any specific type of indicator.

For example, in FIG. 211, summary board 21100 may include an indicator in status cell 21103 that summarizes the first type of information and the third type of information, consistent with disclosed embodiments. As shown in FIG. 211, the indicator may be any suitable depiction, in this case color blocks representing the status information depicted by “Done” cell 20903 in FIG. 209 and the priority information depicted by “CRITICAL” cell 2106 in FIG. 210. Any other suitable depiction of an indicator may be used, however, as explained herein.

In some embodiments, the second aggregation may include another indicator that summarizes the second type of information and the fourth type of information. The another indicator may be any depiction suitable for the type of summarized information, including one or more pictures, alphanumeric characters, avatars, videos, VR or AR objects, graphs, metadata, or any combination thereof, as discussed herein.

For example, in FIG. 211, summary board 21100 may include an indicator in timeline cell 21105 that summarizes the second type of information and the fourth type of information, consistent with disclosed embodiments. As shown in FIG. 211, the indicator may be any suitable depiction, in this case a range of dates depicted as “February 2-16” in timeline cell 21105, which aggregates the dates depicted by “February 16” cell 20905 in FIG. 209 and by “February 2-8” cell 21005 in FIG. 210. Any other suitable depiction of an indicator may be used, however, as explained herein.

In some embodiments, the indicator may be interactive to enable display of underlying information from the first type of information and the third type of information. An indicator may be interacted with in a manual, semi-manual, or automatic manner, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a cell or item in the summary board, the at least one processor may be configured to display a third board including the underlying information from the first type of information and the third type of information. In some embodiments, a user or the at least one processor may edit at least a portion of the underlying information directly from the display. For example, a user may modify one or more status cells in the first board by first interacting with a status summary cell in the third board, and subsequently editing the corresponding cells that are displayed as a result of the interaction.

For example, FIG. 212 illustrates an exemplary display 21201 generated as a result of an interaction with an indicator, consistent with disclosed embodiments. Display 21201 may be overlaid on top of board 21200, which may be a summary board. Board 21200 may include an interactive indicator to generate display 21201, although any other indicators in board 21200 may be interactive. Consequently, display 21201 may be generated as a result of a user interaction, such as a mouse click, with indicator 21203. Display 21201 may include information associated with tasks in the first board, although in some embodiments it may display information associated with tasks in the second board, both boards, or any other board(s). Display 21201 may, for example, include a "Task" column 21205 representing tasks in the first board, a "Person" column 21207 representing individuals associated with each task in the first board, a "Status" column 21209 representing status information associated with each task in the first board, and a "Progress" column 21211 representing completion information associated with each task in the first board. Other information associated with the first board may be displayed, however. In addition, a user may edit information present on display 21201.

FIG. 213 illustrates an exemplary display 21301 for editing underlying information, consistent with disclosed embodiments. Display 21301 may be overlaid on top of board 21300, which may be summary board 21200 discussed above in FIG. 212. In FIG. 213, display 21301 may be generated as a result of a user interaction with an interactable indicator in board 21300, similar to display 21201 discussed above in connection with FIG. 212. Display 21301 in FIG. 213 may include one or more interactive elements that a user may utilize to edit information on the first board, the second board, or any other board, directly. For example, a user may interact with "Person 1" cell 21303 to edit information about individuals associated with "Task 1" in the first board. A user may do the same with the "Due Date," "Status," or "Progress" information in display 21301. In this way, a user may edit information in the underlying first board and second board directly from the third board or any other summary board, thereby saving time.

Some disclosed embodiments may be further configured to generate a fifth heading for the first aggregation. The fifth heading may be the same, similar, or different from the first, second, third, and/or fourth heading discussed herein. The fifth heading may be depicted as text, numbers, symbols, images, avatars, videos, AR or VR objects, or any other graphical representation, and may be associated with one or more horizontal presentations, vertical presentations, or both, as discussed herein. The fifth heading may include information associated with a task, name, status, project, country, person, team, progress, or any other feature or characteristic that may be associated with the information associated with one or more boards. The fifth heading may include a portion of the first heading associated with the first type of information, a portion of the third heading associated with the third type of information, a combination of the two, or any other information suitable for its content.

For example, in FIG. 211, the "Status" heading associated with status cell 21103 in summary board 21100 may be replaced with a fifth heading (not shown), consistent with disclosed embodiments. In such embodiments, the fifth heading may be different from "Status" as shown in FIG. 209 or "Priority" as shown in FIG. 210. The fifth heading may be a combination of both, such as "Status/Priority," or may be a portion of either, or any other suitable heading for the information, such as "Current Status," "State," or "Condition." In addition, the heading may be depicted as one or more images, videos, avatars, VR or AR objects, or any other representation, as discussed herein.

FIG. 214 illustrates a block diagram of an example process 21400 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 21400 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 200 to 213 by way of example. In some embodiments, some aspects of the process 21400 may be implemented as software (e.g., program codes or instructions) that are stored in a memory (e.g., the memory portion 122 in FIG. 1) or a non-transitory computer-readable medium. In some embodiments, some aspects of the process 21400 may be implemented as hardware (e.g., a specific-purpose circuit). In some embodiments, the process 21400 may be implemented as a combination of software and hardware.

FIG. 214 includes process blocks 21401 to 21415. At block 21401, a processing means (e.g., the processing circuitry 110 in FIG. 1) may electronically receive a first selection of at least one item contained on both a first board and a second board (e.g., first board 20900 in FIG. 209 and second board 21000 in FIG. 210). At block 21403, the processing means may electronically receive a second selection of a first type of information presented on the first board, the first type of information being associated with a first heading (e.g., "Done" cell 20903 in FIG. 209).

At block 21405, the processing means may electronically receive a third selection of a second type of information presented on the first board, the second type of information being associated with a second heading (e.g., "February 16" cell 20905 in FIG. 209).

At block 21407, the processing means may electronically receive a fourth selection of a third type of information presented on the second board, the third type of information being associated with a third heading, wherein the first type of information is aggregable with the third type of information in a first aggregation, and wherein the first heading differs from the third heading (e.g., "CRITICAL" cell 21003 in FIG. 210). In some embodiments, the first aggregation may include an indicator that summarizes the first type of information and the third type of information. In some embodiments, the indicator may be interactive to enable display of underlying information from the first type of information and the third type of information (e.g., as shown in displays 21200 and 21300 in FIGS. 212 and 213, respectively).

In some embodiments, the processing means may be further configured to determine a similarity between the first type of information and the third type of information. In some embodiments, the similarity may be based on at least one of a position, a data type, a historical usage, or a logical rule.

At block 21409, the processing means may electronically receive a fifth selection of a fourth type of information presented on the second board, the fourth type of information being associated with a fourth heading, wherein the second type of information is aggregable with the fourth type of information in a second aggregation, and wherein the second heading differs from the fourth heading (e.g., "February 2-8" cell 21005 in FIG. 210). In some embodiments, the second aggregation may include another indicator that summarizes the second type of information and the fourth type of information.

At block 21411, the processing means may electronically generate a summary board including the at least one item, the summary board associating with the at least one item the first aggregation and the second aggregation (e.g., summary board 21100 in FIG. 211).

At block 21413, the processing means may electronically associate one of the first heading and the third heading with the first aggregation (e.g., "Status" heading in summary board 21100 in FIG. 211).

At block 21415, the processing means may electronically associate one of the second heading and the fourth heading with the second aggregation (e.g., "Timeline" heading in summary board 21100 in FIG. 211). In some embodiments, the processing may be further configured to generate a fifth heading for the first aggregation.

Consistent with some disclosed embodiments, systems, methods, and computer readable media for generating high level summary tablature based on lower level tablature are disclosed. The systems and methods described herein may be implemented with the aid of at least one processor or non-transitory computer readable medium, such as a CPU, FPGA, ASIC, or any other processing structure(s), as described herein.

Using computerized systems and methods for generating high level summary tablature using automatic identification of information types provides several advantages over extant processes that fail to provide aggregated information in a seamless and expedited manner. For example, extant systems and methods may fail to summarize large amounts of information in lower level tablature in an automatic manner that is convenient to the user. Using extant systems and methods, for example, a user may be required to manually identify aggregable data in two or more boards, and may be required to manually generate summary information. The computerized systems and methods disclosed herein may perform detection of information types, and may subsequently determine a similarity between them. Any information in the lower level tablature may be analyzed to make this determination, including data types, data content, board data, and any other information associated with the lower level tablature. The disclosed computerized systems and methods may generate summary data indicating similar information, facilitating a user's ability to understand information aggregated from the lower level tablature. Extant systems and methods may fail to identify types of information in a computerized manner, leading to a lower user satisfaction. Further, extant systems and methods may fail to identify items having a similarity in information in a computerized manner that affords convenience to the user.

Some disclosed embodiments may be configured to receive a selection of at least one item contained on both a first board and a second board, consistent with some disclosed embodiments. A board may include a table with items (e.g., individual items presented in horizontal rows) defining objects or entities that are managed in the platform (such as tasks, projects, clients, deals, or other information), as discussed herein. A board may include two or more different boards or tables, or may directly or indirectly access data from one or more other boards, tables, or other sources. A selection may include any automatic, semi-automatic, or manual signal, instruction, process, logical rule, logical combination rule, template, setting, a combination thereof, or any other operation for choosing information in a board. As non-limiting examples, a selection may include a mouse click, a cursor hover, a mouseover, a button press, a keyboard input, a voice command, an interaction performed in virtual or augmented reality, a default based on a user or system setting, a combination thereof, or any other signal received via the at least one processor. A selection of data presented on the first board and/or the second board may be received through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provides a medium for exchanging data.

For example, FIG. 215, illustrates an exemplary first board 21500 the data of which may be selected, consistent with embodiments of the present disclosure. As shown in FIG. 215, first board 21500 may include a table including multiple horizontal rows, such as rows representing "Person 1," "Person 2," and "Person 3." Each row in first board 21500 may include task information associated with an individual (e.g., "Person 1" 21501) in a particular project (e.g., "Project 1"), such as status information indicated by "Done" cell 21503, deadline information indicated by "February 16" cell 21505, and task identification information indicated by "Task No. 128" cell 21507. First board 21500 may include other information associated with a task, or any other kind of information not related to tasks or workflow management information.

FIG. 216, illustrates an exemplary second board 21600 the data of which may be selected, consistent with embodiments of the present disclosure. In FIG. 216, second board 21600 may include a table including multiple horizontal rows, such as rows representing "Person 1," "Person 2," and "Person 3." Each row in second board 21600 may include task information associated with an individual (e.g., "Person 1" 21601) in a particular project (e.g., "Project 2"), such as priority information indicated by "CRITICAL" cell 21603, timeline information indicated by "February 2-8" cell 21605, and project group information indicated by "Group No. 5" cell 21607. Second board 21600 may include other information associated with a task, or any other kind of information not related to tasks or workflow management information.

As can be appreciated from comparing FIG. 215 with FIG. 216, first board 21500 and second board 21600 may include the same, similar, or different information. In FIGS. 215 and 216, for example, both boards may contain information on "Person 1," labeled as item 21501 in FIG. 215 and item 21601 in FIG. 216. In some embodiments, the at least one processor may be configured to electronically receive a selection of this item, or any other item contained on both the first board and the second board, as described above. In addition, both boards may include information on a current state of an individual's work with respect to a project, such as status information (e.g., "Done" cell 21503 in FIG. 215) and priority information (e.g., "CRITICAL" cell 21603 in FIG. 216). Both boards may also include information on one or more significant dates associated with the individual's work, such as due date information (e.g., "February 16" cell 21505 in FIG. 215) and timeline information (e.g., "February 2-8" cell 21605 in FIG. 216). However, as illustrated, the first board and the second board may include different information. For example, first board 21500 in FIG. 215 may include information on individual tasks (e.g., "Task No. 128" cell 21507), while second board 21600 in FIG. 216 may include information on project groups instead (e.g., "Group No. 5" cell 21607).

The at least one processor may be further configured to detect a first type of information presented on the first board, consistent with some disclosed embodiments. A type of information may represent any characteristic, feature, attribute, or any aspect related to data on a board. For example, in embodiments when the first board and the second board include workflow management information, a type of information may be associated with one or more status values, projects, countries, persons, teams, progresses, a combination thereof, or any other information related to a task. It is to be understood, however, that the disclosed embodiments are not limited to any particular type of information, but may rather be used in conjunction with any suitable type of information depending on the information contained in a board or depending on any other context. A detection may be the act of determining the presence or absence of a type of information, such as by analyzing data types, data content, board information, column information, row information, heading information, user interactions, user preferences, settings, historical data, formulas, logical rules, templates, adjacent or related information, functions or applications that utilize the two or more types of information, a combination thereof, or any other information available to or generated by the system. A type of information may be detected automatically, manually, or a combination thereof, such as through a mouse click, a cursor hover, a mouseover, a button press, a keyboard input, a voice command, an interaction performed in virtual or augmented reality, periodically, as a result of a default setting or user preference, as a result of a template, or through any other instruction received via the at least one processor. For example, in embodiments where a board contains multiple rows and columns, the at least one processor may detect the type of information in a column, a row, a cell, a graphical representation in the board, or any other data in the board. The detection may be performed automatically as the information is entered into the board, periodically (e.g., one or more times a day), as a result of a user pressing a button on the board, or as a result of any other event or signal.

For example, in FIG. 215, the system may detect a first type of information associated with "Done" cell 21503 in first board 21500, consistent with disclosed embodiments. The detection may be automatic (e.g., periodic), a result of a user interaction (e.g., a mouse click), or a combination of both, as discussed herein. In such embodiments, the first type of information associated with the second selection may be status information, since "Done" cell 21503 may be indicative of a state of a task in a cell, although any other type of information may be used depending on other information contained in first board 21500 or any other context.

In some embodiments, the first type of information may be associated with a first heading. In such embodiments, the first board and/or the second board may include one or more tablature having one or more headings defining or indicating a category or attribute associated with the information in that row. A heading may be depicted as text, numbers, symbols, images, avatars, videos, AR or VR objects, or any other graphical representation. A heading may be associated with one or more horizontal presentations, vertical presentations, or both, as discussed further below. For example, in embodiment where the first board and the second board include columns and rows, the columns and rows may have headings associated with their content, such as a task, name, status, project, country, person, team, progress, or any other feature or characteristic that may be associated with the information associated with a particular column or row.

For example, in FIGS. 215 and 216, first board 21500 and second board 21600 may include one or more headings. As illustrated in FIGS. 215 and 216, a heading may be associated with an individual in a horizontal row, such as "Person 1," "Person 2," and "Person 3." A heading may also be associated with a vertical column, such as the "Status," "Due Date," and "Task" headings shown in FIG. 215, or the "Priority," "Timeline," and "Group" headings shown in FIG. 216. Following the example above, the first type of information associated with "Done" cell 21503 may be status information, which is associated with the "Status" column heading in first board 21500.

The at least one processor may be further configured to detect a second type of information presented on the first board, consistent with disclosed embodiments. The second type of information may be detected in the same or similar manner as the first type of information, as discussed above. In some embodiments, the second type of information may be associated with a second heading. The second type of information may be the same, similar, or different from the first type of information discussed previously. Likewise, the second heading may be the same, similar, or different from the first heading as discussed previously.

For example, in FIG. 215, the system may detect a second type of information associated with "February 16" cell 21505 in first board 21500, consistent with disclosed embodiments. In such embodiments, the second type of information may be deadline information, since "February 16" cell 21505 is indicative of a significant date of a task, although any other type of information may be used depending on other information in first board 21500 or any other context. In this case, the second type of information associated with "February 16" cell 21505 may be due date information, which is associated with the "Due Date" column heading in first board 21500.

The at least one processor may be further configured to detect a third type of information presented on the second board, consistent with disclosed embodiments. The third type of information may be detected in the same or similar manner as the first and/or second type of information as discussed previously. In some embodiments, the third type of information may be associated with a third heading different from the first heading. The third type of information may be the same, similar, or different from the first and/or second type of information discussed above. Likewise, the third heading may be the same, similar, or different from the first and/or second heading discussed previously.

For example, in FIG. 215, the system may detect a third type of information associated with "CRITICAL" cell 21603 in second board 21600, consistent with disclosed embodiments. In such embodiments, the third type of information may be priority information, since "CRITICAL" cell 21605 is indicative of an urgency status a task, although any other type of information may be used depending on other information in second board 21600 or any other context. In this case, the third type of information of "CRITICAL" cell 21605 may be priority information, which is associated with the "Priority" column heading in second board 21600.

The at least one processor may be further configured to detect a fourth type of information presented on the second board, consistent with disclosed embodiments. The fourth type of information may be detected in the same or similar manner as the first, second, and/or third type of information as discussed previously. In some embodiments, the fourth type of information may be associated with a fourth heading different from the second heading. The fourth type of information may be the same, similar, or different from the first, second, and/or third type of information discussed previously. Likewise, the fourth heading may be the same, similar, or different from the first, second, and/or third heading discussed previously.

For example, in FIG. 215, the system may detect a fourth type of information associated with "February 2-8" cell 21605 in second board 21600, consistent with disclosed embodiments. In such embodiments, the fourth type of information may be timeline information, since "February 2-8" cell 21605 is indicative of a range of significant dates of a task, although any other type of information may be used depending on other information in second board 21600 or any other context. In this case, the fourth type of information associated with "February 2-8" cell 21605 may be timeline information, which is associated with the "Timeline" column heading in second board 21600.

The at least one processor may be further configured to analyze characteristics of the first type of information, the second type of information, the third type of information, and the fourth type of information, to ascertain that the first type of information is aggregable with the third type of information, and that the second type of information is aggregable with the fourth type of information, consistent with disclosed embodiments. Characteristics may be analyzed by identifying and examining relationships between two or more types of information, such as by examining data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system. Two or more types of information may be aggregable based on a shared characteristic or other relationship indicating a commonality between the two or more types of information.

For example, in FIGS. 215 and 216, a first type of information associated with "Done" cell 21503 in FIG. 215 may be aggregable with a third type of information associated with "CRITICAL" cell 21603 in FIG. 216, consistent with disclosed embodiments. In this non-limiting example, because the type of information of "Done" cell 21503 in FIG. 215 is status information, and the type of information of "CRITICAL" cell 21603 in FIG. 216 is priority information, these two types of information may be aggregable despite having differing headings since they both relate to a state of a task associated with an individual.

Similarly, in FIGS. 215 and 216, a second type of information associated with "February 16" cell 21505 in FIG. 215 may be aggregable with a fourth type of information associated with "February 2-8" cell 21605 in FIG. 216, consistent with disclosed embodiments. In this non-limiting example, because the type of information of "February 16" cell 21505 in FIG. 215 is due date information, and the type of information of "February 2-8" cell 21605 in FIG. 216 is timeline information, these two types of information may be aggregable despite having differing headings since they both relate to calendar information of a task associated with an individual.

In some embodiments, each of the first type of information, the second type of information, the third type of information, and the fourth type of information may include associated metadata. Metadata may include any data related to a type of information, such as tags, author, date created, date modified, date viewed, files, file size, links, notes, board data, widget data, column data, row data, heading data, a combination thereof, or any other information corresponding to the data represented by the type of information. It is to be understood that metadata may include any information related to the data corresponding to the type of information or any associated context.

For example, FIG. 217 illustrates a board 21700 that may contain metadata associated with at least one item, consistent with disclosed embodiments. As shown in FIG. 217, metadata 21703 associated with a cell, such as "Done" cell 21701, may be displayed. Metadata 21703 may include any information associated with the cell, in this case a status, such as the creator the author of the status, the creation date of the status, the date of the last update of the status, and email information for the author of the status.

In some embodiments, analyzing characteristics may include analyzing the associated metadata to ascertain that the first type of information is aggregable with the third type of information, and that the second type of information is aggregable with the fourth type of information. Metadata may be analyzed by identifying and examining relationships between metadata associated with two or more types of information, as discussed previously. In embodiments where metadata is analyzed, the system may determine that two types of information are aggregable because they include the same or similar metadata, as defined above. For example, if two or more types of information are created by the same author, the system may determine that the two or more types of information are aggregable. It is to be understood that any other metadata may be used to make this determination.

In some embodiments, the associated metadata may be based on a position. A position may relate to any relational placement with respect to surrounding information, such as placement in a column, row, board, widget, graph, graphical representation, or any other structural data arrangement. In embodiments where the metadata may be based on a position, the system may determine that two types of information are aggregable as a result of having the same or similar position in the structural data arrangement. As a non-limiting example, in embodiments where the first board and the second board include tablature having rows and columns, the system may determine that the first type of information and the third type of information are aggregable if they are located in the same column in the first board and the second board, respectively. Other positional and structural information may be used, as would be understood by a person having ordinary skill in the art.

For example, in FIGS. 215 and 216, the system may determine that the type of information associated with "Done" cell 21503 in FIG. 215 may are aggregable with the type of information associated with "CRITICAL" cell 21603 in FIG. 216 based on position. In this non-limiting example, because the column containing "Done" cell 21503 in FIG. 215 is the second left-most column in board 21500, and the column containing "CRITICAL" cell 21603 in FIG. 216 is also the second left-most column in board 21600, the system may determine that these two columns are aggregable based on position.

In some embodiments, the associated metadata may be based on a data type. Data types may include text, numbers, calendar information, formulas, time, files, multi-select data, tags, check boxes, a combination thereof, or any other attribute of information. In embodiments where the metadata may be based on a data type, the system may determine that two types of information are aggregable as a result of having the same or similar data types. For example, the first type of information may include one or more cells with a range of dates associated with a timeline, such as "December 8-February 12," and the third type of information may also include one or more cells with a range of dates associated with a timeline, such as "December 8-February 18." In such cases, the system may determine that the two types of information are aggregable because both have the same type of data, in this case calendar information. The system may arrive at the same result if the two types of information are similar, such as numbers compared to formulas, numerical strings compared to numbers, persons compared to groups, emails compared to names, and any other data types that relate to one another. Conversely, the first type of information may include one or more cells including status information, such as "Done," and the third type of information may include one or more cells including telephone numbers associated with a person, such as "+123 45 678 9123." In such cases, the system may determine that the two types of information are not aggregable because they do not share the same data type, in this case text and numbers (although in some embodiments there may be sufficient relationship between the two to constitute aggregability). Other data types and combinations may be used, as would be understood by a person having ordinary skill in the art.

For example, in FIGS. 215 and 216, the system may determine that the type of information associated with "February 16" cell 21505 in FIG. 215 may be aggregable with the type of information associated with "February 2-8" cell 21605 in FIG. 216 based on data types. In this non-limiting example, because "February 16" cell 21505 in FIG. 215 contains calendar data, and "February 2-8" cell 21605 in FIG. 216 also contains calendar data, the system may determine that these two types of information are aggregable based on data type.

In some embodiments, the associated metadata may be based on a historical usage. Historical data may include any information previously utilized or generated by the system, such as one or more previous signals, instructions, operations, functions, database retrievals, inputs received from one or more users, user preferences, default settings, interactions with a board or tablature, graphical representations, or any other information associated with the system. In embodiments where the metadata may be based on a historical usage, the system may determine that two types of information are aggregable as a result of having previously been subject to the same or similar historical usage. For example, if the system previously aggregated the first type of information and the third type of information, such as in the form of a summary, graphical representation (e.g., charts), or any other aggregation, the system may determine that the two types of information are aggregable as a result of this historical information. In other embodiments, the system may determine that two types of information are aggregable because a user previously aggregated them, such as by combining the two types of data, generating graphical representations (e.g., charts) of them, or selecting them to be similar as a user preference. Other historical usages may be used, as would be understood by a person having ordinary skill in the art.

In some embodiments, the associated metadata may be based on a logical rule. A logical rule may be any function for causing the system to perform an action on information contained in a board, such as one or more notification generation rules, sound generation rules, data generation rules, data aggregation rules, column rules, row rules, default rules, logical templates, settings, operations, instructions, signals, or any other electronic prompt for causing the system to perform an action. In embodiments where the metadata may be based on a logical rule, the system may determine that two types of information are aggregable as a result of being subject to the same or similar logical rule. As a non-limiting example, in embodiments where the system generates one or more notifications (e.g., email messages) to a particular user as a result of a change in two types of information, the system may determine that the two types of information are aggregable as a result of being subject to the same notification generation rule. Other logical rules may be utilized depending on the information contained in the first board and the second board, and any inputs received by the system, as would be understood by those having ordinary skill in the art.

As an illustration, in FIGS. 215 and 216, the system may determine that the type of information associated with "Done" cell 21503 in FIG. 215 may be aggregable with the type of information associated with "CRITICAL" cell 21603 in FIG. 216 based on a logical rule. If the system is configured to generate an email notification to "Person 1" as a result of a change in status information (e.g., "Stuck") and a change in priority information (e.g., "CRITICAL"), the system may determine that these two types of information are aggregable.

The at least one processor may be further configured to present the at least one item on a third board, consistent with disclosed embodiments. A third board may include a table with items (e.g., individual items presented in horizontal rows) defining objects or entities that are managed in the platform (such as tasks, projects, clients, deals, or other information). The third board and any items contained therein may be presented using any visual, tactile, or any other physical representation, such as through the use of one or more mobile devices, desktops, laptops, tablets, LED, AR devices, VR devices, or a combination thereof, as described previously.

The at least one processor may be further configured to aggregate on the third board, in association with the at least one item, the first type of information with the third type of information, and the second type of information with the fourth type of information, consistent with disclosed embodiments. The third board may represent information in a same or a condensed manner as compared to how it is presented in the first board and/or the second board, such as through one or more graphical representations, dashboards, widgets, tables or tabulations, flowcharts, maps, bar charts, circle charts, pie charts, alphanumeric characters, symbols, pictures, a combination thereof, or any other method for indicating information in a same or condensed manner as compared to its original source. In embodiments where the first board and the second board include tablature, aggregation may involve adding, editing, deleting, or otherwise modifying a variable or other information in the first board and/or the second board.

For example, FIG. 218, illustrates an exemplary summary board 21800, consistent with embodiments of the present disclosure. As shown in FIG. 218, summary board 21800 may include a table including multiple horizontal rows, such as rows representing "Person 1," "Person 2," and "Person 3." In this illustration, "Person 1" item 21801 may be an item contained in both first board 21500 in FIG. 215 and second board 21600 in FIG. 216, as discussed above. Each row in summary board 21800 may include one or more aggregations associated with an individual (e.g., "Person 1" 21801), such as aggregated status information indicated as "Status" cell 21803 (representing an aggregation of "Done" cell 21503 in FIG. 215 and "CRITICAL" cell 21603 in FIG. 216), and aggregated timeline information indicated as "Timeline" cell 21605 (representing an aggregation of "February 16" cell 21505 in FIG. 215 and "February 2-8" cell 21605 in FIG. 216). As shown in FIG. 218, aggregated status information may be illustrated as two or more color blocks, and aggregated timeline information may be illustrated as a range of dates. Other depictions of aggregated information may be used depending on the aggregated information, as would be appreciated by those having ordinary skill in the art.

In some embodiments, as a result of the association, when aggregated information in the first board and/or the second board changes, the information in the at least one item of the third board may change to reflect the change in information. Further, the association of the at least one item in the third board with the types of information may persist through modifications in the first board and/or the second board, such as through duplications, additions, deletions, or any other alterations. In such embodiments, for example, an original first board and/or an original second board may be duplicated as a result of a user action or automatically by the system, resulting in a duplicate first board and/or a duplicate second board, respectively. As a result of the duplication, the association of the at least one item in the third board may similarly be added onto the duplicate first board and/or the duplicate second board. Accordingly, when information changes in either the original first board or the duplicate first board, the first aggregation associated with the at least one item in the third board may be adjusted automatically to reflect the change. Similarly, when information changes either in the original second board or the duplicate second board, the second aggregation associated with the at least one item in the third board may be adjusted automatically to reflect the change. In this manner, the third board may reflect up-to-date information of all relevant lower level tablature without additional input from the user.

The at least one processor may be further configured to generate a first indicator that summarizes the first type of information and the third type of information, consistent with disclosed embodiments. An indicator may be any depiction suitable for the type of summarized information, including one or more pictures, alphanumeric characters, avatars, videos, VR or AR objects, graphs, metadata, or any combination thereof. For example, in embodiments where a type of information summarizes individuals associated with a project, the indicator may include a graphical representation of the individuals, such as a picture, avatar, name initials, or any other representation of the individuals. It is to be understood that any kind of indicator may be used depending on the type of information, and the disclosed embodiments are therefore not limited to any specific type of indicator.

For example, in FIG. 218, summary board 21800 may include an indicator in status cell 21803 that summarizes the first type of information and the third type of information, consistent with disclosed embodiments. As shown in FIG. 218, the indicator may be any suitable depiction, in this case color blocks representing the status information depicted by "Done" cell 21503 in FIG. 215 and the priority information depicted by "CRITICAL" cell 2166 in FIG. 216. Any other suitable depiction of an indicator may be used, however, as explained herein.

The at least one processor may be further configured to generate a second indicator that summarizes the second type of information and the fourth type of information, consistent with disclosed embodiments. The second indicator may be any depiction suitable for the type of summarized information, including one or more pictures, alphanumeric characters, avatars, videos, VR or AR objects, graphs, metadata, or any combination thereof, as discussed herein.

For example, in FIG. 218, summary board 21800 may include an indicator in timeline cell 21805 that summarizes the second type of information and the fourth type of information, consistent with disclosed embodiments. As shown in FIG. 218, the indicator may be any suitable depiction, in this case a range of dates depicted as "February 2-16" in timeline cell 21805, which aggregates the dates depicted by "February 16" cell 21505 in FIG. 215 and by "February 2-8" cell 2166 in FIG. 216. Any other suitable depiction of an indicator may be used, however, as explained herein.

In some embodiments, indicator may be interactive to enable display of underlying information from the first type of information and the third type of information. An indicator may be interacted with in a manual, semi-manual, or automatic manner, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a cell or item in the summary board, the at least one processor may be configured to display a third board including the underlying information from the first type of information and the third type of information. In some embodiments, a user or the at least one processor may edit at least a portion of the underlying information directly from the display. For example, a user may modify one or more status cells in the first board by first interacting with a status summary cell in the third board, and subsequently editing the corresponding cells that are displayed as a result of the interaction.

For example, FIG. 219 illustrates an exemplary display 21901 generated as a result of an interaction with an indicator, consistent with disclosed embodiments. Display 21901 may be overlaid on top of board 21900, which may be a summary board. Board 21900 may include an interactive indicator to generate display 21901, although any other indicators in board 21900 may be interactive. Consequently, display 21901 may be generated as a result of a user interaction, such as a mouse click, with indicator 21903. Display 21901 may include information associated with tasks in the first board, although in some embodiments it may display information associated with tasks in the second board, both boards, or any other board(s). Display 21901 may, for example, include a "Task" column 21905 representing tasks in the first board, a "Person" column 21907 representing individuals associated with each task in the first board, a "Status" column 21909 representing status information associated with each task in the first board, and a "Progress" column 21911 representing completion information associated with each task in the first board. Other information associated with the first board may be displayed, however. In addition, a user may edit information present on display 21901.

For example, FIG. 220 illustrates an exemplary display 22001 for editing underlying information, consistent with disclosed embodiments. Display 22001 may be overlaid on top of board 22000, which may be summary board 21900 discussed above in FIG. 219. In FIG. 220, display 22001 may be generated as a result of a user interaction with an interactable indicator in board 22000, similar to display 21901 discussed above in connection with FIG. 219. Display 22001 in FIG. 220 may include one or more interactive elements that a user may utilize to edit information on the first board, the second board, or any other board, directly. For example, a user may interact with "Person 1" cell 22003 to edit information about individuals associated with "Task 1" in the first board. A user may do the same with the "Due Date," "Status," or "Progress" information in display 22001. In this way, a user may edit information in the underlying first board and second board directly from the third board or any other summary board, thereby saving time.

The at least one processor may be further configured to generate a fifth heading for aggregating the first type of information with the third type of information, consistent with disclosed embodiments. The fifth heading may be the same, similar, or different from the first, second, third, and/or fourth heading discussed previously. The fifth heading may be depicted as text, numbers, symbols, images, avatars, videos, AR or VR objects, or any other graphical representation, and may be associated with one or more horizontal presentations, vertical presentations, or both, as discussed previously. The fifth heading may include information associated with a task, name, status, project, country, person, team, progress, or any other feature or characteristic that may be associated with the information associated with one or more boards. The fifth heading may include a portion of the first heading associated with the first type of information, a portion of the third heading associated with the third type of information, a combination of the two, or any other information suitable for its content.

For example, in FIG. 218, the "Status" heading associated with status cell 21803 in summary board 21800 may be replaced with a fifth heading (not shown), consistent with disclosed embodiments. In such embodiments, the fifth heading may be different from "Status" as shown in FIG. 215 or "Priority" as shown in FIG. 216. The fifth heading may be a combination of both, such as "Status/Priority," or may be a portion of either, or any other suitable heading for the information, such as "Current Status," "State," or "Condition." In addition, the heading may be depicted as one or more images, videos, avatars, VR or AR objects, or any other representation, as discussed previously.

FIG. 221 illustrates a block diagram of an example process 22100 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 22100 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 51-1 to 220 by way of example. In some embodiments, some aspects of the process 22100 may be implemented as software (e.g., program codes or instructions) that are stored in a memory (e.g., the memory portion 122 in FIG. 1) or a non-transitory computer-readable medium. In some embodiments, some aspects of the process 22100 may be implemented as hardware (e.g., a specific-purpose circuit). In some embodiments, the process 22100 may be implemented as a combination of software and hardware.

FIG. 221 includes process blocks 22101 to 22115. At block 22101, a processing means (e.g., the processing circuitry 110 in FIG. 1) may receive a selection of at least one item contained on both a first board and a second board (e.g., first board 21500 in FIG. 215 and second board 21600 in FIG. 216). At block 22103, the processing means may detect a first type of information presented on the first board, the first type of information being associated with a first heading (e.g., status information of "Done" cell 21503 in FIG. 215).

At block 22105, the processing means may detect a second type of information presented on the first board, the second type of information being associated with a second heading (e.g., due date information of "February 16" cell 21505 in FIG. 215).

At block 22107, the processing means may detect a third type of information presented on the second board, the third type of information being associated with a third heading different from the first heading (e.g., priority information of "CRITICAL" cell 21603 in FIG. 216).

At block 22109, the processing means may detect a fourth type of information presented on the second board, the fourth type of information being associated with a fourth heading different from the second heading (e.g., timeline information of "February 2-8" cell 21605 in FIG. 216).

At block 22111, the processing means may analyze characteristics of the first type of information, the second type of information, the third type of information, and the fourth type of information, to ascertain that the first type of information is aggregable with the third type of information, and that the second type of information is aggregable with the fourth type of information. In some embodiments, analyzing characteristics may include analyzing the associated metadata to ascertain that the first type of information is aggregable with the third type of information, and that the second type of information is aggregable with the fourth type of information (e.g., metadata 21703 in FIG. 217). In some embodiments, the associated metadata may be based on at least one of a position, a data type, a historical usage, or a logical rule.

At block 22113, the processing means may present the at least one item on a third board (e.g., summary board 21800 in FIG. 218). At block 22115, the processing means may aggregate on the third board, in association with the at least one item, the first type of information with the third type of information, and the second type of information with the fourth type of information (e.g., status cell 21801 and timeline cell 21805 in FIG. 218). In some embodiments, the processing means may be further configured to generate a fifth heading for aggregating the first type of information with the third type of information.

In some embodiments, the processing means may be further configured to generate a first indicator that summarizes the first type of information and the third type of information. In some embodiments, the processing means may be further configured to generate a second indicator that summarizes the second type of information and the fourth type of information. In some embodiments, indicator may be interactive to enable display of underlying information from the first type of information and the third type of information (e.g., as shown in FIGS. 219 and 220).

Aspects of this disclosure may provide a technical solution to challenges associated with collaborative work systems. Disclosed embodiments include methods, systems, devices, and computer-readable media. For ease of discussion, example system for implementing conditional rules in a hierarchical table structure is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

As another example, some aspects of such system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for implementing conditional rules in a hierarchical table structure having at least one processor (e.g., processor, processing circuit or other processing structure described herein) in collaborative work systems, including methods, devices, and computer-readable media. Conditional rules may refer to rules or instructions that may be tied to logical organization of elements for implementing one or more conditional actions. In some instances, the logical organization of elements may be a semantic statement (e.g., a sentence) or conditional statement (e.g., "if X then Y"). In some instances, the conditional rules may be referred to as an "automation" or a "recipe." The conditional rules may be implemented as program codes or instructions stored in a non-transitory computer-readable medium of the system. The conditional rule may include one or more triggering elements (also may be referred to as "triggers") and one or more action elements (also may be referred to as "actions"). A trigger of the conditional rule may refer to an event or a condition, the occurrence or satisfaction of which may cause another event in the system that implements the conditional rules. An action of the conditional rule may refer to a change of one or more components of the system. A hierarchical table structure may refer to one or more tables arranged or organized into a tree-like structure, a cascade of tables, an array of tables, a network of tables featuring links, or a lattice of tables featuring connections between elements of a table. The one or more tables may be represented or structured as being above, below, inside or at the same level to one another. A table may include of any number horizontal and vertical rows (e.g., rows and columns). A table may be in a form of a board, a sub-board, an array, a grid, a datasheet, a set of tabulated data, a set of comma separated values (CSV), a chart, a matrix, or any other two or greater dimensional systematic arrangement of data or information. The structure of the one or more tables may be the same or different in the number of rows and columns. Furthermore, the hierarchical table structure may consist of one or more tables nested or embedded (may also be referred to as "sub-table," "sub-board," or "sub-item") inside a row, a column, or a cell of another table. The one or more tables may be linked to each other by way of the rows, columns, or cells of the tables. Furthermore, the hierarchical table structure may be arranged and organized with interrelated or unrelated elements containing data or information in the cells of the tables. For example, a hierarchical table may consist of altering data or information associated with a cell, a row of cells, or a column of cells in response to a trigger in a conditional rule causing an action to change data or information in a cell, row of cells, or column of cells in another table being above, below, inside, nested, or embedded.

By way of example, FIG. 222 illustrates an example view of a hierarchical table structure. FIG. 222 may include a hierarchical table structure 22200 having a first table 22202 and a second table 22204. The first table 22202 may be structured with a plurality of rows and columns displaying data. The second table 22204 may have the same structure as the first table. Furthermore, the first row 22206 may contain an embedded or sub-table 22208 having a different structure from the first table and the second table. A sub-table may be associated with each of the first table 22202 and/or the second table 22204 and may have its own number of rows and columns that may be different or the same as the first table or the second table.

In another example, FIG. 223 illustrates an example conditional rule 22320 displayed in a user interface 22320. As illustrated in FIG. 223, the user interface 22320 may be displayed on a computing device (e.g., the computing device 100 illustrated in FIG. 1) or software running thereon. For example, the user interface 22320 may be a portion of a graphical user interface (GUI), such as a webpage or a mobile application GUI displayed on a screen of the computing device 100. As illustrated in FIG. 223, the user interface 22320 displays conditional rule 22322 ("When this happens, do something") as a whole or a partial sentence. The conditional rule 22322 may include a trigger "when this happens" and an action "do something." In accordance with the conditional rule 22322, when the condition "this" is satisfied or the event "this" occurs, the system may cause "something" to occur (i.e., a change of a component or hierarchical table). Furthermore, the conditional rule 22322 includes predefined requirements "when," "happens," and "do," and user-definable requirements "this" and "something." For example, the predefined requirement "when" may only be activated as a whole by receiving a user input indicating that a user selects an interactive element 22324 (e.g., a button). In another example, the predefined requirement "when" may only be deactivated as a whole by receiving a user input indicating that a user clicks an interactive element 22326 (e.g., a button) so that the predefined requirement may be removed and may be replaced.

Consistent with some disclosed embodiments, at least one processor of the system may carry out operations that may involve maintaining for presentation on a viewable interface a higher-level table structure having first rows, first columns and first cells at intersections of first rows and first columns. Maintaining a higher-level table structure for presentation on a viewable interface may involve storing a higher-level table structure in memory that may be accessed for a presentation or display on any viewable interface. A viewable interface may involve a user interface or a graphical user interface (GUI) that may be a web page, a mobile-application interface, a software interface, or any graphical interface that could enable interactions between a human and a machine via an interactive element. The viewable interface may include, for example, a monitor, touchscreen display, projector, AR/VR lens, or any other viewable interface. The interactive element may include any device such as a mouse cursor, a touchable area (as on a touchscreen), an application program interface (API) that receives a keyboard input, or any hardware or software component that may receive user inputs. A higher-level table structure or higher-level table may refer to a table, as described above, having a hierarchy that may be above other tables (e.g., a main table). The higher-level table structure may include one or more tables nested or embedded beneath a row, a column, or a cell of the higher-level table. The higher-level table structure may include any combination of structures such as rows, columns, and cells at the intersections of the rows and columns. The higher-level table structure may be configured to contain information that may be subsequently changed or altered. References made to "first," "second," and so on do not necessarily indicate an order and may be used in reference to a particular group.

By way of example, FIG. 224 illustrates a higher-level table structure 22402 presented on a viewable interface 22400. As illustrated in FIG. 224, the viewable interface 22400 may be displayed or presented with the higher-level table structure 22402. The higher-level table structure 22402 may have a first plurality of columns 22404, rows 22406, and representative cells 22408 and 22410. The higher-table structure 22402 may have subitem cell 22408 that may contain an embedded or nested table (not shown). A user may click subitem cell 22408 in viewable interface 22400 to display the embedded or nested table.

In some embodiments, at least one processor of the system may carry out operations that may involve maintaining for presentation on the viewable interface a lower-level table structure having second rows, second columns and second cells at intersections of second rows and second columns. A lower-level table structure or lower-level table may refer to a table, as described above, having a hierarchy that may be below the higher-level table structure, as described above. The lower-level table structure may be positioned under a first row, a first column, or a first cell of a higher-level table structure. The lower-level table structure may also have the same functions or characteristics of the higher-level table, such as table structure or associations with automations. The lower-level table structure may have the same structure as the higher-level table structure, or may have a structure that is independent from the higher-level table structure. Similar to the higher-level table structure, the lower-level table structure may also contain another embedded or nested table beneath its rows, columns, or cells (which may be referred to as the second rows, second, columns, and second cells). A change or alteration of the data (information or arrangement of information) in the lower-level table structure may subsequently also change or alter the data in the higher-level table structure, and vice-versa. Furthermore, the lower-level table structure includes nested or embedded tables underneath its second rows, second columns, or second cells. A change or alteration of the data contained in the nested or embedded tables of the lower-level table structure may in turn change or alter the data of the lower-level table structure, and vice-versa.

By way of example, FIG. 225 illustrates a lower-level table structure 22504 presented on a viewable interface 22500, consistent with some embodiments of the present disclosure. As illustrated in FIG. 225, the viewable interface 22500 may display a first row 22502 of a higher-level table structure. The lower-level table structure 22504 may be positioned as an indentation under the first row 22502 or in any other manner to indicate that it is associated with the higher-level table structure. The lower-level table 22504 may contain a plurality of rows 22506, columns 22508, and cells 22510.

Consistent with some disclosed embodiments, at least one processor of the system may carry out operations that may involve linking the lower-level table to a specific first cell in the higher-level table, wherein the specific first cell is configured to present a milestone indicator. Linking the lower-level table to a specific first cell in the higher-level table may refer to establishing a relationship via a link between the one or more elements of the lower-level table and a specific cell in the higher-level table. By activating this link, a user may be able to access information in either the specific cell in the higher-level table or information in the lower-level table tied to that specific cell of the higher-level table. For example, one or more second cells (e.g., elements) in the lower-level table may be linked to a specific cell in the higher-level table. A change in information in the lower-level table may cause the link to the specific cell to be activated, which may cause a change or alteration in the data or information of the specific cell of the higher-level table. A milestone indicator may refer to a marker, a designation, a reference point, or any other indication representative of milestone information. The indicator may include any indication such as through alphanumerics, graphics, dynamic information, or a combination thereof. For example, a milestone indicator may enable a user to view the status of tasks or goals for a project or event. For instance, a milestone indicator may mark a specific point along a project timeline (e.g., start, middle phase, end phase, and so on), an indication of importance or condition of an activity associated with a project task. The milestone indicator may be a marker or signal that may express the success or completion of a task. For example, the specific first cell may display summary information through graphical representation (e.g., text, numbers, alphanumeric, symbols, forms, or a combination thereof) associated with the data or information in the second cells of the lower-level table structure. A user may obtain summary information from the specific cell to reach a conclusion of the status of the project without necessarily seeing the data or information contained in the second cells of the lower-level table. A change in the one or more second cells may alter the milestone indicator in the specific first cell.

By way of example, FIG. 226 illustrates linking a lower-level table to a specific cell in a higher-level table, the specific call including a milestone indicator. As illustrated in FIG. 226, higher-level table 22600 may have a first row 22602 with a specific first cell 22604 displaying a "stage" milestone indicator. The specific first cell 22604 may be linked to a lower-level table 22606. When a second "status" cell 22608 of the lower-level table 22606 changes from being empty to displaying the status "Working on it," the specific first cell 22604 displays the milestone indicator of "Full Design" as a stage, since the second "status" cell 22608 is associated with the "Full Design" stage of the project in lower-level table 22606.

In some embodiments, at least one processor of the system may carry out operations that may involve storing a specific conditional rule associating the specific first cell with a plurality of second cells of the lower-level table, such that entry of qualifying data into each of the plurality of second cells triggers the specific conditional rule to cause a change in the specific first cell of the higher-level table. A plurality of second cells may refer to cells that may be adjacent (e.g., sharing the same borders, preceding each other, touching, adjoining, contiguous, juxtaposed, being in close proximity, or being nearby, or any other combination thereof) to each other that may be associated with the lower-level table. Storing a specific conditional rule may refer to a particular conditional rule, as described above, that may be stored in memory or a repository. The specific conditional rule may be associated with a specific cell of the higher-level table structure and the plurality of second cells associated with the lower-level table structure such that information contained in the specific cell of the higher-level table structure may be affected or otherwise altered in response to information associated with the plurality of second cells, according to the specific conditional rule. The specific conditional rule may have one or more triggers and one or more actions that may cause the specific cell to change or alter summary information based on changes in the second rows, columns, cells of the lower-level table that meet the conditional triggers (triggered in response to a threshold being met). Qualifying data may refer to any information that meets a threshold and thereby qualify to meet a condition that may trigger a conditional rule. The qualifying data may include but is not limited to one or more keywords, values, qualifiers that may be represented as numbers, letters of the alphabets, alpha-numeric values, syntax, or mathematical expressions, or any other representation or combination thereof. The qualifying data may be entered data in a cell or may be selected from a list of values. For example, the qualifying data may be a constant from a list of values associated with a milestone indicator. A column in the lower-level table may include a "status" column that may display milestone indicators such as "Working on it," "Stuck," or "Done" as options that a user may select. The user may select label "Done" to provide the status associated a task in the lower-level table. The status of "Done" in the lower-level table may be qualifying data that may trigger a conditional rule that alters a specific cell of the higher-level table to reflect that all of the sub-tasks in the lower-level table structure have been marked "Done." For example, where a lower-level table contains multiple sub-tasks for different phases of a project, a conditional rule may be configured to reflect the progress of the sub-tasks in a specific cell of the higher-level table structure, such as a number of sub-tasks completed or a phase in which the sub-tasks are in progress.

By way of example, FIG. 227 illustrates a use case of an example view of qualifying data in a plurality of seconds cells in a lower-level table structure triggering a specific conditional rule to change a specific first cell of a higher-level table structure. As illustrated in FIG. 227, higher-level table 22700 may include a "Stage" first column 22702, which may include varying input options such as "Research," "Exploration," "Full Design," and "Design Complete." A specific first cell 22704 may display information as a milestone indicator that the current stage is "Research." The higher-level table 22700 may include a lower-level table 22706. The lower-level table may include a "Subitem" column 22708, a "Status" column 22710, and a "Stage" column 22712. The "Subitem" column 22708 may include a plurality of cells displaying different tasks associated with qualifying data for the stage, as shown in the "Stage" column 22712. The "Status" column 22710 and "Stage" column 22712 may display milestone indicators with respect to each of the subitems. The "Status" column 22710 may also be associated with different input options such as "Done," "Stuck," or "Working on it" for its plurality of cells. The "Stage" column 22712 may input options such as "Research," "Exploration," "Full Design," and "Design Complete" for its plurality of cells. A cell 22714 of the lower-level table 22706 may include a milestone indicator such as "Working on it," and another cell 22716 of the lower-level table 22706 may include a milestone indicator of "Research." A specific conditional rule 22820 of FIG. 228 may associate the specific cell 22704 of the higher-level table 22700 to the plurality of cells in "Status" column 22710 and "Stage" column 22712 of the lower-level table structure 22706. As a user or owner may start performing a task listed in the plurality of second cells under "Subitems" column 22708, the cell 22714 and cell 22716 may have as milestone indicators "Working on it" and "Research," which may be the qualifying data that may trigger the specific conditional rule 22820 (of FIG. 228) to alter the specific cell 22704 to display that the project is currently in the "Research" stage.

In another example, FIG. 228 illustrates an exemplary conditional rule associating a specific first cell (of a higher-level table) with a plurality of second cells (of a lower-level table), consistent with some embodiments of the present disclosure. As illustrated in FIG. 228, specific conditional rule 22820 may include a conditional statement—"When subitem Status changes to anything and subitem Stage is Research, set Stage to Research." Specific conditional rule 22820 may also include triggers—"When subitem Status changes to anything" and "subitem Stage is Research"—and actions—"set Stage to Research." Each of the configurable fields 22822, 22824, 22828, 22830, 22834, and 22836 of the conditional rule 22820 may be configured by an input, such as a selection a pick list associated with each of the fields (e.g., pick lists 22838, 22826, and 22832). Each of the configurable fields may be mapped to specific columns, for example, from a higher-level or lower-level table as shown in FIG. 227. The trigger, "subitem Status" 22822, may be linked to the "Status" column 22710 in FIG. 227. The trigger, "anything" 22824, may be an indication that any of the statuses (e.g., Done, Working on it, Stuck) may be considered to be qualifying data for the plurality of second cells in the "Status" column 22710 of FIG. 227. The trigger, "subitem Stage" 22828 may be linked to the "Stage" column 22712 of FIG. 227. The trigger "Research" 22830 may be the qualifying data necessary to trigger the conditional rule 22820 to carry out the action of "set Stage to Research," as indicated by the remainder of the conditional rule 22820 in FIG. 228.

FIG. 229 illustrates another case of an example view of qualifying data in a plurality of seconds cells of a lower-level table triggering a specific conditional rule to change a specific first cell of a higher-level table, consistent with some embodiments of the present disclosure. As illustrated in FIG. 229, higher-level table 22940 may include a "Stage" first column 22942 having a specific first cell 22944. The higher-level table 22940 may also include lower-level table 22946 that may include "Subitems" second column 22948, "Status" second column 22950, "Milespost" second column 22952, and "Stage" second column 22954. A specific conditional rule 23060, described further below in reference to FIG. 230, may be triggered to cause the specific first cell 22944 to display as milestone indicator "Full Design" because the cell 22956 and the cells above it have been marked "Done," which all may be qualifying data that trigger the conditional rule 23060. Additionally or alternatively, another cell 22958 may be marked as "Reached" to indicate that all of the previous subitems have reached a particular milepost, which may be the qualifying data for triggering the conditional rule 23060. In both of these situations, cell 22956 and 22958 are both associated with a "Full Design" stage as indicated by cell 22960, which may also be considered qualifying data for triggering the conditional rule 23060 to update the specific cell 22944 to present a "Full Design" stage to reflect the progress in the lower-level table 22946.

FIG. 230 illustrates a specific conditional rule (associated with the example shown in FIG. 229) associating the specific first cell of a higher-level table with a plurality of second cells of a lower-level table. As illustrated in FIG. 230, specific conditional rule 23060 may include a conditional statement—"When subitem Status changes to Done and subitem Milespost is Reached and subitem Stage is Full Design set Stage to Full Design." Specific conditional rule 23060 may also include triggers and actions similar to the conditional rule 22820 of FIG. 228. Each of the configurable or definable fields 23062, 23064, 23068, 23070, 23074, 23076, 23080, and 23082 may be defined by a user in any manner, such as through picklists as shown in FIG. 230. The pick lists 23066, 23072, 23078, and 23084 may be based on information contained in either the higher-level table 22940 or lower-level table 22946 of FIG. 229. The specific conditional rule 23060 of FIG. 230 may be configured to monitor for qualifying data (e.g., subitems Statuses changing to Done 23064 and subitem Milespost is Reached 23070) to cause the specific conditional rule 23060 to be triggered and cause an action (e.g., setting Stage to Full Design 23082).

In some embodiments, the at least one processor of the system may carry out operations that may involve receiving qualifying information from each of the plurality of second cells. Qualifying information may refer to any information that meets a threshold or condition, similar to the previous reference to qualifying data. The at least one processor may use the qualifying information in one or more cells of a hierarchical table to determine whether to trigger a conditional rule, as described previously. For example, the at least one processor may receive the qualifying information as a variable declaring the statement "True" or "False" that the qualifying data in each of a plurality of second cells in a lower-level table may meet or not meet the triggers established in a specific conditional rule.

In some embodiments, the at least one processor of the system may carry out operations that may involve upon receipt of the qualifying information from each of the plurality of second cells, triggering the specific conditional rule to thereby update milestone information in the specific first cell of the higher-level table. Updating milestone information may refer to the addition, deletion, rearrangement, or any other modification or combination thereof of information related to a milestone that may be included in a cell of the higher-level or lower-level table. Updating milestone information may occur automatically based on a logical rule associated with a specific conditional rule that monitors conditions and qualifying information (of a lower-level table) that meet those conditions before triggering the update of milestone information in a specific cell of a higher-level table, as previously described above in the exemplary use cases.

In some embodiments, the at least one processor of the system may carry out operations that may involve, wherein prior to updating the specific first cell, the specific first cell being empty and updating may cause the milestone indicator to be added to the specific first cell. A cell being empty may include a cell of a table that does not contain information but may still be a part of other functions such as a conditional rule, as previously discussed. Depending on the conditional rule, qualifying data from the lower-level table may cause the conditional rule to be triggered to cause an update in a specific cell of the higher-level table that was previously empty so that the specific cell then becomes populated with an indication of a milestone of the information associated in the lower-level table.

By way of example, FIGS. 231 and 232 illustrate updating the specific first cell from being empty to having an updated milestone indicator, consistent with some embodiments of the present disclosure. As illustrated in FIG. 231, higher-level table 23100 may contain the first row 23102 including an empty specific cell 23104 to present an indication of information contained in the lower-level table 22706's plurality of cells 23108. The same higher-level table 23200 in FIG. 232 may contain the first row 23212 including the same specific cell 23214 being updated to add the milestone indicator "Design Complete" because the plurality of cells 23218 in lower-level table 23216 may be the qualifying information for a conditional rule that populated the previously empty cell 23104 to be updated with milestone information in updated cell 23214.

In some embodiments, the at least one processor of the system may carry out operations that may involve the specific first cell containing an original milestone indicator and updating may cause the original milestone indicator to be replaced by an updated milestone indicator thereby reflecting progress in a workflow. An original milestone indicator may include any milestone indicator as previously discussed and may be different from an updated milestone indicator. For example, an original milestone indicator may include an indication of "Preliminary Design Stage," and an updated milestone indicator may contain the indication of "Critical Design Stage" that may be updated as a result of a conditional rule being triggered to reflect the progress of a workflow contained in a lower-level table. A workflow may refer to combination of structures such as tasks or activities that may organize a project or any other activity. For example, a workflow may include a sequence of tasks such as a "Research Phase," an "Exploration Phase," a "Full Design Phase," and followed by a "Design Complete Phase." These sequences may represent different milestones in a project configured by a user or may be provided as a preset by the system.

By way of example, FIGS. 233 and 234 illustrate a specific first cell containing an original milestone indicator being replaced by an updated milestone indicator, consistent with some embodiments of the present disclosure. As illustrated in FIG. 233, the higher-level table 23300 may contain the specific cell 23302 having the original milestone indicator "Exploration" based on information contained in the plurality of cells 23304 in lower-level table 23306. The lower-level table 23306 may contain the workflow milestones of "Research," "Exploration," "Full Design," and "Design Complete. FIG. 234 illustrates the same higher-level table 23410 containing the same specific cell 23412 having an updated milestone indicator "Full Design" being the third task in the workflow due to the status of the information in the plurality of cells 23414 in the same lower-level table 23416.

Some embodiments may involve the at least one processor being further configured to cause a lower-level table to be selectively expandable and collapsible on a viewable interface and upon receipt of a collapsing command, may cause the lower-level table to be hidden from view. Selectively expandable and collapsible may refer to the ability or capacity to receive a selection from any interface to display (e.g. expand or make visible) or reduce (e.g., minimize, hide, obfuscate) information from a particular lower-level table. A collapsing command may refer to instructions not limited to pressing or clicking a button by a user to request the at least one processor to collapse the lower-level table such that it may be hidden from view in the viewable interface, as previously described. Being hidden from view may include any reduction of viewability of information, such as a minimization of information, complete removal, or partial reduction in viewability. There may also be an expanding command having instructions not limited to pressing or clicking a button by the user to request the at least one processor to expand the lower-level table such that it may be visible from view in the viewable interface.

FIG. 235 illustrates example views of the at least one processor selectively collapsing lower-level table upon receipt of a collapsing command in a viewable interface, consistent with some embodiments of the present disclosure. As illustrated in FIG. 235, a first view 23500 of the viewable interface may display a lower-level table 23502. The at least one processor may, upon receipt of a collapsing command 23504, collapse the lower-level table 23502 as shown in collapsed view 23506. In the collapsed view 23506 of the same viewable interface, the lower-level table 23502 from the first view may be collapsed such that it may be hidden from view as compared to the first view 23500.

Some embodiments may involve the at least one processor further configured to receive from a rule-builder interface, specific conditions in second cells of the lower-level table that may trigger the milestone update in the first specific cell of the higher-level table. A rule-builder interface may refer to a viewable interface specifically dedicated to forming, establishing, and executing conditional rules. The rule builder-interface may enable the selection of a customized conditional rule or pre-defined conditional rule, enable input for user-definable requirements into a selected conditional rule, enable association of the selected conditional rule to structures in the higher-level and lower-level tables.

FIG. 236 illustrates an example view of a rule-builder interface having specific conditions in cells of the lower-level table triggering the milestone update in the specific cell of the higher-level table, consistent with some embodiments of the present disclosure. As illustrated in FIG. 236, rule-builder interface 23600 may include a specific conditional rule 23060 with a conditional rule trigger 23602, a conditional rule action 23604, pre-defined conditional rule options 23606 from which a user may select to build a conditional rule, specific higher-level conditions 23608 associated with a specific first cell of a higher-level table, specific lower-level conditions 23610 associated with a second cell or a plurality of second cells in the lower-level table, and a button 23612 for finalizing conditional rule for execution. The selection of pre-defined conditional rule options 23606 and the specific lower-level conditions 23610 may generate the conditional rule trigger 23602 associated with the plurality of second cells in "Status" second column 22710 and "Stage" second column 22712 of FIG. 227, as described above. Similarly, the selection of pre-defined conditional rule options 23606 and the specific higher-level conditions 23608 may generate the conditional rule action 23604 associated with the specific first cell 22704 in "Stage" first column 22702 of FIG. 227. The conditional rule trigger 23602 may trigger a milestone update (e.g., the update of the milestone indicator or qualifying data) of the specific first cell 22704 based on the conditional rule action 23604.

Some embodiments may involve the at least one processor being further configured to receive from the rule-builder interface, specific variables for each of the plurality of second cells, to prevent the specific conditional rule to be triggered until each of the specific variables exists in an associated second cell. Specific variables for cells may include any information that may be contained in the cells. A conditional rule may include these specific variables to determine when the conditional rule should be triggered. These variables may be selected in the rule-builder interface to configure the qualifying data that will trigger the conditional rule that may cause a milestone indicator to be updated. For example, the specific variable may contain the qualifying data "Anything," "Done," "Stuck," "Working on it," "Reached," "Research," "Exploration," "Full Design," "Design Complete," or any other indicators or information that may be used to indicate qualifying information as described above.

By way of example, FIG. 236 illustrates the rule-builder interface 23600 having the conditional rule trigger 23602 with "Status" specific variable 23614 having the qualifying data "anything" and "Stage" specific variable 23616 having the qualifying data "Exploration." Unless, the "Status" specific variable 23614 and "Stage" specific variable 23616 have their respective variables meet the qualifying data met as configured, the at least one processor may not trigger the conditional rule action 23604 because the qualifying information may not be met.

Some embodiments may involve the at least one processor further configured to store the specific conditional rule as a template for application to additional lower-level tables. Storing a specific conditional rule as a template may include storing a specific conditional rule in memory for later application, such as in a non-transitory computer-readable medium. Once stored in memory, the specific conditional rule may be accessed and reused for additional lower-level tables or even higher-level tables. For example, in another board, the specific conditional rule may be applied to one or more additional lower-level tables associated with one or more higher-level tables without needed to recreate the specific conditional rule in the rule-builder interface from scratch.

By way of example, FIG. 237 illustrates the at least one processor storing a specific conditional rule as a template for application to additional lower-level tables, consistent with some embodiments of the present disclosure. As illustrated in FIG. 237, rule-builder interface 23700 may include a plurality of conditional rules that may have been generated previously. A user may request that a specific conditional rule 23702 be stored as a template 23704 by the at least one processor for application to any future or additional lower-level tables.

FIG. 238 illustrates exemplary block diagram for an exemplary method for implementing conditional rules in a hierarchical table structure, consistent with some embodiments of the present disclosure. Method 23800, as shown in FIG. 238, with block 23802 may maintain presentation on a viewable interface a higher-level table structure having first rows, first columns and first cells at intersections of first rows and first columns, as previously discussed. At block 23804, method 23800 may maintain for presentation on the viewable interface a lower-level table structure having second rows, second columns and second cells at intersections of second rows and second columns, as previously discussed. At block 23806, method 23800 link the lower-level table to a specific first cell in the higher-level table, wherein the specific first cell is configured to present a milestone indicator, as previously discussed. At block 23808, method 23800 may store a specific conditional rule associating the specific first cell with a plurality of second cells of the lower-level table, such that entry of qualifying data into each of the plurality of second cells triggers the specific conditional rule to cause a change in the specific first cell of the higher-level table, as previously discussed. At block 23810, method 23800 may receive qualifying information from each of the plurality of second cells, as previously discussed. At block 23812, method 23800 may trigger, upon receipt of the qualifying information from each of the plurality of second cells, the specific conditional rule to thereby update milestone information in the specific first cell of the higher-level table, consistent with the disclosure discussed above.

Aspects of this disclosure may provide a technical solution to challenges associated with collaborative work systems. Disclosed embodiments include methods, systems, devices, and computer-readable media. For ease of discussion, an example system for automatic generation of customized lower-level table templates based on data in an associated higher-level table structure is described below with the understanding that aspects of the example system apply equally to methods, devices, and computer-readable media. For example, some aspects of such a system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

Tools for automatic generation of customized lower-level table templates based on data in an associated higher-level table structure are lacking. Accordingly, the automatic generation of customized lower-level table templates based on data in an associated higher-level table structure may create efficiencies in data processing, reduce costs associated with memory, distributed memory, communication across multiple networks, and reliability needed in processors, and improve accuracy in the generation and display of customized lower-level table templates, lower-level table structure (which may include default values in its cells), and associated higher-level table structure.

Therefore, there is a need for unconventional methods, systems, devices, and computer-readable media for automatic generation of customized lower-level table templates based on data in an associated higher-level table structure. By using the disclosed computerized methods to ascertain the automatic generation of customized lower-level table templates based on data in an associated higher-level table structure, the embodiments provide advantages over prior systems that merely provide on demand table structures.

As another example, some aspects of such system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for automatic generation of customized lower-level table templates based on data in an associated higher-level table structure. The system may involve at least one processor (e.g., processor, processing circuit or other processing structure described herein) and may be employed in collaborative work systems. Lower-level table templates may refer to one or more temporary or permanent table formats hierarchically arranged beneath a higher level table. The lower-level table template may be organized or positioned into a tree-like structure, a cascade of tables, or an array of tables where the tables may be positioned, located, or embedded into one or more other tables that may be at higher levels. The lower-level table templates may be configured to display data or information in one or more cells, rows, and columns of a table. For example, a lower-level table template may be configured to augment a higher level table by providing back-up information, additional information, and/or information related to the higher level table. Customized lower-level table templates may refer to lower-level table templates capable of being modified, changed, rearranged, reformatted, edited, or any combination thereof individually, in groups, globally, or any combination thereof. Customized templates may have different formats or representations of elements, data, information, and text inside the lower-level tables such that a template change may be reflected in one or more lower-level tables. Furthermore, the customized lower-level table templates may be capable of being modified, such as through the addition or removal of cells, rows, and columns. A higher-level table structure may refer to a table structure—having a plurality of rows, columns, and cells—that may be hierarchically arranged above one or more tables that may be at lower-levels. The higher-level table structure may have the function or characteristic of having one or more tables nested, positioned, located, or embedded beneath a row, a column, or a cell. The higher-level table structure may consist of rows, columns, and cells and may have the function or characteristics of containing data or information that may change, alter, or update the structure or display of data or information in one or more lower-level tables nested or embedded beneath the higher-level table structure. For example, data contained in one or more cells of the higher-level table structure may cause the at least one processor to automatically generate one or more customized lower-level table templates for each row or cells of the higher-level table structure. Each customized lower-level table template associated with higher-level table structure's rows or cells may be the same or different from one another. The data or information in the higher-level table structure may include text, numbers, links, objects, expressions, conditions, or formats, or a combination thereof that the at least one processor may automatically detect to generate customized lower-level table templates.

By way of example, FIG. 239 illustrates an example view of customized lower-level table templates based on data in an associated higher-level table structure, consistent with some embodiments of the present disclosure. FIG. 239 may include view 23900 that may include higher-level table structure 23902 having a plurality of rows, columns, and cells. View 23900 may also include a customized lower-level table template 23904 that the at least one processor may position under row 23918 of higher-level table structure 23902. The at least one processor may automatically generate the customized lower-level table template 23904 based on the data contained in the "Design Sundance" cell 23906.

Disclosed embodiments may involve maintaining the higher-level table structure having first rows, first columns, and first cells at intersections of first rows and first columns, wherein the first cells may be configured to hold values, and wherein the higher-level table structure may exhibit a plurality of characteristics including at least two of a table type, a table grouping, table content, a table size, a particular column heading, a particular item label, or an author. Maintaining a table structure may involve storing a template in memory. In another sense, maintaining a table structure may involve storing in a data structure information keyed to columns, rows, and/or cells in a table. The values in first cells may refer to data such as text, numbers, expressions, conditions, objects, links, formats, or a combination thereof, as described above. A plurality of characteristics of a table (e.g., higher-level or lower-level) may refer to one or more values, traits, entities, relationships, associations, patterns, indicators, or any combination thereof. These characteristics may include one or more of a table type, a table grouping, table content, table size, particular column headings, particular item labels, or authors. For example, table characteristics may include table type, table grouping, table content, table size, particular column heading, particular item label, or an author. Each higher level table may exhibit at least two of these characteristics.

A table type may refer to a category, classification, design, purpose, or description of a table. Differing tables may track differing types of items. For example, a real estate company may have a first type of table that it uses to track rentals of properties, a second type of table used to track sales of properties, and a third type of table used to track property renovations. Table grouping may refer to the collective or set arrangement into a unit of the combination of one or more higher-level tables, one or more lower-level tables, or any combination thereof. The table grouping may be used by the at least one processor as an object to assign data or information associated with the higher-level table structure, the lower-level table, or any combination thereof. Table content may refer to the values or data contained in the first cells of the higher-level table structure or the lower-level table. The table content may be used by the at least one processor as an object to assign data or information associated with the higher-level table structure, lower-level table, or any combination thereof. Table size may refer to the overall or individual dimensions or magnitude—big or small—of the first rows, the first columns, the first cells, and the higher-level table structure or the lower-level table. The table size may be used by the at least one processor as an object to assign data or information associated with the higher-level table structure, lower-level table, or any combination thereof. A particular column heading may refer to a value descriptive of information in an associated column. The particular column heading may be used by the at least one processor as an object to assign data or information associated with the higher-level table structure, lower-level table, or any combination thereof. A particular item label may refer to values characterizing or being associated with data in rows, columns, cells. The particular item label may also refer to a title associated with a table grouping or row. The particular item label may be used by the at least one processor as an object to assign data or information associated with the higher-level table structure, lower-level table, or any combination thereof. An author may refer to the owner, assignee, assignor, or creator of tasks, activities, assignments, or a combination thereof in a higher-level table or a lower-level table. The author may be a value or data in cells, rows, or columns. The author may be used by the at least one processor as an object to assign data or information associated with the higher-level table structure, lower-level table, or any combination thereof. The plurality of characteristics may be used by the at least one processor as an object to assign data or information associated with the higher-level table structure, lower-level table, or any combination thereof. For example, the higher-level table structure may consist a plurality of rows, a plurality of columns, and a plurality of cells. First cells may be at the intersection of first rows and first columns.

If, for example, a higher-level table structure has a plurality of characteristics such as three groupings of items, and two particular column headings (e.g., "Stage" and Status"), the system may identify these characteristics for further analysis. The system may analyze other characteristics of the higher-level table structure such as a particular item label (e.g., an item heading labeled as "Real Estate Property 1") or author.

By way of example with reference to FIG. 1, the system may maintain an object (e.g., a higher-level table structure) by storing it in memory 120, in storage 130, or in both. FIG. 239 illustrates an example of higher-level table structure 23902 having a first row 23908, a first column 23910, and a first cell 23912 at the intersection of the first row 23908 and the first column 23910. The higher-level table structure 23902 may exhibit, as plurality of characteristics, a single table grouping 23914, four particular column headings 23916—"Subitems," "Owner," "Due by," and "Stage"—, a particular item label 23906 having a value "Design Sundance," and an author 23912.

Consistent with disclosed embodiments, a least one processor of the system may carry out operation that may involve receiving an input for triggering generation of a lower-level table template tied to the higher-level table structure. An input for triggering generation of a lower-level table template may refer to an action by a user to cause, induce, or trigger at least one processor to generate a lower-level table template tied or associated with one or more first cells in the higher-level table structure. In some instances, the addition of data to a higher-level table may trigger formation of a lower-level table. In other instances, a lower-level table may be established in response to a specific request of a user. In yet other instances, the lower-level template might automatically be associated with a higher-level table template through design or configuration of the system. The input for triggering a lower-level template may include a change in one or more values in the first cells, particular column headings, particular item labels, or any combination or singular change in the higher-level table. In addition, the input for triggering may be a change in the table size, the table type, the table grouping, the table content, a particular item label, the particular column heading, author, or any combination thereof. The lower-level template may or may not be represented or displayed, and the at least one processor may store the lower-level template in the memory of the system. For example, the at least one processor may detect that a value in a particular item label in the higher-level table structure may have changed, which may trigger the generation of the lower-level table template. In another example, the at least one processor may detect the addition of a particular column heading and author in the higher-level table structure, which may trigger the generation of the lower-level table template.

Some disclosed embodiments may involve triggering a lower-level table structure as a result of activation of a button. Activation of a button may refer to a user pressing, touching, or clicking a button (actual or virtual) to request the at least one processor to generate the lower-level table template that may be tied to the higher-level table structure.

By way of example, the at least one processor may store lower-level table template in the memory 120 in FIG. 1, the storage 130 in FIG. 1, or both. FIG. 240 illustrates examples views of receiving an input for triggering the generation of a lower-level table template tied to the higher-level table structure, consistent with some embodiments of the present disclosure. FIG. 240 illustrates a first view 24000 having a higher-level table structure 24002 with a first row 24004. A user may provide the input by clicking on the first cell 24006 that may trigger the at least one processor to generate a lower-level table template 24014 in a second view 24010 or in memory, or any combination thereof. The lower-level table template 24014 may be tied to a first row 24016 of a higher-level table structure 24012 in the second view 24010. A lower-level table can be customized to suit the needs of users, and there is no hard- and fast structure required. In the instant example, a first row 24016 of the lower-level table structure 24012 may be a repetition of a first row 24004 of the higher-level table structure 24002. The lower-level table template 24014 may not be automatically displayed in second view 24010, and may be retrieved from the system's memory when a user calls for it (such as b clicking click the first cell 24006 in the first view 24000).

Disclosed embodiments may also involve analyzing at least one higher-level table characteristic including higher-level table type, higher-level table grouping, higher-level table content, higher-level table size, higher-level particular column heading, higher-level particular item label, or higher-level author. For example, the at least one processor may analyze one or more of the higher-level table characteristics previously described in order to determine a context for use in selecting a lower-level table. Analysis may include examining the characteristics identified and/or metadata associated with the characteristics to aid in lower-level table structure selection. For example, each specific author may have their own preferred lower-level templates. Therefore, analyzing author may facilitate lower-level table structure selection. By way of another example, lower-level tables may differ based on the table type of the upper-level table. In such instances, analyzing the table type of the higher-level table may facilitate selection of the lower-level table structure template. Similarly, differing groupings of items may each have their own associated lower-level template structure. In such instances, analyzing the grouping to identify it may facilitate lower-level template selection. By way of yet another example, analyzing table content, such as through semantic analysis, may identify a correlation between the content and a lower-level table structure template. In a further example, a larger table may typically be associated with a differing lower-level template than a smaller table. Analyzing the table size may therefore facilitate lower-level table template selection. Similarly, since row/item and column headings may indicate a data type, and the data type may correlate to preferred lower-level table structure templates, analysis of the row/item and column headings may be useful in lower-level table template selection. The analysis may be performed by at least one processor acting on information stored in the memory 120 in FIG. 1, the storage 130 in FIG. 1, or both. The analysis may involve the use of artificial intelligence/machine learning as previously discussed.

Some embodiments may involve, based on the input and the analysis, determining a customization of the lower-level table template, the customization including at least one of a lower-level column heading or a lower-level row heading. A customization of the lower-level table template may refer to selection and/or customization of a lower level template from a group of pre-existing lower-level templates. A customization may also include a complete or partial construction of a new lower-level template. In either instance, the customization may include a least one column or row heading. The column or row heading may correspond to or otherwise relate to information in an associated higher-level table. At least one processor may access a lower-level table template in memory to perform changes or alterations in the format, color, size, values, data or information, or any combination thereof of the rows, columns, or cells of the lower-level table template. A lower-level column heading may refer to a label or other indicator associated with a column. The lower-level column heading may be unique to the lower-level table template or may be the same as or similar to an associated higher-level particular column heading. The lower level heading may alternatively be, unique to the lower-level table template. A lower-level row heading may refer to a label or other indicator associated with one or more rows in a table. The lower-level row heading may be unique to the lower-level table template. The customization of the lower-level table template may include an addition, subtraction, rearrangement, change, alteration, or any combination thereof of the lower-level column heading or the lower-level row heading. For example, the at least one processor may access its memory to determine the customization of the lower-level table template based on an analysis or evaluation of at least one higher-level table characteristic. In another example, the at least one processor may determine the customization of the lower-level table template based on the input in the higher-level table structure. The input, as described above, may be a change in one or more higher-level values in the first cells, column heading, item label, table size, table type, table grouping, table content, activation of a button, or any combination thereof. In yet another example, the at least one processor may simultaneously determine the customization of the lower-level table template based on both the input and the analysis in the higher-level table structure. The at least one processor may continuously analyze and evaluate inputs triggering the generation of one or more lower-level table templates to determine the customization of the lower-level table templates.

By way of example, FIG. 241 illustrates a customization of a lower-level table template based on the input and the analysis by at least one processor, consistent with some embodiments of the present disclosure. As illustrated in FIG. 241, the at least one processor may receive an input 24102 in higher-level table structure 24100 triggering the generation of a lower-level table template in memory 120, storage 130, or both (as illustrated in FIG. 1). Furthermore, the at least one processor may analyze a higher-level author 24104 in a first cell to obtain the lower-level table template associated with the higher-level author 24104. Moreover, the at least one processor may analyze the value of a higher-level particular column heading 24106—"Stage"—, the value of a first higher-level particular item label 24108—"Design Complete"— in a first cell, and the value of a second higher-level particular item label 24110—"Design Braveheart"—to determine a customization of the lower-level table template 24112. The at least one processor may thereafter determine the lower-level column heading 24114—"Owner," "Status," "Milestone," and "Stage"—based on the higher-level author 24104, the higher-level particular column heading 24106, and the first higher-level particular item label 24108. In addition, the at least one processor may determine a row heading 24116—"Integration and Test"—based on the value of the second higher-level item label 24110.

Disclosed embodiments may also involve associating the customization with the lower-level table template to form a customized lower-level table structure. As discussed above, the lower-level table structure may include one or more rows, columns, and cells at the intersections of the rows and columns. Based on the analysis described above, at least one processor may determine the appropriate (e.g., best fit) lower level table template in order to define the structure of the associated lower-level table. This may include, for example, inserting appropriate column and row headings into the template. By either selecting a template from a group of predefined templates, customizing a template from a group, or building a customized lower-level table from scratch, the system may be said to form a customized lower-level table structure.

By way of example, FIG. 242 illustrates associating the customization with the lower-level table template to form a customized lower-level table structure, consistent with some embodiments of the present disclosure. As illustrated in FIG. 242, a higher-level table structure 24200 with first rows 24202 may include one or more values associated with the at least one higher-level table characteristics. The at least one processor may perform a customization of a lower-level table template as previously described to form a customized lower-level table structure 24204 having a plurality of cells, columns, cells, lower-level column headings—"Owner," "Phone Number," "Status—, and lower-level row headings—"Vibration Testing," "Thermal Cycling Testing," "Acoustic Testing," and "Radiation Testing." This may occur after the processor analyzes the table type and recognizes the words "design products" and "Atlas." Applying artificial intelligence, the system may realize that the higher-level table relates to a design of a product, and based on lower-level tables associated with other design projects, populates a lower-level table with the types of testing typically associated with design projects.

Some embodiments may involve presenting options for lower-level template structure and receiving a selection in response. As an alternative to the system picking the row headings, for example, the system may present to the user options for selection. That is, the system may provide a pick list or other form of display that permits a user to select appropriate elements for a lower-level table. In FIG. 242, the various types of testing may be presented to the user, and the user may decide to use some and not others. For example, if the Atlas project does not involve radiation, the user might opt not to select the radiation testing row heading. The presentation may occur in the form of a list menu, a drop-down menu, a visual representation of multiple lower-level template structures in an array, tabs containing each lower-level template structure, or any combination thereof on a graphical user interface to alter, change, add, subtract, rearrange, reformat, resize, change color, or a combination thereof the lower-level template structure. The at least one processor may independently provide a plurality of options for a plurality of lower-level template structures based on the customization of the lower-level template. The at least one processor may receive a selection in response. Such a selection may come from a user. For example, the at least one processor may display a plurality of views in an array on a graphical user interface of one or more lower-level template structures that a user may select from. Furthermore, the at least one processor may store the selected lower-level template structure for use in a lower-level table structure.

By way of another example, FIG. 242 illustrates example lower-level template structure 24204. In addition, the at least one processor may make the lower-level template structure viewable to a user on a graphical user interface. The at least one processor may present to a user a drop-down menu 24206 listing a variety of options to change the lower-level template structure 24204. The user may select an option 24208 to cause the at least one processor to dynamically change a representation or rendering of the lower-level template structure 24204 according to the user's selection. Furthermore, the user may select one or more options from the drop-down menu 24206 to cause the at least one processor to dynamically change the representation or rendering of the lower-level template structure 24204.

Some disclosed embodiments may involve causing a lower-level table structure to be displayed in association with the higher-level table structure. Causing the lower-level table structure to be displayed in association with the higher-level table structure may involve the at least one processor simultaneously displaying on a graphical user interface both the lower-level table structure and the higher-level table structure. A lower-level table structure may include a structure, but in some instances may also include default values in the cells of the structure. For example, a lower-level table structure may be displayed in association with a higher-level table structure as a blank structure, as a structure containing some data or information such as default values in cells, or may in some instances be fully populated with default values.

By way of example, FIG. 242 illustrates higher-level table structure 24200 and the lower-level table structure 24204 being simultaneously displayed on a graphical user interface by the at least one processor.

Disclosed embodiments may further involve determining when conditions in the higher-level table structure may meet a criterion for automatically generating a lower-level table structure, and wherein the input may occur as a result of the determination that the criterion may be met. Conditions in the higher-level table structure may refer to events or triggers associated at least one higher-level characteristic of the higher-level table structure that may cause the at least one processor to recognize, store, or flag one or more values in the at least one higher-level characteristic. Meeting a criterion may refer to a predetermined value being input in a table or a conditional change occurring in a table. Automatically generating a lower-level table structure may refer to the at least one processor independently creating or generating the lower-level table structure in memory or for display on a graphical user interface. The input may occur as a result of the determination that the criterion may be met. For example, a processor might recognize that the conditions in the higher-level table structure may have met a criterion based on an input, as discussed above. For instance, upon recognition that for a specific higher-level author a particular higher-level column heading becomes equal to "Stage," the at least one processor may automatically generate a lower-level table structure with a plurality of empty cells and specific column headings—"Owner," "Status," and "Stage."

FIG. 241 illustrates an example view of the lower-level table structure 24112 generated based the higher-level item label 24110 having the value "Design Braveheart." The lower-level table structure 24112 may include specific column headings 24114 and a plurality of cells.

Some embodiments may involve determining a customization of a plurality of differing lower-level table structures depending on specific characteristics of the higher-level table structure. For example, the at least one processor may recognize a value in a specific higher-level item label to cause a customization adding a specific lower-level column heading to all lower-level table structures, where the added heading is associated with a plurality of first rows in the higher-level table structure.

By way of example, FIG. 243 illustrates a customization of a plurality of differing lower-level table structures depending on specific characteristics of the higher-level table structure, consistent with some embodiments of the present disclosure. FIG. 243 includes a higher-level table structure 24300 having a first row 24302, a second row 24304, and other rows 24306. The first row 24302 may include a first associated lower-level table structure 24308, and the second row 24304 may include a second associated lower-level table structure 24310. Because the first row 24302 includes a characteristic of an item heading labeled "Design Atlas," the system may recognize the meaning of that heading and provide a lower-level table structure 24308 with characteristics associated with the recognized heading. In this instance, the system determined that a "Timeline" column 24312 was relevant to the "Design Atlas" project. In contrast, because the second row 24304 of the higher-level table 24300 includes a different characteristic (i.e., "Design Rapid Fire') the system may recognize the meaning of that heading and provide a lower-level table structure 24314 with differing characteristics (in this instance an absence of a timeline column).

Some disclosed embodiments may involve receiving an instruction for triggering generation of a sub-lower-level table template that may be tied to the lower-level table structure; analyzing at least one lower-level table characteristic, including lower-level table type, lower-level table grouping, lower-level table content, lower-level table size, lower-level particular column heading, lower-level particular item label, or lower-level author; based on the instruction and at least one of the higher-level table characteristic and the lower lower-level table characteristic, determining a customization of the sub-lower-level table template, the sub-lower lower-level customization including at least one of a sub-lower-level column heading or a sub-lower-level row heading; associating the customization of the sub-lower-level table template with the sub-lower-level table template to form a customized sub-lower-level table structure; and causing the sub-lower-level table structure to be displayed in association with the lower-level table structure. Just as a lower-level table structure hierarchically appears beneath a higher-higher level table structure, so too does a sub-lower level table structure appear beneath a lower-level table structure. Indeed, the earlier description of generating a lower-level table structure corresponds to generation of a sub-lower-level table structure, and therefore to avoid repetition, that description is invoked here. As with the higher and lower pairing, the instruction for the lower and sub-lower pairing may be the input that the at least one processor may receive.

At least one processor may receive an instruction such as the activation of a button to generate a sub-lower-level table template; the at least one processor may detect one or more values in both the at least one higher-level table characteristic and the at least one lower-level table characteristic to generate the sub-lower-level table template; or the at least one processor may receive instructions and detect one or more values in the at least one higher-level table characteristic and the at least one lower-level table characteristic to generate the sub-lower-level table template. The values detected may be a higher-level particular column heading combined with the lower-level author and lower-level content. Alternatively, the values detected may be a higher-level table content, a higher-level table size, a lower-level type, a lower-level table grouping, and a lower-level author. Furthermore, the at least one processor may determine a customization of the sub-lower-level table template where two sub-lower-level column headings and five sub-lower-level row headings may be added. Moreover, the at least one processor may apply the customization of the sub-lower-level table template to provide one or more customized sub-lower-level table structures for a user to select from. The at least one processor may simultaneously display on a graphical user interface both the lower-level table structure and the sub-lower-level table structure based on the selection in the one or more customized sub-lower-level table structures.

By way of example, FIG. 244 illustrates the simultaneous display of a higher-level table structure 24400, a lower-level table structure 24402, and a sub-lower-level table structure 24404. At least one processor may receive an instruction to generate the sub-lower-level table structure in response to a user pressing button 24406. In addition, the at least one processor may determine a customization of the sub-lower-level table template based on the user pressing button 24406, a first higher-level particular item label 24408, a second higher-level particular item label 24410, and a lower-level particular item label 24412. The first higher-level particular item label 24408 and the second higher-level particular item label 24410 may be the at least one higher-level table characteristic. In addition, the lower-level particular item label 24412 may be the at least one lower-level table characteristic. The at least one processor may associate the customization of the sub-lower-level table template with the sub-lower-level table structure 24404 for simultaneous display with the lower-level table structure 24402.

Some disclosed embodiments may involve storing the lower-level template structure for use with a later-developed higher-level table structure clone. The lower-level template structure may be stored in memory, storage, or the combination thereof. A later-developed higher-level table structure clone may refer to a copy or an identical representation of the higher-level table structure including all lower-level table templates, customization of the lower-level templates, customized lower-level table structures, and lower-level table structures associated with the higher-level table structure. For example, the at least one processor may store the higher-level table structure associated with a board, as discussed above, as a copy in memory, storage, or the combination thereof for later implementation or application to another board of the system or platform. The later-developed higher-level table structure may be customized according to instructions received by the at least one processor.

FIG. 245 illustrates an exemplary block diagram of an exemplary method for generating customized lower-level table templates based on data in an associated higher-level table structure, consistent with some embodiments of the present disclosure. Method 24500, as shown in FIG. 245, with block 24502 may maintain the higher-level table structure having first rows, first columns, and first cells at intersections of first rows and first columns, wherein the first cells may be configured to hold values, and wherein the higher-level table structure may exhibit a plurality of characteristics including at least two of a table type, a table grouping, table content, a table size, a particular column heading, a particular item label, or an author, as previously discussed. At block 24504, method 24500 may receive an input for triggering generation of a lower-level table template tied to the higher-level table structure, as previously discussed. At block 24506, method 24500 may analyze at least one higher-level table characteristic including higher-level table type, higher-level table grouping, higher-level table content, higher-level table size, higher-level particular column heading, higher-level particular item label, or higher-level author, as previously discussed. At block 24508, method 24500 may, based on the input and the analysis, determine a customization of the lower-level table template, the customization including at least one of a lower-level column heading or a lower-level row heading, as previously discussed. At block 24510, method 24500 may associate the customization with the lower-level table template to form a customized lower-level table structure, as previously discussed. At block 24512, method 24500 may cause the lower-level table structure to be displayed in association with the upper-level table structure, consistent with the disclosure discussed above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

The terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

displaying a table having at least one customizable row heading or column heading;

receiving an insertion of a customized name for the at least one customizable row heading or column heading;

performing a lookup of the inserted customized name to identify a data type associated with the inserted customized name;

displaying, based on the identified data type, selectable options for values for an associated cell of the at least one customizable row heading or column heading;

enabling selection of at least one option of the selectable options;

associating the selected option with the associated cell in at least one row or column associated with the at least one customizable row heading or column heading;

wherein the at least one processor is further configured to receive the insertion of the customized name from a list of predefined customized names;

receiving the insertion of the customized name using alphanumeric keystrokes;

wherein displaying the selectable options includes displaying a drop down menu of options;

wherein displaying the selectable options includes values that are displayed in at least one button;

wherein the at least one processor is further configured to receive an insertion of a second customized name for a second customizable row heading or column heading;

wherein the at least one processor is further configured to perform a second lookup of the second customized name in combination with the previously inserted customized name to identify a second data type associated with the second customized name;

wherein the at least one processor is further configured to display selectable options for second values for a second associated cell of the second customizable row heading or column heading;

wherein the at least one processor is further configured to enable selection of one of the second values;

wherein the at least one processor is further configured to populate the second associated cell with the second value upon selection of the second value;

storing a customized hybrid table-template definition, wherein the hybrid table-template definition includes a table format and at least one pre-population rule linking at least one cell of the hybrid table template with at least one cell of a preexisting table populated with data;

receiving a request to generate a new table using the hybrid table template definition;

following receipt of the request, generate the new table;

wherein generating includes following a link to access real-time cell data from the preexisting table, and migrating the real-time cell data to the new table;

wherein the real-time cell data is variable and wherein the at least one processor is configured such that when the real-time data is updated in the preexisting table, an update automatically occurs via the link to the new table;

wherein the at least one pre-population rule linking at least one cell of the hybrid table template with at least one cell of a preexisting table includes a plurality of pre-population rules linking a plurality of cells from a plurality of preexisting tables with the hybrid table template;

wherein the hybrid table template includes a plurality of cells, a first portion of which are linked to a preexisting table via a corresponding pre-population rule and a second portion of which are unlinked to a preexisting table;

wherein the pre-population rule is configured for dependency on other data in the new table, and wherein pre-population occurs after other data is entered in the new table;

wherein the at least one pre-population rule draws from at least one preexisting table at least one of a capacity, a count, an identity, a budget, variable numerical data, a timeline value, a status value, and a progress value;

wherein the at least one processor is further configured to receive a request to alter the stored hybrid table template definition based on data in the new table;

wherein the request to alter the stored hybrid table template definition is based on a sub-selection of data in the new table;

maintaining a main table having a first structure and containing a plurality of rows;

receiving a first electronic request for establishment of a first sub-table associated with the main table;

wherein the electronic request includes column heading definitions and wherein the column heading definitions constitute a second structure;

storing the second structure in memory as a default sub-table structure;

associating the first sub-table with a first row in the main table;

receiving a second electronic request for association of a second sub-table with a second row of the main table;

performing a lookup of the default sub-table structure following receipt of the second electronic request;

applying the default sub-table structure to the second sub-table;

receiving a change to a structure of the second sub-table, and upon receipt of the change, cause a corresponding change to occur in the first sub-table and the default sub-table structure;

wherein the at least one processor is further configured to receive a request to update data in the first sub-table, and wherein the update does not alter data in the main table;

wherein the at least one processor is further configured to display in a common view, information from the first sub-table and information from the main table;

wherein the at least one processor is further configured to receive an activation of a link associated with the first row of the main table, and upon activation to access the first sub-table;

wherein the common view includes summary information from the first sub-table in the main table;

wherein the summary information from the first sub-table is displayed in a cell of the main table;

wherein the at least one processor is further configured to render, in the main table, a display of an indication of a number of sub-items in the first sub-table;

maintaining the integrated web of the structural components and the data;

wherein the structural components include customized tables for maintaining the data, automations for acting on the data in the customized tables, and dashboards for visualizing the data;

receiving instructions to alter elements of at least some of the structural components;

updating the integrated web to comport with the instructions;

receiving a command to generate a copy of the structural components of the integrated web without the data;

in response to the command, outputting the copy of the structural components in a template format that permits the copy to be adopted for secondary use;

wherein the at least one processor is further configured to export the copy in the template format to a repository for access by third parties;

wherein the at least one processor is configured to enable revision of the copy prior to export;

wherein the revision includes a change in at least one column heading;

wherein the at least one processor is configured to limit access to the copy to entities with access authorization;
wherein the access authorization is dependent of receipt of a recompense signal;
wherein the automations include logical sentence structures defining logical rules;
wherein the instructions to alter elements include an instruction to alter at least one of the logical sentence structures;
maintaining the plurality of distinct tables;
wherein each distinct table contains a plurality of items, with each item being made up of a plurality of cells categorized by category indicators;
wherein the plurality of distinct tables contain a common category indicator;
generating a graphical representation of a plurality of variables within the plurality of cells associated with the common category indicator, the graphical representation including a plurality of sub-portions, each sub-portion representing a differing variable of the common category indicator;
receiving a selection of a sub-portion of the graphical representation;
performing a look-up across the plurality of distinct tables for a specific variable associated with the received selection;
based on the look-up, causing an aggregated display of a plurality of items dissociated from the differing tables;
wherein each displayed item includes the specific variable and variables associated with additional category indicators;
wherein the aggregated display includes a new table different from each of the distinct tables;
receiving a sub-selection of the plurality of distinct tables for exclusion from the aggregated display;
wherein following the received sub-selection, the aggregated display is caused to change to omit items from the excluded tables;
receiving selections of multiple sub-portions of the graphical display and to perform a look-up across the plurality of distinct tables for specific variables associated with the received selections;
storing the selections as a template;
receiving a selection to alter one of the plurality of items of the aggregated display;
in response to the selection to alter one of the plurality of items, outputting a display signal to re-render the aggregated display of the plurality of items;
wherein the aggregated display includes a graphical indicator based on a percentage makeup of a characteristic of the plurality of items;
accessing a first platform that displays a first set of data in a first format;
accessing a second platform that displays a second set of data in a second format;
linking the first set of data with the second set of data to enable migration of the first set of data to the second platform and the second set of data to the first platform;
enabling the first platform to simultaneously display the second set of data in the second format;
enabling alteration of the second set of data in the second platform through manipulation of the simultaneous display of the second set of data in the first platform;
in response to receiving an alteration, syncing the second set of data as altered via the first platform with the first data set;
wherein linking the first set of data with the second set of data includes mapping a data type from the first set of data to a data type from second set of data;
wherein enabling the first platform to simultaneously display the second set of data in the second format includes providing a frame within the first platform in which the second platform is displayed;
wherein the frame is an iframe;
wherein enabling alteration of the second set of data in the second platform through manipulation of the simultaneous display of the second set of data in the first platform includes enabling editing within the frame;
while the second platform is simultaneously displayed, exporting changes made to the first set of data to the second platform such that the simultaneous display of the second set of data is updated in real time;
wherein linking the first set of data with the second set of data occurs as a result of an input to a logical sentence structure;
in response to receipt of the input, regulating the syncing of the second data set with the first data set;
presenting a table via a display, the table containing rows and columns defining cells, the rows and cells being configured to manage respective roles of the workflow participants;
presenting on the display at least one active link for enabling workflow participants to join in a video or an audio communication;
logging in memory, characteristics of the communication including identities of the workflow participants who joined in the communication;
generating an object associated with the table, the object containing the characteristics of the communication logged in memory;
wherein the table is configured to track due dates and statuses of items associated with the workflow;
wherein the at least one processor is configured to associate the communication with a specific one of the items and to link the object to the specific one of the items;
wherein the at least one active link is associated with a particular row in the table;
wherein the generated object is associated with the particular row;
wherein the active link is associated with a particular cell in the table;
wherein the generated object is associated with the particular cell;
wherein the video or audio communication is provided via an application linked via the active link;
wherein the characteristics of the communication further include at least one participant identification, start and end time stamps, a conversation transcript, a conversation duration, a list of key words spoken in the communication, or statistics related to participants;
wherein generating the object associated with the table includes creating a row in the table associated with the communication;
wherein generating the object associated with the table includes creating a row in another table associated with the communication;
logging text messages occurring between participants during the communication;
wherein generating the object includes characterizing the logged text messages;
wherein characterizing the logged text messages includes recording a number of text messages exchanged;

wherein characterizing the text messages includes recording key words from the text messages;

maintaining a first table with rows and columns defining first cells;

maintaining a second table with rows and columns defining second cells;

displaying a joint logical sentence structure template including a first definable condition and a second definable condition;

linking input options for the first definable condition to the first table;

linking input options for the second definable condition to the second table;

generating a joint rule for the first table and the second table by storing a first value for the first definable condition and storing a second value for the second definable condition;

applying the joint rule across the first table and the second table;

triggering the joint rule when the first condition in the first table is met and the second condition in the second table is met;

wherein the joint rule includes an outcome of altering at least one of the first table, the second table, or a third table as a result of the triggering;

wherein the joint rule includes an outcome of sending a notification as a result of the triggering;

wherein the joint rule includes activating a control for an external device, as a result of the triggering;

wherein linking input options for the first definable condition to the first table includes selecting as a default a current table being accessed by an entity;

wherein linking input options for the second definable condition to the second table includes linking the second table to the first table via the joint rule;

employing the joint rule to alter information in at least one of the first cells based on information in at least one of the second cells;

presenting a plurality of alternative automation packages for application to a table;

wherein each package includes a plurality of automations;

wherein each automation is configured to cause an action in response to at least one condition detected in the table;

identifying a selection of a package from the plurality of packages;

automatically configuring a first condition in a particular automation in the selected package based on data in the table;

displaying a second undefined condition of the particular automation;

wherein the second undefined condition requires further configuration;

receiving an input for configuring the second undefined condition;

configuring the second undefined condition using the input to cause the second undefined condition to become a second defined condition;

applying the particular automation to the table;

wherein the alternative automation packages are vocationally-based;

wherein each automation includes a logical sentence structure including definable conditions;

wherein the action includes at least one of a change in data in the table or in another table, or a change in control of an external device;

wherein at least one condition detected in the table includes a change in data in a cell of the table;

wherein automatically configuring based on data in the table includes mapping column heading information in the table to column heading information in the particular automation;

wherein the mapping occurs using artificial intelligence;

wherein the mapping occurs using linguistic processing;

wherein displaying the second undefined condition includes presenting a logical sentence structure with a variable field for subsequent completion;

maintaining in the primary application, a table having rows, columns, and cells at intersections of the rows and columns;

wherein the primary application is configured to enable the construction of automations defined by conditional rules for altering internal information in the primary application and external information in the third party applications;

receiving an automation definition conditional on specific information input into at least one specific cell in the table of the primary application;

wherein the automation definition is constructed using internal blocks and external blocks, the external blocks having links to the external third party applications;

monitoring the at least one specific cell of the primary application for an occurrence of the specific information;

upon detection of the occurrence of the specific information, triggering functionality of the third party applications;

causing a presentation on a display a plurality of the internal blocks and a plurality of the external blocks;

wherein the automation definition is constructed of at least one internal block and at least two external blocks;

wherein the primary application is linked to the third party applications in a manner permitting the primary application to monitor data input in the third party applications;

wherein the conditional rules define changes to the primary application based on conditional data input in the third party applications;

wherein the primary application is configured to monitor a response from the third party applications, and if the response fails to meet a condition of the at least one specific cell, is configured to initiate an action;

wherein the action includes updating data in the at least one specific cell;

altering at least one specific external block, and in response to the alteration, store the alteration to the at least one specific external block for a later automation definition;

wherein each of the at least two external blocks link to differing external third party applications;

maintaining a table containing data;

storing a plurality of logical sentence structures that serve as logical rules to conditionally act on the data in the table;

wherein each logical rule is enabled to act at differing times in response to differing conditional changes;

activating the logical rules so that each rule is in effect simultaneously;

as each logical rule performs an action on the data, recording the action and an associated time stamp in an activity log;

receiving a query to identify most recent actions performed on the table;

accessing the activity log to identify at least one most recent action performed on the table;

presenting at least one specific logical sentence structure underlying at least one logical rule that caused the at least one most recent action;

receiving updates to the plurality of logical sentence structures, the updates including changes to logical sentence structure variables that alter associated logical rules;

wherein the at least one processor is further configured to log and timestamp each update;

wherein presenting at least one specific logical sentence structure that caused the at least one most recent action includes displaying variables changed via the at least one most recent update;

wherein the at least one most recent action includes an update made in at least one of the last few minutes, last hour, last day, last week, last month, or last year;

wherein the query is generated in response to a potential irregularity in an operation of at least one of the logical rules;

identifying the potential irregularity and to display an associated logical sentence structure;

receiving an indication of a type of irregularity occurring on the table, identifying a particular logical sentence structure likely to be associated with the irregularity, and displaying the particular logical sentence structure;

wherein the display of the particular logical sentence structure includes a display of a variable recently changed in the particular logical sentence structure;

wherein presenting includes causing the at least one logical sentence structure to appear on a display;

displaying multiple headings including a first heading and a second heading;

receiving a first selection of a first cell associated with the first heading;

wherein the first cell includes a first category indicator;

receiving a second selection of a second cell associated with the first heading;

wherein the second cell includes a second category indicator;

receiving a third selection of a third cell associated with the second heading;

wherein the third cell includes a third category indicator;

generating a logical filter for the complex table by;

joining with an "or," the first selection and the second selection associated with the first heading, the first selection and the second selection constituting a first group;

joining with an "and," the third selection and the first group;

applying the logical filter to the complex table;

in response to application of the logical filter, causing a display of a filtered collection of items from the first group that contain the third category indicator;

regenerating the logical filter in response to an input to provide additional filter options;

calculating and display a number of times that the first category indicator appears under the first heading;

reducing the displayed number of times following receipt of the third selection;

applying the logical filter in real time to each selection;

causing the logical filter to be saved in memory for later application;

causing the logical filter to be saved in a repository for application to a summary view of the complex table;

generating a real time indicator of a number of received selections;

wherein causing a display of the filtered collection includes displaying metadata associated with at least one item of the collection;

maintaining at least one table containing rows, columns and cells at intersections of rows and columns;

receiving a first selection of at least one cell in the at least one table;

generating a graphical representation associated with the first selection of the at least one cell;

generating a first selection-dependent link between the at least one table and the graphical representation, such that when information associated with the first selection is updated in the at least one table, the graphical representation changes;

receiving a second selection of at least one cell in the at least one table;

altering the graphical representation based on the second selection;

generating a second selection-dependent link between the at least one table and the graphical representation, such that when information associated with the second selection is updated in the at least one table, the graphical representation changes;

wherein the graphical representation includes at least two visualizations and the at least one processor is further configured to receive an input and to alter a presentation of at least one of the at least two visualizations in response to the input;

cancelling the first selection in response to the second selection;

receiving a cancellation of the second selection, and following the cancellation receipt, revive the first selection;

upon revival of the first selection, reverting the graphical representation to a prior state;

wherein the first selection-dependent link is tied to a column in the at least one table;

in response to receiving a request, generating another graphical representation based on the first and second selection-dependent links between the at least one table and the graphical representation;

receiving a cancellation of the second selection, and following the cancellation receipt, revive the first selection to regenerate both the graphical representation and the another graphical representation;

maintaining a table;

presenting to an entity a plurality of tools for manipulating data in the table;

monitoring tool usage by the entity to determine at least one tool historically used by the entity;

comparing the at least one tool historically used by the entity with information relating to the plurality of tools to thereby identify at least one alternative tool in the plurality of tools whose substituted usage is configured to provide improved performance over the at least one historically used tool;

presenting to the entity during a table use session a recommendation to use the at least one alternative tool;

wherein presenting includes providing the entity with an identification of the improved performance;

presenting the at least one alternative tool at a time when the entity accesses the at least one historically used tool;

wherein comparing includes performing semantic analysis of the table to identify a table context and wherein the at least one alternative tool is identified at least in part on the table context;

wherein the table context is at least one of a field, vocation, task, or function;

identifying an instance where a specific recommendation is declined, and is thereafter further configured to disable future presentation of the specific recommendation;

wherein the recommendation includes information about a tool newly added to the plurality of tools;

wherein monitoring tool usage includes monitoring a count of each instance each tool is used;

wherein monitoring tool usage includes monitoring combinations of the at least one tool historically used by the entity;

maintaining a list of restricted tools and is further configured to withhold a recommendation to a use a tool when the tool is on the restricted list;

outputting a logical sentence structure template for use in building a new application module, the logical sentence structure template including a plurality of definable variables that when selected result in a logical sentence structure delineating a function of the new application module;

receiving at least one input for at least one of the definable variables;

performing language processing on the logical sentence structure including the at least one received input to thereby characterize the function of the new application module;

comparing the characterized function of the new application module with pre-stored information related to a plurality of predefined application modules to determine at least one similarity to a specific predefined application module;

based on the at least one similarity, presenting the specific predefined application module as an adoptable alternative for accomplishing the function;

performing language processing on the logical sentence structure before less than all of the variables of the logical sentence structure are selected;

wherein the language processing is performed on the logical sentence structure before less than all of the plurality of variables are input;

wherein the function is estimated based on less than an input of all the variables;

wherein the characterization of the function of the new application module is generated before all of the plurality of variables are selected;

wherein the language processing on the logical sentence structure includes identifying function-related words used in the logical sentence structure;

wherein the language processing involves artificial intelligence for determining an objective of the logical sentence structure;

wherein the at least one similarity includes at least one of a similarity in a word or an objective;

wherein the characterization of the function of the new application module includes examination of a table associated with the logical sentence structure;

maintaining a table containing columns;

accessing a data structure containing the plurality of logical rules including a first particular logical rule that when linked to a first particular column, enables a table action in response to a condition change in a cell associated with the first particular logical rule linked to the first particular column;

accessing a correlation index identifying a plurality of column types and a subset of the plurality of logical rules typically associated with each column type;

receiving a selection of a new column to be added to the table;

in response to the received selection, performing a look up in the correlation index for logical rules typically associated with a type of the new column;

presenting a pick list of the logical rules typically associated with the type of the new column;

receiving a selection from the pick list;

linking to the new column a second particular logical rule associated with the selection from the pick list;

implementing the second particular logical rule when data in the new column meets a condition of the second particular logical rule;

wherein each of the plurality of logical rules includes a logical sentence structure;

wherein when the second particular logical rule is linked to the new column, the at least one processor is configured to apply the second particular logical rule to at least one cell in the new column;

wherein the table action includes a change in data in the maintained table or in another table;

wherein the condition change in a cell includes a change of data in the cell;

wherein the correlation index is stored in the data structure;

wherein the type of the new column is defined by a heading of the new column;

generating the correlation index by inspecting preexisting linkages between preexisting columns and at least some of the plurality of logical rules;

customizing the correlation index to the maintained table based at least in part on other column types in the maintained table;

wherein the correlation index is based on correlations previously employed by an entity associated with the new column;

wherein the correlation index is based on correlations previously employed by entities subscribed to the maintained table;

wherein the correlation index includes rules customized to identify individuals subscribed to the maintained table;

permitting alteration to the correlation index to remove suggestions;

maintaining a platform that hosts a plurality of applications accessible to a plurality of client devices;

enabling the plurality of client devices to access and display via the platform, the plurality of applications, when at a particular time, at least a first client device displays a first application and does not display a second application, and at least a second client device displays the second application and does not display the first application;

causing a communications interface to appear on the first client device and the second client device;

wherein the communications interface on the first client device includes a first link to the second application and the communications interface on the second client device includes a second link to the first application;

causing a first display on the first client device of the second application in response to selection on the first client device of the first link;

causing a second display on the second client device of the first application in response to selection on the second client device of the second link;
during the first display and the second display, enabling communication between the first client device and the second client device;
wherein the plurality of applications include tables;
wherein the communications interface includes a text chat box;
wherein the first link and the second link each include at least one button, activation of which enables screen sharing;
receiving a response to a notification and to cause the communications interface to appear on the first client device and the second client device upon receipt of the response to the notification;
wherein the first display on the first client device of the second application includes a link to a particular location within the second application, the particular location corresponding to a current working location on the second client device;
storing communications between the first client device and the second client device based on the particular location;
causing the communications interface to appear on a third client device and enabling access to the second application on the third client device via the first link;
enabling presentation of a shared work environment on a plurality of client devices;
causing a presentation of a plurality of visual indicators on a fraction of a display of the shared work environment;
wherein each visual indicator represents differing clients associated with the plurality of client devices;
enabling at least one group chat between the plurality of client devices;
wherein communications are presented in pop-up windows appearing adjacent corresponding visual indicators;
wherein the pop-up windows remain on the display for differing durations depending on variables including at least one of length of message, number of concurrently displayed messages, a client defined threshold, or a sender status;
saving a pop-up message for later review on a particular client device when a client associated with the particular client device selects the message;
wherein the fraction of the display includes a bar on an edge of the display;
wherein the visual indicator is at least one of a thumbnail photo, an icon, or alphanumeric characters;
comparing each message to a message length threshold and to increase message hang-time when the message length threshold is surpassed;
wherein the client defined threshold is selectable by a client;
wherein the client defined threshold is selectable by an administrator;
altering a combination of the plurality of client devices in the at least one group chat;
tracking electronic connections between a plurality of entities in an electronic workspace;
tracking characteristics of the electronic connections between the plurality of entities in the electronic workspace;
storing in memory the tracked connections and the tracked characteristics;
calculating connection strength between connected entities based on at least one of the tracked characteristics;
rendering a visualization of the plurality of entities;
rendering a visualization of the tracked electronic connections between the plurality of entities;
rendering a visualization of at least one of the tracked characteristics of the electronic connections;
wherein at least one of the rendered visualization of the tracked electronic connections and the rendered visualization of the at least one of the tracked characteristics is reflective of the calculated connection strength;
outputting a display signal to cause the visualization of the plurality of entities and the visualization of the tracked electronic connections to be presented as a map of nodes;
wherein each entity is represented as a separate node;
wherein at each node, an associated entity is represented via a photo, an icon, an avatar, a graphic, or a series of alphanumeric characters;
calculating the connection strength for a predefined time period;
wherein the time period is adjustable;
wherein the electronic connections are based on at least one of emails, team assignments, text messages, voice messages, file transfers, or collective work in the electronic workspace;
wherein the characteristics include at least one of a length of interaction, a quality of interaction, a type of interaction, a number of interactions, a frequency of interactions, or a regularity of interactions;
wherein the calculated connection strength is based on more than one of the plurality of tracked characteristics;
wherein the at least one of the rendered visualization of the tracked electronic connections and the rendered visualization of the at least one of the tracked characteristics reflective of the calculated connection strength is represented as at least one of a distance between rendered entities, a color, a size, an alphanumeric, or a graphic;
wherein each of the plurality of entities is a single individual;
wherein at least some of the plurality of entities includes a group of individuals;
wherein the calculated connection strength includes scoring;
calculating the connection strength based on at least one weight;
associating a user-ID with a workflow management account;
maintaining a plurality of workflow management boards associated with the workflow management account;
receiving a first plurality of touch points associated with the user-ID;
based on the first plurality of touch points, customizing the workflow management account by initially altering at least one of a column option picker, an automation option picker, a third-party application integration picker, a display interface picker, or a solution picker;
monitoring activity associated with the workflow management account;
receiving, based on the monitoring, a second plurality of touch points associated with the user-ID;
adjusting the customized workflow management account by subsequently altering, based on the second plurality of touch points at least one of the column option picker, the automation option picker, the third-party application integration picker, the display interface picker, or the solution picker;

permitting a plurality of entities to have access to the plurality of workflow management boards;

wherein the second plurality of touch points includes at least one touch point received from a first entity of the plurality of entities and at least one touch point received from a second entity of the plurality of entities;

wherein the subsequent altering results in a common visualization to both the first entity and the second entity;

permitting a plurality of entities to access the plurality of workflow management boards;

wherein the second plurality of touch points includes at least one touch point received from a first entity of the plurality of entities and a touch point received from a second entity of the plurality of entities;

wherein subsequently altering results in an altered customized visualization for the first entity different from an altered customized visualization for the second entity;

wherein at least one of the first plurality of touch points and the second plurality of touch points are derived from responses to queries;

wherein the queries seek a field identification;

wherein at least one of the first plurality of touch points and the second plurality of touch points are derived from actions monitored in the workflow management account;

wherein the actions monitored are associated with a plurality of entities;

wherein actions of a first of the plurality of entities cause customization differing from customization caused by actions of a second of the plurality of entities;

wherein the first plurality of touch points includes a primary touch point identifying a field, a secondary touch point identifying an endeavor, and a tertiary touch point identifying a tool;

receiving an additional plurality of touch points and to further customize the workflow management account based on the additional plurality of touch points;

analyzing behavior associated with the workflow management account, and deriving the second touch points based on the analysis of the behavior;

maintaining a main data source containing a plurality of data objects;

maintaining a plurality of boards for presenting the plurality of data objects;

maintaining a plurality of linkages between at least some of the plurality of data objects associated with differing boards of the plurality of boards;

receiving a selection of a particular data object associated with a particular board;

identifying via a particular linkage of the plurality of linkages at least one additional data object on another board linked to the particular data object on the particular board;

defining a sub-data source, the sub-data source aggregating the at least one additional data object and the particular data object;

receiving a visualization template selection;

mapping the sub-data source to the visualization template selection to generate a sub-data visualization;

causing a co-presentation of a representation of the particular board and the sub-data visualization;

wherein the plurality of linkages is defined by at least one of a folder, an automatic rule, a manually defined rule, a column heading, a row designation, a data cell value, or an item;

wherein the at least some of the plurality of data objects associated with differing boards include multiple data objects from each of the differing boards;

presenting an index of a plurality of visualization templates;

wherein the received visualization template selection is based on a selection from the index;

migrating the sub-data visualization for co-presentation with a representation other than the representation of the particular board;

upon receipt of a filter selection, causing the co-presentation to reflect an unfiltered representation of the particular board and a filtered representation of the sub-data visualization;

wherein the filtered representation is limited by a time period;

wherein the filtered representation is limited by a specific aspect of the particular data object;

enabling a selection causing a change in a relative makeup of a display surface area allotted to the representation of the particular board and the sub-data visualization;

wherein the sub-data visualization is presented within a container;

associating a computing application to the sub-data source to thereby alter the sub-data visualization;

maintaining a board with a plurality of items, each item defined by a row of cells;

wherein each cell is configured to contain data and is associated with a column heading;

linking at least a first column to at least a second column so that a change in data in a cell of the at least first column causes a change in data of a cell in the at least second column;

receiving a first selection of a particular item from the board;

wherein the particular item includes a plurality of cells with data in each cell;

wherein data in a first cell of the plurality of cells is linked to data in a second cell of the plurality of cells;

upon receipt of the first selection, causing a display of an item interface extrapolator;

wherein the item interface extrapolator includes a plurality of activatable elements, each of the activatable elements being associated with a differing visualization of at least some of the data contained in cells associated with the particular item;

receiving a second selection of one of the activatable elements;

upon receipt of the second selection, causing a first extrapolated display of data associated with the particular item to appear in a first manner;

receiving a third selection of another of the activatable elements;

upon receipt of the third selection, causing a second extrapolated display of data associated with the particular item to appear in a second manner;

receiving a fourth selection of a further activatable element;

wherein the further activatable element is configured to enable customization of the item interface extrapolator;

upon receipt of the fourth selection, enabling customization of the item interface extrapolator via a network access device;

wherein the customization enables data associated with the particular item to appear in a third customized manner;

storing the third customized manner as a template, and presenting the third customized manner as a display option when items other than the particular item are selected for analysis and display within the item interface extrapolator;

causing a simultaneous display of the item interface extrapolator and at least a portion of the particular item;

migrating the item interface extrapolator for co-presentation with a representation other than the board;

upon receipt of a filter selection, causing a co-presentation to reflect an unfiltered representation of the board and a filtered representation of the item interface extrapolator;

wherein the filtered representation is limited by a time period;

maintaining at least one table of the workflow management system, the at least one table containing a plurality of items and a plurality of asset designations, each asset designation being associated with at least one of the plurality of items;

maintaining at least one electronic whiteboard containing at least a subset of the plurality of asset designations;

maintaining a data structure containing a plurality of links;

wherein each link associates at least one of the subsets of asset designations with at least one location on the at least one electronic whiteboard;

receiving via a network access device having a display presenting the at least one table, an activation of a particular link associated with a particular asset;

in response to the activation of the particular link, altering the display to present at least a particular location on the at least one electronic whiteboard containing a particular asset designation corresponding to the particular asset;

wherein the particular location includes a cluster of additional asset designations related to the particular asset;

receiving a selection of at least one of the additional asset designations or the particular asset designation;

in response to the selection, retrieving a corresponding asset;

causing the corresponding asset to be presented on the display;

wherein the particular asset is a digital file, including at least one of a text, video, audio, image, design, document, tabular, an image file, a video file, a drawing file, a graphic file, a presentation file, project management file, or a web page;

wherein the cluster of additional asset designations is based on at least one of an author, owner, project, item, subject matter, team, file type, deadline, status, metadata, label, budget, or data source;

wherein at least one of the additional asset designations of the cluster is associated with a differing asset from the particular asset;

wherein at least one of the additional asset designations of the cluster is activatable to access information of another table;

receiving an alteration to the presented corresponding asset;

wherein the alteration causes sending a notification to an entity associated with the presented corresponding asset;

receive an alteration to the presented corresponding asset;

wherein the alteration to the presented corresponding asset causes the presented corresponding asset to be associated with another cluster of the electronic whiteboard;

receiving an alteration to the presented corresponding asset;

wherein the alteration to the presented corresponding asset causes a simultaneous change to the at least one table and the at least one electronic whiteboard;

maintaining a plurality of interconnected boards;

wherein a first group of at least some of the plurality of interconnected boards include items that contain external contact addresses;

wherein a second group of at least some of the plurality of interconnected boards omit external contact addresses;

monitoring, via a mediator overlay on the enterprise messaging system, contact addresses of incoming messages;

comparing a contact address of an incoming message against a repository of addresses associated with the first group of at least some of the plurality of interconnected boards;

in response to a match between the contact address of the incoming message and at least one address contained in the repository, generating at least one primary duplicate of the incoming message;

associating the at least one primary duplicate of the incoming message with each board of the first group of at least some of the plurality of interconnected boards;

determining for each of the boards of the first group having the at least one primary duplicate message associated therewith at least one linked board of the second group;

generating for the at least one linked board of the second group at least one secondary duplicate of the incoming message;

associating the at least one secondary duplicate of the incoming message with the at least one linked board of the second group;

determining for each of the boards of the second group having the at least one secondary duplicate message associated therewith at least one linked board of a third group of at least some of the plurality of interconnected boards;

generating for the at least one linked board of the third group at least one tertiary duplicate of the incoming message;

associating the at least one tertiary duplicate of the incoming message with the at least one linked board of the third group;

generating for the at least one linked board of the fourth group at least one quaternary duplicate of the incoming message;

associating the at least one quaternary duplicate of the incoming message with the at least one linked board of the fourth group;

monitoring, via the mediator overlay, contact addresses of outgoing messages;

comparing a contact address of an outgoing message against the repository of addresses associated with the first group of at least some of the plurality of interconnected boards;

in response to a match between the contact address of the outgoing message and at least one address contained in the repository, generating at least one primary duplicate message of the specific outgoing message;

associating the at least one primary duplicate message of the specific outgoing message with each board of the first group of at least some of the plurality of interconnected boards;

determining for each of the boards of the first group having the at least one primary duplicate message of the specific outgoing message associated therewith at least one linked board of the second group;

generating for the at least one linked board of the second group at least one secondary duplicate message of the specific outgoing message;

associating the at least one secondary duplicate message of the specific outgoing message with the at least one linked board of the second group;

aggregating associated messages of at least one board of the first group in chronological order;

in response to an input, rendering a presentation of the aggregated associated messages;

filtering the aggregated associated messages by an aspect including at least one of an author, recipient, board owner, date, communication type, communication content, or board address;

adding a quote to the aggregated associated messages in chronological order;

maintaining a plurality of boards related to a common entity;

wherein each board of the plurality of boards includes differing external addresses;

receiving an indication of an intent to send a communication, the indication originating from a specific board of the plurality of boards;

in response to receiving the indication, rendering a communication interface associated with the specific board;

performing a look up of a subset of the plurality of boards linked to the specific board;

retrieving external addresses from each of the subset of the plurality of boards;

populating the communication interface with the communication and the retrieved external addresses;

receiving a selection of at least one of the retrieved external addresses;

causing the communication to be transmitted to the at least one selected retrieved external address;

linking a copy of the transmitted communication to at least the specific board;

linking the copy of the transmitted communication to at least one of the subset of the plurality of boards from which the retrieved external address was retrieved;

populating the communication interface with retrieved external addresses from a source other than the plurality of boards;

wherein performing the look up of a subset of the plurality of boards includes performing semantic analysis on at least one cell of the specific board, performing semantic analysis on a plurality of cells of the plurality of boards;

wherein retrieving the external addresses is based on a connection between the semantic analysis of the specific board and the semantic analysis of the plurality of boards;

retrieving external addresses from each of the subset of the plurality of boards based on a context including at least one of a column heading, common characteristics between the specific board and at least one board of the subset of the plurality of boards, a common domain, an address, or a name;

wherein receiving an indication of an intent to send the communication includes an activation of a link associated with an item in the specific board;

wherein performing the look up of the subset of the plurality of boards linked to the specific board is based on the activated link in the specific board;

rendering the communication interface associated with the specific board in a co-presentation with the specific board;

populating the specific board with the retrieved external addresses;

maintaining and causing to be displayed a workflow table having rows, columns and cells at intersections of rows and columns;

tracking a workflow milestone via a designated cell, the designated cell being configured to maintain data indicating that the workflow milestone is reached;

access a data structure that stores at least one rule containing a condition associated with the designated cell;

wherein the at least one rule contains a conditional trigger associated with at least one remotely located dispenser;

receiving an input via the designated cell;

accessing the at least one rule to compare the input with the condition and determining a match;

following determination of the match, activating the conditional trigger to cause at least one dispensing signal to be transmitted over a network to the at least one remotely located dispenser in order to activate the at least one remotely located dispenser and thereby cause the at least one remotely located dispenser to dispense a physical item as a result of the milestone being reached;

wherein the workflow milestone is associated with at least one of a deadline, a status, a date, or a threshold;

wherein the at least one remotely located dispenser is configured to hold a plurality of confections and to dispense a confection in response to the dispensing signal;

wherein receiving the input occurs as a result of an update to the designated cell;

wherein the rule is an automation that associates the designated cell with the condition and an entity;

wherein at least one identity of at least one remotely located dispenser includes identities of a plurality of remotely located dispensers;

wherein the at least one dispensing signal includes a plurality of dispensing signals configured to cause, upon activation of the conditional trigger, dispensing by each of the plurality of dispensers;

wherein the at least one rule contains an identity of at least one entity associated with the at least one remotely located dispenser;

wherein activating the conditional trigger includes looking up an identification of the at least one remotely located dispenser based on the identity of the at least one entity;

wherein the at least one remotely located dispenser is located remote from the at least one processor;

wherein the input is received from a network access device in a vicinity of the at least one remotely located dispenser;

wherein the at least one remotely located dispenser and the network access device are located remote from the at least one processor;

wherein the at least one processor is a server;
wherein the at least one remotely located dispenser is connected to the server via a network;
wherein the physical item is a food item;
wherein the physical item is a gift;
wherein the at least one remotely located dispenser is a vending machine that holds a plurality of differing food items;
wherein the at least one signal is configured to dispense a food item in response to the conditional trigger;
wherein the vending machine is configured to withhold dispensing of the food item associated with the conditional trigger until an identity is locally received by the vending machine;
receiving over a network, during a presentation, from a plurality of network access devices, a plurality of non-audio signals corresponding to activations of substitute audio buttons, each of the plurality of non-audio signals having an audio identity;
processing the received plurality of non-audio signals to determine a quantity of non-audio signals corresponding to a specific audio identity;
performing a lookup in an audio-related data structure to select at least one particular audio file associated with the audio identity and the determined quantity;
outputting data for causing the at least one particular audio file to be played;
wherein the audio identity of the substitute audio buttons includes at least one of clapping or laughing;
wherein processing includes counting a number of non-audio signals received;
wherein each of the plurality of non-audio signals correspond to a common audio identity;
wherein at least a first group of the plurality of non-audio signals have a first audio identity that differs from a second audio identity of a second group of the plurality of non-audio signals;
wherein processing includes counting a first number of signals in the first group of the plurality of non-audio signals and counting a second number of signals in the second group of the plurality of non-audio signals;
wherein performing a lookup includes identifying a first audio file corresponding to the first group of the plurality of non-audio signals and a second audio file corresponding to the second group of the plurality of non-audio signals;
wherein the outputted data is configured to cause the first audio file and the second audio file to simultaneously play;
wherein outputting is configured to cause the at least one particular audio file to play via the presentation;
wherein outputting is configured to cause the at least one particular audio file to play on the plurality of network access devices;
wherein outputting is configured to cause the at least one particular audio file to play via the presentation on the plurality of network access devices;
wherein in the data structure associates a first audio file with a first range of quantities of non-audio signals and a second audio file with a second range of quantities of non-audio signals;
wherein when the determined quantity falls within the first range, outputting is configured to cause the first audio file to playback;
maintaining a count of a quantity of actively connected network access devices, to compare a number of received non-audio signals in a particular time frame with the count, and to select the at least one particular audio file to be played as a function of a correlation between the count and the number of non-audio signals received;
wherein the correlation is a proportion of non-audio signals to the count;
wherein as the proportion increases the output is configured to cause an increase in a volume of play of the selected audio file;
wherein the correlation is a proportion of non-audio signals to the count;
wherein the selection of the at least one audio file is a function of the proportion;
receiving an additional non-audio augmentation signal from an administrator to cause a playback of an audio file different from the particular audio file;
limiting a number of non-audio signals processed from each network access device within a particular time frame;
wherein the limit is a single non-audio signal per unit of time;
processing a plurality of non-audio signals processed from each network access device within a particular time frame;
causing both the at least one particular audio file and graphical imagery to be presented via the plurality of network access devices;
wherein the graphical imagery includes an emoji;
wherein the graphical imagery is correlated to the audio file;
wherein the graphical imagery corresponds to activations of graphical imagery buttons on a plurality of network access devices;
wherein the graphical imagery reflects identities of a plurality of individuals associated with the plurality of network access devices;
wherein the audio-related data structure contains information about a plurality of audio files each associated with a common audio identity;
wherein each of the plurality of audio files corresponds to a differing quantity of non-audio signals;
electronically accessing first data associated with a first board;
electronically accessing second data associated with a second board;
performing electronic semantic analysis to identify a portion of the first data associated with the first board and a portion of the second data associated with the second board that share a similarity;
consolidating in a third board reflecting a similarity consolidation, the identified first portion and the identified second portion;
summarizing the first portion;
summarizing the second portion;
aggregating the summarized first portion and the summarized second portion to form an aggregated summary;
presenting on the third board the aggregated summary in a manner associating the aggregated summary with the similarity consolidation;
wherein the first data and the second data include row headings;
wherein the shared similarity includes a similarity between row headings;
wherein identifying the shared similarity includes discovering a first plurality of common row headings in the first data, discovering a second plurality of common row headings in the second data;

wherein consolidating the identified similarity includes generating a singular entry in the third board consolidating the first plurality of common row headings and second plurality of common row headings;
wherein the first data and the second data include status information;
wherein the identified similarity between the first data and the second data includes common status information;
wherein summarizing the first portion and the second portion includes counting common statuses within the first portion and the second portion;
wherein the aggregated summary includes an indication of a number of entries that share a common status;
wherein the manner associating the aggregated summary with the similarity consolidation includes displaying the similarity consolidation as a row heading and the aggregated summary in a cell associated with the row heading;
wherein the cell includes a numeral or a summary representation;
wherein the cell includes an active link;
upon activation of the link, causing a display of at least one of the portion of the first data or the portion of the second data;
electronically receiving a first selection of at least one item contained on both a first board and a second board;
electronically receiving a second selection of a first type of information presented on the first board, the first type of information being associated with a first heading;
electronically receiving a third selection of a second type of information presented on the first board, the second type of information being associated with a second heading;
electronically receiving a fourth selection of a third type of information presented on the second board, the third type of information being associated with a third heading;
wherein the first type of information is aggregable with the third type of information in a first aggregation;
wherein the first heading differs from the third heading;
electronically receiving a fifth selection of a fourth type of information presented on the second board, the fourth type of information being associated with a fourth heading;
wherein the second type of information is aggregable with the fourth type of information in a second aggregation, and wherein the second heading differs from the fourth heading;
electronically generating a summary board including the at least one item, the summary board associating with the at least one item the first aggregation and the second aggregation;
electronically associating one of the first heading and the third heading with the first aggregation;
electronically associating one of the second heading and the fourth heading with the second aggregation;
determining a similarity between the first type of information and the third type of information;
wherein the similarity is based on at least one of a position, a data type, a historical usage, or a logical rule;
generating a fifth heading for the first aggregation;
wherein the first aggregation includes an indicator that summarizes the first type of information and the third type of information;
wherein the indicator is interactive to enable display of underlying information from the first type of information and the third type of information;
wherein the second aggregation includes another indicator that summarizes the second type of information and the fourth type of information;
receiving a selection of at least one item contained on both a first board and a second board;
detecting a first type of information presented on the first board, the first type of information being associated with a first heading;
detecting a second type of information presented on the first board, the second type of information being associated with a second heading;
detecting a third type of information presented on the second board, the third type of information being associated with a third heading different from the first heading;
detecting a fourth type of information presented on the second board, the fourth type of information being associated with a fourth heading different from the second heading;
analyzing characteristics of the first type of information, the second type of information, the third type of information, and the fourth type of information, to ascertain that the first type of information is aggregable with the third type of information, and that the second type of information is aggregable with the fourth type of information;
presenting the at least one item on a third board;
aggregating on the third board, in association with the at least one item, the first type of information with the third type of information, and the second type of information with the fourth type of information;
wherein each of the first type of information, the second type of information, the third type of information, and the fourth type of information includes associated metadata;
wherein analyzing characteristics includes analyzing the associated metadata to ascertain that the first type of information is aggregable with the third type of information, and that the second type of information is aggregable with the fourth type of information;
wherein the associated metadata is based on at least one of a position, a data type, a historical usage, or a logical rule;
generating a first indicator that summarizes the first type of information and the third type of information;
generating a second indicator that summarizes the second type of information and the fourth type of information;
wherein the indicator is interactive to enable display of underlying information from the first type of information and the third type of information;
generating a fifth heading for aggregating the first type of information with the third type of information;
maintaining for presentation on a viewable interface a higher-level table structure having first rows, first columns and first cells at intersections of first rows and first columns;
maintaining for presentation on the viewable interface a lower-level table structure having second rows, second columns and second cells at intersections of second rows and second columns;
linking the lower-level table to a specific first cell in the higher-level table;
wherein the specific first cell is configured to present a milestone indicator;

storing a specific conditional rule associating the specific first cell with a plurality of second cells of the lower-level table, such that entry of qualifying data into each of the plurality of second cells triggers the specific conditional rule to cause a change in the specific first cell of the higher-level table;

receiving qualifying information from each of the plurality of second cells;

upon receipt of the qualifying information from each of the plurality of second cells, triggering the specific conditional rule to thereby update milestone information in the specific first cell of the higher-level table;

wherein prior to updating the specific first cell, the specific first cell is empty and updating causes the milestone indicator to be added to the specific first cell;

wherein prior to updating of the specific first cell, the specific first cell contains an original milestone indicator and updating causes the original milestone indicator to be replaced by an updated milestone indicator thereby reflecting progress in a workflow;

causing the lower-level table to be selectively expandable and collapsible on the viewable interface and upon receipt of a collapsing command, cause the lower-level table to be hidden from view;

receiving from a rule-builder interface, specific conditions in second cells of the lower-level table that trigger the milestone update in the first specific cell of the higher-level table;

receiving from the rule-builder interface, specific variables for each of the plurality of second cells, to prevent the specific conditional rule to be triggered until each of the specific variables exists in an associated second cell;

storing the specific conditional rule as a template for application to additional lower-level tables;

maintaining the higher-level table structure having first rows, first columns, and first cells at intersections of the first rows and first columns;

wherein the first cells are configured to hold values;

wherein the higher-level table structure exhibits a plurality of characteristics including at least two of a table type, a table grouping, table content, a table size, a particular column heading, a particular item label, or an author;

receiving an input for triggering generation of a lower-level table template tied to the higher-level table structure;

analyzing at least one higher-level table characteristic including a higher-level table type, higher-level table grouping, higher-level table content, higher-level table size, higher-level particular column heading, higher-level particular item label, or higher-level author;

based on the input and the analysis, determine a customization of the lower-level table template, the customization including at least one of a lower-level column heading or a lower-level row heading;

associating the customization with the lower-level table template to form a customized lower-level table structure;

causing the lower-level table structure to be displayed in association with the higher-level table structure;

wherein the triggering occurs as a result of activation of a button;

determining when conditions in the higher-level table structure meet a criterion for automatically generating a lower-level table structure;

wherein the input occurs as a result of the determination that the criterion is met;

determining a customization of a plurality of differing lower-level table structures depending on specific characteristics of the higher-level table structure;

receiving an instruction for triggering generation of a sub-lower-level table template tied to the lower-level table structure;

analyzing at least one lower-level table characteristic, including lower-level table type, lower-level table grouping, lower-level table content, lower-level table size, lower-level particular column heading, lower-level particular item label, or lower-level author;

based on the instruction and at least one of the higher-level table characteristic and the lower-level table characteristic, determining a customization of the sub-lower-level table template, the sub-lower-level customization including at least one of a sub-lower-level column heading or a sub-lower-level row heading;

associating the customization of the sub-lower-level table template with the sub-lower-level table template to form a customized sub-lower-level table structure;

causing the sub-lower-level table structure to be displayed in association with the lower-level table structure;

wherein determining the customization of the lower-level table template includes presenting options for lower-level template structure and receiving a selection in response; and storing the lower-level template structure for use with a later-developed higher-level table structure clone.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A workflow management system having an integrated unified filing engine, the system comprising:

at least one processor configured to:

maintain at least one table of the workflow management system, the at least one table containing a plurality of items and a plurality of asset designations, each asset designation being associated with at least one of the plurality of items;

maintain at least one electronic whiteboard containing at least a subset of the plurality of asset designations;

maintain a data structure containing a plurality of links, wherein each link associates at least one of the subsets of asset designations with at least one location on the at least one electronic whiteboard;

receive via a network access device having a display presenting the at least one table, an activation of a particular link associated with a particular asset;

in response to the activation of the particular link, alter the display to present at least a particular location on the at least one electronic whiteboard containing a particular asset designation corresponding to the particular asset, wherein the particular location includes a cluster of additional asset designations related to the particular asset, and the presentation of at least the particular location is a zoomed-in rendering of the particular location on the at least one electronic whiteboard;

receive a selection of at least one of the additional asset designations or the particular asset designation;

in response to the selection, retrieve a corresponding asset;

cause the corresponding asset to be presented on the display;

receive at least one item to be uploaded from an entity to the at least one electronic whiteboard;

perform at least one recognition process on the at least one item to be uploaded; and provide the entity with an interface based on the at least one recognition process, wherein the interface is configured to enable the entity to edit the at least one item prior to storage in the at least one electronic whiteboard.

2. The system of claim 1, wherein the particular asset is a digital file, including at least one of a text, video, audio, image, design, document, tabular, an image file, a video file, a drawing file, a graphic file, a presentation file, a project management file, or a web page.

3. The system of claim 1, wherein the cluster of additional asset designations is based on at least one of an author, owner, project, item, subject matter, team, file type, deadline, status, metadata, label, budget, or data source.

4. The system of claim 1, wherein at least one of the additional asset designations of the cluster is associated with a differing asset from the particular asset.

5. The system of claim 1, wherein at least one of the additional asset designations of the cluster is activatable to access information of another table.

6. The system of claim 1, wherein the at least one processor is further configured to receive an alteration to the presented corresponding asset, wherein the alteration causes sending a notification to an entity associated with the presented corresponding asset.

7. The system of claim 1, wherein the at least one processor is further configured to receive an alteration to the presented corresponding asset, and wherein the alteration to the presented corresponding asset causes the presented corresponding asset to be associated with another cluster of the at least one electronic whiteboard.

8. The system of claim 1, wherein the at least one processor is further configured to receive an alteration to the presented corresponding asset, and wherein the alteration to the presented corresponding asset causes a simultaneous change to the at least one table and the at least one electronic whiteboard.

9. The system of claim 1, wherein the at least one processor is further configured to:

receive a preselection of at least one of the additional asset designations or the particular asset designation;

in response to the preselection, cause metadata corresponding to the preselected asset designation to be presented on the display.

10. The system of claim 9, wherein receiving the preselection includes receiving an indication that a cursor in a user interface is hovering over at least one of the additional asset designations or the particular asset designation.

11. The system of claim 1, wherein the at least one item is associated with one or more entities and stored in a collective data store shared among the one or more entities.

12. The system of claim 1, wherein the at least one recognition process includes scanning the at least one item to identify at least one of an author, owner, project, subject matter, team, file type, deadline, status, metadata, label, budget, or data source.

13. The system of claim 1, wherein the particular location includes at least one additional cluster of additional asset designations related to the cluster, and an association between the cluster and the at least one additional cluster is indicated by at least one of proximity or color coding.

14. A non-transitory computer readable medium containing instructions that when executed by at least one processor, cause the at least one processor to perform operations for workflow management having an integrated unified filing engine, the operations comprising:

maintaining at least one table of the workflow management system, the at least one table containing a plurality of items and a plurality of asset designations, each asset designation being associated with at least one of the plurality of items;

maintaining at least one electronic whiteboard containing at least a subset of the plurality of asset designations;

maintaining a data structure containing a plurality of links, wherein each link associates at least one of the subsets of asset designations with at least one location on the at least one electronic whiteboard;

receiving via a network access device having a display presenting the at least one table, an activation of a particular link associated with a particular asset;

in response to the activation of the particular link, altering the display to present at least a particular location on the at least one whiteboard containing a particular asset designation corresponding to the particular asset, wherein the particular location includes a cluster of additional asset designations related to the particular asset, and the presentation of at least the particular location is a zoomed-in rendering of the particular location on the at least one electronic whiteboard;

receiving a selection of at least one of the additional asset designations or the particular asset designation;

in response to the selection, retrieving a corresponding asset;

causing the corresponding asset to be presented on the display;

receiving at least one item to be uploaded from an entity to the at least one electronic whiteboard;

performing at least one recognition process on the at least one item to be uploaded; and providing the entity with an interface based on the at least one recognition process, wherein the interface is configured to enable the entity to edit the at least one item prior to storage in the at least one electronic whiteboard.

15. The non-transitory computer readable medium of claim 14, wherein the particular asset is a digital file, including at least one of a text, video, audio, image, design, document, tabular, an image file, a video file, a drawing file, a graphic file, a presentation file, a project management file, or a web page.

16. The non-transitory computer readable medium of claim 14, wherein the cluster of additional asset designations is based on at least one of an author, owner, project, item, subject matter, team, file type, deadline, status, metadata, label, budget, or data source.

17. The non-transitory computer readable medium of claim 14, wherein at least one of the additional asset designations of the cluster is associated with a differing asset from the particular asset.

18. The non-transitory computer readable medium of claim 14, wherein at least one of the additional asset designations of the cluster is activatable to access information of another table.

19. The non-transitory computer readable medium of claim 14, wherein the operations further comprise receiving an alteration to the presented corresponding asset, and wherein the alteration causes sending a notification to an entity associated with the presented corresponding asset.

20. The non-transitory computer readable medium of claim 14, wherein the operations further comprise receiving an alteration to the presented corresponding asset, and wherein the alteration to the presented corresponding asset causes the presented corresponding asset to be associated with another cluster of the at least one electronic whiteboard.

21. The non-transitory computer readable medium of claim 14, wherein the operations further comprise receiving an alteration to the presented corresponding asset, and wherein the alteration to the presented corresponding asset causes a simultaneous change to the at least one table and the at least one electronic whiteboard.

22. A method for workflow management having an integrated unified filing engine, the method comprising:

maintaining at least one table of the workflow management system, the at least one table containing a plurality of items and a plurality of asset designations, each asset designation being associated with at least one of the plurality of items;

maintaining at least one electronic whiteboard containing at least a subset of the plurality of asset designations;

maintaining a data structure containing a plurality of links, wherein each link associates at least one of the subsets of asset designations with at least one location on the at least one electronic whiteboard;

receiving via a network access device having a display presenting the at least one table, an activation of a particular link associated with a particular asset;

in response to the activation of the particular link, altering the display to present at least a particular location on the at least one electronic whiteboard containing a particular asset designation corresponding to the particular asset, wherein the particular location includes a cluster of additional asset designations related to the particular asset, and the presentation of at least the particular location is a zoomed-in rendering of the particular location on the at least one electronic whiteboard;

receiving a selection of at least one of the additional asset designations or the particular asset designation;

in response to the selection, retrieving a corresponding asset;

causing the corresponding asset to be presented on the display;

receiving at least one item to be uploaded from an entity to the at least one electronic whiteboard;

performing at least one recognition process on the at least one item to be uploaded; and providing the entity with an interface based on the at least one recognition process, wherein the interface is configured to enable the entity to edit the at least one item prior to storage in the at least one electronic whiteboard.

23. The method of claim 22, wherein the particular asset is a digital file, including at least one of a text, video, audio, image, design, document, tabular, an image file, a video file, a drawing file, a graphic file, a presentation file, a project management file, or a web page.

24. The method of claim 22, wherein the cluster of additional asset designations is based on at least one of an author, owner, project, item, subject matter, team, file type, deadline, status, metadata, label, budget, or data source.

25. The method of claim 22, the method further comprising receiving an alteration to the presented corresponding asset, and wherein the alteration to the presented corresponding asset causes the presented corresponding asset to be associated with another cluster of the at least one electronic whiteboard.

* * * * *